US011648681B2

(12) United States Patent
Ju

(10) Patent No.: US 11,648,681 B2
(45) Date of Patent: May 16, 2023

(54) AXIS-INVARIANT BASED MULTI-AXIS ROBOT SYSTEM INVERSE KINEMATICS MODELING AND SOLVING METHODS

(71) Applicant: Hehua Ju, Nanjing (CN)

(72) Inventor: Hehua Ju, Nanjing (CN)

( * ) Notice: Subject to any disclaimer, the term of this patent is extended or adjusted under 35 U.S.C. 154(b) by 627 days.

(21) Appl. No.: 16/541,149

(22) Filed: Aug. 15, 2019

(65) Prior Publication Data

US 2020/0055192 A1 Feb. 20, 2020

(30) Foreign Application Priority Data

Aug. 16, 2018 (CN) ......................... 201810933539.0

(51) Int. Cl.
*B25J 9/16* (2006.01)

(52) U.S. Cl.
CPC ........... *B25J 9/1697* (2013.01); *B25J 9/1602* (2013.01); *B25J 9/1664* (2013.01)

(58) Field of Classification Search
None
See application file for complete search history.

(56) References Cited

U.S. PATENT DOCUMENTS

2020/0055192 A1* 2/2020 Ju .......................... B25J 9/1602

FOREIGN PATENT DOCUMENTS

| | | | |
|---|---|---|---|
| CN | 201249818 | Y | 6/2009 |
| CN | 101733749 | A | 6/2010 |
| CN | 101733749 | A | 6/2010 |
| CN | 101982822 | A | 3/2011 |
| CN | 103901898 | A | 7/2014 |
| CN | 104573255 | A | 4/2015 |
| CN | 106393174 | A | 2/2017 |
| CN | 106393174 | A | 2/2017 |
| CN | 107336231 | A | 11/2017 |
| CN | 107443382 | A | 12/2017 |
| CN | 108081256 | A | 5/2018 |
| JP | 2004230530 | A | 8/2004 |
| JP | 2004272783 | A | 9/2004 |
| JP | 4133381 | B2 | 8/2008 |

OTHER PUBLICATIONS

Jü Hehua, et al., A collide detection algorithm based on virtual sensors of lunar rover manipulator, Journal of Harbin Institute of Technology, 2016, pp. 58-65, vol. 48 No.1.

* cited by examiner

*Primary Examiner* — Jeff A Burke
*Assistant Examiner* — Arslan Azhar
(74) *Attorney, Agent, or Firm* — Bayramoglu Law Offices LLC

(57) ABSTRACT

The present invention proposes an inverse kinematics modeling and solving principle for multi-axis systems based on axis invariant, including: the D-H and D-H parameter determination principle based on fixed axis invarian, "Ju-Gibbs" quaternion and class direction cosine matrix principle, the inverse solution principle of general 6R and 7R robotic arms based on axial invariant. These principles are versatile, convenient, and precise. They can be set up as circuits, code, directly or indirectly, partially or completely within a multi-axis robot system. In addition, the present invention also includes analysis verification system constructed on these principles for designing and verifying multi-axis robot systems.

13 Claims, 57 Drawing Sheets

101 — link $l$
102 — link $\bar{l}$

101 — link $l$

102 — link $\bar{l}$

| Name | ID | Type of Joint Pairs | Drawing | Diagram | Motion-Axis | Constraint Axis | |
|---|---|---|---|---|---|---|---|
| | | | | | | Rotational Axis | Translational Axis |
| Sphere Joint | *S* | Space Class III lower pair | 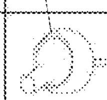  |  | 3 | 0 | 3 |
| Gimbal Joint | *G* | Space Class IV lower pair | 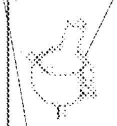  | 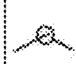 | 2 | 1 | 3 |
| Cylindrical Joint | *C* | Space Class IV lower pair | 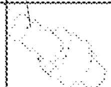  |  | 2 | 2 | 2 |
| Helical Joint | *H* | Space Class V lower pair |   | 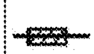 | 1 | 2 or 3 | 1 or 2 |
| Prismatic Joint | *P* | Surface Class V lower pair | 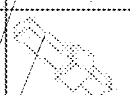  | 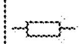 | 1 | 3 | 2 |
| Revolute Joint | *R* | Surface Class V lower pair |   |  | 1 | 2 | 3 |

Fig. 3

401
| Name | ID | Type of Joint Pairs | Drawing | Diagram | Motion-Axis | Constraint Axis | |
|---|---|---|---|---|---|---|---|
| | | | | | | Rotational Axis | Translational Axis |
| Contact Joint | *O* | Space Class I lower pair |  | 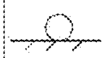 | 5 | 0 | 1 |
| Virtual Joint | *V* | | | 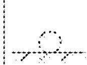 | 6 | 0 | 0 |
| Fixed Joint | **X** | | | 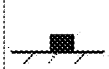 | 0 | 3 | 3 |
Fig. 4

| Name | ID | Diagram | Description |
|---|---|---|---|
| Inertial space | $i$ |  | [1] $i$ represents the root of tree-typed system. |
| Inertial center | $l_I$ | ⊗ or • | [2] $l_I$ indicates the inertial center $I$ belongs to Link $\#l$. [3] Mass centers are key points in dynamics. |
| Geometrical body | $\Omega_l$ | ⊥ | [4] $\Omega_l$ stands for the geometrical body of Link $\#l$. |

6011 — base
6021 — the first link and revolute joint pair ${}^{0}\boldsymbol{R}_1$
6031 — the second link and revolute joint pair ${}^{1}\boldsymbol{R}_2$
6041 — the third link and revolute joint pair ${}^{2}\boldsymbol{R}_3$
6051 — the first gripper and revolute joint pair ${}^{3}\boldsymbol{R}_4$
6061 — the second gripper and revolute joint pair ${}^{4}\boldsymbol{R}_5$
6071 — the third gripper and revolute joint pair ${}^{5}\boldsymbol{R}_6$ 60111 — base
60211 — the first link and revolute joint pair ${}^{0}\boldsymbol{R}_{1}$
60311 — the second link and revolute joint pair ${}^{1}\boldsymbol{R}_{2}$
60411 — the third link and revolute joint pair ${}^{2}\boldsymbol{R}_{3}$
60511 — the first gripper and revolute joint pair ${}^{3}\boldsymbol{R}_{4}$
60611 — the second gripper and revolute joint pair ${}^{4}\boldsymbol{R}_{5}$
60711 — the third gripper and revolute joint pair ${}^{5}\boldsymbol{R}_{6}$ 701 — right rocker
702 — left rocker
703 — differential machanism
704 — right differential machanism arm
705 — left differential machnism arm
706 — right helical gear
707 — left helical gear
708 — front helical gear
709 — back helical gear
710 — chassis
711 — chassis bottom 801 — left rocker
802 — right rocker
803 — left differential arm
804 — right differential arm
805 — the horizontal axle
806 — left bogie
807 — right bogie 901 — the prismatic joint
902 — the spherical joint
903 — link 1101 — the 1D coordinate axis $l$
1102 — the origin $O_l$
1103 — the basis vector $\mathbf{e}_l$
1104 — point $S$ 1201 — the orgin $O_l$
1202 — point $l_S$
1203 — the position vector ${}^{l}\vec{r}_{l_S}$
1204 — the 1D coordinate axis $l$
1205 — the projection vector ${}^{l}r_{l_S}$
1206 — the basis vector $\mathbf{e}_l$ $O_l$ — the origin $\mathbf{e}_l$ — the basic vector $^{\bar{l}}\vec{n}_l$ — the unit Axis-Vector $\phi_{lx}^l$ 、$\phi_{ly}^l$ 、$\phi_{lz}^l$ — three basic component 1601 — angular position $\phi_l^{\bar{l}}$ 1602 — coordinate vector ${}^{\bar{l}}\vec{n}_l$ 1701 — link $\bar{l}$ 1702 — link $l$ 1703 — the position vector ${}^{\bar{l}}_{0}r_l$ 1704 — the axis-vector ${}^{\bar{l}}n_l$ 1801 — the nature zero position vector ${}^{\bar{l}}_{0}\vec{u}_{l}$ 1802 — the current unit vector ${}^{\bar{l}}_{t}\vec{u}_{l}$ 1803 — the axis-vector ${}^{\bar{l}}\vec{n}_{l}$ 1804 — angular position $\phi_{l}^{\bar{l}}$ 1805 — the origin $O_{l}$ 1805 — the radical axis $\phi_{\bar{l}}$ — the rotation angle to the axis $z_{\bar{l}'}$ $\alpha_{\bar{l}}$ — the rotation angle to the axis $x_{l'}$ 2001 — the first revolute joint
2002 — the second revolute joint
2003 — the third revolute joint
2004 — wrist center
2005 — axis $\boldsymbol{R}_1$
2006 — axis $\boldsymbol{R}_2$
2007 — axis $\boldsymbol{R}_3$
2008 — pick point

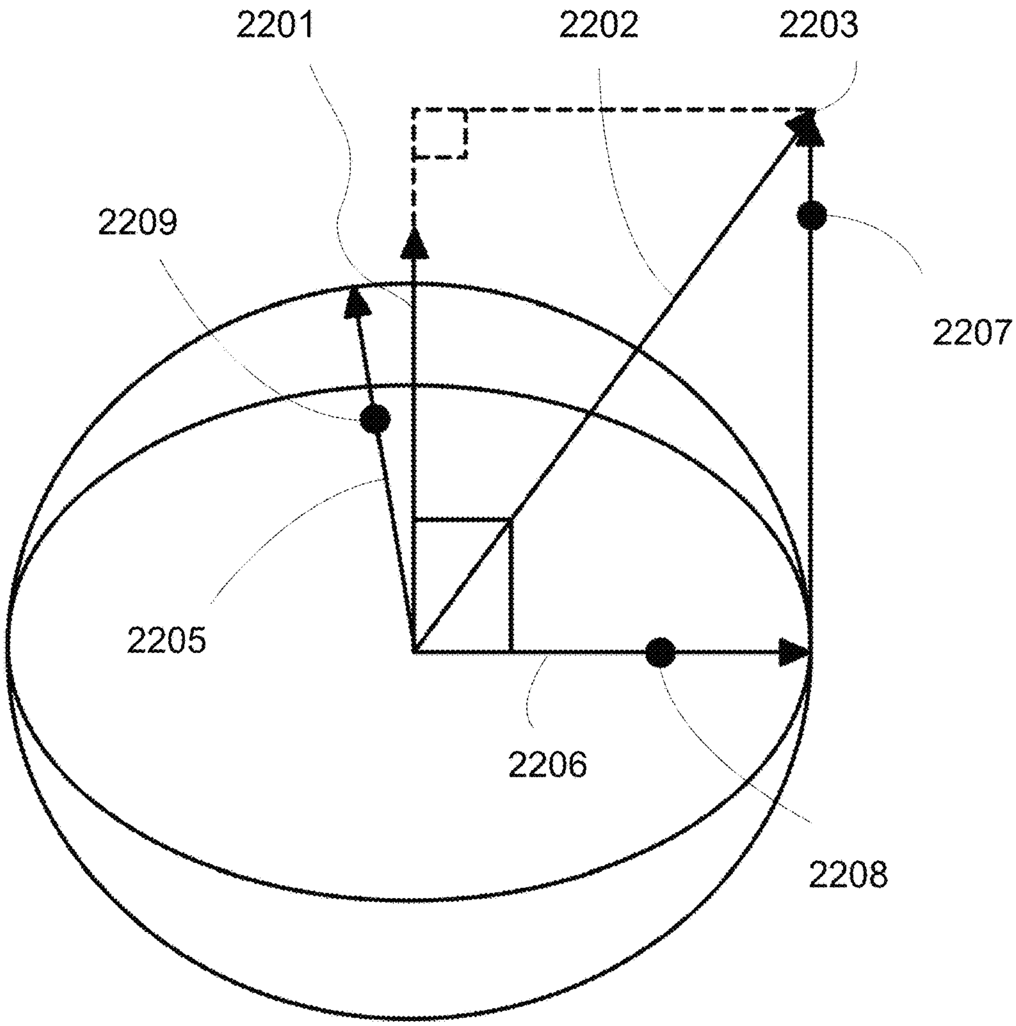

2201 — the axis-vector ${}^{\bar{l}}n_l$
2202 — the unit vector ${}^{l}_{0}u_{l_S}$
2203 — a point $S$ located on the unit sphere
2205 — radial axis-vector ${}^{\bar{l}}_{0}n_l$ at initial time
2206 — nature zero-point axis-vector ${}^{\bar{l}}_{\cdot}n_l$
2207 — the projection vector of the unit vector ${}^{l}_{0}u_{l_S}$ to the axis vector ${}^{\bar{l}}n_l$ is $\left({}^{\bar{l}}n_l \cdot {}^{\bar{l}}n_l^{\mathrm{T}}\right) \cdot {}^{l}_{0}u_{l_S}$
2208 — the projection vector of the unit vector ${}^{l}_{0}u_{l_S}$ to the natural zero-position axis vector ${}^{\bar{l}}_{x}n_l$ is $\left(\mathbf{1} - {}^{\bar{l}}n_l \cdot {}^{\bar{l}}n_l^{\mathrm{T}}\right) \cdot {}^{l}_{0}u_{l_S}$
2209 — the first-order vector screw of Axis-Vector ${}^{\bar{l}}n_l$ to ${}^{l}_{0}u_{l_S}$ is ${}^{\bar{l}}\tilde{n}_l \cdot {}^{l}_{0}u_{l_S}$

Fig. 22

2301 — point $S$
2302 — the image of point $S$ is point $S'$
2303 — the inverse image of point $S$ is point $S''$
2304 — the axis-vector of mirror ${}^{\bar{l}}n_l$
2305 — vector ${}^{l}r_{l_S}$
2306 — the vector from point $S$ to point $S'$ is $-2\cdot\left({}^{\bar{l}}n_l\cdot{}^{\bar{l}}n_l^{\mathrm{T}}\right)\cdot{}^{l}r_{l_S}$

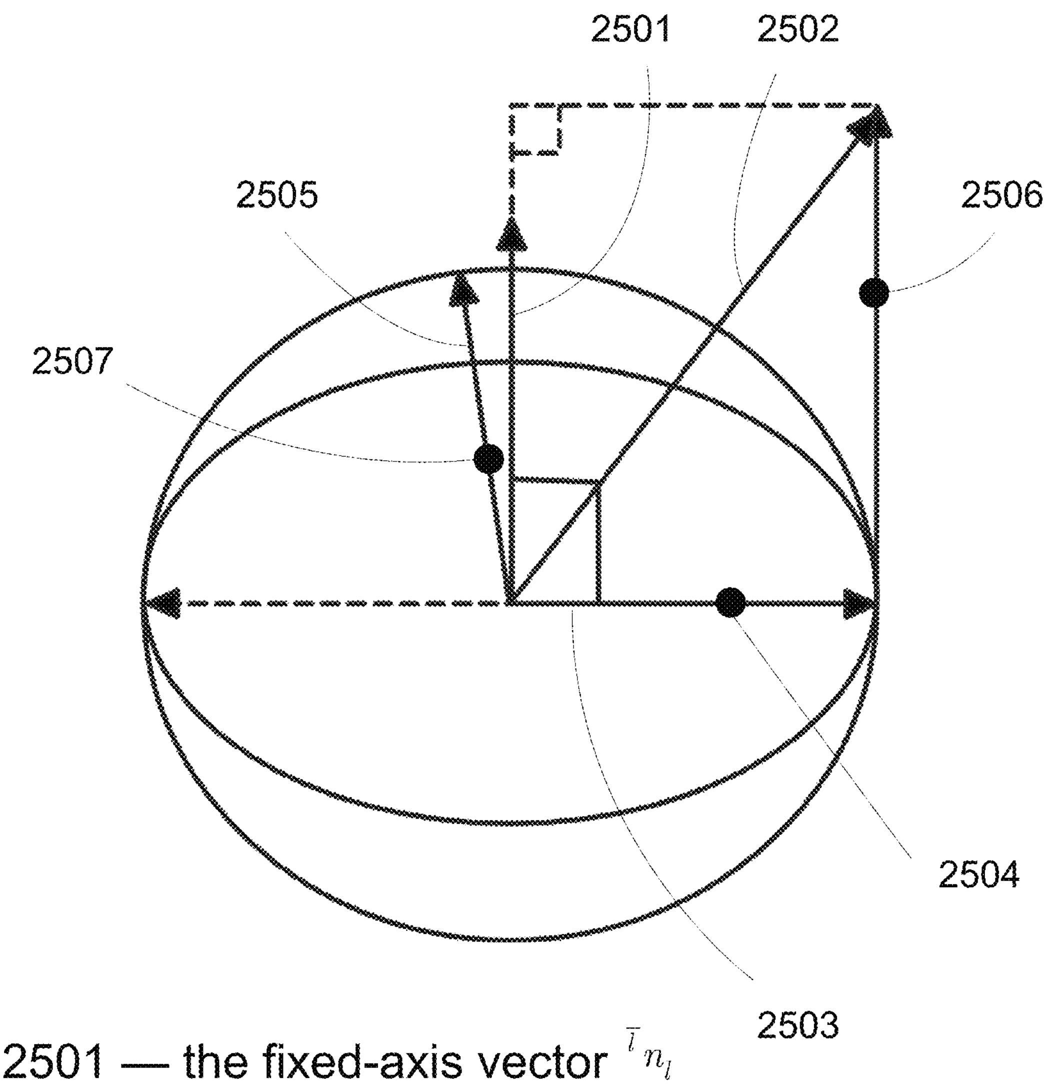

2501 — the fixed-axis vector $^{\bar{l}}n_l$

2502 — the consolidated unit vector of $^{\bar{l}}n_l$ is $^{l}u_{l_s}$

2503 — the natural zero-point vector $^{\bar{l}}_{\bullet}n_l$

2504 — the projection of $^{l}u_{l_s}$ to the natural zero-point vector $^{\bar{l}}_{\bullet}n_l$ is $\left(\mathbf{1} - {}^{\bar{l}}n_l \cdot {}^{\bar{l}}n_l^{\mathrm{T}}\right) \cdot {}^{l}u_{l_s} \cdot \mathrm{C}\left(\phi_l^{\bar{l}}\right)$ 2505 — the radical axis-vector $^{\bar{l}}_{\circ}n_l$ 2506 — the axial component $\left({}^{\bar{l}}n_l \cdot {}^{\bar{l}}n_l^{\mathrm{T}}\right) \cdot {}^{l}u_{l_s}$ 2507 — the radical axis-vector $^{\bar{l}}\tilde{n}_l \cdot {}^{l}u_{l_s}$

Fig. 25a

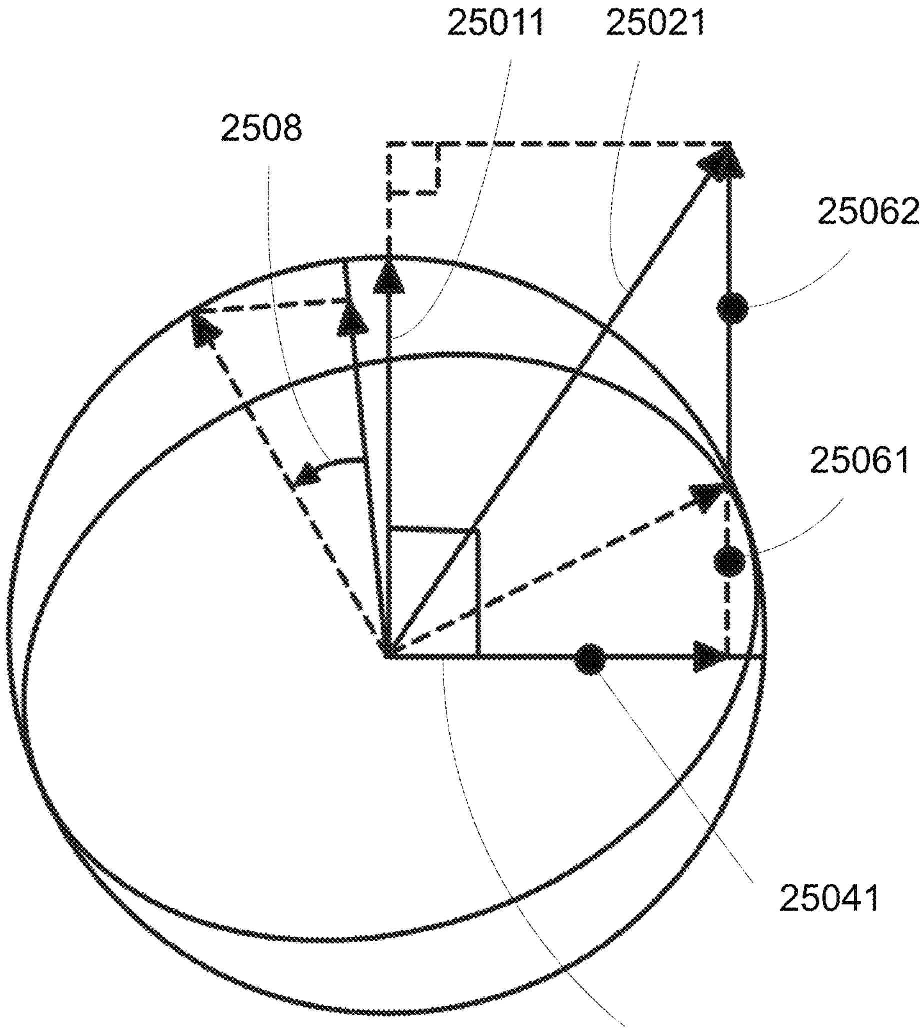

2508 — the rotational angle $\phi_l^{\bar{l}}$
25011 — the Axis-Vector ${}^{\bar{l}}n_l$
25021 — the unit vector ${}^{l}u_{l_s}$
25031 — the natural zero-position vector ${}^{\bar{l}}_{\bullet}n_l$
25041 — the projection of ${}^{l}u_{l_s}$ to the natural zero-position vector ${}^{\bar{l}}_{\bullet}n_l$ is $\left(1 - {}^{\bar{l}}n_l \cdot {}^{\bar{l}}n_l^{\mathrm{T}}\right) \cdot {}^{l}u_{l_s} \cdot \mathrm{C}\left(\phi_l^{\bar{l}}\right)$
25061 — the vector screw of ${}^{l}u_{l_s}$ to the natural radial Axis-vector ${}^{\bar{l}}_{\circ}n_l$ is ${}^{\bar{l}}\tilde{n}_l \cdot {}^{l}u_{l_s} \cdot \mathrm{S}\left(\phi_l^{\bar{l}}\right)$
25062 — the axial component $\left({}^{\bar{l}}n_l \cdot {}^{\bar{l}}n_l^{\mathrm{T}}\right) \cdot {}^{l}u_{l_s}$

Fig. 25b

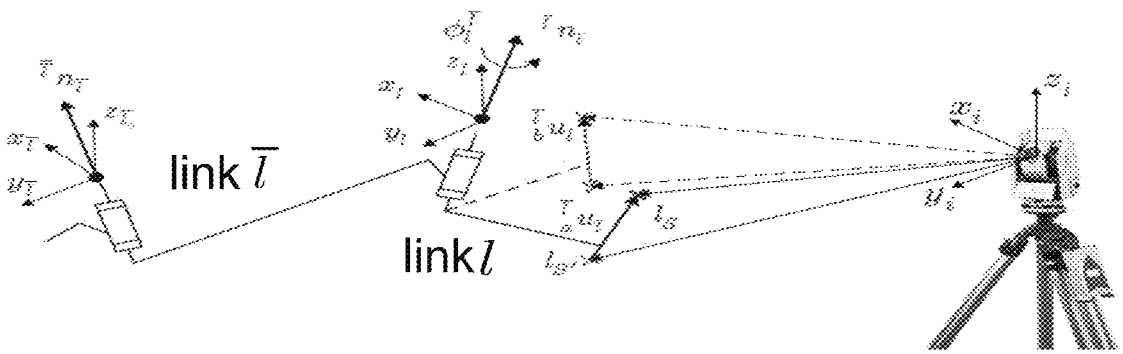

$l_S$ 、$l_{S'}$ — the positions of the laser tracker ${}_a^{\bar{l}}u_l$ — the unit position vector obtained after the rotation of axis $l$ with an angle of ${}_a\phi_l^{\bar{l}}$, the positions of laser track balls are ${}_a^i r_{l_{S'}}$ and ${}_a^i r_{l_S}$ ${}_b^{\bar{l}}u_l$ — the unit position vector obtained after the rotation of axis $l$ with an angle of ${}_b\phi_l^{\bar{l}}$, the positions of laser track balls are ${}_b^i r_{l_{S'}}$ and ${}_b^i r_{l_S}$

Fig. 29

$^{i|\bar{k}}\tilde{n}_k \quad ^{i|k}r_{n_S}$ — cross product of axis-vector $^{i|\bar{k}}n_k$ and axis-vector $^{i|k}r_{n_S}$ $^{\bar{\bar{l}}}n_{\bar{l}}$ — the axis-invariant $^{\bar{l}}n_{l}$ — the axis-invariant $^{\bar{l}}r_{l}$ — the position vector $^{\bar{l}}n_l$ — the axis-invariant $^{l}n_{\bar{l}}$ — the axis-invariant $^{\bar{l}}u_l$ — the screw radial invariant $O_{l'}$ — the origin of the D-H Frame $O_{\bar{l}*}$ — the median point $^{\bar{\bar{l}}}n_{\bar{l}}$ 、$^{\bar{l}}n_l$ — the axis-invariants $^{\bar{\bar{l}}|}\mathbf{e}_{\bar{l}}^{[z]}$ — the equivalent to the axis-invariant $^{\bar{\bar{l}}}n_{\bar{l}}$ $^{\bar{l}|}\mathbf{e}_{l}^{[z]}$ — the equivalent to the axis-invariant $^{\bar{l}}n_l$ $^{\bar{l}|}\mathbf{e}_{l'}^{[x]}$ — a common perpendicular from $n_{\bar{l}}$ to $n_l$ $p$ — the rover solar wing $c$ — the rover classis $\phi_p^c$ — joint variable of axis $p$ $S_r$ $S_l$ — anterolateral and posterolateral points of the solar wing $^c u_S$ — the unit vector of the Group Station s/1 — the first axis
a/2 — the second axis
w/3 —the third axis
c/4 — the imaginary axis 4201 — root index 3R; 4202 — middle index 1R ;
4203 — leaf index 1R; 4204 — root thumb 3R;
4205 — middle thumb 1R; 4206 — leaf thumb 1R;
4207 — wrist 2R; 4208 — elbow 2R;
4209 — shoulder 3R $l_1$ — the length of link 1

$l_{1_I}$ — the distance between the interial center of link1 and the origin of axis 1

$l_{2_I}$ — the distance between the interial center of link2 and the origin of axis 2

$\{m_l | l \in A\}$ — mass squence ${}^i g_{ll}^{T} = [0, 0, -g]$ — the gravity acceleration vector $r_1{}^i$ — the displacement of joint 1
$k$ — the elastic coefficient of spring
$l_2$ — the length of mass pendulum
$\Phi_2^1$ — the swing angle of the pendulum
$\{m_l | l \in A\}$ — mass sequnce $^{i}\boldsymbol{k}_{\bar{l}}$ — the kinematic chain of the axis $\bar{l}$ $^{l}\boldsymbol{L}$ — the closed subtree of the axis $l$ $^{\boldsymbol{D}'}f_l$ — the constraint force applied to the axis $l$ by the system $\boldsymbol{D}'$ $^{\boldsymbol{D}'}\tau_l$ — the constraint torque applied to the axis$l$ by the system $\boldsymbol{D}'$ ${}^{i}n_1$ 、${}^{1}n_2$ 、${}^{2}n_3$ — the axis-invariants $m_1$ 、$m_2$ 、$m_3$ — the mass of the axis ${}^{1_I}\mathbf{J}_{1_I}$ 、${}^{2_I}\mathbf{J}_{2_I}$ 、${}^{3_I}\mathbf{J}_{3_I}$ — the rotational inertia of axis ${}^{i}n_1 \cdot \phi_1^i$ 、${}^{1}n_2 \cdot \phi_2^1$ 、${}^{2}n_3 \cdot \phi_3^2$ — the rotation of fixed axis $f_u^{\perp}$ 、$\tau_u^{\perp}$ — the radial constraint force and torque of the Motion-Axis $u$ ${}_s f_u^{\bar{u}}$ 、${}_s \tau_u^{\bar{u}}$ — the internal friction force and torque of the Motion-Axis $u$ ${}_c f_u^{\bar{u}}$ 、${}_c \tau_u^{\bar{u}}$ — the viscous force and torque of the Motion-Axis $u$ $O_l$ — the origin of axis $l$
$m_l$ — the mass of axis $l$
${}^{ll}J_{ll}$ — the centroid torque of inertia of axis $l$ $O_l$ — the origin of axis $l$ $m_l$ — the mass of axis $l$ ${}^{ll}\mathrm{J}_{ll}$ — the rotational inertia of axis $l$ $u_c$ $[\ddot{q}_d, \dot{q}_d, q_d]$ — the disired state $[\ddot{q}, \dot{q}, q]$ — the achievable state $M'(q)$ — nominal model of $M(q)$ $h'(q,\dot{q})$ — nominal model of $h(q,\dot{q})$ $u$ — the global linearized compensator $[\ddot{q}_d, \dot{q}_d, q_d]$ — the disired state $[\ddot{q}, \dot{q}, q]$ — the achievable state $M'(q)$ — nominal model of $M(q)$ $h'(q,\dot{q})$ — nominal model of $h(q,\dot{q})$ $u_f$ — disturbance $u_i'$ — nominal model of $u_i$ $u_c$ — a stable servo feedback controller

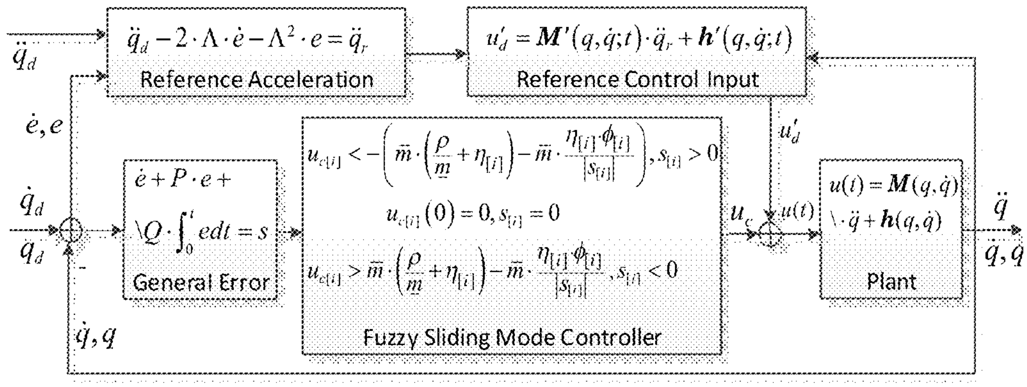

$u_c^{[i]}$ — the ith control input
$q$ — the system state
$\overline{m}$ — the least upper bound
$\underline{m}$ — the greatest lower bound
$e$ — the system deviation
$N_{[i]}(s_{[i]}, \phi_{[i]})$ — the neighborhood of the sliding model surface
$s$ — the generalized error
$\dot{s}$ — the sliding model superplane
$\ddot{q}_r$ — the reference acceleration
$\phi_{[i]}$ — the boundary thickness of the sliding model
$\Lambda$ — the position definite diagonal matrix of n×n, where $P = 2\Lambda,\ Q = \Lambda^2$
$\rho$ — the error of the system model

Fig. 53

$u_c^{[i]}$ — the ith control input
$\overline{m}$ — the least upper bound
$\underline{m}$ — the greatest lower bound
$\rho$ — the error of the system model
$\phi_{[i]}$ — the boundary thickness of the sliding model
$N_{[i]}\left(s_{[i]}, \phi_{[i]}\right)$ — the neighborhood of the sliding model surface

AXIS-INVARIANT BASED MULTI-AXIS ROBOT SYSTEM INVERSE KINEMATICS MODELING AND SOLVING METHODS

FIELD OF THE INVENTION

The invention relates to a robot, a robot autonomous control system and a method used in autonomous robot control system, especially with regard to a multi-axis robot, multi-axis robot autonomous control system and multi-axis robot autonomous control system application method.

BACKGROUND OF THE INVENTION

Robotics is currently a very popular research field. This field has been invested a great deal of science and engineering manpower in the past decades and has studied for many years. However, once the number of the axis and degree of freedom are increased to a certain number, according to the existing textbooks and known observations, modeling, calculation and control methods, they often fall into complex out-of-control, even unsolvable problems.

First, the past practices lack generalized capabilities. It often needs to re-research to establish the corresponding kinematics and mechanical model for different robots.

Second, in the past practices used in the modeling process, the symbols and languages used were often inaccurate and incomplete. It leaded to many parameters that were not taken into account in the early stages of modeling. The subsequent entire modeling processes, including programming code written, were necessary to individually consider and solve the parameters and details that were not considered before. For complex systems such as robots with more degrees of freedom, it often means that a large number of bugs are hidden in the entire modeled system. This will affect the efficiency of the entire system development, and this kind of system developed without full consideration often has many stability problems that are difficult to solve.

Moreover, when the past practices encountered a higher complexity, the amount of computation would increase substantially or even be unanswered, and the accuracy of the calculation would be greatly affected. In other words, it has become a major flaw for robots that require immediate computational control to achieve autonomous control.

Therefore, although there are many robot-related theories, there is still lack of a complete and effective desymbol framework and corresponding calculation and control methods, which can comprehensively solve problems relating to modeling, computational structures and rules in the model, forward kinematics, inverse kinematics, and mechanical calculations in the actual development of various robots.

SUMMARY OF THE INVENTION

The present invention proposes a method that can be used in various multi-axis robot desymbols, which can completely and effectively solve problems of engineering estimation and control relating to modeling, forward kinematics, inverse kinematics, and mechanical equations.

For those familiar with the field of robot desymbol, they can use the different programming tools and circuits in accordance with the description of the documents of the present invention to desymbol various multi-axis robots, the autonomous control systems used in these multi-axis robots, and computing methods performed within these autonomous control systems.

In other words, for those skilled in the art of robot desymbol, they can use the following invention to desymbol a complete robot, modify or replace the internal operation and control circuit for an existing robot, or write program codes according to the present invention to load into an already existing robot control system, and allow these program codes to achieve the technical effect of the present invention by combining with this control system. These different ways of use, as long as they conform to the spirit described in the documents of the present invention, should be considered as falling within the scope of the present invention.

It must be noted that in the current electronic and mechanical fields, the association and combination of software and hardware are very diverse. In other words, the present invention can be implemented as a robot, or a set of program codes that can be downloaded by the robot from remote, or even performing a part or all of the calculations by a computer or server other than the robot entity through the remote connection to network. The diversity of technical means should not affect the expension to which the invention should be protected, nor should it be considered that the present invention may be implemented in a method that includes program code or that appears to involve a symbolificant number of mathematical codes, thus categorized as scientific principles or mathematical methods. Since the concepts of the present invention can be implemented as a specific technical solution and solve practical technical problems, it should be considered that it truly belongs to the scope to be protected by the patent law.

Although the following description involve a lot of mathematics, these mathematics are modeling based on engineering technical view on observing the actual multi-axis robot. Moreover, a large proportion of these math codes can be converted into programmable pseudocode. These pseudocodes, including the desymboled matrix operation and equation solution, can be written as corresponding programs for different processors or circuits, or desymbol all or part of the corresponding circuit to speed up calculation.

These mathematical codes represent the actual input or output values of each joint motor of various robots, the mass, angle, position, moment of each arm section, friction between the wheel and the ground, deformation, rotation angle, and so on. In other words, what the invention can be achieved and hopefully expect to be protected is robot, robot autonomous control system, and robot autonomous control system application method, derived from this series of complete inventive concepts, rather than superficial mathematical or physical principles. It belongs to the subject of patent.

Since this entire invention is complicated, this patent specification will explain the steps of each section as much as possible. Moreover, because the method involved in the entire invention is dealing with a complex system, the relevant explanation may initially seem quite complicated. However, once you understand it, you will find that these seemingly complicated expressions and different calculation methods from the past can greatly reduce the complexity.

Through the methods described below, it can completely cover various of different looking survey vehicles, tools robotic arms and bionic robots, and use the same logic and language to establish a model. In addition, it is possible to have clear and simple steps regardless of the most important forward kinematics, inverse kinematics, or mechanical equation solving in the field of robot desymbol through the methods described below, and write the corresponding code or circuit according to these operating procedures to complete the specific robot technology program. Moreover, these calculations are due to the inventor's comprehensive observation of the nature of the technical problems with the multi-axis robots, so that find out the key points that has a lot of research but no one specifically find out, including models from axis-invariant, constructing forward kinematics, inverse kinematics, equations of motion and solving. Perceive problems that others do not notice, and propose ways to solve technical problems, and this technical means can plinkuce unexpected effects. All these should be unobvious, and further enough for the invention to have patent law advancement.

The following describes the main features of the principle of the present invention. Those skilled in the art of desymboling robots can refer to the complete description attached to the embodiments, and desymbol the multi-axis robots, multi-axis robot autonomous control system, or multi-axis robot autonomous control system application method conforming to the concept of the present invention according to various desymbol requirements after the understanding.

First, the present invention proposes a complete observation method for multi-axis robots. For this observation method, the different components of various multi-axis robots, even the joints that look different, can be described in a complete set of pictorial symbols and languages in a complete isomorphic manner.

In other words, given a specific multi-axis robot, such as prospecting vehicle, robotic arm of machine tool, and bionic robot, desymbolers can quickly and completely describe this multi-axis robot. This set of symbols and language helps to describe the problems involved in kinematics and mechanics of the entire robot. However, it must be explained that the inventor has successfully desymboled a variety of different multi-axis robot autonomous control systems by utilizing the pictorial symbols and language, and corresponding kinematics and mechanics. General desymbolers can also use this set of symbols and languages directly. However, even if the user uses a symbol name that looks different, as long as the inventive concept disclosed in the present invention is satisfied, it should also belong to the scope of the present invention.

The desymbolers can convert various joints of a multi-axis robot into equivalent multiple translational and rotational axis through this set of clearly illustrated symbols and languages. There can be a directed Span tree and a partial order kinematic chain between these axes. The following detailed description of the invention will explain the symbols and languages of these reference contemporary set theory desymbols. Not only does it have an isomorphism relationship with the concerned robot system, but also constitutes a complete model in itself. In order to prove and show the completeness of this language system, we even provide the derivation and proof of the relevant axioms in the patent specification document.

This topological space consisting of kinematic chains can carry out the following description of the motion axis symbols and operations, and these operations will meet the physical characteristics of a corresponding real robot. For example, for a multi-axis robot with three links connected by two rotational axis, when the motors inside these rotational axis rotate by a set angle, the relative positions of the three links will interfere with each other. At this point, how to calculate from one position the ends of the three links move to other position belongs to the forward kinematics in robotics. This involves iterative calculations between multiple axis coordinate systems. The desymbolers can see the technical features of these symbol systems and the present invention in the corresponding sections below, such as how to apply the characteristics of axis invariance to operate and calculate various technical problems in forward kinematics. The desymbolers can write corresponding program codes or desymbol corresponding circuits according to different desymbol requirements after reading these instructions. The desymbolers should be able to obtain relevant information in the general electronic circuit desymbol and programming reference books about the details of these programming code or different methods of circuit desymbol. The document of the present invention does not make a redundant description of the program code or circuit desymbol of these details.

In addition, if a corresponding result has been set, for example it is desirable to move the end suction cup of the multi-axis robot to a specific position judged by a multi-axis robot using machine vision such as camera to pick up an object. At this time, how to set the rotation or movement angle of each axis joint motor constitutes the main problem of inverse kinematics.

Without a doubt, in addition to calculating the amount of axis operation corresponding to a specific position of different links of a multi-axis robot, some links have inherent limitations. For example, it will be blocked by a certain shell when moved to a relative coordinate angle during movement, or some of the working environment belong to areas where some links cannot enter. These limits can be used as limiting parameters in inverse kinematics solution.

These operations involve a large number of coordinate iteration calculations and solutions. For example, the following implementation section will explain how to calculate the key D-H parameters in robotics more efficiently with Axis-Invariants. Moreover, the method of the present invention can effectively calculate the corresponding solution of the higher order multivariate equations. These solutions correspond to the actual operation displacement or rotation angle of each axis joint. Therefore, it is not only a scientific principle or a mathematical formula, but a real application and is also a technical solution that the inventor wants to protect.

The correlation matrix operations constructed under the Axis-Invariants and the operation of the solution equations for the target position, these inverse kinematics can all find a more efficient calculation method through the linguistic symbol system of the present invention than the current inverse kinematics. As mentioned above, these operation methods can be written as corresponding program codes or circuits.

It must be noted that even if the desymboler uses an operation method with a different name but the same substantive meaning to desymbol a corresponding control code or circuit, it should still belong to the scope of the present invention. Again, it is emphasized that the scope of the present invention is not limited to the provided language symbols.

The inventor provided a concrete survey vehicle implementation example to prove the concrete feasibility of this set of methods through such forward kinematics and inverse kinematics.

The inventor further constructed a set of mechanical equations of multi-axis robot based on kinematics and the characteristics of the language symbol system and related Axis-Invariants through the following implementation description. With this complete set of mechanical equations, given the first part of the known variable values in the set of mechanical equations, one can find the values of other variables by solving the set of mechanical equations. For example, it is possible to estimate the force at different positions of the multi-axis robot by inputting the mass of the multi-axis robot member, the movement of each axis joint, the rotation speed, the acceleration, etc. in this mechanical equation. In addition, like the problems to be solved by inverse kinematics, this set of mechanical equations can also be used to calculate how to control the motor output power of each axis joint when a multi-axis robot wants to apply force or force to a certain target point.

Although there have been some mechanical equations used to calculate the field of robots in the past, the mechanical equations proposed for the multi-axis robots of the present invention are obviously superior to the traditional mechanical equations regardless of the computational efficiency or the solvable dimension.

In addition, for the kinematics or mechanics operations proposed by the present invention, the desymbolers can find from the following description that a very large number of operations are based on concise language symbols and corresponding matrix operations. The characteristics of these language symbols and the corresponding matrix operations make these operations easily correspond to pseudocode. The desymbolers may even find that a large proportion of the calculations behind most pseudocode can be calculated in parallel. In other words, current multiprocessor circuits with corresponding coding can finish the entire kinematics or mechanics calculations in a very short time. This has very practical significance for the need to obtain results in real time in order to use these results for multi-axis robot parameter setting, such as for motor control current settings.

For example, even if the past mechanical equations can calculate the same solution and solve the problem for the needs of the autonomous control system, if it cannot calculate immediately within the calculation time limit of the hardware circuit, a useful robot autonomous control system cannot be successfully constructed.

Therefore, this invention can be implemented in various different forms and therefore has various different ranges. The actual scope refers to the scope defined in the claims section, and related patent cases for this invention.

For the robot control system, it is very valuable to fully grasp the parameters and details. For example, a survey vehicle is placed on the surface of the disaster area or even on the moon surface, if it judges incorrectly due to desymbol flaws, the loss caused may be a very high price.

In addition, it is very valuable to be able to use a uniform symbology and corresponding kinematics and mechanical equations to desymbol robot systems that may look completely different. For example, the robot control circuit used on the survey vehicle can be directly placed on the robot arms of various tool machines by just setting and adjusting some parameters. This is a great benefit to the production cost and complexity of processing chips.

Moreover, the desymboler can understand through the following description that the technical solution proposed by the present invention for the technical problems encountered in the desymbol of the robot has more advantages than the existing desymbol framework both in terms of computational efficiency and stability.

Based on the chain theory and tensor analysis theory of contemporary set theory, the present invention establishes a chain topological symbol system with a stringent kinematics chain index system and a kinematic chain coordinate system adapted to contemporary computer symbolic calculations. The theory of multi-body kinematics, dynamics modeling and autonomous behavior control based on chain topological calculus symbol system is constructed.

Autonomous behavior control is based on the kinematics and dynamics of multi-axis systems, contemporary computers, etc. To realize the autonomous behavior of various robot systems must follow the laws of the system itself and the external environment. However, the symbol systems in different fields are not the same. For example, there is no consistent mechanical drawing language, 3D model language, professional symbol language, and there are huge obstacles in integrating these symbol systems. Due to the lack of consistent engineering specifications and technical languages, there are obstacles in the exchange of information in different areas and it is difficult to guarantee the quality of various robots.

The design of these robots depends on the integration of contemporary mathematics, mechanics, astronomy, and computer science. In other words, to design a reliable control system, it is necessary to establish a set of theory for autonomous modeling and controlling of multi-axis systems adapted to the characteristics of contemporary computer technology.

In the present invention, the multi-axis system kinematics and dynamics modeling and autonomous behavior controlling not only realize the parameterization of the system topology, coordinate system, structural parameters and dynamic parameters, but also ensure the accuracy and real-time performance of the calculation and measurement. Thus, the modularization of modeling and controlling is achieved, which improves system integration efficiency and engineering application reliability and inheritance.

Simultaneously, the Axis-Invariant kinematics and dynamics model realizes the parameterization of the system topology (connection relationship), reference systems, polarities, structures, and mechanical parameters. It is a versatile, highly efficient, robotic kinematics and dynamics system that can be directly translated into computer code, and is the basis for robot autonomous control. The computer can perform kinematics and dynamics analysis due to computer-readable symbol system, and the system has a mechanism to autonomously determine the correctness of inference conclusions, which can greatly improve the robot's intelligence in analyzing and solving kinematics and dynamics problems.

Whether it is a complex celestial system or a complex spacecraft system, they all have an objective topology. The topology is based on the tree chain. The integration of mechanics, astronomy, and computer theory can not only unify the symbolic representation and calculation of complex large systems, but also produce many innovative theoretical and engineering technological achievements through the tree chain.

The present invention follows the philosophical principle of isomorphism, and bases on the principles of topology order immutability, tensor invariance and duality of metrics, mechanized modeling and calculation. It establishes a kinematics and dynamic equation of a multiaxial system based on Axis-Invariants that is adapted to contemporary computer for symbolic calculus and has a kinematic chain symbol calculation system. On the one hand, the parameterization of the system topology, coordinate system, structural parameters and dynamic parameters is realized. On the other hand, it is an iterative method of Axis-Invariants in three-dimensional (3D) vector space, which ensures the accuracy and real-time of calculation. It has the function of computer pseudo code to ensure the correctness and reliability of the project implementation at the same time. Based on it, the study of multi-axis system autonomous behavior control is conducted. Computer autonomously completes numerical and explicit modeling of kinematics and dynamics of multi-axis systems, and solves forward kinematics and negative kinematics, forward dynamics and negative dynamics. The invention can indirectly sense the status of the multi-axis system and the environment and indirectly sense the force of the multi-axis system and the environment. The invention can improve the absolute positional accuracy and dynamic response of the system, suppress the vibration and realize the system weight reduction. Thus, the present invention can improve the autonomous behavior capability of the multi-axis system and provide friendly, efficient, and high-quality operations and services.

The chain theory of contemporary set theory is a partially ordered set theory, and the universal law of the objective world including tree chain system. The chain theory not only applies to the action relationship of the kinematic chain, but also applies to the action relationship of the action chain. The tensor analysis theory is a mathematical tool for the study of continuous medium particles and field theory. It has Einstein indicator system. The invention uses the chain theory of contemporary set theory and the tensor analysis theory to build a kinematic chain symbol calculation system, and translate the kinematics and dynamics theory of multi-body systems traditionally dependent on natural language annotations and mathematical language descriptions into a 3D operational algebraic theory system based on chain symbology. The theory used to construct the invention has the following characteristics:

First, the present invention provides a kinematic chain symbol calculation system with chain order as the core. On the one hand, the connotation of kinematic and dynamic physics attributes are accurately expressed through the specification of symbol systems with chain indicators. On the other hand, the intrinsic order laws of kinematics and dynamics of the kinematic chain are succinctly expressed.

Second, the 3D operation algebra system of the present invention has a chain index. The difference between operational algebra and operator algebra is that: Operational algebra contains both matrix operations for numerical calculations and tree chain topology operations. Thus, the adaptability of the multi-axis system with the variable topology, the compactness of the spatial operation, and the understandability of the operation are enabled. It avoids 6d spatial operator algebra depending on system topology integration, the complexity of spatial operations and decomposition, and the abstraction of spatial operators. It is suitable for the kinematics and dynamics modeling of multi-axis systems with variable structure.

In addition, the present invention provides a 3D operational algebra system with natural axis chains. The forward iteration of the motion and the reverse iteration of the force action are the basic characteristics of the tree chain topology. The multi-body system is essentially a multi-axis system. The kinematic pair is the constraint between the axis. The kinematic chain is the axis chain. The common unit Axis-Invariant of the kinematic pair is natural reference axis and has natural invariability, so the unit invariant is called Axis-Invariant. Axis-Invariants and corresponding natural coordinates determine the unique natural coordinate system of the corresponding axis. The kinematic chain based on the Cartesian coordinate system is essentially a Cartesian coordinate axis chain system, which is a special case of the 3D operation algebra of the natural axis chain.

Moreover, the present invention has a fixed Axis-Invariant structural parameters and a natural coordinate system. On the one hand, it solves the method problem of the exact multi-axis system structural parameters. On the other hand, it also solves the problem of automatically determining D-H Frame and D-H parameters based on fixed Axis-Invariants, and solves the real-time establishment problem of the universal kinematics equations for 6-axis reversible solutions and real-time inverse solution calculations.

Furthermore, the kinematics and dynamics equations of the multi-axis system constructed by the present invention have an invariant iterative method. The present invention unifies the fixed-axis rotation of the 3D space, the Linkrigue quaternion, the Euler quaternion, and the dual quaternion of the 4D space by the Axis-Invariants, and solve the double-vector attitude, motion rotation and force rotation in 6D space. The present invention establishes an iterative method based on Axis-Invariant displacement, velocity, acceleration, and partial velocity. The present invention establishes an axis-invariant-based Ju-Kane dynamics equation for rooted tree chains and closed chains, unrooted tree chains and closed chains. The kinematics and dynamics equations of multi-axis system are related to the parametric equations of multi-axis system topology, coordinate system and polarity, structural parameters and motion parameters, with the accuracy and real-time of the forward and reverse solutions. They have the pseudo code function of the chain index. The axiomatization theory system based on topological axioms and metric axioms ensures the correctness and reliability of modeling of complex systems.

This whole set of techniques can be used to make a robot control system, which complete calculations some or all in the robot's control circuits, or partial or complete at a remote server or in an external computer device. In addition, the whole set of techniques can be used to create analysis tools that the designers can use to analyze and verify the correctness of a designed machine system, or to perform iterative design. In other words, this whole set of techniques can be made into a complete set of tools. Moreover, as will be understood from the following description, the model mentioned in this complete system has excellent extensibility. In other words, a number of robotic modules constructed based on the whole set of system can be stacked and combined, and they can still be controlled and analyzed with the same technical solution. Furthermore, because this whole set of technical solutions has a supporting concise symbol system, this symbol system can be designed to corresponding program code and function library. This whole system is easy to model. Besides, even if there is any error in the system, it can still maintain certain operational capabilities through sensor's feedback or engineering staff's adjustments. In other words, this technical solution has very good fault tolerance.

According to an embodiment of the present invention, it provides a control method for controlling a multi-axis robot device. The multi-axis robot device includes a Link Set and a joint set, and the links in the Link Set are combined with the joints in the joint set. The control method includes the following steps:

Convert the joint set to the corresponding Link Set. One joint in a joint set corresponds to a subAxis Set of Axis Set. The axis of the axis set is a translational axis or a rotational axis.

Use the axis set to describe the multi-axis robot device correspondingly. Calculate control parameters of the multi-axis robot device using Axis-Invariants corresponding to the axes of Axis Set. Among them, for two links of one axis, the Axis-Invariant of this axis does not change with the corresponding joint motion, and use the calculated control parameters to control the multi-axis robot device In some embodiments, the method may further includes converting the joint set into the corresponding data of the axis set stored in the memory of the control circuit.

In some embodiments, the data corresponding to the axis set, which corresponds to the description of multi-axis robot device, is stored in the memory of the control circuit. The update calculation of the control method is directly adjusted by modifying the corresponding data in the description. In other words, it is different from the traditional model, which needs to be re-modeled and complex debugging calculating while the setting is changed. It only need to directly provide adjusted parameters to create a new model directly through this system.

This feature enables mass production of parts of machinery and equipment to reduce costs, and can maintain the flexibility of assembled multi-axis robot installations at the same time. Any adjustment can quickly react and accurately complete the new set of modeling and related calculations.

In some embodiments, the axis sets are used to describe the multi-axis robot device correspondingly, and the Axis-Invariants corresponding to the axis of axis set are used to calculate the control parameters of the multi-axis robot device. For two links on one axis, the Axis-Invariant of this axis will not change with the corresponding joint motion.

This method may also include sensor measurement data for the joints of the joint set. Calculate at least one forward kinematics parameter of the multi-axis robot device in combination with the axis invariability of the axis set to predict the trajectory of the multi-axis robot device.

In addition, the control method further includes autonomously operating the multi-axis robot device against the preset rules according to the motion trajectory corresponding to the joint set and the links.

In other embodiments, the control method may further include solving the equation of motion corresponding to a given trajectory of a multi-axis robot device, and finding out the control parameters of the joint corresponding to the joint set given the motion trajectory. The following content will specifically illustrate the calculation of the relevant equation of motion.

In addition, this control method may also include sensor measurement data for the joint of joint set, and calculating at least one mechanical parameter of the multi-axis robot device in combination with the axis invariability of the axis set to predict the force of each part of the multi-axis robot device.

In other embodiments, the control method may also include solving the mechanical equation corresponding to the given mechanical parameter of the multi-axis robot device, and finding the control parameter of the joint in the joint set corresponding to the given mechanical parameter.

In addition, the axis set may correspond to a directional expanded tree structure. Moreover, when there is a non-tree connection relationship between some axes in correspondence to the directional expanded tree structure, the combination is recorded as a non-tree link combination.

This multi-axis robot device integrally corresponds to the axis set through a one-to-one isomorphism correspondence and achieves an isomorphic correspondence. In other words, when a multi-axis robot device performs a certain motion, the model created by this axis set can also find a completely corresponding operation. Conversely, performing operations on models built from this axis set is also corresponded to the motion of the multi-axis robot device.

In addition to kinematics, mechanics models can be further established on the basis of kinematics, and corresponding calculations or solutions can be performed. In some embodiments, the Link Set is further expanded into a virtual Link Set corresponding to a one-to-one correspondence with the Axis Set, such that the links of each virtual links set have exactly one-to-one correspondence with one axis of the Axis Set.

According to another embodiment of the present invention, it is provided a multi-axis robot device. This multi-axis robot device includes a plurality of joints constituting joint set, a plurality of links constitutes Link Set, and control circuit for controlling the motion of the plurality of joints. The links in the Link Set are connected through the plurality of joints. The control circuit converts the joint set to a corresponding axis set. Each joint in the joint set corresponds to the sub-Axis Set of the Axis Set. The axis of the axis set includes two types of axis: a translational axis or a rotational axis.

The control circuit uses the axis set to describe the multi-axis robot device correspondingly, and uses the Axis-Invariant corresponding to the axis of the axis set to calculate the control parameters of the multi-axis robot device. For two links on one axis, the Axis-Invariant of this axis will not change with the corresponding joint motion. The control circuit uses the calculated control parameters to control the joints of the multi-axis robot device.

The following will introduce a complete set of symbols and corresponding computing systems to correspond to and describe various multi-axis robot device.

In some embodiments, the control circuit calculates sensor measurement data for the joints of the joint sets, and calculates at least one forward kinematics parameter of the multi-axis robot device in combination with the Axis-Invariants of the axis set. It can be used to predict the trajectory of the multi-axis robot device.

In some embodiments, the control circuit autonomously operates the multi-axis robot device according to preset rules for the trajectory corresponding to the joint set and the links.

In some embodiments, the control circuit solves the equation of motion corresponding to the given motion trajectory of the multi-axis robot device to find out the control parameters of the joint in the joint set corresponding to the given motion trajectory.

In some embodiments, the control circuit calculates sensor measurement data for the joints of the joint sets, and calculates at least one mechanical parameter of the multi-axis robot device in combination with the Axis-Invariants of the axis set. It can be used to predict the force conditions of various parts of the multi-axis robot device.

In some embodiments, the control circuit solves the equation of mechanics corresponding to the given mechanical parameter of the multi-axis robot device to find out the control parameters of the joint in the joint set corresponding to the given mechanical parameter.

In addition to a control method or a multi-axis robot device, the present invention can also be as a design system for designing and verifying a multi-axis robot device based on the same technical features. This design system can be used to correlate various multi-axis robot systems to motion and/or mechanical models built with Axis-Invariants to analyze and verify the feasibility, correctness, and completeness of various designs.

The link of the analyzed multi-axis robot device has Link Set and joint set, and the links in the Link Set converge through the joints of the joint set. The design system may include an input unit for the designer to convert the joint set to a corresponding axis set. Each joint in the joint set corresponds to the sub-Axis Set of the axis set. The axis of the axis set includes two types: a translational axis or a rotational axis. For example, the designer can use an XML file as a parameter input or combine it with a computer-aided design tool (CAD) to input a new parameter through an interactive command line or an image operation interface. The design of the basic data input can refer to the technical documents in general and will not be described in detail here.

The analysis system further includes a processing unit for describing the multi-axis robot device correspondingly using the axis set, and calculating the control parameters of the multi-axis robot device using the Axis-Invariant corresponding to the axis of the axis set. For two links on one axis, the Axis-Invariant of this axis will not change with the corresponding joint motion.

The analysis system also includes an analysis unit that analyzes and verifies the design of the multi-axis robot device using the calculated control parameters.

The above processing unit and analysis unit can be partially implemented in hardware, and can also be manufactured in a combination of software and hardware. In fact, the relevant logic can also be written as code, executed in whole or in part on the user's computer or executed on a remote server.

In the actual establishment of the system, the input unit may include joint setting parameters for the joint set, and calculates at least one forward kinematics parameter of the multi-axis robot device in combination with the Axis-Invariants of the Axis Set. It can be used to predict the trajectory of the multi-axis robot device.

In the actual establishment of the system, the processing unit further comprises calculating the mechanical parameters of the multi-axis robot device using the mechanical equations constructed by the use of the axis set.

According to another embodiment of the present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding Axis Set. Each joint in the joint set corresponds to the sub-axis set of the axis set. The axis of the axis set includes two types: a translational axis or a rotational axis.

Use the axis set to describe the multi-axis robot device correspondingly, and use the axis set to establish a variety of different dynamics equations. The Axis-Invariant corresponding to the axis set are used in these dynamics equations.

According to another embodiment of present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding axis set. Each joint in the joint set corresponds to the sub-axis set of the axis set. The axis of the axis set includes two types: a translational axis or a rotational axis.

Use the axis set to describe the multi-axis robot device correspondingly, and use the axis of the axis set to calculate the corresponding Axis-Invariant. For two links on one axis, the Axis-Invariant of this axis will not change with the corresponding joint motion.

Construct the iterative kinematics equations based on Axis-Invariants using the invariance of Axis-Invariants. Besides, the symbols of the iterative kinematics equation correspond to pseudo-codes and can clearly reflect the topological relationship and the chain-order relationship of the multi-axis robot device kinematic chain. The calculated control parameters are used to control the multi-axis robot device.

In some embodiments, an iterative calculation using quaternions with orthonormality in the iterative kinematics equation instead of a rotational transformation matrix is used to increase the accuracy of the calculated parameters. Comparing with the traditional iterative calculation which directly uses the rotation transformation matrix, this approach can avoid erroneous accumulation and greatly increase the accuracy and stability of the overall system.

In addition, in the iterative kinematics equation, an Axis-Invariant may be applied to express the rotation as a rotational vector.

In some embodiments, the iterative kinematic equation has natural null axis and system null axis. The Axis-Invariant has excellent operating performance in 3D space and 4D space, satisfies kinematic chain axiom and metric axiom, and has pseudo-code function with accurate physical meaning.

In some embodiments, the rotational transformation matrix used to calculate rotational motion parameters in the iterative motion equation can be represented by an Axis-Invariant.

According to another embodiment of the present invention, it is provided a control method for controlling the multi-axis robot device. The multi-axis robot device includes a Link Set and a joint set, and the links in the Link Set are combined with the joints in the joint set. The control method includes the following steps:

Convert the joint set to the corresponding axis set. Each joint in the joint set corresponds to the sub-axis set of the axis set. The axis of the axis set includes two types: a translational axis or a rotational axis.

Use the axis set to describe the multi-axis robot device correspondingly, and use the axis of the axis set to calculate the corresponding Axis-Invariant. For two links on one axis, the Axis-Invariant of this axis will not change with the corresponding joint motion.

The kinematic model of this multi-axis robot device is constructed through Axis-Invariants, and the calculation result is directly superimposed with another connected multi-axis robot device to calculate the kinematic parameters of the combined multi-axis robot device.

In other words, in the framework of Axis-Invariants, a complex system can be divided into multiple parts to calculate. On the one hand, these separately calculated partial machine modules can also combine the results of operations to form a complex overall result. On the other hand, it can also be calculated together by the following different methods.

For example, this method may provide a hardware or software interface for superimposing parameters of one multi-axis robot device and another multi-axis robot device to directly measure the kinematic parameters of the combined multi-axis robot device.

In other embodiments, the multi-axis robot device and the other multi-axis robot device can be switched between separation and combination, and they can be controlled by the same control circuit after combination.

Another operation mode also includes switching between the separation and combination of the multi-axis robot device and the other multi-axis robot device, and after the combination, it is controlled by a plurality of control circuits located in two multi-axis robot devices through a cooperative operation.

Alternatively, the control method may further include detecting whether the multi-axis robot device is combined with another multi-axis robot device and automatically starting the combined superposition calculation.

In some embodiments, the control method may further include detecting error between actual motion parameter and estimated motion parameter of the multi-axis robot device, and using the error to readjust the kinematic model. This is particularly important to autonomously operated machine installations, because all machinery and equipment are subject to errors at the time of manufacture. Besides, if the parts used in the process are old or damaged, they may produce various unpredictable changes. These changes can be measured by the detection of some locations. The results of these measurements can be compared with the calculations made by the model built from the Axis-Invariants. The errors found in the comparison can be fed back to adjust the model of the axis invariance to achieve a certain fault-tolerance capability of the entire system and enhance the stability of the overall system.

In other words, when the multi-axis robot device has a partial failure or deformation, the kinematics model is used to calculate the relevant kinematics parameters through the readjustment.

In addition, through the following description, the corresponding symbols in the kinematics model can be found that they correspond to pseudo-code, and are written into the corresponding software or circuit. Therefore, the entire kinematic model can be calculated by calling the circuit or code corresponding to the pseudo code.

Moreover, in some embodiments, the control method may include an interface for communicating with application layer code to perform functions of autonomous machine operation.

There are many uses of robots. One of them is the control of manufacturing robots used in factories. At this time, the kinematics model can be used together with the measurement parameters of the external measuring instrument to substitute the operation of the equipment to be assembled, and to control of the multi-axis robot device to achieve the function of the manufacturing robot.

This control method can also use the motion parameters to be substituted into the mechanical equations to calculate the strength of each component of the multi-axis robot device. In other words, from the kinematic parameters, it is possible to deduce the forces tolerated and thus to control the multi-axis robot device more precisely and effectively. This is a great help for robots to work more effectively. Current machine systems often require a fixed base or heavy weight because of the inability to calculate complex mechanical parameters.

In contrast, the present invention is based on Axis-Invariants to establish a concise and computational kinematics model and a mechanical model to calculate various parameters required for control or analysis.

Therefore, the bottom layer of the robot control system that was difficult to establish in the past can be constructed through the present invention. Moreover, such a bottom layer has a very concise representation mode that can be directly converted to the corresponding code or circuit and optimized.

BRIEF DESCRIPTION OF THE DRAWINGS

FIG. 3 is a comparison diagram of the identifiers, types and diagrams of kinematic pair within the system.

FIG. 4 is a comparison diagram of the identifiers, types and diagrams of kinematic pair outside the system.

FIG. 22 is a radial projection and a natural zero bitmap.

FIG. 25*a* is a vector diagram of the vector before the axis rotation.

FIG. 25*b* is a vector diagram of FIG. 25*a* after the axis rotation.

FIG. 29 is the Axis-Invariant precision measurement principle.

FIG. 53 is a diagram of fuzzy variable structure control frame.

DESCRIPTION OF THE EMBODIMENTS

Figure 1:
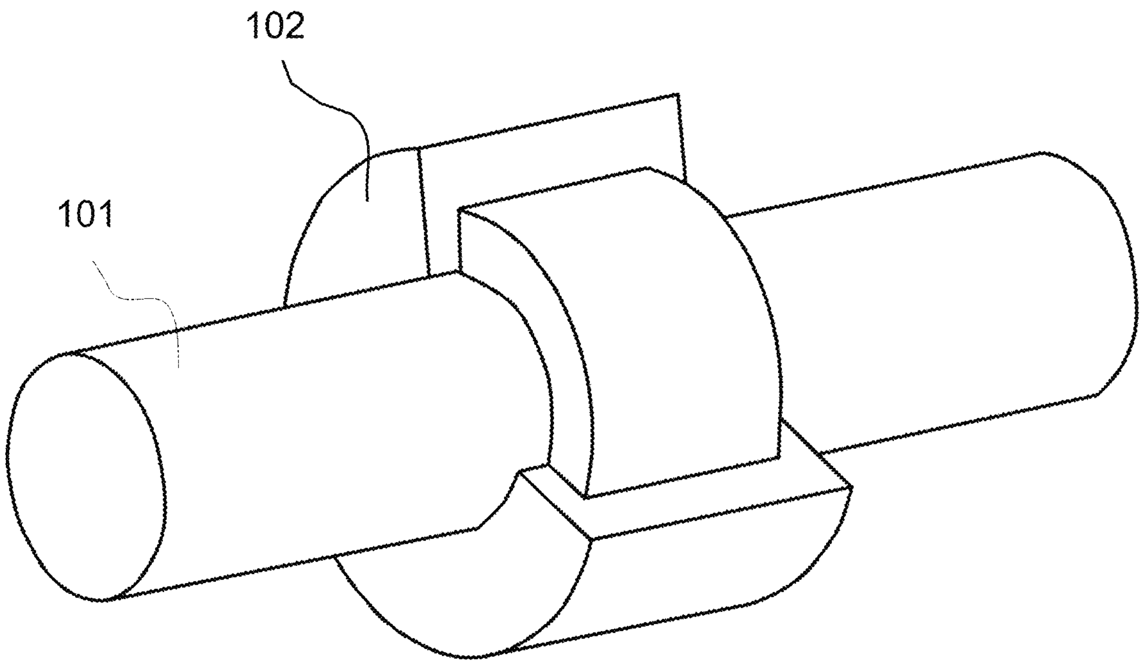
FIG. 1 is a structure diagram of the kinematic pair.

Since the present invention includes a lot of content relating to each other, to help the designer more understanding the content of the invention and implementing the invention based on the understanding, we will descript the invention in four chapters together with figures. The designer may find the implementary details from the other part in the description, then use the electronic circuit and the program which the designer in the field are familiar with, and the invention will be implemented to different technical solutions.

Section 1 Axis-Chain Symbolic Calculus

As an essential part of robotic system, the motion system is an organic integrity composed of joints, internal sensors, external sensors and/or computer systems.

Parts, the unbroken single pieces of the electromechanical system, are cams, bolts, covers and so on.

Components, the elementary unit of the electromechanical system which is no relative motion to each other, include links, racks and so on.

Links, the artifact constitude of the body and head of the link, bearing bush, bolt, nut, cotter and other parts which are individual processing parts. In the field of robot, the components are collectively called profiled link or link for short. (No matter what the shapes of the components, the components which are used to act as a supporting role in the body of the robot are all called links. Racks are usually component of trusses, metal plates and fasteners.)

Modular, the independent functional module on the process of mechanical or electrical assembly, is with the assembly interface for mechanical or electronical assembly. Mechanical modular includes reducer, couping, brake and so on. Electrical modular includes motor, shaft encoder and so on.

Linkages, the devices constitute of a set of mechanical parts, mechanical components and joint pairs to complete certain mechanical movements. Linkages include wheel driving linkage, wheel direction linkage, rotor wing linkage, flapping wing linkage, rotation linkage, single-shaft/double-shaft holder linkage.

Assembly, the independent functional module constitutes of mechanical and electrical modular and not depends on any other mechanical modular. The assembly is with interface for mechanical and electronical assembly. The assembly includes joint, steering gear box, gear train and so on.

Structure is the framework supporting instruments and assemblies. The linkage is the modular to generate motion. They both are mechanical systems and are same or similar in some aspects of design. Such structure is mainly used to: (a) Provide installation space, position and attitude for the mount of instruments and assemblies; (b) Effectively protect instruments and assemblies from electromagnetic field, dust and force; (c) Provide the necessary rigidity for special instruments and assemblies, such as optical elements and sensors, and ensuring their position and orientation precision; and (d) Provide the necessary physical properties for special instruments or assemblies, such as heat radiation or insulation property or electricity conduction or electrical insulation property. When analyzing a robot, its rack (bed) is also treated as a link.

The movement behaviors of robot include energy storage behavior, obstacle crossing behavior, grabbing behavior and so on. Using the electronical system, the robot can sense the environmental states, coordinate actions of the execution sequence, and realize the change process of the environmental states and the robot itself. Motor skills of robot refer to the movement behavior the robot has, they are movement without excitation.

Kinematics is about the interaction processes between robot and motion states characterization of the environment and the states. Dynamics is concerned about the relationship between motion of bodies and its causes.

A robotic joint is an important mechatronic system in a robotic mechanism which determines the action behaviors of kinematics and dynamics.

In natural world (i.e. natural space), any point has three dimensions (3D). The 3D is an invariant of natural space. Accordingly, any point in the space has three independent translational axes, and has three degrees of freedom (DOE). The three independent points constrainted one by one constitute a rigid-body which has three independent directions. Therefore, a rigid body has three independent rotational motion-axes. The rigid body attitude is the derivated state of three independent points. The three independent translational motion-axes and three independent rotational motion-axes respectively correspond to three translational DOFs and three rotational DOFs. Translational axis or rotational axis refers that any two axes are not coaxial.

The joint (JT/Jt) is generally composed of a torque motor of high power density, a reducer, an absolute encoder, a brake and a motor driver. In some models, the force servo joint is equipped with a force sensor.

The robot joint is different from the joint in any common electromechanical system. The robot joint of high performance has following characteristics: The joint is light and compact and has high power density and output torque; The reducer has high precision less than 1 arc minutes. Generally, the encoder is 4-6 times as precise as the reducer backlash; The motor and reducer are highly efficient and reliable, generate little heat and are capable of operating for up to 8,000 hrs or even longer. The motor driver controls the motor via current loop, velocity loop and position loop and usually communicates via EtherCAT. The joint has a hollow axle to improve pipeline reliability. The absolute encoder at the motor side is installed with the reducer output-axle to improve the position precision of of the joint output-axle. The brake output-axle, motor rotor and reducer input-axle are coaxial, and the reducer output-axle and encoder input-axle are coaxial. As a result, the joint reliability is improved and its weight is reduced.

The flange of joint ${}^{\bar{l}}Jt_l$ is connected with link # $\bar{l}$, and link # l with the reducer output-axle. The relative motion of adjacent links is controlled through the joint. The $\bar{l}$ stands for l's father.

Hall effect: when a current-carrying conductor is placed into a magnetic field, a voltage will be generated perpendicular to both the current and the field. When a perpendicular magnetic field is present, a Lorentz force is exerted on the current. This force disturbs the current distribution, resulting in a potential difference (voltage) across the output. This voltage is the Hall voltage ($V_H$). The interaction of the magnetic field and the current is shown in equation form as Eq. (1.1), $$V_H \propto I \times B. \quad (1.1)$$

General features of Hall Effect based sensing devices are: true solid state and long life (30 billion operations in a continuing keyboard module test); high speed operation—over 100 kHz possible to meet the requirement of high dynamic; broad temperature range (−40 to +150° C.). The Hall sensor is usually used as an electronic commutator in the brushless motor. When the polarized motor rotor passes the Hall sensor, the sensor generates alternating rotor position signal to control the on/off of the motor power module.

The BLDC (Blushless DC) motor is composed of the stator, rotor and electronic commutator. The diver is composed of the logic unit for commutation control, power module, motor control module and the communication module.

The motor rotor is composed of permanently magnetic "Nd—Fe—B" or "samarium-cobalt" magnetic steel and generates the magnetic field in the radial direction with alternating polarity. The robot motor requires an intensive magnetic field to reduce the weight of the motor.

The electronic commutator is usually constructed with three Hall sensors. It is used to detect the relative position between stator and rotor. The signal of position is the input of logic unit. The output of logic unit is the time sequential of the power module. Then the Electromagnetic Field is produced. It can drive the rotor to produce power.

BLDC motors operate much more quietly than brushed DC motors, reducing Electromagnetic Interference (EMI), increased reliability and reduced mechanical noise.

For an AC synchronous motor, given the number P of pole pairs of the rotor, the motor driver can regulate the rotational speed N (RPM) via control over the frequency of the three-phase power supply f (Hz).

$$N = 60 \cdot f/P. \quad (1.2)$$

Apparently, when the power frequency is stable, the more the number of pole pairs, the lower the rotational velocity. Increasing the number of pole pairs will increase the output torque of the motor. The motor with a great number of pole pairs has a flat structure and is called the torque motor. The low-velocity torque motor is usually more reliable and is easy to match with the reducer. Properly increasing the number (3-6) of pole pairs can reduce the total weight of the motor and the reducer and improve the dynamic performance of the force control robot. With too many pole pairs, the motor will be heavy and thus become difficult to be used in the robotic engineering.

When the reference current is given, the brushless DC motor controls the current by controlling the duty cycle of the 3-phase voltage. The rotational velocity of the motor is calculated with the zero-crossing rate. The PID driver generates the expected current and controls the velocity via the current loop. Likewise, the position is calculated with the velocity integral. The driver in the position loop generates the expected velocity. The speed loop and the current loop control the position and the force.

The communication is generally carried out through serial port, CAN/CANOpen and EtherCAT/COE protocols. For force control motor, for purpose of multi-axis coordinated control, (a) the current of the joint motor needs to be controlled in real time according to the dynamic process of the robot; (b) the control rate of the current loop needs to be ensured; and (c) the EtherCAT bus (100 Mbps) is usually needed because the CAN bus (1 Mbps) can hardly satisfy the requirements of the robot applications. Unlike the driver with EtherCAT bus, the driver with CAN bus usually opens the current loop, mainly because the CAN bus rate is insufficient and therefore electromechanical accidents are apt to happen.

The planetary gear reducer is composed of the sun gear, the planet gear, the planet carrier and the outer gear ring. The carrier is fixed. The motor drives the sun gear at the input end. The planet gear and the carrier revolve around the sun gear.

This reducer transmits force through the engagement between the gears. The revolution velocity of the planet gear is hard to reduce. The reduction ratio is usually 3-10. The transmission efficiency is 97-98%. The backlash of the precise planetary gear reducer can be controlled within 1 Rad Min. The planetary gear reducer has symmetric structure, so the planet gear is under even load. If a large reduction ratio is required, several planetary gear reducers may be connected in series to form a multi-stage (generally 4 stages at the maximum) reducer. The multi-stage reducer is usually cylindrical. Its space utilization is poor and therefore the efficiency is greatly reduced. In addition, the number of teeth engaged is small, resulting in poor loading capacity. In robotic engineering, the planetary gear reducer usually serves as the first-stage reducer.

The cycloid speed reducer is composed of cycloidal disk, pin gear, crank arms and roller bearing. The input axle is mounted eccentrically to a rolling-element bearing (typically a cylindrical roller bearing), causing the cycloidal disc to move in a circle. The cycloidal disc will independently rotate around the bearing as it is pushed against the ring gear. The number of pins on the ring gear is larger than the number of pins on the cycloidal disc. This causes the cycloidal disc to rotate around the bearing faster than the input axle is moving it around, giving an overall rotation in the direction opposing the rotation of the input axle. The features of cycloid speed reducer are: strong loading capacity; deep shock-resistance; high transmission efficiency; small in size; light weight; long life; simple structure and easy to disassemble and maintain. The precise of the cycloid speed reducer can be controlled within 1 Rad Min.

RV (Rotate Vector) transmission is a two-stage closed planet gear system. At the first stage is the planet gear and at the second stage is the cycloid reducer. This reducer integrates the advantages of the planetary gear reducer and the cycloid reducer. Currently, the RV reducer is the main reducer used for robots.

Harmonic reduction gearing is component of rigid gear, flexible gear and wave generator. The circular spline (CS) is a rigid ring with internal teeth, engaging the teeth of the flexspline across the major axis of the wave generator. The flexspline (FS) is a non-rigid, thin cylindrical cup with external teeth on a slightly smaller pitch circle diameter than the circular spline, resulting in it having two fewer teeth on its outer circumference. It fits over and is held in an elliptical shape by the wave generator. The wave generator (WG) is a thin raced ball bearing fitted on to an elliptical plug serving as a high efficiency torque converter.

Single-stage harmonic reducer with high reduction ratios range from 60 to 300. 25-30% gear fits of the gear fit at the same time. The kinematic accuracy of the single-stage harmonic reducer can range from 10 to 60 Rad Sec. Harmonic drive gearing is superior to conventional transmissions in a number of ways. Since power is transmitted through multiple tooth engagement, a harmonic drive gear typically offers high output torque capacity equal to drives twice its size and three times its weight. Besides its high torque capacity, a harmonic drive gearing is with the features such as high efficiency, excellent position accuracy and repeatability. Since the elastic meshing of circular spline and flexspline need some prestress, the harmonic reducer is also with some disadvantages such as poor shock-resistance, low force ratio and poor reliability. With the advange in precise, the harmonic reducer has been widely used in robot joint.

The resolver consists of a cylindrical rotor with each of the two phases of the rotor and stator in space quadrature. The function of a resolver is to resolve a vector into its components. Besides, the resolver is a sensor transferring the angular position to the electronic signal.

XF refers to the resolver transmitter. XB refers to the resolver transformer. The XF transmits an electric signal related with the mechanical rotation angle which changes according to certain function. The XB receives the signal and generates and outputs an electric signal related with the difference in the mechanical rotation angle. The servo amplifier receives the signal output from the XB and uses it as the control signal for the servo motor. The servo motor rotates according to the amplified signal to drive the resolver spindle l of the receiving side and other mechanisms connected therewith until the angular position $\phi_l^7$ is same with that of the transmitter. At the first stage of the XF, the rotor is usually equipped with orthogonal windings of two phases. One is used as the exciting winding to input single-phase alternating voltage. The other is short circuit to improve precision. At the secondary stage, there are also orthogonal windings of two phases. The first stage of XB is generally on the stator and composed of orthogonal windings of two phases. Its secondary stage is a single-phase winding instead of orthogonal windings. The exciting winding of XF is powered by single-phase voltage which shown below:

$$U_m = U_m^{in}\cdot\sin(\omega t); \tag{1.3}$$

wherein $U_m^{in}$—the amplitude of the exciting voltage; ω—the angular frequency of the exciting voltage. The alternating flux generated by the exciting current in the exciting winding induces electromotive force in the secondary output winding. When the rotor is rotating, the relative position of the exciting winding and the secondary output winding changes, so the electromotive force induced by the secondary output winding changes. The two-phase windings of the secondary out are orthogonal in the space, so the output voltages of the two phases are as below:

$$u_x = U_m^{out}\cdot\sin(\omega t+\alpha)\cdot\sin(\phi_l^7)$$

$$u_y = U_m^{out}\cdot\sin(\omega t+\alpha)\cdot\cos(\phi_l^7); \tag{1.4}$$

wherein $u_x$—output voltage of the sine phase; $u_y$—output voltage of the cosine phase; —amplitude of the secondary output voltage; α—phase angle between the exciting voltage and the secondary output voltage; $\phi_l^7$—rotation angle of the transmitter rotor.

It can be seen that the exciting voltage and the output voltage are of the same frequency, but different phases. The sine phase and the cosine phase are inphase in the time phase, but their amplitude changes as the rotation angle according to sine and cosine functions respectively. The angular position and the rotational speed of the motor rotor can be calculated with a certain calculation chip and algorithm.

The resolver has a middle-level precision, usually up to 3 Rad Min, with good shock resistance. It outputs analog signal, so a special interface board is required.

The absolute optical encoder is composed of the LED light, prismatic joint, coded disc (grating disc) and light sensor. After passing through the prismatic joint, the light from the LED becomes parallel with the optical axis and is projected to the coded disc $U_m^{out}$. On the opaque coded disc, transparent grids are created on the opaque base according to the Gray code. The disc also includes incremental grids created according to the binary system. The coded disc is coaxial with the motor, so the disc rotates with the motor at the same velocity. The detection device composed of the LED and other electronic elements detects and outputs several pulse signal. The light is converted into the electric signal via the coded disc. The light sensor reads the Gray codes and converts them into absolute angle. By continuously reading the binary incremental grids, the rotational velocity of the coded disc can be calculated.

The coded disc may be made of glass, metal and plastic. The glass coded disc includes thin scribed lines. It has high thermal stability and precision, but is liable to be broken and is costly. The metal coded disc includes grids for optical path. It is not liable to be broken. The metal is of certain thickness, so the disc has limited precision and tends to be deformed. Its thermal stability is one level lower than that of the glass coded disc. The plastic coded disc is a kind of economic encoder. It has low cost and is not liable to be broken and deformed, but its precision, thermal stability and duration are not as high as other coded discs. Therefore, the precision of the absolute optical encoder depends on the material and the precision of the grids.

The precision of absolute optical encoder can reach 1 Rad Sec which is much higher than those of absolute encoders of other types. The electrical interfaces are usually conforming to SSI, EnDat, BiSS and other protocols.

For an one-in-all joint, coaxial installation of its motor, reducer, encoder and brake is basic need; otherwise its structure will be damaged. Coaxality refers to that a set of sensors and a set of actuators have common axles. Two axles installed along the same axis are equivalent to one joint.

A joint pair is an abstract concept of a joint of robotic mechanisms in the kinematics. The analysis on the robot motion is the basis of the design and control of robotic motion system. In the field of kinematic analysis and synthesis, the robot motion system is deemed as the kinematic chain (KC) composed of links and joint pairs. A link represents a 3D space fixed with the link.

As shown in FIG. 1, the joint pair is a simple mechanism composed of two components the first link l 101 and the second link $\bar{l}$ 102, which are in motion in relation to each other. It determines the motion of the two components and enables them to contact directly and to move in relative to each other. The joint pair includes not only the relative motions of two links, but also the constraints of them. The dimension of motions is referred to as the degree of freedom (DOF) corresponding to the number of motion-axes, and the dimension of constraints (DOC) is referred to as the degree of constraints in response to the number of constraint-axes.

The component in the root direction of the joint pair is referred to as a static axis and that in the leaf direction is a nonstatic axis. The static axis and the nonstatic axis are relative, and the two axes are coaxial.

It is noted that the stator and the mover constituting any one of the joint pair k are $\bar{l}$ and l, respectively. The joint pair is noted as $^{\bar{l}}k_l$, and $^{\bar{l}}k_l$ indicates the motion subclass or the motion sub-cluster of the connecting link $\bar{l}$ and l. Since the joint pair $^{\bar{l}}k_l$ represents the connection of the stator $\bar{l}$ and the mover l, it represents a two-way connection relationship. An ordered connection of $\bar{l}$ to l and $\bar{l}$ to l, called a full-order connection; an ordered connection of $\bar{l}$ to l or $\bar{l}$ to l, called a partial order connection; partial order and full order reflect whether the connection has direction joint pair The joint pair shown in FIG. 1 has a degree of rotational freedom on its motion axis, and there is a constraint consisting of three translational axes and two rotationally constrained axes.

Besides joint pair shown in FIG. 1, there are different types of joint pairs. The structures of joint pairs include prismatic joint pair, helical joint pair, cylindrical joint pair, spherical joint pair, contact joint pair and gimbal joint pair.

Figure 2:
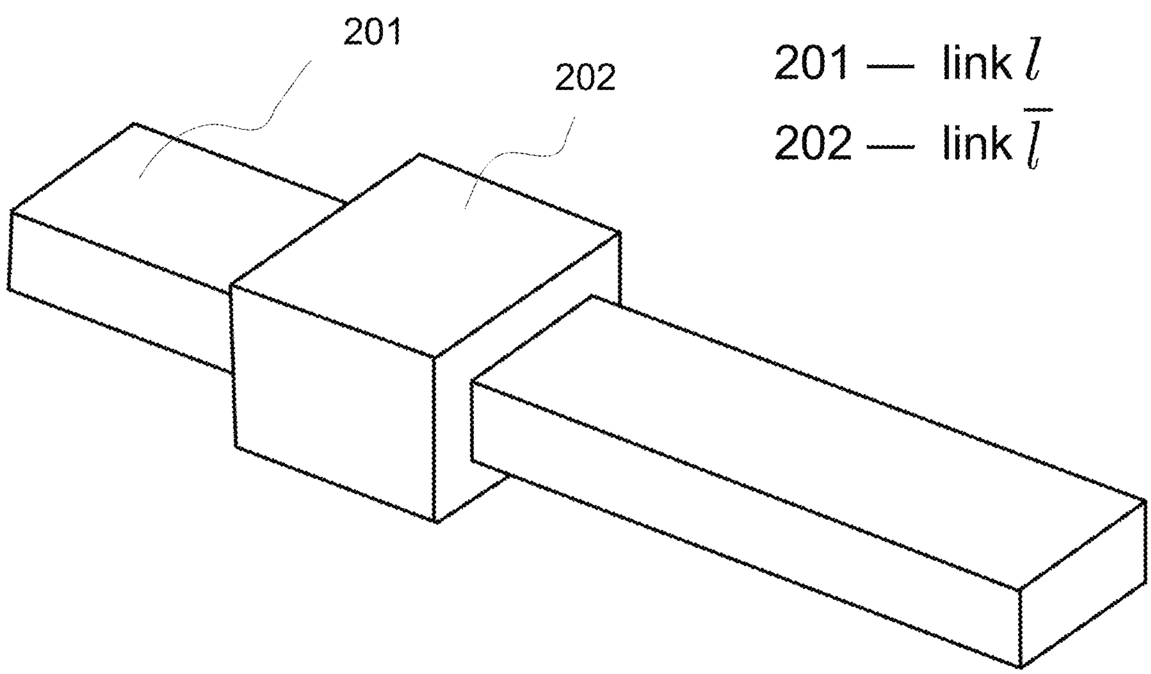
FIG. 2 is a structure diagram of the prismatic pair.

The prismatic joint pair shown in FIG. 2 is composed of a first link l 201 and a second link $\bar{l}$ 202. Which has a translational motion-axis, two translational constraint-axes and three rotational constraint-axes.

The helical joint has a rotational motion-axis. This axle generates axial direction displacement when rotating. The pair has three translational constraint-axes and two rotational constraint-axes. The cylindrical joint has a translational motion-axis and a rotational motion-axis and has two translational constraint-axes and two rotational constraint-axes. The spherical joint has three rotational motion-axes, and has three translational constraint-axes. Wherein two of them are used to control the radial rotation of the output axis, and another one is to control the axial rotation of the output axis. The contact joint shown in has only one ideal contact point, three rotational motion-axes and two translational motion-axes in the axial direction and a unilateral translational constraint-axis. Unilateral constraint represents that the motion at one direction of the axis is constrained. Bilateral constraint represents that the motion at both direction of the axis are constrained. The contact joint refers to point-to-point contact by default, whereas the line-contact and the face-contact type are equivalent to many point-to-point contacts. The gimbal joint has two rotational motion-axes, and has three translational constraint-axes and one rotational constraint-axle.

Classified according to the degree of constraint (DOC): The joint pair with only one DOC is referred to as the Class I pair, the joint pair with two DOC is referred to as the Class II pair, and so on.

The two components of the joint pair directly contact to form a contact point, a contact line or a contact surface. The two components are in contact on surface is called the lower pairs, and the pressure at the contact portion is lower; the two components are in contact at a point or along a line is called the higher pairs, and the pressure at the contact portion is higher.

The identifier (ID), type and diagram of joint pairs are shown in FIG. 3. The common joint pair are sphere joint 301, gimbal joint 302, cylindrical joint 303, helical joint 304, prismatic joint 305 and revolute joint 306.

Except the joint pairs in the robotic system as listed above, FIG. 4 lists three joint pairs outside the system. The wheel-terrain contact pair C is the joint pair constrained by the contact point between the ground/infinitely small surface and the wheel. For the wheeled robot under natural environment, different contact positions between the wheel and the ground correspond to different contact pair, because different contact points and surfaces have different normal directions. The fixed joint pair reflects the relationship between a robot with its rack and the environment. The rack/bed symbol may also represent the spacecraft installed on the space robot.

Figure 5:
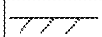
FIG. 5 is a diagram of the basic structure identifies.

In FIG. 5, the identifier of the inertial center I is added. The mass center is the basic physical property for the dynamics modeling of the space robot. It is meaningless to discuss the kinetic energy and momentum of the link without considering the mass center. Therefore, the mass center is an essential part of the mechanical diagram of the robot. The identifier of the ground or the inertial space is i. As described in the following chapters, the inertial center I and the inertial space i constitute the natural loop or closed KC.

The joint pairs are classified into two types in kinematics analysis:

[1] R/P pair, i.e. revolute joints or prismatic joints. They are primitive joint pairs constituting other compound motions. Every composite pair is equivalent to a certain number of R/P and their motion-axes are independent. Some R/P pairs may output power and are the output pairs of the actuator. For example, the output axles of the rotary motor and the reducer are equivalent to R; the output axle of the linear motor is equivalent to P pair; the virtual Joint Pair V is equivalent to triaxis R pairs and triaxis P pairs. The constraint-axes of the prismatic joint or the revolute joint constraints the linear and the angular positions and are called the holonomic constraints. The configuration from the start to any time point is certain and integrable. The revolute joints and the prismatic joints are named as primitive pairs. A primitive pair is composed of two coaxial axes each of which is respectively fixed with a link. Therefore, in kinematics, axis # l and link # l are equivalent, i.e. axis can be used as its one-to-one mapping link and vise versa.

[2] O pair, i.e. contact joint. An ideal wheel-terrain contact may be deemed as a contact joint. The constraint pair only constraints the joint velocity instead of the configuration. Furthermore, due to relative sliding, the configuration from the start to any time point is uncertain and non-integrable. Therefore, the constraint pair is a non-holonomic constraint pair.

As stated above, the basic joint pair R and P, the helical joint H and the contact joint O may be deemed as a special cylindrical joint O. The joint pair R and P can be combined into other composite joint pairs. Therefore, the cylindrical joint is used as the general model of the joint pair. The static axis and nonstatic axis of primitive pair R/P are coaxial and fixed respectively with different links, and the motion of inter-links is in nature the relative motion of the inter-axes of primitive pair. Therefore, in kinematics, the cylindrical joint O is the primitive of the joint pair and is complete.

The kinematic linkage composed of at least one primitive pair connected in certain order is referred to as the kinematic chain (KC). The KC is the abstract concept of the kinematic linkage in kinematics. The primitive pair is the basic unit that constitutes the kinematic chain, called the chaining pair. Expression of the topological and metric relations of the KC is the prerequisite for KC analysis. The constraint pair is the abstract concept of the kinematic constraint between two joint pairs. The property of constraints is generally represented by C.

Inside the primitive joint pair, besides the DOF of motion-axis, there are also axial constraints. The number of motion-axes is the number of DOFs and that of constraint-axes is the number of DOCs. The constraint-axis of one joint pair only constrains its axial motion and does not constitute a constraint pair.

Like the theoretical abstraction of joint pairs, the primitive of constraint pairs needs to be determined to simplify kinematic analysis. Joint pairs can be used to describe spatial motions. Therefore, spatial constraints can be described by constraining the relative position or velocity of different motion-axes. Thus, the constraint over the relative position or velocity of different motion-axes is the primitive of the constraint axis and is complete in kinematics. In theory, constraint pairs can be classified into holonomic and non-holonomic constraint or bilateral and unilateral constraint.

The position constraint is the constraint controlling the relative linear position of the points on the two constraint-axes or the relative rotation angle of the two axes. The velocity constraint is the constraint controlling the relative linear velocity of the points on the two constraint-axes or the relative rotational velocity of the two axes. The holonomic constraint is the constraint of which the relative velocity is integrable. The position constraint is holonomic constraint. If the relative velocity is non-integrable, the constraint is non-holonomic constraint. Bilateral constraint refers to the case where the two directions of the motion-axis are constrained. Unilateral constraint refers to the case where the one direction of the motion-axis is constrained.

As shown through the analysis of joint pairs and constraint pairs above, motion-axis, constraint-axis and measurement-axis are primitives of robotic systems. Those axes are called Natural-axes (Spacial axis) and have the following properties:

[1] Coaxality and directivity are basic properties of actuators and sensors. On the one hand, joint variables and measuring quantities are relative to their natural-axes. On the other hand, one DOF corresponds to one independent motion-axis. More importantly, joint variables and measuring quantities are the relative kinematic quantities of two coaxial motion-axes, either axial translation or axial rotation. Otherwise, it is physically uncontrollable and unmeasurable; the amount of controllable and measurable motion must have a corresponding axial connection in the structure.

Polarity is another basic property of actuators and sensors: joint angular position or line position is a positive or negative scalar. Normally, it is positive when following the right-hand rule, and is negative when obeying the left-hand rule.

[2] Zero-position reference is another property of actuators and sensors. The joint of coaxial sensor and actuator has its mechanical zero-position. Accordingly, its motor driver usually has an electronic zero-position. The spatial reference relationship is the basis for the joint pair and the link motion. The zero position is essentially the radial reference axis of rotation.

[3]

The three dimensions of the axis position space are the objective properties of the axis entity: for a mechanical system connected by a number of joint pairs. Ignoring all the metrics represented by distance and angle, only from the topological relationship is a system of axis-to-axis connections. From a metric point of view, a continuous 3D space is mapped to an abstract 3D axis space. The position and direction of the axis is characterized by a corresponding metrology system. Therefore, whether it is a linear axis or a curved axis, in terms of topology, as long as it is a continuous body, it means an axis.

The coaxiality, polarity and zero-position of the joint pair $^{\bar{l}}k_k$ shows that:

(a) There is one-to-one mapping between link and axis;

(b) The property parameter $p_l^{\bar{l}}$ and that property vector $^{\bar{l}}p_l$ are partially ordered;

(c) The property parameter $p_l^{\bar{l}}$ between axes is directly measurable as for coaxial installation;

(d) The structural parameter between links is directly measurable in engineering, so the property is parameter $^{\bar{l}}\,p_l$ in nature directly measurable.

(e) To ensure the usability and reliability of the theoretical and the software system, kinematics and dynamics should adapt to the topology, structure parameters, reference system and the parameterization of the polar.

The robot topological system is a system in which the geometric sizes of links are ignored and only the connection between Joint Pairs and links are considered. The topological systems of the same type have the same connection relation. When link size changes continuously, their topological relations keep unchanged. The kinematic chain of robots is classified into three types according to their topological relation, namely serial KC, tree-typed KC and closed KC.

Figure 6A:
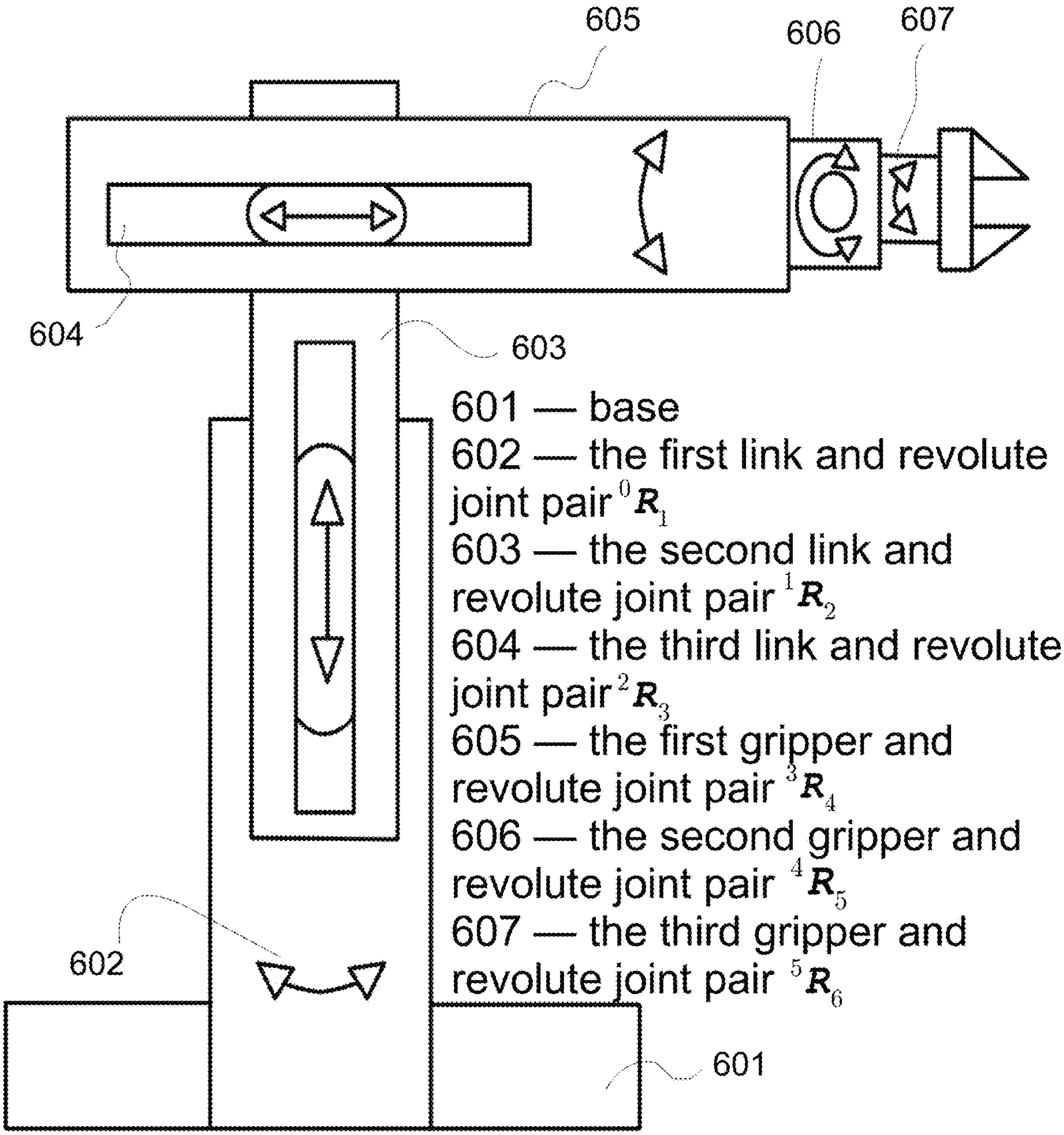
FIG. 6*a* is a diagram of the cylindrical robot arm.
Figure 6B:
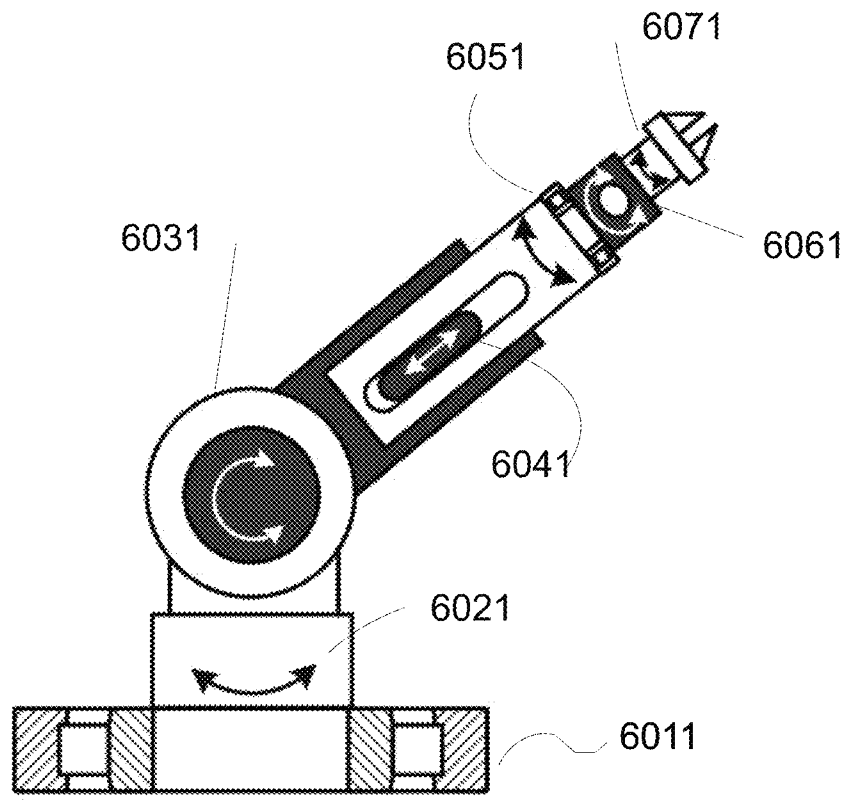
FIG. 6*b* is a diagram of the spherical robot arm.
Figure 6C:
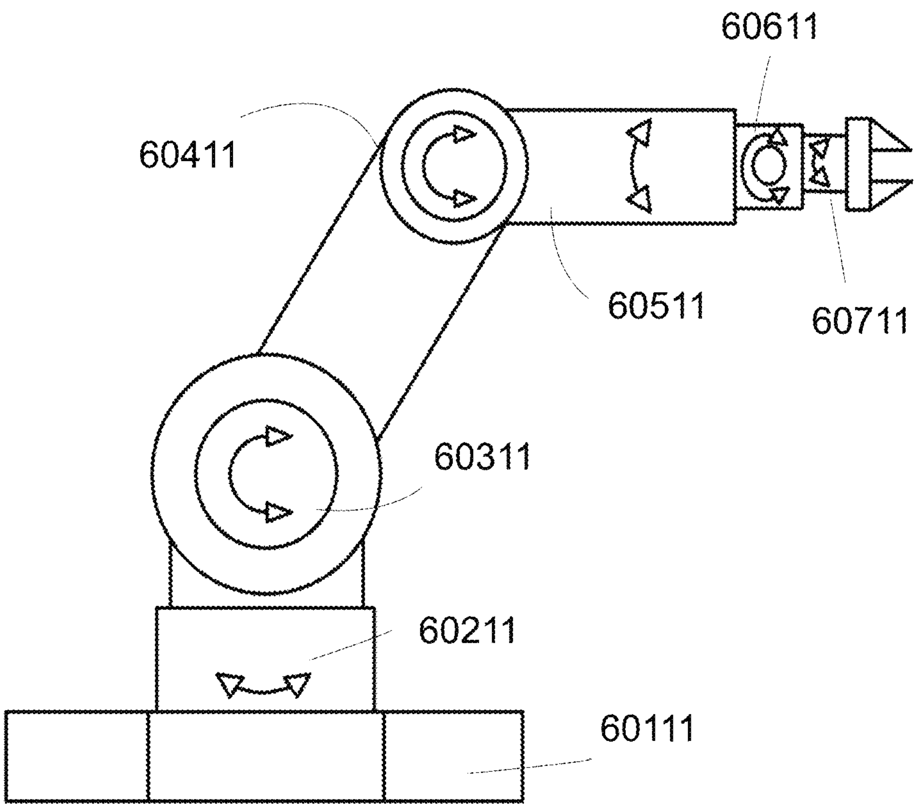
FIG. 6*c* is a diagram of the rotary robot arm.

The robo-arms shown in FIGS. 6a, 6b and 6c are cylindrical, spherical and rotary robo-arms.

As shown in FIG. 6a, the rotary robo-arm is composed of the body 601 and gripper of the 6-axis robo-arm. The body of the rotary 6-axis robo-arm is mainly composed of links #1, #2, #3 and revolute joint pairs $^0R_1$ 602, $^1R_2$ 603, $^2R_3$ 604. The gripper is composed of links #4, #5, #6 and revolute joint pairs $^3R_4$ 605, $^4R_5$ 606, $^5R^6$ 607. Obviously, the $_R$ is the identifier of revolute joint pairs. The superscript at the left corner and the subscript at the right corner respectively indicate the serial number of the link fixed with the static axis and nonstatic axis of the joint pair, reflecting the topological relation of joint pair connection.

As shown in FIG. 6b, the rotary robo-arm is composed of the body 6011 and gripper of the 6-axis robo-arm. The body of the rotary 6-axis robo-arm is mainly composed of links #1, #2, #3 and revolute joint pairs $^0R_1$ 6021, $^1R_2$ 6031, $^2R_3$ 6041. The gripper is composed of links #4, #5, #6 and Revolute Joint Pairs $^3R_4$ 6051, $^4R_5$ 6061, $^5R_6$ 6071.

As shown in FIG. 6c, the rotary robo-arm is composed of the body 60111 and gripper of the 6-axis robo-arm. The body of the rotary 6-axis robo-arm is mainly composed of links #1, #2, #3 and revolute joint pairs $^0R_1$ 60211, $^1R_2$ 60311, $^2R_3$ 60411. The gripper is composed of links #4, #5, #6 and revolute joint pairs $^3R_4$ 60511, $^4R_5$ 60611, $^5R_6$ 60711.

The cylindrical and the spherical robo-arms not only have the revolute joint, but also the prismatic joint. The axes of the three revolute joint pairs of the gripper intersect at a point which is called the wrist center. The expected position for the gripper to pick up the object are often called pick point, which is always on the sphere with the wrist center as the center. This type of robo-arms may be controlled in three steps to pick up an object. First, calculate the attitude of the three axes according to the expected attitude of the gripper relative to the world. Next, calculate the position of the wrist center with the expected attitude and the spherical radius. Last, define the angle of the three axes according to the expected wrist center. The robo-arm of which the position is controlled independently of the attitude is called the decoupled robo-arm. The wrist center of the cylindrical robo-arm is in cylindrical working space and that of the spherical robo-arm is in spherical working space.

This KC of robo-arms, whose all joint pairs are connected in serial, is a partial ordering axis sequence, denoted as (0:6]. The seven numbers respectively represent a link. The adjacent links are connected with a common joint pair.

The mobile system of CE3 rover is a rocker system independently driven by six wheels and is composed of a rocker mechanism, four steering gears and six driving wheels.

The rocker mechanism is composed of right rocker, left rocker, right bogie, left bogie and differential mechanism. The right and left rockers are respectively fixed with the right and left axles of the differential mechanism. The left and right bogies are connected with the left and right rockers respectively via revolute joints. The left front and right front steering gears are respectively connected with the left and right rockers via revolute joints. The left rear and right rear steering gears are respectively connected with the left and right bogies via revolute joints. The swinging of the rockers and bogies as well as the effect of the differential mechanism ensures that the chassis is suspended on the angle bisector of the left and the right rockers. This structure is therefore referred to as the rocker suspension. The left and right parts which are symmetrical are respectively referred to as the left and right suspensions. The rocker mechanism seems like a tree and is called the tree-typed kinematic chain or tree-typed KC.

Figure 7:
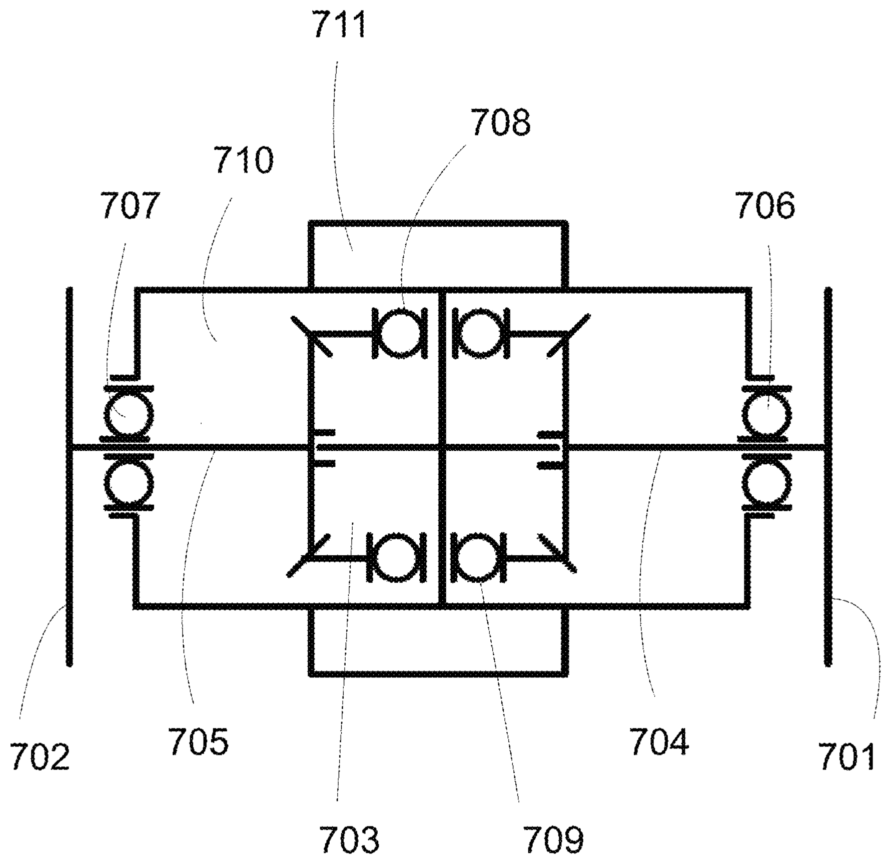
FIG. 7 is a structure diagram of the wheelset differential mechanism of rocker-type six-wheeled robot.

The differential mechanism is shown at the left of FIG. 7. The left 702 and right 701 helical gears rotate with their axles respectively fixed with the right 704 and left 705 rockers. The differential mechanism right rocker axis 704 drives the right helical gear 706 to rotate, and the differential mechanism left rocker axis 705 drives the left helical gear 707 to rotate. The forward bevel gear 708 and the rear bevel gear 709 that are fixed to the case 710 are driven to rotate around the main arm axis. Ensure that the bottom plate of the chassis 711 is located on the angle bisector of the right main arm 701 and the left main arm 702.

Figure 8:
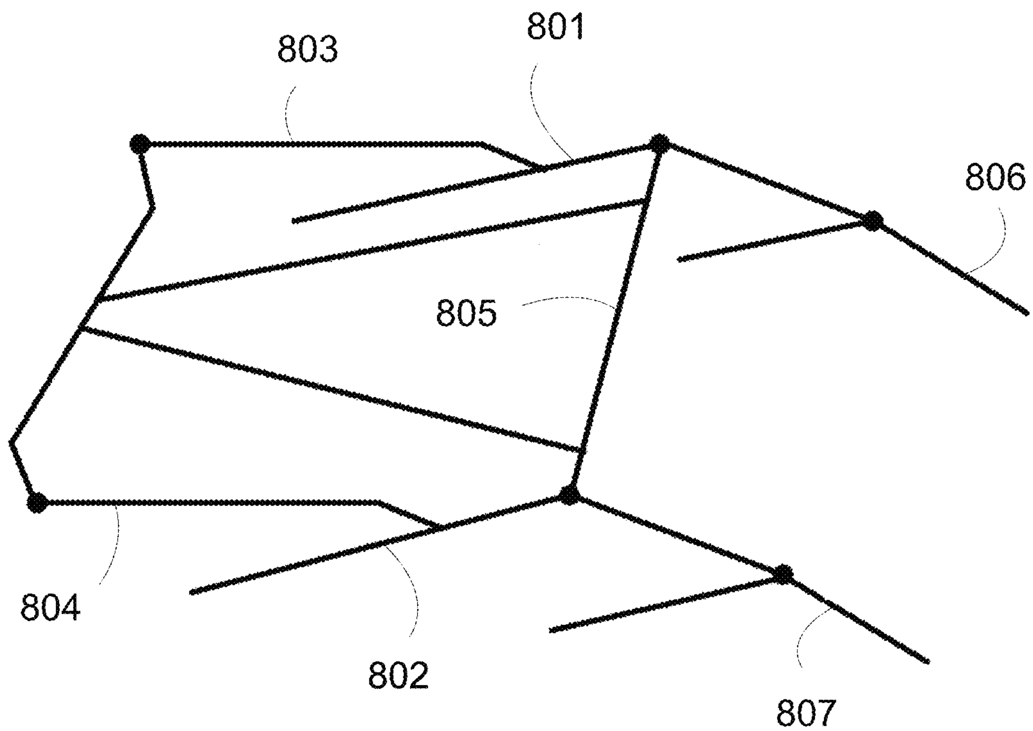
FIG. 8 is a structure diagram of the linkset differential mechanism of rocker-type six-wheeled robot.

The rocker mechanism with differential arms is shown at the right of FIG. 8. The left and right rockers 801 and 802 are respectively fixed with their differential arms 803 and 804. The left differential arm 803 is connected with the average link via two spherical joints and the left differential link. Likewise, the right differential arm is connected with the average link via two spherical joints and the right differential link. The left and right rockers 801 and 802 are connected with the horizontal axle 805 via a revolute joint. Therefore, when the left and right rockers 801 and 802 are in motion, the horizontal axle 805 is at the same surface with the average link which is the angle bisector of the left and right rockers 801 and 802. The left and right rockers 801 and 802 are connected with their bogies 806 and 807 respectively via revolute joints.

The mobile system shown in FIG. 7 and FIG. 8 is a closed KC with loops. The differential mechanism is equivalent to two revolute joints with constraints which enable the revolute joints to form loops. The topological structure of the system mainly seems like a tree, so it is traditionally called the tree-typed KC structure.

Figure 9:
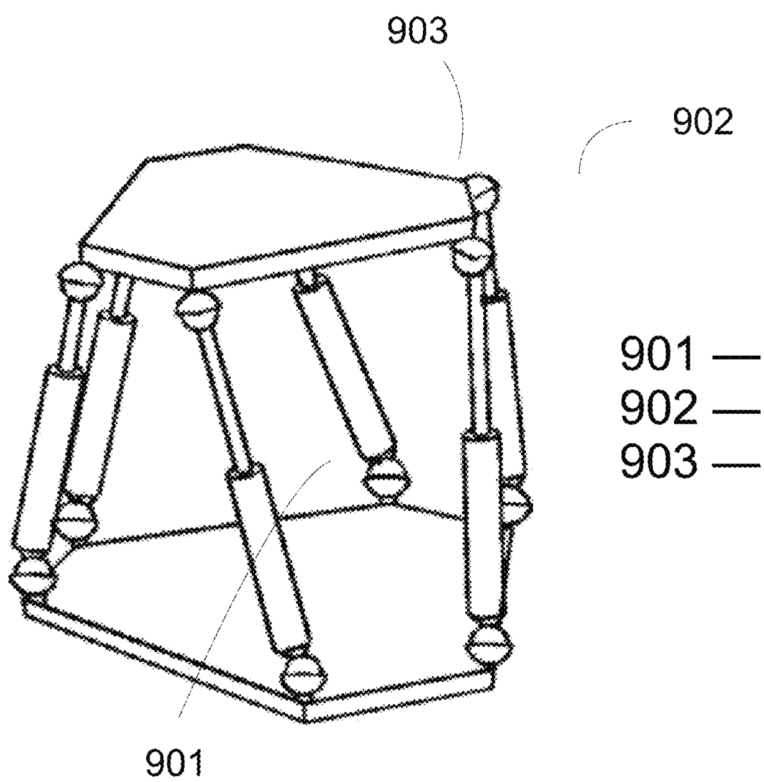
FIG. 9 is a diagram of the closed-chain type robot.

As shown in FIG. 9, the robot is composed of 6 Prismatic Joints 901, 12 Spherical Joints 902 and 14 links 903. The links connected via the Joint Pairs form loops. It is a structure with loops and is called the parallel KC or closed KC. The closed KC may always be divided into tree-typed KC.

As can be inferred from above that, the single KC is a special tree-typed KC and the closed KC may be divided into several tree-typed KCs. Therefore it is significant to analyze the kinematics and dynamics of the tree-typed KC robot. The tree-typed topology is the basic structural constraint of the tree-typed KC robot. The topological relation of robots is the most basic constraint in kinematic, dynamic analysis and situation calculus.

For the convenience of the robot kinematic and dynamic analysis, the identifiers need to be defined when drawing the structural diagram.

c—Chassis; i—Inertial Space;
rr—Right Rocker; rb—Right Bogie;
lr—Left Rocker; lb—Left Bogie;
rfd—Right Front Direction; rrd—Right Rear Direction;
lfd—Left Front Direction; rd—Left Rear Direction;
rfw—Right Front Wheel; lfw—Left Front Wheel;
rmw—Right Middle Wheel; lmw—Left Middle Wheel;
rrw—Right Rear Wheel; lrw—Left Rear Wheel;
rfc—Right Front Wheel—Earth Contact point;
lfc—Left Front Wheel—Earth Contact point;
rmc—Right Middle Wheel—Earth Contact point;
line—Left Middle Wheel—Earth Contact point;
rrc—Right Rear Wheel—Earth Contact point;
lrc—Left Rear Wheel—Earth Contact point;

The structural diagram drawn according to FIG. 3 is diagram of structure. FIG. 3 and the joint pairs out of the system are very important to the analysis of the movement of the robot.

Select any joint pair in the diagram of a closed path formed by connected joint pairs. Separate the stator and the rotor to obtain a tree structure without a loop. This tree structure is called the directed span-tree or the spanning tree. The branch separated is called the non-tree arcs or chord. The span-tree is the support set of the corresponding diagram.

The robot kinematics and dynamics rely on the robot topology. The topological relation, i.e. the connection relation, reflects the connection between the links and the reference relation and the interaction between the motion quantities of the links. Partial ordering, i.e. single-way connection, is the basis for full ordering, i.e. double-way connection.

AXIOM 1.1 The axis-chain axiom is described by the three primary truths of tree-type KC:

TRUTH 1. When the root link moves, the leaf link will certainly move with it. That is to say the position, velocity and acceleration of the roof link transmit and accumulate from the root to the leaf. Therefore, the motion is partially ordered from the root to the leaf. This is shortly referred to as the motion forward iteration of axis-chain.

TRUTH 2. When the leaf modular is under external force, the root link will certainly generate equivalent action. The force on the leaf modular transmits and accumulates from the leaf to the root. Therefore, the effect of force is partially ordered from the leaf to the root. This is shortly referred to as the farce backward iteration of axis-chain.

TRUTH 3. To represent the behavioral process of the robot kinematics and dynamics, the reference relation of the metrics of kinematics and dynamics needs to be built which includes not only the order relation of the interaction process but also the coordinate reference relation of the measured and the controlled quantities. The directed span-tree provides the reference for the topological order of the robot kinematics and dynamics processes. This is shortly referred to as the topological and metric chaining-order of axis-chain.

The three primary truths of the tree-typed axis-chain (AC) axiom stated above are the basis for the theories of the multi-axis system (MAS) kinematics and dynamics and are the footstone for the later KC topology axioms and metric axioms. Therefore, to describe the topologies of the motion of the tree-typed KC, the directed span-tree needs to be created.

Partial ordering is the basic characteristic of the multi-axis system (MAS) and is referred throughout the chapters related to kinematics and dynamics in this book. The span-tree is described as a partially-ordered topological system by numbering the nodes in the tree. Number the nodes of a span-tree in the following process:

[1] Identify a node as the root. Number it as 0.

[2] Select a branch l from the root to the leaf. Assume l=1. Number the nodes successively until $k_l$.

[3] If any node is not numbered, select a remaining branch l+1. Number the nodes successively with the root as $k_l+1$ until $k_{l+1}$. Otherwise, the numbering ends.

In such way, node # l or link # l or axis # l has a unique number, and is called serial number. Given link acronyms, which are one-to-one mapping with the serial numbers of motion-axis sequence $_A$. The motion-axis sequence is shortly referred to as the axis-SEQS. The directed span-tree has the following basic characteristics:

[1] Except the root, any node or link has a unique parent node or link, so the child link # l is one-to-one mapping with the joint pair ${}^{\bar{l}}k_l$ connecting link # $\bar{l}$ and link # l. If all joint pairs have only one motion-axis (composite joint pairs are equivalent to several primitive pairs connected in series), there is one-to-one mapping between any two of the joint pair # l, link # l and axis # l.

[2] There is only one serial chain from a root node to a leaf node.

[3] The direction from a root node to a leaf node is defined as the forward direction and its opposite direction is defined as the backward direction.

[4] In a directed span-tree composed of N+1 links, there is one-to-one mapping between the N links or motion-axes and the natural number set (0, 1, . . . , N]. Therefore the topological relation of a directed span-tree is equivalent to that of a natural number set.

[5] The $\bar{l}$ represents the parent of l. The relation of their partial orderings is as below: $\bar{l}<l$. It means that the orders of the leaf links are always larger than those of the root links.

A link has a unique abbreviation and also a unique number. The order of the abbreviations depends on that of the number. Accordingly, there is a one-to-one mapping between the number of the structural parameters and the motion parameters and the number of the links.

Directed span-tree reflects the topological relation of the robot. The robot behaviors not only associate with the topologies but also closely relate to the kinematic and dynamic processes. The mathematics of topological space and metric space are required to analyze those processes. The chain ordering (CO) and uniqueness of node serial numbers are the fundamental property of MASs. There is a one-to-one mapping between a partially-ordered set and a natural number set, which is an essential part of axiomatic set theory. Therefore, the basic mathematical knowledge of the axiomatic set theory needs to be learned at first. With this basis, the kinematic and dynamic theories and the engineering problems of MASs may then be further studied.

This section uses the axiomatic set theory for reference to introduce the basic technical symbols of the kinematic chain and define the processes and objective of the multi-axis kinematics and dynamics study. First, this section briefs the basis for the axiomatic set theory and describes such as basic concepts as partial ordering and chain, so as to introduce the basic technical symbols of the kinematic chain. Then it briefs the basic concept of vector space to define the study objective of building the kinematic chain symbolic calculus system which uses motion as the core and algebraic geometry as the basis and uses explicit modeling involving topological symbols.

The mathematics that belongs to arbitrary categories can all be deemed as a study of specific mathematical space. The mathematical space covers:

[1] The formalization of the space members and the relation of the members. A space is a set. The space members are collectively referred to as primitive points which may be the spatial points in the real world or the abstract spatial points in mathematics. The basic computational relations of spatial points are referred to as spatial structures. For example, the vector space has the structure with additivity of algebraic products and vector sums. The formulation of space is to correctly express the points in the space and their basic operations.

[2] Calculation of spatial relations. That is to disclose the inherent laws and relations of spaces of the same category via the primitive structures of spatial points.

Zermelo and Fraenkel put forward the axiomatic system of the ZF set theory and the ZFC axiomatic system. It has been proved that the axiomatic mathematical theories constitute the axiom system of the ZFC set theory. Mathematical theories are the basis for the study of all natural sciences and the robot AC symbol system is no exception. The axiomatic set Theory unifies the mathematics of different categories. The mathematics of every category is a mathematical symbol system with the same structures and laws as its investigated system on a certain level of system hierarchy.

If a one-to-one mapping exists between two mathematical spaces, these two spaces are called isomorphic spaces. Isomorphism is a basic philosophical methodology. A symbol system needs to be isomorphic with its investigated system to be equivalent thereto. Only in such way may the calculation of the symbol system be equivalent to that of its investigated system. That is to say the analysis process of the symbol system can reflect the evolution process of its studied system. Isomorphism reflects the objectivity of system laws. Errors tend to arise when exploring the investigated system and the corresponding laws of its symbol system without basing on the isomorphism methodology.

It is common to apply one known mathematics space to research movement in another space which is the isomorphism of the known space. Isomorphism methodology is not only the basis for mathematical research, but also the basis for the realization of computer software and electronic technology.

The chain-ordering symbolic calculus system is built on the basis of the axiomatic set theory and in accordance with the isomorphism methodology isomorphic philosophy, unifying the kinematic chain topology system and the kinematic chain measurement system to construct a unified theoretical framework for modeling and control of robot multi-axis systems Unifying the AC topological system and the AC metric system to create a unified theoretical framework for modeling and control of robot MAS.

The Basis of Set Theory

A set is a collection of all objects sharing a common property. These subjects are called the elements or points of the set. A set member may also be a set, but a set may not be a member of its own, which reflects the level of system hierarchy.

In tradition, the number field (set) includes the natural numbers $\mathcal{N}$, integers $\mathcal{Z}$, real numbers $\mathcal{R}$ and complex numbers $\mathcal{C}$, wherein $\mathcal{N}=\{0, 1, 2, \ldots\}$.

The members of any set $\bar{I}=\{i_0, i_1, \ldots, i_n, \ldots\}$ are different from each other, i.e. $i_k \neq i_j$, wherein k, $j \in \mathcal{N}$.

Null set is set including no element and represented by the symbol Ø. The null set is a member of any set.

The set theory is a mathematical theory related to the study of the sets, including set, element, member relation and other basic mathematical concepts. In modern mathematics, the set theory and the 1st-order predicate logic constitute the axiomatic basis for mathematics and the undefined "set", "set members" and other terms are used to build formal mathematical spaces of different categories. Therefore the axiomatic set theory unifies the mathematical theories of all categories. Mathematics of every category is an example of the axiomatic set theory.

Symbolic System of Axiomatic Set Theory

The axiomatic set theory is the basic system for establishing the mathematical symbol system. It consists of atoms in the symbol system of the axiomatic set theory, 1st-order predicates/judgments and functors/functions. Based on it and through adding atoms and predicates of the application domain, an applied symbol system may be established. The symbol system of axiomatic set theory is in short referred to as the meta-system.

Atom symbols refer to the object symbols, the major property symbols and the minor property symbols of its investigated system. For example, the resistance R1, capacitance C2, energy E and motion A1. Every system is dividable and has its primitive structures or operations. Any atom symbol has the level of its investigated system hierarchy. The atom symbols in the investigated system is corresponding to the level of the system.

The members of atom set constitute new object symbols and property symbols, which are called the composite object symbols and composite property symbols. They are fundamental to the investigated object. The atom symbols, composite object symbols and composite property symbols are collectively referred to atom symbols.

Predicate symbols are the clear judgment symbols in the studied system (correct or false) and composed of the predicate relators and several placeholders, expressed similarly as P(, . . . ), wherein P is the predicate relator, ( ) is the delimiter and , . . . represents several placeholders. A predicate represents a clear judgment.

Functor symbols represent the functional relations of the studied system and each is composed of the function relator and several placeholders, taking the form of ƒ(, . . . ), wherein ƒ is the predicate relator, ( ) is the delimiter and , . . . represents several placeholders. A functor represents a kind of function relation and unlike the predicate it is not a binary judgment.

There is a one-to-one mapping between the atom symbols and the studied objects or properties and between the the predicate symbols and functor symbols and the effects of the objects or properties of the studied system. The predicate judgment and the functor operation are collectively referred to as the property operation of the system and in short, the operation. There is a one-to-one mapping between the symbol computation system composed of the atom symbols and the property symbols and the studied system, meaning that the symbol system is equivalent to the studied system. The motion process of the studied object may be reflected only through describing the isomorphic system with the natural and structural symbolic language. The symbols of the predicate judgment and the functor calculation are collectively referred to as the property operators, including continuous metric relators and connected topological relators.

The following basic atom symbols [8] are often used in the set theory:

[1] Ø means a null set;

[2] I stands for a universal set;

[3] [ ] represents an ordered set, sequence or matrix, such as [x,y,z];

[4] { } represents the identifier of a set, such as {x,y,z}. The members are unordered;

[5] , represents "separator of elements/enties/terms";

[6] ( ) means the delimiter of the action scope of symbols only when no predicate is on the left, such as P(x,y,z);

[7] stands for a property placeholder, such as P(, , );

[8] , . . . represents placeholders of any number, such as P(, . . . );

The following 1st-order predicates/relators are often used in the set theory:

[1] ∃ stands for exists; ∃!, representing unique existence; such as ∃u, ∃!z;

[2] ∀ means "for all", such as ∀x;

[3]=stands for equality and ≡ for "is equivalent to", such as x=y;

[4] ∈ stands for "is an element of", such as a∈b;

[5] ∧ stands for "and", ∨ for "or", ¬ represents opposite, such as ∧x, ∨x, ¬x;

[6] ⇒ stands for "implies", such as ∃x⇒x=y;

[7]⇔ represents "two-way implication", such as a⇔b;

[8]:= means "assignment", such as u:=b;

[9] ∪ represents "set conjunction", such as, A∪B={x|x∈A∨x∈B};

[10] ∩, representing "set disjunction", such as A∩B={x|x∈A∧x∈B};

[11]− means set subtraction, such as A−B={x|x∈A, x∉B};

[12]→ stands for "a many-to-one mapping", such as A→B;

[13] ↔ means "a one-to-one mapping", such as A↔B;

[14] (, . . . ) represents a nameless predicate when no symbols other than separators exist on the left, the output of which is true only when the items in the bracket are true;

[15] · stands for inner product, × for cross product, * for the product of complex number; and for product of algebra.

A member of a set may also be a set. Represent the set and the member respectively by uppercase or lowercase.

The predicate P(, . . . ) represents a clause. The output may be included in the range only when the predicate P is true. The expression of a predicate represents judgment. Two matched predicate expressions constitute a positive judgment. For the convenience of writing, the expressions of one-place predicates and two-pace predicates are distinguished between left and right operations which are variants of P(, . . . ). For example, x=y represents equality; ¬x represents negation.

Defining a new operation based on the meta-system can establish a new symbol system. The meta-system is the basis for the ZF axiom system.

The meta-system is composed of atoms. The atom is the unit composing the meta-system. Only by forming a complex theory system with minimum atoms, functors and predicates may guarantee the conciseness of the theory. The mathematical meta-system provides unified language and logic operation for mathematics of different categories.

ZF has only one object which is a set. Members of the set are sets. Any group of the members is a set. The ZF axiom is the footstone for the axiomatic set Theory. The set expressions of the following axioms are hard to understand and may be ignored. The understanding of the subsequent content will not be affected.

According to the description of natural numbers in the peano axioms, it is certain that there is a set including all natural numbers.

For the axiom scheme of specification, the axiom scheme of replacement and the axiom of choice, see the reference. Applying certain basic operations to different sets, a special category of mathematics may be created.

The axiomatic set theory is significant in that it demonstrates the relation between different categories of mathematics at the meta-system hierarchy and also indicates that different categories of sciences can be unified via the symbol system of the axiomatic set theory to achieve intersection of different disciplines. For the meta-system of the MAS modeling and controlling theory, the basic set expression needs to be built at first:

[1] In the set theory, | | represents the cardinal number of a finite set, i.e. the number of members. The scalar multiplication · represents permutation. For example:

[ ]·[ ]≠[ ]·[ ], but |[ ]·[ ]|=|[ ]·[ ]|, i.e. 2·3=3·2. They have different meanings. Algebra multiplication is a special form of the matrix multiplication. Symbol overloading, meaning implementing different calculation functions depending on the operands, is common and necessary. Therefore, the symbol calculation needs to be defined according to the property parameters.

[2] An unordered set is a combination that can always be expressed as an ordered combination. A combination is a special form of permutation, which is the common form of existence. The three sons of Li are expressed as Li's sons=[a, b, c]. [a, b, c] is an ordered set, i.e. a vector. It is an example of {a, b, c}. Therefore, in the remaining content of this book, [ ] represents an ordered set and { } represents an unordered set.

[3] The set name represents a certain kind of set. For example, in the three sons of Li Li's sons=[a, b, c], the set name Li's sons is a structured relation, while [a, b, c] is only an example of [, ,]. The structured names have clear connotation and are basic forms to express the property parameters. After the members of a set are defined, the member relations shall be reflected as operation or function relations. The functors reflect the mapping between the members. The functions or operations represented by the predicates can help understand the physical significance of the symbols.

Axiomatic set theory is a rigorous axiomatic system, while the present robot kinetic and dynamic theories do not constitute a rigorous axiomatic theory system, for there are many branches. A theory system including the minimum property symbols and minimum operations may be built only by unifying the verified theories.

Traditional mechanics is not an axiomatic theory system including the minimum property symbols and the minimum operations. For example, the translational velocity is represented by v. The translational acceleration is represented by a. The derivative of the velocity v with respect to time t is represented by v'. The force is usually represented by $\vec{f}$. This is ambiguous. For example, the $\vec{f}$ does not reflect the application point nor the exerting point, which fails to meet the requirement of computer processing. The properties represented by the non-structured symbols can only be understood with the help of annotation, hard to meet the requirements of the kinematic and dynamic systems with high-DOF.

Representing the function relation by the 1st-order predicate can not only ensure readability but also eliminate ambiguity. For example, fetch (A, B) represents A fetches B.

Likewise, with respect to the meta-system of the MAS modeling and controlling theories, all objects are deemed as sets and its axiomatic theory system needs to be established. The MAS modeling and controlling theories are applicable to the robotic engineering or mechatronic engineering. They constitute a discipline with clear application background. The properties and their relation are defined and clear. All relations have structures of predicates or functors. For example, ${}^{\bar{l}}k_l$ is defined to represent the joint pair of link # $\bar{l}$ and link # l, which is the expression form of an operation.

In the AC symbolic calculus system, the system property variables and constants have concise names with clear physical significance. They are represented by ordered sets or SEQS. The symbols with the Roman type represent constants. The names of the italic type represent variables associated with the time t. The symbolic calculus system for ACs centering on AC axiom is a meta-system of the modeling and controlling theory of MASs.

From above, the computer language is a beneficial complement to the symbolic system of the axiomatic set theory. Converting the AC symbolic calculus system into the pseudo-codes of software directly is a significant aspect of realizing engineering systems.

Partial Set and Peano Natural Number Set

According to AC axiom, the partial ordering is a fundamental property of robotic systems and an AC is the theoretic abstraction of the partial ordering kinematic chain.

A chain is a set with partial ordering. It is an important content of axiomatic set theory. Its chain theory is the basic laws to which the objective world including kinematic chain generally conforms. Theoretical analysis of kinematical chain can be guided on the topological level on the basis of the laws.

Assume that a is a set. a∪{a} is called the successor of a, which is represented by a+ or S(a). The successor of the a is an element closest to the a and ≥a.

Assume that A is a set. If A satisfies the following conditions, A is an inductive set: (1) Ø∈A; (2) ∀a∈A⇒S(a)∈A. The set of natural numbers $\mathcal{N}$ is the union set of all inductive sets. Assume that 0=Ø; 1=S(0)=Ø∪{Ø}={Ø}; 2=S(1)={Ø}∪{{Ø}}={Ø,{Ø}}; 3=S(2)={Ø,{Ø}}∪{{Ø,{Ø}}}={Ø,{Ø}, {Ø,{Ø}}}. It can be proved by induction.

Therefore, Peano axiom of the set of natural numbers: 0 is a natural number. Every natural number has a successor. 0 is a successor of no natural number. Different natural numbers have different successors. Assume that a set comprised of natural numbers includes 0 and that once a natural number is included in the set, its successor is also included. Therefore this set includes all natural numbers.

The set of natural numbers $\mathcal{N}$ is a process of induction that 0 produces 1, 1 produces 2, 2 produces 3 and so on.

Set of natural numbers $\mathcal{N}$ $\mathcal{N}$ : 0=Ø, also called the null. Ø is the atomic symbol, representing null. {Ø} represents the content of a vacancy, i.e. an object occupying one vacancy. {Ø, {Ø}} represents an object occupying one vacancies and so on. Therefore, the positions of natural entities can be mapped to the natural numbers in a one-to-one way. The set of natural numbers is transitive, i.e. $a \in a^+$. The positive order: $a < a^+$.

For a set X, name the map between the set X and the set X×X's subset R as the relation R. If (a,b)∈R, then ${}^{a}R_{b}$. Therefore, the set X's relation R is a subset of X×X.

If a,b∈X, a≼b represents that at least one element in a is less than the elements in b. The order operators are usually denoted as ≤, <, ≼ [2]. The standard for comparing may be different. The comparing may be conducted in terms of generic number of any form or in accordance with other agreements.

Transitive: If ∀a, ∀b, ∀c∈X, $^{a}R_{b}$ and $^{b}R_{c}$, then $^{a}R_{c}$.

Reflexive: If ∀a∈X, then $^{a}R_{a}$.

Anti-symmetric: If ∀a,b∈X, $^{a}R^{b}$ and $^{b}R_{a}$ then a=b.

Symmetric: If ∀a,b∈X, $^{a}R_{b}$ then $^{b}R_{a}$ and vise versa.

Partial set: If the operation ≤ of a set X is transitive, reflexive and anti-symmetric, then (X,≤) is called a partially set.

The order operation ≤ and its transitivity, reflexivity and anti-symmetry are collectively called the chaining order relations.

Chain: Fora set A, ∀k, i∈A; if k≤i or k>i, (A,≤) is a linear ordered set, called a chain. In short, a chain is an ordered set.

Obviously, a continuous interval is a partially set and is a chain with infinite members, which is usually represented by the interval symbol. Therefore, $$\{x\in x|k<x<i\}=(k,i);\{x\in x|k\leq x<i\}=[k,i),$$

$$\{x\in x|k<x\leq i\}=(k,i];\{x\in x|k\leq x\leq i\}=[k,i].$$

For example, the partially set [1,2,3] is a chain. For a partially set {x,y,z}, if its members are as follow: X<y and y<z, then this set [x,y,z] is a chain. Obviously, the members of a sector and matrix are orderly arranged. Therefore, when the serial number is used as the ordering standard, the sector and the matrix are chains. The chain is the fundamental object of mathematics and a fundamental form of natural existence.

For a set of natural numbers $\mathcal{N}$, if ∀i∈$\mathcal{N}$, then $i<i^+$. The set of natural numbers $\mathcal{N}$ is transitive. If $i<i^+$ and $i^+<k$, then i<k. Therefore the set of natural numbers $\mathcal{N}$ is a chain.

For a set X and there is a one-to-one mapping $f$:X→Y, then X≈Y and the two sets are isomorphic.

Isomorphic chains: For a chain X and an image chain Y, there is a function $f$:X→Y. If ∀a,b∈X,a≤b, then $f$(a)≤$f$(b). The chain X and the image chain Y are isomorphic, denoted as X≈Y.

In the real world, the chain relation is the most basic relation. For example, multiplication "·" may be used for calculation of topological relation. The set A={$a_1$,$a_2$} and the set B={$b_1$, $b_2$, $b_3$} produce the 2D set $$A\cdot B=\{a_1\cdot b_1,a_1\cdot b_2,a_1\cdot b_3,a_2\cdot b_1,a_2\cdot b_2,a_2\cdot b_3\};$$

The cardinal number, i.e. the number of members is denoted as |A·B|=6. Therefore 2·3=6. In nature, $a_1 \cdot b_1$ represents the ordered topological relation, i.e. connection relation. The algebra multiplication is the basic calculation of the chain, so the chain relation is the basic relation of different disciplines.

Based on the ZFC axiom system, assume that 0=∅; 1=0+, 2=1+, etc., in such way, the set of natural numbers is formally represented. The 1st-order predicates added in the set of natural numbers, i.e. plus +, multiply ·, less than and equal to ≤ and less than < constitute the basic spatial structure of the natural numbers. Introduce the 1st-order predicates: functor/operation − into the natural number field. The results may not be elements of the set of natural numbers. Therefore the minus calculation − in the natural number field is not self-closing. The set of natural numbers need to be extended to the set $\mathcal{Z}$ of integrals. Introduce the 1st-order predicates, i.e. division /, into the set $\mathcal{Z}$ of integrals. The results show that this calculation is not self-closing. The set of integrals need to be extended to the set R of real numbers. By applying the square roots of real numbers, the set C of complex numbers is discovered. Vector space and complex number space are isomorphic. For example, the rotation of the 2D Cartesian vector space can be mapped to the multiplication of the 3D complex number space. The rotation of the 3D Cartesian vector space can be mapped to the multiplication of the 4D complex number space.

The mathematical space is formed and extended due to the non-closure of its spatial operation, expanding the field of view for human eyes. Vector space is the basic mathematical space, and it is in nature partially-ordered. Examples of chains include action chain, behavior chain, kinematic chain, etc. The chain is a general form of existence. The chain is in nature an ordered topological relation. On the one hand, the system topology determines the behavioral process of its system kinematics and dynamics. On the other hand, till now, topological symbols are separated from the modeling and analysis of behavioral processes. That is to say topological symbols do not participate the modeling of the multi-body kinematics and dynamics.

However, the existing multi-body kinematics and dynamics lack topological symbology. Due to the invariance of chain ordering, system models not only need to express system topology and chain ordering, but also demands to keep the invariance of the chaining order of kinematics and dynamics. Only in this way can ensure the objectivity of the symbol system. The vector space is also called the linear space and is one of the core contents and the basic concepts of linear algebra. Given a field $\mathcal{F}$, a vector space $\mathcal{V}$ and two operations:

[1] Vector addition: $\mathcal{V}+\mathcal{V}\rightarrow\mathcal{V}$, represented by v+w, ∃v,w∈$\mathcal{V}$.

[2] Scalar multiplication: $\mathcal{F}\cdot\mathcal{V}\rightarrow\mathcal{V}$, represented by a·v, ∃a∈$\mathcal{F}$, ∃v∈$\mathcal{V}$.

wherein ·represents algebra or matrix multiplication; + represents algebra or matrix addition.

The vector space is a linear space including orthogonal base frames and can produce scalar product and cross product. The vector analysis is the basis for the robotic system, for when different frames are chosen the distances/angles between vectors are invariable. Spatial positions, velocities, accelerations and forces are vectors.

The joint motions are the relative motions between the rotor and the stator. The joint variables, i.e. the linear position and the angular position, are called the natural coordinates, which are scalars with respect to their unit axis-vector. Due to the rotation, the relations between position vectors, velocitie vectors and acceleration vectors are non-linear.

A 6D Spatial Vector is formed by combination of two 3D vectors. And the 6D vector is also called double 3D vectors. The dual-vectors formed by the 3D rotational velocity and translational velocity are called the motion screw. The dual-vectors formed by the 3D torque and force are called the wrench.

Let r and p represent the 3D rotational velocity vector and translational velocity vector respectively. Assume that r and p are real numbers. Then the screw S=r+p·ε and the Dual Numbers s=r+p·ε. Represent the dual number unit as ε and $$0\cdot\varepsilon=0,1\cdot\varepsilon=\varepsilon,\varepsilon^2=\varepsilon*\varepsilon=0; \tag{1.5}$$

The following dot multiplications and cross multiplications exist:

$$s_1\pm s_2=r_1+r_2+(p_1\pm p_2)\cdot\varepsilon$$

$$S_1\pm S_2=r_1+r_2+(p_1\pm p_2)\cdot\varepsilon, \tag{1.6}$$

$$s\cdot S(r+p\cdot\varepsilon)\cdot(r+p\cdot\varepsilon)=r\cdot r+(p\cdot r+r\cdot p)\cdot\varepsilon$$

$$S_1 \cdot S_2 = (r_1 + p_1 \cdot \varepsilon) \cdot (r_2 + p_2 \cdot \varepsilon)$$

$$\backslash = r_1 \cdot r_2 + (r_1 \cdot p_2 + p_1 \cdot r_2) \cdot \varepsilon$$

$$S_1 \times S_2 = (r_1 + p_1 \cdot \varepsilon) \times (r_2 + p_2 \cdot \varepsilon)$$

$$\backslash = r_1 \times r_2 + (r_1 \times p_2 + p_1 \times r_2) \cdot \varepsilon. \quad (1.7)$$

The functions of the two variables S=r+p·ε and s=r+p·ε are defined as below $$f(s) = f(r) + \dot{f}(p) \cdot \varepsilon$$

$$f(S) = f(r) + \dot{f}(p) \cdot \varepsilon, \quad (1.8)$$

In Eq. (1.5), $\varepsilon^2=0$ reflects the physical fact that there is not mutual coupling motion of two position vectors.

On the basis of the concept of double vectors, operator algebra of 6D space is formed. It is very important in the robot modeling. Dual quaternion is formed at the same time. It is very important to solve the 6R-robo arm inverse kinematics.

The tensor invariants reflects the invariance of the thing's property. To measure the properties of things, you must have a reference object. There is a necessary connection between the metrics of different reference object, that is, the objectivity of the law. The representation of the thing's property must indicate its reference object.

The "tensor analysis" was originally proposed by Einstein, based on which the theory of electromagnetic field and force field was established. "Tensor analysis" is widely used in the study of continuous medium particle systems. "Invariants of tensors" is the most basic law in nature and a reflection of the thing's objectivity.

The vector space has the fundamental algebraic structures of "addition and scalar product", and also has additional structures:

(a) A real number or a complex number vector space together with norms structure forms a normed vector space.

(b) A real number or a complex number vector space together with the scalar product structure forms an inner product space.

(c) A vector space together with the limits forms a topological vector space.

(d) A vector space together with a bilinear operator forms a field algebra.

(e) In the Cartesian rectangular reference frame, the linear space is an isometric projection space preserving distances and angles, i.e. the norms and the angles between the vectors maintain unchanged. In the study of robot kinematics and dynamics, the Cartesian rectangular reference frame is usually used.

The mathematical spaces stated above are too abstract for the robot researchers. Mathematicians pay more attention to the formalization of mathematical theories and often ignore their applications. Vector spaces and dual vector spaces are basis for robot kinematic and dynamic investigation.

Due to the lack of metasystem consisting of atoms and operations, rigorous axiomatic theoretical system and kinematic chain symbology, there are serious difficulties in the study of complex robotic systems. For example, despite the Lagrange and Kane methods can be used for dynamic analysis, it is still difficult to establish a concise and explicit dynamic equation for multi-body with high-DOF. Due to the lack of the metasystem consisting of atoms and operations, the rigorous axiomatic theoretical system and the kinematic chain symbology, the studies of complex robotic systems are faced with significant challenges. For example, although Lagrange and Kane methods can be used for dynamic analysis, it is difficult to build a concise and explicit dynamic equation for multi-body with high-DOF.

Vectors fall within the category of geometry and are intuitively understandable, but are not analyzable as with algebraic geometry; the two need to be organically combined. At the same time, the objective world is the process of moving from one set of states to another through the execution of an action set. Expressing the movement of space through the action of space is not only easy to understand, but also easy to implement computer software engineering. Therefore, this chapter proposes the AC symbol system, revise and develop the classic vector space theory on the basis of guaranteeing topological invariance and measurement inferiority to establish an action-centered, algebraic geometry-based, explicit/analytical modeling AC symbolic calculus system.

On the one hand, the data in a computer system is an array with addresses as the indexed. The storage and representation of information also needs to be stored in an array. On the other hand, the partial ordering of the directed Span-tree is a basic feature of the MAS. Therefore, (a) the set of chains or partial ordering is the basis for the symbol theories and the fully-ordered set is a special form of the partially set; and (b) using matrix to represent the properties not only ensure conciseness but also fits the structure features of numerical computer.

By reference to the axiomatic set theory, use the partially set (] to represent AC. Assume ${}^{i}l_l = (i, i^+, \ldots \bar{l}, l]$. The ${}^{i}l_l$ is called AC. A null set represents a vacancy. If the vacancies have the addresses of the parent set, the set is extended to a chain, otherwise the set is a null.

Real or complex matrices are partially sets. Assume that the position vector $\vec{r}$ from k to j is ${}^{k}\vec{r}_j$. It is obvious that ${}^{k}\bar{r}_j$ represents the partial ordering operation from k to j.

One AC is a partially-ordered chain. The joint pair ${}^{\bar{l}}k_l$ not only represents the connection from link # $\bar{l}$ to link # l, but also the connection from link # l to link # $\bar{l}$, so the joint pair ${}^{\bar{l}}k_l$ has full ordering. Therefore $${}^{\bar{l}}k_l = {}^{l}k_{\bar{l}}. \quad (1.9)$$

Obviously, full ordering and partial ordering are the properties of an object. However, corresponding symbol system has not yet established for MAss.

By reference to the chain theories of the set theory, the primitive AC ${}^{\bar{l}}l_l$ corresponding to the joint pair ${}^{\bar{l}}k_l$ is represented by interval symbols as below:

$${}^{\bar{l}}l_l = (\bar{l}, l], \quad (1.10)$$

wherein $\bar{l}$—the predecessor/father of l, l—the successor/child of $\bar{l}$.

In a Span-tree, there is a one-to-one mapping between the primitive AC ${}^{\bar{l}}l_l$; and the l, i.e.

$${}^{\bar{l}}l_l \leftrightarrow l. \quad (1.11)$$

Thus, $$\bar{l} \notin {}^{\bar{l}}l_l, \; l \in {}^{\bar{l}}l_l. \quad (1.12)$$

The subsets of a partially set is partially sets, so the AC ${}^{\bar{l}}l_k$ from $\bar{l}$ to k is defined as below:

$${}^{\bar{l}}l_k = (\bar{l}, l, \ldots, k]. \quad (1.13)$$

Assume $\bar{\bar{l}}$ is the predecessor of $\bar{l}$. Thus, $${}^{\bar{l}}l_l = (\bar{\bar{l}}, \bar{l}, l]. \quad (1.14)$$

The subset of a partially set is partially sets, the predecessor of progenitor exists $$^{i}l_{l}=(i,i],|^{i}l_{l}|=0. \tag{1.15}$$

The $^{i}1_{l}$ is a null chain or trival chain. The inertial space (or the world) is represented by i. The trival chain $^{i}1_{l}$ always exists.

In the AC symbolic calculus system, the name of a property variable or constant having partial ordering includes the index/indices representing partial ordering which is/are at the upper left and lower right or at the upper right and the lower right. Its/Their direction(s) are always from the upper left to lower right or from the upper right to lower right. For example, $^{k}\vec{r}_{l}$ represents the position vector from k to l, wherein, r is the translational property symbol. $r_{l}^{k}$ represents the linear position from k to l.

Given an AC $^{\bar{l}}1_{k}=(\bar{1}, \ldots, k]$, $n\in {}^{\bar{l}}1_{k}$. If the n represents a Cartesian reference frame (Cartesian frame), then the $^{\bar{l}}1_{k}$ represents a Cartesian axis-chain (Cartesian AC). If the n represents a natural reference frame (natural frame), then the AC $^{\bar{l}}1_{k}$ stands for a natural axis-chain (natural AC).

A chain $\{L,\leq\}$ is an ordered set, wherein $\leq$ determines the order structure of chains. The order structure is one of the basic structures of topological systems and metric systems.

When defining a reference frame, right hand (RH) order and left hand (LH) order is usually used. The order of the coordinate axes is determined as RH order, for example, [x,y,z]. Therefore coordinates by default conform to the LH order For example, $[1,2,3]^{T}$.

The order of the chain connection is referred to as the chain order, which is determined by the original structure of the object being studied. The ordered sets such as [x,y,z], [1,2,3] and the like are in tradition written from the left to right, which is referred to as the RH order. Correspondingly, the basis components are written in the form of column, which is referred to as the LH order. It is obvious that the chaining order is objective while the writing ordering is subjective. Due to the written symbol system is isomorphic with the study object, the sort order is essentially the chain order, which is the language expression order of the chain order. The order from the predecessor to leaf in the Span-tree is called forward (FW) order, otherwise backward (BW) order. In the forward order, the serial number of the predecessor is always less than that of the leaf. The "zooming-rotation-translation" from the predecessor to leaf is called forward motion. This motion is in nature originates from the reference of forward motion. By reference to its own system, the shape is at first zoomed and then rotation and at last the translation starts. For example: when a robot needs to reach its target, it at first needs to adjust its attitude to the desired one and then carries out translation. It does so repeatedly until reaching the target.

In this patent, the forward order and RH order are corresponding or equivalent and so are the backward order and LH order. The forward and backward directions of to topologies are defined with respect to the connection direction of the Span-tree. The FW or BW orders of metrics are defined with respect to reference axes. The RH or LH orders of partially ordering symbols are defined with respect to the directions of their component arrangements.

Given two index sets r and c. When comparing in accordance with the lexicographic order, if $c\prec r$ and $r^{[1]}=c^{[1]} \ldots r^{[k]}=c^{[k]}$, $r^{[k+1]}\neq c^{[k+1]}$, then $r^{[k+1]}>c^{[k+1]}$. The FW lexicographic order refers the lexicographic order in the dictionary. Therefore, no matter whether the investigated system has an order, as long as it is symbolized, it has lexicographic order.

For example, if r=[1,4,3,2], c=[1,2,4,3], then $c\prec r$.

A matrix is often expressed in block forms and its submatrix by indexing and rearranges the elements in the matrix. The index set and quotation are the basic expression and operation method of the computer symbol processing.

The [n, . . . , m] is often denoted as n:m, wherein $n,m\in\mathcal{N}$; [*] represents using a row or column. The * represents arbitrary symbol. If |r|=O, the index set $r\succ O$, then r is called forward lexicographic order. If the index set $r\prec O$, then r is called BW lexicographic order.

The symbolic calculus conducted by the modern computer is necessary for the analysis of the tree-typed MAS of high dimension. On this basis, the tools for the analysis and modeling of MASs may only be developed. The symbol system of MASs needs to be combined with the modern computer theories. Establishing symbol operation requirements adaptive to the modern computer can help the understanding of the essence of the kinematics and dynamics of high-DOF MASs and the development of MAS software.

In the computer system, the internal and external data are stored in arrays. The index symbol [ ] is introduced for the following purposes:

[1] MAS theories are used to develop MAS software. The kinematic and dynamic equations of MASs are expected to have the function of pseudo-codes.

[2] The basis of machine intelligence is the universality of its software. The full parameterization including the topologies, polarities, structures and inertias of MASs are expected. With the index symbol [ ], the relations between a property and its sub-properties can be represented briefly.

A. Index

Given an ordered set $r^{T}=[1,4,3,2]$. Assume that $r^{[k]}$ represents getting the element at the row k. It is usually assumed that [x], [y], [z] and [w] respectively represent using the elements in row 1, 2, 3 and 4. These indexes are mainly used to analyze the relation between the members of matrices. For example:

$$p\begin{matrix}[x] & [y] & [z]\\ [5 & 6 & 7]\end{matrix} \Rightarrow p^{[x]}=5,\ p^{[y]}=6,\ p^{[z]}=7,$$

$$\begin{matrix}[1]\\ [2]\\ [3]\end{matrix}\overset{p}{\begin{bmatrix}3\\2\\1\end{bmatrix}} \Rightarrow \begin{matrix}p^{[1]}=3\\ p^{[2]}=2,\\ p^{[3]}=1\end{matrix}$$

$$P\quad [x]\quad [y]\quad [z]\quad P^{[1]}=[3\ \ 2\ \ 1],P^{[2]}=[6\ \ 5\ \ 4]$$

$$\begin{matrix}[1]\\ [2]\\ [3]\end{matrix}\begin{bmatrix}3 & 2 & 1\\ 6 & 5 & 4\\ 9 & 8 & 7\end{bmatrix} \Rightarrow \begin{matrix}P^{[1][x]}=3, & P^{[1][z]}=1,\\ P^{[2][x]}=6, & P^{[2][y]}=5,\\ P^{[2][x]}=9, & P^{[3][z]}=7,\end{matrix} P^{[x]}=\begin{bmatrix}3\\6\\9\end{bmatrix}, P^{[y]}=\begin{bmatrix}2\\5\\8\end{bmatrix}.$$

B. Index Set

The set of the indices representing the use of the element numbers is called the index set. For example, given a set l=[1,3,5,7] and an index set $r^{T}=[1,4,3,2]$ and c=[1,2,4,3], then $l^{[r]}=[1,7,5,3]$, $l^{[c]}=[1,3,7,5]$. Further given a matrix Q, wherein $$Q=\begin{vmatrix}Q^{[1][1]} & Q^{[1][2]} & Q^{[1][3]} & Q^{[1][4]}\\ Q^{[2][1]} & Q^{[2][2]} & Q^{[2][3]} & Q^{[2][4]}\\ Q^{[3][1]} & Q^{[3][2]} & Q^{[3][3]} & Q^{[3][4]}\\ Q^{[4][1]} & Q^{[4][2]} & Q^{[4][3]} & Q^{[4][4]}\end{vmatrix}=\begin{vmatrix}11 & 12 & 13 & 14\\ 21 & 22 & 23 & 24\\ 31 & 32 & 33 & 34\\ 41 & 42 & 43 & 44\end{vmatrix}.$$

Then $$Q^{[r][c]} = \begin{vmatrix} 11 & 12 & 14 & 13 \\ 41 & 42 & 44 & 43 \\ 31 & 32 & 34 & 33 \\ 21 & 22 & 24 & 23 \end{vmatrix}.$$

C Delimiters

Assume that $\phi_l \bar{l} \wedge k$ or $\phi_l \bar{l} \vdots k$ is k power of $\phi_l \bar{l}$. The $\wedge$ or $\vdots$ indicate the following is power operator when there is superscript at the upper right.

Topological Space of Axis-Chains

Firstly, based on the axiomatic set theory, a directed Span-tree based on the motion axis is proposed. Then, the symbolic system and basic operations of the directed Span-tree are established to lay the foundation for the construction of the AC symbol system. However, the chain symbol of axiomatic set theory is not build for the analysis of the AC specially. It is necessary to modify the chain symbols according to the basic characteristics of AC.

Directed Span-Tree of Axis-Chain

Any composite joint pair is composed of two basic joint pairs, namely the revolute joint pair R and the prismatic joint pair P. In the directed Span-tree T, link # l has only one link # $\bar{l}$ and there is a one-to-one mapping between link # l and axis # l. That is to say link # l or axis # l or the joint pair $^{\bar{l}}k_l$ is equivalent in terms of corresponding relation. Thus, $$\Omega_l \leftrightarrow A^{[l]} \leftrightarrow {}^{\bar{l}}k_l, l \neq 0. \tag{1.16}$$

A MAS is denoted as D={T,A,B,K,F,NT}, wherein T=[$^{\bar{l}}k_l$|l∈A, $\bar{l}=\overline{A}^{[l]}$] stands for one directed Span-tree, A for a axis-SEQS, F=[$F^{[l]}$|l ∈A] for a frame-SEQS, B=[$B^{[l]}$|l∈A] for a body-SEQS, K=[$^{\bar{l}}k_l$∈l∈A, $^{\bar{l}}k_l$∈{R,P,H,O}] for joint-type-SEQS and NT for a constraint axis-SEQS, i.e. non-tree-SEQS. It is obvious that there is a one-to-one mapping between axis-SEQS A and body-SEQS B, joint-SEQS K and frame-SEQS F.

$$A \leftrightarrow B \leftrightarrow K \leftrightarrow F. \tag{1.17}$$

Axis-SEQS A is comprised of all axes in the MAS D·T, B, K and F are respectively mapped in a one-to-one way to the axis-SEQS A·NT and T constitute the topological structure of the MAS D.

Figure 10:
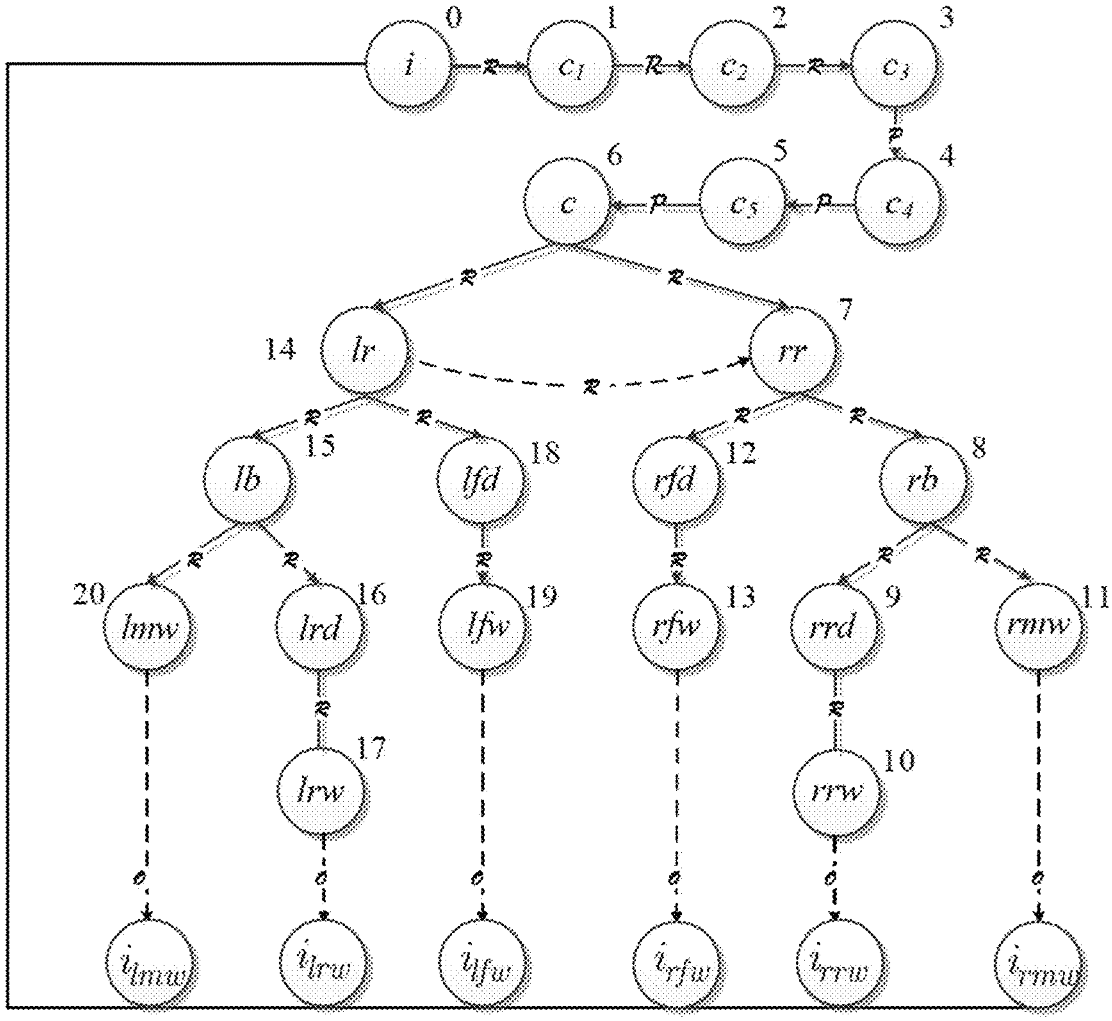
FIG. 10 is a directional Span tree diagram of the CE3 lunar rover axis chain.

The directed span-tree of CE3 rover is shown in FIG. 10, wherein the virtual joint pair $^{i}k_c$=(i,c1,c2,c3,c4,c5,c], i.e. the virtual joint pair $^{i}k_c$ is equivalent to an AC $^{i}l_c$. Likewise, any composite joint pair may respectively be equivalent to its AC.

[1] Every non-root node represents a unique motion-axis. All motion-axes arranged in forward order constitute the axis-SEQS A.

[2] Based on the connection relation of joints represented by solid directed line segments, the parent axis-SEQS of axis-SEQS A is defined to be $\overline{A}$. Given ∀l∈A, then $$\bar{l} - \overline{A^{[l]}} - \overline{A}^{[l]}, A \leftrightarrow \bar{A}. \tag{1.18}$$

[3] Given ∀l ∈A. The joint pairs $^{\bar{l}}k_l$∈{R,P,H,O} arranged in forward order constitute the joint-SEQS K.

[4] Given ∀l∈A. Any dashed non-tree arcs represent constraint-axis $^{\bar{l}}C_l$ which is stored in non-tree-SEQS NT, i.e. $^{\bar{l}}C_l$∈NT and NT={$^{l}C_k$|l∈A,k∈CA, $^{l}C_k$∈{R,P,H,O}};

CA is a constrain-axis type-SEQS.

[5] The system D has |A|−|NT| DOFs, wherein |A| and |NT| represent the cardinal number of axis-SEQS A and non-tree-SEQS NT.

For example, the following axis-SEQS and non-tree-SEQS are obtained according to the FIG. 10.

$$A = \left( \begin{matrix} i, c1, c2, c3, c4, c5, c, rr, rb, rrd, rrw, rmw, \\ \backslash rfd, rfw, lr, lb, lrd, lrw, lfd, lfw, lmw \end{matrix} \right], \tag{1.19}$$

$$NT = \left\{ {}^{lr}R_{rr}, {}^{i}O_{i_{lfw}}, {}^{i}O_{i_{lmw}}, {}^{i}O_{i_{lrw}}, {}^{i}O_{i_{rfw}}, {}^{i}O_{i_{rmw}}, {}^{i}O_{i_{rrw}} \right\}. \tag{1.20}$$

The following parent axis-SEQS is obtained according to Eqs. (1.18) and (1.19).

$$\overline{A}=(i,i,c1,c2,c3,c4,c5,c,rr,rb,rrd,rb,rr,rfb,c,lr,lb,lrd,lr,lfd,lb]. \tag{1.21}$$

AC symbols and operations are as below:

[1] The kinematic chain is identified by the partially set (].

[2] Axis # l is the member $A^{[l]}$ of the Axis-SEQS A. Its name is one-one mapping to its unique number, so the computation complexity of $A^{[l]}$ is O(1).

[3] The operation $\bar{l}$ represents using the parent axis of axis # l. According to Eq. (1.18), the computation complexity of $\bar{l}$ is O(1).

[4] Axis # $\bar{l}$, is the member $\overline{A}^{[l]}$ of the axis-SEQS $\overline{A}$. According to Eq. (1.18), the computation complexity of $\overline{A}^{[l]}$ is O(1).

[5] The operation $^{l}l_k$ represents using the AC from axis # l to axis # k. It is denoted as (l, . . . , $\bar{k}$, k]. And its inverse AC $^{l}l_k$=(l, . . . , $\bar{k}$, k]. The cardinal number of the $^{l}l_k$ is denoted as |$^{l}l_k$|. Implementation process of the operation: implement $\bar{k}$. If $\bar{k}$≠l, implement $\bar{\bar{k}}$, otherwise end. The computation complexity of the operation $^{l}l_k$ is O(|$^{l}l_k$|).

[6] The operation $^{l}$l ≡ll represents getting all children of axis # l. This operation is canal to finding l in $\overline{A}$ and getting all address k of l, so as to obtain $A^{|k|}$. $\overline{A}$ does not have partial ordering structure, so the computation complexity of ll is O(|$\overline{A}$|).

[7] The operation $^{l}$L≡lL represents obtaining the closed subtree comprised of axis # l and its open subtree. $\underline{l}$L is the subtree not including l. Implement $^{l}$l in a recursive way. The computation complexity is less than O(|lL|·|$\overline{A}$|).

[8] The addition and deletion of branches, subtrees and non-tree arcs also constitute an essential part. The variable topology structure is described through the dynamic span-tree and the dynamic graph. In the AC $^{l}l_k$, if $^{l}l_k^{[n]}$=m, then $\vec{m}={}^{l}l_k^{[n+1]}$, $\vec{\vec{m}}={}^{l}l_k^{[n+2]}$. $\vec{m}$ represents getting the child of the member m in the AC.

NOTE: The computation complexity O( ) represents the times of computation and usually refers to the times of floating multiplication and addition. It is cumbersome to represent the computation complexity with the times of floating multiplication and addition, so the times of main operations are often used, such as the times of the operations of the configuration, velocity and acceleration of joints.

According to Eqs. (1.18), (1.19) and (1.21), it can be concluded that lr=$\overline{\text{lb}}$, c=$\overline{\text{lr}}$, c4=$\bar{\bar{c}}$; lb=$\overline{A}^{[lmw]}$, lr=$\overline{A}^{[lb]}$ and c=$\overline{A}^{[lr]}$. Therefore $\vec{c}$ =lr, $\vec{\vec{c}}$ =lb, $^{c}l_{lb}$=(c,lr,lb], |$^{c}l_{lb}$|=2.

According to Eq. (1.21), it can be concluded that the addresses of the members in $\overline{A}$ which are lb are 17 and 21. From A, the children of lb can be obtained, namely lrd and lmw. Through recursion, the child of lrd can be obtained, which is lru. Therefore lbL={lb,lmw,lrw}.

Topology Axiom of Axis-Chain

For the AC ${}^{i}l_{n}$=(i, . . . n], there are the following topology axioms of KC:

[1] ${}^{i}l_{n}$ has a half-openness attribute, i.e.

$$i \notin {}^{i}l_{n}, n \in {}^{i}l_{n}. \quad (1.22)$$

[2] Existence of ${}^{i}l_{n}$'s null chain/trival chain ${}^{i}k_{i}$, i.e.

$${}^{i}k_{i} \in {}^{i}l_{n}, |{}^{i}k_{i}|=0. \quad (1.23)$$

[3] The AC ${}^{i}l_{n}$ can be connected in series (additivity or integrability), i.e.

$${}^{i}l_{n}={}^{i}l_{i}+{}^{l}l_{n}, \quad (1.24)$$

$${}^{i}l_{n}={}^{i}l_{i}\cdot{}^{l}l_{n}. \quad (1.25)$$

[4] The AC ${}^{l}l_{n}$ is reversible, i.e.

$${}^{l}l_{n}=-{}^{n}l_{l}. \quad (1.26)$$

It can be inferred from Eq. (1.26) that the axis-chains ${}^{l}l_{n}$ and ${}^{n}l_{l}$ have reverse partial ordering (the order of the upper and the lower indices). The partial ordering of axis-chains is called chaining order (CO), and axis-chains have the invariance of CO. Therefore the foregoing symbol system is called the chain-ordering symbol system. According to Eqs. (1.24)-(1.26), the AC is invariant:

[1] The chaining order of AC is consistent. The chaining orders comprising the chain must be the same.

[2] The AC can be connected in series. The chain index complys with the chain index offset law: The adjacent chain index ${}_{l}+^{l}$ or ${}_{l}\cdot^{l}$ can offset each other.

The four topology axioms of AC above reflect that the invariance of chaining order is the basic laws of MAS kinematics and dynamics. Therefore, AC chain symbol calculus system is helpful in the kinematics and dynamics analysis of high-DOF MASs in the following ways:

[1] It lays the foundation of the concise and accurate expression of structural parameters and inerital parameters.

[2] Its topological structures of Tree-typed chain simplify the complexity of MAS equations.

[3] The invariance of chaining order guarantees the correctness of MAS equations.

Metric Space of Multi-Axis Systems

A robot with multi-degree of freedom (Multi-DOF) is a typical multi-axis system (MAS) which is denoted as D={T, A,B,K,E,NT} Wherein: T—a directed Span-tree; A—an axis-SEQS. F—a frame-SEQS, B—a body-SEQS, K—a joint pair type-SEQS, NT—a non-tree-SEQS. F is a Cartesian coordinate system.

An AC metric system comprised of the reference point, reference axes or Cartesian frame needs to be established to express the distance and angle of the system properties. The metric system not only determines the method to describe but also affects the calculation precision and calculation complexity. For example, by reference to the north of the terrestrial magnetism, the precision of the terrestrial magnetism direction needs to be considered, for the direction and magnitude of the terrestrial magnetism are significantly different at different time and location. In the vector space, a reference axis is the basic reference unit. The reference frame may be comprised of a set of independent reference axes. In respect to engineering, the reference frame needs to be selected by considering the method and precision of measurement and the common applications. Unlike the theoretical reference frame, the reference frame of precise mechanical engineering needs to have measurable optical speckle, otherwise it cannot be perceived or detected by optical instruments. This section at first builds a metric system of AC and then studies the spatial primitives and their relations, i.e. metric spaces.

Directed Full Span-Tree

Given a MAS, a directed Span-tree taking the axes as primitive can be obtained through eliminating the bodies and relations measured with distances and angles, and retaining the connection relations. The three facts of AC should be considered as well. Obviously, it is a typical process for analysis.

Every axis has its own 3D space of point which is called axis-space. Every axis-space has only one DOF. Therefore, the directed Span-tree based on axis-chain in nature represents a motion space comprised of a set of motion-axes. A composite joint pair is equivalent to a set of primitive pairs connected in series. These primitive pairs constitute an AC to describe composite joint pairs which represent the motion space of the composite joint pair. The number of DOF of this space is equal to the number of motion-axes of the composite joint pair.

For the purpose of kinematic and dynamic studies of MASs, bodies and relations measured with distances and angles need to be added into the directed Span-tree. Points, lines and bodies are primitives for a 3D axis-space.

A. Points of the Axis-Chain Directed Span-Tree

The center of inertia or the inertial center I of link # l is denoted as lI, indicating that the center of inertia I is the child of link # l. In general, an arbitrary point S on link # l is denoted as lS. The point lS is the child of link # l. The frame # l represents the 3D Cartesian space comprised of arbitrary point lS. Therefore any 3D point is is the primitive of the directed Span-tree.

B. Axes of the Axis-Chain Directed Span-Tree

Represent the Cartesian rotational axes r, y and z in axis # l respectively by lx, ly and lz to indicate that their parent is axis # l. Obviously, x, y, z are special symbols for multi-axis systems and cannot be used as others.

C. Bodies of the Axis-Chain Directed Span-Tree

Body-SEQS $B=[B^{[1]}|l \in A]$, wherein $B^{[l]} \triangleq \{(m_{l}^{[s]}, lS)|lS \in \Omega_{l}\}$; If $B^{[l]}=\emptyset$ then the mass of body # l is 0; wherein: lS—an arbitrary point, $\Omega_{l}$—the geometry of link # l.

For the composite joint pair ${}^{\bar{l}}k_{l}={}^{\bar{l}}k_{l1}, \ldots, {}^{ln}k_{l}]$, only axis # l is fixed with body # l. Its mass and rotational inertia are not 0. Other axes have no mass and inertia. Given $k \in (\bar{l}, l1, \ldots, ln, l]$, all are fixed with the geometric body $\Omega_{k}$. Obviously, $\Omega_{k} \subset \Omega_{l}$, i.e. $\Omega_{k}$ is the child space of $\Omega_{l}$.

D. Forces in the Axis-Chain Directed Span-Tree

The force and the torque are represented as fixed vectors ${}^{iS}\|_{lS}$ and ${}^{iS}\tau_{lS}$ respectively that any point iS in the environment i applies on the point lS on body # l. The point iS in the environment and lS on the body form loops through the force ${}^{iS}f_{lS}$ and torque ${}^{iS}\tau_{lS}$.

There does not exist inertial space which moves at a constant velocity or keeps absolutely stationary. The inertial space is a relative space, so it is of no significance in real operation. The axis-chain Span-tree determines the common root of the studied system according to its scope. This root is an inertial space. The tree root i represents the world, including the application point iS of the force ${}^{iS}f_{lS}$. The inertial space i is determined jointly by the MAS studied and the application point of the environment.

Orthogonal Projection of Vector and Tensor

Figure 11:
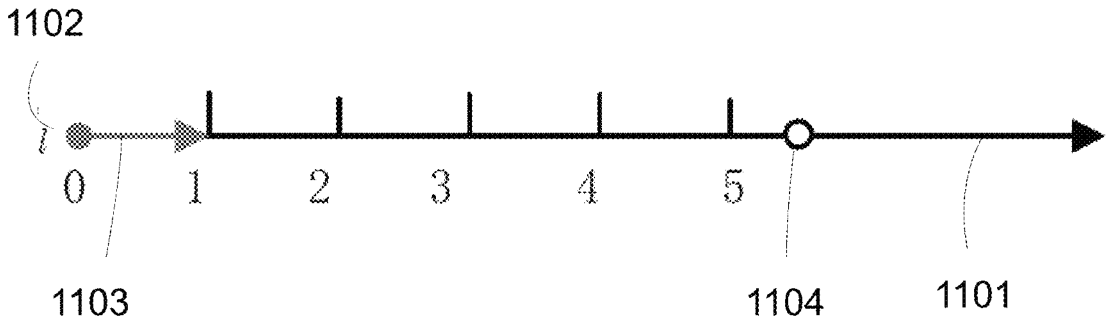
FIG. 11 is a diagram of axes and base vector.

The properties of a kinematic chain can only be measured by reference to certain coordinate axes. As shown in FIG. 11, axis # l 1101 is comprised of its origin $O_{l}$ 1102 and basis vector $e_{l}$ 1103. It is a direction line with scales. The scale of the point S 1104 on axis # l 1101 is its coordinate.

The basis vector $e_l$ 1103 represents an objective unit direction. Its component is represented by orthogonal basis $[e_l^{[x]}, e_l^{[y]}, e_l^{[z]}]$, which is composed of three independent ordered symbols, representing three independent DOFs.

The Cartesian rectangular reference frame (Cartesian frame) is composed of three coordinate axes, every two of which are perpendicular to each other. The distances and angles under Cartesian frames are invariable, i.e. Cartesian frames have the property of preserving angles and distances. It is the basis of the analysis of robot system. In line with people's cognitive habits at the same time. In mathematics, a basis vector represents a set of independent unit vectors in the space. In engineering, the metric units corresponding to the basis vectors need to be considered. The basis vector $e_l$ is objective. For example it stands for the instantaneous axis of rotation of a rigid body. The base frame is both objective and subjective. On the one hand, the base frame and the base vector are equivalent. On the other hand, the base frame is artificially constructed.

A Cartesian frame is a space including the calculations of scalar product (inner product) "·" and vector product "×". The prerequisite of the scalar product and the vector product calculations is that their arguments are vectors. The prerequisite of the scalar product and vector product calculations of two coordinate vectors is that their coordinate are under the same frames. The scalar product and vector product calculations of two coordinate vectors can be unified as the algebra multiplication "·".

Figure 12:
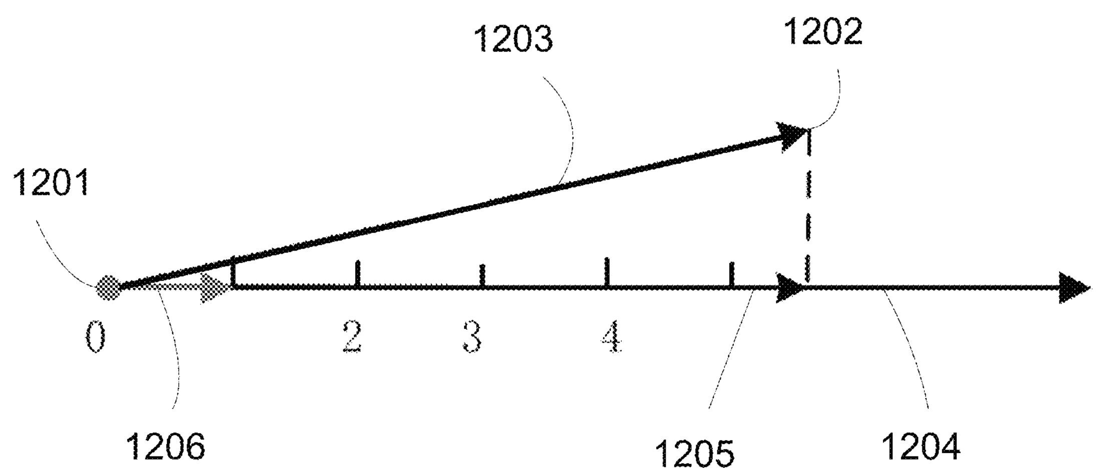
FIG. 12 is a projection vector diagram of vector.

As shown in FIG. 12, the projection vector ${}^l r_{lS}$ of the the position vector ${}^l\vec{r}_{lS}$ from origin $O_l$ 1201 to the point lS 1202 against the 1D axis # l 1204 or the basis vector $e_l$ 1206 is called the coordinate of the vector ${}^l\vec{r}_{lS}$ 1203 against axis # l. The projection vector (projection) of ${}^l\vec{r}_{lS}$ against the reference axis l is denoted as ${}^{l|l}\vec{r}_{lS}\cdot{}^l r_{lS}={}^{l|l}\vec{r}_{lS}$, wherein r is the translational 3D vector. Its elements determine the direction and magnitude of the vector. The projection vector relies on the unit coordinate axis or the unit base. The reference base is also called the projective base.

It is obvious that the orthogonal projection operation corresponds to scalar product in traditional algebra, i.e.

$$ {}^l r_{lS}^{[x]} = e_l^{[x]} \cdot {}^l\vec{r}_{lS}. \tag{1.27}$$

As shown by Eq. (1.27), a coordinate axis can be used as the reference for translation but cannot be used in whole as the reference for rotation. There are two ways to express rotation. One is to add another vector and express the rotation with the angle between the two vectors. Another is to add another zero-position vector in the radial direction of the coordinate axis and express the rotation with the rotational angle around the axis. A coordinate axis cannot be used in whole as the reference for rotation because it is in nature a 1D axis.

The symbol of Projection Operation is noted as |. Its priority is higher than that of the member access symbol [ ] or [ ]. The priority of the member access symbol { } is higher than that of the power operation ⋮. The projection operation | is used:

[1] To differentiate the property parameters of adjacent links from nonadjacent links. The kinematic quantities between adjacent links usually can be measured directly. The quantities between no adjacent links are hard to measure directly.

[2] To ensure that the chaining order of the ACs is correct in kinematic and dynamic equations, i.e. ensure the invariance of chaining order.

[3] To guarantee the conciseness of kinematic and dynamic equations so as to ensure that the important computational relations attract the most attention.

[4] To verify that projection operators have chain rules corresponding to the chain indices.

Figure 13:
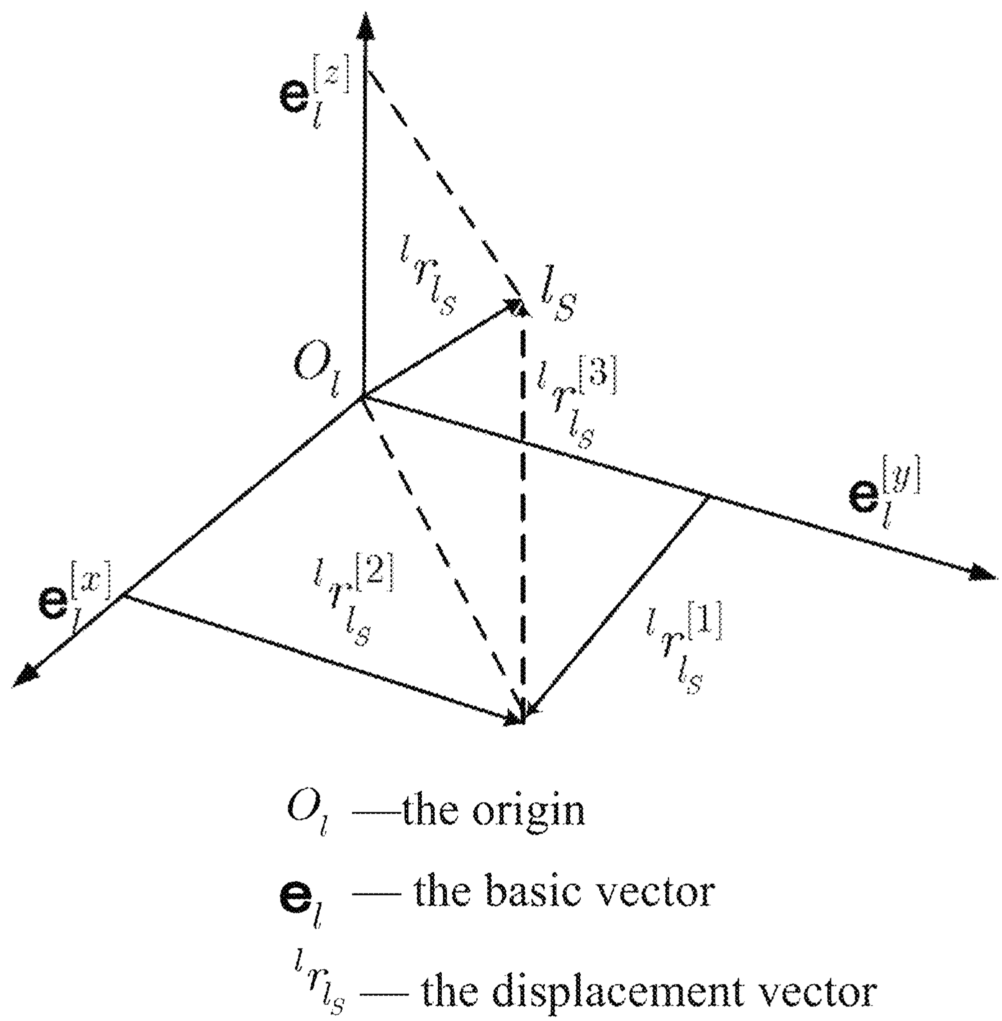
FIG. 13 is a projection vector diagram of vector in the cartesian coordinates system.

FIG. 13 is a projection vector schematic of vector in Cartesian coordinate system, including the origin $O_l$ 1301, orthogonal base vector $e_l$ 1302, and the position vector ${}^l\vec{r}_{lS}$ 1303. The projection vector of the position vector ${}^l\vec{r}_{lS}$ on the three coordinate axes of the Cartesian frame is ${}^{l|l}\vec{r}_{lS}$, and ${}^l r_{lS}={}^{l|l}\vec{r}_{lS}$. The index at the upper left of ${}^l r_{lS}$ indicates the reference frame. ${}^l r_{lS}$ not only indirectly indicate the displacement vector ${}^l\vec{r}_{lS}$, but also directly indicate the displacement coordinate vector. That is to say it has the duality of the basis vector and the coordinate vector. The orthogonal axes in Cartesian frame # l are denoted as $x_l$, $y_l$ and $z_l$.

The projection vector of the position vector ${}^l\vec{r}_{lS}$ in Frame # k is denoted as ${}^{k|l}\vec{r}_{lS}$ and ${}^{k|l}r_{lS}={}^{k|l}\vec{r}_{lS}$.

A vector, also called 1st-order tensor, is the algebraic product of a basis vector and a coordinate vector. The vector which is invariable is denoted as below:

$$ {}^l\vec{r}_{lS} = e_l \cdot {}^l r_{lS} = \begin{bmatrix} e_l^{[x]}, & e_l^{[y]}, & e_l^{[z]} \end{bmatrix} \cdot \begin{bmatrix} {}^l r_{lS}^{[1]} \\ {}^l r_{lS}^{[2]} \\ {}^l r_{lS}^{[3]} \end{bmatrix}. \tag{1.28}$$

$$ \backslash = e_l^{[x]} \cdot {}^l r_{lS}^{[1]} + e_l^{[y]} \cdot {}^l r_{lS}^{[2]} + e_l^{[z]} \cdot {}^l r_{lS}^{[3]} $$

The basis vector $e_l$ is always written in the form of column (RH/FW order). The coordinate vector ${}^l r_{lS}$ is in the form of row (LH/FW order). Like the front and the reverse sides of a coin, there is a duality relation between the basis vector $e_l$ and Coordinate Vector ${}^l r_{lS}$.

For orthogonal basis vector $[e_l^{[x]}, e_l^{[y]}, e_l^{[z]}]$ and spatial basis $e_l$, $$ \|e_l\| = 1. \tag{1.29}$$

Figure 14:
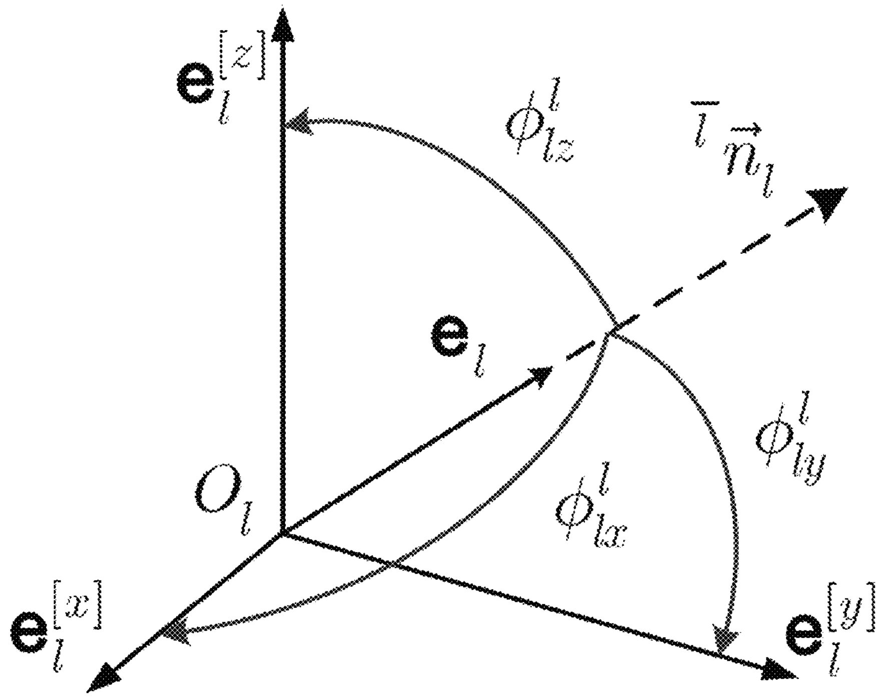
FIG. 14 is a relation diagram of base vector and pedestal.

PROOf: The base needs to be measured by reference to a unit vector. FIG. 14 is a diagram of the base vector and base frame, including the origin $O_l$ 1401, the orthogonal base vector $e_l$ 1402, the unit axis vector ${}^{\bar{l}}\vec{n}_l$ 1403, the first rotation angle $\phi_{lx}^l$ 1404, the second rotation angle $\phi_{ly}^l$ 1405, and the third rotation angle $\phi_{lz}^l$ 1406. As shown in FIG. 14, the angles between any unit base vector $e_l$ 1402 and the three basis components are respectively denoted as $\phi_{lx}^l$ 1404, $\phi_{ly}^l$ 1405, $\phi_{lz}^l$ 1406. Obviously, $$ C^2(\phi_{lx}^l)+C^2(\phi_{ly}^l)+C^2(\phi_{lz}^l)=1; $$

Wherein, C=cos. Therefore there are only two independent quantities in these three angles.

The basis vector $e_l$ is the unit base of 3D axis-space # l and is an independent symbol. It has 3 components, i.e. $e_l=[e_l^{[x]}, e_l^{[y]}, e_l^{[z]}]$. The relations between reference bases can be expressed via the orthogonal projection inner product. Thus, $e_l \cdot e_l^{[x]} = {}^{l|}e_l^{[x]}$, $e_l \cdot e_l^{[y]} = {}^{l|}e_l^{[y]}$, $e_l \cdot e_l^{[z]} = {}^{l|}e_l^{[z]}$. So, $$ \|e_l\| = e_l \cdot e_l^T = \left\|e_l \cdot \left[e_l^{[x]}, e_l^{[y]}, e_l^{[z]}\right]\right\| = \left\|\left[C(\phi_{lx}^l), C(\phi_{ly}^l), C(\phi_{lz}^l)\right]\right\| = \sqrt{C^2(\phi_{lx}^l) + C^2(\phi_{ly}^l) + C^2(\phi_{lz}^l)} = 1 \tag{1.30}$$

Q.E.D.

As shown by the reasoning process above, the basis vector $e_l$ is an arbitrary unit vector fixed with frame # l. The rotational basis vector $e_l$ is equivalent to rotation of tame # l. The metric of the base relies on coordinates. Replace $e_l$ with the unit axis-vector $^{\bar{l}}\vec{n}_l$. Then the rotation of frame # l is equivalent to the rotation $^{\bar{l}}\vec{n}_l$. For the 3D space axis-vector of axis # l is denoted as $^{\bar{l}}n_l$, the three ordered unit axes fixed with axis # l are respectively denoted as lx, ly and lz, indicating that the three coordinate axes belong to axis # l. The basis vector $e_l$ is equivalent to the ordered basis component $\lfloor e_l^{[x]}, e_l^{[y]}, e_l^{[z]}\rfloor$. The coordinate axis-vector $^{\bar{l}}n_l$ is equivalent to the three ordered coordinate axes [lx,ly,lz] fixed on it.

The coordinate vector $^l r_{lS}{}^T$–$[^l r_{lS}{}^{[1]}, {}^l r_{lS}{}^{[2]}, {}^l r_{lS}{}^{[3]}]$ is a fixed vector. It has axed start point and end point, and it also indicates its reference base. Because A↔F, given l∈A, for the translational coordinate vector $^l r_{lS}$, the l at the upper left represents the origin $O_l$ of frame # l The coordinate array of the 3D 2nd-order tensor $^k\vec{\vec{J}}_{lS}$ under the system k is denoted as $^kJ_{lS}$, $$^kJ_{lS} = \begin{vmatrix} ^kJ_{lS}^{[1][1]} & ^kJ_{lS}^{[1][2]} & ^kJ_{lS}^{[1][3]} \\ ^kJ_{lS}^{[2][1]} & ^kJ_{lS}^{[2][2]} & ^kJ_{lS}^{[2][3]} \\ ^kJ_{lS}^{[3][1]} & ^kJ_{lS}^{[3][2]} & ^kJ_{lS}^{[3][3]} \end{vmatrix}.$$

Figure 15:
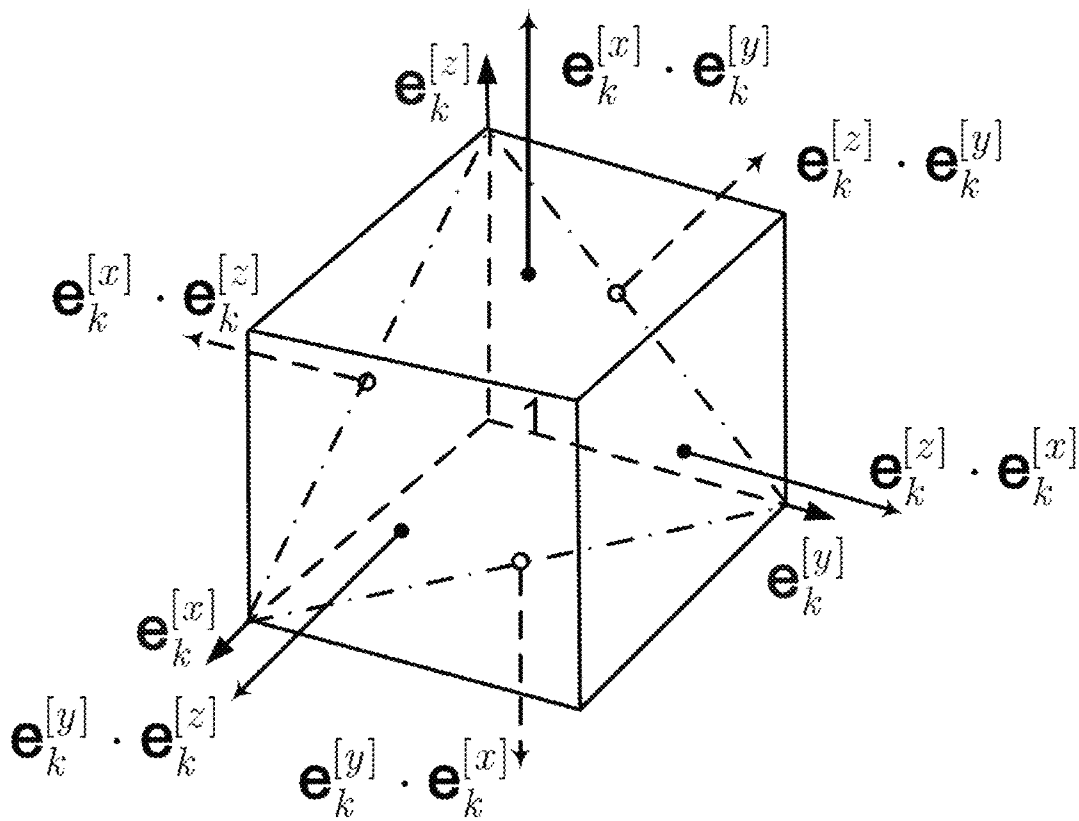
FIG. 15 is a basic components diagram of three-dimensional second-order tensors.

The k at the upper left of $^kJ_{lS}$ indicates the reference frame, meaning that $^kJ_{lS}$ is a coordinate array under Frame # k. The direction of $^kJ_{lS}$ is from the origin $O_k$ of frame # k to the point S in frame # l. The $^kJ_{lS}$ takes two same arrays $e_k \cdot e_k{}^T$ of the base vector $e_k$ as reference. FIG. 15 includes 9 2nd-order basis components obtained from the Cartesian product of two ordered pairs base vectors. The upper case J represents the 3×3 coordinate array corresponding to the base components. The invariable 2nd-order tensor $^k\vec{\vec{J}}_{lS}$ is denoted as below:

$$^k\vec{\vec{J}}_{lS} = e_k \cdot {}^kJ_{lS} \cdot e_k^T = \sum_{r=1}^{3}\left(\sum_{c=1}^{3}\left(e_k^{[r]} \cdot {}^kJ_{lS}^{[r][c]} \cdot e_k^{[c]}\right)\right). \quad (1.31)$$

The sum of the products of the basis components of the 2nd-order tensor and their corresponding coordinates are invariable. The 6 non-diagonal elements in the coordinate array of the 2nd-order tensor, i.e. coordinate matrix $^kJ_{lS}$ represent the six corresponding coordinates in the normal direction and the 3 diagonal elements represent the three corresponding coordinates in the axial direction. In mechanics, the inertial tensor, strain and stress tensor are 2nd-order tensors.

Internal relations exist between property parameters observed in different reference frames. The invariance of property parameters needs to be ensured. The coordinates and corresponding bases serve as reference to each other. The algebraic product of bases and corresponding coordinates maintain unchanged. Otherwise conflicts exist between different metrics and the objectivity of property parameters cannot be ensured. The invariance of the vector $^l\vec{r}_l$ and the 2nd-order tensor $^k\vec{\vec{J}}_{lS}$ is as below:

$$^l\vec{r}_{lS} = e_l \cdot {}^l r_{lS} = e_k \cdot {}^{k|l} r_{lS}, \quad (1.32)$$

$$^l\vec{\vec{J}}_{lS} = e_l \cdot {}^lJ_{lS} \cdot e_l{}^T = e_k \cdot {}^{k|l}J_{lS} \cdot e_k{}^T. \quad (1.33)$$

Obviously, the reference base $e_l$ is not a primitive of AC topology without metric space. Instead, it is a reference for the AC metric. The indices at the upper left and the lower right of the vector $^{\bar{l}}\vec{r}_l$ and the 2nd-order tensor $^k\vec{\vec{J}}_{lS}$ at first indicate the topological relations, i.e. the connection relations. The indices at the upper left also indicate the reference frame.

Chain-Ordering Symbol System

The axis-chain (AC) features the invariants of chaining order and of tensor. The property parameters of the AC reflect their respective chaining order relations through chain indices. The main property in ACs is denoted as p or P.

[1] The vector is denoted as $^{\bar{l}}\vec{p}_l$ in geometric form. The invariance of vector (1st-order tensor) is satisfied, $$^l\vec{p}_l = e_{\bar{l}} \cdot {}^{\bar{l}}p_l = e_k \cdot {}^{k|\bar{l}}p_l. \quad (1.34)$$

The $^lp_l$ and $^{k|\bar{l}}p_l$ are 3×1 coordinate vectors in algebraic form. $^{\bar{l}}p_l$ is the expression of $^{\bar{l}}\vec{p}_l$ under frame # l. $^{k|\bar{l}}p_l$ is the expression of $^{\bar{l}}\vec{p}_l$ under frame # k. As shown by Eq. (1.34), the 1st-order polynomial of the coordinate vector and its basis vector maintain invariant, meaning that the vectors are invariable. The 3D vector is a linear combination of three components. A point in the 3D space is represented by a 3D vector.

[2] The 2nd-order tensor is denoted as $^{\bar{l}}\vec{\vec{P}}_l$ in geometric form. The invariance of the 2nd-order tensor is satisfied, $$^{\bar{l}}\vec{\vec{P}}_l = e_l \cdot {}^{\bar{l}}P_l \cdot e_l{}^T = e_k \cdot {}^{k|l}P_l \cdot e_k{}^T. \quad (1.35)$$

The $^lP_l$ and $^{k|\bar{l}}P_l$ are 3×3 coordinate arrays in algebraic form. The $^{\bar{l}}P_l$ is the expression of $^{\bar{l}}\vec{\vec{P}}_l$ under frame # $\bar{l}$. The $^{k|\bar{l}}P_l$ is the expression of $^l\vec{\vec{P}}_l$ under frame # k. Eq. (1.35) indicates that the 2nd-order polynomial of the 2nd-order coordinate tensor and the base maintains invariant, meaning that the 2nd-order tensor is inviable. 2nd-order tensor is a linear combination of nine 2nd-order components. Tensor indicates the objectivity and is the basis for the establishment of the algebra system. The basic formulas of the algebra system usually need to be demonstrated with the invariance of tensors.

The coupling of two points in a 3D space is represented by 3D 2nd-order tensors. Equivalently $$^{\bar{l}}P_l \triangleq {}^{\bar{l}}p_l \cdot {}^{\bar{l}}p_l^T = \begin{bmatrix} ^{\bar{l}}p_l^{[1]} \\ ^{\bar{l}}p_l^{[2]} \\ ^{\bar{l}}p_l^{[3]} \end{bmatrix} \cdot \left[\, ^{\bar{l}}p_l^{[1]} \;\; ^{\bar{l}}p_l^{[2]} \;\; ^{\bar{l}}p_l^{[3]} \,\right]. \quad (1.36)$$

The dyad in Eq. (1.36) composed of two coordinate vectors is referred to as a 2nd-order coordinate tensor.

[3] The property scalar p of $^{\bar{l}}1_l$ is denoted as $p_l^{\bar{l}}$.

[4] If the property p or P is relative to position, $^{\bar{l}}{}_l$ should be deemed as from the origin $O_{\bar{l}}$ of frame # $\bar{l}$ to the origin $O_l$ of frame # l. If the property p or P is relative to direction, $^{\bar{l}}{}_l$ should be deemed as from frame # $\bar{l}$ to # l.

[5] The $p_l^{\bar{l}}$, $^{\bar{l}}p_l$ and $^{\bar{l}}P_l$ should be respectively deemed as functions of time t, namely $_tp_l^{\bar{l}}$, $_t^{\bar{l}}p_l$ and $_t^{\bar{l}}P_l$. $_0p_l^{\bar{l}}$, $_0^{\bar{l}}p_l$ and $_0^{\bar{l}}P_l$ are constants or constant arrays at time zero. The $p_l^{\bar{l}}$, ${}^{\bar{l}}p_l$ and ${}^{\bar{l}}P_l$ in canonical form should be deemed as constants or constant arrays.

[6] The | is referred to as projection operation which is the projection vector or 2nd-order tensor against its reference basis. It also represents the coordinate vector or coordinate array.

Given the AC ${}^{k}l_{lS}$=(k, . . . , l, lS]. It is agreed as below according to the specifications above:

[1] lS—the point S in link # l.

[2] ${}^{k}\vec{r}_l$—translational vector from origin $O_k$ to origin $O_l$. ${}^{k}r_l$—coordinate vector of ${}^{k}\vec{r}_l$ under Frame # k.

[3] ${}^{k}\vec{r}_{lS}$—translational vector from origin $O_k$ to point lS. ${}^{k}r_{lS}$—coordinate vector of ${}^{k}\vec{r}_{lS}$ under Frame # k.

[4] ${}^{k}\vec{r}_S$—translational vector from origin $O_k$ to point S. ${}^{k}r_S$—coordinate vector of ${}^{k}\vec{r}_S$ under Frame # k.

[5] ${}^{\bar{l}}\vec{n}_l$—axis-vector of joint pair ${}^{\bar{l}}k_l$. ${}^{\bar{l}}n_l$ and ${}^{l}n_{\bar{l}}$—coordinate vectors of axis-vector ${}^{\bar{l}}\vec{n}_l$ under frame # $\bar{l}$ and frame # l respectively.

[6] $r_l^{\bar{l}}$—linear position along axis-vector ${}^{\bar{l}}n_l$. $\phi_l^{\bar{l}}$ angular position around axis-vector ${}^{\bar{l}}\vec{n}_l$.

[7] ${}_0r_l^{\bar{l}}$—mechanical zero-position of translational Axis-Vector ${}^{\bar{l}}\vec{n}_l$. ${}_0\phi_l^{\bar{l}}$-mechanical zero-position of rotational axis-vector ${}^{\bar{l}}\vec{n}_l$.

[8] 0—3D zero matrix. 1—3D unit matrix.

[9] Transposition $[\ ]^T$ represents transposing the set rather than its members. For example, $$\left[{}^{\bar{l}}r_l, 1\right]^T = \begin{bmatrix} {}^{\bar{l}}r_l \\ 1 \end{bmatrix}.$$

[10] ${}_0^{\bar{l}}r_l$—coordinate vector of ${}^{k}\vec{r}_l$ at time zero, and ${}_0^{\bar{l}}r_l \equiv {}^{\bar{l}}l_l$.

The specifications and agreements above are defined according to the following principles: (a) Any AC is partially ordered; and (b) Links are the basic units of AC. They reflect the essential features of ACs. The indices above are also called chain indices which represent connection relations. (c) The index at the upper right indicates its corresponding reference frame. It is convenient for the computer to deal with and it is also the basis for auto-model by the computer. The indices need to be understood according to its main property symbol, to chain ordering from its upscript to subscript, and to the reference frame of the upscript. For example, if the property symbol is of the translational type, the index at the upper left indicates the origin and direction of the reference frame. If it is of the rotational type, the index at the upper left indicates the direction the reference frame. (d) No more need to distinguish tensor from coordinate tensor.

Natural Frame and Axis-Invariants

In the robotic engineering, the Cartesian frame is defined at first. Next the relations between reference frames are determined via engineering measurement. At last the robot kinematic and dynamic analyses are conducted by reference to the reference frame. The relations between links need to be measured via the reference frames fixed with them. The orthogonal relations between any two coordinate axes in the Cartesian frame are very strong constraints and only exist in theory. The Cartesian frame has never been challenged in the past.

Fix a Cartesian frame with a link and mark its origin and the direction of coordinate axes. The mutual relations between the reference frames can be measured via optical equipments (e.g. laser tracker) only with speckles (e.g. Tracker ball). The set of optical speckles of certain size is hard to meet the accuracy requirement to ensure any two coordinate axes in Cartesian frames are perpendicular to each other, resulting excessive measurement errors. In robotic engineering, a small angle (e.g. 10 are seconds) will magnify the position errors to an unacceptable degree through links. In addition, the fixation between a Cartesian frame and its link is limited by the geometric space of the link and as a result the measurement cannot be performed inside and outside the link. Therefore, the Cartesian frame is expected to be defined and applied indirectly. At first, measure the spatial positions of a set of measuring points having minimum optical spots without the constraint that any two of the axes need to perpendicular to each other. Next, define the Cartesian frame through calculation according to certain rules. By optical equipment, the precision of the measuring points is easy to meet the required engineering precision and the errors resulted from calculation are ignorable. Therefore, the precision of the Cartesian frame is ensured. In this process, reference frames is defined after the measurement, which is opposite to the traditional process.

DEFINITION 1. Natural axis: A unit reference axis with an origin which is coaxial with some motion-axle is called natural coordinate axis or natural axis.

Given the MAS D={T,A,B,K,F,NT}. At the zero-position, as long as the world frame or inertial frame is established and all origins fixed with natural axes are defined, other natural frames are certainly defined. Naturally, only the orientation of the world frame needs to be established.

DEFINITION 2. Invariant: The parameters independent on a set of reference frames are called invariants.

Figure 16:
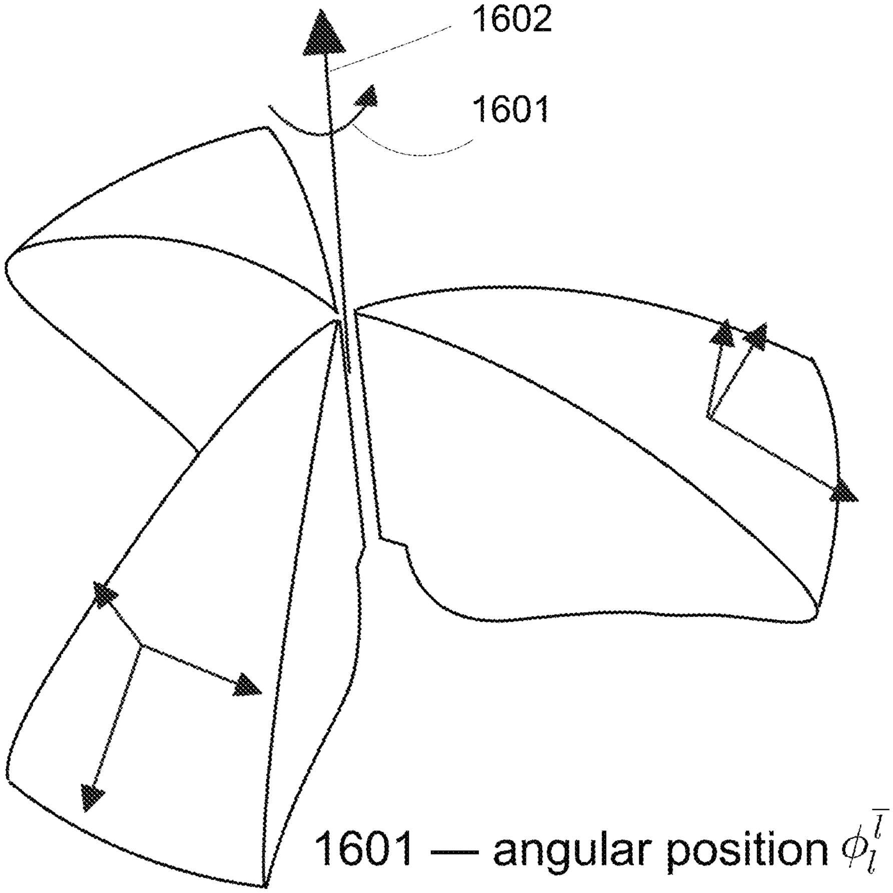
FIG. 16 is a diagram of natural coordinate system and Axis-Invariants.

According to the definition 1, when the MAS D is at natural zero-position, the orientations of natural frames are the same. As shown in FIG. 16, when the system is at zero-position, i.e. $\phi_1^{\bar{l}}=0$, the orientations of frame # $\bar{l}$ to # l are aligned. The angular position $\phi_l^{\bar{l}}$ around axis-vector ${}^{\bar{l}}\vec{n}_l$ corresponds to Frame # l. The coordinate vector ${}^{\bar{l}}n_l$ of ${}^{\bar{l}}{}_l$ observed in frame # $\bar{l}$ is always equal to the coordinate vector ${}^{l}n_{\bar{l}}$ of ${}^{\bar{l}}\vec{n}_l$ under frame # l. Therefore $$ {}^{\bar{l}}n_l = {}^{l}n_{\bar{l}} = {}^{\bar{l}}\psi^{l} n_{\bar{l}}. \tag{1.37}$$

According to Eq. (1.37), ${}^{\bar{l}}n_l$ or ${}^{l}n_{\bar{l}}$ is independent of the adjacent frames # $\bar{l}$ and # l. Therefore ${}^{\bar{l}}n_l$ or ${}^{l}n_{\bar{l}}$ is axis-invariant and is called coordinate axis-vector or axis-vector when the invariance is of no significant. The ${}^{\bar{l}}n_l$ or ${}^{l}n_{\bar{l}}$ represents the common unit reference vector of link # $\bar{l}$ and link # l and is independent of $O_{\bar{l}}$ and $O_l$.

Axis-invariants are essentially different from coordinate axes in the following ways:

[1] A coordinate axis is a reference direction with zero-position and unit scales. It can describe the translational positions along the direction but cannot wholly describe the rotation around the direction. A coordinate axis has no radial reference direction. That is to say it has no zero-position to represent rotation. A radial reference needs to be added in actual application. For example, in the frame # l, the rotation around lx often needs to be measured with ly or lz as the reference zero-position. A coordinate axis is ID, three coordinate axes, any two of which are orthogonal, constitute a Cartesian frame.

[2] An axis-invariant is a spatial reference axis. A natural-axis and its radial axis can determine its Cartesian frame, and a natural-axis stands for a natural frame.

In some references, the axis-vector without chain indices is denoted as ê which is called Euler axis. The corresponding joint angle is called the Euler angle. It is called the axis-invariant instead of Euler axis because it has the following properties.

[1] Given a rotation matrix ${}^{\bar{l}}Q_l$. It is a real matrix and its norm is unital, so it has and one real eigenvalue $\lambda_1$, two conjugated complex eigenvalues $\lambda_2=e^{i\phi}$, $\lambda_3=e^{-i\phi}$ (i—a pure imaginary number). Obviously, $|\lambda_1|\cdot\|\lambda_2\|\cdot\|\lambda_3\|=1$, so $\lambda_1=1$. The axis-vector ${}^{\bar{l}}n_l$ is the eigenvector corresponding to the real eigenvalue $\lambda_1=1$ and is an invariant.

[2] It is a 3D reference axis, having not only axial direction for translational zero-position, but also radial reference direction for rotational zero-position.

[3] Eq. (1.37) shows that, in a natural frame, ${}^{\bar{l}}n_l={}^{l}n_{\bar{l}}$, indicating that the axis-invariant ${}^{\bar{l}}n_l$ is a special vector and has superior operation performance. It will be analyzed and put into application in following sections.

[4] The rotation matrix ${}^{\bar{l}}Q_l$ can be described directly with axis-vector ${}^{\bar{l}}n_l$ and joint angle $\phi_l^{\bar{l}}$ without the need to establish the frame of a non-root link, which significantly reduces the workload associated with modeling. Meanwhile, the measurement accuracy can be improved by measuring the structural parameter ${}^{\bar{l}}n_l$ under the root frame in natural frame system.

[5] In following sections, based on the excellent operation of axis-vector ${}^{l}n_l$, the uniform MAS kinematic and dynamic equations will be established, with the full parameterization of the topological and metric properties in MASs.

The basis vector $e_l$ is fixed with Frame # l, the basis vector $e_{\bar{l}}$ is fixed with frame # $\bar{l}$, and ${}^{\bar{l}}n_l$ is the common unit vector of frame # l and # $\bar{l}$. Thus, ${}^{\bar{l}}n_l$ is the common basis vector of frame # l and # $\bar{l}$. Therefore, the axis-invariant ${}^{\bar{l}}n_l$ can be used for the common reference base of frame # l and # $\bar{l}$. The axis-invariants are the parameterized reference base and primitive of metric space.

When the system D is at the zero-position, the axis-vector ${}^{\bar{l}}n_l$ can be measured under the uniform reference frame. When joint pair ${}^{\bar{l}}k_l$ is moving, the axis-vector ${}^{\bar{l}}k_l$ is invariant. The axis-vector ${}^{\bar{l}}n_l$ and the joint angle $\phi_l^{\bar{l}}$ can determine the rotation relation of joint pair ${}^{\bar{l}}k_l$, i.e. the spatial relation of axes # $\bar{l}$ and l.

Therefore, where natural frame is used, if the system n is at zero-position, only one common reference frame needs to be defined rather than define a reference frame for each link in the system. This is because each natural frame can be determined with its axis-vectors and joint variables respectively. Any natural frame fixed with its link only exists in concept, and never be used for engineering measurement. The natural frame is useful for the MAS theoretical analysis and engineering in following ways:

[1] The structural parameters need to be measured against a uniform reference frame. Otherwise the engineering measurement will be cumbersome and the use of different reference frames will result in huge measurement errors.

[2] As soon as all natural frames in the system are defined, all structural parameters and joint variables are determined naturally. It is helpful for the kinematics and dynamic analysis of MAS.

[3] In engineering, laser trackers and other measuring equipments may be used for accurate measurement of fixed axis-invariants to be discussed later. Directly measuring coordinate axes or origins causes excessive errors.

[4] The joint pair R and p, helical joint H and contact joint C are instances of cylindrical joint C (a joint pair family), so only cylindrical joints can be used to simplify the kinematic and dynamic analysis of the MAS D.

[5] The axis-invariants have superior operation performances in theoretical analysis. For example, the axis-invariant ${}^{\bar{l}}n_1$ and the inter-axle force ${}^{l}f_l$ are orthogonal, so the axis-invariant ${}^{\bar{l}}n_l$ is the decoupled natural orthogonal complement of the inter-axle force ${}^{l}f_l$. Iterative kinematic and dynamic equations based on axis-invariants can be established to ensure accurate and concise modeling and real-time computation.

The advantages of natural frame system include (a) the system is easy to define; (b) when the system is at zero-position, any natural coordinate is zero; (c) the attitudes of frames when it is at zero-position is consistent; and (d) the accumulative measuring errors are not likely to occur.

DEFINITION 3. Rotation vector: The rotation vector ${}^{\bar{l}}\phi_l$ rotating an angular position of $\phi_l^{\bar{l}}$ around the coordinate axis-vector ${}^{\bar{l}}n_l$ is as below:

$$ {}^{\bar{l}}\phi_l \triangleq {}^{\bar{l}}n_l \cdot \phi_l^{\bar{l}} \text{ if } {}^{\bar{l}}k_l \in R. \tag{1.38} $$

DEFINITION 4. Translation vector: The translation vector ${}^{\bar{l}}r_l$ translating a linear position of $r_l^{\bar{l}}$ along the coordinate axis-vector ${}^{\bar{l}}n_l$ is as below:

$$ {}^{\bar{l}}r_l \triangleq {}^{\bar{l}}n_l \cdot r_l^{\bar{l}} \text{ if } {}^{\bar{l}}k_l \in P. \tag{1.39} $$

DEFINITION 5. Nature frame system: Referring to a space with the nature frame, the position of the joint is expressed as $q_l$, which is also called a nature axis-space. Where:

$$ q_l \triangleq q_l^{\bar{l}} = \begin{cases} \phi_l^{\bar{l}} \triangleq \phi_l & \text{if } {}^{\bar{l}}k_l \in R \\ r_l^{\bar{l}} \triangleq r_l & \text{if } {}^{\bar{l}}k_l \in P \end{cases} \circ \tag{1.40} $$

DEFINITION 6 Mechanical zero: At the initial time t0, the zero position ${}_0q_l^{\triangle}$ of absolute encoder of the joint pair ${}^{\bar{l}}k_l$ is not zero. This position is called mechanical zero. Where:

$$ {}_0q_l^{\triangle} = \begin{cases} {}_0\phi_l^{\triangle} & \text{if } {}^{\bar{l}}k_l \in R \\ {}_0r_l^{\triangle} & \text{if } {}^{\bar{l}}k_l \in P_\circ \end{cases} \tag{1.41} $$

the control variable $q_l^{\triangle}$ of the joint pair ${}^{\bar{l}}k_l$ is $$ q_l^{\triangle} - {}_0q_l^{\triangle} = q_l^{\bar{l}}. \tag{1.42} $$

DEFINITION 7. Motion vector: The motion vector ${}^{\bar{l}}q_l$ translating or rotating $q_l$ relative to axis-vector ${}^{\bar{l}}n_l$ is as follows:

$$ {}^{\bar{l}}q_l \triangleq {}^{\bar{l}}n_l \cdot q_l^{\bar{l}}. \tag{1.43} $$

The motion vector implements the uniform expression of translation or rotation. The vectors described with axis-vector and joint variable is also called free 3D motion screw, such as ${}^{\bar{l}}n_l \cdot \tan(\phi_l^{\bar{l}})$. ${}^{\bar{l}}n_l \cdot \tan(\phi_l^{\bar{l}}/2)$. Evidently, the axis-vector ${}^{\bar{l}}n_l$ is a specifical motion screw.

DEFINITION 8. Joint space: The space represented by joint variable $q_l$ is called joint space.

DEFINITION 9. Configuration: A configuration is a complete specification of the position and orientation of a link with respect to the root frame in the MAS D. Any link has a dual 3D vector space or 6D space.

DEFINITION 10. Natural joint space: It refers to a space with the natural frame for reference which is expressed with the joint variable $q_l^{\bar l}$ and ${}_0q_l^{\bar l}=0$ is always correct at the zero-position. It is a natural joint variable space.

Figure 17:
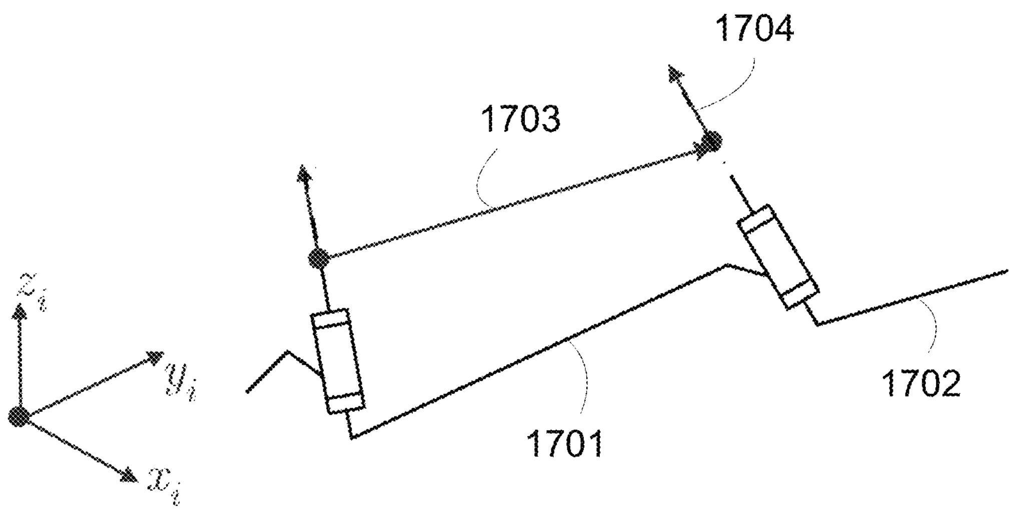
FIG. 17 is a diagram of fixed Axis-Invariants.

As shown in FIG. 17, the axis-vector ${}^{\bar l}n_{\bar l}$ with the fixed origin $O_{\bar l}$ constrained by the position vector ${}^{\bar l}l_l$ is a fixed axis-vector, denoted as ${}^{\bar l}I_l$; wherein $$ {}^{\bar l}I_l = \left[{}^{\bar l}n_l, {}^{\bar l}l_l\right]^T. \tag{1.44}$$

The axis-vector ${}^{\bar l}n_l$ is the natural axis of link # l. As the ${}^{\bar l}n_l$ and ${}^{\bar l}l_l$ are axis-invariants, the ${}^{\bar l}I_l$ representing the structural parameters of link # l is called a fixed axis-invariant, which is independent on body # l. A fixed invariant is the unit axis of natural screw (rotation and translation) and is called screw-axis.

DEFINITION 11. Natural axis-space: The space represented by natural coordinates with respect to a natural axis is also called a natural axis-space. It is a 3D point space.

As seen in FIG. 17, ${}^{\bar l}I_l$ determines the five structural parameters of axis # l relative to axis # $\bar l$, and it can fully express the 6D configuration of link l together with joint variable $q_l^{\bar l}$. If Joint variable SEQS $[q_l^{\bar l}|l\in A]$ is given, corresponding frames can be exclusively determined with the structural parameters $[{}^{\bar l}I_l|l\in A]$ and the joint variable SEQS $[q_l^{\bar l}|l\in A]$. The axis-invariant ${}^{\bar l}n_l$, fixed axis-invariant ${}^{\bar l}I_l$ and linear position $r_l^{\bar l}$ and angular position $\phi_l^{\bar l}$ are called natural invariants. Apparently, there is a one-to-one mapping between the natural screw $[{}^{\bar l}I_l, q_l^{\bar l}]$ and the 3D spatial configuration ${}^{\bar l}R_l$ determined by frames # $\bar l$ to # l, i.e.

$$\left[{}^{\bar l}I_l, q_l^{\bar l}\right] \longleftrightarrow {}^{\bar l}R_l. \tag{1.45}$$

Eq. (1.45) shows the natural screw $[{}^{\bar l}I_l, q_l^{\bar l}]$ is equivalent to the 3D spatial configuration ${}^{\bar l}R_l$.

Apparently, the fixed axis-invariant ${}^{\bar l}I_l$ is the natural axis of the motion-axis l. It is different from the coordinate axes of Cartesian frame which has three coordinate axes, any two of which are orthogonal, while the natural coordinate-axis has only one axis. It is obvious that three independent natural coordinate axes can define any 3D reference frame as well as a Cartesian frame. On a free body, three independent natural axis-vectors can be defined to form the translational reference frame of the body and another three independent natural axis-vectors can be defined to form rotational reference frame of the body. In short, six independent natural axis-vectors can be defined on a free body to form the translational and the rotational reference frame of the body. In conclusion, natural frames based on the natural axis are more flexible than Cartesian frames.

[1] If ${}^{\bar l}k_l\in C$, then $$\begin{cases} {}^{\bar l}\phi_l = {}^{\bar l}n_l \cdot \phi_l^{\bar l} & \text{if } {}^{\bar l}k_l \in C \\ {}^{\bar l}r_l = {}^{\bar l}l_l + {}^{\bar l}n_l \cdot r_l^{\bar l} & \text{if } {}^{\bar l}k_l \in C \end{cases}. \tag{1.46}$$

The translation and rotation in the same axis direction is called screw motion. Integrate the 3D rotation vector ${}^{\bar l}\phi_l$ and the 3D translation vector ${}^{\bar l}r_l$ into a 6D vector form which is $[{}^{\bar l}\phi_l, {}^{\bar l}r_l] \triangleq {}^{\bar l}\gamma_l^T$, and name such vector as 6D motion screw, it has one translational DOF and one rotational DOF. The ${}^{\bar l}I_l$ is called fixed screw-axis or screw-axis accordingly. It is the particular case of screw-axis $[{}^{\bar l}n_{\bar l}, {}^{\bar l}r_l]$, that different from the 6D position screw (6D screw) ${}^{\bar l}\gamma_l$, at the same time ${}^{\bar l}\dot\gamma_l$ and ${}^{\bar l}\ddot\gamma_l$ are also called velocity screw and accelerate screw respectively. $[{}^{\bar l}\phi_l, {}^{\bar l}r_l]$ and $[0_3, {}^{\bar l}r_l]$ are called 3D screw, they represent 3D translation and rotation respectively. The 3D screw-axis has 5 independent parameters including 3P translation and 2R rotation.

[2] If ${}^{\bar l}k_l\in H$, $p_l$ represents the screw step, then $$\begin{cases} {}^{\bar l}\phi_l = {}^{\bar l}n_l \cdot \phi_l^{\bar l} & \text{if } {}^{\bar l}k_l \in H \\ {}^{\bar l}r_l = {}^{\bar l}l_l + p_l \cdot {}^{\bar l}n_l \cdot \phi_l^{\bar l} & \text{if } {}^{\bar l}k_l \in H \end{cases}. \tag{1.47}$$

Eq. (1.46) is equivalent to Eq. (1.47) and $$r_l^{\bar l}=p_l\cdot\phi_l^{\bar l}. \tag{1.48}$$

[3] If ${}^{\bar l}k_l\in R$, then $$\begin{cases} {}^{\bar l}\phi_l = {}^{\bar l}n_l \cdot \phi_l^{\bar l} & \text{if } {}^{\bar l}k_l \in R \\ {}^{\bar l}r_l = {}^{\bar l}l_l & \text{if } {}^{\bar l}k_l \in R \end{cases}. \tag{1.49}$$

$[{}^{\bar l}\phi_l, {}^{\bar l}l_l]$ with only one rotational motion-axis is called the rotation vector. It is a special case of the 6D screw $[{}^{\bar l}\phi_l, {}^{\bar l}r_l]$.

[4] If ${}^{\bar l}k_l\in P$, then $$\begin{cases} {}^{\bar l}\phi_l = 0_3 & \text{if } {}^{\bar l}k_l \in P \\ {}^{\bar l}r_l = {}^{\bar l}l_l + {}^{\bar l}n_l \cdot r_l^{\bar l} & \text{if } {}^{\bar l}k_l \in P \end{cases}. \tag{1.50}$$

Apparently, $[0_3, {}^{\bar l}r_l]$ containing only one translational motion-axis is called the translation vector. It is a special case of the 6D screw $[{}^{\bar l}\phi_l, {}^{\bar l}r_l]$.

Joint variables are also called natural coordinates, which together with joint velocities and accelerations and are collectively referred to as natural kinematic quantities. A natural axis-space is a natural axis-chain composed of a set of independent natural axis-vectors and is called the natural axis-chain system (NAS) for short. Eq. (1.30) shows that the axis-invariant fixed with an axis-space is equivalent to the unit basis vector of the space. The translation/rotation of a fixed axis-Invariant is equivalent to the translation/rotation of the natural frame fixed with it. The translation/rotation of a fixed axis-invariant constitutes a screw motion. The motion SEQS of natural axis-chains and the actual KCs are isomorphic. An AC is a spatial relation chain composed of a set of ordered axis-invariants.

In Eqs. (1.46)-(1.50), if represents the "or" relationship, so as to ensure that the number of the subsequent MAS kinematic and dynamic equations correspond to the number of DOF. In algorithms, Eqs. (1.46)-(1.50) divide the space of axial motions naturally/in a natural way which is essentially different from the classical kinematic screw. The natural frame, natural invariants and natural screw constitute the metric system of AC. It constitutes the AC symbolic calculus system with the chain topological system. Natural expression often implies simplicity, accuracy, elegance and clarity, which further discloses the nature of the MAS to improve the accuracy, precision and real-time capability of MAS computation.

According to Eq. (1.45), the natural coordinate $q_l^{\bar{l}}$ of the fixed axis-invariant $^{\bar{l}}I_l$ can be mapped to the position and orientation relation $^{\bar{l}}R_l$ of frame # $\bar{l}$ and # l in a one-to-one way. The linear position $r_l^{\bar{l}}$ and the angular position $\phi_l^{\bar{l}}$ are motion vector $^{\bar{l}}q_l$ of axis-vector $^{\bar{l}}n_l$. Because $^{\bar{l}}n_l$ is an invariant, meaning this vector is invariant, the rotation of axis # l is called fixed axis rotation. The motion paths from frame # $\bar{l}$ to frame # l are infinite, but there is only one shortest path. The motion on this path is the fixed-axis motion.

Figure 18:
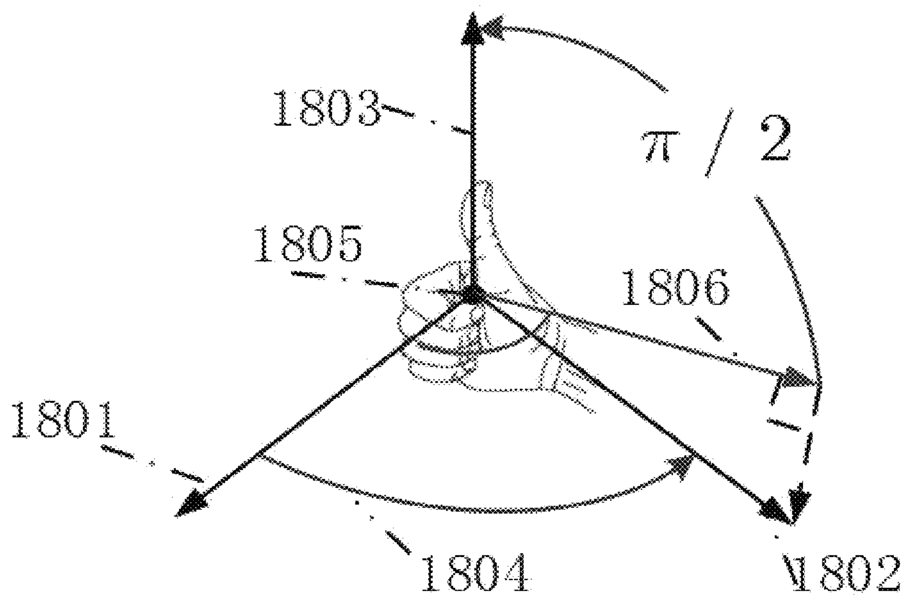
FIG. 18 is a rotation diagram determined by dual vectors.

As shown in FIG. 18, the rotation for an angle $\phi_l^{\bar{l}}$ from the initial unit vector $_\bullet^{\bar{l}}n_l$ to the current unit vector $_t^{\bar{l}}u_l$ is equivalent to the rotation of an angle of $\phi_l^{\bar{l}}$ around axis-vector $^{\bar{l}}n_l$. Let the fingers of your right hand curl naturally. When your fingers are curling from the natural zero position vector $_0^{\bar{l}}u_l$ to current radical vector $_t^{\bar{l}}u_l$ by the angular position $\phi_l^{\bar{l}}$, the direction $^{\bar{l}}n_l$ your thumb is pointing is the positive screw direction. The operation determining the screw according dual-vectors regardless of reference frames is called Right Hand Screw Operation obeying Right Hand Screw Rule (RHSR). It means that the rotation defined by the dual-vector is equivalent to screw motion.

As shown in FIG. 18, the $_\perp^{\bar{l}}n_l$ is called the 1st-order screw-vector from $^{l}n_l$ to $_\bullet^{\bar{l}}n_l$ by RHSR. Obviously, $$^{\bar{l}}n_l \cdot \sin\left(\phi_l^{\bar{l}}\right) = {}_\bullet^{\bar{l}}n_l \times {}_t^{\bar{l}}u_l,\ {}_\perp^{\bar{l}}n_l = {}^{\bar{l}}n_l \times {}_\bullet^{\bar{l}}n_l. \quad (1.51)$$

Therefore, the orthogonal screw operation corresponds to the vector product from screw-axis to any natural zero-position vector;

The motion of a cylindrical joint is screw motion, so axis of the cylindrical joint is called the fixed screw-axis. According to Eq. (1.46), the prismatic joint, revolute joint are the special cases of the cylindrical joint. Taking the screw-axis of screw motion as the general motion-axis or constraint axis can help the realization of the simplified system. Accordingly, the AC based on the screw motion-axis is called the screw AC. The AC composed of the translational axis, rotational axis and screw-axis can be obtained through instantiation of screw AC. The fixed axis-Invariant is essentially the invariant of 3D screw-axis. Eq. (1.46) shows that the fixed axis-Invariant is the unit reference axis of a motion-vector.

The AC system represented by motion-axes is called natural axis-chain system and that represented by Cartesian axes is called Cartesian Axis-Chain (CAC) system. The latter is a special instance of the former. Eqs. (1.46)-(1.50) describe the screw motion with the invariants of screw-axis as the core on the basis of translation vector and rotation vector. The spatial dimensions can be adaptively allocated according to the classification of the motion-axis or the constraint axis, so as to ensure flexible analysis of the MAS. Eqs. (1.46)-(1.50) are called natural screws which are different from 6D screws (dual-vector screws) stated in the existing literatures. According to Eq. (1.46), the relation between the 6D screw $^{\bar{l}}\gamma_l$ and the fixed axis-vector $^{l}I_l$ is as below:

$$^{\bar{l}}\gamma_l = \begin{bmatrix} ^{\bar{l}}\phi_l \\ ^{\bar{l}}r_l \end{bmatrix} = \begin{bmatrix} \phi_l^{\bar{l}}\cdot 1 & 0 \\ r_l^{\bar{l}}\cdot 1 & 1 \end{bmatrix} \cdot \begin{bmatrix} ^{\bar{l}}n_l \\ ^{\bar{l}}l_l \end{bmatrix} = \begin{bmatrix} \phi_l^{\bar{l}}\cdot 1 & 0 \\ r_l^{\bar{l}}\cdot 1 & 1 \end{bmatrix} \cdot {}^{\bar{l}}I_l \text{ if } {}^{\bar{l}}k_l \in C. \quad (1.52)$$

In Eq. (1.52), the derivative of $^{l}\gamma_l$ with respect to time, i.e. $^{\bar{l}}\dot{\gamma}_l$ is in whole written as the twist in 6D spatial (dual-vectors) operator algebra [13, 14]. The force vector and torque vector are combined into the wrench. Therefore, the 3D Screw is the primitive of 3D spatial motion:

[1] The MAS kinematic and dynamic theories are interested in the 3D Natural axis-space and adopt the 6D twist and 6D wrench only in clarifying the relation with the dual vector space. The 6D space operator algebra is too abstract to reveal the intrinsic laws of the kinematics and dynamics, which violates the motivation for establishing the real-time modeling and controlling theories of MAS.

[2] A rigid-body moves in a 6D space. The primitive in such a space is the 3D rigid body. That is to say the level of system hierarchy is composed of the 3D translational space and rotational space as shown in Eqs. (1.5)-(1.8).

The 3D Motion Vector or $^{\bar{l}}\phi_l$ and $^{\bar{l}}r_l$ its velocity and acceleration are also motion vectors. 6D motion vectors or 3D motion vectors are generally referred to as motion vectors. The AC motion process is to align the motion vector fixed with the system with the desired motion vector via translation and rotation of the fixed axis-invariants. The 6D screw $^{\bar{l}}\gamma_l$ is represented by fixed-point dual-vectors. The solid line vectors represent position vectors. The dashed line vectors represent rotation vectors. When the expected 6D screw $$\left[{}_d^{\bar{l}}\phi_l,\ {}_d^{\bar{l}}r_l\right]$$

and the 6D screw $[^{\bar{l}}\phi_l,\ ^{\bar{l}}r_l]$ of the link l overlap, these two vectors are aligned.

D-H Frames and D-H Parameters

The Denavit-Hartenberg (D-H) frame plays a significant role in the robotic inverse kinematics (IK) calculation.

If an AC $^{l}\mathbf{l}_n$ is given, and $l \in {}^{l}\mathbf{l}_n$, any natural coordinate may be applied at initial time corresponding to natural zero-position. The world frame or bed frame i is defined according to actual need, its origin is usually on the first axis. Often $z_i$ goes through the axis $z_1$, and $z_i \| z_1$.

Given a primitive AC $^{\bar{l}}\mathbf{l}_l$. Except the leaf links, the D-H frame # $\bar{l}$' is established as below:

[1] Assume that $z_{\bar{l}'}$ and $z_{l'}$ are respectively on axis-vectors $^{\bar{\bar{l}}}n_{\bar{l}}$ and $^{\bar{l}}n_l$.

[2] Draw the common perpendicular of axis $z_{\bar{l}'}$ and $z_{l'}$. Mark the points intersecting with $z_{\bar{l}'}$ and $z_{l'}$ as $O_{\bar{l}_*}$ and $O_{l'}$ respectively, wherein $O_{\bar{l}_*}$ is the origin of the middle frame # $\bar{l}_*$'. The $O_{l'}$ is used as the origin of frame # l'. The point $O_{l'}$ fixed with link # l is determined jointly by the axes of joint pairs $^{\bar{\bar{l}}}k_{\bar{l}}$ and $^{\bar{l}}k_l$.

[3] Define the direction from axis $z_{\bar{l}'}$ to axis $z_{l'}$ as axis $x_{\bar{l}'}$.

[4] If $z_{\bar{l}'} \| z_{l'}$, select one common perpendicular line to be axis $x_{l'}$. If the axis $z_{\bar{l}'}$ intersects with axis $z_{l'}$, their intersection point is used as the origin $O_{l'}$ of Frame # l'.

[5] Complement the axis $y_{l'}$ in accordance with the right-hand rule.

Once the D-H Frame is established, the D-H parameters of link # l can be determined:

[1] $c_{\bar{l}} = r_{\bar{l}_*}^{\bar{l}'}$—the axial offset distance from the point $O_{l'}$ to the point $O_{\bar{l}_*}$. After the translation of $c_{\bar{l}}$, from the initial point $O_{l'}$ to $O_{\bar{l}_*}$.

[2] $\phi_{\bar{l}} = \phi_{\bar{l}'x}^{\bar{\bar{l}}'x}$—rotational angle from the axis $\bar{\bar{l}}$'x to axis $\bar{l}$'x. After initial frame # $\bar{l}$' rotates around axis $\bar{l}$'z by $\phi_{\bar{l}}$, the initial axis $\bar{l}$'x aligns to current axis $\bar{l}_*$'x, and it comes to the middle frame # $\bar{l}_*$'.

[3] $a_{\bar{l}} = r_{l'}^{\bar{l}_*}$—the axis distance from the point $O_{\bar{l}_*}$ to the point $O_{l'}$. The point $O_{\bar{l}_*}$ and $O_{l'}$ coincide after translation.

[4] $\alpha_{\bar{l}}=\phi_{l'z}^{\bar{l}'z}$—the twist angle from the axis $\bar{l}$'z to axis l'z. After rotation of frame # l' around axis l'x by $\alpha_{\bar{l}}$, current axis l'z aligns with final axis l'z, and it comes to the final frame # l'.

As known from above that joint pair $^{\bar{l}}k_l$ has three D-H structural parameters and one motion parameter. It is two dimensions less than a free rigid-body because the D-H frame relies on common perpendicular and has two constraints. But any natural frame has five structural parameters and one motion parameter, corresponding to the six dimensions of a free rigid-body.

In a natural frame system and considering the joint pair $^{\bar{l}}k_l$, the motion of link # $\bar{l}$ will lead to motion with link # l. The D-H frames and D-H parameters are determined from root to leaf. Any node has a unique serial number. The indices of structural parameters and motion parameters of link # l correspond with the serial number l. The measurement of joint variables and structural parameters is performed by reference to the parent axis. However, for the D-H frame system, because a D-H frame is not a natural frame and the structural parameter expression is not natural, the determination process of D-H frame and D-H parameters is cumbersome. The $\phi_{\bar{l}}=\phi_{\bar{l}}^{\bar{l}}=\phi_{\bar{l}'x}^{\bar{l}'x}$ is a motion parameter and its index corresponds to its successor. The indices of structural parameters $a_{\bar{l}}=r_{l'}^{\bar{l}*}$, $c_{\bar{l}}=r_{\bar{l}*}^{\bar{l}'}$ and $\alpha=\phi_{l'z}^{\bar{l}'z}$ correspond to their predecessors, violating the convention that a tree-typed chain is one-to-one mapping with successors. Therefore, the determination process of D-H frames and D-H parameters is only applicable to the serial chain, rather than the tree-typed chain.

Meanwhile, it is known that the D-H frames of link # $\bar{l}$ and # l are respectively denoted as D-H frame # $\bar{l}$' and # l'. The D-H axis-chain $^{\bar{l}'}l_{\bar{l}'}$ is equivalent to the Cartesian axis-chain $^{\bar{l}'}F_l$=($\bar{l}$',l'1,l'2,l'3,l]. The joint pair sequence is denoted as $^{\bar{l}'}k_l$= $_{\bar{l}'}P_{l'1}$, $^{l'1}R_{l'2}$, $^{l'2}R_{l'3}$, $^{l'3}P_{l'}$]. The sequence of axis-invariants are denoted as $$^{\bar{l}'}n_{l'1}=1^{[z]},\ ^{l'1}n_{l'2}=1^{[z]},\ ^{l'2}n_{l'3}=1^{[x]}$$

and $$^{l'3}n_{l'}=1^{[x]}.$$

After the sequencing motion, the initial configuration of link # l will align to its final configuration.

The D-H frame and parameters of the leaf link # l is determined as below:

[1] The wrist center C is fixed with link # l. Introduce the virtual joint pair $^lV_{c'}$. Draw the axis $z_{c'}$ passing the point C, and let $z_l \| z_{c'}$, if $z_{c'}$ is not given.

[2] Draw the common perpendicular line of axis $z_{l'}$ and $z_{c'}$ which intersects with axis $z_{l'}$ and $z_{c'}$, at $O_{l*'}$ and $O_{C'}$ respectively. Define a direction as axis $x_{l'}$.

[3] Complement $y_{C'}$ in accordance with the right-hand rule.

Accordingly, determine the D-H parameters of link # l:

[1] $c_l=r_{l*'}^{l'}$—the axial offset distance from $O_{l'}$ to $O_{l*'}$.

[2] $c_C=r_C^{l*'}$—the axial offset distance from $O_{l*'}$ to C. $a_l=r_{c'}^{l*}$—the axis distance from $O_{l*}$ to $O_{c'}$.

[3] $\alpha_C$=0—the twist angle from axis l'z to axis c'z: $a_C$=0—the axis distance from $O_{c'}$ to C.

The establishment of the D-H frame needs to be based on a natural frame. At initial time corresponding to natural zero-position, the orientation of all frames should be the same. The process of rotating around axis $z_{l'}$ by $_0\phi_{\bar{l}}^{\dagger}$ is the process to align the initial axis $\bar{l}$'x and current axis $\bar{l}$'x. The process of rotating around axis $x^{\bar{l}'}$by $_0\alpha_{\bar{l}}^{\dagger}$ is the process to align the initial axis l'z and current axis l'z. The $_0\phi_{\bar{l}}^{\dagger}$ is called zero-position of joint and the $_0\alpha_{\bar{l}}^{\dagger}$ as zero-position of twist angle. Among D-H parameters, the $a_{\bar{l}}$, $c_{\bar{l}}$ and $\alpha_{\bar{l}}$ are referred to as structural parameters and $_0\phi_{\bar{l}}^{\dagger}$ and $_0\alpha_{\bar{l}}^{\dagger}$ are referred as zero-positions. For revolute joint pair $^{\bar{l}}R_l$, denote its D-H joint variable as $\theta_l$ and its corresponding natural joint variable as $\phi_l$.

$$\begin{aligned}\phi_l &= \theta_l + {}_0\phi_l^{\dagger} \\ {}_0\phi_l^{\dagger} &= {}_0\phi_{l'x}^{\overline{l'}x},\ \alpha_l = \phi_{l'z}^{\overline{l'}z}\end{aligned} \quad (1.53)$$

In order to ensure the correctness of D-H parameter computation, the initial reference must be consistent, meaning that the computation needs to be performed with natural joint variables by reference to the natural frame. Otherwise, miscomputation will occur or the system computation will become more complex. The fixed axis-invariant $^{\bar{l}}I_l=[^{\bar{l}}n_l, ^{\bar{l}}l_l]$ can determine the D-H frame. The determination processes of D-H frames and D-H parameters are cumbersome and their expressions are not natural. Cartesian frame system is easy to result in measuring errors in engineering and thus hard to meet the engineering requirements for the high-accuracy MAS. However, the Cartesian frame has relatively few structural parameters and has certain advantages in inverse kinematics computation.

The determination process of D-H frames stated above is not the only one. Any Cartesian frame determined via 3 structural parameters and 1 motion parameter can be deemed as a D-H frame. The D-H frame system is used mainly to simplify the analysis and computation of robot inverse kinematics (IK).

On the one hand, the properties of an object cannot be understood and measurable with respect to reference objects such as points, lines and planes. On the other hand, the property parameters obtained against different references should include common and invariable parameters, which are invariants; otherwise the objectiveness of the object cannot be reflected.

The reference objects usually include reference points, reference axes, reference frames, etc. Invariance is an object property. The laws between properties are objective. The invariant of chaining order, the invariance of tensors and their duality are fundamental laws of system investigation.

The invariant of chaining order means that the connection order of MASs does not change with respect to different reference points.

Besides axis-vector $^{\bar{l}}n_l$, fixed axis-invariant $^{\bar{l}}I_l$, natural coordinates $q_l^{\bar{l}}$, many other invariants exist in the objective world, such as π, exponent e, light velocity c, etc. Discovery of invariants and application thereof to problem resolution are permanent themes of scientific studies.

The objective natural space has 3 dimensions. The primitives in such space are points, meaning that the infinitesimal particle in the space is spatial point. 3D is the invariant of the natural space. Given an IMU, the triaxial accelerations have three independent dimensions. The acceleration detected by any additional accelerometer is associated with the independent triaxial acceleration. The actual acceleration can only be equivalent to independent triaxial acceleration at the same time. Likewise, axis-invariants are primitives of the kinematic and dynamic MAS, so they can be used to establish an accurate real-time simulation analysis and control system.

Invariants reflect the properties of objects or systems with respect to different referenceable objects. Likewise, many invariants exist under the MAS composed of Joint Pairs and links.

Any joint pairs has its invariant DOF and DOC. One DOF corresponds to 1D motion space, and one DOC to 1D constraint space. When natural frame system is used as reference, an axis-vector is the common axis of adjacent links, which reflects the coaxality of the links.

The invariant of tensors refers that the 1st-order polynomial of basis components and coordinate components is invariable. The invariance of tensors including scalars, vectors and high-order tensors is an objective reflection of system properties. In other words, the algebra product of different measuring units and measured quantities need to maintain invariant, otherwise metric errors will occur.

Under different system hierarchies, there are many interaction relations between points in certain orders, including the position of adjacent points, the motion between mass points, and so on. The invariance of chaining order is the fundamental guarantee for the correctness of theoretical systems and engineering systems.

Duality means that two independent properties have opposite effects and independent common properties. For example, there is duality between force and motion or between bases and coordinates. Invariants are closely related to invariance and duality.

Like the way we understand the world. We at first understand a question from our own point of view and then think about it from the point of view of others. Obviously, ego reference is the prerequisite for understanding and superego reference is the fundamental guarantee for cooperation and co-existence. The correct understanding of the kinetic characteristics of MAS also requires ego reference and superego reference. The establishment of the reference frame is the essential prerequisite for understanding.

[1] In MASs, the physical properties which are measurable and controllable must be differentiated from those unmeasurable and uncontrollable. The traditional kinematic and dynamic theories often ignore the controllability and measurability and thus physical implementation is likely to become impossible and theoretical analysis meaningless. Only kinematic quantities with controllability can be controlled in engineering and only those with observability can be measured in engineering.

[2] In MASs, the controllable and measurable kinematic quantities in terms of physical structures must be connected in axial direction. In another word, the kinematic quantities of joint pairs are controllable and measurable, while those of different joint pairs are uncontrollable and unmeasurable.

Eq. (1.46) shows that the angular position $\phi_l^{\bar{l}}$ and linear position $r_l^{\bar{l}}$ with the ego-reference of joint pair ${}^{\bar{l}}k_l$ are directly measurable and controllable. Likewise, the angular velocity $\dot{\phi}_l^{\bar{l}}$ and linear velocity $\dot{r}_l^{\bar{l}}$ with ego-reference are directly measurable and controllable. The rotational velocity ${}^{\bar{l}}\dot{\phi}_l$ and translational velocity ${}^{\bar{l}}\dot{r}_l$ with ego-reference are directly measurable and controllable, because their structural parameters and motion parameters are measurable. The reference frame in which the kinematic quantities can be directly measured is called measure frame. If $k \notin {}^{\bar{l}}k_l$, ${}^{k|\bar{l}}\phi_l$ and ${}^{k|\bar{l}}r_l$ are usually not directly controllable or measurable and ${}^{k|\bar{l}}\dot{\phi}_l$ and ${}^{k|\bar{l}}\dot{r}_l$ are not directly controllable or measurable. Therefore, the projection operator | differentiates the unmeasurable and uncontrollable quantities. Projection in concept only ensures the equivalence of measurement in terms of quantity and does not physically controllable and measurable. The reference frame in which the kinematic quantities are indirectly measured is called projection reference frame.

The kinematic quantities of links are physically controllable and measurable. A motion-axis (axis) is the primitive of the concatenation process of AC and is unbridgeable, otherwise the transitivity of AC will be violated.

Metric Axiom of Axis-Chains

AXIOM 1.2 Given an AC ${}^{i}1_n=(i, \ldots, \bar{n}, n]$, ${}^{\bar{l}}k_l \in {}^{i}1_n$, ${}^{k}L$, replace the connection symbol l with property symbol p or P, the 3D spatial operations based on the topology axiom of axis-chain has the following metric axioms of AC:

[1] Partial ordering and reversibility of AC

According to the partial ordering and reversibility of AC topology, obtain $$\phi_l^{\bar{l}}=-\phi_{\bar{l}}^{l},\ {}^{l|\bar{l}}\phi_l=-{}^{l}\phi_{\bar{l}}, \tag{1.54}$$

$$r_l^{\bar{l}}=-r_{\bar{l}}^{l},\ {}^{l|\bar{l}}r_l=-{}^{l}r_{\bar{l}}, \tag{1.54}$$

Eqs. (1.54)-(1.55) show that the angular position $\phi_l^{\bar{l}}$, linear position $r_l^{\bar{l}}$ of link # l, rotation vector ${}^{l}\phi_l$ and translation vector ${}^{\bar{l}}r_l$ are fundamental properties of ACs.

[2] Backward Transitivity of Tree-Typed Chains

According to the transitivity of AC topology, and force backward iteration of axis-chain, obtain $$ {}^{i}p_{k_L} = \sum_{l}^{kL}\left({}^{i}p_l\right) = {}^{i}p_{\bar{k}} + \sum_{l}^{kL}\left({}^{i|k}p_l\right), \tag{1.56}$$

$$ {}^{i}P_{k_L} = \prod_{l}^{kL}\left({}^{i}P_l\right) = {}^{i}P_{\bar{k}} \cdot \prod_{l}^{kL}\left({}^{i|k}P_l\right), \tag{1.57}$$

Eqs. (1.56)-(1.57) show the transitivity of the vector ${}^{i}p_l$ of property p and the 2nd-order tensor ${}^{i}P_l$ of property P for closed subtree ${}^{k}L$ and reflect the transitivity of all children of subtree to its tree root. The indices of any term need to comply with the chain index offset law, meaning that the index at the lower right of the prior product term is same as and can be offset with the index at the upper left of the following product term. The chaining orders at both sides of equations are the same, i.e. the connection order of AC keeps invariant.

[3] Forward Transitivity of Serial Chains

According to the transitivity of AC topology and Motion Forward Iteration, obtain $$ {}^{i}p_n = \prod_{l}^{{}^{i}1_n}\left({}^{i|\bar{l}}p_l\right), \tag{1.58}$$

$$ {}^{i}P_n = \sum_{l}^{{}^{i}1_n}\left({}^{\bar{l}}P_l\right). \tag{1.59}$$

Eqs. (1.58)-(1.59) show the transitivity of the vector ${}^{\bar{l}}p_l$ of the property p and the 2nd-order tensor ${}^{\bar{l}}P_l$ of the property P for the KC ${}^{i}1_j$, meaning that they have iterative relation. The equations reflect the transitivity of the root motion to the leaf motion.

The transitivity of serial chain and backward transitivity of tree-typed chains result in the full ordering of tree-type chains.

The AC symbolic calculus system, comprised of topological axiom of axis-chain and metric axiom of axis-chain, is based on motion-axes and axis-invariant. The system provides the metasystem for the MAS modeling and controlling based on axis-invariant.

At first, this section establishes the 3D spatial operation algebra based on the metric axiom of axis-chain proposed. Furthermore, it provides the basis for the establishment of MAS kinematic theories based on axis-invariant.

The Cartesian space is a 3D scalar product space. Distances and angles under difference Cartesian frames are invariable. Under the scalar product space, the addition and scalar multiplication as well as the inner and cross multiplications of vectors are workable. A Cartesian frame is the primitive of the 3D vector space.

However, a Cartesian frame is composed of three coordinate axes, any two of which are orthogonal. Therefore a Cartesian frame is a special natural frame.

The inner and cross multiplications have clear geometric significance, but 3D vector algebra and 6D spatial operator algebra lack of topological structure are hard to disclose the rule of complex vector space.

The 3D spatial operation algebra is an axiomatic system: It is based on metric axiom of axis-chain and tensor invariance. Any two independent points constitute a line and any three independent points constitute a body. 3D is a natural invariant of the objective world. Using the theories of the high-dimensional space to solve the problems of the low-dimensional space will certainly result in problems associated with computational efficiency and comprehension. The 6D spatial operator algebra is a typical example for the theories of 6D vector space to solve the problems of real 3D space.

The algebra is a concept in mathematics and the operation is a concept in the computer engineering. The name of 3D spatial operator algebra is applied in that this algebra system is adaptive to computer processing.

[1] On the one hand, the Chain-Ordering Symbol System (COSS) is concise, accurate, structured and understandable to be processed by computer. On the other hand, the operation is a mechanical process. It is based on concise fundamental operations. The process is of concise iterative structure and is concise and highly efficient in terms of technical realization.

[2] More importantly, operations include function calculation and logical judgment. On the one hand, the 3D spatial operator algebra is based on tree-typed chain topological symbols. Using the parent node, and closed subtree and other topological operations are discrete operation processes associated with axis-SEQSs and parent axis-SEQSs. On the other hand, matrix operations are the foundation of numerical computation. At the same time, when the automatic computer modeling and analyzing is used, the properties of property symbols need to be distinguished and their symbol calculus system to be established.

[3] Because the functions in mathamatics are often abstract and any natural frame is equivalent to an axis-vector and its angular position, it needs to replace them with their corresponding operations to express the relation between vectors regardless of reference frames. For example, we can replace scalar product with orthogonal projection, and replace vector product with vector screw. Configuration alignment is used for the equation of position and attitude. Robotic motion is a process of operations, and we should analyse and synthesize the process in view of operations. The order of function calculation in mathamatics is different from the order of its corresponding operation, the two orders are often but not always opposite each other.

The Cartesian frame # $l=O_l-x_l y_l z_l$, is composed of the origin $O_l$ and Cartesian axes denoted as basis vector $e_l=[e_l^{[x]}, e_l^{[y]}, e_l^{[z]}]$, any two of which are orthogonal, wherein $e_l^{[x]}$, $e_l^{[y]}$ and $e_l^{[z]}$ are three independent symbols. The basis $e_l$ is projected itself.

$$\lfloor {}^{l|}e_l^{[x]}\ {}^{l|}e_l^{[y]}\ {}^{l|}e_l^{[z]} \rfloor=[1^{[x]},1^{[y]},1^{[z]}]=1. \tag{1.60}$$

Eq. (1.60) shows that $1^{[x]}$, $1^{[y]}$ and $1^{[z]}$ are three independent 3D coordinate basis vectors. Therefore $$^{l}e_l \leftrightarrow 1. \tag{1.61}$$

According to Eq. (1.30), there is a one-to-one mapping between the unit basis vector $e_l$ and the 1, meaning that rotating the basis vector $e_l$ is equivalent to rotating the unit cube 1 fixed therewith.

Because the coordinates have duality on the serial and their inner products (algebraic products) are invariable, the relation between the position vector ${}^{l}\vec{r}_{lS}$ and the base coordinate is as below:

$$^{l}\vec{r}_{lS} = e_l^{[x]}\cdot{}^{l}r_{lS}^{[1]} + e_l^{[y]}\cdot{}^{l}r_{lS}^{[2]} + e_l^{[z]}\cdot{}^{l}r_{lS}^{[3]} = \begin{bmatrix} {}^{l}r_{lS}^{[1]} & {}^{l}r_{lS}^{[2]} & {}^{l}r_{lS}^{[3]} \end{bmatrix}\cdot\begin{bmatrix} e_l^{[x]} \\ e_l^{[y]} \\ e_l^{[z]} \end{bmatrix}. \tag{1.62}$$

According to Eq. (1.62), the vector ${}^{l}\vec{r}_{lS}$ is the scalar product of the basis vector $e_l$ and the coordinate vector ${}^{l}r_{lS}$ and is a linear polynomial. A vector is a 1st-order tensor and is an invariant, i.e.

$$^{l}\vec{r}_{lS} = e_l\cdot{}^{l}r_{lS} = {}^{l}r_{lS}^{T}\cdot e_l^{T}. \tag{1.3}$$

The basis vector $e_l$ and the coordinate ${}^{l}r_{lS}$ constitute the "basis and coordinate" pair. There is a dual relation between the basis vector $e_l$ and coordinate vector ${}^{l}r_{lS}$. The former complies with the LH order and represented by the row scalar. The latter complies with the RHS order and represented by the column scalar. It is expressed as below in materialistic dialectics: The basis vector $e_l$ and the coordinate ${}^{l}r_{lS}$ reflect two aspects of the contradiction. They are mutually dependent and are indivisible. ${}^{l}\vec{r}_{lS}=e_l\cdot{}^{l}r_{lS}=-{}^{lS}\vec{r}_l=-e_l\cdot{}^{lS}r_l$, thus:

$$^{l}r_{lS}=-{}^{lS}r_l. \tag{1.64}$$

According to Eq. (1.64), the transposition operator "T" does not change the order of the upper and the lower indices (i.e. chaining order) and only changes the ordering of elements.

According to Eq. (1.62), the matrix product symbol is the algebra product symbol "·". In this book, this symbol is used to separate different property symbols and thus makes these equations more clear.

The outer product of dual-vectors (dyad) is denoted as o which is calculated as below:

$$[x, y, z]\circ[m, n, p] = \begin{bmatrix} x \\ y \\ z \end{bmatrix}\circ[m, n, p] = \begin{bmatrix} x\circ m & x\circ n & x\circ p \\ y\circ m & y\circ n & y\circ p \\ z\circ m & z\circ n & z\circ p \end{bmatrix}$$

The result is a matrix, indicating that the outer product of two 1st-order vectors is 2nd-order matrix. Obviously, the scalar product of two 1st-order vectors is zero-order, i.e. a scalar.

[1] Outer Scalar Product of Bases

The outer product of the basis vector $e_l$ and basis vector (1st-order tensor) $e_l$ is the dyad of the basis vector $e_l$ and constitute a 2nd-order tensor according to the scalar product "·", which is the orthogonal projection (projection) of the basis vector $e_l$ (an arbitrary unit spatial vector) against itself:

$$e_l^T \cdot e_l = \begin{bmatrix} e_l^{[x]} \\ e_l^{[y]} \\ e_l^{[z]} \end{bmatrix} \cdot \begin{bmatrix} e_l^{[x]} & e_l^{[y]} & e_l^{[z]} \end{bmatrix} = \begin{bmatrix} 1 & 0 & 0 \\ 0 & 1 & 0 \\ 0 & 0 & 1 \end{bmatrix} = 1;$$

Thus, $$e_l^T \cdot e_l = 1. \quad (1.65)$$

According to Eq. (1.65), $\delta^{[i][k]}$ $$e_l^{[i]:T} \cdot e_l^{[k]} = \delta^{[i][k]} = \begin{cases} 1, & \text{if } i = k \\ 0, & \text{if } i \neq k \end{cases} (i, k = x, y, z). \quad (1.66)$$

$\delta^{[i][k]}$ is called Kronecker symbol. Except that the re-expression of indices is different, other aspects of $\delta^{[i][k]}$ in Eq. (1.66) have the same definition as those in linear algebra.

[2] Outer Vector Product of the Base

The outer vector product of the dyad $e_l^T \times e_l$ of the basis vector $e_l$ constitutes a 2nd-order tensor according to cross multiplication. Therefore, $$e_l \otimes e_l = e_l^T \times e_l = \begin{bmatrix} e_l^{[x]} \\ e_l^{[y]} \\ e_l^{[z]} \end{bmatrix} \times \begin{bmatrix} e_l^{[x]} e_l^{[y]} e_l^{[z]} \end{bmatrix} = \begin{bmatrix} 0 & e_l^{[z]} & -e_l^{[y]} \\ -e_l^{[z]} & 0 & e_l^{[x]} \\ e_l^{[y]} & -e_l^{[x]} & 0 \end{bmatrix}. \quad (1.67)$$

The screw-matrix of the basis vector is defined as below, $$\tilde{e}_l \triangleq \begin{bmatrix} 0 & e_l^{[z]} & -e_l^{[y]} \\ -e_l^{[z]} & 0 & e_l^{[x]} \\ e_l^{[y]} & -e_l^{[x]} & 0 \end{bmatrix}. \quad (1.68)$$

$\tilde{e}_l$ is a 2nd-order tensor composed by $e_l$. Its elements correspond to the normal directions of the six surfaces of a unit cube and represent an anti-symmetric spatial rotation. Eq. (1.68) follows the backward order. The axis-vector of $\tilde{e}_l$ is represented as below:

$$\text{Vector}(\tilde{e}_l) = -e_l. \quad (1.69)$$

In Eq. (1.69), $\tilde{e}_l$ is an screw-matrix. The $\tilde{e}_l$ can be mapped to $e_l$ in a one-to-one way, i.e. $\tilde{e}_l \leftrightarrow e_l$ There is a dual relation between the rotational basis vector Vector($\tilde{e}_l$) and the translational basis vector $e_l$. The triangular elements at the upper right of ($\tilde{e}_l$) complies with the LH/BW order, i.e.

$$\tilde{e}_l^{[m][n]} = -(-1)^{m+n} \cdot e_l^{[p]}, m,n,p \in \{1,2,3\}, m \neq n \neq p. \quad (1.70)$$

The LH order of the basis vector $e_l$ is invariable, wherein $i,j \in \{1,2,3\}$. Obviously, the tilde $\tilde{\square}$ in the superscript is a derivated symbol, because it only changes the ordering of $\square$. $e_l$ is called the backward axis-vector of $\tilde{e}_l$. According to Eq. (1.67), $$e^{[m]} \times e^{[n]} = \varepsilon_{[p]}^{[m][n]} \cdot e_l^{[p]}, \quad (1.71)$$

wherein $\varepsilon_{[p]}^{[m][n]}$ is a Richie symbol, and $$\varepsilon_{[p]}^{[m][n]} = \begin{cases} +1, & \text{if } [m, n, p] \text{ is right-ordering} \\ -1, & \text{if } [m, n, p] \text{ is left-ordering} \end{cases}, \quad (1.72)$$

$$m, n, p \in \{x, y, z\}.$$

Except that the representing methods of indices are different, other aspects of $\varepsilon_{[p]}^{[m][n]}$ in Eq. (1.72) have the same definition as those in linear algebra. According to Eq. (1.71), the basis vector $e_l$ complies with the LH order. $\tilde{e}_l$ can be mapped to $e_l$ in a one-to-one way. Vector($\tilde{e}_l$) is of opposite direction to $e_l$. The $\tilde{e}_l$ complies with the LH order. The 2nd-order basis component in Eq. (1.31) corresponds to the screw-matrix of its 1st-order basis component. $\tilde{e}_l \cdot e_l = 0_3$, so $\tilde{e}_l$ and $e_l$ are orthogonal. The RHS order of {x,y,z} in Eq. (1.72) includes [x,y,z], [y,z,x], [z,x,y]. Others are LH order.

[3] Cross product of the basis vector $e_l = [e_l^{[x]}, e_l^{[y]}, e_l^{[z]}]$ is an arbitrary unit basis vector, so it has vector product which is also called the cross product.

$$e_l \times e_l = \tilde{e}_l \cdot e_l^T = 0_3. \quad (1.73)$$

According to Eq., under the Cartesian rectangular reference frame, $\tilde{e}_l$ represents space rotation and $e_l$ represents space displacement. $e_l$ is equivalent to ${}^{\bar{l}}n_l$, so the translation and rotation of the common axis are not dual, meaning that the translation and rotation of the spatial spiral line do not affect each other.

Cross Product of Vectors

[1] Outer Algebraic Product of Dual-Vectors

The ⊙ is called the outer algebraic product. It is a 2nd-order tensor expanded by 1st-order dual-vectors, namely $e_l \cdot {}^l r_{lS}$ and $e_l \cdot r_{lS'}$, which is an algebraic product calculation of a matrix in which the basis vector $e_l$ is at the outside.

$$e_l \cdot {}^l r_{lS} \odot e_l \cdot {}^l r_{lS'} = e_l \cdot \left({}^l r_{lS} \cdot {}^l r_{lS'}^T\right) \cdot e_l^T = e_l \cdot \begin{bmatrix} {}^l r_{lS}^{[1]} \\ {}^l r_{lS}^{[2]} \\ {}^l r_{lS}^{[3]} \end{bmatrix} \cdot \begin{bmatrix} {}^l r_{lS'}^{[1]} & {}^l r_{lS'}^{[2]} & {}^l r_{lS'}^{[3]} \end{bmatrix} \cdot e_l^T.$$

Its coordinates are defined as below $${}^l r_{lS} \odot {}^l r_{lS'} \triangleq {}^l r_{lS} \cdot {}^l r_{lS'}^T. \quad (1.74)$$

Therefore, the outer product calculation is a specific matrix operation.

[2] Outer Scalar Product of Vectors ${}^l r_{lS}^T \cdot e_l^T \cdot e_l \cdot {}^l r_{lS'}$ is called the outer scalar product of the coordinate vector, which is an outer scalar product in which the basis vector $e_l$ is at the inside. From Eq. (1.65), obtain $$(e_l \cdot {}^l r_{lS}) \cdot (e_l \cdot {}^l r_{lS'}) = {}^l r_{lS}^T \cdot (e_l^T \cdot e_l) \cdot {}^l r_{lS} = {}^l r_{lS}^T \cdot {}^l r_{lS'}.$$

The inner bases are producted, and the above equation is called inner product. Its coordinates are defined as below $${}^l r_{lS} \cdot {}^l r_{lS} = {}^l r_{lS}^T \cdot {}^l r_{lS} = {}^l r_{lS}^T \cdot {}^l r_{lS'}. \quad (1.75)$$

According to Eq. (1.75), the scalar product calculation of the coordinate vector can be represented by the matrix multiplication "·" (algebraic multiplication).

[3] Cross Product of Dual-Vectors $e_l \cdot {}^l\omega_j \times e_l \cdot {}^{l|j} r_k$ is called the cross product, representing the vector product calculation in which the basis vector $e_l$ is at the inside.

$$e_l \cdot {}^l\omega_j \times e_l \cdot {}^{l|j} r_k = {}^l\omega_j^T \cdot \tilde{e}_l \cdot {}^{l|j} r_k. \quad (1.76)$$

PROOF:

$$\begin{aligned} e_l\cdot{}^{l}\omega_j\times e_l\cdot{}^{l|j}r_k &= {}^{l}\omega_j^T\cdot e_l^T\times e_l\cdot{}^{l|j}r_k = {}^{l}\omega_j^T\cdot\tilde{e}_l\cdot{}^{l|j}r_k \\ &= \begin{bmatrix} {}^{l}\omega_j^{[1]} & {}^{l}\omega_j^{[2]} & {}^{l}\omega_j^{[3]} \end{bmatrix}\cdot\begin{bmatrix} 0 & e_l^{[z]} & -e_l^{[y]} \\ -e_l^{[z]} & 0 & e_l^{[x]} \\ e_l^{[y]} & -e_l^{[x]} & 0 \end{bmatrix}\cdot\begin{bmatrix} {}^{l|j}r_k^{[1]} \\ {}^{l|j}r_k^{[2]} \\ {}^{l|j}r_k^{[3]} \end{bmatrix} \\ &= \begin{bmatrix} {}^{l}\omega_j^{[1]} & {}^{l}\omega_j^{[2]} & {}^{l}\omega_j^{[3]} \end{bmatrix}\cdot\begin{bmatrix} {}^{l|j}r_k^{[2]}\cdot e_l^{[z]} - {}^{l|j}r_k^{[3]}\cdot e_l^{[y]} \\ -{}^{l|j}r_k^{[1]}\cdot e_l^{[z]} + {}^{l|j}r_k^{[3]}\cdot e_l^{[x]} \\ {}^{l|j}r_k^{[1]}\cdot e_l^{[y]} - {}^{l|j}r_k^{[2]}\cdot e_l^{[x]} \end{bmatrix} = \begin{bmatrix} e_l^{[x]} & e_l^{[y]} & e_l^{[z]} \\ {}^{l}\omega_j^{[1]} & {}^{l}\omega_j^{[2]} & {}^{l}\omega_j^{[3]} \\ {}^{l|j}r_k^{[1]} & {}^{l|j}r_k^{[2]} & {}^{l|j}r_k^{[3]} \end{bmatrix}. \end{aligned}$$

Eq. (1.76) is an 1st-order polynomial of basis components, and it is called vector product. Thus, Eq. (1.76) is workable. Q.E.D.

Orthogonal Projection of Bases vs. Rotation Matrix

The outer scalar product of the basis vector $e_{\bar{l}}$ and the basis vector $e_l$ is defined as below $$ {}^{\bar{l}}Q_l \triangleq {}^{\bar{l}}e_l = e_{\bar{l}}^T\cdot e_l. \tag{1.77}$$

Then $$ e_{\bar{l}}\cdot{}^{\bar{l}}Q_l\cdot e_l^T = 1. \tag{1.78}$$

PROOF: As $$ {}^{\bar{l}}Q_l \triangleq {}^{\bar{l}}e_l = \begin{bmatrix} e_{\bar{l}}^{[x]} \\ e_{\bar{l}}^{[y]} \\ e_{\bar{l}}^{[z]} \end{bmatrix}\cdot\begin{bmatrix} e_l^{[x]} & e_l^{[y]} & e_l^{[z]} \end{bmatrix} = \begin{bmatrix} e_{\bar{l}}^{[x]}\cdot e_l^{[x]} & e_{\bar{l}}^{[x]}\cdot e_l^{[y]} & e_{\bar{l}}^{[x]}\cdot e_l^{[z]} \\ e_{\bar{l}}^{[y]}\cdot e_l^{[x]} & e_{\bar{l}}^{[y]}\cdot e_l^{[y]} & e_{\bar{l}}^{[y]}\cdot e_l^{[z]} \\ e_{\bar{l}}^{[z]}\cdot e_l^{[x]} & e_{\bar{l}}^{[z]}\cdot e_l^{[y]} & e_{\bar{l}}^{[z]}\cdot e_l^{[z]} \end{bmatrix}. \tag{1.79}$$

Considering Eq. (1.29) and (1.77), obtain $$\begin{aligned} e_{\bar{l}}\cdot{}^{\bar{l}}Q_l\cdot e_l^T &= \begin{bmatrix} e_{\bar{l}}^{[x]} & e_{\bar{l}}^{[y]} & e_{\bar{l}}^{[z]} \end{bmatrix}\cdot{}^{\bar{l}}e_l\cdot\begin{bmatrix} e_l^{[x]} \\ e_l^{[y]} \\ e_l^{[z]} \end{bmatrix} = \begin{bmatrix} e_{\bar{l}}^{[x]} & e_{\bar{l}}^{[y]} & e_{\bar{l}}^{[z]} \end{bmatrix} \\ &\backslash\cdot\begin{bmatrix} e_{\bar{l}}^{[x]} \\ e_{\bar{l}}^{[y]} \\ e_{\bar{l}}^{[z]} \end{bmatrix}\cdot\begin{bmatrix} e_l^{[x]} & e_l^{[y]} & e_l^{[z]} \end{bmatrix}\cdot\begin{bmatrix} e_l^{[x]} \\ e_l^{[y]} \\ e_l^{[z]} \end{bmatrix} = \|e_{\bar{l}}\|\cdot\|e_{\bar{l}}\| = 1 \end{aligned}.$$

Q.E.D.

Eq. (1.78) shows Cartesian Frames are distance-preserving 3D spaces. Obviously, ${}^{\bar{l}}e_l$ is a 2nd-order polynomial of $e_{\bar{l}}$ and $e_l$, meaning that ${}^{\bar{l}}e_l$ is a 2nd-order tensor. Eq. (1.77) shows that the chain indexes at both sides are same. Eq. (1.79) results in:

$$ {}^{\bar{l}}Q_l^T = {}^{l}Q_{\bar{l}}. \tag{1.80}$$

Eqs. (1.77) and (1.65) result in:

$$ {}^{\bar{l}}Q_l = {}^{\bar{l}}e_l = e_{\bar{l}}^T\cdot e_l = e_{\bar{l}}^T(e_{\bar{l}}\cdot e_{\bar{l}}^T)\cdot{}_l = e_{\bar{l}}^T\cdot e_{\bar{l}}\cdot e_{\bar{l}}^T\cdot e_l = {}^{\bar{l}}Q_{\bar{l}}\cdot{}^{\bar{l}}Q_l,$$

Equivalently $$ {}^{\bar{l}}Q_l = {}^{\bar{l}}Q_{\bar{l}}\cdot{}^{\bar{l}}Q_l. \tag{1.81}$$

A. Rotational Invariance

Eq. (1.78) results in:

$$ e_l\cdot{}^{\bar{l}}Q_l\cdot e_l^T\cdot e_l = e_l$$

$$ e_{\bar{l}}^T\cdot e_{\bar{l}}\cdot{}^{\bar{l}}Q_l\cdot e_l^T = e_{\bar{l}}^T,$$

Equivalently $$ e_l = e_{\bar{l}}\cdot{}^{\bar{l}}Q_l \tag{1.82}$$

$$ e_{\bar{l}} = e_l\cdot{}^{l}Q_{\bar{l}}. \tag{1.83}$$

Eqs. (1,82) and (1.83) are equations for base transformation. It is obvious that the index ${}_l\bullet^l$ complies with chain index offset law. Eq. (1.82) results in:

$$ {}^{\bar{l}}Q_l\cdot{}^{\bar{l}}Q_l^T = 1. \tag{1.84}$$

Eqs. (1.80) and (1.84) result in:

$$ {}^{\bar{l}}Q_l^T = {}^{\bar{l}}Q_l^{-1}. \tag{1.85}$$

In conclusion:

[1] According to Eq. (1.88), ${}^{\bar{l}}Q_l$ represents the orientation from frame # l to # l. The chaining order is determined from the index at the upper left to that at the lower right.

[2] According to Eq. (1.77), ${}^{\bar{l}}Q_l$ is the coordinate array with respect to frame # l, each column of which is the projection vector of the three basis components of $e_l$ against the three basis components of $e_{\bar{l}}$ respectively. Therefore, ${}^{\bar{l}}Q_l$ is a projection vector sequence. Any two of three Cartesian axes are orthogonal, so ${}^{\bar{l}}Q_l$ is an orthogonal projection and has the properties of "preserving angles" and "preserving distances".

[3] According to Eq. (1.79), ${}^{\bar{l}}Q_l$ is a Direction Cosine Matrix (DCM). Thus $$ {}^{\bar{l}}Q_l = e_{\bar{l}}^T\cdot e_l = \begin{bmatrix} e_{\bar{l}}\cdot e_{\bar{l}}^{[x]} & e_{\bar{l}}\cdot e_{\bar{l}}^{[y]} & e_{\bar{l}}\cdot e_{\bar{l}}^{[z]} \end{bmatrix} = \begin{bmatrix} C\left(\phi_{lx}^{\bar{l}x}\right) & C\left(\phi_{ly}^{\bar{l}x}\right) & C\left(\phi_{lz}^{\bar{l}x}\right) \\ C\left(\phi_{lx}^{\bar{l}y}\right) & C\left(\phi_{ly}^{\bar{l}y}\right) & C\left(\phi_{lz}^{\bar{l}y}\right) \\ C\left(\phi_{lx}^{\bar{l}z}\right) & C\left(\phi_{ly}^{\bar{l}z}\right) & C\left(\phi_{lz}^{\bar{l}z}\right) \end{bmatrix}. \tag{1.86}$$

According to Eq. (1.86), the outer scalar product of coordinate bases is the projection scalar between basis components. According to Eq. (1.29), the scalar product of basis vectors is the scalar projection between the basis vectors. According to Eq. (1.86), although the direction cosine is fully-ordered, the DCM is partially-ordered.

According to Eq. (1.78), $\|e_{\bar{l}}\|\cdot\|{}^{\bar{l}}Q_l\|\cdot\|e_l^T\|=1$. Therefore, $$ \|{}^{\bar{l}}Q_l\| = \mathrm{Trace}({}^{\bar{l}}Q_l) = 1. \tag{1.87}$$

${}^{\bar{l}}Q_l$ is a 3×3 real matrix, so it has three unit eigenvalues, among which one must be a real number denoted as $\lambda_l^{[1]}$ and the other two are conjugate complex numbers, namely $\lambda_l^{[2]}$ and $\lambda_l^{[3]}$, and $\lambda_l^{[2]}\cdot\lambda_l^{[3]}=1$. $\lambda_l^{[1]}\cdot\lambda_l^{[2]}\cdot\lambda_l^{[3]}=1$, so $\lambda^{[1]}=1$. Therefore, for the eigenvalue of ${}^{\bar{l}}Q_l$, $\lambda_l^{[1]}=1$ is certainly correct. As stated in Chapter 3, the eigenvector corresponding to 1, the eigenvalue of ${}^{\bar{l}}Q_l$ is the axis-invariant ${}^{\bar{l}}n_l$.

B. Orthogonal Projection Invariance

If the vector ${}^{l}\vec{r}_{lS}$ is fixed with the basis vector $e_l$, the projection vector of the vector ${}^{l}\vec{r}_{lS}$ against the basis vector $e_{\bar{l}}$ is denoted as ${}^{\bar{l}|l}r_{lS}$ and the projection vector of the vector ${}^{l}\vec{r}_{lS}$ against the basis vector $e_l$ is ${}^{l}r_{lS}$, then $$ {}^{l}\vec{r}_{lS} = e_l\cdot{}^{l}r_{lS} = e_{\bar{l}}\cdot{}^{\bar{l}|l}r_{lS}. \tag{1.88}$$

Put Eq. (1.82) into Eq. (1.88) to obtain:

$$e_{\bar{l}} \cdot {}^{\bar{l}}Q_l \cdot {}^{l}r_{lS} = e_{\bar{l}} \cdot {}^{\bar{l}|l}r_{lS};$$

Thus, $${}^{\bar{l}|l}r_{lS} = {}^{\bar{l}}Q_l \cdot {}^{l}r_{lS}. \tag{1.89}$$

Eqs. (1.85) and (1.89) result in:

$${}^{\bar{l}|l}r_{lS}^{T} = {}^{l}r_{lS}^{T} \cdot {}^{l}Q_{\bar{l}}, {}^{l}r_{lS}^{T} = {}^{\bar{l}|l}r_{lS}^{T} \cdot {}^{\bar{l}}Q_l. \tag{1.90}$$

Eqs. (1.89) and (1.90) are for coordinates variant or in another word for projection vector. Eq. (1.89) is the projection vector in RHS order. It projects the vector denoted by reference to frame # l at the right of the rotation matrix ${}^{\bar{l}}Q_l$ to frame # l at the left of the rotation matrix. Eq. (1.90) is the projection vector in LH order. It projects the vector denoted by reference to frame # $\bar{l}$ at the left of the rotation matrix ${}^{\bar{l}}Q_l$ to frame # $\bar{l}$ at the right of the rotation matrix.

The ${}^{\bar{l}}Q_l$ in forward order ${}^{\bar{l}}1_l$ represents rotation, which is the inverse process of the ${}^{l}Q_{\bar{q}}$ in backward order $-{}^{\bar{l}}1_l$. At natural zero-position, frame # $\bar{l}$ is aligned to frame # l; then rotate the initial frame # l to current frame # l to decided attitude.

The physical significance of Eq. (1.89) is as below: At natural zero-position, ${}_0{}^{\bar{l}}Q_l=1$, the point lS is fixed with link # l. After the rotation of link # l, ${}^{\bar{l}}Q_l \cdot {}^{l}r_{lS} = {}^{\bar{l}|l}r_{lS}$ is obtained, meaning that the ${}^{l}r_{lS}$ have been aligned with ${}^{\bar{l}|l}r_{lS}$.

Likewise, ${}^{\bar{\bar{l}}}Q_{\bar{l}} \cdot {}^{\bar{l}}Q_l \cdot {}^{l}r_{lS} = {}^{\bar{\bar{l}}|l}r_{lS}$ has the following meaning: At natural zero-position, ${}_0{}^{\bar{\bar{l}}}Q_{\bar{l}} = {}_0{}^{\bar{l}}Q_l = 1$, the point lS is fixed with link # l. After the rotation of link # l, ${}^{\bar{\bar{l}}}Q_{\bar{l}} \cdot 1 \cdot {}^{l}r_{lS} \rightarrow {}^{\bar{\bar{l}}|l}r_{lS}$, the two vectors gradually tend to align. After further rotation of link # l, ${}^{\bar{\bar{l}}}Q_{\bar{l}} \cdot {}^{\bar{l}}Q_l \cdot {}^{l}r_{lS} = {}^{\bar{\bar{l}}|l}r_{lS}$ is obtained, meaning that the ${}^{l}r_{lS}$ has been aligned with ${}^{\bar{\bar{l}}|l}r_{lS}$. This is a forward transition from root to leaf.

Apparently, the following equation can be derived:

$${}^{\bar{l}}\vec{r}_l = e_l \cdot {}^{l|\bar{l}} = -e_l \cdot {}^{l}r_{\bar{l}} = -{}^{l}\vec{r}_{\bar{l}};$$

Thus, $${}^{l|\bar{l}}r_{\bar{l}} = -{}^{l}r_{\bar{l}}. \tag{1.91}$$

First-Order Screw-Vector and 1st-Order Moment

For Eq. (1.52), the screw-vector is generated by the action effect due to the rotation of a vector with respect to another reference vector. Its direction is determined by right hand screw rule. Any screw-vector represents not only the operation but also the effect between two vectors. For an 1st-order screw-vector, the power of the vector on the left is 1; For a 2nd-order screw-vector, the power of the vector on the left is 2; And so on.

If we don't corcern the chain-ordering of screw-vectors, such 1st-order screw-vector is called 1st-order moment, and the 2nd-order screw-vector is called 2nd-order moment. The screw-vector and moment are dual, which is akin to the translation-rotation of screw motion and the force-torque of force screw.

Any vector ${}^{j}r_k$ and its 3D rotational velocity vector as ${}^{l}\omega_j$ meet $$\begin{gathered} {}^{l}\omega_j^T \cdot e_l^T \times e_l \cdot {}^{l|j}r_k = {}^{l}\omega_j^T \cdot \tilde{e}_l \cdot {}^{l|j}r_k = e_l \cdot {}^{l}\tilde{\omega}_j \cdot {}^{l|j}r_k \\ e_l \cdot {}^{l}\tilde{\omega}_j = {}^{l}\tilde{\omega}_j^T \cdot \tilde{e}_l \\ {}^{l}\omega_j \times {}^{l|j}r_k = {}^{l}\tilde{\omega}_j \cdot {}^{l|j}r_k \end{gathered}, \tag{1.92}$$

wherein $${}^{l}\tilde{\omega}_j \triangleq \begin{bmatrix} 0 & -{}^{l}\omega_j^{[3]} & {}^{l}\omega_j^{[2]} \\ {}^{l}\omega_j^{[3]} & 0 & -{}^{l}\omega_j^{[1]} \\ -{}^{l}\omega_j^{[2]} & {}^{l}\omega_j^{[1]} & 0 \end{bmatrix}. \tag{1.93}$$

PROOF: According to Eq. (1.76), obtain $${}^{l}\omega_j^T \cdot e_l^T \times e_l \cdot {}^{l|j}r_k = {}^{l}\omega_j^T \cdot \tilde{e}_l \cdot {}^{l|j}r_k =$$
$$e_l^{[x]} \cdot \left({}^{l}\omega_j^{[2]} \cdot {}^{l|j}r_k^{[3]} - {}^{l}\omega_j^{[3]} \cdot {}^{l|j}r_k^{[2]}\right) \backslash e_l^{[y]} \cdot \left({}^{l}\omega_j^{[1]} \cdot {}^{l|j}r_k^{[3]} - {}^{l}\omega_j^{[3]} \cdot {}^{l|j}r_k^{[1]}\right) +$$
$$e_l^{[z]} \cdot \left({}^{l}\omega_j^{[1]} \cdot {}^{l|j}r_k^{[2]} - {}^{l}\omega_j^{[2]} \cdot {}^{l|j}r_k^{[1]}\right),$$

wherein \ is for line continuation. Additionally, $$e_l \cdot {}^{l}\omega_j \times e_l \cdot {}^{l|j}r_k = \begin{bmatrix} e_l^{[x]} & e_l^{[y]} & e_l^{[z]} \end{bmatrix} \cdot \begin{bmatrix} 0 & -{}^{l}\omega_j^{[3]} & {}^{l}\omega_j^{[2]} \\ {}^{l}\omega_j^{[3]} & 0 & -{}^{l}\omega_j^{[1]} \\ -{}^{l}\omega_j^{[2]} & {}^{l}\omega_j^{[1]} & 0 \end{bmatrix} \cdot \begin{bmatrix} {}^{l|j}r_k^{[1]} \\ {}^{l|j}r_k^{[2]} \\ {}^{l|j}r_k^{[3]} \end{bmatrix}.$$
$$= \begin{matrix} e_l^{[x]} \cdot \left({}^{l}\omega_j^{[2]} \cdot {}^{l|j}r_k^{[3]} - {}^{l}\omega_j^{[3]} \cdot {}^{l|j}r_k^{[2]}\right) - e_l^{[y]} \cdot \left({}^{l}\omega_j^{[1]} \cdot {}^{l|j}r_k^{[3]} - {}^{l}\omega_j^{[3]} \cdot {}^{l|j}r_k^{[1]}\right) \\ \backslash + e_l^{[z]} \cdot \left({}^{l}\omega_j^{[1]} \cdot {}^{l|j}r_k^{[2]} - {}^{l}\omega_j^{[2]} \cdot {}^{l|j}r_k^{[1]}\right) \end{matrix}$$

Therefore $${}^{l}\omega_j^T \cdot e_l^T \times e_l \cdot {}^{l|j}r_k = e_l \cdot \begin{bmatrix} {}^{l}\omega_j^{[2]} \cdot {}^{l|j}r_k^{[3]} - {}^{l}\omega_j^{[3]} \cdot {}^{l|j}r_k^{[2]} \\ {}^{l}\omega_j^{[3]} \cdot {}^{l|j}r_k^{[1]} - {}^{l}\omega_j^{[1]} \cdot {}^{l|j}r_k^{[3]} \\ {}^{l}\omega_j^{[1]} \cdot {}^{l|j}r_k^{[2]} - {}^{l}\omega_j^{[2]} \cdot {}^{l|j}r_k^{[1]} \end{bmatrix} = e_l \cdot {}^{l}\tilde{\omega}_j \cdot {}^{l}r_k,$$

$e_l{}^{l}\tilde{\omega}_j = {}^{l}\omega_j^{T} \cdot \tilde{e}_l$, and ${}^{l}\omega_j \times {}^{l|j}r_k = {}^{l}\tilde{\omega}_j \cdot {}^{l|j}r_k$ coordinate form. Q.E.D.

According to Eq. (1.92), we know

[1] The vector ${}^{l}\omega_k$ can determine its unique Screw-Matrix ${}^{l}\tilde{\omega}_k$. ${}^{l}\omega_k$ is called the axis-vector of ${}^{l}\tilde{\omega}_k$.

[2] The vector product calculation of coordinate vectors can be replaced by the product calculation "·" of corresponding vector product matrix. In this book, "×", the symbol representing vector product calculation is generally not used again.

[3] The ${}^{l}\tilde{\omega}_j \cdot {}^{l|j}r_k$ represents the coupling of translation and rotation. The $\tilde{e}_l$ is the tangent frame of $e_l$, so ${}^{l}\tilde{\omega}_j \cdot {}^{l|j}r_k$ represents the tangent vector from ${}^{l}\tilde{\omega}_j$ to ${}^{l}r_k$. The $\tilde{e}_l$ is orthogonal to $e_l$, so in Eq. (1.92), ${}^{l}\tilde{\omega}_j$ represents the screw transformation of ${}^{l|j}r_k$, meaning that ${}^{l}\tilde{\omega}_j \cdot {}^{l|j}r_k$ is the orthogonal vector from the coordinate vector ${}^{l}\omega_j$ to ${}^{l|j}r_k$.

[4] The rotation in the root direction leads to the translation in the leaf direction, complying with the chain index offset law of $j^j$, which reflecting the duality between translation and rotation. The projection operator clearly expresses the interaction relations of the chaining orders and is easy to write.

The forward 1st-order screw-vector of ${}^{\bar{l}}\omega_l$ with respect to ${}^{l}r_{lS}$ is ${}^{\bar{l}}\tilde{\omega}_l \cdot {}^{l}r_{lS}$, and the backward 1st-order screw-vector (LHSR) of ${}^{\bar{l}}\omega_l$ with respect to ${}^{l}r_{lS}$ is ${}^{\bar{l}|l}\tilde{r}_{lS} \cdot {}^{\bar{l}}\omega_l$, ${}^{\bar{l}|l}r_{lS} \cdot {}^{\bar{l}}\omega_l = -{}^{\bar{l}}\tilde{\omega}_l \cdot {}^{l}r_{lS}$. The screw-vector with the forward CO describes the action from left to right. However, the vector product with the backward CO shows the vector product form right to left, thus they are dual.

The velocity ${}^{\bar{i}|\bar{l}}\tilde{\omega}_k \cdot {}^{i|k}r_k$ and torque moment ${}^{\bar{i}|\bar{l}}\tilde{r}_k \cdot {}^{i|k}f_{\bar{k}}$ are of screw-vectors. For the two screw-vectors, the order of angular velocity ${}^{\bar{i}|\bar{l}}\omega_k$ and force ${}^{i|k}f_{\bar{k}}$ are dual, and the first one obeys the forward order, the second one obeys the backward order. It is shown that the motion state and the effect of force are also dual. They are often represented on two sides of equations, otherwise either of them needs to add "—" for changing the order.

The following equation is workable:

$$-{}^{l|j}\tilde{r}_k \cdot {}^l\omega_j = {}^l\tilde{\omega}_j \cdot {}^{l|j}\tilde{r}_k. \tag{1.94}$$

PROOF: As $$\begin{bmatrix} 0 & -{}^lw_j^{[3]} & {}^lw_j^{[2]} \\ {}^lw_j^{[3]} & 0 & -{}^lw_j^{[1]} \\ -{}^lw_l^{[2]} & {}^lw_j^{[1]} & 0 \end{bmatrix} \cdot \begin{bmatrix} {}^{l|j}r_k^{[1]} \\ {}^{l|j}r_k^{[2]} \\ {}^{l|j}r_k^{[3]} \end{bmatrix} = \begin{bmatrix} {}^lw_j^{[2]} \cdot {}^{l|j}r_k^{[3]} - {}^lw_j^{[3]} \cdot {}^{l|j}r_k^{[2]} \\ {}^lw_j^{[3]} \cdot {}^{l|j}r_k^{[1]} - {}^lw_j^{[1]} \cdot {}^{l|j}r_k^{[3]} \\ {}^lw_j^{[1]} \cdot {}^{l|j}r_k^{[2]} - {}^lw_j^{[2]} \cdot {}^{l|j}r_k^{[1]} \end{bmatrix}, \tag{1.95}$$

Additionally, $$\begin{bmatrix} 0 & {}^{l|j}r_k^{[3]} & -{}^{l|j}r_k^{[2]} \\ -{}^{l|j}r_k^{[3]} & 0 & {}^{l|j}r_k^{[1]} \\ {}^{l|j}r_k^{[2]} & {}^{l|j}r_k^{[1]} & 0 \end{bmatrix} \cdot \begin{bmatrix} {}^lw_j^{[1]} \\ {}^lw_j^{[2]} \\ {}^lw_j^{[3]} \end{bmatrix} = \begin{bmatrix} {}^lw_j^{[2]} \cdot {}^{l|j}r_k^{[3]} - {}^lw_j^{[3]} \cdot {}^{l|j}r_k^{[2]} \\ {}^lw_j^{[3]} \cdot {}^{l|j}r_k^{[1]} - {}^lw_j^{[1]} \cdot {}^{l|j}r_k^{[3]} \\ {}^lw_j^{[1]} \cdot {}^{l|j}r_k^{[2]} - {}^lw_j^{[2]} \cdot {}^{l|j}r_k^{[1]} \end{bmatrix}.$$

Thus, Eq. (1.95) is workable. Q.E.D.

By comparison of Eq. (1.68) with Eq. (1.93), it can be known that the screw-matrix of coordinate bases has opposite chaining order to the vector product of coordinate vectors which reflects the duality between the basis vector and the coordinate vector. Eq. (1.93) is to convert the vector product in geometry form into the screw-matrix in algebra form.

The simple rotation around an axis is only a special form of rotation. When a rigid-body rotates around an axis under the space, the rotation matrix can be exclusively determined by the axis-vector and the rotational angle. A vector has a unique corresponding screw-matrix and the former is the axis-vector of the latter.

DEFINITION 12. The coordinate vector ${}^l\omega_j$ is called as axis-vector of its screw-matrix ${}^l\tilde{\omega}_j$. It is represented as below.

$${}^l\omega_j = \mathrm{Vector}({}^l\tilde{\omega}_j) \tag{1.96}$$

Any matrix ${}^kM_l$ can be reexpressed as $${}^kM_l = {}^kM_l^S + {}^kM_l^{DS},$$

wherein ${}^kM_l^S = ({}^kM_l — {}^kM_l^T/2$—a symmetric matrix, ${}^kM_l^{DS} = ({}^kM_l - {}^kM_l^T)/2$—an orthogonal screw-matrix. And it is known that ${}^kM_l^{DS}$ has a unique axis-vector.

DEFINITION 13. the axis vector of the screw matrix ${}^kM_l^{DS}$ of the matrix ${}^kM_l$ is called as the axis-vector of the matrix ${}^kM_l$.

It can be derived from the definitions above that $$\mathrm{Vector}({}^kM_l^{DS}) = \mathrm{Vector}({}^kM_l); \tag{1.97}$$

Thus, $$\mathrm{Vector}({}^lM_l) = \frac{1}{2}\begin{bmatrix} {}^lM_l^{[3][y]} - {}^lM_l^{[2][z]} \\ {}^lM_l^{[1][z]} - {}^lM_l^{[3][x]} \\ {}^lM_l^{[2][x]} - {}^lM_l^{[1][y]} \end{bmatrix}, \ \mathrm{Trace}({}^kM_l^D) = \mathrm{Trace}({}^{\bar{l}|k}M_l^D). \tag{1.98}$$

Given a vector ${}^{\bar{l}}\omega_l$ and a vector ${}^lr_k$, $$-2\cdot\mathrm{Vector}({}^{\bar{l}}\omega_l \cdot {}^{\bar{l}|l}r_k^T) = {}^{\bar{l}}\tilde{\omega}_l \cdot {}^{\bar{l}|l}r_k. \tag{1.99}$$

PROOF: ${}^{\bar{l}}\omega_l \cdot {}^{\bar{l}|l}r_k^T - {}^{\bar{l}|l}r_k^T \cdot {}^{\bar{l}}\omega_l^T$ is an screw-matrix and is the screw-matrix part of the matrix $({}^{\bar{l}}\omega_l \cdot {}^{\bar{l}|l}r_k^T$. For $\forall {}^{\bar{l}}p_*$ (* represents any symbol), $${}^{\bar{l}}\omega_l \cdot {}^{\bar{l}|l}r_k^T - {}^{\bar{l}|l}r_k \cdot {}^{\bar{l}}\omega_l^T) \cdot {}^lp_* = {}^{\bar{l}}\omega_l \cdot {}^{\bar{l}|l}r_k^T \cdot {}^lp_* - {}^{\bar{l}|l}r_k \cdot {}^{\bar{l}}\omega_l^T \cdot {}^lp_*.$$

Eq. (1.96) results in:

$$\begin{aligned} \left(-\frac{1}{2}\cdot[\text{illegible}]\right)\cdot {}^lp_* &= \frac{1}{2}\cdot {}^{\bar{l}}\tilde{p}_* \cdot \left({}^{\bar{l}}\tilde{\omega}_l \cdot {}^{\bar{l}|l}r_k\right) \\ &= \frac{1}{2}\cdot\left(\left({}^{\bar{l}}p_*^T \cdot {}^{\bar{l}|l}r_k\right)\cdot {}^{\bar{l}}\omega_l - \left({}^{\bar{l}}\omega_l^T \cdot {}^{\bar{l}}p_*\right)\cdot {}^{\bar{l}|l}r_k\right)\cdot \\ &\quad -\frac{1}{2}\cdot\left({}^{\bar{l}}\omega_l \cdot \left({}^{\bar{l}|l}r_k^T \cdot {}^{\bar{l}}p_*\right) - {}^{\bar{l}|l}r_k \cdot \left({}^{\bar{l}}\omega_l^T \cdot {}^{\bar{l}}p_*\right)\right) \end{aligned}$$

By considering the definition of the axis-vector expressed by Eq. (1.97), it is known that Eq. (1.99) is workable. Q.E.D.

According to Eq. (1.99), the axis-vector of the outer product of two coordinate vectors is determined by their vector product calculation. From Eqs. (1.69) and (1.97), the coordinate axis-vectors ${}^{\bar{l}}n_l$ with positive chaining order are self-consistent to basis vector $e_l$ with inverse chaining order.

Orthogonal Projection of 2nd-Order Tensors

The projection of ${}^k\vec{\vec{J}}_{lS}$ under the frame j is denoted as ${}^{j|k}J_{lS}$. The 2nd-order tensor is invariable, therefore, $${}^k\vec{\vec{J}}_{lS} - e_k \cdot {}^kJ_{lS} \cdot e_k^T - e_j \cdot {}^{j|k}J_{lS} \cdot e_j^T. \tag{1.100}$$

${}^k\vec{\vec{J}}_{lS} - e_k \cdot {}^kJ_{lS} \cdot e_k^T$ and ${}^k\vec{\vec{J}}_{lS} - e_j \cdot {}^{j|k}J_{lS} \cdot e_j^T$ are a 2nd-order polynomial of the base and take the form of scalar, so the 2nd-order tensor is an invariant. Eq. (1.89) results in:

$$e_k \cdot {}^kJ_{lS} \cdot e_k^T = e_j \cdot {}^jQ_k \cdot {}^kJ_{lS} \cdot {}^kQ_j \cdot e_j^T = e_j \cdot {}^{j|k}J_{lS} \cdot e_j^T.$$

Therefore $${}^{j|k}J_{lS} = {}^jQ_k \cdot {}^kJ_{lS} \cdot {}^kQ_j. \tag{1.101}$$

Eq. (1.101) is the transformation for the 2nd-order tensor coordinate matrix, i.e. the similar transformation in linear algebra. The similar transformation is the coordinate transformation, i.e. projection, of the 2nd-order tensor. Likewise, the projection of 2nd-order tensors can clearly express the chaining order relations and is easy to write. In Eq. (1.101), the k of the 2nd-order tensor ${}^kJ_{lS}$ has its null chain (k,k], which can offset the two k of ${}^jQ_k$, and ${}^kQ_j$.

Forward Recursion Vs. Inverse Iteration of Axis-Chains

Given the AC ${}^{\bar{l}}1_{lS}$, the following can be derived:

$${}^{\bar{l}}\vec{r}_{lS} = {}^{\bar{l}}\vec{r}_l + {}^l\vec{r}_{lS}. \tag{1.102}$$

Equivalently $$e_{\bar{l}} \cdot {}^{\bar{l}}r_{lS} = e_{\bar{l}} \cdot {}^{\bar{l}}r_l + e_l \cdot {}^lr_{lS}. \tag{1.103}$$

Eqs. (1.82) and (1.103) result in:

$$e_{\bar{l}} \cdot {}^{\bar{l}}r_{lS} = e_{\bar{l}} \cdot {}^{\bar{l}}r_l + e_{\bar{l}} \cdot {}^{\bar{l}}Q_l \cdot {}^lr_{lS}; \tag{1.104}$$

Thus, $${}^{\bar{l}}r_{lS} = {}^{\bar{l}}r_l + {}^{\bar{l}}Q_l \cdot {}^lr_{lS}. \tag{1.105}$$

Eq. (1.105) has the following physical significance: At natural zero-position, all points and attitudes are aligned, and lS is fixed with frame # l. At first, the ${}^{\bar{l}}r_l$ stands for the translation of ${}^lr_{lS}$ from $O_{\bar{l}}$ to $O\bar{l}$. Next, the ${}^{\bar{l}}Q_l \cdot {}^lr_{lS}$ stands for the rotation of ${}^lr_{lS}$, and the ${}^lr_{lS}$ is aligned with ${}^{\bar{l}}r_{lS}$.

By considering the AC ${}^0 1_{3S}$=0:3,3S] (the motion process is a forward iteration from root to leaf), the following is derived:

$${}^0r_1 + {}^0Q_1 \cdot ({}^1r_2 + {}^1Q_2 \cdot ({}^2r_3 + {}^2Q_3 \cdot {}^3r_{3C})) = {}^0r_{3C}.$$

Evidently, the prior equation is an inverse recursive process which equivalent to the forward iterative process.

$${}^{0}r_1+{}^{0|1}r_2+{}^{0|2}r_3+{}^{0|3}r_{3C}={}^{0}r_{3C}.$$

The equation above has the following physical significance: The ${}^{0|1}r_2$ stands for the projection of ${}^{1}r_2$ to frame #0; The ${}^{0|2}r_3$ stands for the projection of ${}^{2}r_3$ to frame #0; The (${}^{0|3}r_{3C}$ stands for the projection of ${}^{3}r_{3C}$ to frame #0; All projection vectors is equivalent to ${}^{0}r_{3C}$.

Eq. (1.105) is re-expressed as follows:

$${}^{\bar{l}}\bar{r}_{lS}={}^{\bar{l}}R_l\cdot{}^{l}\bar{r}_{lS}, \tag{1.106}$$

wherein $${}^{\bar{l}}\bar{r}_{lS}=\begin{bmatrix}{}^{\bar{l}}r_{lS}\\1\end{bmatrix},\ {}^{l}\bar{r}_{lS}=\begin{bmatrix}{}^{l}r_{lS}\\1\end{bmatrix},\ {}^{\bar{l}}R_l=\begin{bmatrix}{}^{\bar{l}}Q_l & {}^{\bar{l}}r_l\\0_3^T & 1\end{bmatrix}. \tag{1.107}$$

The ${}^{\bar{l}}\bar{r}_{lS}$ and ${}^{l}\bar{r}_{lS}$ are respectively referred to as the homogeneous coordinates of ${}^{\bar{l}}r_{lS}$ and ${}^{l}r_{lS}$. ${}^{\bar{l}}R_l$ is called the transformation matrix of the primitive Joint Pair ${}^{\bar{l}}k_l$.

[1] Homogeneous Inverse Transformation

Eqs. (1.103) and (1.55) result in:

$${}^{l}r_{lS}={}^{l}Q_{\bar{l}}\cdot{}^{\bar{l}}r_{lS}-{}^{l}Q_{\bar{l}}\cdot{}^{\bar{l}}r_l={}^{l}Q_{\bar{l}}\cdot{}^{\bar{l}}r_{lS}+{}^{l}r_{\bar{l}}. \tag{1.108}$$

Eq. (1.108) is re-expressed as follows:

$${}^{l}\bar{r}_{lS}={}^{l}R_{\bar{l}}\cdot{}^{\bar{l}}\bar{r}_{lS}, \tag{1.109}$$

wherein $${}^{l}R_{\bar{l}}=\begin{bmatrix}{}^{l}Q_{\bar{l}} & {}^{l}r_{\bar{l}}\\0_3^T & 1\end{bmatrix}=\begin{bmatrix}{}^{l}Q_{\bar{l}} & -{}^{l|\bar{l}}r_l\\0_3^T & 1\end{bmatrix}. \tag{1.110}$$

[2] Concatenation of Homogeneous Transformation Matrix $${}^{\bar{\bar{l}}}R_l={}^{\bar{\bar{l}}}R_{\bar{l}}\cdot{}^{\bar{l}}R_l. \tag{1.111}$$

PROOF:

$$\begin{aligned}{}^{\bar{\bar{l}}}R_{\bar{l}}\cdot{}^{\bar{l}}R_l&=\begin{bmatrix}{}^{\bar{\bar{l}}}Q_{\bar{l}} & {}^{\bar{\bar{l}}}r_{\bar{l}}\\0_3^T & 1\end{bmatrix}\cdot\begin{bmatrix}{}^{\bar{l}}Q_l & {}^{\bar{l}}r_l\\0_3^T & 1\end{bmatrix}\\&=\begin{bmatrix}{}^{\bar{\bar{l}}}Q_{\bar{l}}\cdot{}^{\bar{l}}Q_l & {}^{\bar{\bar{l}}}r_{\bar{l}}+{}^{\bar{\bar{l}}}Q_{\bar{l}}\cdot{}^{\bar{l}}r_l\\0_3^T & 1\end{bmatrix}=\begin{bmatrix}{}^{\bar{\bar{l}}}Q_l & {}^{\bar{\bar{l}}}r_l\\0_3^T & 1\end{bmatrix}={}^{\bar{\bar{l}}}R_l\end{aligned}.$$

Q.E.D.

Eq. (1.111) indicates that the homogeneous transformation matrix can be connected in series.

[3] Chain Symbols of Scaling Homogeneous Transformation

The homonymous body of link # l is denoted as # l', i.e. l=l'. The zooming vector from link # l to its homonymous body l' is denoted as ${}^{l}c_{l'}$ and the corresponding scaling matrix as ${}^{l}C_{l'}$. ${}^{l}c_{l'}$ is called the axis-vector of ${}^{l}C_{l'}$, wherein $${}^{l}C_{l'}=\begin{bmatrix}{}^{l}c_{l'}^{[x]} & 0 & 0\\0 & {}^{l}c_{l'}^{[y]} & 0\\0 & 0 & {}^{l}c_{l'}^{[z]}\end{bmatrix}$$

Thus, the following scale transformation is obtained, $${}^{l}r_{l'S}={}^{l}C_{l'}\cdot{}^{l'}r_{l'S}=\begin{bmatrix}{}^{l}c_{l'}^{[x]}\cdot{}^{l'}r_{l'S}^{[x]}\\{}^{l}c_{l'}^{[y]}\cdot{}^{l'}r_{l'S}^{[y]}\\{}^{l}c_{l'}^{[z]}\cdot{}^{l'}r_{l'S}^{[z]}\end{bmatrix}.$$

The vector ${}^{l}r_{l'S}$ represents the vector ${}^{l'}r_{l'S}$ scaled by ${}^{l}C_{l'}$. Apparently, the following equation can be derived:

$${}^{l}C_{l'}^{-1}=\begin{bmatrix}1/{}^{l}c_{l'}^{[x]} & 0 & 0\\0 & 1/{}^{l}c_{l'}^{[y]} & 0\\0 & 0 & 1/{}^{l}c_{l'}^{[z]}\end{bmatrix}.$$

The scaling homogeneous transformation matrix is denoted as below, $${}^{l}R_{l'}=\begin{bmatrix}{}^{l}C_{l'} & {}^{l}0\\0_3^T & 1\end{bmatrix},$$

thus, $${}^{l}\bar{r}_{lS}={}^{l}R_{l'}\cdot{}^{l'}\bar{r}_{lS}.$$

As $${}^{\bar{l}}R_l\cdot{}^{l}R_{l'}=\begin{bmatrix}{}^{\bar{l}}Q_l & {}^{\bar{l}}r_l\\0_3^T & 1\end{bmatrix}\cdot\begin{bmatrix}{}^{l}C_{l'} & {}^{l}0\\0_3^T & 1\end{bmatrix}=\begin{bmatrix}{}^{\bar{l}}Q_l\cdot{}^{l}C_{l'} & {}^{\bar{l}}r_l\\0_3^T & 1\end{bmatrix},$$

thus, $$\begin{aligned}{}^{\bar{l}}R_l\cdot{}^{l}R_{l'}\cdot{}^{l'}r_{l'S}&=\begin{bmatrix}{}^{\bar{l}}Q_l\cdot{}^{l}C_{l'} & {}^{\bar{l}}r_l\\0_3^T & 1\end{bmatrix}\cdot\begin{bmatrix}{}^{l'}r_{l'S}\\1\end{bmatrix}\\&=\begin{bmatrix}{}^{\bar{l}}r_l+{}^{\bar{l}}Q_l\cdot{}^{l}C_{l'}\cdot{}^{l'}r_{l'S}\\1\end{bmatrix}=\begin{bmatrix}{}^{\bar{l}}r_{lS}\\1\end{bmatrix}={}^{\bar{l}}r_{l'S}\end{aligned}.$$

Equivalently $${}^{\bar{l}}\bar{r}_{lS}={}^{\bar{l}}R_l\cdot{}^{l}R_{l'}\cdot{}^{l'}\bar{r}_{lS}. \tag{1.112}$$

The chaining order at the right of Eq. (1.112) is ${}^{\bar{l}}1_{l'}\cdot{}^{\bar{l}}r_l+{}^{\bar{l}}Q_l\cdot{}^{l}C_{l'}\cdot{}^{l'}r_{l'S}$ physically means the forward transformation process of "translation→rotation→zooming".

As $${}^{l'}R_l\cdot{}^{l}R_{\bar{l}}=\begin{vmatrix}{}^{l'}C_l & 0\\0_3^T & 1\end{vmatrix}\cdot\begin{vmatrix}{}^{l}Q_{\bar{l}} & {}^{l}r_{\bar{l}}\\0_3^T & 1\end{vmatrix}=\begin{bmatrix}{}^{l'}C_l\cdot{}^{l}Q_{\bar{l}} & {}^{l'}C_l\cdot{}^{l}r_{\bar{l}}\\0_3^T & 1\end{bmatrix},$$

thus, $$\begin{aligned}{}^{l'}R_l\cdot{}^{l}R_{\bar{l}}\cdot{}^{\bar{l}}r_{l'S}&=\begin{bmatrix}{}^{l'}C_l\cdot{}^{l}Q_i & {}^{l'}C_l\cdot{}^{l}r_i\\0_3^T & 1\end{bmatrix}\cdot\begin{bmatrix}{}^{l'}r_{l'S}\\1\end{bmatrix}=\begin{bmatrix}{}^{l'}C_l\cdot({}^{l}Q_{\bar{l}}\cdot{}^{\bar{l}}r_{l'S}+{}^{l}r_{\bar{l}})\\1\end{bmatrix}\\&=\begin{bmatrix}{}^{l'}C_l\cdot{}^{l}r_{\bar{l}}+{}^{l'}C_l\cdot{}^{l}Q_{\bar{l}}\cdot\left({}^{\bar{l}}r_l+{}^{\bar{l}|l}r_{l'S}\right)\\1\end{bmatrix}=\begin{bmatrix}{}^{l'}r_{l'S}\\1\end{bmatrix}\end{aligned}.$$

Equivalently $$^{l}r_{\cdot lS}={}^{l'}R_{l'}\cdot{}^{l}R_{\bar{l}}\cdot{}^{\bar{l}}r_{\cdot lS}\,. \quad (1.113)$$

The chaining order at the right of Eq. (1.113) is $-^{\bar{l}}1_{l'}$. The $^{l'}C_{l'}\cdot(^{l}Q_{\bar{l}}\cdot{}^{\bar{l}}r_{l'S}+{}^{l}r_{\bar{l}})$ physically means the backward transformation process of "zooming→rotation→translation".

The zooming homogeneous transformation is extensively used in 3D system. In the robot, the body l' is generally a profiled link. The drawing unit used by the mechanical drawing may be different from the units used in the analysis of robot motion and in the navigation control. Or the robot link has triaxial deformation. A point l'S on the link l' usually needs to undergo triaxial zooming according to the system l'. The body after zooming is the homonymous body l. During the machine vision measurement, the lens realizes the variable zooming transformation of the object point l'S and the image point lS. The zooming homogeneous transformation is often used in the machine vision computation. Therefore, the zooming homogeneous transformation is one of the fundamental operation methods used in the analysis of robot AC.

[4] Homogeneous Coordinates of Points at Infinity $$\text{If } \left|{}^{\bar{l}}r_{lS}\right|=\infty,\ {}^{\bar{l}}r_{lS}\Big/\left|{}^{\bar{l}}r_{lS}\right|=\lim_{\left|{}^{\bar{l}}r_{lS}\right|\to\infty}\left(\begin{bmatrix}{}^{\bar{l}}r_{lS}\\1\end{bmatrix}\Big/\left|{}^{\bar{l}}r_{lS}\right|\right)=\begin{bmatrix}{}^{\bar{l}}r_{lS}\Big/\left|{}^{\bar{l}}r_{lS}\right|\\0\end{bmatrix}. \quad (1.114)$$

According to Eq. (1.114), a vector at infinity has only direction and its position is hard to determine. The space formed by homogeneous coordinates has four dimensions, but the homogeneous coordinates are arrays instead of vectors.

According to Eq. (1.114), the homogeneous transformation is only applicable to fixed vectors, reflecting that the motion of one predecessing link will lead to that of all succeeding links. The homogeneous transformation is not applicable to free vectors (e.g. angular velocity vector and rotation vector).

2.6.1 Orthogonal Screw of the Axis-Vector

The axis-vector of the angular velocity $^{\bar{l}}\omega_l$ is denoted as $^{\bar{l}}n_l$. If the $^{\bar{l}}n_l$ is a constant vector, $$^{\bar{l}}\phi_l=\int_0^t{}^{\bar{l}}\omega_l\cdot dt=\int_0^t\dot{\phi}_l^{\bar{l}}\cdot{}^{\bar{l}}n_l\cdot dt={}^{\bar{l}}n_l\cdot\phi_l^{\bar{l}}. \quad (1.115)$$

The following is defined:

$$^{\bar{l}}\phi_l={}^{\bar{l}}n\cdot\phi_l^{\bar{l}},\ {}^{\bar{l}}n_l=\text{Vector}(^{\bar{l}}\tilde{n}_l). \quad (1.116)$$

The $^{\bar{l}}\phi_l$ is called the rotation vector, wherein $\phi$ is the rotation property symbol. The rotation vector/angular vector $^{\bar{l}}\phi_l$ is a free vector, meaning that it can be translated to any position. The screw-matrix including the rotation vector is as below, $$^{\bar{l}}\tilde{\phi}_l={}^{\bar{l}}\tilde{n}_l\cdot\phi_l^{\bar{l}}=\phi_l^{\bar{l}}\cdot\begin{bmatrix}0&-{}^{\bar{l}}n_l^{[3]}&{}^{\bar{l}}n_l^{[2]}\\{}^{\bar{l}}n_l^{[3]}&0&-{}^{\bar{l}}n_l^{[1]}\\-{}^{\bar{l}}n_l^{[2]}&{}^{\bar{l}}n_l^{[1]}&0\end{bmatrix}. \quad (1.117)$$

It means that $^{\bar{l}}n_l\cdot\phi_l^{\bar{l}}$ is the axis-vector of $^{\bar{l}}\tilde{\phi}_l$, and $^{\bar{l}}n_l$ is the unit axis-vector of rotation vector $^{\bar{l}}\phi_l$. From Eq. (1.51), the $^{\bar{l}}\tilde{n}_l$ is the 1st-order orthogonal screw of the screw-axis $^{\bar{l}}n_l$, and $$^{\bar{l}}\tilde{n}_l^{:k}$$

is the kth-order orthogonal screw.

Obviously, $^{\bar{l}}n_l^{T}\cdot{}^{\bar{l}}\phi_l={}^{\bar{l}}n_l^{T}\cdot{}^{\bar{l}}n_l\cdot\phi_l^{\bar{l}}={}^{\bar{l}}n_l^{T}\cdot{}^{\bar{l}}n_l\cdot\phi_l^{\bar{l}}=\phi_l^{\bar{l}}$, where $\phi_l^{\bar{l}}$ is a scalar. It is a natural coordinate or a Joint Variable. The $\phi_l^{\bar{l}}$ is the inner product/projection of the rotation vector $^{\bar{l}}\phi_l$ and the axis-vector $^{\bar{l}}n_l$. In another word, it represents the angle between $^{\bar{l}}\phi_l$ and $^{\bar{l}}n_l$. The rotation vector $^{\bar{l}}\phi_l$ represents the rotation around the unit axis-vector $^{\bar{l}}n_l$ for an angle of $\phi_l^{\bar{l}}$.

In the COSS, the rotation property is expressed by the rotation vector $^{\bar{l}}\phi_l$ and the translation property is expressed by the translation vector $^{\bar{l}}r_l$ They respectively represent rotation operation and translation operation.

The rotation vector $^{\bar{l}}\phi_l$ represents the rotation around a fixed axis-vector and is also called fixed-axis rotation. The kinematic quantity of revolute joint pair $^{\bar{l}}R_l$ in the robotic system is represented by the fixed-axis vector $^{\bar{l}}n_l$ or $^{l}n_{\bar{l}}$ and the angular position $\phi_l^{\bar{l}}$ or $\phi_{\bar{l}}^{l}$. The rotation vector $^{\bar{l}}\phi_l$ or $^{l}\phi_{\bar{l}}$ is the most natural expression of rotation. The kinematic quantity of prismatic joint pair $^{\bar{l}}P_l$ is represented by the fixed-axis vector $^{\bar{l}}n_l$ or $^{l}n_{\bar{l}}$ and the angular position $r_l^{\bar{l}}$ or $r_{\bar{l}}^{l}$. The translation vector $^{\bar{l}}r_l$ or $^{l}n_{\bar{l}}$ is a natural expression of translation.

The natural expression has the following meanings:

[1] The rotation vector $^{\bar{l}}\phi_l$ is equivalent to the rotation matrix $^{\bar{l}}Q_l$. It has 3 independent DOFs without any redundant constraint and is the fundamental guarantee for a concise chain symbolic calculus system.

[2] The rotational axis $^{\bar{l}}n_l$ of the rotation vector $^{\bar{l}}\phi_l$ is a constant vector against frame # l. The axis-vector $^{\bar{l}}n_l$ of the revolute joint $^{\bar{l}}R_l$ is expressed as a constant vector against frame # $\bar{l}$.

[3] The $^{\bar{l}}n_l$ is a constant or an invariant with respect to frames # $\bar{l}$ and # l.

The priority of the operation of the vector product symbol $\tilde{\square}$ is higher than that of the projection operation $|\square$. Assume that the screw-matrix $^{\bar{l}}\tilde{r}_l$ of a vector $^{\bar{l}}r_l$ is a 2nd-order tensor, meaning that $$^{\bar{l}|l}\tilde{r}_k={}^{\bar{l}}Q_l\cdot{}^{l}\tilde{r}_k\cdot{}^{l}Q_{\bar{l}}; \quad (1.118)$$

Then $$^{\overline{l|l}}\tilde{r}_k=-2\cdot\text{Vector}\left({}^{\bar{l}|l}r_k\cdot{}^{l}Q_{\bar{l}}^{[x]:T},\ {}^{\bar{l}|l}r_k\cdot{}^{l}Q_{\bar{l}}^{[y]:T},\ {}^{\bar{l}|l}r_k\cdot{}^{l}Q_{\bar{l}}^{[z]:T}\right)\cdot{}^{\bar{l}}Q_l. \quad (1.119)$$

PROOF: According to Eq. (1.97):

$$^{l}r_k=\text{Vector}(^{l}\tilde{r}_k).$$

Additionally, $$(^{\bar{l}}Q_l\cdot{}^{l}\tilde{r}_k\cdot{}^{l}Q_{\bar{l}})=-{}^{\bar{l}}Q_l\cdot{}^{l}\tilde{r}_k\cdot{}^{l}Q_{\bar{l}}.$$

Equivalently, $^{\bar{l}}Q_l\cdot{}^{l}\tilde{r}_k\cdot{}^{l}Q_{\bar{l}}$ is a screw-matrix. From Eq. (1.95), obtain $$-2\cdot\text{Vector}\left({}^{\bar{l}|l}r_k\cdot{}^{l}Q_{\bar{l}}^{[n]:T}\right)={}^{\bar{l}|l}\tilde{r}_k\cdot{}^{l}Q_{\bar{l}}^{[n]}.$$

Thus, $$-2\cdot\text{Vector}\left({}^{\overline{l|l}}r_k\cdot{}^{l}Q_{\bar{l}}^{[x]:T},\ {}^{\overline{l|l}}r_k\cdot{}^{l}Q_{\bar{l}}^{[y]:T},\ {}^{\overline{l|l}}r_k\cdot{}^{l}Q_{\bar{l}}^{[z]:T}\right)={}^{\overline{l|l}}\tilde{r}_k\cdot\left[{}^{l}Q_{\bar{l}}^{[x]},\ {}^{l}Q_{\bar{l}}^{[y]},\ {}^{l}Q_{\bar{l}}^{[z]}\right].$$

Thus, Eq. (1.115) is workable.

The screw-matrix ${}^{\bar{l}}\tilde{\omega}_{\bar{l}}$ of the angular velocity ${}^{\bar{l}}\omega_{\bar{l}}$ is also a 2nd-order tensor, meaning that $$ {}^{\bar{l}|l}\tilde{\omega}_{\bar{l}}={}^{\bar{l}}Q_{l}\cdot{}^{l}\tilde{\omega}_{\bar{l}}\cdot{}^{l}Q_{\bar{l}}. \tag{1.120}$$

Taking the partial derivative with respect to ${}^{l}\tilde{\omega}_{\bar{l}}\cdot{}^{\bar{l}|l}r_{k}$ results in $$ e_{\bar{l}}\cdot{}^{\bar{l}}\tilde{\omega}_{l}\cdot{}^{\overline{l|l}}r_{k}=\mathrm{Det}\left(\begin{bmatrix} e_{\bar{l}}^{[x]} & {}^{\bar{l}}\omega_{l}^{[x]} & {}^{\overline{l|l}}r_{k}^{[x]} \\ e_{\bar{l}}^{[y]} & {}^{\bar{l}}\omega_{l}^{[y]} & {}^{\overline{l|l}}r_{k}^{[y]} \\ e_{\bar{l}}^{[z]} & {}^{\bar{l}}\omega_{l}^{[z]} & {}^{\overline{l|l}}r_{k}^{[z]} \end{bmatrix}\right),\quad {}^{\bar{l}}\omega_{l}=\frac{\partial\left({}^{\bar{l}}\omega_{l}^{T}\cdot{}^{\overline{l|l}}r_{k}\right.}{\partial\,{}^{\overline{l|l}}r_{k}^{T}}. \tag{1.121}$$

According to Eq. (1.121), ${}^{\bar{l}}\omega_{l}$ is the direction gradient of ${}^{\bar{l}}\omega_{l}^{T}\cdot{}^{\bar{l}|l}r_{k}$ with respect to ${}^{\bar{l}|l}r_{k}$. According to Eqs. (1.120)-(1.121), ${}^{l}\tilde{\omega}_{k}$ has the following meanings:

[1] The ${}^{l}\tilde{\omega}_{k}$ is the 2nd-order tensor of the angular velocity vector ${}^{l}\omega_{k}$ to which the coordinate transformation (similar transformation) of the 2nd-order tensor is applicable.

[2] The ${}^{l}\omega_{k}$ is the coordinate transformation matrix from the position vector ${}^{l}r_{k}$ to the translational velocity vector ${}^{l}\dot{r}_{k}$.

The following is derived from the AC coordinate transformation operation, $$ -{}^{l}\omega_{k}={}^{l|k}\omega_{l}={}^{l}Q_{k}\cdot{}^{k}\omega_{l}. \tag{1.122}$$

Eqs. (1.120) and (1.122) result in:

$$ -{}^{l}\tilde{\omega}_{k}={}^{l|k}\tilde{\omega}_{l}={}^{l}Q_{k}\cdot{}^{k}\tilde{\omega}_{l}\cdot{}^{k}Q_{l}; $$

Thus, $$ -{}^{l}\tilde{\omega}_{k}={}^{l}Q_{k}\cdot{}^{k}\tilde{\omega}_{l}\cdot{}^{k}Q_{l}. \tag{1.123}$$

On the one hand, ${}^{l}\tilde{\omega}_{k}$ is a 2nd-order tensor. It is derived from ${}^{l}\omega_{k}$. Its basis is both $e_{l}$. During similar transformation, Eq. (1.123) can be written as below $$ -{}^{l}\tilde{\omega}_{k}={}^{l}Q_{k}\cdot{}^{k}\tilde{\omega}_{l}\cdot{}^{k}Q_{l}. \tag{1.124}$$

Therefore, during the operation of the screw-matrix ${}^{k}\tilde{\omega}_{l}$, the index relations with other property parameters can be clearly expressed through index equivalence. The following can be derived from the vector operation relations of chain symbols:

$$ -{}^{l}\omega_{k}={}^{l|k}\tilde{\omega}_{l}. \tag{1.125}$$

The screw-matrix ${}^{l}\tilde{\omega}_{k}$ represents vector product calculation, thereby:

$$ {}^{l}\omega_{k}\cdot{}^{l|k}r_{\bar{k}}=-{}^{l|k}\tilde{r}_{\bar{k}}\cdot{}^{l}\omega_{k}. \tag{1.126}$$

The moment complies with right hand screw rule. The operation involving n cross products is called the nth-order moment.

2.6.2 Second-Order Screw-Vector and 2nd-Order Moment

Given the three vectors a, b and c. the following can be derived according to linear algebra $$ \tilde{a}\cdot(\tilde{b}\cdot c)=(a^{T}\cdot c)\cdot b-(b^{T}\cdot a)\cdot c, \tag{1.127}$$

$$ \begin{aligned}\tilde{a}\cdot\tilde{b}\cdot c &= b\cdot\left(a^{T}\cdot c\right)-a\cdot\left(b^{T}\cdot c\right)\\ &=\left(b\cdot a^{T}-a\cdot b^{T}\right)\cdot c\end{aligned}. \tag{1.128}$$

Eq. (1.128) is called the "dual-vector product with RHS priority" equation, because the operation at the right hand side of the vector product takes the priority. Meanwhile, Eq. (1.128) is called the "dual-vector product with LHS priority" equation, because the operation at the left hand side of equations takes the priority.

The moment invariance mainly includes the moment invariance of vectors and of 2nd-order tensors. The following are equations of second order moment:

$$ a^{T}\cdot(\tilde{b}\cdot c)=c^{T}\cdot(\tilde{a}\cdot b)=b^{T}\cdot(\tilde{c}\cdot a) \tag{1.129}$$

Eq. (1.129) indicates the equivalence of the prismatic volume formed by the three vectors and complies with the order rotation rule.

The dual-vector product calculation is a fundamental operation of MASs and reflects the duality between the generalized forces and between the motion states in ACs. Converting the dual-vector product calculation into the algebraic operation is an important step to establish the algebraic geometry to facilitate the subsequent kinematics and dynamics analysis.

[1] Dual-Vector Product with Right Hand Side Priority

Given the vectors ${}^{k}r_{kS}$ and ${}^{k|l}r_{lS}$, the following can be derived $$ {}^{k}\tilde{r}_{kS}\cdot{}^{k|l}\tilde{r}_{lS}={}^{k|l}r_{lS}\cdot{}^{k}r_{kS}^{T}-{}^{k|l}r_{lS}^{T}\cdot{}^{k}r_{kS}\cdot\mathbf{1}. \tag{1.130}$$

PROOF: The following can be derived from Eq. (1.127), wherein * represents an arbitrary point.

$$ \begin{aligned}{}^{k}\tilde{r}_{kS}\cdot\left({}^{k|l}\tilde{r}_{lS}\cdot{}^{k}r_{*}\right) &= \left({}^{k}r_{kS}^{T}\cdot{}^{k}r_{*}\right)\cdot{}^{k|l}r_{lS}-\left({}^{k|l}r_{lS}^{T}\cdot{}^{k}r_{kS}\right)\cdot{}^{k}r_{*}\\ &={}^{k|l}r_{lS}\cdot{}^{k}r_{kS}^{T}\cdot{}^{k}r_{*}-{}^{k|l}r_{lS}^{T}\cdot{}^{k}r_{kS}\cdot{}^{k}r_{*}\\ &=\left({}^{k|l}r_{lS}\cdot{}^{k}r_{kS}^{T}-{}^{k|l}r_{lS}^{T}\cdot{}^{k}r_{kS}\cdot\mathbf{1}\right)\cdot{}^{k}r_{*}\end{aligned}. $$

As the ${}^{k}r_{*}$ is an arbitrary vector, Eq. (1.130) is workable.

[2] Dual-Vector Product with Left Hand Side Priority

Given the vectors ${}^{k}r_{kS}$ and ${}^{k|l}r_{lS}$, the following can be derived $$ {}^{k}\tilde{r}_{kS}\cdot{}^{k|l}\tilde{r}_{lS}={}^{k|l}r_{lS}\cdot{}^{k|l}r_{kS}^{T}-{}^{k}r_{kS}\cdot{}^{k|l}r_{lS}^{T}. \tag{1.131}$$

PROOF: The following can be derived from Eq. (1.127), wherein * represents an arbitrary point.

$$ \overline{{}^{k}\tilde{r}_{kS}\cdot{}^{k|l}\tilde{r}_{lS}}\cdot{}^{k}r_{*}=\left({}^{k|l}r_{lS}\cdot{}^{k|l}r_{kS}^{T}-{}^{k}r_{kS}\cdot{}^{k|l}r_{lS}^{T}\right)\cdot{}^{k}r_{*}. $$

As ${}^{k}r_{*}$ is an arbitrary vector, Eq. (1.131) is workable.

Eq. (1.130) results in:

$$ {}^{k|l}r_{lS}^{T}\cdot{}^{k}r_{kS}\cdot\mathbf{1}={}^{k|l}r_{lS}\cdot{}^{k}r_{kS}^{T}-{}^{k}\tilde{r}_{kS}\cdot{}^{k|l}\tilde{r}_{kS}, $$

$$ {}^{k}r_{kS}^{T}\cdot{}^{k|l}r_{lS}\cdot\mathbf{1}={}^{k}r_{kS}\cdot{}^{k|l}r_{lS}^{T}-{}^{k|l}\tilde{r}_{lS}\cdot{}^{k}\tilde{r}_{kS}. $$

The following is established:

$$ {}^{k}\tilde{r}_{kS}\cdot{}^{k|l}\tilde{r}_{lS}-{}^{k|l}\tilde{r}_{lS}\cdot{}^{k}\tilde{r}_{kS}={}^{k|l}r_{lS}\cdot{}^{k}r_{kS}^{T}-{}^{k}r_{kS}\cdot{}^{k|l}r_{lS}^{T}. \tag{1.132}$$

Eq. (1.132) indicates the internal relations between the dual-vector product calculations and the outer product calculations.

In general, the vector equations of an AC ${}^{k}\mathbf{l}_{l}$ are usually established by reference to frame # k. Given the AC ${}^{\bar{l}}\mathbf{l}_{l}$, using the axis-invariants ${}^{\bar{l}}n_{\bar{l}}$ and ${}^{\bar{l}}n_l$ to replace the position vector in Eq. (1.130) respectively result in the following $$
\begin{aligned}
&{}^{\bar{l}}\tilde{n}_l^2 = {}^{\bar{l}}n_l \cdot {}^{\bar{l}}n_l^T - 1,\\
&\mathrm{Trace}\left({}^{\bar{l}}\tilde{n}_l^2\right) = \mathrm{Trace}\left({}^{\bar{l}}\tilde{n}_l\right)\cdot \mathrm{Trace}\left({}^{\bar{l}}\tilde{n}_l\right) = 0,\\
&{}^{\bar{l}}\tilde{n}_{\bar{l}} \cdot {}^{\bar{l}|\bar{l}}\tilde{n}_{\bar{l}} = {}^{\bar{l}|\bar{l}}\tilde{n}_l \cdot {}^{\bar{l}}.\tilde{n}_{\bar{l}}^T - {}^{\bar{l}}n_{\bar{l}}^T \cdot {}^{\bar{l}|\bar{l}}n_l \cdot 1.
\end{aligned}
$$

Replace the position vectors with the axis-invariants ${}^{\bar{l}}n_{\bar{l}}$ and ${}^{\bar{l}}n_l$ in Eqs. (1.131) and (1.132) respectively, then $$
\begin{aligned}
&\overline{{}^{\bar{\bar{l}}}\tilde{n}_{\bar{l}} \cdot {}^{\bar{l}|\bar{l}}\tilde{n}_l} - {}^{\bar{\bar{l}}|\bar{l}}n_l \cdot {}^{\bar{\bar{l}}}n_{\bar{l}}^T - {}^{\bar{\bar{l}}}n_{\bar{l}} \cdot {}^{\bar{\bar{l}}|\bar{l}}n_l^T,\\
&{}^{\bar{\bar{l}}}\tilde{n}_{\bar{l}} \cdot {}^{\bar{\bar{l}}|\bar{l}}\tilde{n}_l - {}^{\bar{\bar{l}}|\bar{l}}\tilde{n}_l \cdot {}^{\bar{\bar{l}}}\tilde{n}_{\bar{l}} = {}^{\bar{\bar{l}}|\bar{l}}n_l \cdot {}^{\bar{\bar{l}}|\bar{l}}n_{\bar{l}}^T - {}^{\bar{\bar{l}}}n_{\bar{l}} \cdot {}^{\bar{\bar{l}}|\bar{l}}n_l^T.
\end{aligned}
$$

Rotation vectors, rotational velocity vectors and acceleration vectors are multi-linear forms of fixed axis-invariants, so the four equations based on axis-invariant shown above are significant for the subsequent kinematics and dynamics.

Eqs. (1.130) and (1.131) are referred to as 2nd-order moment equations, for they are vector product calculations. Eqs. (1.92), (1.130) and (1.131) are fundamental equations to convert the 3D spatial calculations into 3D Spatial Operation Algebra (SOA) and complete the natural orthogonal decomposition. Therefore, the 3D SOA equations include spatial operations as well as topological operations, thus having advantages of both algebra and geometries. In the level of algebraic operations, the 3D SOA are based on the primitive operations of orthographic projection, orthogonal screw and motion-vector alignment, which is distinguished from the 6D spatial operator algebra based on the primitive functions of dot product, cross product and equations. In the level of metric spaces, the 3D SOA is based on natural-axes and axis-invariants, and has the metric invariance composed of axis-vectors and traces in Eqs. (1.69), (1.87), (1.92), (1.97), (1.99), (1.116), and (1.119); but the 6D spatial operator algebra on Cartesian frames and various decompositions.

So far, the innovative 3D spatial operation algebra has been established.

Cartesian Axis-Chains vs. Natural Axis-Chains

The COSS provides three bases for the kinematics and dynamics of MASs:

[1] The kinematic quantities and functional relations of property operations can be clearly reflected by chain indices.

[2] The invariants of tensors reflect the objectivity of kinematic properties.

[3] The invariance of matrix operations is the equivalence of the 2nd-order coordinate tensors with respect to different coordinate frames.

The AC analysis involves two processes, namely forward motion transmission process and the backward external force transmission process. The AC system represented by Cartesian axes is called the Cartesian Axis-Chain (CAC). The 3D spatial operation algebra can be used for the analysis of the CAC system as well as the analysis of the Natural Axis-Chain (NAC). The CAC is only a special AC and do not have the features of the natural axis-chain system. The following paragraphs will first elaborate the application and then discusses the problems of the CAC system.

[1] D-H Rotation Matrix

Figure 19:
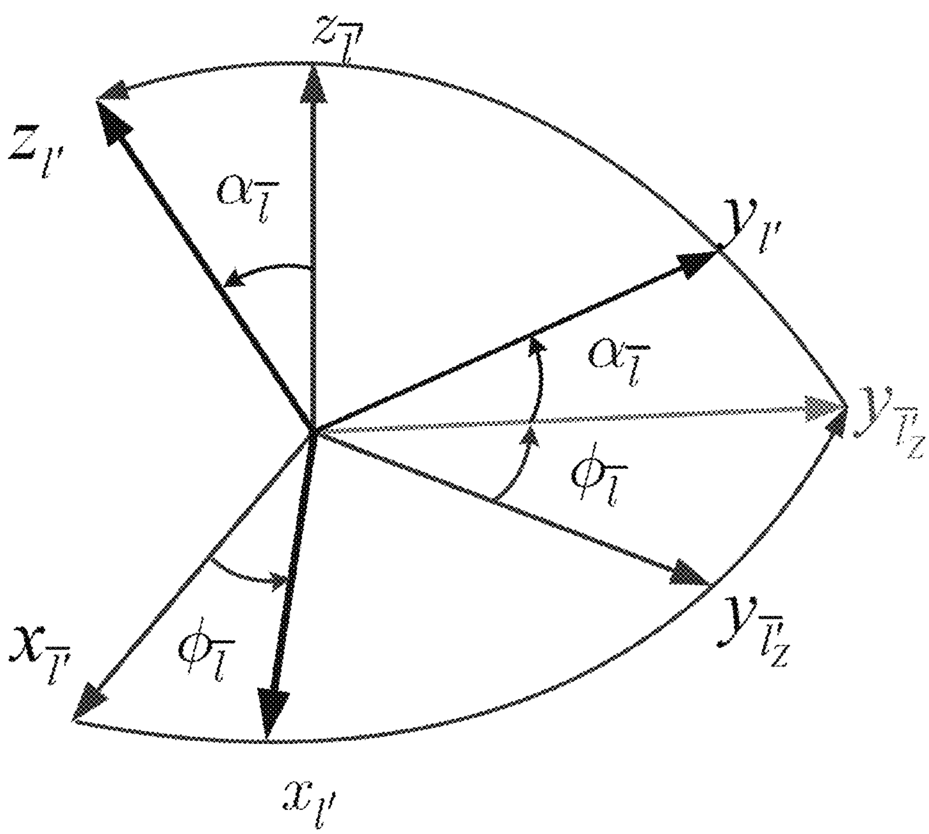
FIG. 19 is a D-H rotation diagram.

See the FIG. 19. Given joint pair # l, at natural zero-position, frames # $\bar{l}$' and # l' share the same attitude. The initial frame # l' rotates at first around the axis $z_{l'}$ by the angle of $\phi_l$ to frame # $\bar{l}$'z and then frame # $\bar{l}$'z rotates around the axis $x_{l'}$ for an angle of $\alpha_l$ to final frame # l'. The relation between the two rotations is shown in FIG. 19.

For the convenience of writing, it is agreed that C( )=cos( ) and S( )=sin( ). Some D-H parameters use parent indices which is different from the parameters in natural frames in that the latter use child indices. The following is defined:

$$\lambda_l \triangleq C(\alpha_l)\mu_l \triangleq S(\alpha_l). \tag{1.133}$$

Eqs. (1.133) result in:

$$
\begin{aligned}
{}^{\bar{l}'}Q_{l'} = {}^{\bar{l}'}Q_{\bar{l}'z} \cdot {}^{\bar{l}'z}Q_{l'} &= \begin{bmatrix} C(\phi_l) & -S(\phi_l) & 0 \\ S(\phi_l) & C(\phi_l) & 0 \\ 0 & 0 & 1 \end{bmatrix} \cdot \begin{bmatrix} 1 & 0 & 0 \\ 0 & C(\alpha_l) & -S(\alpha_l) \\ 0 & S(\alpha_l) & C(\alpha_l) \end{bmatrix}\\
&= \begin{bmatrix} C(\phi_l) & -S(\phi_l)\cdot C(\alpha_l) & S(\phi_l)\cdot S(\alpha_l) \\ S(\phi_l) & C(\phi_l)\cdot C(\alpha_l) & -C(\phi_l)\cdot S(\alpha_l) \\ 0 & S(\alpha_l) & C(\alpha_l) \end{bmatrix}\\
&= \begin{bmatrix} C(\phi_l) & -\lambda_l\cdot S(\phi_l) & \mu_l\cdot S(\phi_l) \\ S(\phi_l) & \lambda_l\cdot C(\phi_l) & -\mu_l\cdot C(\phi_l) \\ 0 & \mu_l & \lambda_l \end{bmatrix}.
\end{aligned}
$$

The following is established:

$$
{}^{\bar{l}'}Q_{l'} = \begin{bmatrix} C(\phi_l) & -\lambda_l\cdot S(\phi_l) & \mu_l\cdot S(\phi_l) \\ S(\phi_l) & \lambda_l\cdot C(\phi_l) & -\mu_l\cdot C(\phi_l) \\ 0 & \mu_l & \lambda_l \end{bmatrix}. \tag{1.134}
$$

It is obvious that the 3rd line of Eq. (1.134) does not include the motion parameter $\phi_l$. This feature will be applied in the computation of 3R robo-arm position IK. The 3rd line of ${}^{\bar{l}'}Q_{l'}$ represents the projection of the basis component $e_{\bar{l}'}^{[z]}$ under frame # l'. The rotation of the coordinate axis $z_{\bar{l}'}$ has no effect on the projection of the basis component $e_{\bar{l}'}^{[z]}$ under under frame # l'. Additionally, $$
\begin{aligned}
{}^{l'}Q_{\bar{l}'} = {}^{l'}Q_{\bar{l}'z} \cdot {}^{\bar{l}'z}Q_{\bar{l}'} &= \begin{bmatrix} 1 & 0 & 0 \\ 0 & C(-\alpha_l) & -S(-\alpha_l) \\ 0 & S(-\alpha_l) & C(-\alpha_l) \end{bmatrix} \cdot \begin{bmatrix} C(-\phi_l) & -S(-\phi_l) & 0 \\ S(-\phi_l) & C(-\phi_l) & 0 \\ 0 & 0 & 1 \end{bmatrix}\\
&= \begin{bmatrix} C(\phi_l) & S(\phi_l) & 0 \\ C(\alpha_l)\cdot S(\phi_l) & C(\alpha_l)\cdot C(\phi_l) & S(\alpha_l) \\ S(\alpha_l)\cdot S(\phi_l) & -S(\alpha_l)\cdot C(\phi_l) & C(\alpha_l) \end{bmatrix}\\
&= \begin{bmatrix} C(\phi_l) & S(\phi_l) & 0 \\ -\lambda_l\cdot S(\phi_l) & \lambda_l\cdot C(\phi_l) & \mu_l \\ \mu_l\cdot S(\phi_l) & -\mu_l\cdot C(\phi_l) & \lambda_l \end{bmatrix},
\end{aligned}
$$

Equivalently, $$
{}^{l'}Q_{\bar{l}'} = \begin{bmatrix} C(\phi_l) & S(\phi_l) & 0 \\ -\lambda_l\cdot S(\phi_l) & \lambda_l\cdot C(\phi_l) & \mu_l \\ \mu_l\cdot S(\phi_l) & -\mu_l\cdot C(\phi_l) & \lambda_l \end{bmatrix}. \tag{1.135}
$$

Apparently, ${}^{l'}Q_{\bar{l}'} = {}^{\bar{l}'}Q_{l'}^{-1}$.

[2] D-H Homogeneous Transformation $c_l = r_{\bar{l}_*'}^{\bar{l}'}$ and $a_l = r_{l'}^{\bar{l}_*'}$. For the AC ${}^{\bar{l}'}\mathbf{l}_l = (\bar{l}', \bar{l}_*', l']$, the following can be derived from Eq. (1.135):

$$ {}^{\bar{l}'}r_{l'} = \begin{bmatrix} 0 \\ 0 \\ r_{\bar{l}'_*}^{\bar{l}'} \end{bmatrix} + {}^{\bar{l}'}Q_{l'} \cdot \begin{bmatrix} r_{l'}^{\bar{l}'_*} \\ 0 \\ 0 \end{bmatrix} = \begin{bmatrix} 0 \\ 0 \\ c_l \end{bmatrix} + \begin{bmatrix} C(\phi_l) & -\lambda_l \cdot S(\phi_l) & \mu_l \cdot S(\phi_l) \\ S(\phi_l) & \lambda_l \cdot C(\phi_l) & -\mu_l \cdot C(\phi_l) \\ 0 & \mu_l & \lambda_l \end{bmatrix} \cdot \begin{bmatrix} a_l \\ 0 \\ 0 \end{bmatrix} = \begin{bmatrix} a_l \cdot C(\phi_l) \\ a_l \cdot S(\phi_l) \\ c_l \end{bmatrix}. $$

Equivalently, $$ {}^{\bar{l}'}r_{l'} = \begin{bmatrix} a_l \cdot C(\phi_l) \\ a_l \cdot S(\phi_l) \\ c_l \end{bmatrix}. \tag{1.136} $$

As shown by Eq. (1.136) that ${}^{\bar{l}'}r_{l'}$ includes not only the motion parameter $\phi_l$ but also the structural parameters $a_l$ and $c_l$.

For the AC ${}^{l'}\mathbf{l}_{\bar{l}'} = -(\bar{l}', \bar{l}_*', l']$, the following is workable $$ {}^{l'}r_{\bar{l}'} = \begin{bmatrix} r_{\bar{l}'_*}^{\bar{l}'} \\ 0 \\ 0 \end{bmatrix} + {}^{l}Q_{\bar{l}} \cdot \begin{bmatrix} 0 \\ 0 \\ -r_{l'}^{\bar{l}'_*} \end{bmatrix} = \begin{bmatrix} C(\phi_l) & S(\phi_l) & 0 \\ -\lambda_l \cdot S(\phi_l) & \lambda_l \cdot C(\phi_l) & \mu_l \\ \mu_l \cdot S(\phi_l) & -\mu_l \cdot C(\phi_l) & \lambda_l \end{bmatrix} \cdot \begin{bmatrix} 0 \\ 0 \\ c_l \end{bmatrix} + \begin{bmatrix} -a_l \\ 0 \\ 0 \end{bmatrix} = -\begin{bmatrix} a_l \\ c_l \cdot \mu_l \\ c_l \cdot \lambda_l \end{bmatrix}, \tag{1.137} $$

Equivalently, $$ {}^{l'}r_{\bar{l}'} = -\begin{bmatrix} a_l \\ c_l \cdot \mu_l \\ c_l \cdot \lambda_l \end{bmatrix}. $$

Eq. (1.137) indicates that ${}^{l'}r_{\bar{l}'}$ is independent of the motion parameter $\phi_l$. This feature will be applied in the computation of 3R robo-arm position IK. The ${}^{l'}r_{\bar{l}'}$ represents the position observed in frame # l'. When the axis $z_{l'}$ rotates, the position ${}^{l'}r_{\bar{l}'}$ is of no effect.

Eq. (1.137) results in:

$$ \left\| {}^{\bar{l}'}r_{l'} \right\| = \left\| \begin{bmatrix} a_l \cdot C(\phi_l) \\ a_l \cdot S(\phi_l) \\ c_l \end{bmatrix} \right\| = \sqrt{a_l^2 + c_l^2}. \tag{1.138} $$

Eqs. (1.138) and (1.139) show that the modules of ${}^{\bar{l}'}r_{l'}$ and ${}^{l'}r_{\bar{l}'}$ are invariable.

The CAC is used to analyze the D-H Frame transformation relations because the D-H frame is a special Cartesian frame. The CAC has a narrow scope of application and many problems. These problems are elaborated below.

The orientation of any rigid body can be determined through the rotational sequence around the Cartesian axis-SEQS {x,y,z}, wherein any adjacent two coordinate axes should be independent, meaning that they must not be coaxial. The {x,y,z} has 27 kinds of permutation of {[m,n, p]|m,n,p∈{x,y,z}}. There are 3 kinds of permutation in which m=n=p and 6 kinds of permutation in which m=n≠p and another 6 kinds in which m≠n=p. Therefore, the number of kinds of triaxis rotational SEQS is as follow: 27−3−6−6=12. In the 12 kinds of rotation order, only the order of "1-2-3" is equivalent to the Cartesian axis-SEQS of [x,y,z]. The Cartesian axis-SEQS of {x,y,z} only guarantees the equivalence of orientation rather than that of the rotation process serial. One Cartesian axis-chain is not strictly isomorphic with one AC.

The rotation from the reference frame # $\bar{l}$ to # l is equivalent to the rotational sequence around the three rotational axis-vector SEQS $[{}^{\bar{l}}n_{l1}, {}^{l1}n_{l2}, {}^{l2}n_l]$. Additionally, ${}^{\bar{l}}n_{l1} \neq {}^{l1}n_{l2}$ and ${}^{l1}n_{l2} \neq {}^{l2}n_l$. If ${}^{\bar{l}}n_{l1} = 1^{[z]}$, ${}^{l1}n_{l2} = 1^{[y]}$ and ${}^{l2}n_l = 1^{[x]}$, the rotational SEQS will be "3-2- 1". If ${}^{\bar{l}}n_{l1} = 1^{[z]}$, ${}^{l1}n_{l2} = 1^{[x]}$ and ${}^{l2}n_l = 1^{[z]}$, the rotational SEQS will be "3-1-3". These two rotational SEQS are commonly used, for example to describe the attitudes of mobile robots.

[1] Attitude Angles of Full Range

The full range of joint angle is (−π,π]. The use of θ=atan(y,x) will simplify the calculation of the attitude angle. The overloaded function atan(y,x) corresponding to atan(x) is calculated as below:

$$ \theta = \operatorname{atan}(y, x) = \begin{cases} \operatorname{atan}(y/x) & \text{if } x \geq 0 \\ -\operatorname{atan}(y/x) - \pi & \text{if } x < 0 \land y < 0 \\ -\operatorname{atan}(y/x) + \pi & \text{if } x < 0 \land y \geq 0 \end{cases}. \tag{1.140} $$

Apparently, the following equations can be derived:

$$ \operatorname{atan}(y,x) = \operatorname{atan}(cy, cx), \text{if } c > 0. \tag{1.141} $$

According to Eq. (1.140), θ∈(−π,π], x=0 is the singular point of θ=atan(y,x). According to the set theory, +∞ and −∞ are also numbers, so the "singular point" is not theoretically workable. However, the word length of the floating-point number is limited, so the computational accuracy cannot be guaranteed in reality. In engineering, the expected accuracy can always be achieved by adding the digits of floating point, so the "singular point" does not exist in engineering. The case where the finite points in the continuous function scope become singular points is referred as "single-point singularity". Therefore, "single-point singularity" can always be complemented with continuity. It only affects the errors of computation and will not result in no solution, meaning that the behaviors of the function is not uncertain.

To calculate the attitude angle SEQS, 2·atan( ) should be used. If asin( ) and acos( ) are used, whether the attitude range can be fully described should be checked.

The case where a continuous interval is singular is referred as "interval singularity". This singularity cannot be complemented, so it will result in no solution in the decided continuous interval, meaning that in engineering the system behaviors cannot be controlled or the system state cannot be determined.

[2] "3-2-1" Rotational Sequence

Given a spherical joint ${}^{\bar{l}}S_l$. It rotates frame # l via the "3-2-1" AC ${}^{\bar{l}}\mathbf{l}_l = (\bar{l}, l_1, l_2, l]$ with respect of frame # $\bar{l}$. The angle SEQS is denoted as $$ q_{(\bar{l},l]} = \left[ \phi_{l1}^{\bar{l}}, \phi_{l2}^{l1}, \phi_l^{l2} \right], $$

the rotational axis-vector SEQS as $[{}^{\bar{l}}n_{l1}, {}^{l1}n_{l2}, {}^{l2}n_l]$, ${}^{\bar{l}}n_{l1} = 1^{[z]}$, ${}^{l1}n_{l2} = 1^{[y]}$, ${}^{l2}n_l = 1^{[x]}$. Wherein, the l1 and l2 are middle reference axes. Given ${}^{\bar{l}}Q_l$, try to figure out $q_{(\bar{l},l]}$.

SOLVING: The computations of sine and cosine are complex. They are usually used after computation. The resulting sine and cosine are denoted as below $$ C_{l1}^{\bar{l}} = C(\phi_{l1}^{\bar{l}}), S_{l1}^{\bar{l}} = S(\phi_{l1}^{\bar{l}}). \tag{1.142} $$

Then $$ {}^{\bar{l}}Q_{l1}=\begin{bmatrix} C_{l1}^{\bar{l}} & S_{l1}^{\bar{l}} & 0 \\ S_{l1}^{\bar{l}} & C_{l1}^{\bar{l}} & 0 \\ 0 & 0 & 1 \end{bmatrix},\ {}^{l1}Q_{l2}=\begin{bmatrix} C_{l2}^{l1} & 0 & S_{l2}^{l1} \\ 0 & 1 & 0 \\ S_{l2}^{l1} & 0 & C_{l2}^{l1} \end{bmatrix},\ {}^{l2}Q_{l}=\begin{bmatrix} 1 & 0 & 0 \\ 0 & C_{l}^{l2} & -S_{l}^{l2} \\ 0 & S_{l}^{l2} & C_{l}^{l2} \end{bmatrix}. \tag{1.143} $$

Thus, $$ {}^{\bar{l}}Q_l=\prod_{k}^{{}^{\bar{l}}1_l}\left({}^{\bar{k}}Q_k\right) = \begin{bmatrix} C_{l1}^{\bar{l}}\cdot C_{l2}^{l1} & C_{l1}^{\bar{l}}\cdot S_{l2}^{l1}\cdot S_{l}^{l2}-S_{l1}^{\bar{l}}\cdot C_{l}^{l2} & S_{l1}^{\bar{l}}\cdot S_{l}^{l2}+C_{l1}^{\bar{l}}\cdot S_{l2}^{l1}\cdot C_{l}^{l2} \\ S_{l1}^{\bar{l}}\cdot C_{l2}^{l1} & C_{l1}^{\bar{l}}\cdot C_{l}^{l2}+S_{l1}^{\bar{l}}\cdot S_{l2}^{l1}\cdot S_{l}^{l2} & S_{l1}^{\bar{l}}\cdot S_{l2}^{l1}\cdot C_{l}^{l2}-C_{l1}^{\bar{l}}\cdot S_{l}^{l2} \\ -S_{l2}^{l1} & C_{l2}^{l1}\cdot S_{l}^{l2} & C_{l2}^{l1}\cdot C_{l}^{l2} \end{bmatrix}. $$

The $[\phi_{l1}^{\bar{l}},\phi_{l2}^{l1},\phi_{l}^{l2}]$ are often called the Cardan angles. Their polarity is determined by $[{}^{\bar{l}}n_{l1},{}^{l1}n_{l2},{}^{l2}n_{l}]$. The $[\phi_{l1}^{\bar{l}},\phi_{l2}^{l1},\phi_{l}^{l2}]$ are not addable and thus often called quasi-coordinates. Any element of ${}^{\bar{l}}Q_l$ is the multi-linear representation of the sine and cosine of the attitude angle and is also called multi-linear form. The process stated above is a process to calculate the rotation matrix with the attitude angle known. This is a forward problem of attitude.

Eq. (1.143) is extensively used in this patent. No note or description thereof will be provided when it is subsequently used.

If Cartesian axis x points forward, Cartesian axis y points leftward, Cartesian axis z points upward, the angle SEQS $[\phi_{l1}^{\bar{l}},\phi_{l2}^{l1},\phi_{l}^{l2}]$ has the following physical significance: $\phi_{l1}^{\bar{l}}$—Yaw, $\phi_{l2}^{l1}$—Pitch, $\phi_{l}^{l2}$—Roll. The attitude angle of "3-2-1" is usually used to describe the attitude of robots, planes and guided missiles. Eq. (1.143) results in:

$$ \begin{aligned} \phi_{l1}^{\bar{l}} &= a\tan\left({}^{\bar{l}}Q_l^{[2][x]},\ {}^{\bar{l}}Q_l^{[1][x]}\right) \\ \phi_{l2}^{l1} &= a\sin\left(-{}^{\bar{l}}Q_l^{[3][x]}\right) \\ \phi_{l}^{l2} &= a\tan\left({}^{\bar{l}}Q_l^{[3][y]},\ {}^{\bar{l}}Q_l^{[3][z]}\right) \end{aligned}. \tag{1.144} $$

It is obvious that $[-\phi_{l}^{l2},-\phi_{l2}^{l1},-\phi_{l1}^{\bar{l}}]$ is the inverse angular SEQS of $[\phi_{l1}^{\bar{l}},\phi_{l2}^{l1},\phi_{l}^{l2}]$. It not only changes the rotational polarity, but also reverses the order of rotation. The angle order used to describe the attitude only indicates the equivalence of the states at the beginning and the end rather than the rotation process. The process stated above is to calculate the attitude angle with the rotation matrix known. This is an inverse problem of attitude.

[3] Rotational Sequence of "3-1-3"

Figure 20:
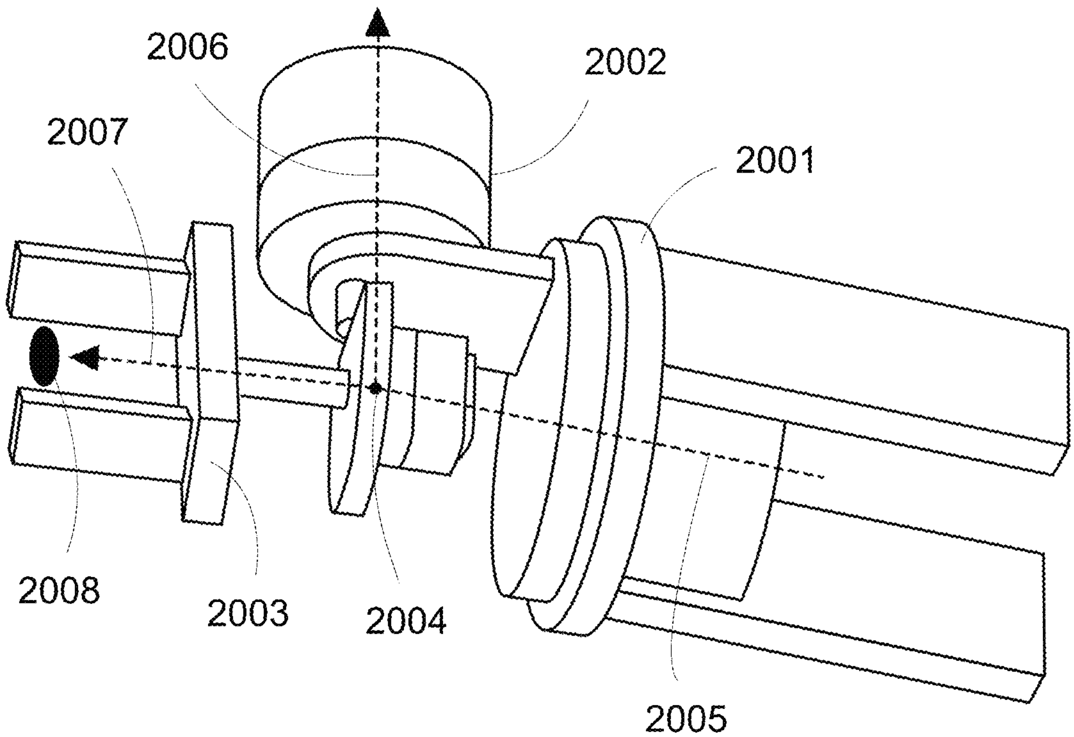
FIG. 20 is a structure diagram of the decoupled robotic arm.

EXAMPLE 2.1 As shown in FIG. 20, the decoupled Robo-Arm is composed of three Revolute Joints and four links which are connected in series. Any two of the three rotational axes are intersected at the same point O, which is called Wrist Center. Axis #1 is orthogonal to Axis #2 and Axis #2 is orthogonal to Axis #3. Obviously, the pick point S of the decoupled Robo-Arm is on the sphere with the Wrist Center as the center of sphere. The ${}^{\bar{l}}1_l=(\bar{l},l_1,l_2,l)$ is an Axis-Chain from Axis # $\bar{l}$ to Axis # l. The rotational Axis-Vector SEQS are $[{}^{\bar{l}}n_{l1},{}^{l1}n_{l2},{}^{l2}n_{l}]$. The joint variable SEQS is denoted as $q_{(\bar{l},l]}^{T}=[\phi_{l1}^{\bar{l}},\phi_{l2}^{l1},\phi_{l}^{l2}]$. If ${}^{\bar{l}}n_{l1}=1^{[z]}$, ${}^{l1}n_{l2}=1^{[x]}$ and ${}^{l2}n_{l}=1^{[z]}$, the rotational SEQS will be "3-2-1". Given ${}^{\bar{l}}Q_l$, try to figure out $q_{(\bar{l},l]}$.

SOLVING:

$$ {}^{\bar{l}}Q_{l1}=\begin{bmatrix} C_{l1}^{\bar{l}} & -S_{l1}^{\bar{l}} & 0 \\ S_{l1}^{\bar{l}} & C_{l1}^{\bar{l}} & 0 \\ 0 & 0 & 1 \end{bmatrix},\ {}^{l1}Q_{l2}=\begin{bmatrix} 1 & 0 & 0 \\ 0 & C_{l2}^{l1} & -S_{l2}^{l1} \\ 0 & S_{l2}^{l1} & C_{l2}^{l1} \end{bmatrix},\ {}^{l2}Q_{l}=\begin{bmatrix} C_{l}^{l2} & -S_{l}^{l2} & 0 \\ S_{l}^{l2} & C_{l}^{l2} & 0 \\ 0 & 0 & 1 \end{bmatrix}; \tag{1.145} $$

$$ {}^{\bar{l}}Q_l=\prod_{k}^{{}^{\bar{l}}1_l}\left({}^{\bar{k}}Q_k\right) = \begin{bmatrix} C_{l1}^{\bar{l}}\cdot C_{l}^{l2}-S_{l1}^{\bar{l}}\cdot C_{l2}^{l1}\cdot S_{l}^{l2} & -C_{l1}^{\bar{l}}\cdot S_{l}^{l2}-S_{l}^{l2}\cdot C_{l2}^{l1}\cdot C_{l}^{l2} & S_{l1}^{\bar{l}}\cdot S_{l2}^{l1} \\ S_{l1}^{\bar{l}}\cdot C_{l}^{l2}+C_{l1}^{\bar{l}}\cdot C_{l2}^{l1}\cdot S_{l}^{l2} & C_{l1}^{\bar{l}}\cdot C_{l2}^{l1}\cdot C_{l}^{l2}-S_{l1}^{\bar{l}}\cdot S_{l}^{l2} & -C_{l1}^{\bar{l}}\cdot S_{l2}^{l1} \\ -S_{l2}^{l1}\cdot S_{l}^{l2} & S_{l2}^{l1}\cdot C_{l}^{l2} & C_{l2}^{l1} \end{bmatrix}. $$

According to Eq. (1.144), the ranges of the angle SEQS should meet the following requirements: $\phi_{l1}^{\bar{l}}\in(-\pi,\pi]$, $\phi_{l2}^{l1}\in(-\pi/2,\pi/2)$, $\phi_{l}^{l2}\in(-\pi,\pi]$, otherwise the attitudes of Frame # l will not be fully described. At the beginning, Frame # $\bar{l}$ and # l overlap. When $\phi_{l1}^{\bar{l}}\in(-\pi,\pi]$, $\phi_{l2}^{l1}\in(-\pi/2,\pi/2)$, after the rotational sequence of "3-2" is applied to Frame # l, any unit direction ${}^{l}u_{lS}$ on Frame # l can be aligned with any unit direction ${}^{\bar{l}}u_{lS}$ fixed with Frame # $\bar{l}$. After the direction alignment is completed and the rotational sequence of "1" is applied; if $\phi_{l}^{l2}\in(-\pi,\pi]$, any radial vector of ${}^{l}u_{lS}$ can be aligned with any radial vector of ${}_{d}^{l}u_{lS}$.

Eq. (1.145) results in:

$$ \begin{aligned} \phi_{l1}^{\bar{l}} &= a\tan\left({}^{\bar{l}}Q_l^{[1][z]},\ -{}^{\bar{l}}Q_l^{[2][z]}\right) \\ \phi_{l2}^{l1} &= a\cos\left({}^{\bar{l}}Q_l^{[3][z]}\right) \\ \phi_{l}^{l2} &= a\tan\left({}^{\bar{l}}Q_l^{[3][x]},\ {}^{\bar{l}}Q_l^{[3][y]}\right) \end{aligned}. \tag{1.146} $$

According to Eq. (1.146), $\phi_{l1}^{\bar{l}}\in(-\pi,\pi]$, $\phi_{l2}^{l1}\in[0,\pi)$, $\phi_{l}^{l2}\in(-\pi,\pi]$ can describe full range attitudes.

When the angle SEQS of "3-1-3" is used to describe the attitude of a celestial body, $\phi_{l1}^{\bar{l}}$ is referred to as precession angle, $\phi_{l2}^{l1}$ is referred to as nutation angle and $\phi_l^{l2}$ is referred to as self-rotation angle.

There are 12 kinds of attitude SEQS. It is cumbersome to list the inverse solution of attitude of every rotational SEQS. What is more general is to determine the rotational angles of the rotational axis-vector SEQS $[{}^{\bar{l}}n_{l1}, {}^{l1}n_{l2}, {}^{l2}n_l]$, ${}^{\bar{l}}n_{l1} \neq {}^{l1}n_{l2}$ and ${}^{l1}n_{l2} \neq {}^{l2}n_l$ with ${}^{\bar{l}}Q_l$ known. The general solution to the inverse attitude problem needs to be further developed.

Partial Velocity of Cartesian Axis-Chains

In FIG. 20, if the position where such decoupled robo-arm grabs a workpiece is denoted as S, the following can be established:

$$ {}^{\bar{l}}r_{lS} = {}^{\bar{l}}_0 r_l + {}^{\bar{l}}Q_l \cdot {}^l r_{lS}. \tag{1.147} $$

For Eq. (1.147), the following can be established:

$$ {}^{\bar{l}}C_l\left({}^{\bar{l}}r_{lS}\right) = \left\| {}^{\bar{l}}r_{lS} \right\| - c \equiv 0. \tag{1.148} $$

Eq. (1.148) is called the kinematic constraint equation of such decoupled robo-wrist or spherical joints, reflecting the invariance of spatial distance constraint.

The revolute joint and gimbal joint are special spherical Joints. The S is denoted as the spherical joint center. The following constraint equation is established for the joint pair # l:

$$ {}^{\bar{l}}C_l\left({}^{\bar{l}}r_{lS}\right) = {}^{\bar{l}}r_{lS}^T \cdot {}^{\bar{l}}r_{lS} - c \equiv 0, \tag{1.149} $$

wherein ${}^{\bar{l}}r_{lS}$ represents the position vector of such spherical joint center in frame # l, and c is a constant.

Eq. (1.149) results in:

$$ {}^{\bar{l}}\dot{C}_l\left({}^{\bar{l}}r_{lS}\right) = {}^{\bar{l}}r_{lS}^T \cdot {}^{\bar{l}}\dot{r}_{lS} = 0. \tag{1.150} $$

Apparently, $$ {}^{\bar{l}}\dot{r}_{lS} = \frac{\partial^{\bar{l}}\dot{r}_{lS}}{\partial \dot{q}_{(\bar{l},l]}} \cdot \begin{bmatrix} \dot{\phi}_{l1}^{\bar{l}} \\ \dot{\phi}_{l2}^{\bar{l}1} \\ \dot{\phi}_l^{\bar{l}2} \end{bmatrix} = {}^{\bar{l}}J_l \cdot \dot{q}_{(\bar{l},l]}^T, \tag{1.151} $$

wherein $$ \dot{q}_{(\bar{l},l]} = \left[\dot{\phi}_{l1}^{\bar{l}}, \dot{\phi}_{l2}^{l1}, \dot{\phi}_l^{l2}\right], \quad {}^{\bar{l}}J_l = \frac{\partial^{\bar{l}}\dot{r}_{lS}}{\partial \dot{q}_{(\bar{l},l]}}. $$

The ${}^{\bar{l}}J_l$ is called "Jacobian matrix", which reflects the relationship of velocity and joint velocity. According to Eq. (1.151), the velocity ${}^{\bar{l}}\dot{r}_{lS}$ is the linear form related to the joint speed $\dot{q}_{(\bar{l},l]}$. Of course, the joint speed $\dot{q}_{(\bar{l},l]}$ is not a vector. Various members have different references, which are not additive. Thus, it is called joint speed.

Put Eq. (1.151) into Eq. (1.150) to obtain:

$$ {}^{\bar{l}}\dot{C}_l\left({}^{\bar{l}}r_{lS}\right) = {}^{\bar{l}}r_{lS}^{T} \cdot {}^{\bar{l}}J_l \cdot \dot{q}_{(\bar{l},l]} = 0. \tag{1.152} $$

The axis-vector SEQS $[{}^{\bar{l}}n_{l1}, {}^{l1}n_{l2}, {}^{l2}n_l]$ of the spherical joint ${}^lS_l$ is considered, wherein: ${}^{\bar{l}}n_{l1} = 1^{[x]}$, ${}^{l1}n_{l2} = 1^{[y]}$, ${}^{l2}n_l = 1^{[z]}$; the joint variable SEQS is denoted as $q_{(\bar{l},l]} = [\phi_{l1}^{\bar{l}}, \phi_{l2}^{l1}, \phi_l^{l2}]$. Apparently, this is the rotational sequence of "1-2-3". Then $$ {}^{\bar{l}}\dot{\phi}_l = \begin{bmatrix} {}^{\bar{l}}\omega_l^{[1]} \\ {}^{\bar{l}}\omega_l^{[2]} \\ {}^{\bar{l}}\omega_l^{[3]} \end{bmatrix} = \begin{bmatrix} \dot{\phi}_{l1}^{\bar{l}} \\ 0 \\ 0 \end{bmatrix} + {}^{\bar{l}}Q_{l1} \cdot \begin{bmatrix} 0 \\ \dot{\phi}_{l2}^{\bar{l}1} \\ 0 \end{bmatrix} + {}^{\bar{l}}Q_{l2} \cdot \begin{bmatrix} 0 \\ 0 \\ \dot{\phi}_l^{l2} \end{bmatrix} $$

$$ = \begin{bmatrix} \dot{\phi}_{l1}^{\bar{l}} \\ 0 \\ 0 \end{bmatrix} + \begin{bmatrix} 1 & 0 & 0 \\ 0 & C_{l1}^{\bar{l}} & -S_{l1}^{\bar{l}} \\ 0 & S_{l1}^{\bar{l}} & C_{l1}^{\bar{l}} \end{bmatrix} \cdot \begin{bmatrix} 0 \\ \dot{\phi}_{l2}^{\bar{l}1} \\ 0 \end{bmatrix} + \begin{bmatrix} 1 & 0 & 0 \\ 0 & C_{l1}^{\bar{l}} & -S_{l1}^{\bar{l}} \\ 0 & S_{l1}^{\bar{l}} & C_{l1}^{\bar{l}} \end{bmatrix} \cdot $$

$$ \backslash \begin{bmatrix} C_{l2}^{l1} & 0 & S_{l2}^{l1} \\ 0 & 1 & 0 \\ -S_{l2}^{l1} & 0 & C_{l2}^{l1} \end{bmatrix} \cdot \begin{bmatrix} 0 \\ 0 \\ \dot{\phi}_l^{l2} \end{bmatrix} = \begin{bmatrix} 1 & 0 & -S_{l2}^{\bar{l}1} \\ 0 & C_{l1}^{\bar{l}} & -S_{l1}^{\bar{l}} \cdot C_{l2}^{l1} \\ 0 & S_{l1}^{\bar{l}} & C_{l1}^{\bar{l}} \cdot C_{l2}^{l1} \end{bmatrix} \cdot \begin{bmatrix} \dot{\phi}_{l1}^{\bar{l}} \\ \dot{\phi}_{l2}^{l1} \\ \dot{\phi}_l^{l2} \end{bmatrix}. $$

Equivalently $$ {}^{\bar{l}}\dot{\phi}_l = \begin{bmatrix} 1 & 0 & S_{l2}^{\bar{l}1} \\ 0 & C_{l1}^{\bar{l}} & -S_{l1}^{\bar{l}} \cdot C_{l2}^{l1} \\ 0 & S_{l1}^{\bar{l}} & C_{l1}^{\bar{l}} \cdot C_{l2}^{l1} \end{bmatrix} \cdot \begin{bmatrix} \dot{\phi}_{l1}^{\bar{l}} \\ \dot{\phi}_{l2}^{l1} \\ \dot{\phi}_l^{l2} \end{bmatrix}. \tag{1.153} $$

Accordingly, $$ {}^{\bar{l}}J_l = \begin{bmatrix} 1 & 0 & S_{l2}^{\bar{l}1} \\ 0 & C_{l1}^{\bar{l}} & -S_{l1}^{\bar{l}} \cdot C_{l2}^{l1} \\ 0 & S_{l1}^{\bar{l}} & C_{l1}^{\bar{l}} \cdot C_{l2}^{l1} \end{bmatrix}. \tag{1.154} $$

According to Eq. (1.154), the angular velocity represents a linear equation related to the joint speed SEQS $\dot{q}_{(\bar{l},l]} = [\dot{\phi}_{l1}^{\bar{l}}, \dot{\phi}_{l2}^{l1}, \dot{\phi}_l^{l2}]$. Specifically, it is the linear form of joint speed. Apparently, the joint speed SEQS $\dot{q}_{(\bar{l},l]}$ is not a vector. $\partial^{\bar{l}}\omega_l / \partial \dot{q}_{(\bar{l},l]}$ is called partial/quasi angular velocity and expressed as ${}^{\bar{l}}\Theta_l$, i.e.

$$ {}^{\bar{l}}\Theta_l = \frac{\partial^{\bar{l}}\dot{\phi}_l}{\partial \dot{q}_{(\bar{l},l]}}. \tag{1.155} $$

According to Eq. (1.155), $$ {}^{\bar{l}}\dot{r}_{lS} = {}^{\bar{l}}J_l \cdot \dot{q}_{(\bar{l},l]} = {}^{\bar{l}}J_l \cdot {}^{\bar{l}}\Theta_l^{-1} \cdot {}^{\bar{l}}\dot{\phi}_l. \tag{1.156} $$

The linear or angular velocity is a non-linear function of joint variables, and a linear function of joint speed.

EXAMPLE 2.2. Given the axis-SEQS A=(i,c1,c2,c3,c4,c5,c], its parent axis-SEQS $\overline{A}$=(i,i,c1,c2,c3,c4,c5], axis-Type-SEQS CA=(F,R,R,R,P,P,P] and joint variable SEQS $q_{(i,c]} = (\phi_{c1}, \phi_{c2}, \phi_{c3}, r_{c4}, r_{c5}, r_c]$; so such AC is expressed as ${}^i\mathbf{l}_c$=(i,c1,c2,c3,c4,c5,c]. Additionally, $$ {}^i n_{c1} = {}^{c5}n_c = 1^{[z]}, {}^{c1}n_{c2} = {}^{c4}n_{c5} = 1^{[y]}, {}^{c2}n_{c3} = {}^{c3}n_{c4} = 1^{[x]}. \tag{1.157} $$

Such AC is represented in this way: "3-2-1" rotation first and "1-2-3" translation later. The following equations are established:

$$ {}^iQ_{c1} = \begin{bmatrix} C_{c1}^i & -S_{c1}^i & 0 \\ S_{c1}^i & C_{c1}^i & 0 \\ 0 & 0 & 1 \end{bmatrix}, \quad {}^{c1}Q_{c2} = \begin{bmatrix} C_{c2}^{c1} & 0 & S_{c2}^{c1} \\ 0 & 1 & 0 \\ -S_{c2}^{c1} & 0 & C_{c2}^{c1} \end{bmatrix}, \tag{1.158} $$

$$ {}^{c2}Q_{c3} = \begin{bmatrix} 1 & 0 & 0 \\ 0 & C_{c3}^{c2} & -S_{c3}^{c2} \\ 0 & S_{c3}^{c2} & C_{c3}^{c2} \end{bmatrix} $$

-continued $$ {}^{i|c1}n_{c2} = {}^{i}Q_{c1} \cdot {}^{c1}n_{c2} = \begin{bmatrix} C_{c1}^{i} & -S_{c1}^{i} & 0 \\ S_{c1}^{i} & C_{c1}^{i} & 0 \\ 0 & 0 & 1 \end{bmatrix} \cdot \begin{bmatrix} 0 \\ 1 \\ 0 \end{bmatrix} = \begin{bmatrix} -S_{c1}^{i} \\ C_{c1}^{i} \\ 0 \end{bmatrix}, \tag{1.159} $$

$$ {}^{i|c2}n_{c3} = {}^{i}Q_{c1} \cdot {}^{c1}Q_{c2} \tag{1.160} $$

$$ {}^{c2}n_{c3} = \begin{bmatrix} C_{c1}^{i} & -S_{c1}^{i} & 0 \\ S_{c1}^{i} & C_{c1}^{i} & 0 \\ 0 & 0 & 1 \end{bmatrix} \cdot \begin{bmatrix} C_{c2}^{c1} & 0 & S_{c2}^{c1} \\ 0 & 1 & 0 \\ -S_{c2}^{c1} & 0 & C_{c2}^{c1} \end{bmatrix} \cdot \begin{bmatrix} 1 \\ 0 \\ 0 \end{bmatrix} = \begin{bmatrix} C_{c1}^{i} \cdot C_{c2}^{c1} \\ S_{c1}^{i} \cdot C_{c2}^{c1} \\ -S_{c2}^{c1} \end{bmatrix}, $$

$$ {}^{i}\phi_{c} = {}^{i}n_{c1} \cdot \phi_{c1} + {}^{i|c1}n_{c2} \cdot \phi_{c2} + {}^{i|c2}n_{c3} \cdot \phi_{c3} = \sum_{k}^{{}^{i}1_{c}} \left( {}^{i|\bar{k}}\phi_{k} \right) \tag{1.161} $$

$$ {}^{i}\dot{\phi}_{c} = {}^{i}n_{c1} \cdot \dot{\phi}_{c1} + {}^{i|c1}n_{c2} \cdot \dot{\phi}_{c2} + {}^{i|c2}n_{c3} \cdot \dot{\phi}_{c3} = \sum_{k}^{{}^{i}1_{c}} \left( {}^{i|\bar{k}}\dot{\phi}_{k} \right) \cdot $$

$$ {}^{i}\ddot{\phi}_{c} = {}^{i}n_{c1} \cdot \ddot{\phi}_{c1} + {}^{i|c1}n_{c2} \cdot \ddot{\phi}_{c2} + {}^{i|c2}n_{c3} \cdot \ddot{\phi}_{c3} = \sum_{k}^{{}^{i}1_{c}} \left( {}^{i|\bar{k}}\ddot{\phi}_{k} \right) $$

According to Eqs. (1.157)-(1.160):

$$ {}^{i}\Theta_{c} \triangleq [\,{}^{i}n_{c1},\ {}^{i|c1}n_{c2},\ {}^{i|c2}n_{c3}\,] = \begin{bmatrix} 0 & -S_{c1}^{i} & C_{c1}^{i} \cdot C_{c2}^{c1} \\ 0 & C_{c1}^{i} & S_{c1}^{i} \cdot C_{c2}^{c1} \\ 1 & 0 & S_{c2}^{c1} \end{bmatrix}. \tag{1.162} $$

Apparently, $$ {}^{i}\Theta_{c} = \frac{\partial\left({}^{i}\dot{\phi}_{c}\right)}{\partial\left[\dot{\phi}_{c1}, \dot{\phi}_{c2}, \dot{\phi}_{c3}\right.}. $$

The following equations are established:

$$ {}^{i}\dot{\phi}_{c} = {}^{i}\Theta_{c} \cdot \begin{bmatrix} \dot{\phi}_{c1} \\ \dot{\phi}_{c2} \\ \dot{\phi}_{c3} \end{bmatrix},\ {}^{i}\ddot{\phi}_{c} = {}^{i}\Theta_{c} \cdot \begin{bmatrix} \ddot{\phi}_{c1} \\ \ddot{\phi}_{c2} \\ \ddot{\phi}_{c3} \end{bmatrix}. \tag{1.163} $$

Eq. (1.163) results in:

$$ {}^{i}Q_{c} = \left[\ {}^{i}n_{c1},\ {}^{i|c1}n_{c2},\ {}^{i|c2}n_{c} \right] = {}^{i}Q_{c1} \cdot {}^{c1}Q_{c2} \cdot \tag{1.164} $$

$$ {}^{c2}Q_{c} \begin{bmatrix} C_{c1}^{i} \cdot C_{c2}^{c1} & C_{c1}^{i} \cdot S_{c2}^{c1} \cdot S_{c}^{c2} - S_{c1}^{i} \cdot C_{c}^{c2} & S_{c1}^{i} \cdot S_{c}^{c2} + C_{c1}^{i} \cdot S_{c2}^{c1} \cdot C_{c}^{c2} \\ S_{c1}^{i} \cdot C_{c2}^{c1} & C_{c1}^{i} \cdot C_{c}^{c2} + S_{c1}^{i} \cdot S_{c2}^{c1} \cdot S_{c}^{c2} & S_{c1}^{i} \cdot S_{c2}^{c1} \cdot C_{c}^{c2} - C_{c2}^{c1} \cdot S_{c}^{c2} \\ -S_{c2}^{c1} & C_{c2}^{c1} \cdot S_{c}^{c2} & C_{c2}^{c1} \cdot C_{c}^{c2} \end{bmatrix}. $$

Eq. (1.164) results in:

$$ \begin{bmatrix} \dot{\phi}_{c1} \\ \dot{\phi}_{c2} \\ \dot{\phi}_{c3} \end{bmatrix} = {}^{c}\Theta_{i} \cdot {}^{i}\dot{\phi}_{c},\ \begin{bmatrix} \ddot{\phi}_{c1} \\ \ddot{\phi}_{c2} \\ \ddot{\phi}_{c3} \end{bmatrix} = {}^{c}\Theta_{i} \cdot {}^{i}\ddot{\phi}_{c}, \tag{1.165} $$

wherein $$ {}^{c}\Theta_{i} = {}^{i}\Theta_{c}^{-1}. \tag{1.166} $$

For a high accuracy electromechanical system, the machining and assembly errors result in the fact that orthogonal motion or measurement axes never exist. For instance, the triaxial accelerometers and triaxial angular rate gyroscopes of a IMU are designed to measure translational and rotational velocities in triaxial directions. Sometimes, another accelerometer and angular rate gyroscope are arranged for standby for the sake of reliability. In the engineering, the inclined installation of motion and measurement axes is common. Therefore, it is quite necessary to further investigate the kinematics and dynamics of axis-chain.

Given the AC ${}^{l}1_{n}$=(i, . . . , $\bar{n}$, n] and k∈${}^{i}1_{n}$, Eq. (1.166) gives:

$$ \frac{\partial}{\partial \phi_{k}^{\bar{k}}}\left({}^{i}Q_{n}\right) = \frac{\partial}{\partial \phi_{k}^{\bar{k}}}\left(\prod_{l}^{{}^{i}1_{n}}\left({}^{\bar{l}}Q_{l}\right)\right). \tag{1.167} $$

Similarly, Eq. (1.167) results in:

$$ \frac{\partial}{\partial \phi_{k}^{\bar{k}}}\left({}^{i}r_{nS}\right) = \frac{\partial}{\partial \phi_{k}^{\bar{k}}}\left(\sum_{l}^{{}^{i}1_{nS}}\left({}^{i|\bar{l}}r_{l}\right)\right);\ \frac{\partial}{\partial r_{k}^{\bar{k}}}\left({}^{i}r_{nS}\right) = \frac{\partial}{\partial r_{k}^{\bar{k}}}\left(\sum_{l}^{{}^{i}1_{nS}}\left({}^{i|\bar{l}}r_{l}\right)\right). \tag{1.168} $$

The partial velocity in Eqs. (1.167) and (1.168) plays a crucial role in the analysis of robot kinematics and dynamics. Consequently, more efforts are needed to solve the partial velocity problem.

Eq. (1.147) results in:

$$ {}^{\bar{l}}\dot{r}_{lS} = {}_{0}{}^{\bar{l}}\dot{r}_{l} + {}^{\bar{l}}Q_{l} \cdot {}^{l}\dot{r}_{lS} + {}^{\bar{l}}\dot{Q}_{l} \cdot {}^{l}r_{lS} = {}^{\bar{l}}Q_{l} \cdot {}^{l}\dot{r}_{lS} + {}^{\bar{l}}\dot{Q}_{l} \cdot {}^{l}r_{lS}. \tag{1.169} $$

For Eq. (1.169), ${}^{\bar{l}}\dot{Q}_{l}$ should be calculated. According to Eq. (1.145), ${}^{\bar{l}}Q_{l}$ is a function of $[\phi_{l1}{}^{\bar{l}}, \phi_{l2}{}^{l1}, \phi_{l}{}^{l2}]$, and $[\phi_{l1}{}^{\bar{l}}, \phi_{l2}{}^{l1}, \phi_{l}{}^{l2}]$ is also a function of the time t; so it is very troublesome to calculate ${}^{\bar{l}}\dot{Q}_{l}$ directly. Further efforts are needed regarding the derivation of the rotation matrix.

EXAMPLE 2.3. The installation relationship between the camera frame c and CE3 rover frame r is dependent of the angles between their coordinate axes:

| Rad | cx | cy | cz |
|---|---|---|---|
| rx | $\phi_{cx}^{rz}$ | $\phi_{cy}^{rx}$ | $\phi_{cz}^{rx}$ |
| ry | $\phi_{cx}^{ry}$ | $\phi_{cy}^{ry}$ | $\phi_{cz}^{ry}$ ; |
| rz | $\phi_{cx}^{rz}$ | $\phi_{cy}^{rz}$ | $\phi_{cz}^{rz}$ |

wherein $\phi_{cn}{}^{rm}$ indicates the angle between Cartesian axis rm, and Cartesian axis cn, m,n∈[x,y,z]; and so on ${}^{r}Q_{c}$ should be solved.

SOLUTION: The projection of the camera axis x in CE3 rover frame is expressed as ${}^{r}e_{c}{}^{[x]}=[C_{cx}{}^{rx}\ C_{cx}{}^{ry}\ C_{cx}{}^{rz}]^{T}$; that of the camera axis y in CE3 rover frame is expressed as ${}^{r}e_{c}{}^{[y]}=[C_{cy}{}^{rx}\ C_{cy}{}^{ry}\ C_{cy}{}^{rz}]^{T}$; and that of the camera axis z in CE3 rover frame is expressed as ${}^{r}e_{c}{}^{[z]}=[C_{cz}{}^{rx}\ C_{cz}{}^{ry}\ C_{cz}{}^{rz}]^{T}$. Accordingly, $$ {}^{r}Q_{c} = [\,{}^{r}e_{c}^{[x]}\ \ {}^{r}e_{c}^{[y]}\ \ {}^{r}e_{c}^{[z]}\,] = \begin{bmatrix} C_{cx}^{rx} & C_{cy}^{ry} & C_{cz}^{rx} \\ C_{cx}^{ry} & C_{cy}^{ry} & C_{cz}^{ry} \\ C_{cx}^{rz} & C_{cy}^{rz} & C_{cz}^{rz} \end{bmatrix}. \tag{1.170} $$

Q.E.D.

Theoretically, Eq. (1.170) seems correct to calculate the rotation matrix with direction cosine. However, this implies a critical disadvantage in terms of engineering: Due to errors in the measurement of nine angles, the orthononnal constraint of such rotation matrix fails. An example is shown below.

EXAMPLE 2.4 Followed by example 2.3: the engineering measurement gives:

| Deg | cx | cy | cz |
|---|---|---|---|
| rx | $\phi_{cx}^{rx}=90.15$ | $\phi_{cy}^{rx}=0.15$ | $\phi_{cz}^{rx}=90.00$ |
| ry | $\phi_{cx}^{ry}=90.00$ | $\phi_{cy}^{ry}=90.00$ | $\phi_{cz}^{ry}=0.00$ |
| rz | $\phi_{cx}^{rz}=0.15$ | $\phi_{cy}^{rz}=89.85$ | $\phi_{cz}^{rz}=90.00$ |

The following solutions are worked out according to Eq. (1.170):

$$^{r}Q_{c}=\begin{bmatrix}-0.0026177637150 & 0.999996573057 & 0.000000226795\\ 0.0000000226795 & 0.000000226795 & 1.000000000000\\ 0.999996573057 & 0.002618217304 & 0.00000226795\end{bmatrix}. \quad (1.171)$$

It is shown by such result that $^{r}Q_{c}$ is ill-conditioned with six-bit accuracy.

Theoretically, it seems workable to calculate the attitude angles of the rotation matrix based on Eq. (1.144) or (1.146); however, such rotation matrix must satisfy the orthonormal constraint. Otherwise, the calculation errors of the attitude angles may be excessive. For the ill-conditioned rotation metrix, its components are not given a full play in Eqs. (1.144) and (1.146). As a result, the accuracy of the attitude angle sequence is poorer than the cosine measurement accuracy of such angle.

Apart from measurement errors in engineering, such ill-conditioned rotation matrix is also attributable to computer numerical truncation errors. Given an AC, The rotation matrix of any link appears ill-conditioned to some extent, and it requires such orthonormalization in actual applications. After the orthonormalization of Eq. (1.171):

$$^{r}Q_{c}=\begin{bmatrix}-0.002617997583 & 0.999996602535 & 0.000000059527\\ 0.000000059527 & 0.000000015190 & 1.000000000000\\ 0.999996602535 & 0.002617953112 & -0.00000104176\end{bmatrix}.$$

After such orthonormalization, the accuracy is up to eight-bit. Therefore, the calculation of a rotation matrix with direction cosine requires higher measurement accuracy and "orthonormalization" of such matrix. Otherwise, the computational accuracy of ACs will witness a gradual dilution process. Accordingly, more efforts are needed to determine how to realize such orthononnalized rotation matrix.

Elementary Operations for Matrices Vs. Axial Polarities

In the analysis of robot kinematics and dynamics, the focus is on the relationship among tensor coordinate matrix, rather than that among reference bases. A tensor coordinate matrix can be expressed with matrix. The coordinate array of a high-order tensor can be expressed as the vector and matrix of a matrix. As an information ordering mode, the matrix is compatible with the way that we are thinking about everything as well as the progress of numerical calculation.

[1] Elementary Transformation of Coordinate Axis-Sequences

The unit normal vectors of six sides of a cube can define 6 different reference axes and establish 6 reference frames, any two of which are equivalent. Due to different polarity definitions, it is often necessary to transform coordinates defined with diversified polarities.

Figure 21A:
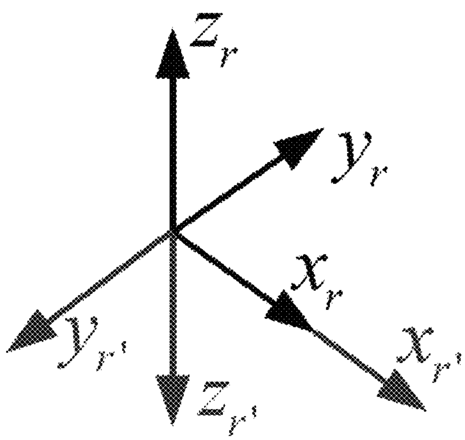
FIG. 21*a*, 21*b* are relation diagrams of two sets of coordinate systems.
Figure 21B:
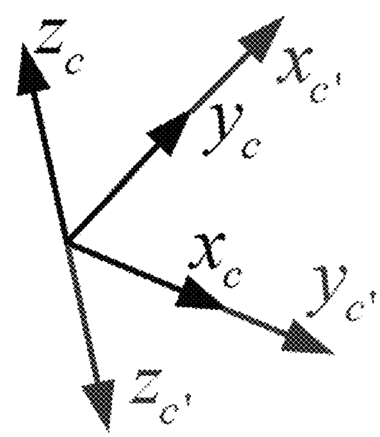

EXAMPLE 2.5. Followed by example 2.4 frames # r' and # c' respectively corresponding to frames # r and # c are defined, with their relationship as shown in FIGS. 21$a$ and 21$b$. $^{r'}Q_{c'}$ is solved as follows.

SOLVER 1: The direction cosine relationship of reference frames gives:

$$^{r'}Q_{c'}=\begin{bmatrix}^{r'}e_{c'}^{[x]}\\ ^{r'}e_{c'}^{[y]}\\ ^{r'}e_{c'}^{[z]}\end{bmatrix}^{T}=\begin{bmatrix}C_{c'x}^{r'x} & C_{c'y}^{r'x} & C_{c'z}^{r'x}\\ C_{c'x}^{r'y} & C_{c'y}^{r'y} & C_{c'z}^{r'y}\\ C_{c'x}^{r'z} & C_{c'y}^{r'z} & C_{c'z}^{r'z}\end{bmatrix}=\begin{bmatrix}C_{cy}^{rx} & C_{cx}^{rx} & -C_{cz}^{rx}\\ -C_{cy}^{ry} & -C_{cx}^{ry} & C_{cz}^{ry}\\ -(C_{cy}^{rz} & -C_{cx}^{rz} & C_{cz}^{rz}\end{bmatrix}.$$

SOLVER 2: At first, the elementary column transformation to $^{r}Q_{c}$ is performed, i.e. exchange of $x_c$ and $y_c$, and negation of $z_c$, to work out $^{r}Q_{c'}$.

$$\begin{array}{|cccc|}\hline ^{r}Q_{c} & cx & cy & cz\\ rx & C_{cx}^{rx} & C_{cy}^{rx} & C_{cz}^{rx}\\ ry & C_{cx}^{ry} & \phi_{cy}^{ry} & C_{cz}^{ry}\\ rz & C_{cx}^{rz} & \phi_{cy}^{rz} & C_{cz}^{rz}\\ \hline\end{array}\rightarrow\begin{array}{|cccc|}\hline ^{r}Q_{c'} & c'y & c'x & -c'z\\ rx & C_{c'y}^{rx} & C_{c'x}^{rx} & -C_{c'z}^{rx}\\ ry & C_{c'y}^{ry} & C_{c'x}^{ry} & -C_{c'z}^{ry}\\ rz & C_{c'y}^{rz} & C_{c'x}^{rz} & -C_{c'z}^{rz}\\ \hline\end{array}, \quad (1.172)$$

Next, the elementary row transformation to $^{r}Q_{c'}$ is implemented, i.e. negation of $y_r$ and $z_r$, to work out $^{r'}Q_{c'}$.

$$\begin{array}{|cccc|}\hline ^{r}Q_{c'} & c'y & c'x & -c'z\\ rx & C_{c'y}^{rx} & C_{c'x}^{rx} & -C_{c'z}^{rx}\\ ry & C_{c'y}^{ry} & C_{c'x}^{ry} & -C_{c'z}^{ry}\\ rz & C_{c'y}^{rz} & C_{c'x}^{rz} & -C_{c'z}^{rz}\\ \hline\end{array}\rightarrow$$

$$\begin{array}{|cccc|}\hline ^{r'}Q_{c'} & c'x & c'y & c'z\\ r'x & C_{c'y}^{r'x} & C_{c'x}^{r'x} & -C_{c'z}^{r'x}\\ -r'y & -C_{c'y}^{r'y} & -C_{c'x}^{r'y} & C_{c'z}^{r'y}\\ -r'z & -C_{c'y}^{r'z} & -C_{c'x}^{r'z} & C_{c'z}^{r'z}\\ \hline\end{array}\rightarrow\begin{array}{|cccc|}\hline ^{r'}Q_{c'} & c'x & c'y & c'z\\ r'x & C_{c'y}^{r'x} & C_{c'x}^{r'x} & -C_{c'z}^{r'x}\\ -r'y & -C_{c'y}^{r'y} & -C_{c'x}^{r'y} & C_{c'z}^{r'y}\\ -r'z & -C_{c'y}^{r'z} & -C_{c'x}^{r'z} & C_{c'z}^{r'z}\\ \hline\end{array}.$$

It is solved.

As indicated by this resolution process in example 2.4, these elementary transformations, such as "row/column switching" and "row/column multiplication", substantially change the orders and polarities of reference bases, rather than the eigenmotion relation expressed with matrix. Accordingly, with respect to the definition of coordination systems in different orders, their transformation relations can rely on these elementary transformations.

[2] Elementary Transformation for Coordinate Transformation

The $^{i|k}r_l={}^{i}Q_k\cdot{}^{k}r_l$ can be derived from Eq. (1.89), i.e right-handed multiplication transformation of matrix:

$$\begin{array}{|cccc|}\hline ^{i}Q_{k} & x_k & y_k & z_k\\ x_i & ^{i}Q_{k}^{[1][x]} & ^{i}Q_{k}^{[1][y]} & ^{i}Q_{k}^{[1][z]}\\ y_i & ^{i}Q_{k}^{[2][x]} & ^{i}Q_{k}^{[2][y]} & ^{i}Q_{k}^{[2][z]}\\ z_i & ^{i}Q_{k}^{[3][x]} & ^{i}Q_{k}^{[3][y]} & ^{i}Q_{k}^{[3][z]}\\ \hline\end{array}\cdot\begin{bmatrix}^{k}r_l\\ ^{k}r_l^{[1]}\\ ^{k}r_l^{[2]}\\ ^{k}r_l^{[3]}\end{bmatrix}=\begin{bmatrix}^{i|k}r_l\\ ^{i|k}r_l^{[1]}\\ ^{i|k}r_l^{[2]}\\ ^{i|k}r_l^{[3]}\end{bmatrix}, \quad (1.173)$$

Eq. (1.173) is equivalent to:

$$\boxed{\begin{matrix} {}^iQ_k & x_k & y_k & z_k \\ x_i & {}^iQ_k^{[1][x]} & {}^iQ_k^{[1][y]} & {}^iQ_k^{[1][z]} \\ y_i & {}^iQ_k^{[2][x]} & {}^iQ_k^{[2][y]} & {}^iQ_k^{[2][z]} \\ z_i & {}^iQ_k^{[3][x]} & {}^iQ_k^{[3][y]} & {}^iQ_k^{[3][z]} \end{matrix}} \cdot \begin{bmatrix} {}^kr_l \\ {}^kr_l^{[1]} \\ {}^kr_l^{[2]} \\ {}^kr_l^{[3]} \end{bmatrix} = \begin{bmatrix} {}^iT_k & x_k & y_k & z_k \\ x_i & 1 & 0 & 0 \\ y_i & 0 & 1 & 0 \\ z_i & 0 & 0 & 1 \end{bmatrix} \cdot \begin{bmatrix} {}^{i|k}r_l \\ {}^{i|k}r_l^{[1]} \\ {}^{i|k}r_l^{[2]} \\ {}^{i|k}r_l^{[3]} \end{bmatrix}, \tag{1.174}$$

"Elementary transformations" are performed for Eq. (1.174). For example, the rows $x_i$ and $y_i$ in Eq. (1.174) are exchanged, and the row $z_i$ is multiplied by the constant $c_i$, wherein $c_i \in \mathcal{R}$; accordingly, $$\boxed{\begin{matrix} {}^iQ_k & x_k & y_k & z_k \\ y_i & {}^iQ_k^{[2][x]} & {}^iQ_k^{[2][y]} & {}^iQ_k^{[2][z]} \\ x_i & {}^iQ_k^{[1][x]} & {}^iQ_k^{[1][y]} & {}^iQ_k^{[1][z]} \\ c_iz_i & c_i \cdot {}^iQ_k^{[3][x]} & c_i \cdot {}^iQ_k^{[3][y]} & c_i \cdot {}^iQ_k^{[3][z]} \end{matrix}} \cdot \begin{bmatrix} {}^kr_l \\ {}^kr_l^{[1]} \\ {}^kr_l^{[2]} \\ {}^kr_l^{[3]} \end{bmatrix} = \begin{bmatrix} {}^iT_k & x_k & y_k & z_k \\ y_i & 0 & 1 & 0 \\ x_i & 1 & 0 & 0 \\ c_iz_i & 0 & 0 & c_n \end{bmatrix} \cdot \begin{bmatrix} {}^{i|k}r_l \\ {}^{i|k}r_l^{[1]} \\ {}^{i|k}r_l^{[2]} \\ {}^{i|k}r_l^{[3]} \end{bmatrix}. \tag{1.175}$$

Apparently, Eq. (1.174) is equivalent to Eq. (1.175). The ${}^iT_k$ is called the elementary matrix of row operation. Such elementary matrix has no influence on solutions of linear equation.

For Eq. (1.90), i.e. left multiplication of vector ${}^lr_{lS}{}^T = {}^{\bar{l}|l}r_{lS}{}^T \cdot {}^{\bar{l}}Q_l$, the elementary column transformation and the elementary matrix of column operation are available.

Based on the linear algebra theory, such elementary row or column transformation may be implemented to transform ${}^nQ_k$ into a unit matrix 1, which, thus, contributes to ${}^kT_n = {}^nQ_k^{-1}$ and ${}^kr_l = {}^kQ_n \cdot {}^{n|k}r_l$.

Besides, such elementary transformations are basic operations of a matrix's inverse matrix, triangularization and diagonalization. In this regard, pivot operations play an extraordinarily critical role for such matrix operations and enjoy a wide range of applications in robot dynamics calculations.

Non-linear equations root in linear ones, and the complex number space is based on the real number space. To ensure invariable topologies and metrics, it is imperative to understand complex numbers and the reference bases of non-linear space appropriately. As elaborated in Chapter 3, Axis-Invariants are primitives of kinematic chains for the real and complex space and provide the basis for problems concerning high-DOF and high-dimensional space.

Given the AC ${}^i\mathbf{1}_n = (i, \ldots, \bar{n}, n]$, ${}^{\bar{l}}Q_l$ can be worked out from Eq. (1.86), Eqs. (1.59) and (1.81) result in:

$${}^iQ_n = \prod_l^{{}^i\mathbf{1}_n} \left({}^{\bar{l}}Q_l\right) \tag{1.176}$$

Eq. (1.176) is solved for the attitude calculation of the AC ${}^i\mathbf{1}_n$. On the one hand, such ill-conditioned ${}^{\bar{l}}Q_l$ in engineering contributes to a deteriorated ill-conditioned ${}^iQ_n$. On the other hand, Eq. is not applicable to the calculation of ${}^{\bar{l}}Q_l$, but only applies to the Cartesian Axis-Chain (CAC). Generally, rotational axes are inconsistent with coordinate axes.

The ${}^{\bar{l}}\phi_l$ and ${}^{\bar{l}}r_l$ are worked out from Eq. (1.46), Eqs. (1.59) and (1.116) result in:

$${}^i\phi_n = \sum_l^{{}^i\mathbf{1}_n} \left({}^{i|\bar{l}}n_l \cdot \phi_l^{\bar{l}}\right). \tag{1.177}$$

Eqs. (1.58) and (1.89) result in:

$${}^ir_{nS} = \sum_l^{{}^i\mathbf{1}_{nS}} \left({}^{i|\bar{l}}r_l\right). \tag{1.178}$$

Eq. (1.178) is solved for the position calculation of the AC ${}^i\mathbf{1}_{nS}$.

Eq. (1.178) results in:

$${}^iR_n = \prod_l^{{}^i\mathbf{1}_n} \left({}^{\bar{l}}R_l\right). \tag{1.179}$$

Eq. (1.179) results in:

$$\begin{cases} {}^{\bar{l}}\dot{\phi}_l = {}^{\bar{l}}n_l \cdot \dot{\phi}_l^{\bar{l}} & \text{if } {}^{\bar{l}}k_l \in C \\ {}^{\bar{l}}\dot{r}_l = {}^{\bar{l}}n_l \cdot \dot{r}_l^{\bar{l}} & \text{if } {}^{\bar{l}}k_l \in C \end{cases}, \tag{1.180}$$

$$\begin{cases} \bar{l}\ddot{\phi}_l = {}^{\bar{l}}n_l \cdot \ddot{\phi}_l^{\bar{l}} & \text{if } {}^{\bar{l}}k_l \in C \\ {}^{\bar{l}}\ddot{r}_l = {}^{\bar{l}}n_l \cdot \ddot{r}_l^{\bar{l}} & \text{if } {}^{\bar{l}}k_l \in C \end{cases}. \tag{1.181}$$

Apparently, the rotational velocity ${}^{\bar{l}}\dot{\phi}_l$ and the relative translational velocity ${}^{\bar{l}}\dot{r}_l$ are vectors; and the same applies to the relative rotational acceleration ${}^{\bar{l}}\ddot{\phi}_l$ and the relative translational velocity ${}^{\bar{l}}\ddot{r}_l$.

Following are defined:

$$ {}^{i|\bar{l}}\dot{r}_l \triangleq {}^iQ_{\bar{l}} \cdot \frac{d}{dt}\left({}^{\bar{l}}r_l\right),\quad {}^{i|\bar{l}}\ddot{r}_l \triangleq {}^iQ_{\bar{l}} \cdot \frac{d^2}{dt^2}\left({}^{\bar{l}}r_l\right) \\ {}^{i|\bar{l}}\dot{\tilde{\phi}}_l \triangleq {}^iQ_{\bar{l}} \cdot \frac{d}{dt}\left({}^{\bar{l}}\tilde{\phi}_l\right),\quad {}^{i|\bar{l}}\ddot{\tilde{\phi}}_l \triangleq {}^iQ_{\bar{l}} \cdot \frac{d^2}{dt^2}\left({}^{\bar{l}}\tilde{\phi}_l\right) \tag{1.182} $$

According to Eq. (1.182), the derivative operator · takes priority over the projection operator |. Such derivation is relative, as the effect of such basis vector $e_{\bar{l}}$ relative to the motion of the inertial basis vector $e_i$ is not taken into account.

Eq. (1.182) results in:

$$ {}^i\dot{r}_{nS} = \sum_l^{{}^i1_{nS}} \left({}^{i|\bar{l}}\dot{r}_l\right), \tag{1.183} $$

$$ {}^i\ddot{r}_{nS} = \sum_l^{{}^i1_{nS}} \left({}^{i|\bar{l}}\ddot{r}_l\right). \tag{1.184} $$

For the AC ${}^i1_{nS}$, the relative translational velocity ${}^i\dot{r}_{nS}$ and the relative translational acceleration ${}^i\ddot{r}_{nS}$ are calculated respectively according to Eq. (1.183) and (1.184). Apparently, the convected velocities of its links are not taken into account in this process.

Eq. (1.177) results in:

$$ {}^i\dot{\phi}_n = \sum_l^{{}^i1_n} \left({}^{i|\bar{l}}n_l \cdot \dot{\phi}_l^{\bar{l}}\right), \tag{1.185} $$

$$ {}^i\ddot{\phi}_n = \sum_l^{{}^i1_n} \left({}^{i|\bar{l}}n_l \cdot \ddot{\phi}_l^{\bar{l}}\right). \tag{1.186} $$

For the AC ${}^i1_{nS}$, the relative rotational velocity ${}^i\dot{\phi}_n$ and the relative rotational acceleration ${}^i\ddot{\phi}_n$ are calculated respectively according to Eqs. (1.185) and (1.186). Apparently, the convected accelerations of its links are not taken into account in this process.

However, such theoretic significance of relative velocities and accelerations cannot represent real velocities or accelerations of an AC. For correct representations of basic system properties including velocity, acceleration and energy, it is imperative to take the convected motion effect of AC links into account properly.

In light of the needs for such accurate MAS, subsequent chapters are based on the kinematic chain symbolic calculus system to develop the axis-invariants-based MAS theory, with major considerations as follows:

[1] With regard to the precision measurement of structural parameters, the errors in MAS machining and assembly should be considered to minimize possible measurement and calculation errors. In a natural joint space, the precision optical equipment should be used to measure the structural parameters for characterization of Fixed axis-invariant. On the one hand, no error in system machining or assembly will be negligible. On the other hand, the accuracy in the measurement of spatial positions with the precision optical equipment can also be given equal consideration. Consequently, the engineering realizability is ensured. As natural invariants of MAS, fixed axis-invariant can be measured easily in engineering.

[2] As for real-time and accurate calculations, the complexity in calculation arising from a high-DOF MAS should be taken into account. Specifically, the iterative kinematic and dynamic equations should be established; and on the other hand, it is also imperative to develop the description methods of kinematic properties consistent with the system DOF and determine minimum operations for attributes. Based on the kinematic chain symbolic calculus system, such natural invariants (fixed axis-invariant $\bar{\Pi}_l$ natural coordinates $r_l^{\bar{l}}$ and $\phi_l^{\bar{l}}$) based MAS theory is of pragmatic significance to the axis-invariants-based iterative kinematic and dynamic equations, so ensuring the real-time and accurate calculations of MAS.

[3] From the perspective of engineering development, such high-DOF MAS leads to complex calculations and engineering realization. On the one hand, it is necessary to provide engineering technologists with the accurate, concise and structured symbolic language which should contain the accurate description of attributes and their interrelations, and to take the matrix manipulation features of modern numerical computers into account. On the other hand, the structured COSS should be applied to improve the engineering realization efficiency. For this purpose, pseudo-codes necessary for programming realization should be substituted with structured symbolic MAS equations; and the computer software will also be required for kinematics and dynamics modeling and analysis. Such kinematic chain symbolic calculus system is a kind of structured symbolic language which can meet the aforesaid needs. Featured by pseudo-code functions and iterative calculations, those axis-invariants based kinematic and dynamic equations accelerate the engineering realization process.

[4] For the compatibility of diversified theoretical approaches, the current multi-body system theory contains different theory branches which enjoy respective application features. As a result, it is imperative to unify them for the sake of theoretical research and real-time and accurate system realization. Therefore, based on the kinematic chain symbolic calculus system, an axiomatic MAS theory system is established. Specifically, the screw-axis-chain system with screw-axis as primitive can unify the theories on 3D and 6D vector spaces, complex number spaces, quaternion and dual-quaternions spaces.

Such axis-invariant based MAS plays a significant role as follows:

[1] Based on the kinematic chain symbolic calculus system as well as axis-invariants, the MAS modeling and control theory has been established;

[2] In the MAS that acts as a natural coordinate axis system, natural coordinate axes are regarded as its primitives; and

[3] The MAS model featured by the COSS contains algebraic equations represented by axis-invariants (natural reference axes) and natural coordinates. The MAS theory is an algebra system which is designed for the natural axis-space study and featured by tree-typed AC topological operations.

Research Ideas of the MAS modeling and control theory:

[1] At first, axis-invariants are investigated as basic attributes. Next, 3D spatial operator algebras with natural-axes for reference are investigated;

[2] The subsequent study focuses on spatial points, particles and rigid bodies;

[3] Furthermore, the relations of link kinematics and AC kinematics are also investigated; and

[4] Finally, the tree-typed AC system dynamics is investigated to develop the axis-invariants-based MAS modeling theory.

Section 2 Axis-Invariant Based Forward Kinematics

[1] It is known from section 1 that the Axis-chain ${}^i\mathbf{l}_n=(i, \ldots, \bar{n}, n]$ has the following basic axioms:

[1.1] ${}^i\mathbf{l}_n$ has the half-open attribute, i.e.

$$i \notin {}^i l_n, n \in {}^i l_n. \tag{2.1}$$

[1.2] ${}^i\mathbf{l}_n$ has a null-chain ${}^i\mathbf{k}_i$, i.e.

$$ {}^i k_l \in {}^i l_n, |{}^i k_l|=0. \tag{2.2}$$

[1.3] The Axis-chain ${}^i\mathbf{l}_n$ has transitivity (additivity or integrability):

$$ {}^i l_n = {}^i l_l + {}^l l_n, \tag{2.3}$$

$$ {}^i l_n = {}^i l_l \cdot {}^l l_n. \tag{2.4}$$

[1.4] The Axis-chain ${}^l\mathbf{l}_n$ has reversibility, i.e.

$$ {}^l l_n = -{}^n l_l. \tag{2.5}$$

[2] For the AC ${}^i\mathbf{l}_n=(i, \ldots, \bar{n}, n]$, there are the following basic conclusions:

$$ {}^i Q_n = \sum_l^{{}^i\mathbf{1}_n} \left({}^{\bar{l}}Q_l\right), \tag{2.6}$$

$$ {}^i \phi_n = \sum_l^{{}^i\mathbf{1}_n} \left({}^{i|\bar{l}}n_l \cdot \phi_l^{\bar{l}}\right), \tag{2.7}$$

$$ {}^i r_{nS} = \sum_l^{{}^i\mathbf{1}_{nS}} \left({}^{i|\bar{l}}r_l\right) = \sum_l^{{}^i\mathbf{1}_{nS}} \left({}^{i|\bar{l}}l_l + {}^{i|\bar{l}}n_l \cdot r_l^{\bar{l}}\right), \tag{2.8}$$

$$ \begin{matrix} {}^{i|\bar{l}}\dot{\phi}_l = {}^i Q_{\bar{l}} \cdot {}^{\bar{l}}n_l \cdot \dot{\phi}_l^{\bar{l}}, & \text{if } {}^{\bar{l}}k_l \in R \\ {}^{i|\bar{l}}\dot{r}_l = {}^i Q_{\bar{l}} \cdot {}^{\bar{l}}n_l \cdot \dot{r}_l^{\bar{l}}, & \text{if } {}^{\bar{l}}k_l \in P \end{matrix}, \tag{2.9}$$

$$ \begin{matrix} {}^{i|\bar{l}}\ddot{\phi}_l = {}^i Q_{\bar{l}} \cdot {}^{\bar{l}}n_l \cdot \ddot{\phi}_l^{\bar{l}}, & \text{if } {}^{\bar{l}}k_l \in R \\ {}^{i|\bar{l}}\ddot{r}_l = {}^i Q_{\bar{l}} \cdot {}^{\bar{l}}n_l \cdot \ddot{r}_l^{\bar{l}}, & \text{if } {}^{\bar{l}}k_l \in P \end{matrix}. \tag{2.10}$$

[3] If k, l∈A, there are the following 2nd-order moment relationships:

$$ {}^k\tilde{r}_{kS} \cdot {}^{k|l}\tilde{r}_{lS} = {}^{k|l}r_{lS} \cdot {}^k r_{kS}^T - {}^{k|l}r_{lS}^T \cdot {}^k r_{kS} \cdot \mathbf{1}, \tag{2.11}$$

$$ {}^k\tilde{r}_{kS} \cdot {}^{k|l}\tilde{r}_{lS} = {}^{k|l}r_{lS} \cdot {}^k r_{kS}^T - {}^k r_{kS} \cdot {}^{k|l}r_{lS}^T, \tag{2.12}$$

$$ {}^k\tilde{r}_{kS} \cdot {}^{k|l}\tilde{r}_{lS} - {}^{k|l}\tilde{r}_{lS} \cdot {}^k\tilde{r}_{kS} = {}^{k|l}r_{lS} \cdot {}^k r_{kS}^T - {}^k r_{kS} \cdot {}^{k|l}r_{lS}^T. \tag{2.13}$$

[4] Relationship between left ordering vector product and transposition $$ {}^i\dot{\phi}_l^T \cdot {}^{i|l}\tilde{r}_{lS} = -{}^{i|l}r_{lS}^T \cdot {}^i\dot{\tilde{\phi}}_l, \left({}^i\dot{\phi}_l^T \cdot {}^{i|l}\tilde{r}_{lS}\right)^T = {}^i\dot{\tilde{\phi}}_l \cdot {}^{i|l}r_{lS}. \tag{2.14}$$

PROOF: Since $$ \begin{matrix} \left({}^i\dot{\tilde{\phi}}_l \cdot {}^{i|l}r_{lS}\right)^T = \left(-{}^{i|l}\tilde{r}_{lS} \cdot {}^i\dot{\phi}_l\right)^T = {}^i\dot{\phi}_l^T \cdot {}^{i|l}\tilde{r}_{lS} \\ {}^i\dot{\phi}_l^T \cdot {}^{i|l}\tilde{r}_{lS} = -{}^{i|l}r_{lS}^T \cdot {}^i\dot{\tilde{\phi}}_l, \quad \left({}^i\dot{\phi}_l^T \cdot {}^{i|l}\tilde{r}_{lS}\right)^T = {}^i\dot{\tilde{\phi}}_l \cdot {}^{i|l}r_{lS} \end{matrix}.$$

Q.E.D.

[5] 3D Spatial Operation Algebra

Although multibody dynamics has been studied extensively, it lacks the Kinematic Chain-Ordering Symbol System (COSS) and does not establish the space algebra system based on Axis-invariant. The proposed spatial operation algebra differs from the traditional one in the following ways:

[5.1] Operation is the basic motion of space, i.e. the action or operation performed by the computer; operation includes the address access, matrix row/line permutation, and topological relation access, also includes the calculation of the functor; therefore, operation is the generalization of the operator concept. The MAS kinematics and dynamics not only are relevant to system topology, but also are realized through the computer; consequently, it needs to establish the corresponding operation algebra;

[5.2] On the one hand, the spatial operation is more direct and easy to understand. The MAS can change from one state to another in response to some external operation. On the other hand, it is easy to implement by computer software, and the computer system itself is a computing system based on a set of basic operations; the matrix calculation including address access, pivot operation, LU and $LDL^T$ decomposition and so on are the bases of computer numerical calculation;

[5.3] 3D Spatial Operation Algebra (3D SOA) mainly characterizes the spatial kinematic relationship through the space or computer operating sequences, and the Chain-Ordering (CO) is the basic characteristic of the spatial operator. The spatial operation needs to ensure topological invariance, metric invariance, and duality, as well as the accuracy and real-time performance of measurement and numerical calculation, which are the basic characteristics of 3D SOA;

[5.4] The 3D SOA needs to determine the primitives of the space operation to ensure the efficiency of the complex space operation. The natural reference axis and 3D joint space Axis-invariant based on a natural frame are the primitives of the spatial operator. The Cartesian frames, such as Denavit-Hartenberg (D-H) frames and other required frames, can be set through a set of natural reference axes. MASs can be parameterized through Axis-invariants and joint variables to ensure the accuracy of the engineering survey and flexibility of spatial reference.

In conclusion, the 3D SOA based on the COSS, is a 3D spatial forward kinematic calculation system with symbolic calculus, spatial motion and matrix calculation as its core. It is different from the traditional 6D spatial operator algebra.

Axis-Invariant Based 3D Vector Spatial Operation Algebra

The structural parameters of the system are represented by the fixed Axis-invariant, and the algebraic product between the structural parameter are still the structural parameters. The joint variable is the scalar, and the algebraic product between the joint variable are called Composite Variable. The 3D vector consisting of structural parameters is called the Vector of Structural Parameters. The scalar consisting of joint variable is called Motion Salars. Axis-invariant The 3D vector spatial operation algebra system based on Axis-Invariant is a 3D space operation algebra system with Axis-Invariant as the core, and a second order polynomial system for structure vector and joint variable (scalar).

The Axis-vector ${}^{\bar{l}}\mathbf{n}_l$ of the joint pair ${}^{\bar{l}}\mathbf{k}_l$ represents the unit direction of the kinematic axis and is the natural reference axis, of which unit direction is determined by its members $[{}^{\bar{l}}\mathbf{n}_l^{[1]}, {}^{\bar{l}}\mathbf{n}_l^{[2]}, {}^{\bar{l}}\mathbf{n}_l^{[3]}]^T$. The Axis-vector ${}^{\bar{l}}\mathbf{n}_l$, has the following invariance:

$$ {}^{\bar{l}}n_l = {}^l n_{\bar{l}}, -{}^{\bar{l}}n_l = -{}^l n_{\bar{l}}. \tag{2.15}$$

From Eq. (2.15) we know that the Axis-vector ${}^{\bar{l}}\mathbf{n}_l$ is a full ordering vector, that is, its connection order is bidirectional, and the negative sign "–" cannot change the connection order, and ${}^{\bar{l}}\mathbf{n}_l \neq -{}^l\mathbf{n}_{\bar{l}}$; the coordinate component can be changed $-^{\bar{l}}n_l=[-^{\bar{l}}n_l^{[1]}, -^{\bar{l}}n_l^{[2]}, -^{\bar{l}}n_l^{[3]}]^T$. Therefore, the Axis-vector $^{\bar{l}}n_l$ is also called the Axis-invariant. The Axis-vector $^{\bar{l}}n_l$ is determined before system calculation as the common reference axis of links $\omega_{\bar{l}}$ and $\omega_l$, and can not be artificially changed during system calculation; otherwise, the references will be inconsistent.

We can easily determine the Natural-axis frame by the Axis-invariants, which has excellent spatial operating performance. The Axis-invariants can also be applied to solve many theoretical and engineering problems effectively.

In this chapter, we will build the theories of multi-axis kinemic based on axis-invariant on the base of axis chain, thus, build the kinematic and dynamic equations of the multi-axis system according to the number of axis of the multi-axis system.

Natural-Axis Frame Based on Axis-Invariant

As shown in FIG. 22, the Axis-vector $^{\bar{l}}n_l$ 2201 of joint pair $^{\bar{l}}k_l$ and zero position vector $^lu_{lS}$ 2202 are given, and S 2203 is located on the unit sphere. The Axis-vector $^{\bar{l}}n_l$ 2201 rotating 90° toward the unit vector $^lu_{lS}$ 2202 is called the natural zero axis vector, recorded as $_x{}^{\bar{l}}n_l$; the radial Axis-vector $_y{}^{\bar{l}}n_l$ can be determined by the Axis-vector $^{\bar{l}}n_l$ 2201 and natural zero axis $_x{}^{\bar{l}}n_l$ according to the right hand rule. The zero axis $_x{}^{\bar{l}}n_l$ and radial axis $_y{}^{\bar{l}}n_l$ at initial time $t_0$ are recorded as $_\bullet{}^{\bar{l}}n_l$ 2206 and $_\perp{}^{\bar{l}}n_l$ 2205 respectively, and are called the natural zero-position Axis-vector and natural radial Axis-vector.

The projection of the unit vector $^lu_{l_s}$ to the Axis-vector $^{\bar{l}}n_l$ is the scalar $^{\bar{l}}n_l^{T}\cdot{}^lu_{l_s}$; the projection vector of the unit vector $^lu_{l_s}$ to the Axis-vector $^{\bar{l}}n_l$ is $(^{\bar{l}}n_l\cdot{}^{\bar{l}}n_l^T)\cdot{}^lu_{l_s}$ (2207); the projection vector of the unit vector $^lu_{l_s}$ to the natural zero-position Axis-vector is $(1-^{\bar{l}}n_l\cdot{}^{\bar{l}}n_l^T)\cdot{}^lu_{l_s}$ (2208). Therefore, the radial projection transformation $^{\bar{l}}A_l$ of the unit vector $^lu_{l_s}$ and zero-position projection transformation $^{\bar{l}}N_l$ are expressed respectively as follows, $$^{\bar{l}}A_l={}^{\bar{l}}n_l\odot{}^{\bar{l}}n_l={}^{\bar{l}}n_l\cdot{}^{\bar{l}}n_l^T, \quad (2.16)$$

$$^{\bar{l}}N_l=1-{}^{\bar{l}}n_l\cdot{}^{\bar{l}}n_l^T. \quad (2.17)$$

The moment vector of Axis-vector $^{\bar{l}}n_l$ to $^lu_{l_s}$ is $^{\bar{l}}\tilde{n}_l\cdot{}^lu_{l_s}$ (2209); the unit vector $_0{}^lu_{l_s}$ is expressed as $$_0{}^lu_{lS}=(^{\bar{l}}n_l\cdot{}^{\bar{l}}n_l^T)\cdot{}_0{}^lu_{lS}+(1-{}^{\bar{l}}n_l\cdot{}^{\bar{l}}n_l^T)\cdot{}_0{}^lu_{lS}.$$

[1] If the unit vector $_0{}^lu_{l_s}$ is given, the natural zero-position Axis-vector $_\bullet{}^{\bar{l}}n_l$, the natural radial Axis-vector $_\perp{}^{\bar{l}}n_l$, and the Axis-vector $^{\bar{l}}n_l$ form the Natural-axis Frame. This frame is determined by the natural zero-position Axis-vector $_\bullet{}^{\bar{l}}n_l$ and the natural radical Axis-vector $_\perp{}^{\bar{l}}n_l$, which is in general different from natural frame $F^{[l]}$.

[2] If the joint constraint force $^lf_{lS}{}^C$ is given, since it is orthogonal to the Axis-vector $^{\bar{l}}n_l$, then $$^{\bar{l}}n_l^{T}\cdot{}^lf_{lS}{}^C=0_3. \quad (2.18)$$

$\mathrm{Diag}[^i\tilde{n}_l, \ldots {}^{i|\bar{k}}\tilde{n}_k \ldots, {}^{i|\bar{v}}\tilde{n}_v]$ is called the decoupled natural orthogonal complement matrix.

[3] The zero-position projection transformation $^{\bar{l}}N_l$ has symmetry, i.e.

$$^{\bar{l}}n_l^T={}^{\bar{l}}N_l, {}^{\bar{l}}N_l^{:2}={}^{\bar{l}}N_l. \quad (2.19)$$

PROOF: From Eq. (2.17)

$$^{\bar{l}}N_l^T=(1-{}^{\bar{l}}n_l\cdot{}^{\bar{l}}n_l^T)^T=1-{}^{\bar{l}}n_l\cdot{}^{\bar{l}}n_l^T={}^{\bar{l}}N_l,$$

$$^{\bar{l}}N_l^{:2}=(1-{}^{\bar{l}}n_l\cdot{}^{\bar{l}}n_l^T)\cdot(1-{}^{\bar{l}}n_l\cdot{}^{\bar{l}}n_l^T)=1-{}^{\bar{l}}n_l\cdot{}^{\bar{l}}n_l^T={}^{\bar{l}}N_l.$$

Q.E D.

Figure 23:
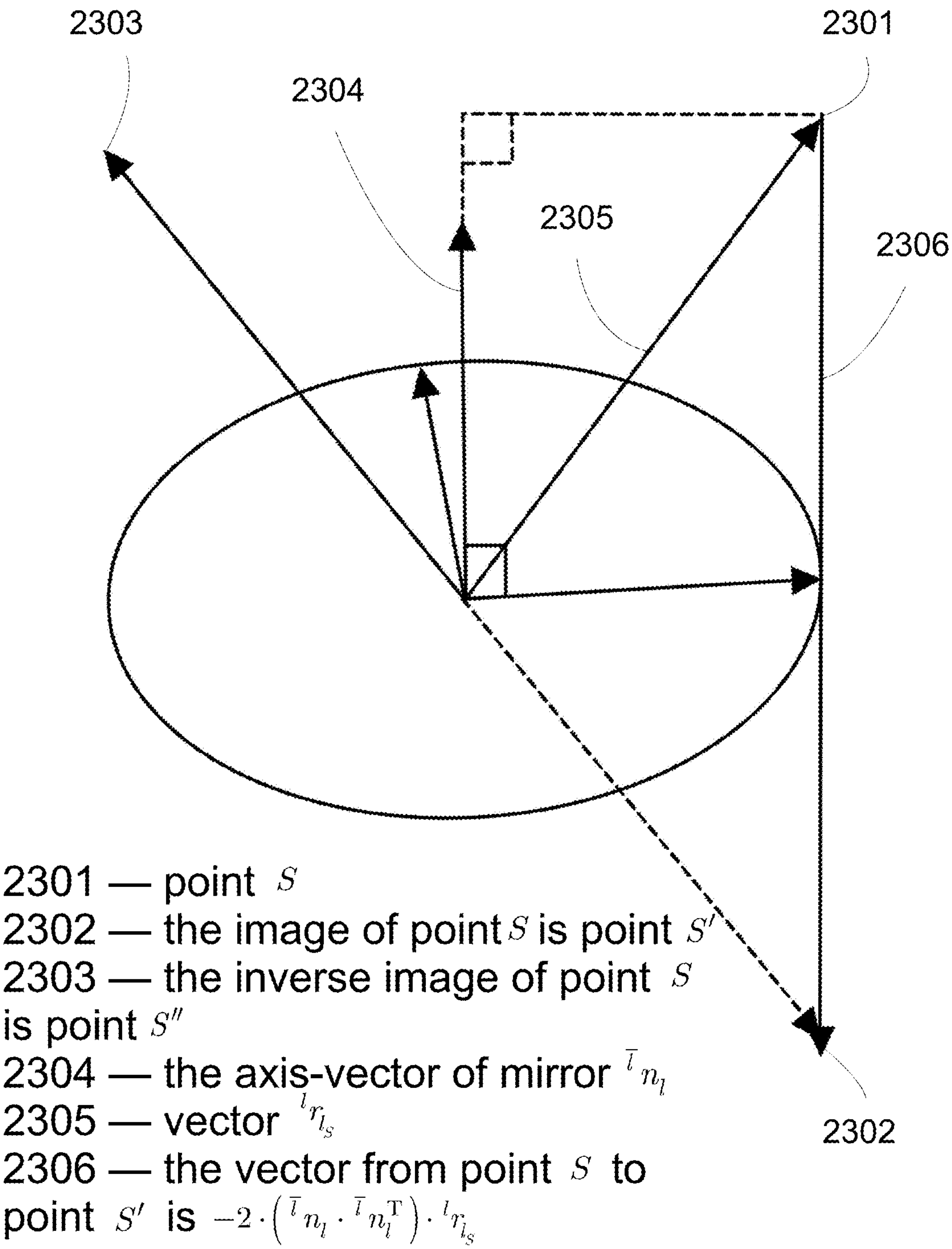
FIG. 23 is a diagram of vector mirroring transformation.

Mirror transformations can be easily realized through Axis-invariants. As shown in FIG. 23, point S' (2302) is the image of point S (2301), vector $^lr_{l_s}$ (2305), the Axis-vector of mirror is recorded as $^{\bar{l}}n_l$ (2304), and point S" (2303) is the inverse image of point S (2301). And $^lr_{l_s}=r_{l_s}{}^{l}\cdot{}^lu_{l_s}$, the vector from point S' (2302) to point S (2301) is noted as $-2\cdot(^{\bar{l}}n_l\cdot{}^{\bar{l}}n_l^T)\cdot{}^lr_{l_s}$.

Obtain $$^lr_{l_{s'}}={}^lr_{l_s}-2\cdot(^{\bar{l}}n_l\cdot{}^{\bar{l}}n_l^T)\cdot{}_lr_{l_s}=(1-2\cdot{}^{\bar{l}}n_l\cdot{}^{\bar{l}}n_l^T)\cdot{}^lr_{l_s}, \quad (2.20)$$

and $$^lr_{l_{s''}}=-{}^lr_{l_{s'}}=(2\cdot{}^{\bar{l}}n_l\cdot{}^{\bar{l}}n_l^T-1)\cdot{}^lr_{l_s}. \quad (2.21)$$

Note $$^{\bar{l}}M_l=1-2\cdot{}^{\bar{l}}n_l\cdot{}^{\bar{l}}n_l^T. \quad (2.22)$$

$^{\bar{l}}M_l$ is called the mirror transformation, and $-^{\bar{l}}M_l$ is the reflection transformation. Obviously, $$^{\bar{l}}M_l^{:2}=(1-2\cdot{}^{\bar{l}}n_l\cdot{}^{\bar{l}}n_l^T)\cdot(1-2\cdot{}^{\bar{l}}n_l\cdot{}^{\bar{l}}n_l^T)=1-2\cdot{}^{\bar{l}}n_l\cdot{}^{\bar{l}}n_l^T$$

$$\backslash-2\cdot{}^{\bar{l}}n_l\cdot{}^{\bar{l}}n_l^T+4\cdot{}^{\bar{l}}n_l\cdot{}^{\bar{l}}n_l^T\cdot{}^{\bar{l}}n_l\cdot{}^{\bar{l}}n_l^T=1$$

That is, the $^{\bar{l}}M_l$ is a self-inverse matrix. And $$^{\bar{l}}M_l^{:2}=1. \quad (2.23)$$

The mirror transformation can be applied to solve light reflection, refraction, image and many other issues, and is widely applied in the optical system.

Figure 24:
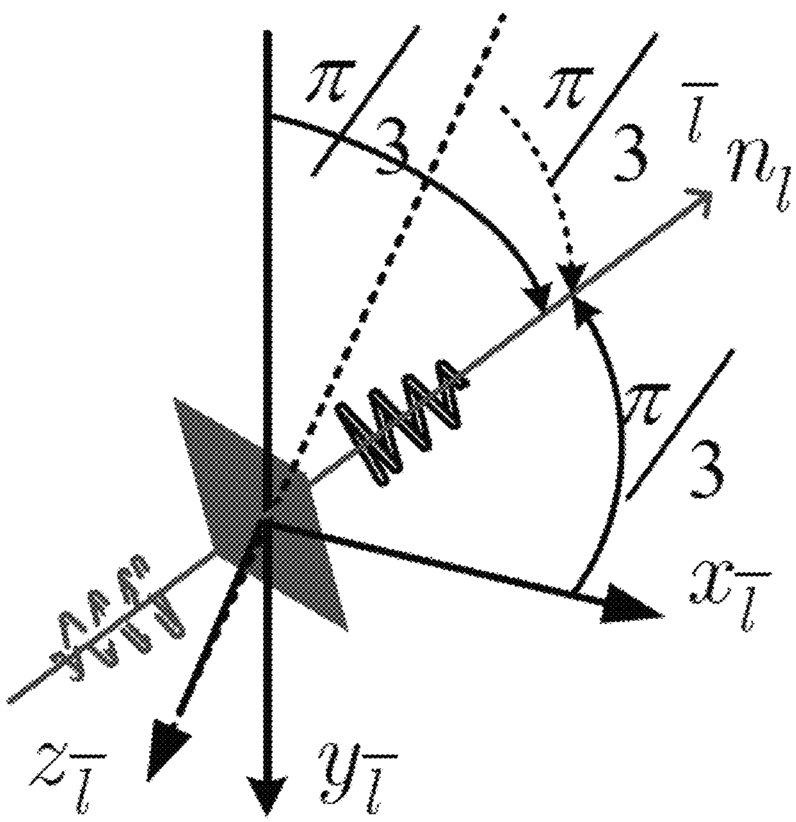
FIG. 24 is a orthophoto map.
Figure 26:
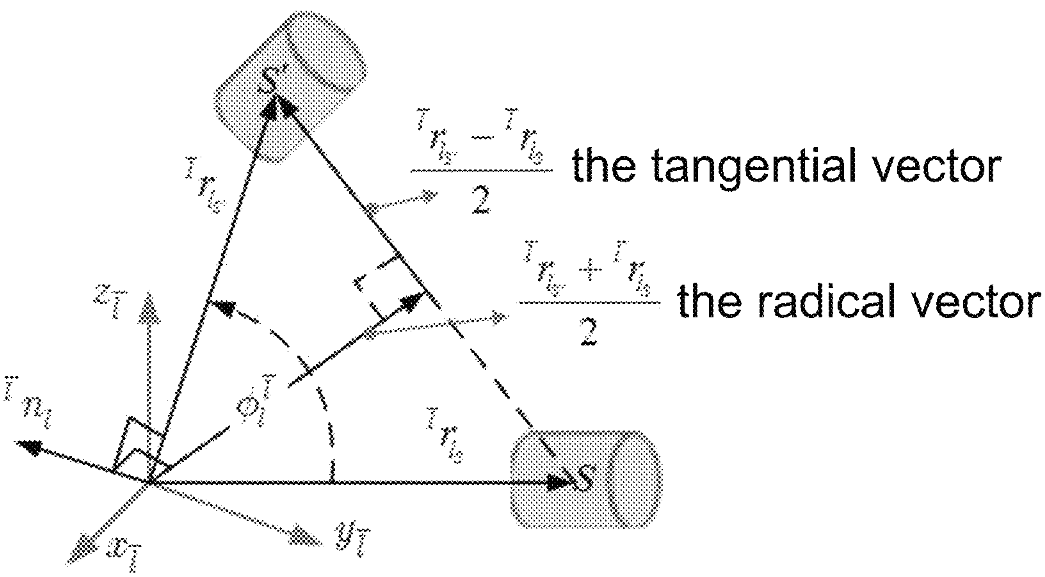
FIG. 26 is a meaning diagram of the Cayley parameter.

EXAMPLE 2.1. As shown in FIG. 24, it is an orthographic mirror image. The 3D world frame is Ī; the orthogonal projection is the image of the scene viewed from the mirror normal $^{\bar{l}}n_l$, wherein $\cos(\alpha)=\sqrt{3}/3$;

Then, the isometric perspective projection transformation is $$^{\bar{l}}M_l=\frac{1}{3}\cdot\begin{bmatrix}2 & -1 & -1\\ 1 & 2 & -1\\ -1 & 1 & 2\end{bmatrix}. \quad (2.24)$$

PROOF: From FIG. 24, $^{\bar{l}}n_l^T=\sqrt{3}/3\cdot[1\ -1\ -1]$. From Eq. (2.22) we have:

$$^{\bar{l}}M_l=1-2\cdot{}^{\bar{l}}n_l\cdot{}^{\bar{l}}n_l^T=1-\frac{1}{3}\cdot\begin{bmatrix}1\\ -1\\ -1\end{bmatrix}\cdot[1\ \ -1\ \ -1]=\frac{1}{3}\cdot\begin{bmatrix}2 & -1 & -1\\ 1 & 2 & -1\\ -1 & 1 & 2\end{bmatrix}.$$

Q.E.D.

The nilpotency of Axis-invariants is discussed below, which forms the basis for subsequent investigation.

[1] Power of the Axis-Screw Matrix

If the Axis-vector $^{\bar{l}}n_l$ of the joint pair $^{\bar{l}}k_l$ is given, then the 2nd-Order nilpotency of the Axis-vector $^{\bar{l}}n_l$ is $$^{\bar{l}}\tilde{n}_l^{:2p}=(-1)^p\cdot(1-{}^{\bar{l}}n_l\cdot{}^{\bar{l}}n+_l{}^T)=(-1)^{p+1}\cdot{}^{\bar{l}}\tilde{n}_l^{:2}, p\in\mathcal{N}, \quad (2.25)$$

$$^{\bar{l}}\tilde{n}_l^{:2p|1}=(-1)^p\cdot{}^{\bar{l}}\tilde{n}_l, p\in\mathcal{N}. \quad (2.26)$$

PROOF: $^{\bar{l}}n_l$ is the unit vector, and $|n_l^{\bar{l}}|=1$, which is proved via mathematical induction as follows.

When p=1, from Eq. (2.32) we know that this also sets Eq. (2.25). From Eq. (2.26), then $$^{\bar{l}}\tilde{n}_l^{:3}={}^{\bar{l}}\tilde{n}_l\cdot{}^{\bar{l}}\tilde{n}_l^{:2}={}^{\bar{l}}\tilde{n}_l\cdot(^{\bar{l}}n_l\cdot{}^{\bar{l}}n_l^T\cdot-1)=-{}^{\bar{l}}\tilde{n}_l. \quad (2.27)$$

When p=k, assuming that Eqs. (2.25) and (2.26) are set, i.e.

$$^{\bar{l}}n_l^{:2k}=(-1)^k\cdot(1-{}^{\bar{l}}n_l\cdot{}^{\bar{l}}n_l^T)=(-1)^{k+1}\cdot{}^{\bar{l}}\tilde{n}_l^{:2}, \quad (2.28)$$

$$^{\bar{l}}\tilde{n}_l^{:2k+1}=(-1)^k\cdot{}^{\bar{l}}\tilde{n}1, \quad (2.29)$$

then when p=k+1, Eqs. (2.28) and (2.29) result in $$\begin{aligned}{}^{\bar{l}}\tilde{n}_l^{:2(k+1)} &= {}^{\bar{l}}\tilde{n}_l^{:2}\cdot{}^{\bar{l}}\tilde{n}_l^{:2k} = -\left(1-{}^{\bar{l}}n_l\cdot{}^{\bar{l}}n_l^T\right)\cdot(-1)^k\cdot\left(1-{}^{\bar{l}}n_l\cdot{}^{\bar{l}}n_l^T\right)\\ &= (-1)^{k+1}\cdot\left(1-{}^{\bar{l}}n_l\cdot{}^{\bar{l}}n_l^T+{}^{\bar{l}}n_l\cdot{}^{\bar{l}}n_l^T-{}^{\bar{l}}n_l\cdot{}^{\bar{l}}n_l^T\right)\\ &= (-1)^{k+1}\cdot\left(1-{}^{\bar{l}}n_l\cdot{}^{\bar{l}}n_l^T\right) = (-1)^{k+2}\cdot{}^{\bar{l}}\tilde{n}_l^{:2}\\ {}^{\bar{l}}\tilde{n}_l^{:2k+3} &= -(-1)^k\cdot{}^{\bar{l}}\tilde{n}_l\cdot\left(1-{}^{\bar{l}}n_l\cdot{}^{\bar{l}}n_l^T\right) = (-1)^{k+1}\cdot{}^{\bar{l}}\tilde{n}_l.\end{aligned}$$

So Eqs. (2.25) and (2.26) are set. Q.E.D.

Therefore, ${}^{\bar{l}}\tilde{n}_l$ is called the 2st-Order screw matrix and has the character of antisymmetry. Correspondingly, ${}^{\bar{l}}\tilde{n}_l{:}^2$ and ${}^{\bar{l}}\tilde{n}_l{:}^3$ are called the 2nd-Order and 3rd-order screw matrix. As shown in Eqs. (2.28) and (2.29), ${}^{\bar{l}}\tilde{n}_l^{:k}$ has periodicity.

Since ${}^{\bar{l}}\tilde{n}_l$ is a 2nd-Order tensor, then $$^{i|\bar{l}}n_l = {}^iQ_{\bar{l}}\,{}^{\bar{l}}\tilde{n}_l\,{}^{\bar{l}}Q_i = -{}^{i|\bar{l}}n_{\bar{l}}. \tag{2.30}$$

Eq. (2.30) results in $${}^{\bar{l}}Q_i\,{}^{i|\bar{l}}\tilde{n}_l = {}^{\bar{l}}\tilde{n}_l\,{}^{\bar{l}}Q_i. \tag{2.31}$$

For the Axis-invariant ${}^{\bar{l}}n_l$, from Eqs. (2.17) and (2.11), then $$-{}^{\bar{l}}\tilde{n}_l^{:2} = 1-{}^{\bar{l}}n_l\cdot{}^{\bar{l}}n_l^T \triangleq {}^{\bar{l}}\underline{n}_l. \tag{2.32}$$

From Eq. (2.11), we get $${}^{\bar{l}|\bar{l}}\tilde{n}_{\bar{l}}\cdot{}^{\bar{l}}\tilde{n}_{\bar{l}} = {}^{\bar{l}}n_l\cdot{}^{\bar{l}|\bar{l}}\tilde{n}_{\bar{l}}^T - {}^{\bar{l}}n_l^T\cdot{}^{\bar{l}|\bar{l}}n_{\bar{l}}\cdot 1. \tag{2.33}$$

[2] Natural-Axis Quaternion and its Properties

The Axis-invariant ${}^{\bar{l}}n_l$ takes natural frame $F^{[\bar{l}]}$ as reference, and the angular position $\phi_l^{\bar{l}}$ takes the natural zero-position vector ${}_{\bullet}^{\bar{l}}n_l$ as reference, which constitute the 4D space. In the following, we define the Natural-axis quaternion ${}^{\bar{l}}\mathfrak{n}_l$ of the Axis-vector, the left hand (LH) screw-matrix ${}^{\bar{l}}\underset{\rightarrow}{\tilde{n}}_l$ and right hand (RH) screw-matrix ${}^{\bar{l}}\underset{\leftarrow}{\tilde{n}}_l$:

$${}^{\bar{l}}\mathfrak{n}_l \triangleq \left[{}^{\bar{l}}n_l,\ 0\right]^T \tag{2.34}$$

$$\begin{bmatrix}1&0\\0&1\end{bmatrix}=\mathbf{1},\ {}^{\bar{l}}\tilde{\mathfrak{n}}_l={}^{\bar{l}}\underset{\rightarrow}{\tilde{n}}_l\triangleq\begin{bmatrix}{}^{\bar{l}}\tilde{n}_l & {}^{\bar{l}}n_l\\ -{}^{\bar{l}}n_l^T & 0\end{bmatrix},\ {}^{\bar{l}}\tilde{\mathfrak{n}}_l^*={}^{\bar{l}}\underset{\leftarrow}{\tilde{n}}_l\triangleq\begin{bmatrix}-{}^{\bar{l}}\tilde{n}_l & -{}^{\bar{l}}n_l\\ {}^{\bar{l}}n_l^T & 0\end{bmatrix}.$$

From Eqs. (2.28), (2.29) and (2.34), then $$\begin{aligned}&{}^{\bar{l}}\tilde{\mathfrak{n}}_l^{:2p}=(-1)^p\cdot\mathbf{1},\ {}^{\bar{l}}\tilde{\mathfrak{n}}_l^{:2p+1}=(-1)^p\cdot{}^{\bar{l}}\tilde{\mathfrak{n}}_l,\ p\in N\\ &{}^{\bar{l}}\underset{\leftarrow}{\tilde{n}}_l^{:2p}=(-1)^p\cdot\mathbf{1},\ {}^{\bar{l}}\underset{\leftarrow}{\tilde{n}}_l^{:2p+1}=(-1)^p\cdot{}^{\bar{l}}\underset{\leftarrow}{\tilde{n}}_l,\ p\in N.\\ &{}^{\bar{l}}\underset{\rightarrow}{\tilde{n}}_l\cdot{}^{\bar{l}}\mathfrak{n}_l=\left[{}^{\bar{l}}n_l,-1\right]^T,\ {}^{\bar{l}}\underset{\leftarrow}{\tilde{n}}_l\cdot{}^{\bar{l}}\mathfrak{n}_l=\left[-{}^{\bar{l}}n_l,1\right]^T\end{aligned} \tag{2.35}$$

Given the axis-invariant of ${}^{\bar{l}}n_l$, p∈N, and define $${}^{\bar{l}}\underset{\leftarrow}{\dot{\phi}}_l \triangleq \dot{\phi}_l^{\bar{l}}\cdot\begin{bmatrix}-{}^{\bar{l}}\tilde{n}_l & -{}^{\bar{l}}n_l\\ {}^{\bar{l}}n_l^T & 0\end{bmatrix}. \tag{2.36}$$

PROOF: From the unit vector ${}^{\bar{l}}n_l$, then $|n_l^{\bar{l}}|=1$. When p=1, from Eq. (2.37), we know that $$\begin{aligned}{}^{\bar{l}}\underset{\leftarrow}{\dot{\phi}}_l^{:2} &= \dot{\phi}_l^{\bar{l}:2}\cdot\begin{bmatrix}-{}^{\bar{l}}\tilde{n}_l & -{}^{\bar{l}}n_l\\ {}^{\bar{l}}n_l^T & 0\end{bmatrix}\cdot\begin{bmatrix}-{}^{\bar{l}}\tilde{n}_l & -{}^{\bar{l}}n_l\\ {}^{\bar{l}}n_l^T & 0\end{bmatrix}\\ &= \dot{\phi}_l^{\bar{l}:2}\cdot\begin{bmatrix}{}^{\bar{l}}\tilde{n}_l & {}^{\bar{l}}n_l\\ -{}^{\bar{l}}n_l^T & 0\end{bmatrix}\cdot\begin{bmatrix}{}^{\bar{l}}\tilde{n}_l & {}^{\bar{l}}n_l\\ -{}^{\bar{l}}n_l^T & 0\end{bmatrix}\\ &= \dot{\phi}_l^{\bar{l}:2}\cdot\begin{bmatrix}{}^{\bar{l}}\tilde{n}_l^{:2}-{}^{\bar{l}}n_l\cdot{}^{\bar{l}}n_l^T & 0\\ 0 & -{}^{\bar{l}}n_l^T\cdot{}^{\bar{l}}n_l\end{bmatrix}\\ &= \dot{\phi}_l^{\bar{l}:2}\cdot\begin{bmatrix}-1&0\\0&-1\end{bmatrix} = -\dot{\phi}_l^{\bar{l}:2}\cdot\begin{bmatrix}1&0\\0&1\end{bmatrix}\end{aligned},$$

i.e.

$${}^{\bar{l}}\underset{\leftarrow}{\dot{\phi}}_l^{:2} = -\dot{\phi}_l^{\bar{l}:2}\cdot\begin{bmatrix}1&0\\0&1\end{bmatrix} = -\dot{\phi}_l^{\bar{l}:2}\cdot\mathbf{1}. \tag{2.39}$$

Eq. (2.39) results in $${}^{\bar{l}}\underset{\leftarrow}{\dot{\phi}}_l^{:3} = {}^{\bar{l}}\underset{\leftarrow}{\dot{\phi}}_l\cdot{}^{\bar{l}}\underset{\leftarrow}{\dot{\phi}}_l^{:2} = -{}^{\bar{l}}\underset{\leftarrow}{\dot{\phi}}_l^{:3}\cdot\begin{bmatrix}-{}^{\bar{l}}\tilde{n}_l & -{}^{\bar{l}}n_l\\ {}^{\bar{l}}n_l^T & 0\end{bmatrix}\cdot\begin{bmatrix}1&0\\0&1\end{bmatrix} = -\dot{\phi}_l^{\bar{l}:3}\cdot\begin{bmatrix}-{}^{\bar{l}}\tilde{n}_l & -{}^{\bar{l}}n_l\\ {}^{\bar{l}}n_l^T & 0\end{bmatrix},$$

i.e.

$${}^{\bar{l}}\underset{\leftarrow}{\dot{\phi}}_l^{:3} = -\dot{\phi}_l^{\bar{l}:3}\cdot\begin{bmatrix}-{}^{\bar{l}}\tilde{n}_l & -{}^{\bar{l}}n_l\\ {}^{\bar{l}}n_l^T & 0\end{bmatrix}, \tag{2.40}$$

When p=m, we can have Eqs. (2.37) and (2.38), then $${}^{\bar{l}}\underset{\leftarrow}{\dot{\phi}}_l^{:2m} = (-1)^m\cdot\dot{\phi}_l^{\bar{l}:2m}\cdot\begin{bmatrix}1&0\\0&1\end{bmatrix} = (-1)^m\cdot\dot{\phi}_l^{\bar{l}:2m}\cdot\mathbf{1}, \tag{2.41}$$

$${}^{\bar{l}}\underset{\leftarrow}{\dot{\phi}}_l^{:2m+1} = (-1)^m\cdot\dot{\phi}_l^{\bar{l}:2m+1}\cdot\begin{bmatrix}-{}^{\bar{l}}\tilde{n}_l & -{}^{\bar{l}}n_l\\ {}^{\bar{l}}n_l^T & 0\end{bmatrix}. \tag{2.42}$$

Then when p=m+1, from Eqs. (2.41) and (2.39), we have $${}^{\bar{l}}\underset{\leftarrow}{\dot{\phi}}_l^{:2m+2} = -\dot{\phi}_l^{\bar{l}:2}\cdot\begin{bmatrix}1&0\\0&1\end{bmatrix}\cdot(-1)^m\cdot\dot{\phi}_l^{\bar{l}:2m}\cdot\begin{bmatrix}1&0\\0&1\end{bmatrix} = (-1)^{m+1}\cdot\dot{\phi}_l^{\bar{l}:2m+2}\cdot\begin{bmatrix}1&0\\0&1\end{bmatrix}.$$

Eqs. (2.42) and (2.36) result in $${}^{\bar{l}}\underset{\leftarrow}{\dot{\phi}}_l^{:2m+3} = -\dot{\phi}_l^{\bar{l}:2}\cdot\begin{bmatrix}1&0\\0&1\end{bmatrix}\cdot(-1)^m\cdot\dot{\phi}_l^{\bar{l}:2m+1}\cdot\begin{bmatrix}-{}^{\bar{l}}\tilde{n}_l & -{}^{\bar{l}}n_l\\ {}^{\bar{l}}n_l^T & 0\end{bmatrix} = (-1)^{m+1}\cdot\dot{\phi}_l^{\bar{l}:2m+3}\cdot\begin{bmatrix}-{}^{\bar{l}}\tilde{n}_l & -{}^{\bar{l}}n_l\\ {}^{\bar{l}}n_l^T & 0\end{bmatrix}.$$

With the mathematical induction, we know that Eqs. (2.37) and (2.38) are workable. Q.E.D. From Eq. (2.37), we get $${}^{\bar{l}}\underset{\rightarrow}{\dot{\phi}}_l^{:2p} = (-1)^p\cdot\dot{\phi}_l^{\bar{l}:2p}\cdot\mathbf{1}. \tag{2.43}$$

According to Eq. (2.38), then $$ {}^{\bar{l}}\dot{\tilde{\phi}}_{\vec{l}}^{:2p+1} = (-1)^{p} \cdot \dot{\phi}_{l}^{\bar{l}:2p+1} \cdot {}^{\bar{l}}\tilde{n}_{\vec{l}}. \tag{2.44} $$

Eqs. (2.43) and (2.44) show that the power of the angular velocity screw-matrix is periodic.

[3] Rotation Vector

With the Axis-invariant, rotation can be expressed as a rotation vector. We will discuss below.

The process by which Frame l rotates with an angle of $\phi_l^{\bar{l}}$ around the Axis-vector ${}^{\bar{l}}n_l$ from natural frames $\bar{l}$ to l is called the fixed-axis rotation. Obviously, the Axis-vector ${}^{\bar{l}}n_l$ with respect to natural frames $\bar{l}$ to l is a constant vector, i.e., a fixed axis. The Axis-vector ${}^{\bar{l}}n_l$ determines the direction of fixed-axis rotation, and the angle $\phi_l^{\bar{l}}$ determines the magnitude or size of fixed-axis rotation. So the rotation vector or Rodrigues parameter ${}^{\bar{l}}\phi_l$ is defined as follows:

$$ {}^{\bar{l}}\phi_l = {}^{\bar{l}}_{0}\phi_l + {}^{\bar{l}}n_l \cdot \phi_l^{\bar{l}},\ {}^{l}\phi_{\bar{l}} = {}^{l}_{0}\phi_{\bar{l}} + {}^{l}n_{\bar{l}} \cdot \phi_{\bar{l}}^{l}. \tag{2.45} $$

In natural frames, ${}_0^{\bar{l}}\phi_l = 0_3$, obtain $$ {}^{\bar{l}}\phi_l = \phi_l^{\bar{l}} \cdot {}^{\bar{l}}n_l, \tag{2.46} $$

wherein $$ {}^{\bar{l}}\bar{\phi}_l = \begin{vmatrix} 0 & -{}^{\bar{l}}\phi_l^{[3]} & {}^{\bar{l}}\phi_l^{[2]} \\ {}^{\bar{l}}\phi_l^{[3]} & 0 & -{}^{\bar{l}}\phi_l^{[1]} \\ -{}^{\bar{l}}\phi_l^{[2]} & {}^{\bar{l}}\phi_l^{[1]} & 0 \end{vmatrix}. \tag{2.47} $$

$$ \text{Since } \left| n_l^{\bar{l}} \right| = 1,\ \left| \phi_l^{\bar{l}} \right| = \left\| {}^{\bar{l}}\phi_l \right\|.\ \text{Then } \left| \phi_l^{\bar{l}} \right| = \sqrt{{}^{\bar{l}}\phi_l^{[1]:2} + {}^{\bar{l}}\phi_l^{[2]:2} + {}^{\bar{l}}\phi_l^{[3]:2}} \geq 0. \tag{2.48} $$

Since ${}^{\bar{l}}\tilde{\phi}_l$ is a 2nd-Order tensor, then $$ {}^{l|\bar{l}}\tilde{\phi}_l = {}^{l}Q_{\bar{l}} \cdot {}^{\bar{l}}\tilde{\phi}_l \cdot {}^{\bar{l}}Q_l = -{}^{l|\bar{l}}\tilde{\phi}_{\bar{l}}. \tag{2.49} $$

Fixed-Axis Rotation Based on Axis-Invariant

As shown in FIG. 25*a*, the fixed-Axis Vector ${}^{\bar{l}}n_l$ (2501) and its consolidated unit vector ${}^{l}u_{l_s}$ (2502) are given. At initial time, for the unit vector ${}^{l}u_{l_s}$ (2502), ${}^{l}u_{l_s} = {}_0{}^{l}u_{l_s}$, the projection vector of zero-position Axis-vector is $(1-{}^{\bar{l}}n_l \cdot {}^{\bar{l}}n_l^T) \cdot {}^{l}u_{l_s}$ (2504), the axial component is $({}^{\bar{l}}n_l \cdot {}^{\bar{l}}n_l^T) \cdot {}^{l}u_{l_s}$ (2506), and the radial Axis-vector is ${}^{\bar{l}}\tilde{n}_l \cdot {}^{l}u_{l_s}$ (2507).

As shown in FIG. 25*b*, it is the projection vector diagram of FIG. 25*a* after rotation of the fixed axis. From Eq. (2.15) we know that the Axis-vector ${}^{\bar{l}}n_l$ (25011) is constant relative to natural frames $F^{[\bar{l}]}$ and $F^{[l]}$, so that its rotation is called the fixed-axis rotation. After the unit vector ${}^{l}u_{l_s}$ (2502) rotates around the axis ${}^{\bar{l}}n_l$ (25011) by $\phi_l^{\bar{l}}$ (2508), the projection of ${}^{l}u_{l_s}$ (25021) to the natural zero-position vector ${}_{\bullet}^{\bar{l}}n_l$ is $(1-{}^{\bar{l}}n_l \cdot {}^{\bar{l}}n_l^T) \cdot {}^{l}u_{l_s} \cdot C(\phi_l^{T})$ (25041), The vector screw of ${}^{l}u_{l_s}$ (25021) to the natural radial Axis-vector ${}_{\perp}^{\bar{l}}n_l$ is ${}^{\bar{l}}\tilde{n}_l \cdot {}^{l}u_{l_s} \cdot S(\phi_l^{\bar{l}})$ (25061), and axial component is $({}^{\bar{l}}n_l \cdot {}^{\bar{l}}n_l^T) \cdot {}^{l}u_{l_s}$ (25062); so we obtain the Rodrigues vector equation with chain ordering (CO)

$$ {}^{\bar{l}|l}u_{l_s} = ({}^{\bar{l}}n_l \cdot {}^{\bar{l}}n_l^T + (1-{}^{\bar{l}}n_l \cdot {}^{\bar{l}}n_l^T) \cdot C(\phi_l^{\bar{l}}) + {}^{\bar{l}}\tilde{n}_l \cdot S(\phi_l^{\bar{l}})) \cdot {}^{l}u_{l_s}. \tag{2.50} $$

Since the vector ${}^{l}u_{l_s}$ is arbitrary and ${}^{\bar{l}|l}u_{l_s} = {}^{\bar{l}}Q_l \cdot {}^{l}u_{l_s}$, we obtain the Rodrigues rotation equation with CO:

$$ {}^{\bar{l}}Q_l = {}^{\bar{l}}n_l \cdot {}^{\bar{l}}n_l^T + (1-{}^{\bar{l}}n_l \cdot {}^{\bar{l}}n_l^T) \cdot C(\phi_l^{\bar{l}}) + {}^{\bar{l}}\tilde{n}_l \cdot S(\phi_l^{\bar{l}}). \tag{2.51} $$

If ${}_0\phi_l^{\bar{l}} = 0$, from Eq. (2.51), then ${}_0^{\bar{l}}Q_l = 1$. If ${}^{\bar{l}}Q_l = 1$, the natural frames $F^{[\bar{l}]}$ and $F^{[l]}$ are accordant in direction. From Eq. (2.51) we know that screw term ${}^{\bar{l}}\tilde{n}_l \cdot S(\phi_l^{\bar{l}}) = O$, and there must be ${}_0\phi_l^{\bar{l}} = 0$. Therefore, the natural zero-position is a necessary and sufficient condition for the coincidence of Natural Frames $F^{[\bar{l}]}$ and $F^{[l]}$, that is, the accordant direction of the natural frames at the initial time is the prerequisite for defining the natural zero-position. The MAS kinematics and dynamics can be established with natural frames.

Obviously, $S(\phi_l^{\bar{l}})$ is the coordinates on Axis-vector ${}^{\bar{l}}n_l$, $C(\phi_l^{\bar{l}})$ is the coordinates on the natural zero-position axis in ${}_{\bullet}^{\bar{l}}n_l$. The unit vector ${}^{\bar{l}|l}u_{l_s}$ consolidated to natural frame $F^{[l]}$ is mapping with the quaternion $[{}^{\bar{l}}n_l \cdot S(\phi_l^{\bar{l}}), C(\phi_l^{\bar{l}})]^T$ one by one, i.e. they are equivalent. The zero-position axis and the three axes of the natural axis frame form the 4D complex space. In Eq. (2.51), the first two items of the right side are the symmetry matrix of Joint variable $\phi_l^{\bar{l}}$, so $\mathrm{Trace}({}^{\bar{l}}Q_l) = 1+2 \cdot C(\phi_l^{\bar{l}})$. The last item is the screw matrix of joint variable $\phi_l^{\bar{l}}$, so $\mathrm{Vector}({}^{\bar{l}}Q_l) = {}^{\bar{l}}n_l \cdot S(\phi_l^{\bar{l}})$. Therefore, ${}^{\bar{l}}Q_l$ is uniquely determined by $\mathrm{Trace}({}^{\bar{l}}Q_l)$ and $\mathrm{Vector}({}^{\bar{l}}Q_l)$, that is, ${}^{\bar{l}}Q_l$ is uniquely determined by the vector ${}^{\bar{l}}n_l \cdot S(\phi_l^{\bar{l}})$ and scalar $C(\phi_l^{\bar{l}})$, which is the basis for discussion of the following issues.

The COs of any item in Eq. (2.51) remain consistent. From Eq. (2.51), then $$ {}^{\bar{l}}Q_l(\phi_l^{\bar{l}}) = {}^{l}Q_{\bar{l}}(\phi_{\bar{l}}^{l}). \tag{2.52} $$

At the same time, according to Eq. (2.51), then $$ {}^{l|\bar{l}}n_l = \left({}^{\bar{l}}n_l \cdot {}^{\bar{l}}n_l^T + \left(1 - {}^{\bar{l}}n_l \cdot {}^{\bar{l}}n_l^T\right) \cdot C\left(-\phi_l^{\bar{l}}\right) + {}^{\bar{l}}\tilde{n}_l \cdot S\left(-\phi_l^{\bar{l}}\right)\right) \cdot {}^{\bar{l}}n_l = {}^{\bar{l}}n_l; $$

i.e.

$$ {}^{l|\bar{l}}n_l = {}^{\bar{l}}n_l,\ {}^{l}n_{\bar{l}} = {}^{\bar{l}|l}n_{\bar{l}}, \tag{2.53} $$

Eq. (2.53) shows that: on the one hand, the common reference-axis of adjacent links l and $\bar{l}$ have the same coordinates in two adjacent natural frames. On the other hand, the Axis-vector ${}^{\bar{l}}n_l$ points the outside of $O_{\bar{l}}$ from the origin $O_{\bar{l}}$, and they have the same coordinates, that is, the Axis-invariant ${}^{\bar{l}}n_l$ has a full ordering relationship, and its forward and reverse sequence are indistinguishable. Thus, $$ {}^{\bar{l}}n_l = {}^{l}n_{\bar{l}},\ -{}^{\bar{l}}n_l = -{}^{l}n_{\bar{l}}. \tag{2.54} $$

If $-{}^{\bar{l}}n_l = {}^{\bar{l}|l}n_{\bar{l}}$, from Eq. (2.53), then $-{}^{\bar{l}}n_l = {}^{\bar{l}|l}n_{\bar{l}} = {}^{l}n_{\bar{l}}$; let it be substituted into Eq. (2.51), then $$ \left(-{}^{\bar{l}}n_l\right) \cdot \left(-{}^{\bar{l}}n_l^T\right) + \left(1 - \left(-{}^{\bar{l}}n_l\right) \cdot \left(-{}^{\bar{l}}n_l^T\right)\right) \cdot C\left(\phi_l^{\bar{l}}\right) - {}^{\bar{l}}\tilde{n}_l \cdot S\left(\phi_l^{\bar{l}}\right) = {}^{\bar{l}}n_l \cdot {}^{\bar{l}}n_l^T + \left(1 - {}^{\bar{l}}n_l \cdot -{}^{\bar{l}}n_l^T\right) \cdot C\left(\phi_l^{\bar{l}}\right) + {}^{\bar{l}}\tilde{n}_l \cdot S\left(\phi_l^{\bar{l}}\right) = {}^{l}Q_{\bar{l}}. $$

Therefore $$ {}^{\bar{l}}Q_l(-{}^{\bar{l}}n_l) = {}^{l}Q_{\bar{l}}({}^{l}n_{\bar{l}}). \tag{2.55} $$

From Eqs. (2.52) and (2.55), we know that the inverse of ${}^{\bar{l}}Q_l$ can be obtained by the negative value of the Axis-vector ${}^{\bar{l}}n_l$ and inverse order of the joint variable $\phi_l^{\bar{l}}$. The Axis-vector ${}^{\bar{l}}n_l$ is a free vector, and it is always oriented towards the outside of the origin of frame $F^{[l]}$. Obviously, the axial direction in metric space and the connection direction in topological space are two different concepts. In MAS theory, the Axis-vector ${}^{\bar{l}}n_l$ is used as the reference axis of joint pair ${}^{\bar{l}}k_l$, Eq. (2.15) shows the Axis-vector ${}^{\bar{l}}n_l$ is an invariant.

Nilpotent Polynomial of Fixed-Axis Rotation

Eq. (2.51) results in $$d{}_0^{\bar{l}}Q_l/d\phi_l^{\bar{l}}=\left[-\left(1-{}^{\bar{l}}n_l\cdot{}^{\bar{l}}n_l^T\right)\cdot S\left(\phi_l^{\bar{l}}\right)+{}^{\bar{l}}n_l\cdot C\left(\phi_l^{\bar{l}}\right)\right]\Big|_{\phi_l^{\bar{l}}=0}={}^{\bar{l}}n_l,$$

$$d^2{}_0^{\bar{l}}Q_l/d^2\phi_l^{\bar{l}}=\left[-\left(1-{}^{\bar{l}}n_l\cdot{}^{\bar{l}}n_l^T\right)\cdot C\left(\phi_l^{\bar{l}}\right)-{}^{\bar{l}}\tilde{n}_l\cdot S\left(\phi_l^{\bar{l}}\right)\right]\Big|_{\phi_l^{\bar{l}}=0}={}^{\bar{l}}\tilde{n}_l^{:2},$$

then $$\frac{d^{2k+1}\left({}_0^{\bar{l}}Q_l\right)}{d^{2k+1}\phi_l^{\bar{l}}}=(-1)^k\cdot{}^{\bar{l}}\tilde{n}_l,\ k\in\mathcal{N} \tag{2.56}$$

$$\frac{d^{2k}\left({}_0^{\bar{l}}Q_l\right)}{d^{2k}\phi_l^{\bar{l}}}=(-1)^{k+1}\cdot{}^{\bar{l}}\tilde{n}_l^{:2},\ k\in\mathcal{N}.$$

Consider the Taylor expansion of ${}^{\bar{l}}Q_l$ $${}^{\bar{l}}Q_l= \tag{2.57}$$

$${}_0^{\bar{l}}Q_l+\frac{d\left({}_0^{\bar{l}}Q_l\right)}{d\phi_l^{\bar{l}}}\cdot\phi_l^{\bar{l}}+\frac{1}{2}\frac{d^2\left({}_0^{\bar{l}}Q_l\right)}{d^2\phi_l^{\bar{l}}}\cdot\phi_l^{\bar{l}:2}\backslash+\ldots+\frac{1}{k!}\frac{d^k\left({}_0^{\bar{l}}Q_l\right)}{d^k\phi_l^{\bar{l}}}\cdot\phi_l^{\bar{l}:k}+\ldots$$

Let Eq. (2.56) be substituted in Eq. (2.57), $${}^{\bar{l}}Q_l\left(\phi_l^{\bar{l}}\right)=1+{}^{\bar{l}}\tilde{n}_l\cdot\left[\phi_l^{\bar{l}}-\frac{1}{3!}\cdot\phi_l^{\bar{l}:3}\ldots+\frac{(-1)^k}{(2k+1)!}\cdot\phi_l^{\bar{l}:2k+1}+\ldots\right] \tag{2.58}$$

$$\backslash+{}^{\bar{l}}\tilde{n}_l^{:2}\cdot\left(\frac{1}{2!}\cdot\phi_l^{\bar{l}:2}-\frac{1}{4!}\cdot\phi_l^{\bar{l}:4}\ldots+\frac{(-1)^k}{2k!}\phi_l^{\bar{l}:2k}+\ldots\right),$$

$$=1+S\left(\phi_l^{\bar{l}}\right)\cdot{}^{\bar{l}}\tilde{n}_l+\left(1-C\left(\phi_l^{\bar{l}}\right)\right)\cdot+{}^{\bar{l}}\tilde{n}_l^{:2}$$

i.e.

$${}^{\bar{l}}Q_l=1+S\left(\phi_l^{\bar{l}}\right)\cdot{}^{\bar{l}}\tilde{n}_l+\left(1-C\left(\phi_l^{\bar{l}}\right)\right)\cdot{}^{\bar{l}}\tilde{n}_l^{:2}.$$

i.e.

$${}^{\bar{l}}Q_l=1+S(\phi_l^{\bar{l}})\cdot{}^{\bar{l}}\tilde{n}_l+(1-C(\phi_l^{\bar{l}}))\cdot{}^{\bar{l}}\tilde{n}_l^{:2}. \tag{2.59}$$

Eq. (2.59) is a multi-linear equation related to $C(\phi_l^{\bar{l}})$ and $S(\phi_l^{\bar{l}})$, and is a 2nd-Order polynomial of the Axis-invariant ${}^{\bar{l}}n_l$. Given the natural zero-point vector ${}^{l}1_{l_s}$ as the zero-point reference of $\phi_l^{\bar{l}}$, then $-{}^{\bar{l}}\tilde{n}_l^{2}\cdot{}^{l}1_{l_s}$ and ${}^{\bar{l}}\tilde{n}_l\cdot{}^{l}1_{l_s}$ represent zero-point vector and radical vector respectively. The screw matrix ${}^{\bar{l}}\tilde{n}_l$ and symmetrical matrix $1+{}^{\bar{l}}\tilde{n}_l^{:2}$ in Eq. (2.59) are invariants and orthonormal with each other, which shows that the Natural-axis space itself is a two-dimensional space. When combined with joint variable $\phi_l^{T}$, there are three independent variables in ${}^{\bar{l}}n_l\cdot\phi_l^{\bar{l}}$ to determine a 3D space. Eq. (2.59) contains only one sine and cosine calculation, 6 product calculations and 6 sum calculations, for which the computational complexity is lower. At the same time we know that the natural frame $F^{[l]}$ and the polarity of Natural-axis $F^{[l]}$ are parameterized through the Axis-invariant ${}^{\bar{l}}n_l$ and joint variable $\phi_l^{\bar{l}}$.

EXAMPLE 2.2. Given ${}^{\bar{l}}n_l=1^{[x]}$, i.e.

$${}^{\bar{l}}\tilde{\phi}_l=\begin{bmatrix}0&0&0\\0&0&-\phi_l^{\bar{l}}\\0&\phi_l^{\bar{l}}&0\end{bmatrix},\text{ and }{}^{\bar{l}}\tilde{n}_l=\begin{bmatrix}0&0&0\\0&0&-1\\0&1&0\end{bmatrix},{}^{\bar{l}}\tilde{n}_l^{:2}=\begin{bmatrix}0&0&0\\0&-1&0\\0&0&-1\end{bmatrix};$$

then $${}^{\bar{l}}Q_l=$$

$$1+S\left(\phi_l^{\bar{l}}\right)\cdot\backslash\begin{bmatrix}0&0&0\\0&0&-1\\0&1&0\end{bmatrix}+\left(1-C\left(\phi_l^{\bar{l}}\right)\right)\cdot\begin{bmatrix}0&0&0\\0&-1&0\\0&0&-1\end{bmatrix}=\begin{bmatrix}1&0&0\\0&C\left(\phi_l^{\bar{l}}\right)&-S\left(\phi_l^{\bar{l}}\right)\\0&S\left(\phi_l^{\bar{l}}\right)&C\left(\phi_l^{\bar{l}}\right)\end{bmatrix}.$$

Solution is finished.

EXAMPLE 2.3. Given ${}^{\bar{l}}n_l=1^{[y]}$, i.e.

$${}^{\bar{l}}\tilde{\phi}_l=\begin{bmatrix}0&0&\phi_l^{\bar{l}}\\0&0&0\\-\phi_l^{\bar{l}}&0&0\end{bmatrix},\text{ and }{}^{\bar{l}}\tilde{n}_l=\begin{bmatrix}0&0&1\\0&0&0\\-1&0&0\end{bmatrix},{}^{\bar{l}}\tilde{n}_l^{:2}=\begin{bmatrix}-1&0&0\\0&0&0\\0&0&-1\end{bmatrix};$$

from Eq. (2.59), then $${}^{\bar{l}}Q_l=$$

$$1+S\left(\phi_l^{\bar{l}}\right)\cdot\backslash\begin{bmatrix}0&0&1\\0&0&0\\-1&0&0\end{bmatrix}+\left(1-C\left(\phi_l^{\bar{l}}\right)\right)\cdot\begin{bmatrix}-1&0&0\\0&0&0\\0&0&-1\end{bmatrix}=\begin{bmatrix}C\left(\phi_l^{\bar{l}}\right)&0&S\left(\phi_l^{\bar{l}}\right)\\0&1&0\\-S\left(\phi_l^{\bar{l}}\right)&0&C\left(\phi_l^{\bar{l}}\right)\end{bmatrix}.$$

Solution is finished.

EXAMPLE 2.4. Given ${}^{\bar{l}}n_l=1^{[z]}$, i.e.

$${}^{\bar{l}}\tilde{\phi}_l=\begin{bmatrix}0&-\phi_l^{\bar{l}}&0\\\phi_l^{\bar{l}}&0&0\\0&0&0\end{bmatrix},\text{ and }{}^{\bar{l}}\tilde{n}_l=\begin{bmatrix}0&-1&0\\1&0&0\\0&0&0\end{bmatrix},{}^{\bar{l}}\tilde{n}_l^{:2}=\begin{bmatrix}-1&0&0\\0&-1&0\\0&0&0\end{bmatrix};$$

from Eq. (2.59), then $${}^{\bar{l}}Q_l=$$

$$1+S\left(\phi_l^{\bar{l}}\right)\cdot\backslash\begin{bmatrix}0&-1&0\\1&0&0\\0&0&0\end{bmatrix}+\left(1-C\left(\phi_l^{\bar{l}}\right)\right)\cdot\begin{bmatrix}-1&0&0\\0&-1&0\\0&0&0\end{bmatrix}=\begin{bmatrix}C\left(\phi_l^{\bar{l}}\right)&-S\left(\phi_l^{\bar{l}}\right)&0\\S\left(\phi_l^{\bar{l}}\right)&C\left(\phi_l^{\bar{l}}\right)&0\\0&0&1\end{bmatrix}.$$

Solution is finished.

EXAMPLE 2.5. Given $\phi_l^{\bar{l}}=60°$, ${}^{\bar{l}}n_l^T=[0\ 6\sqrt{3}/11\ \sqrt{13}/11]$, find ${}^{\bar{l}}Q_l$.

Solution:

$$S\left(\phi_l^{\bar{l}}\right)\cdot{}^{\bar{l}}\tilde{n}_l=S\left(\phi_l^{\bar{l}}\right)\cdot\begin{bmatrix}0&-{}^{\bar{l}}n_l^{[3]}&{}^{\bar{l}}n_l^{[2]}\\{}^{\bar{l}}n_l^{[3]}&0&-{}^{\bar{l}}n_l^{[1]}\\-{}^{\bar{l}}n_l^{[2]}&{}^{\bar{l}}n_l^{[1]}&0\end{bmatrix},$$

$$=\frac{\sqrt{3}}{2}\cdot\begin{bmatrix}0&-\sqrt{13}/11&6\sqrt{3}/11\\\sqrt{13}/11&0&0\\-6\sqrt{3}/11&0&0\end{bmatrix}$$

-continued $$\left(1-C\left(\phi_l^{\bar{l}}\right)\right)\cdot{}^{\bar{l}}\tilde{n}_l^{:2}=\left(1-C\left(\phi_l^{\bar{l}}\right)\right)\cdot\begin{bmatrix}0 & -{}^{\bar{l}}n_l^{[3]} & {}^{\bar{l}}n_l^{[2]}\\ {}^{\bar{l}}n_l^{[3]} & 0 & -{}^{\bar{l}}n_l^{[1]}\\ -{}^{\bar{l}}n_l^{[2]} & {}^{\bar{l}}n_l^{[1]} & 0\end{bmatrix}^2$$
$$=\frac{1}{2}\cdot\begin{bmatrix}-1 & 0 & 0\\ 0 & -13/121 & 6\sqrt{39}/121\\ 0 & 6\sqrt{39}/121 & -108/121\end{bmatrix}.$$

From Eq. (2.59), then $${}^{\bar{l}}Q_l=\begin{bmatrix}1/2 & -\sqrt{39}/22 & 9/11\\ \sqrt{39}/22 & -13/242 & 3\sqrt{39}/121\\ -9/11 & 3\sqrt{39}/121 & -54/121\end{bmatrix}.$$

Solution is finished.

Exponential Form of Fixed-Axis Rotation

Since the DCM ${}^{\bar{l}}Q_l$ must have an eigenvalue of 1, its corresponding eigenvector is ${}^{\bar{l}}n_l$. Based on the Cayley-Hamilton theory, Eq. (2.59) can be expressed as $${}^{\bar{l}}Q_l=e^{{}^{\bar{l}}\tilde{\phi}_l}\triangleq\exp\left({}^{\bar{l}}\tilde{n}_l\cdot\phi_l^{\bar{l}}\right).\tag{2.60}$$

Eq. (2.60) represents the general rotation, where the exponent e is a natural universal constant.

Eqs. (2.60) and (2.6) result in $${}^{\bar{l}}Q_l={}^{\bar{l}}Q_{\bar{l}}\cdot{}^{\bar{l}}Q_l=\exp\left({}^{\bar{l}}\tilde{\phi}_{\bar{l}}\right)\cdot\exp\left({}^{\bar{l}|\bar{l}}\tilde{\phi}_l\right)=\exp\left({}^{\bar{l}}\tilde{\phi}_{\bar{l}}+{}^{\bar{l}|\bar{l}}\tilde{\phi}_l\right)=\exp\left({}^{\bar{l}}\tilde{\phi}_l\right),\tag{2.61}$$

so $${}^{\bar{l}}\phi_l={}^{\bar{l}}\phi_{\bar{l}}+{}^{\bar{l}|\bar{l}}\phi_l,\ {}^{\bar{l}}\tilde{\phi}_l={}^{\bar{l}}\tilde{\phi}_{\bar{l}}+{}^{\bar{l}|\bar{l}}\tilde{\phi}_l\tag{2.62}$$

For the fixed-axis rotation from Eq. (2.60), it can obtain very important characters. So it is necessary to analyse the basic properties of Eq. (2.60).

$$\begin{aligned}\frac{\partial}{\partial\phi_l^{\bar{l}}}\left({}^{\bar{l}}Q_l\right)&=\frac{\partial}{\partial\phi_l^{\bar{l}}}\left(\exp\left({}^{\bar{l}}\tilde{n}_l\cdot\phi_l^{\bar{l}}\right)\right)\\&={}^{\bar{l}}\tilde{n}_l\cdot\exp\left({}^{\bar{l}}\tilde{n}_l\cdot\phi_l^{\bar{l}}\right)={}^{\bar{l}}\tilde{n}_l\cdot{}^{\bar{l}}Q_l={}^{\bar{l}}Q_l\cdot{}^{\bar{l}}\tilde{n}_l\end{aligned}.\tag{2.63}$$

According to Eq. (2.63), so $$\begin{aligned}\frac{\partial}{\partial\phi_l^{\bar{l}}}\left({}^{\bar{l}}Q_l\right)&={}^{i}Q_{\bar{l}}\cdot\frac{\partial}{\partial\phi_l^{\bar{l}}}\left(\exp\left({}^{\bar{l}}\tilde{n}_l\cdot\phi_l^{\bar{l}}\right)\right)\\&={}^{i}Q_{\bar{l}}\cdot{}^{\bar{l}}\tilde{n}_l\cdot{}^{\bar{l}}Q_l={}^{i}Q_l\cdot{}^{l}\tilde{n}_{\bar{l}}={}^{i}Q_l\cdot{}^{\bar{l}}\tilde{n}_l\end{aligned}.\tag{2.64}$$

From Eqs. (2.54) and (2.64), we get $$\text{Vector}\left(\frac{\partial}{\partial\phi_l^{\bar{l}}}\left({}^{\bar{l}}Q_l\right)\right)=\text{Vector}\left({}^{\bar{l}}\tilde{n}_l\cdot{}^{\bar{l}}Q_l\right)={}^{\bar{l}}n_l\cdot C\left(\phi_l^{\bar{l}}\right).\tag{2.65}$$

Eq. (2.60) results in $${}^{\bar{l}}\dot{Q}_l={}^{\bar{l}}\dot{\tilde{\phi}}_l\cdot\exp\left({}^{\bar{l}}\tilde{\phi}_l\right)={}^{\bar{l}}\dot{\tilde{\phi}}_l\cdot{}^{\bar{l}}Q_l,$$

So $${}^{\bar{l}}\dot{\tilde{\phi}}_l={}^{\bar{l}}\dot{Q}_l\cdot{}^{l}Q_{\bar{l}}.\tag{2.66}$$

From Eqs. (2.63)-(2.66), we know that it is very convenient for the Joint variable with Eq. (2.60), which has excellent spatial operational performance. Eq. (2.59) is less complex to calculate than Eq. (2.60) and is more suitable for numerical calculation.

Cayley Transformation Based on Axis-Invariant

After the angle $\phi_l^{\bar{l}}$ is given, its sine and cosine, and the sine and cosine of its half-angle are constants; for convenience, record them as $$C_l=C(\phi_l^{\bar{l}}/2),S_l=S(\phi_l^{\bar{l}}/2)$$

$$C_l^{\bar{l}}=C(\phi_l^{\bar{l}}),S_l^{\bar{l}}=(\phi_l^{\bar{l}}).\tag{2.67}$$

From Eq. (2.67), $$C_l^{\bar{l}}=\frac{1-\tau_l^{:2}}{1+\tau_l^{:2}},\ S_l^{\bar{l}}=\frac{2\cdot\tau_1}{1+\tau_l^{:2}}.\tag{2.68}$$

Define $$\tau_l^{\bar{l}}\triangleq\tan(\phi_l^{\bar{l}}/2)=\tau_l,\tag{2.69}$$

so $$\tau_l^{\bar{l}}=-\tau_{\bar{l}}^{l}.\tag{2.70}$$

[1] Cayley Positive Transformation of Fixed-Axis Rotation

From Eq. (2.69), there must be $${}^{\bar{l}}Q_l=(1+{}^{\bar{l}}\tilde{n}_l\cdot\tau_l^{\bar{l}})\cdot(1-{}^{\bar{l}}\tilde{n}_l\cdot\tau_l^{\bar{l}})^{-1}$$

$$=(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}}).\tag{2.71}$$

PROOF: Eqs. (2.59) and (2.69) result in $$\begin{aligned}\left(1-\tau_1^{\bar{l}}\cdot{}^{\bar{l}}\tilde{n}_l\right)\cdot{}^{\bar{l}}Q_l&=\left(1-\tau_1^{\bar{l}}\cdot{}^{\bar{l}}\tilde{n}_l\right)\cdot\begin{pmatrix}1+S\left(\phi_l^{\bar{l}}\right)\cdot{}^{\bar{l}}\tilde{n}_l+\\ \backslash\left(1-C\left(\phi_l^{\bar{l}}\right)\right)\cdot{}^{\bar{l}}\tilde{n}_l^{:2}\end{pmatrix}\\&={}^{\bar{l}}Q_l\cdot\left(1-\tau_1^{\bar{l}}\cdot{}^{\bar{l}}\tilde{n}_l\right)\end{aligned}.\tag{2.72}$$

Since $$\tau_l=\tau_l^{\bar{l}}=(1-C_l^{\bar{l}})/S_l^{\bar{l}},\tag{2.73}$$

substitute Eq. (2.73) into Eq. (2.72), $$\begin{aligned}\left(1-{}^{\bar{l}}\tilde{n}_l\cdot\tau_1^{\bar{l}}\right)\cdot{}^{\bar{l}}Q_l&=\left(1-{}^{\bar{l}}\tilde{n}_l\cdot\tau_1^{\bar{l}}\right)\cdot\left(1+S_1^{\bar{l}}\cdot{}^{\bar{l}}\tilde{n}_l+\left(1-C_1^{\bar{l}}\right)\cdot{}^{\bar{l}}\tilde{n}_l^{:2}\right)\\&=\left(1-{}^{\bar{l}}\tilde{n}_l\cdot\left(1-C_1^{\bar{l}}\right)/S_1^{\bar{l}}\right)\cdot\left(1+S_1^{\bar{l}}\cdot{}^{\bar{l}}\tilde{n}_l+\left(1-C_1^{\bar{l}}\right)\cdot{}^{\bar{l}}\tilde{n}_l^{:2}\right)\\&=\left(1+{}^{\bar{l}}\tilde{n}_l\cdot S_1^{\bar{l}}+\left(1-C_1^{\bar{l}}\right)\cdot{}^{\bar{l}}\tilde{n}_l^{:2}\right)-\begin{pmatrix}{}^{\bar{l}}\tilde{n}_l\cdot\tau_1^{\bar{l}}+{}^{\bar{l}}\tilde{n}_l^{:2}\cdot\left(1-C_1^{\bar{l}}\right)\\ \backslash+{}^{\bar{l}}\tilde{n}_l^{:3}\cdot\left(1-C_1^{\bar{l}}\right)\cdot\tau_1^{\bar{l}}\end{pmatrix}\\&=\left(1+{}^{\bar{l}}\tilde{n}_l\cdot S_1^{\bar{l}}+\left(1-C_1^{\bar{l}}\right)\cdot{}^{\bar{l}}\tilde{n}_l^{:2}\right)-\begin{pmatrix}{}^{\bar{l}}\tilde{n}_l\cdot\tau_1^{\bar{l}}+{}^{\bar{l}}\tilde{n}_l^{:2}\cdot\left(1-C_1^{\bar{l}}\right)\\ \backslash-{}^{\bar{l}}\tilde{n}_l\cdot\left(1-C_1^{\bar{l}}\right)\cdot\tau_1^{\bar{l}}\end{pmatrix}\\&=\left(1+{}^{\bar{l}}\tilde{n}_l\cdot S_1^{\bar{l}}+\left(1-C_1^{\bar{l}}\right)\cdot{}^{\bar{l}}\tilde{n}_l^{:2}\right)-\left({}^{\bar{l}}\tilde{n}_l^{:2}\cdot\left(1-C_1^{\bar{l}}\right)+{}^{\bar{l}}\tilde{n}_l\cdot C_1^{\bar{l}}\cdot\tau_1^{\bar{l}}\right)\\&=1+{}^{\bar{l}}\tilde{n}_l\cdot\left(S_1^{\bar{l}:2}+C_1^{\bar{l}:2}-C_1^{\bar{l}}\right)/S_1^{\bar{l}}\\&=1+{}^{\bar{l}}\tilde{n}_l\cdot\tau_1^{\bar{l}}\end{aligned}.$$

So $${}^{\bar{l}}Q_l=(1+{}^{\bar{l}}\tilde{n}_l\cdot\tau_l^{\bar{l}})\cdot(1-{}^{\bar{l}}\tilde{n}_l\cdot\tau_l^{\bar{l}})^{-1}.\tag{2.74}$$

And $$(1-{}^{\bar{l}}\tilde{n}_l\cdot\tau_l^{\bar{l}})\cdot(1+{}^{\bar{l}}\tilde{n}_l\cdot\tau_l^{\bar{l}})=(1+{}^{\bar{l}}\tilde{n}_l\cdot\tau_l^{\bar{l}})\cdot(1-{}^{\bar{l}}\tilde{n}_l\cdot\tau_l^{\bar{l}}),$$

so $$(1+{}^{\bar{l}}\tilde{n}_l\cdot\tau_l^{\bar{l}})\cdot(1-{}^{\bar{l}}\tilde{n}_l\cdot\tau_l^{\bar{l}})^{-1}=(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}}). \tag{2.75}$$

From Eq. (2.74) and (2.75) we know that Eq. (2.71) is set. Q.E.D.

According to Eq. (2.71), then $$(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}})\cdot[(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}})]^T$$

$$=(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}})\cdot(1-{}^{\bar{l}}\tilde{n}_l\cdot\tau_l^{\bar{l}})\cdot(1+{}^{\bar{l}}\tilde{n}_l\cdot\tau_l^{\bar{l}})^{-1}$$

$$=(1-{}^{\bar{l}}\tilde{n}_l\cdot\tau_l^{\bar{l}})^{-1}\cdot(1-{}^{\bar{l}}\tilde{n}_l\cdot\tau_l^{\bar{l}})\cdot(1+{}^{\bar{l}}\tilde{n}_l\cdot\tau_l^{\bar{l}})\cdot(1+{}^{\bar{l}}\tilde{n}_l\cdot\tau_l^{\bar{l}})^{-1}$$

$$=\mathbf{1}.$$

So $(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}})$ is an orthogonal rotation matrix.

In 1846, Cayley expressed a Cayley transformation without chain indexes. The $T_r$ in Eq. (2.69) is called Cayley parameter, and its meaning is shown in FIG. 3.5, which is the tangent of the tangential vector and radial vector. And $${}^{\bar{l}}\tilde{n}_l\cdot\tau_l^{\bar{l}}\cdot({}^{\bar{l}}r_{lS}+{}^{\bar{l}}r_{lS})={}^{\bar{l}}r_{lS}-{}^{\bar{l}}r_{lS}$$

$$-{}^{\bar{l}}\tilde{n}_l\cdot({}^{\bar{l}}r_{lS}-{}^{\bar{l}}r_{lS})=\tau_l^{\bar{l}}\cdot\cdot({}^{\bar{l}}r_{lS}+{}^{\bar{l}}r_{lS}). \tag{2.76}$$

From Eq. (2.76) we know that ${}^{\bar{l}}n_l\cdot\tau_l^{\bar{l}}$ has a linear relationship with the vector ${}^{\bar{l}}r_{lS}+{}^{\bar{l}}r_{lS}$ and the tangential vector ${}^{\bar{l}}r_{lS}-{}^{\bar{l}}r_{lS}$. And ${}^{\bar{l}}n_l\cdot\tan(\phi_l^{\bar{l}}/2)$, i.e. ${}^{\bar{l}}n_l\cdot\tau_l^{\bar{l}}$, is generally called Rodrigues parameter or Gibbs vector, and ${}^{\bar{l}}n_l\cdot\tan(\phi_l^{\bar{l}}/4)$ is called the modified Rodrigues parameter (MRPs).

[2] Cayley Inverse Transformation

From Eq. (2.71), so $${}^{\bar{l}}\tilde{n}_l\cdot\tau_l^{\bar{l}}=({}^{\bar{l}}Q_l-1)\cdot({}^{\bar{l}}Q_l+1)^{-1}=({}^{\bar{l}}Q_l+1)^{-1}\cdot({}^{\bar{l}}Q_l-1). \tag{2.77}$$

PROOF: Eqs. (2.26), (2.59) and (2.73) result in $${}^{\bar{l}}\tilde{n}_l\cdot\tau_l^{\bar{l}}\cdot({}^{\bar{l}}Q_l+1)={}^{\bar{l}}\tilde{n}_l\cdot\tau_l^{\bar{l}}\cdot[2\cdot 1+S_l^{\bar{l}}\cdot{}^{\bar{l}}\tilde{n}_l+(1-C_l^{\bar{l}})\cdot{}^{\bar{l}}\tilde{n}_l^{:2}]$$

$$={}^{\bar{l}}\tilde{n}_l\cdot[2\cdot 1+S(\phi_l^{\bar{l}})\cdot{}^{\bar{l}}\tilde{n}_l+(1-C_l^{\bar{l}})\cdot{}^{\bar{l}}\tilde{n}_l^{:2}]\cdot(1-C_l^{\bar{l}})/S_l^{\bar{l}}$$

$$=[2\cdot{}^{\bar{l}}\tilde{n}_l+S_l^{\bar{l}}\cdot{}^{\bar{l}}\tilde{n}_l^{:2}+(1-C_l^{\bar{l}})\cdot{}^{\bar{l}}\tilde{n}_l^{:3}]\cdot(1-C_l^{\bar{l}})/S_l^{\bar{l}}$$

$$=[2\cdot{}^{\bar{l}}\tilde{n}_l+S_l^{\bar{l}}\cdot{}^{\bar{l}}\tilde{n}_l^{:2}+(C_l^{\bar{l}}-1)\cdot{}^{\bar{l}}\tilde{n}_l]\cdot(1-C_l^{\bar{l}})/S_l^{\bar{l}}$$

$$=[(1+C_l^{\bar{l}})\cdot{}^{\bar{l}}\tilde{n}_l+S_l^{\bar{l}}\cdot{}^{\bar{l}}\tilde{n}_l^{:2}]\cdot(1-C_l^{\bar{l}})/S_l^{\bar{l}}$$

$$=S_l^{\bar{l}}\cdot{}^{\bar{l}}\tilde{n}_l+[1-C_l^{\bar{l}}]\cdot{}^{\bar{l}}\tilde{n}_l^{:2}={}^{\bar{l}}Q_l-1.$$

so $${}^{\bar{l}}\tilde{n}_l\cdot\tau_l^{\bar{l}}=({}^{\bar{l}}Q_l-1)\cdot({}^{\bar{l}}Q_l+1)^{-1}. \tag{2.78}$$

On the other hand, $$({}^{\bar{l}}Q_l+1)\cdot{}^{\bar{l}}\tilde{n}_l\cdot\tau_l^{\bar{l}}=\tau_l^{\bar{l}}\cdot[2\cdot 1+S_l^{\bar{l}}\cdot{}^{\bar{l}}\tilde{n}_l+(1-C_l^{\bar{l}})\cdot{}^{\bar{l}}\tilde{n}_l^{:2}]\cdot{}^{\bar{l}}\tilde{n}_l$$

$$=[2\cdot 1+S_l^{\bar{l}}\cdot{}^{\bar{l}}\tilde{n}_l+(1-C_l^{\bar{l}})\cdot{}^{\bar{l}}\tilde{n}_l^{:2}]\cdot{}^{\bar{l}}\tilde{n}_l\cdot(1-C_l^{\bar{l}})/S_l^{\bar{l}}$$

$$=[2\cdot{}^{\bar{l}}\tilde{n}_l+S_l^{\bar{l}}\cdot{}^{\bar{l}}\tilde{n}_l^{:2}+(1-C_l^{\bar{l}})\cdot{}^{\bar{l}}\tilde{n}_l^{:3}]\cdot(1-C_l^{\bar{l}})/S_l^{\bar{l}}$$

$$=[2\cdot{}^{\bar{l}}\tilde{n}_l+S_l^{\bar{l}}\cdot{}^{\bar{l}}\tilde{n}_l^{:2}+(C_l^{\bar{l}}-1)\cdot{}^{\bar{l}}\tilde{n}_l]\cdot(1-C_l^{\bar{l}})/S_l^{\bar{l}}$$

$$=[S_l^{\bar{l}}\cdot{}^{\bar{l}}\tilde{n}_l^{:2}+(C_l^{\bar{l}}+1)\cdot{}^{\bar{l}}\tilde{n}_l]\cdot(1-C_l^{\bar{l}})/S_l^{\bar{l}}$$

$$={}^{\bar{l}}Q_l-1,$$

so $${}^{\bar{l}}\tilde{n}_l\cdot\tau_l^{\bar{l}}=({}^{\bar{l}}Q_l+1)^{-1}\cdot({}^{T}Q_l-1). \tag{2.79}$$

From Eqs. (2.78) and (2.79), then Eq. (2.77) is workable. Q.E.D.

From Eq. (2.77) we know that the Gibbs vector ${}^{\bar{l}}n_l\cdot\tau_l^{\bar{l}}$, the DCM matrix ${}^{\bar{l}}Q_l$, and the rotation vector ${}^{\bar{l}}n_l\cdot\phi_l^{\bar{l}}$ are mapped one by one, then $${}^{\bar{l}}n_l\cdot\tau_l^{\bar{l}}\leftrightarrow{}^{\bar{l}}n_l\cdot\phi_l^{\bar{l}}\leftrightarrow{}^{\bar{l}}Q_l. \tag{2.80}$$

Therefore, the property of the screw-matrix ${}^{\bar{l}}\tilde{n}_l$ plays an important role, and it is necessary to analyze its basic properties. From Eq. (2.77), then $${}^{\bar{l}}\tilde{n}_l^{T}=-{}^{\bar{l}}Q_l\cdot{}^{l}\tilde{n}Q_{\bar{l}}. \tag{2.81}$$

PROOF: From Eq. (2.77), then $$({}^{\bar{l}}\tilde{n}_l^{T}+{}^{\bar{l}}Q_l\cdot{}^{l}\tilde{n}_{\bar{l}}\cdot{}^{l}Q_{\bar{l}})\cdot\tau_l^{\bar{l}}$$

$$=[({}^{l}Q_{\bar{l}}-1)\cdot({}^{l}Q_{\bar{l}}+1)^{\perp}]^{T}+{}^{\bar{l}}Q_l\cdot({}^{l}Q_{\bar{l}}-1)\cdot({}^{\bar{l}}Q_l+1)^{\perp}\cdot{}^{\bar{l}}Q_l^{-1}$$

$$=({}^{\bar{l}}Q_l+1)^{-1}\cdot({}^{\bar{l}}Q_l-1)+(1-{}^{\bar{l}}Q_l)\cdot(1+{}^{\bar{l}}Q_l)^{-1}$$

$$=({}^{\bar{l}}Q_l+1)^{-1}\cdot{}^{\bar{l}}Q_l-({}^{\bar{l}}Q_l+1)^{-1}-({}^{\bar{l}}Q_l-1)\cdot({}^{\bar{l}}Q_l+1)^{-1}.$$

Since $({}^{\bar{l}}Q_l+\dot{1})^{-1}=1-({}^{\bar{l}}Q_l+1)^{-1}\cdot{}^{\bar{l}}Q_l$, i.e.

$$({}^{\bar{l}}Q_l+1)^{-1}\cdot{}^{\bar{l}}Q_l=1-({}^{\bar{l}}Q_l+1)^{-1}$$

$$({}^{\bar{l}}Q_l+1)^{-1}\cdot{}^{\bar{l}}Q_l-({}^{\bar{l}}Q_l+1)^{-1}-({}^{\bar{l}}Q_l-1)\cdot({}^{\bar{l}}Q_l+1)^{-1}$$

$$=1-({}^{\bar{l}}Q_l+1)^{-1}-({}^{\bar{l}}Q_l+1)^{-1}+(1-{}^{\bar{l}}Q_l)\cdot({}^{\bar{l}}Q_l+1)^{-1}$$

$$=1-({}^{\bar{l}}Q_l+1)\cdot({}^{\bar{l}}Q_l+1)^{-1}=O$$

Since $\tau_l^{\bar{l}}$ is arbitrary and there is ${}^{\bar{l}}\tilde{n}_l^{T}+{}^{\bar{l}}Q_l\cdot{}^{l}\tilde{n}_{\bar{l}}\cdot{}^{l}Q_{\bar{l}}=O$, then Eq. (2.81) is proved. Eq. (2.81) shows that ${}^{l}\tilde{n}_{\bar{l}}$ is a 2nd-Order tensor and ${}^{l}\tilde{n}_{\bar{l}}$ has anti-symmetry. Eq. (2.77) is called the "inverse Cayley transformation." Q.E.D Since ${}^{\bar{l}}\tilde{n}_l^{T}=-{}^{\bar{l}}\tilde{n}_l$, from Eq. (2.81), then $${}^{\bar{l}}\tilde{n}_l={}^{\bar{l}}Q_l\cdot{}^{l}\tilde{n}_{\bar{l}}\cdot{}^{l}Q_{\bar{l}}. \tag{2.82}$$

Comparing Eq. (2.82) with ${}^{i l\bar{l}}\tilde{n}_l={}^{l}Q_{\bar{l}}\cdot{}^{\bar{l}}\tilde{n}_l\cdot{}^{\bar{l}}Q_l$, we know that the Axis-vector is invariant, that is, ${}^{l}n_{\bar{l}}={}^{\bar{l}}n_l$. Since the Axis-vector is independent from the adjacent frames, the Axis-vector is called Axis-invariant.

3D Attitude Vector Equation Based on Axis-Invariant

The attitude and position vector theorem is explained and proved in the following.

THEOREM 2.1. The AC ${}^{i}\mathbf{1}_n$ is given, its 3D attitude vector equation based on Axis-invariant is $$\prod_{l}^{{}^{i}\mathbf{1}_n}(1+\tau_l^{:2})\cdot\mathrm{Vector}({}^{i}Q_n)=\mathrm{Vector}\left(\prod_{l}^{{}^{i}\mathbf{1}_n}\left(\begin{matrix}1+2\cdot\tau_l\cdot{}^{\bar{l}}\tilde{n}_l+\tau_l^{:2}\\ \backslash\cdot\left(1+2\cdot{}^{\bar{l}}\tilde{n}_l^{:2}\right)\end{matrix}\right)\right), \tag{2.83}$$

$${}^{i}r_{nS}\cdot\prod_{k}^{{}^{i}\mathbf{1}_n}(1+\tau_k^{:2})=\sum_{l}^{{}^{i}\mathbf{1}_{nS}}\left(\prod_{k}^{{}^{i}\mathbf{1}_{\bar{l}}}\left(\begin{matrix}1+2\cdot\tau_k\cdot{}^{\bar{k}}\tilde{n}_k+\\ \backslash\tau_l^{:2}\cdot\left(1+2\cdot{}^{\bar{k}}\tilde{n}_k^{:2}\right)\end{matrix}\right)\cdot\prod_{k}^{{}^{i}\mathbf{1}_n}(1+\tau_k^{:2})\cdot{}^{\bar{l}}r_l\right), \tag{2.84}$$

wherein $${}^{\bar{l}}r_l={}^{\bar{l}}l_l+{}^{\bar{l}}n_l\cdot r_l^{\bar{l}}$$

$$\begin{cases}\phi_l^{\bar{l}}\equiv 0 & \text{if } {}^{\bar{l}}k_l\in P\cdot\\ {}^{\bar{l}}r_l=0 & \text{if } {}^{\bar{l}}k_l\in R\end{cases}$$

PROOF: From Eqs. (2.8) and (2.59), then ${}^{i|k}r_{k_s}={}^{i}Q_k\cdot{}^{k}r_{k_s}$, ${}^{i|k}r_{k_s}$ is the multiple linear model of $C_l^{\bar{l}}$ and $S_l^{\bar{l}}$, wherein $l\in{}^{i}\mathbf{1}_k$. Eq. (2.59) can be expressed as $$(1+\tau_l^{:2})\cdot{}^{\bar{l}}Q_l=(1+\tau_l^{:2})\cdot 1+2\cdot\tau_l\cdot{}^{\bar{l}}\tilde{n}_l+2\cdot\tau_l^{:2}\cdot{}^{\bar{l}}\tilde{n}_l^{:2}$$

$$=1+2\cdot\tau_l\cdot{}^{\bar{l}}\tilde{n}_l+\tau_l^{:2}\cdot(1+2\cdot{}^{\bar{l}}\tilde{n}_l^{:2}). \tag{2.85}$$

Eq. (2.85) is called the modified Cayley transformation. Then $$(1+\tau_l^{:2})\cdot{}^{\bar{l}}Q_l=1+2\cdot\tau_l\cdot{}^{\bar{l}}\tilde{n}_l+\tau_l^{:2}\cdot(2\cdot{}^{\bar{l}}n_l\cdot{}^{\bar{l}}n_l^{T}-1). \tag{2.86}$$

Eq. (2.83) is an n-dimensional 2nd-Order polynomial equation about $[\tau_l^{\bar{l}}|l\in{}^i1_n]$. Substitute Eq. (2.86) into Eq. (2.8):

$$
\begin{aligned}
{}^i r_{n_S} &= \sum_l^{{}^i1_{n_S}} \left({}^iQ_{\bar{l}} \cdot {}^{\bar{l}}r_l\right) \\
&= \sum_l^{{}^i1_{n_S}} \left( \frac{\prod_k^{{}^{\bar{l}}1_n}(1+\tau_k^{:2}) \cdot \prod_k^{{}^i1_{\bar{l}}}\left(1+2\cdot\tau_k\cdot{}^{\bar{k}}\tilde{n}_k+\tau_k^{:2}\cdot\left(1+2\cdot{}^{\bar{k}}\tilde{n}_k^{:2}\right)\right)}{\prod_k^{{}^i1_{\bar{l}}}(1+\tau_k^{:2})\cdot\prod_k^{{}^i1_n}(1+\tau_k^{:2})} \cdot {}^{\bar{l}}r_l \right), \\
&= \sum_l^{{}^i1_{n_S}} \left( \frac{\prod_k^{{}^i1_n}(1+\tau_k^{:2}) \cdot \prod_k^{{}^i1_{\bar{l}}}\left(1+2\cdot\tau_k\cdot{}^{\bar{k}}\tilde{n}_k+\tau_k^{:2}\cdot\left(1+2\cdot{}^{\bar{k}}\tilde{n}_k^{:2}\right)\right)}{\prod_k^{{}^i1_n}(1+\tau_k^{:2})} \cdot {}^{\bar{l}}r_l \right)
\end{aligned}
$$

Eq. (2.84) is obtained.

Eqs. (2.83) and (2.84) show that the attitude $(1+\tau^{:2})$·Vector $({}^iQ_n)$ and position vector ${}^ir_{n_s}$ constitute six "n dimensional 2 order" polynomial equations about $\tau_k$. Eqs. (2.83) and (2.84) are the vector equations about structural vectors and joint variables, theorem 2.1 is called the 3D vector position and attitude theorem. The position inverse problem shown in Eq. (2.84) is to solve the joint variable $\tau_l$ and $r_l^{\bar{l}}$ of the polynomial equation when desired position ${}^ir_{n_s}$ is given, wherein $l\in{}^i1_n$.

Eqs. (2.83) and (2.84) show that the relevant structural vectors can be calculated in advance, and can be expressed as reverse recursive process with linear computational complexity, so it can raise the computing speed. And because of normalization of structural parameter ${}^{\bar{l}}n_l$, the "orthogonal normalization" of ${}^iQ_n$ is guaranteed by two orthogonal matrixs ${}^{\bar{l}}\tilde{n}_l$ and $1+{}^{\bar{l}}\tilde{n}_l^{:2}$, and is irrelevant to $\tau_l$, wherein $l\in{}^i1_n$, so the computational accuracy by digital truncation errors in Eqs. (2.83) and (2.84) will not cumulative. Thus, the calculation precision of the vector position equation is guaranteed.

Therefore, the number of 3D vector position and attitude equations based on Axis-invariant is equal to the dimension of 3D spatial position and attitude. Further more, the former has the advantage of calculation speed and precision. It shows that the Gibbs vector ${}^{\bar{l}}n_l\cdot\tau_l^{\bar{l}}$ can represent attitude.

EXAMPLE 2.6. As shown in FIG. 20, for a decoupling Robo-Arm, the pick-up point S 2008 is located on the spherical surface with the wrist center as the sphere center. The rotation chain is recorded as ${}^{\bar{l}}1_l=(\bar{l},l1,l2,l]$, the Axis-vector SEQS is recorded as $[{}^{\bar{l}}n_{l1}, {}^{l1}n_{l2}, {}^{l2}n_l]$, and the angle SEQS as $q_{(\bar{l},l]}=[\phi_{l1}^{\bar{l}},\phi_{l2}^{l1},\phi_l^{l2}]$.

The rotation vector is expressed as $$ {}^{\bar{l}}\phi_l={}^{\bar{l}}n_{l1}\cdot\phi_{l1}^{\bar{l}}+{}^{\bar{l}|l1}n_{l2}\cdot\phi_{l2}^{l1}+{}^{\bar{l}|l2}n_l\phi_l^{l2}. \tag{2.87}$$

Since the Axis-vector SEQS $[{}^{\bar{l}}n_{l1}, {}^{l1}n_{l2}, {}^{l2}n_l]$ of the fixed-axis rotation is a natural invariant, and from Eq. (2.87), the angular velocity is ${}^{\bar{l}}\dot{\phi}_l$; so $$ {}^{\bar{l}}\dot{\phi}_l={}^{\bar{l}}n_{l1}\cdot\dot{\phi}_{l1}^{\bar{l}}+{}^{\bar{l}|l1}n_{l2}\cdot\dot{\phi}_{l2}^{l1}+{}^{\bar{l}|l2}n_l\cdot\dot{\phi}_l^{l2}. \tag{2.88}$$

From Eq. (2.88), the Jacobian matrix, i.e. the partial velocity, is expressed as $$ \frac{\partial^{\bar{l}}\dot{\phi}_l}{\partial\dot{q}_{(\bar{l},l]}} = \left[{}^{\bar{l}}n_{l1}, {}^{\bar{l}|l1}n_{l2}, {}^{\bar{l}|l2}n_l\right]. \tag{2.89}$$

From the Jacobian matrix of the angular velocity vector ${}^{\bar{l}}\dot{\phi}_l$ obtained from Eq. (2.89), we know that it is only relevant to the structural parameters of the Joint Pair, but is independent of the Joint variables.

Eq. (2.63) results in $$ \frac{\partial}{\partial q_{(\bar{l},l]}}\left({}^{\bar{l}}Q_{l1}\cdot{}^{l1}Q_{l2}\cdot{}^{l2}Q_l\right) = \left[{}^{\bar{l}}\tilde{n}_{l1}\cdot{}^{\bar{l}}Q_l, {}^{\bar{l}}Q_{l1}\cdot{}^{l1}\tilde{n}_{l2}\cdot{}^{l1}Q_l, {}^{\bar{l}}Q_{l2}\cdot{}^{l2}\tilde{n}_l\cdot{}^{l2}Q_l\right]. \tag{2.90}$$

According to Eqs. (2.31) and (2.90), the partial velocity of the rotation matrix is obtained $$ \frac{\partial}{\partial q_{(\bar{l},l]}}\left({}^{\bar{l}}Q_{l1}\cdot{}^{l1}Q_{l2}\cdot{}^{l2}Q_l\right) = \left[{}^{\bar{l}}\tilde{n}_{l1}, {}^{\bar{l}|l1}\tilde{n}_{l2}, {}^{\bar{l}|l2}\tilde{n}_l\right]. \tag{2.91}$$

From Eq. (2.91), we get $$ \mathrm{Vector}\left(\frac{\partial}{\partial q_{(\bar{l},l]}}\left({}^{\bar{l}}Q_{l1}\cdot{}^{l1}Q_{l2}\cdot{}^{l2}Q_l\right)\right) = \left[{}^{\bar{l}}\tilde{n}_{l1}, {}^{\bar{l}|l1}\tilde{n}_{l2}, {}^{\bar{l}|l2}\tilde{n}_l\right]. \tag{2.92}$$

From Eq. (2.92) we know that the partial velocity of the rotation transformation is the partial angular velocity. Obviously, the rotation matrix expressed by natural Axis-invariants can work out the partial velocity.

From this section, we know that the Axis-invariant has excellent spatial operational performance, which brings great convenience for rotation analysis and calculation. Since the Axis-invariant is the intrinsic amount of rotation and transposition, it is necessary to establish MAS kinematic and dynamic theories based on Axis-invariant to reveal the inherent laws of MASs.

Quaternion Calculus Based on Axis-Invariant

Rodrigues Quaternion

Fixed-axis rotation is uniquely determined by the Axis-invariant ${}^{\bar{l}}n_l$ and joint angle $\phi_l^{\bar{l}}$, i.e. it is expressed only by the rotation vector ${}^{\bar{l}}\phi_l={}^{\bar{l}}n_l\cdot\phi_l^{\bar{l}}$. The variant form $[{}^{\bar{l}}n_l\cdot S_l^{\bar{l}},C_l^{\bar{l}}]^T$ of the rotation vector is called Rodrigues quaternion also known as Rodrigues parameter. Quaternion means four numbers, where the first three ${}^{\bar{l}}n_l\cdot S_l^{\bar{l}}$ are vectors, and the last $C_l^{\bar{l}}$ is a scalar. Obviously, the Rodrigues quaternion does not meet additivity, so the Rodrigues quaternion is a 4 by 1 array, often called pseudo-coordinates.

The Rodrigues quaternion is expressed as $$ {}^{\bar{l}}q_l = \left[{}^{\bar{l}}n_l\cdot S_l^{\bar{l}}, C_l^{\bar{l}}\right]^T. \tag{2.93}$$

It is recorded as $$ {}^{\bar{l}}q_l = \left[{}^{\bar{l}}q_l, {}^{\bar{l}}q_l^{[4]}\right]^T, $$

wherein ${}^{\bar{l}}q_l$ is called the Rodrigues quaternion vector, and ${}^{\bar{l}}q_l^{[4]}$ is called the real part or scalar part of the Rodrigues quaternion. Obviously, there is $|{}^{\bar{l}}q_l|=1$, i.e. the modulus is 1. Eq. (2.93) is an American style "Rodrigues quaternion".

From Eq. (2.93), we get $$\phi_l^{\bar{l}} = acos\left({}^{\bar{l}}q_l^{[4]}\right) \in [0, \pi], \quad (2.94)$$

$$ {}^{\bar{l}}\phi_l = \begin{cases} {}^{\bar{l}}q_l \cdot \phi_l^{\bar{l}} / S_l^{\bar{l}} & \text{if } \phi_l^{\bar{l}} \neq 0 \\ 0_3 & \text{if } \phi_l^{\bar{l}} = 0 \end{cases}. \quad (2.95)$$

From Eq. (2.94) we know that $\phi_l^{\bar{l}}$ cannot cover a circle, so ${}^{\bar{l}}q_l$ and ${}^{\bar{l}}\phi_l$ are not mapped one by one. The angular range of the Eq. (2.94) is different from that in reference [2], and the direction of the rotational axis in this document is reproducible. The Axis-vector in this paper is an invariant, as its direction is determined in advance of modelling, and Axis-invariants can not be redefined.

European style Rodrigues quaternion is generally expressed as $$ {}^{\bar{l}}q_l = \left[C_l^{\bar{l}}, {}^{\bar{l}}n_l \cdot S_l^{\bar{l}}\right]^T. \quad (2.96)$$

According to Eq. (2.93) we know $$ {}^{l}q_{\bar{l}} = \left[{}^{\bar{l}}n_l \cdot \sin\left(-\phi_l^{\bar{l}}\right), \cos\left(-\phi_l^{\bar{l}}\right)\right]^T = \left[-{}^{\bar{l}}q_l, {}^{\bar{l}}q_l^{[4]}\right]^T \triangleq {}^{\bar{l}}q_l^*. \quad (2.97)$$

The ${}^{\bar{l}}q_l^*$ is the inverse quaternion of ${}^{\bar{l}}q_l$, i.e. conjugate quaternion; obviously, the ${}^{\bar{l}}q_l^*$ is the inverse process of the ${}^{\bar{l}}q_l$. When a Rodrigues quaternion is given, only the angular range of the fixed-axis rotation can be determined as [0,π]. So the Rodrigues quaternion of fixed-axis rotation is a finite rotation quaternion. Note that ${}^{l}q_{\bar{l}}$ is the negative/anti-quaternion of ${}^{\bar{l}}q_l$, and $$ {}^{l}q_{\bar{l}} = {}^{\bar{l}}q_l^{-1}. \quad (2.98)$$

If non-normalized ${}^{\bar{l}}q_l$ is given, obviously, ${}^{\bar{l}}n_l = {}^{\bar{l}}q_l / |q_l^{\bar{l}}|$; then from Eq. (2.51), the corresponding rotation matrix ${}^{\bar{l}}Q_l$ is obtained.

$$ {}^{\bar{l}}Q_l = \frac{{}^{\bar{l}}q_l \cdot {}^{\bar{l}}q_l^T}{\left|q_l^{\bar{l}}\right|^2} + {}^{\bar{l}}q_l^{[4]} \cdot \left(1 - \frac{{}^{\bar{l}}q_l \cdot {}^{\bar{l}}q_l^T}{\left|q_l^{\bar{l}}\right|^2}\right) + {}^{\bar{l}}\tilde{q}_l. \quad (2.99)$$

For the normalized Rodrigues quaternion ${}^{\bar{l}}q_l$, there are $|q_l^{\bar{l}}|=1$ and $\left|q_l^{\bar{l}}\right|^2 = 1 - {}^{\bar{l}}q_l^{[4]:2}$ according to Eq. (2.99), so $$ {}^{\bar{l}}Q_l = {}^{\bar{l}}q_l^{[4]} \cdot 1 + \frac{1}{1 + {}^{\bar{l}}q_l^{[4]}} \cdot {}^{\bar{l}}q_l \cdot {}^{\bar{l}}q_l^T + {}^{\bar{l}}\tilde{q}_l, \quad (2.100)$$

i.e.

$$ {}^{\bar{l}}Q_l = \begin{bmatrix} \frac{{}^{\bar{l}}q_l^{[1]:2}}{1+{}^{\bar{l}}q_l^{[4]}} + {}^{\bar{l}}q_l^{[4]} & \frac{{}^{\bar{l}}q_l^{[1]} \cdot {}^{\bar{l}}q_l^{[2]}}{1+{}^{\bar{l}}q_l^{[4]}} - {}^{\bar{l}}q_l^{[3]} & \frac{{}^{\bar{l}}q_l^{[1]} \cdot {}^{\bar{l}}q_l^{[3]}}{1+{}^{\bar{l}}q_l^{[4]}} + {}^{\bar{l}}q_l^{[2]} \\ \frac{{}^{\bar{l}}q_l^{[2]} \cdot {}^{\bar{l}}q_l^{[1]}}{1+{}^{\bar{l}}q_l^{[4]}} + {}^{\bar{l}}q_l^{[3]} & \frac{{}^{\bar{l}}q_l^{[2]:2}}{1+{}^{\bar{l}}q_l^{[4]}} + {}^{\bar{l}}q_l^{[4]} & \frac{{}^{\bar{l}}q_l^{[2]} \cdot {}^{\bar{l}}q_l^{[3]}}{1+{}^{\bar{l}}q_l^{[4]}} - {}^{\bar{l}}q_l^{[4]} \\ \frac{{}^{\bar{l}}q_l^{[3]} \cdot {}^{\bar{l}}q_l^{[1]}}{1+{}^{\bar{l}}q_l^{[4]}} - {}^{\bar{l}}q_l^{[2]} & \frac{{}^{\bar{l}}q_l^{[3]} \cdot {}^{\bar{l}}q_l^{[2]}}{1+{}^{\bar{l}}q_l^{[4]}} + {}^{\bar{l}}q_l^{[1]} & \frac{{}^{\bar{l}}q_l^{[3]:2}}{1+{}^{\bar{l}}q_l^{[4]}} + {}^{\bar{l}}q_l^{[4]} \end{bmatrix}. \quad (2.101)$$

From Eq. (2.101) and $$1 - {}^{\bar{l}}q_l^{[4]:2} = {}^{\bar{l}}q_l^{[1]:2} + {}^{\bar{l}}q_l^{[2]:2} + {}^{\bar{l}}q_l^{[3]:2},$$

then $$2 \cdot {}^{\bar{l}}q_l^{[4]} = \text{Trace}\left({}^{\bar{l}}Q_l\right) - 1, \quad (2.102)$$

$$ {}^{\bar{l}}Q_l^{[3][2]} - {}^{\bar{l}}Q_l^{[2][3]} = 2 \cdot {}^{\bar{l}}q_l^{[1]} \quad (2.103)$$

$$ {}^{\bar{l}}Q_l^{[1][3]} - {}^{\bar{l}}Q_l^{[3][1]} = 2 \cdot {}^{\bar{l}}q_l^{[2]}$$

$$ {}^{\bar{l}}Q_l^{[2][1]} - {}^{\bar{l}}Q_l^{[1][2]} = 2 \cdot {}^{\bar{l}}q_l^{[3]}.$$

When ${}^{\bar{l}}q_l$ is calculated from Eq. (2.102) and (2.103), which is robust against the ill-conditioned matrix ${}^{\bar{l}}Q_l$, because each element of the ${}^{\bar{l}}Q_l$ is fully applied.

Fixed-axis rotation is the basic problem of ACs. Due to measurement noise and truncation errors of the computer, the orthogonal constraint of the rotation matrix is broken. Additionally, the error is amplified due to the tree chain rotation transformation, so it is difficult to meet the engineering requirements. It is necessary to characterize the rotation matrix by the Rodrigues quaternion, which ensures the orthogonal normalization of the rotation matrix. Metric and digital truncation error can be reduced by rotation based on Axis-invariant.

4D Complex Number

The angular range of the finite rotation quaternion is [0,π), which has the following basic characteristics:

[1] For fixed-axis rotation, the finite rotation quaternion can uniquely determine the rotation matrix; otherwise, it is not set, i.e. ${}^{\bar{l}}q_l \rightarrow {}^{\bar{l}}Q_l$.

[2] The finite rotation quaternions ${}^{\bar{l}}q_l$ and ${}^{l}q_{\bar{l}}$ have the following relation: ${}^{\bar{l}}q_l^{[4]} = {}^{l}q_{\bar{l}}^{[4]}$, ${}^{\bar{l}}q_l = -1 \cdot q_{\bar{l}} = {}^{l}q_{\bar{l}}$. The former is a scalar, called the scalar part; the latter is a rotational Axis-vector, called the vector part.

For the inverse problem of fixed-axis rotation, there is a particularly important constraint when calculating the finite rotation quaternion by the rotation matrix, that is $0 \le \phi_l^{\bar{l}} < \pi$. When the robot or spacecraft or other linkage is in fixed-axis rotation, it is often required to achieve continuous rotation within [0, 2π); obviously, $0 \le \phi_l^{\bar{l}} < \pi$ cannot meet the requirements, which is the reason why the quaternion is named the finite rotation quaternion. For the inverse problem of the fixed-axis rotation, the finite rotation quaternion is not exactly equivalent to the corresponding rotation matrix, which reflects the limitation of the finite rotation quaternion.

However, since the rotation matrix can be represented by the finite rotation quaternion, and the finite rotation quaternion shows a fixed-axis rotation naturally, it is often used as a human-computer interaction interface to calculate the rotation matrix when a fixed-axis rotation is represented. Because in the fixed-axis rotation based on a natural frame, the relationship between two adjacent frames can be determined by the rotation vector and the Rodrigues quaternion. In addition to the root frame, other systems are not required to be defined at this point, i.e. in the MAS, only the basis of the root frame must be focused. In the robotic motion planning and control, the Euler quaternion is required for expression and completely equivalent to the corresponding rotation matrix.

The 2D rotation is a special case of 3D rotation as shown in FIG. 25*a* and 25*b*. Considering the radial plane of the Axis-invariant, $i={}^{\bar{l}}\tilde{n}_l$, and $\text{Vector}({}^{\bar{l}}\tilde{n}_l)\equiv 0$. From Eq. (2.32), we know that ${}^{\bar{l}}\tilde{n}_l{:}^2={}^{\bar{l}}n_l\cdot{}^{\bar{l}}n_l^T-1=-1$, so $i^2=-1$. Thus, the complex base component of the 2D plane is [i, 1]. Obviously, the i is a pure unit imaginary number, with real physical meaning. From Eqs. (2.51) and (2.60), we obtain the Euler equation known as God's Formula:

$$\exp(i\cdot\phi_l^{\bar{l}})=C(\phi_l^{\bar{l}})+i\cdot S(\phi_l^{\bar{l}}). \tag{2.104}$$

From Eq. (2.104), then $$\|\exp(i\cdot\phi_l^{\bar{l}})\|=\exp(i\cdot\phi_l^{\bar{l}})\cdot\exp(-i\cdot\phi_l^{\bar{l}})=1.$$

From the 2D complex number, we know that the pure imaginary axis of the complex number is orthogonal to the real axis and the complex product stands for the corresponding vector rotation. In 2D space, it is very concise to solve the rotation problem with complex numbers. The 2D complex number system is used to solve the 1DOF rotation problem. Therefore, the 4D complex number system is investigated further to solve the 3DOF rotation problem.

Since the rotational Axis-vector ${}^{\bar{l}}n_l$ is a natural invariant, for the AC ${}^{i}\mathbf{l}_l=(i,\ldots,\bar{l},l]$, the Axis-vector ${}^{\bar{l}}n_l$ is regarded as the reference axis. In engineering, it only needs to determine the reference frame $F^{[i]}$ or inertial system. When the MAS is at natural zero-position, $F^{[\bar{l}]}\|F^{[l]}$, it means that the reference system is natural frame system. The Cartesian frame system is the ideal coordinate system, it should be used in the ideal case. That is, the joint coordinate and the natural frame system of section 2.5.4 are applied, and the general kinematics equation and dynamic equation are established with reference to the fixed-axis vector. In the natural frame system, it only need to define the reference frame or inertial system, ie. link system. Other link systems are ideal, because they can be determined by fixed-axis vector or joint coordinate. Thus, it only needs to define the reference frame or inertial system, and all the chain systems have the same basis. The same basis vector i in the inertial system is $$i=[i_x,i_y,i_z]. \tag{2.105}$$

The "*" is noted as complex multiplication, so $$i_x*i_y=i_z,i_y*i_z=i_x,i_z*i_x=i_y. \tag{2.106}$$

The unit base $\underset{.}{i}$ of the 4D complex space is defined by Eq. (2.106). The point at the bottom shows that there adds one dimension.

$$\underset{.}{i}\triangleq[i_x,i_y,i_z,1],\|\underset{.}{i}\|\triangleq 0, \tag{2.107}$$

and the i meets $$i^T*i=\tilde{i}-1, \tag{2.108}$$

wherein the 3D complex multiplication "*" has the 3D vector multiplication "x" operation of Eq. (2.106), i.e.

$$i^T*i=\begin{bmatrix} i_x\\ i_y\\ i_z\end{bmatrix}*[i_x\ i_y\ i_z]=\begin{bmatrix} i_x*i_x & i_z & -i_y\\ -i_z & i_y*i_y & i_x\\ i_y & -i_x & i_z*i_z\end{bmatrix}=\tilde{i}-1.$$

So $$1+i_x*i_x=0,1+i_y*i_y=0,1+i_z*i_z=0. \tag{2.109}$$

Since $i_x$, $i_y$ and $i_z$ are three independent symbols, they are considered three pure imaginary numbers; from Eq. (2.109), three components of the 3D imaginary number i are:

$$i_z^2=-1,i_y^2=-1,i_z^2=-1, \tag{2.110}$$

That is, the correlated pure imaginary numbers are mapped with 3D Cartesian space point one by one. From the above, we know that after adding a dimension to the coordinate base $[i_x,i_y,i_z]$ and introducing the constraint in Eq. (2.108), it still has three independent dimensions and is an independent 3D real space. Obviously, the 4D complex space is isomorphic to the 3D Cartesian space, i.e. equivalent. From Eq. (2.107), then $$\underset{.}{i}^*=\underset{.}{i}^{-1}=[-i,1]. \tag{2.111}$$

Similarly, to Eq. (2.69), define $$\tilde{\underset{.}{i}}\triangleq\underset{.}{i}^T*\underset{.}{i}=\begin{bmatrix} -1 & i_z & -i_y & i_x\\ -i_z & -1 & i_x & i_y\\ i_y & -i_x & -1 & i_z\\ i_x & i_y & i_z & 1\end{bmatrix}=\begin{bmatrix} -1+\tilde{i} & i^T\\ i & 1\end{bmatrix}. \tag{2.112}$$

Eqs. (2.111) and (2.112) show that the 4D complex space has matrix invariance and inner product invariance. Similarly to Eq. (2.70), then $$\text{Vector}(\tilde{i})=-i. \tag{2.113}$$

According to Eq. (2.107), then:

$$\|\underset{.}{i}\|=0=\underset{.}{i}*\underset{.}{i}^T=[-i,1]*[-i,1]^T=i^2+1.$$

So $$i^2=-1. \tag{2.114}$$

Obviously, the 3D Cartesian space is a subspace of the new 4D complex space, and the complex multiplication has the vector multiplication calculation of Eq. (2.106), as well as the algebraic multiplication calculation of Eqs. (2.110) and (2.114). Naturally, the law of the 3D Cartesian space can be investigated by applying the law of 4D complex space. As with the 2D complex numbers, the attitude representation and calculation are complex in the 3D space, but they are concise in the 4D complex space on the contrary, which is the key to many problems in attitude calculation.

Therefore, define the quaternion ${}^{\bar{l}}\underset{.}{q}_l$ and ensure the conjugate quaternion ${}^{\bar{l}}\underset{.}{q}_l^*$ with a constant modulus, $$\begin{gathered}{}^{\bar{l}}\underset{.}{q}_l\triangleq\left[{}^{\bar{l}}q_l,\ {}^{\bar{l}}\underset{.}{q}_l^{[4]}\right]^T,{}^{\bar{l}}\underset{.}{q}_l^*\triangleq\left[-{}^{\bar{l}}q_l,\ {}^{\bar{l}}\underset{.}{q}_l^{[4]}\right]^T\\ {}^{l}\underset{.}{q}_{\bar{l}}\triangleq\left[-{}^{\bar{l}}q_l,\ {}^{\bar{l}}\underset{.}{q}_l^{[4]}\right]^T,\left\|{}^{\bar{l}}\underset{.}{q}_l\right\|=\left\|{}^{\bar{l}}\underset{.}{q}_l^*\right\|\end{gathered}. \tag{2.115}$$

The imaginary part and real part of the quaternion ${}^{\bar{l}}\underset{.}{q}_l$ represent the invariants, so the index at the upper left corner does not represent the reference frame, but only represents the relationship between chain actions. Therefore, ${}^{\bar{l}}\underset{.}{q}_l$ can be regarded as a complex number of the 4D space, where ${}^{\bar{l}}\underset{.}{q}_l^{[4]}$ is the real part and ${}^{\bar{l}}q_l$ is the imaginary part. The Euler quaternion is known through the study of 4D complex space. The first three numbers of ${}^{\bar{l}}\underset{.}{q}_l$ constitute the vector, corresponding to the coordinates of the base i, and the last one is the real part, i.e. $\underset{.}{i}\cdot{}^{\bar{l}}\underset{.}{q}_l={}^{\bar{l}}q_l^{[i]}\cdot i_x+{}^{\bar{l}}q_l^{[2]}\cdot i_y+{}^{\bar{l}}q_l^{[3]}\cdot i_z+{}^{\bar{l}}\underset{.}{q}_l^{[4]}$.

Since the reference base of the 4D complex number is the only natural reference base, the index at the upper left corner of the 4D complex number only shows the motion relationship, and has lost the meaning of the projection reference frame. The 4D complex number with different indexes at the upper left can be used in the algebraic operation. Although the reference index is meaningless in the 4D complex number, this does not show that the index relationship is meaningless because the multiplication and division operations of the complex number abide by the chain ordering of the complex numbers.

The 4D complex number is noted as $$i\cdot{}^{l}q_{l}={}^{l}q_{l}^{[1]}\cdot i_x+{}^{l}q_{l}^{[2]}\cdot i_y+{}^{l}q_{l}^{[3]}\cdot i_z+{}^{l}q_{l}^{[4]}.$$

There is an arbitrary constant c, and then there are the following complex calculations plus "+", scalar multiplication "·", conjugate "□*" and complex number "*":

$$i={}^{\bar l}q_{\bar l}+i\cdot{}^{\bar l l}q_{l}=\left({}^{\bar l}q_{\bar l}^{[1]}+{}^{\bar l l}q_{l}^{[1]}\right)\cdot i_x+\left({}^{\bar l}q_{\bar l}^{[2]}+{}^{\bar l l}q_{l}^{[2]}\right)\cdot i_y+\left({}^{\bar l}q_{\bar l}^{[3]}+{}^{\bar l l}q_{l}^{[3]}\right)\cdot i_z+{}^{\bar l}q_{\bar l}^{[4]}+{}^{\bar l l}q_{l}^{[4]},\tag{2.116}$$

$$c\cdot i\cdot{}^{\bar l}q_{l}=\left(c\cdot{}^{\bar l}q_{l}^{[1]}\right)\cdot i_x+\left(c\cdot{}^{\bar l}q_{l}^{[2]}\right)\cdot i_y+\left(c\cdot{}^{\bar l}q_{l}^{[3]}\right)\cdot i_z+c\cdot{}^{\bar l}q_{l}^{[4]}\tag{2.117}$$

$$i\cdot{}^{\bar l}q_{l}^{*}=-{}^{\bar l}q_{l}^{[1]}\cdot i_x-{}^{\bar l}q_{l}^{[2]}\cdot i_y-{}^{\bar l}q_{l}^{[3]}\cdot i_z+{}^{\bar l}q_{l}^{[4]}=\left(i\cdot{}^{\bar l}q_{l}\right)^{*}.$$

Write Eq. (2.116) into the array form:

$${}^{\bar l}q_{\bar l}+{}^{\bar l l}q_{l}=\begin{bmatrix}{}^{\bar l}q_{\bar l}+{}^{\bar l l}q_{l}\\ {}^{\bar l}q_{\bar l}^{[4]}+{}^{\bar l l}q_{l}^{[4]}\end{bmatrix},\ {}^{\bar l}q_{l}^{*}=\begin{bmatrix}-{}^{\bar l}q_{\bar l}\\ {}^{\bar l l}q_{\bar l}^{[4]}\end{bmatrix}.\tag{2.118}$$

Eq. (2.118) is called the algebra plus formula of the quaternion. Write Eq. (2.118) into the array form:

$$c\cdot{}^{\bar l}q_{l}=\begin{bmatrix}c\cdot{}^{\bar l}q_{l}\\ c\cdot{}^{\bar l}q_{l}^{[4]}\end{bmatrix}.\tag{2.119}$$

Eq. (2.119) is called the scalar multiplication formula of the quaternion. Next, analyze the calculation law of the complex multiplication "*."

$$\left({}^{\bar l}q_{\bar l}^{T}\cdot i^{T}\right)*\left(i\cdot{}^{l}q_{l}\right)=\begin{bmatrix}{}^{\bar l}q_{\bar l}^{T} & {}^{\bar l}q_{\bar l}^{[4]}\end{bmatrix}\cdot\left(i^{T}\cdot *i\right)\cdot\begin{bmatrix}{}^{l}q_{l}\\ {}^{l}q_{l}^{[4]}\end{bmatrix}$$

$$=\begin{bmatrix}{}^{\bar l}q_{\bar l}^{T} & {}^{\bar l}q_{\bar l}^{[4]}\end{bmatrix}\cdot\begin{bmatrix}\tilde{i}-1 & i^{T}\\ i & 1\end{bmatrix}\cdot\begin{bmatrix}{}^{l}q_{l}\\ {}^{l}q_{l}^{[4]}\end{bmatrix}$$

$$=-{}^{\bar l}q_{\bar l}^{T}\cdot{}^{l}q_{l}+{}^{\bar l}q_{\bar l}^{T}\cdot\tilde{i}\cdot{}^{l}q_{l}+{}^{l}q_{l}^{[4]}\cdot{}^{\bar l}q_{\bar l}^{T}\cdot i^{T}+{}^{\bar l}q_{\bar l}^{[4]}\cdot i\cdot{}^{l}q_{l}+{}^{\bar l}q_{\bar l}^{[4]}\cdot{}^{l}q_{l}^{[4]}$$

$$=\left({}^{l}q_{l}^{[4]}\cdot{}^{\bar l}q_{\bar l}^{T}+{}^{\bar l}q_{\bar l}^{[4]}\cdot{}^{l}q_{l}^{T}-{}^{l}q_{l}^{T}\cdot{}^{\bar l}\tilde{q}_{\bar l}\right)\cdot i^{T}+{}^{\bar l}q_{\bar l}^{[4]}\cdot{}^{l}q_{l}^{[4]}-{}^{\bar l}q_{\bar l}^{T}\cdot{}^{l}q_{l}$$

$$=i\cdot\left({}^{\bar l}q_{\bar l}^{[4]}\cdot{}^{l}q_{l}+{}^{\bar l}\tilde{q}_{\bar l}\cdot{}^{l}q_{l}+{}^{\bar l}q_{\bar l}\cdot{}^{l}q_{l}^{[4]}\right)+{}^{\bar l}q_{\bar l}^{[4]}\cdot{}^{l}q_{l}^{[4]}-{}^{\bar l}q_{\bar l}^{T}\cdot{}^{l}q_{l},$$

i.e.

$${}^{\bar l}q_{\bar l}^{T}=i^{T}*i\cdot{}^{l}q_{l}=i\cdot\begin{pmatrix}{}^{\bar l}q_{\bar l}^{[4]}\cdot{}^{l}q_{l}+{}^{\bar l}\tilde{q}_{\bar l}\cdot\\ {}^{l}q_{l}+{}^{\bar l}q_{\bar l}\cdot{}^{l}q_{l}^{[4]}\end{pmatrix}+{}^{\bar l}q_{\bar l}^{[4]}\cdot{}^{l}q_{l}^{[4]}-{}^{\bar l}q_{\bar l}^{T}\cdot{}^{l}q_{l}.\tag{2.120}$$

Write Eq. (2.120) into pseudo-coordinates or the array form, $${}^{\bar l}q_{\bar l}*{}^{l}q_{l}=\begin{bmatrix}{}^{\bar l}q_{\bar l}^{[4]}\cdot{}^{l}q_{l}+{}^{\bar l}\tilde{q}_{\bar l}\cdot{}^{l}q_{l}+{}^{\bar l}q_{\bar l}\cdot{}^{l}q_{l}^{[4]},\\ {}^{\bar l}q_{\bar l}^{[4]}\cdot{}^{l}q_{l}^{[4]}-{}^{\bar l}q_{\bar l}^{T}\cdot{}^{l}q_{l}\end{bmatrix},\tag{2.121}$$

i.e.

$${}^{\bar l}q_{\bar l}*{}^{l}q_{l}=\begin{bmatrix}{}^{\bar l}q_{\bar l}^{[4]}\cdot{}^{l}q_{l}+{}^{\bar l}q_{\bar l}\cdot{}^{l}q_{l}^{[4]}+{}^{\bar l}\tilde{q}_{\bar l}\cdot{}^{l}q_{l}\\ {}^{\bar l}q_{\bar l}^{[4]}\cdot{}^{l}q_{l}^{[4]}-{}^{\bar l}q_{\bar l}^{T}\cdot{}^{l}q_{l}\end{bmatrix}.\tag{2.122}$$

On the other hand, $$\begin{bmatrix}{}^{\bar l}q_{\bar l}^{[4]}\cdot 1+{}^{\bar l}\tilde{q}_{\bar l} & {}^{\bar l}q_{\bar l}\\ -{}^{\bar l}q_{\bar l}^{T} & {}^{\bar l}q_{\bar l}^{[4]}\end{bmatrix}\cdot\begin{bmatrix}{}^{l}q_{l}\\ {}^{l}q_{l}^{[4]}\end{bmatrix}=\begin{bmatrix}{}^{\bar l}q_{\bar l}^{[4]}\cdot{}^{l}q_{l}+{}^{\bar l}q_{\bar l}\cdot{}^{l}q_{l}^{[4]}+{}^{\bar l}\tilde{q}_{\bar l}\cdot{}^{l}q_{l}\\ {}^{\bar l}q_{\bar l}^{[4]}\cdot{}^{l}q_{l}^{[4]}-{}^{\bar l}q_{\bar l}^{T}\cdot{}^{l}q_{l}\end{bmatrix}.\tag{2.123}$$

So the complex multiplication "*" in Eq. (2.121) can be converted into the number multiplication "." calculation, i.e.

$${}^{\bar l}q_{\bar l}*{}^{l}q_{l}=\begin{bmatrix}{}^{\bar l}q_{\bar l}^{[4]}\cdot 1+{}^{\bar l}\tilde{q}_{\bar l} & {}^{\bar l}q_{\bar l}\\ -{}^{\bar l}q_{\bar l}^{T} & {}^{\bar l}q_{\bar l}^{[4]}\end{bmatrix}\cdot\begin{bmatrix}{}^{l}q_{l}\\ {}^{l}q_{l}^{[4]}\end{bmatrix}.\tag{2.124}$$

So, it is defined as $${}^{\bar l}q_{\bar l}\triangleq\begin{bmatrix}{}^{\bar l}q_{\bar l}^{[4]}\cdot 1+{}^{\bar l}\tilde{q}_{\bar l} & {}^{\bar l}q_{\bar l}\\ -{}^{\bar l}q_{\bar l}^{T} & {}^{\bar l}q_{\bar l}^{[4]}\end{bmatrix},\tag{2.125}$$

$${}^{\bar l}\tilde{q}_{\bar l}^{*}\triangleq\begin{bmatrix}{}^{\bar l}q_{\bar l}^{[4]}\cdot 1+{}^{\bar l}\tilde{q}_{\bar l} & -{}^{\bar l}q_{\bar l}\\ {}^{\bar l}q_{\bar l}^{T} & {}^{\bar l}q_{\bar l}^{[4]}\end{bmatrix}.$$

The ${}^{\bar l}\tilde{q}_{\bar l}$ is called the multiplication cross (conjugate) matrix of the quaternion ${}^{l}q_{\bar l}$. Eq. (2.122) results in $${}^{\bar l}q_{\bar l}^{*}*{}^{l}q_{l}^{*}\begin{bmatrix}{}^{\bar l}q_{\bar l}^{[4]}\cdot 1+{}^{\bar l}\tilde{q}_{\bar l} & -{}^{\bar l}q_{\bar l}\\ {}^{\bar l}q_{\bar l}^{T} & {}^{\bar l}q_{\bar l}^{[4]}\end{bmatrix}\cdot\begin{bmatrix}-{}^{l}q_{l}\\ {}^{l}q_{l}^{[4]}\end{bmatrix}=\left({}^{l}q_{l}*{}^{\bar l}q_{\bar l}\right)^{*}.$$

From Eq. (2.124) and the equation above, then $${}^{\bar l}q_{\bar l}*{}^{l}q_{l}={}^{\bar l}q_{\bar l}\cdot{}^{l}q_{l},\ \left({}^{l}q_{l}*{}^{\bar l}q_{\bar l}\right)^{*}={}^{\bar l}q_{\bar l}^{*}*{}^{l}q_{l}^{*}.\tag{2.126}$$

Eqs. (2.125) and (2.126) have the following effects: the multiplication calculation of the quaternion can be replaced by the conjugate matrix calculation of the quaternion. Similar to the vector multiplication cross-calculation, the quaternion multiplication can be replaced by the corresponding conjugate matrix. Eq. (2.126) is called the 4D complex multiplication formula.

[1] Definition of Euler Quaternion

Define $$
{}^{\bar{l}}\underset{\cdot}{\lambda}_l \triangleq \left[{}^{\bar{l}}\lambda_l,\ {}^{\bar{l}}\lambda_l^{[4]}\right]^T = \left[{}^{\bar{l}}n_l \cdot S_l,\ C_l\right]^T, \quad \underset{\cdot}{i} \cdot {}^{\bar{l}}\underset{\cdot}{\lambda}_l = C_l + i \cdot {}^{\bar{l}}n_l \cdot S_l \tag{2.127}
$$

wherein $$
{}^{\bar{l}}\lambda_l^{[4]} = C_l,\ {}^{\bar{l}}\lambda_l = {}^{\bar{l}}n_l \cdot S_l \cdot {}^{\bar{l}}\underset{\cdot}{\lambda}_l \triangleq \left[{}^{\bar{l}}\lambda_l,\ {}^{\bar{l}}\lambda_l^{[4]}\right]^T
$$

is called the Euler-Rodrigues quaternion or Euler quaternion; obviously, it is a quaternion with the modulus of 1, and is also known as the normalized quaternion. Based on the Rodrigues quaternion, Euler first used the Rodrigues quaternion represented by a half-angle. Eq. (2.127) is the American Euler quaternion representation; similarly, the European style Euler quaternion is expressed as $$
{}^{\bar{l}}\underset{\cdot}{\lambda}_l \triangleq \left[C_l,\ {}^{\bar{l}}n_l \cdot S_l\right]^T. \tag{2.128}
$$

In this patent, only the American style Euler quaternion in Eq. (2.127) is used.

[2] Rotation Matrix Derived from Euler Quaternion

From Eq. (2.51) we know $$
\begin{aligned}
&\left(2 \cdot {}^{\bar{l}}\underset{\cdot}{\lambda}_l^{[4]:2} - 1\right) \cdot 1 + 2 \cdot {}^{\bar{l}}\lambda_l \cdot {}^{\bar{l}}\lambda_l^T + 2 \cdot {}^{\bar{l}}\underset{\cdot}{\lambda}_l^{[4]} \cdot {}^{\bar{l}}\tilde{\lambda}_l \\
&= \left({}^{\bar{l}}\underset{\cdot}{\lambda}_l^{[4]:2} - {}^{\bar{l}}\lambda_l^T \cdot {}^{\bar{l}}\lambda_l\right) \cdot 1 + 2 \cdot {}^{\bar{l}}\lambda_l \cdot {}^{\bar{l}}\lambda_l^T + 2 \cdot {}^{\bar{l}}\underset{\cdot}{\lambda}_l^{[4]} \cdot {}^{\bar{l}}\tilde{\lambda}_l \\
&= \left(C_l^2 - S_l^2\right) \cdot 1 + 2 \cdot S_l^2 \cdot {}^{\bar{l}}n_l \cdot {}^{\bar{l}}n_l^T + 2 \cdot C_l \cdot S_l \cdot {}^{\bar{l}}\tilde{n}_l \\
&= 1 \cdot C_l^{\bar{l}} + \left(1 - C_l^{\bar{l}}\right) \cdot {}^{\bar{l}}n_l \cdot {}^{\bar{l}}n_l^T + {}^{\bar{l}}\tilde{n}_l \cdot S_l^{\bar{l}} \\
&= {}^{\bar{l}}n_l \cdot {}^{\bar{l}}n_l^T + \left(1 - {}^{\bar{l}}n_l \cdot {}^{\bar{l}}n_l^T\right) \cdot C_l^{\bar{l}} + {}^{\bar{l}}\tilde{n}_l \cdot S_l^{\bar{l}} = {}^{\bar{l}}Q_l
\end{aligned}.
$$

Thus, the Euler quaternion ${}^{\bar{l}}\underset{\cdot}{\lambda}_l$ represents fixed-axis rotation and determines the rotation matrix ${}^{\bar{l}}Q_l$. Take Eq. (2.25) into account, so $$
\begin{aligned}
&(2 \cdot {}^{\bar{l}}\underset{\cdot}{\lambda}_l^{[4]:2} - 1) \cdot 1 = 2 \cdot {}^{\bar{l}}\lambda_l \cdot {}^{\bar{l}}\lambda_l^T + 2 \cdot {}^{\bar{l}}\underset{\cdot}{\lambda}_l^{[4]} \cdot {}^{\bar{l}}\tilde{\lambda}_l \\
&= 1 + 2 \cdot {}^{\bar{l}}\underset{\cdot}{\lambda}_l^{[4]} \cdot {}^{\bar{l}}\tilde{\lambda}_l + 2 \cdot {}^{\bar{l}}\tilde{\lambda}_l^{:2}
\end{aligned} \tag{2.129}
$$

From Eq. (2.45) we know ${}^{\bar{l}}\phi_l = \phi_l^{\bar{l}} \cdot {}^{\bar{l}}n_l$, and from Eq. (2.48) we have $$
\left|\phi_l^{\bar{l}}\right| = \sqrt{{}^{\bar{l}}\phi_l^{[1]:2} + {}^{\bar{l}}\phi_l^{[2]:2} + {}^{\bar{l}}\phi_l^{[3]:2}};
$$

the relationship between Eqs. (2.93) and (2.127) is as follows $$
\begin{aligned}
{}^{\bar{l}}\underset{\cdot}{q}_l &= \left[2 \cdot {}^{\bar{l}}\lambda_l^{[4]} \cdot {}^{\bar{l}}\lambda_l,\ 2 \cdot {}^{\bar{l}}\lambda_l^{[4]:2} - 1\right]^T \\
{}^{\bar{l}}\underset{\cdot}{\lambda}_l &= \left[{}^{\bar{l}}q_l \Big/ \sqrt{\left({}^{\bar{l}}q_l^{[4]:2} + 1\right)/2},\ \sqrt{\left({}^{\bar{l}}q_l^{[4]:2} + 1\right)/2}\right]^T
\end{aligned}. \tag{2.130}
$$

From Eq. (2.129), we know that the rotation matrix is $$
{}^{\bar{l}}Q_l = \left(2 \cdot C_l^2 - 1\right) \cdot 1 + 2 \cdot {}^{\bar{l}}\lambda_l \cdot {}^{\bar{l}}\lambda_l^T + 2 \cdot C_l \cdot {}^{\bar{l}}\tilde{\lambda}_l = \tag{2.131}
$$

$$
2 \cdot \begin{bmatrix}
C_l^2 + {}^{\bar{l}}\lambda_l^{[1]:2} - 1/2 & {}^{\bar{l}}\lambda_l^{[1]} \cdot {}^{\bar{l}}\lambda_l^{[2]} \backslash - C_l \cdot {}^{\bar{l}}\lambda_l^{[3]} & {}^{\bar{l}}\lambda_l^{[1]} \cdot {}^{\bar{l}}\lambda_l^{[3]} \backslash + C_l \cdot {}^{\bar{l}}\lambda_l^{[2]} \\
{}^{\bar{l}}\lambda_l^{[1]} \cdot {}^{\bar{l}}\lambda_l^{[2]} \backslash + C_l \cdot {}^{\bar{l}}\lambda_l^{[3]} & C_l^2 + {}^{\bar{l}}\lambda_l^{[2]:2} - 1/2 & {}^{\bar{l}}\lambda_l^{[2]} \cdot {}^{\bar{l}}\lambda_l^{[3]} \backslash - C_l \cdot {}^{\bar{l}}\lambda_l^{[1]} \\
{}^{\bar{l}}\lambda_l^{[1]} \cdot {}^{\bar{l}}\lambda_l^{[3]} \backslash - C_l \cdot {}^{\bar{l}}\lambda_l^{[2]} & {}^{\bar{l}}\lambda_l^{[2]} \cdot {}^{\bar{l}}\lambda_l^{[3]} \backslash + C_l \cdot {}^{\bar{l}}\lambda_l^{[1]} & C_l^2 + {}^{\bar{l}}\lambda_l^{[3]:2} - 1/2
\end{bmatrix}
$$

Obviously, $$
{}^{\bar{l}}Q_l = (2 \cdot C_l^2 - 1) \cdot 1 + 2 \cdot {}^{\bar{l}}\lambda_l \cdot {}^{\bar{l}}\lambda_l^T + 2 \cdot C_l \cdot {}^{\bar{l}}\tilde{\lambda}_l. \tag{2.132}
$$

The computational complexity of Eq. (2.132) is higher than that of Eq. (2.59). The difference between Euler quaternion and Rodrigues quaternion is that Euler quaternion is $[{}^{\bar{l}}n_l \cdot S_l, C_l]^T$, and Rodrigues quaternion is $$
\left[{}^{\bar{l}}n_l \cdot S_l^{\bar{l}},\ C_l^{\bar{l}}\right]^T.
$$

Eq. (2.132) is more complex than Eq. (2.59).

[3] Euler Quaternion Derived from Rotation Matrix

In the following, we will discuss the problem of determining the quaternion ${}^{\bar{l}}\underset{\cdot}{\lambda}_l$ by the rotation matrix ${}^{\bar{l}}Q_l$. From Eq. (2.131) we know $$
\phi_l^{\bar{l}} = 2 \cdot a\cos\left(\frac{1}{2} \cdot \sqrt{1 + \mathrm{Trace}\left({}^{\bar{l}}Q_l\right)}\right) \in [0, 2\pi), \tag{2.133}
$$

$$
\begin{aligned}
1 + {}^{\bar{l}}Q_l^{[1][1]} - {}^{\bar{l}}Q_l^{[2][2]} - {}^{\bar{l}}Q_l^{[3][3]} &= 4 \cdot {}^{\bar{l}}\lambda_l^{[1]:2} \\
1 - {}^{\bar{l}}Q_l^{[1][1]} + {}^{\bar{l}}Q_l^{[2][2]} - {}^{\bar{l}}Q_l^{[3][3]} &= 4 \cdot {}^{\bar{l}}\lambda_l^{[2]:2} \\
1 - {}^{\bar{l}}Q_l^{[1][1]} - {}^{\bar{l}}Q_l^{[2][2]} + {}^{\bar{l}}Q_l^{[3][3]} &= 4 \cdot {}^{\bar{l}}\lambda_l^{[3]:2}
\end{aligned}. \tag{2.134}
$$

According to Eq. (2.134), then $$
{}^{\bar{l}}\lambda_l^{[n]} - \sqrt{\overset{n:=m}{\mathrm{Max}}\left\{{}^{\bar{l}}\underset{\cdot}{\lambda}_l^{[m]:2} \middle| m = 1, 2, 3, 4\right\}}, \quad n \in [1:4], \tag{2.135}
$$

$$
\begin{aligned}
{}^{\bar{l}}Q_l^{[1][2]} + {}^{\bar{l}}Q_l^{[2][1]} &= 4 \cdot {}^{\bar{l}}\lambda_l^{[1]} \cdot {}^{\bar{l}}\lambda_l^{[2]} \\
{}^{\bar{l}}Q_l^{[1][3]} + {}^{\bar{l}}Q_l^{[3][1]} &= 4 \cdot {}^{\bar{l}}\lambda_l^{[1]} \cdot {}^{\bar{l}}\lambda_l^{[3]}, \\
{}^{\bar{l}}Q_l^{[2][3]} + {}^{\bar{l}}Q_l^{[3][2]} &= 4 \cdot {}^{\bar{l}}\lambda_l^{[2]} \cdot {}^{\bar{l}}\lambda_l^{[1]}
\end{aligned} \tag{2.136}
$$

$$
\begin{aligned}
{}^{\bar{l}}Q_l^{[2][1]} + {}^{\bar{l}}Q_l^{[1][2]} &= 4 \cdot {}^{\bar{l}}\lambda_l^{[4]} \cdot {}^{\bar{l}}\lambda_l^{[3]} \\
{}^{\bar{l}}Q_l^{[3][1]} + {}^{\bar{l}}Q_l^{[1][3]} &= 4 \cdot {}^{\bar{l}}\lambda_l^{[4]} \cdot {}^{\bar{l}}\lambda_l^{[2]}, \\
{}^{\bar{l}}Q_l^{[3][2]} + {}^{\bar{l}}Q_l^{[2][3]} &= 4 \cdot {}^{\bar{l}}\lambda_l^{[4]} \cdot {}^{\bar{l}}\lambda_l^{[1]}
\end{aligned} \tag{2.137}
$$

i.e.

$$
{}^{\bar{l}}\lambda_l^{[4]} \cdot {}^{\bar{l}}\lambda_l = \frac{1}{2} \cdot \mathrm{Vector}\left({}^{\bar{l}}Q_l\right). \tag{2.138}
$$

Substitute Eq. (2.135) into Eq. (2.137) ${}^{\bar{l}}\underset{\cdot}{\lambda}_l^{[m]}$, $m \in [1:4]$, $m \neq n$. The direction of the rotational axis in reference is definable, but the Axis-vector in Eq. (2.133) is an invariant, and its direction is determined before system analysis as the Natural-axis of ACs should not be redefined in the later calculation process. The angular position $\phi_l^{\bar{l}}$ can completely covers a circle, and the Euler quaternion and attitude have a mapping relationship.

When calculating ${}^{\bar{l}}\lambda_l$ with Eqs. (2.134) and (2.137), the matrix element information is fully applied, and they are determined by Trace(${}^{\bar{l}}Q_l$) and Vector(${}^{\bar{l}}Q_l$). Compared with the attitude calculation of Cartesian Axis-chain, Euler quaternion is stronger and more robust than the ill-suited rotation matrix. From Eq. (2.132) we know that ${}^{l}\lambda_{\bar{l}}$ and ${}^{\bar{l}}\lambda_l$ describe the rotation matrices ${}^{l}Q_{\bar{l}}$ and ${}^{\bar{l}}Q_l$ respectively. From Eq. (2.133) and (2.138), rotational angular $\phi_l^{\bar{l}}$ and the Axis-invariant ${}^{\bar{l}}n_l$ are uniquely determined, i.e. ${}^{\bar{l}}\lambda_l \leftrightarrow {}^{\bar{l}}\phi_l$. Eq. (2.128) is represented as $$ {}^{\bar{l}}\lambda_l = \left[{}^{\bar{l}}n_l \cdot S_l,\ C_l\right]^T,\ 0 \le \phi_l^{\bar{l}} < 2\pi. \tag{2.139}$$

The Euler quaternion can distinguish the full range of [0,2π), but the Rodrigues quaternion can only distinguish the half range within [0,π).

[4] Inverse Quaternion

According to Eqs. (2.130) and (2.132), we know that $$ {}^{l}Q_{\bar{l}} = \left[\left(2\cdot{}^{\bar{l}}\lambda_l^{[4]:2} - 1\right)\cdot \mathbf{1} + 2\cdot{}^{\bar{l}}\lambda_l\cdot{}^{\bar{l}}\lambda_l^T + 2\cdot{}^{\bar{l}}\lambda_l^{[4]}\cdot{}^{\bar{l}}\tilde{\lambda}_l\right]^T = $$
$$ \left(2\cdot{}^{\bar{l}}\lambda_l^{[4]:2} - 1\right)\cdot \mathbf{1} + 2\cdot\left(-{}^{\bar{l}}\lambda_l\right)\cdot\left(-{}^{\bar{l}}\lambda_l^T\right) - 2\cdot{}^{\bar{l}}\lambda_l^{[4]}\cdot{}^{\bar{l}}\tilde{\lambda}_l^{\,T} = \left(2\cdot{}^{l}\lambda_{\bar{l}}^{[4]:2} - 1\right)\cdot \mathbf{1} + 2\cdot{}^{l}\lambda_{\bar{l}}\cdot{}^{l}\lambda_{\bar{l}}^T + 2\cdot{}^{l}\lambda_{\bar{l}}^{[4]}\cdot{}^{l}\tilde{\lambda}_{\bar{l}}. $$
$$ \text{So } {}^{l}\lambda_{\bar{l}} = -{}^{\bar{l}}\lambda_l,\ {}^{l}\lambda_{\bar{l}}^{[4]} = {}^{\bar{l}}\lambda_l^{[4]},\ \text{i.e. } {}^{l}\lambda_{\bar{l}} = \left[-{}^{\bar{l}}\lambda_l,\ {}^{\bar{l}}\lambda_l^{[4]}\right]^T. \tag{2.140}$$

From Eq. (2.130) we have that $$ {}^{l}\lambda_{\bar{l}} = \left[-{}^{\bar{l}}\lambda_l,\ {}^{\bar{l}}\lambda_l^{[4]}\right]^T = \left[{}^{l}n_{\bar{l}}\cdot\sin\left(-\phi_l^{\bar{l}}/2\right),\ \cos\left(-\phi_l^{\bar{l}}/2\right)\right]^T, $$

it is the reverse or inverse of $$ {}^{\bar{l}}\lambda_l, $$

and $$ {}^{l}\lambda_{\bar{l}} = {}^{\bar{l}}\lambda_l^{-1} = {}^{\bar{l}}\lambda_l^{*} = \left[-{}^{\bar{l}}\lambda_l,\ {}^{\bar{l}}\lambda_l^{[4]}\right]^T. \tag{2.141}$$

NOTE: The conjugate quaternion $$ {}^{\bar{l}}\lambda_l^{*} $$

of the unit quaternion $$ {}^{\bar{l}}\lambda_l \text{ is } {}^{\bar{l}}\lambda_l^{-1},\ \text{i.e. } {}^{\bar{l}}\lambda_l^{*} = {}^{\bar{l}}\lambda_l^{-1}; $$

since $$ {}^{\bar{l}}\lambda_l^{*} = {}^{\bar{l}}\lambda_l\left(-\phi_l^{\bar{l}}\right), $$

the conjugate quaternion expresses the inverse rotation of ${}^{\bar{l}}\lambda$. From Eq. (2.141) we know that $$ {}^{l}\lambda_{\bar{l}} \text{ and } {}^{\bar{l}}\lambda_l^{-1} $$

are equivalent.

From Eqs. (2.125) and (2.126) we know that quaternion multiplication can be replaced by its conjugate matrix calculation, $$ {}^{\bar{\bar{l}}}\lambda_l = {}^{\bar{\bar{l}}}\lambda_{\bar{l}} * {}^{\bar{l}}\lambda_l = {}^{\bar{\bar{l}}}\tilde{\lambda}_{\bar{l}}\cdot{}^{\bar{l}}\lambda_l, \tag{2.142}$$

Wherein: from Eq. (2.125), then $$ {}^{\bar{l}}\tilde{\lambda}_{\bar{\bar{l}}} = \begin{bmatrix} {}^{\bar{\bar{l}}}\lambda_{\bar{l}}^{[4]} & -{}^{\bar{\bar{l}}}\lambda_{\bar{l}}^{[3]} & {}^{\bar{\bar{l}}}\lambda_{\bar{l}}^{[2]} & {}^{\bar{\bar{l}}}\lambda_{\bar{l}}^{[1]} \\ {}^{\bar{\bar{l}}}\lambda_{\bar{l}}^{[3]} & {}^{\bar{\bar{l}}}\lambda_{\bar{l}}^{[4]} & -{}^{\bar{\bar{l}}}\lambda_{\bar{l}}^{[1]} & {}^{\bar{\bar{l}}}\lambda_{\bar{l}}^{[2]} \\ -{}^{\bar{\bar{l}}}\lambda_{\bar{l}}^{[2]} & {}^{\bar{\bar{l}}}\lambda_{\bar{l}}^{[1]} & {}^{\bar{\bar{l}}}\lambda_{\bar{l}}^{[4]} & {}^{\bar{\bar{l}}}\lambda_{\bar{l}}^{[3]} \\ -{}^{\bar{\bar{l}}}\lambda_{\bar{l}}^{[1]} & -{}^{\bar{\bar{l}}}\lambda_{\bar{l}}^{[2]} & -{}^{\bar{\bar{l}}}\lambda_{\bar{l}}^{[3]} & {}^{\bar{\bar{l}}}\lambda_{\bar{l}}^{[4]} \end{bmatrix} = \begin{bmatrix} {}^{\bar{\bar{l}}}\lambda_{\bar{l}}^{[4]}\cdot\mathbf{1} + {}^{\bar{\bar{l}}}\tilde{\lambda}_{\bar{l}} & {}^{\bar{\bar{l}}}\lambda_{\bar{l}} \\ -{}^{\bar{\bar{l}}}\lambda_{\bar{l}}^T & {}^{\bar{\bar{l}}}\lambda_{\bar{l}}^{[4]} \end{bmatrix}. \tag{2.143}$$

There is ${}^{\bar{l}}\tilde{\lambda}_{\bar{l}}^T = -{}^{\bar{l}}\tilde{\lambda}_{\bar{l}}^T$ and is called the conjugate matrix of ${}^{\bar{l}}\lambda_{\bar{l}}$. At the same time, since the quaternion is a 4D complex number, the vector injection of the vector part to the reference base should correspond to the same reference base. Eq. (2.142) is called a quaternion concatenation calculation, which corresponds to homogeneous transformation. Therefore, the sequence attitude calculation has the concatenation of ACs; similarly to the vector multiplication cross calculation, the quaternion multiplication can be replaced by the corresponding conjugate matrix.

From Eqs. (2.143) and (2.67), then $$ {}^{\bar{\bar{l}}}\tilde{\lambda}_{\bar{l}} = \begin{bmatrix} C_{\bar{l}}\cdot\mathbf{1} + S_{\bar{l}}\cdot{}^{\bar{\bar{l}}}\tilde{n}_{\bar{l}} & S_{\bar{l}}\cdot{}^{\bar{\bar{l}}}n_{\bar{l}} \\ -S_{\bar{l}}\cdot{}^{\bar{\bar{l}}}n_{\bar{l}}^T & C_{\bar{l}} \end{bmatrix}. \tag{2.144}$$
$$ {}^{\bar{\bar{l}}}\tilde{\lambda}_{\bar{l}}^{-1} = \begin{bmatrix} C_{\bar{l}}\cdot\mathbf{1} - S_{\bar{l}}\cdot{}^{\bar{\bar{l}}}\tilde{n}_{\bar{l}} & -S_{\bar{l}}\cdot{}^{\bar{\bar{l}}}n_{\bar{l}} \\ S_{\bar{l}}\cdot{}^{\bar{\bar{l}}}n_{\bar{l}}^T & C_{\bar{l}} \end{bmatrix} $$

Eq. (2.142) is realized by computer programming, and can be replaced by the following formula, $$
{}^{\bar{\bar{l}}}\lambda_{l} = {}^{\bar{\bar{l}}}\lambda_{\bar{l}} * {}^{\bar{l}}\lambda_{l} = \begin{bmatrix} S_{\bar{l}} \cdot C_{l} \cdot {}^{\bar{\bar{l}}}n_{\bar{l}} + \left(C_{\bar{l}} \cdot 1 + S_{\bar{l}} \cdot {}^{\bar{\bar{l}}}\tilde{n}_{\bar{l}}\right) \cdot S_{l} \cdot {}^{\bar{l}}n_{l} \\ C_{\bar{l}} \cdot C_{l} - S_{\bar{l}} \cdot {}^{\bar{\bar{l}}}n_{\bar{l}}^{T} \cdot S_{l} \cdot {}^{\bar{l}}n_{l} \end{bmatrix}. \tag{2.145}
$$

Eq. (2.145) contains only 16 multiplications and 12 additions, and ${}^{\bar{\bar{l}}}Q_{l} = {}^{\bar{\bar{l}}}Q_{\bar{l}} \cdot {}^{\bar{l}}Q_{l}$ needs 27 multiplications and 18 additions. Calculating ${}^{\bar{l}}n_{l}$, $S_{l}^{\bar{l}}$ and $C_{l}^{\bar{l}}$ after obtain ${}^{\bar{l}}\lambda_{l}$, then calculate ${}^{\bar{l}}Q_{l}$ with Eq. (2.59). The ${}^{\bar{l}}\tilde{\lambda}_{\bar{l}}$ is the 4×4 matrix, which consists of the following: (a) The fourth row, the quaternion ${}^{\bar{l}}\lambda_{\bar{l}}$ with forward CO. (b) The fourth line, the quaternion ${}^{\bar{l}}\lambda_{\bar{l}}$ with backward CO, i.e. $-{}^{\bar{l}}\lambda_{\bar{l}}^{T}$. (c) The upper left 3×3 contains ${}^{\bar{l}}\lambda_{\bar{l}}^{[4]} \cdot 1 + {}^{\bar{l}}\tilde{\lambda}_{\bar{l}}$, wherein the ${}^{\bar{l}}\tilde{\lambda}_{\bar{l}}$ is screw metrix of ${}^{\bar{l}}\lambda_{\bar{l}}$.

According to Eq. (2.145), obtain $$
{}^{i}\lambda_{j} = \prod_{k}^{{}^{i}1_{\bar{j}}} \left({}^{\bar{k}}\tilde{\lambda}_{k}\right) \cdot {}^{\bar{j}}\lambda_{j}. \tag{2.146}
$$

Eq. (2.142) represents the forward rotation operation, i.e. it represents rotation. Therefore, the Euler quaternion product calculation corresponds to the product calculation of the rotation matrix. Thus, the rotation transformation chain is equivalent to the fixed-axis rotation chain, i.e.

$$
{}^{\bar{\bar{l}}}Q_{l} = {}^{\bar{\bar{l}}}Q_{\bar{l}} \cdot {}^{\bar{l}}Q_{l} \Leftrightarrow {}^{\bar{\bar{l}}}\lambda_{l} = {}^{\bar{\bar{l}}}\lambda_{\bar{l}} * {}^{\bar{l}}\lambda_{l} = {}^{\bar{\bar{l}}}\tilde{\lambda}_{\bar{l}} \cdot {}^{\bar{l}}\lambda_{l}. \tag{2.147}
$$

It can be seen from above that the Euler quaternion can uniquely determine the rotation matrix. The rotation matrix can also uniquely determine the Euler quaternion, that is, the Euler quaternion is equivalent to the rotation matrix. The rotation vector corresponds to the normalized quaternion, i.e. the quaternion represents the fixed-axis rotation; the calculation of the rotation matrix is equivalent to the matrix calculation of the chain quaternion.

Since three independent spatial points can uniquely determine the rotation and the rotation is a derived quantity from translation, the position vector ${}^{l}r_{l_S}$ can also be represented by a quaternion. Define the quaternion ${}^{l}p_{l_S}$ of the position vector ${}^{l}r_{l_S}$, $$
{}^{l}p_{l_S} \triangleq \left[{}^{l}r_{l_S}, d_{l_S}\right]^{T}, \; {}^{l_S}p_{l} \triangleq {}^{l}p_{l_S}^{*} = \left[-{}^{l}r_{l_S}, d_{l_S}\right]^{T}. \tag{2.148}
$$

The position quaternion increases the 3D vector space to the 4D space, where $d_{l_S}$ is any real number. In physics, the position vector consolidated with a rigid-body shows the position and attitude of the rigid-body; the position quaternion is consistent with the attitude quaternion in mathematical form, and they form a dual relationship:

$$
\begin{gathered}
{}^{\bar{l}}\tilde{\lambda}_{l} \cdot {}^{\bar{l}}\tilde{\lambda}_{l}^{*} = \mathbf{1} \\
{}^{l}p_{l_S}^{*} * {}^{\bar{l}}\lambda_{l} = {}^{\bar{l}}\tilde{\lambda}_{l}^{\diamond} \cdot {}^{l}p_{l_S} \\
{}^{\bar{l}}\tilde{\lambda}_{l} \cdot {}^{\bar{l}}\tilde{\lambda}_{l}^{\diamond} = {}^{\bar{l}}\tilde{\lambda}_{l}^{\diamond} \cdot {}^{\bar{l}}\tilde{\lambda}_{l} = {}^{\bar{l}}Q_{l},
\end{gathered} \tag{2.149}
$$

wherein $$
{}^{\bar{l}}\tilde{\lambda}_{l}^{\diamond} \triangleq \begin{bmatrix} C_{l} \cdot 1 + S_{l} \cdot {}^{\bar{l}}\tilde{n}_{l} & -S_{l} \cdot {}^{\bar{l}}n_{l} \\ S_{l} \cdot {}^{\bar{l}}n_{l}^{T} & C_{l} \end{bmatrix}, \; {}^{\bar{l}}Q_{l} \triangleq \begin{bmatrix} {}^{\bar{l}}Q_{l} & 0_{3} \\ 0_{3}^{T} & 1 \end{bmatrix}.
$$

PROOF: Consider $$
{}^{\bar{l}}\tilde{\lambda}_{l}^{\diamond}
$$

defined in Eqs. (2.32), (2.34), (2.143) and (2.149), so $$
\begin{aligned}
{}^{\bar{l}}\tilde{\lambda}_{l} \cdot {}^{\bar{l}}\tilde{\lambda}_{l}^{*} &= \begin{bmatrix} C_{l} \cdot 1 + S_{l} \cdot {}^{\bar{l}}\tilde{n}_{l} & S_{l} \cdot {}^{\bar{l}}n_{l} \\ -S_{l} \cdot {}^{\bar{l}}n_{l}^{T} & C_{l} \end{bmatrix} \cdot \begin{bmatrix} C_{l} \cdot 1 - S_{l} \cdot {}^{\bar{l}}\tilde{n}_{l} & -S_{l} \cdot {}^{\bar{l}}n_{l} \\ S_{l} \cdot {}^{\bar{l}}n_{l}^{T} & C_{l} \end{bmatrix} \\
&= \begin{bmatrix} C_{l}^{2} \cdot 1 - S_{l}^{2} \cdot {}^{\bar{l}}\tilde{n}_{l}^{:2} + S_{l}^{2} \cdot \left({}^{\bar{l}}\tilde{n}_{l}^{:2} + 1\right) & 0_{3} \\ 0_{3}^{T} & 1 \end{bmatrix} = \begin{bmatrix} 1 & 0_{3} \\ 0_{3}^{T} & 1 \end{bmatrix} = \mathbf{1}.
\end{aligned}
$$

Consider ${}^{\bar{l}}Q_{l}$ defined in Eqs. (2.126), (2.143), (2.146) and (2.149), therefore $$
\begin{aligned}
{}^{l}p_{l_S} * {}^{\bar{l}}\lambda_{l}^{*} = {}^{l}\tilde{p}_{l_S} \cdot {}^{\bar{l}}\lambda_{l}^{*} &= \begin{bmatrix} d_{l_S} \cdot 1 + {}^{l}\tilde{r}_{l_S} & {}^{\bar{l}}r_{l_S} \\ -{}^{l}r_{l_S}^{T} & d_{l_S} \end{bmatrix} \cdot \begin{bmatrix} -S_{l} \cdot {}^{\bar{l}}n_{l} \\ C_{l} \end{bmatrix} \\
&= \begin{bmatrix} C_{l} \cdot 1 + S_{l} \cdot {}^{\bar{l}}\tilde{n}_{l} & -S_{l} \cdot {}^{\bar{l}}n_{l} \\ S_{l} \cdot {}^{\bar{l}}n_{l}^{T} & C_{l} \end{bmatrix} \cdot \begin{bmatrix} {}^{l}r_{l_S} \\ d_{l_S} \end{bmatrix} = {}^{\bar{l}}\tilde{\lambda}_{l}^{\diamond} \cdot {}^{l}p_{l_S}.
\end{aligned}
$$

From ${}^{\bar{l}}\tilde{\lambda}_{l}^{\diamond}$ defined in Eqs. (2.59), (2.143) and (2.149), then obtain $$
\begin{aligned}
{}^{\bar{l}}\tilde{\lambda}_{l} \cdot {}^{\bar{l}}\tilde{\lambda}_{l}^{\diamond} &= \begin{bmatrix} C_{l} \cdot 1 + S_{l} \cdot {}^{\bar{l}}\tilde{n}_{l} & S_{l} \cdot {}^{\bar{l}}n_{l} \\ -S_{l} \cdot {}^{\bar{l}}n_{l}^{T} & C_{l} \end{bmatrix} \cdot \begin{bmatrix} C_{l} \cdot 1 + S_{l} \cdot {}^{\bar{l}}\tilde{n}_{l} & -S_{l} \cdot {}^{\bar{l}}n_{l} \\ S_{l} \cdot {}^{\bar{l}}n_{l}^{T} & C_{l} \end{bmatrix} \\
= {}^{\bar{l}}\tilde{\lambda}_{l}^{\diamond} \cdot {}^{\bar{l}}\tilde{\lambda}_{l} &= \begin{bmatrix} C_{l}^{2} \cdot 1 + S_{l}^{2} \cdot {}^{\bar{l}}\tilde{n}_{l}^{:2} + 2 \cdot C_{l}S_{l} \cdot {}^{\bar{l}}\tilde{n}_{l} + S_{1}^{2} \cdot \left(1 + {}^{\bar{l}}\tilde{n}_{l}^{:2}\right) & 0_{3} \\ 0_{3}^{T} & C_{l} \end{bmatrix} \\
&= \begin{bmatrix} 1 + S_{l}^{\bar{l}} \cdot {}^{\bar{l}}\tilde{n}_{l} + \left(1 - C_{l}^{\bar{l}}\right) \cdot {}^{\bar{l}}\tilde{n}_{l}^{:2} & 0_{3} \\ 0_{3}^{T} & 1 \end{bmatrix} \\
&= \begin{bmatrix} 1 + 2 \cdot {}^{\bar{l}}\lambda_{\bar{l}}^{[4]} \cdot {}^{\bar{l}}\tilde{\lambda}_{l} + 2 \cdot {}^{\bar{l}}\tilde{\lambda}_{l}^{:2} & 0_{3} \\ 0_{3}^{T} & 1 \end{bmatrix} = {}^{\bar{l}}Q_{l}.
\end{aligned}
$$

So Eq. (2.149) is established. Q.E.D.

From Eqs. (2.146) and (2.149), we have $$
{}^{\bar{l}}\lambda_{l} * {}^{l}p_{l_S} * {}^{l}\lambda_{\bar{l}} = {}^{\bar{l}}\tilde{\lambda}_{l} \cdot {}^{\bar{l}}\tilde{\lambda}_{l}^{\diamond} \cdot {}^{l}p_{l_S} = {}^{\bar{l}}Q_{l} \cdot {}^{l}p_{l_S} = \left[{}^{\bar{l}|l}r_{l_S}, d_{l_S}\right]^{T}.
$$

Since the Euler quaternion ${}^{\bar{l}}\lambda_{\bar{l}}$ is a specific position quaternion, from Eqs. (2.146) and (2.149), then $$
{}^{\bar{\bar{l}}}\lambda_{\bar{l}} * {}^{\bar{l}}\lambda_{l} * {}^{\bar{l}}\lambda_{\bar{\bar{l}}} = {}^{\bar{\bar{l}}}\tilde{\lambda}_{\bar{l}} \cdot {}^{\bar{\bar{l}}}\tilde{\lambda}_{\bar{l}}^{\diamond} \cdot {}^{\bar{l}}\lambda_{l} = {}^{\bar{\bar{l}}}Q_{\bar{l}} \cdot {}^{\bar{l}}\lambda_{l} = \left[{}^{\bar{\bar{l}}|l}\lambda_{l}, {}^{l}\lambda_{l}^{[4]}\right]^{T} \triangleq {}^{\bar{\bar{l}}|\bar{l}}\lambda_{l}.
$$

Comparing the equation above with Eq. (2.145), we know that ${}^{\bar{\bar{l}}|\bar{l}}\lambda_{l}$ and ${}^{\bar{\bar{l}}}\lambda_{l}$ are different: ${}^{\bar{\bar{l}}|\bar{l}}\lambda_{l}$ is still a quaternion, but no longer an Euler quaternion. So there is $$
\begin{gathered}
{}^{\bar{\bar{l}}}\lambda_{\bar{l}} * {}^{\bar{l}}\lambda_{l} * {}^{\bar{\bar{l}}}\lambda_{\bar{l}}^{-1} = {}^{\bar{\bar{l}}|\bar{l}}\lambda_{l} \\
{}^{\bar{l}|\bar{l}}p_{lS} = \left[\,{}^{\bar{l}|l}r_{lS},\ \ d_{l_s}\,\right]^T \\
{}^{\bar{l}|l}p_{l_s} \triangleq \begin{bmatrix} {}^{\bar{l}|l}r_{l_s} \\ {}^{l}p_{l_s}^{[4]} \end{bmatrix} = \begin{bmatrix} \left(1 + 2\cdot{}^{\bar{l}}\lambda_l^{[4]}\cdot{}^{\bar{l}}\tilde{\lambda}_l + 2\cdot{}^{\bar{l}}\tilde{\lambda}_l^{:2}\right)\cdot{}^{l}r_{l_s} \\ d_{l_s} \end{bmatrix} = {}^{\bar{l}}\tilde{\lambda}_l\cdot{}^{l}\tilde{p}_{l_s}\cdot{}^{l}\lambda_{\bar{l}}.
\end{gathered}
\tag{2.150}
$$

The coordinate transformation of the position vector corresponds to the "conjugate transformation" of the position quaternion to the attitude quaternion, corresponding to a similar transformation of the matrix. We know that the rotation vector and translation vector are unified in mathematical form from chapter 2. From this section we know that the position quaternion and rotation quaternion are also unified in mathematical form. The attitude quaternion and position quaternion are usually referred to as dual-quaternions individually or collectively. Dual-quaternions are very important to solve the inverse kinematics of the general robot arm.

[1] Attitude Quaternion Based on Dual-Vectors

The attitude from the initial unit vector ${}_{a}^{\bar{l}}u_l$ to the target unit vector ${}_{b}^{\bar{l}}u_l$ is equivalent to the rotation angle $\phi_l^{\bar{l}} \in (-\pi,\pi]$ around the axis ${}^{\bar{l}}n_l$, wherein ${}_{b}^{\bar{l}}u_l \neq {}_{a}^{\bar{l}}u_l$. Then we obtain the process of determining the dual-vector attitude:

$$
\begin{gathered}
C_l^{\bar{l}} = {}_{a}^{\bar{l}}u_l^T\cdot{}_{b}^{\bar{l}}u_l,\ {}^{\bar{l}}n_l\cdot S_l^{\bar{l}} = {}_{a}^{\bar{l}}\tilde{u}_l\cdot{}_{b}^{\bar{l}}\tilde{u}_l \\
{}^{\bar{l}}n_l = {}_{a}^{\bar{l}}\tilde{u}_l\cdot{}_{b}^{\bar{l}}u_l \Big/ \left\|{}_{a}^{\bar{l}}\tilde{u}_l\cdot{}_{b}^{\bar{l}}u_l\right\|
\end{gathered}.
\tag{2.151}
$$

According to Eq. (2.151), then $$
\begin{cases}
{}^{\bar{l}}\lambda_l^{[4]} = C_l = \sqrt{\left|1 + C_l^{\bar{l}}\right|/2} \\
{}^{\bar{l}}\lambda_l = {}^{\bar{l}}n_l\cdot\dfrac{S_l^{\bar{l}}}{2\cdot C_l} = \dfrac{{}_{a}^{\bar{l}}\tilde{u}_l\cdot{}_{b}^{\bar{l}}u_l}{2\cdot{}^{\bar{l}}\lambda_l^{[4]}}
\end{cases}.
\tag{2.152}
$$

From Eq. (2.127), therefore $$
\phi_l^{\bar{l}} = 2\cdot\operatorname{atan}\left({}^{\bar{l}}\lambda_l^T\cdot{}^{\bar{l}}n_l,\ {}^{\bar{l}}\lambda_l^{[4]}\right) \in (-\pi, \pi],
\tag{2.153}
$$

wherein || is used to prevent overflow during the numerical calculation. From Eq. (2.153) we know that $\phi_l^{\bar{l}} \in (-\pi,\pi]$. In much software (such as Coin3D), the dual-vector attitude determination algorithms are very inconvenient for the user, because they require the angular range from the initial vector to the target vector to be only $[0,\pi)$. The dual-vector attitude determination process shows that the Euler quaternion essentially unifies the dual-vector multiplication cross and point multiplication.

[2] Triaxial Attitude Based on Quaternions

EXAMPLE 2.7. Record the rover system as $O_c{-}x_cy_cz_c$ and the inertia system as $O_i{-}x_iy_iz_i$; the fixed-axis-chain ${}^{i}\mathbf{l}_c=(i, c1, c2, c]$ is given, the Axis-invariant sequence is $[{}^{\bar{l}}n_l \mid l\in{}^{i}\mathbf{l}_c]$, and the angle sequence is recorded as $q_{(l,c]}=[\phi_l^{\bar{l}} \mid l\in{}^{i}\mathbf{l}_c]$, that is, the initial system is consistent with the navigation system and rotated to the current attitude of the patroller respectively around ${}^{i}n_{c1}$, ${}^{c1}n_{c2}$ and ${}^{c2}n_c$, where c1 and c2 are the intermediate frames. So:

$$
{}^{i}\lambda_c = \begin{bmatrix} C_{c1}C_{c2}S_c - S_{c1}S_{c2}C_c \\ S_{c1}C_{c2}S_c - C_{c1}S_{c2}C_c \\ C_{c1}S_{c2}S_c + S_{c1}C_{c2}C_c \\ -S_{c1}S_{c2}S_c + C_{c1}C_{c2}C_c \end{bmatrix},
\tag{2.154}
$$

$$
{}^{i}Q_c = 2\cdot\begin{bmatrix}
{}^{i}\lambda_c^{[4]:2} + {}^{i}\lambda_c^{[1]:2} - \frac{1}{2} & {}^{i}\lambda_c^{[1]}\cdot{}^{i}\lambda_c^{[2]} - {}^{i}\lambda_c^{[4]}\cdot{}^{i}\lambda_c^{[3]} & {}^{i}\lambda_c^{[1]}\cdot{}^{i}\lambda_c^{[3]} + {}^{i}\lambda_c^{[4]}\cdot{}^{i}\lambda_c^{[2]} \\
{}^{i}\lambda_c^{[1]}\cdot{}^{i}\lambda_c^{[2]} + {}^{i}\lambda_c^{[4]}\cdot{}^{i}\lambda_c^{[3]} & {}^{i}\lambda_c^{[4]:2} + {}^{i}\lambda_c^{[2]:2} - \frac{1}{2} & {}^{i}\lambda_c^{[2]}\cdot{}^{i}\lambda_c^{[3]} - {}^{i}\lambda_c^{[4]}\cdot{}^{i}\lambda_c^{[1]} \\
{}^{i}\lambda_c^{[1]}\cdot{}^{i}\lambda_c^{[3]} - {}^{i}\lambda_c^{[4]}\cdot{}^{i}\lambda_c^{[2]} & {}^{i}\lambda_c^{[2]}\cdot{}^{i}\lambda_c^{[3]} + {}^{i}\lambda_c^{[4]}\cdot{}^{i}\lambda_c^{[1]} & {}^{i}\lambda_c^{[4]:2} + {}^{i}\lambda_c^{[3]:2} - \frac{1}{2}
\end{bmatrix}.
\tag{2.155}
$$

PROOF: According to Eq. (2.127), then $$
{}^{i}\lambda_{c1} = \begin{vmatrix} 0 \\ 0 \\ S_{c1} \\ C_{c1} \end{vmatrix},\ {}^{c1}\lambda_{c2} = \begin{vmatrix} 0 \\ S_{c2} \\ 0 \\ C_{c2} \end{vmatrix},\ {}^{c2}\lambda_c = \begin{vmatrix} S_c \\ 0 \\ 0 \\ C_c \end{vmatrix}.
\tag{2.156}
$$

From Eq. (2.147), $$
\begin{aligned}
{}^{i}\lambda_c &= {}^{i}\lambda_{c1} * {}^{c1}\lambda_{c2} * {}^{c2}\lambda_c = {}^{i}\tilde{\lambda}_{c1}\cdot{}^{c1}\tilde{\lambda}_{c2}\cdot{}^{c2}\lambda_c \\
&= \begin{bmatrix} C_{c1} & -S_{c1} & 0 & 0 \\ S_{c1} & C_{c1} & 0 & 0 \\ 0 & 0 & C_{c1} & S_{c1} \\ 0 & 0 & -S_{c1} & C_{c1} \end{bmatrix}\cdot\begin{bmatrix} C_{c2} & 0 & -S_{c2} & 0 \\ 0 & C_{c2} & 0 & -S_{c2} \\ S_{c2} & 0 & C_{c2} & 0 \\ 0 & S_{c2} & 0 & C_{c2} \end{bmatrix}\cdot\begin{bmatrix} S_c \\ 0 \\ 0 \\ C_c \end{bmatrix}, \\
&= \begin{bmatrix} C_{c1}C_{c2}S_c - S_{c1}S_{c2}C_c \\ S_{c1}C_{c2}S_c - C_{c1}S_{c2}C_c \\ C_{c1}S_{c2}S_c + S_{c1}C_{c2}C_c \\ -S_{c1}S_{c2}S_c + C_{c1}C_{c2}C_c \end{bmatrix}
\end{aligned}
$$

wherein $\|{}^{i}\lambda_c\|=1$. Therefore Eq. (2.154) is set. From Eq. (2.131) we know that $$
{}^{i}Q_c = \begin{bmatrix}
2\cdot\begin{pmatrix} {}^{i}\lambda_c^{[4]:2} + \\ {}^{i}\lambda_c^{[1]:2} \end{pmatrix} - 1 & 2\cdot\begin{pmatrix} {}^{i}\lambda_c^{[1]}\cdot{}^{i}\lambda_c^{[2]} - \\ {}^{i}\lambda_c^{[4]}\cdot{}^{i}\lambda_c^{[3]} \end{pmatrix} & 2\cdot\begin{pmatrix} {}^{i}\lambda_c^{[1]}\cdot{}^{i}\lambda_c^{[3]} + \\ {}^{i}\lambda_c^{[4]}\cdot{}^{i}\lambda_c^{[2]} \end{pmatrix} \\
2\cdot\begin{pmatrix} {}^{i}\lambda_c^{[1]}\cdot{}^{i}\lambda_c^{[2]} + \\ {}^{i}\lambda_c^{[4]}\cdot{}^{i}\lambda_c^{[3]} \end{pmatrix} & 2\cdot\begin{pmatrix} {}^{i}\lambda_c^{[4]:2} + \\ {}^{i}\lambda_c^{[2]:2} \end{pmatrix} - 1 & 2\cdot\begin{pmatrix} {}^{i}\lambda_c^{[2]}\cdot{}^{i}\lambda_c^{[3]} - \\ {}^{i}\lambda_c^{[4]}\cdot{}^{i}\lambda_c^{[1]} \end{pmatrix} \\
2\cdot\begin{pmatrix} {}^{i}\lambda_c^{[1]}\cdot{}^{i}\lambda_c^{[3]} - \\ {}^{i}\lambda_c^{[4]}\cdot{}^{i}\lambda_c^{[2]} \end{pmatrix} & 2\cdot\begin{pmatrix} {}^{i}\lambda_c^{[2]}\cdot{}^{i}\lambda_c^{[3]} + \\ {}^{i}\lambda_c^{[4]}\cdot{}^{i}\lambda_c^{[1]} \end{pmatrix} & 2\cdot\begin{pmatrix} {}^{i}\lambda_c^{[4]:2} + \\ {}^{i}\lambda_c^{[3]:2} \end{pmatrix} - 1
\end{bmatrix}.
$$

So Eq. (2.155) is set. The "3-2-1" attitude angle SEQS are obtained from Eq. (2.144)

$$\phi_{c1}^{i} = \operatorname{atan}\left(2\cdot\left({}^{i}\lambda_c^{[1]}\cdot{}^{i}\lambda_c^{[2]} + {}^{i}\lambda_c^{[4]}\cdot{}^{i}\lambda_c^{[3]}\right),\ 2\cdot\left({}^{i}\lambda_c^{[4]:2} + {}^{i}\lambda_c^{[1]:2}\right) - 1\right)$$

$$\phi_{c}^{c2} = \operatorname{atan}\left(2\cdot\left({}^{i}\lambda_c^{[2]}\cdot{}^{i}\lambda_c^{[3]} + {}^{i}\lambda_c^{[4]}\cdot{}^{i}\lambda_c^{[1]}\right),\ 2\cdot\left({}^{i}\lambda_c^{[4]:2} + {}^{i}\lambda_c^{[3]:2}\right) - 1\right).$$

$$\phi_{c2}^{c1} = \operatorname{asin}\left(-2\cdot\left({}^{i}\lambda_c^{[1]}\cdot{}^{i}\lambda_c^{[3]} - {}^{i}\lambda_c^{[4]}\cdot{}^{i}\lambda_c^{[2]}\right)\right) \tag{2.157}$$

Q.E.D

When ${}^{i}Q_c$ is known, the angle SEQS $[\phi_{c1}{}^{i}, \phi_{c2}{}^{c1}, \phi_c{}^{c2}]$ is calculated respectively with Eqs. (2.145) and (2.155). When ${}^{i}Q_c$ is calculated with Eq. (2.143), any item of ${}^{i}Q_{c1}\cdot{}^{c1}Q_{c2}\cdot{}^{c2}Q_c$ violates the orthogonal normalization in a certain degree, so ${}^{i}Q_c$ is obviously ill-conditioned matrix. When ${}^{i}Q_c$ is calculated with Eq. (2.155), the corresponding quaternions are respectively obtained from Eq. (2.156) and ${}^{i}Q_c$ is obtained after unitization; its accuracy is mainly determined by the word length of the computer, so it has very high accuracy. Therefore, the calculation of DCM by quaternions is the basic criterion for the kinematic calculation of the tree chain system.

EXAMPLE 2.8. In example 2.6, we know that expected rotation attitude of the Robo-Arm is ${}^{\bar{l}}n_l\cdot\phi_l^{\bar{l}}$, then:

$$\phi_{l1}^{\bar{l}} = \operatorname{atan}\left(2\cdot\left({}^{\bar{l}}\lambda_l^{[1]}\cdot{}^{\bar{l}}\lambda_l^{[3]} + {}^{\bar{l}}\lambda_l^{[4]}\cdot{}^{\bar{l}}\lambda_l^{[2]}\right),\ 2\cdot\left({}^{\bar{l}}\lambda_l^{[4]}\cdot{}^{\bar{l}}\lambda_l^{[1]} + {}^{\bar{l}}\lambda_l^{[2]}\cdot{}^{\bar{l}}\lambda_l^{[3]}\right)\right)$$

$$\phi_{l2}^{l1} = \operatorname{acos}\left(2\cdot\left({}^{\bar{l}}\lambda_l^{[4]:2} + {}^{\bar{l}}\lambda_l^{[3]:2}\right) - 1\right.$$

$$\phi_{l}^{l2} = \operatorname{atan}\left(2\cdot\left({}^{\bar{l}}\lambda_l^{[1]}\cdot{}^{\bar{l}}\lambda_l^{[3]} - {}^{\bar{l}}\lambda_l^{[4]}\cdot{}^{\bar{l}}\lambda_l^{[2]}\right)\right),\ 2\cdot\left({}^{\bar{l}}\lambda_l^{[2]}\cdot{}^{\bar{l}}\lambda_l^{[3]} + {}^{\bar{l}}\lambda_l^{[4]}\cdot{}^{\bar{l}}\lambda_l^{[1]}\right) \tag{2.158}$$

SOLUTION: the axial direction of the grasped workpiece is ${}^{\bar{l}}n_l$, and the rotation angle is $\phi_l^{\bar{l}}$. From Eq. (2.127), the Euler quaternion is $${}^{\bar{l}}\lambda_l = \left[S_l\cdot{}^{\bar{l}}n_l,\ C_l\right]^T.$$

From Eq. (2.131), so $${}^{\bar{l}}Q_l = \begin{bmatrix} 2\cdot\left(C_l^2 + {}^{\bar{l}}\lambda_l^{[1]:2}\right) - 1 & 2\cdot\left({}^{\bar{l}}\lambda_l^{[1]}\cdot{}^{\bar{l}}\lambda_l^{[2]} - C_l\cdot{}^{\bar{l}}\lambda_l^{[3]}\right) & 2\cdot\left({}^{\bar{l}}\lambda_l^{[1]}\cdot{}^{\bar{l}}\lambda_l^{[3]} + C_l\cdot{}^{\bar{l}}\lambda_l^{[2]}\right) \\ 2\cdot\left({}^{\bar{l}}\lambda_l^{[1]}\cdot{}^{\bar{l}}\lambda_l^{[2]} + C_l\cdot{}^{\bar{l}}\lambda_l^{[3]}\right) & 2\left(C_l^2 + {}^{\bar{l}}\lambda_l^{[2]:2}\right) - 1 & 2\cdot\left({}^{\bar{l}}\lambda_l^{[2]}\cdot{}^{\bar{l}}\lambda_l^{[3]} - C_l\cdot{}^{\bar{l}}\lambda_l^{[1]}\right) \\ 2\cdot\left({}^{\bar{l}}\lambda_l^{[1]}\cdot{}^{\bar{l}}\lambda_l^{[3]} - C_l\cdot{}^{\bar{l}}\lambda_l^{[2]}\right) & 2\cdot\left({}^{\bar{l}}\lambda_l^{[2]}\cdot{}^{\bar{l}}\lambda_l^{[3]} + C_l\cdot{}^{\bar{l}}\lambda_l^{[1]}\right) & 2\cdot\left(C_l^2 + {}^{\bar{l}}\lambda_l^{[3]:2}\right) - 1 \end{bmatrix}.$$

According to Eq. (2.147), then $$\phi_{l1}^{\bar{l}} = \operatorname{atan}\left(2\cdot\left({}^{\bar{l}}\lambda_l^{[1]}\cdot{}^{\bar{l}}\lambda_l^{[3]} + {}^{\bar{l}}\lambda_l^{[4]}\cdot{}^{\bar{l}}\lambda_l^{[2]}\right),\ 2\cdot\left({}^{\bar{l}}\lambda_l^{[2]}\cdot{}^{\bar{l}}\lambda_l^{[3]} - {}^{\bar{l}}\lambda_l^{[4]}\cdot{}^{\bar{l}}\lambda_l^{[1]}\right)\right)$$

$$\phi_{l2}^{l1} = \operatorname{acos}\left(2\cdot\left({}^{\bar{l}}\lambda_l^{[4]:2} + {}^{\bar{l}}\lambda_l^{[3]:2}\right) - 1\right).$$

$$\phi_{l}^{l2} = \operatorname{atan}\left(2\cdot\left({}^{\bar{l}}\lambda_l^{[1]}\cdot{}^{\bar{l}}\lambda_l^{[3]} - {}^{\bar{l}}\lambda_l^{[4]}\cdot{}^{\bar{l}}\lambda_l^{[2]}\right),\ 2\cdot\left({}^{\bar{l}}\lambda_l^{[2]}\cdot{}^{\bar{l}}\lambda_l^{[3]} + {}^{\bar{l}}\lambda_l^{[4]}\cdot{}^{\bar{l}}\lambda_l^{[1]}\right)\right)$$

So Eq. (2.158) is set.

Similarly, since ${}^{\bar{l}}n_l$ has a measurement error, in the process of calculating ${}^{\bar{l}}Q_l$ with Eq. (2.158), the quaternion is applied and "orthogonally normalized". ${}^{\bar{l}}Q_l$ is obtained after "unitization"; its accuracy is mainly determined by the word length of the computer, so it has very high accuracy.

3D Vector Spatial Operation Algebra of Derivatives

First, define the absolute derivative symbol:

$${}^{i|\bar{l}}r_l' \triangleq \frac{d}{dt}\left({}^{i|\bar{l}}r_l\right),\quad {}^{i|\bar{l}}r_l'' \triangleq \frac{d^2}{d^2t}\left({}^{i|\bar{l}}r_l\right)$$
$${}^{i|\bar{l}}\tilde{\phi}_l' \triangleq \frac{d}{dt}\left({}^{i|\bar{l}}\tilde{\phi}_l\right),\quad {}^{i|\bar{l}}\tilde{\phi}_l'' \triangleq \frac{d^2}{d^2t}\left({}^{i|\bar{l}}\tilde{\phi}_l\right). \tag{2.159}$$

From Eq. (2.159) we know that the symbols ⎵' and ⎵" have a lower priority than the projection symbol ${}^{l}\square$. The derivation calculation is called the absolute derivative, and the influence of the calculation of the base vector $e_{\bar{l}}$ relative to the inertial base vector $e_i$ is taken into account.

The relative derivative operator is $\dot{\square}$ a derived operator, and its priority is higher than the projection symbol ${}^{l}\square$, that is, the derivative calculation first and then the projection calculation. The absolute derivative $\square'$ is also a derived operator, and its priority is lower than the projection symbol ${}^{l}\square$, that is, the projection calculation first and then the derivative calculation.

[1] Angular Velocity Screw-Matrix

Since ${}^{\bar{l}}Q_l\cdot{}^{l}Q_{\bar{l}}=1$, then $${}^{\bar{l}}\dot{Q}_l\cdot{}^{l}Q_{\bar{l}} + {}^{\bar{l}}Q_l\cdot{}^{l}\dot{Q}_{\bar{l}} = 0, \tag{2.160}$$

i.e. ${}^{\bar{l}}\dot{Q}_l\cdot{}^{l}Q_{\bar{l}} = -{}^{\bar{l}}Q_l\cdot{}^{l}\dot{Q}_{\bar{l}}$. Obviously, ${}^{\bar{l}}\dot{Q}_l\cdot{}^{l}Q_{\bar{l}}$ and $-{}^{\bar{l}}Q_l\cdot{}^{l}\dot{Q}_{\bar{l}}$ are screw matrices mutually.

Substitute Eq. (2.66) into Eq. (2.160), therefore $${}^{\bar{l}}\dot{\tilde{Q}}_l = -{}^{\bar{l}}Q_l\cdot{}^{l}\dot{Q}_{\bar{l}} = {}^{\bar{l}}\dot{Q}_l\cdot{}^{l}Q_{\bar{l}}. \tag{2.161}$$

The angular velocity screw-matrix ${}^{\bar{l}}\dot{\tilde{\phi}}_l$ is a screw matrix. From Eqs. (2.66) and (2.161) we know that: the direction of the angular velocity is determined by the direction of the derived rotation matrix $${}^{\bar{l}}\dot{\phi}_l = \operatorname{Vector}\left({}^{\bar{l}}\dot{\tilde{\phi}}_l\right) = \operatorname{Vector}\left({}^{\bar{l}}\dot{Q}_l\cdot{}^{l}Q_{\bar{l}}\right). \tag{2.162}$$

Therefore, the rotational velocities ${}^{\bar{l}}\dot{\phi}_l$ and ${}^{l}\dot{\phi}_{\bar{l}}$ are vectors and additive. On the other hand, since $${}^{\bar{l}}\dot{Q}_l = \left[{}^{\bar{l}}\dot{Q}_l^{[x]}\ \ {}^{\bar{l}}\dot{Q}_l^{[y]}\ \ {}^{\bar{l}}\dot{Q}_l^{[z]}\right] = \left[{}^{\bar{l}}\dot{\tilde{\phi}}_l\cdot{}^{\bar{l}}Q_l^{[x]}\ \ {}^{\bar{l}}\dot{\tilde{\phi}}_l\cdot{}^{\bar{l}}Q_l^{[y]}\ \ {}^{\bar{l}}\dot{\tilde{\phi}}_l\cdot{}^{\bar{l}}Q_l^{[z]}\right] = {}^{\bar{l}}\dot{\tilde{\phi}}_l\cdot\left[{}^{\bar{l}}Q_l^{[x]}\ \ {}^{\bar{l}}Q_l^{[y]}\ \ {}^{\bar{l}}Q_l^{[z]}\right] = {}^{\bar{l}}\dot{\tilde{\phi}}_l\cdot{}^{\bar{l}}Q_l,$$

then $${}^{\bar{l}}\dot{Q}_l = {}^{\bar{l}}\dot{\tilde{\phi}}_l\cdot{}^{\bar{l}}Q_l.$$

Obviously, ${}^{\bar{l}}\dot{\phi}_l$ is the Axis-vector of ${}^{\bar{l}}\dot{\tilde{\phi}}_l$, i.e. there is $$ {}^{\bar{l}}\dot{\tilde{\phi}}_l \cdot {}^{\bar{l}|l}r_{l_s} = {}^{\bar{l}}\dot{\phi}_l \times {}^{\bar{l}|l}r_{l_s} $$

for any vector $$ {}^{\bar{l}}r_S \cdot {}^{\bar{l}|l}r_{l_s} \cdot {}^{\bar{l}}\dot{\tilde{\phi}}_l $$

is subject to the matrix calculation, and ${}^{\bar{l}}\dot{\phi}_l$ is subject to vector calculation. Similarly, ${}^{\bar{l}}\ddot{\phi}_l$ is also subject to vector calculation, i.e. ${}^{\bar{l}}\ddot{\phi}_l$ is a vector. So there is $$ {}^{\bar{l}|l}\dot{\phi}_l = {}^{\bar{l}}Q_{\bar{l}} \cdot {}^{\bar{l}}\dot{\phi}_l, \tag{2.163} $$

$$ {}^{\bar{l}|l}\ddot{\phi}_l = {}^{\bar{l}}Q_{\bar{l}} \cdot {}^{\bar{l}}\ddot{\phi}_l. \tag{2.164} $$

Similarly, $$ \begin{aligned} &{}^{l}\dot{\tilde{\phi}}_{\bar{l}} = {}^{l}\dot{Q}_{\bar{l}} \cdot {}^{\bar{l}}Q_l,\ {}^{l}\dot{\tilde{\phi}}_{\bar{l}} = -{}^{l}Q_{\bar{l}} \cdot {}^{\bar{l}}\dot{Q}_l \\ &{}^{l}\dot{\phi}_{\bar{l}} = \text{Vector}\left({}^{l}\dot{\tilde{\phi}}_{\bar{l}}\right) = \text{Vector}\left(-{}^{l}Q_{\bar{l}} \cdot {}^{\bar{l}}\dot{Q}_l\right) \end{aligned}. \tag{2.165} $$

The angular velocity screw-matrix ${}^{l}\dot{\tilde{\phi}}_{\bar{l}}$ is an screw matrix. Eqs. (2.168) and (2.169) are concise rigid-body velocity equations.

Since ${}^{l}\dot{\tilde{\phi}}_{\bar{l}} = -{}^{l}Q_{\bar{l}} {}^{\bar{l}}\dot{Q}_l$ and ${}^{\bar{l}}\dot{\tilde{\phi}}_l = {}^{\bar{l}}\dot{Q}_l \cdot {}^{l}Q_{\bar{l}}$; then $$ \begin{aligned} &{}^{l}\dot{\tilde{\phi}}_{\bar{l}} = -{}^{l}Q_{\bar{l}} \cdot {}^{\bar{l}}\dot{\tilde{\phi}}_l \cdot {}^{\bar{l}}Q_l \\ &{}^{\bar{l}}\dot{\tilde{\phi}}_l = -{}^{\bar{l}}Q_l \cdot {}^{l}\dot{\tilde{\phi}}_{\bar{l}} \cdot {}^{l}Q_{\bar{l}} \end{aligned}. \tag{2.166} $$

From Eq. (2.166) we know that the angular velocity screw-matrix is a 2nd-Order invariant, ${}^{l}\dot{\tilde{\phi}}_{\bar{l}}$ and ${}^{\bar{l}}\dot{\tilde{\phi}}_l$ are subject to the similar transformation.

[2] Absolute Derivative

The chain ${}^{\bar{l}}\mathbf{l}_l$ is given, is $l_S$ a point in the l system which is in the same direction as the $\bar{l}$ system in the initial time direction, and the attitude of the l system relative to the $\bar{l}$ system after time t is recorded as ${}^{\bar{l}}Q_l$. Obviously, ${}^{\bar{l}}Q_l$ is a function of time t, and the position vector ${}^{l}r_{l_s}$ rotates to the position vector ${}^{\bar{l}}r_{l_s}$ infinitely after an infinitely small time interval. Then $$ {}^{\bar{l}}r_s \cdot {}^{\bar{l}}r_l + {}^{\bar{l}|l}r_{l_s}. \tag{2.167} $$

Eq. (2.167) is the kinematic equation of the AC ${}^{\bar{l}}\mathbf{l}_{l_s}$, take its derivative to obtain $$ {}^{\bar{l}}\dot{r}_{l_s} = {}^{\bar{l}}\dot{r}_l + {}^{\bar{l}}\dot{Q}_l \cdot {}^{l}r_{l_s} + {}^{\bar{l}}Q_l \cdot {}^{l}\dot{r}_{l_s}. \tag{2.168} $$

Consider Eqs. (2.161) and (2.168), then obtain the velocity formula of the AC ${}^{\bar{l}}\mathbf{l}_{l_s}$:

$$ {}^{\bar{l}}\dot{r}_{l_s} = {}^{\bar{l}}\dot{r}_l + {}^{\bar{l}|l}\dot{r}_{l_s} + {}^{\bar{l}}\dot{\tilde{\phi}}_l \cdot {}^{\bar{l}|l}r_{l_s}. \tag{2.169} $$

From the partial order of the AC, we know that the rotation of link l and ${}^{l}$L are implicated. Therefore, the $$ {}^{\bar{l}}\dot{\tilde{\phi}}_l \cdot {}^{\bar{l}|l}r_{l_s} $$

chain index meets chain index offset law.

If ${}^{l}r_{l_s}$ is a constant, i.e.

$$ {}^{l}r_{l_s} = {}^{l}r_{l_s}, $$

then $$ {}^{\bar{l}}\dot{r}_{l_s} = {}^{\bar{l}}\dot{r}_l + {}^{\bar{l}}\dot{\tilde{\phi}}_l \cdot {}^{\bar{l}|l}r_{l_s}. \tag{2.170} $$

If ${}^{\bar{l}}\dot{r}_l = 0_3$, i.e. there is no translation velocity, Eq. (2.169) results in $$ {}^{\bar{l}}\dot{r}_{l_s} = {}^{\bar{l}|l}\dot{r}_{l_s} + {}^{\bar{l}}\dot{\tilde{\phi}}_l \cdot {}^{\bar{l}|l}r_{l_s}. \tag{2.171} $$

Compare the chain index relationship between Eqs. (2.167) and (2.169), so that $$ {}^{\bar{l}|l}r'_{l_S} \triangleq {}^{\bar{l}}\dot{\tilde{\phi}}_l \cdot {}^{\bar{l}|l}r_{l_S} + {}^{\bar{l}|l}\dot{r}_{l_S}. \tag{2.172} $$

Then Eq. (2.169) is expressed as $$ {}^{\bar{l}}r'_{l_S} \triangleq {}^{\bar{l}}\dot{r}_{l_S} = {}^{\bar{l}}\dot{r}_l + {}^{\bar{l}|l}r'_{l_S} = {}^{\bar{l}}\dot{r}_l + {}^{\bar{l}}\dot{\tilde{\phi}}_l \cdot {}^{\bar{l}|l}r_{l_S} + {}^{\bar{l}|l}\dot{r}_{l_S}, \tag{2.173} $$

Eq. (2.172) meets CO invariance, and ${}^{\bar{l}}\dot{r}_{l_s}$ is a vector and additive.

The ${}^{\bar{l}|l}r'_{l_s}$ in Eq. (2.172) is called the forward absolute derivative, because ${}^{\bar{l}}\dot{\tilde{\phi}}_l$ in Eq. (2.172) meets the forward CO and is same as the order of Projection Frame $\bar{l}$ of ${}^{\bar{l}|l}\|'$ to Measurement Frame l.

According to Eqs. (2.169) and (2.166), then $$ {}^{l|\bar{l}}\dot{r}_{l_s} = {}^{l|\bar{l}}\dot{r}_l - {}^{l}\dot{\tilde{\phi}}_{\bar{l}} \cdot {}^{l}r_{l_s} + {}^{l}\dot{r}_{l_s}. \tag{2.174} $$

Similarly, define ${}^{l}r'_{l_s|\bar{l}}$ $$ \frac{{}^{\bar{l}}d}{dl}\left({}^{l}r_{l_S}\right) = {}^{l}r'_{l_S|\bar{l}} \triangleq -{}^{l}\dot{\tilde{\phi}}_{\bar{l}} \cdot {}^{l}r_{l_S} + {}^{l}\dot{r}_{l_S}. \tag{2.175} $$

Then Eq. (2.174) is expressed as $$ {}^{l|\bar{l}}r'_{l_S|\bar{l}} \triangleq {}^{l|\bar{l}}\dot{r}_{l_S} = {}^{l|\bar{l}}\dot{r}_l + {}^{l}r'_{l_S|\bar{l}} = {}^{l|\bar{l}}\dot{r}_l - {}^{l}\dot{\tilde{\phi}}_{\bar{l}} \cdot {}^{l}r_{l_S} + {}^{l}\dot{r}_{l_S}. \tag{2.176} $$

Eq. (2.176) meets the CO invariance, and ${}^{l|\bar{l}}\dot{r}_{l_s}$ is a vector and additive. The ${}^{l}r'_{l_s|\bar{l}}$ in Eq. (2.175) is called the backward absolute derivative, because ${}^{l}\dot{\tilde{\phi}}_{\bar{l}}$ in Eq. (2.175) meets the backward CO, and its order is the same as ${}^{l}\square_{|l'}$ from measurement frame $l$ to Frame $\bar{l}$. Obviously, Eqs. (2.172) and (2.173), absolute derivative with forward CO, are easier to use, and the default absolute derivation always derives Projection Frames. Eqs. (2.175) and (2.176), absolute derivative with backward CO, require to specify the derivative reference frame at the lower right corner. The absolute derivative of backward CO is lessly used, is not as straightforward as that of backward CO. From Eq. (2.173), then $$ {}^{\bar{l}}\dot{r}l = {}^{\bar{l}}\dot{r}\bar{l} + {}^{\bar{l}}\dot{\tilde{\phi}}_{\bar{l}} \cdot {}^{\bar{l}|\bar{l}}r_{l} + {}^{\bar{l}}\dot{r}_{l}. \quad (2.177)$$

From Eq. (2.176), then $$ {}^{\bar{l}|\bar{l}}\dot{r}_{l} = {}^{\bar{l}|\bar{l}}\dot{r}_{\bar{l}} - {}^{\bar{l}}\dot{\tilde{\phi}}_{\bar{l}} \cdot {}^{\bar{l}}r_{l} + {}^{\bar{l}}\dot{r}_{l}. \quad (2.178)$$

Absolute Derivative of the Base

[1]. Absolute Derivative of Bases

If according to the attitude ${}^{\bar{l}}Q_{l}$ from the base $e_{\bar{l}}$ to the kinematic base $e_{l}$, the absolute derivative ${}^{i|}\square'$ shows absolute derivative of the projection frame i, then $$ {}^{i|}e_{l}' = e_{i} \cdot {}^{i}\dot{\tilde{\phi}}_{l}. \quad (2.179)$$

PROOF: Convert the reference index of the derived item into the reference index of the derivative time. For any finite-length vector ${}^{l}r_{l_s}$, consider Eq. (2.172), then $$\begin{aligned} \frac{{}^{i}d}{dt}\left(e_i \cdot {}^{i|l}r_{l_S}\right) &= \frac{{}^{i}d}{dt}(e_i) \cdot {}^{i|l}r_{l_S} + e_i \cdot \frac{{}^{i}d}{dt}\left({}^{i|l}r_{l_S}\right) = e_i \cdot {}^{i|l}r'_{l_S} \\ &= e_i \cdot \left({}^{i}\dot{\tilde{\phi}}_l \cdot {}^{i|l}r_{l_S} + {}^{i|l}\dot{r}_{l_S}\right) \\ &= e_i \cdot {}^{i}\dot{\tilde{\phi}}_l \cdot {}^{i|l}r_{l_S} + e_i \cdot {}^{i|l}\dot{r}_{l_S}, \end{aligned}$$

i.e.

$$ \frac{{}^{i}d}{dt}\left(e_i \cdot {}^{i|l}r_{l_S}\right) = e_i \cdot {}^{i}\dot{\tilde{\phi}}_l \cdot {}^{i|l}r_{l_S} + e_i \cdot {}^{i|l}\dot{r}_{l_S}. \quad (2.180)$$

On the other hand, $$ \frac{{}^{i}d}{dt}\left(e_l \cdot {}^{l}r_{l_S}\right) = {}^{i|}e_l \cdot {}^{l}r_{l_S} + e_i \cdot {}^{i|l}\dot{r}_{l_S}. \quad (2.181)$$

According to the vector absolute derivative invariance, then $$ \frac{{}^{i}d}{dt}\left(e_i \cdot {}^{i|l}r_{l_S}\right) = \frac{{}^{i}d}{dt}\left(e_l \cdot {}^{l}r_{l_S}\right). \quad (2.182)$$

From Eqs. (2.180), (2.181) and (2.182), obtain Eq. (2.179). Q.E.D.

Eq. (2.179) has the following characteristics:

[1] Meets chain index offset law.

[2] ${}^{i}\dot{\tilde{\phi}}_{l}$ is the angular velocity screw-matrix of frame l with respect to frame i.

[3] The derivation results of ${}^{i|}e_{l}'$ refers to frame i.

Similarly $$ e_{l|i}' = -e_{l} \cdot {}^{l}\dot{\tilde{\phi}}_{i}. \quad (2.183)$$

PROOF: Convert the reference index of the derived item into the reference index of derivative time. For any finite-length fixed vector or orientational vector ${}^{l}r_{l_S}$ consider Eq. (2.175), then $$\begin{aligned} \frac{{}^{i}d}{dt}\left(e_i \cdot {}^{i|l}r_{l_S}\right) &= \frac{{}^{i}d}{dt}(e_i) \cdot {}^{i|l}r_{l_S} + e_l \cdot \frac{{}^{i}d}{dt}\left({}^{l}r_{l_S}\right) = e_l \cdot {}^{l}r'_{l_S|i} \\ &= e_l \cdot \left(-{}^{l}\dot{\tilde{\phi}}_i \cdot {}^{l}r_{l_S} + {}^{l}\dot{r}_{l_S}\right) \\ &= -e_l \cdot {}^{l}\dot{\tilde{\phi}}_i \cdot {}^{l}r_{l_S} + e_l \cdot {}^{l}\dot{r}_{l_S}, \end{aligned}$$

i.e.

$$ \frac{{}^{i}d}{dt}\left(e_i \cdot {}^{i|l}r_{l_S}\right) = -e_l \cdot {}^{l}\dot{\tilde{\phi}}_i \cdot {}^{l}r_{l_S} + e_l \cdot {}^{l}\dot{r}_{l_S}. \quad (2.184)$$

On the other hand, $$ \frac{{}^{i}d}{dt}\left(e_l \cdot {}^{l}r_{l_S}\right) = \frac{{}^{i}d}{dt}(e_l) \cdot {}^{l}r_{l_S} + e_i \cdot \frac{{}^{i}d}{dt}\left({}^{i|l}r_{l_S}\right) = e'_{l|i} \cdot {}^{l}r_{l_S} + e_l \cdot {}^{l}\dot{r}_{l_S}. \quad (2.185)$$

According to the vector absolute derivative invariance, then $$ \frac{{}^{i}d}{dt}\left(e_i \cdot {}^{i|l}r_{l_S}\right) = \frac{{}^{i}d}{dt}\left(e_l \cdot {}^{l}r_{l_S}\right). \quad (2.186)$$

From Eqs. (2.184), (2.185) and (2.186), obtain Eq. (2.183). Q.E.D.

[2]. Absolute Derivative Formula

From Eq. (2.180), then $$ \frac{{}^{i}d}{dt}\left({}^{l}r_{l_S}\right) = {}^{i|l}r'_{l_S} = {}^{i}\dot{\tilde{\phi}}_l \cdot {}^{i|l}r_{l_S} + {}^{i|l}\dot{r}_{l_S}. \quad (2.187)$$

Eq. (2.187) is called Forward Absolute Derivative Formula and has the following characteristics:

[1] It is different from the relative derivation in that the implicated item $$ {}^{i}\dot{\tilde{\phi}}_l \cdot {}^{i|l}\dot{r}_{l_S} $$

is added.

[2] All sum items and product items meet chain index offset law.

[3] ${}^{i}\dot{\tilde{\phi}}_{l}$ is an angular velocity screw-matrix of frame l with respect to frame i.

[4] The ${}^{i|l}r_{l_s}'$ results refer to projection frame i, and the projection reference frames of all sum items are consistent.

From Eq. (2.184), then $$ \frac{{}^{i}d}{dt}\left({}^{l}r_{l_S}\right) = {}^{l}r'_{l_S|i} = -{}^{l}\dot{\tilde{\phi}}_i \cdot {}^{l}r_{l_S} + {}^{l}\dot{r}_{l_S}. \quad (2.188)$$

Eq. (2.188) is called backward absolute derivative formula and has the following characteristics:

[1] It is different from the relative derivation in that the implicated item $$ -{}^{l}\dot{\tilde{\phi}}_i \cdot {}^{l}r_{l_s} $$

is added.

[2] All sum items and product items meet the chain index offset law.

[3] ${}^{l}\tilde{\dot{\phi}}_{i}$ is an angular velocity screw-matrix of measurement frame l to the absolute derivative frame i.

[4] The ${}^{l}r_{l_S l i}{}'$ results refer to measurement frame l, and the projection reference frames of all sum items are consistent.

From Eq. (2.161), obtain $${}^{i}\dot{\tilde{\phi}}_{l} - {}^{i}\dot{\tilde{\phi}}_{\bar{l}} = {}^{i}\tilde{\phi}'_{l} - {}^{i}\tilde{\phi}'_{\bar{l}} = \left({}^{i}\dot{Q}_{\bar{l}}\cdot{}^{\bar{l}}Q_{l} + {}^{i}Q_{\bar{l}}\cdot{}^{\bar{l}}\dot{Q}_{l}\right)\cdot{}^{l}Q_{\bar{l}}\cdot{}^{\bar{l}}Q_{i} - {}^{i}\dot{Q}_{\bar{l}}\cdot{}^{\bar{l}}Q_{i} =$$

$$\left({}^{i}Q_{\bar{l}}\cdot{}^{\bar{l}}\dot{Q}_{l}\cdot{}^{l}Q_{l}\right)\cdot{}^{\bar{l}}Q_{i} = {}^{i}Q_{\bar{l}} - {}^{\bar{l}}\dot{\tilde{\phi}}_{l}\cdot{}^{\bar{l}}Q_{i} = {}^{i|\bar{l}}\dot{\tilde{\phi}}_{l},$$

$${}^{i|\bar{l}}\phi'_{l} \triangleq \mathrm{Vector}\left({}^{i|\bar{l}}\dot{\tilde{\phi}}_{l}\right) - {}^{i}\dot{\phi}_{l} - {}^{i}\dot{\phi}_{\bar{l}} - {}^{i|\bar{l}}\dot{\phi}_{l}.$$

So $${}^{i|\bar{l}}\phi'_{l} = {}^{i|\bar{l}}\dot{\phi}_{l} = {}^{i}\dot{\phi}_{l} - {}^{i}\dot{\phi}_{\bar{l}} = {}^{i|\bar{l}}n_{l}\cdot\dot{\phi}^{\bar{l}}_{l}. \tag{2.189}$$

Eq. (2.189) shows that the absolute angular velocity is equivalent to the relative angular velocity.

EXAMPLE 2.9. Given ${}^{i}L_{II} = {}^{i|II}J_{II}\cdot{}^{i}\dot{\phi}_{l}$, then $${}^{i}\dot{L}_{II} = {}^{i|II}J_{II}\cdot{}^{i}\ddot{\phi}_{i} - {}^{i}\dot{\tilde{\phi}}_{l}\cdot{}^{i|II}J_{II}\cdot{}^{i}\dot{\phi}_{l}. \tag{2.190}$$

PROOF: Eq. (2.187) is applied to obtain $${}^{i}\dot{L}_{II} = \frac{{}^{i}d}{dt}\left({}^{i|II}J_{II}\cdot{}^{i}\dot{\phi}_{l}\right) = {}^{i|II}J_{II}\cdot{}^{i}\ddot{\phi}_{l}\cdot{}^{i}\dot{\tilde{\phi}}_{l}\cdot{}^{i|II}J_{II}\cdot{}^{i}\dot{\phi}_{l}.$$

Q.E.D.

Eq. (2.190) is the famous Euler equation. The equation is equivalent to (2.191), $${}_{l|i}\dot{L}_{II} = -{}^{II}J_{II}\cdot{}^{l}\ddot{\phi}_{i} + {}^{l}\dot{\tilde{\phi}}_{i}\cdot{}^{II}J_{II}\cdot{}^{l}\dot{\phi}_{i}. \tag{2.191}$$

PROOF 1: From Eq. (2.190), then $$\begin{aligned}{}^{l|i}\dot{L}_{II} &= {}^{l}Q_{i}\cdot{}^{i|II}J_{II}\cdot{}^{i}Q_{l}\cdot{}^{l}Q_{i}\cdot{}^{i}\ddot{\phi}_{l}\\ &\backslash+{}^{l}Q_{i}\cdot{}^{i}\dot{\tilde{\phi}}_{l}\cdot{}^{i}Q_{l}\cdot{}^{l}Q_{i}\cdot{}^{i|II}J_{II}\cdot{}^{i}Q_{l}\cdot{}^{l}Q_{i}\cdot{}^{i}\dot{\phi}_{l}\end{aligned}.$$

So $$\begin{aligned}{}^{l|i}\dot{L}_{II} &= {}^{l}Q_{i}\cdot{}^{i|II}J_{II}\cdot{}^{i}Q_{l}\cdot{}^{l}Q_{i}\cdot{}^{i}\ddot{\phi}_{l}\\ &\backslash+{}^{l}Q_{i}\cdot{}^{i}\dot{\tilde{\phi}}_{l}\cdot{}^{i}Q_{l}\cdot{}^{l}Q_{i}\cdot{}^{i|II}J_{II}\cdot{}^{i}Q_{l}\cdot{}^{l}Q_{i}\cdot{}^{i}\dot{\phi}_{l}.\\ &= -{}^{II}J_{II}\cdot{}^{l}\ddot{\phi}_{i} + {}^{l}\dot{\tilde{\phi}}_{i}\cdot{}^{II}J_{II}\cdot{}^{l}\dot{\phi}_{i}\end{aligned}$$

PROOF 2: Since ${}^{l|i}L_{II} = -{}^{II}J_{II}\cdot{}^{l}\dot{\phi}_{i}$, Eq. (2.188) is applied to obtain $${}^{l|i}L'_{II} = -{}^{II}J_{II}\cdot{}^{l}\ddot{\phi}_{i} - {}^{l}\dot{\tilde{\phi}}_{i}\cdot\left(-{}^{II}J_{II}\cdot{}^{l}\dot{\phi}_{i}\right) = -{}^{II}J_{II}\cdot{}^{l}\ddot{\phi}_{i}\cdot{}^{l}\dot{\tilde{\phi}}_{i}\cdot{}^{II}J_{II}\cdot{}^{l}\dot{\phi}_{i}.$$

Q.E.D.

Eq. (2.191) is relative space Euler equation, and Eq. (2.190) is called absolute space Euler equation. Although Eq. (2.190) is equivalent to Eq. (2.191), this equivalence is set based on the ideal conditions for noise-free motion. In engineering, they are distinguished in that the relative space Euler equation does not need the relative absolute space attitude ${}^{i}\dot{\tilde{\phi}}_{l}$, which can be measured directly by the rate gyroscope and other inertial devices. The absolute space Euler equation requires the rotation matrix ${}^{i}Q_{l}$ of relative absolute space, while ${}^{i}Q_{l}$ contains measurement noise.

Acceleration

From Eq. (2.169) we know $${}^{\bar{l}}\dot{r}_{l_S} = {}^{\bar{l}}\dot{r}_{l} + {}^{\bar{l}}\dot{\tilde{\phi}}_{l}\cdot{}^{\bar{l}|l}r_{l_S} + {}^{\bar{l}|l}\dot{r}_{l_S}$$

and its relative derivation is as follows $$\begin{aligned}{}^{\bar{l}}\ddot{r}_{l_S} &= \frac{{}^{\bar{l}}d}{dt}\left({}^{\bar{l}}\dot{r}_{l} + {}^{\bar{l}}\dot{\tilde{\phi}}_{l}\cdot{}^{\bar{l}|l}r_{l_S} + {}^{\bar{l}|l}\dot{r}_{l_S}\right)\\ &= \frac{{}^{\bar{l}}d}{dt}\left({}^{\bar{l}}\dot{r}_{l}\right) + \frac{{}^{\bar{l}}d}{dt}\left({}^{\bar{l}}\dot{\tilde{\phi}}_{l}\cdot{}^{\bar{l}|l}r_{l_S}\right) + \frac{{}^{\bar{l}}d}{dt}\left({}^{\bar{l}|l}\dot{r}_{l_S}\right)\\ &= {}^{\bar{l}}\ddot{r}_{l_S} + \left({}^{\bar{l}}\ddot{\tilde{\phi}}_{l}\cdot{}^{\bar{l}|l}r_{l_S} + {}^{\bar{l}}\dot{\tilde{\phi}}_{l}\cdot{}^{\bar{l}|l}\dot{r}_{l_S}\cdot{}^{\bar{l}}\dot{\tilde{\phi}}_{l}\cdot{}^{\bar{l}}\dot{\tilde{\phi}}_{l}\cdot{}^{\bar{l}|l}r_{l_S}\right) + \left({}^{\bar{l}|l}\ddot{r}_{l_S} + {}^{\bar{l}}\dot{\tilde{\phi}}_{l}\cdot{}^{\bar{l}|l}\dot{r}_{l_S}\right)\\ &= {}^{\bar{l}}\ddot{r}_{l_S} + {}^{\bar{l}}Q_{l}\cdot{}^{l}\ddot{r}_{l_S} + {}^{\bar{l}}\ddot{\tilde{\phi}}_{l}\cdot{}^{\bar{l}|l}r_{l_S} + {}^{\bar{l}}\dot{\tilde{\phi}}_{l}^{:2}\cdot{}^{\bar{l}|l}r_{l_S} + 2\cdot{}^{\bar{l}}\dot{\tilde{\phi}}_{l}\cdot{}^{\bar{l}|l}\dot{r}_{l_S}\end{aligned},$$

i.e.

$${}^{\bar{l}}\ddot{r}_{l_S} = {}^{\bar{l}}\ddot{r}_{l_S} + {}^{\bar{l}}Q_{l}\cdot{}^{l}\ddot{r}_{l_S} + \left({}^{\bar{l}}\ddot{\tilde{\phi}}_{l} + {}^{\bar{l}}\dot{\tilde{\phi}}_{l}^{:2}\right)\cdot{}^{\bar{l}|l}r_{l_S} + 2\cdot{}^{\bar{l}}\dot{\tilde{\phi}}_{l}\cdot{}^{\bar{l}|l}\dot{r}_{l_S}, \tag{2.192}$$

wherein ${}^{\bar{l}}\ddot{r}_{l}$ and ${}^{\bar{l}|l}\ddot{r}_{l_S}$-translation acceleration;

$$\left({}^{\bar{l}}\ddot{\tilde{\phi}}_{l} + {}^{\bar{l}}\dot{\tilde{\phi}}_{l}^{:2}\right)\cdot{}^{\bar{l}|l}r_{l_S}$$

rotation acceleration, where $$\left({}^{\bar{l}}\ddot{\tilde{\phi}}_{l} + {}^{\bar{l}}\dot{\tilde{\phi}}_{l}^{:2}\right)$$

is centripetal acceleration; $2\cdot{}^{l}\dot{\tilde{\phi}}_{l_S}$—Coriolis acceleration, it is the coupled acceleration of translation and rotation.

From Eq. (2.192) we know that the translation acceleration ${}^{\bar{l}}\ddot{r}_{l_S}$ is a vector and additive. Based on the partial order of ACs, the root rotation and the vane translation are implicated. Therefore, $${}^{\bar{l}}\dot{\tilde{\phi}}_{l}\cdot{}^{\bar{l}|l}r_{l_S}$$

and $$\left({}^{\bar{l}}\ddot{\tilde{\phi}}_{l}\cdot{}^{\bar{l}}\dot{\tilde{\phi}}_{l}^{:2}\right)\cdot{}^{\bar{l}|l}r_{l_S}$$

chain index meets the chain index offset law. The angular acceleration is ${}^{\bar{l}}\Psi_l$, therefore $$ {}^{\bar{l}}\Psi_l = {}^{\bar{l}}\ddot{\tilde{\phi}}_l + {}^{\bar{l}}\dot{\tilde{\phi}}_l^{:2}, \tag{2.193}$$

wherein ${}^{\bar{l}}\ddot{\tilde{\phi}}_l$ is screw matrix, and ${}^{\bar{l}}\dot{\tilde{\phi}}_l^{:2}$ is a symmetrical matrix. From Eq. (2.193), then $$ \mathrm{Vector}({}^{i|\bar{l}}\Psi_l) = \mathrm{Vector}\left({}^{i|\bar{l}}\ddot{\tilde{\phi}}_l + {}^{i|\bar{l}}\dot{\tilde{\phi}}_l^{:2}\right) = \mathrm{Vector}\left({}^{i|\bar{l}}\ddot{\tilde{\phi}}_l\right) = {}^{i|\bar{l}}\ddot{\phi}_l. \tag{2.194}$$

From Eq. (2.194) we know that the angular acceleration ${}^{\bar{l}}\Psi_l$ is a vector and additive. At the same time, $$ \begin{aligned} \mathrm{Trace}\left({}^{\bar{l}}\Psi_l\right) &= \mathrm{Trace}\left({}^{\bar{l}}\ddot{\tilde{\phi}}_l + {}^{\bar{l}}\dot{\tilde{\phi}}_l^{:2}\right) = \mathrm{Trace}\left({}^{\bar{l}}\dot{\tilde{\phi}}_l^{:2}\right) \\ &= \mathrm{Trace}\left(-\left|\dot{\phi}_l^{\bar{l}}\right|^2 \cdot 1 + {}^{\bar{l}}\dot{\phi}_l \cdot {}^{\bar{l}}\dot{\phi}_l^T\right) \\ &= -\left|\dot{\phi}_l^{\bar{l}}\right|^2 \cdot \mathrm{Trace}(1) + \mathrm{Trace}\left({}^{\bar{l}}\dot{\phi}_l \cdot {}^{\bar{l}}\dot{\phi}_l^T\right) = -2 \cdot \left|\dot{\phi}_l^{\bar{l}}\right|^2 \end{aligned} $$

therefore $$ {}^{i|\bar{l}}\phi_l'' = {}^{i|\bar{l}}\ddot{\phi}_l = {}^{i}\ddot{\phi}_l - {}^{i}\ddot{\phi}_{\bar{l}} = {}^{i|\bar{l}}n_l \cdot \ddot{\phi}_l^{\bar{l}}. \tag{2.195}$$

Eq. (2.189) shows that the absolute angular acceleration is equivalent to the relative angular acceleration. Contrasting Eq. (2.189) and Eq. (2.195), we know that the absolute derivative and relative derivative of rotation vector ${}^{i|\bar{l}}n_l$ are equal.

Second Derivative of DCMs

Eq. (2.66) results in $$ {}^{\bar{l}}\dot{\tilde{\phi}}_l = {}^{\bar{l}}\dot{Q}_l \cdot {}^{l}Q_{\bar{l}}, {}^{\bar{l}}\dot{\tilde{\phi}}_l \cdot {}^{\bar{l}}Q_l = {}^{\bar{l}}\dot{Q}_l. \tag{2.196}$$

Or $$ {}^{\bar{l}}\dot{\tilde{\phi}}_l = {}^{\bar{l}}Q_l \cdot {}^{l}\dot{Q}_{\bar{l}}, -{}^{l}Q_{\bar{l}} \cdot {}^{\bar{l}}\dot{\tilde{\phi}}_l = {}^{l}\dot{Q}_{\bar{l}}. \tag{2.197}$$

From Eq. (2.197), then $$ {}^{l}\ddot{Q}_{\bar{l}} = -{}^{l}\dot{Q}_{\bar{l}} \cdot {}^{\bar{l}}\dot{\tilde{\phi}}_l - {}^{l}Q_{\bar{l}} \cdot {}^{\bar{l}}\ddot{\tilde{\phi}}_l $$

$$ = {}^{l}Q_{\bar{l}} \cdot {}^{\bar{l}}\dot{\tilde{\phi}}_l \cdot {}^{\bar{l}}\dot{\tilde{\phi}}_l - {}^{l}Q_{\bar{l}} \cdot {}^{\bar{l}}\ddot{\tilde{\phi}}_l. $$

$$ = {}^{l}\dot{\tilde{\phi}}_{\bar{l}}^{:2} \cdot {}^{\bar{l}}Q_l + {}^{l}\ddot{\tilde{\phi}}_{\bar{l}} \cdot {}^{\bar{l}}Q_l $$

Therefore $$ {}^{l}\ddot{Q}_{\bar{l}} = ({}^{l}\dot{\tilde{\phi}}_{\bar{l}}^{:2} + {}^{l}\ddot{\tilde{\phi}}_{\bar{l}}) \cdot {}^{\bar{l}}Q_l, \tag{2.198}$$

$$ {}^{\bar{l}}\ddot{Q}_l = {}^{l}Q_{\bar{l}} \cdot ({}^{l}\dot{\tilde{\phi}}_{\bar{l}}^{:2} - {}^{l}\ddot{\tilde{\phi}}_{\bar{l}}). \tag{2.199}$$

Contrasting Eq. (2.161) and Eq. (2.198) or Eq. (2.199), we know that the first derivative ${}^{\bar{l}}\dot{Q}_l$ and the second derivative ${}^{\bar{l}}\ddot{Q}_l$ of DCM represent first moment of angular velocity ${}^{\bar{l}}\dot{\tilde{\phi}}_l$ and first moment of angular acceleration ${}^{\bar{l}}\Psi_{\bar{l}}$.

Homogeneous Velocity and Velocity Transformation

The AC ${}^{\bar{l}}\mathbf{l}_l$ is given, the ${}^{\bar{l}}\overline{r}_{lS}{}_{l_S}$ and ${}^{l}\overline{r}_{lS}{}_{l_S}$ are the homogeneous coordinates, and $$ {}^{\bar{l}}\dot{r}_{l_S} = \begin{bmatrix} {}^{\bar{l}}\dot{r}_{l_S} \\ 0 \end{bmatrix}, {}^{\bar{l}|l}r_{l_S} = \begin{bmatrix} {}^{\bar{l}}r_{l_S} \\ 1 \end{bmatrix}. $$

Then $$ {}^{\bar{l}}\dot{r}_{l_S} = {}^{\bar{l}}\dot{R}_l \cdot {}^{l}r_{l_S} + {}^{\bar{l}|l}\dot{r}_{l_S}, \tag{2.200}$$

wherein $$ {}^{\bar{l}}\dot{R}_l = \begin{bmatrix} {}^{\bar{l}}\dot{Q}_l & {}^{\bar{l}}\dot{r}_l \\ 0_3^T & 0 \end{bmatrix} = \begin{bmatrix} {}^{\bar{l}}\dot{\tilde{\phi}}_l \cdot {}^{\bar{l}}Q_l & {}^{\bar{l}}\dot{r}_l \\ 0_3^T & 0 \end{bmatrix}. \tag{2.201}$$

PROOF:

$$ \begin{aligned} {}^{\bar{l}}\dot{r}_{l_S} &= {}^{\bar{l}}\dot{R}_l \cdot {}^{l}r_{l_S} + {}^{\bar{l}}R_l \cdot {}^{l}\dot{r}_{l_S} = {}^{\bar{l}}\dot{R}_l \cdot {}^{l}r_{l_S} + \begin{bmatrix} {}^{\bar{l}}Q_l & {}^{\bar{l}}r_l \\ 0_3^T & 1 \end{bmatrix} \cdot \begin{bmatrix} {}^{l}\dot{r}_{l_S} \\ 0 \end{bmatrix} \\ &= \begin{bmatrix} {}^{\bar{l}}\dot{Q}_l & {}^{\bar{l}}\dot{r}_l \\ 0_3^T & 0 \end{bmatrix} \cdot {}^{l}r_{l_S} + \begin{bmatrix} {}^{\bar{l}|l}\dot{r}_{l_S} \\ 0 \end{bmatrix} = \begin{bmatrix} {}^{\bar{l}}\dot{\tilde{\phi}}_l \cdot {}^{\bar{l}}Q_l & {}^{\bar{l}}\dot{r}_l \\ 0_3^T & 0 \end{bmatrix} \cdot {}^{l}r_{l_S} + \begin{bmatrix} {}^{\bar{l}|l}\dot{r}_{l_S} \\ 0 \end{bmatrix}. \\ &= {}^{\bar{l}}\dot{R}_l \cdot {}^{l}r_{l_S} + {}^{\bar{l}|l}\dot{r}_{l_S} \end{aligned} $$

Q.E.D.

Euler Quaternion Differentiation Based on Axis-Invariant

Euler Quaternion Differential Equation

From Eq. (2.32) we know that $$ \left|\lambda_l^{\bar{l}}\right|^2 \cdot 1 = {}^{\bar{l}}\lambda_l \cdot {}^{\bar{l}}\lambda_l^T - {}^{\bar{l}}\tilde{\lambda}_l^{:2}. \tag{2.202}$$

According to Eqs. (2.12) and (2.13), then $$ {}^{\bar{l}}\dot{\tilde{\lambda}}_l \cdot {}^{\bar{l}}\tilde{\lambda}_l - {}^{\bar{l}}\tilde{\lambda}_l \cdot {}^{\bar{l}}\dot{\tilde{\lambda}}_l = {}^{\bar{l}}\dot{\tilde{\lambda}}_l \cdot \tilde{{}^{\bar{l}}\lambda_l}. \tag{2.203}$$

The right hand (RH) order matrix ${}^{\bar{l}}\tilde{\underset{\rightharpoonup}{\lambda}}$ and the left hand (LH) order matrix ${}^{\bar{l}}\tilde{\underset{\leftharpoonup}{\lambda}}$ are defined respectively:

$$ {}^{\bar{l}}\tilde{\underset{\rightharpoonup}{\lambda}}_l \triangleq \begin{bmatrix} {}^{\bar{l}}\lambda_l^{[4]} \cdot 1 + {}^{\bar{l}}\tilde{\lambda}_l \\ -{}^{\bar{l}}\lambda_l^T \end{bmatrix}, {}^{\bar{l}}\tilde{\underset{\leftharpoonup}{\lambda}}_l \triangleq \begin{bmatrix} {}^{\bar{l}}\lambda_l^{[4]} \cdot 1 - {}^{\bar{l}}\tilde{\lambda}_l \\ {}^{\bar{l}}\lambda_l^T \end{bmatrix}. \tag{2.204}$$

So $$ {}^{\bar{l}}\tilde{\underset{\rightharpoonup}{\lambda}}_l^T = \left[{}^{\bar{l}}\lambda_l^{[4]} \cdot 1 - {}^{\bar{l}}\tilde{\lambda}_l - {}^{\bar{l}}\lambda_l\right], {}^{\bar{l}}\tilde{\underset{\leftharpoonup}{\lambda}}_l^T = \left[{}^{\bar{l}}\lambda_l^{[4]} \cdot 1 + {}^{\bar{l}}\tilde{\lambda}_l \quad {}^{\bar{l}}\lambda_l\right]. \tag{2.205}$$

Considering Eqs. (2.202), (2.204) and (2.205), then $$
\begin{aligned}
{}^{\bar{l}}\underset{\rightarrow}{\tilde{\lambda}}_l^{T}\cdot{}^{\bar{l}}\underset{\rightarrow}{\tilde{\lambda}}_l &= \left[{}^{\bar{l}}\lambda_l^{[4]}\cdot 1-{}^{\bar{l}}\tilde{\lambda}_l \quad -{}^{\bar{l}}\lambda_l\right]\cdot\begin{bmatrix}{}^{\bar{l}}\lambda_l^{[4]}\cdot 1+{}^{\bar{l}}\tilde{\lambda}_l\\ -{}^{\bar{l}}\lambda_l^{T}\end{bmatrix}\\
&= {}^{\bar{l}}\lambda_l^{[4]}\cdot 1+{}^{\bar{l}}\tilde{\lambda}_l \quad {}^{\bar{l}}\lambda_l\Big]\cdot\begin{bmatrix}{}^{\bar{l}}\lambda_l^{[4]}\cdot 1-{}^{\bar{l}}\tilde{\lambda}_l\\ {}^{\bar{l}}\lambda_l^{T}\end{bmatrix}={}^{\bar{l}}\underset{\leftarrow}{\tilde{\lambda}}_l^{T}\cdot{}^{\bar{l}}\underset{\leftarrow}{\tilde{\lambda}}_l\\
&= {}^{\bar{l}}\lambda_l^{[4]:2}\cdot 1-{}^{\bar{l}}\tilde{\lambda}_l^{:2}+{}^{\bar{l}}\tilde{\lambda}_l\cdot{}^{\bar{l}}\lambda_l^{T}={}^{\bar{l}}\lambda_l^{[4]:2}\cdot 1+\left(1-{}^{\bar{l}}\lambda_l^{[4]:2}\right)\cdot 1=1
\end{aligned},
$$

i.e. the RH order matrix ${}^{\bar{l}}\underset{\rightarrow}{\tilde{\lambda}}$ and the LH order matrix ${}^{\bar{l}}\underset{\leftarrow}{\tilde{\lambda}}$ are mutually reversible, $$
{}^{\bar{l}}\underset{\leftarrow}{\tilde{\lambda}}_l^{T}\cdot{}^{\bar{l}}\underset{\leftarrow}{\tilde{\lambda}}_l={}^{\bar{l}}\underset{\rightarrow}{\tilde{\lambda}}_l^{T}\cdot{}^{\bar{l}}\underset{\rightarrow}{\tilde{\lambda}}_l=1. \tag{2.206}
$$

Since $$
\begin{aligned}
{}^{\bar{l}}\underset{\rightarrow}{\tilde{\lambda}}_l^{T}\cdot{}^{\bar{l}}\underset{\rightarrow}{\tilde{\lambda}}_l &= \begin{bmatrix}{}^{\bar{l}}\lambda_l^{[4]}\cdot 1-{}^{\bar{l}}\tilde{\lambda}_l\\ -{}^{\bar{l}}\lambda_l^{T}\end{bmatrix}\cdot\left[{}^{\bar{l}}\lambda_l^{[4]}\cdot 1-{}^{\bar{l}}\tilde{\lambda}_l \quad -{}^{\bar{l}}\lambda_l\right]\\
&= \begin{bmatrix}{}^{\bar{l}}\lambda_l^{[4]:2}\cdot 1-{}^{\bar{l}}\lambda_l^{[4]}\cdot{}^{\bar{l}}\tilde{\lambda}_l+{}^{\bar{l}}\lambda_l^{[4]}\cdot{}^{\bar{l}}\tilde{\lambda}_l-{}^{\bar{l}}\tilde{\lambda}_l^{:2} & -{}^{\bar{l}}\lambda_l^{[4]}\cdot{}^{\bar{l}}\lambda_l-{}^{\bar{l}}\tilde{\lambda}_l\cdot{}^{\bar{l}}\lambda_l\\ -{}^{\bar{l}}\lambda_l^{[4]}\cdot{}^{\bar{l}}\lambda_l^{T}+{}^{\bar{l}}\lambda_l^{T}\cdot{}^{\bar{l}}\tilde{\lambda}_l & {}^{\bar{l}}\lambda_l^{T}\cdot{}^{\bar{l}}\lambda_l\end{bmatrix}\\
&= {}^{\bar{l}}\underset{\leftarrow}{\tilde{\lambda}}_l\cdot{}^{\bar{l}}\underset{\leftarrow}{\tilde{\lambda}}_l^{T}\\
&= \begin{bmatrix}{}^{\bar{l}}\lambda_l^{[4]:2}\cdot 1+\left(1-{}^{\bar{l}}\lambda_l^{[4]:2}\right)\cdot 1-{}^{\bar{l}}\lambda_l\cdot{}^{\bar{l}}\lambda_l^{T} & -{}^{\bar{l}}\lambda_l^{[4]}\cdot{}^{\bar{l}}\lambda_l-{}^{\bar{l}}\tilde{\lambda}_l\cdot{}^{\bar{l}}\lambda_l\\ {}^{\bar{l}}\lambda_l^{[4]}\cdot{}^{\bar{l}}\lambda_l^{T}+{}^{\bar{l}}\lambda_l^{T}\cdot{}^{\bar{l}}\tilde{\lambda}_l & {}^{\bar{l}}\lambda_l^{T}\cdot{}^{\bar{l}}\lambda_l\end{bmatrix},\\
&= \begin{bmatrix}1-{}^{\bar{l}}\lambda_l\cdot{}^{\bar{l}}\lambda_l & -{}^{\bar{l}}\lambda_l^{[4]}\cdot{}^{\bar{l}}\lambda_l-{}^{\bar{l}}\tilde{\lambda}_l\cdot{}^{\bar{l}}\lambda_l\\ -{}^{\bar{l}}\lambda_l^{[4]}\cdot{}^{\bar{l}}\lambda_l^{T}+{}^{\bar{l}}\lambda_l^{T}\cdot{}^{\bar{l}}\tilde{\lambda}_l & 1-{}^{\bar{l}}\lambda_l^{[4]:2}\end{bmatrix}\\
&= 1-\begin{bmatrix}{}^{\bar{l}}\lambda_l\\ {}^{\bar{l}}\lambda_l^{[4]}\end{bmatrix}\cdot\left[{}^{\bar{l}}\lambda_l^{T} \quad {}^{\bar{l}}\lambda_l^{[4]}\right]=1-{}^{\bar{l}}\lambda_l\cdot{}^{\bar{l}}\lambda_l^{T}
\end{aligned}
$$

i.e.

$$
{}^{\bar{l}}\underset{\leftarrow}{\tilde{\lambda}}_l\cdot{}^{\bar{l}}\underset{\leftarrow}{\tilde{\lambda}}_l^{T}={}^{\bar{l}}\underset{\rightarrow}{\tilde{\lambda}}_l\cdot{}^{\bar{l}}\underset{\rightarrow}{\tilde{\lambda}}_l^{T}=1-{}^{\bar{l}}\lambda_l\cdot{}^{\bar{l}}\lambda_l^{T}. \tag{2.207}
$$

Eqs. (2.204) and (2.205) are applied, then $$
\begin{aligned}
{}^{\bar{l}}\underset{\rightarrow}{\tilde{\lambda}}_l^{T}\cdot{}^{\bar{l}}\underset{\rightarrow}{\tilde{\lambda}}_l &= \left[{}^{\bar{l}}\lambda_l^{[4]}\cdot 1-{}^{\bar{l}}\tilde{\lambda}_l \quad -{}^{\bar{l}}\lambda_l\right]\cdot\begin{bmatrix}{}^{\bar{l}}\tilde{\lambda}_l\\ {}^{\bar{l}}\lambda_l^{[4]}\end{bmatrix}\\
&= {}^{\bar{l}}\lambda_l^{[4]}\cdot{}^{\bar{l}}\lambda_l-{}^{\bar{l}}\tilde{\lambda}_l\cdot{}^{\bar{l}}\lambda_l-{}^{\bar{l}}\lambda_l^{[4]}\cdot{}^{\bar{l}}\lambda_l=0_3,\\
{}^{\bar{l}}\underset{\rightarrow}{\tilde{\lambda}}_l^{T}\cdot{}^{\bar{l}}\underset{\rightarrow}{\tilde{\lambda}}_l &= \left[{}^{\bar{l}}\lambda_l^{[4]}\cdot 1-{}^{\bar{l}}\tilde{\lambda}_l \quad -{}^{\bar{l}}\lambda_l\right]\cdot\begin{bmatrix}{}^{\bar{l}}\tilde{\lambda}_l\\ {}^{\bar{l}}\lambda_l^{[4]}\end{bmatrix}\\
&= {}^{\bar{l}}\lambda_l^{[4]}\cdot{}^{\bar{l}}\lambda_l-{}^{\bar{l}}\tilde{\lambda}_l\cdot{}^{\bar{l}}\lambda_l-{}^{\bar{l}}\lambda_l^{[4]}\cdot{}^{\bar{l}}\lambda_l=0_3.
\end{aligned}
$$

Due to the RH order matrix ${}^{\bar{l}}\underset{\rightarrow}{\tilde{\lambda}}$ and the LH order matrix ${}^{\bar{l}}\underset{\leftarrow}{\tilde{\lambda}}$ are independent from ${}^{\bar{l}}\tilde{\lambda}$, then $$
{}^{\bar{l}}\underset{\leftarrow}{\tilde{\lambda}}_l^{T}\cdot{}^{\bar{l}}\lambda_l={}^{\bar{l}}\underset{\rightarrow}{\tilde{\lambda}}_l^{T}\cdot{}^{\bar{l}}\lambda_l\cdot=0_3. \tag{2.208}
$$

Eqs. (2.202), (2.204) and (2.205) are applied to obtain $$
\begin{aligned}
{}^{\bar{l}}\underset{\leftarrow}{\tilde{\lambda}}_l^{T}\cdot{}^{\bar{l}}\underset{\rightarrow}{\tilde{\lambda}}_l &= \left[{}^{\bar{l}}\lambda_l^{[4]}\cdot 1+{}^{\bar{l}}\tilde{\lambda}_l-{}^{\bar{l}}\lambda_l\right]\cdot\begin{bmatrix}{}^{\bar{l}}\lambda_l^{[4]}\cdot 1+{}^{\bar{l}}\tilde{\lambda}_l\\ -{}^{\bar{l}}\lambda_l^{T}\end{bmatrix}\\
&= {}^{\bar{l}}\lambda_l^{[4]:2}\cdot 1+{}^{\bar{l}}\tilde{\lambda}_l^{:2}+2\cdot{}^{\bar{l}}\lambda_l^{[4]}\cdot{}^{\bar{l}}\tilde{\lambda}_{\bar{l}}+{}^{\bar{l}}\lambda_l\cdot{}^{\bar{l}}\lambda_l^{T}\\
&= \left(2\cdot{}^{\bar{l}}\lambda_l^{[4]:2}-1\right)\cdot 1+2\cdot{}^{\bar{l}}\lambda_l\cdot{}^{\bar{l}}\lambda_l^{T}+2\cdot{}^{\bar{l}}\lambda_l^{[4]}\cdot{}^{\bar{l}}\tilde{\lambda}_l={}^{\bar{l}}Q_l
\end{aligned}. \tag{2.208}
$$

Similarly, $$
\begin{aligned}
{}^{\bar{l}}\underset{\rightarrow}{\tilde{\lambda}}_l^{T}\cdot{}^{\bar{l}}\underset{\leftarrow}{\tilde{\lambda}}_l &= \left[{}^{\bar{l}}\lambda_l^{[4]}\cdot 1-{}^{\bar{l}}\tilde{\lambda}_l-{}^{\bar{l}}\lambda_l\right]\cdot\begin{bmatrix}{}^{\bar{l}}\lambda_l^{[4]}\cdot 1-{}^{\bar{l}}\tilde{\lambda}_l\\ -{}^{\bar{l}}\lambda_l^{T}\end{bmatrix}\\
&= {}^{\bar{l}}\lambda_l^{[4]:2}\cdot 1+{}^{\bar{l}}\tilde{\lambda}_l^{:2}-2\cdot{}^{\bar{l}}\lambda_l^{[4]}\cdot{}^{\bar{l}}\tilde{\lambda}_{\bar{l}}+{}^{\bar{l}}\lambda_l\cdot{}^{\bar{l}}\lambda_l^{T}\\
&= \left(2\cdot{}^{\bar{l}}\lambda_l^{[4]:2}-1\right)\cdot 1+2\cdot{}^{\bar{l}}\lambda_l\cdot{}^{\bar{l}}\lambda_l^{T}-2\cdot{}^{\bar{l}}\lambda_l^{[4]}\cdot{}^{\bar{l}}\tilde{\lambda}_l={}^{\bar{l}}Q_l^{T}
\end{aligned},
$$

i.e. the RH order matrix ${}^{\bar{l}}\underset{\rightarrow}{\tilde{\lambda}}$ and the LH order matrix ${}^{\bar{l}}\underset{\leftarrow}{\tilde{\lambda}}$ are invariants irrelevant to the attitude ${}^{\bar{l}}Q_l$ $$
{}^{\bar{l}}\underset{\leftarrow}{\tilde{\lambda}}_l^{T}\cdot{}^{\bar{l}}\underset{\rightarrow}{\tilde{\lambda}}_l={}^{\bar{l}}Q_l,\ {}^{\bar{l}}\underset{\rightarrow}{\tilde{\lambda}}_l^{T}\cdot{}^{\bar{l}}\underset{\leftarrow}{\tilde{\lambda}}_l\cdot{}^{\bar{l}}Q_l^{T}. \tag{2.209}
$$

From Eqs. (2.202) and (2.204), $$
\begin{aligned}
{}^{\bar{l}}\underset{\leftarrow}{\dot{\tilde{\lambda}}}_l^{T}\cdot{}^{\bar{l}}\underset{\rightarrow}{\tilde{\lambda}}_l &= \left[{}^{\bar{l}}\dot{\lambda}_l^{[4]}\cdot 1+{}^{\bar{l}}\dot{\tilde{\lambda}}_l-{}^{\bar{l}}\dot{\lambda}_l\right]\cdot\begin{bmatrix}{}^{\bar{l}}\lambda_l^{[4]}\cdot 1+{}^{\bar{l}}\tilde{\lambda}_l\\ -{}^{\bar{l}}\lambda_l^{T}\end{bmatrix}\\
&= {}^{\bar{l}}\dot{\lambda}_l^{[4]}\cdot{}^{\bar{l}}\lambda_l^{[4]}\cdot 1+{}^{\bar{l}}\dot{\tilde{\lambda}}_l\cdot{}^{\bar{l}}\dot{\lambda}_l+{}^{\bar{l}}\dot{\lambda}_l^{[4]}\cdot{}^{\bar{l}}\tilde{\lambda}_l\\
&\quad +{}^{\bar{l}}\lambda_l^{[4]}\cdot{}^{\bar{l}}\dot{\tilde{\lambda}}_l+{}^{\bar{l}}\dot{\lambda}_l\cdot{}^{\bar{l}}\lambda_l^{T}
\end{aligned}, \tag{2.210}
$$

$$
\begin{aligned}
{}^{\bar{l}}\underset{\leftarrow}{\tilde{\lambda}}_l^{T}\cdot{}^{\bar{l}}\underset{\rightarrow}{\dot{\tilde{\lambda}}}_l &= \left[{}^{\bar{l}}\lambda_l^{[4]}\cdot 1+{}^{\bar{l}}\tilde{\lambda}_l-{}^{\bar{l}}\lambda_l\right]\cdot\begin{bmatrix}{}^{\bar{l}}\dot{\lambda}_l^{[4]}\cdot 1+{}^{\bar{l}}\dot{\tilde{\lambda}}_l\\ -{}^{\bar{l}}\dot{\lambda}_l^{T}\end{bmatrix}\\
&= {}^{\bar{l}}\lambda_l^{[4]}\cdot{}^{\bar{l}}\dot{\lambda}_l^{[4]}\cdot 1+{}^{\bar{l}}\tilde{\lambda}_l\cdot{}^{\bar{l}}\dot{\tilde{\lambda}}_l+{}^{\bar{l}}\lambda_l^{[4]}\cdot{}^{\bar{l}}\dot{\tilde{\lambda}}_l+{}^{\bar{l}}\lambda_l^{[4]}\cdot{}^{\bar{l}}\tilde{\lambda}_l+{}^{\bar{l}}\lambda_l\cdot{}^{\bar{l}}\dot{\lambda}_l^{T}
\end{aligned}. \tag{2.211}
$$

From Eqs. (2.210) and (2.211), $$
{}^{\bar{l}}\underset{\leftarrow}{\dot{\tilde{\lambda}}_l}^{T}\cdot{}^{\bar{l}}\underset{\rightarrow}{\tilde{\lambda}_l}={}^{\bar{l}}\underset{\leftarrow}{\tilde{\lambda}_l}^{T}\cdot{}^{\bar{l}}\underset{\rightarrow}{\dot{\tilde{\lambda}}_l}. \tag{2.212}
$$

According to Eqs. (2.202) and (2.204), $$
\begin{aligned}
{}^{\bar{l}}\underset{\rightarrow}{\dot{\tilde{\lambda}}}_l^{T}\cdot{}^{\bar{l}}\underset{\leftarrow}{\tilde{\lambda}}_l &= \left[{}^{\bar{l}}\dot{\lambda}_l^{[4]}\cdot 1-{}^{\bar{l}}\dot{\tilde{\lambda}}_l-{}^{\bar{l}}\dot{\lambda}_l\right]\cdot\begin{bmatrix}{}^{\bar{l}}\lambda_l^{[4]}\cdot 1-{}^{\bar{l}}\tilde{\lambda}_l\\ -{}^{\bar{l}}\lambda_l^{T}\end{bmatrix}\\
&= {}^{\bar{l}}\dot{\lambda}_l^{[4]}\cdot{}^{\bar{l}}\lambda_l^{[4]}\cdot 1+{}^{\bar{l}}\dot{\tilde{\lambda}}_l\cdot{}^{\bar{l}}\dot{\lambda}_l-{}^{\bar{l}}\dot{\lambda}_l^{[4]}\cdot{}^{\bar{l}}\tilde{\lambda}_l\\
&\quad -{}^{\bar{l}}\lambda_l^{[4]}\cdot{}^{\bar{l}}\dot{\tilde{\lambda}}_l+{}^{\bar{l}}\dot{\lambda}_l\cdot{}^{\bar{l}}\lambda_l^{T}
\end{aligned}, \tag{2.213}
$$

$$
\begin{aligned}
{}^{\bar{l}}\underset{\rightarrow}{\tilde{\lambda}}_l^{T}\cdot{}^{\bar{l}}\underset{\leftarrow}{\dot{\tilde{\lambda}}}_l &= \left[{}^{\bar{l}}\lambda_l^{[4]}\cdot 1-{}^{\bar{l}}\tilde{\lambda}_l-{}^{\bar{l}}\lambda_l\right]\cdot\begin{bmatrix}{}^{\bar{l}}\dot{\lambda}_l^{[4]}\cdot 1-{}^{\bar{l}}\dot{\tilde{\lambda}}_l\\ -{}^{\bar{l}}\dot{\lambda}_l^{T}\end{bmatrix}\\
&= {}^{\bar{l}}\lambda_l^{[4]}\cdot{}^{\bar{l}}\dot{\lambda}_l^{[4]}\cdot 1+{}^{\bar{l}}\tilde{\lambda}_l\cdot{}^{\bar{l}}\dot{\tilde{\lambda}}_l-{}^{\bar{l}}\lambda_l^{[4]}\cdot{}^{\bar{l}}\dot{\tilde{\lambda}}_l\\
&\quad -{}^{\bar{l}}\dot{\lambda}_l^{[4]}\cdot{}^{\bar{l}}\tilde{\lambda}_l+{}^{\bar{l}}\lambda_l\cdot{}^{\bar{l}}\dot{\lambda}_l^{T}
\end{aligned}. \tag{2.214}
$$

Eqs. (2.213) and (2.214) result in $$ {}^{\bar l}\dot{\underrightarrow{\tilde\lambda}}_l^T\cdot{}^{\bar l}\underleftarrow{\tilde\lambda}_l={}^{\bar l}\underrightarrow{\tilde\lambda}_l^T\cdot{}^{\bar l}\dot{\underleftarrow{\tilde\lambda}}_l. \tag{2.215}$$

From Eq. (2.206), we get $$ {}^{\bar l}\dot{\underleftarrow{\tilde\lambda}}_l^T\cdot{}^{\bar l}\underleftarrow{\tilde\lambda}_l+{}^{\bar l}\underleftarrow{\tilde\lambda}_l^T\cdot{}^{\bar l}\dot{\underleftarrow{\tilde\lambda}}_l=o,\ {}^{\bar l}\dot{\underrightarrow{\tilde\lambda}}_l^T\cdot{}^{\bar l}\underrightarrow{\tilde\lambda}_l+{}^{\bar l}\underrightarrow{\tilde\lambda}_l^T\cdot{}^{\bar l}\dot{\underrightarrow{\tilde\lambda}}_l=o. \tag{2.216}$$

According to Eq. (2.209), $$ {}^{\bar l}\dot{\underleftarrow{\tilde\lambda}}_l^T\cdot{}^{\bar l}\underrightarrow{\tilde\lambda}_l+{}^{\bar l}\underleftarrow{\tilde\lambda}_l^T\cdot{}^{\bar l}\dot{\underrightarrow{\tilde\lambda}}_l={}^{\bar l}\dot Q_l,\ {}^{\bar l}\dot{\underrightarrow{\tilde\lambda}}_l^T\cdot{}^{\bar l}\underleftarrow{\tilde\lambda}_l+{}^{\bar l}\underrightarrow{\tilde\lambda}_l^T\cdot{}^{\bar l}\dot{\underleftarrow{\tilde\lambda}}_l={}^{\bar l}\dot Q_l^T. \tag{2.217}$$

From Eqs. (2.212), (2.215) and (2.217), $$ 2\cdot{}^{\bar l}\dot{\underleftarrow{\tilde\lambda}}_l^T\cdot{}^{\bar l}\underrightarrow{\tilde\lambda}_l={}^{\bar l}\dot Q_l,\ 2\cdot{}^{\bar l}\dot{\underrightarrow{\tilde\lambda}}_l^T\cdot{}^{\bar l}\underleftarrow{\tilde\lambda}_l={}^{\bar l}\dot Q_l^T \tag{2.218}$$

From Eqs. (2.209), (2.206) and (2.218), $$\begin{aligned} {}^{\bar l}\dot\phi_l &= {}^{\bar l}\dot Q_l\cdot{}^{l}Q_{\bar l} = 2\cdot{}^{\bar l}\dot{\underleftarrow{\tilde\lambda}}_l^T\cdot{}^{\bar l}\underrightarrow{\tilde\lambda}_l\cdot\left({}^{\bar l}\underleftarrow{\tilde\lambda}_l^T\cdot{}^{\bar l}\underrightarrow{\tilde\lambda}_l\right)\\ &= 2\cdot{}^{\bar l}\dot{\underleftarrow{\tilde\lambda}}_l^T\cdot{}^{\bar l}\underrightarrow{\tilde\lambda}_l\cdot{}^{\bar l}\underrightarrow{\tilde\lambda}_l^T\cdot{}^{\bar l}\underleftarrow{\tilde\lambda}_l\\ &= 2\cdot{}^{\bar l}\dot{\underleftarrow{\tilde\lambda}}_l^T\cdot\left(1-{}^{\bar l}\lambda_l\cdot{}^{\bar l}\lambda_l^T\right)\cdot{}^{\bar l}\underleftarrow{\tilde\lambda}_l\\ &= 2\cdot{}^{\bar l}\dot{\underleftarrow{\tilde\lambda}}_l^T\cdot{}^{\bar l}\underleftarrow{\tilde\lambda}_l, \end{aligned}, \tag{2.219}$$

i.e.

$$ {}^{\bar l}\dot\phi_l=2\cdot{}^{\bar l}\dot{\underleftarrow{\tilde\lambda}}_l^T\cdot{}^{\bar l}\underleftarrow{\tilde\lambda}_l. \tag{2.220}$$

According to Eq. (2.220), we get $$\begin{aligned} {}^{\bar l}\dot{\underleftarrow{\tilde\lambda}}_l^T\cdot{}^{\bar l}\lambda_l &= \left[{}^{\bar l}\tilde\lambda_l+{}^{\bar l}\dot\lambda_l^{[4]}\cdot 1-{}^{\bar l}\dot{\tilde\lambda}_l\right]\cdot\begin{bmatrix}{}^{\bar l}\tilde\lambda_l\\ {}^{\bar l}\lambda_l^{[4]}\end{bmatrix},\\ &= {}^{\bar l}\dot{\tilde\lambda}_l\cdot{}^{\bar l}\lambda_l+{}^{\bar l}\dot\lambda_l^{[4]}\cdot{}^{\bar l}\lambda_l-{}^{\bar l}\lambda_l^{[4]}\cdot{}^{\bar l}\dot\lambda_l \end{aligned} \tag{2.221}$$

$$\begin{aligned} {}^{\bar l}\dot{\underleftarrow{\tilde\lambda}}_l^T\cdot{}^{\bar l}\dot\lambda_l &= \left[{}^{\bar l}\tilde\lambda_l+{}^{\bar l}\dot\lambda_l^{[4]}\cdot 1-{}^{\bar l}\dot{\tilde\lambda}_l\right]\cdot\begin{bmatrix}{}^{\bar l}\dot{\tilde\lambda}_l\\ {}^{\bar l}\dot\lambda_l^{[4]}\end{bmatrix},\\ &= {}^{\bar l}\dot{\tilde\lambda}_l\cdot{}^{\bar l}\dot\lambda_l+{}^{\bar l}\dot\lambda_l^{[4]}\cdot{}^{\bar l}\dot{\tilde\lambda}_l-{}^{\bar l}\dot\lambda_l^{[4]}\cdot{}^{\bar l}\dot{\tilde\lambda}_l=0_3 \end{aligned} \tag{2.222}$$

$$\begin{aligned} {}^{\bar l}\dot{\underrightarrow{\tilde\lambda}}_l^T\cdot{}^{\bar l}\lambda_l &= \left[{}^{\bar l}\dot{\tilde\lambda}_l+{}^{\bar l}\dot\lambda_l^{[4]}\cdot 1-{}^{\bar l}\dot{\tilde\lambda}_l\right]\cdot\begin{bmatrix}{}^{\bar l}\lambda_l\\ {}^{\bar l}\lambda_l^{[4]}\end{bmatrix},\\ &= {}^{\bar l}\dot{\tilde\lambda}_l\cdot{}^{\bar l}\lambda_l+{}^{\bar l}\dot\lambda_l^{[4]}\cdot{}^{\bar l}\lambda_l-{}^{\bar l}\lambda_l^{[4]}\cdot{}^{\bar l}\dot\lambda_l \end{aligned} \tag{2.223}$$

$$\begin{aligned} {}^{\bar l}\dot{\underrightarrow{\tilde\lambda}}_l^T\cdot{}^{\bar l}\dot\lambda_l &= \left[{}^{\bar l}\dot\lambda_l\cdot 1-{}^{\bar l}\dot{\tilde\lambda}_l-{}^{\bar l}\dot\lambda_l\right]\cdot\begin{bmatrix}{}^{\bar l}\dot\lambda_l\\ {}^{\bar l}\dot\lambda_l^{[4]}\end{bmatrix}.\\ &= {}^{\bar l}\dot\lambda_l^{[4]}\cdot{}^{\bar l}\dot\lambda_l-{}^{\bar l}\dot{\tilde\lambda}_l\cdot{}^{\bar l}\dot\lambda_l-{}^{\bar l}\dot\lambda_l^{[4]}\cdot{}^{\bar l}\dot\lambda_l=0_3 \end{aligned} \tag{2.224}$$

Eqs. (2.32), (2.203) and (2.221) result in $$\begin{aligned} \overline{{}^{\bar l}\dot{\underleftarrow{\tilde\lambda}}_l^T\cdot{}^{\bar l}\lambda_l} &= \overline{{}^{\bar l}\dot{\tilde\lambda}_l\cdot{}^{\bar l}\lambda_l}+\overline{{}^{\bar l}\dot\lambda_l^{[4]}\cdot{}^{\bar l}\lambda_l}-\overline{{}^{\bar l}\lambda_l^{[4]}\cdot{}^{\bar l}\dot\lambda_l}\\ &= {}^{\bar l}\dot\lambda_l^{[4]}\cdot{}^{\bar l}\tilde\lambda_l-{}^{\bar l}\tilde\lambda_l\cdot{}^{\bar l}\dot{\tilde\lambda}_l+{}^{\bar l}\dot{\tilde\lambda}_l\cdot{}^{\bar l}\tilde\lambda_l-{}^{\bar l}\lambda_l^{[4]}\cdot{}^{\bar l}\dot{\tilde\lambda}_l\\ &= \left[{}^{\bar l}\tilde\lambda_l+{}^{\bar l}\dot\lambda_l^{[4]}\cdot 1-{}^{\bar l}\lambda_l\right]\cdot\begin{bmatrix}{}^{\bar l}\dot\lambda_l^{[4]}\cdot 1-{}^{\bar l}\dot{\tilde\lambda}_l\\ -{}^{\bar l}\dot\lambda_l^T\end{bmatrix}={}^{\bar l}\underleftarrow{\tilde\lambda}_l^T\cdot{}^{\bar l}\dot{\underleftarrow{\tilde\lambda}}_l \end{aligned},$$

i.e.

$$ \overline{{}^{\bar l}\dot{\underleftarrow{\tilde\lambda}}_l^T\cdot{}^{\bar l}\lambda_l}={}^{\bar l}\underleftarrow{\tilde\lambda}_l^T\cdot{}^{\bar l}\dot{\underleftarrow{\tilde\lambda}}_l. \tag{2.225}$$

From Eqs. (2.32), (2.203) and (2.223), then $$\begin{aligned} \overline{{}^{\bar l}\dot{\underrightarrow{\tilde\lambda}}_l^T\cdot{}^{\bar l}\lambda_l} &= -\overline{{}^{\bar l}\dot{\tilde\lambda}_l\cdot{}^{\bar l}\lambda_l}+\overline{{}^{\bar l}\dot\lambda_l^{[4]}\cdot{}^{\bar l}\lambda_l}-\overline{{}^{\bar l}\lambda_l^{[4]}\cdot{}^{\bar l}\dot\lambda_l}\\ &= -{}^{\bar l}\dot{\tilde\lambda}_l\cdot{}^{\bar l}\tilde\lambda_l+{}^{\bar l}\tilde\lambda_l\cdot{}^{\bar l}\dot{\tilde\lambda}_l+{}^{\bar l}\lambda_l^{[4]}\cdot{}^{\bar l}\dot{\tilde\lambda}_l-{}^{\bar l}\dot\lambda_l^{[4]}\cdot{}^{\bar l}\tilde\lambda_l\\ &= -\left[-{}^{\bar l}\tilde\lambda_l+{}^{\bar l}\lambda_l^{[4]}\cdot 1-{}^{\bar l}\lambda_l\right]\cdot\begin{bmatrix}{}^{\bar l}\dot{\tilde\lambda}_l+{}^{\bar l}\dot\lambda_l^{[4]}\cdot 1\\ -{}^{\bar l}\dot\lambda_l^{[4]}\end{bmatrix}=-{}^{\bar l}\underrightarrow{\tilde\lambda}_l^T\cdot{}^{\bar l}\dot{\underrightarrow{\tilde\lambda}}_l \end{aligned},$$

i.e.

$$ \overline{{}^{\bar l}\dot{\underrightarrow{\tilde\lambda}}_l^T\cdot{}^{\bar l}\lambda_l}=-{}^{\bar l}\underrightarrow{\tilde\lambda}_l^T\cdot{}^{\bar l}\dot{\underrightarrow{\tilde\lambda}}_l. \tag{2.226}$$

From Eqs. (2.222) and (2.224) we know that ${}^{\bar l}\dot{\underleftarrow{\tilde\lambda}}$ and ${}^{\bar l}\dot{\underrightarrow{\tilde\lambda}}$ are respectively independent of ${}^{\bar l}\dot\lambda_l$, $$ {}^{\bar l}\dot{\underleftarrow{\tilde\lambda}}_l^T\cdot{}^{\bar l}\dot\lambda_l=0_3,\ {}^{\bar l}\dot{\underrightarrow{\tilde\lambda}}_l^T\cdot{}^{\bar l}\dot\lambda_l=0_3. \tag{2.227}$$

Substitute Eq. (2.209) into the first formula of Eq. (2.165), then $$ 2\cdot{}^{\bar l}\dot{\underleftarrow{\tilde\lambda}}_l^T\cdot{}^{\bar l}\underrightarrow{\tilde\lambda}_l\cdot{}^{\bar l}\underrightarrow{\tilde\lambda}_l^T\cdot{}^{\bar l}\underleftarrow{\tilde\lambda}_l={}^{\bar l}\dot\phi_l. \tag{2.228}$$

Substitute Eq. (2.207) into the first formula of Eq. (2.228), then $$ 2\cdot{}^{\bar l}\dot{\underleftarrow{\tilde\lambda}}_l^T\cdot\left(1-{}^{\bar l}\lambda_l\cdot{}^{\bar l}\lambda_l^T\right)\cdot{}^{\bar l}\underleftarrow{\tilde\lambda}_l={}^{\bar l}\dot\phi_l. \tag{2.229}$$

According to Eqs. (2.229) and (2.208) then $$ 2\cdot{}^{\bar l}\dot{\underleftarrow{\tilde\lambda}}_l^T\cdot{}^{\bar l}\underleftarrow{\tilde\lambda}_l={}^{\bar l}\dot\phi_l. \tag{2.230}$$

Substitute Eq. (2.225) into Eq. (2.230), so $$ 2\cdot\overline{{}^{\bar l}\dot{\underleftarrow{\tilde\lambda}}_l^T\cdot{}^{\bar l}\lambda_l}={}^{\bar l}\dot\phi_l. \tag{2.231}$$

From Eq. (2.231), $$2\cdot{}^{7}\underleftarrow{\lambda}_l^{T}\cdot{}^{7}\dot{\lambda}_l={}^{7}\dot{\phi}_l. \tag{2.232}$$

Substituting Eq. (2.206) into Eq. (2.232), the LH order quaternion differential equation is obtained, $${}^{7}\dot{\lambda}_l=\frac{1}{2}\cdot{}^{7}\underleftarrow{\lambda}_l\cdot{}^{7}\dot{\phi}_l. \tag{2.233}$$

According to Eqs. (2.204) and (2.233), $$\left[\begin{array}{l}\begin{bmatrix}{}^{7}\dot{\lambda}_l^{[1]}\\ {}^{7}\dot{\lambda}_l^{[2]}\\ {}^{7}\dot{\lambda}_l^{[3]}\\ {}^{7}\dot{\lambda}_l^{[4]}\end{bmatrix}=\frac{1}{2}\cdot\begin{bmatrix}{}^{7}\lambda_l^{[4]} & {}^{7}\lambda_l^{[3]} & -{}^{7}\lambda_l^{[2]}\\ -{}^{7}\lambda_l^{[3]} & {}^{7}\lambda_l^{[4]} & {}^{7}\lambda_l^{[1]}\\ {}^{7}\lambda_l^{[2]} & -{}^{7}\lambda_l^{[1]} & {}^{7}\lambda_l^{[4]}\\ -{}^{7}\lambda_l^{[1]} & -{}^{7}\lambda_l^{[2]} & -{}^{7}\lambda_l^{[3]}\end{bmatrix}\cdot\begin{bmatrix}{}^{7}\dot{\phi}_l^{[1]}\\ {}^{7}\dot{\phi}_l^{[2]}\\ {}^{7}\dot{\phi}_l^{[3]}\end{bmatrix}.\\ {}^{7}\lambda_l^{[1]:2}+{}^{7}\lambda_l^{[2]:2}+{}^{7}\lambda_l^{[3]:2}+{}^{7}\lambda_l^{[4]:2}=1\end{array}\right. \tag{2.234}$$

Define $${}^{7}\dot{\underline{\phi}}_l\triangleq\left[{}^{7}\dot{\phi}_l\ 0\right]^{T}, \tag{2.235}$$

and its inverse conjugate matrix (Screw-Matrix)

$${}^{7}\underleftarrow{\dot{\phi}}_l\triangleq\begin{bmatrix}-{}^{7}\dot{\tilde{\phi}}_l & -{}^{7}\dot{\phi}_l\\ {}^{7}\dot{\phi}_l^{T} & 0\end{bmatrix},\ {}^{7}\underrightarrow{\dot{\phi}}_l\triangleq\begin{bmatrix}{}^{7}\dot{\tilde{\phi}}_l & {}^{7}\dot{\phi}_l\\ -{}^{7}\dot{\phi}_l^{T} & 0\end{bmatrix}. \tag{2.236}$$

From Eqs. (2.234) and (2.236), the quaternion derivative RH order equation can be obtained $${}^{7}\dot{\lambda}_l=\frac{1}{2}\cdot{}^{7}\underrightarrow{\dot{\phi}}_l\cdot{}^{7}\lambda_l, \tag{2.237}$$

i.e.

$$\left[\begin{array}{l}\begin{bmatrix}{}^{7}\dot{\lambda}_l^{[1]}\\ {}^{7}\dot{\lambda}_l^{[2]}\\ {}^{7}\dot{\lambda}_l^{[3]}\\ {}^{7}\dot{\lambda}_l^{[4]}\end{bmatrix}=\frac{1}{2}\cdot\begin{bmatrix}0 & -{}^{7}\dot{\phi}_l^{[3]} & {}^{7}\dot{\phi}_l^{[2]} & {}^{7}\dot{\phi}_l^{[1]}\\ {}^{7}\dot{\phi}_l^{[3]} & 0 & -{}^{7}\dot{\phi}_l^{[1]} & {}^{7}\dot{\phi}_l^{[2]}\\ -{}^{7}\dot{\phi}_l^{[2]} & {}^{7}\dot{\phi}_l^{[1]} & 0 & {}^{7}\dot{\phi}_l^{[3]}\\ -{}^{7}\dot{\phi}_l^{[1]} & -{}^{7}\dot{\phi}_l^{[2]} & -{}^{7}\dot{\phi}_l^{[3]} & 0\end{bmatrix}\cdot\begin{bmatrix}{}^{7}\lambda_l^{[1]}\\ {}^{7}\lambda_l^{[2]}\\ {}^{7}\lambda_l^{[3]}\\ {}^{7}\lambda_l^{[4]}\end{bmatrix}.\\ {}^{7}\lambda_l^{[1]:2}+{}^{7}\lambda_l^{[2]:2}+{}^{7}\lambda_l^{[3]:2}+{}^{7}\lambda_l^{[4]:2}=1\end{array}\right. \tag{2.238}$$

Eq. (2.238) is called the Euler quaternion differential equation, the first four equations are linearly related to ${}^{7}\dot{\lambda}_l$, and the last equation is the constraint equation. Eq. (2.233) results in $${}^{7}\dot{\lambda}_l=\frac{1}{2}\cdot{}^{7}\underleftarrow{\lambda}_l\cdot{}^{7}Q_l\cdot{}^{l}\dot{\phi}_7. \tag{2.239}$$

Substitute Eq. (2.209) into Eq. (2.239), then $${}^{7}\dot{\lambda}_l=-\frac{1}{2}\cdot{}^{7}\underleftarrow{\lambda}_l\cdot{}^{7}\underleftarrow{\lambda}_l^{T}\cdot{}^{7}\underrightarrow{\lambda}_l\cdot{}^{l}\dot{\phi}_7. \tag{2.240}$$

From Eqs. (2.206) and (2.240), we obtain the RH order equation of the quaternion derivative $${}^{7}\dot{\lambda}_l=-\frac{1}{2}\cdot{}^{7}\underrightarrow{\lambda}_l\cdot{}^{l}\dot{\phi}_7. \tag{2.241}$$

Similarly, from Eq. (2.233), we obtain the LH order equation of the quaternion derivative $${}^{7}\dot{\lambda}_l=-\frac{1}{2}\cdot{}^{l}\underleftarrow{\dot{\phi}}_7\cdot{}^{7}\lambda_l. \tag{2.242}$$

From Eq. (2.206), we obtain the LH order equation of second derivative $${}^{7}\ddot{\lambda}_l=\frac{1}{2}\cdot{}^{7}\underleftarrow{\lambda}_l\cdot{}^{7}\ddot{\phi}_l. \tag{2.243}$$

Similarly, Eqs. (2.243) and (2.236) result in the RH order equation $${}^{7}\ddot{\lambda}_l=\frac{1}{2}\cdot{}^{7}\underrightarrow{\ddot{\phi}}_l\cdot{}^{7}\lambda_l. \tag{2.244}$$

Solution of Quaternion Differential Equation

Since the first four equations of Eq. (2.238) are differential equations linearly related to ${}^{7}\dot{\lambda}_l$ within the time period from $t_k$ to $t_{k+1}$, wherein $t_{k+1}=t_k+\delta t$, and its exponential calculation form is as follows:

$${}^{7}_{k+1}\lambda_l=\exp\left(\frac{1}{2}\cdot{}^{7}_{k}\underrightarrow{\dot{\phi}}_l\right)\cdot{}^{7}_{k}\lambda_l. \tag{2.245}$$

From Eq. (2.245), we get $${}^{7}_{k+1}\lambda_l={}^{7}_{k}\lambda_l+\delta^{7}_{k}\lambda_l, \tag{2.246}$$

$$\delta^{7}_{k}\lambda_l=\delta\exp\left(\frac{1}{2}{}^{7}_{k}\underrightarrow{\dot{\phi}}_l\right)\cdot{}^{7}_{k}\lambda_l. \tag{2.247}$$

The computational complexity of Eq. (2.247) is higher, and is further simplified as $$\delta^{7}_{k}\lambda_l=\left(C\left(\delta\phi_l^{7}/2\right)\cdot\mathbf{1}+\frac{\delta S_l\cdot\delta\phi_l^{7}}{\delta\phi_l^{7}}\cdot{}^{7}\underrightarrow{n}_l\right)\cdot{}^{7}_{k}\lambda_l, \tag{2.248}$$

wherein $$\delta C_l=C\left(\delta\phi_l^{7}/2\right),\ \delta S_l=S\left(\delta\phi_l^{7}/2\right). \tag{2.249}$$

Eq. (2.248) is $$\delta_k^{\bar{l}}\lambda_l=\begin{bmatrix}\delta C_l & -\delta\dot{\phi}_l^{\bar{l}}\cdot\delta S_l\cdot{}^{\bar{l}}n_l^{[3]} & \delta\dot{\phi}_l^{\bar{l}}\cdot\delta S_l\cdot{}^{\bar{l}}n_l^{[2]} & \delta\dot{\phi}_l^{\bar{l}}\cdot\delta S_l\cdot{}^{\bar{l}}n_l^{[1]}\\ \delta\dot{\phi}_l^{\bar{l}}\cdot\delta S_l\cdot{}^{\bar{l}}n_l^{[3]} & \delta C_l & -\delta\dot{\phi}_l^{\bar{l}}\cdot\delta S_l\cdot{}^{\bar{l}}n_l^{[1]} & \delta\dot{\phi}_l^{\bar{l}}\cdot\delta S_l\cdot{}^{\bar{l}}n_l^{[2]}\\ -\delta\dot{\phi}_l^{\bar{l}}\cdot\delta S_l\cdot{}^{\bar{l}}n_l^{[3]} & \delta\dot{\phi}_l^{\bar{l}}\cdot\delta S_l\cdot{}^{\bar{l}}n_l^{[3]} & \delta C_l & \delta\dot{\phi}_l^{\bar{l}}\cdot\delta S_l\cdot{}^{\bar{l}}n_l^{[3]}\\ -\delta\dot{\phi}_l^{\bar{l}}\cdot\delta S_l\cdot{}^{\bar{l}}n_l^{[1]} & -\delta\dot{\phi}_l^{\bar{l}}\cdot\delta S_l\cdot{}^{\bar{l}}n_l^{[2]} & -\delta\dot{\phi}_l^{\bar{l}}\cdot\delta S_l\cdot{}^{\bar{l}}n_l^{[3]} & \delta C_l\end{bmatrix}\cdot{}_k^{\bar{l}}\lambda_l, \tag{2.250}$$

wherein $$\delta^{\bar{l}}\dot{\vec{\phi}}_l={}^{\bar{l}}\dot{\vec{\phi}}_l\cdot\delta t, \tag{2.251}$$

$$\delta\phi_l^{\bar{l}}=\dot{\phi}_l^{\bar{l}}\cdot\delta t. \tag{2.252}$$

PROOF: According to Eqs. (2.37) and (2.38) we know that $${}^{\bar{l}}\dot{\vec{\phi}}_l^{:2p}=(-1)^p\cdot\dot{\phi}_l^{\bar{l}:2p}\cdot\mathbf{1},\ {}^{\bar{l}}\dot{\vec{\phi}}_l^{:2p+1}=(-1)^p\cdot\dot{\phi}_l^{\bar{l}:2p+1}\cdot{}^{\bar{l}}\vec{n}_l.$$

Obviously $$\begin{aligned}\delta\exp\left(\frac{1}{2}\cdot{}_k^{\bar{l}}\dot{\vec{\phi}}_l\right)&=\mathbf{1}+\\ &\left[-\frac{1}{2!}\cdot\left(\frac{1}{2}\cdot\delta\phi_l^{\bar{l}}\right)^2+\frac{1}{4!}\cdot\left(\frac{1}{2}\cdot\delta\phi_l^{\bar{l}}\right)^4-\ldots+\frac{(-1)^p}{(2p)!}\cdot\left(\frac{1}{2}\cdot\delta\phi_l^{\bar{l}}\right)^{2p}+\ldots\right]\cdot\mathbf{1}+\\ &\left[\left(\frac{1}{2}\cdot\delta\phi_l^{\bar{l}}\right)-\frac{1}{3!}\cdot\left(\frac{1}{2}\cdot\delta\phi_l^{\bar{l}}\right)^3+\ldots+\frac{(-1)^p}{(2p+1)!}\cdot\left(\frac{1}{2}\cdot\delta\phi_l^{\bar{l}}\right)^{2p+1}+\ldots\right]{}^{\bar{l}}\vec{n}_l\\ &=C\left(\delta\phi_l^{\bar{l}}/2\right)\cdot\mathbf{1}+S\left(\delta\phi_l^{\bar{l}}/2\right)\cdot{}^{\bar{l}}\vec{n}_l\end{aligned}$$

Q.E.D.

The rotation vector ${}^{\bar{l}}\phi_l$ is obtained from the integral of the angular velocity vector ${}^{\bar{l}}\dot{\phi}_l$, the quaternion ${}^{\bar{l}}\lambda_l$ is then acquired by iteration of Eq. (2.250), as well as the rotation matrix ${}^{\bar{l}}Q_l$ by applying Eq. (2.131). Eq. (2.250) has lower computational complexity than Eq. (2.245). Considering Eq. (2.250), when $\phi_l^{\bar{l}}\to 0$, then, $$\delta_k^{\bar{l}}\lambda_l=\frac{1}{2}\cdot\begin{bmatrix}2 & -\delta^{\bar{l}}\phi_l^{[3]} & \delta^{\bar{l}}\phi_l^{[2]} & -\delta^{\bar{l}}\phi_l^{[1]}\\ \delta^{\bar{l}}\phi_l^{[3]} & 2 & -\delta^{\bar{l}}\phi_l^{[1]} & -\delta^{\bar{l}}\phi_l^{[2]}\\ -\delta^{\bar{l}}\phi_l^{[1]} & \delta^{\bar{l}}\phi_l^{[1]} & 2 & -\delta^{\bar{l}}\phi_l^{[3]}\\ \delta^{\bar{l}}\phi_l^{[1]} & \delta^{\bar{l}}\phi_l^{[2]} & \delta^{\bar{l}}\phi_l^{[3]} & 2\end{bmatrix}\cdot{}_k^{\bar{l}}\lambda_l. \tag{2253}$$

For highly dynamic situations, it is necessary to increase the sampling frequency and smooth process data to prevent high-frequency noise. The detailed solution of the quaternion differential equation can be found in references. Eq. (2.253) is mainly used for inertial navigation, Newton Euler dynamical integration, etc.

Twist and Screw Based on Axis-Invariant

Twist

The γ represents the 6D space screw attribute. Accordingly, its frame at the upper left corner is understood as 6D space; the relative position form from the 6D space $\bar{l}$ to the configuration space l is expressed as $${}^{\bar{\bar{l}}}\gamma_l=\begin{bmatrix}{}^{\bar{\bar{l}}}\phi_{\bar{l}}\\ {}^{\bar{\bar{l}}|\bar{l}}r_l\end{bmatrix},\ {}^{\bar{l}}\gamma_{l_S}=\begin{bmatrix}{}^{\bar{l}}\phi_l\\ {}^{\bar{l}|l}r_{l_S}\end{bmatrix}. \tag{2.254}$$

The derivatives of Eq. (2.254) obtain $$\begin{aligned}&{}^{\bar{\bar{l}}}\dot{\gamma}_l=\begin{bmatrix}{}^{\bar{\bar{l}}}\dot{\phi}_{\bar{l}}\\ {}^{\bar{\bar{l}}|\bar{l}}r'_l\end{bmatrix},\ {}^{\bar{l}}\dot{\gamma}_{l_S}=\begin{bmatrix}{}^{\bar{l}}\dot{\phi}_l\\ {}^{\bar{l}|l}r'_{l_S}\end{bmatrix}\\ &{}^{\bar{l}}\dot{\gamma}_l=\begin{bmatrix}{}^{\bar{l}|\bar{\bar{l}}}\dot{\phi}_{\bar{l}}\\ {}^{\bar{l}}\dot{r}_l\end{bmatrix},\ {}^{l}\dot{\gamma}_{l_S}=\begin{bmatrix}{}^{l|\bar{l}}\dot{\phi}_l\\ {}^{l}\dot{r}_{l_S}\end{bmatrix}.\end{aligned} \tag{2.255}$$

The ${}^{\bar{l}}\dot{\gamma}_l$ and ${}^{\bar{l}}\dot{\gamma}_{l_S}$ are called twists.

Twist Transformation

The AC ${}^{\bar{l}}\mathbf{1}_{l_S}$ is given, then $${}^{\bar{l}}\dot{r}_{l_S}={}^{\bar{l}}\dot{r}_l+{}^{\bar{l}|l}r'_{l_S}, \tag{2.256}$$

$${}^{\bar{\bar{l}}}\dot{r}_l={}^{\bar{\bar{l}}}\dot{r}_{\bar{l}}+{}^{\bar{\bar{l}}|\bar{l}}r'_l. \tag{2.257}$$

Eqs. (2.256) and (2.257) express the relative chain relationship of translation velocity. Eqs. (2.173) and (2.256) obtain $$\begin{bmatrix}{}^{\bar{l}}\dot{\phi}_l\\ {}^{\bar{l}|l}r'_{l_S}\end{bmatrix}=\begin{bmatrix}{}^{\bar{l}}Q_l & O\\ -{}^{\bar{l}|l}\tilde{r}_{l_S}\cdot{}^{\bar{l}}Q_l & {}^{\bar{l}}Q_l\end{bmatrix}\cdot\begin{bmatrix}{}^{l|\bar{l}}\dot{\phi}_l\\ {}^{l}\dot{r}_{l_S}\end{bmatrix}. \tag{2.258}$$

According to Eqs. (2.177) and (2.257), $$\begin{bmatrix}{}^{\bar{\bar{l}}}\dot{\phi}_{\bar{l}}\\ {}^{\bar{\bar{l}}|\bar{l}}r'_l\end{bmatrix}=\begin{bmatrix}{}^{\bar{\bar{l}}}Q_{\bar{l}} & O\\ -{}^{\bar{\bar{l}}|\bar{l}}\tilde{r}_l\cdot{}^{\bar{\bar{l}}}Q_{\bar{l}} & {}^{\bar{\bar{l}}}Q_{\bar{l}}\end{bmatrix}\cdot\begin{bmatrix}{}^{\bar{l}|\bar{\bar{l}}}\dot{\phi}_{\bar{l}}\\ {}^{\bar{l}}\dot{r}_{l_S}\end{bmatrix}. \tag{2.259}$$

From Eqs. (2.255) and (2.258), $${}^{\bar{l}}\dot{\gamma}_{l_S}={}^{\bar{l}|l}T_{l_S}\cdot{}^{l}\dot{\gamma}_{l_S}. \tag{2.260}$$

From Eqs. (2.255) and (2.259), $${}^{\bar{l}}\dot{\gamma}_l={}^{\bar{l}|l}T_l\cdot{}^{\bar{l}}\dot{\gamma}_l, \tag{2.261}$$

wherein $${}^{\bar{l}|l}T_{l_S}=\begin{bmatrix}{}^{\bar{l}}Q_l & O\\ -{}^{\bar{l}|l}\tilde{r}_{l_S}\cdot{}^{\bar{l}}Q_l & {}^{\bar{l}}Q_l\end{bmatrix},\ {}^{\bar{\bar{l}}|\bar{l}}T_l=\begin{bmatrix}{}^{\bar{\bar{l}}}Q_{\bar{l}} & O\\ -{}^{\bar{\bar{l}}|\bar{l}}\tilde{r}_l\cdot{}^{\bar{\bar{l}}}Q_{\bar{l}} & {}^{\bar{\bar{l}}}Q_{\bar{l}}\end{bmatrix}. \tag{2.262}$$

Eqs. (2.260) and (2.261) are the forward twist transformation.

[1] Concatenation of the Twist Transfer Matrix

The twist transfer matrix is recorded as $$^{\bar{\bar{l}}}T_{\bar{l}} \triangleq {}^{\bar{\bar{l}}|\bar{l}}T_l = \begin{bmatrix} ^{\bar{\bar{l}}}Q_{\bar{l}} & O \\ -^{\bar{\bar{l}}|\bar{l}}\tilde{r}_l \cdot {}^{\bar{\bar{l}}}Q_{\bar{l}} & ^{\bar{\bar{l}}}Q_{\bar{l}} \end{bmatrix}, \tag{2.263}$$

$$^{\bar{l}}T_l \triangleq {}^{\bar{l}|l}T_{l_s} = \begin{bmatrix} ^{\bar{l}}Q_l & O \\ -^{\bar{l}|l}\tilde{r}_{l_s} \cdot {}^{\bar{l}}Q_l & ^{\bar{l}}Q_l \end{bmatrix}. \tag{2.264}$$

From Eqs. (2.264) and (2.263), then $$\Big] \cdot \begin{bmatrix} ^{\bar{l}}Q_l & O \\ -^{\bar{l}|l}\tilde{r}_{l_s} \cdot {}^{\bar{l}}Q_l & ^{\bar{l}}Q_l \end{bmatrix} = \begin{bmatrix} ^{\bar{\bar{l}}}Q_{\bar{l}} \\ -^{\bar{\bar{l}}|\bar{l}}\tilde{r}_l \cdot {}^{\bar{\bar{l}}}Q_l - {}^{\bar{\bar{l}}}Q_{\bar{l}} \cdot {}^{\bar{l}|l}\tilde{r}_{l_s} \cdot {}^{\bar{l}}Q_l \end{bmatrix}$$

$$\begin{bmatrix} ^{\bar{\bar{l}}}Q_l & O \\ -\left(^{\bar{\bar{l}}|\bar{l}}\tilde{r}_l + {}^{\bar{\bar{l}}|l}\tilde{r}_{l_s}\right) \cdot {}^{\bar{\bar{l}}}Q_l & ^{\bar{\bar{l}}}Q_l \end{bmatrix} - {}^{\bar{\bar{l}}}1$$

So $$^{\bar{\bar{l}}}T_{\bar{l}} \cdot {}^{\bar{l}}T_l = {}^{\bar{\bar{l}}}T_l. \tag{2.265}$$

Eq. (2.265) shows that the twist transfer matrix has cascade operation.

[2] Inverse of the Twist Transfer Matrix

Note $$^{l}T_{\bar{l}} = \begin{bmatrix} ^{l}Q_{\bar{l}} & O \\ ^{l}\tilde{r}_{l_s} \cdot {}^{l}Q_{\bar{l}} & ^{l}Q_{\bar{l}} \end{bmatrix}, \tag{2.266}$$

According to Eqs. (2.264) and (2.266), then $$^{\bar{l}}T_l \cdot {}^{l}T_{\bar{l}} = \begin{bmatrix} ^{\bar{l}}Q_l & O \\ -^{\bar{l}|l}\tilde{r}_{l_s} \cdot {}^{\bar{l}}Q_l & ^{\bar{l}}Q_l \end{bmatrix} \cdot \begin{bmatrix} ^{l}Q_{\bar{l}} & O \\ ^{l}\tilde{r}_{l_s} \cdot {}^{l}Q_{\bar{l}} & ^{l}Q_{\bar{l}} \end{bmatrix} = \begin{bmatrix} 1 & O \\ -^{\bar{l}|l}\tilde{r}_{l_s} + {}^{\bar{l}}Q_l \cdot {}^{l}\tilde{r}_{l_s} \cdot {}^{l}Q_{\bar{l}} & 1 \end{bmatrix} - \begin{bmatrix} 1 & O \\ -^{\bar{l}|l}\tilde{r}_{l_s} + {}^{\bar{l}|l}\tilde{r}_{l_s} & 1 \end{bmatrix} - \begin{bmatrix} 1 & O \\ 0 & 1 \end{bmatrix}.$$

So $$^{\bar{l}}T_l \cdot {}^{l}T_{\bar{l}} = \begin{bmatrix} 1 & 0 \\ 0 & 1 \end{bmatrix}. \tag{2.267}$$

$^{\bar{l}}T_l$ and $^{l}T_{\bar{l}}$ are inversable, i.e.

$$^{\bar{l}}T_l^{-1} = {}^{l}T_{\bar{l}}. \tag{2.268}$$

Motion Screw

[1] Plücker Coordinates of Spatial Straight Lines

The joint pair $^{\bar{l}}k_l \in C$ is given, and the parameter equation of any point $l_S$ on the Axis-vector $^{\bar{l}}n_l$ is expressed as $$^{\bar{l}}r_{l_s} = {}^{\bar{l}}r_l + s \cdot {}^{\bar{l}}n_l; \tag{2.269}$$

wherein S is a linear parameter. $[^{\bar{l}}n_l, {}^{\bar{l}}\tilde{r}_l \cdot {}^{\bar{l}}n_l]^T$ are Plücker coordinates; the first three coordinates are the unit direction vectors $^{\bar{l}}n_l$ of the line, and the last three coordinates are moment of $^{\bar{l}}r_l$ and the unit direction vector $^{\bar{l}}n_l$. The space line has two DOFs, that is, two degrees of freedom. Therefore, in the line Plücker coordinates, there must be four constraints, i.e. $^{\bar{l}}n_l^T \cdot {}^{\bar{l}}n_l = 1$ and $^{\bar{l}}\tilde{n}_l \cdot {}^{\bar{l}}\tilde{r}_l \cdot {}^{\bar{l}}n_l = 0$. Thus, Plücker coordinates are not vectors, but arrays, in line with matrix calculation. Note $$^{\bar{l}}\xi_{l_s} = \begin{bmatrix} ^{\bar{l}}n_l \\ ^{\bar{l}}\tilde{r}_{l_s} \cdot {}^{\bar{l}}n_l \end{bmatrix}, \quad {}^{\bar{l}}\xi_l = \begin{bmatrix} ^{\bar{l}}n_l \\ ^{\bar{l}}\tilde{r}_l \cdot {}^{\bar{l}}n_l \end{bmatrix}, \tag{2.270}$$

since $$^{\bar{l}}\xi_{l_s} = \begin{bmatrix} ^{\bar{l}}n_l \\ ^{\bar{l}}\tilde{r}_l \cdot {}^{\bar{l}}n_l - \left(^{\bar{l}}\tilde{r}_l - {}^{\bar{l}}\tilde{r}_{l_s}\right) \cdot {}^{\bar{l}}n_l \end{bmatrix} = \begin{bmatrix} 1 & O \\ ^{\bar{l}}\tilde{r}_l - {}^{\bar{l}}\tilde{r}_{l_s} & 1 \end{bmatrix}, \tag{2.271}$$

$$\backslash \cdot \begin{bmatrix} ^{\bar{l}}n_l \\ ^{\bar{l}}\tilde{r}_l \cdot {}^{\bar{l}}n_l \end{bmatrix} = \begin{bmatrix} 1 & O \\ ^{\bar{l}}\tilde{r}_l - {}^{\bar{l}}\tilde{r}_{l_s} & 1 \end{bmatrix} \cdot {}^{\bar{l}}\xi_l$$

$$^{\bar{l}}\xi_{l_s} = {}^{\bar{l}}U_{l_s}^{l} \cdot {}^{\bar{l}}\xi_l,$$

wherein $$^{\bar{l}}U_{l_s}^{l} = \begin{bmatrix} 1 & 0 \\ ^{\bar{l}}\tilde{r}_l - {}^{\bar{l}}\tilde{r}_{l_s} & 1 \end{bmatrix}. \tag{2.272}$$

Eq. (2.271) is called the Plücker coordinate transfer equation. Since $$^{\bar{l}}U_{l_s}^{\ell-1} = \begin{bmatrix} 1 & O \\ ^{\bar{l}}\tilde{r}_l - {}^{\bar{l}}\tilde{r}_{l_s} & 1 \end{bmatrix}^{-1} = \begin{bmatrix} 1 & O \\ ^{\bar{l}}\tilde{r}_{l_s} - {}^{\bar{l}}\tilde{r}_l & 1 \end{bmatrix}, \tag{2.273}$$

$$^{\bar{l}}\xi_l = {}^{\bar{l}}U_{l_s}^{\ell-1} \cdot {}^{\bar{l}}\xi_{l_s}.$$

In kinematics, a straight line at an infinitely distant location is a straight line without direction, and its matrices are directional and independent of the measurement of this point. Note $^{\bar{l}}u_l = {}^{\bar{l}}r_l / |r_l^{l}|$, from Eq. (2.270), then $$\lim_{r_l^{\bar{l}} \to 0} \left( ^{\bar{l}}\xi_l \Big/ \left| r_l^{\bar{l}} \right| \right) = \lim_{r_l^{\bar{l}} \to 0} \left( \begin{bmatrix} ^{\bar{l}}n_l / \left| r_l^{\bar{l}} \right| \\ ^{\bar{l}}\tilde{r}_l \cdot {}^{\bar{l}}n_l / \left| r_l^{\bar{l}} \right| \end{bmatrix} \right) = \begin{bmatrix} 0_3 \\ ^{\bar{l}}\tilde{u}_l \cdot {}^{\bar{l}}n_l \end{bmatrix}. \tag{2.274}$$

[2] 3D Space Pole

Figure 27:
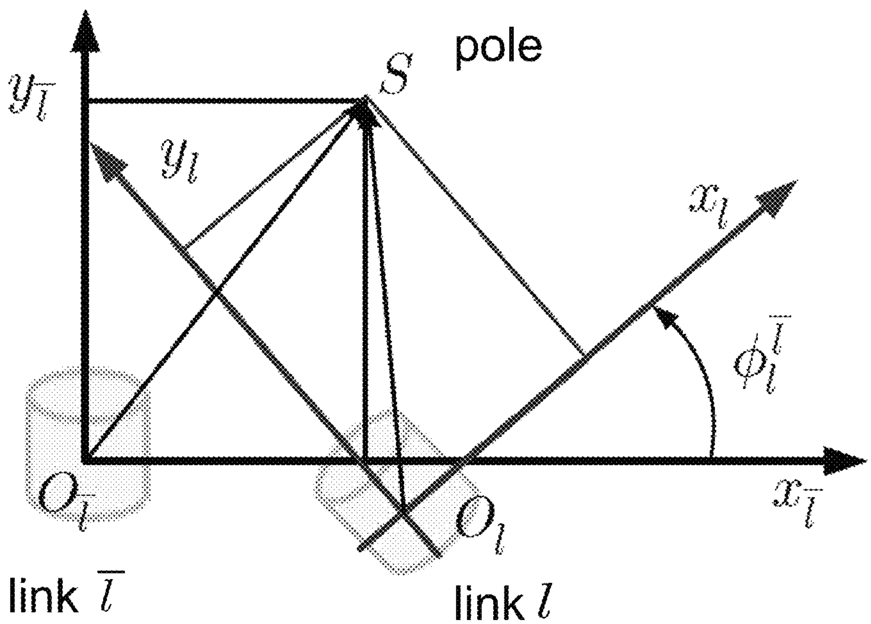
FIG. 27 is a diagram of two-dimensional space pole.

As shown in FIG. 27, in 2D space, when frame $\bar{l}$ 2707 rotates with an angle of $\phi_l^{\bar{l}}$ to Frame l 2702, there is always a point S, which meet $^{l}r_{l_S}=1\cdot{}^{\bar{l}}r_{l_S}$, i.e. the point S is unchanged relative to the coordinates of the two frames, and this point S is called the pole.

Figure 28:
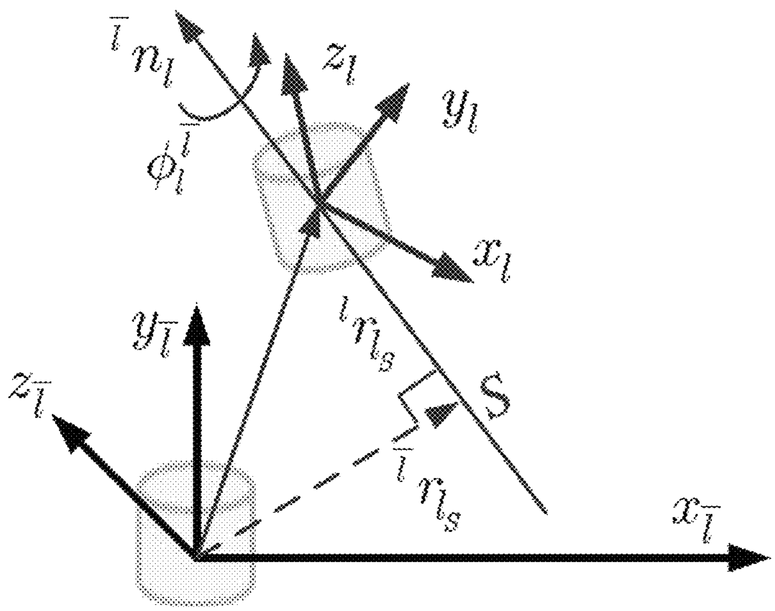
FIG. 28 is a diagram of sports spiral.

As shown in FIG. 28, the joint pair $^{\bar{l}}k_l\in C$ is given, and there is a pole $l_S$ in the 3D space.

PROOF: If there is a pole $^{l}r_{l_S}$, of the spiral line in frame l, i.e. it meets $$^{l}r_{l_S}=1\cdot{}^{\bar{l}}r_{l_S}, \tag{2.275}$$

$$^{\bar{l}}r_{l_S}={}^{\bar{l}}r_l+{}^{\bar{l}}Q_l\cdot{}^{l}r_{l_S}. \tag{2.276}$$

Therefore $$^{l}r_{l_S} = \frac{1}{2\cdot\tau_l^{\bar{l}}}\cdot\left(\tau_l^{\bar{l}}\cdot 1 - {}^{\bar{l}}\tilde{n}_l^{-1}\right)\cdot{}^{\bar{l}}r_l. \tag{2.277}$$

Substitute Eqs. (2.71) and (2.275) into Eq. (2.276), then $$^{\bar{l}}r_{l_S}={}^{\bar{l}}r_l+(1-{}^{\bar{l}}\tilde{n}_l\cdot\tau_l^{\bar{l}})^{-1}\cdot(1+{}^{\bar{l}}\tilde{n}_l\cdot\tau_l^{\bar{l}})\cdot{}^{l}r_{l_S}={}^{l}r_{l_S},$$

so $$(1-{}^{\bar{l}}\tilde{n}_l\cdot\tau_l^{\bar{l}})\cdot{}^{l}r_{l_S}=(1-{}^{\bar{l}}\tilde{n}_l\cdot\tau_l^{\bar{l}})\cdot{}^{\bar{l}}r_l+(1+{}^{\bar{l}}\tilde{n}_l\cdot\tau_l^{\bar{l}})\cdot{}^{l}r_{l_S},$$

i.e.

$$(1-{}^{\bar{l}}\tilde{n}_l\cdot\tau_l^{\bar{l}})\cdot{}^{\bar{l}}r_l+2\cdot\tau_l^{\bar{l}}\cdot{}^{\bar{l}}\tilde{n}_l\cdot{}^{l}r_{l_S}=0_3,$$

i.e $$\tau_l^{\bar{l}}\cdot{}^{\bar{l}}\tilde{n}_l\cdot{}^{l}r_{l_S}=\tfrac{1}{2}\cdot({}^{\bar{l}}\tilde{n}_l\cdot\tau_l^{\bar{l}}-1)\cdot{}^{\bar{l}}r_l.$$

Therefore, $$\tau_l^{\bar{l}}\cdot{}^{\bar{l}}\tilde{n}_l^{:2}\cdot{}^{l}r_{l_S}=\tfrac{1}{2}\cdot({}^{\bar{l}}\tilde{n}_l^{:2}\cdot\tau_l^{\bar{l}}-{}^{\bar{l}}\tilde{n}_l)\cdot{}^{\bar{l}}r_l,$$

i.e.

$$\tau_l^{\bar{l}}\cdot{}^{\bar{l}}\tilde{n}_l^{:2}\cdot{}^{\bar{l}}r_l-{}^{\bar{l}}\tilde{n}_l\cdot{}^{\bar{l}}r_l=2\cdot\tau_l^{\bar{l}}\cdot{}^{\bar{l}}\tilde{n}_l^{:2}\cdot{}^{l}r_{l_S}.$$

Thus, Eq. (2.277) is set. The $^{l}r_{l_S}$ is called the polar moment vector of the spiral line. Q.E.D.

The joint pair $^{\bar{l}}k_l\in C$ is given, for any position vector $^{\bar{l}}r_{l_S}$, there is always an Axis-vector $^{\bar{l}}n_l$ through the point $l_S$, which is irrelevant to the rotation of frame l.

PROOF: As shown in FIG. 28, from Eq. (2.276), then $$^{\bar{l}}n_l^{T}\cdot{}^{\bar{l}}r_{l_S}={}^{\bar{l}}n_l^{T}\cdot{}^{\bar{l}}r_l+{}^{\bar{l}}n_l^{T}\cdot{}^{\bar{l}}Q_l\cdot{}^{l}r_{l_S}. \tag{2.278}$$

Eqs. (2.59) and (2.278) result in $$^{\bar{l}}n_l^T\cdot{}^{\bar{l}}r_{l_S} = {}^{\bar{l}}n_l^T\cdot{}^{\bar{l}}r_l+{}^{\bar{l}}n_l^T\cdot\left(1+S(\phi_l^{\bar{l}})\cdot{}^{\bar{l}}\tilde{n}_l+\left(1-C(\phi_l^{\bar{l}})\right)\cdot{}^{\bar{l}}\tilde{n}_l^{:2}\right)\cdot{}^{l}r_{l_S} = {}^{\bar{l}}n_l^T\cdot{}^{\bar{l}}r_l+{}^{\bar{l}}n_l^T\cdot{}^{l}r_{l_S},$$

and $$^{\bar{l}}n_l^{T}\cdot{}^{\bar{l}}r_{l_S}={}^{\bar{l}}n_l^{T}\cdot{}^{\bar{l}}r_l+{}^{\bar{l}}n_l^{T}\cdot{}^{l}r_{l_S}.$$

This equation shows that it is irrelevant to the angular position $\phi_l^{\bar{l}}$. Q.E.D.

From the proof above, a point $l_S$ on frame l is given, then there is an invariant $^{\bar{l}}n_l^{T}\cdot{}^{l}r_{l_S}$. The twist step $p_S$ of point $l_S$ is $$p_S = \frac{{}^{l}n_l^T\cdot{}^{l}r_{l_s}}{\phi_l^{\bar{l}}}(m/\text{rad}). \tag{2.279}$$

Thus, $$p_S\cdot\phi_l^{\bar{l}}={}^{\bar{l}}n_l^{T}\cdot{}^{\bar{l}}r_{l_S}={}^{\bar{l}}n_l^{T}\cdot{}^{\bar{l}}r_l.$$

From Eq. (2.276), we obtain the screw curve equation $$^{\bar{l}}r_{l_S} = {}^{\bar{l}}r_l + {}^{\bar{l}|l}r_{l_S} = {}^{\bar{l}}r_l + {}^{\bar{l}}Q_l\cdot{}^{l|\bar{l}}n_l\cdot p_S\cdot\phi_l^{\bar{l}} = {}^{\bar{l}}r_l + {}^{\bar{l}}n_l\cdot p_S\cdot\phi_l^{\bar{l}}. \tag{2.280}$$

From Eq. (2.280), we obtain the 6D twist and step expression.

$$\begin{bmatrix} {}^{\bar{\bar{l}}}\dot{\phi}_{\bar{l}} \\ {}^{\bar{\bar{l}}}\dot{\tilde{\phi}}_{\bar{l}}\cdot{}^{\bar{\bar{l}}|\bar{l}}r_{l_s} \end{bmatrix} = \begin{bmatrix} {}^{\bar{\bar{l}}}\dot{\phi}_{\bar{l}} \\ {}^{\bar{\bar{l}}}\dot{\tilde{\phi}}_{\bar{l}}\cdot\left({}^{\bar{\bar{l}}|\bar{l}}r_{l_s}+{}^{\bar{\bar{l}}|\bar{l}}n_l\cdot p_S\cdot\phi_l^{\bar{l}}\right) \end{bmatrix}. \tag{2.281}$$

MAS Forward Kinematics Based on Axis-Invariant

Accurate Calibration of Fixed Axis-Invariants

Due to the machining and assembly processes of MASs inevitably cause errors in designing structural parameters, it is necessary to solve accurate calibration of engineering structural parameters in MASs. The following will elaborate the method of accurately measuring the engineering structural parameters in the MAS with an automatic laser tracking system.

The MAS D={T, A, B, K, F, NT} refers to natural frame SEQS F, The natural coordinate system F is the origin at the joint axis, and has the same coordinate system direction when system reset, $I=[{}^{\bar{l}}I_l=[{}^{\bar{l}}n_l,{}^{\bar{l}}l_l]|l\in A]$—the structural parameter SEQS. The joint space is expressed as $$c = \left\{ q_l \middle| \begin{matrix} r_l^{\bar{l}}\equiv 0, & q_l=\phi_l^{\bar{l}} & \text{if } {}^{\bar{l}}k_l\in R; \\ \phi_l^{\bar{l}}\equiv 0, & q_l=r_l^{\bar{l}} & \text{if } {}^{\bar{l}}k_l\in P; \end{matrix}\ l\in A \right\}. \tag{2.282}$$

The measurement of fixed Axis-invariants is shown in FIG. 29. Laser track balls $l_{S'}$ 2902 and $l_S$ 2901 are fixed on link l for measurement with a laser tracker. After the rotation of axis l 2903 with an angle of $_a\phi_l^{\bar{l}}$, the positions of laser track balls $l_{S'}$ and $l_S$ are $_a{}^{i}r_{l_{S'}}$ and $_a{}^{i}r_{l_S}$. After the rotation of axis l with an angle of $_b\phi_l^{\bar{l}}$, the positions of the laser track balls $l_{S'}$ and $l_S$ are $_b{}^{i}r_{l_{S'}}$ and $_b{}^{i}r_{l_S}$. Thus, the unit position vectors $_a{}^{\bar{l}}u_l$ and $_b{}^{\bar{l}}u_l$ are obtained. The above steps are performed by axes from root to leaf.

When the system is in the natural zero-position, the Axis-invariant $I=[{}^{\bar{l}}I_l=[{}^{\bar{l}}n_l,{}^{\bar{l}}l_l]|l\in A]$ can be measured with a laser tracker or a 3D coordinate machine. The Axis-invariant is measured relatively to the common natural frame $F^{[i]}$ to eliminate the cumulative effect of measurement errors. In order to consider the machining and assembly errors, we often consolidate the measurement prism and the link l, then track the position of the measurement prism center $l_S$ through a laser tracker i to obtain the corresponding position vector $^{i}r_{l_S}$, so that the unit vector $^{i|\bar{l}}u_l$ consolidated with the measured link l is obtained.

Figure 30:
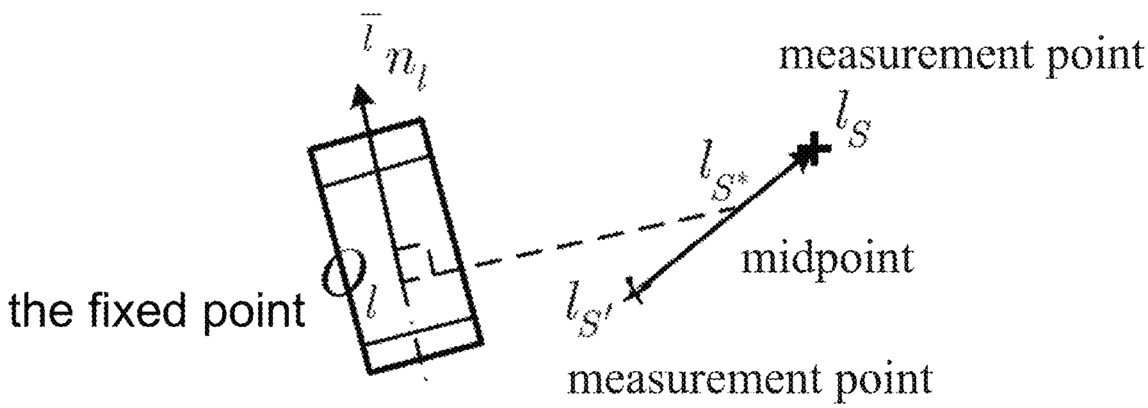
FIG. 30 is an origin determination diagram of fixed Axis-Invariant.

The calculation process of the Axis-invariant $^{\bar{l}}n_l$ is as follows: First, apply Eq. (2.127) to determine $^{i}\lambda_{\bar{l}}$ and $^{i}\lambda_l$; second, because $^{i}Q_{\bar{l}}$ is known, apply Eq. (2.142) to obtain $^{\bar{l}}\lambda_l={}^{i}\tilde{\lambda}_{\bar{l}}^{-1}\,{}^{i}\lambda_l$; third, substitute $^{\bar{l}}\lambda_l$ into Eq. (2.153) to obtain $\phi_l^{\bar{l}}$; finally, obtain $^{\bar{l}}n_l$ from Eq. (2.151). As shown in FIG. 30, the intersection obtained by drawing a vertical line from the midpoint $l_S^*$ 3003 of the measurement points $l_{S'}$ 3001 and $l_S$ 3002 to the Axis-invariant $^{\bar{l}}n_l$ 3004 is defined as the fixed point $O_l$ 3005 of axis l.

Then $$ {}^{i}r_{l_{S^*}} = \frac{1}{2}\cdot\left({}^{i}r_{l_{S'}} + {}^{i}r_{l_S}\right), \tag{2.283}$$

$$ {}^{i}r_{l_{S^*}} = {}^{i}r_{l} + {}^{i}Q_{\bar{l}}\cdot{}^{\bar{l}}Q_{l}\cdot{}^{l}r_{l_{S^*}} = \frac{1}{2}\cdot\left({}^{i}r_{l_{S'}} + {}^{i}r_{l_S}\right). \tag{2.284}$$

According to Eq. (2.284), $$\begin{aligned} {}^{i}r_{l} &= {}^{i}Q_{\bar{l}} + {}^{\bar{l}}Q_{l}\left({}_{a}\phi_{l}^{\bar{l}}\right)\cdot{}^{l}r_{S^*} = \frac{1}{2}\left({}_{a}^{i}r_{S'} + {}_{a}^{i}r_{S}\right) \\ {}^{i}r_{l} &= {}^{i}Q_{\bar{l}} + {}^{\bar{l}}Q_{l}\left({}_{b}\phi_{l}^{\bar{l}}\right)\cdot{}^{l}r_{S^*} = \frac{1}{2}\left({}_{b}^{i}r_{S'} + {}_{b}^{i}r_{S}\right) \end{aligned}. \tag{2.285}$$

From Eq. (2.285), $$ {}^{i}Q_{\bar{l}}\cdot\left({}^{\bar{l}}Q_{l}\left({}_{a}\phi_{l}^{\bar{l}}\right) - {}^{\bar{l}}Q_{l}\left({}_{b}\phi_{l}^{\bar{l}}\right)\right)\cdot{}^{l}r_{S^*} = \frac{1}{2}\cdot\left({}_{a}^{i}r_{S'} + {}_{a}^{i}r_{S}\right) - \frac{1}{2}\cdot\left({}_{b}^{i}r_{S'} + {}_{b}^{i}r_{S}\right). \tag{2.286}$$

obtain $$ {}^{l}r_{l_{S^*}} = \frac{1}{2}\cdot\left(\left(S\left({}_{a}\phi_{l}^{\bar{l}}\right) - S\left({}_{b}\phi_{l}^{\bar{l}}\right)\right)\cdot{}^{\bar{l}}\tilde{n}_{l} + \left(C\left({}_{a}\phi_{l}^{\bar{l}}\right) - C\left({}_{b}\phi_{l}^{\bar{l}}\right)\right)\cdot 1\right)^{-1}\backslash\cdot \; {}^{\bar{l}}Q_{i}\cdot\left({}_{a}^{i}r_{S'} + {}_{a}^{i}r_{S} - {}_{b}^{i}r_{S'} + {}_{b}^{i}r_{S}\right) \tag{2.287}$$

Substitute Eq. (2.287) into Eq. (2.285), then ${}^{i}r_{l}$ is obtained, $$ {}^{i}r_{l} = -\frac{1}{2}\cdot{}^{i}Q_{\bar{l}}\cdot\begin{pmatrix}\left(S\left({}_{a}\phi_{l}^{\bar{l}}\right) - S\left({}_{b}\phi_{l}^{\bar{l}}\right)\right)\cdot{}^{\bar{l}}\tilde{n}_{l}\backslash+ \\ \left(C\left({}_{a}\phi_{l}^{\bar{l}}\right) - C\left({}_{b}\phi_{l}^{\bar{l}}\right)\right)\cdot 1\end{pmatrix}^{-1}\backslash\cdot \; {}^{\bar{l}}Q_{i}\cdot\left({}_{a}^{i}r_{S'} + {}_{a}^{i}r_{S} - {}_{b}^{i}r_{S'} - {}_{b}^{i}r_{S}\right) + \frac{1}{2}\cdot\left({}_{a}^{i}r_{S'} + {}_{a}^{i}r_{S}\right), \tag{2.288}$$

or $$ {}^{i}r_{l} = -\frac{1}{2}\cdot{}^{i}Q_{\bar{l}}\cdot \begin{pmatrix}\left(S\left({}_{a}\phi_{l}^{\bar{l}}\right) - S\left({}_{b}\phi_{l}^{\bar{l}}\right)\right)\cdot{}^{\bar{l}}\tilde{n}_{l} + \backslash \\ \left(C\left({}_{a}\phi_{l}^{\bar{l}}\right) - C\left({}_{b}\phi_{l}^{\bar{l}}\right)\right)\cdot 1\end{pmatrix}^{-1}\cdot\backslash\cdot{}^{\bar{l}}Q_{i}\cdot\left({}_{a}^{i}r_{S'} + {}_{a}^{i}r_{S} - {}_{b}^{i}r_{S'} - {}_{b}^{i}r_{S}\right) + \frac{1}{2} \left({}_{b}^{i}r_{S'} + {}_{b}^{i}r_{S}\right). \tag{2.289}$$

From the above, the condition ${}^{\bar{l}}n_l \neq {}^{\bar{l}}u_l$ is easier to meet than the orthogonal basis $e_l$. This method helps to accurately measure the fixed Axis-invariants including machining and assembly errors.

In the engineering survey, we usually start from the root link of a MAS and go through to its children links; after each measurement of a link, you can brake it. The joint variables of all braked links are set to their natural zero-positions, and the outputs by the joint sensors are noted as $$ {}_{0}q^{\Delta} = \left[{}_{0}q_{l}^{\Delta} \,\middle|\, l\in A\right], $$

called mechanical zero position. And $$ {}_{0}^{\bar{l}}Q_{l} = 1,\ l\in A. \tag{2.290}$$

At this point, we obtain the structural parameter SEQS $$ I = \left[{}^{\bar{l}}I_{l} = \left[{}^{\bar{l}}n_{l}\ \ {}^{\bar{l}}l_{l}\right]^{T} \,\middle|\, l\in A\right] $$

and the natural zero-position SEQS $$ {}_{0}q^{\Delta} = \left[{}_{0}q_{l}^{\Delta} \,\middle|\, l\in A\right]. $$

The inputs of joint drivers is noted as the control input SEQS $q^{\Delta}=[q_l^{\Delta}|l\in A]$. At the same time, joint variable SEQS has a reference zero-position SEQS $q^{\dagger}=[{}_0q_l^{\dagger}|l\in A]$. The relationship between the joint variable SEQS q, the control input SEQS $q^{\Delta}$ of joint drivers, the natural zero-position SEQS ${}_0q^{\Delta}$ and the reference zero-position ${}_0q_l^{\dagger}$ in Eq. (2.282), is as follows:

$$ q_l = q_l^{\Delta} - {}_{0}q_l^{\Delta} + {}_{0}q_l^{\dagger}. \tag{2.291}$$

When the FK calculation of the MAS refers to the calculation process in which the desired configuration parameters $$ I = \left[{}^{\bar{l}}I_{l} = \left[{}^{\bar{l}}n_{l}\ \ {}^{\bar{l}}l_{l}\right]^{T} \,\middle|\, l\in A\right], $$

the joint coordinate SEQS q, the joint velocity SEQS $\dot{q}$ and the joint acceleration SEQS $\ddot{q}$ are given, the calculation process of the desired configuration, velocity, acceleration and deceleration will be completed.

From the above, we can accurately measure the fixed Axis-invariant ${}^{\bar{l}}I_l$ in engineering to achieve the accuracy of optical measuring equipment. The method avoids excessive errors in the measurement of structural parameters with the traditional ideal Cartesian system as reference, and lays the foundation for the realization of engineering measurements for the development of MASs.

Ideal AC Calculation Process

The AC ${}^{i}l_n$ and axis l,n∈A are given, n>l, s is any point on link l; when ${}^{\bar{l}}\phi_l$ has non-measurement noise, the FK process of the AC ${}^{i}l_n$ is as follows:

[1] FK Calculation of the Primitive AC ${}^{\bar{l}}l_l$

[1-1] If ${}^{\bar{l}}k_l\in R$, calculate the Euler quaternion, ${}^{\bar{l}}\lambda_l$ according to Eq. (2.130) from the structural parameter ${}^{\bar{l}}n_l$ and Joint variable $\phi_l^{\bar{l}}$, or calculate ${}^{\bar{l}}\mathfrak{q}_l$ with Eq. (2.93).

[1-2] If ${}^{\bar{l}}k_l\in R$, calculate the rotation matrix ${}^{\bar{l}}Q_l$ with Eq. (2.131), or calculate the rotation matrix ${}^{\bar{l}}Q_l$ with Eq. (2.99). If ${}^{\bar{l}}k_l\in P$, then ${}^{\bar{l}}Q_l=1$.

[2] Configuration Calculation of the AC ${}^{i}l_n$

[2-1] Calculate the homogeneous transformation matrix ${}^{i}Q_n$ with Eq. (2.6);

[2-2] Calculate the position vector ${}^{i}r_{n_s}$ with Eq. (2.8).

In the ideal FK calculation process, both the Euler quaternion and finite rotation quaternion can be applied to calculate the AC rotation matrix.

The above ideal FK calculation process is widely applied in Open Inventor, Coin3D, and other 3D software. When there is any measurement noise, Eqs. (2.131) and (2.147) are applied in all rotation matrix calculations. On the one hand, it is necessary to reduce the ill-conditioned rotation matrix caused by measurement noise; on the other hand, it is necessary to prevent the ill-conditioned deterioration of the ill-conditioned rotation matrix in concatenation.

Iterative FK Calculation Based on Axis-Invariant

Given the AC ${}^{i}\mathbf{1}_n$ and axes l,n∈A, n>l, s is any point on link l. When ${}^{\bar{l}}\phi_l$ has measurement noise, the iterative FK numerical calculation of the AC ${}^{i}\mathbf{1}_n$ is:

[1] FK calculation of the AC ${}^{\bar{l}}\mathbf{1}_l$

[1-1] Calculate the Euler quaternion ${}^{\bar{l}}\lambda_l$ a according to Eq. (2.130) from the rotation vector ${}^{\bar{l}}\phi_l$;

[1-2] Calculate the rotation matrix ${}^{\bar{l}}Q_l$ with Eq. (2.131);

[1-3] Calculate the chain velocity ${}^{\bar{l}}\dot{r}_l$ and ${}^{\bar{l}}\dot{\phi}_l$ with Eq. (2.9);

[1-4] Calculate the chain acceleration ${}^{\bar{l}}\ddot{r}_l$ and ${}^{\bar{l}}\ddot{\phi}_l$ with Eq. (2.10).

[2] Configuration calculation of the AC ${}^{i}\mathbf{1}_n$

[2-1] Calculate the Euler quaternion SEQS $[{}^{i}\lambda_j|j\in A]$ with equation (2.146);

[2-2] Since Eq. (2.131) is higher than Eq. (2.59) in computational complexity, calculate the rotation matrix SEQS $[{}^{i}Q_j|j\in A]$ with Eq. (2.59);

[2-3] Calculate the position vector ${}^{i}r_{n_s}$ with Eq. (2.8).

[3] Velocity and acceleration of the AC ${}^{i}\mathbf{1}_n$

[3-1] Calculate the absolute angular velocity ${}^{i}\dot{\phi}_n$ with Eq. (2.292), $$ {}^{i}\dot{\phi}_n = \sum_k^{{}^{i}\mathbf{1}_n}\left({}^{i|\bar{k}}\dot{\phi}_k\right) = \sum_k^{{}^{i}\mathbf{1}_n}\left({}^{i|\bar{k}}n_k \cdot \dot{\phi}_k^{\bar{k}}\right). \tag{2.292} $$

PROOF: Eq. (2.189) results in $$ {}^{i}\dot{\phi}_n = {}^{i}\phi'_n = \sum_k^{{}^{i}\mathbf{1}_n}\left({}^{i|\bar{k}}\phi'_k\right) = \sum_k^{{}^{i}\mathbf{1}_n}\left({}^{i|\bar{k}}\phi'_k\right) = \sum_k^{{}^{i}\mathbf{1}_n}\left({}^{i|\bar{k}}n_k \cdot \dot{\phi}_k^{\bar{k}}\right). $$

Q.E.D.

[3-2] Calculate the absolute angular acceleration ${}^{i}\ddot{\phi}_n$ with Eq. (2.293)

$$ {}^{i}\ddot{\phi}_n = {}^{i}\phi''_n = \sum_k^{{}^{i}\mathbf{1}_n}\left({}^{i|\bar{k}}\ddot{\phi}_k\right) = \sum_k^{{}^{i}\mathbf{1}_n}\left({}^{i|\bar{k}}n_k \cdot \ddot{\phi}_k^{\bar{k}}\right). \tag{2.293} $$

PROOF: From Eq. (2.195), so $$ {}^{i}\ddot{\phi}_n = {}^{i}\phi''_n = \sum_k^{{}^{i}\mathbf{1}_n}\left({}^{i|\bar{k}}\phi''_k\right) = \sum_k^{{}^{i}\mathbf{1}_n}\left({}^{i|\bar{k}}\ddot{\phi}_k\right) = \sum_k^{{}^{i}\mathbf{1}_n}\left({}^{i|\bar{k}}n_k \cdot \ddot{\phi}_k^{\bar{k}}\right). $$

Q.E.D.

[3-3] Calculate the absolute translation velocity ${}^{i}\dot{r}_{nS}$ with Eq. (2.294), $$ \begin{aligned} {}^{i}\dot{r}_{nS} = &\sum_k^{{}^{i}\mathbf{1}_n}\left({}^{i|\bar{k}}n_k \cdot \dot{r}_k^{\bar{k}} + {}^{i}\dot{\tilde{\phi}}_{\bar{k}} \cdot \left({}^{i|\bar{k}}l_k + {}^{i|\bar{k}}n_k \cdot r_k^{\bar{k}}\right)\right) \\ &+ {}^{i|n}\dot{r}_{nS} + {}^{i}\dot{\tilde{\phi}}_n \cdot {}^{i|n}r_{nS} \end{aligned}. \tag{2.294} $$

PROOF: From Eq. (2.187), then $$ \begin{aligned} {}^{i}\dot{r}_{n_S} = {}^{i}r'_{n_S} &= \sum_k^{{}^{i}\mathbf{1}_n}\left({}^{i|\bar{k}}r'_k\right) + {}^{i|n}r'_{n_S} \\ &= \sum_k^{{}^{i}\mathbf{1}_n}\left({}^{i|\bar{k}}\dot{r}_k + {}^{i}\dot{\tilde{\phi}}_{\bar{k}} \cdot {}^{i|\bar{k}}r_k\right) + {}^{i|n}\dot{r}_{n_S} + {}^{i}\dot{\tilde{\phi}}_n \cdot {}^{i|n}r_{n_S} \\ &= \sum_k^{{}^{i}\mathbf{1}_n}\left({}^{i|\bar{k}}n_k \cdot \dot{r}_k^{\bar{k}} + {}^{i}\dot{\tilde{\phi}}_{\bar{k}} \cdot \left({}^{i|\bar{k}}l_k + {}^{i|\bar{k}}n_k \cdot r_k^{\bar{k}}\right)\right) + {}^{i|n}\dot{r}_{n_S} + {}^{i}\dot{\tilde{\phi}}_n \cdot {}^{i|n}r_{n_S} \end{aligned}. $$

Q.E.D.

[3-4] Calculate the absolute translation acceleration ${}^{i}r_{n_s}$ with Eq. (2.295), $$ \begin{aligned} {}^{i}\ddot{r}_{n_S} = &\sum_k^{{}^{i}\mathbf{1}_n}\left[\begin{array}{c} {}^{i|\bar{k}}n_k \cdot \ddot{r}_k^{\bar{k}} + 2 \cdot {}^{i}\dot{\tilde{\phi}}_{\bar{k}} \cdot {}^{i|\bar{k}}n_k \cdot \dot{r}_k^{\bar{k}} \\ + \left({}^{i}\ddot{\tilde{\phi}}_{\bar{k}} + {}^{i}\dot{\tilde{\phi}}_{\bar{k}}^{:2}\right) \cdot \left({}^{i|\bar{k}}l_k + {}^{i|\bar{k}}n_k \cdot r_k^{\bar{k}}\right) \end{array}\right]. \\ &+ {}^{i|n}\ddot{r}_{n_S} + 2 \cdot {}^{i}\dot{\tilde{\phi}}_n \cdot {}^{i|n}\dot{r}_{n_S} + \left({}^{i}\ddot{\tilde{\phi}}_n + {}^{i}\dot{\tilde{\phi}}_n^{:2}\right) \cdot {}^{i|n}r_{n_S} \end{aligned} \tag{2.295} $$

PROOF: From Eq. (2.192), we get $$ \begin{aligned} {}^{i}\ddot{r}_{n_S} = {}^{i}r''_{n_S} &= \sum_k^{{}^{i}\mathbf{1}_n}\left({}^{i|\bar{k}}r''_k\right) + {}^{i|n}r''_{n_S} \\ &= \sum_k^{{}^{i}\mathbf{1}_n}\left({}^{i|\bar{k}}\ddot{r}_k + 2 \cdot {}^{i}\dot{\tilde{\phi}}_{\bar{k}} \cdot {}^{i|\bar{k}}\dot{r}_k + \left({}^{i}\ddot{\tilde{\phi}}_{\bar{k}} + {}^{i}\dot{\tilde{\phi}}_{\bar{k}}^{:2}\right) \cdot {}^{i|\bar{k}}r_k\right) \\ &+ {}^{i|n}\ddot{r}_{n_S} + 2 \cdot {}^{i}\dot{\tilde{\phi}}_n \cdot {}^{i|n}\dot{r}_{n_S} + \left({}^{i}\ddot{\tilde{\phi}}_n + {}^{i}\dot{\tilde{\phi}}_n^{:2}\right) \cdot {}^{i|n}r_{n_S} \\ &= \sum_k^{{}^{i}\mathbf{1}_n}\left({}^{i|\bar{k}}n_k \cdot \ddot{r}_k^{\bar{k}} + 2 \cdot {}^{i}\dot{\tilde{\phi}}_{\bar{k}} \cdot {}^{i|\bar{k}}n_k \cdot \dot{r}_k^{\bar{k}} + \left({}^{i}\ddot{\tilde{\phi}}_{\bar{k}} + {}^{i}\dot{\tilde{\phi}}_{\bar{k}}^{:2}\right) \cdot \left({}^{i|\bar{k}}l_k + {}^{i|\bar{k}}n_k \cdot r_k^{\bar{k}}\right)\right) \\ &+ {}^{i|n}\ddot{r}_{n_S} + 2 \cdot {}^{i}\dot{\tilde{\phi}}_n \cdot {}^{i|n}\dot{r}_{n_S} + \left({}^{i}\ddot{\tilde{\phi}}_n + {}^{i}\dot{\tilde{\phi}}_n^{:2}\right) \cdot {}^{i|n}r_{n_S} \end{aligned}. $$

Q.E.D.

Iterative Partial Velocity Based on Axis-Invariant

References present the Jacobian matrix calculation method, but do not prove the conclusion and the conclusion is not comprehensive. In the kinematic and dynamic analysis, the Jacobian matrix is more applicable to the partial velocity because the Jacobian matrix generally refers to the partial derivative and does not necessarily have additivity. The partial velocity in the kinematics and dynamics refers to the partial derivative of the vector to joint coordinates and is additive; the partial velocity is the transformation matrix of the corresponding velocity, and is the vector projection to the unit direction vector. In the kinematic and dynamic analysis, the partial velocity plays a key role, and the calculation of the partial velocity is the basic premise of the dynamics system calculus.

First, define the enable function, $$ \delta_k^{{}^{i}\mathbf{1}_l} = \begin{cases} 1 & \text{if } k \in {}^{i}\mathbf{1}_l \\ 0 & \text{if } k \notin {}^{i}\mathbf{1}_l \end{cases}. \tag{2.296} $$

The special form of Eq. (2.296) is $$\delta_k^l = \begin{cases} 1 & \text{if} \quad k = l \\ 0 & \text{if} \quad k \neq l \end{cases}. \tag{2.297}$$

In the following, we will prove the iterative partial velocity formula based on Axis-invariant.

[1] Calculate the partial velocity of the absolute angular velocity to the joint angular velocity according to Eq. (2.298), $$\frac{\partial\, {}^i\phi'_n}{\partial \dot{\phi}_k^{\bar{k}}} = \delta_k^{{}^i 1_n} \cdot {}^{i|\bar{k}}n_k. \tag{2.298}$$

PROOF: From Eq. (2.292), so $$\begin{aligned}
\frac{\partial\, {}^i\phi'_n}{\partial \dot{\phi}_k^{\bar{k}}} &= \frac{\partial}{\partial \dot{\phi}_k^{\bar{k}}} \left( \sum_l^{{}^i 1_k} \left( {}^{i|\bar{l}}\dot{\phi}_l \right) + \sum_l^{{}^i 1_k} \left( {}^{i|\bar{l}}\dot{\phi}_l \right) \right) = \sum_l^{{}^i 1_k} \left( \delta_k^{\bar{l}} \cdot {}^iQ_{\bar{l}} \cdot \frac{\partial}{\partial \dot{\phi}_k^{\bar{k}}} \left( {}^{\bar{l}}\dot{\phi}_l \right) \right) \\
&= {}^iQ_{\bar{k}} \cdot \frac{\partial}{\partial \dot{\phi}_k^{\bar{k}}} \left( {}^{\bar{k}}\dot{\phi}_k \right) = {}^iQ_{\bar{k}} \cdot \frac{\partial}{\partial \dot{\phi}_k^{\bar{k}}} \left( {}^{\bar{k}}n_k \cdot \dot{\phi}_k^{\bar{k}} \right) \\
&= {}^{i|\bar{k}}n_k
\end{aligned}$$

Q.E.D.

[2] Calculate the partial velocity of the absolute translation velocity vector to the joint translation velocity according to Eq. (2.299), $$\frac{\partial\, {}^i r'_{n_S}}{\partial \dot{r}_k^{\bar{k}}} = \delta_k^{{}^i 1_n} \cdot {}^{i|\bar{k}}n_k. \tag{2.299}$$

PROOF:

$$\begin{aligned}
\frac{\partial\, {}^i r'_{n_S}}{\partial \dot{r}_k^{\bar{k}}} &= \frac{\partial}{\partial \dot{r}_k^{\bar{k}}} \left( \begin{aligned} &\sum_l^{{}^i 1_k} \left( {}^{i|\bar{l}}\dot{r}_l + {}^i\dot{\tilde{\phi}}_l \cdot {}^{i|\bar{l}}r_l \right) + \sum_l^{{}^k 1_n} \left( {}^{i|\bar{l}}\dot{r}_l + {}^i\dot{\tilde{\phi}}_j \cdot {}^{i|\bar{l}}r_l \right) \\ &\backslash + {}^{i|n}\dot{r}_{n_S} + {}^i\dot{\tilde{\phi}}_n \cdot {}^{i|n}r_{n_S} \end{aligned} \right) \\
&= \sum_l^{{}^i 1_k} \left( \delta_k^{\bar{l}} \cdot {}^iQ_{\bar{l}} \cdot \frac{\partial}{\partial \dot{r}_k^{\bar{k}}} \left( {}^{\bar{l}}\dot{r}_l \right) \right) \\
&= {}^iQ_{\bar{k}} \cdot \frac{\partial}{\partial \dot{r}_k^{\bar{k}}} \left( {}^{\bar{k}}\dot{r}_k \right) \\
&= {}^{i|\bar{k}}n_k
\end{aligned}.$$

Q.E.D.

[3] Calculate the partial velocity of the absolute rotation vector to the joint angle according to Eq. (2.300), $$\frac{\partial\, {}^i\phi_n}{\partial \phi_k^{\bar{k}}} = \delta_k^{{}^i 1_n} \cdot {}^{i|\bar{k}}n_k. \tag{2.300}$$

PROOF: Eq. (2.292) results in $$\begin{aligned}
\frac{\partial\, {}^i\phi_n}{\partial \phi_k^{\bar{k}}} &= \frac{\partial}{\partial \phi_k^{\bar{k}}} \left( \sum_l^{{}^i 1_k} \left( {}^{i|\bar{l}}\phi_l \right) + \sum_l^{{}^k 1_n} \left( {}^{i|\bar{l}}\phi_l \right) \right) \\
&= \sum_l^{{}^i 1_k} \left( \delta_k^{\bar{l}} \cdot {}^iQ_{\bar{l}} \frac{\partial}{\partial \phi_k^{\bar{k}}} {}^{\bar{l}}\phi_l \right) + {}^iQ_{\bar{k}} \cdot \frac{\partial}{\partial \phi_k^{\bar{k}}} \left( {}^{\bar{k}}Q_k \right) \cdot \sum_l^{{}^k 1_n} \left( {}^{k|\bar{l}}\phi_l \right) \\
&= {}^iQ_{\bar{k}} \cdot \frac{\partial}{\partial \phi_k^{\bar{k}}} \left( {}^{\bar{k}}\phi_{\bar{k}} \right) + {}^iQ_k \cdot {}^{\bar{k}}\tilde{n}_k \cdot \sum_l^{{}^i 1_n} \left( {}^{k|\bar{l}}\phi_l \right) \\
&= {}^iQ_{\bar{k}} \cdot \frac{\partial}{\partial \phi_k^{\bar{k}}} \left( {}^{\bar{k}}n_k \cdot \phi_k^{\bar{k}} \right) + {}^{i|k}\tilde{n}_{\bar{k}} \cdot \sum_l^{{}^k 1_n} \left( {}^{i|\bar{l}}\phi_l \right) \\
&= {}^{i|\bar{k}}n_k + {}^{i|k}\tilde{n}_{\bar{k}} \cdot \sum_l^{{}^k 1_n} \left( {}^{i|\bar{l}}\phi_l \right)
\end{aligned}.$$

Q.E.D.

[4] Calculate the partial velocity of the absolute position vector to the joint displacement according to Eq. (2.301), $$\frac{\partial\, {}^i r_{n_S}}{\partial r_k^{\bar{k}}} = \delta_k^{{}^i 1_n} \cdot {}^{i|\bar{k}}n_k. \tag{2.301}$$

PROOF: According to Eq. (2.8), then $$\begin{aligned}
\frac{\partial\, {}^i r_{n_S}}{\partial r_k^{\bar{k}}} &= \frac{\partial}{\partial r_k^{\bar{k}}} \left( \sum_l^{{}^i 1_k} \left( {}^{i|\bar{l}}r_l \right) + \sum_l^{{}^k 1_n} \left( {}^{i|\bar{l}}r_l \right) + {}^{i|n}r_{n_S} \right) \\
&= \sum_l^{{}^i 1_k} \left( \delta_k^{\bar{l}} \cdot {}^iQ_{\bar{l}} \cdot \frac{\partial\, {}^i r_{n_S}}{\partial r_k^{\bar{k}}} \left( {}^{\bar{l}}r_l \right) \right) = {}^iQ_{\bar{k}} \cdot \frac{\partial}{\partial r_k^{\bar{k}}} \left( {}^{\bar{k}}r_k \right) \\
&= {}^iQ_{\bar{k}} \cdot \frac{\partial}{\partial r_k^{\bar{k}}} \left( {}^{\bar{k}}n_k \cdot r_k^{\bar{k}} \right) = {}^{i|\bar{k}}n_k
\end{aligned}.$$

Q.E.D.

[5] Calculate the partial velocity of the absolute position vector to the joint angle according to Eq. (2.302), $$\frac{\partial\, {}^i r_{n_S}}{\partial \phi_k^{\bar{k}}} = \delta_k^{{}^i 1_n}, {}^{i|\bar{k}}\tilde{n}_k \cdot {}^{i|k}r_{n_S}. \tag{2.302}$$

PROOF: From Eq. (2.294), we have $$\begin{aligned}
\frac{\partial\, {}^i r_{n_s}}{\partial \phi_k^{\bar{k}}} &= \frac{\partial}{\partial \phi_k^{\bar{k}}} \left( \prod_l^{{}^i 1_k} \left( {}^{\bar{l}}R_l \right) \cdot \prod_l^{{}^k 1_n} \left( {}^{\bar{l}}R_l \right) \cdot {}^n r_{n_s} \right) \\
&= \frac{\partial}{\partial \phi_k^{\bar{k}}} \left( \prod_l^{{}^i 1_k} \left( {}^{\bar{l}}R_l \right) \right) \cdot \prod_l^{{}^k 1_n} \left( {}^{\bar{l}}R_l \right) \cdot {}^n r_{n_s} + \prod_l^{{}^i 1_k} \left( {}^{\bar{l}}R_{\bar{l}} \right) \cdot \frac{\partial}{\partial \phi_k^{\bar{k}}} \left( \prod_l^{{}^k 1_n} \left( {}^{\bar{l}}R_l \right) \cdot {}^n r_{n_s} \right) \\
&= \frac{\partial}{\partial \phi_k^{\bar{k}}} \left( \prod_l^{{}^i 1_k} \left( {}^{\bar{l}}R_l \right) \right) \cdot \prod_l^{{}^k 1_n} \left( {}^{\bar{l}}R_l \right) \cdot {}^n r_{n_s} \\
&= \prod_l^{{}^i 1_{\bar{k}}} \left( {}^{\bar{l}}R_l \right) \cdot \frac{\partial}{\partial \phi_k^{\bar{k}}} \left( {}^{\bar{k}}R_k \right) \cdot \prod_l^{{}^k 1_n} \left( {}^{\bar{l}}R_l \right) \cdot {}^n r_{n_s}
\end{aligned}$$

-continued $$= \prod_{l}^{{}^i1_{\bar{k}}} \left({}^{\bar{l}}R_l\right) \cdot \begin{bmatrix} \frac{\partial}{\partial \phi_k^{\bar{k}}}\left({}^{\bar{k}}Q_k\right) & 0_3 \\ 0_3^T & 0 \end{bmatrix} \cdot \prod_{l}^{{}^k1_n} \left({}^{\bar{l}}R_l\right) \cdot {}^n r_{n_s}$$

$$= \prod_{l}^{{}^i1_{\bar{k}}} \left({}^{\bar{l}}R_l \cdot \begin{bmatrix} \delta_k^{\bar{l}} \cdot \frac{\partial}{\partial \phi_k^{\bar{k}}}\left({}^{\bar{l}}Q_l\right) & 0_3 \\ 0_3^T & 0 \end{bmatrix}\right) \cdot \prod_{l}^{{}^k1_n} \left({}^{\bar{l}}R_l\right) \cdot {}^n r_{n_s} = \begin{bmatrix} {}^iQ_{\bar{k}} \cdot \frac{\partial}{\partial \phi_k^{\bar{k}}}\left({}^{\bar{k}}Q_k\right) & 0_3 \\ 0_3^T & 0 \end{bmatrix} \cdot \prod_{l}^{{}^k1_n} \left({}^{\bar{l}}R_l\right) \cdot {}^n r_{n_s},$$

i.e.

$$\frac{\partial^i r_{n_s}}{\partial \phi_k^{\bar{k}}} = \begin{bmatrix} {}^iQ_{\bar{k}} \cdot \frac{\partial}{\partial \phi_k^{\bar{k}}}\left({}^{\bar{k}}Q_k\right) & 0_3 \\ 0_3^T & 0 \end{bmatrix} \cdot \prod_{l}^{{}^k1_n} \left({}^{\bar{l}}R_l\right) \cdot {}^n r_{n_s}.$$

So $$\frac{\partial^i r_{n_s}}{\partial \phi_k^{\bar{k}}} = {}^iQ_{\bar{k}} \cdot \frac{\partial}{\partial \phi_k^{\bar{k}}}\left({}^{\bar{k}}Q_k\right) \cdot {}^k r_{n_s} = {}^{i|\bar{k}}\tilde{n}_k \cdot {}^{i|k} r_{n_s}.$$

Q.E.D.

[6] Calculate the partial velocity of the absolute translation velocity vector to the joint angular velocity according to Eq. (2.303), $$\frac{\partial^i r'_{n_s}}{\partial \dot{\phi}_k^{\bar{k}}} = \delta_k^{i1_n} \cdot {}^{i|\bar{k}}\tilde{n}_k \cdot {}^{i|k} r_{n_s}. \tag{2.303}$$

PROOF: From Eq. (2.294), then $$\frac{\partial^i r'_{n_s}}{\partial \dot{\phi}_k^{\bar{k}}} = \frac{\partial}{\partial \dot{\phi}_k^{\bar{k}}} \left( \sum_{l}^{{}^i1_k} \left({}^{i|\bar{l}}\dot{r}_l + {}^i\dot{\tilde{\phi}}_{\bar{l}} \cdot {}^{i|\bar{l}}r_l\right) + \sum_{l}^{{}^k1_n} \left({}^{i|\bar{l}}\dot{r}_l + {}^i\dot{\tilde{\phi}}_{\bar{l}} \cdot {}^{i|\bar{l}}r_l\right) \backslash + {}^{i|n}\dot{r}_{n_s} + {}^i\dot{\tilde{\phi}}_n \cdot {}^{i|n}r_{n_s} \right)$$

$$= \frac{\partial}{\partial \dot{\phi}_k^{\bar{k}}} \left( \sum_{l}^{{}^k1_n} \left({}^{i|\bar{l}}\dot{r}_l + {}^i\dot{\tilde{\phi}}_{\bar{l}} \cdot {}^{i|\bar{l}}r_l\right) \right) + \frac{\partial}{\partial \dot{\phi}_k^{\bar{k}}} \left({}^{i|n}\dot{r}_{n_s} + {}^i\dot{\tilde{\phi}}_n \cdot {}^{i|n}r_{n_s}\right)$$

$$= \sum_{l}^{{}^k1_n} \left( \delta_k^{\bar{l}} \cdot \frac{\partial}{\partial \dot{\phi}_k^{\bar{k}}}\left({}^i\dot{\tilde{\phi}}_{\bar{l}}\right) \cdot {}^{i|\bar{l}}r_l \right) + \frac{\partial}{\partial \dot{\phi}_k^{\bar{k}}} \left({}^i\dot{\tilde{\phi}}_n \cdot {}^{i|n}r_{n_s}\right)$$

$$= {}^iQ_{\bar{k}} \cdot \frac{\partial}{\partial \dot{\phi}_k^{\bar{k}}}\left({}^{\bar{k}}\dot{\tilde{\phi}}_k\right) \cdot {}^{\bar{k}|k}r_{n_s}$$

$$= {}^{i|\bar{k}}\tilde{n}_k \cdot {}^{i|k}r_{n_s}$$

Q.E.D.

The above conclusions are unified in theorem 2.2 called the partial velocity theorem. THEOREM 2.2. If AC ${}^i1_n$ is given, then $$\frac{\partial^i \phi_n}{\partial \phi_k^{\bar{k}}} = {}^{i|\bar{k}}n_k + {}^{i|k}\tilde{n}_{\bar{k}} \cdot \sum_{l}^{{}^k1_n} \left({}^{i|\bar{l}}\phi_l\right) \tag{2.304}$$

$$\frac{\partial}{\partial \phi_l^{\bar{l}}}\left({}^iQ_n\right) = {}^iQ_l \cdot {}^{\bar{l}}\tilde{n}_l \cdot {}^lQ_n, \quad \frac{\partial^i \dot{\phi}_n}{\partial \dot{\phi}_k^{\bar{k}}} = {}^{i|\bar{k}}n_k,$$

$$\frac{\partial^i r_{n_s}}{\partial r_k^{\bar{k}}} = \frac{\partial^i \dot{r}_{n_s}}{\partial \dot{r}_k^{\bar{k}}} = {}^{i|\bar{k}}n_k \tag{2.305}$$

-continued $$\frac{\partial^i r_{n_s}}{\partial \phi_k^{\bar{k}}} = \frac{\partial^i \dot{r}_{n_s}}{\partial \dot{\phi}_k^{\bar{k}}} = -{}^{i|\bar{k}}\tilde{n}_k \cdot {}^{i|k}r_{n_s},$$

$$\frac{\partial^i \phi_n}{\partial r_k^{\bar{k}}} = \frac{\partial^i \phi_n}{\partial \dot{r}_k^{\bar{k}}} = \frac{\partial^i \dot{\phi}_n}{\partial r_k^{\bar{k}}} = \frac{\partial^i \dot{\phi}_n}{\partial \dot{r}_k^{\bar{k}}} = 0_3. \tag{2.306}$$

PROOF: When $\delta_k^{i_n}=1$, from Eqs. (2.300), (2.298), (2.3011) and (2.299) we can get Eq. (2.304). Eq. (2.305) is acquired by Eqs. (2.302) and (2.303). Because ${}^i\phi_n$ and ${}^i\dot{\phi}_n$ are irrelevant to $r_k^{\bar{k}}$ and $\dot{r}_k^{\bar{k}}$, then Eq. (2.306) is obtained. QED.

Eqs. (2.300)-(2.303) play an important role on the velocity analysis and dynamical analysis of ACs. They have clear physical meaning, and also simplify the expression of the velocity equation and dynamical equation of the studied system.

Figure 31:
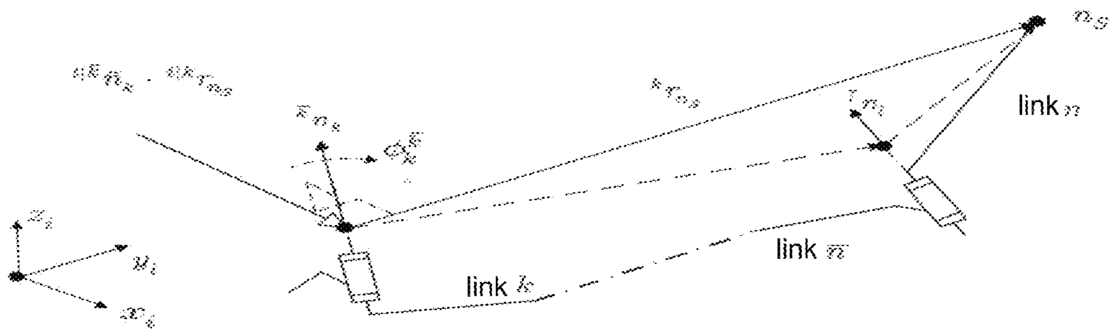
FIG. 31 is a meaning diagram of the partial velocity.

As shown in FIG. 31, on the one hand, in the geometric view, the partial velocity in Eq. (2.304) is the corresponding Axis-invariant, and (2.305) represents the first-order moment of the position vector to the Axis-invariant, i.e. the multiplication cross of the Axis-vector ${}^{i|\bar{k}}n_k$ and vector ${}^{i|k}r_{nS}$. On the other hand, in view of the force action relationship, ${}^{i|\bar{k}}n_k^T \cdot {}^if_{n_s}$ is the projection of ${}^if_{n_s}$ in the Axis-vector ${}^{i|\bar{k}}n_k$.

From Eq. (2.14) we know that $$\frac{\partial^i \dot{r}_{n_s}^T}{\partial \dot{\phi}_k^{\bar{k}}} \cdot {}^i\int_{n_s} = -{}^{i|k}r_{n_s}^T \cdot {}^{i|\bar{k}}\tilde{n}_k \cdot {}^i\int_{n_s} = {}^{i|\bar{k}}n_k^T \cdot {}^{i|k}\tilde{r}_{n_s} \cdot {}^i\int_{n_s}. \tag{2.307}$$

Eq. (2.307) shows that $\partial^i\dot{r}_{n_s}^T/\partial\dot{\phi}_k^{\bar{k}}$ completes the action effect of the force ${}^if_{n_s}$ on Axis-vector ${}^{i|\bar{k}}n_k$, i.e. 1st-order moment.

The CO of ${}^{i|k}\tilde{r}_{l_S} \cdot {}^{i_S}f_{l_S}$ in Eq. (2.307) is different from that of ${}^i\tilde{\omega}_{\bar{k}} \cdot {}^{i|\bar{k}}r_k$ in Eq. (2.294); the former stands for the acting force, and the latter for the kinematic quantity, both of which are dual and have opposite orders.

Invariance of Axis-Invariants with Respect to Time

According to Eqs. (2.189) and (2.195) we know that $$\frac{d}{dt}\left({}^{i|\bar{l}}n_l \cdot \phi_l^{\bar{l}}\right) = {}^{i|\bar{l}}n_l \cdot \dot{\phi}_l^{\bar{l}}, \quad \frac{d^2}{dt^2}\left({}^{i|\bar{l}}n_l \cdot \phi_l^{\bar{l}}\right) = {}^{i|\bar{l}}n_l \cdot \ddot{\phi}_l^{\bar{l}}. \tag{2.308}$$

So $$\frac{d}{dt}\left({}^{i|\bar{l}}n_l\right) - {}^{i|\bar{l}}\dot{n}_l - 0_3, \quad \frac{d^2}{dt^2}\left({}^{i|\bar{l}}n_l \cdot \phi_l^{\bar{l}}\right) - {}^{i|\bar{l}}\dot{n}_l - 0_3. \tag{2.309}$$

Eq. (2.309) shows that for the Axis-invariant, its absolute derivative is its relative derivative; because the Axis-invariant is a reference axis of the system and is an invariant, its absolute derivative is a zero vector constantly. Thus, the Axis-invariant have time invariance.

From Eqs. (2.304) and (2.309), $$\frac{d}{dt}\left(\frac{\partial^i \phi_n}{\partial \phi_k^{\bar{k}}}\right) = \frac{d}{dt}\left(\frac{\partial^i \dot{\phi}_n}{\partial \dot{\phi}_k^{\bar{k}}}\right) = \frac{d}{dt}\left(\frac{\partial^i r_{n_s}}{\partial r_k^{\bar{k}}}\right) = \frac{d}{dt}\left(\frac{\partial^i \dot{r}_{n_s}}{\partial \dot{r}_k^{\bar{k}}}\right) = 0_3 \tag{2.310}$$

$$\frac{d^2}{dt^2}\left(\frac{\partial^i \phi_n}{\partial \phi_k^{\bar{k}}}\right) = \frac{d^2}{dt^2}\left(\frac{\partial^i \dot{\phi}_n}{\partial \dot{\phi}_k^{\bar{k}}}\right) = \frac{d^2}{dt^2}\left(\frac{\partial^i r_{n_s}}{\partial r_k^{\bar{k}}}\right) = \frac{d^2}{dt^2}\left(\frac{\partial^i \dot{r}_{n_s}}{\partial \dot{r}_k^{\bar{k}}}\right) = 0_3.$$

According to Eqs. (2.187) and (2.309), $$\frac{d}{dt}\left(\frac{\partial^i \dot{r}_{n_S}^T}{\partial \dot{\phi}_k^{\bar{k}}}\right) = \frac{d}{dt}\left({}^{i|\bar{k}}n_k^T \cdot {}^{i|k}\tilde{r}_{n_S}\right)$$

$$= {}^{i|\bar{k}}n_k^T \cdot \frac{d}{dt}\left({}^{i|k}\tilde{r}_{n_S}\right)$$

$$= {}^{i|\bar{k}}n_k^T \cdot \left({}^{i|k}\dot{\tilde{r}}_{n_S} + {}^i\dot{\tilde{\phi}}_k \cdot {}^{i|k}\tilde{r}_{n_S}\right).$$

From the equations above, $$\frac{d^2}{dt^2}\left(\frac{\partial^i \dot{r}_{n_S}^T}{\partial \dot{\phi}_k^{\bar{k}}}\right) = \frac{d}{dt}\left({}^{i|\bar{k}}n_k^T \cdot \frac{d}{dt}\left({}^{i|k}\tilde{r}_{n_S}\right)\right) = {}^{i|\bar{k}}n_k^T \cdot \frac{d^2}{dt^2}\left({}^{i|k}\tilde{r}_{n_S}\right) = ; \tag{2.311}$$

$${}^{i|\bar{k}}n_k^T \cdot \left({}^{i|k}\ddot{\tilde{r}}_{n_S} + {}^i\ddot{\tilde{\phi}}_k \cdot {}^{i|k}\tilde{r}_{n_S} + {}^i\dot{\tilde{\phi}}_k^{:2} \cdot {}^{i|k}\tilde{r}_{n_S} + 2 \cdot {}^i\dot{\tilde{\phi}}_k \cdot {}^{i|k}\dot{\tilde{r}}_{n_S}\right)$$

i.e.

$$\frac{d}{dt}\left(\frac{\partial^i \dot{r}_{n_S}^T}{\partial \dot{\phi}_k^{\bar{k}}}\right) = {}^{i|\bar{k}}n_k^T \cdot \left({}^{i|k}\dot{\tilde{r}}_{n_S} + {}^i\dot{\tilde{\phi}}_k \cdot {}^{i|k}\tilde{r}_{n_S}\right)$$

$$\frac{d^2}{dt^2}\left(\frac{\partial^i \dot{r}_{n_S}^T}{\partial \dot{\phi}_k^{\bar{k}}}\right) = {}^{i|\bar{k}}n_k^T \cdot \begin{pmatrix} {}^{i|k}\ddot{\tilde{r}}_{n_S} + {}^i\ddot{\tilde{\phi}}_k \cdot {}^{i|k}\tilde{r}_{n_S} + {}^i\dot{\tilde{\phi}}_k^{:2} \cdot {}^{i|k}\tilde{r}_{n_S} \\ \backslash + 2 \cdot {}^i\dot{\tilde{\phi}}_k \cdot {}^{i|k}\dot{\tilde{r}}_{n_S} \end{pmatrix}.$$

From Eq. (2.311) we know that the derivative of the partial velocity to time is still iteration of Axis-invariant; the Axis-invariant ${}^{\bar{l}}n_l$ is the coordinate vector of the basis $e_l$, and ${}^{i|\bar{l}}n_l$ essentially represents the projection of the base $e_l$ on the reference frame. If Eq. (2.309) is not set, it means denying the objectivity of the reference base $e_l$ as a reference.

From Eq. (2.65), therefore $$\mathrm{Vector}\left(\sum_l^{{}^i1_c}\left(\frac{\partial}{\partial \phi_l^{\bar{l}}}\left({}^iQ_c\right)\right)\right) = \sum_l^{{}^i1_c}\left({}^{i|\bar{l}}n_l\right). \tag{2.312}$$

The left side in Eq. (2.312) shows the sum of the partial velocities of DCM of the rotational AC ${}^i1_c$ to all joint angles of the chain. The right side in Eq. (2.312) shows the sum of the Axis-invariants of the rotational AC ${}^i1_c$. Therefore, the DCM angular velocity of the rotational AC to the joint angle has the invariance of the Axis-invariant.

For the subtree $\vec{i}$ L, from Eqs. (2.309) and (2.312), obtain $$\frac{d}{dt}\left(\mathrm{Vector}\left(\sum_l^{\vec{i}L}\left(\frac{\partial}{\partial \phi_l^{\bar{l}}}\left({}^iQ_c\right)\right)\right)\right) = \frac{d}{dt}\left(\sum_l^{\vec{i}L}\left({}^{i|\bar{l}}n_l\right)\right) = 0_3.$$

It shows that the Axis-invariant of MAS is constant for time and the regid-body system in the natural reference system is invariant. From Eq. (2.312), wo know that the joint parameters in the system map one-to-one to the matural reference axis. The joint numbers of the body is determined by the independent move degree. However, the invariant of natural reference axis derivated to time does not change.

Tree-Chain Variation Calculation

The infinitesimal increment of the function independent variable is called the differential, expressed by d. Corresponding to the differential, the increment of the independent variable function is called the variation which is expressed by δ. But the variation does not consider the increment δt of time t, i.e. δt≡0. It is precise because the time increment δt is not taken into account that the variation of displacement (linear displacement and angular displacement) can be understood as the possible change in motion at the same time, i.e., the virtual displacement.

[1] Variation of Rotation Vectors $$\delta\left({}^i\phi_n'\right) = \sum_l^{{}^i1_n}\left({}^{i|\bar{l}}n_l \cdot \delta\dot{\phi}_l^{\bar{l}}\right). \tag{2.313}$$

PROOF: From Eq. (2.298), $$\delta\left({}^i\phi_n'\right) = \sum_l^{{}^i1_n}\left(\frac{\partial^i\dot{\phi}_l}{\partial\dot{\phi}_l^{\bar{l}}} \cdot \delta\dot{\phi}_l^{\bar{l}}\right) = \sum_l^{{}^i1_n}\left({}^{i|\bar{l}}n_l \cdot \delta\dot{\phi}_l^{\bar{l}}\right).$$

Q.E.D.

[2] Variation of Translation Vectors $$\delta\left({}^ir_{n_S}'\right) = \sum_l^{{}^i1_n}\left(\frac{\partial}{\partial\dot{\phi}_l^{\bar{l}}}\left({}^i\dot{r}_{n_S}\right)\cdot\delta\dot{\phi}_l^{\bar{l}}\right) + \sum_l^{{}^i1_n}\left({}^{i|\bar{l}}n_l \cdot \delta\dot{r}_l^{\bar{l}}\right). \tag{2.314}$$

PROOF: According to Eqs. (2.302) and (2.303), $$\delta\left({}^ir_{n_S}'\right) = \sum_l^{{}^i1_n}\left(\frac{\partial}{\partial\dot{\phi}_l^{\bar{l}}}\left({}^i\dot{r}_{n_S}\right)\cdot\delta\dot{\phi}_l^{\bar{l}}\right) + \sum_l^{{}^i1_n}\left(\frac{\partial}{\partial\dot{r}_l^{\bar{l}}}\left({}^i\dot{r}_{n_S}\right)\cdot\delta\dot{r}_l^{\bar{l}}\right)$$

$$= \sum_l^{{}^i1_n}\left({}^{i|\bar{l}}\tilde{n}_l \cdot {}^{i|\bar{l}}r_{n_S} \cdot \delta\dot{\phi}_l^{\bar{l}}\right) + \sum_l^{{}^i1_n}\left({}^{i|\bar{l}}n_l \cdot \delta\dot{r}_l^{\bar{l}}\right).$$

Q.E.D.

Natural Axis-Chains Vs. Cartesian Axis-Chains

The axis SEQS ${}^iA_c$=(i, c1, c2, c3, c4, c5, c] is given, the parent axis SEQS is recorded as ${}^i\bar{A}_c$=(i, i, c1, c2, c3, c4, c5], the Axis-type sequence is noted as ${}^iK_c$=(X, R, R, R, P, P, P], the AC as ${}^i1_c$=(i, c1, c2, c3, c4, c5, c], angular position SEQS as and linear position as $r_{(i,c]}=[r_{c4}^{c3}, r_{c5}^{c4}, r_c^{c5}]$.

$${}^{c|i}n_{c1} = 1^{[m]},\ {}^{c|c1}n_{c2} = 1^{[n]},\ {}^{c|c2}n_{c2} = {}^{c|c3}n_{c3} = 1^{[p]}, \tag{2.315}$$

$$m, n, p \in \{x, y, z\},\ m \neq n,\ n \neq p$$

$${}^{c|c5}n_c = 1^{[x]},\ {}^{c|c4}n_{c5} = 1^{[y]},\ {}^{c|c3}n_{c4} = 1^{[z]}$$

$${}_0^{c|c2}r_{c3} = {}_0^{c|c3}r_{c4} = {}_0^{c|c4}r_{c5} = {}_0^{c|c5}r_c = 0_3. \tag{2.316}$$

Then the particular AC is equivalent to a Cartesian Axis-chain, abbreviated as ${}^iF_c$, i.e. the AC from natural frame $F^{[i]}$ to $F^{[c]}$. Obviously, the attitude SEQS can be set according to the engineering requirements.

From Eqs. (2.304) and (2.315), we have $$\frac{\partial}{\partial\dot{\phi}_{c1}^i}\left({}^i\dot{\phi}_c\right) = {}^in_{c1} = 1^{[m]} \tag{2.317}$$

$$\frac{\partial}{\partial\dot{\phi}_{c2}^{c1}}\left({}^i\dot{\phi}_c\right) = {}^{i|c1}n_{c2} = {}^iQ_{c1} \cdot 1^{[n]}$$

-continued $$\frac{\partial}{\partial \dot{\phi}_{c3}^{c2}}({}^{i}\dot{\phi}_{c}) = {}^{i|c2}n_{c3} = {}^{i}Q_{c2}\cdot 1^{[p]}.$$

From Eq. (2.317), we get $$ {}^{i}\ominus_{c} \triangleq \partial^{i}\dot{\phi}_{c} / \partial^{i}\dot{\phi}_{(i,c]} = [1^{[m]}, {}^{i}Q_{c1}\cdot 1^{[n]}, {}^{i}Q_{c2}\cdot 1^{[p]}]. \quad (2.318)$$

According to Eq. (2.318), therefore $$ {}^{i}\dot{\phi}_{c} = {}^{i}\Theta_{c}\cdot \dot{\phi}_{(i,c]}{}^{T}. \quad (2.319)$$

The Cartesian Axis-chain ${}^{i}F_{c}$ is given, the acting force of a point S on the body C is ${}^{i}f_{c_S}$, and the position vector is ${}^{i}r_{c_S}$, then $$ {}^{i}\dot{r}_{c_S} = {}^{i}\dot{r}_{c} + {}^{i|c}\dot{r}_{c_S}. \quad (2.320)$$

Eq. (2.301) results in $$\frac{\partial}{\partial \dot{r}_{(i,c]}}({}^{i}\dot{r}_{c_S}) = 1. \quad (2.321)$$

So $$\frac{\partial}{\partial \dot{r}_{(i,c]}}({}^{i}\dot{r}_{c_S})\cdot {}^{i}f_{c_S} = 1\cdot {}^{i}f_{c_S} = {}^{i}f_{c_S}. \quad (2.322)$$

From Eq. (2.305), then $$\frac{\partial}{\partial \dot{\phi}_{c1}^{i}}({}^{i}\dot{r}_{c_S}) = {}^{i}\tilde{n}_{c1}\cdot {}^{i|c}r_{cS} \quad (2.323)$$

$$\frac{\partial}{\partial \dot{\phi}_{c2}^{c1}}({}^{i}\dot{r}_{cS}) = {}^{i|c1}\tilde{n}_{c2}\cdot {}^{i|c}r_{cS}$$

$$\frac{\partial}{\partial \dot{\phi}_{c3}^{c2}}({}^{i}\dot{r}_{cS}) = {}^{i|c2}\tilde{n}_{c3}\cdot {}^{i|c}r_{cS}.$$

According to Eqs. (2.299) and (2.323), then $$ {}^{i}J_{c_S} \triangleq \frac{\partial}{\partial \dot{\phi}_{(i,c]}}({}^{i}\dot{r}_{c_S}) = \begin{bmatrix} 0 & -{}^{i|c}r_{c_S}^{[3]} & {}^{i|c}r_{c_S}^{[2]} \\ {}^{i|c}r_{c_S}^{[3]} & 0 & -{}^{i|c}r_{c_S}^{[1]} \\ -{}^{i|c}r_{c_S}^{[2]} & {}^{i|c}r_{c_S}^{[1]} & 0 \end{bmatrix} = {}^{i|c}\tilde{r}_{c_S}. \quad (2.324)$$

So $$ {}^{i}\tau_{c_S} \triangleq \frac{\partial}{\partial \dot{\phi}_{(i,c]}}({}^{i|c}r_{c_S})\cdot {}^{i}f_{c_S} = {}^{i|c}\tilde{r}_{c_S}\cdot {}^{i}f_{c_S}. \quad (2.325)$$

From Eqs. (2.322) and (2.325) we know that the action effect of the acting force of a point S on a body C to the origin $O_c$ of the body C contains the acting force vector ${}^{i}f_{c_S}$, and the moment ${}^{i}\tau_{c_S}$, where ${}^{i}\tau_{c_S} = {}^{i|c}\tilde{r}_{c_S}\cdot {}^{i}f_{c_S}$. This conclusion should be consistent with the acting force effect in traditional dynamics.

From the above: when the triaxial linear position SEQS and triaxial angular position SEQS refer to Cartesian axes, there is a vector product under Cartesian frames. Cartesian Axis-chain is a special case of the Natural Axis-chain. The Axis-chain kinematics based on Axis-invariant has the following characteristics:

[1] With the concise natural frame as a reference, it ensures the measurement accuracy of the structural parameters of the Axis-invariant, and contains both machining errors and assembly errors;

[2] It has a concise, accurate and unified axis symbol system of CO, and the kinematic equation has clear and accurate meaning;

[3] The kinematic equation based on Axis-invariant is the iteration of Axis-invariant, which ensures the accuracy and real-time performance of the kinematic calculation;

[4] The kinematic equation based on Axis-invariant itself has a pseudo-code function, which ensures the reliability of engineering implementation.

Dual-Quaternion Calculus Based on Axis-Invariant

The AC ${}^{i}l_{c}$ and $l,k\in {}^{i}l_{c}$ are given, and $l\neq k$, based on the configuration expressed by Eqs. (2.7) and (2.8), we know that: the product calculation of the chain translation vectors ${}^{\bar{l}}r_{l}$ and ${}^{\bar{k}}r_{k}$ has no effect on the total displacement ${}^{i}r_{c}$ of the AC. The dual numbers and dual-quaternions are abstracts of such relationships.

Dual Numbers

Dual numbers are proposed by Clifford, and the dual numbers unit symbol ε and dual numbers basis $\underset{..}{\varepsilon}$ are defined, $$0\cdot\varepsilon=0, 1\cdot\varepsilon=\varepsilon, \varepsilon^2=\varepsilon*\varepsilon=0, \quad (2.326)$$

$$\underset{..}{\varepsilon} \triangleq [1,\varepsilon]. \quad (2.327)$$

The dual numbers operators have 2nd-Order nilpotency. The dual numbers basis $\underset{..}{\varepsilon}$ is usually written in the form of a row, which is independent of the space reference base. The form only shows the correlation between the dual numbers, and does not have an absolute derivative.

Define a dual number invariant $\underset{..}{\varepsilon}\cdot\underset{..}{q}$ and its conjugate number $\underset{..}{\varepsilon}\cdot\underset{..}{q}^{\circ}$ which has a constant module:

$$\underset{..}{\varepsilon}\cdot\underset{..}{q} = \phi + r\cdot\varepsilon,\ \underset{..}{\varepsilon}\cdot\underset{..}{q}^{*} = \phi^{*} + r^{*}\cdot\varepsilon \quad (2.328)$$

$$\underset{..}{q} = \begin{bmatrix}\phi \\ r\end{bmatrix},\ \underset{..}{q}^{*} = \begin{bmatrix}\phi^{*} \\ r^{*}\end{bmatrix}$$

$$\|\underset{..}{q}\|^2 = \|\underset{..}{q}\cdot\underset{..}{q}^{*}\| = \|\underset{..}{q}^{*} * \underset{..}{q}\|;$$

wherein $\underset{..}{q}$ is called the pseudo-coordinates of the dual numbers, and is usually written in the form of a row, and the number in the numbers can represent any row. Wherein φ is the rotation attribute, and r is the translation attribute. φ and r are called the main part and auxiliary part of the dual number.

[1] Basic Calculation of Dual Number

The dual number sequence $\{\underset{..}{q}_{l}|l\in\mathcal{N}\}$ is given, and it meets the calculation of addition "+" and multiplication "*". From Eq. (2.326), then $$\underset{..}{\varepsilon}\cdot\underset{..}{q}_{k} + \underset{..}{\varepsilon}\cdot\underset{..}{q}_{l} - (\phi_k+\phi_l) + (r_k+r_l)\cdot\varepsilon \quad (2.329)$$

$$\underset{..}{q}_{k} + \underset{..}{q}_{l} = \begin{bmatrix}\phi_k+\phi_l \\ r_k+r_l\end{bmatrix},$$

$$\left(\underset{..}{\varepsilon}\cdot\underset{..}{q}_{k}\right) * \left(\underset{..}{\varepsilon}\cdot\underset{..}{q}_{l}\right) = \phi_k\cdot\phi_l + (\phi_k\cdot r_l + r_k\cdot\phi_l)\cdot\varepsilon. \quad (2.330)$$

From Eqs. (2.328) and (2.330), then $$(\underset{..}{\varepsilon}\cdot\underset{..}{q})*(\underset{..}{\varepsilon}\cdot\underset{..}{q}*)=(\phi+r\cdot\varepsilon)\cdot(\phi-r\cdot\varepsilon)=\phi^2. \tag{2.331}$$

From Eq. (2.331), then $$\underset{..}{\varepsilon}\cdot\underset{..}{q}*=(\phi+r\cdot\varepsilon)^{-1}\cdot\phi^2=\phi\cdot(1-r\cdot\phi^{-1}\cdot\varepsilon)$$

$$\underset{..}{\varepsilon}*\underset{..}{q}*=\phi^2. \tag{2.332}$$

[2] Derivative of Dual Numbers

The rotation attribute $\phi$ and translation attribute r are usually functions of time t. If $\rho$ is a constant, derive time t with Eq. (2.328), then $$\underset{..}{\varepsilon}\cdot\rho\dot{\underset{..}{q}}=\rho\dot{\phi}+\rho\dot{r}\cdot\varepsilon. \tag{2.333}$$

Expand the function $f(\underset{..}{\varepsilon}\cdot\rho\underset{..}{q})$ of the dual numbers $\underset{..}{\varepsilon}\cdot\underset{..}{q}$ as Taylor series of $\varepsilon$, then $$\begin{aligned} f\left(\underset{..}{\varepsilon}\cdot\rho\underset{..}{q}\right) &= f(\rho\phi)+\rho r\cdot\frac{\partial f(\phi)}{\partial\phi}\cdot\varepsilon+\frac{\rho^2\cdot r^2}{2}\cdot\frac{\partial^2 f(\phi)}{\partial^2\phi}\cdot\varepsilon^2+\ldots \\ &= f(\rho\phi)+\frac{\partial f(\phi)}{\partial\phi}\cdot\rho r\cdot\varepsilon \end{aligned}, \tag{2.334}$$

i.e.

$$f\left(\underset{..}{\varepsilon}\cdot\rho\underset{..}{q}\right)=f(\rho\phi)+\frac{\partial f(\phi)}{\partial\phi}\cdot\rho r\cdot\varepsilon,$$

wherein $f(\phi)$ is the main part of function, and corresponds to the main part $\phi$ of dual numbers. At the same time, derive both sides of Eq. (2.334), then $$\dot{f}\left(\underset{..}{\varepsilon}\cdot\rho\underset{..}{q}\right)=\dot{f}(\rho\phi)+\frac{d}{t}\left(\frac{\partial f(\phi)}{\partial\phi}\right)\cdot\rho r\cdot\varepsilon+\frac{\partial f(\phi)}{\partial\phi}\cdot\rho\dot{r}\cdot\varepsilon. \tag{2.335}$$

[3] Sine and Cosine Functions of Dual Numbers

According to Eq. (2.334), then $$\begin{aligned} C\left(\rho\cdot\frac{\phi+r\cdot\varepsilon}{2}\right) &= C\left(\frac{\rho\phi}{2}\right)=\frac{\rho r}{2}\cdot S\left(\frac{\rho\phi}{2}\right)\cdot\varepsilon \\ S\left(\rho\cdot\frac{\phi+r\cdot\varepsilon}{2}\right) &= S\left(\frac{\rho\phi}{2}\right)=\frac{\rho r}{2}\cdot C\left(\frac{\rho\phi}{2}\right)\cdot\varepsilon \end{aligned}. \tag{2.336}$$

Derive Eq. (2.336) with (2.335) or directly derive with (2.336), therefore $$\begin{aligned} \dot{C}\left(\rho\cdot\frac{\phi+r\cdot\varepsilon}{2}\right) &= -\frac{\rho\dot{\phi}}{2}\cdot S\left(\frac{\rho\phi}{2}\right)-\left(\frac{\rho\dot{r}}{2}\cdot S\left(\frac{\rho\phi}{2}\right)+\frac{\rho\dot{\phi}\cdot\rho r}{4}\cdot C\left(\frac{\rho\phi}{2}\right)\right)\cdot\varepsilon \\ \dot{S}\left(\rho\cdot\frac{\phi+r\cdot\varepsilon}{2}\right) &= -\frac{\rho\dot{\phi}}{2}\cdot C\left(\frac{\rho\phi}{2}\right)-\left(\frac{\rho\dot{r}}{2}\cdot C\left(\frac{\rho\phi}{2}\right)+\frac{\rho\dot{\phi}\cdot\rho r}{4}\cdot S\left(\frac{\rho\phi}{2}\right)\right)\cdot\varepsilon \end{aligned}, \tag{2.337}$$

i.e.

$$\begin{aligned} \dot{C}\left(\rho\cdot\frac{\phi+r\cdot\varepsilon}{2}\right) &= -\frac{\rho\dot{\phi}}{2}\cdot S\left(\rho\cdot\frac{\phi+r\cdot\varepsilon}{2}\right)-\frac{\rho\dot{r}}{2}\cdot S\left(\frac{\rho\phi}{2}\right)\cdot e \\ \dot{S}\left(\rho\cdot\frac{\phi+r\cdot\varepsilon}{2}\right) &= -\frac{\rho\dot{\phi}}{2}\cdot C\left(\rho\cdot\frac{\phi+r\cdot\varepsilon}{2}\right)-\frac{\rho\dot{r}}{2}\cdot C\left(\frac{\rho\phi}{2}\right)\cdot e \end{aligned}.$$

Eq. (2.336) results in $$\begin{aligned} C^2\left(\rho\cdot\frac{\phi+r\cdot\varepsilon}{2}\right)+S^2\left(\rho\cdot\frac{\phi+r\cdot\varepsilon}{2}\right) &= \\ \left(C\left(\frac{\rho\phi}{2}\right)=\frac{\rho r}{2}\cdot S\left(\frac{\rho\phi}{2}\right)\cdot\varepsilon\right)*\left(C\left(\frac{\rho\phi}{2}\right)+\frac{\rho r}{2}\cdot S\left(\frac{\rho\phi}{2}\right)\cdot\varepsilon\right)^*&, \\ \backslash+\left(S\left(\frac{\rho\phi}{2}\right)+\frac{\rho r}{2}\cdot C\left(\frac{\rho\phi}{2}\right)\cdot\varepsilon\right)*\left(S\left(\frac{\rho\phi}{2}\right)+\frac{r}{2}\cdot C\left(\frac{\rho\phi}{2}\right)\cdot\varepsilon\right)^* &= 1, \end{aligned} \tag{2.338}$$

i.e.

$$C^2\left(\rho\cdot\frac{\phi+r\cdot\varepsilon}{2}\right)+S^2\left(\rho\cdot\frac{\phi+r\cdot\varepsilon}{2}\right)=1,$$

By instantiating the main part $\phi$ and auxiliary part r of the dual numbers $\underset{..}{\varepsilon}\cdot\underset{..}{q}=\phi+r\cdot\varepsilon$, we can obtain the corresponding dual numbers instance, such as the generalized dual-quaternions, the configuration dual-quaternions, the screw dual-quaternions, etc. From Eqs. (2.328) and (2.336), therefore $$\begin{aligned} C\left(\underset{..}{\varepsilon}\cdot\underset{..}{q}\right) &= C(\phi+r\cdot\varepsilon)=C(\phi)-r\cdot S(\phi)\cdot\varepsilon \\ S\left(\underset{..}{\varepsilon}\cdot\underset{..}{q}\right) &= S(\phi+r\cdot\varepsilon)=S(\phi)-r\cdot C(\phi)\cdot\varepsilon \end{aligned};\ \text{if } \rho=2. \tag{2.339}$$

Euler Quaternion Iteration Based on Axis-Invariant

From Eq. (2.124), then $$\overset{\bar{l}}{\underset{\cdot\bar{l}}{q}}*\overset{\bar{l}}{\underset{\cdot l}{q}}=\begin{bmatrix} {}^{\bar{l}}q_{\bar{l}}\cdot{}^{\bar{l}}\underset{\cdot l}{q}^{[4]}+{}^{\bar{l}}\underset{\cdot l}{q}^{[4]}\cdot{}^{\bar{l}}q_l+{}^{\bar{l}}\tilde{q}_{\bar{l}}\cdot{}^{\bar{l}}q_l \\ {}^{\bar{l}}\underset{\cdot l}{q}^{[4]}\cdot{}^{\bar{l}}\underset{\cdot l}{q}^{[4]}-{}^{\bar{l}}q_{\bar{l}}^T\cdot{}^{\bar{l}}q_l \end{bmatrix}. \tag{2.340}$$

According to Eq. (2.145), we obtain the attitude quaternion iteration:

$$\overset{\bar{l}}{\underset{\cdot l}{\lambda}}=\overset{\bar{l}}{\underset{\cdot\bar{l}}{\lambda}}*\overset{\bar{l}}{\underset{\cdot l}{\lambda}}=\begin{bmatrix} S_{\bar{l}}\cdot{}^{\bar{l}}\underset{\cdot l}{\lambda}^{[4]}\cdot{}^{\bar{l}}n_{\bar{l}}+\left(C_{\bar{l}}\cdot 1+S_{\bar{l}}\cdot{}^{\bar{l}}\tilde{n}_{\bar{l}}\right)\cdot{}^{\bar{l}}\lambda_l \\ C_{\bar{l}}\cdot{}^{\bar{l}}\underset{\cdot l}{\lambda}^{[4]}-S_{\bar{l}}\cdot{}^{\bar{l}}n_{\bar{l}}^T\cdot{}^{\bar{l}}\lambda_l \end{bmatrix}. \tag{2.341}$$

From Eqs. (2.141) and (2.341), $$ {}^{l}\lambda_{\bar{\bar{l}}} = {}^{l}\lambda_{\bar{l}} * {}^{\bar{l}}\lambda_{\bar{\bar{l}}} = \begin{bmatrix} -S_{\bar{l}}\cdot {}^{l}\lambda_{\bar{l}}^{[4]}\cdot {}^{\bar{l}}n_{\bar{\bar{l}}} - \left(C_{\bar{l}}\cdot 1 - S_{\bar{l}}\cdot {}^{\bar{l}}\tilde{n}_{\bar{\bar{l}}}\right)\cdot {}^{l}\lambda_{\bar{l}} \\ C_{\bar{l}}\cdot {}^{l}\lambda_{\bar{l}}^{[4]} - S_{\bar{l}}\cdot {}^{\bar{l}}n_{\bar{l}}^{T}\cdot {}^{l}\lambda_{\bar{l}} \end{bmatrix}. \tag{2.342} $$

From Eqs. (2.341) and (2.342), we get $$ {}^{\bar{l}}\lambda_{l} = {}^{l}\lambda_{\bar{l}}^{*},\ {}^{\bar{l}}\lambda_{l}^{*} = {}^{l}\lambda_{\bar{l}}. \tag{2.343} $$

According to Eqs. (2.145) and (2.341), then $$ {}^{\bar{\bar{l}}|\bar{l}}\lambda_{l} \triangleq {}^{\bar{\bar{l}}}\lambda_{\bar{l}} * {}^{\bar{l}}\lambda_{l} * {}^{\bar{l}}\lambda_{\bar{\bar{l}}} = \begin{bmatrix} S_{\bar{l}}\cdot {}^{\bar{l}}\lambda_{\bar{l}}^{[4]}\cdot {}^{\bar{\bar{l}}}n_{\bar{l}} + \left(C_{\bar{l}}\cdot 1 - S_{\bar{l}}\cdot {}^{\bar{\bar{l}}}\tilde{n}_{\bar{l}}\right)\cdot {}^{\bar{l}}\lambda_{l} \\ C_{\bar{l}}\cdot {}^{\bar{l}}\lambda_{\bar{l}}^{[4]} - S_{\bar{l}}\cdot {}^{\bar{\bar{l}}}n_{\bar{l}}^{T}\cdot {}^{\bar{l}}\lambda_{l} \end{bmatrix} * \begin{bmatrix} -S_{\bar{l}}\cdot {}^{\bar{\bar{l}}}n_{\bar{l}} \\ C_{\bar{l}} \end{bmatrix} = \begin{bmatrix} \left(1 + 2\cdot C_{\bar{l}}\cdot S_{\bar{l}}\cdot {}^{\bar{\bar{l}}}\tilde{n}_{\bar{l}} + 2\cdot S_{\bar{l}}^{2}\cdot {}^{\bar{\bar{l}}}\tilde{n}_{\bar{l}}^{:2}\right)\cdot {}^{\bar{l}}\lambda_{l} \\ {}^{\bar{l}}\lambda_{l}^{[4]} \end{bmatrix} = \begin{bmatrix} \left(1 + S_{\bar{l}}^{\bar{\bar{l}}}\cdot {}^{\bar{\bar{l}}}\tilde{n}_{\bar{l}} + \left(1 - C_{\bar{l}}^{\bar{\bar{l}}}\right)\cdot {}^{\bar{\bar{l}}}\tilde{n}_{\bar{l}}^{:2}\right)\cdot {}^{\bar{l}}\lambda_{l} \\ {}^{\bar{l}}\lambda_{l}^{[4]} \end{bmatrix}, \tag{2.344} $$

i.e.

$$ {}^{\bar{\bar{l}}|\bar{l}}\lambda_{l} = \begin{bmatrix} \left(1 + 2\cdot C_{\bar{l}}\cdot S_{\bar{l}}\cdot {}^{\bar{\bar{l}}}\tilde{n}_{\bar{l}} + 2\cdot S_{\bar{l}}^{2}\cdot {}^{\bar{\bar{l}}}\tilde{n}_{\bar{l}}^{:2}\right)\cdot {}^{\bar{l}}\lambda_{l} \\ {}^{\bar{l}}\lambda_{l}^{[4]} \end{bmatrix}. $$

From Eq. (2.344) we know that the similar transformation of the Euler quaternion ${}^{\bar{l}}\lambda_{l}$ is the projection of its Axis-invariant ${}^{\bar{l}}n_{l}$, and the size $C_{l}$ of the scalar part $S_{l}$ and vector ${}^{l}\lambda_{l}$ is invariant because the Axis-vector ${}^{\bar{l}}n_{l}$ and joint angle $\phi$l $\bar{l}$ are invariants. From Eq. (2.60) we know that the similar transformation of DCM matrix ${}^{\bar{\bar{l}}}Q_{\bar{l}}\cdot{}^{\bar{l}}Q_{l}\cdot{}^{\bar{l}}Q_{\bar{\bar{l}}}$ corresponds to the screw-matrix $\phi_{l}^{\bar{l}}\cdot{}^{\bar{\bar{l}}|\bar{l}}\tilde{n}_{l}$ after the projection of its rotation vector $\phi_{l}^{\bar{l}}\cdot{}^{\bar{l}}n_{l}$, and $$ {}^{\bar{\bar{l}}}Q_{\bar{l}}\cdot{}^{\bar{l}}Q_{l}\cdot{}^{\bar{l}}Q_{\bar{\bar{l}}} = \exp\begin{pmatrix} \phi_{\bar{l}}^{\bar{\bar{l}}}\cdot {}^{\bar{\bar{l}}}\tilde{n}_{\bar{l}} + \phi_{l}^{\bar{l}}\cdot {}^{\bar{\bar{l}}|\bar{l}}\tilde{n}_{l} \\ \backslash -\phi_{\bar{l}}^{\bar{\bar{l}}}\cdot {}^{\bar{\bar{l}}}\tilde{n}_{\bar{l}} \end{pmatrix} = \exp\left(\phi_{l}^{\bar{l}}\cdot {}^{\bar{\bar{l}}|\bar{l}}\tilde{n}_{l}\right). \tag{2.345} $$

Obviously, all of Eqs. (2.341), (2.342) and (2.344) have an iterative form; they are the basis for the establishment of kinematic equations by applying the dual-quaternions subsequently.

The 3D coordinate vectors a, b and c are given, then $$ a^{T}\cdot b\cdot c = c\cdot a^{T}\cdot b. \tag{2.346} $$

PROOF:

$$ a^{T}\cdot b\cdot c = \left(a^{[1]}\cdot b^{[1]} + a^{[2]}\cdot b^{[2]} + a^{[3]}\cdot b^{[3]}\right)\cdot c = \begin{bmatrix} c^{[1]} \\ c^{[2]} \\ c^{[3]} \end{bmatrix}\cdot $$

$$ \left(a^{[1]}\cdot b^{[1]} + a^{[2]}\cdot b^{[2]} + a^{[3]}\cdot b^{[3]}\right) = \begin{bmatrix} c^{[1]} \\ c^{[2]} \\ c^{[3]} \end{bmatrix}\cdot\left[a^{[1]},\ a^{[2]},\ a^{[3]}\right]\cdot\begin{bmatrix} b^{[1]} \\ b^{[2]} \\ b^{[3]} \end{bmatrix} = c\cdot a^{T}\cdot b. $$

Q.E.D.

Eq. (2.346) results in $$ {}^{\bar{l}}n_{\bar{l}}^{T}\cdot{}^{\bar{l}}p_{l}\cdot{}^{\bar{l}}n_{\bar{l}} = {}^{\bar{l}}n\cdot{}^{\bar{l}}n_{\bar{l}}^{T}\cdot{}^{\bar{l}}p_{l}. \tag{2.347} $$

According to Eqs. (2.124) and (2.347), then $$ {}^{\bar{\bar{l}}|\bar{l}}p_{l} \triangleq {}^{\bar{\bar{l}}}\lambda_{\bar{l}} * {}^{\bar{l}}p_{l} * {}^{\bar{l}}\lambda_{\bar{\bar{l}}} = \begin{bmatrix} \left(C_{\bar{l}}\cdot 1 + S_{\bar{l}}\cdot {}^{\bar{\bar{l}}}\tilde{n}_{\bar{l}}\right)\cdot {}^{\bar{l}}p_{l} + S_{\bar{l}}\cdot {}^{\bar{l}}p_{l}^{[4]}\cdot {}^{\bar{\bar{l}}}n_{\bar{l}} \\ C_{\bar{l}}\cdot {}^{\bar{l}}p_{l}^{[4]} - S_{\bar{l}}\cdot {}^{\bar{\bar{l}}}n_{\bar{l}}^{T}\cdot {}^{\bar{l}}p_{l} \end{bmatrix} * \begin{bmatrix} -S_{\bar{l}}\cdot {}^{\bar{\bar{l}}}n_{\bar{l}} \\ C_{\bar{l}} \end{bmatrix} = \begin{bmatrix} S_{\bar{l}}^{2}\cdot {}^{\bar{\bar{l}}}n_{\bar{l}}^{T}\cdot {}^{\bar{l}}p_{l}\cdot {}^{\bar{\bar{l}}}n_{\bar{l}} + S_{\bar{l}}^{2}\cdot {}^{\bar{\bar{l}}}\tilde{n}_{\bar{l}}^{:2}\cdot {}^{\bar{l}}p_{l} + C_{\bar{l}}^{2}\cdot {}^{\bar{l}}p_{l} + 2\cdot C_{\bar{l}}\cdot S_{\bar{l}}\cdot {}^{\bar{\bar{l}}}\tilde{n}_{\bar{l}}\cdot {}^{\bar{l}}p_{l} \\ {}^{\bar{l}}p_{l}^{[4]} \end{bmatrix} = $$

$$ \begin{bmatrix} S_{\bar{l}}^{2}\cdot\left({}^{\bar{l}}\tilde{n}_{l}^{:2} + 1\right)\cdot {}^{\bar{l}}p_{l} + S_{\bar{l}}^{2}\cdot {}^{\bar{\bar{l}}}\tilde{n}_{\bar{l}}^{:2}\cdot {}^{\bar{l}}p_{l} + C_{\bar{l}}^{2}\cdot {}^{\bar{l}}p_{l} + 2\cdot C_{\bar{l}}\cdot S_{\bar{l}}\cdot {}^{\bar{\bar{l}}}\tilde{n}_{\bar{l}}\cdot {}^{\bar{l}}p_{l} \\ {}^{\bar{l}}p_{l}^{[4]} \end{bmatrix} = $$

$$ \begin{bmatrix} \left(1 + 2\cdot C_{\bar{l}}\cdot S_{\bar{l}}\cdot {}^{\bar{\bar{l}}}\tilde{n}_{\bar{l}} + 2\cdot S_{\bar{l}}^{2}\cdot {}^{\bar{\bar{l}}}\tilde{n}_{\bar{l}}^{:2}\right)\cdot {}^{\bar{l}}p_{l} \\ {}^{\bar{l}}p_{l}^{[4]} \end{bmatrix} = \begin{bmatrix} \left(1 + S_{\bar{l}}^{\bar{\bar{l}}}\cdot {}^{\bar{\bar{l}}}\tilde{n}_{\bar{l}} + \left(1 - C_{\bar{l}}^{\bar{\bar{l}}}\right)\cdot {}^{\bar{\bar{l}}}\tilde{n}_{\bar{l}}^{:2}\right)\cdot {}^{\bar{l}}p_{l} \\ {}^{\bar{l}}p_{l}^{[4]} \end{bmatrix}, \tag{2.348} $$

i.e.

$$ {}^{\bar{\bar{l}}|\bar{l}}p_{l} = \begin{bmatrix} \left(1 + S_{\bar{l}}^{\bar{\bar{l}}}\cdot {}^{\bar{\bar{l}}}\tilde{n}_{\bar{l}} + \left(1 - C_{\bar{l}}^{\bar{\bar{l}}}\right)\cdot {}^{\bar{\bar{l}}}\tilde{n}_{\bar{l}}^{:2}\right)\cdot {}^{\bar{l}}p_{l} \\ {}^{\bar{l}}p_{l}^{[4]} \end{bmatrix}. $$

From Eq. (2.348) we know that the vector of ${}^{\bar{\bar{l}}|\bar{l}}p_{l}$ is the projection corresponding to the vector ${}^{\bar{l}}p_{l}$, and its scalar remains unchanged. Eqs. (2.344) and (2.348) show that the similar transformation of the attitude quaternion and position quaternion is the projection transformation in essence.

Dual-Quaternions Based on Axis-Invariant

[1] Dual-Quaternions and Basic Calculation

Define the dual-quaternions $\underset{..}{\varepsilon}\cdot{}^{\bar l}\underset{..}{q}_l$ as follows:

$$\underset{..}{\varepsilon}\cdot{}^{\bar l}\underset{..}{q}_l = {}^{\bar l}\lambda_l + {}^{\bar l}\underset{.}{q}_l\cdot\varepsilon = [1,\ \varepsilon]\cdot\begin{bmatrix}{}^{\bar l}\lambda_l\\ {}^{\bar l}\underset{.}{q}_l\end{bmatrix}, \tag{2.349}$$

$${}^{\bar l}\underset{.}{q}_l \triangleq {}^{\bar l|l}\underset{.}{p}_{l_S}, \tag{2.350}$$

wherein ${}^{\bar l}\lambda_l$ - attitude quaternion, ${}^{\bar l|l}\underset{.}{p}_{l_S}$ - the position quaternion, and ε—dual numbers operator in line with Eq. (2.326). ${}^{\bar l}\underset{..}{q}_l$ is the pseudo-coordinates of the dual-quaternions $\underset{..}{\varepsilon}\cdot{}^{\bar l}\underset{..}{q}_l$. The position quaternion ${}^{l}\underset{.}{q}_l$ characterizes the position quaternion from the origin $O_l$ to any consolidation point on link l.

Define the unit Euler quaternion $\underset{.}{1}$ and the zero-position quaternion $\underset{.}{0}$, $$\underset{.}{1} \triangleq [0_3,\ 1]^T,\ \underset{.}{0} \triangleq [0_3,\ 0]^T. \tag{2.351}$$

While ${}^{\bar l|l}\underset{.}{p}_{l_S}=\underset{.}{0}$, the dual-quaternion ${}^{\bar l}\underset{..}{q}_l$ is a pure rotation dual-quaternion; when ${}^{\bar l}\lambda=\underset{.}{1}$, the dual-quaternion ${}^{\bar l}\underset{..}{q}_l$ is a pure translation dual-quaternion. In general, the dual-quaternion ${}^{\bar l}\underset{..}{q}_l$ represents translation and rotation quaternions.

The dual-quaternions ${}^{\bar l}_k\underset{..}{q}_l$ and ${}^{\bar l}_j\underset{..}{q}_l$ are given and addition "+" calculations in Eq. (2.329) are met, therefore $\underset{..}{q}$ $$\underset{..}{\varepsilon}\cdot{}^{\bar l}_k\underset{..}{q}_l + \underset{..}{\varepsilon}\cdot{}^{\bar l}_j\underset{..}{q}_l = {}^{\bar l}_k\lambda_l + {}^{\bar l}_j\lambda_l + \left({}^{\bar l}_k\underset{.}{q}_l + {}^{\bar l}_j\underset{.}{q}_l\right)\cdot\varepsilon.$$

Then there is the pseudo-coordinate form, $${}^{\bar l}_k\underset{..}{q}_l + {}^{\bar l}_j\underset{..}{q}_l = \begin{bmatrix}{}^{\bar l}_k\lambda_l\\ {}^{\bar l}_k\underset{.}{q}_l\end{bmatrix} + \begin{bmatrix}{}^{\bar l}_j\lambda_l\\ {}^{\bar l}_j\underset{.}{q}_l\end{bmatrix}. \tag{2.352}$$

The dual-quaternions ${}^{\bar l}\underset{..}{q}_{\bar l}$ and ${}^{\bar l}\underset{..}{q}_l$ are given and multiplication "*" calculations in Eq. (2.330) are met. Consider Eq. (2.326), then $\underset{..}{q}$ $${}^{\bar l}\underset{..}{q}_{\bar l}\cdot\underset{..}{\varepsilon}^T * \underset{..}{\varepsilon}\cdot{}^{\bar l}\underset{..}{q}_l - {}^{\bar l}\lambda_{\bar l} * {}^{\bar l}\lambda_l + \left({}^{\bar l}\lambda_{\bar l} * {}^{\bar l}\underset{.}{q}_l + {}^{\bar l}\underset{.}{q}_{\bar l} * {}^{\bar l}\lambda_l\right)\cdot\varepsilon. \tag{2.353}$$

From Eq. (2.330), $${}^{\bar l}\overset{=}{\lambda}_{\bar l} * {}^{\bar l}\underset{.}{q}_l = \begin{bmatrix}{}^{\bar l}\overset{=}{\lambda}^{[4]}_{\bar l}\cdot{}^{\bar l}q_l + {}^{\bar l}\overset{=}{\lambda}_{\bar l}\cdot{}^{\bar l}q^{[4]}_l + {}^{\bar l}\tilde{\overset{=}{\lambda}}_{\bar l}\cdot{}^{\bar l}q_l\\ {}^{\bar l}\overset{=}{\lambda}^{[4]}_{\bar l}\cdot{}^{\bar l}q^{[4]}_l - {}^{\bar l}\overset{=}{\lambda}^T_{\bar l}\cdot{}^{\bar l}q_l\end{bmatrix} = \begin{bmatrix}{}^{\bar l}\overset{=}{\lambda}^{[4]}_{\bar l}\cdot{}^{\bar l}q_l + {}^{\bar l}\tilde{\overset{=}{\lambda}}_{\bar l}\cdot{}^{\bar l}q_l\\ -{}^{\bar l}\overset{=}{\lambda}^T_{\bar l}\cdot{}^{\bar l}q_l\end{bmatrix},$$

-continued $${}^{\bar l}\overset{=}{\underset{.}{q}}_{\bar l} * {}^{\bar l}\lambda_l = \begin{bmatrix}{}^{\bar l}\overset{=}{q}^{[4]}_{\bar l}\cdot{}^{\bar l}\lambda_l + {}^{\bar l}\overset{=}{q}_{\bar l}\cdot{}^{\bar l}\overset{=}{\lambda}^{[4]}_l + {}^{\bar l}\tilde{\overset{=}{q}}_{\bar l}\cdot{}^{\bar l}\lambda_l\\ {}^{\bar l}\overset{=}{q}^{[4]}_{\bar l}\cdot{}^{\bar l}\lambda^{[4]}_l - {}^{\bar l}\overset{=}{q}^T_{\bar l}\cdot{}^{\bar l}\lambda_l\end{bmatrix} = \begin{bmatrix}{}^{\bar l}q_l\cdot{}^{\bar l}\lambda^{[4]}_l + {}^{\bar l}\tilde{\overset{=}{q}}_{\bar l}\cdot{}^{\bar l}\lambda_l\\ -{}^{\bar l}\overset{=}{\lambda}^T_l\cdot{}^{\bar l}q_l\end{bmatrix},$$

i.e.

$${}^{\bar l}\overset{=}{\underset{..}{q}}_{\bar l} \triangleq {}^{\bar l}\overset{=}{\underset{..}{q}}_{\bar l} * {}^{\bar l}\underset{..}{q}_l = \begin{bmatrix}{}^{\bar l}\overset{=}{\lambda}_{\bar l}\cdot{}^{\bar l}\lambda_l\\ \left[{}^{\bar l}\overset{=}{q}_{\bar l}\cdot{}^{\bar l}\lambda^{[4]}_l + {}^{\bar l}\tilde{\overset{=}{q}}_{\bar l}\cdot{}^{\bar l}\lambda_l - {}^{\bar l}\overset{=}{q}^T_{\bar l}\cdot{}^{\bar l}\lambda_l\right]\end{bmatrix}.$$

The above equation shows that ${}^{\bar l}\underset{.}{q}_l^{[4]}$ may not be 0. Therefore, the pseudo-coordinate form corresponding to Eq. (2.353) is $${}^{\bar l}\overset{=}{\underset{..}{q}}_{\bar l} = {}^{\bar l}\overset{=}{\underset{..}{q}}_{\bar l} * {}^{\bar l}\underset{..}{q}_l = \begin{bmatrix}{}^{\bar l}\overset{=}{\lambda}_{\bar l} * {}^{\bar l}\lambda_l\\ {}^{\bar l}\overset{=}{\lambda}_{\bar l} * {}^{\bar l}\underset{.}{q}_l + {}^{\bar l}\overset{=}{\underset{.}{q}}_{\bar l} * {}^{\bar l}\lambda_l\end{bmatrix}. \tag{2.354}$$

[2] Conjugate Dual-Quaternions

Define the conjugate dual-quaternions ${}^{\bar l}\underset{..}{q}$ 1260 ${}_{\bar l}^{*}$ and ${}^{\bar l}\underset{..}{q}$ 1260 ${}_{\bar l}^{\circ}$ of the dual-quaternions ${}^{\bar l}\underset{..}{q}$ 1260 ${}_{\bar l}$ as follows:

$${}^{\bar l}\underset{..}{q}^*_l = \begin{bmatrix}{}^{\bar l}\lambda^*_l\\ {}^{\bar l}\underset{.}{q}^*_l\end{bmatrix},\ {}^{\bar l}\underset{..}{q}^\circ_l = \begin{bmatrix}{}^{\bar l}\lambda^*_l\\ -{}^{\bar l}\underset{.}{q}^*_l\end{bmatrix}. \tag{2.355}$$

Eq. (2.349) results in $\underset{..}{q}$ $$\left({}^{\bar l}\underset{..}{q}_{\bar l} * {}^{\bar l}\underset{..}{q}_l\right)^* = {}^{\bar l}\underset{..}{q}^*_l * {}^{\bar l}\underset{..}{q}^*_{\bar l}, \tag{2.356}$$

$$\left({}^{\bar l}\underset{..}{q}_{\bar l} * {}^{\bar l}\underset{..}{q}_l\right)^\circ = {}^{\bar l}\underset{..}{q}^\circ_l * {}^{\bar l}\underset{..}{q}^\circ_{\bar l}. \tag{2.357}$$

PROOF: Consider Eqs. (2.354) and (2.355), then $$\left({}^{\bar l}\overset{=}{\underset{..}{q}}_{\bar l} * {}^{\bar l}\underset{..}{q}_l\right)^* = \begin{bmatrix}{}^{\bar l}\overset{=}{\lambda}_{\bar l} * {}^{\bar l}\lambda_l\\ {}^{\bar l}\overset{=}{\lambda}_{\bar l} * {}^{\bar l}\underset{.}{q}_l + {}^{\bar l}\overset{=}{\underset{.}{q}}_{\bar l} * {}^{\bar l}\lambda_l\end{bmatrix}^o = \begin{bmatrix}\left({}^{\bar l}\overset{=}{\lambda}_{\bar l} * {}^{\bar l}\lambda_l\right)^*\\ \left({}^{\bar l}\overset{=}{\lambda}_{\bar l} * {}^{\bar l}\underset{.}{q}_l + {}^{\bar l}\overset{=}{\underset{.}{q}}_{\bar l} * {}^{\bar l}\lambda_l\right)\end{bmatrix} =$$

$$\begin{bmatrix}{}^{\bar l}\lambda^*_l * {}^{\bar l}\overset{=}{\lambda}^*_{\bar l}\\ {}^{\bar l}\underset{.}{q}^*_l * {}^{\bar l}\overset{=}{\lambda}^*_{\bar l} + {}^{\bar l}\lambda^*_l * {}^{\bar l}\overset{=}{\underset{.}{q}}^*_{\bar l}\end{bmatrix} = \begin{bmatrix}{}^{\bar l}\lambda^*_l\\ {}^{\bar l}\underset{.}{q}^*_l\end{bmatrix} * \begin{bmatrix}{}^{\bar l}\overset{=}{\lambda}^*_{\bar l}\\ {}^{\bar l}\overset{=}{\underset{.}{q}}\end{bmatrix} = {}^{\bar l}\underset{..}{q}^*_{\bar l} * {}^{\bar l}\overset{=}{\underset{..}{q}}^*_{\bar l},$$

so Eq. (2.356) is obtained. Consider Eqs. (2.354) and (2.355), therefore $$\left({}^{\bar l}\overset{=}{\underset{..}{q}}_{\bar l} * {}^{\bar l}\underset{..}{q}_l\right)^o = \begin{bmatrix}{}^{\bar l}\overset{=}{\lambda}_{\bar l} * {}^{\bar l}\lambda_l\\ {}^{\bar l}\overset{=}{\lambda}_{\bar l} * {}^{\bar l}\underset{.}{q}_l + {}^{\bar l}\overset{=}{\underset{.}{q}}_{\bar l} * {}^{\bar l}\lambda_l\end{bmatrix}^o = \begin{bmatrix}\left({}^{\bar l}\overset{=}{\lambda}_{\bar l} * {}^{\bar l}\lambda_l\right)^*\\ \left({}^{\bar l}\overset{=}{\lambda}_{\bar l} * {}^{\bar l}\underset{.}{q}_l + {}^{\bar l}\overset{=}{\underset{.}{q}}_{\bar l} * {}^{\bar l}\lambda_l\right)\end{bmatrix} =$$

-continued $$\begin{bmatrix} {}^{\bar{l}}\lambda^*_{l} * {}^{l}\lambda^*_{\bar{l}} \\ \left({}^{\bar{l}}q^*_{l} * {}^{l}\lambda^*_{\bar{l}} + {}^{\bar{l}}\lambda^*_{l} * {}^{l}q^*_{\bar{l}}\right) \end{bmatrix} = \begin{bmatrix} {}^{\bar{l}}\lambda^*_{l} \\ -{}^{\bar{l}}q^*_{l} \end{bmatrix} * \begin{bmatrix} {}^{l}\lambda^*_{\bar{l}} \\ -{}^{\bar{l}}q^*_{\bar{l}} \end{bmatrix} = {}^{\bar{l}}q^o_{\bar{l}} * {}^{l}q^*_{\bar{l}}.$$

Thus, Eq. (2.357) is obtained. Q.E.D.

According to Eqs. (20122), (2.354) and (2.355), then $$ {}^{\bar{l}}q_{l} * {}^{\bar{l}}q^*_{l} = \begin{bmatrix} {}^{\bar{l}}\lambda_{l} \\ {}^{\bar{l}}q_{l} \end{bmatrix} * \begin{bmatrix} {}^{\bar{l}}\lambda^*_{l} \\ {}^{\bar{l}}q^*_{l} \end{bmatrix} = \begin{bmatrix} {}^{\bar{l}}\lambda_{l} * {}^{\bar{l}}\lambda^*_{l} \\ {}^{\bar{l}}\lambda_{l} * {}^{\bar{l}}q^*_{l} + {}^{\bar{l}}q_{l} * {}^{\bar{l}}\lambda^*_{l} \end{bmatrix} = \tag{2.358}$$

$$\left[1, \begin{bmatrix} -{}^{\bar{l}}\lambda^{[4]}_{\bar{l}} \cdot {}^{\bar{l}}q_l - {}^{\bar{l}}\tilde{\lambda}_l \cdot {}^{\bar{l}}q_l \\ {}^{\bar{l}}\lambda_l^T \cdot {}^{\bar{l}}q_l \end{bmatrix} + \begin{bmatrix} {}^{\bar{l}}q_l \cdot {}^{\bar{l}}\lambda^{[4]}_{\bar{l}} - {}^{\bar{l}}\tilde{q}_l \cdot {}^{\bar{l}}\lambda_l \\ {}^{\bar{l}}q_l^T \cdot {}^{\bar{l}}\lambda_l \end{bmatrix}\right]^T = \left[1, 2 \cdot \begin{bmatrix} 0_3 \\ {}^{\bar{l}}\lambda_l^T \cdot {}^{\bar{l}}q_l \end{bmatrix}\right]^T,$$

i.e.

$$ {}^{\bar{l}}q_{l} * {}^{\bar{l}}q^*_{l} = \left[1, 2 \cdot \begin{bmatrix} 0_3 \\ {}^{\bar{l}}\lambda_l^T \cdot {}^{\bar{l}}q_l \end{bmatrix}\right]^T.$$

From Eqs. (2.126), (2.354), and (2.355), we get $$ {}^{\bar{l}}q_{l} * {}^{\bar{l}}q^o_{l} = \begin{bmatrix} {}^{\bar{l}}\lambda_{l} \\ {}^{\bar{l}}q_{l} \end{bmatrix} * \begin{bmatrix} {}^{\bar{l}}\lambda^*_{l} \\ -{}^{\bar{l}}q^*_{l} \end{bmatrix} = \begin{bmatrix} {}^{\bar{l}}\lambda_{l} * {}^{\bar{l}}\lambda^*_{l} \\ {}^{\bar{l}}q_{l} * {}^{\bar{l}}\lambda^*_{l} - {}^{\bar{l}}\lambda_{l} * {}^{\bar{l}}q^*_{l} \end{bmatrix} = \tag{2.259}$$

$$\left[1, \begin{bmatrix} {}^{\bar{l}}q_l \cdot {}^{\bar{l}}\lambda^{[4]}_{\bar{l}} - {}^{\bar{l}}\tilde{q}_l \cdot {}^{\bar{l}}\lambda_l \\ {}^{\bar{l}}q_l^T \cdot {}^{\bar{l}}\lambda_l \end{bmatrix} - \begin{bmatrix} {}^{\bar{l}}\lambda^{[4]}_{\bar{l}} \cdot {}^{\bar{l}}q_l - {}^{\bar{l}}\tilde{\lambda}_l \cdot {}^{\bar{l}}q_l \\ {}^{\bar{l}}\lambda_l^T \cdot {}^{\bar{l}}q_l \end{bmatrix}\right]^T = \left[1, 2 \cdot {}^{\bar{l}}\lambda^{[4]}_{\bar{l}} \cdot \begin{bmatrix} {}^{\bar{l}}q_l \\ 0 \end{bmatrix}\right]^T,$$

i.e.

$$ {}^{\bar{l}}q_{l} * {}^{\bar{l}}q^o_{l} = \left[1, 2 \cdot {}^{\bar{l}}\lambda^{[4]}_{\bar{l}} \cdot \begin{bmatrix} {}^{\bar{l}}q_l \\ 0 \end{bmatrix}\right]^T.$$

[3] Property of the Orthogonal Translation Quaternion

If $q$ $$ {}^{\bar{l}}\lambda_{l} \perp {}^{\bar{l}}q_{l}, \text{ then } {}^{\bar{l}}\lambda_l^T \cdot {}^{\bar{l}}q_l = 0; \text{ the } {}^{\bar{l}}q_l$$

is called the orthogonal translation quaternion. From Eq. (2.358) and the orthogonality of the orthogonal translation quaternion, then $q$ $$ {}^{\bar{l}}q_{l} * {}^{\bar{l}}q^*_{l} = 1. \tag{2.360}$$

Define the inverse ${}^{\bar{l}}q_{l}^{-1}$ of the orthogonal translation quaternion ${}^{\bar{l}}q_{l}$ in line with $q$ $$ {}^{\bar{l}}q_{l}^{-1} * {}^{\bar{l}}q_{l} = {}^{\bar{l}}q_{l} * {}^{\bar{l}}q_{l}^{-1} = 1. \tag{2.361}$$

From Eq. (2.360), therefore $q$ $$ {}^{\bar{l}}q^*_{l} = {}^{\bar{l}}q^{-1}_{l}. \tag{2362}$$

If $$ {}^{\bar{l}}\lambda_{l} \perp {}^{\bar{l}}q_{l}, \text{ then } {}^{\bar{l}}\lambda_l^T \cdot {}^{\bar{l}}q_l = 0.$$

Consider Eqs. (2.122) and (2.148), from Eqs. (2.361) and (2.353), then $$\begin{bmatrix} {}^{\bar{l}}\lambda_{l} \\ {}^{\bar{l}}q_{l} \end{bmatrix} * \begin{bmatrix} {}^{\bar{l}}\lambda^*_{l} \\ {}^{\bar{l}}q^*_{l} \end{bmatrix} = \begin{bmatrix} {}^{\bar{l}}\lambda_{l} * {}^{\bar{l}}\lambda^*_{l} \\ {}^{\bar{l}}q_{l} * {}^{\bar{l}}\lambda^*_{l} + {}^{\bar{l}}q_{l} * {}^{\bar{l}}\lambda_{l} \end{bmatrix} =$$

$$\left[1, \begin{bmatrix} {}^{\bar{l}}q_l \cdot -{}^{\bar{l}}\lambda^{[4]}_{\bar{l}} - {}^{\bar{l}}\tilde{q}_l \cdot {}^{\bar{l}}\lambda_l \\ {}^{\bar{l}}q_l^T \cdot {}^{\bar{l}}\lambda_l \end{bmatrix} - \begin{bmatrix} {}^{\bar{l}}\lambda^{[4]}_{\bar{l}} - {}^{\bar{l}}q_l + {}^{\bar{l}}\tilde{\lambda}_l \cdot {}^{\bar{l}}q_l \\ -{}^{\bar{l}}\lambda_l^T \cdot {}^{\bar{l}}q_l \end{bmatrix}\right]^T = \left[1, \begin{bmatrix} 0_3 \\ {}^{\bar{l}}q_l^T \cdot {}^{\bar{l}}\lambda_l \end{bmatrix}\right]^T = \begin{bmatrix} 1 \\ 0 \end{bmatrix}.$$

If ${}^{\bar{l}}\lambda \perp {}^{\bar{l}}q_{l}$, ${}^{\bar{l}}q$ 1358 $_{l}$ is the orthogonal translation quaternion, its inverse ${}^{\bar{l}}q$ 1358 $_{l}^{-1}$ is $$ {}^{\bar{l}}q^*_{l} = {}^{\bar{l}}q^{-1}_{l} = \begin{bmatrix} {}^{\bar{l}}\lambda_l^{-1} \\ -{}^{\bar{l}}q_l \end{bmatrix} = {}^{l}q_{\bar{l}}. \tag{2.363}$$

According to Eqs. (2.350) and (2.363), so $$ {}^{\bar{l}}q_{l} = \begin{bmatrix} {}^{\bar{l}}\lambda_l \\ {}^{\bar{l}|l}q_{l_S} \end{bmatrix}, \quad {}^{\bar{l}}q^*_{l} = \begin{bmatrix} {}^{\bar{l}}\lambda^*_l \\ -{}^{l}q_{l_S} \end{bmatrix}. \tag{2.364}$$

From Eqs. (2.349) and (2.363), then $$ {}^{\bar{l}}q_{\bar{\bar{l}}} = {}^{\bar{\bar{l}}}q_{\bar{l}}^{-1} = \begin{bmatrix} {}^{\bar{l}}\lambda_{\bar{\bar{l}}} \\ {}^{\bar{l}}q_{\bar{\bar{l}}} \end{bmatrix}, \tag{2.365}$$

when ${}^{\bar{l}}q_{\bar{l}}^{[4]}=0$, substitute Eq. (2.150) into Eq. (2.365), therefore $$ {}^{\bar{\bar{l}}}q_{l} = {}^{\bar{l}}q_{\bar{l}}^{-1} = \left[{}^{\bar{\bar{l}}}\lambda_{\bar{l}}, \begin{bmatrix} \left(1 + 2 \cdot {}^{\bar{\bar{l}}}\lambda^{[4]}_{\bar{l}} \cdot {}^{\bar{\bar{l}}}\tilde{\lambda}_l + 2 \cdot {}^{\bar{\bar{l}}}\tilde{\lambda}_l^{:2}\right) \cdot {}^{\bar{l}}r_l \\ 0 \end{bmatrix}\right]^T. \tag{2.366}$$

Configuration Dual-Quaternions Based on Axis-Invariant

From Eq. (2.86) we know that the position equation of the AC ${}^{i}\mathbf{1}_n=(i, \ldots, \bar{n}, n]$ is a multiple quadratic equation of $[\Sigma_l | l \in {}^{i}\mathbf{1}_n]$. Since the solution to the multiple quadratic equations is complex, it is necessary to simplify the positioning equation shown in Eq. (2.86) in order to obtain the inverse solution more easily. Consider the AC ${}^{i}\mathbf{1}_{l_S}=(\bar{l}, l, l_S]$, then ${}^{\bar{l}}r_{l_S}={}^{\bar{l}}r_l+{}^{\bar{l}}Q_l \cdot {}^{l}r_{l_S}$; the equation is the basic form of iterative kinematics. To simplify the position equation of the AC, the equation ${}^{\bar{l}}r_{l_S}={}^{\bar{l}}r_l+{}^{\bar{l}}Q_l\cdot{}^{l}r_{l_S}$ is should be expressed in a more compact form.

[1] Double 4D Complex Basis

First define the double 4D complex basis $\underset{..}{i}$, $$\underset{..}{i} \triangleq [i, \underset{.}{i}]. \tag{2.367}$$

From Eqs. (2.114) and (2.332), then $$\underset{..}{i}\cdot\underset{..}{i}^* = i^2 + \underset{.}{i}^2 = 0,$$

so $$\underset{..}{i}^2 = 0. \tag{2.368}$$

[2] Unilateral Dual-Quaternions

Define $\underset{..}{q}$ as the configuration dual-quaternion. Considering Eqs. (2.150) and (2.350), combine the translation ${}^{\bar{l}}r_l$ and rotation ${}^{\bar{l}}\underset{.}{\lambda}_l$ into the unilateral dual-quaternion as shown in Eq. (2.369)

$$\underset{..}{i}\cdot{}^{\bar{\bar{l}}l\bar{l}}\underset{..}{q}_l \triangleq \underset{..}{i}\cdot{}^{\bar{\bar{l}}}\lambda_l + \frac{1}{2}\cdot\underset{..}{i}\cdot{}^{\bar{\bar{l}}}\lambda_l * {}^{\bar{l}}\underset{..}{q}_l;\ \text{ if }\ \underset{..}{q}\in\underset{..}{q},\ {}^{\bar{\bar{l}}}k_l\in R, \tag{2.369}$$

wherein ${}^{\bar{l}}\underset{.}{p}_l$ is the position quaternion, as defined in Eq. (2.148), and $d_l$=0 The pseudo-coordinates ${}^{\bar{l}l\bar{l}}\underset{..}{q}_l$ of the configuration dual-quaternion is $$\underset{..}{{}^{\bar{\bar{l}}l\bar{l}}q}_l = \begin{bmatrix} {}^{\bar{\bar{l}}}\underset{.}{\lambda}_l \\ \frac{1}{2}\cdot{}^{\bar{\bar{l}}}\underset{.}{\lambda}_l * {}^{\bar{l}}\underset{.}{p}_l \end{bmatrix} = \begin{bmatrix} {}^{\bar{\bar{l}}}\underset{.}{\lambda}_l \\ {}^{\bar{\bar{l}}l\bar{l}}\underset{.}{q}_l \end{bmatrix} \text{ if } \underset{..}{q}\in\underset{..}{q},\ {}^{\bar{\bar{l}}}k_l\in R. \tag{2.370}$$

According to Eq. (2.370), then $${}^{\bar{l}}\underset{..}{q}_l = \begin{bmatrix} {}^{\bar{l}}\lambda_l \\ \frac{1}{2}\cdot{}^{\bar{l}}\lambda_l * {}^{\bar{l}}\underset{.}{p}_l \end{bmatrix} = \begin{bmatrix} \underset{.}{1} \\ \frac{1}{2}\cdot{}^{\bar{l}}\underset{.}{p}_l \end{bmatrix} \text{if } \underset{..}{q}\in\underset{..}{q},\ {}^{\bar{l}}k_l\in p. \tag{2.371}$$

Obviously, ${}^{\bar{l}l\bar{l}}\underset{..}{q}_l$ shows the position quaternion that rotates first and then translates, which has a forward sequence from root to leaf. Consider Eqs. (2.144), (2.148) and (2.370), then $${}^{\bar{l}l\bar{l}}\underset{..}{q}_l = \begin{bmatrix} {}^{\bar{l}}\lambda_l \\ \frac{1}{2}\cdot\begin{bmatrix} C_l\cdot\mathbf{1}+S_l\cdot{}^{\bar{l}}\tilde{n}_l & S_l\cdot{}^{\bar{l}}n_l \\ -S_l\cdot{}^{\bar{l}}n_l^T & C_l \end{bmatrix}\cdot\begin{bmatrix} {}^{\bar{l}}r_l \\ 0 \end{bmatrix} \end{bmatrix} \text{if } \begin{matrix} \underset{..}{q}\in\underset{..}{q} \\ {}^{\bar{l}}k_l\in c \end{matrix}. \tag{2.372}$$

From Eq. (2.372) we know that $${}^{\bar{l}l\bar{l}}\underset{.}{q}_l = \frac{1}{2}\cdot\begin{bmatrix} \left(C_l\cdot\mathbf{1}+S_l\cdot{}^{\bar{l}}\tilde{n}_l\right)\cdot{}^{\bar{l}}_0r_l \\ -S_l\cdot{}^{\bar{l}}n_l^T\cdot{}^{\bar{l}}_0r_l \end{bmatrix} \text{if } \begin{matrix} \underset{..}{q}\in\underset{..}{q} \\ {}^{\bar{l}}k_l\in R \end{matrix}. \tag{2.373}$$

Eqs. (2.148), (2.355) and (2.370) result in $${}^{\bar{l}l\bar{l}}\underset{..}{q}_l^* = \begin{bmatrix} {}^{\bar{l}}\lambda_l^* \\ \frac{1}{2}\cdot\left({}^{\bar{l}}\lambda_l * {}^{\bar{l}}\underset{.}{p}_l\right)^* \end{bmatrix} = \begin{bmatrix} {}^{\bar{l}}\lambda_l^* \\ \frac{1}{2}\cdot{}^{\bar{l}}\underset{.}{p}_l^* * {}^{\bar{l}}\lambda_l^* \end{bmatrix} = \begin{bmatrix} {}^{l}\lambda_{\bar{l}} \\ \frac{1}{2}\cdot{}^{l}\underset{.}{p}_{\bar{l}} * {}^{l}\lambda_{\bar{l}} \end{bmatrix}, \tag{2.374}$$

$${}^{\bar{l}l\bar{l}}\underset{..}{q}_l^{\circ} = \begin{bmatrix} {}^{\bar{l}}\lambda_l^* \\ -\frac{1}{2}\cdot\left({}^{\bar{l}}\lambda_l * {}^{\bar{l}}\underset{.}{p}_l\right)^* \end{bmatrix} = \begin{bmatrix} {}^{l}\lambda_{\bar{l}} \\ -\frac{1}{2}\cdot{}^{l}\underset{.}{p}_{\bar{l}} * {}^{l}\lambda_{\bar{l}} \end{bmatrix},$$

$$\text{i.e. } {}^{\bar{l}l\bar{l}}\underset{..}{q}_l^* = \begin{bmatrix} {}^{l}\lambda_{\bar{l}} \\ \frac{1}{2}\cdot{}^{l}\underset{.}{p}_{\bar{l}} * {}^{l}\lambda_{\bar{l}} \end{bmatrix},\ {}^{\bar{l}l\bar{l}}\underset{..}{q}_l^{\circ} = \begin{bmatrix} {}^{l}\lambda_{\bar{l}} \\ -\frac{1}{2}\cdot{}^{l}\underset{.}{p}_{\bar{l}} * {}^{l}\lambda_{\bar{l}} \end{bmatrix}.$$

Obviously, ${}^{\bar{l}l\bar{l}}\underset{..}{q}_l^*$ and ${}^{\bar{l}l\bar{l}}\underset{..}{q}_l^{\circ}$ represent the position quaternion that translates first and then rotates, which has an inverse sequence from leaf to root. From Eq. (2.361) we know that the inverse dual-quaternion ${}^{\bar{l}l\bar{l}}\underset{..}{q}_l^{-1}$ of the unilateral configuration dual-quaternion ${}^{\bar{l}l\bar{l}}\underset{..}{q}_l$, in Eq. (2.370) is $${}^{\bar{l}l\bar{l}}\underset{..}{q}_l^{-1} = \begin{bmatrix} {}^{\bar{l}}\lambda_l^* \\ \frac{1}{2}\cdot{}^{\bar{l}}\underset{.}{p}_l^* * {}^{\bar{l}}\lambda_l^* \end{bmatrix} = \begin{bmatrix} {}^{l}\lambda_{\bar{l}} \\ \frac{1}{2}\cdot{}^{l}\underset{.}{p}_{\bar{l}} * {}^{l}\lambda_{\bar{l}} \end{bmatrix} \text{if } \underset{..}{q}\in\underset{..}{q}. \tag{2.375}$$

According to Eqs. (2.370) and (2.375), then $$\begin{aligned} {}^{\bar{l}l\bar{l}}\underset{..}{q}_l * {}^{\bar{l}l\bar{l}}\underset{..}{q}_l^* &= \left[{}^{\bar{l}}\lambda_l,\ \frac{1}{2}\cdot{}^{\bar{l}}\lambda_l * {}^{\bar{l}}\underset{.}{p}_l\right]^T * \left[{}^{l}\lambda_{\bar{l}},\ -\frac{1}{2}\cdot{}^{l}\underset{.}{p}_{\bar{l}} * {}^{l}\lambda_{\bar{l}}\right]^T \\ &= \begin{bmatrix} \underset{.}{1} \\ \frac{1}{2}\cdot\left({}^{\bar{l}}\lambda_l * {}^{\bar{l}}\underset{.}{p}_l * {}^{l}\lambda_{\bar{l}} - {}^{\bar{l}}\lambda_l\cdot{}^{\bar{l}}\underset{.}{p}_l * {}^{l}\lambda_{\bar{l}}\right) \end{bmatrix} = \begin{bmatrix} \underset{.}{1} \\ \underset{.}{0} \end{bmatrix} \end{aligned}.$$

From Eq. (2.149) and the equation above, we obtain the modulus invariant equation of the configuration dual-quaternion:

$${}^{\bar{l}}\underset{.}{\lambda}_l * {}^{\bar{l}}\underset{.}{\lambda}_l^* = \underset{.}{1},\ {}^{\bar{l}l\bar{l}}\underset{..}{q}_l * {}^{\bar{l}l\bar{l}}\underset{..}{q}_l^* = \underset{..}{1}, \tag{2.376}$$

where $\underset{..}{1}$ is the unit dual-quaternion, $$\underset{..}{1} = [\underset{.}{1}, \underset{.}{0}]^T. \tag{2.377}$$

[3] Bilateral Dual-Quaternions

Define bilateral dual-quaternion ${}^{l}\underset{..}{p}_{l_S}$, $\underset{..}{p}$ $${}^{l}\underset{..}{p}_{l_S} \triangleq \left[\underset{.}{1},\ {}^{l}\underset{.}{p}_{l_S}\right]^T = \left[\underset{.}{1},\ {}^{l}\underset{.}{p}_{l_S}\right]^T. \tag{2.378}$$

Eq. (2.378) is a special case of Eq. (2.370), and is also known as the position dual-quaternion. From Eqs. (2.148), (2.355) and (2.378), then $${}^{l}\underset{..}{p}_{l_S}^* - \begin{bmatrix} \underset{.}{1} \\ {}^{l_S}\underset{.}{p}_l \end{bmatrix} - \begin{bmatrix} \underset{.}{1} \\ -{}^{l}\underset{.}{p}_{l_S} \end{bmatrix}, \tag{2.379}$$

-continued $$^{l}p^{\circ}_{l_s} = \begin{bmatrix} 1 \\ -^{l_s}p_l \end{bmatrix} = \begin{bmatrix} 1 \\ ^{l}p_{l_s} \end{bmatrix},$$

and $$^{\bar{l}|l}p_{l_s} \triangleq \begin{bmatrix} ^{\bar{l}}\lambda_l \\ ^{\bar{l}}\lambda_l * ^{l}p_{l_s} * ^{l}\lambda_{\bar{l}} \end{bmatrix} \quad (2.380)$$

$$^{\bar{l}|l}p_{l_s} \triangleq \begin{bmatrix} ^{\bar{l}}\lambda_l \\ -^{\bar{l}}\lambda_l * ^{l}p_{l_s} * ^{l}\lambda_{\bar{l}} \end{bmatrix}.$$

Figure 32:
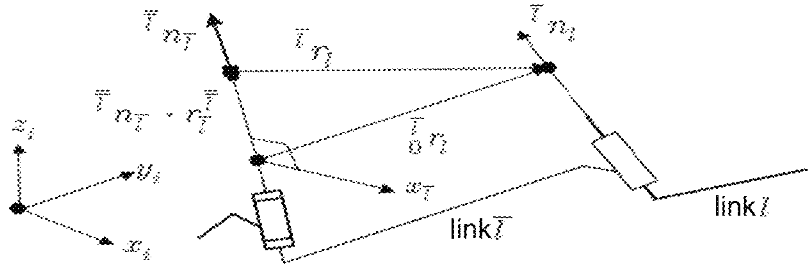
FIG. 32 is a relation diagram of fixed Axis-Invariants and dual quaternions.

Since $^{\bar{l}}r_l = {}_0^{\bar{l}}r_l + ^{\bar{l}}n_l \cdot r_l^l$, $^{\bar{l}}\lambda_l = [^{\bar{l}}n_l \cdot S_l, C_l]^T$. The structural parameter of the configuration dual-quaternions in Eq. (2.370) is the Axis-invariant $^{\bar{l}}\mathbb{I}_l = [^{\bar{l}}n_l, {}_0^{\bar{l}}r_l]$, as shown in FIG. 32. There are axis-invariant $^{\bar{l}}n_l$ 3201, axis-invariant $\mathbb{I}_{n_l}$ 3202 and the position vector $^{\bar{l}}r_l$ in the graph. The configuration dual-quaternions of the Axis-chain $^{\bar{l}}\mathbf{l}_l$ elaborate the screw motion of the position vector $^{\bar{l}}r_l$ 3203 around the Axis-invariant $^{\bar{l}}n_l$ 3201.

[4] Chain Relationship of Dual-Quaternions

When the bilateral dual-quaternion $^{l}p_{l_s}$, and unilateral dual-quaternion $^{\bar{l}}q_l$ of the AC $^{\bar{l}}\mathbf{l}_l$ are given, then there is an inverse iterative form of the dual-quaternions from leaf to root:

$$^{\bar{l}|\bar{l}}q_l * ^{\bar{l}|l}p_{l_s} * ^{\bar{l}|\bar{l}}q_l^{*} = \begin{bmatrix} ^{\bar{l}|\bar{l}}\lambda_l \\ ^{\bar{l}|l}p_{l_s} \end{bmatrix} = ^{\bar{l}|l}p_{l_s}, \text{ if } q \in q, \quad (2.381)$$

$$^{\bar{l}|\bar{l}}q_l * ^{\bar{l}|l}p_{l_s} * ^{\bar{l}|\bar{l}}q_l^{\circ} = \begin{bmatrix} ^{\bar{l}|\bar{l}}\lambda_l \\ ^{\bar{l}|\bar{l}}p_l + ^{\bar{l}|l}p_{l_s} \end{bmatrix} = ^{\bar{l}|\bar{l}}p_{l_s}, \text{ if } q \in q. \quad (2.382)$$

PROOF: Consider Eqs. (2.370), (2.375) and (2.378), then $$\begin{aligned}
^{\bar{l}|\bar{l}}q_l * ^{\bar{l}|l}p_{l_s} * ^{\bar{l}|\bar{l}}q_l^{*} &= \begin{bmatrix} ^{\bar{l}}\lambda_{\bar{l}} \\ \frac{1}{2}\cdot ^{\bar{l}}\lambda_{\bar{l}} * ^{\bar{l}}p_l \end{bmatrix} * \begin{bmatrix} ^{\bar{l}}\lambda_l \\ ^{\bar{l}}\lambda_l * ^{l}p_{l_s} * ^{l}\lambda_{\bar{l}} \end{bmatrix} * \begin{bmatrix} ^{l}\lambda_{\bar{l}} \\ -\frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l \\ ^{\bar{l}}\lambda_{\bar{l}} * ^{\bar{l}}\lambda_l * ^{l}p_{l_s} * ^{l}\lambda_{\bar{l}} + \frac{1}{2}\cdot ^{\bar{l}}\lambda_{\bar{l}} * ^{\bar{l}}p_l * ^{\bar{l}}\lambda_l \end{bmatrix} * \begin{bmatrix} ^{l}\lambda_{\bar{l}} \\ -\frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l * ^{l}\lambda_{\bar{l}} \\ \left(^{\bar{l}}\lambda_{\bar{l}} * ^{\bar{l}}\lambda_l * ^{l}p_{l_s} * ^{l}\lambda_{\bar{l}} + \frac{1}{2}\cdot ^{\bar{l}}\lambda_{\bar{l}} * ^{\bar{l}}p_l * ^{\bar{l}}\lambda_l\right) * ^{l}\lambda_{\bar{l}} - \frac{1}{2}\cdot ^{\bar{l}}\lambda_l * ^{\bar{l}}p_l \cdot ^{l}\lambda_{\bar{l}} \end{bmatrix}. \\
&= \begin{bmatrix} ^{\bar{l}|\bar{l}}\lambda_l \\ ^{\bar{l}}\lambda_l * ^{l}p_{l_s} * ^{l}\lambda_{\bar{l}} \end{bmatrix} = \begin{bmatrix} ^{\bar{l}|\bar{l}}\lambda_l \\ ^{\bar{l}|\bar{l}}\lambda_{l_s} \end{bmatrix} = ^{\bar{l}|\bar{l}}p_{l_s}
\end{aligned}$$

So Eq. (2.381) is obtained. From Eqs. (2.370), (2.375) and (2.378), therefore $$\begin{aligned}
^{\bar{l}|\bar{l}}q_l * ^{\bar{l}|l}p_{l_s} * ^{\bar{l}|\bar{l}}q_l^{\circ} &= \begin{bmatrix} ^{\bar{l}}\lambda_{\bar{l}} \\ \frac{1}{2}\cdot ^{\bar{l}}\lambda_{\bar{l}} * ^{\bar{l}}p_l \end{bmatrix} * \begin{bmatrix} ^{\bar{l}}\lambda_l \\ ^{\bar{l}}\lambda_l * ^{l}p_{l_s} * ^{l}\lambda_{\bar{l}} \end{bmatrix} * \begin{bmatrix} ^{l}\lambda_{\bar{l}} \\ -\frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l \\ ^{\bar{l}}\lambda_{\bar{l}} * ^{\bar{l}}\lambda_l * ^{l}p_{l_s} * ^{l}\lambda_{\bar{l}} + \frac{1}{2}\cdot ^{\bar{l}}\lambda_{\bar{l}} * ^{\bar{l}}p_l * ^{\bar{l}}\lambda_l \end{bmatrix} * \begin{bmatrix} ^{l}\lambda_{\bar{l}} \\ \frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l * ^{l}\lambda_{\bar{l}} \\ \left(^{\bar{l}}\lambda_{\bar{l}} * ^{\bar{l}}\lambda_l * ^{l}p_{l_s} * ^{l}\lambda_{\bar{l}} + \frac{1}{2}\cdot ^{\bar{l}}\lambda_{\bar{l}} * ^{\bar{l}}p_l * ^{\bar{l}}\lambda_l\right) * ^{l}\lambda_{\bar{l}} + \frac{1}{2}\cdot ^{\bar{l}}\lambda_l * ^{\bar{l}}p_l \cdot ^{l}\lambda_{\bar{l}} \end{bmatrix}. \\
&= \begin{bmatrix} ^{\bar{l}|\bar{l}}\lambda_l \\ ^{\bar{l}}\lambda_l * ^{l}p_{l_s} * ^{l}\lambda_{\bar{l}} + ^{\bar{l}}\lambda_l * ^{\bar{l}}p_l * ^{l}\lambda_{\bar{l}} \end{bmatrix} = \begin{bmatrix} ^{\bar{l}|\bar{l}}\lambda_l \\ ^{\bar{l}|\bar{l}}p_l + ^{\bar{l}|\bar{l}}p_{l_s} \end{bmatrix} = ^{\bar{l}|\bar{l}}p_{l_s}
\end{aligned}$$

So Eq. (2.382) is obtained. Q.E.D.

If the bilateral dual-quaternion $^{l}p_{l_s}$ and the unilateral dual-quaternion $^{\bar{l}}q_l$ of the AC $^{\bar{l}}\mathbf{l}_l$ are given, then there is a forward iterative form of the dual-quaternions from root to leaf:

$$^{\bar{l}|\bar{l}}q_l * ^{\bar{l}|l_s}p_l * ^{\bar{l}|\bar{l}}q_l^{*} = \begin{bmatrix} ^{\bar{l}|\bar{l}}\lambda_l \\ ^{\bar{l}|l_s}p_l \end{bmatrix} = ^{\bar{l}|l_s}p_l, \text{ if } q \in q, \quad (2.383)$$

$$^{\bar{l}|\bar{l}}q_l * ^{\bar{l}|l_s}p_l * ^{\bar{l}|\bar{l}}q_l^{\circ} = \begin{bmatrix} ^{\bar{l}|\bar{l}}\lambda_l \\ ^{\bar{l}|\bar{l}}p_l + ^{\bar{l}|l_s}p_l \end{bmatrix} = ^{\bar{l}|l_s}p_l, \text{ if } q \in q. \quad (2.384)$$

PROOF: From Eqs. (2.370), (2.375) and (2.378), we get $$\begin{aligned}
^{\bar{l}|\bar{l}}q_l * ^{\bar{l}|l_s}p_l * ^{\bar{l}|\bar{l}}q_l^{*} &= \begin{bmatrix} ^{\bar{l}}\lambda_{\bar{l}} \\ \frac{1}{2}\cdot ^{\bar{l}}\lambda_{\bar{l}} * ^{\bar{l}}p_l \end{bmatrix} * \begin{bmatrix} ^{\bar{l}}\lambda_l \\ ^{\bar{l}}\lambda_l * ^{l_s}p_l * ^{l}\lambda_{\bar{l}} \end{bmatrix} * \begin{bmatrix} ^{l}\lambda_{\bar{l}} \\ -\frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l \\ ^{\bar{l}}\lambda_{\bar{l}} * ^{\bar{l}}\lambda_l * ^{l_s}p_l * ^{l}\lambda_{\bar{l}} + \frac{1}{2}\cdot ^{\bar{l}}\lambda_{\bar{l}} * ^{\bar{l}}p_l * ^{\bar{l}}\lambda_l \end{bmatrix} * \begin{bmatrix} ^{l}\lambda_{\bar{l}} \\ -\frac{1}{2}\cdot ^{\bar{l}}p_l * ^{l}\lambda_{\bar{l}} \end{bmatrix} \\
&= \begin{bmatrix} ^{\bar{l}}\lambda * ^{\bar{l}}\lambda_l * ^{l}\lambda_{\bar{l}} \\ \left(^{\bar{l}}\lambda_{\bar{l}} * ^{\bar{l}}\lambda_l * ^{lS}p_l * ^{l}\lambda_{\bar{l}} + \frac{1}{2}\cdot ^{\bar{l}}\lambda_{\bar{l}} * ^{\bar{l}}p_l * ^{\bar{l}}\lambda_l\right) * ^{l}\lambda_{\bar{l}} \\ \backslash -\frac{1}{2}\cdot ^{\bar{l}}\lambda_{\bar{l}} * ^{\bar{l}}\lambda_l * ^{\bar{l}}p_l * ^{l}\lambda_{\bar{l}} \end{bmatrix}. \\
&= \begin{bmatrix} ^{\bar{l}|\bar{l}}\lambda_l \\ ^{\bar{l}|l_s}p_l \end{bmatrix} = ^{\bar{l}|\bar{l}}p_l
\end{aligned}$$

So Eq. (2.383) is obtained. According to Eqs. (2.370), (2.375) and (2.378), then $$\begin{aligned}
^{\bar{l}|\bar{l}}q_l * ^{\bar{l}|l_s}p_l * ^{\bar{l}|\bar{l}}q_l^{\circ} &= \begin{bmatrix} ^{\bar{l}}\lambda_{\bar{l}} \\ \frac{1}{2}\cdot ^{\bar{l}}\lambda_{\bar{l}} * ^{\bar{l}}p_l \end{bmatrix} * \begin{bmatrix} ^{\bar{l}}\lambda_l \\ ^{\bar{l}}\lambda_l * ^{l_s}p_l * ^{l}\lambda_{\bar{l}} \end{bmatrix} * \begin{bmatrix} ^{l}\lambda_{\bar{l}} \\ \frac{1}{2}\cdot ^{\bar{l}}p_l * ^{l}\lambda_{\bar{l}} \end{bmatrix} \\
&= \begin{bmatrix} ^{\bar{l}}\lambda_{\bar{l}} * ^{\bar{l}}\lambda_l \\ ^{\bar{l}}\lambda_{\bar{l}} * ^{\bar{l}}\lambda_l * ^{l_s}p_l * ^{l}\lambda_{\bar{l}} + \frac{1}{2}\cdot ^{\bar{l}}\lambda_{\bar{l}} * ^{\bar{l}}p_l * ^{\bar{l}}\lambda_l \end{bmatrix} * \begin{bmatrix} ^{l}\lambda_{\bar{l}} \\ \frac{1}{2}\cdot ^{\bar{l}}p_l * ^{l}\lambda_{\bar{l}} \end{bmatrix}
\end{aligned}$$

-continued $$= \begin{bmatrix} {}^{\vec{\bar{l}}}\lambda_{\bar{l}} * {}^{\bar{l}}\lambda_{l} * {}^{\bar{l}}\lambda_{\vec{\bar{l}}} \\ \left({}^{\vec{\bar{l}}}\lambda_{\bar{l}} * {}^{\bar{l}}\lambda_{l} * {}^{lS}p_{l} * {}^{l}\lambda_{\bar{l}} + \frac{1}{2}\cdot{}^{\vec{\bar{l}}}\lambda_{\bar{l}} * {}^{\bar{l}}p_{l} * {}^{\bar{l}}\lambda_{l}\right) * {}^{\bar{l}}\lambda_{\vec{\bar{l}}} \\ \backslash + \frac{1}{2}\cdot{}^{\vec{\bar{l}}}\lambda_{\bar{l}} * {}^{\bar{l}}\lambda_{l} * {}^{\bar{l}}p_{l} * {}^{\bar{l}}\lambda_{\vec{\bar{l}}} \end{bmatrix}$$

$$= \begin{bmatrix} {}^{\vec{\bar{l}}|\bar{l}}\lambda_{l} \\ {}^{\vec{\bar{l}}|\bar{l}}p_{l} + {}^{\vec{\bar{l}}|l_S}p_{l} \end{bmatrix} = {}^{\vec{\bar{l}}|\bar{l}}p_{l}$$

So Eq. (2.384) is obtained. Q.E.D.

When the AC ${}^{i}1_{n}$=(i, ${}^{i}\tilde{\lambda}_{\bar{l}}^{-1}$, . . . , $\bar{n}$, n], l∈${}^{i}1_{n}$ are given, we can get the iteratives of the bilateral position dual-quaternions ${}^{n}p_{n_s}$ and ${}^{i}p_{i_s}$ and the unilateral configuration dual-quaternion ${}^{\bar{l}}q_{l}$ respectively with Eqs. (2.381)-Eq. (2.384)

$$\left({}^{i|\bar{i}}q_{\bar{\bar{i}}} * \ldots {}^{\bar{\bar{n}}|\bar{n}}q_{n}\right) * {}^{\bar{n}|n}p_{n_S} * \left({}^{i|\bar{i}}q_{\bar{\bar{i}}} * \ldots {}^{\bar{\bar{n}}|\bar{n}}q_{n}\right)^{*} = {}^{i|n}p_{n_S} \quad \text{if} \quad q \in q, \tag{2.385}$$

$$\left({}^{i|\bar{i}}q_{\bar{\bar{i}}} * \ldots {}^{\bar{\bar{n}}|\bar{n}}q_{n}\right) * {}^{\bar{n}|n}p_{n_S} * \left({}^{i|\bar{i}}q_{\bar{\bar{i}}} * \ldots {}^{\bar{\bar{n}}|\bar{n}}q_{n}\right)^{\circ} = {}^{i}p_{n_S} \quad \text{if} \quad q \in q, \tag{2.386}$$

$$\left({}^{n|\bar{n}}q_{\bar{\bar{n}}} * \ldots {}^{\bar{\bar{i}}|\bar{i}}q_{i}\right) * {}^{\bar{i}|i_S}p_{i} * \left({}^{n|\bar{n}}q_{\bar{\bar{n}}} * \ldots {}^{\bar{\bar{i}}|\bar{i}}q_{i}\right)^{*} = {}^{n|i_S}p_{i} \quad \text{if} \quad q \in q, \tag{2.387}$$

Eqs. (2.386) and (2.388) not only carry out the coordinate transformation of the position vector, but also ensure the invariance of the position vector of the ACs, which are used to establish the positioning equation of the AC ${}^{i}1_{n_S}$ and AC ${}^{i_S}1_{n}$ respectively. Eqs. (2.385) and (2.387) are ordinary, and do not have any practical use. In Eqs. (2.386) and (2.388), ${}^{n|i_S}p_{i}$ or ${}^{n}p_{i}$ usually express the desired position dual-quaternions; ${}^{i_S}p_{i}$ or ${}^{\bar{n}|n}p_{n_S}$ express the position dual-quaternions of the end-effector relative to its system. Although Eqs. (2.385)-(2.388) are concise in form, the calculation is complicated with many axes, and it is necessary to establish an effective iterative process.

In the following, the section further simplifies the expression form of the configuration dual-quaternion to obtain a more concise and unified screw dual-quaternions. Firstly, we propose the screw radial invariants characterized by D-H parameters. Furthermore, we propose screw dual-quaternions based on Axis-invariant.

[1] Screw Radial Invariant

As can be seen from Section one, the configuration dual-quaternions essentially express a screw motion. In the following, Eq. (2.372) further expresses as a more concise form to reflect the characteristics of screw motion. As shown in FIG. 32, D-H parameters are defined, then $$\lambda_{\bar{l}} = C(\alpha_{\bar{l}}) = {}^{\bar{l}}n_{l}^{T} \cdot {}^{\bar{\bar{l}}}n_{\bar{l}}, \tag{2.389}$$

$$c_{\bar{l}} = r_{\bar{l}}^{\bar{\bar{l}}} = {}^{\bar{\bar{l}}}n_{\bar{l}}^{T} \cdot {}^{\bar{l}}l_{l}, \tag{2.390}$$

$${}^{\bar{l}}l_{l} = a_{\bar{l}} \cdot {}^{\bar{\bar{l}}}\tilde{n}_{\bar{l}} \cdot {}^{\bar{l}}n_{l} + c_{\bar{l}} \cdot {}^{\bar{\bar{l}}}n_{\bar{l}}. \tag{2.391}$$

Obviously, there is an ordinary fact:

$$2\cdot S_l\cdot({}^{\bar{l}}n_l\cdot{}^{\bar{l}}n_l^{T}-1)\cdot{}^{l}r^{i}\tilde{\lambda}_{\bar{l}}^{1} = 2\cdot S_l\cdot({}^{\bar{l}}n_l\cdot{}^{\bar{l}}n_l^{T}-1)\cdot{}^{l}r^{i}\tilde{\lambda}_{\bar{l}}^{1},$$

and with (2.32), then $$\begin{aligned} &\left(C_l\cdot{}^{\bar{l}}\tilde{n}_l + 2\cdot S_l\cdot\left({}^{\bar{l}}n_l\cdot{}^{\bar{l}}n_l^{T} - 1\right)\right)\cdot{}^{l}r_{\bar{l}} \\ &= \left(C_l\cdot{}^{\bar{l}}\tilde{n}_l + 2\cdot S_l\cdot{}^{\bar{l}}\tilde{n}_l^{:2}\right)\cdot{}^{l}r_{\bar{l}} \end{aligned}. \tag{2.392}$$

So $$\left(C_l\cdot{}^{\bar{l}}\tilde{n}_l + 2\cdot S_l\cdot\left({}^{\bar{l}}n_l\cdot{}^{\bar{l}}n_l^{T} - 1\right)\right)\cdot{}^{l}r_{\bar{l}} = -2\cdot S_l\cdot{}^{\bar{\bar{l}}}u_{\bar{l}}, \tag{2.393}$$

where $${}^{\bar{l}}u_l = -\frac{1}{2}\cdot\left(\frac{C_l}{S_l}\cdot 1 + 2\cdot{}^{\bar{l}}\tilde{n}_l\right)\cdot{}^{\bar{l}}\tilde{n}_l\cdot{}^{l}r_{\bar{l}}. \tag{2.394}$$

Considering Eq. (2.394), then $${}^{\bar{l}}n_l^{T}\cdot{}^{\bar{l}}u_l = -\frac{1}{2}\cdot{}^{\bar{l}}n_l^{T}\cdot\left(\frac{C_l}{S_l}\cdot 1 + 2\cdot{}^{\bar{l}}\tilde{n}_l\right)\cdot{}^{\bar{l}}\tilde{n}_l\cdot{}^{l}r_{\bar{l}} = 0,$$

so $${}^{\bar{l}}n_l^{T}\cdot{}^{\bar{l}}u_l = 0. \tag{2.395}$$

From Eq. (2.394) we know that there are always the system dependent structural parameter $c_l$ and screw radial invariant ${}^{\bar{l}}u_l$ of the Joint angle $\phi_l^{\bar{l}}$, among which ${}^{\bar{l}}u_l$ and ${}^{\bar{l}}n_l$ are orthogonal to each other. ${}^{\bar{l}}u_l$ is called the screw radial invariant of ${}^{\bar{l}}n_l$. It is a prerequisite for the screw dual-quaternion. The screw dual-quaternion will be elaborated as follows.

[2] Screw Dual-Quaternion $\psi$ is defined as the screw dual-quaternion. Assume the origin of the joint variable of a body be consistent with the origin of its D-H system, and the reference frame is still the natural frame. From Eq. (2.394), then $${}^{\bar{l}}u_l = -\frac{1}{2}\cdot\left(\frac{1}{\tau_l}\cdot 1 + 2\cdot{}^{\bar{l}}\tilde{n}_l\right)\cdot{}^{\bar{l}}\tilde{n}_l\cdot{}^{\bar{l}}r_{\bar{l}}, \text{ if } q \in \psi. \tag{2.396}$$

When $${}^{l}r_{\bar{l}} = c_l\cdot{}^{\bar{l}}n_l - 2\cdot{}^{\bar{l}}u_l, \text{ if } q \in \psi, \tag{2.397}$$

according to Eq. (2.373)

$${}^{\bar{l}}q_l = \frac{1}{2}\cdot\begin{bmatrix}\left(C_l\cdot 1 + S_l\cdot{}^{\bar{l}}\tilde{n}_l\right)\cdot\left(c_l\cdot{}^{\bar{l}}n_l - 2\cdot{}^{\bar{l}}u_l\right) \\ -c_l\cdot S_l\cdot{}^{\bar{l}}n_l^{T}\cdot\left({}^{\bar{l}}n_l - 2\cdot{}^{\bar{l}}u_l\right)\end{bmatrix}, \text{ if } q \in \psi.. \tag{2.398}$$

From Eqs. (2.395) and (2.398), therefore $${}^{\bar{l}}q_l = \frac{1}{2}\cdot\begin{bmatrix}C_l\cdot c_l\cdot{}^{\bar{l}}n_l - 2\cdot S_l\cdot{}^{\bar{l}}u_l \\ -S_l\cdot c_l\end{bmatrix}; \text{ if } q \in \psi.. \tag{2.399}$$

When ${}^{\bar{l}}r_l=c_l\cdot{}^{\bar{l}}n_l$, we obtain the unilateral dual-quaternions with Eq. (2.373), $$ {}^{\bar{l}}\underset{..}{q}_l=\begin{bmatrix}{}^{\bar{l}}\lambda_l\\ {}^{\bar{l}}q_l\end{bmatrix}=\begin{bmatrix}\begin{bmatrix}S_l\cdot{}^{\bar{l}}n_l\\ C_l\end{bmatrix}\\ \frac{1}{2}\cdot\begin{bmatrix}C_l\cdot c_l\cdot{}^{\bar{l}}n_l\\ -S_l\cdot c_l\end{bmatrix}\end{bmatrix};\ \text{if}\ \underset{.}{q}\in\underset{.}{\psi}. \tag{2.400}$$

From Eq. (2.400) we know that ${}^{\bar{l}}\underset{..}{q}_l$ is the linear form about $C_l$, $S_l$ and $c_l$, and translation and rotation are expressed in a compact form. Since the screw dual-quaternions of Eq. (2.400) are specific configuration dual-quaternions, Eqs. (2.385)-(2.388) are still set.

Figure 33:
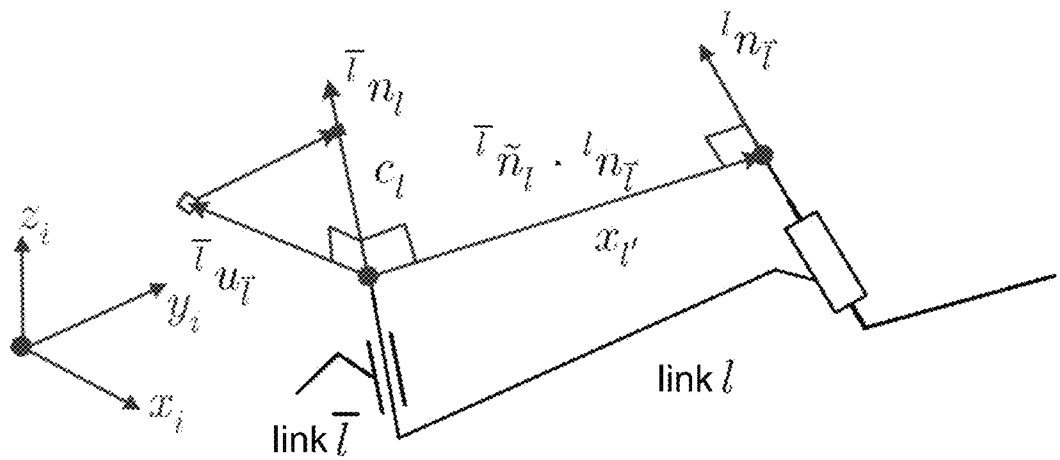
FIG. 33 is a diagram of spiral radial invariant.

On the basis of screw radial invariants, the effect of establishing the screw dual-quaternions is as follows: Eqs. (2.395) and (2.396) are applied to reduce the calculation amount of the dual-quaternions and easily reveal the law of screw dual-quaternions in order to simplify the kinematic solution process. From Eqs. (2.395) and (2.396) we know that the screw radial invariant ${}^{\bar{l}}u_l$ 3303 is orthogonal to the Axis-invariants ${}^{\bar{l}}n_l$ 3301 and ${}^{l}n_{\bar{l}}$ 3302, as shown in FIG. 33.

Considering Eq. (2.373), when ${}^{\bar{l}}k_{\bar{l}}$, ${}^{\bar{l}}r_l={}^{\bar{l}}n_{\bar{l}}\cdot r_{\bar{l}}^{\bar{l}}+{}^{\bar{l}}l_l$, we obtain the unilateral screw dual-quaternions.

$$ {}^{\bar{l}|l}\underset{..}{q}_{\bar{l}}=\begin{bmatrix}{}^{\bar{l}}\underset{.}{\lambda}_l\\ \frac{1}{2}\cdot\begin{bmatrix}\begin{pmatrix}C_l\cdot 1+\\ \backslash S_l\cdot{}^{\bar{l}}\tilde{n}_l\end{pmatrix}\cdot{}^{l}r_{\bar{l}}\\ -S_l\cdot{}^{\bar{l}}n_l^T\cdot{}^{l}r_{\bar{l}}\end{bmatrix}\end{bmatrix}=\begin{bmatrix}\begin{bmatrix}S_l\cdot{}^{\bar{l}}n_l\\ C_l\end{bmatrix}\\ \frac{1}{2}\cdot\begin{bmatrix}{}^{\bar{l}}n_l\cdot C_l\cdot c_l\\ -S_l\cdot c_l\end{bmatrix}\end{bmatrix},\ \text{if}\begin{cases}\underset{..}{q}\in\underset{..}{q}\\ {}^{\bar{l}}k_l\in c\\ {}^{\bar{l}}n_l\|{}^{l}r_{\bar{l}}\\ c_l:=r_l^{\bar{l}}\end{cases}. \tag{2.401}$$

By comparing Eq. (2.400) with Eq. (2.401), we also know that screw dual-quaternions are specific dual-quaternions. Thus, the nature of the configuration dual-quaternions also adapts to screw dual-quaternions. When the D-H reference and the screw quaternion are used in the kinematic modeling of Robo-arms, the motion of a joint has to be expressed by two screw quaternions, and its symbolic calculus and numerical calculation amount are much higher than that of a configuration quaternion.

[3] Invariance of Screw Dual-Quaternions

Since screw dual-quaternions are a special case of configuration dual-quaternions, it can be expressed in a more compact form. By considering the screw dual-quaternions of the dual numbers base ${}^{\bar{l}}\underset{..}{\bar{\lambda}}$ and double 4D complex number basis $\underset{..}{1}$, the variables of the screw dual-quaternions can be obtained with Eqs. (2.67), (2.349), (2.369), (2.336) and (2.400), i.e. the overall form of the pseudo-coordinate and base:

$$\begin{aligned}\underset{.}{\varepsilon}\cdot\mathrm{Diag}(\underset{.}{i})\cdot{}^{\bar{l}}\underset{..}{q}_l&=C\left(\frac{\phi_l^{\bar{l}}}{2}\right)+i\cdot S\left(\frac{\phi_l^{\bar{l}}}{2}\right)\cdot{}^{\bar{l}}n_l\\ &\backslash-S\left(\frac{\phi_l^{\bar{l}}}{2}\right)\cdot\frac{c_l}{2}\cdot\varepsilon+i\cdot\left(C\left(\frac{\phi_l^{\bar{l}}}{2}\right)\cdot\frac{c_l}{2}\cdot{}^{\bar{l}}n_l-S\left(\frac{\phi_l^{\bar{l}}}{2}\right)\cdot{}^{\bar{l}}u_l\right)\cdot\varepsilon\\ &=C\left(\frac{\phi_l^{\bar{l}}}{2}\right)-S\left(\frac{\phi_l^{\bar{l}}}{2}\right)\cdot\frac{c_l}{2}\cdot\varepsilon\\ &\backslash+i\cdot\left[S\left(\frac{\phi_l^{\bar{l}}}{2}\right)\cdot{}^{\bar{l}}n_l+\left(C\left(\frac{\phi_l^{\bar{l}}}{2}\right)\cdot\frac{c_l}{2}\cdot{}^{\bar{l}}n_l-S\left(\frac{\phi_l^{\bar{l}}}{2}\right)\cdot{}^{\bar{l}}u_l\right)\cdot\varepsilon\right]\\ &=C\left(\frac{\phi_l^{\bar{l}}}{2}\right)-\frac{c_l}{2}\cdot S\left(\frac{\phi_l^{\bar{l}}}{2}\right)\cdot\varepsilon+\underset{.}{i}\cdot\left(S\left(\frac{\phi_l^{\bar{l}}}{2}\right)+\frac{c_l}{2}\cdot C\left(\frac{\phi_l^{\bar{l}}}{2}\right)\cdot\varepsilon\right)\cdot\left({}^{\bar{l}}n_l+{}^{\bar{l}}u_l\cdot\varepsilon\right)\\ &=C\left(\frac{\phi_l^{\bar{l}}+c_l\cdot\varepsilon}{2}\right|+\underset{.}{i}\cdot S\left(\frac{\phi_l^{\bar{l}}+c_l\cdot\varepsilon}{2}\right)\cdot\left({}^{\bar{l}}n_l+{}^{\bar{l}}u_l\cdot\varepsilon\right)\end{aligned}$$

-continued i.e.

$$\begin{aligned}&\underset{.}{\varepsilon}\cdot\mathrm{Diag}(\underset{.}{i})\cdot{}^{\bar{l}}\underset{..}{q}_l\\ &=C\left(\underset{.}{\varepsilon}\cdot\frac{\underset{..}{q}_l^{\bar{l}}}{2}\right)+\underset{.}{i}\cdot S\left(\underset{.}{\varepsilon}\cdot\frac{q_l^{\bar{l}}}{2}\right)\cdot\left(\underset{.}{\varepsilon}\cdot{}^{\bar{l}}\underset{..}{\xi}_l\right),\ \text{if}\ \underset{.}{q}\in\underset{.}{\psi},\end{aligned} \tag{2.402}$$

where $$c_l\equiv c_l^{\bar{l}}, \tag{2.403}$$

$$\underset{.}{\varepsilon}\cdot\underset{..}{q}_l^{\bar{l}}=\phi_l^{\bar{l}}+c_l^{\bar{l}}\cdot\varepsilon, \tag{2.404}$$

$$\underset{.}{\varepsilon}\cdot{}^{\bar{l}}\underset{..}{\xi}_l={}^{\bar{l}}n_l+{}^{\bar{l}}u_l\cdot\varepsilon, \tag{2.405}$$

$$\underset{..}{q}_l^{\bar{l}}=\begin{bmatrix}\phi_l^{\bar{l}}\\ c_l^{\bar{l}}\end{bmatrix},\ {}^{\bar{l}}\underset{..}{\xi}_l=\begin{bmatrix}{}^{\bar{l}}n_l\\ {}^{\bar{l}}u_l\end{bmatrix},\ \text{if}\ \underset{.}{q}\in\underset{.}{\psi}. \tag{2.406}$$

The ${}^{\bar{l}}\underset{..}{\xi}_l$ is called the dual screw axis, which consists of a screw radial vector ${}^{\bar{l}}n_l$ and a screw radial invariant ${}^{\bar{l}}u_l$.

From Eq. (2.358), then $$ {}^{\bar{l}}\underset{..}{\xi}_l*{}^{\bar{l}}\underset{..}{\xi}_l^*=\begin{bmatrix}{}^{\bar{l}}n_l\\ {}^{\bar{l}}u_l\end{bmatrix}*\begin{bmatrix}{}^{\bar{l}}n_l^*\\ {}^{\bar{l}}u_l^*\end{bmatrix}=\begin{bmatrix}{}^{\bar{l}}n_l*{}^{\bar{l}}n_l^*\\ {}^{\bar{l}}u_l*{}^{\bar{l}}n_l^*+{}^{\bar{l}}n_l*{}^{\bar{l}}u_l^*\end{bmatrix}=\begin{bmatrix}{}^{\bar{l}}n_l*{}^{\bar{l}}n_l^*\\ 0_3\end{bmatrix}, \tag{2.407}$$

i.e.

$$ {}^{\bar{l}}\underset{..}{\xi}_l*{}^{\bar{l}}\underset{..}{\xi}_l^*=[1,\ \ 0_3]^T,\ \left\|{}^{\bar{l}}\underset{..}{\xi}_l\right\|=1.$$

Eq. (2.407) shows that the dual screw axis ${}^{\bar{l}}\underset{..}{\psi}_l$ is unit double 3D vectors, and the screw dual-quaternions are the unit quaternions. With Eqs. (2.404)-(2.406), Eq. (2.402) is re-expressed as $$\underset{.}{\varepsilon}\cdot\mathrm{Diag}(\underset{.}{i})\cdot{}^{\bar{l}}\underset{..}{q}_l=C\left(\underset{.}{\varepsilon}\cdot\underset{..}{q}_l^{\bar{l}}\right)+\underset{.}{i}\cdot S\left(\underset{.}{\varepsilon}\cdot\underset{..}{q}_l^{\bar{l}}\right)\cdot{}^{\bar{l}}\underset{..}{\xi}_l,\ \text{if}\ \underset{.}{q}\in\underset{.}{\psi}, \tag{2.408}$$

where $$\underset{.}{\varepsilon}\cdot{}^{\bar{l}}\underset{..}{q}_l=\left[S\left(\underset{.}{\varepsilon}\cdot\underset{..}{q}_l^{\bar{l}}\right)\cdot{}^{\bar{l}}\underset{..}{\xi}_l,\ C\left(\underset{.}{\varepsilon}\cdot\underset{..}{q}_l^{\bar{l}}\right)\right]^T,\ \text{if}\ \underset{.}{q}\in\underset{.}{\psi}. \tag{2.409}$$

By comparing Eq. (2.409) with Eq. (2.127), they both have the same mathematical structure in the unit axis and sine and cosine forms. Therefore, screw dual-quaternions have all spatial operators of the Euler formula. The screw dual-quaternions are the unity of translation and rotation quaternions, and Eqs. (2.395) and (2.409) respectively show the opposite and unity of both.

Substitute i and $\phi_l^{\bar{l}}$ in Eq. (2.104) with $\underset{.}{i}$ and $$ {}^{\bar{l}}\underset{..}{\xi}_l\cdot\underset{.}{\varepsilon}\cdot\underset{..}{q}_l^{\bar{l}}$$

$\underset{..}{\psi}\ \underset{.}{q}$ respectively, then $$\exp\left(\underset{.}{i}\cdot{}^{\bar{l}}\underset{..}{\xi}_l\cdot\underset{.}{\varepsilon}\cdot\underset{..}{q}_l^{\bar{l}}\right)=C\left(\underset{.}{\varepsilon}\cdot\underset{..}{q}_l^{\bar{l}}\right)+\underset{.}{i}\cdot{}^{\bar{l}}\underset{..}{\xi}_l\cdot S\left(\underset{.}{\varepsilon}\cdot\underset{..}{q}_l^{\bar{l}}\right),\ \text{if}\ \underset{.}{q}\in\underset{.}{\psi}. \tag{2.410}$$

That is, there is a pseudo-coordinate form of the screw dual-quaternions $$\exp({}^{\bar l}\underline{\xi}_l\cdot\underline{\varepsilon}\cdot\underline{q}_l^{\bar l}) = \left[S(\underline{\varepsilon}\cdot\underline{q}_l^{\bar l}),\ {}^{\bar l}\underline{\xi}_l\cdot C(\underline{\varepsilon}\cdot\underline{q}_l^{\bar l})\right],\ \text{if } q\in\underline{\psi}. \tag{2.411}$$

Obviously, the exponential calculation in Eq. (2.410) has a better operating performance than the complex multiplication calculation of dual-quaternions, which provides an effective technical means for complex kinematic analysis.

Consider Eq. (2.368), from Eq. (2.410), therefore $$\begin{aligned} C(\underline{\varepsilon}\cdot\underline{q}_l^{\bar l}) &= \frac{1}{2}\cdot\begin{pmatrix}\exp(-\underline{i}\cdot{}^{\bar l}\underline{\xi}_l\cdot\underline{\varepsilon}\cdot\underline{q}_l^{\bar l})\\ +\exp(\underline{i}\cdot{}^{\bar l}\underline{\xi}_l\cdot\underline{\varepsilon}\cdot\underline{q}_l^{\bar l})\end{pmatrix} \\ S(\underline{\varepsilon}\cdot\underline{q}_l^{\bar l}) &= \frac{\underline{i}}{2}\cdot\begin{pmatrix}\exp(-\underline{i}\cdot{}^{\bar l}\underline{\xi}_l\cdot\underline{\varepsilon}\cdot\underline{q}_l^{\bar l})\\ -\exp(\underline{i}\cdot{}^{\bar l}\underline{\xi}_l\cdot\underline{\varepsilon}\cdot\underline{q}_l^{\bar l})\end{pmatrix}\end{aligned},\ \text{if } q\in\underline{\psi}. \tag{2.412}$$

[4] Power and Differential of Screw Dual-Quaternions

From Eq. (2.409), we obtain the ρth power of ${}^{\bar l}\underline{q}_l$, $${}^{\bar l}\underline{q}_l^{\rho} = \left[S\left(\frac{\rho \underline{q}_l^{\bar l}}{2}\right)\cdot{}^{\bar l}\underline{\xi}_l,\ C\left(\frac{\rho \underline{q}_l^{\bar l}}{2}\right)\right]^T,\ \text{if } q\in\underline{\psi},\ \rho>0. \tag{2.413}$$

Obviously, Eq. (2.413) is the interpolation process of Eq. (2.409). From Eqs. (2.413) and (2.237), we obtain the interpolation and differential formulas of Euler quaternions respectively:

$${}^{\bar l}\dot{\lambda}_l^{\rho} = \frac{\rho}{2}\cdot{}^{\bar l}\dot{\vec{\phi}}_l\cdot{}^{\bar l}\lambda_l, \tag{2.414}$$

$${}^{\bar l}\lambda_l^{\rho} - \left[S\left(\frac{\rho\phi_l^{\bar l}}{2}\right)\cdot{}^{\bar l}n_l,\ C\left(\frac{\rho\phi_l^{\bar l}}{2}\right)\right]^T,\ \rho>0. \tag{2.415}$$

From Eq. (2.400) we obtain the ρth power of ${}^{\bar l}\underline{q}_l$, $${}^{\bar l}\underline{q}_l = \left[\begin{bmatrix}S\left(\frac{\rho\phi_l^{\bar l}}{2}\right)\cdot{}^{\bar l}n_l\\ C\left(\frac{\rho\phi_l^{\bar l}}{2}\right)\end{bmatrix},\ \begin{bmatrix}C\left(\frac{\rho\phi_l^{\bar l}}{2}\right)\cdot\frac{\rho c_l^{\bar l}}{2}\cdot{}^{\bar l}n_l\\ -S\left(\frac{\rho\phi_l^{\bar l}}{2}\right)\cdot{}^{\bar l}u_l\\ -S\left(\frac{\rho\phi_l^{\bar l}}{2}\right)\cdot\frac{\rho c_l^{\bar l}}{2}\end{bmatrix}\right]^T,\ \text{if } \begin{matrix}q\in\underline{\psi}\\ \rho>0\end{matrix}. \tag{2.416}$$

Similarly, from Eq. (2.409), we obtain the ρ the power of $\underline{\varepsilon}\cdot{}^{\bar l}\underline{q}_l$, $$\underline{\varepsilon}\cdot{}^{\bar l}\underline{q}_l = \left[S(\underline{\varepsilon}\cdot\rho \underline{q}_l^{\bar l})\cdot{}^{\bar l}\underline{\xi}_l,\ C(\underline{\varepsilon}\cdot\rho \underline{q}_l^{\bar l})\right]^T,\ \text{if } \begin{matrix}q\in\underline{\psi},\\ \rho>0\end{matrix}. \tag{2.417}$$

The dual Screw-Matrix ${}^{\bar l}\dot{\tilde{\phi}}_l$ and dual unit matrix $\underline{0}$ are expressed as $${}^{\bar l}\dot{\underline{\tilde{\phi}}}_l\begin{bmatrix}{}^{\bar l}\dot{\tilde{\phi}}_l & 0\\ 0 & {}^{\bar l}\dot{\tilde{\phi}}_l\end{bmatrix},\ \underline{1} = \begin{bmatrix}1 & 0\\ 0 & 1\end{bmatrix}. \tag{2.418}$$

Eqs. (2.336) and (2.408) result in $$\begin{aligned}\underline{\varepsilon}\cdot\underline{i}\cdot{}^{\bar l}\dot{\underline{q}}_l = &-\frac{\rho\dot{\phi}_l^{\bar l}}{2}\cdot S(\underline{\varepsilon}\cdot\rho \underline{q}_l^{\bar l}) - \frac{\rho\dot{c}_l^{\bar l}}{2}\cdot S\left(\frac{\rho\phi_l^{\bar l}}{2}\right)\cdot\varepsilon + [i,\ i].\\ &\left[S(\underline{\varepsilon}\cdot\rho \underline{q}_l^{\bar l})\cdot{}^{\bar l}\dot{\underline{\tilde{\phi}}}_l\cdot{}^{\bar l}\underline{\xi}_l + \frac{\rho\dot{\phi}}{2}\cdot C(\underline{\varepsilon}\cdot\rho \underline{q}_l^{\bar l})\cdot{}^{\bar l}\underline{\xi}_l + \frac{\rho\dot{\phi}_l^{\bar l}}{2}\cdot C\left(\frac{\rho\phi_l^{\bar l}}{2}\right)\cdot{}^{\bar l}\underline{\xi}_l\cdot\varepsilon\right]\end{aligned}$$

From Eq. (2.337) and the equation above, then $$\begin{aligned}\underline{\varepsilon}\cdot\underline{i}\cdot{}^{\bar l}\dot{\underline{q}}_l = &-\frac{\rho\dot{\phi}_l^{\bar l}}{2}\cdot S\left(\frac{\rho\phi_l^{\bar l}}{2}\right)\\ &-\left[\frac{\rho^2\cdot c_l^{\bar l}\cdot\dot{\phi}_l^{\bar l}}{4}\cdot C\left(\frac{\rho\phi_l^{\bar l}}{2}\right) + \frac{\rho\dot{c}_l^{\bar l}}{2}\cdot S\left(\frac{\rho\phi_l^{\bar l}}{2}\right)\right]\cdot\varepsilon\\ &+[i,i]\cdot\left[S\left(\frac{\rho\phi_l^{\bar l}}{2}\right)\cdot{}^{\bar l}\dot{\underline{\tilde{\phi}}}_l + \frac{\rho\dot{\phi}_l^{\bar l}}{2}\cdot C\left(\frac{\rho\phi_l^{\bar l}}{2}\right)\cdot\underline{1}\right]\cdot{}^{\bar l}\underline{\xi}_l + [i,i]\\ &\cdot\left[\frac{\rho c_l^{\bar l}}{2}\cdot C\left(\frac{\rho\phi_l^{\bar l}}{2}\right)\cdot{}^{\bar l}\dot{\underline{\tilde{\phi}}}_l + \begin{pmatrix}\frac{\rho\dot{c}_l^{\bar l}}{2}\cdot C\left(\frac{\rho\phi_l^{\bar l}}{2}\right) -\\ \frac{\rho^2\cdot c_l^{\bar l}\cdot\dot{\phi}_l^{\bar l}}{4}\cdot S\left(\frac{\rho\phi_l^{\bar l}}{2}\right)\end{pmatrix}\cdot\underline{1}\right]\cdot{}^{\bar l}\underline{\xi}_l\cdot\varepsilon.\end{aligned} \tag{2.419}$$

Eq. (2.419) is expressed in the dual-quaternions matrix form, we obtain Eq. (2.420)

$${}^{\bar l}\dot{\underline{q}}_l = \begin{bmatrix}\begin{bmatrix}{}^{\bar l}A_l\cdot{}^{\bar l}n_l\\ -\frac{\rho\dot{\phi}_l^{\bar l}}{2}\cdot S\left(\frac{\rho\phi_l^{\bar l}}{2}\right)\end{bmatrix}\\ {}^{\bar l}A_l\cdot{}^{\bar l}n_l\\ \left[-\frac{\rho^2\cdot c_l^{\bar l}\cdot\dot{\phi}_l^{\bar l}}{4}\cdot C\left(\frac{\rho\phi_l^{\bar l}}{2}\right) - \frac{\rho\dot{c}_l^{\bar l}}{2}\cdot S\left(\frac{\rho\phi_l^{\bar l}}{2}\right)\right]\end{bmatrix},\ \text{if } \begin{matrix}q\in\underline{\psi}\\ \rho>0\end{matrix}, \tag{2.420}$$

where $$\begin{aligned}{}^{\bar l}A_l = &\left(S\left(\frac{\rho\phi_l^{\bar l}}{2}\right) + \frac{\rho c_l^{\bar l}}{2}\cdot C\left(\frac{\rho\phi_l^{\bar l}}{2}\right)\right)\cdot{}^{\bar l}\dot{\tilde{\phi}}_l\\ &+\left(\frac{\rho\dot{c}_l^{\bar l}+\rho\dot{\phi}_l^{\bar l}}{2}\cdot C\left(\frac{\rho\phi_l^{\bar l}}{2}\right) - \frac{\rho^2\cdot c_l^{\bar l}\cdot\dot{\phi}_l^{\bar l}}{4}\cdot S\left(\frac{\rho\phi_l^{\bar l}}{2}\right)\right)\cdot 1\end{aligned}\quad \text{if } \begin{matrix}q\in\underline{\psi}\\ \rho>0\end{matrix}. \tag{2.421}$$

From Eq. (2.420) we know that ${}^{\bar l}\underline{q}_l$ is the functions of $\rho c_l^{\bar l}$, $\rho\dot{c}_l^{\bar l}$, $\rho\phi_l^{\bar l}$ and $\rho\dot{\phi}_l^{\bar l}$.

Iterative Kinematic Equation Based on Dual-Quaternions

On the one hand, the manual calculation of high-DOF explicit normalized equations is difficult since they have high complexity, and it is necessary to do kinematic modeling with symbolic calculation software such as Maple. However, such software is difficult to integrate into robotic control systems. On the other hand, variable-structure robots need to establish normative kinematic explicit equations in real time automatically. Therefore, it is necessary to establish an iterative kinematic equation based on dual-quaternions.

According to Eqs. (2.341) and (2.342) we know:

$$\begin{bmatrix} {}^{i|n}\lambda_n \\ {}^{i|n}\lambda_n^{[4]} \end{bmatrix} = \begin{bmatrix} \prod_{l}^{{}^i1_{\overline{n}}} \left(1 + S_l^{\overline{l}} \cdot {}^{\overline{l}}\tilde{n}_l + \left(1 - C_l^{\overline{l}}\right) \cdot {}^{\overline{l}}\tilde{n}_l^{:2}\right) * {}^{\overline{n}}\lambda_n \\ {}^{\overline{n}}\lambda_n^{[4]} \end{bmatrix} \quad (2.422)$$

$$\begin{bmatrix} {}^{n|i}\lambda_i \\ {}^{n|\vec{i}}\lambda_i^{[4]} \end{bmatrix} = \begin{bmatrix} \prod_{l}^{{}^i1_{i}} \left(1 - S_l^{\overline{l}} \cdot {}^{\overline{l}}\tilde{n}_l + \left(1 - C_l^{\overline{l}}\right) \cdot {}^{\overline{l}}\tilde{n}_l^{:2}\right) * {}^{\vec{i}}\lambda_i \\ {}^{\vec{i}}\lambda_n^{[4]} \end{bmatrix}.$$

The ${}^{i|n}\lambda_n$ in Eq. (2.422), and the attitude equation expressed by quaternion is a multi-linear form of $[C_l^{\overline{l}}, S_l^{\overline{l}} | , l \in {}^i1_n]$.

The position quaternions of Eqs. (2.386) and (2.388) can be expressed as following:

$$\begin{bmatrix} \sum_{k}^{{}^i1_{nS}} \left( \prod_{l}^{{}^i1_{\overline{k}}} \left(1 + S_l^{\overline{l}} \cdot {}^{\overline{l}}\tilde{n}_l + \left(1 - C_l^{\overline{l}}\right) \cdot {}^{\overline{l}}\tilde{n}_l^{:2}\right) \cdot {}^{\overline{k}}p_k \right) \\ \sum_{k}^{{}^i1_{nS}} \left( {}^{\overline{k}}p_k^{[4]} \right) \end{bmatrix} = {}^i p_{nS}, \quad (2.423)$$

$$\begin{bmatrix} \sum_{k}^{{}^n1_{i}} \left( \prod_{l}^{{}^i1_{\overline{k}}} \left(1 - S_l^{\overline{l}} \cdot {}^{\overline{l}}\tilde{n}_l + \left(1 - C_l^{\overline{l}}\right) \cdot {}^{\overline{l}}\tilde{n}_l^{:2}\right) \cdot {}^{\overline{k}}p_k \right) \\ \sum_{k}^{{}^i1_{i}} \left( {}^{\overline{k}}p_k^{[4]} \right) \end{bmatrix} = {}^n p_i. \quad (2.424)$$

PROOF: From Eq. (2.344), then $${}^{\bar{\bar{l}}|\bar{l}}\lambda_l = \begin{bmatrix} \left(1 + S_{\bar{l}}^{\bar{\bar{l}}} \cdot {}^{\bar{\bar{l}}}\tilde{n}_{\bar{l}} + \left(1 - C_{\bar{l}}^{\bar{\bar{l}}}\right) \cdot {}^{\bar{\bar{l}}}\tilde{n}_{\bar{l}}^{:2}\right) \cdot {}^{\bar{l}}\lambda_l \\ {}^{\bar{l}}\lambda_l^{[4]} \end{bmatrix}. \quad (2.425)$$

Eqs. (2.386) and (2.388) show that the vector of ${}^{\bar{l}|\bar{l}}\lambda_l$ is the projection of the corresponding vector ${}^{\bar{l}}\lambda_l$; the vector of ${}^{\bar{l}|\bar{l}}p_l$ is the projection of the corresponding vector ${}^{\bar{l}}p_l$. From Eqs. (2.382) and (2.384), we obtain respectively $${}^{\bar{\bar{l}}|\bar{l}}p_{\bar{l}} = {}^{\bar{\bar{l}}|\bar{l}}q_l * {}^{\bar{l}|l}p_{\bar{l}} * {}^{\bar{\bar{l}}|\bar{l}}q_l^o = \begin{bmatrix} {}^{\bar{l}|\bar{l}}\lambda_l \\ {}^{\bar{\bar{l}}|\bar{l}}p_l + {}^{\bar{\bar{l}}|\bar{l}}p_s \end{bmatrix}, \text{ if } q \in q, \quad (2.426)$$

$${}^{\bar{\bar{l}}|\bar{l}}q_l * {}^{\bar{l}|l_s}p_{\bar{l}} * {}^{\bar{\bar{l}}|\bar{l}}q_l^o = \begin{bmatrix} {}^{\bar{l}|\bar{l}}\lambda_l \\ {}^{\bar{\bar{l}}|\bar{l}}p_l + {}^{\bar{\bar{l}}|l_s}p_l \end{bmatrix}, \text{ if } q \in q. \quad (2.427)$$

Obviously, $${}^{i|n}p_{n_S} = \sum_{k}^{{}^i1_{nS}} \left( {}^{i|\overline{k}}p_k \right), \; {}^n p_i = \sum_{k}^{{}^n1_{i}} \left( {}^{n|\overline{k}}p_k \right). \quad (2.428)$$

From Eqs. (2.386), (2.388), (2.348) and (2.425)-(2.428), we obtain Eqs. (2.423) and (2.424). Q.E.D.

Since screw dual-quaternions are a special case of configuration dual-quaternions, Eqs. (2.423) and (2.424) also adapt to the screw dual-quaternions, besides Eqs. (2.423) and (2.424) can be further reduced by applying Eq. (2.401).

From Eqs. (2.422) and (2.424) we know that they are the 1st-Order polynomial equations with respect to $[C_l^{\overline{l}}, S_l^{\overline{l}} | , l \in {}^i1_n]$. The ${}^{i|\overline{n}}\lambda_n$ in Eq. (2.422) is the multi-linear polynomial with respect to $[C_l^{\overline{l}}, S_l^{\overline{l}} | , l \in {}^i1_n]$. Therefore, the kinematic equation of the AC ${}^i1_n$ is a polynomial equation of the Cayley parameter $[\tau_l^{\overline{l}} | , l \in {}^i1_n]$. When ${}^i p_{nS}$ or ${}^n p_i$ are given, the calculation of $[\tau_l^{\overline{l}} | , l \in {}^i1_n]$ is an inverse kinematic solution. How to solve the polynomial equation with respect to $[\tau_l^{\overline{l}} | , l \in {}^i1_n]$ is the core problem for studying the inverse kinematics.

From Eqs. (2.422) and (2.424) we know that the kinematic equations of the Robo-arm based on the dual-quaternions are ordinary, and they are kinematic equations based the Axis-invariant. Even if no knowledge of dual-quaternions is applied, Eqs. (2.422) and (2.424) are applicable. Obviously, compared to quaternions, the concept of dual-quaternions does not add new information, so it is difficult to get a new conclusion.

Review of the Axis-Invariant

In this chapter, we propose the concept of Axis-invariant and set MAS FK based on Axis-invariant. Effects of the axis invariance concept are summed up:

[1] The Axis-invariant ${}^{\overline{l}}n_l$ is the common reference axis of axes $\overline{l}$ and l, and it achieves the parameterization of the polarity of axis l in conjunction with the Lodrigues quaternion and Euler quaternion. The Axis-Invariant ${}^{\overline{l}}n_l$ is a structural parameter indicating both the invariant structural parameters of axis $\overline{l}$ and l, and the constant axis chain of axis $\overline{l}$ and l, and the parameterization of the topology of the MAS is realized by the topology operation.

[2] The Euler quaternion based on the Axis-invariant ${}^{\overline{l}}n_l$ and joint variable $\phi_l^{\overline{l}}$ can be mapped with the rotation vector ${}^{\overline{l}}\phi_l$ one by one, which ensures invariance defined by the natural reference axis; thus, the calculation reliability of the MAS is guaranteed.

[3] The Axis-invariants ${}^{\overline{l}}n_l$ and ${}^{\overline{l}}\tilde{n}_l$ are invariant and have excellent operating performance; ${}^{\overline{l}}\tilde{n}_l$ is screw, and ${}^{\overline{l}}\tilde{n}_l^{:2}$ is symmetrical; when p>2, p∈N, ${}^{\overline{l}}\tilde{n}_l^{:p}$ has nilpotency.

[4] From Eqs. (2.309) and (2.312) we know that the Axis-invariant is invariant to time, the DCM of ACs is invariant to the partial velocity of joint angles, and the Axis-invariant is the coordinate vector of the base.

[5] The Axis-invariant ${}^{\overline{l}}n_l$ is the primitive of 3D spatial operation algebra. The 3D spatial operation algebra with topological operation not only has clear physical meaning, but also is easy to calculate so it can adapt to the applications of a variable topology system. It is different from traditional 3D vector algebra, as well as 6D dual-vector operation algebra.

[6] The 3D vector can be converted into the 6D vector, quaternions and configuration dual-quaternions and other different mathematical spaces through the Axis-invariant ${}^{\overline{l}}n_l$. The computational complexity is reduced correspondingly, and the structured and internally compact multi-axis kinematic system is established.

[7] The kinematic equation based on the Axis-invariant ${}^{\overline{l}}n_l$ is a second-order multivariable polynomial equation of ${}^{\overline{l}}n_l$ with an iterative form. It not only unifies the form of the kinematic equations, but also improves the efficiency and accuracy of kinematic calculation.

[8] It is precise to measure the Axis-invariant ${}^{\overline{l}}n_l$ with optical instruments such as laser trackers.

[9] Full parameterization modeling including the frame, polarity and system structural parameters is realized through the Axis-invariant.

The Axis-invariant is the key to realize full parameterization of the frame, polarity, structural parameters and dynamical parameters. In the dynamical modeling of the MAS based on Axis-invariant, the dynamical equation of any axis can be written directly. The equation can also be expressed as an iterative of the Axis-invariant, and the generalized inertia is a 3×3 matrix, which reduces the complexity of forward and inverse dynamics calculations. Therefore, it is necessary to name the Axis-vector an Axis-invariant, which reflects an intrinsic attribute of the Axis-invariant.

The Axis-invariant is the primitive of the MAS structure as well as the MAS motion reference. At the same time, the Axis-invariant has excellent mathematical operating performance, and the advantage of accurate calibration with a laser tracker. Therefore, Axis-invariant is the cornerstone of establishing the structured and intrinsically compact MAS theory.

Generally, the effect of Axis-invariant on MAS modeling is the same as that of binary words on information processing: They are the smallest calculation units in the system, and natural descriptions of the real world, and have the most concise operating performance. Therefore, a system based on them is flexible and efficient. MAS kinematics has a COSS that is isomorphic to natural numbers, and they provide the metric basis reference for MASs, which ensure the objectivity, compactness and hierarchy of internal action relationships.

Chapter 3 Axis-Invariant Based Inverse Kinematics Reading Formulas

[1] Eq. (2.85) results in a standard attitude equation:

$$\prod_{k}^{^i\mathbf{1}_n}\left(1+\tau_k^{:2}\right)\cdot{}^iQ_n=\prod_{l}^{^i\mathbf{1}_n}\left(1+2\cdot\tau_l\cdot{}^{\bar{l}}\tilde{n}_l+\tau_l^{:2}\cdot\left(2\cdot{}^{\bar{l}}n_l\cdot{}^{\bar{l}}n_l^T-1\right)\right). \tag{3.1}$$

[2] Eq. (2.86) results in a standard position equation:

$$^ir_{nS}\cdot\prod_{k}^{^i\mathbf{1}_n}\left(1+\tau_k^{:2}\right)=\sum_{l}^{^i\mathbf{1}_{nS}}\left(\prod_{k}^{^i\mathbf{1}_{\bar{l}}}\begin{pmatrix}1+2\cdot\tau_k\cdot{}^{\bar{k}}\tilde{n}_k+\\ \backslash\tau_k^{:2}\cdot\left(1+2\cdot{}^{\bar{k}}\tilde{n}_k^{:2}\right)\end{pmatrix}\cdot\prod_{k}^{^{\bar{l}}\mathbf{1}_n}\left(1+\tau_k^{:2}\right)\cdot{}^{\bar{l}}r_l\right). \tag{3.2}$$

[3] If $k\in{}^i\mathbf{l}_n$, it is shown by Eqs. (2.304)-(2.306) that:

$$\frac{\partial^i\phi_n}{\partial\phi_k^{\bar{k}}}={}^{i|\bar{k}}n_k+{}^{i|\bar{k}}\tilde{n}_{\bar{k}}\cdot\sum_{l}^{^kI_n}\left({}^{i|\bar{l}}\phi_l\right), \tag{3.3}$$

$$\frac{\partial^i\dot{\phi}_n}{\partial\dot{\phi}_k^{\bar{k}}}=\frac{\partial^ir_{nS}}{\partial r_k^{\bar{k}}}=\frac{\partial^i\dot{r}_{nS}}{\partial\dot{r}_k^{\bar{k}}}={}^{i|\bar{k}}n_k$$

$$\frac{\partial^ir_{nS}}{\partial\phi_k^{\bar{k}}}=\frac{\partial^i\dot{r}_{nS}}{\partial\dot{\phi}_k^{\bar{k}}}={}^{i|\bar{k}}\tilde{n}_k\cdot{}^{i|k}n_{nS}, \tag{3.4}$$

$$\frac{\partial^i\phi_n}{\partial r_k^{\bar{k}}}=\frac{\partial^i\phi_n}{\partial\dot{r}_k^{\bar{k}}}=\frac{\partial^i\dot{\phi}_n}{\partial r_k^{\bar{k}}}=\frac{\partial^i\dot{\phi}_n}{\partial\dot{r}_k^{\bar{k}}}=0_3. \tag{3.5}$$

The Characteristics of Axis-Invariant Based Inverse Kinematics

In consideration of Eq. (3.1), if $^{\bar{l}}k_l\in R$, $^iQ_n$ represents the attitude, with three degrees of freedom (DOF) only; and when $\mathbf{1}_n^i=3$, the inverse solution to 3R attitude will be available. If the unit vector $^nu_{nS}$ is given, Eq. (3.1) will result in:

$$^{i|n}u_{nS}={}^iQ_n\cdot{}^nu_{nS}. \tag{3.6}$$

If $^{\bar{l}}k_l\in R$, $^{i|n}u_{nS}$ represents the orientation to be determined; and if $|^iI_n|=2$, directional inverse solution will be available. If the unit vectors $^nu_{nS}$ and $^iu_{iS}$ is given, Eq. (3.1) will results in:

$$^iu_{iS}^T\cdot{}^{i|n}u_{nS}={}^iu_{iS}^T\cdot{}^iQ_n\cdot{}^nu_{nS} \tag{3.7}$$

If $^{\bar{l}}k_l\in R$, $^iu_{iS}{}^T\cdot{}^{i|n}u_{nS}$ represents the desired projection; and if $|^iI_n|=1$, 1R attitude inverse solution will be available.

In consideration of Eq. (3.2), if $^{\bar{l}}k_l\in R$, $^ir_{n_s}$ represents the desired position to be determined; and if $|^iI_n|=3$, 3R position inverse solution will be available; if $|^iI_n|=6$, the inverse solution to position and attitude will be available.

Eqs. (3.1) and (3.2) are n-D and 2-Order polynomial vector equations concerning the Cayley parameter. The difficulty in calculating the inverse solution is: the complex variable elimination process is required to obtain univariate high-order polynomial equations with only one Cayley parameter. At present, Gröbner basis algorithm is a possible solution to multivariate polynomial equations, but its calculation is extremely complex. For the robotic inverse Kinematics (IK) problem, applying multiple linear kinematics equations to calculate the inverse kinematics (Symbolic/Analytic Solution) is a more efficient approach.

The following sections discuss the principle of solving univariate polynomial equations and multivariate polynomial equations to set the foundation for the subsequent IK calculations. In the sixteenth century, Italian mathematician Candano and his assistant successively put forward the analytic solutions to univariate cubic and quartic equations. Based on the solvable group theory, the French young mathematician Galois demonstrated that generally no analytic solution was available for above quintic equations. For the convenience of readers, the following solutions for univariate cubic and quartic equations are organized for subsequent reference.

Analytic Solution of Univariate Cubic Equations

In the given univariate cubic equation $a\cdot x^3+b\cdot x^2+c\cdot x+d=0$, wherein: a, b, c, $d\in R$. and $a\neq0$; it is demonstrated that the 3 solutions to this equation are respectively as:

$$x_1=\sqrt[3]{m+s}+\sqrt[3]{m-s}-\frac{b}{3\cdot a} \tag{3.8}$$

$$x_2=\sqrt[3]{m+s}\cdot\frac{-1+\sqrt{3}\cdot i}{2}-\sqrt[3]{m-s}\cdot\frac{1+\sqrt{3}\cdot i}{2}-\frac{b}{3\cdot a},$$

$$x_3=\sqrt[3]{m+s}\cdot\frac{-1+\sqrt{3}\cdot i}{2}+\sqrt[3]{m-s}\cdot\frac{1+\sqrt{3}\cdot i}{2}-\frac{b}{3\cdot a},$$

wherein $$m=-\frac{b^3}{27a^3}+\frac{b\cdot c}{6a^2}-\frac{d}{2a},\ n=\left(-\frac{b^2}{9a^2}+\frac{c}{3a}\right)^3,\ s=\sqrt{m^2+n}. \tag{3.9}$$

PROOF: Firstly, it is converted into a standard cubic equation, which is denoted as:

$$x^3+\alpha\cdot x^2+\beta\cdot x+\gamma=0, \tag{3.10}$$

wherein $\alpha=b/a$, $\beta=c/a$, $\gamma=d/a$.

Secondly, quadratic terms are eliminated. Assume x=y−λ and put it into Eq. (3.10) to obtain:

$$(y-\lambda)^3+\alpha\cdot(y-\lambda)^2+\beta\cdot(y-\lambda)+\gamma=0,$$

it is expanded to obtain $$y^3-3\lambda y^2+3\lambda^2 y-\lambda^3+\alpha y^2-2\cdot\alpha\lambda y+\alpha\lambda^2+\beta y-\beta\gamma—+\gamma=0.$$

Thus $$y^3+(\alpha-3\cdot\lambda)\cdot y^2+(3\cdot\lambda^2-2\cdot\alpha\cdot\lambda+\beta)\cdot\gamma$$

$$\backslash-(\lambda^3-\alpha\sim\lambda^2+\beta\cdot\lambda-\gamma)=0. \quad (3.11)$$

Assume λ=α/3 and quadratic terms in Eq. (3.11) are eliminated. Then x=y−λ=y−α/3. Accordingly, Eq. (3.11) can be simplified into:

$$y^3+(-\alpha^2/3+\beta)\cdot y+(2/27\cdot\alpha^3-1/3\cdot\alpha\cdot\beta+\gamma)=0,$$

and represented as:

$$y^3+p\cdot y+q=0, \quad (3.12)$$

wherein $$p=-\frac{\alpha^2}{3}+\beta=-\frac{b^2}{3\cdot a^2}+\frac{c}{a}$$

$$q=\frac{2}{27}\cdot\alpha^3-\frac{1}{3}\cdot\alpha\cdot\beta+\gamma=\frac{d}{a}-\frac{b\cdot c}{3\cdot a^2}+\frac{2\cdot b^3}{27\cdot a^3}.$$

Thirdly, convert into a quadratic equation. Assume y=u+v and put it into Eq. (3.12) to obtain:

$$(u+v)^3+p\cdot(u+v)+q=0. \quad (3.13)$$

Apparently, the following equation is workable:

$$(u+v)^3-3\cdot u\cdot v\cdot(u+v)-(u^3+v^3)=0. \quad (3.14)$$

Compare coefficients in Eqs. (3.13) and (3.14) to obtain:

$$u\cdot v=-p/3\Rightarrow u^3\cdot v^3=-p^3/27,\ u^3+v^3=-q,$$

Regard $u^3$ and $v^3$ as roots of the univariate quadratic equation. Thus $z^2+q\cdot z-p^3/27=0$. Solve $u^3$ and $v^3$ to obtain:

$$u^3=-q/2+\sqrt{q^2/4+p^3/27},\ v^3=-q/2-\sqrt{q^2/4+p^3/27}.$$

Then $$u_1=\sqrt[3]{\frac{-q}{2}+\sqrt{\frac{q^2}{4}+\frac{p^3}{27}}},\ u_2=\sqrt[3]{\frac{-q}{2}+\sqrt{\frac{q^2}{4}+\frac{p^3}{27}}}\cdot\omega,\ u_3=\sqrt[3]{\frac{-q}{2}+\sqrt{\frac{q^2}{4}+\frac{p^3}{27}}}\cdot\omega^2$$

$$v_1=\sqrt[3]{\frac{-q}{2}-\sqrt{\frac{q^2}{4}+\frac{p^3}{27}}},\ v_2=\sqrt[3]{\frac{-q}{2}-\sqrt{\frac{q^2}{4}+\frac{p^3}{27}}}\cdot\omega,\ v_3=\sqrt[3]{\frac{-q}{2}-\sqrt{\frac{q^2}{4}+\frac{p^3}{27}}}\cdot\omega^2$$

wherein $$\omega=\frac{1}{2}\cdot\left(-1+\sqrt{3}\cdot i\right),\ \omega^3=1.$$

Fourthly, the solution to the standard cubic equation is obtained. As u·v=−p/3∈R, y=u+v has three possibilities below:

$$y_1=\sqrt[3]{\frac{-q}{2}+\sqrt{\frac{q^2}{4}+\frac{p^3}{27}}}+\sqrt[3]{\frac{-q}{2}-\sqrt{\frac{q^2}{4}+\frac{p^3}{27}}},$$

$$y_2=\sqrt[3]{\frac{-q}{2}+\sqrt{\frac{q^2}{4}+\frac{p^3}{27}}}\cdot\omega+\sqrt[3]{\frac{-q}{2}-\sqrt{\frac{q^2}{4}+\frac{p^3}{27}}}\cdot\omega^2,$$

$$y_3=\sqrt[3]{\frac{-q}{2}+\sqrt{\frac{q^2}{4}+\frac{p^3}{27}}}\cdot\omega^2+\sqrt[3]{\frac{-q}{2}-\sqrt{\frac{q^2}{4}+\frac{p^3}{27}}}\cdot\omega.$$

Assume $$m=\frac{-q}{2}=-\frac{b^3}{27\cdot a^3}+\frac{b\cdot c}{6\cdot a^2}-\frac{d}{2\cdot a},$$

$$n=\frac{p^3}{27}=\left(-\frac{b^2}{9\cdot a^2}+\frac{c}{3\cdot a}\right)^3,\ s=\sqrt{m^2+n}.$$

Fifthly, revert the solution.

Use x=y−λ=y−α/3=y−b/(3·a) to change variables and then know that the solution of univariate cubic equation is Eqs. (3.8) and (3.9). Q.E.D.

Analytic Solution of Univariate Quartic Equations

Given univariate quartic equation $a\cdot x^4+b\cdot x^3+c\cdot x^2+d\cdot x+e=0$, a, b, c, d, e∈R and a≠0; it is demonstrated that the four solutions to this equation are respectively as:

$$x_{[1:2]}=-\frac{b}{4\cdot a}+\frac{1}{2}\cdot\left(\sqrt{z'-p}\pm\sqrt{z'-p+\frac{2\cdot q}{\sqrt{z'-p}}-2\cdot z'}\right)$$
$$x_{[3:4]}=-\frac{b}{4\cdot a}+\frac{1}{2}\cdot\left(-\sqrt{z'-p}\pm\sqrt{z'-p+\frac{2\cdot q}{\sqrt{z'-p}}-2\cdot z'}\right), \quad (3.15)$$

wherein $$z'=\sqrt[3]{m+s}+\sqrt[3]{m-s}+p/3$$
$$s=\sqrt{m^2+n},\ m=\left(p^2/27-4r/3\right)\cdot p+q^2/2$$
$$n=-\left(p^2/9+4\cdot r/3\right)^3,\ p=\left(8\cdot a\cdot c-3\cdot b^2\right)/\left(8\cdot a^2\right)$$
$$q=\frac{8\cdot a^2 d-4\cdot abc+b^3}{8\cdot a^3}$$
$$r=\frac{256\cdot a^3\cdot e-64\cdot a^2\cdot bd+16\cdot ab^2\cdot c-3\cdot b^4}{256\cdot a^4}. \quad (3.16)$$

PROOF: Firstly, standardization is performed. From $$ax^4+bx^3+cx^2+dx+e=0,$$

then $$x^4+\alpha\cdot^3+\beta\cdot x^2+\gamma\cdot x+\mu=0, \quad (3.17)$$

wherein α=b/a, β=c/a, γ=d/a, μ=e/a.

Secondly, cubic terms are eliminated. Assume x=y−α/4 and put it into Eq. (3.17) to obtain:

$$\begin{aligned}&\left(y-\frac{\alpha}{4}\right)^4+\alpha\cdot\left(y-\frac{\alpha}{4}\right)^3+\beta\cdot\left(y-\frac{\alpha}{4}\right)^4+\gamma\cdot\left(y-\frac{\alpha}{4}\right)+\mu=0\\&=y^4-\alpha\cdot y^3+\frac{3\cdot\alpha^2}{8}\cdot y^2-\frac{\alpha^3}{16}\cdot y+\frac{\alpha^4}{256}+\alpha\cdot y^3-\frac{3\cdot\alpha^2}{4}\cdot y^2\quad.\\&\backslash+y\cdot\frac{3\cdot\alpha^2}{16}-\frac{\alpha^4}{64}+\beta\cdot y^2-\frac{\alpha\cdot\beta}{2}\cdot y+\frac{\alpha^2\cdot\beta}{16}+\gamma\cdot y-\frac{\alpha\cdot\gamma}{4}+\mu\end{aligned}\tag{3.18}$$

Thus $$\begin{aligned}&y^4+\left(\frac{-3\cdot\alpha^2+8\cdot\beta}{8}\right)\cdot y^2+\left(\frac{\alpha^3}{8}-\frac{\alpha\cdot\beta}{2}+\gamma\right)\cdot y.\\&\backslash+\mu-\frac{\alpha\cdot\gamma}{4}+\frac{\alpha^2\cdot\beta}{16}-\frac{3\cdot\alpha^4}{256}=0\end{aligned}$$

Assume Eq. (3.18) equivalent to:

$$y^4+p\cdot y^2+q\cdot y+r=0,\tag{3.19}$$

wherein $$\begin{aligned}p&=\frac{-3\cdot\alpha^2+8\cdot\beta}{8}=\frac{8\cdot a\cdot c-3\cdot b^2}{8\cdot a^2},\\q&=\gamma-\frac{\alpha\cdot\beta}{2}+\frac{\alpha^3}{8}=\frac{8\cdot a^2\cdot d-4\cdot a\cdot b\cdot c+b^3}{8\cdot a^3},\\r&=\mu-\frac{\alpha\cdot\gamma}{4}+\frac{\alpha^2\cdot\beta}{16}-\frac{3\cdot\alpha^4}{256}\\&=\frac{256\cdot a^3\cdot e-64\cdot a^2\cdot b\cdot d+16\cdot a\cdot b^2\cdot c-3\cdot b^4}{256\cdot a^4}\end{aligned}\quad.$$

Thirdly, it is converted into a quadratic equation. Apparently, equation $y^4+p\cdot y^2+q\cdot y+r$ can be converted into a quadratic equation. Assume $$y^4+p\cdot y^2+q\cdot y+r=y^4+z\cdot y^2+z^2/4,$$

and put Eq. (3.19) into it to obtain:

$$y^4+z\cdot y^2+z^2/4=z\cdot y^2+z^2/4-p\cdot y^2-q\cdot y-r=0.$$

Thus $$(y^2+z/2)^2=(z-p)\cdot y^2-q\cdot y+(z^2/4-r)=0.\tag{3.20}$$

Accordingly, the discriminant of Eq. (3.20) is also called "Resolvent" of the univariate quartic equation: $q^2-4\cdot(z-p)\cdot(z^2/4-r)=0$, i.e.

$$q^2-(z-p)\cdot(z^2-4\cdot r)=0,\tag{3.21}$$

Eq. (3.21) is equivalent to:

$$z^3-p\cdot z^2-4\cdot r\cdot z+(4\cdot r\cdot p-q^2)=0.\tag{3.22}$$

Eqs. (3.8) and (3.9) are applied to solve the real root z' of Eq. (3.22):

$$\begin{aligned}&z'=\sqrt[3]{m+s}+\sqrt[3]{m-s}+p/3,\ s=\sqrt{m^2+n}\\&m=\left(p^2/27-4r/3\right)p+q^2/2,\ n=-\left(p^2/9+4r/3\right)^3\end{aligned}\tag{3.23}$$

Put this real root $z_1$ into Eq. (3.20) again to obtain:

$$\left(y^2+\frac{z'}{2}\right)^2=(z'-p)\cdot\left(y-\frac{q}{2\cdot(z'-p)}\right)^2,\tag{3.24}$$

Eq. (3.24) is applied to obtain two quadratic equations:

$$y^2\pm\sqrt{z'-p}\cdot y-\frac{q\cdot\sqrt{z'-p}}{2\cdot(z'-p)}+\frac{z'}{2}=0,\tag{3.25}$$

solve Eq. (3.25) to obtain:

$$y=\frac{1}{2}\cdot\left(\pm\sqrt{z'-p}\pm\sqrt{z'-p+\frac{2\cdot q}{\sqrt{z'-p}}-2\cdot z'}\right).$$

Put the solution x=y−α/4=y−b/(4·a) into the equation. As a result:

$$\begin{aligned}x_1&=-\frac{b}{4\cdot a}+\frac{1}{2}\cdot\left(\sqrt{z'-p}+\sqrt{z'-p+\frac{2\cdot q}{\sqrt{z'-p}}-2\cdot z'}\right),\\x_2&=-\frac{b}{4\cdot a}+\frac{1}{2}\cdot\left(\sqrt{z'-p}-\sqrt{z'-p+\frac{2\cdot q}{\sqrt{z'-p}}-2\cdot z'}\right),\\x_4&=-\frac{b}{4\cdot a}+\frac{1}{2}\cdot\left(-\sqrt{z'-p}-\sqrt{z'-p+\frac{2\cdot q}{\sqrt{z'-p}}-2\cdot z'}\right),\\x_3&=-\frac{b}{4\cdot a}+\frac{1}{2}\cdot\left(-\sqrt{z'-p}+\sqrt{z'-p+\frac{2\cdot q}{\sqrt{z'-p}}-2\cdot z'}\right).\end{aligned}$$

Q.E.D.

Solution of Companion Matrix Based Univariate Polynomial High-Order Polynomial Equation The univariate polynomial $p(x)=a_0+a_1x+\ldots a_{n-1}x^{n-1}+x^n$ has n solutions. If a matrix A can satisfy $|A-\lambda_1\cdot 1_n|\cdot v_1=0$, wherein: $l\in[1:n]$, $\{\lambda_l\}$—eigenvalues of the A and $\{v_l\}$—the eigenvectors; then the characteristic equation of the matrix A is $|A-\lambda_l\cdot 1_n|=a_0+a_1\lambda_l+\ldots a_{n-1}\lambda_l^{n-1}+\lambda_l^n=0$, then the matrix is known as the "Companion Matrix" for p(x). Therefore, the solution of polynomial equation $p(\lambda_l)=0$ and the characteristic polynomial $|A-\lambda_l\cdot 1_n|=0$ of its Companion Matrix A are equivalent.

If the Companion Matrix of polynomial p(x) is $$A=\begin{bmatrix}0&1&\ldots&0\\\vdots&\vdots&\ddots&\vdots\\0&0&\ldots&1\\-a_v&-a_1&\cdots&-a_{n-1}\end{bmatrix},\tag{3.26}$$

then the matrix of the eigenvectors of the matrix A is the Vandermonde matrix.

$$V(\lambda_1,\lambda_2,\ldots,\lambda_n)-\begin{bmatrix}1&1&\ldots&1\\\vdots&\vdots&\ddots&\vdots\\\lambda_1^{\vdots n\ 2}&\lambda_2^{\vdots n\ 2}&\ldots&\lambda_n^{\vdots n\ 2}\\\lambda_1^{\vdots n-1}&\lambda_2^{\vdots n\ 1}&\ldots&\lambda_n^{\vdots n\ 1}\end{bmatrix},\tag{3.27}$$

and $$p(\lambda_l)=|A-\lambda_l\cdot 1_n|=0.\tag{3.28}$$

PROOF: The eigenvector $\lambda_l$ corresponding to the eigenvalue $v_l$, the eigenvalue definition result in $A\cdot v_l=\lambda_l\cdot v_l$, therefore $$A\cdot v_l=\begin{bmatrix}0&1&\dots&0\\ \vdots&\vdots&\ddots&\vdots\\ 0&0&\dots&1\\ -a_0&-a_1&\dots&-a_{n-1}\end{bmatrix}\cdot\begin{bmatrix}1\\ \vdots\\ \lambda_l^{:n-2}\\ \lambda_l^{:n-1}\end{bmatrix}=\begin{bmatrix}\lambda_l\\ \vdots\\ \lambda_l^{:n-1}\\ \lambda_l^{:n}-p(\lambda_l)\end{bmatrix}=\lambda_l\cdot\begin{bmatrix}1\\ \vdots\\ \lambda_l^{:n-2}\\ \lambda_l^{:n-1}\end{bmatrix},$$

so Eq. (3.27) was established. Since $A\cdot v_l=\lambda_l\cdot v_l$, obtain $$\begin{bmatrix}\lambda_l\\ \vdots\\ \lambda_l^{:n-1}\\ -\sum_k^{[0:n-1]}(a_k\lambda_l^{:k})\end{bmatrix}-\lambda_l\cdot\begin{bmatrix}1\\ \vdots\\ \lambda_l^{:n-2}\\ \lambda_l^{:n-1}\end{bmatrix}=\begin{bmatrix}\lambda_l-\lambda_l\\ \vdots\\ \lambda_l^{:n-1}-\lambda_l^{:n-1}\\ -\sum_k^{[0:n-1]}(a_k\lambda_l^{:k})-\lambda_l^{:n}\end{bmatrix}=-p(\lambda_l)\cdot\begin{bmatrix}0\\ \vdots\\ 0\\ 1\end{bmatrix}=0_n.$$

Since $v_l\neq 0_n$, therefore $$\|(A-\lambda_l\cdot 1_n)\cdot v_l\|=\|A-\lambda_l\cdot 1_n\|\cdot\|v_l\|=|p(\lambda_l)|\cdot\|[0,\ \dots\ ,0,1]\|.$$

So Eq. (3.28) was established. Q.E.D

EXAMPLE 3.1. Solution of the polynomial $p(x)=x^3-10x^2+31x-30=0$.

SOLUTION: Eq. (3.26) and Eq. (3.28) respectively result in $$A=\begin{bmatrix}0&1&0\\ 0&0&1\\ 30&-31&10\end{bmatrix},$$

$$|A-\lambda\cdot 1|=\begin{vmatrix}-\lambda&1&0\\ 0&-\lambda&1\\ 30&-31&10-\lambda\end{vmatrix}=-\lambda^3+10\lambda^2-31\lambda+30=0.$$

All solutions to this polynomial equation is all the solutions to characteristic roots $\lambda=[2,3,5]$.

EXAMPLE 3.2. Solution of the polynomial $p(x)=x^2+1=0$.

SOLUTION: Eq. (3.26) and Eq. (3.28) respectively result in $$A=\begin{bmatrix}0&1\\ -1&0\end{bmatrix},\ |A-\lambda\cdot 1|=\begin{vmatrix}-\lambda&1\\ -1&-\lambda\end{vmatrix}=\lambda^2+1=0.$$

All solutions to this polynomial equation is all the solutions to characteristic roots $\pm i$.

Elimination and Solution of n-Variables with N-Order Polynomial System

Consider equation $f(x)$ and $g(x)$ with two univariate polynomials and the resulting polynomial system $F_2(x)$. Introduce and substitute the auxiliary variable y for the original variable x. Then obtain Eq. (3.29):

$$\begin{aligned}\mathrm{Det}(F_2(y|x))&\triangleq\frac{1}{x-y}\cdot\mathrm{Det}\left(\begin{bmatrix}f(x)&g(x)\\ f(y)&g(y)\end{bmatrix}\right)\\ &=\frac{f(x)\cdot g(y)-f(y)\cdot g(x)}{x-y}\end{aligned},\tag{3.29}$$

which is a symmetric polynomial equation related to Variable x and y; wherein Det stands for the determinant (DET) operation. This is the Cayley-Bézout method proposed by Cayley in 1865. If $$f(z)=0,g(x)=0,\tag{3.30}$$

the Dixon polynomial is always available for any y $$\mathrm{Det}\left(\begin{bmatrix}f(x)&g(x)\\ f(y)&q(y)\end{bmatrix}\right)=\frac{f(x)\cdot g(y)-g(x)\cdot f(y)}{x-y}=0.\tag{3.31}$$

Apparently, x−y is inevitably eliminated. Thus, Eq. (3.31) is the necessary condition for ensuring these Eqs. (3.30) have solutions. As such system contains non-independent equations, the Dixon polynomial in such system is identically zero, which is the necessary condition for ensuring such system has solutions. It is necessary to generalize the Dixon polynomial to the n-variables with N-Order polynomial system, which is a multinomial system composed of n polynomial equations of n-variables with N-Order.

Solution of n-Variables with 1st-Order Polynomial System Binary Word

An algebraic ring refers to a set that satisfies the conditions for addition and multiplication algorithms, wherein: the addition algorithm satisfies the conditions for commutative, associative, inverse operation and additive identity; and the multiplication algorithm satisfies the conditions for left distributivity or right distributivity and multiplicative identity. As typical algebraic ring systems, the binary algebra and polynomial symbolic systems are isomorphic.

Polynomial independent variables are denoted as $X_n=[x_1, x_2, \dots, x_n]$ and n-Bit Binary Word. Binary Word is denoted as $\alpha_n$, which is expressed as row vector; polynomial composite variables $X_n^a$ are Binary Word. Binary Word power products of independent variables and expressed as column vectors.

$$a_n=\mathrm{Power}(\alpha[1]\cdot\alpha[2]\ \dots\ \alpha[n])=\sum_l^n(\alpha[n]\cdot N^{l-1}),\tag{3.32}$$

$$\alpha[*]\in[0,1],$$

$$x_n^a=x_1^{\alpha[1]}\cdot x_2^{a[2]}\ \dots\ x_n^{a[n]},\ X_n^a=\mathrm{Power}(x_n^a)\leftrightarrow a_n,\tag{3.33}$$

$$x_n^{\alpha}=x_1^{\alpha[1]}\cdot x_2^{[2]}\ \dots\ x_n^{\alpha[n]},X_n^{\alpha}=\mathrm{Power}(x_n^{\alpha})\leftrightarrow\alpha_n,\tag{3.33}$$

wherein: The number of independent variables is n; 'the n-Bit Binary Word' $\alpha_n$ has $2^n$ instances of "Binary Word" in total, which have one-to-one mapping relationship with composite variables; thus $|X_n^{\alpha}|=2^n$; the degree of the composite variable $X_n^{\alpha}$ is: $\mathrm{Degree}(X_n^{\alpha})=n$. As shown above: The composite variable coefficients matrix is denoted as $k(X_n^{\alpha})$, which has one-to-one mapping relationship with the Binary Word $X_n^{\alpha}$.

$$k(X_n^a)=k^{[1+\alpha[1]][1+\alpha[2]]\ \dots\ [1+\alpha[n]]}\leftrightarrow X_n^a,\ \alpha[*]\in[0,1].\tag{3.34}$$

EXAMPLE 3.3. For the convenience of writing, $k_l^{[m][n][p]}$ is denoted as $k_l^{mnp}$. when n=3, then $$\begin{aligned}a_3&=[000,\ 001,\ 010,\ 011,\ 100,\ 101,\ 110,\ 111]\\ X_3^{a:T}&=[1,\ x_1,\ x_2,\ x_2\cdot x_1,\ x_3,\ x_3\cdot x_1,\ x_3\cdot x_2,\ x_3\cdot x_2\cdot x_1]\\ f^{[l]}(X_3^a)&=k_l^{000}+k_l^{001}\cdot x_1+k_l^{010}\cdot x_2\\ &\quad+k_l^{011}\cdot x_2\cdot x_1+\dots+k_l^{111}\cdot x_3\cdot x_2\cdot x_1\end{aligned}.\tag{3.35}$$

High-Dimensional Determinant with Block Matrix

The <1:n> stands for all permutations of the natural number [1:n] and there are totally n! examples. For the matrix m with the size n×n of the given number field, the elements in the j row and i column are denoted as $m_{[i]}^{[j]}$ and $m_{[i]}^{[j]} \in R$; according to the definition of DET:

$$\mathrm{Det}(M) = \sum_{\lfloor i1, \ldots\, in \rfloor}^{\langle 1:n \rangle} \left( (-1)^{I[i1, \ldots\, in]} \cdot m_{[i1]}^{[1]} \cdot m_{[i2]}^{[2]} \ \ldots \ m_{[in]}^{[n]} \right), \tag{3.36}$$

wherein I[i1, . . . in] stands for the number of backward orders for the permutation <i1, . . . in>. The calculation complexity of Eq. (3.36) is as: n number products for n! times and additions for n! times, such calculation is as complex as index calculation, so that it is only applicable to determinants with smaller dimensions. For determinants with larger dimensions, the Laplace formula should be applied for the row recursion operation. $A[i]^{[j]}$ is denoted as adjugate matrix of $m_{[i]}^{[j]}$, and then $$\mathrm{Det}(M) = \sum_{i}^{[1:n]} \left( (-1)^{i+j} \cdot m_{[i]}^{[j]} \cdot \Lambda_{[i]}^{[j]} \right) \tag{3.37}$$

Simpler algorithms usually use Gaussian elimination or LU factorization. First, the matrix is changed to the product of a triangular matrix or the product of a triangular matrix, and then the determinant is calculated. The above determinant calculation method for number fields is not applicable to high dimensional polynomial matrix, that needs to introduce the determinant calculation method of block matrix. The vector polynomial DET is a specific block matrix determinant calculation issue and expresses the internal relation between vector and determinant in terms of vector hierarchy. The block matrix determinant calculation reveals the inherent regularity of block matrix and determinant in terms of matrix hierarchy.

If the vector polynomial $f_3^{[1]} = k_1^{\alpha} \cdot / x_n^{\alpha}$, $f_3^{[2]} = k_2^{\alpha} \cdot X_n^{\alpha}$ and $f_3^{[3]} = k_3^{\alpha} \cdot X_n^{\alpha}$ is given. wherein $k_1^{\alpha}$, $k_2^{\alpha}$ and $k_3^{\alpha}$ are 3D coordinate vectors, and $X_n^{\alpha}$ is the polynomial variable sequence (SEQS); if $$\mathrm{Det}\left( \left[ k_1^{[l]}, k_2^{[l']}, k_3^{[l'']} \right] \right) \triangleq \left[\!\left[ k_1^{[l]}, k_2^{[l']}, k_3^{[l'']} \right]\!\right] = k_1^{[l]:T} \cdot \tilde{k}_2^{[l']} \cdot k_3^{[l'']}, \tag{3.38}$$

then $$\begin{bmatrix} k_1^{[0]:\mathrm{T}} \cdot x^0 + \ldots + k_1^{[\alpha 1]:\mathrm{T}} \cdot x^{\alpha 1} \\ k_2^{[0]:\mathrm{T}} \cdot x^0 + \ldots + k_2^{[\alpha 2:\mathrm{T}} \cdot x^{\alpha 2} \\ k_3^{[0]:\mathrm{T}} \cdot x^0 + \ldots + k_3^{[\alpha 3]:\mathrm{T}} \cdot x^{\alpha 3} \end{bmatrix} = \sum_{\langle l, l', l'' \rangle} \begin{pmatrix} \left[\!\left[ k_1^{[l]}, k_2^{[l']}, k_3^{[l'']} \right]\!\right] \\ \backslash \cdot x^{l+l'+l''} \end{pmatrix}, \tag{3.39}$$

$$\begin{cases} l \in [0:\alpha 1] \\ l' \in [0:\alpha 2] \\ l'' \in [0:\alpha 3] \end{cases}.$$

PROOF: As $$\left| \sum_{l}^{[0:\alpha 1]} \left( k_1^{[l]} \cdot x_1^l \right) \times \sum_{l}^{[0:\alpha 2]} \left( k_l^{[l]} \cdot x_1^l \right) \right) \cdot \sum_{l}^{[0:\alpha 3]} \left( k_3^{[l]} \cdot x_1^l \right) =$$

$$\sum_{l}^{[0:\alpha 1]} \sum_{l'}^{[0:\alpha 2]} \sum_{l''}^{[0:\alpha 3]} \left( k_1^{[l]} \times k_2^{[l']} \cdot k_3^{[l'']} \cdot x_1^{l+l'+l''} \right),$$

thus, Eq. (3.39) is workable. Q.E.D.

Eqs. (3.38) and (3.39) can be generalized into n dimensional spaces. Eq. (3.38) facilitates the inherent regularity analysis of determinant in terms of vector hierarchy. If any two vectors are parallel or any three vectors are in the same plane, the corresponding determinant is zero. According to Eq. (3.39), the vector polynomial DET tends to result in "combinatorial explosion".

EXAMPLE 3.4. If two 2D row vector polynomials are given as $$\sum_{l}^{[0:2]} \left( a_1^{[l]} \cdot x_1^l \right) \text{ and } \sum_{l}^{[0:2]} \left( a_2^{[l]} \cdot x_1^l \right),$$

then $a_1^{[0]:T} = [1,1]$, $a_1^{[1]:T} = [2,0]$, $a_2^{[0]:T} = [2,0]$ and $a_2^{[1]:T} = [1,1]$. On the one hand, Eq. (3.39) results in:

$$\left[\!\left[ \begin{matrix} 1 + 2 \cdot x_1 & 2 + x_1 \\ 1 & x_1 \end{matrix} \right]\!\right] \underset{x|\alpha\overline{[1]}<2}{=} \left[\!\left[ \begin{matrix} 1 & 2 \\ 1 & 0 \end{matrix} \right]\!\right] + \left[\!\left[ \begin{matrix} 1 & 2 \\ 0 & 1 \end{matrix} \right]\!\right] \cdot x_1 + \left[\!\left[ \begin{matrix} 2 & 1 \\ 1 & 0 \end{matrix} \right]\!\right] \cdot x_1 = -2,$$

on the other hand, $$\left[\!\left[ \begin{matrix} 1 + 2 \cdot x_1 & 2 + x_1 \\ 1 & x_1 \end{matrix} \right]\!\right] \underset{x|\alpha\overline{[1]}<2}{=} (1 + 2 \cdot x_1) \cdot x_1 - (2 + x_1) \underset{x|\alpha\overline{[1]}<2}{=} -2.$$

The above results verify the correctness of Eq. (3.39).

The following section successively represents and testifies the determinant calculation theorem of block matrix.

THEOREM 3.1. If a square matrix with (n+m)·(n+m) size is denoted as M, the matrix ${}_nM_n^{[cn]}$ with n·n size will be a submatrix composed of front n rows and any n columns of elements of such square matrix M, and the matrix ${}_mM_m^{|cm|}$ with m·m size will be a submatrix composed of rear m rows and remaining m columns of elements of the square matrix M; the sequences cn and cm composed of column ordinals in ascending order are subsets of the sequence [1:m+n], [cn,cm]∈<1:n+m> and cm∪cn=[1:m+n]; the composite sequence composed of cn and cm is denoted as [cn,cm], and the backward order may exist in such sequence; the relationship of determinants between the square matrix M and block matrices ${}_nM_n^{[cn]}$ and ${}_mM_m^{[cm]}$ is shown below:

$$Dct(M) = \sum_{|cn,cm|}^{\langle 1:n+m \rangle} \left( (-1)^{I[cn,cm]} \cdot Dct\left({}_nM_n^{[cn]}\right) \cdot Dct\left({}_mM_m^{[cm]}\right)\right)\!\Bigg). \tag{3.40}$$

PROOF: As such determinants rely on full permutations of matrix elements, all permutations of the submatrices ${}_nM_n^{[cn]}$ and ${}_mM_m^{[cm]}$ should be equivalent to those of elements of the square matrix M. [cn,cm] has a total of (n+m)!/(n!m!) species. Since the square matrix M is composed of submatrices ${}_nM_n^{[cn]}$ and ${}_mM_m^{[cm]}$, the full permutations of the square matrix M elements can be divided into (n+m)!/(n!m!) classes; wherein the elements of ${}_nM_n^{[cn]}$ have n! types of permutations, and ${}_mM_m^{[cm]}$ have m! types of permutations, each type contains n!m! types of permutations. Therefore, the determinant of the square matrix M is expressed as:

$$Dct(M) = \sum_{[cn,cm]}^{\langle 1:n|m\rangle} \left( \begin{array}{c} (-1)^{I[cn,cm]} \cdot \sum_{[cn]}^{\langle 1:n+m\rangle} \left((-1)^{I[cn]} \cdot {}_nM_{n+m}^{[cn]}\right) \\ \backslash \cdot \sum_{[cm]}^{\langle 1:n+m\rangle} \left((-1)^{I[cm]} \cdot {}_mM_{n|m}^{[cm]}\right) \end{array} \right).$$

$$= \sum_{[cn,cm]}^{\langle 1:n+m\rangle} \left((-1)^{I[cn,cm]} \cdot Dct({}_nM_n^{[cn]}) \cdot Det({}_mM_m^{[cm]}\right)\Bigg)\Bigg)$$

Q.E.D.

Each item on the right of Eq. requires product and sum operations for n·n!+m·m!+1 times. The total number of such operations is (n+m)!(n·n!+m·m!+1)/n!m!, which is much smaller than that (n+m)(n+m)! during unblocked calculation, especially when n and m are larger. If a matrix is so big that it is necessary to use gradually partitioning block method to further reduce the operations. For the square matrix of 16·16, the computational complexity of its determinant can be reduced from 16·16! to 10,992,267, and the calculation speed can be significantly improved.

EXAMPLE 3.5. According to the Laplace formula, the determinant of the following square matrix is calculated, $$M = \begin{bmatrix} 2 & 3 & 4 & 5 \\ 1 & 3 & 5 & 7 \\ 9 & 0 & 5 & 4 \\ 3 & 6 & 7 & 9 \end{bmatrix},$$

Det(M)=6 is easily obtained. Select 2×2 block matrices, i.e. n=m=2. Eq. (3.40) is applied with the calculation process as follows:

$$Det(M) =$$

$$\begin{bmatrix} 2 & 3 \\ 1 & 3 \end{bmatrix} \cdot \begin{bmatrix} 5 & 4 \\ 7 & 9 \end{bmatrix} - \begin{bmatrix} 2 & 4 \\ 1 & 5 \end{bmatrix} \cdot \begin{bmatrix} 0 & 4 \\ 6 & 9 \end{bmatrix} + \begin{bmatrix} 2 & 5 \\ 1 & 7 \end{bmatrix} \cdot \begin{bmatrix} 0 & 5 \\ 6 & 7 \end{bmatrix} \backslash + \begin{bmatrix} 3 & 4 \\ 3 & 5 \end{bmatrix} \cdot \begin{bmatrix} 9 & 4 \\ 3 & 9 \end{bmatrix} -$$

$$\begin{bmatrix} 3 & 5 \\ 3 & 7 \end{bmatrix} \cdot \begin{bmatrix} 9 & 5 \\ 3 & 7 \end{bmatrix} + \begin{bmatrix} 4 & 5 \\ 5 & 7 \end{bmatrix} \cdot \begin{bmatrix} 9 & 0 \\ 3 & 6 \end{bmatrix} = 6.$$

The results of such two methods are the same. The correctness of Eq. (3.40) is verified.

To simplify the calculation and the analysis of the determinant, we agree that $\underset{con}{\equiv}$ is the equivalences under con conditions. For example, if $g=a_1 \cdot y_2^2 \cdot \tau_3 + a_1 \cdot y_2 \cdot \tau_3$, and the order of $y_2$ meet the condition α[2]<2, then $$g \underset{y|\alpha[2]<2}{\equiv} a_1 \cdot y_2 \cdot \tau_3.$$

The principle of row stepping calculation for determinant:

For the matrix S×S, each item is an $n^{th}$ order polynominal about $\tau_1$. When calculating the determinant of the matrix, the original determinant can be changed to the upper triangular determinant by the elementary row transformation, and then the non-zero diagonal elements are multiplied to obtain a determinant polynomial expression. When the formula is 0, all the solutions of $\tau_1$ are obtained.

The specific method of row stepping is to first sort the highest order of the first column of the determinant from high to low, and then perform up to (S−1)×n times of the first row transform elimination to obtain the first column, then obtain a determinant which the first element is not 0. Then, the first row and the remainder of the determinant are subjected to the elementary row transformation elimination, and the iterative solution is sequentially performed.

N-Order Polynomial System Based on N-Digit

[1] N-Order Polynomial System Based on N-Digit

If independent variables in the power product of n-variables and 1-Order polynomial $X_n^\alpha$ appear for N times, polynomial system of n-variables and N-Order $F_n(X_n^\alpha)$ can be obtained; such "N-Order polynomial system with n-variables" $F_n(X_n^\alpha)$ and the "n-Bit N-Digit" $\alpha_n^N$ are isomorphic.

$$\alpha_n = \text{Power}(\alpha[1] \cdot \alpha[2] \ldots \alpha[n]) = \sum_l^n (\alpha[n] \cdot N^{l-1}), \tag{3.41}$$

$$\alpha[*] \in [0:N],\ x_n^\alpha = x_1^{\alpha[1]} \cdot x_2^{\alpha[2]} \ldots x_n^{\alpha[n]},$$

$$X_n^\alpha = \text{Power}(x_n^\alpha) \leftrightarrow a_n$$

$$k_l^\alpha \leftrightarrow X_n^\alpha, \tag{3.42}$$

$$f_n^{[l]} = k_l^\alpha \cdot X_n^\alpha, \tag{3.43}$$

$$F_n(X_n^\alpha) = \left[f_n^{[1]}, f_n^{[2]}, \ldots, f_n^{[n]}\right]^T = 0_n. \tag{3.44}$$

EXAMPLE 3.6. Eqs. (3.35) and (3.43) are applied to obtain a 1D polynomial system of 3-variables and 1st-Order:

$$f_3^{[l]} = k_l^{111} \cdot x_1x_2x_3 + k_l^{110} \cdot x_1x_2 + k_l^{101} \cdot x_1x_3$$

$$\backslash + k_l^{100} \cdot x_1 + k_l^{001} \cdot x_2x_3 + \ldots + k_l^{000}.$$

The product $\alpha_m^N \cdot \alpha_n^N$ of the N-Digit and the product $Y_m^\alpha \cdot X_n^\alpha$ of polynomial composite variables are calculated as follows:

$$\alpha_m \cdot \alpha_n = \text{Power}\begin{pmatrix} \alpha[1] \cdot \alpha[2] \ldots \alpha[m] \cdot \alpha[m+1] \backslash \cdot \\ \alpha[m+2] \ldots \alpha[m+n] \end{pmatrix}, \tag{3.45}$$

$$\alpha^{[*]} \in [0:N].$$

$$Y_m^\beta \cdot X_n^\alpha = \text{Power}\begin{pmatrix} y_1^{\beta[1]} \cdot y_2^{\beta[2]} \ldots y_m^{\beta[m]} \cdot x_1^{\alpha[m+1]} \backslash \cdot \\ x_2^{\alpha[m+2]} \ldots x_n^{\alpha[m+n]} \end{pmatrix}, \tag{3.45}$$

$$\beta[*], \alpha[*] \in [0:N].$$

Accordingly, the composite variable coefficients of $Y_m^\beta \cdot X_n^\alpha$ is represented by $k(Y_m^\beta \cdot X_n^\alpha)$:

$$k(Y_m^\beta \cdot X_n^\alpha) = k^{\beta_m \cdot \alpha_n} \leftrightarrow Y_m^\beta \cdot X_n^\alpha, \alpha[*], \beta[*] \in [0:N]. \tag{3.47}$$

[2] Cayley-Dixon Polynomial of n-Variables and N-Orders

Introduce the auxiliary variable $[y_2, y_3, \ldots, y_n]$ and:

$$Y_{n-1}^\alpha \succ X_n^\alpha, Y_{n-1}^\alpha = \text{Power}(y_2, y_3, \ldots, y_n). \tag{3.48}$$

In Eqs. (3.43) with multi-Variables and multi-Orders, the front n auxiliary variables $Y_m$ sequence successively substitute m ones of original variables $X_n$. "|" is denoted as operator alternative. Then extended polynomials are obtains:

$$f_{m|n}^{[l]} = \sum_\alpha^\alpha (k_l^\alpha \cdot (Y_m^\alpha \mid X_n^\alpha)). \tag{3.49}$$

$$f_{m|n}^{[l]} - f_{\overline{m}|n}^{[l]} = \sum_\alpha^{\alpha>0} \left(k_\alpha^{[l]} \cdot (Y_m^\alpha \mid X_n^\alpha)\right) - \sum_\alpha^{\alpha>0} \left(k_\alpha^{[l]} \cdot (Y_{m-1}^\alpha \mid X_n^\alpha)\right). \tag{3.50}$$

Eqs. (3.41) and (3.50) result in:

$$f_{m-1|n}^{[l]} - f_{m-2|n}^{[l]} = -(x_m - y_m)\cdot \overline{f}_{m-1|n}^{[l]}, \tag{3.51}$$

wherein $$\overline{f}_{m-1|n}^{[l]} \triangleq \sum_{\alpha}^{\alpha>0}\left(k_\alpha^{[l]}\cdot x_1^{\alpha[1]}\cdot y_2^{\alpha[2]}\ \dots\ y_{m-1}^{\alpha[m-1]}\cdot \frac{x_m^{\alpha[m]} - y_m^{\alpha[m]}}{x_m - y_m}\cdot x_{m+1}^{\alpha[m+1]}\ \dots\ x_n^{\alpha[n]}\right) \tag{3.52}$$

$$x_m^{\alpha[m]} - y_m^{\alpha[m]} = (x_m - y_m)\cdot\begin{pmatrix} x_m^{\alpha[m]-1} + x_m^{\alpha[m]-2}y_m + \dots \\ \backslash + x_m y_m^{\alpha[m]-2} + y_m^{\alpha[m]-1}\end{pmatrix}.$$

Separable composite variables $Y_{n-1}^{\alpha}$ and $X_{n-1}^{\alpha}$ are defined as follows:

$$\begin{matrix} X_{n-1}^{\alpha} = \mathrm{Power}\left(x_2^{\alpha[2]}\ \dots\ x_n^{\alpha[n]}\right) \\ Y_{n-1}^{\alpha} = \mathrm{Power}\left(y_2^{\alpha[2]}\ \dots\ y_n^{\alpha[n]}\right)\end{matrix},\ \alpha[*]\in[0:N], \tag{3.53}$$

Eqs. (3.52) and (3.53) show: The alternate form $\overline{f}_{m|n}^{[l]}$ is a bilinear form related to $X_{n-1}^{\alpha}$ and $Y_{n-1}^{\alpha}$. Accordingly, the polynomial systems substituted by auxiliary variables are denoted as:

$$F_n(Y_{n-1}\mid X_{n-1}) = \left[f_n^{[1]}, f_{1|n}^{[2]}, \dots, f_{n-1|n}^{[n]}\right]^T. \tag{3.54}$$

With the given n-D polynomial system of n-variables and N-Order $F_n(Y_{n\ 1}^{\alpha}|X_n^{\alpha})$, its Cayley-Dixon polynomial is defined as:

$$Det(F_n(Y_{n-1}\mid X_{n-1})) \triangleq \frac{1}{\prod_l^{[2:n]}(x_l - y_l)}\cdot\begin{bmatrix} f_n^{[1]} & f_n^{[2]} & \dots & f_n^{[n]} \\ f_{1|n}^{[1]} & f_{1|n}^{[2]} & \dots & f_{1|n}^{[n]} \\ \vdots & \vdots & \ddots & \vdots \\ f_{n-1|n}^{[1]} & f_{n-1|n}^{[2]} & \dots & f_{n-1|n}^{[n]}\end{bmatrix}. \tag{3.55}$$

Eq. (3.55) results in:

$$Det(F_n(Y_{n-1}\mid X_{n-1})) = (-1)^{n-1}\cdot\begin{bmatrix} f_n^{[1]} & \frac{f_{0|n-1}^{[1]} - f_{1|n-1}^{[1]}}{x_2 - y_2} & \dots & \frac{f_{n-2|n-1}^{[1]} - f_{n-1|n-1}^{[1]}}{x_n - y_n} \\ f_n^{[2]} & \frac{f_{0|n-1}^{[2]} - f_{1|n-1}^{[2]}}{x_2 - y_2} & \dots & \frac{f_{n-2|n-1}^{[2]} - f_{n-1|n-1}^{[2]}}{x_n - y_n} \\ \vdots & \vdots & \ddots & \vdots \\ f_n^{[n]} & \frac{f_{0|n-1}^{[n]} - f_{1|n-1}^{[n]}}{x_2 - y_2} & \dots & \frac{f_{n-2|n-1}^{[n]} - f_{n-1|n-1}^{[n]}}{x_n - y_n}\end{bmatrix}. \tag{3.56}$$

In Eq. (3.53), separable variables differ from those in the literature: The substitution order of the original variable $X_{n-1}$ replaced by the auxiliary variable $Y_{n-1}$ is different, and the Cayley-Dixon polynomial also varies. From Eqs. and, we get Cayley-Dixon determinant of the polynomial:

$$\mathrm{Det}(F_n(Y_{n-1}|X_{n-1}))=\mathrm{Det}(\overline{F}_n(Y_{n-1}|X_{n-1})). \tag{3.57}$$

In Cartesian space, the DET composed of the position vector or rotation vector represents the volume of the vector expanded space; and the volume does not vary with diversified Cartesian spaces. Wherein:

$$\overline{F}_n(Y_{n-1}\mid X_{n-1}) = (-1)^{n-1}\cdot\begin{bmatrix} \overline{f}_{0|n}^{[1]} & \overline{f}_{0|n}^{[2]} & \dots & \overline{f}_{0|n}^{[n]} \\ \overline{f}_{1|n}^{[1]} & \overline{f}_{1|n}^{[2]} & \dots & \overline{f}_{1|n}^{[n]} \\ \vdots & \vdots & \ddots & \vdots \\ \overline{f}_{n-1|n}^{[1]} & \overline{f}_{n-1|n}^{[2]} & \dots & \overline{f}_{n-1|n}^{[n]}\end{bmatrix}. \tag{3.58}$$

For the n-D polynomial system of n-variables and N-Order, the DET order of the Cayley-Dixon matrix and number of substitution variables are expressed respectively as:

$$\mathrm{Order}\left(\mathrm{Det}\left(\overline{F}_n(Y_{n-1}\mid X_{n-1})\right), y_l\right) = N\cdot(n-l+1)-1, \tag{3.59}$$

$$l\in[2:n]$$

$$\mathrm{Order}\left(\mathrm{Det}\left(\overline{F}_n(Y_{n-1}\mid X_{n-1})\right), x_l\right) = N\cdot l - 1,\ l\in[2:n]$$

$$\mathrm{Order}\left(\mathrm{Det}\left(\overline{F}_n(Y_{n-1}\mid X_{n-1})\right), x_1\right) = N\cdot n$$

$$\mathrm{Term}(Y_{n-1}^{\alpha}) = \prod_l^{[2:n]}\left(2^{N\cdot(n-l+1)-1}+1\right).$$

Cayley-Dixon Matrices of n-Variables and N-Order n-D Polynomial Systems

THEOREM 3.2. The n-D polynomial system of n-variables and N-Order $F_n(Y_{n-1}|X_{n-1})$, n≥2 is given; the Cayley-Dixon matrix ${}_S\Theta_S(x_1)$ irrelevant to the elimination of variables $x_2$, . . . , $x_n$ exists; the Cayley-Dixon polynomial $\mathrm{Det}(\overline{F}_n(Y_{n-1}|X_{n-1}))$ is expressed as bilinear form of separable variables $X_{n-1}^{\alpha}$ and $Y_{n-1}^{\beta}$:

$$\mathrm{Det}(\overline{F}_n(Y_{n-1}|X_{n-1}))=Y_{n-1}^{\alpha\,:\,T}\cdot{}_S\Theta_S(x_1)\cdot X_{n-1}^{\alpha}. \tag{3.60}$$

$$\alpha[l]\in[0,N\cdot(n-l+1)-1],l\in[2:n]. \tag{3.61}$$

The size of the Cayley-Dixon matrix is S×S; the [i][j] member is the univariate $x_1$ N-Order polynomial:

$${}_S\Theta_S^{[i][j]}(x_1) = {}_S\Theta_S^{[i][j][0]} + {}_S\Theta_S^{[i][j][1]}\cdot x_1 + \dots + {}_S\Theta_S^{[i][j][N]}\cdot x_1^N, \tag{3.62}$$

wherein $$s = |x_{n-1}^{\alpha}| = \prod_l^{[2:n]}\left(2^{N\cdot(n-l+1)-1}+1\right). \tag{3.63}$$

If $$Y_{n-1}^{\alpha}=X_{n-1}^{\alpha}(y_l|x_l),l\in[2:n], \tag{3.64}$$

then $${}_S\Theta_S(x_1)={}_S\Theta_S(x_1). \quad (3.65)$$

PROOF: According to Eq. (3.58), $A^{[1][c]}$ is denoted as the adjugate matrix in Row 1, Column c to obtain:

$$\mathrm{Det}(\overline{F}_n(Y_{n-1}\mid X_{n-1}))=\sum_{c=1}^{n}\left((-1)^{1+c}\cdot f_{0|n}^{[c]}\cdot A^{[1][c]}\right). \quad (3.66)$$

According to Eqs. (3.51)-(3.53) and (3.59): Det($\overline{F}_n(Y_{n-1}|X_{n-1})$) is a bilinear form of $X_{n-1}^{\alpha}$ and $Y_{n-1}^{\alpha}$. To ensure Eq. (3.60) exists, Eq. (3.59) is applied to obtain Eq. (3.63), and:

$$\mathrm{Order}\left(Y_{n-1}^{\alpha|T}\cdot {}_S\Theta_S(x_1)\cdot X_{n-1}^{\alpha},\ y_l\right)=N\cdot(n-l+1)-1. \quad (3.67)$$

As a result, Eq. (3.51) is obtained, because each member of the Cayley-Dixon matrix sΘs has N+1 undetermined coefficients, i.e. (N+1)·S×S undetermined coefficients in total. As Order (Det(${}_S\Theta_S(x_1)$),$x_1$)=S·N≥N, separable variables have no effect on the right $x_1$ order of Eq.(3.60), thus, results in Eq.(3.62). According to Eqs. (3.60) and (3.67): $X_{n-1}^{\alpha}$ and $Y_{n-1}^{\alpha}$ on both sides of Eq. (3.60) share the same order, and the $x_1$ order on both sides is identical. Independent auxiliary variables are used to substitute original variables, resulting in the increment-dimensional polynomial; as the determinant (i.e. Volume) is independent of the dimension and form of variables, the increment-dimensional DET is equivalent to the original DET. Therefore, Eqs. (3.60)-(3.62) are workable.

Let l,l'∈[2:n]. According to Eq. (3.64): If Eq. (3.60) contains $y_{l'}^{\alpha l'}\tau_l^{\alpha l}$, $y_l^{\alpha l}\tau_{l'}^{\alpha l'}$ will inevitably exist; as the substitution of variables does not result in changes in polynomial coefficients, the coefficients of $y_{l'}^{\alpha l'}\tau_l^{\alpha l}$ and $y_l^{\alpha l}\tau_{l'}^{\alpha l'}$ are identical to those of the polynomial $\tau_l^{\alpha l}\tau_{l'}^{\alpha l'}$, and the Cayley-Dixon matrix ${}_S\overline{\Theta}_S(\gamma_1)$ appears symmetric. Therefore, Eq. (3.65) is workable. Q.E.D.

Theorem 3.2 is called the Cayley-Dixon matrix existence theorem of the n-D polynomial system of n-variables and N-Order. The differences between this theorem and the Cayley-Dixon variable elimination method are: (a) The Cayley-Dixon polynomial calculation process of Eq. (3.58) is different; (b) Eq. (3.60) is applicable to the n-D polynomial system of n-variables and N-Order; and (c) The symbolic system with N-Digit is available. Eq. (3.60) converts the polynomial solution into the Cayley-Dixon matrix representation and linear equation solution. Eq. (3.56) represents the generalization of the resultant of polynomials in the Cayley-Bézout method. However, the order in Eq. (3.67) is high, which tends to result in "combinatorial explosion".

Solution of n-Variables and N-Order n-D Polynomial Systems

In consideration of Eq. (3.60), if $X_{n-1}^{\alpha}\neq 0_S$, $Y_{n-1}^{\beta}\neq 0_S$, resulting in:

$$\mathrm{Det}({}_S\Theta_S(x_1))=0. \quad (3.68)$$

Eq. (3.68) are referred to as necessary conditions for the Cayley-Dixon elimination of the polynomial system, thus, the local feasible solution becomes available. If Det(${}_S\Theta_S$) contains any zero row or zero column vector, no polynomial equation of $x_1$ can be established; at this moment, through the elementary row transformation of ${}_S\Theta_S$, it is converted into the row echelon matrix; a square matrix Ech(${}_S\Theta_S$) can be obtained, after calculating the product of the pivot in such matrix, the square matrix ${}_{S'}\overline{\Theta}_{S'}$ is obtained. Namely, S' independent column vectors are selected in matrix ${}_S\Theta_S$.

Any example of the n-D polynomial system of n-variables and N-Order (hereinafter referred to as "polynomial system") is denoted as $\overline{F}_n(Y_{n-1}|X_{n-1})$, i.e. instance of the polynomial system type $\overline{F}_n(Y_{n-1}|X_{n-1})$, wherein $X_{n-1}\subset X_{n-1}$, $Y_{n-1}\subset Y_{n-1}$, $\overline{F}_n\in\overline{F}_n$ and $|Y_{n-1}^{\beta}|\leq|X_{n-1}^{\alpha}|$. According to polynomials of Det($\overline{F}_n(Y_{n-1}|X_{n-1})$), Cayley-Dixon matrix and separable variables $X_{n-1}^{\beta}$ and $Y_{n-1}^{\beta}$ are determined. $Y_{n-1}^{\beta}$ and $X_{n-1}^{\beta}$ can be selected, and satisfy:

$$S=\left|Y_{n-1}^{\beta}\right|=\left|X_{n-1}^{\beta}\right|\leq\prod_{l}^{[2:n]}\left(2^{N\cdot(n-l+1)-1}+1\right),\ n\geq 2. \quad (3.69)$$

The bilinear form is determined:

$$\mathrm{Det}(\overline{F}_n(Y_{n-1}\mid X_{n-1}))=Y_{n-1}^{\beta:\mathrm{T}}\cdot {}_S\overline{\Theta}_S(x_1)\cdot X_{n-1}^{\beta}, \quad (3.70)$$

$${}_S\overline{\Theta}_S^{[i][j]}={}_SK_S^{[i][j][0]}+{}_SK_S^{[i][j][1]}\cdot x_1\ \ldots+{}_SK_S^{[i][j][k_{ij}]}\cdot x_1^{k_{ij}},\quad k_{ij}\leq n\cdot N, \quad (3.71)$$

wherein the columns in ${}_S\overline{\Theta}_S(x_1)$ are linearly independent from $X_{n-1}^{\beta}$. Since $X_{n-1}^{\beta}\neq 0_S$, and $Y_{n-1}^{\beta}\neq 0_S$; thus, Eqs. (3.60) and (3.63) result in:

$$Det\left({}_S\overline{\Theta}_S(x_1)\right)=0,\quad S=\left|Y_{n-1}^{\beta}\right|=\left|X_{n-1}^{\beta}\right|\leq\prod_{l}^{[2:n]}\left(2^{N\cdot(n-l+1)-1}+1\right),\ n\geq 2. \quad (3.72)$$

It is called Resultant or Elimination type. Eq. (3.72) is a univariate $x_1$ polynomial equation; n−1 unknown variables are eliminated; accordingly, the univariate $x_1$ solution becomes available. If $x_1$ is simultaneously satisfied $$\mathrm{Rank}\left({}_S\Theta_S^{[1:S][2:S][*]}(x_1)\right)=S, \quad (3.73)$$

then $x_1$ is the correct solution. The solved $x_1$ is put into Eq. (3.74); Eq. (3.72) is workable and $Y_{n-1}^{\beta}$ is random, resulting in:

$${}_S\overline{\Theta}_S(x_1)\cdot X_{n-1}^{\beta}=0_S, \quad (3.74)$$

the following is established:

$${}_S\overline{\Theta}_S^{[1:S][2:S][*]}(x_1)\cdot X_{n-1}^{\beta>0}=-{}_S\overline{\Theta}_S^{[*][1][*]}(x_1). \quad (3.75)$$

If necessary conditions are available $$\mathrm{Rank}\left({}_S\Theta_S^{[1:S][2:S][*]}(x_1)\right)=S-1. \quad (3.76)$$

It is workable, Eq. (3.75) is solved to obtain the solution to the eliminated variable $X_{n-1}^{\beta}$; otherwise, Eq. (3.75) is required to combine to obtain all solutions. According to Eq.(3.54), as the $x_1$ order on both sides of Eq. (3.60) is identical, the following will inevitably exist:

$$\mathrm{Order}(\mathrm{Det}({}_S\overline{\Theta}_S(x_1)))\leq M\ \mathrm{in}[n\cdot N,S\cdot N]; \quad (3.77)$$

If the following condition is also met:

$$\mathrm{Rank}({}_S\overline{\Theta}_S(x_1))>n-1, \tag{3.78}$$

Eq. (3.75) can be solved to obtain n−1 different composite variables in $X_{n-1}{}^{\beta}$; accordingly, the solutions to all independent variables will become available.

The n-D polynomial system of n-variables and N-Order $F_a(X_n{}^{\alpha})$ is given; the Cayley-Dixon matrix is calculated as follows:

[1] Determination of system structure: The number of equations and independent variables is denoted as n; the independent variable is denoted as $X_n$; the polynomial composite variable is denoted as $X_n{}^{\alpha}$; the substitution variable is denoted as $Y_{n-1}$; the number of substitution variables is denoted as n−1; the Cayley-Dixon matrix with a size of S·S is denoted as ${}_S\overline{\Theta}_S$, and its member coefficients are expressed by Eq.(3.62), wherein S is determined via Eq. (3.72), and the variable to be eliminated is $x_1$.

[2] Eq. (3.43) results in the corresponding relation between $x^{\alpha}$ and $k_x{}^{\alpha}$, $Y_{n-1}{}^{\alpha}|X_n{}^{\alpha}$ in the expression Eq. (3.49) has S terms at most.

[3] According to Eq. (3.57) and Sarrus Rule, calculate Dixon $(F_n(Y_{n-1}|X_{n-1}))$; based on the N-Digit operation result corresponding to $k_x{}^{\alpha}$, combine those polynomials.

[4] The Cayley-Dixon matrix members are shown by Eq. (3.72). According to Eq.(3.72), calculate $(n+1)\cdot S^2$ coefficients of the Cayley-Dixon matrix ${}_S\Theta_S$.

[5] If the direct solution discrimination criteria of Eqs. (3.77) and (3.78) are met, all numerical solutions can be obtained via Eqs. (3.74) and (3.75).

EXAMPLE 3.7. Solution of polynomial system (3.79)

$$F_2(\tau_2^{\alpha})=\begin{bmatrix} f^{[1]} \\ f^{[2]} \end{bmatrix},\begin{cases} f^{[1]}:=1+2\cdot\tau_l+\tau_{\bar{l}}+2\cdot\tau_{\bar{l}}\cdot\tau_l=0 \\ f^{[2]}:=1+\tau_l+\tau_{\bar{l}}+\tau_{\bar{l}}\cdot\tau_l=0 \end{cases}. \tag{3.79}$$

SOLUTION: Apparently, according to Eq. (3.79), it is a 2D polynomial system of 2-variables and 1-Order which satisfies the Cayley-Dixon variable elimination conditions. Eqs. (3.57) and (3.60) result in:

$$\begin{aligned} Det(\overline{F}_2(y_l\,|\,\tau_l)) &= \left[\!\!\left[\begin{matrix} 1+2\cdot\tau_l+\tau_{\bar{l}}+2\cdot\tau_{\bar{l}}\tau_l & 2+2\tau_{\bar{l}} \\ 1+\tau_l+\tau_{\bar{l}}+\tau_{\bar{l}}\tau_l & 1+\tau_{\bar{l}} \end{matrix}\right]\!\!\right], \\ &= -(1+\tau_{\bar{l}})^2=[\,1\quad y_l\,]\cdot{}_2\ominus_2(\tau_{\bar{l}})\cdot[\,1\quad\tau_l\,|^T \end{aligned}$$

wherein $${}_1\overline{\Theta}_1(\tau_{\bar{l}})=-(1+\tau_{\bar{l}})^2. \tag{3.80}$$

According to Eqs. (3.74) and (3.80): $\tau_{\bar{l}}=-1$; put it into Eq. (3.79) to obtain $\tau_l=0$. Apparently, variables satisfy Eq. (3.64), the Cayley-Dixon matrix as shown by Eq. (3.80) is symmetric.

EXAMPLE 3.8. Solution of polynomial system $$F_2(\tau_2^{\alpha})=\begin{bmatrix} f^{[1]} \\ f^{[2]} \end{bmatrix},\begin{cases} f^{[1]}:=1+2\cdot\tau_l+\tau_{\bar{l}}=0 \\ f^{[2]}:=2+\tau_l+\tau_{\bar{l}}=0 \end{cases}. \tag{3.81}$$

SOLUTION: It is a 2D polynomial system of 2-variables and 1-Order which satisfies the Cayley-Dixon variable elimination conditions. Eqs. (3.57) and (3.60) result in:

$$\begin{aligned} \mathrm{Det}(\overline{F}_2(y_l\,|\,\tau_{\bar{l}}\tau_l)) &= \left[\!\!\left[\begin{matrix} 1+2\cdot\tau_l+\tau_{\bar{l}} & 2+\tau_l+\tau_{\bar{l}} \\ 2 & 1 \end{matrix}\right]\!\!\right], \\ &= [\,1\quad y_l]\cdot{}_2\ominus_2(\tau_{\bar{l}})\cdot[\,1\quad\tau_l\,]^T \end{aligned}$$

wherein $${}_1\overline{\Theta}_1(\tau_{\bar{l}})=-3-\tau_{\bar{l}}. \tag{3.82}$$

According to Eqs. (3.74) and (3.80): $\tau_{\bar{l}}=-3$; put it into Eq. (3.81) to obtain $\tau_l=1$.

EXAMPLE 3.9. Cayley-Dixon variable elimination of polynomial system (3.83)

$$F_3(X_3^{2\alpha})=\begin{bmatrix} f^{[1]} \\ f^{[2]} \\ f^{[3]} \end{bmatrix},\begin{cases} f^{[1]}:=x_1^2+x_2^2-1 \\ f^{[2]}:=:x_1^2+x_3^2-1 \\ f^{[3]}:=x_2^2+x_3^2-1 \end{cases}. \tag{3.83}$$

SOLUTION: Eq. (3.83) seems a 2-Order polynomial, but essentially it is a 3D polynomial system of 3-variables and 1-Order which satisfies the Cayley-Dixon variable elimination conditions. Eqs. (3.57) and (3.60) result in:

$$\begin{aligned} Det(\overline{F}_3(y_{[2:3]}\,|\,x_{[2:3]})) &= \begin{bmatrix} x_1^2+x_2^2-1 & x_2+y_2 & 0 \\ x_1^2+x_3^2-1 & 0 & x_3+y_3 \\ x_2^2+x_3^2-1 & x_2+y_2 & x_3+y_3 \end{bmatrix}, \\ &= [\,1\quad y_2\quad y_3\quad y_2y_3\,]\cdot{}_4\ominus_4(x_1)\cdot[\,1\quad x_2\quad x_3\quad x_2x_3\,]^T \end{aligned}$$

wherein $${}_4\Theta_4(x_1)=\begin{bmatrix} 0 & 0 & 0 & 1-2x_1^2 \\ 0 & 0 & 1-2x_1^2 & 0 \\ 0 & 1-2x_1^2 & 0 & 0 \\ 1-2x_1^2 & 0 & 0 & 0 \end{bmatrix}. \tag{3.84}$$

According to Eqs. (3.74) and (3.84): $x_1=\pm\sqrt{2}/2$; put it into Eq. (3.83) to obtain the corresponding $x_2=x_3=\pm\sqrt{2}/2$. Apparently, as variables satisfy Eq. (3.64), the Cayley-Dixon matrix as shown by Eq. (3.84) is symmetric.

EXAMPLE 3.10. Cayley-Dixon variable elimination of polynomial system (3.85)

$$F_4(\tau_4^{\alpha})=\begin{bmatrix} f^{[1]} \\ f^{[2]} \\ f^{[3]} \\ f^{[4]} \end{bmatrix},\begin{cases} f^{[1]}:=1+\tau_1+\tau_1\tau_2\tau_3\tau_4=0 \\ f^{[2]}:=1+\tau_2+\tau_1\tau_2\tau_3\tau_4=0 \\ f^{[3]}:=1+\tau_3+\tau_1\tau_2\tau_3\tau_4=0 \\ f^{[1]}:=4+\tau_4+\tau_1\tau_2\tau_3\tau_4=0 \end{cases}. \tag{3.85}$$

SOLUTION: It is a 4D polynomial system of 4-variables and 1-Order, which satisfies the Cayley-Dixon variable elimination conditions. Eqs. (3.57) and (3.60) result in:

$$Det(\overline{F}_4(y_{[2:4]}|\tau_{[2:4]}))= \tag{3.86}$$

-continued $$\left|\begin{matrix} 1+\tau_1+\tau_1\tau_2\tau_3\tau_4 & \tau_1\tau_3\tau_4 & \tau_1 y_2\tau_4 & \tau_1 y_2 y_3 \\ 1+\tau_2+\tau_1\tau_2\tau_3\tau_4 & 1+\tau_1\tau_3\tau_4 & \tau_1 y_2\tau_4 & \tau_1 y_2 y_3 \\ 1+\tau_3+\tau_1\tau_2\tau_3\tau_4 & \tau_1\tau_3\tau_4 & 1+\tau_1 y_2\tau_4 & \tau_1 y_2 y_3 \\ 4+\tau_4+\tau_1\tau_2\tau_3\tau_4 & \tau_1\tau_3\tau_4 & \tau_1 y_2\tau_4 & 1+\tau_1 y_2 y_3 \end{matrix}\right| =$$

$$(-1)^3\cdot\left|\begin{matrix} 1+\tau_1+\tau_1\tau_2\tau_3\tau_4 & \tau_1\tau_3\tau_4 & \tau_1 y_2\tau_4 & \tau_1 y_2 y_3 \\ \tau_2-\tau_1 & 1 & 0 & 0 \\ \tau_3-\tau_1 & 0 & 1 & 0 \\ 3+\tau_4-\tau_1 & 0 & 0 & 1 \end{matrix}\right| =$$

$$[1, y_2, y_2y_3]\cdot {}_3\overline{\Theta}_3\cdot\begin{bmatrix} 1 \\ \tau_4 \\ \tau_3\tau_4 \end{bmatrix}$$

wherein $${}_3\overline{\Theta}_3 = \begin{bmatrix} -1-\tau_1 & 0 & -\tau_1^2 \\ 0 & -\tau_1^2 & \tau_1 \\ 3\tau_1-\tau_1^2 & \tau_1 & 0 \end{bmatrix}.$$

Eqs. (3.74) and (3.86) result in five solutions:

$$\tau_1^{[1]} = 0,\ \tau_1^{[2]} = 1,$$

$$\tau_1^{[3]} = \frac{1}{3}\cdot\left(2+\frac{1}{2}\cdot\left(79-3\sqrt{249}\right)\right)^{1/3} + \frac{1}{3}\cdot\left(\frac{1}{2}\left(79-3\sqrt{249}\right)\right)^{1/3},$$

$$\tau_1^{[4]} = \frac{2}{3}-\frac{1}{6}\cdot\left(1+i\sqrt{3}\right)\cdot\left(\frac{1}{2}\cdot\left(79-3\sqrt{249}\right)\right)^{1/3} - \frac{1}{6}\cdot\left(1-i\sqrt{3}\right)\cdot\left(\frac{1}{2}\left(79+3\sqrt{249}\right)\right)^{1/3},$$

$$\tau_1^{[5]} = \frac{2}{3}-\frac{1}{6}\cdot\left(1-i\sqrt{3}\right)\cdot\left(\frac{1}{2}\cdot\left(79-3\sqrt{249}\right)\right)^{1/3} - \frac{1}{6}\cdot\left(1+i\sqrt{3}\right)\cdot\left(\frac{1}{2}\cdot\left(79+3\sqrt{249}\right)\right)^{1/3}.$$

wherein $\tau_1^{[1]}=0$ is not the solution to these equations. Put the remaining four solutions into Eq. (3.75) respectively. If $\Sigma_1=1$, according to Eq.(3.75), $$\begin{bmatrix} 0 & -1 \\ -1 & 1 \\ 1 & 0 \end{bmatrix}\cdot\begin{bmatrix} \tau_4 \\ \tau_3\tau_4 \end{bmatrix} = \begin{bmatrix} 2 \\ 0 \\ -2 \end{bmatrix}.$$

Following solutions are obtained: $\tau_3=1$ and $\tau_4=-2$. Put $\tau_1^{[2]}=1$, $\tau_3$ and $\tau_4$ into Eq. (3.85) to obtain $\tau_2=1$. Similarly, other 3 sets of solutions can be obtained. Apparently, as variables fail to satisfy the equation, the Cayley-Dixon matrix as shown by Eq. (3.86) is asymmetric. This example shows that the Cayley-Dixon determinant is zero is the sufficient condition of the solution if multi-linear polynomial systems.

EXAMPLE 3.11. Cayley-Dixon variable elimination of polynomial system (3.87)

$$F_2(\tau_2^{\alpha}) = \begin{bmatrix} f^{[1]} \\ f^{[2]} \end{bmatrix}, \begin{cases} f^{[1]} := \tau_1^2 - 2\cdot\tau_1 + \tau_1\tau_2 - 3 = 0 \\ f^{[2]} := 2\cdot\tau_2^2 - 3\cdot\tau_2 + \tau_1\tau_2 = 0 \end{cases}. \tag{3.87}$$

SOLUTION: According to Eq. (3.87), it is a 2D polynomial system of 2-variables and 2-Order which satisfies the Cayley-Dixon variable elimination conditions. Eqs. (3.57) and (3.60) result in:

$$Det\left(\overline{F}_2(y_2\,|\,\tau_2)\right) = -\begin{vmatrix} \tau_1^2-2\tau_1+\tau_1\tau_2-3 & \tau_1 \\ 2\tau_2^2-3\tau_2+\tau_1\tau_2 & 2(\tau_2+y_2)-3+\tau_1 \end{vmatrix},$$
$$= [1\ \ y_2]\cdot{}_2\Theta_2(\tau_1)\cdot[1\ \ \tau_2]^T$$

wherein $${}_2\Theta_2(\tau_1) = \begin{bmatrix} -9-3\tau_1+5\tau_1^2-\tau_1^3 & 6+4\tau_1-2\tau_1^2 \\ 6+4\tau_1-2\tau_1^2 & -2\tau_1 \end{bmatrix}. \tag{3.88}$$

According to Eqs. (3.74) and (3.88): $\tau_1=-2$, $\tau_1=-1$ and $\tau_1=3$; put such 3 solutions into Eq. (3.85) and then obtain three sets of solutions to these equations:

$$\begin{cases} \tau_2 = -2 \\ \tau_2 = \frac{5}{2} \end{cases}, \begin{cases} \tau_1 = -1 \\ \tau_2 = 0 \end{cases}, \begin{cases} \tau_1 = 3 \\ \tau_2 = 0 \end{cases}.$$

As variables satisfy Eq. (3.64), the Cayley-Dixon matrix in Eq. (3.88) is symmetric.

EXAMPLE 3.12. The Cayley-Dixon determinant of polynomial system (3.89).

$$F_3(X_3^{2\alpha}) = \begin{bmatrix} f^{[1]} \\ f^{[2]} \\ f^{[3]} \end{bmatrix}, \begin{cases} f^{[1]} := x_1^2 + x_2^2 - 2 \\ f^{[2]} := (x_1-2)^2 + x_3^2 - 2 \\ f^{[3]} := x_2x_3^2 - 1 \end{cases}. \tag{3.89}$$

SOLUTION: According to Eqs. (3.57) and (3.60), $$Det\left(\overline{F}_3(y_{[2:3]}|x_{[2:3]})\right) = -\begin{vmatrix} x_1^2+x_2^2-2 & (x_1-2)^2+x_3^2-2 & x_2x_3^2-1 \\ x_2+y_2 & 0 & x_3^2 \\ 0 & x_3+y_3 & y_2(x_3+y_3) \end{vmatrix}$$
$$= (x_1^2-2)\cdot(x_3^3+x_3^2y_3) + (x_1^2-4x_1+2)\cdot(x_2x_3y_2+x_3y_2^2+x_2y_2y_3+y_2^2y_3),$$
$$+x_2^2x_3^3 + x_2^2x_3^2y_3 + x_2x_3^3y_2 + x_2x_3^2y_3 + x_2x_3 + y_2x_3 + x_2y_3 + y_2y_3$$
$$= \begin{bmatrix} 1 & y_2 & y_3 & y_2y_3 & y_2^2 & y_2^2y_3 \end{bmatrix}\cdot{}_6\Theta_{10}(x_1)$$
$$\cdot[1\ \ x_2\ \ x_3\ \ x_2x_3\ \ x_3^2\ \ x_2x_3^2\ \ x_3^3\ \ x_2x_3^3\ \ x_2^2x_3^2\ \ x_2^2x_3^3]^T$$

wherein $\alpha_{(x_1)}=x_1^2-4x_1+2$, $\beta_{(x_1)}=x_1^2-2$.

$${}_6\Theta_{10}(x_1) = \begin{bmatrix} 0 & 0 & 0 & 1 & 0 & 0 & \beta_{(x_1)} & 0 & 0 & 1 \\ 0 & 0 & 1 & \alpha_{(x_1)} & 0 & 0 & 0 & 1 & 0 & 0 \\ 0 & 1 & 0 & 0 & \beta_{(x_1)} & 0 & 0 & 0 & 1 & 0 \\ 1 & \alpha_{(x_1)} & 0 & 0 & 0 & 1 & 0 & 0 & 0 & 0 \\ 0 & 0 & \alpha_{(x_1)} & 0 & 0 & 0 & 0 & 0 & 0 & 0 \\ \alpha_{(x_1)} & 0 & 0 & 0 & 1 & 0 & 0 & 0 & 0 & 0 \end{bmatrix}. \tag{3.90}$$

Taking six column vectors which is independence from $x_1$ in the ${}_6\Theta_{10}(x_1)$ to constitute ${}_6\overline{\Theta}_6(x_1)$, then $${}_6\overline{\Theta}_6(x_1) = \begin{bmatrix} 0 & 0 & 0 & 1 & 0 & \beta_{(x_1)} \\ 0 & 0 & 1 & \alpha_{(x_1)} & 0 & 0 \\ 0 & 1 & 0 & 0 & \beta_{(x_1)} & 0 \\ 1 & \alpha_{(x_1)} & 0 & 0 & 0 & 0 \\ 0 & 0 & \alpha_{(x_1)} & 0 & 0 & 0 \\ \alpha_{(x_1)} & 0 & 0 & 0 & 1 & 0 \end{bmatrix}. \tag{3.91}$$

Using Eq. (3.40) to calculate the determinant of Eq. (3.91) obtains $$Det({}_6\overline{\Theta}_6(x_1)) = \begin{bmatrix} 0 & 1 & x_1^2-2 \\ 0 & \alpha_{(x_1)} & 0 \\ 1 & 0 & 0 \end{bmatrix} \cdot \begin{bmatrix} 1 & 0 & 0 \\ 0 & \alpha_{(x_1)} & 0 \\ \alpha_{(x_1)} & 0 & 1 \end{bmatrix}$$
$$\backslash - \begin{bmatrix} 1 & 0 & x_1^2-2 \\ \alpha_{(x_1)} & 0 & 0 \\ 0 & x_1^2-2 & 0 \end{bmatrix} \cdot \begin{bmatrix} 1 & \alpha_{(x_1)} & 0 \\ 0 & 0 & \alpha_{(x_1)} \\ \alpha_{(x_1)} & 0 & 0 \end{bmatrix}$$
$$= -\left((x_1^2-2)\cdot(x_1^2-4x_1+2)^2\right)\cdot\left(1+(x_1^2-2)\cdot(x_1^2-4x_1+2)^2\right).$$
$$= -x_1^{12}+16x_1^{11}-100x_1^{10}+288x_1^9-252x_1^8-640x_1^7+1823x_1^6$$
$$\backslash -1272x_1^5-1026x_1^4+2304x_1^3-1564x_1^2+480x-56$$

Apparently there is a solution $x_1^{[1]}=1$, putting it into Eq. (3.89) obtain $x_2^{[1]}=x_3^{[1]}=1$. The 7 to 9 columns in Eq. (3.90) are related to the columns in ${}_6\overline{\Theta}_6(x_1)$. Although $x_1^{[2]}=\sqrt{2}$, but $x_2^{[2:4]}$ and $x_3^{[2:4]}$ does not exist, because after substituting them into Eq. (3.90), Eq. (3.73) cannot be satisfied. Therefore, when $|\alpha|\neq|\beta|$ is not satisfied, the solution of Eq. (3.68) is feasible, and it is necessary to substitute it to the system equation to verify whether it is correct. This example shows that when the Cayley-Dixon determinant is zero, it is a necessary condition for the general polynomial system, but not a sufficient condition.

EXAMPLE 3.13. The Cayley-Dixon determinant of polynomial system (3.92).

$$F_3(X_3^{2\alpha}) = \begin{bmatrix} f^{[1]} \\ f^{[2]} \\ f^{[3]} \end{bmatrix}, \begin{cases} f^{[1]} := x_1^2+x_2^2-2 \\ f^{[2]} := (x_1-2)^2+x_3^2+x_2-3\ . \\ f^{[3]} : = x_2x_3^2-1 \end{cases} \tag{3.92}$$

SOLUTION: According to Eqs. (3.57) and (3.60), $$Det(\overline{F}_3(y_{[2:3]}|x_{[2:3]})) = -\begin{bmatrix} x_1^2+x_2^2-2 & x_2y_2 & 0 \\ (x_1-2)^2+x_3^2+x_2-3 & 1 & x_3y_3 \\ x_2x_3^2-1 & x_3^2 & y_2(x_3+y_3) \end{bmatrix}$$
$$= (x_1-2)\cdot\begin{pmatrix} x_3^3+x_3^2y_3- \\ \backslash y_2x_3-y_2y_3 \end{pmatrix} + (x_1^4-4x_1^2+1)\cdot\begin{pmatrix} x_2x_3y_2+x_3y_2^2+ \\ \backslash x_2y_2y_3+y_2^2y_3 \end{pmatrix},$$
$$\backslash + (x_3^3y_2^2+x_3^2y_2^2y_3+x_2x_3y_2^2+x_2y_2^2y_3)+(x_2x_3+y_2x_3+x_2y_3+y_2y_3)$$
$$= [\,1\ \ y_2\ \ y_3\ \ y_2y_3\ \ y_2^2\ \ y_2^2y_3\,]\cdot{}_6\Theta_6(x_1)\cdot[\,1\ \ x_2\ \ x_3\ \ x_2x_3\ \ x_3^2\ \ x_3^3\,]^T$$

wherein $${}_6\ominus_6(x_1) = \begin{bmatrix} 0 & 0 & 0 & 1 & 0 & x_1^2-2 \\ 0 & 0 & 3-x_1^2 & \alpha_{(x_1)} & 0 & 0 \\ 0 & 1 & 0 & 0 & x_1^2-2 & 0 \\ 3-x_1^2 & \alpha_{(x_1)} & 0 & 0 & 0 & 0 \\ 0 & 0 & \alpha_{(x_1)} & 1 & 0 & 1 \\ \alpha_{(x_1)} & 1 & 0 & 0 & 1 & 0 \end{bmatrix}, \tag{3.93}$$

wherein, $\alpha_{(x_1)}$. Applying Eqs. (3.40) to (3.93) will obtain $$\mathrm{Det}({}_6\ominus_6(x_1)) = \begin{bmatrix} 0 & 1 \\ 3-x_1^2 & \alpha_{(x_1)} \end{bmatrix} \cdot \begin{bmatrix} 0 & 1 & x_1^2-2 & 0 \\ 3-x_1^2 & \alpha_{(x_1)} & 0 & 0 \\ 0 & 0 & 0 & 1 \\ \alpha_{(x_1)} & 1 & 1 & 0 \end{bmatrix} \backslash +$$

-continued $$\begin{bmatrix} 0 & x_1^2-2 \\ 3-x_1^2 & 0 \end{bmatrix} \cdot \begin{bmatrix} 0 & 1 & 0 & x_1^2-2 \\ 3-x_1^2 & \alpha_{(x_1)} & 0 & 0 \\ 0 & 0 & 0 & 0 \\ \alpha_{(x_1)} & 1 & -1 & -1 \end{bmatrix} =$$
$$\left((x_1^2-2)\cdot(x_1^2-4x+1)^2\backslash-(3-x_1^2)\right)\cdot\left(2\cdot(3-x_1^2)-\right.$$
$$\left.\backslash(x_1^2-4x_1+1)^2\right)\cdot -3x_1^6+16x_1^5-11x_1^4-44x_1^3+47x_1^2+20x-25.$$

Apparently, there is a solution $x_1^{[1]}=1$, putting it into Eq. will obtain $x_2^{[1]}=x_3^{[1]}=1$.

EXAMPLE 3.14. Through the elementary row transformation of matrices, obtain the row echelon matrix of eq. (3.86).

SOLUTION: The rk stands for the No. k row. From eq. (3.86), obtain $${}_3\ominus_3 = \begin{bmatrix} -1-\tau_1 & 0 & -\tau_1^2 \\ 0 & -\tau_1^2 & \tau_1 \\ 3\tau_1-\tau_1^2 & \tau_1 & 0 \end{bmatrix} \xrightarrow{-\tau_1\cdot r1\backslash+r3}$$
$$\begin{bmatrix} -1-\tau_1 & 0 & -\tau_1^2 \\ 0 & -\tau_1^2 & \tau_1 \\ 4\tau_1 & \tau_1 & \tau_1^3 \end{bmatrix} \xrightarrow{4\cdot r1\backslash+r3} \begin{bmatrix} -1-\tau_1 & 0 & -\tau_1^2 \\ 0 & -\tau_1^2 & \tau_1 \\ -4 & \tau_1 & \tau_1^3-4\tau_1^2 \end{bmatrix} \xrightarrow{\tau_1\cdot r3-\backslash 4\cdot r1}$$
$$\begin{bmatrix} 4 & \tau_1^2 & \tau_1^4-4\tau_1^3+4\tau_1^2 \\ 0 & -\tau_1^2 & \tau_1 \\ -4 & \tau_1 & \tau_1^3-4\tau_1^2 \end{bmatrix} \xrightarrow{r1\backslash+r3} \begin{bmatrix} 4 & \tau_1^2 & \tau_1^4-4\tau_1^3+4\tau_1^2 \\ 0 & -\tau_1^2 & \tau_1 \\ 0 & \tau_1^2+\tau_1 & \tau_1^4-3\tau_1^3 \end{bmatrix} \xrightarrow{r2\backslash+r3}$$
$$\begin{bmatrix} 4 & \tau_1^2 & \tau_1^4-4\tau_1^3+4\tau_1^2 \\ 0 & -\tau_1^2 & \tau_1 \\ 0 & \tau_1 & \tau_1^4-3\tau_1^3+\tau_1 \end{bmatrix} \xrightarrow{r2+\tau_1\backslash\cdot r3} \begin{bmatrix} 4 & \tau_1^2 & \tau_1^4-4\tau_1^3+4\tau_1^2 \\ 0 & -\tau_1^2 & \tau_1 \\ 0 & 0 & \tau_1^5-3\tau_1^4+\tau_1^2+\tau_1 \end{bmatrix}$$

And obtain $\mathrm{Det}({}_3\Theta_3)=\tau_1^2\cdot(\Sigma_1^5-3\tau_1^4+\tau_1^2+\tau_1)=0$.

D-H Frame and D-H Parameter Based on Axis-Invariant when the nominal D-H frame and D-H parameters are applied to calculate the inverse kinematics (IK), the machining and assembly errors result in the fact that the absolute positioning and attitude of the system is much lower than the system repeatability. Meanwhile, as the D-H frame establishing and D-H parameters determination are very tedious, manual operation tends to reduce the reliability if the system DOF is high. Therefore, it is necessary to solve the determination of the D-H frame and D-H parameters by the computer. Meanwhile, the accurate robotic autonomous operation is based on the highly accurate D-H frame and D-H parameters, which also set the foundation for the development from teaching robot to autonomous robot.

D-H Frame Determination Based on Axis-Invariant

Figure 34:
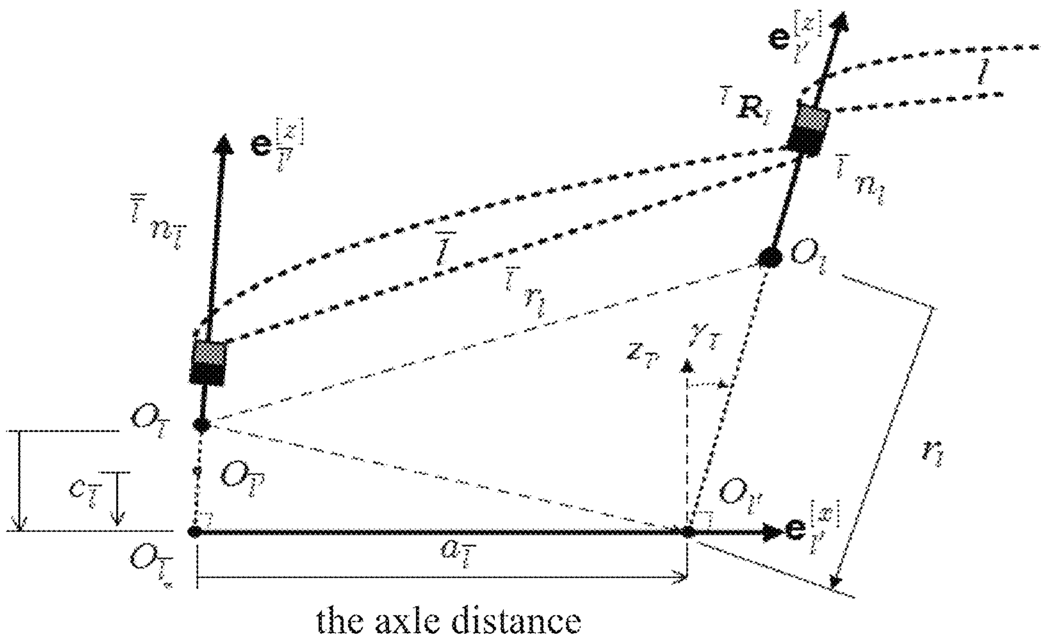
FIG. 34 is a relation diagram of natural coordinate system and D-H system.

As shown by FIG. 34, natural frame SEQS $F=\{F^{[l]}|l\in A\}$, fixed Axis-Invariant SEQS $I=[[{}^{\bar{l}}n_l, {}^{\bar{l}}l_{nl}]|l\in A]$, and $A=(0:k]$; wherein: $F^{[l]}$ is the natural frame, $F^{[l']}$ is the D-H frame; additionally, ${}_0{}^{\bar{l}}Q_l\equiv 1$ and $l,\bar{l}\in A$. First of all, the median point $O_{\bar{l}'}$ 3402 and the origin $O_{l'}$ 3401 of the D-H frame should be determined.

[1] Assume that $z_{\bar{l}'}$ and $z_{l'}$ pass the Axis-Invariant ${}^{\bar{l}}n_{\bar{l}}$ 3403 and ${}^{\bar{l}}n_l$ 3404 respectively, and that ${}^{\bar{l}|}e_{\bar{l}'}^{[z]}={}^{\bar{l}}n_{\bar{l}}$ and ${}^{\bar{l}|}e_{l'}^{[z]}={}^{\bar{l}}n_l$.

[2] ${}^{\bar{l}|}e_{l'}^{[x]}$ is defined as a common perpendicular from ${}^{\bar{l}}n_{\bar{l}}$ 3403 to ${}^{\bar{l}}n_l$, 3404 including three conditions.

[2.1] If $|{}^{0|\bar{l}}n_{\bar{l}}^T\cdot{}^{0|\bar{l}}n_l|\neq 1$, then ${}^0r_{\bar{l}'}$ and ${}^0r_{l'}$ can be expressed as the Axis- Invariant ${}^{\bar{l}}n_{\bar{l}}$ 3403 and ${}^{\bar{l}}n_l$, 3404

$$\begin{cases} {}^{0|\bar{l}}r_{\bar{l}_*} = {}^{0|\bar{l}}n_{\bar{l}}\cdot r_{\bar{l}} \\ {}^{0|l}r_{l'} = {}^{0|\bar{l}}n_l\cdot r_l \end{cases}, \tag{3.94}$$

$${}^{0|\bar{l}_*}r_{l'} = {}^{0|\bar{l}}r_l + {}^{0|\bar{l}}n_l\cdot r_l - {}^{0|\bar{l}}n_{\bar{l}}\cdot r_{\bar{l}}. \tag{3.95}$$

${}^{0|\bar{l}*}r_{l'}\perp{}^{0|\bar{l}}n_{\bar{l}}$ and ${}^{\bar{l}*}r_{l'}\perp{}^{\bar{l}}n^{l}$ result in:

$$\begin{cases} {}^{0|\bar{l}}n_{\bar{l}}^T\cdot\left({}^{0|\bar{l}}r_l + {}^{0|\bar{l}}n_l\cdot r_l - {}^{0|\bar{l}}n_{\bar{l}}\cdot r_{\bar{l}}\right) = 0 \\ {}^{0|\bar{l}}n_l^T\cdot\left({}^{0|\bar{l}}r_l + {}^{0|\bar{l}}n_l\cdot r_l - {}^{0|\bar{l}}n_{\bar{l}}\cdot r_{\bar{l}}\right) = 0 \end{cases}, \tag{3.96}$$

solve Eq. (3.96) to obtain:

$$\begin{cases} r_{\bar{l}} = \dfrac{{}^{0|\bar{\bar{l}}}n_{\bar{l}}^T\cdot\left(1 - {}^{0|\bar{l}}n_l\cdot{}^{0|\bar{l}}n_l^T\right)\cdot{}^{0|\bar{l}}r_l}{1 - {}^{0|\bar{\bar{l}}}n_{\bar{l}}^T\cdot{}^{0|\bar{l}}n_l\cdot{}^{0|\bar{l}}n_l^T\cdot{}^{0|\bar{\bar{l}}}n_{\bar{l}}} \\ r_l = \dfrac{{}^{0|\bar{l}}n_l^T\cdot\left(1 - {}^{0|\bar{\bar{l}}}n_{\bar{l}}\cdot{}^{0|\bar{\bar{l}}}n_{\bar{l}}^T\right)\cdot{}^{0|\bar{l}}r_l}{{}^{0|\bar{l}}n_l^T\cdot{}^{0|\bar{\bar{l}}}n_{\bar{l}}\cdot{}^{0|\bar{\bar{l}}}n_{\bar{l}}^T\cdot{}^{0|\bar{l}}n_l} \end{cases}. \tag{3.97}$$

Put Eq. (3.97) into Eq. (3.94) to obtain:

$$\begin{cases} {}^{0|\bar{l}}r_{\bar{l}_*} = {}^{0|\bar{\bar{l}}}n_{\bar{l}}\cdot\dfrac{{}^{0|\bar{\bar{l}}}n_{\bar{l}}^T\cdot\left(1 - {}^{0|\bar{l}}n_l\cdot{}^{0|\bar{l}}n_l^T\right)\cdot{}^{0|\bar{l}}r_l}{1 - {}^{0|\bar{\bar{l}}}n_{\bar{l}}^T\cdot{}^{0|\bar{l}}n_l\cdot{}^{0|\bar{l}}n_l^T\cdot{}^{0|\bar{\bar{l}}}n_{\bar{l}}} \\ {}^{0|l}r_{l'} = {}^{0|\bar{l}}n_l\cdot\dfrac{{}^{0|\bar{l}}n_1^T\cdot\left(1 - {}^{0|\bar{\bar{l}}}n_{\bar{l}}\cdot{}^{0|\bar{\bar{l}}}n_{\bar{l}}^T\right)\cdot{}^{0|\bar{l}}r_l}{1 - {}^{0|\bar{l}}n_l^T\cdot{}^{0|\bar{\bar{l}}}n_{\bar{l}}\cdot{}^{0|\bar{\bar{l}}}n_{\bar{l}}^T\cdot{}^{0|\bar{l}}n_l} \end{cases}, \tag{3.98}$$

and $${}^{\bar{l}|\bar{l}_*}r_{l'} = {}^{\bar{l}|\bar{\bar{l}}}\tilde{n}_{\bar{l}}\cdot{}^{\bar{l}}n_l\cdot\left({}^{\bar{l}|\bar{\bar{l}}}\tilde{n}_{\bar{l}}\cdot{}^{\bar{l}}n_l\right)^T\cdot{}^{\bar{l}}r_l = -{}^{\bar{l}|\bar{\bar{l}}}\tilde{n}_{\bar{l}}\cdot{}^{\bar{l}}n_l\cdot{}^{\bar{l}}n_1^T\cdot{}^{\bar{l}|\bar{\bar{l}}}\tilde{n}_{\bar{l}}\cdot{}^{\bar{l}}r_l. \tag{3.99}$$

For the natural frame, the following equation is established, $${}_0^{\bar{l}}Q_l = 1, l\in A. \tag{3.100}$$

Convert Eqs. (3.100), (3.98) and (3.99) into $$\begin{cases} {}^{0}r_{\bar{l}_*} = {}^{0}r_{\bar{l}} + {}^{0|\bar{\bar{l}}}n_{\bar{l}}\cdot\dfrac{{}^{0|\bar{\bar{l}}}n_{\bar{l}}^T\cdot\left(1 - {}^{0|\bar{l}}n_l\cdot{}^{0|\bar{l}}n_l^T\right)\cdot\left({}^{0}r_l - {}^{0}r_{\bar{l}}\right)}{1 - {}^{0|\bar{\bar{l}}}n_{\bar{l}}^T\cdot{}^{0|\bar{l}}n_l\cdot{}^{0|\bar{l}}n_l^T\cdot{}^{0|\bar{\bar{l}}}n_{\bar{l}}} \\ {}^{0}r_{l'} = {}^{0}r_1 + {}^{0|\bar{l}}n_l\cdot\dfrac{{}^{0|\bar{l}}n_l^T\cdot\left(1 - {}^{0|\bar{\bar{l}}}n_{\bar{l}}\cdot{}^{0|\bar{\bar{l}}}n_{\bar{l}}^T\right)\cdot\left({}^{0}r_l - {}^{0}r_{\bar{l}}\right)}{1 - {}^{0|\bar{l}}n_l^T\cdot{}^{0|\bar{\bar{l}}}n_{\bar{l}}\cdot{}^{0|\bar{\bar{l}}}n_{\bar{l}}^T\cdot{}^{0|\bar{l}}n_l} \end{cases}, \tag{3.101}$$

and $${}^{\bar{l}|}e_{l'}^{[x]} = {}^{\bar{l}_*}r_{l'}\Big/\left\|{}^{\bar{l}_*}r_{l'}\right\|. \tag{3.102}$$

According to Eq. (3.100), Eq. (3.102) can be expressed as follows:

$${}^{\bar{l}|}e_{\bar{l}'}^{[z]} = {}^{\bar{l}_*}r_{\bar{l}'}\Big/\left\|{}^{\bar{l}_*}r_{\bar{l}'}\right\|. \tag{3.103}$$

Generally, ${}^{\bar{l}|}e_{\bar{l}'}^{[x]}$ shows the zero-position direction of $\phi_l^{\bar{l}}(t_0)$.

[2.2] Apparently, if $|{}^{0|\bar{l}}n_{\bar{l}}^{T}\cdot{}^{0|\bar{l}}n_l|\neq 1$ and ${}^{\bar{l}}r_l=0_3$, ${}^{\bar{l}}r_{\bar{l}_*}={}^{\bar{l}|l}r_{l'}=0_3$ can be obtained. And $${}^{\bar{l}|}e_{l'}^{[x]} = {}^{\bar{l}|\bar{l}}\tilde{n}_{\bar{l}}\cdot{}^{\bar{l}}n_l = {}^{\bar{l}}\tilde{n}_{\bar{l}}\cdot{}^{\bar{l}}n_l. \tag{3.104}$$

[2.3] If $|{}^{0|\bar{l}}n_{\bar{l}}^{T}\cdot{}^{0|\bar{l}}n_l|=1$ and ${}^{\bar{l}}r_l\neq 0_3$, then ${}^{\bar{l}}r_{\bar{l}_*}=0_3$. And $$\begin{aligned} {}^{\bar{l}_*}r_{l'} &= \left(1 - {}^{\bar{l}|\bar{l}}n_{\bar{l}}\cdot{}^{\bar{l}|\bar{l}}n_{\bar{l}}^T\right)\cdot{}^{\bar{l}}r_l \\ {}^{\bar{l}|}e_{l'}^{[x]} &= {}^{\bar{l}_*}r_{l'}\Big/\left\|{}^{\bar{l}_*}r_{l'}\right\|. \end{aligned} \tag{3.105}$$

According to Eq. (3.105) and ${}^{\bar{l}}r_{\bar{l}_*}+{}^{\bar{l}*}r_{l'}={}^{\bar{l}}r_l+{}^{l}r_{l'}$:

$${}^{\bar{l}|l}r_{l'} = {}^{\bar{l}*}r_{l'} - {}^{\bar{l}}r_l, \tag{3.106}$$

[3] ${}^{\bar{l}|}e_{l'}^{[y]}$ is obtained.

$${}^{\bar{l}|}e_{l'}^{[y]} = {}^{\bar{l}}\tilde{n}_l\cdot{}^{\bar{l}|}e_{l'}^{[x]}. \tag{3.107}$$

[4] Such equation results in ${}^{\bar{l}}Q_{l'}$.

$${}^{\bar{l}}Q_{l'} = [{}^{\bar{l}|}e_{l'}^{[x]}, {}^{\bar{l}|}e_{l'}^{[y]}, {}^{\bar{l}|}e_{l'}^{[z]}]. \tag{3.108}$$

So far, the fixed Axis-Invariant is applied to determine the D-H frame.

D-H Parameters Determination Based on Axis-Invariant

As shown by FIG. 34, ${}^{\bar{l}|}e_{l'}^{[x]}$ represents the unit coordinate vector $e_{l'}^{[x]}$ of Axis # l'x.

$$a_{\bar{l}} = {}^{\bar{l}}r_l^{T}\cdot{}^{\bar{l}|}e_{l'}^{[x]}, \tag{3.109}$$

$$c_{\bar{l}} = {}^{\bar{l}}n_{\bar{l}}^{T}\cdot({}^{\bar{l}}r_{\bar{l}_*} - {}^{\bar{l}}r_{\bar{l}}). \tag{3.110}$$

Assume ${}_b^{\bar{l}}u_l={}^{\bar{l}}n_l$ and ${}_a^{\bar{l}}u_l={}^{\bar{l}}n_{\bar{l}}$. According to the definition of the axial torsion angle:

$$\alpha_{\bar{l}} = \mathrm{acos}({}^{\bar{l}}n_{\bar{l}}^{T}\cdot{}^{\bar{l}}n_l)\in[0,\pi). \tag{3.111}$$

Assume ${}_a^{\bar{l}}u_l={}^{\bar{l}|}e_{\bar{l}'}^{[x]}$ and ${}_b^{\bar{l}}u_l={}^{\bar{l}|}e_{l'}^{[x]}$. According to the definition of the joint rotation angle:

$${}_0\phi_{\bar{l}}^{\dagger} = \mathrm{acos}({}_a^{\bar{l}}u_l^{T}\cdot{}_b^{\bar{l}}u_l)\in[0,\pi), \tag{3.112}$$

wherein: $a_l$ and $c_l$ stand for the Axle-distance and offset from Axle $\bar{l}$ to Axle l respectively; $\alpha_l$ represents the torsion angle from Axle $\bar{l}$ to Axle l; and ${}_0\phi_l^{\dagger}$ means the natural zero-position of Axle $\bar{l}$.

In summary, the fixed Axis-Invariant $[{}^{\bar{l}}n_{\bar{l}}, {}^{\bar{l}}l_{\bar{l}}]$ and $[{}^{\bar{l}}n_l, {}^{\bar{l}}l_l]$ can be applied to easily represent D-H parameters $\alpha_{\bar{l}}$, $a_{\bar{l}}$ and $c_{\bar{l}}$, as well as the natural zero-position ${}_0\phi_{\bar{l}}^{\dagger}$.

The determination principles of the D-H frame and D-H parameters based on fixed Axis-Invariant has the following functions:

[1] The problems of the D-H frame and D-H parameters in engineering realizability is solved; as the determination of the D-H frame and D-H parameters depends on the optical characteristics, the required characteristics are generally located inside and outside the links, so that accurate measurement is impossible technologically. By virtue of the optical measuring equipment such as laser tracker, the fixed Axis-Invariant may be applied to perform indirect measurement.

[2] The accuracy of the D-H frame and D-H parameters is ensured; The D-H frame and D-H parameters has to satisfy the requirement for orthogonality, but it is difficult to meet this requirement technologically. During the MAS design, the D-H frame and D-H parameters determined according to drawings significantly differ from the engineering D-H frame and D-H parameters. It is necessary to take the errors arising from machining and assembly into account. With the accuracy of the measuring equipment is guaranteed, the fixed Axis-Invariant by using engineering surveying can obtain the precise structural parameters with fixed Axis-Invariant, so as to ensure the accuracy of D-H frame and D-H parameters.

Axis-Invariant and D-H Parameter Based 1R/2R/3R Attitude Inverse Kinematics

In the engineering application, the natural frame appears simple and convenient, and is helpful to improve the engineering measurement accuracy and enhance the modeling generality. Meanwhile, the major difficulty in kinematics and dynamics modeling of the MAS results from rotation, and the rotational axis is the key to the description about rotation. Based on the Natural Frame, this section focuses on the study about the attitude inverse solution problem of 1R, 2R and 3R. The main purpose is to set the foundation for the subsequent explanation about the Axis-Invariant based MAS inverse kinematics (IK).

Axis-Invariant Based JR Attitude Inverse Kinematics

The projection is the scalar product of two vectors in a linear space. With the given Link ${}^{\bar{l}}\mathrm{I}_l$, ${}^{\bar{l}}k_l \in \mathrm{R}$; the Joint Variable $\phi_l^{\bar{l}}$ is controlled to ensure the optimal projection $C(\varphi_l^{\bar{l}})$ of the fixed unit vector ${}^l u_S$ and the desired unit vector ${}^{\bar{l}}u_S$; wherein: $\varphi_l^{\bar{l}}$ represents the angle from ${}^l u_S$ to ${}^{\bar{l}}u_S$. This problem is called 1R attitude IK. According to Eqs. (2.83) and (3.7):

$$C(\varphi_l^{\bar{l}}) = {}^{\bar{l}}u_S^T \cdot {}^{\bar{l}|}u_S = \frac{1}{1+\tau_1^2} \cdot {}^{\bar{l}}u_S^T \cdot \left(1 + 2 \cdot \tau_l \cdot {}^{\bar{l}}\tilde{n}_l + \tau_1^2 \cdot \left(1 + 2 \cdot {}^{\bar{l}}\tilde{n}_1^2\right)\right) \cdot {}^l u_S,$$

equivalently, obtain the univariable equation of Axis # l:

$$(a - C(\varphi_l^{\bar{l}})) \cdot \tau_l^2 + 2 \cdot \tau_l \cdot b + c - C(\varphi_l^{\bar{l}}) = 0, \quad (3.113)$$

wherein $$a = {}^{\bar{l}}u_S^T \cdot \left(1 + 2 \cdot {}^{\bar{l}}\tilde{n}_l^2\right) \cdot {}^l u_S) \quad (3.114)$$

$$b - {}^{\bar{l}}u_S^T \cdot {}^{\bar{l}}\tilde{n}_l \cdot {}^l u_S,\ c - {}^{\bar{l}}u_S^T \cdot {}^l u_S.$$

If $a - C(\varphi_l^{\bar{l}}) \neq 0$, solve Eq. (3.113) to obtain:

$$\tau_1 = \frac{-b \pm \sqrt{b^2 - \left(\alpha - C(\varphi_1^{\bar{l}})\right) \cdot \left(c - C(\varphi_l^{\bar{l}})\right)}}{\alpha - C(\varphi_l^{\bar{l}})}. \quad (3.115)$$

If $a - C(\varphi_l^{\bar{l}}) = 0$, Eq. (3.113) is degenerated into a simple equation:

$$2 \cdot \tau_l \cdot b + c - C(\varphi_l^{\bar{l}}) = 0, \quad (3.116)$$

Eq. (3.116) results in:

$$\tau_l = -(c - C(\varphi_l^{\bar{l}}))/(2 \cdot b). \quad (3.117)$$

The square root of Eq. (3.115) is denoted as:

$$f(\varphi_l^{\bar{l}}) = b^2 - (a - C(\varphi_l^{\bar{l}})) \cdot (c - C(\varphi_l^{\bar{l}})). \quad (3.118)$$

$\tau_l$ is a continuous function concerning $C(\varphi_l^{\bar{l}})$. As $\varphi_l$ $\bar{l} \in [-\pi/2, \pi/2]$, $C(\varphi_l^{\bar{l}}) \geq 0$; $f(\varphi_l^{\bar{l}})$ is the monotone decreasing concerning $C(\varphi_l^{\bar{l}})$. When $f(\varphi_l^{\bar{l}}) = 0$, Eqs. (3.114) and (3.118) result in:

$$C^2(\varphi_l^{\bar{l}}) - C(\varphi_l^{\bar{l}}) \cdot (a + c) + a \cdot c - b^2 = 0. \quad (3.119)$$

Eq. (3.119) results in:

$$C(\varphi_l^{\bar{l}}) = \tfrac{1}{2} \cdot (a + c) \pm \tfrac{1}{2} \cdot \sqrt{(a + c)^2 + 4 \cdot (b^2 - a \cdot c)}. \quad (3.120)$$

At this time, the optimal solution satisfying $C(\varphi_l^{\bar{l}})$ is:

$$_{op}\tau_l = \frac{-{}^{\bar{l}}u_S^T \cdot {}^{\bar{l}}\tilde{n}_l \cdot {}^l u_S}{{}^{\bar{l}}u_S^T \cdot \left(1 + 2 \cdot {}^{\bar{l}}\tilde{n}_l^2\right) \cdot {}^l u_S - C(\varphi_l^{\bar{l}})}. \quad (3.121)$$

Axis-Invariant Based Attitude IK of CE3 Solar-Panel

Figure 35:
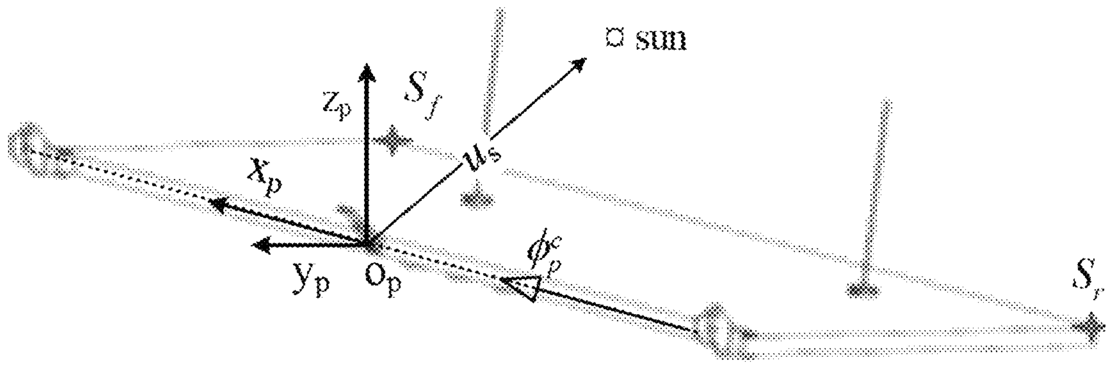
FIG. 35 is a schematic of Lunar rover solar wing coordinate system.

In CE3 Rover Solar panel p as shown by FIG. 35, $O_p$ is located at Axis $\#_p$ of the Revolute Pair ${}^c R_p$; Cartesian Axis $x_p$ crosses the axis of the Revolute Pair ${}^c R_p$ and points to the forward direction of the rover; Cartesian Axis $y_p$ points to the left side of the rover; Cartesian Axis $z_p$ is subject to the right-hand rule and specifically points to the normal direction of the +Y photosensitive component array. The rover chassis is denoted as c.

Wherein: $\phi_p^c$—Solar panel rotation angle 3503, $\phi_p^c \in [-\pi/2, \pi/4]$; $S_r$ 3501 and $S_t$ 3502—anterolateral and posterolateral points of the Solar panel; ${}^c r_p$—the position coordinate vector from the origin $O_c$ of the rover system to the origin $O_p$ of the Solar panel system in the rover system; ${}^n u_{nS}$—the unit coordinate vector from the rover to the sun in navigation frame n.

According to Eq. (2.83):

$${}^c Q_p = (1 + \tau_p{:}^2)^{-1} \cdot (1 + 2 \cdot \tau_p \cdot {}^c\tilde{n}_p + \tau_p{:}^2 \cdot (1 + 2 \cdot {}^c\tilde{n}_p{:}^2)). \quad (3.122)$$

The coordinate of any point s on the Solar panel in its system is denoted as ${}^p r_{pS}$, so that the homogeneous coordinates transformation is possible:

$${}^c r_{\cdot pS} = \begin{bmatrix} {}^c Q_p & {}^c r_p \\ 0_3^T & 1 \end{bmatrix} \cdot {}^p r_{\cdot pS}. \quad (3.123)$$

The rotation matrix of the relative navigation system of such rover is denoted as Q so that ${}^n Q_p = {}^n Q_c \cdot {}_c Q_p$. Accordingly, $${}^c u_S = {}^c Q_n \cdot {}^c u_S, \quad (3.124)$$

$${}^p u_S = {}^p Q_n \cdot {}^n u_S. \quad (3.125)$$

The elevation angle of the Rover-Sun vector relative to the Solar panel is denoted as $\zeta_S^p$, which is determined via Eq. (3.125):

$$\zeta_S^p = \operatorname{asin}({}^p u_S^{[3]}). \quad (3.126)$$

The angle of the Solar panel normal direction towards the sun unit vector is denoted as $\varphi_p^c \in (-\pi/2, \pi/2)$ Rad, so that:

$$\cos(\varphi_p^c) = {}^c u_S^T \cdot {}^{c|p}u_S. \quad (3.127)$$

The Solar panel of CE3 Rover has two control modes:

[1] Solar Panel Regulating Control

The Solar panel regulating control means: The minimum threshold $_{min}\varphi_p^c$ of $\varphi_p^c$ is given. $\varphi_p^c$ should be properly controlled to ensure the sufficient power of the Solar panel and avoid overheating of the Solar panel due to solar radiation, i.e. $\varphi_p^c \geq {}_{min}\varphi_p^C \cdot \tau_p$ can be obtained via Eq. (3.115) or Eq. (3.117). Apparently, $\varphi_p^c = 2 \cdot \text{ar}\tan(\tau_p)$.

[2] Optimal Control of Solar Panel

The optimal control of the Solar panel means: $\phi_p^c$ should be controlled to ensure the maximum power generation capacity of the Solar panel. $\tau_p$ can be obtained via Eq. (3.121). Apparently, $\varphi_p{}^c=2\cdot\mathrm{artan}(\tau_p)$. The special examples below are applied to verify the correctness of Eqs. (3.115), (3.117) and (3.121). If $$^{p}u_S-[0\ 0\ 1]^T, {}^{c}n_p-[1\ 0\ 0]^T. \tag{3.128}$$

Put Eq. (3.128) into Eq. (3.120) to obtain:

$$C\ (\varphi^c{}_p)=\pm\sqrt{}^{c}u_S{}^{[2]}\vdots{}^{2}+{}^{c}u_S{}^{[3]}\vdots{}^{2}. \tag{3.129}$$

Put Eq. (3.128) into Eq. (3.121) to obtain:

$$\tau_p=\frac{-{}^{c}u_S^{[2]}}{{}^{c}u_S^{[3]}+C(\varphi_p^c)}. \tag{3.130}$$

If ${}^{c}u_S{}^{[1]=}0$, ${}^{c}u_S{}^{[2]}=1$, ${}^{c}u_S{}^{[3]}=0$, Eq. (3.129) results in $C(\varphi_p{}^c)=1$, and Eq. (3.130) results in $\phi_p{}^c=-\pi/2$ Rad.

If ${}^{c}u_S{}^{[1]}=0$, ${}^{c}u_S{}^{[2]=}-1$, ${}^{c}u_S{}^{[3]}=0$, Eq. (3.129) results in $C(\varphi_p{}^c)=1$, and Eq. (3.130) results in $\phi_p{}^c=\pi/2$ Rad.

If ${}^{c}u_S{}^{[1]}=0$, ${}^{c}u_S{}^{[2]}=0$, ${}^{c}u_S{}^{[3]}=1$, Eq. results in $C(\varphi_p{}^c)=1$, and Eq. (3.130) results in $\varphi_p{}^c=0$ Rad.

Apparently, the results above are identical to the direct physical significance, thus demonstrating the correctness of the Axis-Invariant based 1R inverse projection solution principle.

It is shown by the aforesaid inverse solution to Solar panel that there are two sets of optimal solutions. The rotational angle of the Solar panel is constrained by the structure and Solar panel temperature. The Solar panel and HGA or the omnidirectional antenna may generate mechanical interference. Consequently, it is necessary to limit the operating range of the Solar panel. The Solar panel will be controlled within the allowed operating range to ensure the maximum power generation capacity.

Figure 36:
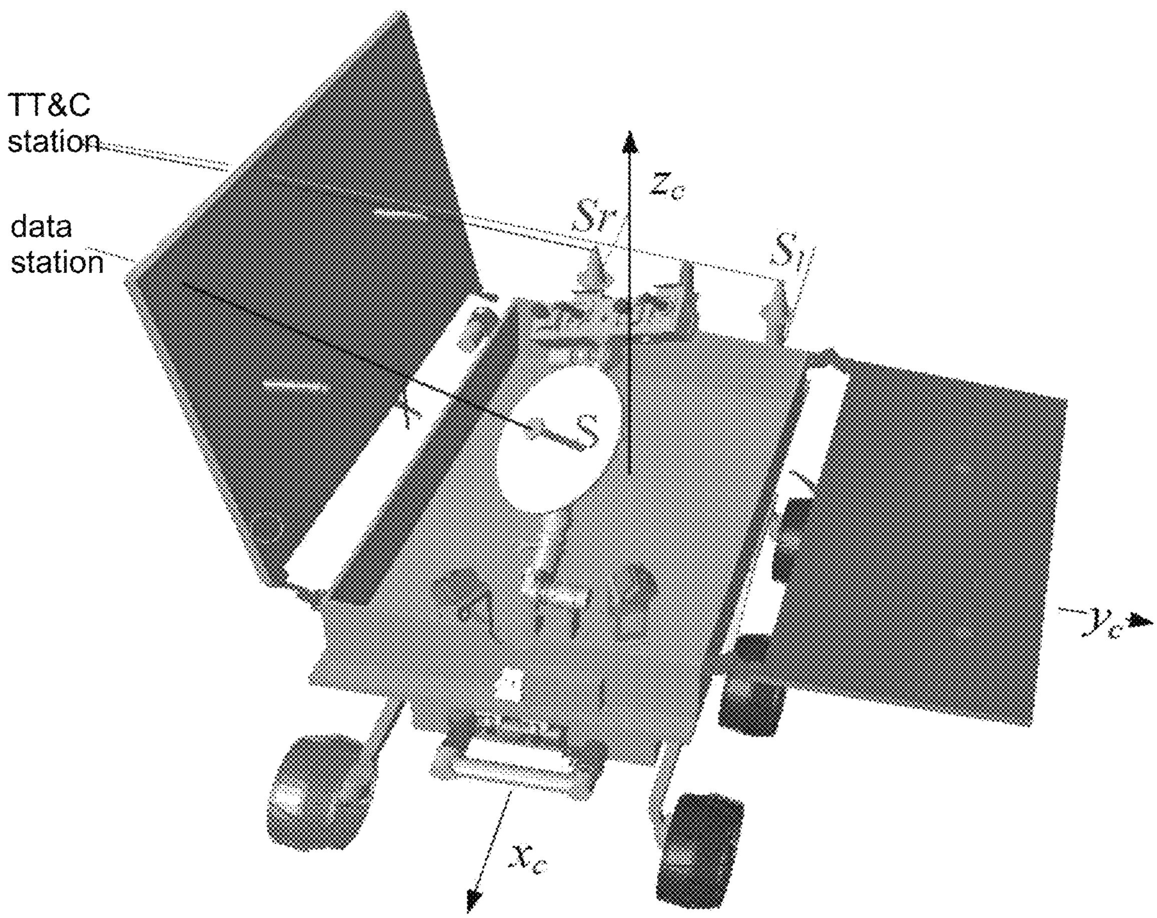
FIG. 36 is an interference diagram between omnidirectional antenna and right-wing, omnidirectional antenna and solar wing.

As shown by FIG. 36, the Solar panel is so close to the HGA and omnidirectional antenna to interfere with the electromagnetic wave transmission, resulting in the interruption of data or omnidirectional communication or the power attenuation, this is called mechanical interference between Solar panel and antenna. The basic constraint of the rover mission planning, mast control and Solar panel control is to avoid such mechanical interference.

The mechanical interference between the HGA and Solar panel of the rover, or between the omnidirectional antenna and Solar panel can be discriminated as follows: The vertexes of the omnidirectional transmitting and receiving antennae are denoted respectively as $S_l$ 3603 and $S_r$, 3604 and the intersection point between the wave beam axle of the HGA and emitting surface is denoted as S 3605. In the rover chassis c, the ray equations between $S_l$ 3603 and the measuring and control station, between $S_r$ 3604 and the measuring and control station, and between S 3605 and data receiving station are established. The ray equation for omnidirectional or data communication and the plane equation of the Solar panel can be applied to solve intersection points. If such points exist and are located within the plane of the Solar panel, they will be regarded as mechanical interference. The ray origin is denoted as A, the ray unit vector as ${}^{c}n_t$, parameter as t and its corresponding point as ${}^{c}r_t$, and the ray parameter equation in the rover system c as:

$${}^{c}r_t={}^{c}r_A+{}^{c}n_t\cdot t, \tag{3.131}$$

equivalently $$\begin{cases}{}^{c}r_t^{[1]}={}^{c}r_A^{[1]}+{}^{c}n_t^{[1]}\cdot t\\ {}^{c}r_t^{[2]}={}^{c}r_A^{[2]}+{}^{c}r_t^{[2]}\cdot t\\ {}^{c}r_t^{[3]}={}^{c}r_A^{[3]}+{}^{c}r_t^{[3]}\cdot t\end{cases}. \tag{3.132}$$

The anteromedial angular point of the Solar panel is denoted as B, the normal direction of the Solar panel as ${}^{c}n_p$, and any intersection point between the ray and the Solar panel plane as ${}^{c}r_t$. The plane equation of the Solar panel is:

$$({}^{c}r_t{}^T-{}^{c}r_B{}^T)\cdot{}^{c}n_p=0, \tag{3.133}$$

equivalently $$\begin{aligned}&\left({}^{c}r_t^{[1]}-{}^{c}r_B^{[1]}\right)\cdot{}^{c}n_p^{[1]}+\left({}^{c}r_t^{[2]}-{}^{c}r_B^{[2]}\right)\cdot{}^{c}n_p^{[2]}\\ &\backslash+\left({}^{c}r_t^{[3]}-{}^{c}r_B^{[3]}\right)\cdot{}^{c}n_p^{[3]}=0\end{aligned}. \tag{3.134}$$

Put Eq. (3.133) into Eq. (3.131) to obtain:

$$t=({}^{c}r_B{}^T-{}^{c}r_A{}^T)\cdot{}^{c}n_p/({}^{c}n_t{}^T\cdot{}^{c}n_p), \tag{3.135}$$

in Eq. (3.135), if ${}^{c}n_t{}^T\cdot{}^{c}n_p=0$, it is showed that the ray is orthogonal to the normal direction of the Solar panel, i.e:

$$t=\frac{\left({}^{c}r_B^{[1]}-{}^{c}r_A^{[1]}\right)\cdot{}^{c}n_p^{[1]}+\left({}^{c}r_B^{[2]}-{}^{c}r_A^{[2]}\right)\cdot{}^{c}n_p^{[2]}+\left({}^{c}r_B^{[3]}-{}^{c}r_A^{[3]}\right)\cdot{}^{c}n_p^{[3]}}{{}^{c}n_t^{[1]}\cdot{}^{c}n_p^{[1]}+{}^{c}n_t^{[2]}\cdot{}^{c}n_p^{[2]}+{}^{c}n_t^{[3]}\cdot{}^{c}n_p^{[3]}}. \tag{3.136}$$

As ${}^{c}n_p{}^T=[0,-\sin(\phi_p{}^c),\cos(\phi_p{}^c)]$, the intersection point ${}^{c}r_t$ between the ray and the Solar panel plane can be obtained by putting Eq. (3.135) into Eq. (3.131).

$${}^{c}r_t={}^{c}r_A+{}^{c}n_t\cdot\backslash\frac{\left({}^{c}r_B^{[1]}-{}^{c}r_A^{[1]}\right)\cdot{}^{c}n_p^{[1]}+\left({}^{c}r_B^{[2]}-{}^{c}r_A^{[2]}\right)\cdot{}^{c}n_p^{[2]}+\left({}^{c}r_B^{[3]}-{}^{c}r_A^{[3]}\right)\cdot{}^{c}n_p^{[3]}}{{}^{c}n_t^{[1]}\cdot{}^{c}n_p^{[1]}+{}^{c}n_t^{[2]}\cdot{}^{c}n_p^{[2]}+{}^{c}n_t^{[3]}\cdot{}^{c}n_p^{[3]}}. \tag{3.137}$$

If ${}^{p|c}r_t{}^{[1]}\in[{}^{p}r_{Sl}{}^{[1]},{}^{p}r_{Sl}{}^{[l]}]$, ${}^{p|c}r_t{}^{[2]}\in[{}^{p}r_{Sl}{}^{[2]},{}^{p}r_{Sl}{}^{[2]}]$, ${}^{p|c}r_t{}^{[3]}\in[{}^{p}r_{Sl}{}^{[3]},{}^{p}r_{Sl}{}^{[3]}]$, it is showed that the detection ray interferes with the Solar panel. Without a doubt, the engineering realization needs repeated ray detection and the interference threshold should be taken into account.

The solar panel behavior control can be visually reflected by the 3D scene display, and can accurately reflect the "Sun-Earth-Moon" and the ground station, the rover posture, and the solar panel motion state. Not only allows the user to accurately grasp the scene state of the rover while on the track, but also helps to improve the reliability of the software. In the simulation test, it can be used to analyze the adaptability of the detection area, the lunar surface, the detection time interval, the solar panel and the left solar panel power generation performance and the lunar rover detection task, and optimize the design of the rover power supply system.

Axis-Invariant and D-H Parameter Based 2R/3R Attitude IK Solution

D-H parameters only contain three structural parameters and one joint variable for any link, which is helpful to simplify the variable elimination process of the attitude equation. On the other hand, the D-H parameters are generally nominal, so that it is difficult to obtain accurate engineering parameters. It is required to accurately measure the fixed Axis-Invariant and perform calculations for the accurate D-H frame and D-H parameters. Therefore, the problems concerning the 2R orientation and 3R attitude based on Axis-Invariant can be converted into those based on D-H parameters.

With the given 2R AC $^{\bar{l}}\mathbf{l}_l$, it is performed from the initial unit vector $^{l'}\mathbf{u}_{lS}$ to the desired unit vector $^{\bar{\bar{l}}'|l'}\mathbf{u}_{lS}$ to solve joint variables $\phi_{\bar{l}}$ and $\phi_l$. This is a problem concerning the inverse orientation solution.

If it is assumed that the indices of D-H parameters obey the sub-indices, and $^{\bar{l}}Q_{l'}\cdot{}^{l'}\mathbf{u}_{lS}={}^{\bar{l}}Q_{\bar{l}'}\cdot{}^{\bar{l}'|l'}\mathbf{u}_{lS}$, D-H parameters can represent and obtain:

$$\begin{bmatrix} C(\phi_l) & -\lambda_l\cdot S(\phi_l) & \mu_l\cdot S(\phi_l) \\ S(\phi_l) & -\lambda_l\cdot C(\phi_l) & -\mu_l\cdot C(\phi_l) \\ 0 & \mu_l & \lambda_l \end{bmatrix}\cdot {}^{l'}u_{lS} = \begin{bmatrix} C(\phi_{\bar{l}}) & S(\phi_{\bar{l}}) & 0 \\ -\lambda_{\bar{l}}\cdot S(\phi_{\bar{l}}) & -\lambda_{\bar{l}}\cdot C(\phi_{\bar{l}}) & \mu_{\bar{l}} \\ -\mu_{\bar{l}}\cdot S(\phi_{\bar{l}}) & -\mu_{\bar{l}}\cdot C(\phi_{\bar{l}}) & \lambda_{\bar{l}} \end{bmatrix}\cdot {}^{\bar{\bar{l}}'|l'}u_{lS}. \tag{3.138}$$

The last row of Eq. (3.138) gives:

$$\begin{aligned} \mu_l\cdot{}^{l'}u_{lS}^{[2]}+\lambda_l\cdot{}^{l'}u_{lS}^{[3]} &= \mu_{\bar{l}}\cdot S(\phi_{\bar{l}})\cdot{}^{\bar{\bar{l}}'|l'}u_{lS}^{[1]} \\ &\quad -\mu_{\bar{l}}\cdot C(\phi_{\bar{l}})\cdot{}^{\bar{\bar{l}}'|l'}u_{lS}^{[2]}+\lambda_{\bar{l}}\cdot{}^{\bar{\bar{l}}'|l'}u_{lS}^{[3]} \end{aligned}. \tag{3.139}$$

Thus $$\begin{aligned} &\tau_{\bar{l}}^2\cdot\left(\lambda_{\bar{l}}\cdot{}^{\bar{\bar{l}}'|l'}u_{lS}^{[3]}+\mu_{\bar{l}}\cdot{}^{\bar{\bar{l}}'|l'}u_{lS}^{[2]}-\mu_l\cdot{}^{l'}u_{lS}^{[2]}-\lambda_l\cdot{}^{l'}u_{lS}^{[3]}\right) \\ &+2\cdot\tau_{\bar{l}}\cdot\mu_{\bar{l}}\cdot{}^{\bar{\bar{l}}'|l'}u_{lS}^{[1]}-\mu_l\cdot{}^{l'}u_{lS}^{[2]}-\lambda_l\cdot{}^{l'}u_{lS}^{[3]} \\ &+\lambda_{\bar{l}}\cdot{}^{\bar{\bar{l}}'|l'}u_{lS}^{[3]}-\mu_{\bar{l}}\cdot{}^{\bar{\bar{l}}'|l'}u_{lS}^{[2]}=0 \end{aligned}.$$

The following univariable equation of Axis # $\bar{l}$ is established:

$$A\cdot\tau_{\bar{l}}^2+B\cdot\tau_{\bar{l}}+C=0, \tag{3.140}$$

wherein $$\begin{aligned} A &= \lambda_{\bar{l}}\cdot{}^{\bar{\bar{l}}'|l'}u_{lS}^{[3]}+\mu_{\bar{l}}\cdot{}^{\bar{\bar{l}}'|l'}u_{lS}^{[2]}-\mu_l\cdot{}^{l'}u_{lS}^{[2]}-\lambda_l\cdot{}^{l'}u_{lS}^{[3]} \\ B &= 2\cdot\mu_{\bar{l}}\cdot{}^{\bar{\bar{l}}'|l'}u_{lS}^{[1]} \\ C &= -\mu_l\cdot{}^{l'}u_{lS}^{[2]}-\lambda_l\cdot{}^{l'}u_{lS}^{[3]}+\lambda_{\bar{l}}\cdot{}^{\bar{\bar{l}}'|l'}u_{lS}^{[3]}+\mu_{\bar{l}}\cdot{}^{\bar{\bar{l}}'|l'}u_{lS}^{[2]} \end{aligned}. \tag{3.141}$$

Thus $$\phi_{\bar{l}} = \begin{cases} 2\cdot a\tan\left(\dfrac{-B\pm\sqrt{B^2-4AC}}{2A}\right), & \text{if } A\neq 0 \\ 2\cdot a\tan(-C/B), & \text{if } A=0,\ B\neq 0 \\ (-\pi,\ \pi], & \text{if } A=0,\ B=0,\ C=0 \end{cases}. \tag{3.142}$$

The first row of Eq. (3.138) gives:

$$\begin{aligned} &C(\phi_l)\cdot{}^{l'}u_{lS}^{[1]}+S(\phi_l)\cdot(\mu_l\cdot{}^{l'}u_{lS}^{[3]}-\lambda_l\cdot{}^{l'}u_{lS}^{[2]}) \\ &= C(\phi_{\bar{l}})\cdot{}^{\bar{\bar{l}}'|l'}u_{lS}^{[1]}+S(\phi_{\bar{l}})\cdot{}^{\bar{\bar{l}}'|l'}u_{lS}^{[2]} \end{aligned}. \tag{3.143}$$

Thus $$\begin{aligned} &\tau_l^2\cdot\left(C(\phi_{\bar{l}})\cdot{}^{\bar{\bar{l}}'|l'}u_{lS}^{[1]}+S(\phi_{\bar{l}})\cdot{}^{\bar{\bar{l}}'|l'}u_{lS}^{[2]}+{}^{l'}u_{lS}^{[1]}\right) \\ &-2\cdot\tau_l\cdot(\mu_l\cdot{}^{l'}u_{lS}^{[3]}-\lambda_l\cdot{}^{l'}u_{lS}^{[2]}) \\ &+C(\phi_{\bar{l}})\cdot{}^{\bar{\bar{l}}'|l'}u_{lS}^{[1]}+S(\phi_{\bar{l}})\cdot{}^{\bar{\bar{l}}'|l'}u_{lS}^{[2]}+{}^{l'}u_{lS}^{[1]}=0 \end{aligned},$$

equivalently, obtain the univariablc equation of Axis # l $$A'\cdot\tau_l^2+B'\cdot\tau_l+C'=0, \tag{3.144}$$

wherein $$\begin{aligned} A' &= C(\phi_{\bar{l}})\cdot{}^{\bar{\bar{l}}'|l'}u_{lS}^{[1]}+S(\phi_{\bar{l}})\cdot{}^{\bar{\bar{l}}'|l'}u_{lS}^{[2]}+{}^{l'}u_{lS}^{[1]} \\ B' &= -2\cdot(\mu_l\cdot{}^{l'}u_{lS}^{[3]}-\lambda_l\cdot{}^{l'}u_{lS}^{[2]}) \\ C' &= C(\phi_{\bar{l}})\cdot{}^{\bar{\bar{l}}'|l'}u_{lS}^{[1]}+S(\phi_{\bar{l}})\cdot{}^{\bar{\bar{l}}'|l'}u_{lS}^{[2]}-{}^{l'}u_{lS}^{[1]} \end{aligned}. \tag{3.145}$$

As Eqs. (3.140) and (3.144) may not satisfy the second row of Eq. (3.138), $\phi_{\bar{l}}$ $\phi_l$ and obtained via Eqs. (3.140) and (3.144) are possible solutions only; thus, possible solutions should be put into the second row of Eq. (3.138); and if such equation is still workable, real solutions can be obtained.

The 3R AC $^{\bar{l}}\mathbf{l}_{\bar{l}}$, desired attitude $^{\bar{l}}\dot{\lambda}_{\bar{l}}$ and Axis-Invariant SEQS $[^{\bar{l}}n_{\bar{l}},{}^{\bar{l}}n_l,{}^{l}n_{\bar{l}}]$ are given; solve the Joint Variable SEQS $[\phi_{\bar{l}},\phi_l,\phi_{\bar{l}}]$. This is a problem concerning the inverse solution of 3R attitude.

SOLUTION: Eqs. (3.140) and (3.144) result in $[\phi_{\bar{l}},\phi_l]$. $^{\bar{l}}\dot{\lambda}_{\bar{l}}={}_{\bar{l}}\hat{\dot{\lambda}}_l\cdot{}^{l}\dot{\lambda}_{\bar{l}}$ gives $^{l}\dot{\lambda}_{\bar{l}}$. Thus, obtain the solutions of Axis # $\vec{\bar{l}}$ $$\phi_{\bar{l}}=2\cdot\text{atan}(\lambda_{\bar{l}}^{l},{}^{l}\dot{\lambda}_{\bar{l}}^{[4]}). \tag{3.146}$$

So far, the poor generality of the inverse solution of attitude based on the Cartesian Axis-Chain (CAC) elaborated in Chapter 2 has been solved.

Direction IK Solution of CE3 High Gain Antenna

Figure 37:
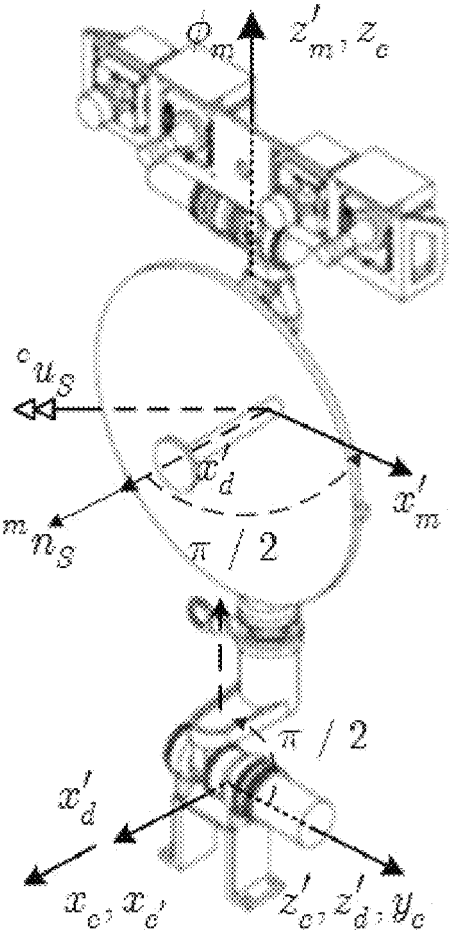
FIG. 37 is a schematic of Lunar rover 2DOF mast.

As shown by FIG. 37 the AC of the HGA in CE3 Rover is denoted as $^{c}\mathbf{l}_m$=(c,d,m], and the Axis-Invariant SEQS as $[^{c}n_d,{}^{d}n_m]$. The unit vector of the Ground Station is denoted as $^{c}\mathbf{u}_S$. Solve its angle SEQS $[\phi_d,\phi_m]$.

As specified in previous section, if the structural parameter represented by the Axis-Invariant is obtained through accurate measurement:

$$^{\bar{l}}n_{\bar{l}}=1^{[y]},{}^{\bar{l}}n_l=1^{[z]},{}^{l}u_{lS}=1^{[x]}. \tag{3.147}$$

Put Eq. (3.147) into Eqs. (3.111) and (3.112) to obtain D-H Parameters of the mast, as shown by Table 3-1.

TABLE 3-1

D-H Parameters of the HGA

| $k\in{}^{c}\mathbf{l}_S$ | $\alpha_k$ (rad) | $\mu_k$ | $\lambda_k$ | $_0\phi_l^{\Delta}$ (rad) | $_0\phi_k^{\dagger}+\theta_k$ (rad) |
|---|---|---|---|---|---|
| k = d | π/2 | 1 | 0 | 0 | $\theta_d$ |
| k = m | 0 | 0 | 1 | 0 | $\pi/2+\theta_m$ |

The parameters in the above table are put into Eqs. (3.141) and (3.145) respectively to obtain:

$$^{l'}u_{lS}=\left[{}^{l}u_{lS}^{[2]},-{}^{l}u_{lS}^{[1]},{}^{l}u_{lS}^{[3]}\right]^T, \tag{3.148}$$

$$^{\bar{\bar{l}}'|l'}u_{lS}=\left[{}^{\bar{\bar{l}}'|l'}u_{lS}^{[1]},-{}^{\bar{\bar{l}}'|l'}u_{lS}^{[3]},{}^{\bar{\bar{l}}'|l'}u_{lS}^{[2]}\right]^T,\quad A={}^{\bar{\bar{l}}'|l'}u_{lS}^{[2]}-{}^{l'}u_{lS}^{[3]} \tag{3.149}$$

-continued $$B = 2 \cdot {}^{\bar{\bar{l}}'|l'}u_{lS}^{[1]},\ C = -{}^{l'}u_{lS}^{[3]} - {}^{\bar{\bar{l}}'|l'}u_{lS}^{[2]}, \tag{3.150}$$

$$A' = C_{\bar{l}}^{\bar{\bar{l}}} \cdot {}^{\bar{\bar{l}}'|l'}u_{lS}^{[1]} + S_{\bar{l}}^{\bar{\bar{l}}} \cdot {}^{\bar{\bar{l}}'|l'}u_{lS}^{[2]} + {}^{l'}u_{lS}^{[1]} \tag{3.151}$$

$$B' = 2 \cdot {}^{l'}u_{lS}^{[2]}$$

$$C' = C_{\bar{l}}^{\bar{\bar{l}}} \cdot {}^{\bar{\bar{l}}'|l'}u_{lS}^{[1]} + S_{\bar{l}}^{\bar{\bar{l}}} \cdot {}^{\bar{\bar{l}}'|l'}u_{lS}^{[2]} + {}^{l'}u_{lS}^{[1]}.$$

Put Eq. (3.150) into Eq. (3.142) to obtain:

$$\phi_{\bar{l}} = \begin{cases} 2 \cdot \mathrm{atan}\left( \dfrac{{}^{\bar{\bar{l}}'|l'}u_{lS}^{[1]} \pm \sqrt{{}^{\bar{\bar{l}}'|l'}u_{lS}^{[1]\|2} + {}^{\bar{\bar{l}}'|l'}u_{lS}^{[2]\|2} - {}^{l'}u_{lS}^{[3]\|2}}}{{}^{\bar{\bar{l}}'|l'}u_{lS}^{[2]} + {}^{l'}u_{lS}^{[3]}} \right), & \text{if } A \neq 0 \\ 2 \cdot \mathrm{atan}\left( \dfrac{{}^{\bar{\bar{l}}'|l'}u_{lS}^{[2]} + {}^{l'}u_{lS}^{[3]}}{2 \cdot {}^{\bar{\bar{l}}'|l'}u_{lS}^{[1]}} \right), & \text{if } A = 0, B \neq 0 \\ (-\pi, \pi], & \text{if } A = 0, B = 0, C = 0 \end{cases}. \tag{3.152}$$

Put Eq. (3.151) into Eq. (3.142) to obtain:

$$\phi_l = \begin{cases} 2 \cdot \mathrm{atan}\left( \dfrac{-{}^{l'}u_{lS}^{[1]:2} \pm \backslash \sqrt{{}^{l'}u_{lS}^{[1]:2} + {}^{l'}u_{lS}^{[2]:2} - \left( \begin{matrix} C_{\bar{l}}^{\bar{\bar{l}}} \cdot {}^{\bar{\bar{l}}'|l'}u_{lS}^{[t]} \\ + S_{\bar{l}}^{\bar{\bar{l}}} \cdot {}^{\bar{\bar{l}}'|l'}u_{lS}^{[2]} \end{matrix} \right)^2}}{C_{\bar{l}}^{\bar{\bar{l}}} \cdot {}^{\bar{\bar{l}}'|l'}u_{lS}^{[1]} + S_{\bar{l}}^{\bar{\bar{l}}} \cdot {}^{\bar{\bar{l}}'|l'}u_{lS}^{[2]} + {}^{l'}u_{lS}^{[1]}} \right), & \text{if } A' \neq 0 \\ 2 \cdot \mathrm{atan}\left( -\dfrac{C_{\bar{l}}^{\bar{\bar{l}}} \cdot {}^{\bar{\bar{l}}'|l'}u_{lS}^{[1]} + S_{\bar{l}}^{\bar{\bar{l}}} \cdot {}^{\bar{\bar{l}}'|l'}u_{lS}^{[2]} + {}^{l'}u_{lS}^{[1]}}{2 \cdot {}^{l'}u_{lS}^{[2]}} \right), & \text{if } \begin{matrix} A' = 0 \\ B' \neq 0 \end{matrix} \\ (-\pi, \pi], \text{ if } A' = 0, B' = 0, C' = 0 \end{cases}. \tag{3.153}$$

As it is necessary to put it into the second row of Eq. (3.138) for validation to obtain real solutions, so there are at most two sets of solutions for $\phi_l$.

In consideration of Eqs. (3.148) and (3.149), the special examples are applied to verify the correctness of Eqs. (3.152) and (3.153):

$$\phi_{\bar{l}} = 0,\ \phi_l = 0;\ \text{if } {}^{\bar{l}|l}u_{lS} = 1^{[x]},\ {}^{l}u_{lS} = 1^{[x]}.$$

$$\phi_{\bar{l}} = 0,\ \phi_l = \pi;\ \text{if } {}^{\bar{l}|l}u_{lS} = -1^{[x]},\ {}^{l}u_{lS} = 1^{[x]}.$$

$$\phi_{\bar{l}} \in (-\pi, \pi],\ \phi_l = \pi/2;\ \text{if } {}^{\bar{l}|l}u_{lS} = 1^{[y]},\ {}^{l}u_{lS} = 1^{[x]}.$$

$$\phi_{\bar{l}} \in (-\pi, \pi],\ \phi_l = -\pi/2;\ \text{if } {}^{\bar{l}|l}u_{lS} = -1^{[y]},\ {}^{l}u_{lS} = 1^{[x]}.$$

$$\phi_{\bar{l}} = \pm\pi/2,\ \phi_l = \pi \text{ or } 0;\ \text{if } {}^{\bar{l}|l}u_{lS} = 1^{[z]},\ {}^{l}u_{lS} = 1^{[x]}.$$

The physical significance of the equation above indirectly shows the correctness of such principle. During the numerical calculation, the numerical truncation error may lead to no solution; in this case, it is necessary to add a micro-increment to ${}^{\bar{l}|l'}\mathrm{u}_{lS}$ and then perform calculation again for ensuring the existence of solutions.

The CE3 digital transmission control module includes the following functions: forward kinematics calculation of masts, digital transmission behavior control, mission planning system internal communication, task support system communication, 3D display control, debug interface, input and output conversion, etc. When controlling the mast, first check the basic constraints such as measurement and control visibility, sun visibility, and whether it is covered by the sun.

Axis-Invariant and D-H Parameter Based Position IK Solution of 3R Robo-Arms

As the D-H frame is ideal coordinate system, it is necessary to make a common perpendicular for the adjacent two axes and ensure that three coordinate axes are pairwise orthogonal. On the one hand, no ideal orthogonality exists technologically: there is almost no common orthogonal line and cross-points on the Robo-Arm surface. Due to lack of highly accurate characteristics of any reference axis and cross-point, that results in the fact that it is impossible to accurately determine the D-H frame and D-H parameters technologically. On the other hand, the conventional 3R Robo-Arm inverse position solution is calculated according to theoretic D-H parameters; alternatively, based on theoretic D-H parameters, the accurate measurements of the laser tracker are applied to optimize D-H parameters. However, the strong nonlinearity of D-H parameters and the end position of the Robo-Arm limits the optimization effect, so that the absolute positioning accuracy of the Robo-Arm is much lower than the relative positioning accuracy. As a result, it is difficult to realize autonomous control in the accurate Robo-Arm application.

In the previous section, the fixed Axis-Invariant accurately measured can be used to determine only one set of D-H frames and D-H parameters. As such invariants contain error arising from machining and assembly, the accuracy of such D-H frames and D-H parameters determined is ensured, thus significantly improving the absolute positioning accuracy of the Robo-Arm. Therefore, more details are provided below to make readers have a profound understanding about such principle and engineering application. The 3R Robo-Arm position inverse solution based on D-H parameters has a process as follows:

[1] The accurate measurement principle of fixed Axis-Invariant is applied to accurately measure the structural parameters of the Robo-Arm;

[2] The determination principles of D-H frames and D-H parameters based on fixed Axis-Invariant are applied to establish the D-H frame and D-H parameters;

[3] Based on the D-H parameters-based conventional 3R Robo-Arm inverse position solution, the inverse solution of the 3R Robo-Arm is calculated.

The Axis SEQS of the 3R Robo-Arm is denoted as A=(0,1:4], the wrist center fixed on the virtual Axis #4 as c, the AC as ${}^{0'}l_{4'C}$=(0',1':4',4'C], and the D-H frame SEQS as F=($F^{[0']}$,$F^{[1']}$, $F^{[2']}$, $F^{[3']}$. The pick point are denoted as C', and the quaternions of the position and orientation for the wrist center respectively as:

$$ {}^{0'}_{d}r^{T}_{4'C} = [x_C, y_C, z_C], {}^{0'}_{d}\lambda^{T}_{6'} = \left[S(\phi^0_6/2)\cdot{}^{0'}n_{6'}, C(\phi^0_6/2)\right], \tag{3.154}$$

then λ

$$ {}^{0'}_{d}r_{4'C} = {}^{0'}_{d}r_{4'C} - {}^{0'}n_{6'}\cdot\left\|{}^{C}r_{C'}\right\|, {}^{3'}_{d}\lambda_{6'} = {}^{0'}\lambda^{-1}_{3'} * {}^{0'}_{d}\lambda_{6'}. \tag{3.155}$$

The forward kinematic equation of such Robo-Arm is expressed as:

$$ {}^{0'}_{d}r_{4'C} = {}^{0'}r_{1'} + {}^{0|1'}r_{2'} + {}^{0|2'}r_{3'} + {}^{0|3'}r_{4'C}. \tag{3.156}$$

Thus, the position equation is expressed as:

$$ {}^{1'}Q_{2'}\cdot\left({}^{2'}r_{3'} + {}^{2'|3'}r_{4'C}\right) = {}^{1'}Q_0\cdot\left({}^{0'}_{d}r_{4'C} + {}^{0'}r_{1'}\right) - {}^{1'}r_{2'}. \tag{3.157}$$

Eq. (3.156) is a 3D polynomial system of 3-variables and 2-Order. If ${}_{d}^{0'}r_{4'C'}$ and ${}_{d}^{0'}Q_{6'}$ are given, Eq. (3.155) results in ${}_{d}^{0'}r_{4'C}$; Eq. (3.157) is applied to obtain the inverse solution $[\phi_l^{\bar{l}}|l\in[1:3]]$, so leading to ${}^{0'}Q_{3'}$; furthermore, Eq. (3.155) results in ${}_{d}^{4'}Q_{6'}$. The inverse solution principle of attitude is applied to obtain $[\phi_l^{\bar{l}|l\in}[4:6]]$. Therefore, the inverse solution of the 6R decoupling Robo-Arm can be classified into the 3R inverse position solution and the 3R inverse solution of attitude. Therefore, the 6R decoupling Robo-Arm is concatenated composed of 3R Robo-Arm and 3R decoupling Robo-Wrist. From the point of view in inverse kinematic, the 6R decoupling Robo-Arm is essentially 3R Robo-Arm.

The RBR is the most classic configuration, the last three axes intersect at one point. BBR and 3R are commonly known as offset type, the first two axes of the last three axis and the last two axes intersect at one point. The three axes and the two axes of the structure intersect at one point are very strong constraints, which requires precision machining and assembly.

For RBR, given the position vector ${}^{0'}r_{6'P}$ of the pick point (P) or tool center point (TCP) and the desired attitude ${}^{0'}Q_{6'}$ of Axis #6, then the desired position of the Wrist Center 4'C is expressed as $$ {}^{0'}_{d}r_{4'C} = {}^{0'}r_{6'P} - c_6\cdot{}^{0'}Q_{6'}\cdot{}^{6'}_{d}n_{6'P}. $$

For BBR and 3R, given the desired position of the P point position vector ${}^{0'}r_{6'P}$, The desired Axis-Vector ${}^{0'|5'}n_{6'}$ of Axis #6 and unit direction ${}^{6'}u_{6'P}$ of pick point P, then the desired position of Wrist Center 4'C is expressed as $$ {}^{0'}_{d}r_{4'C} = {}^{0'}r_{7'P} - c_6\cdot{}^{0'|5'}n_{6'} - c_7\cdot{}^{0'|6'}u_{6'P}. $$

D-H Parameters and Basic Relations for Robo-Wrists

If the last Motion-Axis is #4, the wrist center of the Axis-Vector ${}^{3'}n_{4'}$, of the wrist joint is denoted as c, l∈[1:3]. It is assumed that the indices of D-H parameters obey the sub-indices, and it is shown by the D-H rotation that:

$$ a_C = 0, \tag{3.158}$$

$$ c_C = {}^{3'}r^{[3]}_{4'C} = {}^{3'}n^{T}_{4'}\left({}^{3'}r_{4'C} - {}^{3'}r_{4'}\right), \tag{3.159}$$

$$ {}^{\bar{l}'}Q_{l'} = \begin{bmatrix} C(\phi_l) & -\lambda_l\cdot S(\phi) & \mu_l\cdot S(\phi_l) \\ S(\phi_l) & \lambda_l\cdot C(\phi) & -\mu_l\cdot C(\phi_l) \\ 0 & \mu_l & \cdot\lambda_l \end{bmatrix}, \tag{3.160}$$

$$ {}^{\bar{l}:l'}r_{\bar{l}'} = \begin{bmatrix} a_l\cdot C(\phi_l) \\ c_l\cdot S(\phi_l) \\ c_l \end{bmatrix}, {}^{\bar{l}}r_{l'} = \begin{bmatrix} a_l \\ c_l\cdot\mu_l \\ c_l\cdot\lambda_l \end{bmatrix}. \tag{3.161}$$

Thus, Eq. (3.160) results in:

$$ {}^{3'|4'}r_{4'C} = \begin{bmatrix} C(\phi_3) & -\lambda_3 S(\phi_3) & \mu_3 S(\phi_3) \\ S(\phi_3) & \lambda_3 C(\phi_3) & -\mu_3 C(\phi_3) \\ 0 & \mu_3 & \lambda_3 \end{bmatrix}\cdot\begin{bmatrix} 0 \\ 0 \\ c_C \end{bmatrix}. \tag{3.162}$$

According to Eqs. (3.161) and (3.162):

$$ {}^{3'}r_{4'C} = \begin{bmatrix} a_3 C(\phi_3) \\ a_3 S(\phi_3) \\ c_3 \end{bmatrix} + {}^{3'|4'}r_{4'C} = \begin{bmatrix} a_3 C(\phi_3) + c_C\mu_3 S(\phi_3) \\ a_3 S(\phi_3) - c_C\mu_3 C(\phi_3) \\ c_3 + c_C\lambda_3 \end{bmatrix}. \tag{3.163}$$

$$ {}^{1'|0'}_{d}r_{4'C} = \begin{bmatrix} x_C C(\phi_1) + y_C S(\phi_1) \\ y_C\lambda_1 C(\phi_1) - x_C\lambda_1 S(\phi_1) + z_C\mu_1 \\ x_C\mu_1 S(\phi_1) - y_C\mu_1 C(\phi_1) + z_C\lambda_1 \end{bmatrix}. \tag{3.164}$$

$$ {}^{1'}r_{2'} = \begin{bmatrix} a_1 \\ c_1\mu_1 \\ c_1\lambda_1 \end{bmatrix}, {}^{2'}r_{3'} = \begin{bmatrix} a_2 \\ c_2\cdot\mu_2 \\ c_2\cdot\lambda_2 \end{bmatrix} $$

D-H Parameter Based Position IK Solution of 3R Robo-Arms

As Axis #4 is virtual; 3'C≡4'C. To simplify the calculation of the 3R inverse position solution, we always let the origin of Frame #0 coincide with that of Frame #1, and $$ {}^{0'}r_{1'} = 0_3, {}^{0'}Q_{1'} = 1, \tag{3.165}$$

According to Eq. (3.165), Eq. (3.157) is expressed as:

$$ {}^{1'}Q_{2'}\cdot\left({}^{2'}r_{3'} + {}^{2'}Q_{3'}\cdot{}^{3'}r_{4'C}\right) = {}^{1'}Q_0\cdot{}^{0'}_{d}r_{4'C} - {}^{1'}r_{2'}. \tag{3.166}$$

Eq. (3.166) is called the position equation of the 3R Robo-Arm based on the D-H frame.

According to Eqs. (3.160), (3.163) and (3.164), Eq. (3.166) is expressed as the following component form:

$$\begin{bmatrix} C(\phi_2) & -\lambda_2 S(\phi_2) & \mu_2 S(\phi_2) \\ S(\phi_2) & \lambda_2 C(\phi_2) & -\mu_2 C(\phi_2) \\ 0 & \mu_2 & \lambda_2 \end{bmatrix} \cdot \begin{bmatrix} a_2 + a_3 C(\phi_3) + c_C \mu_3 S(\phi_3) \\ c_2\mu_2 + a_3 S(\phi_3) - c_C \mu_3 C(\phi_3) \\ c_2\lambda_2 + c_3 + c_C\lambda_3 \end{bmatrix} = \begin{bmatrix} x_C C(\phi_1) + y_C S(\phi_1) - a_1 \\ y_C\lambda_1 C(\phi_1) - x_C\lambda_1 S(\phi_1) + z_C\mu_1 - c_1\mu_1 \\ x_C\mu_1 S(\phi_1) - y_C\mu_1 C(\phi_1) + z_C\lambda_1 - c_1\lambda_1 \end{bmatrix}. \tag{3.167}$$

Eq. (3.166) or Eq. (3.167) has following three features:

Feature 1: The left side of Eq. (3.167) contains $\phi_2$ and $\phi_3$, which are multilinear forms of $[C(\phi_1),S(\phi_1)]^T$ and $[C(\phi_3),S(\phi_3)]^T$; as the Euclidean 2-norm of the DCM matrix is constantly 1, i.e. irrelevant to $\phi_2$, the left Euclidean 2-norm can be expressed as $\phi_3$. As the right equation does not contain $\phi_2$ and $\phi_3$, its Euclidean 2-norm can be expressed as $\phi_1$. Accordingly, the Euclidean norm equation is expressed as follows:

$$AC(\phi_1)+BS(\phi_1)+CC(\phi_3)+DS(\phi_3)+E=0, \tag{3.168}$$

wherein A, B, C, D, E depend on structural parameters of the AC. In Eq. (3.166), the norm of the right equation is expressed as:

$$\begin{aligned}
&\|{}^{2'}Q_{1'}({}^{1'}r_{3'C} - {}^{1'}r_{2'})\|^2 = [x_C C(\phi_1) + y_C S(\phi_1) - a_1]^2 \\
&\backslash + [-x_C\lambda_1 S(\phi_1) + y_c\lambda_1 C(\phi_1) + z_C\mu_1 - c_1\mu_1]^2 \\
&\backslash + [x_C\mu_1 S(\phi_1) - y_C\mu_1 C(\phi_1) + z_C\lambda_1 - c_1\lambda_1]^2 \\
&= x_C^2 C^2(\phi_1) + y_C^2 S^2(\phi_1) + a_1^2 + 2x_C y_C C(\phi_1)S(\phi_1) - 2a_1 x_c C(\phi_1) \\
&\backslash -2a_1 y_C S(\phi_1) + x_C^2\lambda_1^2 S^2(\phi_1) + y_C^2\lambda_1^2 C^2(\phi_1) + z_C^2\mu_1^2 + c_1^2\mu_1^2 \\
&\backslash -2x_C y_C\lambda_1^2 S(\phi_1)C(\phi_1) - 2x_C z_C\mu_1\lambda_1 S(\phi_1) + 2x_C c_1\mu_1\lambda_1 \cdot S(\phi_1) \\
&\backslash +2y_C z_C\mu_1\lambda_1 C(\phi_1) - 2y_C c_1\mu_1\lambda_1 C(\phi_1) - 2z_C c_1\mu_1^2 + x_C^2\mu_1^2 S^2(\phi_1) + \\
&\backslash\, y_C^2\mu_1^2 C^2(\phi_1) + z_C^2\lambda_1 + c_1^2\lambda_1^2 - 2x_C y_c\mu_1^2 S(\phi_1)C(\phi_1) + 2x_C z_C\lambda_1\mu_1 S(\phi_1) \\
&\backslash -2x_C c_1\lambda_1\mu_1 S(\phi_1) - 2y_C z_C\lambda_1\mu_1 C(\phi_1) + 2y_C c_1\lambda_1\mu_1 C(\phi_1) - 2z_C c_1\lambda_1^2 \\
&= x_C^2 + y_C^2 + a_1^2 - 2a_1 x_c C((\phi_1) - 2a_1 y_C S(\phi_1) + z_C^2 + c_1^2 - 2z_C c_1
\end{aligned},$$

equivalently $$\|{}^{2'}Q_{1'} \cdot ({}^{1'}r_{3'C} - {}^{1'}r_{2'})\|^2 = \begin{matrix} x_C^2 + y_C^2 + a_1^2 - 2a_1 x_C C(\phi_1) \\ \backslash -2a_1 y_C + S(\phi_1) + z_C^2 + c_1^2 - 2z_C c_1 \end{matrix}, \tag{3.169}$$

wherein \ is for line continuation. The norm on the left side of Eq. (3.167) is:

$$\begin{aligned}
&\|{}^{2'}Q_3({}^{3'}|{}^{2'}r_{3'} - {}^{3'}r_{3'C})\|^2 = [a_2 + a_3 C(\phi_3) + c_C\mu_3 S(\phi_3)]^2 \\
&\backslash + [c_2\mu_2 + a_3 S(\phi_3) + c_C\mu_3 C(\phi_3)]^2 + [c_2\lambda_2 + c_3 + c_C\lambda_3]^2 \\
&= a_2^2 + a_3^2 C^2(\phi_3) + c_C^2\mu_3^2 S^2(\phi_3) + 2a_2 a_3 C(\phi_{13}) + 2a_2 c_C\mu_3 S(\phi_3) \\
&\backslash +2a_3 c_C\mu_3 C^2(\phi_3)S(\phi_3) + c_2^2\mu_2^2 + a_3^2 S^2(\phi_3) + c_C^2\mu_3^2 C^2(\phi_3) \\
&\backslash +2c_2 a_3\mu_2 S(\phi_3) - 2c_2 c_C\mu_2\mu_3 C(\phi_3) + 2a_3 c_C\mu_3 C(\phi_3)S(\phi_3) \\
&\backslash + c_2^2\lambda_2^2 + c_3^2 + c_C^2\lambda_3^2 + 2c_2 c_3\lambda_2 + 2c_2 c_C\lambda_2\lambda_3 + 2c_3 c_C\lambda_3 \\
&= (a_3^2 + c_C^2\mu_3^2)C^2(\phi_3) + (a_3^2 + c_C^2\mu_3^2)S^2(\phi_3) \\
&\backslash + (2a_2 a_3 - 2c_2 c_C\mu_2\mu_3)C(\phi_3) + (2a_2 c_C\mu_3 S(\phi_3) + 2c_2 a_3\mu_2)S(\phi_3) \\
&\backslash + a_2^2 + c_2^2\mu_2^2 + c_2^2\lambda_2^2 + c_3^2 + c_C^2\lambda_3^2 + 2c_2 c_3\lambda_2 + 2c_2 c_C\lambda_2\lambda_3 + 2c_3 c_C\lambda_3 \\
&= (2a_2 a_3 - 2c_2 c_C\mu_2\mu_3)C(\phi_3) + (2a_2 c_C\mu_3 + 2c_2 a_3\mu_2)S(\phi_3) \\
&+ a_2^2 + c_2^2 + c_3^2 + a_3^2 + c_C^2 + 2c_2 c_3\lambda_2 + 2c_2 c_C\lambda_2\lambda_3 + 2c_3 c_C\lambda_3
\end{aligned},$$

equivalently $$\begin{aligned}
&\|{}^{2'}Q_3 \cdot ({}^{3'}|{}^{2'}r_{3'} + {}^{3'}r_{3'C})\|^2 = (2a_2 a_3 - 2c_2 c_C\mu_2\mu_3)C(\phi_3) \\
&\backslash + (2a_2 c_C\mu_3 + 2c_2 a_3\mu_2)S(\phi_3) + a_2^2 + c_2^2 + c_3^2 + a_3^2 + c_C^2 \\
&\backslash + 2c_2 c_3\lambda_2 + 2c_2 c_C\lambda_2\lambda_3 + 2c_3 c_C\lambda_3
\end{aligned}. \tag{3.170}$$

According to Eqs. (3.169) and (3.170):

$$\begin{aligned}
&(2\alpha_2 a_3 - 2c_2 c_C\mu_2\mu_3)C(\phi_3) + (2a_2 c_C\mu_3 + 2c_2 a_3\mu_2)S(\phi_3) \\
&+ a_2^2 + c_2^2 + c_3^2 + a_3^2 + c_C^2 + 2c_2 c_3\lambda_2 + 2c_2 c_C\lambda_2\lambda_3 + 2c_3 c_C\lambda_3 \\
&= x_C^2 + y_C^2 + a_1^2 - 2a_1 x_C C(\phi_1) - 2a_1 y_C S(\phi_1) + z_C^2 + c_1^2 - 2z_C c_1
\end{aligned},$$

equivalently $$\begin{aligned}
&2a_1 x_C C(\phi_1) + 2a_1 y_C S(\phi_1) + (2a_2 a_3 - 2c_2 c_C\mu_2\mu_3)C(\phi_3) + \\
&\backslash (2a_2 c_C\mu_3 + 2c_2 a_3\mu)S(\phi_3) + a_2^2 + c_2^2 + c_3^2 \\
&\backslash + a_3^2 + c_C^2 + 2c_2 c_3\lambda_2 + 2c_2 c_C\lambda_2\lambda_3 + 2c_3 c_C\lambda_3 \\
&\backslash - x_C^2 - y_C^2 - z_C^2 - c_1^2 + 2z_C c_1 = 0
\end{aligned}. \tag{3.171}$$

The comparison of Eqs. (3.171) with (3.168) result in the derived structural parameters as follows $$\begin{aligned}
&A = 2a_1 x_C,\ B = 2a_1 y_C \\
&C = 2a_2 a_3 - 2c_2 c_C\mu_2\mu_3,\ D = 2a_3 c_2\mu_2 + 2a_2 c_C\mu_3 \\
&E = a_2^2 + a_3^2 + c_2^2 + c_3^2 + c_C^2 - a_1^2 - x_C^2 - y_C^2 \\
&\backslash -(z_C - c_1)^2 + 2(c_2 c_3\lambda_2 + c_2 c_C\lambda_2\lambda_3 + c_3 c_C\lambda_3)
\end{aligned}. \tag{3.172}$$

Feature 2: The third row of Eq. (3.167) does not contain $\phi_2$, so that $$\begin{aligned}
&y_C\mu_1 C(\phi_1) - x_C\mu_1 S(\phi_1) - c_C\mu_2\mu_3 C(\phi_3) + a_3\mu_2 S(\phi_3) \\
&+ c_2\mu_2^2 + c_2\lambda_2^2 + c_3\lambda_2 + c_c\lambda_2\lambda_3 - z_c\lambda_1 + c_1\lambda_1 = 0
\end{aligned}. \tag{3.173}$$

It is expressed as follows:

$$FC(\phi_1)+GS(\phi_1)+HC(\phi_3)+IS(\phi_3)+J=0, \tag{3.174}$$

the derived structural parameters in Eq. (3.174) include:

$$\begin{aligned}
&F = y_C\mu_1,\ G = -x_C\mu_1,\ H = -c_C\mu_2\mu_3,\ I = a_3\mu_2 \\
&J = c_2 + c_3\lambda_2 + c_C\lambda_2\lambda_3 - (z_C - c_1)\lambda_1.
\end{aligned} \tag{3.175}$$

Feature 3: The derived structural parameters have following basic relations:

$$\begin{aligned}
&AF + BG = -2a_1 x_C y_C\mu_1 + 2a_1 x_C y_C\mu_1 = 0 \\
&A^2 + B^2 = 4a_1^2(x_C^2 + y_C^2),\ G^2 + F^2 = \mu_1^2(x_C^2 + y_C^2) \\
&AG - FB = -2a_1\mu_1 x_C^2 - 2a_1\mu_1 y_C^2 = -2a_1\mu_1(x_C^2 + y_C^2).
\end{aligned} \tag{3.176}$$

According to Simultaneous Eqs. (3.168) and (3.174):

$$\begin{cases} \Lambda C(\phi_1) + BS(\phi_1) + CC(\phi_3) + DS(\phi_3) + E = 0 \\ FC(\phi_1) + GS(\phi_1) + HC(\phi_3) + IS(\phi_3) + J = 0 \end{cases}, \tag{3.177}$$

equivalently $$\begin{bmatrix} A & B \\ F & G \end{bmatrix} \cdot \begin{bmatrix} C(\phi_1) \\ S(\phi_1) \end{bmatrix} = -\begin{bmatrix} CC(\phi_3) + DS(\phi_3) + E \\ HC(\phi_3) + IS(\phi_3) + J \end{bmatrix}. \tag{3.178}$$

Step 1: Explicit Solution of Axis #3

Eq. (3.178) results in the solution of Axis #3. Specifically, Eq. (3.176) shows:

$$\Delta_{11}=AG-FB=-2a_1\mu_1(x_C^2+y_C^2). \tag{3.179}$$

If $\Delta_{11}\neq 0$, from Eq. (3.176), we get $$\begin{bmatrix} C(\phi_1) \\ S(\phi_1) \end{bmatrix} = -\begin{bmatrix} A & B \\ F & G \end{bmatrix}^{-1} \cdot \begin{bmatrix} CC(\phi_3) + DS(\phi_3) + E \\ HC(\phi_3) + IS(\phi_3) + J \end{bmatrix} = -\frac{1}{\Delta_{11}} \cdot \begin{bmatrix} G & -B \\ -F & A \end{bmatrix} \backslash \cdot \begin{bmatrix} CC(\phi_3) + DS(\phi_3) + E \\ HC(\phi_3) + IS(\phi_3) + J \end{bmatrix} = \frac{1}{\Delta_{11}} \begin{bmatrix} -G(CC(\phi_3) + DS(\phi_3) + E) \backslash + \\ B(HC(\phi_3) + IS(\phi_3) + J) \\ F(CC(\phi_3) + DS(\phi_3) + E) \backslash - \\ A(HC(\phi_3) + IS(\phi_3) + J) \end{bmatrix},$$

equivalently $$\begin{bmatrix} C(\phi_1) \\ S(\phi_1) \end{bmatrix} = \frac{1}{\Delta_{11}} \cdot \begin{bmatrix} -G(CC(\phi_3) + DS(\phi_3) + E) \backslash + \\ B(HC(\phi_3) + IS(\phi_3) + J) \\ F(CC(\phi_3) + DS(\phi_3) + E) \backslash - \\ A(HC(\phi_3) + IS(\phi_3) + J) \end{bmatrix}. \tag{3.180}$$

The simplified Eq. (3.180) of $C^2(\phi_1)+S^2(\phi_1)=1$ is applied to obtain the equation of Axis #3:

$$\begin{bmatrix} G(CC(\phi_3) + DS(\phi_3) + E) - \\ \backslash B(HC(\phi_3) + IS(\phi_3) + J) \end{bmatrix}^2 + \begin{bmatrix} F(CC(\phi_3) + DS(\phi_3) + E) - \\ \backslash A(HC(\phi_3) + IS(\phi_3) + J) \end{bmatrix}^2 = (AG - FB)^2,$$

equivalently $$\begin{aligned} &C^2(\phi_3) \cdot \begin{bmatrix} (BH - GC)^2 + \\ \backslash (FC - AH)^2 \end{bmatrix} + S^2(\phi_3) \cdot \begin{bmatrix} (BI - GD)^2 + \\ \backslash (FD - AI)^2 \end{bmatrix} + 2 \cdot C(\phi_3) \\ &\backslash \cdot S(\phi_3) \cdot [(BH - GC)(BI - GD) + (FC - AH)(FD - AI)] \\ &+2 \cdot C(\phi_3) \cdot [(BH - GC)(BJ - GE) + (FC - AH)(FE - AJ)] \\ &\backslash +2 \cdot S(\phi_3) \cdot [(BI - GD)(BJ - GE) + (FD - AI)(FE - AJ)] \\ &+\left[(BJ - GE)^2 + (FE - AJ)^2 - (AG - FB)^2\right] = 0 \end{aligned} \tag{3.181}$$

Eq. (3.181) is expressed as:

$$KC^2(\phi_3)+LS^2(\phi_3)+MC(\phi_3)\cdot S(\phi_3),$$

$$\backslash +NC(\phi_3)+PS(\phi_3)+Q=0 \tag{3.182}$$

in this equation, derived parameters are expressed as follows:

$$K=(BH-GC)^2+(FC-AH)^2$$

$$L=(BI-GD)^2+(FD-AI)^2$$

$$M=2[(BH-GC)(BI-GD)+(FC-AH)(FD-AI)]$$

$$N=2[(BH-GC)(BJ-GE)+(FC-AH)(FE-AJ)]$$

$$P=2[(BI-GD)(BJ-GE)+(F\cdot D-AI)(FE-AJ)]$$

$$Q=(BJ-GE)+(FE-AJ)^2-(AG-PB)^2 \tag{3.183}$$

The simplified Eq. (3.183) by using Eq. (3.176) results in:

$$\begin{aligned} K &= (BH - GC)^2 + (FC - AH)^2 = \\ &(2a_1 y_C H + x_C \mu_1 C)^2 \backslash + (y_C \mu_1 C - 2a_1 x_C H)^2 = \\ &4a_1^2(x_C^2 + y_C^2)H^2 + \mu_1^2(x_C^2 + y_C^2)C^2 = (x_C^2 + y_C^2)(4a_1^2 H^2 + \mu_1^2 C^2), \\ L &= (BI - GD)^2 + (FD - AI)^2 = \\ &(2a_1 y_C I + x_C \mu_1 D)^2 \backslash + (y_C \mu_1 D - 2a_1 x_C I)^2 = \\ &4a_1^2(y_C^2 + x_C^2)I^2 + \mu_1^2(y_C^2 + x_C^2)D^2 = (y_C^2 + x_C^2)(4 \cdot a_1^2 I^2 + \mu_1^2 D^2), \\ M &= 2[(BH - GC)(BI - GD) + (FC - AH)(FD - AI)] = \\ &2\left[(B^2 + A^2)HI + CD(G^2 + F^2) - (CI + DH)(AF + BG)\right] = \\ &2\left[4a_1^2(x_C^2 + y_C^2)HI + CD(x_C^2 + y_C^2)\mu_1^2\right] = 2(x_C^2 + y_C^2)(4a_1^2 HI + \mu_1^2 CD), \\ N &= 2 \cdot [(BH - GC)(BJ - GE) + (FC - AH)(FE - AJ)] = \\ &2 \cdot \backslash\left[(B^2 + A^2)HJ + CE(G^2 + F^2) - BEGH - BCGJ - ACFJ - AEFH\right] = \\ &2 \cdot \left[4a_1^2(y_C^2 + x_C^2)HJ + CE\mu_1^2(y_C^2 + x_C^2) - (AF + BG)(EH - CJ)\right] = \\ &2 \cdot (y_C^2 + x_C^2)(4a_1^2 HJ + \mu_1^2 CE), \\ P &= 2[(BI - GD)(BJ - GE) + (FD - AI)(FE - AJ)] = \\ &2\begin{bmatrix} (B^2 + A^2)IJ + (G^2 + F^2)DE \backslash - \\ BEGI - BDJG - AEIF - ADFJ \end{bmatrix} = \\ &2\left[4a_1^2(y_C^2 + x_C^2)IJ + (y_C^2 + x_C^2)\mu_1^2 DE - (DG + EI)(AF + BG)\right] = \\ &2 \cdot (y_C^2 + x_C^2)(4a_1^2 IJ + \mu_1^2 DE), \\ Q &= (BJ - GE)^2 + (FE - AJ)^2 - (AG - FB)^2 = \\ &(A^2 + B^2)J^2 + (G^2 + F^2)E^2 - 2 \cdot (AF + BG)EJ - (AG - FB)^2 = \\ &4a_1^2(x_C^2 + y_C^2)J^2 + (x_C^2 + y_C^2)\mu_1^2 E^2 - (AG - FB)^2 = \\ &(x_C^2 + y_C^2)(4a_1^2 J^2 + \mu_1^2 E^2 - 4a_1^2\mu_1^2(x_C^2 + y_C^2)). \end{aligned} \tag{1}$$

Eq. (3.183) is equivalent to:

$$K=4a_1^2H^2+\mu_1^2C^2, L=4a_1^2I^2+\mu_1^2D^2$$

$$M=2(4a_1^2HI+\mu_1^2CD), N=2(4a_1^2HJ+\mu_1^2CE)$$

$$P=2(4a_1^2IJ+\mu_1^2DE), Q=4a_1^2J^2+\mu_1^2E^2-4a_1^2\mu_1^2(x_C^2+y_C^2). \tag{3.184}$$

Equation (3.182) is resolved below. Firstly, equation (3.182) is expressed as:

$$K\left(\frac{1-\tau_3^{:2}}{1+\tau_3^{:2}}\right)^2 + L\left(\frac{2\cdot\tau_3}{1+\tau_3^{:2}}\right)^2 + M\frac{1-\tau_3^{:2}}{1+\tau_3^2}\cdot\frac{2\cdot\tau_3}{1+\tau_3^2} \backslash + N\frac{1-\tau_3^{:2}}{1+\tau_3^{:2}} + P\frac{2\cdot\tau_3}{1+\tau_3^{:2}} + Q = 0, \tag{3.185}$$

equivalently, obtain the univariate equation of Axis #3:

$$(K+N+Q)\cdot\tau_3{:}^{4}+2(P-M)\cdot\tau_3{:}^{3}+2(2L+Q-K)\cdot\tau_3{:}^{2}\backslash+2(M+P)\cdot\tau_3+(K+N+Q)=0. \tag{3.186}$$

Eq. (3.186) is expressed as:

$$R\cdot\tau_3{:}^{4}+S\cdot\tau_3{:}^{3}+T\cdot\Sigma_3{:}^{2}+U\cdot\tau_3+V=0, \tag{3.187}$$

wherein, derived parameters are expressed as follows:

$$R = K - N + Q = 4a_1^2 H^2 + \mu_1^2 C^2 - 2(4a_1^2 HJ + \mu_1^2 CE) \backslash + 4a_1^2 J^2 + \mu_1^2 E^2 - 4a_1^2\mu_1^2(x_C^2 + y_C^2) =$$

-continued $$4a_1^2(J-H)^2+\mu_1^2(E-C)^2-4a_1^2\mu_1^2(x_C^2+y_C^2),$$

$$S=2\cdot(P-M)=$$

$$4(4a_1^2IJ+\mu_1^2DE-4a_1^2HI-\mu_1^2CD)=4(4a_1^2I(J-H)+\mu_1^2D(E-C)),$$

$$T=2(2L+Q-K)=2\begin{pmatrix}8a_1^2I^2+2\mu_1^2D^2+4a_1^2J^2+\mu_1^2E^2\backslash-\\4a_1^2\mu_1^2(x_C^2+y_C^2)-4a_1^2H^2-\mu_1^2C^2\end{pmatrix}=$$

$$2(4a_1^2(J^2-H^2+2I^2)+\mu_1^2(E^2-C^2+2D^2)-4a_1^2\mu_1^2(x_C^2+y_C^2)),$$

$$U=2(M+P)=4(4a_1^2I(H+J)+\mu_1^2D(C+E)),$$

$$V=K+N+Q=$$

$$4a_1^2H^2+\mu_1^2C^2+2(4a_1^2HJ+\mu_1^2CE)\backslash+4a_1^2J^2+\mu_1^2E^2-4a_1^2(x_C^2+y_C^2)=$$

$$4a_1^J(H+J)^2+\mu_1^2(C+E)^2-4a_1^2\mu_1^2(x_C^2+y_C^2),$$

equivalently $$R=4a_1^2(J-H)^2+\mu_1^2(E-C)^2-4a_1^2\mu_1^2(x_C^2+y_C^2) \tag{3.188}$$

$$S=4(4a_1^2I(J-H)+\mu_1^2D(E-C))$$

$$T=2\begin{pmatrix}4a_1^2(J^2-H^2+2I^2)+\mu_1^2(E^2-C^2+2D^2)\backslash-\\4a_1^2\mu_1^2(x_C^2+y_C^2)\end{pmatrix}$$

$$U=4(4a_1^2I(H+J)+\mu_1^2D(C+E))$$

$$V=4a_1^2(H+J)^2+\mu_1^2(C+E)^2-4a_1^2\mu_1^2(x_C^2+y_C^2).$$

Eq. (3.187) is a 4-Order equation with $\tau_3$ as member. The maximum number of its solutions is four.

If $\Delta_{11}=0$, i.e. $2a_1\mu_1(x_C^2+y_C^2)=0$, three conditions should be taken into account. They are called the 1st singular case. If $x_C^2+y_C^2=0$ shows that the Wrist Center is on Axis #1, $\tau_1$ is random, it shows the same as the 1st singular case stated in the previous section.

[1] If $a_1=0$, $\mu_1\neq0$ or $x_C^2+y_C^2=0$, Eq. (3.172) shows A=B=0, and Eq. (3.168) is expressed as:

$$CC(\phi_3)+DS(\phi_3)+E=0. \tag{3.189}$$

(a) If $C\neq0$, Eq. (3.189) can be expressed as $(E-C)\tau_3^2+2D\tau_3+E+C=0$. Accordingly, $$\phi_3=2\cdot a\tan\left(\frac{-D\pm\sqrt{C^2+D^2-E^2}}{E-C}\right)\pm k\pi,\text{ if }\begin{cases}C\neq E\\k\in Z\end{cases}, \tag{3.190}$$

$$\phi_3=2\cdot a\tan\left(-\frac{E+C}{2\cdot D}\right),\text{ if } C=E\ D\neq0. \tag{3.191}$$

(b) If C=0 and $D\neq0$, Eq. (3.189) can give:

$$\begin{cases}\phi_3=-\text{asin}(E/D)\\(\phi_3=\pi+\text{asin}(E/D)\end{cases}. \tag{3.192}$$

(c) If $C\neq0$, D=0, then:

$$\phi_3=\pm\text{acos}(E/C). \tag{3.193}$$

[2] With $a_1\neq0$, $\mu_1=0$, Eq. (3.175) results in F=G=0, and Eq. (3.174) is expressed as:

$$HC(\phi_3)+IS(\phi_3)+J=0. \tag{3.194}$$

(a) If $H\neq0$, Eq. (3.194) is expressed as $$(J-H)\cdot\tau_3^{:2}+2I\cdot\tau_3+J+H=0,$$

and accordingly:

$$\phi_3=2\cdot a\tan\left(\frac{-I\pm\sqrt{H^2+I^2-J^2}}{J-H}\right),\text{ if } H\neq J, \tag{3.195}$$

$$\phi_3=2\cdot a\tan\left(-\frac{H+J}{2\cdot I}\right),\text{ if } I\neq0,\ H=J. \tag{3.196}$$

(b) If H=0, $I\neq0$, then $$\begin{cases}\phi_3=-\text{asin}(J/I)\\(\phi_3=\pi-\text{asin}(J/I)\end{cases}. \tag{3.197}$$

[3] If $a_1=0$ and $\mu_1=0$, it is shown that the first and second axes of the Robo-Arm are coaxial. It is impossible to calculate $\phi_3$, so that $\phi_1$ cannot be determined. There is something wrong with the design of such structure.

Step 2: Explicit Solution of Axis 1 #

Eqs. (3.168) and (3.174) result in:

$$\begin{bmatrix}A&B\\F&G\end{bmatrix}\cdot\begin{bmatrix}C(\phi_1)\\S(\phi_1)\end{bmatrix}=-\begin{bmatrix}CC((\phi_3)+DS(\phi_3)+E\\HC(\phi_3)+IS(\phi_3)+J\end{bmatrix}. \tag{3.198}$$

[1] If $\Delta_{11}=AG-BF\neq0$, solve Eq. (3.198) to obtain:

$$\begin{bmatrix}C(\phi_1)\\S(\phi_1)\end{bmatrix}=-\begin{bmatrix}A&B\\F&G\end{bmatrix}^{-1}\cdot\begin{bmatrix}CC((\phi_3)+DS(\phi_3)+E\\HC(\phi_3)+IS(\phi_3)+J\end{bmatrix}, \tag{3.199}$$

$\phi_3$ has four solutions at the most. Eq. (3.199) results in $[C(\phi_1), S(\phi_1)]$, corresponding to four sets of solutions; additionally, $\phi_1=\text{atan}(S(\phi_1),C(\phi_1))$, so that $\phi_1$ has four solutions at the most.

[2] if $\Delta_{11}=CI-DH=0$, $C(\phi_3)$ and $S(\phi_3)$ can be put into Eqs. (3.168) and (3.174) respectively for solutions. For example, if they are put into Eq. (3.174), then $$y_C\mu_1C(\phi_1)-x_C\mu_1S(\phi_1)+\mu_2Z+W=0, \tag{3.200}$$

wherein $$W=c_2+\lambda_2(c_3+c_C\lambda_3)-(z_C-c_1)\lambda_1$$

$$\tau_l=\tan(\phi_l^{\overline{l}}/2),\ C(\phi_l^{\overline{l}})=\frac{1-\tau_l^{:2}}{1+\tau_l^{:2}},\ S(\phi_l^{\overline{l}})=\frac{2\cdot\tau_l}{1+\tau_l^{:2}}. \tag{3.202}$$

Eqs. (3.202) and (3.200) result in:

$$(W+\mu_2Z-y_C\mu_1)\cdot\tau_1^{:2}-2x_C\mu_1\cdot\tau_1+(W+\mu_2Z+y_C\mu_1)=0. \tag{3.203}$$

(a) If $W+\mu_2\cdot Z-y_C\cdot\mu_1\neq0$ and $(x_C^2+y_C^2)\cdot\mu_1^2-(W+\mu_2\cdot Z)^2\geq0$, then $$\phi_1=2\cdot\text{atan}\left(\frac{x_C\cdot\mu_1\pm\sqrt{(x_C^2+y_C^2)\cdot\mu_1^2-(W+\mu_2\cdot Z)^2}}{W+\mu_2\cdot Z-y_C\cdot\mu_1}\right). \tag{3.204}$$

The two sets of potential solutions of Eq. (3.204) are put into Eq. (3.168) for validation. Inevitably, only one set of solutions satisfies Eq. (3.168).

(b) If $W+\mu_2\cdot Z-y_C\cdot\mu_1=0$ and $x_C\cdot\mu_1\neq0$, Eq. (3.203) is degenerated into a simple equation, so $-2x_C\mu_1\tau_1+(W+\mu_2Z+y_C\mu_1)=0$; accordingly:

$$\phi_1 = 2\cdot a\tan\left(\frac{W+\mu_2\cdot Z+y_C\cdot\mu}{2\cdot x_C\cdot\mu_1}\right).$$

(c) If $W+\mu_2\cdot Z-y_C\cdot\mu_1=0$, $x_C\cdot\mu_1=0$ and $W+\mu_2Z+y_C\mu_1=0$, then $$\phi_1=(-\pi,\pi]. \tag{3.205}$$

If $W+\mu_2Z-y_C\mu_1\neq 0$ and $(x_C^2+y_C^2)\mu_1^2-(W+\mu_2Z)^2\geq 0$, then the three sets of solutions above are integrated as follows:

$$\phi_1 = 2\cdot a\tan\left(\frac{x_C\mu_1 \pm \sqrt{(x_C^2+y_C^2)\mu_1^2-(W+\mu_2Z)^2}}{W+\mu_2Z-y_C\mu_1}\right), \tag{3.206}$$

$$\phi_1 = 2\cdot a\tan\left(\frac{W+\mu_2Z+y_C\mu_1}{2x_C\mu_1}\right), \tag{3.207}$$

$$\text{if } \begin{cases} W+\mu_2Z-y_C\mu_1=0 \\ x_C\mu_1\neq 0 \end{cases};$$

$$\phi_1 = (-\pi,\pi],\ \text{if } \begin{cases} W+\mu_2Z-y_C\mu_1=0 \\ x_C\mu_1=0 \\ W+\mu_2Z-y_C\mu_1=0 \end{cases}.$$

Step 3: Explicit Solution of Axis #2

Assume $$\begin{aligned} A_{11} &\triangleq a_2+a_3C(\phi_3)+c_C\mu_3S(\phi_3) \\ A_{12} &\triangleq -a_3\lambda_2S(\phi_3)+c_3\mu_2+c_C\mu_3\lambda_2C(\phi_3)+c_C\mu_2\lambda_3, \end{aligned} \tag{3.208}$$

The first two equations of Eq. (3.167) can give:

$$\begin{bmatrix} A_{11} & A_{12} \\ -A_{12} & A_{11} \end{bmatrix}\cdot\begin{bmatrix} C(\phi_2) \\ S(\phi_2) \end{bmatrix} = \begin{bmatrix} x_CC(\phi_1)+y_CS(\phi_1)-a_1- \\ x_C\lambda_1S(\phi_1)+y_C\lambda_1C(\phi_1)\backslash+ \\ (z_C-c_1)\mu_1 \end{bmatrix}. \tag{3.209}$$

Assume $$\Delta_{22} = A_{11}^2+A_{12}^2, \tag{3.210}$$

$$\text{If } \Delta_{22}\neq 0,\ \text{then} \tag{3.211}$$

$$\begin{bmatrix} C(\phi_2) \\ S(\phi_2) \end{bmatrix} = \frac{1}{\Delta_{22}}\begin{bmatrix} A_{11} & -A_{12} \\ A_{12} & A_{11} \end{bmatrix}\cdot\begin{bmatrix} x_CC(\phi_1)+y_CS(\phi_1)-a_1- \\ x_C\lambda_1S(\phi_1)+y_c\lambda_1C(\phi_1)\backslash+ \\ (z_C-c_1)\mu_1 \end{bmatrix},$$

The following is established:

$$\phi_2=\mathrm{atan}(S(\phi_2),C(\phi_2)). \tag{3.212}$$

The $\phi_1$ and $\phi_3$ have four sets of solutions at the most, and $\phi_2$ only depends on $\phi_1$ and $\phi_3$. Accordingly, $\phi_2$ has 4 solutions at the most. According to Eqs. (3.187), (3.199) and (3.212), the 4 sets of solutions to $[\phi_1,\phi_2,\phi_3]$ are available.

Apparently, other resolution methods also exist. For example, when $\phi_1$ and $\phi_3$ are resolved, the first or second equation of Eqs. (3.167) is converted into a quadratic equation of $\tau_2$ respectively. Separate resolution will result in respective 2 sets of different local feasible solutions. Accordingly, $[\phi_1,\phi_2,\phi_3]$ has at least 16 sets of local feasible solutions. However, all of them should satisfy 3 equations of Eqs. (3.167) simultaneously. The 4 sets of solutions obtained via Eq. (3.209) are correct solutions which originate from 16 local feasible solutions and satisfy the first and second equations simultaneously. Therefore, the 3R inverse position solution is concluded: The 3R Robo-Arm inverse position solution has at least 16 local feasible solutions and 4 sets of correct solutions.

If $\Delta_{22}=0$, then $\Delta_{11}=0$ and $A_{12}=0$; this is called the 2nd singular case. If $\lambda_2\neq 0$, Eq. (3.208) results in:

$$\begin{cases} a_3C(\phi_3)+c_C\mu_3S(\phi_3)=-a_2 \\ c_C\mu_3C(\phi_3)-a_3S(\phi_3)=-(c_C\mu_2\lambda_3+c_3\mu_2)/\lambda_2 \end{cases}. \tag{3.213}$$

[1] If $$\begin{vmatrix} a_3 & c_C\mu_3 \\ c_C\mu_3 & -a_3 \end{vmatrix} = -(a_3^2+c_C^2\mu_3^2)=0, \tag{3.214}$$

equivalently $$a_3=c_C\cdot\mu_3=0. \tag{3.215}$$

At this moment, the solution to $\phi_3$ exists. According to Eq. (3.158), $a_C=0$, $a_3=\mu_3=0$ and $c_C=0$. In other digits, the wrist center is located on Axis #3. In such case, the rotation of Axis #3 cannot control the wrist center position of the Robo-Arm, which shows that the design of this structure is wrong.

[2] If $\lambda_2=0$, Eq. (3.208) results in $A_{12}=0$ and Eq. (3.209) can be expressed as:

$$\begin{bmatrix} A_{11}C(\phi_2) \\ \Lambda_{11}S(\phi_2) \end{bmatrix} = \begin{bmatrix} x_CC(\phi_1)+y_CS(\phi_1)-a_1 \\ -x_C\lambda_1S(\phi_1)+y_C\lambda_1C(\phi_1)+(z_C-c_1)\mu_1 \end{bmatrix}, \tag{3.216}$$

accordingly $$\phi_2 = a\tan\left(\frac{-x_C\lambda_1S(\phi_1)+y_C\lambda_1C(\phi_1)\backslash+(z_C-c_1)\mu_1}{A_{11}},\ \frac{x_CC(\phi_1)+y_CS(\phi_1)-a_1}{A_{11}}\right) \tag{3.217}$$

D-H Parameter Based Workspace of 3R Roho-Arms

3R Robo-Arm working space $\Omega$ is the space which is constitute by the position $[x_C,y_C,z_C]$ of the wrist center of Robo-Arm, because the continuity of the angle SEQS and the kinematic equations, therefore, the maximum envelope Env of $\Omega$ is continuous and satisfying.

$$Env = \underset{[\phi_1,\phi_2,\phi_3]}{Conv}\left((x_C-x)^2+(y_C-y)^2+(z_C-z)^2\right). \tag{3.218}$$

Eq. (3.218) shows that the linear distance between the points $[x_C,y_C,z_C]$ on Env with any point $[x,y,z]$ is either extremely small or extremely small, that means Env is the convex hull of $\Omega$. Obviously, the amount of data passing through the convex hull Env is much less than the working space $\Omega$. Below will discuss the problem of convex hull calculation, when the range of angle SEQS $[\phi_1,\phi_2,\phi_3]$ is not limited. Eq. (3.171) results in $$(x_C-a_1C(\phi_1))^2+(y_C-a_1S(\phi_1))^2+(z_C-c_1)^2=(2a_2a_3-2c_2c_C\mu_2\mu_3)C(\phi_3)+(2a_2c_C\mu_3+2c_2a_3\mu_2)S(\phi_3)+a_1^2\backslash+a_2^2+c_2^2+c_3^2+a_3^2+c_C^2+2c_2c_3\lambda_2+2c_2c_C\lambda_2\lambda_3+2c_3c_C\lambda_3. \tag{3.219}$$

Eq. (3.219) results in $$(x_C-a_1C(\dot\phi_1))^2+(y_C-a_1S(\phi_1))^2+(z_C-c_1)^2=4. \tag{3.220}$$

-continued $$\frac{(a_2c_C\mu_3 + c_2a_3\mu_2)\cdot\tau_3 + a_2a_3 - c_2c_C\mu_2\mu_3}{1+\tau_3^{:2}} + a_1^2 + a_2^2 + c_2^2 + c_3^2.$$
$$+ a_3^2 + c_C^2 + 2c_2c_3\lambda_2 + 2c_2c_C(\lambda_2\lambda_3 + \mu_2\mu_3) + 2c_3c_C\lambda_3 - 2a_2a_3$$

Eq. (3.220) results in: When given $\phi_l$, there is a maximum and minimum value for the left equation. Eqs. (3.218) and (3.220) result in:

$$Env = \underset{[\phi_1,\phi_2,\phi_3]}{Conv}\left((x_C - a_1C(\phi_1))^2 + (y_C - a_1S(\phi_1))^2 + (z_C - c_1)^2\right) = \underset{\tau_3}{Conv}\left(\begin{aligned}&4\cdot\frac{(a_2c_C\mu_3 + c_2a_3\mu_2)\cdot\tau_3 + a_2a_3 - c_2c_C\mu_2\mu_3}{1+\tau_3^{:2}}\\ &+a_1^2 + a_2^2 + c_2^2 + c_3^2 + a_3^2 + c_C^2 + 2c_2c_3\lambda_2 +\\ &2c_2c_C(\lambda_2\lambda_3 + \mu_2\mu_3) + 2c_3c_C\lambda_3 - 2a_2a_3\end{aligned}\right). \tag{3.221}$$

If $$val = \frac{(a_2c_C\mu_3 + c_2a_3\mu_2)\cdot\tau_3 + a_2a_3 - c_2c_C\mu_2\mu_3}{1+\tau_3^{:2}}, \tag{3.322}$$

then $$val\cdot\tau_3^{:2} - (a_2c_C\mu_3 + c_2a_3\mu_2)\cdot\tau_3 + val - a_2a_3 + c_2c_C\mu_2\mu_3 = 0. \tag{3.223}$$

If $\tau_3$ wants to be existed, the val must be satisfied with $$4\cdot val\cdot(val - a_2a_3 + c_2c_C\mu_2\mu_3) - (a_2c_C\mu_3 + c_2a_3\mu_2)^2 \le 0. \tag{3.224}$$

Let val∈[val1, val2]. Eqs. (3.223) and (3.224) result in:

$$\begin{cases}\tau_3^{[1]} = \dfrac{a_2c_C\mu_3 + c_2a_3\mu_2}{2\cdot val}, \text{ if } val = val2\\ \tau_3^{[2]} = \dfrac{a_2c_C\mu_3 + c_2a_3\mu_2}{2\cdot val}, \text{ if } val = val1\end{cases}, \tag{3.225}$$

wherein $$val1 = \frac{a_2a_3 - c_2c_C\mu_2\mu_3 - \sqrt{(c_2c_C\mu_2\mu_3 - a_2a_3)^2 - (a_2c_C\mu_3 + c_2a_3\mu_2)^2}}{2}$$
$$val2 = \frac{a_2a_3 - c_2c_C\mu_2\mu_3 + \sqrt{(c_2c_C\mu_2\mu_3 - a_2a_3)^2 - (a_2c_C\mu_3 + c_2a_3\mu_2)^2}}{2}.$$

Eqs. (3.221) and (3.222) result in $$\begin{aligned}Env &= \underset{[\phi_1,\phi_2,\phi_3]}{Conv}\left((x_C = a_1C(\phi_1))^2 + (y_C - a_1S(\phi_1))^2 + (z_C - c_1)^2\right)\\ &= 4\cdot val + a_1^2 + a_2^2 + c_2^2 + c_3^2 + a_3^2 + c_C^2 + 2c_2c_3\lambda_2\\ &\quad + 2c_2c_C(\lambda_2\lambda_3 + \mu_2\mu_3) + 2c_3c_C\lambda_3 - 2a_3a_C \ge 0\end{aligned}. \tag{3.226}$$

So the maximum and minimum value for Eq. (3.226) can be resulted by Eq. (3.225). The cross section is a concentric ring which is passing through the convex hull of [$a_1$ C($\phi_1$), $a_1$ S($\phi_1$), $c_1$], therefore, the convex hull shown in Eq. (3.226) is a concentric ring.

Example of D-H Parameter Based CE3 Robo-Arm Position IK Solution

Figure 38:
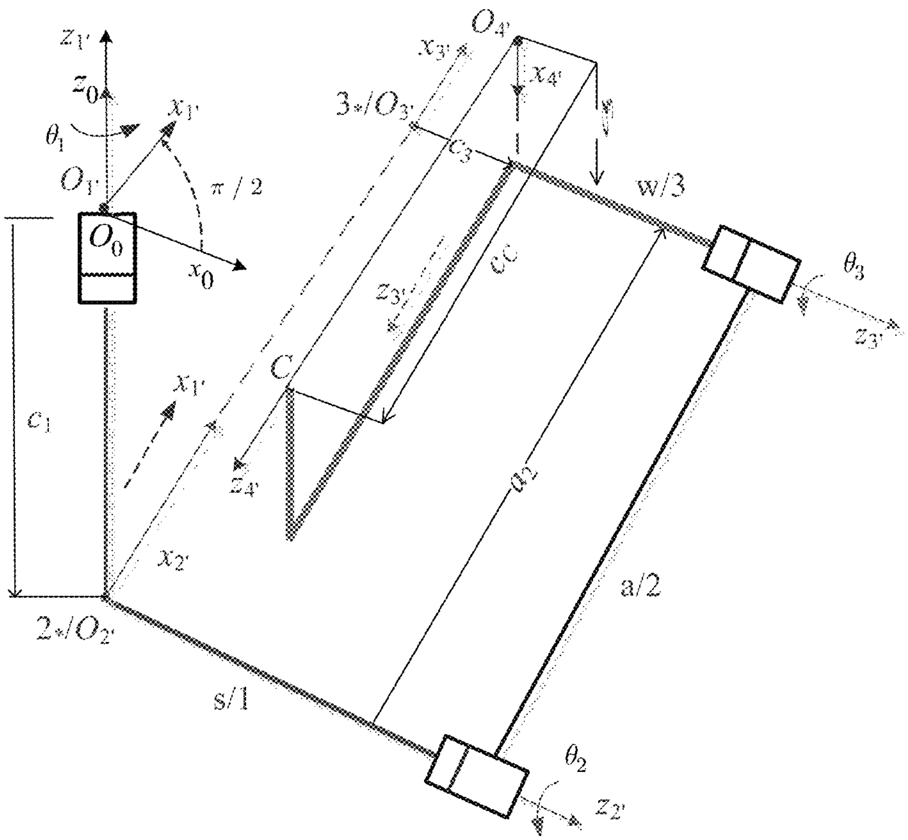
FIG. 38 is a D-H system diagram of the CE3 Lunar rover robotic arm.

The Robo-Arm of CE3 Rover consists of a base, a shoulder, an arm, a wrist and an X-ray spectrometer. The Axis-Chain of this Robo-Arm is denoted as A=(b,s,a,w,C]. The D-H frame of CE3 Robo-Arm is shown by FIG. 38. FIG. 38 contains the first axis s/1 (3801), the second axis a/2 (3802), the third axis w/3 (3803), and the virtual axis C/4.

The nominal D-H parameters are shown in Table 3-2.

Among D-H parameters, the structural parameters $a_l$, $c_l$ and $\alpha_{\bar{l}}$ correspond to Axis $\#_l$ at the zero-position ${}_0\phi_{\bar{l}}^{\dagger}$. Such natural coordinate $\phi_l - {}_0\phi_l^{\dagger}$ of Axis $\#_l$ is the joint variable $\sigma_l$; thus $$\phi_l - {}_0\phi_l^{\dagger} = \theta_l. \tag{3.227}$$

The determination principle of the Axis-Invariant based D-H frame and D-H parameters as specified is applied to obtain the engineering D-H parameters, as shown in Table 3-3.

The Wrist Center C of this Robo-Arm is the intersection point between the central axis of the X-ray spectrometer and its detection plane. According to the measurement method of the Axis-Invariant based structural parameters as elaborated in Chapter 3, the laser tracker is used to measure the Axis-Invariant SEQS [[${}^{\bar{l}}n_l$, ${}^{\bar{l}}l_l$]|l∈A], wherein:

$${}^cn_1^T = [0.01898, 0.01548, 0.99970], {}^1n_2^T = [0.99983, 0.00998, 0.01550],$$

$${}^2n_3 == [0.99991, 0.00988, 0.00908]^T, {}^3n_C = [0.01484, -0.99980, 0.01341]^T,$$

$${}^cr_1^T = [0.5330, 0.0386, -0.1461]m, {}^1r_2^T = [0.4227, 0.0013, -0.2241]m,$$

$${}^2r_3^T = [0.0001, 0.3119, -0.0004]m, {}^3r_{3C}^T = [-0.40925, -0.2062, 0.065]m.$$

The calculations of forward and inverse kinematics for the Robo-Arm are shown in Table 3.4.

TABLE 3-2

Nominal D-H Parameters of CE3 Robo-Arm

| No | Axis | $a_l$ (m) | $c_l$ (m) | $\alpha_l$ (rad) | $\phi_l$ interval (rad) | ${}_0\phi_l^{\Delta}$ (rad) | ${}_0\phi_l^{\dagger} + \theta_l = \phi_l$ (rad) |
|---|---|---|---|---|---|---|---|
| 1 | l = 1 | 0 | −0.2270 | 0.5π | [0, 0.5π) | 0 | $\theta_1 + 0.5\pi$ |
| 2 | l = 2 | 0.3120 | 0 | 0 | [−0.25π, 0.5π) | 0 | $\theta_2$ |
| 3 | l = 3 | −0.0650 | 0.01550 | 0.5π | [0, 1.5π) | 0 | $\theta_3$ |
| 4 | l = 4 | 0 | 0.2060 | | | | |

TABLE 3-3

| Axis-Invariant based engineering D-H Parameters | | | | | | | |
|---|---|---|---|---|---|---|---|
| No | Axis | $a_l$ (m) | $c_l$ (m) | $\alpha_l$ (rad) | Interval (rad) | ${}_0\phi_l^{\Delta}$ (rad) | ${}_0\phi_l^{\dagger} + \theta_l = \phi_l$ (rad) |
| 1 | l = 1 | 0.000610 | −0.230783 | 1.536159 | [0, 0.5π) | 0 | $\theta_1 + 0.5\pi$ |
| 2 | l = 2 | 0.311884 | 0.000014 | 0.016548 | [−0.25π, 0.5π) | 0 | $0.013897 + \theta_2$ |
| 3 | l = 3 | −0.066495 | 0.018675 | 1.578994 | [0, 1.5π) | 0 | $0.008753 + \theta_3$ |
| 4 | l = 4 | 0 | 0.205125 | | | | |

TABLE 3.4

| Mutual Verification of Forward and Inverse kinematics for CE3 Robo-Arm | | | | | | | |
|---|---|---|---|---|---|---|---|
| | Forward Kinematics | | Inverse Kinematics (IK) | | | | Error (°) |
| No. | Input (°) $\theta_1, \theta_2, \theta_3$ | Output (m) ${}^{c}r_{3C}$ | Input (m) ${}^{c}r_{3C}$ | Output (°) $\theta_1, \theta_2, \theta_3$ | Solution number | Error (°) $\delta\,({}^{c}r_{3C})$ | $\delta\theta_1, \delta\theta_2, \delta\theta_3$ |
| 1 | 0.000 | 0.548500 | 0.548500 | 0.000 | 1 | 0.0003 | 0.000 |
| | 0.000 | 0.038500 | 0.038500 | 0.000 | | 0.0006 | 0.000 |
| | 0.000 | −0.146000 | −0.146000 | 0.000 | | 0.0003 | 0.000 |
| 2 | 5.000 | 0.558832 | 0.558832 | 5.000 | 1 | 0.0004 | 0.000 |
| | 5.000 | 0.027075 | 0.027075 | 5.000 | | 0.0007 | 0.000 |
| | 5.000 | −0.153591 | −0.153591 | 5.000 | | 0.0006 | 0.000 |
| 3 | 10.000 | 0.571866 | 0.571866 | 10.000 | 1 | 0.0009 | 0.000 |
| | 10.000 | 0.013342 | 0.013342 | 10.000 | | 0.0005 | 0.000 |
| | 10.000 | −0.158358 | −0.158358 | 10.000 | | 0.0008 | 0.000 |
| 4 | 20.000 | 0.608158 | 0.608158 | 20.000 | 1 | 0.0008 | 0.000 |
| | 20.000 | −0.016675 | −0.016675 | 20.000 | | 0.0008 | 0.000 |
| | 20.000 | −0.156497 | −0.156497 | 20.000 | | 0.0007 | 0.000 |
| 5 | 30.000 | 0.658169 | 0.658169 | 30.000 | 1 | 0.0011 | 0.000 |
| | 30.000 | −0.041299 | −0.041299 | 30.000 | | 0.0009 | 0.000 |
| | 30.000 | −0.135901 | −0.135901 | 30.000 | | 0.0008 | 0.000 |
| 6 | 30.000 | 0.714023 | 0.714023 | 30.000 | 1 | 0.0010 | 0.000 |
| | 30.000 | −0.138042 | −0.138042 | 30.000 | | 0.0011 | 0.000 |
| | 60.000 | −0.131000 | −0.131000 | 60.000 | | 0.0006 | 0.000 |
| 7 | 30.000 | 0.786974 | 0.786974 | 30.000 | 2 | 0.0008 | 0.000 |
| | 30.000 | −0.264396 | −0.264396 | 30.000 | | 0.0012 | 0.000 |
| | 120.000 | 0.028292 | 0.028292 | 120.000 | | 0.0013 | 0.000 |
| 8 | 30.000 | 0.739535 | 0.739535 | 30.000 | 2 | 0.0009 | 0.000 |
| | 30.000 | −0.182230 | −0.182230 | 30.000 | | 0.0013 | 0.000 |
| | 190.000 | 0.257207 | 0.257207 | 190.000 | | 0.0011 | 0.000 |
| 9 | 40.000 | 0.793134 | 0.793134 | 40.000 | 2 | 0.0010 | 0.000 |
| | 30.000 | −0.141402 | −0.141402 | 30.000 | | 0.0012 | 0.000 |
| | 190.000 | 0.257207 | 0.257207 | 189.999 | | 0.0007 | −0.001 |
| 10 | 40.000 | 0.751612 | 0.751612 | 40.000 | 2 | 0.0008 | 0.000 |
| | 40.000 | −0.091918 | −0.091918 | 40.000 | | 0.0013 | 0.000 |
| | 190.000 | 0.319136 | 0.319136 | 189.999 | | 0.0012 | −0.001 |
| 11 | 40.000 | 0.528916 | 0.528916 | 40.000 | 1 | 0.0009 | 0.000 |
| | 70.000 | 0.173481 | 0.173481 | 70.000 | | 0.0013 | 0.000 |
| | 220.000 | 0.383530 | 0.383530 | 219.999 | | 0.0014 | −0.001 |
| 12 | 60.000 | 0.848215 | 0.848215 | 60.000 | 2 | 0.0012 | 0.000 |
| | 40.000 | −0.019592 | −0.019592 | 40.000 | | 0.0014 | 0.000 |
| | 180.000 | 0.301757 | 0.301757 | 179.999 | | 0.0016 | −0.001 |

After system testing, the repetitive positioning accuracy of the robot arm is 0.2 mm. The positioning accuracy calculated by the nominal D-H parameter is 0.86 mm. The positioning accuracy of engineering D-H parameter is increased to 0.25 mm. The test shows that the engineering D-H parameter based on the axis invariant can greatly improve the absolute positioning accuracy of the robot arm and contribute to the improvement of the automic ability of the robot arm. According to the terrain reconstructed by the environment and the triangular surface of each part of the patrol, the AABB collision detection technology is applied to realize the CE3 robot arm collision detection function. In order to guide the operator to determine the feasible detection area, it is necessary to draw the robot arm working space and the detection space. The working space is a collection of locations where the robotic pick-up points can be contacted, and the detection space is the intersection of the working space and the terrain surface.

The robot arm carries the X-ray spectrometer for detection, and other conditions must be met: for example, whether the illumination is suitable, whether the detection area is flat or the like. When the operator clicks the mouse in the detection space, the system will automatically evaluate whether the area can be detected and prompt the relevant information of the local area. After the operator selects the desired detection area, the motion planning module of the robot arm is executed to plan the motion sequence of the robot arm deployment.

Axis-Invariant Based Inverse Kinematics of MASs

As for an important aspect of the autonomous robot study is to solve the kinematic modeling of robots with variable topology structures. In the MAS, the dynamic graph structure is available to dynamically establish the motion-axis based directed Span-Tree, which setting the foundation for the study on the modeling and control of robots with variable topology structures. It is necessary to propose the principle of general Robo-Arm inverse solution based on Axis-Invariant, not only to establish the kinematics model including frame, polarity, structural parameters and Joint Variables, but also calculate the Position and Attitude equation in real time. On the one hand, it can improve the autonomy of the robot, on the other hand, it can improve the absolute precision of the robot position and attitude control.

The 6R decoupling Robo-Arm has a common constraint on the structure: Either Axis #4 to Axis #6 intersect at one point, or Axis #4 and Axis #5 intersect at one point, and Axis #5 and Axis #6 intersect at one point at the same time. For high precision Robo-Arm, the assumption is not valid due to machining and assembly errors. Because the general 6R Robo-Arm does not have a common point constraint, its inverse calculation is very difficult and has to be subject to decoupling constraint in engineering. This constraint increases the difficulty of machining and assembly of the Robo-Arm, and reduces the absolute positioning accuracy of the Robo-Arm. Only by breaking the principle of the General 6R Robo-Arm inverse solution, can we satisfy the requirements of the precision operation of the Robo-Arm, and the autonomous robotic theory can be perfected.

It needs to solve the operability problem of Analytical Inverse Solution for the 6R general Robo-Arm: On the one hand, engineering structural parameters should be characterized by fixed Axis-Invariant to ensure the absolute positioning accuracy of the MAS; on the other hand, it needs to solve the dimensionality reduction problem of kinematic equation, and the computability problems concerning the variable elimination method for inverse solutions.

In the natural space, the number of translational and rotational axes is three respectively; translational axes may be substituted by rotational ones; translational and rotational axes in the 6R AC are denoted respectively as ${}^{i}P_n=\{{}^{\bar{l}}k_l|l\in {}^{i}l_n, {}^{\bar{l}}k_l\in P\}$ and ${}^{i}R_n=\{{}^{\bar{l}}k_l|l\in {}^{i}l_n, {}^{\bar{l}}k_l\in R\}$; additionally, $1\le P_n^{\,i}+R_n^{\,i}\le 6$, $R_n^{\,i}\le 6$ and $P_n^{\,i}\le 3$. The AC is classified into three categories: The pure-translational AC has 3 types; the pure-AC has 6 types; the rotational and translational composite AC has 12 types; and there are 21 types in total. Wherein, the 3 types of pure-translational AC involve the trivial kinematics, so that there is no need to discuss them. Accordingly, the existence conditions for the IK solutions of nontrivial AC are available:

$$1\le R_n^{\,i}\le 6, P_n^{\,i}\le 3$$

$$1\le P_n^{\,i}+R_n^{\,i}\le 6. \tag{3.228}$$

If $l_n^{\,i}=6$, and $R_n^{\,i}\ge 3$ is available, at least three rotators are required to satisfy the requirement for position and orientation alignment.

Artificial derivate the kinematic equation of the 6R AC is very complicated and easy to make mistake, and it is difficult to guarantee the reliability of the modeling. On the one hand, the iterative form should be established for the computer-based automatic building of the MAS symbolic models. On the other hand, it is necessary to apply a motion chain with fewer axis to carry on the equivalent. There are many equivalent forms of kinematic equations. Only the kinematic equation with specific structure has the feasibility of inverse solution, it requires that the forward kinematic equation has the minimum order, the least number of equations and the least number of independent variables; it also requires that there is no singularity in the inverse solution process of numerical calculation.

The natural space has six dimensions, so six position and attitude equations with only six joint variables should be established. Obviously, the Position and Attitude equations based on Euler quaternions or dual quaternions do not satisfy the minimum requirements of the equations. Although Eqs. (3.1) and (3.2) are 2-Order polynomial systems, there are only six equations. The motion vectors that contain translational and rotational motion are essentially natural screws. The last axis of the Robo-Arm must be aligned with the desired direction to perform the required operation. After the first 5-Axis controls the position of Axis #6 aligned with the desired position and the pointing, then control Axis #4 to satisfy the radial alignment; therefore, for the general 6R Robo-Arm, it only need to establish the position and attitude equation with the first five joint variables.

In consideration of the AC ${}^{i}l_n$, Eqs. (3.1) and (3.2) are expressed by Cayley parameter or Gibbs vector. For this purpose, the Ju-Gibbs attitude quaternion is proposed; the aim is to complete the alignment of the first 5-Axis to eliminate the joint variables of Axis #4 and Axis #5, thus laying the foundation for the subsequent inverse solution.

Ju-Gibbs Quaternion and Quasi-DCM

Considering the AC, on the one hand, the Eq. (3.2) is a Gibbs vector equation; on the other hand, the trigonometric function of the sine and cosine can be transformed into the equation of the corresponding Gibbs parameter. To this end, the "Gibbs" attitude quaternion is proposed. Thus, the problem of transforming the position inverse kinematics problem into a polynomial equation of Gibbs parameters.

[1] Ju-Gibbs Quaternion

At first, define the Ju-Gibbs Quaternion which is the isomorphism of Euler quaternion $${}^{\bar{l}}\tau_l \triangleq \left[\tau_l\cdot{}^{\bar{l}}n_l,\ {}^{\bar{l}}\tau_l^{[4]}\right]^T=\left[{}^{\bar{l}}\tau_l,\ {}^{\bar{l}}\tau_l^{[4]}\right]^T\sim{}^{\bar{l}}\lambda_l,\ \phi_l^{\bar{l}}\in(-\pi,\ \pi). \tag{3.229}$$

Eq. (2.115) results in the Gibbs conjugate quaternion:

$${}^{\bar{l}}\boldsymbol{\tau}_l^{\,*}=[\tau_l\cdot{}^{\bar{l}}n_l, {}^{\bar{l}}\boldsymbol{\tau}_l^{\,[4]}]^T. \tag{3.230}$$

wherein $$\tau_l=\tan(\phi_l^{\bar{l}}/2), {}^{\bar{l}}\tau_l={}^{\bar{l}}n_l\cdot\tau_l$$

$${}^{\bar{l}}\tilde{\tau}_l={}^{\bar{l}}\tilde{n}_l\cdot\tau_l, \tau_l^{\bar{l}}\triangleq{}^{\bar{l}}\boldsymbol{\tau}_l^{\,[4]:2}+\tau_l^{:2}. \tag{3.231}$$

Evidently, $\tau_l^{\bar{l}}$ is the square of modulus of ${}^{\bar{l}}\boldsymbol{\tau}_l$. Eq. (2.124) gives the complex multiplication algorithm of such Ju-Gibbs Quaternion, and the product operation still results in the Ju-Gibbs Quaternion.

$${}^{i}\boldsymbol{\tau}_k={}^{i}\boldsymbol{\tau}_j{}^{*j}\boldsymbol{\tau}_k={}^{i}\tilde{\boldsymbol{\tau}}_j\cdot{}^{j}\boldsymbol{\tau}_k; \tag{3.232}$$

wherein $$\begin{aligned}{}^{i}\tilde{\tau}_j\cdot{}^{j}\tau_k&=\begin{bmatrix}{}^{i}\tau_j^{[4]}\cdot 1+{}^{i}\tilde{\tau}_j & {}^{i}\tau_j\\ -{}^{i}\tau_j^T & {}^{i}\tau_j^{[4]}\end{bmatrix}\cdot\begin{bmatrix}{}^{j}\tau_k\\ {}^{j}\tau_k^{[4]}\end{bmatrix}\\&=\begin{bmatrix}{}^{j}\tau_k^{[4]}\cdot{}^{i}\tau_j+{}^{i}\tau_j^{[4]}\cdot{}^{j}\tau_k+{}^{i}\tilde{\tau}_j\cdot{}^{j}\tau_k\\ {}^{i}\tau_j^{[4]}\cdot{}^{j}\tau_k^{[4]}-{}^{i}\tau_j^T\cdot{}^{j}\tau_k\end{bmatrix};\end{aligned} \tag{3.233}$$

Eq. (3.233) results in:

$$ {}^{\bar{\bar{l}}}\tau_{l} = {}^{\bar{\bar{l}}}\tau_{\bar{l}} * {}^{\bar{l}}\tau_{l} = \begin{bmatrix} {}^{\bar{l}}\tau_{l}^{[4]} \cdot \tau_{\bar{l}} \cdot {}^{\bar{\bar{l}}}n_{\bar{l}} + {}^{\bar{\bar{l}}}\tau_{\bar{l}}^{[4]} \cdot \tau_{l} \cdot {}^{\bar{l}}n_{l} \\ \backslash + \tau_{\bar{l}}\tau_{l} \cdot {}^{\bar{\bar{l}}}\tilde{n}_{\bar{l}} \cdot {}^{\bar{l}}n_{l} \\ {}^{\bar{l}}\tau_{\bar{l}}^{[4]} \cdot {}^{\bar{\bar{l}}}\tau_{\bar{l}}^{[4]} - \tau_{\bar{l}}\tau_{l} \cdot {}^{\bar{\bar{l}}}n_{\bar{l}}^{T} \cdot {}^{\bar{l}}n_{l} \end{bmatrix}. \tag{3.234} $$

The desired attitude of the single joint and AC is expressed by canonical Ju-Gibbs Quaternion which scalar part is 1; however, the calculation of product is usually nonstandard, namely its scalar part isn't 1. From Eq. (3.234), only if the axes l, $\bar{l}$ are orthogonal, and ${}^{\bar{l}}\boldsymbol{\tau}_{\bar{l}}$ as well as ${}^{\bar{l}}\boldsymbol{\tau}_{l}$ are canonical Ju-Gibbs Quaternion, ${}^{\bar{l}}\boldsymbol{\tau}_{l}$ can be the canonical Ju-Gibbs Quaternion.

Eq. (3.234) results in:

$$ \tau_{l}^{\bar{\bar{l}}:2} = \left({}^{\bar{l}}\tau_{l}^{[4]:2} + \tau_{l}^{:2}\right) \cdot \left({}^{\bar{\bar{l}}}\tau_{\bar{l}}^{[4]:2} + \tau_{\bar{l}}^{:2}\right) = \tau_{\bar{l}}^{\bar{\bar{l}}:2} \cdot \tau_{l}^{\bar{l}:2}. \tag{3.235} $$

PROOF: According to Eq. (3.234):

$$ \begin{aligned} \tau_{l}^{\bar{\bar{l}}:2} &= \left({}^{\bar{l}}\tau_{l}^{[4]} \cdot \tau_{\bar{l}} \cdot {}^{\bar{\bar{l}}}n_{\bar{l}}^{T} + {}^{\bar{\bar{l}}}\tau_{\bar{l}}^{[4]} \cdot \tau_{l} \cdot {}^{\bar{l}}n_{l}^{T} - \tau_{\bar{l}}\tau_{l} \cdot {}^{\bar{l}}n_{\bar{l}}^{T} \cdot {}^{\bar{\bar{l}}}\tilde{n}_{\bar{l}}\right) \\ &\backslash \cdot \left(\cdot {}^{\bar{l}}\tau_{l}^{[4]} \cdot \tau_{\bar{l}} \cdot {}^{\bar{\bar{l}}}n_{\bar{l}} + {}^{\bar{\bar{l}}}\tau_{\bar{l}}^{[4]} \cdot \tau_{l} \cdot {}^{\bar{l}}n_{l} + \tau_{\bar{l}}\tau_{l} \cdot {}^{\bar{\bar{l}}}\tilde{n}_{\bar{l}} \cdot {}^{\bar{l}}n_{l}\right) \\ &\backslash + \left({}^{\bar{l}}\tau_{l}^{[4]} \cdot {}^{\bar{\bar{l}}}\tau_{\bar{l}}^{[4]} - \tau_{\bar{l}}\tau_{l} \cdot {}^{\bar{\bar{l}}}n_{\bar{l}}^{T} \cdot {}^{\bar{l}}n_{l}\right)^{2} \\ &= {}^{\bar{l}}\tau_{l}^{[4]:2} \cdot {}^{\bar{\bar{l}}}\tau_{\bar{l}}^{[4]:2} + {}^{\bar{\bar{l}}}\tau_{\bar{l}}^{[4]:2} \cdot \tau_{l}^{:2} + {}^{\bar{l}}\tau_{\bar{l}}^{[4]:2} \cdot \tau_{\bar{l}}^{:2} + \tau_{l}^{:2}\tau_{\bar{l}}^{:2} \\ &= \left({}^{\bar{l}}\tau_{l}^{[4]:2} + \tau_{l}^{:2}\right) \cdot \left({}^{\bar{\bar{l}}}\tau_{\bar{l}}^{[4]:2} + \tau_{\bar{l}}^{:2}\right) \end{aligned}. $$

Alternatively, based on the nature of the 4D complex number:

$$ \tau_{l}^{\bar{\bar{l}}:2} = \left({}^{\bar{l}}\tau_{l}^{[4]:2} + \tau_{l}^{:2}\right) \cdot \left({}^{\bar{\bar{l}}}\tau_{\bar{l}}^{[4]:2} + \tau_{\bar{l}}^{:2}\right) = \tau_{\bar{l}}^{\bar{\bar{l}}:2} \cdot \tau_{l}^{\bar{l}:2}. \tag{3.236} $$

Q.E.D.

Record as $\underset{\cdot}{1} = [0_3, 1]^T$, Eq. (3.233) results in:

$$ {}^{i}\boldsymbol{\tau}_{l} * \underset{\cdot}{1} = {}^{i}\boldsymbol{\tau}_{l}. \tag{3.237} $$

According to Eqs. (3.229), (3.231), (3.230) and (3.236):

$$ {}^{k}\tau_{l}^{*} * {}^{k}\tau_{l} = \tau_{l}^{k} \cdot \underset{\cdot}{1}, \quad \tau_{l}^{k} \triangleq \prod_{k}^{{}^{k}1_{l}} \left(\tau_{k}^{\bar{k}}\right). \tag{3.238} $$

PROOF: Eq. (3.234) results in:

$$ {}^{k}\tau_{l}^{*} * {}^{k}\tau_{l} = \begin{bmatrix} {}^{k}\tau_{l}^{[4]} \cdot {}^{k}\tau_{l} - {}^{k}\tau_{l}^{[4]} \cdot {}^{k}\tau_{l} - {}^{k}\tilde{\tau}_{l} \cdot {}^{k}\tau_{l} \\ {}^{k}\tau_{l}^{[4]:2} + {}^{k}\tau_{l}^{T} \cdot {}^{k}\tau_{l} \end{bmatrix} = \tau_{l}^{k} \cdot \underset{\cdot}{1}. $$

Thus, Eq. (3.238) is workable. Q.E.D.

Eqs.(3.231), (3.238) and (3.235) result in:

$$ \tau_{k}^{i}\tau^{k}\boldsymbol{\tau}_{l} = {}^{i}\tilde{\boldsymbol{\tau}}_{k}^{*} \cdot {}^{i}\boldsymbol{\tau}_{l}. \tag{3.239} $$

[2] Quasi-DCM and Nature

Eq. (3.1) results in $$ \tau_{l}^{\bar{l}} \cdot {}^{\bar{l}}Q_{l} = {}^{\bar{l}}Q_{l}, \tag{3.240} $$

$$ \tau_{n}^{i} \cdot {}^{i}Q_{n} = {}^{i}Q_{n}, {}^{i}Q_{n} \cdot {}^{i}Q_{n}^{-1} = {}^{i}Q_{n}^{-1} \cdot {}^{i}Q_{n} = \tau_{n}^{i\,:2} \cdot 1, \tag{3.241} $$

wherein $$ \begin{aligned} {}^{i}Q_{n} &= \prod_{l}^{{}^{i}1_{n}} \left(1 + 2 \cdot \tau_{l} \cdot {}^{\bar{l}}\tilde{n}_{l} + \tau_{l}^{:2} \cdot {}^{\bar{l}}N_{l}\right) \\ {}^{i}Q_{n}^{-1} &= \prod_{l}^{{}^{i}1_{n}} \left(1 - 2 \cdot \tau_{l} \cdot {}^{\bar{l}}\tilde{n}_{l} + \tau_{l}^{:2} \cdot {}^{\bar{l}}N_{l}\right) \\ {}^{\bar{l}}N_{l} &= 1 + 2 \cdot {}^{\bar{l}}\tilde{n}_{l}^{2}, \quad \tau_{n}^{k} = \prod_{l}^{{}^{k}1_{n}} \left(1 + \tau_{l}^{:2}\right) = \prod_{l}^{{}^{k}1_{n}} \left(\tau_{l}^{\bar{l}}\right) \end{aligned}. \tag{3.242} $$

As shown by Eq. (3.241): ${}^{i}Q_{n}$ and $\tau_{n}^{i}$ are multiple 2-Order polynomials related to $\tau_k$ and n. Apparently, $\tau_{n}^{i}$ is the 2-norm of Gibbs. According to Eq. (3.240): ${}^{\bar{l}}Q_{l}$ and ${}^{\bar{l}}Q_{l}$ are similar. Thus, it is called Gibbs DCM or Quasi-DCM. Eq. (3.242) results in:

$$ {}^{i}Q_{n} = \prod_{l}^{{}^{i}1_{n}} \left(2 \cdot \left(\tau_{l} \cdot {}^{\bar{l}}\tilde{n}_{l} - {}^{\bar{l}}\tilde{n}_{l}^{2}\right) + \left(1 + \tau_{l}^{:2}\right) \cdot {}^{\bar{l}}N_{l}\right). \tag{3.243} $$

Apparently, Quasi-DCM can be expressed as the Ju-Gibbs Quaternion. Therefore, the attitude Eq. (3.1) and the position Eq. (3.2) are essentially the expressions concerning the Ju-Gibbs Quaternion. Based on the 2-Order nilpotent property of ${}^{\bar{l}}\tilde{n}_{l}$, the following can be known:

$$ \begin{aligned} {}^{\bar{l}}N_{l}^{2} &= \left(1 + 2 \cdot {}^{\bar{l}}\tilde{n}_{l}^{2}\right) \cdot \left(1 + 2 \cdot {}^{\bar{l}}\tilde{n}_{l}^{2}\right) = 1 \\ {}^{\bar{l}}\tilde{n}_{l}^{2} \cdot {}^{\bar{l}}N_{l} &= {}^{\bar{l}}N_{l} \cdot {}^{\bar{l}}\tilde{n}_{l} = -{}^{\bar{l}}\tilde{n}_{l} \\ {}^{\bar{l}}N_{l} \cdot \left(1 + {}^{\bar{l}}N_{l}\right) &= {}^{\bar{l}}N_{l} + 1 \end{aligned}. \tag{3.244} $$

Eq. (3.244) results in:

$$ \begin{aligned} &{}^{\bar{l}}\tilde{n}_{l} \cdot (1 + {}^{\bar{l}}N_{l}) = 0 \\ &(1 - {}^{\bar{l}}N_{l}) \cdot {}^{\bar{l}}n_{l} = 0_3 \\ &1 - {}^{\bar{l}}N_{l}^{2} = (1 + {}^{\bar{l}}N_{l}) \cdot (1 - {}^{\bar{l}}N_{l}) = 0 \end{aligned} \tag{3.245} $$

[3] Inverse Solution to the Block Square Matrix

If the invertible square matrices $K^1$, B and C are given, and $$ K^{-1} = \begin{bmatrix} {}_{l}A_{c} & {}_{l}B_{l} \\ {}_{c}C_{c} & {}_{c}D_{l} \end{bmatrix}, $$

then $$ K^{-1} = \begin{bmatrix} -C^{-1}D \cdot \left[{}_{l}1_{l} - B^{-1}AC^{-1}D\right]^{-1} \cdot B^{-1} & \left[C - DB^{-1}A\right]^{-1} \\ \left[{}_{l}1_{l} - B^{-1}AC^{-1}D\right]^{-1} \cdot B^{-1} & -B^{-1}A \cdot \left[C - DB^{-1}A\right]^{-1} \end{bmatrix}. \tag{3.246} $$

PROOF: The following is denoted $$ K = \begin{bmatrix} \overline{A} & \overline{B} \\ \overline{C} & \overline{D} \end{bmatrix}, $$

then $$K\cdot K^{-1}=\begin{bmatrix} {}_lA_c & {}_lB_l \\ {}_cC_c & {}_cD_l \end{bmatrix}\cdot\begin{bmatrix} {}_c\overline{A}_l & {}_c\overline{B}_c \\ {}_l\overline{C}_l & {}_l\overline{D}_c \end{bmatrix} = \begin{bmatrix} A\overline{A}+B\overline{C} & A\overline{B}+B\overline{D} \\ C\overline{A}+D\overline{C} & C\overline{B}+D\overline{D} \end{bmatrix}=\begin{bmatrix} {}_l1_l & {}_l0_c \\ {}_c0_l & {}_c1_c \end{bmatrix}.$$

Thus $$\overline{C}=B^{-1}\cdot({}_l1_l-A\cdot\overline{A}),\overline{D}=-B^{-1}\cdot A\cdot\overline{B}$$

$$\overline{A}=-C^{-1}\cdot D\cdot\overline{C},D\cdot\overline{D}+C+\overline{B}={}_C1_C,$$

$\overline{A}=-C^{-}\cdot D\cdot\overline{C}$ is put into $\overline{C}=B^{-1}\cdot({}_l1_l-A\cdot\overline{A})$ to obtain $\overline{C}=B^{-1}+B^{-1}\cdot A\cdot C^{-1}\cdot D\cdot\overline{C}$. Accordingly, $$\overline{C}=({}_l1_l-B^{-1}\cdot A\cdot C^{-1}\cdot D)^{-1}\cdot B^{-1},$$

it is put into Eq. $C\cdot\overline{A}+D\cdot\overline{C}={}_c0_l$ to obtain:

$$\overline{A}=-C^{-1}\cdot D\cdot({}_l1_l-B^{-1}\cdot A\cdot C^{-1}\cdot D)^{-1}\cdot B^{-1}.$$

$\overline{D}=-B^{-1}\cdot A\cdot\overline{B}$ is put into $D\cdot\overline{D}+C\cdot\overline{B}={}_c1_c$ to obtain:

$$\overline{B}=(C-D\cdot B^{-1}\cdot A)^{-1},$$

it is put into $\overline{D}=-B^{-1}A\cdot\overline{B}$ to obtain:

$$\overline{D}=-B^{1}\cdot A\cdot(C-D\cdot B^{-1}\cdot A)^{-}.$$

Q.E.D.

Axis-Invariant Based Direction IK Principle of 2R Robo-Wrists

The 6R decoupling Robo-Arm consists of 3R Robo-Arm, 2R decoupling Robo-Wrist and IR Robo-Palm. The attitude inverse solution of 3R decoupling Robo-Wrist is that: When the structural parameter, desired attitude of 6R AC and the attitude of first 3 Joints are given before, the attitude inverse solution can be acquired by calculating the Axis #4 and Axis #5 Joint Variable to align the orientation to the desired direction, and then align the radial axis of Axis #6 to the desired radial direction.

The existence of the Ju-Gibbs quaternion pointing to the alignment is proved below. Theorem 3.3 is called the Ju-Gibbs quaternion pointing alignment theorem.[1] Orientation alignment theorem based on Ju-Gibbs Quaternion The existence of Ju-Gibbs Quaternions for attitude alignment is proved as follows.

THEOREM 3.3. Considering the AC ${}^i\mathbf{1}_l$, wherein $R_l^i>2$. If the Axis-Vector ${}^{\bar{l}}n_l$ aligns to the desired Axis-Vector ${}_d^{i|\bar{l}}n_l$, then there exists at least one Ju-Gibbs Quaternion for multiaxial rotation as follows $$ {}_d^i\boldsymbol{\tau}_{\bar{l}}^T=[{}_d^in_{\bar{l}}^T\cdot{}_d\tau_{\bar{l}}^i,1], \tag{3.247}$$

wherein $$\begin{cases} {}_d^in_{\bar{l}}=\left({}_d^{i|\bar{l}}\tilde{n}_l+{}^{\bar{l}}\tilde{n}_l\right)\cdot\left({}_d^{i|\bar{l}}n_l-{}^{\bar{l}}n_l\right) \\ {}_d\tau_{\bar{l}}^i=\dfrac{\left\|{}_d^{i|\bar{l}}n_l-{}^{\bar{l}}n_l\right\|}{\left\|{}_d^{i|\bar{l}}n_l+{}^{\bar{l}}n_l\right\|} \end{cases};\ \text{if}\ {}_d^{i|\bar{l}}n_l\neq\pm{}^{\bar{l}}n_l, \tag{3.248}$$

$$ {}_d^in_{\bar{l}}={}^{\bar{\bar{l}}}\tilde{n}_{\bar{l}}\cdot{}^{\bar{l}}n_l,\quad {}_d\tau_{\bar{l}}^i=0;\ \text{if}\ {}_d^{i|\bar{l}}n_l={}^{\bar{l}}n_l, \tag{3.249}$$

and $$ {}_d^in_{\bar{l}}={}^{\bar{\bar{l}}}\tilde{n}_{\bar{l}}\cdot{}^{\bar{l}}\tilde{n}_l,\ {}_d\tau_{\bar{l}}^i=\pm\propto;\ \text{if}\ ={}_d^{i|\bar{l}}n_l-{}^{\bar{l}}n_l, \tag{3.250}$$

PROOF: From Eq. (3.71), obtain $$\left(1-{}_d^i\tilde{n}_{\bar{l}}\cdot{}_d\tau_{\bar{l}}^i\right)^{-1}\cdot\left(1+{}_d^i\tilde{n}_{\bar{l}}\cdot{}_d\tau_{\bar{l}}^i\right)\cdot{}^{\bar{l}}n_l={}_d^{i|\bar{l}}n_l. \tag{3.251}$$

Eq. (3.251) results in $$\left(1+{}_d^i\tilde{n}_{\bar{l}}\cdot{}_d\tau_{\bar{l}}^i\right)\cdot{}^{\bar{l}}n_l\left(1-{}_d^i\tilde{n}_{\bar{l}}\cdot{}_d\tau_{\bar{l}}^i\right)\cdot{}_d^{i|\bar{l}}n_l, \tag{3.252}$$

and $$ {}_d\tau_{\bar{l}}^i\cdot{}_d^i\tilde{n}_{\bar{l}}\cdot\left({}_d^{i|\bar{l}}n_l+{}^{\bar{l}}n_l\right)={}_d^{i|\bar{l}}n_l-{}^{\bar{l}}n_l. \tag{3.253}$$

Due to Axis-vector ${}_d^{i|\bar{l}}n_l$ and desired Axis-Vector ${}^{\bar{l}}n_l$ are unit vectors, assume ${}_d^{i|\bar{l}}n_l+{}^{\bar{l}}n_l\neq0$ and ${}_d^{i|\bar{l}}n_l-{}^{\bar{l}}n_l\neq0$, we can obtain $$\left({}_d^{i|\bar{l}}n_l^T+{}^{\bar{l}}n_l^T\right)\cdot\left({}_d^{i|\bar{l}}n_l-{}^{\bar{l}}n_l\right)=0. \tag{3.254}$$

Eq. (3.254) shows ${}_d^{i|\bar{l}}n_l+{}^{\bar{l}}n_l$ and ${}_d^{i|\bar{l}}n_l-{}^{\bar{l}}n_l$ are mutually orthogonal. Eqs. (3.253) and (3.254) result in the optimal Axis-Vector as follows $$ {}_d^in_{\bar{l}}=\pm\left({}_d^{i|\bar{l}}\tilde{n}_l+{}^{\bar{l}}\tilde{n}_l\right)\cdot\left({}_d^{i|\bar{l}}n_l-{}^{\bar{l}}n_l\right). \tag{3.255}$$

and $$ {}_d\tau_{\bar{l}}^i=\frac{\left\|{}_d^{i|\bar{l}}n_l\quad{}^{\bar{l}}n_l\right\|}{\left\|{}_d^{i|\bar{l}}n_l+{}^{\bar{l}}n_l\right\|}. \tag{3.256}$$

Eqs. (3.255) and (3.256) result in Eq. (3.248). If $$ {}_d^{i|\bar{l}}n_l+{}^{\bar{l}}n_l=\text{or}\ {}_d^{i|\bar{l}}n_l-{}^{\bar{l}}n_l=0,$$

then, Eq. (3.251) results in $$\left(1-{}_d^i\tilde{n}_{\bar{l}}\cdot{}_d\tau_{\bar{l}}^i\right)^{-1}\cdot\left(1+{}_d^i\tilde{n}_{\bar{l}}\cdot{}_d\tau_{\bar{l}}^i\right)\cdot{}^{\bar{l}}n_l=\pm{}^{\bar{l}}n_l. \tag{3.257}$$

From Eq. (3.257), obtain $$\left(1+{}_d^i\tilde{n}_{\bar{l}}\cdot{}_d\tau_{\bar{l}}^i\right)\cdot{}^{\bar{l}}n_l=\pm\left(1-{}_d^i\tilde{n}_{\bar{l}}\cdot{}_d\tau_{\bar{l}}^i\right)\cdot{}^{\bar{l}}n_l. \tag{3.258}$$

Since ${}^{\bar{l}}\neq{}^{\bar{l}}n_{\bar{l}}$, Eq. (3.258) results in $$ {}_d^in_{\bar{l}}={}^{\bar{\bar{l}}}\tilde{n}_{\bar{l}}\cdot{}^{\bar{l}}n_l,\ {}_d\tau_{\bar{l}}^i=0;\ \text{if}\ {}_d^{i|\bar{l}}n_l={}^{\bar{l}}n_l, \tag{3.259}$$

and $$ {}^{i}_{d}n_{\bar{l}} = {}^{\bar{l}}\tilde{n}_{\bar{l}} \cdot {}^{\bar{l}}n_{l},\ {}_{d}\tau^{i}_{\bar{l}} = \pm\infty;\ \text{if } {}^{i|\bar{l}}_{d}n_{l} = -{}^{\bar{l}}n_{l}, \tag{3.260} $$

Eqs. (3.259) and (3.260) result in Eqs. (3.249) and (3.250) respectively. Q.E.D.

The theorem 3.3 shows the direction alignment can be represent by one Ju-Gibbs Quaternion. i.e. there exists at least one Ju-Gibbs Quaternion for uniaxial rotation. make the Axis-Vector ${}^{\bar{l}}n_l$ align to the desired Axis-Vector ${}_{d}^{i|\bar{l}}n_l$. But unfortunately not all Ju-Gibbs Quaternion can be expressed for multi-axial rotation.

EXAMPLE 3.15. Considering the AC ${}^{i}l_6$ and theorem 3.3, we obtain $$
\begin{aligned}
&\text{if } {}^{3|5}_{d}n_6 = 1^{[x]},\ {}^{5}n_6 = 1^{[z]};\ \text{then } {}^{3}_{d}\tau_5 = 1^{[y]}\\
&\text{if } {}^{3|5}_{d}n_6 = 1^{[y]},\ {}^{5}n_6 = 1^{[z]};\ \text{then } {}^{3}_{d}\tau_5 = -1^{[x]}\\
&\text{if } {}^{3|5}_{d}n_6 = 1^{[y]},\ {}^{5}n_6 = 1^{[x]};\ \text{then } {}^{3}_{d}\tau_5 = 1^{[z]}\\
&\text{if } {}^{3|5}_{d}n_6 = 1^{[z]},\ {}^{5}n_6 = 1^{[x]};\ \text{then } {}^{3}_{d}\tau_5 = -1^{[y]}\\
&\text{if } {}^{3|5}_{d}n_6^{T} = \sqrt{3}/3\cdot[1\ \ 1\ \ 1],\ {}^{5}n_6 = 1^{[x]};\\
&\backslash\text{then } {}^{3}_{d}\tau_5^{T} = \left[0\ \ 0\ \ -\sqrt{2\sqrt{3}-3}/2\right]
\end{aligned}
$$

[2] Direction IK Principle of 2R Robo-Wrist Based on Ju-Gibbs Quaternion

This section elaborates the direction IK theorem based on Ju-Gibbs Direction Quaternion, then proves it.

THEOREM 3.4. If given the 6R AC ${}^{i}l_6$=(i,1:6], the desired Ju-Gibbs Quaternion of Axis #5 is denoted as ${}_{d}^{i}\boldsymbol{\tau}_5$ and the Ju-Gibbs Quaternion of Axis #3 is denoted as ${}^{i}\boldsymbol{\tau}_3$, the inverse solution of direction alignment as follows $$
\begin{cases}
\tau_4 = \dfrac{{}^{3}E_5^{[1][*]}\cdot{}^{3}_{d}\tau_5}{1+{}^{3}n_4^{T}\cdot{}^{4}n_5\cdot{}^{3}E_5^{[3][*]}\cdot{}^{3}_{d}\tau_5}, & \text{if } \begin{matrix}1+{}^{3}n_4^{T}\cdot{}^{4}n_5\cdot\backslash\\ {}^{3}E_5^{[3][*]}\cdot{}^{3}_{d}\tau_5\neq 0\end{matrix},\\
\tau_5 = \dfrac{{}^{3}E_5^{[2][*]}\cdot{}^{3}_{d}\tau_5}{1+{}^{3}n_4^{T}\cdot{}^{4}n_5\cdot{}^{3}E_5^{[3][*]}\cdot{}^{3}_{d}\tau_5} &
\end{cases}
\tag{3.261}
$$

$$ \tau_4 = \frac{{}^{3}E_5^{[3][*]}\cdot{}^{3}_{d}\tau_5}{{}^{3}E_5^{[2][*]}\cdot{}^{3}_{d}\tau_5},\quad \tau_5 = \frac{{}^{3}E_5^{[3][*]}\cdot{}^{3}_{d}\tau_5}{{}^{3}E_5^{[1][*]}\cdot{}^{3}_{d}\tau_5};\ \text{if } \begin{matrix}1+{}^{3}n_4^{T}\cdot{}^{4}n_5\cdot\backslash\\ {}^{3}E_5^{[3][*]}\cdot{}^{3}_{d}\tau_5 = 0\end{matrix}, \tag{3.262} $$

wherein $$ \tau_3{}^{i}\cdot{}_{d}{}^{3}\boldsymbol{\tau}_5 = {}_{d}{}^{3}\bar{\boldsymbol{\tau}}_{i}\cdot{}_{d}{}^{i}\boldsymbol{\tau}_5,\ {}_{d}{}^{i}\tau_5 = {}_{d}{}^{i}n_5\cdot{}_{d}\tau_5{}^{3}, \tag{3.263} $$

$$ {}^{3}E_5{}^{:-1} = [{}^{3}n_4\ {}^{4}n_5\ 3\tilde{n}_4\cdot{}^{4}n_5]. \tag{3.264} $$

Ju-Gibbs Direction Quaternion ${}_{d}^{3}\boldsymbol{\tau}_5$ satisfies $$
\begin{aligned}
&{}_{d}\tau_5^{3} = \frac{{}^{3}E_5^{[3][*]}\cdot{}^{3}_{d}n_5}{\begin{pmatrix}{}^{3}E_5^{[1][*]}\cdot{}^{3}_{d}n_5\cdot{}^{3}E_5^{[2][*]}-{}^{3}E_5^{[3][*]}\\ \backslash\cdot{}^{3}_{d}n_5\cdot{}^{3}n_4^{T}\cdot{}^{4}n_5\cdot{}^{3}E_5^{[3][*]}\end{pmatrix}\cdot{}^{3}_{d}n_5} && \text{if } \begin{matrix}1+{}^{3}n_4^{T}\cdot{}^{4}n_5\cdot\backslash\\ {}^{3}E_5^{[3][*]}\cdot{}^{3}_{d}\tau_5\neq 0\end{matrix}\\
&{}^{3}_{d}\tau_5 = -\frac{1}{{}^{3}n_4^{T}\cdot{}^{4}n_5\cdot{}^{3}E_5^{[3][*]}} && \text{if } \begin{matrix}1+{}^{3}n_4^{T}\cdot{}^{4}n_5\cdot\backslash\\ {}^{3}E_5^{[3][*]}\cdot{}^{3}_{d}\tau_5 = 0\end{matrix}
\end{aligned}
\tag{3.265}
$$

PROOF: From Eq. (2.145), we consider the attitude alignment of Euler quaternion.

$$ \begin{bmatrix} S_4C_5\cdot{}^{3}n_4 + \begin{pmatrix}C_4\cdot S_5\cdot 1+\\ \backslash S_4\cdot S_5\cdot{}^{3}\tilde{n}_4\end{pmatrix}\cdot{}^{4}n_5 \\ C_4C_5 - S_4S_5\cdot{}^{3}n_4^{T}\cdot{}^{4}n_5 \end{bmatrix} = \begin{bmatrix} S(a\tan({}_{d}\tau_5^{3}))\cdot{}^{3}_{d}\tau_5 \\ C(a\tan({}_{d}\tau_5^{3})) \end{bmatrix}, \tag{3.266} $$

Eq. (3.266) results in:

$$ {}_{4}K_4\cdot[\,C_4C_5,\ \ S_4C_5,\ \ C_4S_5\ \ S_4S_5\,]^{T} = \begin{bmatrix} S(\operatorname{atan}({}^{3}_{d}\tau_5))\cdot{}^{3}_{d}n_5 \\ C(\operatorname{atan}({}_{d}\tau_5^{3})) \end{bmatrix}, \tag{3.267} $$

wherein $$ {}_{4}K_4 = \begin{bmatrix} 0_3 & {}^{3}n_4 & {}^{4}n_5 & {}^{3}\tilde{n}_4\cdot{}^{4}n_5 \\ 1 & 0 & 0 & -{}^{3}n_4^{T}\cdot{}^{4}n_5 \end{bmatrix}. \tag{3.268} $$

According to Eqs. (3.246) and (3.268)

$$ {}_{4}K_4^{-1} = \begin{bmatrix} [\,0,\ 0,\ {}^{3}n_4^{T}\cdot{}^{4}n_5\,]\cdot{}^{3}E_5, & 1 \\ {}^{3}E_5, & 0_3 \end{bmatrix} = \begin{bmatrix} {}^{3}n_4^{T}\cdot{}^{4}n_5\cdot{}^{3}E_5^{[3][*]}, & 1 \\ {}^{3}E_5, & 0_3 \end{bmatrix}. \tag{3.269} $$

Eq. (3.267) results in:

$$ [\,C_4C_5,\ \ S_4C_5,\ \ C_4S_5\ \ S_4S_5\,]^{T} = C(\operatorname{atan}({}_{d}\tau_5^{3}))\cdot{}_{4}K_4^{-1}\cdot\begin{bmatrix}{}^{3}_{d}\tau_5\\ 1\end{bmatrix}, \tag{3.270} $$

wherein $$ {}_{d}{}^{3}\tau = {}_{d}\tau_5{}^{3}\cdot{}_{d}{}^{3}n_5. \tag{3.271} $$

According to Eqs. (3.269) and (3.270), $$ \begin{bmatrix} C_4C_5 \\ S_4C_5 \\ C_4S_5 \\ S_4S_5 \end{bmatrix} = C(a\tan({}_{d}\tau_5^{3}))\cdot\begin{bmatrix} 1+{}^{3}n_4^{T}\cdot{}^{4}n_5\cdot{}^{3}E_5^{[3][*]}\cdot{}^{3}_{d}\tau_5 \\ {}^{3}E_5\cdot{}^{3}_{d}\tau_5 \end{bmatrix}, \tag{3.272} $$

Eq. (3.272) results in:

$$ C_4C_5 = C(\operatorname{atan}({}_{d}\tau_5^{3}))\cdot(1-{}^{3}n_4^{T}\cdot{}^{4}n_5\cdot{}^{3}E_5^{[3][*]}\cdot{}^{3}_{d}\tau_5), \tag{3.273} $$

(a) If $$1+{}^3n_4^T\cdot{}^4n_5\cdot{}^3E_5^{[3][*]}\cdot{}_d^3\tau_5=0,$$

the two sides of Eqs. (3.272) and (3.273) both divide it, then $$[1,\ \tau_4,\ \tau_5,\ \tau_4\tau_5]^T=\frac{1}{1+{}^3n_4^T\cdot{}^4n_5\cdot{}^3E_5^{[3][*]}\cdot{}_d^3\tau_5}\cdot\begin{bmatrix}1+{}^3n_4^T\cdot{}^4n_5\cdot{}^3E_5^{[3][*]}\cdot{}_d^3\tau_5\\ {}^3E_5\cdot{}_d^3\tau_5\end{bmatrix}. \quad (3.274)$$

Because ${}_d^i\tau_3\cdot{}_d^3\tau_5={}_d^i\tau_5$, we obtain Eq. (3.263) of the attitude alignment of Ju-Gibbs Quaternion. From Eqs. (3.239) and Ju-Gibbs Quatermon ${}_d^3\tau_5$, we get to $${}^3\tau_5={}^3\tau_5^{[4]}\cdot{}_d^3\tau_5, \quad (3.275)$$

Using canonical Ju-Gibbs Quaternion represent the Joint Variable and combining Eq. (3.234), we get to $${}^3\tau_5=\begin{bmatrix}\tau_4\cdot{}^3n_4+\tau_5\cdot{}^4n_5+\tau_4\tau_5\cdot{}^3\tilde{n}_4\cdot{}^4n_5\\ 1-\tau_4\tau_5\cdot{}^3n_4^T\cdot{}^4n_5\end{bmatrix}, \quad (3.276)$$
$$={}_4K_4\cdot[1,\ \tau_4,\ \tau_5,\ \tau_4\tau_5]^T$$

i.e.

$$={}_4K_4\cdot[1,\ \tau_4,\ \tau_5,\ \tau_4\tau_5]^T={}^3\tau_5. \quad (3.277)$$

Because ${}^3n_4$ and ${}^4n_5$ are independent, the ${}^3E_5$ is nonsingular from Eq. (3.264). Obviously, ${}_4K_4^{-1}$ is determined by structural parameters ${}^3n_4$ and ${}^4n_5$. Substituting Eqs. (3.276), (3.277) and (3.269) into (3.275), obtain $$[1,\ \tau_4,\ \tau_5,\ \tau_4\tau_5]^T=(1-\tau_4\tau_5\cdot{}^3n_4^T\cdot{}^4n_5)\cdot\begin{bmatrix}1+{}^3n_4^T\cdot{}^4n_5\cdot{}^3E_5^{[3][*]}\cdot{}_d^3\tau_5\\ {}^3E_5\cdot{}_d^3\tau_5\end{bmatrix}, \quad (3.278)$$

The first row of Eq. (3.278) can be written as $$\tau_4\tau_5=\frac{{}^3E_5^{[3][*]}\cdot{}_d^3\tau_5}{1+{}^3n_4^T\cdot{}^4n_5\cdot{}^3E_5^{[3][*]}\cdot{}_d^3\tau_5}, \quad (3.279)$$

substituting Eq. (3.279) into (3.278), then $$[1,\ \tau_4,\ \tau_5,\ \tau_4\tau_5]^T=\frac{1}{1+{}^3n_4^T\cdot{}^4n_5\cdot{}^3E_5^{[3][*]}\cdot{}_d^3\tau_5}\cdot\begin{bmatrix}1+{}^3n_4^T\cdot{}^4n_5\cdot{}^3E_5^{[3][*]}\cdot{}_d^3\tau_5\\ {}^3E_5\cdot{}_d^3\tau_5\end{bmatrix}, \quad (3.280)$$

Eqs. (3.274) and (3.280) show that the two methods are equivalent. Using the second and third row of Eq. (3.280) yields $$\tau_4=\frac{{}^3E_5^{[1][*]}\cdot{}_d^3\tau_5}{1+{}^3n_4^T\cdot{}^4n_5\cdot{}^3E_5^{[3][*]}\cdot{}_d^3\tau_5} \quad (3.281)$$
$$\tau_5=\frac{{}^3E_5^{[2][*]}\cdot{}_d^3\tau_5}{1+{}^3n_4^T\cdot{}^4n_5\cdot{}^3E_5^{[3][*]}\cdot{}_d^3\tau_5}.$$

From the Eq. (3.274), the Eq. (3.261) is established. There are four equations and two independent variables in Eq. (3.280). The constraint formulation can be obtained from the 4th row of Eqs. (3.281) and (3.280).

$${}^3E_5^{[1][*]}\cdot{}_d^3\tau_5\cdot{}^3E_5^{[2][*]}\cdot{}_d^3\tau_5={}^3E_5^{[3][*]}\cdot{}_d^3\tau_5\cdot\begin{pmatrix}1+{}^3n_4^T\cdot{}^4n_5\\ \cdot{}^3E_5^{[3][*]}\cdot{}_d^3\tau_5\end{pmatrix}. \quad (3.282)$$

(b) If $1+{}^3n_4^T\cdot{}^4n_5\cdot{}^3E_5^{[3][*]}\cdot{}_d^3\tau_5=0$, we can obtain $C_4C_5-0$ by Using Eq. (3.273). From Eq. (3.267), we obtain $$\begin{cases}-{}^3n_4^T\cdot{}^4n_5\cdot S_4S_5=C(\mathrm{atan}({}_d\tau_5^3))\\ S_4C_5=S(\mathrm{atan}({}_d\tau_5^3))\cdot{}^3E_5^{[1][*]}\cdot{}_d^3n_5,\\ C_4S_5=S(\mathrm{atan}({}_d\tau_5^3))\cdot{}^3E_5^{[2][*]}\cdot{}_d^3n_5\end{cases} \quad (3.283)$$

Eq. (3.283) results in:

$$-{}^3n_4^T\cdot{}^4n_5\cdot\tau_4=\frac{1}{{}^3E_5^{[2][*]}\cdot{}_d^3\tau_5},\quad -{}^3n_4^T\cdot{}^4n_5\cdot\tau_5=\frac{1}{{}^3E_5^{[1][*]}\cdot{}_d^3\tau_5}. \quad (3.284)$$

Obviously, ${}^3n_4^T\cdot{}^4n_5=0$. When ${}^3n_4\cdot{}^4n_5\cdot{}_d^3\tau_5=-1$, if ${}^3E_5^{[3][*]}\cdot{}_d^3\tau_5\neq0$, Eq. (3.282) results in:

$$1+{}^3n_4^T\cdot{}^4n_5\cdot{}^3E_5^{[3][*]}\cdot{}_d^3\tau_5=\frac{{}^3E_5^{[1][*]}\cdot{}_d^3\tau_5\cdot{}^3E_5^{[2][*]}\cdot{}_d^3\tau_5}{{}^3E_5^{[3][*]}\cdot{}_d^3\tau_5}, \quad (3.285)$$

If ${}^3E_5^{[3][*]}\cdot{}_d^3\tau_5\neq0$, Eq. (3.282) results in:

$${}^3E_5^{[1][*]}\cdot{}_d^3\tau_5\cdot{}^3E_5^{[2][*]}\cdot{}_d^3\tau_5=0, \quad (3.286)$$

according to Eqs. (3.286) and (3.281), Eq. (3.262) is also established.

When $${}^3n_4^T\cdot{}^4n_5\cdot{}^3E_5^{[3][\bullet]}\cdot{}_d^3\tau_5=-1,\ \text{if}\ {}^3E_5^{[3][\bullet]}\cdot{}_d^3\tau_5=0, \quad \text{Eq. (3261)}$$

is also established.

To guarantee the orientation alignment, the orientation of ${}^3n_4$ or ${}^4n_5$ is required to keep consistent with ${}_d^3\tau_5$ when ${}^3n_4^T\cdot{}^4n_5\cdot{}^3E_5^{[3][*]}\cdot{}_d^3\tau_5=-1$, Obviously, ${}^3n_4^T\cdot{}^4n_5\neq0$. When ${}^3E_5^{[3][*]}\cdot{}_d^3\tau_5=0$ and ${}^3E_5^{[1][*]}\cdot{}_d^3\tau_5=0$, Eq. (3.285) results in $${}^3E_5^{[3][*]}\cdot{}_d^3\tau_5={}^3E_5^{[1][*]}\cdot{}_d^3\tau_5\cdot{}^3E_5^{[2][*]}\cdot{}_d^3\tau_5,$$

therefore, the Eq. (3.262) was established.

(c) Ju-Gibbs Direction Quaternion

Eqs. (3.261), (3.262) and (3.279) result in $$ {}^{3}E_{5}^{[3][*]}\cdot {}_{d}^{3}\tau_{5}\cdot\left(1+{}^{3}n_{4}^{T}\cdot {}^{4}n_{5}\cdot {}^{3}E_{5}^{[3][*]}\cdot {}_{d}^{3}\tau_{5}\right)={}^{3}E_{5}^{[1][*]}\cdot {}_{d}^{3}\tau_{5}={}^{3}E_{5}^{[2][*]}\cdot {}_{d}^{3}\tau_{5} $$

and $$ 1+{}^{3}n_{4}{}^{T}\cdot{}^{4}n_{5}\cdot{}^{3}E_{5}{}^{[3][*]}\cdot{}_{d}{}^{3}\tau_{5}=0. $$

Taking ${}_{d}{}^{3}\tau_{5}={}_{d}{}^{3}n_{5}\cdot{}_{d}\tau_{5}{}^{3}$ into the above two equations yields Eq. (3.265), which shows ${}_{d}{}^{3}\tau_{5}$ is the special Ju-Gibbs quaternion, called Ju-Gibbs direction quaternion. Q.E.D EXAMPLE 3.16. Continue EXAMPLE 3.15. If ${}^{3}n_{4}=1^{[x]}$, ${}^{4}n_{5}=1^{[y]}$, we can obtain ${}^{3}E_{5}=1$ from Eq. (3.264). Using (3.262), obtain $$ \text{if } {}_{d}^{3|5}n_{6}=1^{[x]},\ {}^{5}n_{6}=1^{[z]};\ \text{then } {}_{d}^{3}\tau_{5}=1^{[y]},\ \phi_{4}^{3}=0,\ \phi_{5}^{4}=0.5\pi. $$

$$ \text{if } {}_{d}^{3|5}n_{6}=1^{[y]},\ {}^{5}n_{6}=1^{[z]};\ \text{then } {}_{d}^{3}\tau_{5}=1^{[x]},\ \phi_{4}^{3}=-0.5\pi,\ \phi_{5}^{4}=0. $$

$$ \text{if } {}_{d}^{3|5}n_{6}=1^{[z]},\ {}^{5}n_{6}=1^{[x]};\ \text{then } {}_{d}^{3}\tau_{5}=1^{[y]},\ \phi_{4}^{3}=0,\ \phi_{5}^{4}=0.5\pi. $$

$$ \text{if } {}_{d}^{3|5}n_{6}=1^{[y]},\ {}^{5}n_{6}=1^{[x]}; $$

$$ \text{then } {}_{d}^{3}\tau_{5}=1^{[z]},\ \phi_{4}^{3}=\pm 0.5\pi,\ \phi_{5}^{4}=\pm 0.5\pi. $$

$$ \text{if } {}_{d}^{3|5}n_{6}^{T}=\sqrt{3}/3\cdot\begin{bmatrix}1 & 1 & 1\end{bmatrix},\ {}^{5}n_{6}=1^{[x]}; $$

$$ \backslash\ \text{then } {}_{d}^{3}\tau_{5}^{T}=\left[0\ \ 0\ \ -\sqrt{2\sqrt{3}-3}\,/\,2\right],\ \phi_{4}^{3}=0,\ \phi_{5}^{4}=0 $$

Theorem 3.3 shows that there is a unique Ju-Gibbs direction quaternion equivalent to DCM. The proving procedure of theorem 3.4 shows Ju-Gibbs quaternion and Euler quaternion are isomorphic, as well as the Quasi-DCM demonstrated by Ju-Gibbs quaternion and DCM are isomorphic from Eq. (3.243). Hence, the posture relation can be expressed completely.

Given the ${}^{i}1_{n}$, $k\in{}^{i}1_{n}$, desired Ju-Gibbs Direction quaternion ${}_{d}{}^{i}\tau_{n}$ and desired position vector ${}_{d}{}^{i}\tau_{n}$. Considering Eq. (3.2) and Eq. (3.275), the posture alignment can be represented as $$ \begin{cases} \sum\limits_{l}^{{}^{i}1_{n}}\left(\prod\limits_{k}^{{}^{i}1_{\bar{l}}}\begin{pmatrix}1+2\cdot\tau_{k}\cdot{}^{\bar{k}}\tilde{n}_{k}+\\ \backslash\tau_{k}^{:2}\cdot\left(1+2\cdot{}^{\bar{k}}\tilde{n}_{k}^{2}\right)\end{pmatrix}\cdot\prod\limits_{k}^{{}^{\bar{l}}1_{\bar{n}}}\left(\tau_{k}^{\bar{k}}\right)\cdot{}^{\bar{l}}r_{l}\right)={}_{d}^{i}r_{n}\cdot\prod\limits_{k}^{{}^{i}1_{\bar{n}}}\left(\tau_{k}^{\bar{k}}\right) \\ \prod\limits_{l}^{{}^{i}1_{\bar{n}}}\left({}^{\bar{l}}\tilde{\tau}_{l}\right)\cdot{}^{\bar{n}}\tau_{n}={}^{i}\tau_{n}^{[4]}\cdot{}_{d}^{i}\tau_{n} \end{cases} \tag{3.287} $$

Considering the invariant of the Euclidean 2-norm of $\tau_{n}{}^{i}$, obtain $$ \tau_{n}^{i}={}^{i}\tau_{n}^{[4]:2}\cdot\left(1+{}_{d}\tau_{n}^{i:2}\right). \tag{3.288} $$

Compared with the Euler quaternion and dual quaternion, the direction alignment represented by Ju-Gibbs Quaternion has non-redundant function. We can solve the Joint Variables of Axis #4 and Axis #6 by direction alignment. This work lay the foundation of inverse solution for 6R and 7R Robo-Arm.

Axis-Invariant Based Cayley-Dixon Determinant

This section discusses nature of radial invariant and AC Dixon determinant, which set the foundation for the Axis-Invariant based 1K analysis and calculation.

[1] Axis-Invariant

Firstly, the Axis-Invariant essentially differ from coordinate axes: A coordinate axis with an origin stands for a reference direction for expression of the translational positions along the direction but cannot fully express the rotation around the direction because of no radial reference direction. That is to say, it has no zero-position to represent rotation. A radial reference needs to be added in actual application. A coordinate axis is 1D. Three 1D reference axes, any two of which are orthogonal, constitute a 3D Cartesian frame. An Axis-Invariant is a 3D spatial reference axis with a radial reference axis, i.e. natural zero-position for reference. A spatial coordinate axis and its radial reference axis are used for the determination of their natural-axis frame.

Secondly, although the eigenvector corresponding to the Eigenvalue 1 of the rotation matrix is the Axis-Vector, the Axis-Invariant essentially differ from the Euler Axis: (a) The Axis-Invariant involves it axial direction and natural zero-position; (b) Any Axis-Invariant has the invariant coordinate vector observed in different coaxial natural frames, and its time derivative always be zero vector. (c) Any Axis-Invariant has excellent spatial operations of polarity, periodicity and nilpotency; (d) In the natural frame system, any Axis-Vector and its joint variable can be used to directly express the rotation matrix; and there is no need to establish the respective system for each link, which significantly reduces the modeling workload.

Meanwhile, there exists only one natural frame used for engineering measurement. And the Axis-Invariant used for structural parameters can be measured precisely. Based on Axis-Invariant, the uniform MAS kinematic equations and dynamic equations can be established, including topology structures, frames, polarity, structural parameters and inertial parameters.

As shown by Eqs. (3.1) and (3.2): The position and attitude equations of the MAS are essentially multivariate polynomial equations; thus, the MAS IK solutions substantially rely on the variable elimination of polynomials, including: Calculations of the Cayley-Dixon matrix and Cayley-Dixon determinant (DET). The 3R Robo-Arm position equation characterized by Eq. (3.2) is three polynomial equations of three variables with 2-Order. The Cayley-Dixon variable elimination method is applied to calculate inverse solutions, with two substitution variables available; for the calculation of 8×8 Cayley-Dixon matrix DET, the maximum possible order is 16. According to Eq.(3.39): The DET calculation is an arrangement process, which may lead to the "combinatorial explosion".

If such problem can be solved within the polynomial time, it is called a NP problem. Non-deterministic algorithm: The non-deterministic algorithm separates such problem into conjecture and verification. The conjecture of such algorithm is non-deterministic. But its verification is deterministic and verifies the correctness of any solutions obtained during such conjecture. The variable elimination process of multivariate polynomials is generally regarded as a non-deterministic polynomial (NP) problem. NP problem. Generally, the variable elimination process of multivariate polynomials with Gröbner bases requires heuristic conjectures and verifications to solve such problem.

According to Eqs. (3.293) and (3.294), The determinant of the three radial vectors of the same axis is zero; the determinant of any two Axis-Vectors of the same axis is also zero. The invariants derived from Axis-Invariant can simplify the DET calculation of the Cayley-Dixon matrix. When applying Dixon elimination, software such as Mathematica and Maple did not know how to apply the domain knowledge of the D-H AC to deal with serious combinatorial explosion problems.

[2] Radial Invariants

Figure 39:
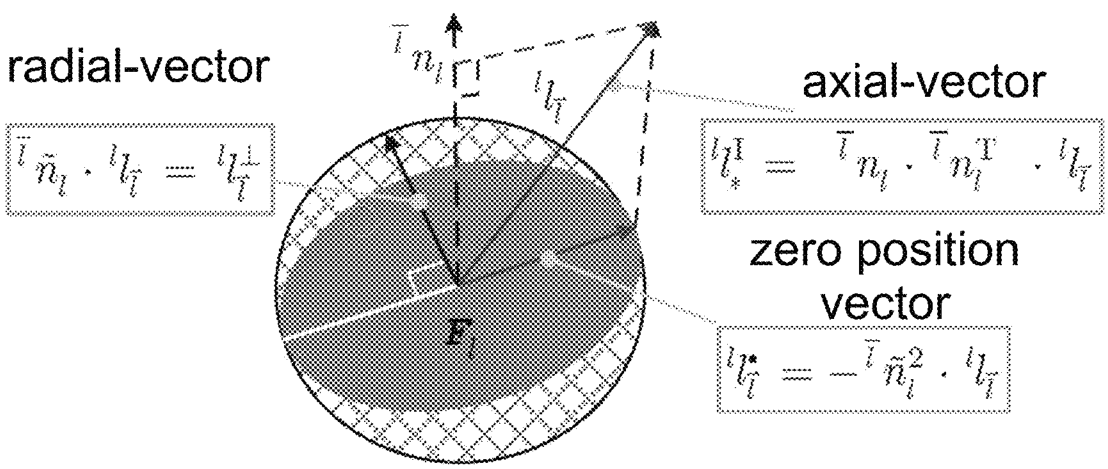
FIG. 39 is a diagram derived invariants of Axis-Invariants.

The structural parameters ${}^{l}l_{\bar{l}}$ and ${}^{\bar{l}}n_{l}$ of Link # l can be measured externally at system zero-position. The zero-position vector, radial vector and Axis-Vector shown in FIG. 39 are the derived invariant graph of the Axis-Invariant. They are invariants independent of the rotation angle. The radial zero-position vector 3901 is aspecific radial vector 3902.

Any vector can be decomposed as radical zero-position vector ${}^{l}l_{\bar{l}}^{\bullet}$ and Axis-Vector ${}^{l}l_{\bar{l}}^{I}$.

$$ {}_{0}{}^{i|l}r_{\bar{l}} \triangleq {}^{i|l}l_{\bar{l}}={}^{i}Q_{\bar{l}}\cdot({}^{\bar{l}}n_{l}\cdot{}^{\bar{l}}n_{l}^{T}-{}^{\bar{l}}\tilde{n}_{l}^{2})\cdot{}^{\bar{l}}Q_{i}\cdot{}^{i}l_{\bar{l}}={}^{i|l}l_{\bar{l}}^{I}+{}^{i|l}l_{\bar{l}}^{\bullet}, \tag{3.289}$$

wherein $$ {}^{l}l_{l}^{I} \triangleq {}^{\bar{l}}n_{l}^{T}\cdot{}^{l}l_{\bar{l}}\cdot{}^{\bar{l}}n_{l},\ {}^{l}l_{\bar{l}}^{\bullet} \triangleq -{}^{\bar{l}}\tilde{n}_{l}^{2}\cdot{}^{l}l_{\bar{l}},\ {}^{l}l_{\bar{l}}^{\circ} \triangleq {}^{\bar{l}}N_{l}\cdot{}^{l}l_{\bar{l}}. \tag{3.290}$$

$$ {}^{\bar{l}}n_{l}\cdot{}^{\bar{l}}n_{l}^{T}-{}^{\bar{l}}\tilde{n}_{l}^{2}=1,\ {}^{l}l_{\bar{l}}-{}^{l}l_{\bar{l}}^{I}+{}^{l}l_{\bar{l}}^{\bullet}. \tag{3.291}$$

Considering Link # $\bar{l}$, its D-H parameters can be written as $$ c_{\bar{l}}={}^{\bar{l}}n_{l}^{T}\cdot{}^{l}l_{l}^{I},\ a_{\bar{l}}={}^{l}l_{\bar{l}}^{\bullet}\,\vdots\,{}^{T}\cdot{}^{\bar{l}}\tilde{n}_{l}\cdot{}^{l}\tilde{n}_{\bar{l}}. \tag{3.292}$$

Evidently, ${}^{l}l_{\bar{l}}^{\bullet}$ is the Radial Vector of Axes #l and # $\bar{l}$, ${}^{l}l_{\bar{l}}^{I}$ is the Axis-Vector of Axis # l. Eq. (3.289) shows that any structural parameters vector ${}^{l}l_{\bar{l}}$ can be divided into zero-position vector ${}^{l}l_{\bar{l}}^{\bullet}$ and Axis-Vector ${}^{l}l_{\bar{l}}^{I}$ which are irrelevant to the coordinates. The radial vector which possess two independent dimensions only determined by structural position vector ${}^{l}l_{\bar{l}}$ and Axis-Invariant ${}^{\bar{l}}n_{l}$. If and two Axis-Vectors ${}^{i|k}l_{\bar{k}}^{I}$ and ${}^{i|l}l_{\bar{l}}^{I}$ are co-axial, they a denoted as $$ {}^{i|k}l_{\bar{k}}^{I}\|{}^{i|l}l_{\bar{l}}^{I}. \tag{3.293}$$

If the two radical vectors ${}^{i|k}l_{\bar{k}}^{I}$ and ${}^{i|l}l_{\bar{l}}^{I}$ are coplanar with any two radial invariants ${}^{i|k}l_{\bar{k}}^{\perp}$ and ${}^{i|l}l_{\bar{l}}^{\perp}$, we denoted them as $$ \diamond\left({}^{i|k}l_{\bar{k}}^{I},\ {}^{i|l}l_{\bar{l}}^{I},\ {}^{i|k}l_{\bar{k}}^{I},\ {}^{i|l}l_{\bar{l}}^{I}\right). \tag{3.294}$$

Therefore, Eq. (3.290) shows that the Axis-Invariant and the radical invariant are the factors of the Natural-Axis according to structural vectors.

The relations of the zero-position vector, radial vector and Axis-Vector which derived by Axis-Invariant can be written as $$ {}^{\bar{l}}N_{l}\cdot{}^{l}l_{\bar{l}}^{\bullet}=-{}^{l}l_{\bar{l}}^{\bullet}, \tag{3.295}$$

$$ {}^{\bar{l}}\tilde{n}_{l}\cdot{}^{l}l_{\bar{l}}^{\bullet}={}^{l}l_{\bar{l}}^{\perp},{}^{\bar{l}}\tilde{n}_{l}\cdot{}^{l}l_{\bar{l}}^{\perp}=-{}^{l}l_{\bar{l}}^{\bullet},{}^{\bar{l}}\tilde{n}_{l}\cdot{}^{l}l_{\bar{l}}^{I}=0_{3}, \tag{3.296}$$

$$ {}^{\bar{l}}N_{l}\cdot{}^{l}l_{\bar{l}}^{I}={}^{l}l_{\bar{l}}^{I}. \tag{3.297}$$

PROOF: Eq. (3.290) results in $$ {}^{\bar{l}}N_{l}\cdot{}^{l}l_{\bar{l}}^{\bullet}=-(1+2\cdot{}^{\bar{l}}\tilde{n}_{l}^{2})\cdot{}^{\bar{l}}\tilde{n}_{l}^{2}\cdot{}^{l}l_{\bar{l}}=-({}^{\bar{l}}\tilde{n}_{l}^{2}+2\cdot{}^{\bar{l}}\tilde{n}_{l}^{4})\cdot{}^{l}l_{\bar{l}}=-{}^{l}l_{\bar{l}}^{\bullet}.$$

The Eq. (3.295) is valid. Eq. (3.290) results in $$ {}^{\bar{l}}\tilde{n}_{l}\cdot{}^{l}l_{\bar{l}}^{\bullet}=-{}^{\bar{l}}\tilde{n}_{l}\cdot{}^{\bar{l}}\tilde{n}_{l}^{2}\cdot{}^{l}l_{\bar{l}}={}^{\bar{l}}\tilde{n}_{l}\cdot{}^{l}l_{\bar{l}}={}^{l}\tilde{n}_{\bar{l}}^{\perp}$$

$$ {}^{\bar{l}}\tilde{n}_{l}\cdot{}^{l}l_{\bar{l}}^{\perp}={}^{\bar{l}}\tilde{n}_{l}^{2}\cdot{}^{l}l_{\bar{l}}=-{}^{l}l_{\bar{l}}^{\bullet},{}^{\bar{l}}\tilde{n}_{l}\cdot{}^{l}l_{\bar{l}}^{I}=0_{3}$$

The Eq. (3.296) is valid. Eq. (3.290) results in $$ {}^{\bar{l}}N_{l}\cdot{}^{l}l_{\bar{l}}^{I}=(1+2\cdot{}^{\bar{l}}\tilde{n}_{l}^{2})\cdot{}^{\bar{l}}n_{l}\cdot{}^{\bar{l}}n_{l}^{T}\cdot{}^{l}l_{\bar{l}}={}^{\bar{l}}n_{l}\cdot{}^{\bar{l}}n_{l}^{T}\cdot{}^{l}l_{\bar{l}}={}^{l}l_{l}^{I}.$$

The Eq. (3.297) is valid. Q.E.D

Eq. (3.295) is called the inverse formula of the zero vector; Eq. (3.296) is called the exchange formula of zero vector and radial vector; Eq. (3.297) is called the radial vector invariance formula. Using Eqs. (3.289), and (3.295)-(3.297), we can acquire $$ {}^{l}l_{\bar{l}}^{\circ}={}^{\bar{l}}N_{l}\cdot{}^{l}l_{\bar{l}}=(1+2\cdot{}^{\bar{l}}\tilde{n}_{l}^{2})\cdot({}^{l}l_{\bar{l}}^{I}+{}^{l}l_{\bar{l}}^{\bullet})={}^{l}l_{\bar{l}}^{I}-{}^{l}l_{\bar{l}}^{\bullet}. \tag{3.298}$$

$$ {}^{\bar{l}}\tilde{n}_{l}\cdot{}^{l}l_{\bar{l}}={}^{\bar{l}}\tilde{n}_{l}\cdot({}^{l}l_{\bar{l}}^{I}+{}^{l}l_{\bar{l}}^{\bullet})={}^{\bar{l}}\tilde{n}_{l}\cdot{}^{l}l_{\bar{l}}^{\bullet}={}^{l}l_{\bar{l}}^{\perp}. \tag{3.299}$$

Eq. (3.298) results in $$ -{}^{\bar{l}}\tilde{n}_{l}^{2}\cdot{}^{l}l_{l}=({}^{l}l_{l}-{}^{l}N_{l}\cdot{}^{l}l_{l})/2={}^{l}l_{l}^{\bullet}. \tag{3.300}$$

Since ${}^{\bar{l}}N_{l}$ is the structure constant of ${}^{\bar{l}}Q_{l}$'s symmetric part, so Eq. (3.298) is the symmetric decomposition of the vector ${}^{l}l_{\bar{l}}$. Since ${}^{\bar{l}}n_{l}$ is the structural constant of ${}^{\bar{l}}Q_{l}$ antisymmetric part, so Eq. (3.299) is the antisymmetric decomposition of the vector ${}^{l}l_{l}$. Eq. (3.300) is zero equation.

[3] Properties of Cayley-Dixon determinant of ACs

Define $$ {}^{\bar{l}}n_{l}^{l} \triangleq {}^{\bar{l}}\tilde{n}_{\bar{l}}\cdot{}^{\bar{l}}n_{l},n_{l}^{\bar{l}}\,\vdots\,\mathrm{I} \triangleq {}^{\bar{l}}n_{\bar{l}}^{T}\cdot{}^{\bar{l}}n_{l}, \tag{3.301}$$

Eq. (3.233) results in:

$$ {}^{i}\tau_{3}=\begin{bmatrix}1+\tau_{1}\cdot{}^{i}\tilde{n}_{1} & \tau_{1}\cdot{}^{i}n_{1}\\ -\tau_{1}\cdot{}^{i}n_{1}^{T} & 1\end{bmatrix}\cdot\begin{bmatrix}1+\tau_{2}\cdot{}^{i}\tilde{n}_{2} & \tau_{2}\cdot{}^{1}n_{2}\\ -\tau_{2}\cdot{}^{1}n_{2}^{T} & 1\end{bmatrix}\cdot{}^{2}\tau_{3}=N\cdot T, \tag{3.302}$$

wherein $$ N=\begin{bmatrix}0_{3} & {}^{i}n_{1} & {}^{1}n_{2} & {}^{2}n_{3} & {}^{1}n_{2}^{\perp} & {}^{i}\tilde{n}_{1}\cdot{}^{2}n_{3} & {}^{2}n_{3}^{\perp} & {}^{i}\tilde{n}_{1}\cdot{}^{2}n_{3}^{\perp}-n_{3}^{2:\mathrm{I}}\cdot{}^{i}n_{1}\\ 1 & 0 & 0 & 0 & -n_{2}^{1:\mathrm{I}} & -{}^{i}n_{1}^{T}\cdot{}^{2}n_{3} & -n_{3}^{2:\mathrm{I}} & -{}^{i}n_{1}^{T}\cdot{}^{2}n_{3}^{\perp}\end{bmatrix}.$$

$$ T=[\,1\ \ \tau_{1}\ \ \tau_{2}\ \ \tau_{3}\ \ \tau_{2}\tau_{1}\ \ \tau_{3}\tau_{1}\ \ \tau_{3}\tau_{2}\ \ \tau_{3}\tau_{2}\tau_{1}\,]^{T}$$

$$ T=[1\ \tau_{1}\ \tau_{2}\ \tau_{3}\ \tau_{2}\tau_{1}\ \tau_{3}\tau_{1}\ \tau_{3}\tau_{2}\ \tau_{3}\tau_{2}\tau_{1}]^{T}$$

Considering Eq. (3.302), if M is a matrix of 4×4, it yields $$ {}^{i}\tau_{3}^{T}\cdot M\cdot{}^{i}\tau_{3}=T^{T}\cdot N^{T}\cdot M\cdot N\cdot T= \tag{3.303}$$

$$ \sum_{\alpha[1:3]}^{[0:7]}\sum_{\beta[1:3]}^{[0:7]}\left(\left[N^{T}\cdot M\cdot N\right]_{\alpha[1:3]}^{\beta[1:3]}\cdot\tau_{1}^{\vdots\alpha[1]+\beta[1]}\tau_{2}^{\vdots\alpha[2]+\beta[2]}\tau_{3}^{\vdots\alpha[3]+\beta[3]}\right),$$

$$ \tau_{2}^{\vdots\alpha[2]}\tau_{3}^{\vdots\alpha[3]}\cdot{}^{i}\tau_{3}=\sum_{\beta[1:3]}^{[0:7]}\left(N_{[*]}^{\beta[1:3]}\cdot\tau_{1}^{\vdots\beta[1]}\tau_{2}^{\vdots\alpha[2]+\beta[2]}\tau_{3}^{\vdots\alpha[3]+\beta[3]}\right)$$

Eq. (3.303) has the iterative structure used for the 1K of general 6R Robo-Arms.

$$ \overline{{}^{i}\tau_{3}^{T}.\,M\cdot{}^{i}\tau_{3}}(y_{2}|\tau_{2})=\sum_{\alpha[1:3]}^{[0:7]}\sum_{\beta[1:3]}^{[0:7]}\begin{pmatrix}\left[N^{T}\cdot M\cdot N\right]_{\alpha[1:3]}^{\beta[1:3]}\cdot\tau_{1}^{\vdots\alpha[1]+\beta[1]}\\ \backslash\bar{\tau}_{2}^{\vdots\alpha[2]+\beta[2]}(y_{2}|\tau_{2})\tau_{3}^{\vdots\alpha[3]+\beta[3]}\end{pmatrix} \tag{3.304}$$

$$ \overline{{}^{i}\tau_{3}^{T}.\,M\cdot{}^{i}\tau_{3}}(y_{[2:3]}|\tau_{[2:3]})=\sum_{\alpha[1:3]}^{[0:7]}\sum_{\beta[1:3]}^{[0:7]}\begin{pmatrix}\left[N^{T}\cdot M\cdot N\right]_{\alpha[1:3]}^{\beta[1:3]}\cdot\tau_{1}^{\vdots\alpha[1]+\beta[1]}\\ \backslash y_{2}^{\vdots\alpha[2]+\beta[2]}\tau_{3}^{\vdots\alpha[3]+\beta[3]}(y_{3}|\tau_{3})\end{pmatrix},$$

$$ \overline{\tau_{2}^{\vdots\alpha[2]}\tau_{3}^{\vdots\alpha[3]}\cdot{}^{i}\tau_{3}}(y_{2}|\tau_{2})=\sum_{\beta[1:3]}^{[0:7]}\left(N_{[*]}^{\beta[1:3]}\cdot\tau_{1}^{\vdots\beta[1]}\bar{\tau}_{2}^{\vdots\alpha[2]+\beta[2]}\tau_{3}^{\vdots\alpha[3]+\beta[3]}\right) \tag{3.305}$$

$$ \overline{\tau_{2}^{\vdots\alpha[2]}\tau_{3}^{\vdots\alpha[3]}\cdot{}^{i}\tau_{3}}(y_{[2:3]}|\tau_{[2:3]})=\sum_{\beta[1:3]}^{[0:7]}\left(N_{[*]}^{\beta[1:3]}\cdot\tau_{1}^{\vdots\beta[1]}y_{2}^{\vdots\alpha[2]+\beta[2]}\bar{\tau}_{3}^{\vdots\alpha[3]+\beta[3]}\right),$$

-continued and $$\bar{\tau}_l^{:[0:1]}(y_l|\tau_l)=1,\ \bar{\tau}_l^{:2}(y_l|\tau_l)=y_l+\tau_l.$$

According to Eqs. (3.242) and (3.290), $$^{\bar{l}}Q_l(y_l)=1+2\cdot y_l\cdot{}^{\bar{l}}\tilde{n}_l+y_l^{:2}\cdot{}^{\bar{l}}N_l$$

$$^{\bar{l}}\overline{Q}_l(y_l|\tau_l)=2\cdot{}^{\bar{l}}\tilde{n}_l+(y_l+\tau_l)\cdot{}^{\bar{l}}N_l. \quad (3.306)$$

It is easy to prove by Eq. (3.306), $$^{\bar{l}}Q_l(y_l)=1-\tau_l y_l\cdot{}^{\bar{l}}N_l+y_l\cdot{}^{\bar{l}}\overline{Q}_l(y_l|\tau_l)$$

$$^{\bar{l}}Q_l=1-\tau_l y_l\cdot{}^{\bar{l}}N_l+\tau_l\cdot{}^{\bar{l}}\overline{Q}_l(y_l|\tau_l). \quad (3.307)$$

Eq. (3.307) results in $$^{\bar{l}}Q_l(y_l)\cdot{}^l l_{\bar{l}}={}^l l_{\bar{l}}+2y_l\cdot{}^l l_{\bar{l}}^{\perp}+y_l^{:2}\cdot{}^l l_{\bar{l}}^{\circ}$$

$$^{\bar{l}}\overline{Q}_l(y_l|\tau_l)\cdot{}^l l_{\bar{l}}=2\cdot{}^{\bar{l}}\tilde{n}_l\cdot{}^l l_{\bar{l}}^{\perp}+(y_l+\tau_l)\cdot{}^l l_{\bar{l}}^{\circ}. \quad (3.308)$$

From Eq. (3.307), $^{\bar{l}}Q_l(y_l)$ and $^{\bar{l}}Q_l$ can be translate into the multiple linear model regarding to $^{\bar{l}}\overline{Q}_l(y_l|\tau_l)$ which possess symmetry between $y_l$ and $\tau_l$. According to Eqs. (3.289), (3.295) and (3.297).

$$^{\bar{l}}Q_l\cdot{}^l l_{\bar{l}}={}^l l_{\bar{l}}+2\tau_l\cdot{}^l l_{\bar{l}}^{\perp}+\tau_l^{:2}\cdot{}^l l_{\bar{l}}^{\circ}={}^l l_{\bar{l}}^{I}+{}^l l_{\bar{l}}^{\bullet}+2\tau_l\cdot{}^l l_{\bar{l}}^{\perp}$$

$$+\tau_l^{:2}\cdot({}^l l_{\bar{l}}^{I}-{}^l l_{\bar{l}}^{\bullet})=(1+\tau_l^{:2})\cdot{}^l l_{\bar{l}}^{I}+(1-\tau_l^{:2})\cdot{}^l l_{\bar{l}}^{\bullet}+2\tau_l\cdot{}^l l_{\bar{l}}^{\perp}. \quad (3.309)$$

Eq. (3.309) is constructed by the joint variable$^{T1}$ and the three independent structural vectors of $^l l_{\bar{l}}^{I}$, $^l l_{\bar{l}}^{\bullet}$ and $^l l_{\bar{l}}^{\perp}$. Eq. (3.309) results in $$^{\bar{l}}\overline{Q}_l(y_l|\tau_l)\cdot{}^l l_{\bar{l}}=(y_l+\tau_l)\cdot({}^l l_{\bar{l}}^{I}-{}^l l_{\bar{l}}^{\bullet})+2\cdot{}^l l_{\bar{l}}^{\perp} \quad (3.310)$$

$$^{\bar{l}}Q_l(y_l)\cdot{}^l l_{\bar{l}}=(1+y_l^{:2})\cdot{}^l l_{\bar{l}}^{I}+(1-y_l^{:2})\cdot{}^l l_{\bar{l}}^{\bullet}+2y_l\cdot{}^l l_{\bar{l}}^{\perp}.$$

$$[\![{}^{\bar{l}}Q_l\cdot{}^l l_{\bar{l}},\ {}^{\bar{l}}\overline{Q}_l(y_l|\tau_l)\cdot{}^l l_{\bar{l}},\ {}^{\bar{l}}Q_l(y_l)\cdot{}^l l_{\bar{l}}]\!]= \quad (3.311)$$

$$[\![{}^{\bar{l}}Q_l(y_l|\tau_l)\cdot{}^l l_{\bar{l}},\ {}^{\bar{l}}\overline{Q}_l(\tau_l|y_l)\cdot{}^l l_{\bar{l}},\ {}^{\bar{l}}Q_{\bar{l}}(\tau_l|y_l)\cdot{}^l l_{\bar{l}}]\!]=0.$$

According to Eqs. (3.307) and (3.311), $$[\![{}^{\bar{l}}Q_l\cdot{}^l l_i,\ {}^{\bar{\bar{l}}}\overline{Q}_{\bar{l}}(y_{\bar{l}}|\tau_{\bar{l}})\cdot{}^{\bar{l}}\overline{Q}_l\cdot{}^l l_i,\ {}^{\bar{\bar{l}}}Q_{\bar{l}}(y_{\bar{l}})\cdot{}^{\bar{l}}\overline{Q}_l(y_l|\tau_l)\cdot{}^l l_i]\!]= \quad (3.312)$$

$$[\![(1-\tau_{\bar{l}}y_{\bar{l}}\cdot{}^{\bar{\bar{l}}}N_{\bar{l}})\cdot{}^{\bar{l}}Q_l\cdot{}^l l_{\bar{l}},\ {}^{\bar{\bar{l}}}\overline{Q}_{\bar{l}}(y_{\bar{l}}|\tau_{\bar{l}})\cdot{}^{\bar{l}}Q_l\cdot{}^l l_{\bar{l}},\ {}^{\bar{\bar{l}}}Q_{\bar{l}}$$

$$(y_{\bar{l}})\cdot{}^{\bar{l}}\overline{Q}_l(y_l|\tau_l)\cdot{}^l l_{\bar{l}}]\!]=[\![\begin{pmatrix}1-\tau_{\bar{l}}y_{\bar{l}}\cdot\\ {}^{\bar{\bar{l}}}N_{\bar{l}}\end{pmatrix}\cdot\begin{pmatrix}1-\tau_l y_l\cdot{}^{\bar{l}}N_l+\tau_l\cdot\\ {}^{\bar{l}}\overline{Q}_l(y_l|\tau_l)\end{pmatrix}\cdot$$

$$^l l_{\bar{l}},\ {}^{\bar{\bar{l}}}\overline{Q}_{\bar{l}}(y_{\bar{l}}|\tau_{\bar{l}})\cdot(1-\tau_l y_l\cdot{}^{\bar{l}}N_l+\tau_l\cdot{}^{\bar{l}}\overline{Q}_l(y_l|\tau_l))\cdot{}^l l_{\bar{l}},$$

$$(1-\tau_{\bar{l}}y_{\bar{l}}\cdot{}^{\bar{\bar{l}}}N_{\bar{l}}+y_{\bar{l}}\cdot{}^{\bar{\bar{l}}}\overline{Q}_{\bar{l}}(y_{\bar{l}}|\tau_{\bar{l}}))\cdot{}^{\bar{l}}\overline{Q}_l(y_l|\tau_l)\cdot{}^l l_{\bar{l}}]\!].$$

According to Eqs. (3.307) and (3.312), $$[\![{}^{\bar{l}}Q_l\cdot{}^l l_{\bar{l}},\ {}^{\bar{\bar{l}}}\overline{Q}_{\bar{l}}(y_{\bar{l}}|\tau_{\bar{l}})\cdot{}^{\bar{l}}Q_l\cdot{}^l l_{\bar{l}},\ {}^{\bar{\bar{l}}}Q_{\bar{l}}(y_{\bar{l}})\cdot{}^{\bar{l}}\overline{Q}_l \quad (3.313)$$

$$(y_l|\tau_l)\cdot{}^l l_{\bar{l}}]\!]=[\![(1-\tau_{\bar{l}}y_{\bar{l}}\cdot{}^{\bar{\bar{l}}}N_{\bar{l}})\cdot(1-\tau_l y_l\cdot{}^{\bar{l}}N_{\bar{l}})\cdot{}^l l_{\bar{l}},\ {}^{\bar{\bar{l}}}\overline{Q}_{\bar{l}}$$

$$(y_{\bar{l}}|\tau_{\bar{l}})\cdot\begin{pmatrix}1-\tau_l y_l\cdot\\ {}^{\bar{l}}N_l\end{pmatrix}\cdot{}^l l_{\bar{l}},\begin{pmatrix}1-\tau_{\bar{l}}y_{\bar{l}}\cdot\\ {}^{\bar{\bar{l}}}N_{\bar{l}}\end{pmatrix}\cdot{}^{\bar{l}}\overline{Q}_l(y_l|\tau_l)\cdot{}^l l_{\bar{l}}]\!]+$$

-continued $$y_{\bar{l}}\cdot[\![(1-\tau_{\bar{l}}y_{\bar{l}}\cdot{}^{\bar{\bar{l}}}N_{\bar{l}})\cdot(1-\tau_l y_l\cdot{}^{\bar{l}}N_l)\cdot{}^l l_{\bar{l}},$$

$$^{\bar{\bar{l}}}\overline{Q}_{\bar{l}}(y_{\bar{l}}|\tau_{\bar{l}})\cdot(1-\tau_l y_l\cdot{}^{\bar{l}}N_l)\cdot{}^l l_{\bar{l}},\ {}^{\bar{\bar{l}}}\overline{Q}_{\bar{l}}(y_{\bar{l}}|\tau_{\bar{l}})\cdot{}^{\bar{l}}\overline{Q}_l(y_l|\tau_l)\cdot{}^l l_{\bar{l}}]\!]+$$

$$\tau_l\cdot[\![(1-\tau_{\bar{l}}y_{\bar{l}}\cdot{}^{\bar{\bar{l}}}N_{\bar{l}})\cdot(1-\tau_l y_l\cdot{}^{\bar{l}}N_l)\cdot{}^l l_{\bar{l}},\ {}^{\bar{\bar{l}}}\overline{Q}_{\bar{l}}(y_{\bar{l}}|\tau_{\bar{l}})\cdot{}^{\bar{l}}\overline{Q}_l(y_l|\tau_l)\cdot{}^l l_{\bar{l}},$$

$$(1-\tau_{\bar{l}}y_{\bar{l}}\cdot{}^{\bar{\bar{l}}}N_{\bar{l}})\cdot{}^{\bar{l}}\overline{Q}_l(y_l|\tau_l)\cdot{}^l l_{\bar{l}}]\!]+y_{\bar{l}}\tau_l\cdot[\![(1-\tau_{\bar{l}}y_{\bar{l}}\cdot{}^{\bar{\bar{l}}}N_{\bar{l}})\cdot{}^{\bar{l}}\overline{Q}_l(y_l|\tau_l)\cdot{}^l l_{\bar{l}},$$

$$^{\bar{\bar{l}}}\overline{Q}_{\bar{l}}(y_{\bar{l}}|\tau_{\bar{l}})\cdot(1-\tau_l y_l\cdot{}^{\bar{l}}N_l)\cdot{}^l l_{\bar{l}},\ {}^{\bar{\bar{l}}}\overline{Q}_{\bar{l}}(y_{\bar{l}}|\tau_{\bar{l}})\cdot{}^{\bar{l}}\overline{Q}_l(y_l|\tau_l)\cdot{}^l l_{\bar{l}}]\!].$$

Direct calculation of $[{}^{\bar{\bar{l}}}Q_{\bar{l}}\cdot{}^{\bar{l}}Q_l\cdot{}^l l_{\bar{l}}, {}^{\bar{\bar{l}}}\overline{Q}_{\bar{l}}(y_{\bar{l}}|\tau_{\bar{l}})\cdot{}^{\bar{l}}Q_l\cdot{}^l l_{\bar{l}}, {}^{\bar{\bar{l}}}Q_{\bar{l}}(y_{\bar{l}})\cdot{}^{\bar{l}}\overline{Q}_l(y_l|\tau_l)\cdot{}^l l_{\bar{l}}]$ is much more complicate than using Eq. (3.313). Because $^{\bar{l}}N_i\cdot{}^{\bar{l}}N_l\cdot{}^l l_{\bar{l}}$ doesn't exist in the three columns of the determinant at one time. Therefore, Eq. (3.313) whose variables $y_2$, $\tau_2$, $\tau_3$ and $y_3$ are with 3-orders, 3-orders, 3-orders and 1-order respectively.

[4] Direction 1K Solution of 2R Robo-Wrist Based on Quasi-DCM

Since we can't express all decided Ju-Gibbs direction quaternions for 2R Robo-Wrist IK, we have to resort Quasi-DCM to obtain all solution of joint variables, which is elaborated by the direction IK theorem based on Quasi-DCM as follows.

THEOREM 3.5. Given the 6R AC $^i l_6=(i,1{:}6]$, the axis vector $^3n_4$ and $^4n_5$, the desired DCM of Axis #5 is denoted as $_d{}^iQ_5$ and the desired DCM of Axis #3 is denoted as $_d{}^iQ_3$, the inverse solutions of the direction $^5l_6$ aligned with the desired direction $_d{}^{3|5}l_6$ satisfy the following equation $$\begin{bmatrix}{}^5l_6-{}_d^{3|5}l_6, & 2\cdot{}^3\tilde{n}_4\cdot{}^5l_6, & 2\cdot{}^5l_6^{\perp}, & 4\cdot{}^3\tilde{n}_4\cdot{}^5l_6^{\perp}, & {}^3N_4\cdot{}^5l_6-{}_d^{3|5}l_6,\\ {}^5l_6^{\circ}-{}_d^{3|5}l_6, & 2\cdot{}^3N_4\cdot{}^5l_6^{\perp}, & 2\cdot{}^3\tilde{n}_4\cdot{}^5l_6^{\circ}, & {}^3N_4\cdot{}^5l_6^{\circ}-{}_d^{3|5}l_6\end{bmatrix}\cdot\begin{bmatrix}1, & \tau_4, & \tau_5, & \tau_4\cdot\tau_5, & \tau_4^{:2}, & \tau_5^{:2},\\ \tau_4^{:2}\cdot\tau_5, & \tau_4\cdot\tau_5^{:2}, & \tau_4^{:2}\cdot\tau_5^{:2}\end{bmatrix}^T=0_3 \quad (3.314)$$

PROOF: The direction $^5l_6$ aligned with desired direction $_d{}^{3|5}l_6$ satisfies $$_d{}^{3|5}l_6={}_d{}^3Q_5\cdot{}^5r_6={}^3Q_4\cdot{}^4Q_5\cdot{}^5l_6. \quad (3.315)$$

From Eq. (3.240), arrive at $$\tau_4{}^3\cdot\tau_5{}^4\cdot{}^{3|5}l_6={}^3Q_4\cdot{}^4Q_5\cdot{}^5l_6. \quad (3.316)$$

i.e $$\begin{aligned}&\tau_4^{:2}\cdot\tau_5^{:2}\cdot({}^3N_4\cdot{}^5l_6^{\circ}-{}^{3|5}l_6)+2\cdot\tau_4^{:2}\cdot\tau_5\cdot{}^3N_4\cdot{}^5l_6^{\perp}\\&+2\cdot\tau_4\cdot\tau_5^{:2}\cdot{}^3\tilde{n}_4\cdot{}^5l_6^{\circ}+\tau_4^{:2}\cdot({}^3N_4\cdot{}^5l_6-{}^{3|5}l_6)\\&+\tau_5^{:2}\cdot({}^5l_6^{\circ}-{}^{3|5}l_6)4\cdot\tau_4\cdot\tau_5\cdot{}^3\tilde{n}_4\cdot{}^5l_6^{\perp}\\&+2\cdot\tau_4\cdot{}^3\tilde{n}_4\cdot{}^5l_6+2\cdot\tau_5\cdot{}^5l_6^{\perp}+({}^5l_6-{}^{3|5}l_6)=0_3\end{aligned} \quad (3.317)$$

And Eq. (3.317) is re-expressed as Eq. (3.314).

Axis-Invariant Based Position IK Solution Principle and Promotion of 3R Robo-Arms The 3R Robo-Arm inverse position solution means: If the structural parameters and desired positions of the 3R Robo-Arm are given, three joint variables can be calculated to achieve the alignment between wrist center position and desired positions. The first part describes the inverse solution of the 3R Robo-Arm position based on D-H parameters, but has the following disadvantages: The process of establishing D-H system and D-H parameters is unnatural and cumbersome to apply; need to deal with the singularity problem caused by the calculation method; easy to introduce system measurement error when applied; this method is difficult to generalize this method for solving problems concerning the general 6R Robo-Arm inverse solution. Therefore, it is necessary to study the principle of the position inverse solution of 3R Robo-Arm based on Axis-Invariant, and explain the steps of using the Cayley-Dixon elimination principle to calculate the inverse solution to position and attitude of general 6R Robo-Arm.

[1] According to the n-Dimensional 3D Vector Attitude Equation, n 2-Order Polynomial Equation of 3R Robo-Arms are Obtained Eq. (3.2) results in the 3R kinematic equation $$ {}^{i}r_{3S} - {}^{i}_{d}r_{3S} = {}^{i}Q_1 \cdot {}^{1}l_2 + {}^{i}Q_2 \cdot {}^{2}l_3 + {}^{i}Q_3 \cdot {}^{3}l_{3S} - {}^{i}_{d}r_{3S} = 0_3, \quad (3.318) $$

Eq. (3.318) results in:

$$ \tau_1^i \cdot \tau_3^1 \cdot ({}^{i}r_{3S} - {}^{i}_{d}r_{3S}) = \tau_3^1 \cdot {}^{i}Q_1 \cdot {}^{1}l_2 + \tau_3^2 \cdot {}^{i}Q_2 \cdot {}^{2}l_3 \backslash + {}^{i}Q_3 \cdot {}^{3}l_{3S} - \tau_1^i \cdot \tau_2^1 \cdot \tau_3^2 \cdot {}^{i}_{d}r_{3S} = 0_3, \quad (3.319) $$

Eq. (3.319) results in:

$$ \tau_1{}^{i} \cdot \tau_3{}^{1} \cdot {}^{1}Q_{i} \cdot ({}^{i}r_{3S} - {}^{i}_{d}r_{3S}) = -\tau_1{}^{i} \cdot \tau_3{}^{1} \cdot {}^{1}Q_{i} \cdot {}^{i}_{d}r_{3S} + \tau_1{}^{i:2} \cdot (\tau_3{}^{1} \cdot {}^{1}l_2 + \tau_3{}^{2} \cdot {}^{1}Q_2 \cdot {}^{2}l_3 + {}^{1}Q_3 \cdot {}^{3}l^{3S}) = 0_3, \quad (3.320) $$

If $$ {}^{2}r_{3S} = \tau_3{}^{1} \cdot {}^{i}Q_1 \cdot {}^{1}l_2 + \tau_3{}^{2} \cdot {}^{i}Q_2 \cdot {}^{2}l_3 + {}^{i}Q_3 \cdot {}^{3}l_{3S} $$

$$ {}^{1|i}r_{3S} = \tau_3{}^{1} \cdot {}^{1}l_2 + \tau_3{}^{2} \cdot {}^{1}Q_2 \cdot {}^{2}l_3 + {}^{1}Q_3 \cdot {}^{3}l_{3S}, \quad (3.321) $$

Eqs. (3.241) and (3.321) result in $$ {}^{1|i}r^{3S} = \tau_1{}^{i:-2} \cdot {}^{1}Q_{i} \cdot {}^{1}r_{3S}. \quad (3.322) $$

Eqs. (3.320) and (3.321) result in:

$$ f^{[1:3]} = \tau_3{}^{1} \cdot {}^{1}Q_{i} \cdot ({}^{1}r_{3S} \cdot {}_{d}{}^{i}r_{3S}) = \tau_1{}^{i} \cdot {}^{1|i}r_{3S} - \tau_3{}^{1} \cdot {}^{1}Q_{i} \cdot {}_{d}{}^{i}r_{3S} = 0_3. \quad (3.323) $$

[2] The Structure of the Cayley-Dixon Matrix of 3R Robo-Arms

The structure of the Cayley-Dixon matrix of the 3R Robo-Arm kinematic equation is described by theorem 3.6, and to be proved.

THEOREM 3.6. The position equation of 3R Robo-Arms is expressed as $$ f^{[1:3]} = -\tau_3^1 \cdot {}^{1}Q_i \cdot {}^{i}_{d}r_{3S} + \tau_1^i \cdot \begin{pmatrix} \tau_3^1 \cdot {}^{1}l_2 + \tau_3^2 \cdot {}^{1}Q_2 \backslash \cdot \\ {}^{2}l_3 + {}^{1}Q_3 \cdot {}^{3}l_{3S} \end{pmatrix} = 0_3, \quad (3.324) $$

the polynomial system $F_3(Y_2|T_2)$ as $$ \mathrm{Det}(F_3(Y_2 \mid T_2)) / \tau_1^{i:2} \underset{con}{=} Y_2^{\beta,T} \cdot {}_{S}\ominus_{S}(\tau_1) \cdot T_2^{\beta}, \quad (3.325) $$

wherein $$ {}_{S}\overline{\ominus}_{S}^{[i][j]}(\tau_1) = \sum_{i}^{[0:2]} \left( {}_{S}\overline{\ominus}_{S}^{[i][j][i]} \cdot \tau_1^{:i} \right), \quad (3.326) $$

-continued $$ con = \{\beta 2, \alpha 2 \in [0:3], \alpha 3, \beta 3 \in [0:1]\}, S = 8 $$

$$ Y_2^{\beta} = \begin{bmatrix} 1 & \tau_2 & \tau_3 & \tau_2\tau_3 & \tau_2^{:2} & \tau_2^{:2}\tau_3 & \tau_2^{:3} & \tau_2^{:3}\tau_3 \end{bmatrix} \quad (3.327) $$

$$ T_2^{\beta \wedge T} = Y_2^{\beta}(\tau_{[2:3]} | y_{[2:3]}). $$

PROOF: From Eq. (3.323), obtain eq. (3.324). Eqs. (3.56) and (3.324) result in $$ \begin{aligned} \mathrm{Det}(F_3(Y_2 \mid T_2)) = & -\tau_1^{i:3} \cdot [\![ {}^{1|i}r_{3S},\ {}^{1|i}\overline{r}_{3S}(y_2|\tau_2),\ {}^{1|i}\overline{r}_{3S}(y_{[2:3]}|\tau_{[2:3]}) ]\!] \backslash + \tau_1^{i:2} \cdot \\ & \tau_3^1 \cdot [\![ {}^{1}Q_i \cdot {}^{i}_{d}r_{3S},\ {}^{1|i}\overline{r}_{3S}(y_2|\tau_2),\ {}^{1|i}\overline{r}_{3S}(y_{[2:3]}|\tau_{[2:3]}) ]\!] \backslash + \tau_1^{i:2} \cdot \\ & (y_2 + \tau_2) \cdot \tau_3^2 \cdot [\![ {}^{1|i}r_{3S},\ {}^{1}Q_i \cdot {}^{i}_{d}r_{3S},\ {}^{1|i}r_{3S}(y_{[2:3]}|\tau_{[2:3]}) ]\!] \backslash + \tau_1^{i:2} \cdot \\ & (1 + y_2^2) \cdot (y_3 + \tau_3) \cdot [\![ {}^{1|i}r_{3S},\ {}^{1|i}\overline{r}_{3S}(y_2|\tau_2),\ {}^{1}Q_i \cdot {}^{i}_{d}r_{3S} ]\!]. \end{aligned} \quad (3.328) $$

Eq. (3.326) is established by Eq (3.328). Eqs. (3.307) and (3.321) result in:

$$ \begin{aligned} {}^{1|i}\overline{r}_{3S}(y_2|\tau_2) = & (\tau_2 + y_2) \cdot (1 + \tau_3^{:2}) \cdot {}^{1}l_2 + \\ & (1 + \tau_3^{:2}) \cdot \backslash {}^{1}\overline{Q}_2(y_2|\tau_2) \cdot {}^{2}l_3 + {}^{1}\overline{Q}_2(y_2|\tau_2) \cdot {}^{2}Q_3 \cdot {}^{3}l_{3S} = \\ & (\tau_2 + y_2) \cdot (1 + \tau_3^{:2}) \cdot {}^{1}l_2 + (1 + \tau_3^{:2}) \cdot {}^{1}\overline{Q}_2(y_2|\tau_2) \cdot {}^{2}l_3, / + {}^{1}\overline{Q}_2 \\ & (y_2|\tau_2) \cdot {}^{3}l_{3S} - \\ & \tau_3 y_3 \cdot {}^{1}\overline{Q}_2(y_2|\tau_2) \cdot {}^{2}N_3 \cdot {}^{3}l_{3S} \backslash + \tau_3 \cdot {}^{1}\overline{Q}_2(y_2|\tau_2) \cdot {}^{2}\overline{Q}_3(y_3 \mid \tau_3) \cdot {}^{3}l_{3S} \end{aligned} \quad (3.329) $$

$$ \begin{aligned} {}^{1|i}\overline{r}_{3S}(y_{[2:3]}|\tau_{[2:3]}) = & (1 + y_2^{:2}) \cdot (y_3 + \tau_3) \cdot {}^{3}l_3 \backslash + (y_3 + \tau_3) \cdot {}^{1}Q_2(y_2) \cdot {}^{2}l_3 + \\ & {}^{1}Q_2(y_2) \cdot {}^{2}\overline{Q}_3(y_3|\tau_3) \cdot {}^{3}l_{3S} = (1 + y_2^{:2}) \cdot (y_3 + \tau_3) \cdot {}^{2}l_3 - \\ & \tau_2 y_2 \cdot (y_3 + \tau_3) \cdot {}^{1}N_2 \cdot {}^{2}l_3 \backslash + y_2 \cdot (y_3 + \tau_3) \cdot {}^{1}\overline{Q}_2(y_2|\tau_2) \cdot {}^{2}l_3 + \\ & {}^{2}\overline{Q}_3(y_3 \mid \tau_3) \cdot {}^{3}l_{3S} \backslash - \tau_2 y_2 \cdot {}^{1}N_2 \cdot {}^{2}\overline{Q}_3(y_3 \mid \tau_3) \cdot {}^{2}l_{3S} + \\ & y_2 \cdot {}^{1}\overline{Q}_2(y_2|\tau_2) \cdot {}^{2}\overline{Q}_3(y_3 \mid \tau_3) \cdot {}^{3}l_{3S}. \end{aligned} \quad (3.330) $$

Eqs. (3.321), (3.329) and (3.330) result in:

$$ \begin{aligned} & [\![ {}^{1|i}r_{3S},\ {}^{1|i}\overline{r}_{3S}(y_2|\tau_2),\ {}^{1|i}\overline{r}_{3S}(y_{[2:3]}|\tau_{[2:3]}) ]\!] = [\![ \\ & (1 + \tau_2^{:2}) \cdot (1 + \tau_3^{:2}) \cdot {}^{1}l_2 + (1 + \tau_3^{:2}) \cdot {}^{1}Q_2 \cdot {}^{2}l_3 \backslash + {}^{1}Q_3 \cdot {}^{3}l_{3S}, \\ & (\tau_2 + y_2) \cdot (1 + \tau_3^{:2}) \cdot {}^{1}l_2 + (1 + \tau_3^{:2}) \cdot {}^{1}\overline{Q}_2(y_2|\tau_2) \backslash \cdot {}^{2}l_3 + \\ & {}^{1}\overline{Q}_2(y_2|\tau_2) \cdot {}^{2}Q_3 \cdot {}^{3}l_{3S},\ (1 + y_2^{:2}) \cdot (y_3 + \tau_3) \cdot {}^{2}l_3 + \\ & \backslash (y_3 + \tau_3) \cdot {}^{1}Q_2(y_2) \cdot {}^{2}l_3 + {}^{1}Q_2(y_2) \cdot {}^{2}\overline{Q}_3(y_3 \mid \tau_3) \cdot {}^{3}l_{3S} ]\!]. \end{aligned} \quad (3.330) $$

Wherein Eq. (3.313) is used for the calculation of $$ [\![ {}^{1}Q_3 \cdot {}^{3}l_{3S},\ {}^{1}\overline{Q}_2(y_2 \mid \tau_2) \cdot {}^{2}Q_3 \cdot {}^{3}l_{3S},\ {}^{1}Q_2(y_2) \cdot {}^{2}\overline{Q}_3(y_3 \mid \tau_3) \cdot {}^{3}l_{3S} ]\!]. $$

Obviously, $\beta 2 \in [0:3]$ and $\beta 3 \in [0:1]$ in Eq. Consider the following three items of Eq. $\beta 2 \in [0:3]$ and $\beta 3 \in [0:1]$ in $[{}^{1}Q_{i} \cdot {}_{d}{}^{i}r_{3S},\ {}^{1|i}\overline{r}_{3S}(y_2|\tau_2),\ {}^{1|i}\overline{r}_{3S}(y_{[2:3]}|\tau_{[2:3]})]$, $\beta 2 \in [0:2]$ and $\beta 3 \in [0:1]$ in $(y_2+\tau_2) \cdot [{}^{1|i}r_{3S},\ {}^{1}Q_{i} \cdot {}_{d}{}^{i}r_{3S},\ {}^{1|i}r_{3S}(y_{[2:3]}|\tau_{[2:3]})]$. $\beta 2 \in [0:3]$ and $\beta 3 \in [0:1]$ in $(1+y_2^2) \cdot (y_3+\tau_3) \cdot [{}^{1|i}r_{3S},\ {}^{1|i}\overline{r}_{3S}(y_2|\tau_2),\ {}^{1}Q_{i} \cdot {}_{d}{}^{i}r_{3S}]$. According to the above, $y_2$ order $\beta 2 \in [0:3]$ and $y_3$ order $\beta 3 \in [0:1]$ in Eq. So s=8.

Eq. (3.321) and Eqs. (3.328)-(3.331) result in: The coefficients of combination variables in $T_2^{\beta}$ is an independent column vector, therefore, the coefficient of $T_2^{\beta}$ is selected to form the square matrix ${}_S\overline{\Theta}_S$, the rest of the column vectors must be related to the columns of ${}_S\overline{\Theta}_S$. So the Eq. (3.327) was established. Q.E.D

[3] IK Solutions of 3R Robo-Arms Based on Axis-Invariant

The principle of "Cayley-Dixon determinant calculation based on Axis-Invariant" and the principle of "high-dimensional determinant calculation of block matrix" are applied to simplify the calculation of determinants.

Eqs. (3.307) and (3.321) result in $$
\begin{aligned}
{}^{1|i}r_{3S} &= \left(1+\tau_2^{:2}\right)\cdot\left(1+\tau_3^{:2}\right)\cdot{}^{1}l_2+\left(1+\tau_3^{:2}\right)\cdot\begin{pmatrix}{}^{2}l_3+2\tau_2\cdot{}^{2}l_3^{\perp}\\ \backslash+\tau_2^{:2}\cdot{}^{2}l_3^{o}\end{pmatrix},\\
&\backslash+\left(1+2\tau_2\cdot{}^{1}\tilde{n}_2+\tau_2^{:2}\cdot{}^{1}N_2\right)\cdot\left({}^{3}l_{3S}+2\tau_3\cdot{}^{3}l_{3S}^{l}+\tau_3^{:2}\cdot{}^{3}l_{3S}^{o}\right)
\end{aligned}
\tag{3.332}
$$

$$
\begin{aligned}
{}^{1|i}\overline{r}_{3S}(y_2\mid\tau_2) &= (\tau_2+y_2)\cdot\left(1+\tau_3^{i:2}\right)\cdot{}^{1}l_2\\
&\backslash+\left(1+\tau_3^{:2}\right)\cdot\left(2\cdot{}^{2}l_3^{\perp}+(y_2+\tau_2)\cdot{}^{2}l_3^{o}\right),\\
&\backslash+\left(2\cdot{}^{l}\tilde{n}_2+(y_2+\tau_2)\cdot{}^{l}N_2\right)\cdot\left({}^{3}l_{3S}+2\tau_3\cdot{}^{3}l_{3S}^{\perp}+\tau_3^{:2}\cdot{}^{3}l_{3S}^{o}\right)
\end{aligned}
\tag{3.333}
$$

$$
\begin{aligned}
{}^{1|i}\overline{r}_{3S}(y_{[2:3]}\mid\tau_{[2:3]}) &= \left(1+y_2^{:2}\right)\cdot(y_3+\tau_3)\cdot{}^{2}l_3\\
&\backslash+(y_3+\tau_3)\cdot\left({}^{2}l_3+2y_2\,{}^{2}l_3^{\perp}+y_2^{:2}\cdot{}^{2}l_3^{o}\right).\\
&\backslash+\left(1+2y_2\cdot{}^{1}\tilde{n}_2+y_2^{:2}\cdot{}^{1}N_2\right)\cdot\left(2\cdot{}^{2}l_3^{\perp}+(y_3+\tau_3)\cdot{}^{2}l_3^{o}\right)
\end{aligned}
\tag{3.334}
$$

Eq. (3.332) results in $$
\begin{aligned}
{}^{1|i}r_{3S} &\underset{con}{=} \left(1+\tau_2^{:2}\right)\cdot{}^{1}l_2+\left({}^{2}l_3+2\tau_2\cdot{}^{2}l_3^{\perp}+\tau_2^{:2}\cdot{}^{2}l_3^{o}\right)\\
&\backslash+{}^{3}l_{3S}+2\tau_2\cdot{}^{1}\tilde{n}_2\cdot{}^{3}l_{3S}+\tau_2^{:2}\cdot{}^{1}N_2\cdot{}^{3}l_{3S}+2\tau_3\cdot{}^{3}l_{3S}^{\perp}\cdot\\
&\backslash+4\tau_2\tau_3\cdot{}^{1}\tilde{n}_2\cdot{}^{3}l_{3S}^{\perp}+2\tau_2^{:2}\tau_3\cdot{}^{1}N_2\cdot{}^{3}l_{3S}^{\perp}
\end{aligned}
\tag{3.335}
$$

Eq. (3.333) yields $$
\begin{aligned}
{}^{1|i}\overline{r}_{3S}(y_2\mid\tau_2) &\underset{con}{=} (\tau_2+y_2)\cdot{}^{1}l_2+\left(2\cdot{}^{2}l_3^{\perp}+\tau_2\cdot{}^{2}l_3^{o}+y_2\cdot{}^{2}l_3^{o}\right)\\
&\backslash+2\cdot{}^{1}\tilde{n}_2\cdot{}^{3}l_{3S}+4\tau_3\cdot{}^{1}\tilde{n}_2\cdot{}^{3}l_{3S}^{\perp}+\tau_2\cdot{}^{1}N_2\cdot{}^{3}l_{3S}\\
&\backslash+2\tau_2\tau_3\cdot{}^{1}N_2\cdot{}^{3}l_{3S}^{\perp}+y_2\cdot{}^{1}N_2\cdot{}^{3}l_{3S}+2\tau_3y_2\cdot{}^{1}N_2\cdot{}^{3}l_{3S}^{\perp}
\end{aligned}
\tag{3.336}
$$

Eq. (3.334) results in $$
\begin{aligned}
{}^{1|i}\overline{r}_{3S}(y_{[2:3]}\mid\tau_{[2:3]}) &\underset{Con}{=} -\left(y_3+\tau_3+y_2^{:2}y_3+\tau_3y_2^{:2}\right)\cdot{}^{2}l_3+\tau_3\cdot{}^{2}l_3\\
&\backslash+2\tau_3y_2\cdot{}^{2}l_3^{\perp}+\tau_3y_2^{:2}\cdot{}^{2}l_3^{o}+y_3\cdot{}^{2}l_3+2\cdot y_2y_3\cdot{}^{2}l_3^{\perp}+\\
&\backslash\, y_2^{:2}y_3\cdot{}^{2}l_3^{o}+2\cdot{}^{3}l_{3S}^{\perp}+4y_2\cdot{}^{1}\tilde{n}_2\cdot{}^{3}l_{3S}^{\perp}+2y_2^{:2}+{}^{1}N_2\cdot{}^{3}l_{3S}^{\perp}\\
&\backslash+y_3\cdot{}^{3}l_{3S}^{\perp}+2y_2y_3\cdot{}^{1}\tilde{n}_2\cdot{}^{3}l_{3S}^{\perp}+y_2^{:2}y_3\cdot{}^{1}N_2\cdot{}^{3}l_{3S}^{\perp}+\\
&\backslash\,\tau_3\cdot{}^{3}l_{3S}^{\perp}+2\tau_3y_2\cdot{}^{1}\tilde{n}_2\cdot{}^{3}l_{3S}^{\perp}+\tau_3y_2^{:2}\cdot{}^{1}N_2\cdot{}^{3}l_{3S}^{\perp}
\end{aligned}
\tag{3.337}
$$

Eq. (3.328) results in $$
\begin{aligned}
&\mathrm{Det}(F_3(Y_2\mid T_2))\big/\tau_1^{i:2}\\
&\underset{Con}{=} -\left(1+\tau_1^{i:2}\right)\cdot\left[\!\left[\,{}^{1|i}r_{3S},\ {}^{1|i}\overline{r}_{3_S}(y_2\mid\tau_2),\ {}^{1|i}\overline{r}_{3S}(y_{[2:3]}\mid\tau_{[2:3]})\,\right]\!\right]\\
&\backslash+\left(1+\tau_2^{i:2}\right)\cdot\left[\!\left[{}^{1}Q_i\cdot{}^{1|i}_{d}r_{3S},\ {}^{1|i}\overline{r}_{3S}(y_2\mid\tau_2),\ {}^{1|i}\overline{r}_{3S}(y_{[2:3]}\mid\tau_{[2:3]})\right]\!\right]\cdot\\
&\backslash+(y_2+\tau_2)\cdot\left[\!\left[\,{}^{1|i}r_{3S},\ {}^{1}Q_i\cdot{}^{i}_{d}r_{3S},\ {}^{1|i}r_{3_S}(y_{[2:3]}\mid\tau_{[2:3]})\,\right]\!\right]+\\
&\backslash(\tau_3+\tau_3y_2^{:2}+y_3+y_2^{:2}y_3)\cdot\left[\!\left[\,{}^{1|i}r_{3S},\ {}^{i}_{d}\overline{r}_{3_S}(y_2\mid\tau_2),\ {}^{1}Q_i\cdot{}^{i}_{d}r_{3S}\,\right]\!\right]
\end{aligned}
\tag{3.338}
$$

Put Eq. (3.335)-(3.337) into Eq. (3.338)

$$
\mathrm{Det}(F_3(Y_2|T_2))/\tau_1{}^{i:2}\underset{con}{=}Y_2{}^{\beta:T}\cdot{}_S\overline{\Theta}_S(\tau_1)\cdot T_2{}^{\beta}.
\tag{3.339}
$$

The Cayley-Dixon elimination and the solution principle of n-D polynomial of "n-variables and N-Order" are applied to calculate the position and attitude inverse solution. Eqs. (3.74), (3.326) and (3.321) result in $$
\mathrm{Det}({}_S\Theta_S(\tau_1))=0.
\tag{3.340}
$$

Since S=8, the complexity is 8*8!=322560 calculating by $\mathrm{Det}({}_S\Theta_S)$. Calculating determinant of the second partition by using the Eq. (3.40), among them: The computation complexity of 2·2 block matrix is 4!*(2*2!+2*2!+1)/(2*2!)=30, the computation complexity of 4*4 block matrix is 8!*(30+30+1)/(4!*4!)=4270. In general, the Eq. (3.340) is the 16-Order's monomial equation about $\tau_1$. The feasible solution to the first axis can be got by using the principle of one-dimensional polynomial solution. Put the feasible solution of the first axis into Eq. (3.75), feasible solutions to the second and third axis can be got. Put the feasible solution into Eq. (3.324) respectively to verify. if the equation is established, it is the correct solution.

The principle of 3R Robo-Arm position inverse solution based on Axis-Invariant plays a significant role as elaborated below:

The accurate measurement of Axis-Invariant can improve the absolute positioning accuracy of the Robo-Arm. Any Joint Variable covers a full circle, which eliminates the calculation singularities arising from the D-H method. Compared with the D-H method, the solving process has universality and can obtain all the inverse solutions of the system.

The principle of the Axis-Invariant based 3R Robo-Arm inverse position solution shows: Integrality and locality, as well as complexity and simplicity, reflect the unity of opposites; in Eq. (3.39), the determinant calculation of vector polynomials is converted into the determinants of three vectors, which plays a decisive role in the reasoning of this principle; the Axis-Invariant and its derived invariant are structural parameters, The system equation is the vector equation of Joint Variables and structural parameters.

Axis-Invariant Based General 6R Robo-Arm Position and Attitude Inverse Solution

When the degree of freedom is high, the artificial derivation of the kinematics equation is very complicated and error-prone, and it is difficult to guarantee the reliability of the modeling. Iterative form needs to be established to meet the needs of the computer to automatically build a multi-axis system symbolic models. At the same time, it is necessary to apply the inherent laws of the system and simplify the system equations. Different systems may have different forms of equations, and their computational complexity, physical meaning, system order and singularity are also different. Of course, the ideal system model needs to meet the application requirements of minimum order and no computational singularity. There are many equivalent forms of kinematics equations. Only the kinematics equations of a particular structure are the basis for the inverse kinematics of high-degree-freedom multi-axis systems.

The 6R decoupling robot arm has the following common point constraints on the structure: either 4 or 6 axes are concurrent, or 4 and 5 axes are concurrent and 5 and 6 axes are concurrent. For high-precision robot arms, this assumption does not hold due to the machining and assembly errors. The universal 6R manipulator does not have the concurrent constraint. But the inverse solution calculation is very difficult and has to succumb to the decoupling constraint in engineering.

[1] Preparation Theorem of General 6R Robo-Arm Position and Attitude Inverse Solution Based on Axis-Invariant The inverse problem with the prior knowledge of the desired position ${}_d^i r_6$ and desired attitude ${}_d^i \boldsymbol{\tau}_6$ is equivalent to that with the prior knowledge of the desired position ${}_d^i r_6$ and desired attitude ${}_d^i \boldsymbol{\tau}_5$, are equivalent. The 5th axis achieves fixed point pointing alignment, and the 6th axis achieves infinite rotation We will elaborate the preparation theorem of inverse solution of general 6R Robo-Arm posture, and then give the proof.

THEOREM 3.7. Given 6R AC ${}^i\mathbf{l}_6=(i,1:6]$, ${}^i l_1=0_3$. The desired position vector is noted as ${}_d^i r_6$ and the Ju-Gibbs quaternion as ${}_d^i \boldsymbol{\tau}_5$.

The preparation equation of 6R Robo-Arms based on Axis-invariant can be expressed as below.

$$\begin{aligned}
f^{[1:3]} &:= {}_d\tau_5^i \cdot \left({}^3Q_1 \cdot {}^1Q_i \cdot {}_d^i r_6 - \tau_1^i \cdot \left({}^3Q_1 \cdot {}^1 l_2 + \tau_2^1 \cdot {}^3Q_2 \cdot {}^2 l_3\right)\right) \\
&\backslash - {}^i\tau_3^T \cdot C_{11} \cdot {}^i\tau_3 \cdot \left({}^3 l_4 + {}^4 l_5 + {}^5 l_6\right) \\
&\backslash - 2 \cdot {}^i\tau_3^T \cdot C_{13} \cdot {}^i\tau_3 \cdot {}^5 l_6^{\perp} \\
&\backslash - 2 \cdot {}^i\tau_3^T \cdot C_{12} \cdot {}^i\tau_3 \cdot \left({}^4 l_5^{\perp} + {}^3\tilde{n}_4 + {}^5 l_6\right) \\
&\backslash - 4 \cdot {}^i\tau_3^T \cdot C_{14} \cdot {}^i\tau_3 \cdot {}^3\tilde{n}_4 \cdot {}^5 l_6^{\perp} \\
&\backslash - 2 \cdot {}^i\tau_3^T \cdot C_{24} \cdot {}^i\tau_3 \cdot {}^3 N_4 \cdot {}^5 l_6^{\perp} \\
&\backslash - 2 \cdot {}^i\tau_3^T \cdot C_{34} \cdot {}^i\tau_3 \cdot \left({}^4 l_5^{\perp} + {}^3\tilde{n}_4 + {}^5 l_6^{\circ}\right) \\
&\backslash - {}^i\tau_3^T \cdot C_{24} \cdot {}^i\tau_3 \cdot \left({}^3 l_4 + {}^4 l_5^{\circ} + {}^3 N_4 \cdot {}^5 l_6\right) \\
&\backslash - {}^i\tau_3^T \cdot C_{33} \cdot {}^i\tau_3 \cdot \left({}^3 l_4 + {}^4 l_5 + {}^5 l_6^{\circ}\right) \\
&\backslash - {}^i\tau_3^T \cdot C_{44} \cdot {}^i\tau_3 \cdot \left({}^3 l_4 + {}^4 l_5^{\circ} + {}^3 N_4 \cdot {}^5 l_6^{\circ}\right) = 0_3
\end{aligned}, \tag{3.341}$$

wherein $$\tau_1^i = 1 + \tau_1^{:2},\ \ \tau_2^i = 1 + \tau_2^{:2},\ \ \tau_3^2 = 1 + \tau_3^{:2},\ \ {}_d\tau_5^i = \left\|{}_d^i\tau_5\right\|^2. \tag{3.342}$$

The matrix of the system structure parameters and the desired Ju-Gibbs pose quaternion is expressed as $${}^3E_5^{:-1} = [{}^3n_4, {}^4n_5, {}^3\tilde{n}_4 \cdot {}^4n_5], \tag{3.343}$$

$${}^3E_5^{:-1} = [\,{}^3n_4,\ \ {}^4n_5,\ \ {}^3\tilde{n}_4 \cdot {}^4n_5\,], \tag{3.343}$$

$$C = \begin{bmatrix} {}_d^i\tau_5^T + {}^3n_4^T \cdot {}^4n_5 \cdot & 1 + {}^3n_4^T \cdot {}^4n_5 \\ \backslash {}^3E_b^{[3][*]} \cdot \left({}_d^i\tilde{\tau}_b - 1\right), & \backslash \cdot {}^3E_5^{[3][*]} \cdot {}_d^i\tau_5 \\ {}^3E_5 \cdot \left({}_d^i\tilde{\tau}_5 - 1\right) & {}^3E_5 \cdot {}_d^i\tau_5 \end{bmatrix}, \tag{3.344}$$

$$\begin{aligned}
C_{[1]} &= \begin{bmatrix} {}^3n_4^T \cdot {}^4n_5 \cdot {}^3E_5^{[3][*]} & 1 + {}^3n_4^T \cdot {}^4n_5 \cdot \\ \backslash \cdot \left({}_d^i\tilde{\tau}_5 - 1\right) + {}_d^i\tau_5^T, & \backslash {}^3E_5^{[3][*]} \cdot {}_d^i\tau_5 \end{bmatrix} \\
C_{[k+1]} &= \left[\,{}^3E_5^{[k][*]} \cdot \left({}_d^i\tilde{\tau}_5 - 1\right),\ \ {}^3E_5^{[k][*]} \cdot {}_d^i\tilde{\tau}_5\right], k \in [1:3]
\end{aligned}, \tag{3.345}$$

$$\begin{aligned}
&C_{11} \triangleq C_{[1]}^T \cdot C_{[1]}, C_{22} \triangleq C_{[2]}^T \cdot C_{[2]} \\
&C_{33} \triangleq C_{[3]}^T \cdot C_{[3]}, C_{44} \triangleq C_{[4]}^T \cdot C_{[4]} \\
&C_{12} \triangleq C_{[1]}^T \cdot C_{[2]}, C_{13} \triangleq C_{[1]}^T \cdot C_{[3]}, C_{14} \triangleq C_{[1]}^T \cdot C_{[4]} \\
&C_{23} \triangleq C_{[2]}^T \cdot C_{[3]}, C_{24} \triangleq C_{[2]}^T \cdot C_{[4]}, C_{34} \triangleq C_{[3]}^T \cdot C_{[4]}
\end{aligned} \tag{3.346}$$

PROOF: Let desired ${}^i\boldsymbol{\tau}_5$ align with the attitude ${}_d^i\boldsymbol{\tau}_5$, Eq. (3.287) yield ${}^i\boldsymbol{\tau}_3 * {}^3\boldsymbol{\tau}_5 = {}^i\boldsymbol{\tau}_5^{[4]} \cdot {}_d^i\boldsymbol{\tau}_5$, and eq. (3.289) yields $$\tau_3^i \cdot \tau_5^3 = {}^i\tau_5^{[4]:2} \cdot {}_d\tau_5^i,\ \ \tau_3^i \cdot {}^3\tau_5 = {}^i\tau_5^{[4]} \cdot {}^i\tau_3^* \cdot {}_d^i\tau_5. \tag{3.347}$$

Eqs. (3.233) and (3.347) result in (3.346). And. Eq. (3.347) yields $$\begin{aligned}
\tau_3^i \cdot {}^3\tau_5 &= \cdot \begin{bmatrix} {}^i\tau_3^{[4]} \cdot {}_d^i\tau_5 + \left({}_d^i\tau_5 - 1\right) \cdot {}^i\tau_3 \\ {}^i\tau_3^{[4]} + {}_d^i\tau_5^T \cdot {}^i\tau_3 \end{bmatrix} \\
&= {}^i\tau_5^{[4]} \cdot \begin{bmatrix} {}_d^i\tilde{\tau}_5 - 1 & {}_d^i\tau_5 \\ {}_d^i\tau_5^T & 1 \end{bmatrix} \cdot {}^i\tau_3
\end{aligned}, \tag{3.348}$$

Eq. (3.234) results in:

$$\begin{aligned}
{}^3\tau_5 &= \begin{bmatrix} \tau_4 \cdot {}^3n_4 + \tau_5 \cdot {}^4n_5 + \tau_4\tau_5 \cdot {}^3\tilde{n}_4 \cdot {}^4n_5 \\ 1 - \tau_4\tau_5 \cdot {}^3n_4^T \cdot {}^4n_5 \end{bmatrix}, \\
&= {}_4K_4 \cdot [\,1,\ \ \tau_4,\ \ \tau_5,\ \ \tau_4\tau_5]^T
\end{aligned} \tag{3.349}$$

wherein $${}_4K_4 = \begin{bmatrix} 0_3 & {}^3n_4 & {}^4n_5 & {}^3\tilde{n}_4 & {}^4n_5 \\ 1 & 0 & 0 & -{}^3n_4^T \cdot {}^4n_5 \end{bmatrix}. \tag{3.350}$$

According to Eqs. (3.348) and (3.349), arrive at $$\tau_3^i \cdot [\,1,\ \ \tau_4,\ \ \tau_5,\ \ \tau_4\tau_5\,]^T = {}^i\tau_5^{[4]} \cdot {}_4K_4^{-1} \cdot \begin{bmatrix} {}_d^i\tilde{\tau}_5 - 1 & {}_d^i\tau_5 \\ {}_d^i\tau_5^T & 1 \end{bmatrix} \cdot {}^i\tau_3, \tag{3.351}$$

Eq. (3.246) results in $${}_4K_4^{-1} = \begin{bmatrix} {}^3n_4^T \cdot {}^4n_5 \cdot {}^3E_5^{[3][*]}, & 1 \\ {}^3E_5, & 0_3 \end{bmatrix}. \tag{3.352}$$

Take Eq. (3.352) into (3.348), then $$\tau_3^i \cdot \left[\,1,\ \ \tau_4,\ \ \tau_5,\ \ \tau_4\tau_5\right]^T = {}^i\tau_5^{[4]} \cdot C \cdot {}^i\tau_3, \tag{3.353}$$

wherein $$C = \begin{bmatrix} {}^3n_4^T \cdot {}^4n_5 \cdot {}^3E_5^{[3][*]}, & 1 \\ {}^3E_5, & 0_3 \end{bmatrix} \cdot \begin{bmatrix} {}_d^i\tilde{\tau}_5 - 1 & {}_d^i\tau_5 \\ {}_d^i\tau_5^T & 1 \end{bmatrix}. \tag{3.354}$$

Eq. (3.354) results in (3.342), according to Eqs. (3.342) and (3.353), $$\tau_3^i = {}^i\tau_5^{[4]} \cdot C_{[1]} \cdot {}^i\tau_3, \tag{3.355}$$

$$\begin{aligned}
&\tau_3^i \cdot \tau_4 = {}^i\tau_5^{[4]} \cdot C_{[2]} \cdot {}^i\tau_3 \\
&\tau_3^i \cdot \tau_5 = {}^i\tau_5^{[4]} \cdot C_{[3]} \cdot {}^i\tau_3,\ \tau_3^i \cdot \tau_4\tau_5 = {}^i\tau_5^{[4]} \cdot C_{[4]} \cdot {}^i\tau_3
\end{aligned}, \tag{3.356}$$

Eq. (3.355) is the constraint equation of ${}^i\boldsymbol{\tau}_3$, the desired attitude ${}_d^i\tau_5$, and the structural parameters of the fourth and fifth axis. From Eq. (3.242), obtain $$\tau_5^3 = (1+\tau_4^{:2}) \cdot (1+\tau_5^{:2}) = 1+\tau_4^{:2}+\tau_5^{:2}+\tau_4^{:2}\tau_5^{:2}. \tag{3.357}$$

According to Eqs.(3.355), (3.356) and (3.357), obtain $$\tau_3^{i:2} \cdot \tau_5^3 = {}^i\boldsymbol{\tau}_5^{[4]:2} \cdot {}^i\boldsymbol{\tau}_3^T \cdot (C_{11}+C_{22}+C_{33}+C_{44}) \cdot {}^i\boldsymbol{\tau}_3; \tag{3.358}$$

At the same time, according to Eqs. (3.347), (3.355) and (3.358), obtain $$\begin{aligned}
\tau_3^{i:2} \cdot \tau_5^3 &= {}^i\boldsymbol{\tau}_5^{[4]:2} \cdot {}^i\boldsymbol{\tau}_3^T \cdot (C_{11}+C_{22}+C_{33}+C_{44}) \cdot {}^i \\
\boldsymbol{\tau}_3 &= {}^i\boldsymbol{\tau}_5^{[4]:3} \cdot {}_d\tau_5^i \cdot C_{[1]} \cdot {}^i\boldsymbol{\tau}_3.
\end{aligned} \tag{3.359}$$

And obtain $$ {}^i\tau_3^T\cdot(C_{11}+C_{22}+C_{33}+C_{44})\cdot{}^i\tau_3={}^i\tau_5^{[4]}\cdot{}_d\tau_5\cdot{}^iC_{[1]}\cdot{}^i\tau_3. \quad (3.360)$$

Eq. (3.356) results in (3.344) and $$\begin{aligned}
\tau_3^{i:2} &= {}^i\tau_5^{[4]:2}\cdot{}^i\tau_3^T\cdot C_{11}\cdot{}^i\tau_3\\
\tau_3^{i:2}\cdot\tau_4^{:2} &= {}^i\tau_5^{[4]:2}\cdot{}^i\tau_3^T\cdot C_{22}\cdot{}^i\tau_3\\
\tau_3^{i:2}\cdot\tau_5^{:2} &= {}^i\tau_5^{[4]:2}\cdot{}^i\tau_3^T\cdot C_{33}\cdot{}^i\tau_3\\
\tau_3^{i:2}\cdot\tau_4^{:2}\tau_5^{:2} &= {}^i\tau_5^{[4]:2}\cdot{}^i\tau_3^T\cdot C_{44}\cdot{}^i\tau_3\\
\tau_3^{i:2}\cdot\tau_4^{:2}\tau_5 &= {}^i\tau_5^{[4]:2}\cdot{}^i\tau_3^T\cdot C_{24}\cdot{}^i\tau_3\\
\tau_3^{i:2}\cdot\tau_4\tau_5^{:2} &= {}^i\tau_5^{[4]:2}\cdot{}^i\tau_3^T\cdot C_{34}\cdot{}^i\tau_3
\end{aligned} \quad (3.361)$$

According to Eqs. (3.355) and (3.346), arrive at $$\begin{aligned}
&\tau_3^i\cdot C_{[2]}\cdot{}^i\tau_3={}^i\tau_5^{[4]}\cdot{}^i\tau_3^T\cdot C_{12}\cdot{}^i\tau_3\\
&\tau_3^i\cdot C_{[3]}\cdot{}^i\tau_3={}^i\tau_5^{[4]}\cdot{}^i\tau_3^T\cdot C_{13}\cdot{}^i\tau_3\\
&\tau_3^i\cdot C_{[4]}\cdot{}^i\tau_3={}^i\tau_5^{[4]}\cdot{}^i\tau_3^T\cdot C_{14}\cdot{}^i\tau_3.
\end{aligned} \quad (3.362)$$

Eqs. (3.355)-(3.361) are applied for the simplification of subsequent equations. C is a constant structure matrix. The 2-norms on both sides of Eq. (3.353) are expressed as $$\tau_3^{i:2}\cdot\|1\quad\tau_4\quad\tau_5\quad\tau_4\tau_5\|^2=\|C\|^2\cdot\|{}^i\tau_3\|^2. \quad (3.363)$$

In consideration of the position alignment when ${}^i l_1=0_3$ results in $${}^1Q_i\cdot{}_d^i r_6-{}^1r_3={}^1Q_3\cdot\sum_l^{[3:6]}\left({}^3Q_l\cdot{}^l l_l\right). \quad (3.364)$$

According to Eqs. (3.2) and (3.364), $$\frac{1}{\tau_1^i}\cdot{}^1Q_i\cdot{}_d^i r_6-\frac{1}{\tau_2^1}\cdot\sum_l^{[1:3]}\left(\tau_2^l\cdot{}^1Q_l\cdot{}^l l_l\right)=\frac{1}{\tau_3^1\tau_5^3}\cdot{}^1Q_3\cdot\sum_l^{[3:6]}\left(\tau_5^l\cdot{}^3Q_l\cdot{}^l l_l\right)$$

And then $$\tau_5^3\cdot{}^3Q_1\cdot\begin{pmatrix}\tau_1^i\cdot\tau_3^1\cdot{}^1Q_i\cdot{}_d^i r_6-\tau_1^{i:2}\cdot\\ \tau_3^2\cdot\sum_l^{[1:3]}\left(\tau_2^l\cdot{}^1Q_l\cdot{}^l l_l\right)\end{pmatrix}=\tau_1^{i:2}\cdot\tau_3^{1:2}\cdot\sum_l^{[3:6]}\left(\tau_5^l\cdot{}^3Q_l\cdot{}^l l_l\right), \quad (3.365)$$

i.e.

$$\tau_3^i\cdot\tau_5^3\cdot{}^3Q_1\cdot\begin{pmatrix}\tau_3^i\cdot{}^1Q_i\cdot{}_d^i r_6-\tau_1^{i:2}\tau_3^2\\ \cdot\sum_l^{[1:3]}\left(\tau_2^l\cdot{}^1Q_l\cdot{}^l l_l\right)\end{pmatrix}=\tau_1^{i:3}\cdot\sum_l^{[3:6]}\left(\tau_5^l\cdot{}^3Q_l\cdot{}^l l_l\right).$$

Apparently, then $$\tau_1^{i:2}\cdot\tau_3^2\cdot{}^3Q_1\cdot\sum_l^{[1:3]}\left(\tau_2^l\cdot{}^1Q_l\cdot{}^l l_l\right)= \tau_1^i\cdot\begin{pmatrix}\tau_1^i\cdot\tau_2^1\cdot\tau_3^2\cdot{}^3Q_1\cdot 1/2+\\ \tau_1^i\cdot\tau_1^{i:2}\cdot{}^3Q_2\cdot\tau_3^2\cdot{}^2l_3\end{pmatrix}=\tau_1^i\cdot\tau_3^i\cdot\left({}^3Q_1\cdot 1/2+\tau_2^1\cdot{}^3Q_2\cdot{}^2l_3\right). \quad (3.366)$$

From Eqs. (3.290), (3.356) and (3.361), the left side of Eq. (3.365) is expressed as $$\begin{aligned}
&\tau_3^i\cdot\tau_5^3\cdot{}^3Q_1\cdot\left(\tau_3^i\cdot{}^1Q_i\cdot{}_d^i r_6-\tau_1^{i:2}\cdot\tau_3^2\cdot\sum_l^{[1:3]}\left(\tau_2^l\cdot{}^1Q_l\cdot{}^l l_l\right)\right)=\\
&\tau_3^i\cdot\tau_5^3\cdot\left(\tau_3^i\cdot{}^3Q_1\cdot{}^1Q_i\cdot{}_d^i r_6-\tau_1^{i:2}\tau_3^2\cdot{}^3Q_1\cdot\begin{pmatrix}\tau_2^1\cdot 1/2+\\ {}^2Q_1\cdot{}^2l_3\end{pmatrix}\right)=\\
&\tau_3^i\cdot\tau_5^3\cdot\left(\tau_3^i\cdot{}^3Q_1\cdot{}^1Q_i\cdot{}_d^i r_6-\tau_1^i\cdot\begin{pmatrix}\tau_1^i\tau_2^1\tau_3^2\cdot{}^3Q_1\cdot 1/2+\\ \tau_1^i\tau_1^{i:2}\tau_3^2\cdot{}^3Q_2\cdot{}^2l_3\end{pmatrix}\right)=\\
&{}^i\tau_5^{[4]:2}\cdot{}_d\tau_5^i\cdot\tau_3^i\cdot\left({}^3Q_1\cdot{}^1Q_i\cdot{}_d^i r_6-\tau_1^i\cdot\begin{pmatrix}{}^3Q_1\cdot 1/2+\tau_2^1\\ \cdot{}^3Q_2\cdot{}^2l_3\end{pmatrix}\right).
\end{aligned} \quad (3.367)$$

According to Eqs. (3.290), (3.356), (3.361) and (3.359), arrive at $$\tau_1^{i:3}\cdot\sum_l^{[3:6]}\left(\tau_5^l\cdot{}^3Q_l\cdot{}^l l_l\right)=\tau_3^{i:3}\cdot\left(\tau_5^3\cdot{}^3l_4+\tau_5^4\cdot{}^3Q_4\cdot{}^4l_5+{}^3Q_5\cdot{}^5l_6\right)= \tau_3^{i:3}\begin{pmatrix}{}^3l_4+{}^4l_5+{}^5l_6\\ +2\cdot\tau_4\cdot\left({}^4l_5^1+{}^3\tilde{n}_4\cdot{}^5l_6\right)\\ +2\tau_5\cdot{}^5l_6^1+4\cdot\tau_4\tau_5\cdot{}^3\tilde{n}_4\cdot{}^5l_6^1\\ +2\cdot\tau_4\tau_5^{:2}\cdot\left({}^4l_5^1+{}^3\tilde{n}_4\cdot{}^5l_6^o\right)\\ +2\cdot\tau_4^{:2}\tau_5\cdot{}^3N_4\cdot{}^5l_6^1\\ +\tau_5^{:2}\cdot\left({}^3l_4+{}^4l_5+{}^5l_6^o\right)\\ +\tau_4^{:2}\cdot\left({}^3l_4+{}^4l_5^o+{}^3N_4\cdot{}^5l_6\right)\\ +\tau_4^{:2}\tau_5^{:2}\cdot\left({}^3l_4+{}^4l_5^o+{}^3N_4\cdot{}^5l_6^o\right)\end{pmatrix}. \quad (3.368)$$

According to Eqs. (3.361) and (3.368), obtain $$\begin{aligned}
&\tau_3^{i:3}\cdot\sum_l^{[3:6]}\left(\tau_5^l\cdot{}^3Q_l\cdot{}^l l_l\right)=\\
&\tau_3^i\cdot{}^i\tau_5^{[4]:2}\cdot{}^i\tau_3^T\cdot C_{11}\cdot{}^i\tau_3\cdot\left({}^3l_4+{}^4l_5+{}^5l_6\right)\\
&+2\cdot\tau_3^{i:2}\cdot{}^i\tau_5^{[4]}\cdot C_{[2]}\cdot{}^i\tau_3\cdot\left({}^4l_5^1+{}^3\tilde{n}_4\cdot{}^5l_6\right)\\
&+2\cdot\tau_3^{i:2}\cdot{}^i\tau_5^{[4]}\cdot C_{[3]}\cdot{}^i\tau_3\cdot{}^5l_6^1\\
&+4\cdot\tau_3^{i:2}\cdot\tau_3^2\cdot{}^i\tau_5^{[4]}\cdot C_{[4]}\cdot{}^i\tau_3\cdot{}^3\tilde{n}_4\cdot{}^5l_6^1\\
&+2\cdot\tau_3^i\cdot{}^i\tau_5^{[4]:2}\cdot{}^i\tau_3^T\cdot C_{24}\cdot{}^i\tau_3\cdot{}^3N_4\cdot{}^5l_6^1\\
&+2\cdot\tau_3^i\cdot{}^i\tau_5^{[4]:2}\cdot{}^i\tau_3^T\cdot C_{34}\cdot{}^i\tau_3\cdot\left({}^4l_5^1+{}^3\tilde{n}_4\cdot{}^5l_6^o\right)\\
&+\tau_3^i\cdot{}^i\tau_5^{[4]:2}\cdot{}^i\tau_3^T\cdot C_{22}\cdot{}^i\tau_3\cdot\left({}^3l_4+{}^4l_5^o+{}^3N_4\cdot{}^5l_6\right)\\
&+\tau_3^i\cdot{}^i\tau_5^{[4]:2}\cdot{}^i\tau_3^T\cdot C_{33}\cdot{}^i\tau_3\cdot\left({}^3l_4+{}^4l_5+{}^5l_6^o\right)\\
&+\tau_3^i\cdot{}^i\tau_5^{[4]:2}\cdot{}^i\tau_3^T\cdot C_{44}\cdot{}^i\tau_3\cdot\left({}^3l_4+{}^4l_5^o+{}^3N_4\cdot{}^5l_6^o\right).
\end{aligned} \quad (3.369)$$

According to Eqs. (3.355), (3.361) and (3.369), obtain $$\tau_3^{i:3}\cdot\sum_{l}^{[3:6]}\left(\tau_5^{\bar l}\cdot{}^3Q_{\bar l}\cdot{}^{\bar l}l_l\right)= \tag{3.370}$$
$$\backslash\tau_3^i\cdot{}^i\tau_5^{[4]:2}\cdot{}^i\tau_3^T\cdot C_{\cdot 11}\cdot{}^i\tau_{\cdot 3}\cdot\left({}^3l_4+{}^4l_5+{}^5l_6\right)$$
$$\backslash+2\cdot\tau_3^{i:2}\cdot{}^i\tau_{\cdot 5}^{[4]}\cdot C_{\cdot[2]}\cdot{}^i\tau_{\cdot 3}\cdot\left({}^4l_5^{\perp}+{}^3\bar n_4\cdot{}^5l_6\right)$$
$$\backslash+2\cdot\tau_3^{i:2}\cdot{}^i\tau_{\cdot 5}^{[4]}\cdot C_{\cdot[3]}\cdot{}^i\tau_{\cdot 3}\cdot{}^5l_6^{\perp}$$
$$\backslash+4\cdot\tau_3^{i:2}\cdot\tau_3^2\cdot{}^i\tau_{\cdot 5}^{[4]}\cdot C_{\cdot[4]}\cdot{}^i\tau_{\cdot 3}\cdot{}^3\bar n_4\cdot{}^5l_6^{\perp}$$
$$\backslash+2\cdot\tau_3^i\cdot{}^i\tau_5^{[4]:2}\cdot{}^i\tau_{\cdot 3}^T\cdot C_{\cdot 24}\cdot{}^i\tau_{\cdot 3}\cdot{}^3N_4\cdot{}^5l_6^{\perp}$$
$$\backslash+2\cdot\tau_3^i\cdot{}^i\tau_5^{[4]:2}\cdot{}^i\tau_{\cdot 3}^T\cdot C_{\cdot 34}\cdot{}^i\tau_{\cdot 3}\cdot\left({}^4l_5^{\perp}+{}^3\bar n_4\cdot{}^5l_6^{o}\right)$$
$$\backslash+\tau_3^i\cdot{}^i\tau_5^{[4]:2}\cdot{}^i\tau_{\cdot 3}^T\cdot C_{\cdot 22}\cdot{}^i\tau_{\cdot 3}\cdot\left({}^3l_4+{}^4l_5^{o}+{}^3N_4\cdot{}^5l_6\right)$$
$$\backslash+\tau_3^i\cdot{}^i\tau_5^{[4]:2}\cdot{}^i\tau_{\cdot 3}^T\cdot C_{\cdot 33}\cdot{}^i\tau_{\cdot 3}\cdot\left({}^3l_4+{}^4l_5+{}^5l_6^{o}\right)$$
$$\backslash+\tau_3^i\cdot{}^i\tau_5^{[4]:2}\cdot{}^i\tau_{\cdot 3}^T\cdot C_{\cdot 44}\cdot{}^i\tau_{\cdot 3}\cdot\left({}^3l_4+{}^4l_5^{o}+{}^3N_4\cdot{}^5l_6^{o}\right).$$

Eqs. (3.367) and (3.370) are put into Eq. (3.365), and with ${}^i\tau^{[4]}\bar\tau^{2}\cdot\tau_3{}^i$ of both sides of the equation are eliminated, so the position equation in Eq. (3.345) can be obtained. Q.E.D. According to theorem 3.7, 3D polynomial equation of 3-variables and 3-Order can be obtained by eliminating $\tau_4$ and $\tau_5$. The polynomial vector equation functions lay the foundation for inverse solution of general 6R Robo-Arms. On the one hand, it will help to improve the absolute positioning accuracy of the 6R Robo-Arms; On the other hand, moving the 4th and 5th axial directions of the traditional decoupling arm not only facilitates the optimization of the 6R Robo-Arms structure, but also improves the flexibility of the 6R Robo-Arms to avoid obstacles.

[2] Axis-Invariant based structure of the Cayley-Dixon matrix of General 6R Robo-Arms On the basis of General 6R Robo-Arm kinematic function mentioned in theorem 3.7, we elaborate the structure features of Cayley-Dixon matrix in the kinematics function by proving theorem 3.8.

THEOREM 3.8. If given 6R AC ${}^il_6=(i,1{:}6]$, ${}^il_1=0_3$. The desired position vector and Ju-Gibbs quaternion are denote as ${}_6{}^ir_6$ and ${}_d{}^i\tau_5$ respectively. The Cayley-Dixon matrix of the polynomial system in Eq. (2.345) is expressed as $$\mathrm{Det}(F_3(Y_2|T_2))/\tau_1{}^{i:2}\overset{=}{_{con}}Y_2{}^{\alpha:T}\cdot{}_S\Theta_S(\tau_1)\cdot T_2{}^{\alpha}, \tag{3.371}$$

wherein $${}_S\overline{\Theta}_S^{[i][j]}(\tau_1)={}_S\overline{\Theta}_S^{[i][j][0]}+{}_S\overline{\Theta}_S^{[i][j][1]}\cdot\tau_1+{}_S\overline{\Theta}_S^{[i][j][i]}\cdot\tau_1^{i:2}, \tag{3.372}$$
$$con=\{\beta 2,\alpha 2\in[0:3],\beta 3,\alpha 3\in[0:1]\}$$

$$Y_2^{\beta:T}=\begin{bmatrix}1 & y_2 & y_2^{i:2} & y_2^{i:3} & y_3 & y_2y_3 & y_2^{i:2}y_3 & y_2^{i:3}y_3\end{bmatrix}$$
$$T_2^{\beta:T}=Y_2^{\beta}(\tau_{[2:3]}\mid y_{[2:3]}),\ S=\mathrm{Min}\left(|T_2^{\alpha}|,\left|Y_2^{\beta}\right|\right)=8 \tag{3.373}$$

PROOF: Regard as $$f_1^{[1:3]}={}^3Q_1,\ f_2^{[1:3]}={}^3Q_1\cdot 1/2+\tau_2^1\cdot{}^3Q_2\cdot{}^2l_3, \tag{3.374}$$

$$f_3^{[1:3]}={}^i\tau_3^T\cdot C_{\cdot 11}\cdot{}^i\tau_{\cdot 3}\cdot\left({}^3l_4+{}^4l_5+{}^5l_6\right) \tag{3.375}$$
$$\backslash+2\cdot{}^i\tau_{\cdot 3}^T\cdot C_{\cdot 12}\cdot{}^i\tau_{\cdot 3}\cdot\left({}^4l_5^{\perp}+{}^3\bar n_4\cdot{}^5l_6\right)$$
$$\backslash+2\cdot{}^i\tau_{\cdot 3}^T\cdot C_{\cdot 13}\cdot{}^i\tau_{\cdot 3}\cdot{}^5l_6^{\perp}+4\cdot{}^i\tau_{\cdot 3}^T\cdot C_{\cdot 14}\cdot{}^i\tau_{\cdot 3}\cdot{}^3\bar n_4\cdot{}^5l_6^{\perp}$$

-continued $$\backslash+2\cdot{}^i\tau_{\cdot 3}^T\cdot C_{\cdot 24}\cdot{}^i\tau_{\cdot 3}\cdot{}^3N_4\cdot{}^5l_6^{\perp}$$
$$\backslash+2\cdot{}^i\tau_{\cdot 3}^T\cdot C_{\cdot 34}\cdot{}^i\tau_{\cdot 3}\cdot\left({}^4l_5^{\perp}+{}^3\bar n_4\cdot{}^5l_6^{o}\right)$$
$$\backslash+{}^i\tau_{\cdot 3}^T\cdot C_{\cdot 22}\cdot{}^i\tau_{\cdot 3}\cdot\left({}^3l_4+{}^4l_5^{o}+{}^3N_4\cdot{}^5l_6\right)$$
$$\backslash+{}^i\tau_{\cdot 3}^T\cdot C_{\cdot 33}\cdot{}^i\tau_{\cdot 3}\cdot\left({}^3l_4+{}^4l_5+{}^5l_6^{o}\right)$$
$$\backslash+{}^i\tau_{\cdot 3}^T\cdot C_{\cdot 44}\cdot{}^i\tau_{\cdot 3}\cdot\left({}^3l_4+{}^4l_5^{o}+{}^3N_4\cdot{}^5l_6^{o}\right).$$

Eqs. (3.341), (3.374)-(3.375) result in:

$$f^{[1:3]}={}_d\tau_5^i\cdot\int_1^{[1:3]}{}^1Q_i\cdot{}_d^ir_6-{}_d\tau_5^i\cdot\tau_1^i\cdot C_{[1]}\cdot\int_2^{[1:3]}-\int_3^{[1:3]}, \tag{3.376}$$

Eq. (3.376) results in:

$$\overline{f}^{[1:3]}(y_2\mid\tau_2)={}_d\tau_5^i\cdot\overline{f}_1^{[1:3]}(y_2\mid\tau_2)\cdot{}^1Q_i\cdot{}_d^ir_6 \tag{3.377}$$
$$\backslash-{}_d\tau_5^i\cdot\tau_1^i\cdot C_{\cdot[1]}\overline{f}_2^{[1:3]}(y_2\mid\tau_2)-\overline{f}_3^{[1:3]}(y_2\mid\tau_2)$$
$$\overline{f}^{[1:3]}(y_{[2:3]}\mid\tau_{[2:3]})={}_d\tau_5^i\cdot\overline{f}_1^{[1:3]}(y_{[2:3]}\mid\tau_{[2:3]})\cdot{}^1Q_i\cdot{}_d^ir_6\ ,$$
$$\backslash-{}_d\tau_5^i\cdot\tau_1^i\cdot C_{\cdot[1]}\cdot\overline{f}_2^{[1:3]}(y_{[2:3]}\mid\tau_{[2:3]})-\overline{f}_3^{[1:3]}(y_{[2:3]}\mid\tau_{[2:3]})$$

wherein: According to Eqs. (3.304) and (3.374):

$$\overline{f}_1^{[1:3]}(y_2\mid\tau_2)=\left(1+\tau_3^{i:2}\right)\cdot{}^3Q_2\cdot{}^2\overline{Q}_1(y_2\mid\tau_2) \tag{3.378}$$
$$\overline{f}_2^{[1:3]}(y_{[2:3]}\mid\tau_{[2:3]})=\left(y_3^{i:2}-\tau_3^{i:2}\right)\cdot{}^3\overline{Q}_2(y_3\mid\tau_3)\cdot{}^2Q_1(y_2\mid\tau_2)\ ,$$

According to Eqs. (3.305) and (3.374):

$$\overline{f}_2^{[1:3]}(y_2\mid\tau_2)={}^3Q_2\cdot{}^2\overline{Q}_1(y_2\mid\tau_2)\cdot{}^1l_2+(\tau_2+y_2)\cdot{}^3Q_2\cdot{}^2l_3 \tag{3.379}$$
$$\overline{f}_2^{[1:3]}(y_{[2:3]}\mid\tau_{[2:3]})={}^3\overline{Q}_2(y_3\mid\tau_3)\cdot{}^2Q_1(y_2\mid\tau_2)\cdot{}^1l_2\ ,$$

According to Eqs. (3.304). (3.305) and (3.375):

$$\overline{f}_3^{[1:3]}(y_2\mid\tau_2)=\overline{{}^i\tau_3^T\cdot C_{\cdot 11}\cdot{}^i\tau_{\cdot 3}}(y_2\mid\tau_2)\cdot\left({}^3l_4+{}^4l_5+{}^5l_6\right) \tag{3.380}$$
$$\backslash+2\cdot\overline{{}^i\tau_{\cdot 3}^T\cdot C_{\cdot 12}\cdot{}^i\tau_{\cdot 3}}(y_2\mid\tau_2)\cdot\left({}^4l_5^{\perp}+{}^3\bar n_4\cdot{}^5l_6\right)$$
$$\backslash+2\cdot\overline{{}^i\tau_{\cdot 3}^T\cdot C_{\cdot 13}\cdot{}^i\tau_{\cdot 3}}(y_2\mid\tau_2)\cdot{}^5l_6^{\perp}$$
$$\backslash+4\cdot\overline{{}^i\tau_{\cdot 3}^T\cdot C_{\cdot 14}\cdot{}^i\tau_{\cdot 3}}(y_2\mid\tau_2)\cdot{}^3\bar n_4\cdot{}^5l_6^{\perp}$$
$$\backslash+2\cdot\overline{{}^i\tau_{\cdot 3}^T\cdot C_{\cdot 24}\cdot{}^i\tau_{\cdot 3}}(y_2\mid\tau_2)\cdot{}^3N_4\cdot{}^5l_6^{\perp}$$
$$\backslash+2\cdot\overline{{}^i\tau_{\cdot 3}^T\cdot C_{\cdot 34}\cdot{}^i\tau_{\cdot 3}}(y_2\mid\tau_2)\cdot\left({}^4l_5^{\perp}+{}^3\bar n_4\cdot{}^5l_6^{o}\right)$$
$$\backslash+\overline{{}^i\tau_{\cdot 3}^T\cdot C_{\cdot 22}\cdot{}^i\tau_{\cdot 3}}(y_2\mid\tau_2)\cdot\left({}^3l_4+{}^4l_5^{o}+{}^3N_4\cdot{}^5l_6\right)$$
$$\backslash+\overline{{}^i\tau_{\cdot 3}^T\cdot C_{\cdot 33}\cdot{}^i\tau_{\cdot 3}}(y_2\mid\tau_2)\cdot\left({}^3l_4+{}^4l_5+{}^5l_6^{o}\right)$$
$$\backslash+\overline{{}^i\tau_{\cdot 3}^T\cdot C_{\cdot 44}\cdot{}^i\tau_{\cdot 3}}(y_2\mid\tau_2)\cdot\left({}^3l_4+{}^4l_5+{}^3N_4\cdot{}^5l_6^{o}\right).$$

$$\overline{f}_3^{[1:3]}(y_{[2:3]}\mid\tau_{[2:3]})=\overline{{}^i\tau_{\cdot 3}^T\cdot C_{\cdot 11}\cdot{}^i\tau_{\cdot 3}}(y_{[2:3]}\mid\tau_{[2:3]})\cdot\left({}^3l_4+{}^4l_5+{}^5l_6\right) \tag{3.381}$$
$$\backslash+2\cdot\overline{{}^i\tau_{\cdot 3}^T\cdot C_{\cdot 12}\cdot{}^i\tau_{\cdot 3}}(y_{[2:3]}\mid\tau_{[2:3]})\cdot\left({}^4l_5^{\perp}+{}^3\bar n_4\cdot{}^5l_6\right)$$

-continued $$\backslash +2\cdot \overline{{}^i\tau^T_{\cdot 3}\cdot C_{\cdot 13}\cdot {}^i\tau_{\cdot 3}}(y_{[2:3]}\mid \tau_{[2:3]})(y_2\mid \tau_2)\cdot {}^3\tilde{n}_4\cdot {}^5l_6^{\perp}$$
$$\backslash +2\cdot \overline{{}^i\tau^T_{\cdot 3}\cdot C_{\cdot 24}\cdot {}^i\tau_{\cdot 3}}(y_{[2:3]}\mid \tau_{[2:3]})\cdot {}^3N_4\cdot {}^5l_6^{\perp}$$
$$\backslash +2\cdot \overline{{}^i\tau^T_{\cdot 3}\cdot C_{\cdot 34}\cdot {}^i\tau_{\cdot 3}}(y_{[2:3]}\mid \tau_{[2:3]})\cdot ({}^4l_5^{\perp}+{}^3\tilde{n}_4\cdot {}^5l_6^{o})$$
$$\backslash +\overline{{}^i\tau^T_{\cdot 3}\cdot C_{\cdot 22}\cdot {}^i\tau_{\cdot 3}}(y_{[2:3]}\mid \tau_{[2:3]})\cdot ({}^3l_4+{}^4l_5^{o}+{}^3N_4\cdot {}^5l_6)$$
$$\backslash +\overline{{}^i\tau^T_{\cdot 3}\cdot C_{\cdot 33}\cdot {}^i\tau_{\cdot 3}}(y_{[2:3]}\mid \tau_{[2:3]})\cdot ({}^3l_4+{}^4l_5+{}^5l_6^{o})$$
$$\backslash +\overline{{}^i\tau^T_{\cdot 3}\cdot C_{\cdot 44}\cdot {}^i\tau_{\cdot 3}}(y_{[2:3]}\mid \tau_{[2:3]})\cdot ({}^3l_4+{}^4l_5+{}^3N_4\cdot {}^5l_6^{o}).$$

Eqs. (3.378)-(3.381) show that $\mathfrak{J}^{[1:3]}(y_2|\tau_2)$ is expressed in the polynomial form whose variables $y_2$ and $y_3$ are with 1-order and 0-order respectively; for $\mathfrak{J}[^{[1:3]}(y_{[2:3]}|\tau_{[2:3]})$, the variables $y_2$ and $y_3$ are with 2-orders and 1-order respectively as well. Meanwhile, since Eq. (3.376) is polynomial vector, the determinant in equation equals to zero if arbitrary two columns of structural parameters are identical. In Eq. (3.371), variables $y_2$ and $y_3$ are with 3-orders and 1-order respectively, as well as Eq. (3.376) acknowledges a polynomial form whose variable $\tau_1$ is with 2-orders. So, Eqs. (3.373) and (3.372) are valid. Q.E.D.

[3] Examples of General 6R Robo-Arm IK Solution Based on Axis-Invariant

The software of the 6R Robo-Arm IK are developed based on THEOREMs 3.5, 3.7 and 3.8 and running in the notebook computer with 2.8G Hz CPU. In the following IK solution examples, all solution times are less then 700 ms. The solution numbers depend on the structure symmetry of the Robo-Arms and there are at most 16 groups of solutions.

EXAMPLE 3.17. The structural parameters of the 6R Robo-Arm are listed below: ${}^in_1=1^{[z]}$, ${}^1n_2=1^{[y]}$, ${}^2n_3=1^{[y]}$, ${}^3n_4=1^{[x]}$, ${}^4n_5=1^{[y]}$, ${}^5n_6=1^{[x]}$; ${}^il_1=0_3$ m, ${}^1l_2^T=[0,0.3,0.8]$ m, ${}^2l_3^T=[1.8, 0.1,0]$ m, ${}^3l_4^T=[1.5,0,0]$ m, ${}^4l_5^T=[0.5,0,0]$ m, ${}^5l_6^T=0_3$ m. Given the decided position ${}_d^ir_6^T=[-0.4, 3.42998, -0.429932]$ m and the decided direction ${}_d^{i5}n_6^T=[-0.3214, 0.657742, -0.681236]$, then there exist the 8 groups of solutions as follows:

$\phi_{[1][*]}=[-76.69657, 170.546093, -20, 33.69583, -16.915188]$ Deg, $\phi_{[2][*]}=[-76.69657, 170.546093, -20, -146.30417, 16.915188]$ Deg, $\phi_{[3][*]}=[-76.69657, 150, 20, -16.44416, -34.76538]$ Deg, $\phi_{[4][*]}=[-76.69657, 150, 20, -163.55584, 34.76538]$ Deg, $\phi_{[5][*]}=[-90, 30, -20, 30, 40]$ Deg, $\phi_{[6][*]}=[-90, 30, -20, -150, -40]$ Deg, $\phi_{[7][*]}=[90, 9.4539, -20, -130.008225, -24.80936]$ Deg, $\phi_{[8][*]}=[90, 9.4539, -20, 49.99178, 24.80936]$ Deg.

EXAMPLE 3.18. The structural parameters of the 6R Robo-Arm are listed below: ${}^in_1=1^{[z]}$, ${}^1n_2=1^{[y]}$, ${}^2n_3=1^{[y]}$, ${}^3n_4=1^{[x]}$, ${}^4n_5=1^{[y]}$, ${}^5n_6=1^{[x]}$; ${}^il_1=0_3$ m, ${}^1l_2^T=[0,0.3,0.8]$ m, ${}^2l_3^T=[1.8, 0.1,0]$ m, ${}^3l_4^T=[1.5,0,0]$ m, ${}^4l_5^T=[0.5,0,0]$ m, ${}^5l_6^T=0_3$ m. (a) Given the decided position ${}_d^ir_6^T=[-0.41732, 3.431717, -0.420083]$ m and the decided direction ${}_d^{i5}n_6^T=[-0.3214, 0.657742, -0.681236]$, then there exists only one group of solution $\phi_{[1][*]}=[90, 30, -20, 30, 40]$ Deg. (b) Given the decided position ${}_d^ir_6^T=[-0.42, 3.42998, -0.429932]$ m and the decided direction ${}_d^{i5}n_6^T=[-0.3214, 0.657742, -0.681236]$, then then there exist the 2 groups of solutions as follows:

$\phi_{[1][*]}=[90, 30, -20, 0, 0]$ Deg and $\phi_{[2][*]}=[90, 9.45391, 20, 0, -19.45391]$ Deg.

The general 6R Robo-Arm will help to increase the absolute positioning accuracy and further optimize the structure of the Robo-Arm.

Axis-Invariant based position and attitude inverse solution of General 7R Robo-Arms Since the 5R general Robo-Arm's Axis #5 achieves fixed-point alignment and the Axis #7 achieves infinite rotation, the Axis #6 can be used for collision avoidance adjustment, with a humanoid arm structure. The general 7R Robo-Arm controls Axis #7 with the desired position and attitude alignment through the first 6-Axes, and Axis #7 is infinitely rotating or controlling Axis #7 to satisfy the radial alignment. Therefore, 7R general Robo-Arm has more flexibility than the 6R Robo-Arm in spatial operation.

This section examines the inverse problem of the general 7R Robo-Arm with the nominal pick point on the 7 Axis #7. The arm is characterized by: the inverse solution problem for a given desired position ${}_d^ir_7$ and desired attitude ${}_d^i\boldsymbol{\tau}_7$ is equivalent to the inverse solution problem for a given desired position ${}_d^ir_7$ and desired attitude ${}_d^i\boldsymbol{\tau}_6$, ie the 7R manipulator is essentially a 6R shaft chain problem. In the following, the preparation theorem of general 7R Robo-Arm inverse solution is first explained and proved.

THEOREM 3.9. If given 7R AC ${}^il_7=(i,1:6]$, ${}^il_1=0_3$. The desired position and attitude respectively as ${}_d^1r_7$ and ${}_d^i\boldsymbol{\tau}_6$. Define the 7R manipulator kinematics polynomial equation characterized by the axis invariance is:

$$f^{[1:3]} := {}_d\tau_6^i\cdot\left({}^3Q_1\cdot{}^1Q_i\cdot{}_d^ir_7-\tau_1^i\cdot\begin{pmatrix}{}^4Q_1\cdot{}^1l_2+\tau_2^1\cdot{}^4Q_2\cdot{}^2l_3\\ \backslash+\tau_2^1\tau_3^2\cdot{}^4Q_3\cdot{}^3l_4\end{pmatrix}\right) \quad (3.382)$$
$$\backslash -{}^i\tau_4^T\cdot C_{\cdot 11}\cdot{}^i\tau_{\cdot 4}\cdot({}^4l_5+{}^5l_6+{}^6l_7)$$
$$\backslash -2\cdot{}^i\tau^T_{\cdot 4}\cdot C_{\cdot 12}\cdot{}^i\tau_{\cdot 4}\cdot({}^5l_6^{\perp}+{}^4\tilde{n}_5\cdot{}^6l_7)$$
$$\backslash -2\cdot{}^i\tau^T_{\cdot 4}\cdot C_{\cdot 13}\cdot{}^i\tau_{\cdot 4}\cdot{}^6l_7^{\perp}-4\cdot{}^i\tau^T_{\cdot 4}\cdot C_{\cdot 14}\cdot{}^i\tau_{\cdot 4}\cdot{}^4\tilde{n}_5\cdot{}^6l_7^{\perp}$$
$$\backslash -2\cdot{}^i\tau^T_{\cdot 4}\cdot C_{\cdot 24}\cdot{}^i\tau_{\cdot 4}\cdot({}^5l_6^{\perp}+{}^4\tilde{n}_5\cdot{}^6l_7^{o})$$
$$\backslash -2\cdot{}^i\tau^T_{\cdot 4}\cdot C_{\cdot 34}\cdot{}^i\tau_{\cdot 4}\cdot{}^4N_5\cdot{}^6l_7^{\perp}$$
$$\backslash -{}^i\tau^T_{\cdot 4}\cdot C_{\cdot 22}\cdot{}^i\tau_{\cdot 4}\cdot({}^4l_5+{}^5l_6^{o}+{}^4N_5\cdot{}^6l_7)$$
$$\backslash -{}^i\tau^T_{\cdot 4}\cdot C_{\cdot 33}\cdot{}^i\tau_{\cdot 4}\cdot({}^4l_5+{}^5l_6+{}^6l_7^{o})$$
$$\backslash -{}^i\tau^T_{\cdot 4}\cdot C_{\cdot 44}\cdot{}^i\tau_{\cdot 4}\cdot({}^4l_5+{}^5l_6^{o}+{}^4N_5\cdot{}^6l_7^{o})=0_3,$$

$$f^{[4]} := {}^i\tau^T_{\cdot 4}\cdot\begin{pmatrix}C_{\cdot 11}+C_{\cdot 22}+\\ \backslash C_{\cdot 33}+C_{\cdot 44}\end{pmatrix}\cdot{}^i\tau_{\cdot 4}-{}^i\tau^{[6]}_{\cdot 4}\cdot{}_d\tau_6^i\cdot C_{\cdot [1]}\cdot{}^i\tau_{\cdot 4}=0$$

wherein $$\tau_1^i=1+\tau_1{:}^2,\tau_2^1=1+\tau_2{:}^2,\tau_3^2=1+\tau_3{:}^2,{}_d\tau_6^i=\|{}_d^i\boldsymbol{\tau}_6\|^2. \quad (3.384).$$

The matrix of the system stnicture parameters and the desired Ju-Gibbs pose quaternion is expressed as $${}^4E_6{:}^{-1}=[{}^4n_5\ {}^5n_6\ {}^4\tilde{n}_5\cdot{}^5n_6], \quad (3.384)$$

$${}^4E_6^{:-1}=\begin{bmatrix}{}^4n_5 & {}^4n_6 & {}^4\tilde{n}_5\cdot{}^5n_6\end{bmatrix}, \quad (3.384)$$

$$C=\begin{bmatrix}{}_d^i\tau_6^T+{}^4n_5^T\cdot{}^5n_6\cdot & 1+{}^4n_5^T\cdot{}^5n_6\cdot\\ \backslash{}^4E_6^{[3][*]}\cdot({}_d^i\bar{\tau}_6-1), & \backslash{}^4E_6^{[3][*]}\cdot{}_d^i\tau_6\\ {}^4E_6\cdot({}_d^i\bar{\tau}_6-1) & {}^4E_6\cdot{}_d^i\tau_6\end{bmatrix}, \quad (3.385)$$

-continued $$\underset{\cdot}{C}_{[1]} = \begin{bmatrix} {}^i_d\tau_6^T + {}^4n_5^T\cdot{}^5n_6\cdot & 1+{}^4n_5^T\cdot{}^5n_6\cdot \\ \backslash{}^4E_6^{[3][*]}\cdot\left({}^i_d\bar{\tau}_6-1\right), & \backslash{}^4E_6^{[3][*]}\cdot{}^i_d\tau_6 \end{bmatrix} \tag{3.386}$$

$$\underset{\cdot}{C}_{[k+1]} = \left[{}^4E_6^{[k][*]}\cdot\left({}^i_d\bar{\tau}_6-1\right), {}^4E_6^{[k][*]}\cdot{}^i_d\tau_6\right], k\in[1:3],$$

$$\underset{\cdot}{C}_{11} \triangleq \underset{\cdot}{C}^T_{[1]}\cdot\underset{\cdot}{C}_{[1]}, \underset{\cdot}{C}_{22} \triangleq \underset{\cdot}{C}^T_{[2]}\cdot\underset{\cdot}{C}_{[2]} \tag{3.387}$$

$$\underset{\cdot}{C}_{33} \triangleq \underset{\cdot}{C}^T_{[3]}\cdot\underset{\cdot}{C}_{[3]}, \underset{\cdot}{C}_{44} \triangleq \underset{\cdot}{C}^T_{[4]}\cdot\underset{\cdot}{C}_{[4]}$$

$$\underset{\cdot}{C}_{12} \triangleq \underset{\cdot}{C}^T_{[1]}\cdot\underset{\cdot}{C}_{[2]}, \underset{\cdot}{C}_{13} \triangleq \underset{\cdot}{C}^T_{[1]}\cdot\underset{\cdot}{C}_{[3]}, \underset{\cdot}{C}^T_{[4]}\cdot\underset{\cdot}{C}^T_{[4]}$$

$$\underset{\cdot}{C}_{23} \triangleq \underset{\cdot}{C}^T_{[2]}\cdot\underset{\cdot}{C}_{[3]}, \underset{\cdot}{C}_{24} \triangleq \underset{\cdot}{C}^T_{[2]}\cdot\underset{\cdot}{C}_{[4]}, \underset{\cdot}{C}_{34} \triangleq \underset{\cdot}{C}^T_{[3]}\cdot\underset{\cdot}{C}_{[4]}.$$

PROOF: Let desired ${}^i\boldsymbol{\tau}_6$ align with attitude ${}^i_d\boldsymbol{\tau}_6$. Eq (3.287) results in ${}^i\boldsymbol{\tau}_4 {}^{*4}\boldsymbol{\tau}_6 = {}^i\boldsymbol{\tau}_6^{[4]}\cdot{}^i_d\boldsymbol{\tau}_6$ and eq. (3.239) results in:

$$\tau_4^i\cdot\tau_6^4 = {}^i\tau_6^{[4]:2}\cdot{}_d\tau_6^i,\ \ \tau_4^i\cdot{}^4\tau_6 = {}^i\tau_6^{[4]}\cdot{}^i\bar{\tau}_4^*\cdot{}^i_d\tau_6. \tag{3.388}$$

Eq. (3.387) is derived from Eq. (3.233). Eq. (3.388) results in:

$$\tau_4^i\cdot{}^4\tau_6 = {}^i\tau_6^{[4]}\cdot\backslash\begin{bmatrix} {}^i\tau_4^{[4]}\cdot{}^i_d\tau_6+\left({}^i_d\bar{\tau}_6-1\right)\cdot{}^i\tau_4 \\ {}^i\tau_4^{[4]}+{}^i_d\tau_6^T\cdot{}^i\tau_4 \end{bmatrix} = {}^i\tau_6^{[4]}\cdot\begin{bmatrix} {}^i_d\bar{\tau}_6-1 & {}^i_d\tau_6 \\ {}^i_d\tau_6^T & 1 \end{bmatrix}\cdot{}^i\tau_4, \tag{3.389}$$

Eq. (3.234) results in:

$${}^4\tau_6 = \begin{bmatrix} \tau_5\cdot{}^4n_5+\tau_6\cdot{}^5n_6+\tau_5\tau_6\cdot{}^4\tilde{n}_5\cdot{}^5n_6 \\ 1-\tau_5\tau_6\cdot{}^4n_5^T\cdot{}^5n_6 \end{bmatrix} = {}_4K_4\cdot\begin{vmatrix} 1 \\ \tau_5 \\ \tau_6 \\ \tau_5\tau_6 \end{vmatrix}, \tag{3.390}$$

wherein $${}_4K_4 - \begin{bmatrix} 0_3 & {}^4n_5 & {}^5n_6 & {}^4\tilde{n}_5\cdot{}^5n_6 \\ 1 & 0 & 0 & -{}^4n_5^T\cdot{}^5n_6 \end{bmatrix}. \tag{3.391}$$

Eqs. (3.389) and (3.390) yield $$\tau_4^i\cdot[1,\tau_5,\tau_6,\tau_5\tau_6]^T = {}^i\tau_6^{[4]}\cdot{}_4K_4^{-1}\cdot\begin{bmatrix} {}^i_d\bar{\tau}_6-1 & {}^i_d\tau_6 \\ {}^i_d\tau_6^T & 1 \end{bmatrix}\cdot{}^i\tau_4, \tag{3.392}$$

Eq. (3.246) results in:

$${}_4K_4^{-1} = \begin{bmatrix} {}^4n_5^T\cdot{}^5n_6\cdot{}^4E_6^{[3][*]}, & 1 \\ {}^4E_6, & 0_3 \end{bmatrix}. \tag{3.393}$$

Take Eq. (3.393) into Eq. (3.392), obtain $$\tau_4^i\cdot[1,\ \tau_5,\ \tau_6,\ \tau_5\tau_6]^T = {}^i\tau_6^{[4]}\cdot\underset{\cdot}{C}\cdot{}^i\tau_4, \tag{3.394}$$

wherein $$\underset{\cdot}{C} = \begin{bmatrix} {}^4n_5^T\cdot{}^5n_6\cdot{}^4E_6^{[3][*]}, & 1 \\ {}^4E_6, & 0_3 \end{bmatrix}\cdot\begin{bmatrix} {}^i_d\bar{\tau}_6-1 & {}^i_d\tau_6 \\ {}^i_d\tau_6^T & 1 \end{bmatrix}. \tag{3.395}$$

Eq. (3.385) is derived from Eq. (3.395), Eqs. (3.385) and (3.394) result in:

$$\tau_4^i = {}^i\boldsymbol{\tau}_6^{[4]}\cdot\underset{\cdot}{C}_{[1]}\cdot{}^i\boldsymbol{\tau}_4,$$

$$\tau_4^i\cdot\tau_5 = {}^i\boldsymbol{\tau}_6^{[4]}\cdot\underset{\cdot}{C}_{[2]}\cdot{}^i\boldsymbol{\tau}_4 \tag{3.396}$$

$$\tau_4^i\cdot\tau_6 = {}^i\boldsymbol{\tau}_6^{[4]}\cdot\underset{\cdot}{C}_{[3]}\cdot{}^i\boldsymbol{\tau}_4,$$

$$\tau_4^i\cdot\tau_5\tau_6 = {}^i\boldsymbol{\tau}_6^{[4]}\cdot\underset{\cdot}{C}_{[4]}\cdot{}^i\boldsymbol{\tau}_4 \tag{3.397}$$

Eq. (3.396) is the constraint equation of ${}^i\boldsymbol{\tau}_4$, attitude ${}^i_d\boldsymbol{\tau}_6$ and the structural parameters of Axis #5 and Axis #6. Eq. (3.385) results in Eq. (3.387) and $$\begin{aligned} \tau_4^{i:2} &= {}^i\tau_6^{[4]:2}\cdot{}^i\tau_4^T\cdot\underset{\cdot}{C}_{11}\cdot{}^i\tau_4 \\ \tau_4^{i:2}\cdot\tau_5^{:2} &= {}^i\tau_6^{[4]:2}\cdot{}^i\tau_4^T\cdot\underset{\cdot}{C}_{22}\cdot{}^i\tau_4 \\ \tau_4^{i:2}\cdot\tau_6^{:2} &= {}^i\tau_6^{[4]:2}\cdot{}^i\tau_4^T\cdot\underset{\cdot}{C}_{33}\cdot{}^i\tau_4 \\ \tau_4^{i:2}\cdot\tau_5^{:2}\tau_6^{:2} &= {}^i\tau_6^{[4]:2}\cdot{}^i\tau_4^T\cdot\underset{\cdot}{C}_{44}\cdot{}^i\tau_4 \\ \tau_4^{i:2}\cdot\tau_5^{:2}\tau_6 &= {}^i\tau_6^{[4]:2}\cdot{}^i\tau_4^T\cdot\underset{\cdot}{C}_{24}\cdot{}^i\tau_4 \\ \tau_4^{i:2}\cdot\tau_5\tau_6^{:2} &= {}^i\tau_6^{[4]:2}\cdot{}^i\tau_4^T\cdot\underset{\cdot}{C}_{34}\cdot{}^i\tau_4 \end{aligned}. \tag{3.398}$$

Eqs. (3.396) and (3.387) yields $$\begin{aligned} \tau_4^i\cdot\underset{\cdot}{C}_{[2]}\cdot{}^i\tau_4 &= {}^i\tau_6^{[4]}\cdot{}^i\tau_4^T\cdot\underset{\cdot}{C}_{12}\cdot{}^i\tau_4 \\ \tau_4^i\cdot\underset{\cdot}{C}_{[3]}\cdot{}^i\tau_4 &= {}^i\tau_6^{[4]}\cdot{}^i\tau_4^T\cdot\underset{\cdot}{C}_{13}\cdot{}^i\tau_4 \\ \tau_4^i\cdot\underset{\cdot}{C}_{[4]}\cdot{}^i\tau_4 &= {}^i\tau_6^{[4]}\cdot{}^i\tau_4^T\cdot\underset{\cdot}{C}_{14}\cdot{}^i\tau_4 \end{aligned}. \tag{3.399}$$

Eqs. (3.396)-(3.399) are applied for the simplification of subsequent equations. C is a constant structure matrix. The 2-norms on both sides of Eq. (3.398) are expressed as $$\tau_4^{i:2}\cdot\left\| 1\ \ \tau_5\ \ \tau_6\ \ \tau_5\tau_6\right\|^2 = {}^i\tau_6^{[4]:2}\cdot\|\underset{\cdot}{C}\|^2\cdot\left\|{}^i\tau_4\right\|^2. \tag{3.400}$$

Eq. (3.242) results in:

$$\tau_6^4 = \left(1+\tau_5^{:2}\right)\cdot\left(1+\tau_6^{:2}\right) = 1+\tau_5^{:2}+\tau_6^{:2}+\tau_5^{:2}\tau_6^{:2}. \tag{3.401}$$

According to Eqs. (3.398), (3.397) and (3.401), obtain $$\tau_4^{i:2}\cdot\tau_6^4 = {}^i\boldsymbol{\tau}_6^{[4]:2}\cdot{}^i\boldsymbol{\tau}_4^T\cdot(\underset{\cdot}{C}_{11}+\underset{\cdot}{C}_{22}+\underset{\cdot}{C}_{33}+\underset{\cdot}{C}_{44})\cdot{}^i\boldsymbol{\tau}_4. \tag{3.402}$$

At the same time, according to Eqs. (3.388), (3.396) and (3.402), arrive at $$\begin{aligned} \tau_4^{i:2}\cdot\tau_6^4 &= {}^i\tau_6^{[4]:2}\cdot{}^i\tau_4^T\cdot\left(\underset{\cdot}{C}_{11}+\underset{\cdot}{C}_{22}+\underset{\cdot}{C}_{33}+\underset{\cdot}{C}_{44}\right)\cdot{}^i\tau_4 \\ &= {}^i\tau_6^{[4]:3}\cdot{}_d\tau_6^i\cdot\underset{\cdot}{C}_{[1]}\cdot{}^i\tau_4 \end{aligned}. \tag{3.403}$$

Therefore, $${}^i\boldsymbol{\tau}_4^T\cdot(\underset{\cdot}{C}_{11}+\underset{\cdot}{C}_{22}+\underset{\cdot}{C}_{33}+\underset{\cdot}{C}_{44})\cdot{}^i\boldsymbol{\tau}_4 = {}^i\boldsymbol{\tau}_6^{[4]}\cdot{}_d\tau_6^i\cdot\underset{\cdot}{C}_{[1]}\cdot{}^i\boldsymbol{\tau}_4. \tag{3.404}$$

Eq. (3.404) yields the attitude equation of Eq. (3.386). In consideration of the position alignment when ${}^i l_1 = 0_3$, obtain $$ {}^1Q_i\cdot{}^i_d r_7-{}^1r_4={}^1Q_4\cdot\sum_l^{(4:7]}({}^4Q_{\bar l}\cdot{}^{\bar l}l_l). \tag{3.405}$$

Eqs. (3.2) and (3.405) result in $$\frac{1}{\tau_1^i}\cdot{}^1Q_i\cdot{}^i_d r_7-\frac{1}{\tau_3^1}\cdot\sum_l^{(1:4]}\left(\tau_3^{\bar l}\cdot{}^1Q_{\bar l}\cdot{}^{\bar l}l_l\right)=\frac{1}{\tau_4^1\tau_6^4}\cdot{}^1Q_4\cdot\sum_l^{(4:7]}\left(\tau_6^{\bar l}\cdot{}^4Q_{\bar l}\cdot{}^{\bar l}l_l\right); \tag{3.406}$$

then $$\tau_6^4\cdot{}^4Q_1\cdot$$

$$\left(\tau_1^i\tau_4^1\cdot{}^1Q_i\cdot{}^i_d r_7-\tau_1^{i:2}\tau_4^3\cdot\sum_l^{(1:4]}\left(\tau_3^{\bar l}\cdot{}^1Q_{\bar l}\cdot{}^{\bar l}l_l\right)=\tau_1^{i:2}\cdot\tau_4^{1:3}\cdot\sum_l^{(4:7]}\left(\tau_6^{\bar l}\cdot{}^4Q_{\bar l}\cdot{}^{\bar l}l_l\right),\right.$$

i.e.

$$\tau_4^i\cdot\tau_6^4\cdot{}^4Q_i\cdot\begin{pmatrix}\tau_4^i\cdot{}^1Q_i\cdot{}^i_d r_7-\tau_1^{i:2}\tau_4^3\\ \backslash\cdot\sum_l^{(1:4]}\left(\tau_3^{\bar l}\cdot{}^1Q_{\bar l}\cdot{}^{\bar l}l_l\right)\end{pmatrix}=\tau_4^{i:3}\cdot\sum_l^{(4:7]}\left(\tau_6^{\bar l}\cdot{}^4Q_{\bar l}\cdot{}^{\bar l}l_l\right)\cdot$$

Apparently, obtain $$\begin{aligned}&\tau_1^{i:2}\cdot\tau_4^3\cdot{}^4Q_1\cdot\sum_l^{(1:4]}\left(\tau_3^{\bar l}\cdot{}^1Q_{\bar l}\cdot{}^{\bar l}l_l\right)\\&=\tau_1^i\cdot\begin{pmatrix}\tau_1^i\cdot\tau_2^1\cdot\tau_3^2\cdot\tau_4^3\cdot{}^4Q_1\cdot{}^1l_2+\tau_1^i\cdot\tau_2^{1:2}\cdot{}^4Q_2\cdot\tau_3^2\cdot\tau_4^3\cdot{}^2l_3\\ \backslash+\tau_1^i\cdot\tau_2^{1:2}\tau_3^{2:2}\cdot{}^4Q_3\cdot\tau_4^3\cdot{}^3l_4\end{pmatrix}\\&=\tau_1^i\cdot\tau_3^i\cdot\left({}^4Q_1\cdot{}^1l_2+\tau_2^1\cdot{}^4Q_2\cdot{}^2l_3+\tau_2^1\cdot\tau_3^2\cdot{}^4Q_3\cdot{}^3l_4\right).\end{aligned} \tag{3.407}$$

From Eqs. (3.388) and (3.407), the left hand side of Eq. (3.406) is expressed as $$\begin{aligned}&\tau_4^i\cdot\tau_6^4\cdot{}^4Q_1\cdot\left(\tau_4^i\cdot{}^1Q_i\cdot{}^i_d r_7-\tau_1^{i:2}\tau_4^3\cdot\sum_l^{(1:4]}\left(\tau_3^{\bar l}\cdot{}^1Q_{\bar l}\cdot{}^{\bar l}l_l\right)\right)=\\&\tau_4^i\tau_6^4\backslash\cdot\left(\tau_4^i\cdot{}^4Q_1\cdot{}^1Q_i\cdot{}^i_d r_7-\tau_1^{i:2}\cdot\tau_4^3\cdot{}^4Q_1\cdot\sum_l^{(1:4]}\left(\tau_1^{\bar l}\cdot{}^1Q_{\bar l}\cdot{}^{\bar l}l_l\right)\right)=\backslash{}^i\tau_5^{[4]:2}\cdot\\&{}_d\tau_6^i\cdot\tau_3^i\cdot\left({}^3Q_1\cdot{}^1Q_i\cdot{}^i_d r_7-\tau_1^i\cdot\begin{pmatrix}{}^4Q_1\cdot{}^1l_2+\tau_2^1\cdot{}^4Q_2\cdot{}^2l_3\\ \backslash+\tau_2^1\cdot\tau_3^2\cdot{}^4Q_3\cdot{}^3l_4\end{pmatrix}\right).\end{aligned} \tag{3.408}$$

According to Eqs. (3.290), (3.397), (3.398) and (3.403), arrive at $$\begin{aligned}&\tau_4^{i:3}\cdot\sum_l^{(4.7]}\left(\tau_6^{\bar l}\cdot{}^4Q_{\bar l}\cdot{}^{\bar l}l_l\right)=\tau_4^{i:3}\cdot\begin{pmatrix}\tau_6^4\cdot{}^4l_5+\tau_6^5\cdot{}^4Q_5\\ \backslash\cdot{}^5l_6+{}^5Q_6\cdot{}^6l_7\end{pmatrix}=\\&\tau_4^{i:3}\cdot\backslash\begin{pmatrix}{}^4l_5+{}^5l_6+{}^6l_7+2\tau_6\cdot{}^6l_7^{\perp}+2\tau_5^{:2}\tau_6\cdot{}^4N_5\cdot{}^6l_7^{\perp}\\ \backslash+2\tau_5\tau_6^{:2}\cdot\left({}^5l_6^{\perp}+{}^4\tilde n_5\cdot{}^6l_7^{\circ}\right)+\tau_6^{:2}\cdot\left({}^4l_5+{}^5l_6+{}^6l_7^{\circ}\right)\\ \backslash+4\tau_5\tau_6\cdot{}^4\tilde n_5\cdot{}^6l_7^{\perp}+2\tau_6\cdot\left({}^5l_6^{\perp}+{}^4\tilde n_5\cdot{}^6l_7\right)+\tau_6^{:2}\cdot\\ \backslash\left({}^4l_5+{}^5l_6^{\circ}+{}^4N_5\cdot{}^6l_7\right)+\tau_5^{:2}\tau_6^{:2}\cdot\left({}^4l_5+{}^5l_6^{\circ}+{}^4N_5\cdot{}^6l_7^{\circ}\right)\end{pmatrix}.\end{aligned} \tag{3.409}$$

Eqs. (3.398) and (3.409) result in $$\begin{aligned}\tau_4^{i:3}\cdot\sum_l^{(4.7]}\left(\tau_6^{\bar l}\cdot{}^4Q_{\bar l}\cdot{}^{\bar l}l_l\right)=&\ \tau_4^i\cdot{}^i\tau_6^{[4]:2}\cdot{}^i\tau_4^T\cdot C_{11}\cdot{}^i\tau_4\cdot\begin{pmatrix}{}^4l_5+{}^5l_6\\ \backslash+{}^6l_7\end{pmatrix}\\&\backslash+2\cdot\tau_4^{i:2}\cdot{}^i\tau_6^{[4]}\cdot C_{[2]}\cdot{}^i\tau_4\cdot\left({}^5l_6^{\perp}+{}^4\tilde n_5\cdot{}^6l_7\right)\\&\backslash+2\cdot\tau_4^{i:2}\cdot{}^i\tau_6^{[4]}\cdot C_{[3]}\cdot{}^i\tau_4\cdot{}^6l_7^{\perp}\\&\backslash+4\cdot\tau_4^{i:2}\cdot{}^i\tau_6^{[4]}\cdot C_{[4]}\cdot{}^i\tau_4\cdot{}^4\tilde n_5\cdot{}^6l_7^{\perp}\\&\backslash+2\cdot\tau_4^i\cdot{}^i\tau_6^{[4]:2}\cdot{}^i\tau_4^T\cdot C_{24}\cdot{}^i\tau_4\cdot\left({}^5l_6^{\perp}+{}^4\tilde n_5\cdot{}^6l_7^{\circ}\right)\\&\backslash+2\cdot\tau_4^i\cdot{}^i\tau_6^{[4]:2}\cdot{}^i\tau_4^T\cdot C_{34}\cdot{}^i\tau_4\cdot{}^4N_5\cdot{}^6l_7^{\perp}\\&\backslash+\tau_4^i\cdot{}^i\tau_6^{[4]:2}\cdot{}^i\tau_4^T\cdot C_{22}\cdot{}^i\tau_4\cdot\left({}^4l_5+{}^5l_6^{\circ}+{}^4N_5\cdot{}^6l_7\right)\\&\backslash+\tau_4^i\cdot{}^i\tau_6^{[4]:2}\cdot{}^i\tau_4^T\cdot C_{33}\cdot{}^i\tau_4\cdot\left({}^4l_5+{}^5l_6+{}^6l_7^{\circ}\right)\\&\backslash+\tau_4^i\cdot{}^i\tau_6^{[4]:2}\cdot{}^i\tau_4^T\cdot C_{44}\cdot{}^i\tau_4\cdot\left({}^4l_5+{}^5l_6^{\circ}+{}^4N_5\cdot{}^6l_7^{\circ}\right).\end{aligned} \tag{3.410}$$

According to Eqs. (3.396), (3.399) and (3.410), obtain $$\begin{aligned}\tau_4^{i:3}\cdot\sum_l^{(4.7]}\left(\tau_6^{\bar l}\cdot{}^4Q_{\bar l}\cdot{}^{\bar l}l_l\right)=&\ \tau_4^i\cdot{}^i\tau_6^{[4]:2}\cdot{}^i\tau_4^T\cdot C_{11}\cdot{}^i\tau_4\cdot\left({}^4l_5+{}^5l_6+{}^6l_7\right)\\&\backslash+2\cdot\tau_4^i\cdot{}^i\tau_6^{[4]:2}\cdot{}^i\tau_4^T\cdot C_{12}\cdot{}^i\tau_4\cdot\left({}^5l_6^{\perp}+{}^4\tilde n_5\cdot{}^6l_7\right)\\&\backslash+2\cdot\tau_4^i\cdot{}^i\tau_6^{[4]:2}\cdot{}^i\tau_4^T\cdot C_{13}\cdot{}^i\tau_4\cdot{}^6l_7^{\perp}\\&\backslash+4\cdot\tau_4^i\cdot{}^i\tau_6^{[4]:2}\cdot{}^i\tau_4\cdot C_{14}\cdot{}^i\tau_4\cdot{}^4\tilde n_5\cdot{}^6l_7^{\perp}\\&\backslash+2\cdot\tau_4^i\cdot{}^i\tau_6^{[4]:2}\cdot{}^i\tau_4^T\cdot C_{24}\cdot{}^i\tau_4\cdot\left({}^5l_6^{\perp}+{}^4\tilde n_5\cdot{}^6l_7^{\circ}\right)\\&\backslash+2\cdot\tau_4^i\cdot{}^i\tau_6^{[4]:2}\cdot{}^i\tau_4^T\cdot C_{34}\cdot{}^i\tau_4\cdot{}^4N_5\cdot{}^6l_7^{\perp}\\&\backslash+\tau_4^i\cdot{}^i\tau_6^{[4]:2}\cdot{}^i\tau_4^T\cdot C_{22}\cdot{}^i\tau_4\cdot\left({}^4l_5+{}^5l_6^{\circ}+{}^4N_5\cdot{}^6l_7\right)\\&\backslash+\tau_4^i\cdot{}^i\tau_6^{[4]:2}\cdot{}^i\tau_4^T\cdot C_{33}\cdot{}^i\tau_4\cdot\left({}^4l_5+{}^5l_6+{}^6l_7^{\circ}\right)\\&\backslash+\tau_4^i\cdot{}^i\tau_6^{[4]:2}\cdot{}^i\tau_4^T\cdot C_{44}\cdot{}^i\tau_4\cdot\left({}^4l_5+{}^5l_6^{\circ}+{}^4N_5\cdot{}^6l_7^{\circ}\right).\end{aligned} \tag{3.411}$$

Eqs. (3.408) and (3.411) are put into Eq. (3.406), and with ${}^i\tau_6^{[4]:2}\cdot\tau_4^i$ of both sides of the equation are eliminated, so the position equation in Eq. (3.382) can be obtained. Q.E.D.

The significance of theorem 3.9 is elaborated below: Eq. (3.345) is four polynomial equations of four variables with 2-Order with $\tau_5$ and $\tau_6$ eliminated. Obviously, the $y_{[2:4]}$ order of the Cayley-Dixon determinant in Eq. (3.341) is [5,3,1] at least. If applied Eq. (3.36), The computational complexity of a determinant is up to the magnitude of 48*48!, which is difficult to achieve under the conditions of modern computing technology.

Ju-Gibbs Delta-Quaternion

From the inverse solution to position and attitude of the Axis-Invariant based general 6R Robo-Arm and general 7R Robo-Arm: the computational complexity is relatively high and it is necessary to solve technical problems arising from the real-time computation. In engineering, the computation precision is a relative concept, the engineering requirements can be met as long as the numerical calculation accuracy is much higher than 4 to 6 times the accuracy of system structural parameters. The attitude equation in Eq. (3.1) and the position equation in Eq. (3.2) are essentially the expressions concerning the Ju-Gibbs Quaternion. The requirements for engineering accuracy can be met as long as Eqs. (3.1) and (3.2) have sufficient calculation accuracy. The Ju-Gibbs Delta-quaternion is put forward below to establish the general incremental position and attitude equations of the 6R Robo-Arm and the real-time IK solution.

[1] Definition of Ju-Gibbs Delta-Quaternion

Replace τ and τ with C and ε respectively, the Ju-Gibbs Delta-quaternion is defined below:

$$ {}^{l}\underset{\cdot}{\boldsymbol{\varepsilon}}_{l} \triangleq [{}^{l}n_{l}\cdot\varepsilon_{l},1]^{T}=[{}^{l}\varepsilon_{l},1]^{T}, \tag{3.412}$$

wherein $$\begin{gathered}\varepsilon_l=\tan\left(\delta\phi_l^{\bar{l}}/2\right),\ {}^{\bar{l}}\varepsilon_l={}^{\bar{l}}n_l\cdot\varepsilon_l,\ {}^{\bar{l}}\tilde{\varepsilon}_l={}^{\bar{l}}\tilde{n}_l\cdot\varepsilon_l \\ \varepsilon_l^{\bar{l}:2}=1+\varepsilon_l^{:2},\ \delta\phi_l^{\bar{l}}\to 0\end{gathered}. \tag{3.413}$$

Apparently, the Ju-Gibbs Delta-quaternion is a 4D complex number and additionally, $$\varepsilon_l^{:2}\to 0,\ \varepsilon_l^{\bar{l}:2}\to 1 \tag{3.414}$$

[2] Nature of Ju-Gibbs Delta-Quaternion

According to Eqs. (3.234) and Eqs (3.412)-(3.414):

$$ {}^{\bar{\bar{l}}}\varepsilon_l={}^{\bar{\bar{l}}}\varepsilon_{\bar{l}}*{}^{\bar{l}}\varepsilon_l\to\begin{bmatrix}\varepsilon_l\cdot{}^{\bar{\bar{l}}}n_{\bar{l}}+\varepsilon_{\bar{l}}\cdot{}^{\bar{l}}n_l\\1\end{bmatrix}. \tag{3.415}$$

Eqs. (3.235) and (3.414) result in:

$$\begin{gathered}\varepsilon_{\bar{l}}^{\bar{\bar{l}}:2}=\left(1+\varepsilon_l^{:2}\right)\cdot\left(1+\varepsilon_{\bar{l}}^{:2}\right)\to 1\\ \varepsilon_n^{i}\triangleq\prod_{k}^{{}^{i}\mathbf{1}_n}\left(1+\varepsilon_k^{:2}\right)\to 1\end{gathered}. \tag{3.416}$$

Eq. (3.233) results in:

$$ {}^{i}\varepsilon_4={}^{1}\tilde{\varepsilon}_2\cdot{}^{2}\varepsilon_4=\begin{bmatrix}\varepsilon_1\cdot{}^{i}n_1+\varepsilon_2\cdot{}^{1}n_2+\varepsilon_3\cdot{}^{2}n_3+\varepsilon_4\cdot{}^{3}n_4\\1\end{bmatrix}, \tag{3.417}$$

Eq. (3.1) results in:

$$\prod_{k}^{{}^{i}\mathbf{1}_n}\left(1+\varepsilon_k^{:2}\right)\cdot{}^{i}Q_n=\sum_{l}^{{}^{i}\mathbf{1}_n}\left(1+2\cdot\varepsilon_l\cdot{}^{\bar{l}}\tilde{n}_l\right). \tag{3.418}$$

Eqs. (3.240) and (3.241) result in:

$$\varepsilon_l^{\bar{l}}\cdot{}^{\bar{l}}Q_l(\varepsilon_l)={}^{\bar{l}}Q_l(\varepsilon_l)=1+2\cdot\varepsilon_l\cdot{}^{\bar{l}}\tilde{n}_l, \tag{3.419}$$

$$\varepsilon_n^{i}\cdot{}^{i}Q_n={}^{i}Q_n,\ \ {}^{i}Q_n\cdot{}^{i}Q_n^{-1}={}^{i}Q_n^{-1}\cdot{}^{i}Q_n=\varepsilon_n^{i:2}\cdot 1. \tag{3.420}$$

Axis-Invariant Based Motion Planning of 7R Robo-Arms

Due to the high computational complexity, the general 7R Robo-Arm inverse solution cannot be realized under the existing technical conditions. However, the pick points usually on Axis #7 are very close from Axis #6. Therefore, take the closer one to the pick point on Axis #6 as the nominal pick point, calculating the inverse solution of the universal 6R Robo-Arm first, based on this, the numerical iteration method is applied to complete the motion planning and inverse calculation of the general 7R Robo-Arm. The following article will discuss the establishment and inverse problem of the Delta position and attitude equation of the general 7R Robo-Arm.

[1] The Delta Position and Attitude Equation of the General 7R Axis-Chain

The delta position and attitude equation of the general 7R Axis-Chain represented by Ju-Gibbs Delta-quaternion is presented Firstly, then to be proved, and find the inverse solution lastly.

THEOREM 3.10. Given 7R Axis-Chains ${}^{i}\mathbf{l}_{\bar{l}}=(i, 1:7]$, ${}^{i}l_l=0_3$, the desired position vector and the Ju-Gibbs Delta-quaternion are recorded respectively as ${}_{d}^{i}\delta_7$ and ${}_{d}^{i}\underset{\cdot}{\boldsymbol{\varepsilon}}_6$, the Delta position and attitude equations of the General 6R Robo-Arm characterized by Ju-Gibbs Delta-quaternion are expressed as:

$$\begin{cases}{}^{1}l_2+{}^{2}l_3+{}^{3}l_4-{}_{d}^{i}\delta_6+\varepsilon_1^{i}\cdot{}^{i}\tilde{n}_1\cdot{}_{d}^{i}\delta_6-\varepsilon_2^{1}\cdot{}^{1}\tilde{n}_2\cdot\left({}^{1}l_2-{}_{d}^{i}\delta_6\right)\\ \quad\backslash-\varepsilon_3^{2}\cdot{}^{2}\tilde{n}_3\cdot\left({}^{1}l_2+{}^{2}l_3-{}_{d}^{i}\delta_6\right)-\varepsilon_4^{3}\cdot{}^{3}\tilde{n}_4\cdot\left({}^{1}l_2+{}^{2}l_3+{}^{3}l_4\right)\\ \quad\backslash-\begin{pmatrix}4\cdot\left({}^{4}l_5+{}^{5}l_6^{\perp}+{}^{4}\tilde{n}_5\cdot{}^{6}l_7^{\perp}\right)\\ \backslash+2\cdot\begin{pmatrix}{}^{5}l_6+{}^{6}l_7^{\perp}+{}^{4}\tilde{n}_5\cdot{}^{6}l_7\\ \backslash+{}^{4}\tilde{n}_5\cdot{}^{6}l_7^{\circ}+{}^{4}N_5\cdot{}^{6}l_7^{\perp}+{}^{5}l_6^{\circ}\end{pmatrix}\\ \backslash+{}^{6}l_7+{}^{6}l_7^{\circ}+{}^{4}N_5\cdot{}^{6}l_7+{}^{4}N_5\cdot{}^{6}l_7^{\circ}\end{pmatrix}=0_3\\ {}^{i}\underset{\cdot}{\varepsilon}_6^{[4]}\cdot\underset{\cdot}{C}_{[1]}\cdot[\,\varepsilon_1\cdot{}^{i}n_1+\varepsilon_2\cdot{}^{1}n_2+\varepsilon_3\cdot{}^{2}n_3+\varepsilon_4\cdot{}^{3}n_4\quad 1]^{T}=4\end{cases}. \tag{3.421}$$

$$\begin{aligned}\varepsilon_5&={}^{i}\underset{\cdot}{\varepsilon}_6^{[4]}\cdot\underset{\cdot}{C}_{[2]}\cdot{}^{i}\underset{\cdot}{\varepsilon}_4\\ \varepsilon_6&={}^{i}\underset{\cdot}{\varepsilon}_6^{[4]}\cdot\underset{\cdot}{C}_{[3]}\cdot{}^{i}\underset{\cdot}{\varepsilon}_4\end{aligned}, \tag{3.422}$$

wherein ${}_{d}^{i}\underset{\cdot}{\boldsymbol{\varepsilon}}_6\to 1$ because ${}_{d}^{i}\tilde{\boldsymbol{\tau}}_6\to{}^{i}\tilde{\boldsymbol{\tau}}_6$; and ${}_{d}^{i}\delta_7={}_{d}^{i}r_7-{}^{i}r_7\to 0_3$. The system structural parameter matrix composed of row quaternions is expressed as:

$$\underset{\cdot}{C}=\begin{bmatrix}{}_{d}^{i}\varepsilon_6^{T}+\left({}^{4}n_5^{T}\cdot{}^{5}n_6\right)\cdot & 1+\left({}^{4}n_5^{T}\cdot{}^{5}n_6\right)\cdot\\ \backslash{}^{4}E_6^{[3][*]}\cdot\left({}_{d}^{i}\tilde{\varepsilon}_6-1\right), & \backslash{}^{4}E_6^{[3][*]}\cdot{}_{d}^{i}\varepsilon_6\\ {}^{4}E_6^{[1][*]}\cdot\left({}_{d}^{i}\tilde{\varepsilon}_6-1\right), & {}^{4}E_6^{[1][*]}\cdot{}_{d}^{i}\varepsilon_6\\ {}^{4}E_6^{[2][*]}\cdot\left({}_{d}^{i}\tilde{\varepsilon}_6-1\right), & {}^{4}E_6^{[2][*]}\cdot{}_{d}^{i}\varepsilon_6\\ {}^{4}E_6^{[3][*]}\cdot\left({}_{d}^{i}\tilde{\varepsilon}_6-1\right) & {}^{4}E_6^{[3][*]}\cdot{}_{d}^{i}\varepsilon_6\end{bmatrix}. \tag{3.423}$$

PROOF: Considering Eqs. (3.412)-(3.420), and replace τ and τ in Eq. (3.382) with ε and ε respectively, then $$\begin{aligned}&{}^{i}\underset{\cdot 4}{\varepsilon}^{T}\cdot\underset{\cdot 11}{C}\cdot{}^{i}\underset{\cdot 4}{\varepsilon}={}^{i}\underset{\cdot 4}{\varepsilon}^{T}\cdot\underset{\cdot 12}{C}\cdot{}^{i}\underset{\cdot 4}{\varepsilon}={}^{i}\underset{\cdot 4}{\varepsilon}^{T}\cdot\underset{\cdot 13}{C}\cdot{}^{i}\underset{\cdot 4}{\varepsilon}=1\\ &{}^{i}\underset{\cdot 4}{\varepsilon}^{T}\cdot\underset{\cdot 14}{C}\cdot{}^{i}\underset{\cdot 4}{\varepsilon}={}^{i}\underset{\cdot 4}{\varepsilon}^{T}\cdot\underset{\cdot 24}{C}\cdot{}^{i}\underset{\cdot 4}{\varepsilon}={}^{i}\underset{\cdot 4}{\varepsilon}^{T}\cdot\underset{\cdot 34}{C}\cdot{}^{i}\underset{\cdot 4}{\varepsilon}=1,\\ &{}^{i}\underset{\cdot 4}{\varepsilon}^{T}\cdot\underset{\cdot 22}{C}\cdot{}^{i}\underset{\cdot 4}{\varepsilon}={}^{i}\underset{\cdot 4}{\varepsilon}^{T}\cdot\underset{\cdot 33}{C}\cdot{}^{i}\underset{\cdot 4}{\varepsilon}={}^{i}\underset{\cdot 4}{\varepsilon}^{T}\cdot\underset{\cdot 44}{C}\cdot{}^{i}\underset{\cdot 4}{\varepsilon}=1\end{aligned} \tag{3.424}$$

and then, replace ${}_{d}^{i}r_7$ with ${}_{d}^{i}\delta_6$, then $$\begin{gathered}{}^{3}Q_1\cdot{}^{1}Q_i\cdot{}_{d}^{i}\delta_6-\left({}^{4}Q_1\cdot{}^{1}l_2+{}^{4}Q_2\cdot{}^{2}l_3+{}^{4}Q_3\cdot{}^{3}l_4\right)-\backslash\\ \begin{pmatrix}4\cdot\left({}^{4}l_5+{}^{5}l_6^{\perp}+{}^{4}\tilde{n}_5\cdot{}^{6}l_7^{\perp}\right)+{}^{6}l_7+{}^{6}l_7^{o}+{}^{4}l_5+{}^{4}N_5\cdot{}^{6}l_7+{}^{4}N_5\cdot\\ {}^{6}l_7^{o}+2\cdot\left({}^{5}l_6+{}^{6}l_7^{1}+{}^{4}\tilde{n}_5\cdot{}^{6}l_7+{}^{4}\tilde{n}_5\cdot{}^{6}l_7^{o}+{}^{4}N_5\cdot{}^{6}l_7^{1}+{}^{5}l_6^{o}\right.\end{pmatrix}=0_3\end{gathered}, \tag{3.425}$$

and $$ {}^{i}\underset{\cdot 6}{\varepsilon}^{[4]}\cdot\underset{\cdot [1]}{C}\cdot\begin{bmatrix}\varepsilon_1={}^{i}n_1+\varepsilon_2\cdot{}^{1}n_2+\varepsilon_3\cdot{}^{2}n_3+\varepsilon_4\cdot{}^{3}n_4\\1\end{bmatrix}=4. \tag{3.426}$$

Considering Eqs. (3.418)-(3.420), Eq. (3.421) is derived from Eqs. (3.425). Eq. (3.423) is derived from Eq. (3.385), Eq. (3.422) is derived from Eq. (3.397). Q.E.D.

Next, analyze the delta position and attitude inverse solution of the general 7R Robo-Arm. Obviously, Eq. (3.421) is linear about $[\varepsilon_l | l \in [1:4]]$. Eq. (3.421) is re-expressed as $$A\cdot[\varepsilon_1\ \varepsilon_2\ \varepsilon_3\ \varepsilon_4]^T=b, \tag{3.427}$$

wherein $$b=\begin{bmatrix} 4\cdot\left({}^4l_5+{}^5l_6^{\perp}+{}^4\tilde{n}_5\cdot{}^6l_7^{\perp}\right)+2\cdot\begin{pmatrix} {}^5l_6+{}^6l_7^{\perp}+{}^4\tilde{n}_5+{}^6l_7+{}^4\tilde{n}_5 \\ \backslash\cdot{}^6l_7^{\circ}+{}^4N_5\cdot{}^6l_7^{\perp}+{}^5l_6^{\circ} \end{pmatrix} \\ \backslash+{}^6l_7+{}^6l_7^{\circ}+{}^4N_5\cdot{}^6l_7\cdot{}^4N_5\cdot{}^6l_7^{\circ}-\left({}^1l_2+{}^2l_3+{}^3l_4\right) \\ 4/{}^i\underset{\cdot}{\varepsilon}_6^{[4]}-\underset{\cdot}{C}_{[1]}^{[4]} \end{bmatrix}. \tag{3.428}$$

$$A=\begin{bmatrix} {}^i\tilde{n}_1\cdot{}_d^i\delta_6 & \begin{matrix}\varepsilon_2^1\cdot{}^i\tilde{n}_2\cdot \\ \backslash({}_d^i\delta_6-{}^1l_2)\end{matrix} & {}^2\tilde{n}_3\cdot\begin{pmatrix}{}_d^i\delta_6-{}^1l_2 \\ \backslash+{}^2l_3\end{pmatrix} & {}^3\tilde{n}_4\cdot\begin{pmatrix}{}^1l_2+{}^2l_3 \\ \backslash+{}^3l_4\end{pmatrix} \\ C_{[1]}\cdot{}^in_1 & C_{[1]}\cdot{}^1n_2 & C_{[1]}\cdot{}^2n_3 & C_{[1]}\cdot{}^3n_4 \end{bmatrix}. \tag{3.429}$$

If $A^{-1}$ exists, the solution Eq. (3.427) is obtained $$[\varepsilon_1\varepsilon_2\varepsilon_3\varepsilon_4]^T=A^{-1}\cdot b. \tag{3.430}$$

${}^i\underset{\cdot}{\varepsilon}_4$ is derived from Eqs. (3.417) and (3.430), $\varepsilon_5$ and $\varepsilon_6$ are derived from Eq. (3.397), until now, all the inverse solutions are got.

The role of the position and attitude inverse solution of the general 6R Robo-Arm is: By delta position vector ${}_d^i\delta_7$ and Ju-Gibbs Delta-quaternion ${}_d^i\underset{\cdot}{\varepsilon}_6$, using Iterative Approximation algorithm to make the position and attitude. The principle is essentially the same in the first part, and the two have the same convergence. Similarly, when converge to the target state, there is usually only one set of inverse solutions.

[2] The General 7R Robo-Arm Motion Planning Based on the Partial Velocity

Recording the AC as ${}^i\mathbf{l}_{6S}$=(i,1:6, 6S], l∈(i, 1:6], Eqs. (3.3) and (3.4) result in:

$$\frac{\partial^i\phi_6}{\partial\phi_l^{\bar{l}}}={}^{i|\bar{l}}n_l,\ \frac{\partial^i r_{6S}}{\partial\phi_l^{\bar{l}}}={}^{i|\bar{l}}\tilde{n}_l\cdot{}^{i|l}r_{6S}, \tag{3.431}$$

Record $\phi_{(i,6]}=[\phi_1^{\,i},\ \ldots,\ \phi_6^{\,5}]$, $\delta\phi_{(i,6]}=[\delta\phi_1^{\,i},\ \ldots,\ \delta\phi_6^{\,5}]$, recording desired position and attitude as ${}_d^i r_{6S}$ and ${}_d^i\phi_6$ respectively, and ${}_\delta^i\phi_6={}_d^i\phi_6-{}^i\phi_6$, ${}_\delta^i r_{6S}={}_d^i r_{6S}-{}^i r_{6S}$. Write as $${}^iJ_{6S}\triangleq\begin{bmatrix}\dfrac{\partial^i\phi_6}{\partial\phi_{(i,6]}} \\ \dfrac{\partial^i r_{6S}}{\partial\phi_{(i,6]}}\end{bmatrix}=\begin{bmatrix} {}^{i|0}n_1, & {}^{i|1}n_2, & \ldots & {}^{i|5}n_6 \\ {}^{i|0}\tilde{n}_1\cdot{}^{i|1}r_{6S}, & {}^{i|1}\tilde{n}_2\cdot{}^{i|2}r_{6S}, & \ldots & {}^{i|5}\tilde{n}_6\cdot{}^{i|6}r_{6S} \end{bmatrix}. \tag{3.432}$$

The gradient descent method is applied by Eq. (3.432), then $$\delta\phi_{(i,6)}^T—-\mathrm{Step}\cdot{}^iJ_{6S}^T\cdot\begin{bmatrix}{}_\delta^i\phi_6 \\ {}_\delta^i r_{6S}\end{bmatrix}, \tag{3.433}$$

wherein step-length Step>0, Step→0. Obviously $$-\mathrm{Step}\cdot\left[{}_\delta^i\phi_6,\ {}_\delta^i r_{6S}\right]\cdot{}^iJ_{6S}\cdot{}^iJ_{6S}^T\cdot\begin{bmatrix}{}_\delta^i\phi_6 \\ {}_\delta^i r_{6S}\end{bmatrix}<0. \tag{3.434}$$

Select Step step-length and starting from the initial state $[{}_0^i\phi_6,\ {}_0^i r_{6S}]$ to the final state $[{}^i\phi_6,\ {}^i r_{6S}]\rightarrow[{}_d^i\phi_6,\ {}_d^i r_{6S}]$. The iterative optimization steps based on the partial velocity are as follows:

(a) Determining the Objective Function $$\mathrm{Goal}-\frac{1}{2}\cdot\left[{}_\delta^i\phi_6^T,\ {}_\delta^i r_{6S}^T\right]\cdot\begin{bmatrix}{}_\delta^i\phi_6 \\ {}_\delta^i r_{6S}\end{bmatrix}. \tag{3.435}$$

Obviously, Goal represents the variance of ${}_\delta^i\phi_6$ and ${}_\delta^i r_{6S}$.

(b) Selecting Step

On the one hand, the construction method is used to determine the step-length.

$$\mathrm{Step}=\frac{\left[{}_\delta^i\phi_6,\ {}_\delta^i r_{6S}\right]\cdot{}^iJ_{6S}\cdot{}^iJ_{6S}^T\cdot\left[{}_\delta^i\phi_6,\ {}_\delta^i r_{6S}\right]^T}{\left[{}_\delta^i\phi_6,\ {}_\delta^i r_{6S}\right]\cdot{}^iJ_{6S}\cdot{}^iJ_{6S}^T\cdot{}^iJ_{6S}\cdot{}^iJ_{6S}^T\cdot\left[{}_\delta^i\phi_6,\ {}_\delta^i r_{6S}\right]^T}, \tag{3.436}$$

according to Eqs. (3.413) and (3.436), only when $[{}_\delta^i\phi_6,\ {}_\delta^i r_{6S}]\rightarrow[0_3, 0_3]$, Step→0, Goal→0.

On the other hand, according to Eqs. (3.413) and (3.432):

$${}^\delta\phi_{(i,6]}^T=2\cdot\mathrm{atan}(\varepsilon_{(i,6]}),\ {}^\delta\phi_{(i,6]}^T={}^iJ_{6S}^T\cdot\begin{bmatrix}{}_\delta^i\phi_6 \\ {}_\delta^i r_{6S}\end{bmatrix}, \tag{3.437}$$

wherein $\varepsilon_{(i,6]}=[\varepsilon_1\ \varepsilon_2\ \ldots\ \varepsilon_6]^T$. Determining the step-length according to (3.437) and, $$\mathrm{Step}=-\frac{2\cdot\left[{}_\delta^i\phi_6,\ {}_\delta^i r_{6S}\right]\cdot{}^iJ_{6S}\cdot\mathrm{atan}(\varepsilon_{(i,6]})}{\left[{}_\delta^i\phi_6,\ {}_\delta^i r_{6S}\right]\cdot{}^iJ_{6S}\cdot{}^iJ_{6S}^T\cdot\left[{}_\delta^i\phi_6,\ {}_\delta^i r_{6S}\right]^T}. \tag{3.438}$$

(c) Iterative Process

On the one hand, if taking the step-length Step in Eq. (3.438), the iterative calculation is completed by equation:

$$\phi_{(i,6]}:=\phi_{(i,6]}+\delta\phi_{(i,6]},\ \begin{bmatrix}{}^i\phi_6 \\ {}^i r_{6S}\end{bmatrix}:=\begin{bmatrix}{}^i\phi_6 \\ {}^i r_{6S}\end{bmatrix}+\begin{bmatrix}{}_\delta^i\phi_6 \\ {}_\delta^i r_{6S}\end{bmatrix}, \tag{3.439}$$

wherein when $[{}_\delta^i\phi_6,\ {}_\delta^i r_{6S}]\rightarrow[0_3,\ 0_3]$, the iteration process ends. For the iterative process of Eq. (3.435) must have $$\delta\mathrm{Goal}\leq 0, \tag{3.440}$$

That means the iterative process of Eq. (3.435) must converge.

PROOF: Eqs. (3.432) and (3.435) result in:

$$\frac{\partial\mathrm{Goal}}{\partial\phi_{(i,6]}}=\frac{\partial\mathrm{Goal}}{\partial\left[{}_\delta^i\phi_6^T,\ {}_\delta^i r_{6S}^T\right]}\cdot\frac{\partial\left[{}_\delta^i\phi_6^T,\ {}_\delta^i r_{6S}^T\right]}{\partial\phi_{(i,6]}}=\left[{}_\delta^i\phi_6^T,\ {}_\delta^i r_{6S}^T\right]\cdot{}^iJ_{6S}. \tag{3.441}$$

According to Eqs. (3.433), (3.436) and (3.441):

$$\delta\mathrm{Goal} = \frac{\partial\,\mathrm{Goal}}{\partial\,\phi_{(i,6]}} \cdot \delta\phi^T_{(i,6]} = \left[{}^i_\delta\phi^T_6,\ {}^i_\delta r^T_{6S}\right] \cdot {}^iJ_{6S} \cdot \delta\phi^T_{(i,6]}$$

$$= -\frac{\left[{}^i_\delta\phi^T_6,\ {}^i_\delta r^T_{6S}\right] \cdot {}^iJ_{6S} \cdot {}^iJ^T_{6S} \cdot \left[{}^i_\delta\phi^T_6,\ {}^i_\delta r^T_{6S}\right]^T}{\left[{}^i_\delta\phi^T_6,\ {}^i_\delta r^T_{6S}\right] \cdot {}^iJ_{6S} \cdot {}^iJ^T_{6S} \cdot {}^iJ_{6S} \cdot {}^iJ^T_{6S} \cdot \left[{}^i_\delta\phi^T_6,\ {}^i_\delta r^T_{6S}\right]^T} \cdot \quad .$$

$$\backslash \cdot \left[{}^i_\delta\phi^T_6,\ {}^i_\delta r^T_{6S}\right] \cdot {}^iJ_{6S} \cdot {}^iJ^T_{6S} \cdot \begin{bmatrix} {}^i_\delta\phi_6 \\ {}^i_\delta r_{6S} \end{bmatrix} = -\left[{}^i_\delta\phi^T_6,\ {}^i_\delta r^T_{6S}\right] \cdot \begin{bmatrix} {}^i_\delta\phi_6 \\ {}^i_\delta r_{6S} \end{bmatrix} \leq 0$$

Eq. (3.436) equivalent to Eq. (3.438) theoretically, so Eq. (3.436) can be substituted by Eq. (3.438). But Eq. (3.436) differs from Eq. (3.438) in the calculation process: Because the Digit length of the computer is limited, the accuracy of the former is getting worse and worse when $[{}_\delta{}^i\phi_6, {}_\delta{}^ir_{6S}] \rightarrow [0_3, 0_3]$, while the latter is higher and higher; at the same time, the latter calculation is relatively small. Therefore, in engineering application, the step-length in the Eq. (3.438) is better.

When $[{}_\delta{}^i\phi_6, {}_\delta{}^ir_{6S}] \rightarrow [0_3, 0_3]$, the steady state solution $\phi_{(z,6]}$ can be got, which is the position and attitude IK of the general Robo-Arm. Q.E.D.

The characteristics of the general 7R Robo-Arm motion planning based on the partial velocity are: by iteration, the desired position and attitude is gradually approached, and a path from the initial position and attitude to the desired position and attitude can be obtained. The method is a target-oriented optimization process, so that its real-time operation is poor. If the Joint increment is controlled during the iteration, the constraint of Joint Velocity can be satisfied, therefore, a set of inverse solutions to the desired position and attitude are obtained while completing the motion planning.

Axis-Invariant Theory and Autonomous Behavior Robotics

The theorem of general 6R Robo-Arm inverse solution based on Axis-Invariant established the theory foundation of general Robo-Arm inverse solution. Since eq. (3.336) has an iterative form, it is also called the general 5R iterative kinematics modeling theorem. The structure theorem of general 6R Robo-Arm IK shows that the general 5R AC has real-time inverse solutions. The two theorems show that:

[1] The rigid body configuration characterized by fixed Axis-Invariant is not only simple and intuitive, but also reduces the computational complexity of the inverse solution.

[2] The general Robo-Arm kinematic equation based on Axis-Invariant is not only concise, but also has a real-time inverse solution.

Figure 40:
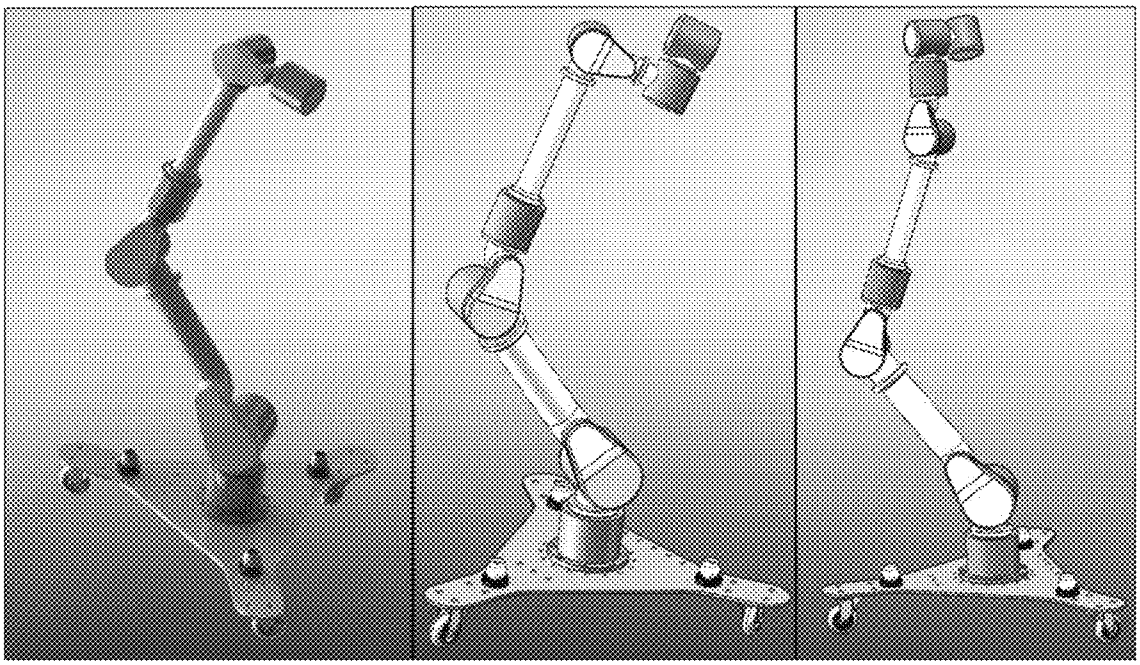
FIG. 40 is a diagram of a high-precision universal robotic arm (left 6R, middle 7R, right 8R).
Figure 41:
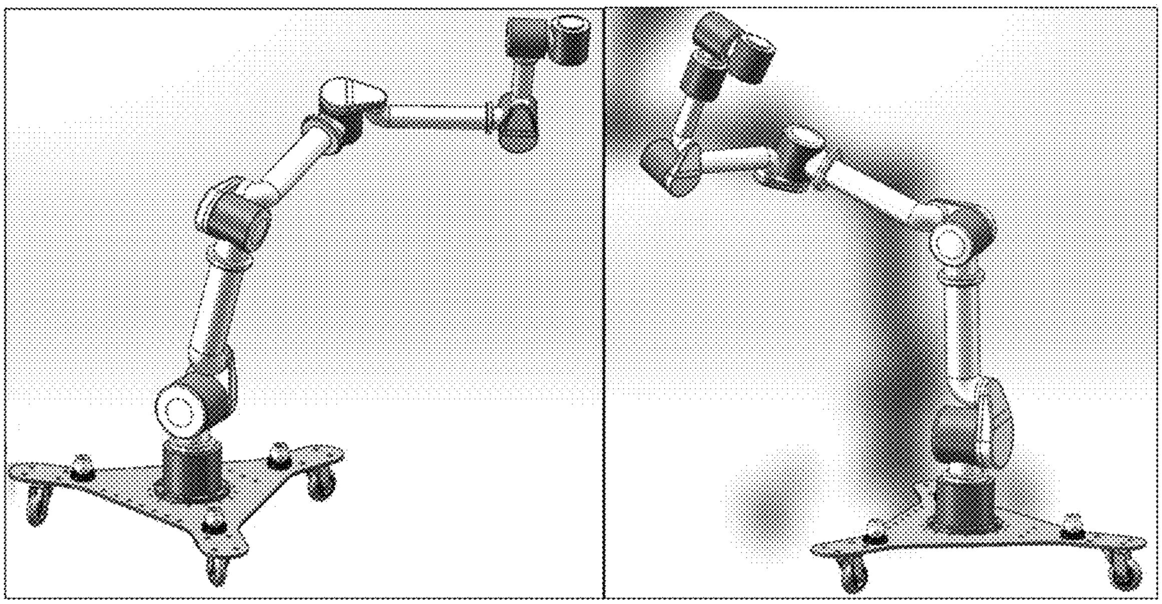
FIG. 41 is a diagram of a human-like arm (left 7R, right 8R).

The fixed and free Axis-Invariant of the 5-axis and 2-axis screws in 3D space are the primitives of robot theory, and have universality of modeling and solution. The real time IK of General 5R AC is not only a major breakthrough in robotics, but also leads to many innovations in robotic engineering. As shown in FIGS. 40 and 41, the general 6R Robo-Arm is connected with the 1R/2R/3R decoupling Robo-Wrist to develop a high-precision 7R/8R/9R Humanoid Arm.

The base/bed of the high-precision Robo-Arm has more than 3 laser tracking-ball seat, which can be used to establish the precise frame of the Robo-Arm. The Axis-Invariant of each axis can be accurately measured. There is no constraint of ideal Cartesian frames and decoupling structures, which improve the Robo-Arm's absolute accuracy up to the level of its repeatability precision.

Figure 42:
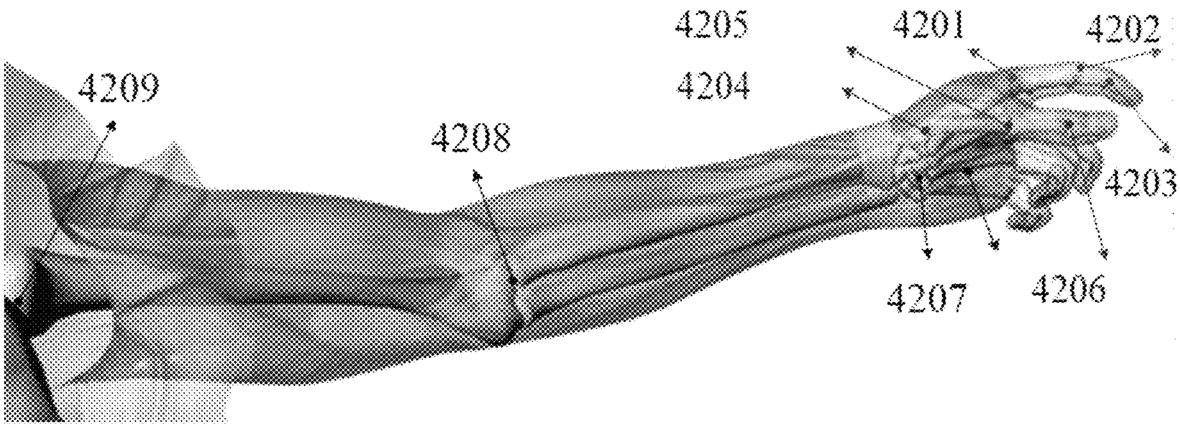
FIG. 42 is a diagram of the human arm structure.

Please refer to FIG. 42. There are root index 3R 4201, middle index 1R 4202, leaf index 1R 4203, root thumb 3R

4204, middle thumb 1R 4205, leaf thumb 1R 4206, wrist 2R 4207, elbow 2R 4208 and should 3R 4209 in FIG. 42. For the human arm, the root-to-leaf kinematic chain consists of a 5R limb, a 2R wrist and a 5R finger, which is a 12-degree-of-freedom and 6-fold spatial structure. If the two axes of the wrist are counted into the arm and the finger respectively, the kinematic chain is a system of tandem and decoupling of two universal 6R arms, and the hand is a system of 5 chain 6R fingers (abbreviated as 5C-6R). Therefore, the humanoid arm is composed of a 6R manipulator and a 5C-6R dexterous hand in series to achieve level motion control. The first level 6R arm and the 5C-6R dexterous hand have a 12R shaft chain for a wide range of space motion. The second level 5C-6R dexterous hand has a variable topology axle chain that enables the precise operation of controlled objects using tools.

(1) DH0 mode, operating 0DOF; Controlled objects, such as hold;

(2) DH1 mode, operating 1DOF; controlled objects, such as wrench, push, pull;

(3) DH2 mode, operating 2DOF; controlled objects, such as sway, screw, drawing;

(4) DH3 mode, operating 3DOF; controlled objects, such as translate, rotate;

(5) DH4 mode, operating 4DOF; controlled objects, such as balance, attach, detach;

(6) DH5 mode, operating 5DOF; controlled objects, such as pass, touch, cut;

(7) DH6 mode, operating 6DOF; controlled objects, such as stir, set, engrave.

The layered series of two general manipulators, the 5C-6R variable topology and the multi-fold structure are the three characteristics of the humanoid arm.

Figure 43:
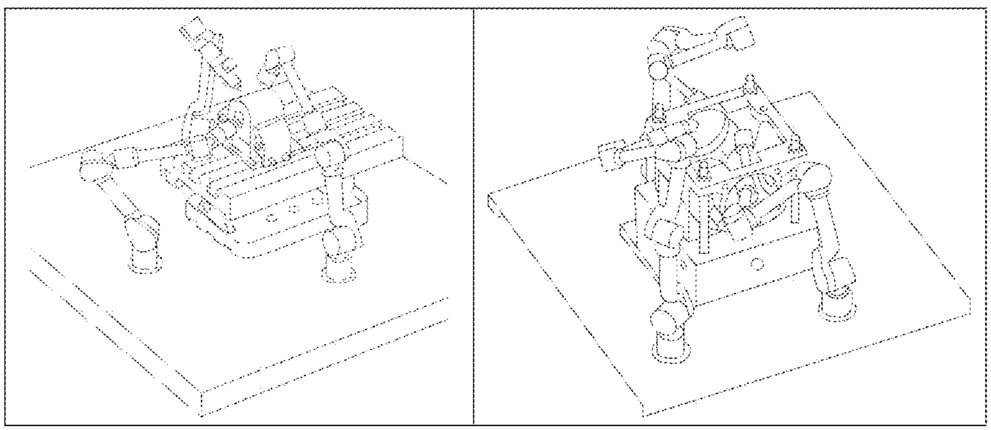
FIG. 43 is robot flexible machining center (left 6R3F, right 6R4F).

As shown in FIG. 43, the 6R4F (folding) humanoid arm has the advantage of complex space operation. Because of its first five axes breaking through the coupling constraints, it has a more optimized and simpler structure. It is the development trend of autonomous robots to develop a humanoid arm for special processing and operation, and to realize multi-robot cooperation.

The reason why the Axis-Invariant theory can unify the existing kinematics and dynamics is that: on the one hand, the Axis-Invariant theory is a multi-axis system modeling and control theory based on the axis for topologically, and with the 3D screw as the basis for measure. On the other hand, the Multi-Axis system is essentially an autonomous system which is expressed by the ordinary differential equation (ODE) with implicit time. The autonomous system has the determinacy of behavior, whether in structure or in behavior, autonomous behavior based robots often have orderliness, accuracy, controllability and real-time ability. The structure and behavior of partial differential systems often have the uncertainty of bifurcation and chaos. The kinematics and dynamics equations of a multi-axis system are all 3D vector space operational algebra systems.

Section Four: Axis-Invariant Based Multi-Axis System Dynamics and Control

Reading Formulas

[1] The Axis-Chain ${}^il_n$ is given, k, $l \in {}^il_n$, then $$i \notin {}^il_n, n \notin {}^il_n \tag{4.1}$$

$$ {}^ik_i \in {}^il_n, |{}^ik_i| = 0, \tag{4.2}$$

$$ {}^kl_n = -{}^nl_k \tag{4.3}$$

$$ {}^il_n = {}^il_l + {}^ll_n, {}^il_n = {}^il_l \cdot {}^ll_n \tag{4.4}$$

[2] Natural Invariants $$r_l^{\bar{l}} = -r_{\bar{l}}^{l}, \phi_l^{\bar{l}} = -\phi_{\bar{l}}^{l} \quad (4.5)$$

$$q_l^{\bar{l}} = \begin{cases} r_l^{\bar{l}} & \text{if } {}^{\bar{l}}k_l \in P \\ \phi_l^{\bar{l}} & \text{if } {}^{\bar{l}}k_l \in R \end{cases}, \quad (4.6)$$

$${}^{\bar{l}}n_l = {}^{\bar{l}|l}n_{\bar{l}} = {}^{l}n_{\bar{l}}. \quad (4.7)$$

$$\lambda$$

$${}^{\bar{l}}Q_l = 1 + S_l^{\bar{l}} \cdot {}^{\bar{l}}\tilde{n}_l + \left(1 - C_l^{\bar{l}}\right) \cdot {}^{\bar{l}}\tilde{n}_l^{:2}, \quad (4.8)$$

$${}^{\bar{l}}Q_l = \left(2 \cdot {}^{\bar{l}}\lambda_l^{[4]:2} - 1\right) \cdot 1 + 2 \cdot {}^{\bar{l}}\lambda_l \cdot {}^{\bar{l}}\lambda_l^T + 2 \cdot {}^{\bar{l}}\lambda_l^{[4]} \cdot {}^{\bar{l}}\tilde{\lambda}_l, \quad (4.9)$$

$${}^{\bar{l}}\lambda_l = \left[ {}^{\bar{l}}\lambda_l \quad {}^{\bar{l}}\lambda_l^{[4]} \right]^T = \left[ {}^{\bar{l}}n_l \cdot S_l \quad C_l \right]^T, \quad (4.10)$$

Wherein:

$$C_l = C(\phi_l^{\bar{l}}/2), S_l = S(\phi_l^{\bar{l}}/2), \tau_l = \tau_l^{\bar{l}} = \tan(\phi_l^{\bar{l}}/2)$$

$$C_l^{\bar{l}} = C(\phi_l^{\bar{l}}), S_l^{\bar{l}} = S(\phi_l^{\bar{l}}). \quad (4.11)$$

[4] Kinematic iteratives

The Axis-Chain ${}^{i}1_l$ is given, and $1_l^i \geq 2$, there are the following velocity and acceleration iteratives:

$${}^{i}Q_l = \prod_k^{{}^{i}1_{\bar{l}}} \left({}^{\bar{k}}Q_k\right) \cdot {}^{\bar{l}}Q_l, \quad (4.12)$$

$${}^{i}\lambda_l = \prod_k^{{}^{i}1_{\bar{l}}} \left({}^{\bar{k}}\tilde{\lambda}_k\right) \cdot {}^{\bar{l}}\lambda_l, \quad (4.13)$$

$${}^{i}R_l = \prod_k^{{}^{i}1_{\bar{l}}} \left({}^{\bar{k}}R_k\right) \cdot {}^{\bar{l}}R_l, \quad (4.14)$$

$${}^{i}\phi_l = \sum_k^{{}^{i}1_l} \left({}^{i|\bar{k}}\phi_k\right), \quad (4.15)$$

$${}^{i}r_{lS} = \sum_k^{{}^{i}1_{lS}} \left({}^{i|\bar{k}}r_k\right) = \sum_k^{{}^{i}1_l} \left({}^{i|\bar{k}}l_k + {}^{i|\bar{k}}n_k \cdot r_k^{\bar{k}}\right), \quad (4.16)$$

$${}^{i}\dot{\phi}_n = \sum_k^{{}^{i}1_n} \left({}^{i|\bar{k}}\dot{\phi}_k\right) = \sum_k^{{}^{i}1_n} \left({}^{i|\bar{k}}n_k \cdot \dot{\phi}_k^{\bar{k}}\right), \quad (4.17)$$

$${}^{i}\dot{r}_{lS} = \sum_k^{{}^{i}1_{lS}} \left({}^{i}\dot{\tilde{\phi}}_{\bar{k}} \cdot {}^{i|\bar{k}}r_k + {}^{i|\bar{k}}\dot{r}_k\right), \quad (4.18)$$

$${}^{i}\ddot{\phi}_n = \sum_k^{{}^{i}1_n} \left({}^{i|\bar{k}}\ddot{\phi}_k\right) = \sum_k^{{}^{i}1_n} \left({}^{i|\bar{k}}n_k \cdot \ddot{\phi}_k^{\bar{k}}\right), \quad (4.19)$$

$${}^{i}\ddot{r}_{lS} = \sum_k^{{}^{i}1_{lS}} \left({}^{i}\ddot{\tilde{\phi}}_{\bar{k}} \cdot {}^{i|\bar{k}}r_k + {}^{i}\dot{\tilde{\phi}}_{\bar{k}}^{:2} \cdot {}^{i|\bar{k}}r_k + 2 \cdot {}^{i}\dot{\tilde{\phi}}_{\bar{k}} \cdot {}^{i|\bar{k}}\dot{r}_k + {}^{i|\bar{k}}\ddot{r}_k\right), \quad (4.20)$$

Obviously, $$\sum_k^{{}^{i}1_{lI}} \left({}^{i}\ddot{\tilde{\phi}}_{\bar{k}} \cdot {}^{i|\bar{k}}r_k + {}^{i|\bar{k}}\ddot{r}_k\right) = \sum_k^{{}^{i}1_l} \left({}^{i}\ddot{\tilde{\phi}}_{\bar{k}} \cdot {}^{i|\bar{k}}r_k + {}^{i|\bar{k}}\ddot{r}_k\right) + \left({}^{i}\ddot{\tilde{\phi}}_l \cdot {}^{i|l}r_{lI} + {}^{i|l}\ddot{r}_{lI}\right). \quad (4.21)$$

For the trivial chain (4.2), then $${}^{i}r_i = {}^{i}\dot{r}_i = {}^{i}\ddot{r}_i = 0_3, {}^{i}\phi_i = {}^{i}\dot{\phi}_i = {}^{i}\ddot{\phi}_i = 0_3 \quad (4.22)$$

If Body l is rigid, from Eqs. (4.21) and (4.22), then $$\sum_k^{{}^{i}1_{lI}} \left({}^{i}\ddot{\tilde{\phi}}_{\bar{k}} \cdot {}^{i|\bar{k}}r_k + {}^{i|\bar{k}}\ddot{r}_k\right) = \sum_k^{{}^{i}1_l} \left({}^{i}\ddot{\tilde{\phi}}_{\bar{k}} \cdot {}^{i|\bar{k}}r_k + {}^{i|\bar{k}}\ddot{r}_k\right) + {}^{i}\ddot{\tilde{\phi}}_l \cdot {}^{i|l}r_{lI}, \quad (4.23)$$

$${}^{i}\ddot{\phi}_{l_I} = \sum_k^{{}^{i}1_l} \left({}^{i|\bar{k}}\ddot{\phi}_k\right). \quad (4.24)$$

[5] Second-order tensor projection $${}^{l|kI}J_{kI} = {}^{l}Q_k \cdot {}^{kI}J_{kI} \cdot {}^{k}Q_i, \quad (4.25)$$

$${}^{l|\bar{k}}\tilde{\phi}_k = {}^{i}Q_{\bar{k}} \cdot {}^{\bar{k}}\tilde{\phi}_k \cdot {}^{\bar{k}}Q_i. \quad (4.26)$$

[6] If the Axis-Chain ${}^{k}1_{lI}$ is Given, then there are Inertial Tensors $${}^{l}J_{lI} = \sum_S^{\Omega_l} \left(-m_l^{[S]} \cdot {}^{l}\tilde{r}_{lS}^{:2}\right), \quad (4.27)$$

$${}^{k}J_l = -m_l \cdot {}^{k}\tilde{r}_l \cdot {}^{k|l}\tilde{r}_{lI}, \quad (4.28)$$

$${}^{l_I}J_{lI} = m_l \cdot {}^{l_I}\tilde{r}_l \cdot {}^{l}\tilde{r}_{lI} + {}^{l}J_{lI} = -m_l \cdot {}^{l}\tilde{r}_{lI}^{:2} + {}^{l}J_{lI}, \quad (4.29)$$

$${}^{l}J_{lI} = m_l \cdot {}^{l}\tilde{r}_{lI}^{:2} + {}^{l_I}J_{lI}, \quad (4.30)$$

$${}^{k}J_{lI} = -m_l \cdot {}^{k|l}\tilde{r}_{lI}^{:2} + {}^{k|l_I}J_{lI}. \quad (4.31)$$

[7] If the Axis-Chain ${}^{i}1_n$, $k \in {}^{i}1_n$ is given, there is the following partial velocity calculation formula:

$$\frac{\partial\, {}^{i}r_{nS}}{\partial \phi_k^{\bar{k}}} = \frac{\partial\, {}^{i}\dot{r}_{nS}}{\partial \dot{\phi}_k^{\bar{k}}} = {}^{i|\bar{k}}\tilde{n}_k \cdot {}^{i|k}r_{nS} = -{}^{i|k}\tilde{r}_{nS} \cdot {}^{i|\bar{k}}n_k, \quad (4.32)$$

$$\frac{\partial\, {}^{i}\dot{\phi}_n}{\partial \dot{\phi}_k^{\bar{k}}} = {}^{i|\bar{k}}n_k, \quad \frac{\partial\, {}^{i}r_{nS}}{\partial r_k^{\bar{k}}} = \frac{\partial\, {}^{i}\dot{r}_{nS}}{\partial \dot{r}_k^{\bar{k}}} = {}^{i|\bar{k}}n_k \quad (4.33)$$

$$\frac{\partial\, {}^{i}\phi_n}{\partial r_k^{\bar{k}}} = \frac{\partial\, {}^{i}\phi_n}{\partial \dot{r}_k^{\bar{k}}} = \frac{\partial\, {}^{i}\dot{\phi}_n}{\partial r_k^{\bar{k}}} = \frac{\partial\, {}^{i}\dot{\phi}_n}{\partial \dot{r}_k^{\bar{k}}} = 0_3. \quad (4.34)$$

[8] If the Axis-Chain, ${}^{i}1_n$, k, $l \in {}^{i}1_n$ is given, there is the following second moment formula:

$${}^{k}\tilde{r}_{kS} \cdot {}^{k|l}\tilde{r}_{lS} = {}^{k|l}r_{kS} \cdot {}^{k}r_{kS}^T - {}^{k|l}r_{lS}^T \cdot {}^{k}r_{kS} \cdot 1, \quad (4.35)$$

$$[illegible] = {}^{k|l}r_{lS} \cdot {}^{k}r_{kS}^T - {}^{k}r_{kS} \cdot {}^{k|l}r_{lS}^T, \quad (4.36)$$

$${}^{k}\tilde{r}_{kS} \cdot {}^{k|l}\tilde{r}_{lS} - {}^{k}\tilde{r}_{lS} \cdot {}^{k}\tilde{r}_{kS} = {}^{k|l}r_{lS} \cdot {}^{k}r_{kS}^T - {}^{k}r_{kS} \cdot {}^{k|l}r_{lS}^T. \quad (4.37)$$

[9] Relationship between the RHO cross-multiplication and the LHO $${}^{i}\dot{\phi}_l^T \cdot {}^{i|l}\tilde{r}_{lS} = -{}^{i|l}\tilde{r}_{lS}^T \cdot {}^{i}\dot{\tilde{\phi}}_l, \left({}^{i}\dot{\phi}_l^T \cdot {}^{i|l}\tilde{r}_{lS}\right)^T = {}^{i}\dot{\tilde{\phi}}_l \cdot {}^{i|l}r_{lS}. \quad (4.38)$$

[10] Wheel-terrain force vector and wheel mobility dimension follows $$ {}^iS_{\bar{l}}^{NS} = \begin{bmatrix} 1 & -{}^i\mu_{\bar{l}}^{[1]}\cdot \mathrm{sign}\left({}^{l|i}\dot{r}_l^{[1]}\right) \\ 0 & -{}^i\mu_{\bar{l}}^{[2]}\cdot \mathrm{sign}\left({}^{l|i}\dot{r}_l^{[2]}\right) \\ 0 & 1 \end{bmatrix},\ F_{\bar{l}}^{NS} = \begin{bmatrix} T_{\bar{l}}^{l} \\ N_{\bar{l}}^{l} \end{bmatrix}, \tag{4.39} $$

$$ {}^iS_{\bar{l}}^{S} = \begin{bmatrix} 1 & 0 & -{}^i\mu_{\bar{l}}^{[1]}\cdot \mathrm{sign}\left({}^{l|i}\dot{r}_l^{[1]}\right) \\ 0 & 1 & -{}^i\mu_{\bar{l}}^{[2]}\cdot \mathrm{sign}\left({}^{l|i}\dot{r}_l^{[2]}\right) \\ 0 & 0 & 1 \end{bmatrix},\ F_{\bar{l}}^{S} = \begin{bmatrix} T_{\bar{l}}^{l} \\ L_{\bar{l}}^{l} \\ N_{\bar{l}}^{l} \end{bmatrix}, \tag{4.40} $$

$$ FD(W_S) = 3, \tag{4.41} $$

$$ FD(W_{NS}) = 2, \tag{4.42} $$

$$ DOF(iL) = 6 + |A| - |NT| + |O|, \tag{4.43} $$

$$ DOL(iL) = DOF(iL) - n_{NS}\cdot FD(W_{NS}) - n_S\cdot FD(W_S). \tag{4.44} $$

$$ DOF(iL)=6+|A|-|NT|+|O|, \tag{4.43} $$

$$ DOL(iL)=DOF(iL)-n_{NS}\cdot FD(W_{NS})-n_S\cdot FD(W_S). \tag{4.44} $$

Derivation and Application of Lagranee Equation of MASs

In 1764, Lagrange proposed the Lagrange method when he studied the lunar libration, which is the basic method of expressing the dynamic equation in generalized coordinates[1]. At the same time, the Lagrange method is also the basic method of describing the quantum field theory. The section deduced the Lagrange equation and re-expressed it by applying the COSS.

We consider the particle dynamic system iL={A,K,T,NT,F,B} below and derive the Lagrange equation of the particle $m^{[S]}$ according to Newton's mechanics. Then we extend it to the constraint particle system. For a group of particles under the action of the conservative force, the following exists with respect to the inertial space:

$$ m_l^{[S]}\cdot{}^i\ddot{r}_{lS}={}^if_{lS} \tag{4.45} $$

The conservative force ${}^if_{lS}$ in Eq. (4.45) has the same chain-ordering as the particle inertial force $m_l^{[S]}\cdot{}^i\ddot{r}_{lS}$, that ${}^if_{lS}$ has the forward order. Assume the resultant external force ${}^{iL}f_{lS}$ of the particle l is zero. The energy of the particle system is denoted as $\varepsilon_{iL}{}^i$, consisting of the kinetic energy ${}_v\varepsilon_{iL}{}^i$ and the potential energy ${}_g\varepsilon_{iL}{}^i$, i.e.

$$ \varepsilon_{iL}^i = {}_v\varepsilon_{iL}^i - {}_g\varepsilon_{iL}^i = \sum_l^{iL}\left({}_v\varepsilon_{lS}^i\right) - \sum_l^{iL}\left({}_g\varepsilon_{lS}^i\right). \tag{4.46} $$

From Eq. (4.46), we obtain the linear momentum ${}^ip_l$, and $$ {}^ip_D = \sum_l^{iL}\left({}^ip_l\right),\ {}^ip_l = \frac{\partial\varepsilon_{iL}^i}{\partial{}^i\dot{r}_l}. \tag{4.47} $$

From Eq. (4.47), then $$ \frac{{}^id}{dt}\left(\frac{\partial\varepsilon_{iL}^i}{\partial{}^i\dot{r}_l^{[w]}}\right) - \frac{\partial\varepsilon_{iL}^i}{\partial{}^ir_l^{[w]}} = 0,\ k\in[x,y,z]. \tag{4.48} $$

Eq. (4.48) is called as the Lagrange equation of the Cartesian-Axis space.

The relationship between the generalized coordinate sequence $[q_l^{\bar{l}}|l\in T]$ and the Cartesian spatial position vector sequence $[{}^ir_l|l\in T]$ is denoted as $$ q_l^{\bar{l}}=q_l^{\bar{l}}(\ldots,{}^ir_l,\ldots;t),{}^ir_l={}^ir_l(\ldots,q_l^{\bar{l}},\ldots;t). \tag{4.49} $$

From Eq. (4.49), then $$ \dot{q}_k^{\bar{k}} = \sum_j^{iL}\left(\frac{\partial q_k^{\bar{k}}}{\partial{}^ir_j^{[w]}}\cdot{}^i\dot{r}_l^{[w]}\right) + \frac{\partial q_k^{\bar{k}}}{\partial t}. \tag{4.50} $$

Obviously, then $$ \frac{\partial q_k^{\bar{k}}}{\partial{}^ir_l^{[w]}} = \frac{\partial\dot{q}_k^{\bar{k}}}{\partial{}^i\dot{r}_l^{[w]}}. \tag{4.51} $$

From Eqs. (4.48) and (4.49), then $$ \frac{\partial\varepsilon_{iL}^i}{\partial{}^i\dot{r}_l^{[w]}} = \sum_k^{iL}\left(\frac{\partial\varepsilon_{iL}^i}{\partial\dot{q}_k^{\bar{k}}}\cdot\frac{\partial\dot{q}_k^{\bar{k}}}{\partial{}^i\dot{r}_l^{[w]}}\right). \tag{4.52} $$

From Eqs. (4.52) and (4.51), then $$ \frac{{}^id}{dt}\left(\frac{\partial\varepsilon_{iL}^i}{\partial{}^i\dot{r}_l^{[w]}}\right) = \sum_k^{iL}\left(\frac{{}^id}{dt}\left(\frac{\partial\varepsilon_{iL}^i}{\partial{}^i\dot{q}_k^{\bar{k}}}\right)\cdot\frac{\partial{}^iq_k^{\bar{k}}}{\partial{}^ir_l^{[w]}}\right) + \sum_k^{iL}\left(\frac{\partial\varepsilon_{iL}^i}{\partial{}^i\dot{q}_k^{\bar{k}}}\cdot\frac{{}^id}{dt}\left(\frac{\partial q_k^{\bar{k}}}{\partial{}^ir_l^{[w]}}\right)\right). \tag{4.53} $$

For any function $f(\ldots,{}^ir_l,\ldots;t)$, its time derivative is $$ \frac{df}{dl} = \sum_k^{iL}\left(\frac{\partial f}{\partial{}^ir_k^{[w]}}\cdot{}^i\dot{r}_k^{[w]}\right) + \frac{\partial f}{\partial l}. \tag{4.54} $$

Based on the Leibnitz rule of Eq. (4.54) and second term of Eq. (4.53), we obtain $$ \frac{{}^id}{dt}\left(\frac{\partial\varepsilon_{iL}^i}{\partial{}^i\dot{r}_l^{[w]}}\right) = \sum_k^{iL}\left(\frac{d}{dt}\left(\frac{\partial\varepsilon_{iL}^i}{\partial\dot{q}_k^{\bar{k}}}\right)\cdot\frac{\partial q_k^{\bar{k}}}{\partial{}^ir_l^{[w]}}\right)\backslash + \sum_k^{iL}\left(\frac{\partial\varepsilon_{iL}^i}{\partial\dot{q}_k^{\bar{k}}}\cdot\left(\frac{\partial^2q_k^{\bar{k}}}{\partial{}^ir_l^{[w]}\partial{}^ir_k^{[w]}}{}^i\dot{r}_k^{[w]} + \frac{\partial^2q_k^{\bar{k}}}{\partial{}^ir_l^{[w]}\partial t}\right)\right). \tag{4.55} $$

From Eq. (4.50), then $$ \frac{\partial\dot{q}_k^{\bar{k}}}{\partial{}^ir_l^{[w]}} = \sum_j^{iL}\left(\frac{\partial^2q_k^{\bar{k}}}{\partial{}^ir_l^{[w]}\partial{}^ir_j^{[w]}}\cdot{}^i\dot{r}_j^{[w]}\right) + \frac{\partial^2q_k^{\bar{k}}}{\partial{}^ir_l^{[w]}\partial t}. \tag{4.56} $$

On the other hand, we know based on the partial derivative chain rule that $$ \frac{\partial\mathcal{E}_{iL}^i}{\partial{}^ir_l^{[w]}} = \sum_k^{iL}\left(\frac{\partial\mathcal{E}_{iL}^i}{\partial q_k^{\bar{k}}}\cdot\frac{\partial q_k^{\bar{k}}}{\partial{}^ir_l^{[w]}}\right) + \sum_k^{iL}\left(\frac{\partial\mathcal{E}_{iL}^i}{\partial\dot{q}_k^{\bar{k}}}\,\frac{\partial\dot{q}_k^{\bar{k}}}{\partial{}^ir_l^{[w]}}\right). \tag{4.57} $$

From Eqs. (4.56) and (4.57), then $$\frac{\partial \mathcal{E}^i_{iL}}{\partial^i r_l^{[w]}} = \sum_k^{iL}\left(\frac{\partial \mathcal{E}^i_{iL}}{\partial q^{\bar{k}}_k}\cdot\frac{\partial q^{\bar{k}}_k}{\partial^i r_l^{[w]}}\right) + \sum_k^{iL}\left(\frac{\partial \mathcal{E}^i_{iL}}{\partial \dot{q}^{\bar{k}}_k}\cdot\left(\sum_j^{iL}\left(\frac{\partial^2 q^{\bar{k}}_k}{\partial^i r_l^{[w]}\partial^i r_j^{[w]}}\cdot{}^i\dot{r}_l^{[w]}\right)+\frac{\partial^2 q^{\bar{k}}_k}{\partial^i r_l^{[w]}\partial t}\right)\right). \quad (4.58)$$

Let Eqs. (4.55) and (4.58) be substituted into Eq. (4.48), then $$\sum_j^{iL}\left(\frac{^id}{dt}\left(\frac{\partial \mathcal{E}^i_{iL}}{\partial \dot{q}^l_l}\right)-\frac{\partial \mathcal{E}^i_{iL}}{\partial q^{\bar{l}}_l}\right)\cdot\frac{\partial q^{\bar{j}}_j}{\partial^i r_l^{[w]}} = 0. \quad (4.59)$$

If $\partial q^{\bar{j}}_j/\partial^i r_l^{[w]}$ is non-singular, then $\partial^i r_l^{[w]}/\partial q^{\bar{j}}_j$ exists. So, we obtain the Lagrange equation of the joint space, $$\frac{^id}{dt}\left(\frac{\partial \varepsilon^i_{iL}}{\partial \dot{q}^{\bar{k}}_k}\right)-\frac{\partial \varepsilon^i_{iL}}{\partial q^{\bar{k}}_k} = 0. \quad (4.60)$$

Eq. (4.60) has the invariance with Eq. (4.49) in the structure. In Eq. (4.60), the scalar of the given joint space point is independent from the generalized coordinates describing the point. The coordinate replacement of Eq. (4.49) is called the point transformation.

When deriving the Lagrangian equation, the premise is that Eqs. (4.46) and (4.48) are established. The conservative force has the opposite chain-ordering as the inertial force. The constraint in the Lagrange system can be either a consolidation constraint or a motion constraint between particles; the rigid-body itself is a particle system $B^{[l]}=[(m_l^{[S]}, lS)|lS\in\Omega_l]$, and the particle energy is additive.

We know that the rigid-body kinetic energy consists of the body center translational kinetic energy and the rotational kinetic energy. The Lagrange equation is established for the primitive joint pair R/P to lay the foundation for further introduction of the new dynamic theory.

The rigid-body MAS iL={A,K,T,NT,F,B} is given, and the root is used as the inertial space, $\forall l\in A$; the energy of Axis # l is denoted as $\varepsilon_l^i$, the translational kinetic energy as $_v\varepsilon_l^i$, the rotational kinetic energy as $_w\varepsilon_l^i$, and the gravity potential energy as $_g\varepsilon_l^i$. The external resultant force and the resultant torque of Axis # l in addition to the gravitation are respectively $^{iL}f_l$ and $^{iL}\tau_l$; the mass and rotational inertia of Axis # l are respectively $m_l$ and $^{lI}J_{lI}$; the Axis-Invariant of Axis # u is $^{\bar{u}}n_u$; the inertial acceleration of the environment i acting on lI. The chain-ordering of the gravity acceleration $^ig_{lI}$ is from i to lI; the chain-ordering of $^{i|1I}g$, is from lI to i; and $$^ig_{lI}=-^{i|1I}g_i \quad (4.61)$$

[1] System Energy

The system iL energy $\varepsilon_{iL}^l$ is expressed as $$\varepsilon^i_{LI}={}_m\varepsilon_{iL}^i+{}_g\varepsilon_{iL}^i \quad (4.62)$$

where $$_m\mathcal{E}^i_{iL} = \sum_k^{iL}\left({}_v\mathcal{E}^i_k\right)+\sum_k^{iL}\left({}_\omega\mathcal{E}^i_k\right),\ {}_g\mathcal{E}^i_{iL} = \sum_k^{iL}\left({}_g\mathcal{E}^i_k\right) \quad (4.63)$$

-continued $$_v\mathcal{E}^i_l = \frac{1}{2}\cdot m_l\cdot{}^i\dot{r}^T_{lI}\cdot{}^i\dot{r}_{lI},\ {}_\omega\mathcal{E}^i_l = \frac{1}{2}\cdot{}^i\dot{\phi}^T_l\cdot{}^{i|lI}J_{lI}\cdot{}^i\dot{\phi}_l$$

$$_g\mathcal{E}^i_l = m_k\cdot{}^ir^T_{lI}\cdot{}^ig_{lI} = -m_l\cdot{}^ir^T_{lI}\cdot{}^{i|lI}g_i$$

[2] Lagrange Equation of the Multi-Axis System

From Eq. (4.60), we obtain the Lagrange equation of MASs, $$\begin{cases}\frac{^id}{dt}\left(\frac{\partial \mathcal{E}^i_{iL}}{\partial^i\dot{r}^{\bar{u}}_u}\right)-\frac{\partial \mathcal{E}^i_{iL}}{\partial r^{\bar{u}}_u} = {}^{i|\bar{u}}n^T_u\cdot{}^{i|iL}f_u, & \text{if } {}^{\bar{u}}k_u\in P\\ \frac{^id}{dt}\left(\frac{\partial \mathcal{E}^i_{iL}}{\partial\dot{\phi}^{\bar{u}}_u}\right)-\frac{\partial \mathcal{E}^i_{iL}}{\partial \phi^{\bar{u}}_u} = {}^{i|\bar{u}}n^T_u\cdot{}^{i|iL}\tau_u, & \text{if } {}^{\bar{u}}k_u\in R\end{cases}. \quad (4.64)$$

Eq. (4.64) is the control equation of Axis # u, i.e. the force balance equation on the Axis-Invariant $^{\bar{u}}n_u$; $^{i|\bar{u}}n_u^{T}\cdot{}^{i|iL}f_u$ is a component of the resultant force $^{i|iL}f_u$ on $^{\bar{u}}n_u$; and $^{i|\bar{u}}n_u^{T}\cdot{}^{i|iL}\tau_u$ is a component of the resultant torque $^{i|iL}\tau_u$ on $^{\bar{u}}n_u$.

Figure 44:
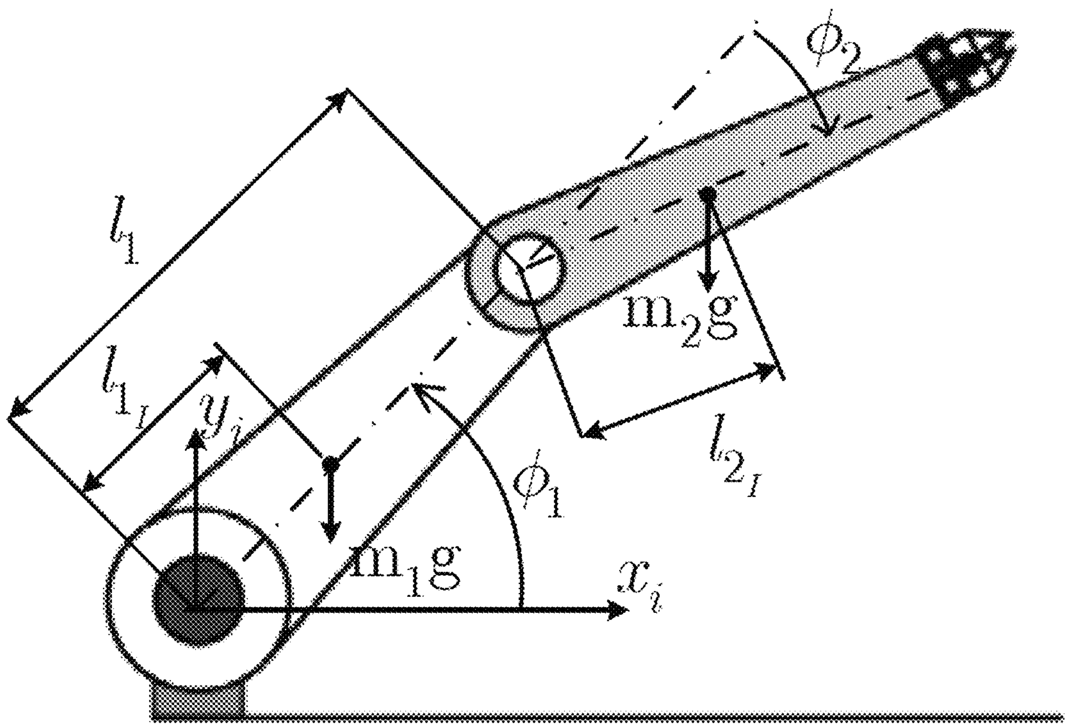
FIG. 44 is a schematic of planar 2R robotic arm.

EXAMPLE 4.1: FIG. 44 is the plane schematic of 2R RobotArm. In FIG. 44, there are the length of link 1 $l_1$ 4401, the distance between link 1's centroid and axis 1's origin $l_{1_l}$ 4402, the distance between link 2's centroid and axis 2's origin $l_{2_l}$ 4403. The 2R-Robo system is noted as A=(i,1,2], The joint variable SEQS is noded as $\phi_{(i,2]}^T=[\phi_1^i,\phi_2^1]$, the link natural coordinate system SEQS as $[F^{[l]}|l\in A]$, the inertia system as $F^{[i]}$, the inertial center vectors as $^lr_{1I}^T=[l_{1I},0,0]$, $^2r_{2I}^T=[l_{2I},0,0]$, the gravity acceleration vector as $^ig_{lI}^T=[0,0,-g]$, mass SEQS as $[m_l|l\in A]$, and rotational inertia SEQS as $[^uJ_{lI}|l\in A]$, joint driving torque SEQS as $\tau_l^i$ and $\tau_2^i$. The Lagrange equation of the system is established with Eq. (4.64).

SOLUTION: Denote $\phi_2^i=\phi_1^i+\phi_2^1$, $\dot{\phi}_2^i=\dot{\phi}_1^i+\dot{\phi}_2^1$, and $\ddot{\phi}_2^i=\ddot{\phi}_1^i+\ddot{\phi}_2^1$, and denote $$^{1I}J_{1I} = \begin{bmatrix} * & * & * \\ * & * & * \\ * & * & J_{1I}\end{bmatrix},\ {}^{2I}J_{2I} = \begin{bmatrix} * & * & * \\ * & * & * \\ * & * & J_{2I}\end{bmatrix}, \quad (4.65)$$

Where * indicates the unknown quantity. Apply the sine and cosine abridged symbols in Eq. (4.11). STEP 1. Express the system energy. The kinetic energy of Axis 1, $$_v\varepsilon^i_1 + {}_\omega\varepsilon^i_1 = \frac{1}{2}m_1\dot{r}^{i:2}_{1I}+\frac{1}{2}J_{1I}\dot{\phi}^{i:2}_1 = \frac{1}{2}m_1l^2_{lI}\dot{\phi}^{i:2}_1+\frac{1}{2}J_{1I}\dot{\phi}^{i:2}_l; \quad (4.66)$$

Gravity potential energy of Axis 1, $$_g\varepsilon^i_1 = m_1\cdot{}^ir^T_{1I}\cdot{}^ig_{1I} = -m_1gl_{1I}S^i_1; \quad (4.67)$$

Kinetic energy of Axis 2, $$\begin{aligned}_v\varepsilon^i_2 + {}_w\varepsilon^i_2 &= \frac{1}{2}\cdot m_2\cdot\dot{r}^{i:2}_{2I}+\frac{1}{2}\cdot J_{2I}\cdot\dot{\phi}^{i:2}_2\\ &= \frac{1}{2}m_2\cdot\left[\left(l_1\dot{\phi}^i_1C^1_2+l_{2I}\dot{\phi}^i_2\right)^2+\left(l_1\dot{\phi}^i_1S^1_2\right)^2\right]+\frac{1}{2}J_{2I}\dot{\phi}^{i:2}_2\\ &= \frac{1}{2}m_2\cdot\left[l^2_1\dot{\phi}^{i:2}_1+2l_1l_{2I}C^1_2\cdot\left(\dot{\phi}^i_1\dot{\phi}^1_2+\dot{\phi}^{i:2}_1\right)+l^2_{2I}\dot{\phi}^{i:2}_2\right]+\frac{1}{2}J_{2I}\dot{\phi}^{i:2}_2\end{aligned}; \quad (4.68)$$

Gravity potential energy of axis 2, $$ {}_g\varepsilon_2^i = m_2 \cdot {}^i r_{2I}^T \cdot {}^i g_{2I} = -m_2 g(l_1 S_1^i + l_{2I} S_2^i); \quad (4.69)$$

System gravity potential energy, $$ {}_g\varepsilon_{iL}^i = {}_g\varepsilon_1^i + {}_g\varepsilon_2^i $$

System kinetic energy, $$ \varepsilon_{iL}^i = {}_v\varepsilon_1^i + {}_w\varepsilon_1^i + {}_v\varepsilon_2^i + {}_w\varepsilon_2^i + {}_g\varepsilon_{1L}^i; $$

STEP 2. Obtain the partial derivative of the system energy to the joint speed, $$\begin{aligned} \partial\varepsilon_{iL}^i / \partial\dot\phi_1^i &= m_1 l_{1I}^2 \dot\phi_1^i + J_{1I}\dot\phi_1^i + \\ & m_2 l_1^2 \dot\phi_1^i + m_2 l_1 l_{2I} C_2^1 \dot\phi_2^i \backslash + 2 m_2 l_1 l_{2I} C_2^1 \dot\phi_1^i + m_2 l_2^2 \dot\phi_2^i + J_{2I}\dot\phi_2^i = \\ & m_1 l_1^2 \dot\phi_1^i + J_{1I}\dot\phi_1^i + m_2 l_1^2 \dot\phi_1^i + 2 m_2 l_1 l_{2I} C_2^1 \dot\phi_1^i \backslash + m_2 l_1 l_{2I} C_2^1 \dot\phi_2^i + m_2 l_2^2 \dot\phi_2^i + J_{2I}\dot\phi_2^i. \\ \partial\varepsilon_{iL}^i / \partial\dot\phi_2^i &= m_2 l_1 l_{2I} C_2^1 \dot\phi_1^i + m_2 l_{2I}^2 \dot\phi_2^i + J_{2I}\dot\phi_2^i. \end{aligned}$$

STEP 3. Obtain the partial derivative of the system energy to the joint variable, $$\frac{\partial \mathcal{E}_{iL}^i}{\partial \phi_{(i,2]}} = \begin{bmatrix} 0 \\ -m_2 l_1 l_{2I} S_2^1 \left(\dot\phi_1^i \dot\phi_2^1 + \dot\phi_1^{i:2}\right) \end{bmatrix} - \begin{bmatrix} m_1 g l_{1I} C_1^i + m_2 g(l_1 C_1^i + l_{2I} C_2^i) \\ m_2 g l_{2I} C_2^i \end{bmatrix}. \quad (4.70)$$

STEP 4. Obtain the derivative of the partial velocity to the time, $$\frac{d}{dt}\left(\frac{\partial \mathcal{E}_D^i}{\partial \dot\phi_{(i,2]}}\right) = \frac{d}{dt}\begin{pmatrix} m_1 l_{1I}^2 \dot\phi_1^i + J_{1I}\dot\phi_1^i + m_2 l_1^2 \dot\phi_1^i + m_2 l_1 l_{2I} C_2^1 \dot\phi_2^1 \\ \backslash + 2 m_2 l_1 l_{2I} C_2^1 \dot\phi_1^i + m_2 l_{2I}^2 \dot\phi_2^i + J_{2I}\dot\phi_2^i \\ m_2 l_1 l_{2I} C_2^1 \dot\phi_1^i + m_2 l_{2I}^2 \dot\phi_2^i + J_{2I}\dot\phi_2^i \end{pmatrix} = \backslash$$

$$\begin{bmatrix} \begin{pmatrix} m_1 l_{1I}^2 + J_{1I} + J_{2I} + m_2 \\ \backslash(l_1^2 + 2 l_1 l_{2I} C_2^1 + l_{2I}^2) \end{pmatrix} \ddot\phi_1^i \\ (m_2(l_{2I}^2 + l_1 l_{2I} C_2^1) + J_{2I}) \ddot\phi_1^i \end{bmatrix} +$$

$$\begin{bmatrix} \begin{pmatrix} J_{2I} + m_2 \\ \backslash(l_{2I}^2 + l_1 l_{2I} C_2^1) \end{pmatrix} \ddot\phi_2^1 \\ (m_2 l_{2I}^2 + J_{2I}) \ddot\phi_2^1 \end{bmatrix} - \begin{bmatrix} m_2 l_1 l_{2I} S_2^1 \\ \backslash(\dot\phi_2^{1:2} + 2\dot\phi_1^i \dot\phi_2^1) \\ m_2 l_1 l_{2I} S_2^1 \dot\phi_1^{i:2} \end{bmatrix} \cdot =$$

$$\begin{bmatrix} m_1 l_{1I}^2 + J_{1I} + J_{2I} + m_2 & m_2\begin{pmatrix} l_{2I}^2 + l_1 \\ \backslash l_{2I} C_2^1 \end{pmatrix} + J_{2I} \\ \backslash(l_1^2 + 2 l_1 l_{2I} C_2^1 + l_{2I}^2) & \\ m_2(l_{2I}^2 + l_1 l_{2I} C_2^1) + J_{2I} & m_2 l_{2I}^2 + J_{2I} \end{bmatrix} \cdot \begin{bmatrix} \ddot\phi_1^i \\ \ddot\phi_2^1 \end{bmatrix} - \begin{bmatrix} m_2 l_1 l_{2I} S_2^1 \\ \backslash(\dot\phi_2^{1:2} + 2\dot\phi_1^i \dot\phi_2^1) \\ m_2 l_1 l_{2I} S_2^1 \dot\phi_1^{i:2} \end{bmatrix}$$

So $$\frac{d}{dt}\left(\frac{\partial \mathcal{E}_{iL}^i}{\partial \dot\phi_{(i,2]}}\right) = \begin{bmatrix} m_1 l_{1I}^2 + J_{1I} + J_{2I} + m_2 & m_2(l_{2I}^2 + l_1 l_{2I} C_2^1 \\ \backslash(l_1^2 + 2 l_1 l_{2I} C_2^1 + l_{2I}^2) & \backslash + J_{2I} \\ m_2(l_{2I}^2 + l_1 l_{2I} C_2^1) + J_{2I} & m_2 l_{2I}^2 + J_{2I} \end{bmatrix}.$$

$$\backslash \cdot \begin{bmatrix} \ddot\phi_1^i \\ \ddot\phi_2^1 \end{bmatrix} + \begin{bmatrix} -m_2 l_1 l_{2I} S_2^1 \left(\dot\phi_2^{1:2} + 2\dot\phi_1^i \dot\phi_2^1\right) \\ m_2 l_1 l_{2I} S_2^1 \dot\phi_1^i \dot\phi_2^1 \end{bmatrix}$$

STEP 5. From Eqs. (4.71), (4.70) and (4.64), we obtain the Lagrange dynamic equation:

$$\begin{bmatrix} m_1 l_{1I}^2 + J_{1I} + J_{2I} + m_2 & m_2(l_{2I}^2 + l_1 l_{2I} C_2^1) + J_{2I} \\ \backslash(l_1^2 + 2 l_1 l_{2I} C_2^1 + l_{2I}^2) & \\ m_2(l_{2I}^2 + l_1 l_{2I} C_2^1) + J_{2I} & m_2 l_{2I}^2 + J_{2I} \end{bmatrix} \cdot \begin{bmatrix} \ddot\phi_1^i \\ \ddot\phi_2^1 \end{bmatrix} + \backslash \quad (4.72)$$

$$\begin{bmatrix} -m_2 l_1 l_{2I} S_2^1 \left(\dot\phi_2^{1:2} + 2\dot\phi_1^i \dot\phi_2^1\right) \\ m_2 l_1 l_{2I} S_2^1 \dot\phi_1^{i:2} \end{bmatrix} + \begin{bmatrix} m_1 g l_{1I} C_1^i + \\ \backslash m_2 g(l_1 C_1^i + l_{2I} C_2^i) \\ m_2 g l_{2I} C_2^i \end{bmatrix} = \begin{bmatrix} \tau_1^i \\ \tau_2^i \end{bmatrix}.$$

From EXAMPLE 4.1 we know that for 2DOF plane Robo-Arm, it is a cumbersome process to apply the Lagrange method to establish the dynamic equation. With the increase of DOF number, the computational complexity is also increasing. This is because:

[1] First, the computational complexity of the translation and rotation velocity is proportional to the number of DOFs;

[2] Furthermore, the computational complexity of the system energy is expressed as second power of the number of DOFs by the translation and rotation velocity.

[3] Then, the complexity of the partial velocity is as as third power of the number of DOFs from the system energy;

[4] Finally, the complexity of the derivation from the partial velocity is as forth power of the number of DOFs.

Although the Lagrange equation deduces the dynamic equation of the system based on the invariant system energy, it has the advantage of theoretical analysis. However, in the engineering application, with the increase of the system DOE the complexity of the equation derivation is increasing, so it is difficult to be applied universally.

Derivation and Application of Kane Equation of MASs

We first analyze the Kane equation proposed by Thomas R. Kane and re-express it with the symbol system of CO.

If MAS iL={A,K,T,NT,F,B} is given, NT≠Ø; considering MAS consisting of N=|B| rigid bodies, any rigid-body is subject to the action of the external force and the joint internal force. The inertia system is noted as $F^{[i]}$. The external force applied to the inertial center $k_I$ of body k and the torque coordinate vector are denoted as ${}^i f_{kI}$ and ${}^i\tau_k$, k∈[1:N]. The joint internal force and the torque vector are respectively denoted as ${}^{i|k}f_{kI}^{\,c}$ and ${}^{i|k}\tau_{kI}^{\,c}$. The force balance equation of the body k is established with the D'Alembert principle, $$ {}^i f_{kI}^{*} - {}^i f_{kI} - {}^{i|k} f_{kI}^{\,c} = 0, \quad (4.73)$$

Wherein: ${}^i f_{kI}^{*}$ is the inertial force of body k; the inertial force ${}^i f_{kI}^{*}$ is expressed as $$ {}^i f_{kI}^{*} = m_k \cdot {}^i \ddot r_{kI} \quad (4.74)$$

The virtual displacement of the center of mass $k_I$ is $\delta^i r_{kI}$, and it is the displacement increment of the time δt→0; according to the virtual work principle, we obtain the virtual work δW, $$ \delta W = \delta^i r_{kI}^{T} \cdot ({}^i f_{kI}^{*} - {}^i f_{kI} - {}^{i|k} f_{kI}^{\,c}) = 0, k \in [1:N]. $$

Under the assumption that the joint internal force does not cause power loss, then $$ \delta^i r_{kI}^{T} \cdot {}^{i|k} f_{kI}^{\,c} = 0, $$

So $$ \delta W = \delta^i r_{kI}^T \cdot \left({}^i f_{kI}^{*} - {}^i f_{kI}\right) = 0,\ k \in [1:N]. \quad (4.75)$$

From Eq. (4.75), then $$\delta W = \delta q_l^{\bar{l}} \cdot \frac{\partial}{\partial \dot{q}_l^{\bar{l}}} \left({}^i\dot{r}_{kI}^T\right) \cdot \left({}^i f_{kI}^* - {}^i f_{kI}\right) = 0,\ k,\ l \in [1:N]. \tag{4.76}$$

Since the position vector ${}^i r_{kI}$ is $${}^i r_{kI} = {}^i r_{kI}(\ldots, q_l^{\bar{l}}, \ldots; t),$$

So $${}^i\dot{r}_{kI} = \frac{\partial\, {}^i r_{kI}}{\partial q_l^{\bar{l}}} \cdot \frac{dq_l^{\bar{l}}}{dt} + \frac{\partial\, {}^i r_{kI}}{\partial t} = \frac{\partial\, {}^i r_{kI}}{\partial q_l^{\bar{l}}} \cdot \dot{q}_l^{\bar{l}} + \frac{\partial\, {}^i r_{kI}}{\partial t}.$$

Obviously, then $$\frac{\partial}{\partial \dot{q}_l^{\bar{l}}}\left({}^i\dot{r}_{kI}\right) = \frac{\partial}{\partial q_l^{\bar{l}}}\left({}^i r_{kI}\right). \tag{4.77}$$

Because the virtual displacement is $\delta q_l^{\bar{l}}$ arbitrary, from Eq. (4.76), then $$\frac{\partial}{\partial \dot{q}_l^{\bar{l}}}\left({}^i\dot{r}_{kI}^T\right) \cdot \left({}^i f_{kI}^* - {}^i f_{kI}\right) = 0,\ k;\ l \in [1:N]. \tag{4.78}$$

From Eqs. (4.74) and (4.78), then $$m_k \cdot \frac{\partial}{\partial \dot{q}_l^{\bar{l}}}\left({}^i\dot{r}_{kI}^T\right) \cdot {}^i\ddot{r}_{kI} = \frac{\partial}{\partial \dot{q}_l^{\bar{l}}}\left({}^i\dot{r}_{kI}^T\right) \cdot {}^i f_{kI},\ k,\ l \in [1:N]. \tag{4.79}$$

Similarly, with the virtual work principle, we obtain $$\frac{\partial}{\partial \dot{q}_l^{\bar{l}}}\left({}^i\dot{r}_{kI}^T\right) \cdot {}^i\tau_{kI} + \frac{\partial}{\partial \dot{q}_l^{\bar{l}}}\left({}^i\dot{r}_{kI}^T\right) \cdot {}^i\tau_{kI}^* = 0,\ k,\ l \in [1:N], \tag{4.80}$$

wherein: ${}^i\tau_{kI}$ and ${}^i\tau_{kI}^*$ are the external torque and the inertia torque coordinate vector respectively. And $${}^{i|kI}J_{kI} \cdot {}^i\ddot{\phi}_k + {}^i\dot{\tilde{\phi}}_k \cdot {}^{i|kI}J_{kI} \cdot {}^i\dot{\phi}_k = {}^i\tau_l, \tag{4.81}$$

where ${}^{i|k}J_{kI}$ is the inertial center rotation inertia of Body # k. From Eqs. (4.80) and (4.81), then $$\frac{\partial\, {}^i\dot{\phi}_k^T}{\partial \dot{q}_l^{\bar{l}}} \cdot \left({}^{i|kI}J_{kI} \cdot {}^i\ddot{\phi}_k + {}^i\dot{\tilde{\phi}}_k \cdot {}^{i|kI}J_{kI} \cdot {}^i\dot{\phi}_k\right) = \frac{\partial\, {}^i\dot{\phi}_k^T}{\partial \dot{q}_l^{\bar{l}}} \cdot {}^i\tau_l. \tag{4.82}$$

Let Eqs. (4.79) and (4.82) be combined to obtain the Kane equation of MASs $$m_k \cdot \frac{\partial\, {}^i\dot{r}_{kI}^T}{\partial \dot{q}_l^{\bar{l}}} \cdot {}^i\ddot{r}_{kI} + \frac{\partial\, {}^i\dot{\phi}_k^T}{\partial \dot{q}_l^{\bar{l}}} \cdot \left({}^{i|kI}J_{kI} \cdot {}^i\ddot{\phi}_k + {}^i\dot{\tilde{\phi}}_k \cdot {}^{i|kI}J_{kI} \cdot {}^i\dot{\phi}_k\right) = \tag{4.83}$$

-continued $$\frac{\partial\, {}^i\dot{r}_{kI}^T}{\partial \dot{q}_l^{\bar{l}}} \cdot {}^i f_{kI} + \frac{\partial\, {}^i\dot{\phi}_k^T}{\partial \dot{q}_l^{\bar{l}}} \cdot {}^i\tau_l.$$

From Eq. (4.83), we know that the Kane equation of MASs is established as follows:

STEP 1. Identify the key points such as the body center, the acting point of the force, etc.:

STEP 2. Select a set of independent joint coordinates and obtain the DCM;

STEP 3. Express the translation velocity, the translational acceleration, the rotation velocity and the rotation acceleration with the joint coordinates and the joint speeds.

| Joint velocity ($\dot{q}_l^{\bar{l}}$) | $\partial\, {}^i\dot{r}_{kI}^T / \partial \dot{q}_l^{\bar{l}}$ | $\partial\, {}^i\dot{\phi}_k^T / \partial \dot{q}_l^{\bar{l}}$ |
|---|---|---|
| l = 1 | | |
| | . | . |

STEP 5. Let the calculated partial velocity, velocity and acceleration be substituted into Eq. (4.83) to obtain the dynamic equation of the system;

STEP 6. Write the dynamic equation in the standard form to obtain the canonical dynamic equation, $$[M]\{\ddot{q}\} = \{RHS(q, \dot{q})\}, \tag{4.84}$$

wherein: RHS—Right hand side.

Figure 45:
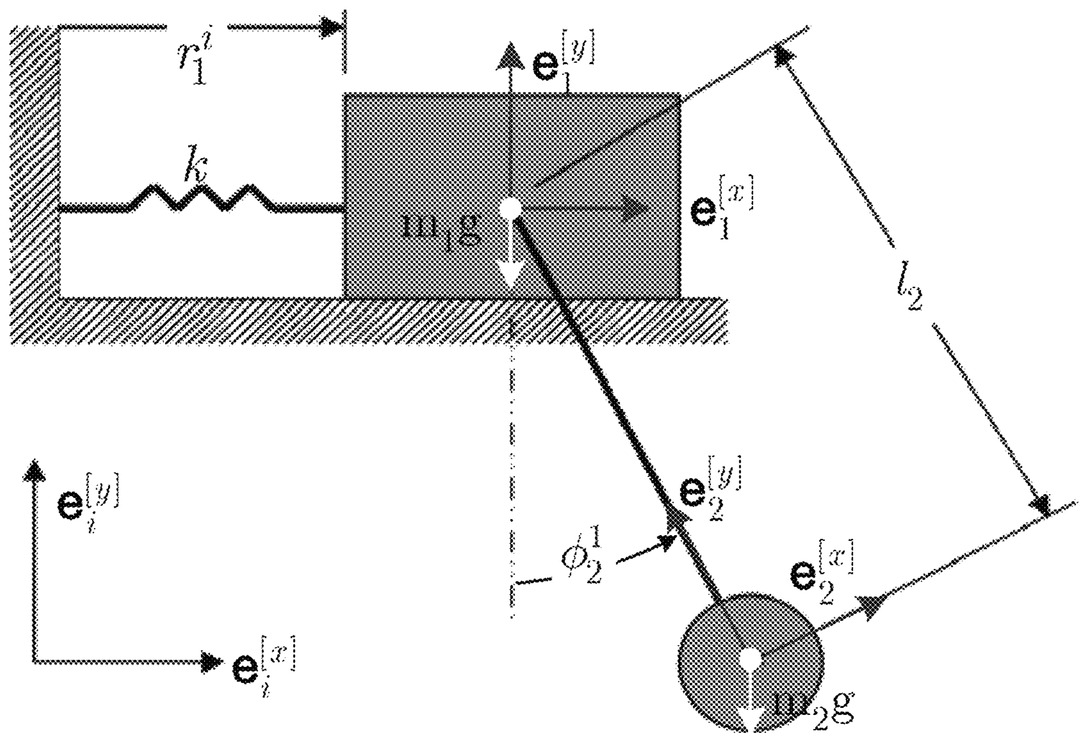
FIG. 45 is a diagram of the ideal spring mass pendulum.

EXAMPLE 4.2: As shown in FIG. 45 is an ideal spring mass pendulum, and the dynamic equations of the system are established respectively with the Kane method and the Lagrange method. In FIG. 45, there are the spring elastic deformation as the displacement of joint 1 $r_l^i$ 4501, spring elastic coefficient k 4502, the length of pendulum spring $l_2$ 4503 and the swing angle of the pendulum spring $\phi_2^1$ 4504.

SOLUTION 1: The Kane modeling method is as follows:

STEP 1. As shown in FIG. 45, the body center position is identified as *;

STEP 2. Obtain DCM.

| ${}^iQ_2 = {}^{i|}e_s$ | $e_2^{[x]}$ | $e_2^{[y]}$ | $e_2^{[z]}$ |
|---|---|---|---|
| $e_i^{[x]}$ | $C_2^1$ | $-S_2^1$ | 0 |
| $e_i^{[y]}$ | $S_2^1$ | $C_2^1$ | 0 |
| $e_i^{[z]}$ | 0 | 0 | 1 |

STEP 3. Select the joint coordinates $q_1^i = r_1^i$, $q_2^i = \phi_2^i$; calculate the rotational velocity and acceleration ${}^i\dot{\phi}_1 = 0_3$, ${}^i\dot{\phi}_2 = 1^{[z]} \cdot \dot{\phi}_2^1$, ${}^i\ddot{\phi}_1 = 0_3$, ${}^i\ddot{\phi}_2 = 1^{[z]} \cdot \ddot{\phi}_2^1$; calculate the translation velocity and the acceleration, as shown in the following table.

| ${}^i\dot{r}_{1I} = 1^{[x]} \cdot \dot{q}_1^i$ | ${}^i\ddot{r}_{1I} = 1^{[x]} \cdot \ddot{q}_1^i$ |
|---|---|
| ${}^i\dot{r}_{2I}^T = \left[\dot{q}_1^i + l_2\dot{q}_2^1 C_2^1,\ l_2\dot{q}_2^1 S_2^1,\ 0\right]$ | ${}^i\ddot{r}_{2I}^T = \begin{bmatrix} \ddot{q}_1^i + l_2\ddot{q}_2^1 C_2^1 & l_2\ddot{q}_2^1 S_2^1 & \\ \backslash -l_2\dot{q}_2^{1:2} S_2^1, & \backslash + l_2\dot{q}_2^{1:2} C_2^1, & 0 \end{bmatrix}$ |

STEP 4. Build a partial velocity table.

| $q_l^{\bar{l}}$ | $\partial\, {}^i\dot{\phi}_k^T / \partial \dot{q}_l^{\bar{l}}$ | $\partial\, {}^i\dot{r}_{k_I}^T / \partial \dot{q}_l^{\bar{l}}$ |
|---|---|---|
| l = 1 | $0_3^T$ | $1^{[x]}$ |
| l = 2 | $1^{[z]}$ | $l_2 \cdot [C_2^1, S_2^1, 0]$ |

STEP 5. Let the calculated partial velocity, velocity and acceleration be substituted into Eq. (4.83) to obtain all terms of the dynamic equation of the system.

| | |
|---|---|
| $m_2 \cdot \frac{\partial^i \dot{r}_{2I}^T}{\partial \dot{q}_1^i} \cdot {}^i\ddot{r}_{2I} = m_2\ddot{q}_1^i + m_2 l_2 C_2^1 \ddot{q}_2^1 - m_2 l_2 S_2^1 \dot{q}_2^{1:2}$ | $\frac{\partial^i \dot{r}_{2I}^T}{\partial \dot{q}_1^i} \cdot {}^i f_{2I} = 0$ |
| $m_1 \cdot \frac{\partial^i \dot{r}_{1I}^T}{\partial \dot{q}_1^i} \cdot {}^i\ddot{r}_{1I} = m_1\ddot{q}_1^i$ | $\frac{\partial^i \dot{r}_{1I}^T}{\partial \dot{q}_1^i} \cdot {}^i f_{1I} = -kq_1^i$ |
| $m_2 \cdot \frac{\partial^i \dot{r}_{2I}^T}{\partial \dot{q}_2^1} \cdot {}^i\ddot{r}_{2I} = m_2 l_2 C_2^1 \ddot{q}_1^i + m_2 l_2^2 \ddot{q}_2^1$ | $\frac{\partial^i \dot{r}_{2I}^T}{\partial \dot{q}_2^i} \cdot {}^i f_{2I} = -l_2 m_2 g S_2^1$ |
| $m_1 \cdot \frac{\partial^i \dot{r}_{1I}^T}{\partial \dot{q}_2^i} \cdot {}^i\ddot{r}_{1I} = 0$ | $\frac{\partial^i \dot{r}_{1I}^T}{\partial \dot{q}_2^1} \cdot {}^i f_{1I} = 0$ |

STEP 6. Write the dynamic equation in the standard form to obtain the canonical dynamic equation.

$$\begin{bmatrix} m_1+m_2 & m_2 l_2\cos(q_2^1) \\ m_2 l_2\cos(q_2^1) & m_2 l_2^2 \end{bmatrix} \cdot \begin{bmatrix} \ddot{q}_1^i \\ \ddot{q}_2^1 \end{bmatrix} = \begin{bmatrix} m_2\dot{q}_2^2 l_2\sin(q_2^1) - kq_1^i \\ m_2 l_2 g\sin(q_2^1) \end{bmatrix}. \tag{4.85}$$

SOLUTION 2: The Lagrange method is as follows:

STEP 1. Express the system energy. Kinetic energy of Axis #1

$${}_v\varepsilon_1^i = \frac{1}{2} m_1 \dot{r}_1^{i:2}.$$

With respect to Frame #i, the potential energy of Axis #1

$${}_g\varepsilon_1^i = 0.$$

Kinetic energy of axis #2

$${}_v\mathcal{E}_2^i = \frac{1}{2} m_2\left(\left(\dot{r}_1^i + l_2 C_2^1 \dot{\phi}_2^1\right)^2 + \left(l_2 S_2^1 \dot{\phi}_2^1\right)^2\right) = \frac{1}{2} m_2 \dot{r}_1^{i:2} + m_2 l_2 C_2^1 \dot{r}_1^i \dot{\phi}_2^1 + \frac{1}{2} m_2 l_2^2 \dot{\phi}_2^{1:2}.$$

Potential energy of axis #2

$${}_g\varepsilon_2^i = m_2 g l_2 C_2^1.$$

Total system energy $$\mathcal{E}_{iL}^i = {}_v\mathcal{E}_1^i + {}_v\mathcal{E}_2^i + {}_g\mathcal{E}_1^i + {}_g\mathcal{E}_2^i = \frac{1}{2} m_1 \dot{r}_1^{i:2} + \frac{1}{2} m_2 \dot{r}_1^{i:2} + m_2 l_2 C_2^1 \dot{r}_1^i \dot{\phi}_2^1 + \frac{1}{2} m_2 l_2^2 \dot{\phi}_2^{1:2} + m_2 g l_2 C_2^1.$$

STEP 2. Obtain the partial derivative of system energy to the joint speeds $$\partial\mathcal{E}_{iL}^i / \partial\dot{r}_1^i = m_1\dot{r}_1^i + m_2\dot{r}_1^i + m_2 l_2 C_2^1 \dot{\phi}_2^1,$$
$$\partial\mathcal{E}_D^i \Big/ \partial\dot{\phi}_2^1 = m_2 l_2 C_2^1 \dot{r}_1^i + m_2 l_2^2 \dot{\phi}_2^1.$$

STEP 3. Obtain the partial derivatives of the energy to the joint displacement $$\partial\mathcal{E}_{iL}^i / \partial r_1^i = 0,\ \partial\mathcal{E}_{iL}^i \Big/ \partial\phi_2^1 = -m_2 l_2 S_2^1 \dot{r}_1^i \dot{\phi}_2^1 - m_2 g l_2 S_2^1.$$

STEP 4. Obtain the derivative of the partial velocity to the time t $$\frac{d}{dt}\left(\partial\mathcal{E}_{iL}^i \big/ \partial\dot{r}_1^i\right) = m_1\ddot{r}_1^i + m_2\ddot{r}_1^i - m_2 l_2 S_2^1 \dot{\phi}_2^{1:2} + m_2 l_2 C_2^1 \ddot{\phi}_2^1$$
$$\frac{d}{dt}\left(\partial\mathcal{E}_{iL}^i \big/ \partial\dot{\phi}_2^1\right) = -m_2 l_2 S_2^1 \dot{r}_1^i \dot{\phi}_2^1 + m_2 l_2 C_2^1 \ddot{r}_1^i + m_2 l_2^2 \ddot{\phi}_2^1$$

STEP 5. Substitute all terms into the Lagrange dynamic equation, and obtain $$\begin{bmatrix} m_1+m_2 & m_2 l_2 C_2^1 \\ m_2 l_2 C_2^1 & m_2 l_2^2 \end{bmatrix} \cdot \begin{bmatrix} \ddot{r}_1^i \\ \ddot{\phi}_2^1 \end{bmatrix} = \begin{bmatrix} m_2 l_2 S_2^1 \dot{\phi}_1^{i:2} - kr_1^i \\ -m_2 g l_2 S_2^1 \end{bmatrix}$$

Obviously, the above equation is consistent with Eq. (4.85). Q.E.D.

From the above we know that by comparing the establishment process of the Kane equation with the Lagrange equation, the dynamic equation is directly expressed by the partial velocity, the velocity and the acceleration of the system. The first calculate the complexity of the velocity and the acceleration is proportional to the number of DOFs; then, calculate the complexity of the partial velocity also to the number of DOFs. So, the complexity of the Kane dynamic modeling is as second power of the number of DOFs.

As compared with the Lagrange method, the Kane dynamics method greatly reduces the difficulty of system modeling because of the lack of the expression of the system energy and the derivation process to the time. However, for the high-freedom system, the Kane dynamic modeling process is still difficult to apply because the Kane dynamic modeling process needs to address the following issues:

[1] It needs to solve the problem of establishing the iterative kinematics equation;

[2] It needs to solve the problem of partial velocity solution;

[3] It needs to solve the problem of establishing the canonical dynamic equation as shown in example 4.2.

Limitations of Existing Multi-Body Dynamics

The Lagrange equation and the Kane equation greatly contribute to the study of multi-body dynamics; since the dynamics based on the spatial operator algebra applies the iterative process, the calculation velocity and accuracy are improved to an extent. These dynamics methods need the complex transformation in the body space, body sub-space, system space and system sub-space in both the kinematics process and the dynamics process; the modeling process and the model expression are very complicated and difficult to meet the requirements of the high-freedom system modeling and control, mainly in:

[1] For high-freedom systems, the technical communication is a serious obstacle due to the lack of the canonical dynamic symbol system. Although the documents [1-20] have their corresponding symbols respectively, they are schematic, do not accurately reflect the meaning of the physical quantity, and fail to reflect the nature of the axis-chain; professionals are required to have long-term dynamic modeling experience, otherwise it is difficult to ensure the engineering quality of the modeling process and the general application.

[2] When the system structure parameter and the inertial parameter are given, although there are many dynamic analysis and calculation methods, they cannot clearly express the unified dynamic model because of the dynamic modeling process is complex. Thus, it is difficult to adapt to the dynamic control. Simultaneously, both the Lagrange dynamic equation and the Kane dynamic equation modeling process show that the 3D space dynamic equation can express the multi-body dynamics process.

[3] The physical meaning of the 6D spatial operator algebra is very abstract, the established dynamic algorithm lacks rigorous axiomatic proof, and the complex calculation process give away the calculation velocity to a certain extent due to the lack of concise and accurate symbol system. The documents [13-15] respectively introduce the multi-body dynamics principle of the 6D spatial operator algebra in hundreds of pages, but do not explain the application process of the principle almost without a complete example; even a low-freedom system, the modeling process is very tedious. The fundamental reason is that the 6D space is a double 3D vector space.

Therefore, it is necessary to establish a concise expression of the dynamic system; it is not only necessary to ensure the accuracy of the modeling, but also the real-time performance of the modeling. If there is no concise dynamic expression, it is difficult to ensure the reliability and the accuracy of the implementation of the dynamics engineering of the high-freedom system. Meanwhile, the traditional unstructured kinematics and dynamic symbols agree the meaning of the symbol with notes, but cannot be understood by the computer, so that the computer cannot independently establish and analyze the kinematic and dynamic models.

Preparation Theorem for Ju-Kane Dynamics

The primitive of the 3D cartesian space is the natural reference axis, i.e. the Axis-Invariant; by combining the multi-body kinematics theory with the chain topology theory and the computer theory, the chain-ordering symbol system and MAS kinematics theory based on Axis-Invariant are established in accordance with the basic principles of tensor invariance, chain ordering invariance and axis invariance, of which the fundamental purpose is to establish a concise iterative kinematics and dynamic equation based on the Axis-Invariants by 3D Spatial Operation Algebra.

in Section 1, the traditional Lagrange equation and Kane equation are expressed as Eqs. (4.60) and (4.83) respectively with the symbol system of CO. The role of Axis-Invariants based forward and reverse iterations on MAS dynamics modeling is further explained below.

Forward and Backward Iteratives Based on Axis-Invariant

Figure 46:
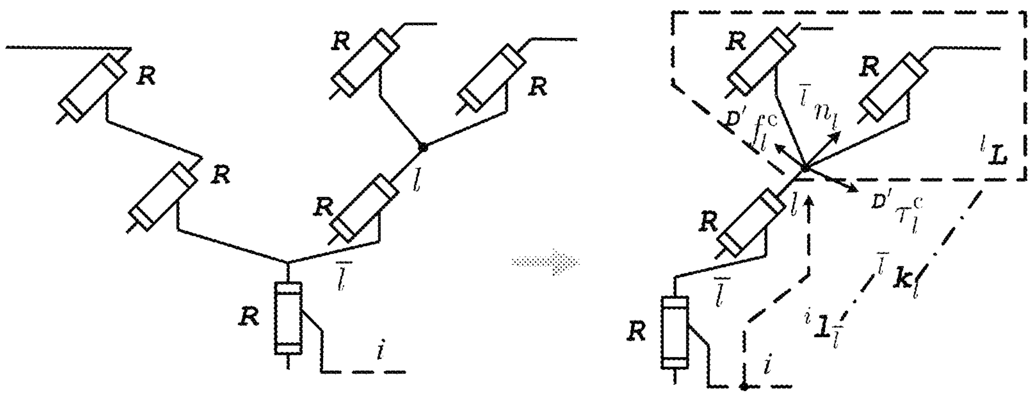
FIG. 46 is a diagram of closed subtree of multi-axis system.

In the following, we first clarify the three important criteria of the axis iterative, the kinematics forward iterative and the dynamics backward iterative, and lay the foundation for the Ju-Kane dynamics principle. FIG. 46 is the closed suntree of the multi-axis system. As shown in FIG. 46, "Cutting" two axes of ${}^{\bar{l}}k_l$, the Axis-Chain of the axis $\bar{l}$ is ${}^{i}k_{\bar{l}}$, the closed subtree of the axis l is lL, and let D'=${}^{l}$L.

[1] Axial balance equation of the Motion-Axis: it is equations of the balance between the inertia force in the direction of the Motion-Axis and the external force. The constraint force applied to the axis 1 by the system D' is denoted as ${}^{D'}f_1$ and the constraint torque is ${}^{D'}\tau_l$; then $$\begin{cases} {}^{\bar{l}}n_l^T \cdot {}^{\bar{l}|D'}f_l = 0 & \text{if } {}^{\bar{l}}k_l \in P \\ {}^{\bar{l}}n_l^T \cdot {}^{\bar{l}|D'}\tau_l = 0 & \text{if } {}^{\bar{l}}k_l \in R \end{cases}, \tag{4.86}$$

where ${}^{D'}f_l$—the resultant force acting on the axis l by the system D'; ${}^{D'}\tau_l$—the resultant torque acting on the axis l by the system D'.

Eq. (4.86) shows that the axial component of the Motion-Axis is always zero although the applied constraint ${}^{D'}f_l$ and the constraint torque ${}^{D'}\tau_l$ are unknown; the dynamic equation is essentially the balance equation of the axial or torque of the Motion-Axis; the axis constraint force and the torque are orthogonal with the natural Motion-Axis, which is also known as the natural orthocomplement.

[2] Kinematics forward iteratives: for both the root system and the mobile MAS, the root shape. velocity and acceleration are regarded as known quantities, and the kinematics calculation from the root to the non-root link can be used to determine the shape, velocity and acceleration of any axis, which is determined by the concatenation of the system topology shown in Eq. (4.4). From the analysis in Chapter 3, we know that the shape, velocity and acceleration of the relative inertial space of any axis are iteratives in respect to the Axis-Invariants.

[3] Dynamics backward iterative: the force is transmitted from the non-root link to the root inversely, the force has dual effects, and the action force ${}^{lL}f_l$ from the closed subtree lL to the axis l and the torque ${}^{lL}\tau_l$ are the inertial force of the members of the closed subtree and the equivalent force of the external force on the axis 1 and torque. The shape, velocity and acceleration of the relative inertial space of the members of the closed subtree, as well as the inertial forces and torques of the members of the closed subtree are determined by the kinematics forward iterative.

The establishment of the axial balance equation of the Motion-Axis depends on the basic properties of the Axis-Invariants. The kinematics forward iteratives depend on the topological operation of the Axis-Chain and the iterative kinematics calculation based on the Axis-Invariants. The dynamics backward iteratives depend on the topological operation of the closed subtree and the calculation of the partial velocity of the iterative. These three problems have been systematically elaborated in Chapter 2 and Chapter 3. In the following, the correctness of the partial velocity expressed by Eqs. (4.32)-(4.34) is proved by the kinematic iterative process of Eqs. (4.8)-(4.20).

EXAMPLE 4.3: Following the example 4.1, complete the kinematics iterative calculation with Eqs. (4.8) to (4.20). The correctness of the partial velocity iterative process of Eqs. (4.32) to (4.34) is proved by the example.

SOLUTION: Obviously, the structural parameters are $${}^{i}n_1 = 1^{[z]},\ {}^{1}n_2 = 1^{[z]}, \tag{4.87}$$

$${}^{i}r_1 = 0_3,\ {}^{1}r_{1I} = l_{1I} \cdot 1^{[x]},\ {}^{1}r_2 = l_1 \cdot 1^{[x]},\ {}^{2}r_{2I} = l_{2I} \cdot 1^{[x]}. \tag{4.88}$$

The gravitational constant is $${}^{i}g_{1I} = {}^{i}g_{2I} = -g \cdot 1^{[y]} \tag{4.89}$$

[1] Translation and Rotation

[1-1] Rotation Transformation Matrix

From Eq. (4.8), then $$ {}^{i}Q_1 = \begin{bmatrix} C_1^i & -S_1^i & 0 \\ S_1^i & C_1^i & 0 \\ 0 & 0 & 1 \end{bmatrix}, {}^{1}Q_2 = \begin{bmatrix} C_2^1 & -S_2^1 & 0 \\ S_2^1 & C_2^1 & 0 \\ 0 & 0 & 1 \end{bmatrix}. \tag{4.90} $$

From Eqs. (4.8)-(4.90), then $$ {}^{i}Q_2 = \begin{bmatrix} C_1^i & -S_1^i & 0 \\ S_1^i & C_1^i & 0 \\ 0 & 0 & 1 \end{bmatrix} \cdot \begin{bmatrix} C_2^1 & -S_2^1 & 0 \\ S_2^1 & C_2^1 & 0 \\ 0 & 0 & 1 \end{bmatrix} = \begin{bmatrix} C_2^i & -S_2^i & 0 \\ S_2^i & C_2^i & 0 \\ 0 & 0 & 1 \end{bmatrix}. \tag{4.91} $$

Rotation vector $$ {}^{i}\phi_1 = 1^{[z]} \cdot \phi_1^{\,i}, {}^{1}\phi_2 = 1^{[z]} \cdot \phi_2^{\,1}. \tag{4.92} $$

From Eq. (4.15), then $$ {}^{i}\phi_2 = {}^{i}\phi_1 + {}^{i|1}\phi_2 = 1^{[z]} \cdot \phi_2^{\,i}. \tag{4.93} $$

Position vector: Obviously, then $$ {}^{i}r_1 = 0_3, {}^{1}r_{1I} = 1^{[x]} \cdot l_{1I}, {}^{1}r_2 = 1^{[x]} \cdot l_1, {}^{2}r_{2I} = 1^{[x]} \cdot l_{2I}. \tag{4.94} $$

From Eq. (4.16), then $$ {}^{i|2}r_{2I} = {}^{i}Q_2 \cdot {}^{2}r_{2I} = [\, l_{2I}C_2^i,\ \ l_{2I}S_2^i,\ \ 0\,]^T, \tag{4.95} $$

$$ {}^{i}r_{1I} = {}^{i|1}r_{1I} = {}^{i}Q_1 \cdot {}^{1}r_{1I} = [\, l_{1I}C_1^i \ \ l_{1I}S_1^i \ \ 0\,]^T, \tag{4.96} $$

$$ {}^{i|1}r_2 = {}^{i}Q_1 \cdot {}^{1}r_2 = [\, l_1C_1^i \ \ l_1S_1^i \ \ 0\,]^T, \tag{4.97} $$

$$ {}^{i|2}r_{2I} = {}^{i}Q_2 \cdot {}^{2}r_{2I} = [\, l_{2I}C_2^i \ \ l_{2I}S_2^i \ \ 0\,]^T $$

and $$ {}^{i}r_{2I} = {}^{i}r_1 + {}^{i|1}r_2 + {}^{i|2}r_{2I} = [l_1C_1^{\,i} + l_{2I}C_2^{\,i} l_1S_1^{\,i} + l_{2I}S_2^{\,i} 0]^T. \tag{4.98} $$

Rotation velocity vector: obviously, then $$ {}^{i}\dot{\phi}_1 = 1^{[z]} \cdot \dot{\phi}_1^{\,i}, {}^{1}\dot{\phi}_2 = 1^{[z]} \cdot \dot{\phi}_2^{\,1}. \tag{4.99} $$

From Eq. (4.17), then $$ {}^{i}\dot{\phi}_2 = 1^{[z]} \cdot \dot{\phi}_1^{\,i} + {}^{i}Q_1 \cdot 1^{[z]} \cdot \dot{\phi}_2^{\,1} = 1^{[z]} \cdot \dot{\phi}_2^{\,i}. \tag{4.100} $$

Translation velocity vector: obviously, then $$ {}^{i}\dot{r}_1 = {}^{1}\dot{r}_{1I} = {}^{2}\dot{r}_{2I} = 0_3. \tag{4.101} $$

From Eq. (4.18), then $$ {}^{i}\dot{r}_{1I} = {}^{i}\dot{\tilde{\phi}}_1 \cdot {}^{i}r_{1I} = \begin{bmatrix} 0 & -\dot{\phi}_1^i & 0 \\ \dot{\phi}_1^i & 0 & 0 \\ 0 & 0 & 0 \end{bmatrix} \cdot \begin{bmatrix} l_{1I} \cdot C_1^i \\ l_{1I} \cdot S_1^i \\ 0 \end{bmatrix} = \begin{bmatrix} -l_{1I}S_1^i\dot{\phi}_1^i \\ l_{1I}C_1^i\dot{\phi}_1^i \\ 0 \end{bmatrix}, \tag{4.102} $$

$$ {}^{i}\dot{r}_2 = {}^{i}\dot{\tilde{\phi}}_1 \cdot {}^{i|1}r_2 = \left[\, -l_1S_1^i\dot{\phi}_1^i,\ \ l_1C_1^i\dot{\phi}_1^i,\ \ 0\right]^T, \tag{4.103} $$

and $$ {}^{i}\dot{\tilde{\phi}}_2 \cdot {}^{i|2}r_{2I} = \begin{bmatrix} 0 & -\dot{\phi}_2^i & 0 \\ \dot{\phi}_2^i & 0 & 0 \\ 0 & 0 & 0 \end{bmatrix} \cdot \begin{bmatrix} l_{2I} \cdot C_2^i \\ l_{2I} \cdot S_2^i \\ 0 \end{bmatrix} = \begin{bmatrix} -l_{2I}S_2^i\dot{\phi}_2^i \\ l_{2I}C_2^i\dot{\phi}_2^i \\ 0 \end{bmatrix}. \tag{4.104} $$

From Eq. (4.18) and considering Eq. (4.104), then $$ {}^{i}\dot{r}_{2I} = {}^{i}\dot{\tilde{\phi}}_1 \cdot {}^{i|1}r_2 + {}^{i}\dot{\tilde{\phi}}_2 \cdot {}^{i|2}r_{2I} = \begin{bmatrix} -l_1S_1^i\dot{\phi}_1^i \\ l_1C_1^i\dot{\phi}_1^i \\ 0 \end{bmatrix} + \begin{bmatrix} -l_{2I}S_2^i\dot{\phi}_2^i \\ l_{2I}C_2^i\dot{\phi}_2^i \\ 0 \end{bmatrix}. \tag{4.105} $$

Rotation acceleration vector: From Eq. (4.19), then $$ {}^{i}\ddot{\phi}_2 = 1^{[z]} \cdot \ddot{\phi}_1^{\,i} + {}^{i}Q_1 \cdot 1^{[z]} \cdot \ddot{\phi}_2^{\,1} = 1^{[z]} \cdot \ddot{\phi}_1^{\,i} + 1^{[z]} \cdot \ddot{\phi}_2^{\,1}. \tag{4.106} $$

Translational acceleration vector: From Eq. (4.20), then $$ {}^{i}\ddot{r}_{1I} = \left({}^{i}\dot{\tilde{\phi}}_1^{2} \cdot {}^{i}\ddot{\tilde{\phi}}_1\right) \cdot \tag{4.107} $$

$$ {}^{i|1}r_{1I} = \begin{bmatrix} -\dot{\phi}_1^{i:2} & -\ddot{\phi}_1^i & 0 \\ \ddot{\phi}_1^i & -\dot{\phi}_1^{i:2} & 0 \\ 0 & 0 & 0 \end{bmatrix} \cdot \begin{bmatrix} l_{1I}C_1^i \\ l_{1I}S_1^i \\ 0 \end{bmatrix} = \begin{bmatrix} -l_{1I}C_1^i\dot{\phi}_1^{i:2} - l_{1I}S_1^i\ddot{\phi}_1^i \\ l_{1I}C_1^i\ddot{\phi}_1^i - l_{1I}S_1^i\dot{\phi}_1^{i:2} \\ 0 \end{bmatrix}. $$

From Eq. (4.107), then $$ {}^{i}\ddot{r}_2 = \left({}^{i}\dot{\tilde{\phi}}_1^{:2} + {}^{i}\ddot{\tilde{\phi}}_1\right) \cdot {}^{i|1}r_2 = \begin{bmatrix} -l_1 \cdot \left(C_1^i\dot{\phi}_1^{i:2} + S_1^i \cdot \ddot{\phi}_1^i\right. \\ l_1 \cdot \left(C_1^i\ddot{\phi}_1^i - S_1^i \cdot \dot{\phi}_1^{i:2}\right. \\ 0 \end{bmatrix}. \tag{4.108} $$

From Eq. (4.20), then $$ {}^{i|2}\ddot{r}_{2I} = \left({}^{i}\ddot{\tilde{\phi}}_2 + {}^{i}\dot{\tilde{\phi}}_2^{:2}\right) \cdot {}^{i|2}r_{2I} = \begin{bmatrix} -\dot{\phi}_2^{i:2} & -\ddot{\phi}_2^i & 0 \\ \ddot{\phi}_2^i & -\dot{\phi}_2^{i:2} & 0 \\ 0 & 0 & 0 \end{bmatrix} \cdot \begin{bmatrix} l_{2I}C_2^i \\ l_{2I}S_2^i \\ 0 \end{bmatrix}, \tag{4.109} $$

i.e.

$$ {}^{i|2}\ddot{r}_{2I} = \begin{bmatrix} -l_{2I}\left(C_2^i\dot{\phi}_2^{i:2} + S_2^i \cdot \ddot{\phi}_2^i\right. \\ l_{2I}\left(C_2^i\ddot{\phi}_2^i - S_2^i \cdot \dot{\phi}_2^{i:2}\right. \\ 0 \end{bmatrix}. $$

From Eq. (4.20), then $$ {}^{i|2}\ddot{r}_{2I} = \tag{4.110} $$

$$ {}^{i}\ddot{r}_2 + {}^{i|2}\ddot{r}_{2I} = \begin{bmatrix} -\dot{\phi}_1^{i:2} & -\ddot{\phi}_1^i & 0 \\ \ddot{\phi}_1^i & -\dot{\phi}_1^{i:2} & 0 \\ 0 & 0 & 0 \end{bmatrix} \cdot \begin{bmatrix} l_1C_1^i \\ l_1S_1^i \\ 0 \end{bmatrix} + \begin{bmatrix} -\dot{\phi}_2^{i:2} & -\ddot{\phi}_2^i & 0 \\ \ddot{\phi}_2^i & -\dot{\phi}_2^{i:2} & 0 \\ 0 & 0 & 0 \end{bmatrix} \cdot \begin{bmatrix} l_{2I}C_2^i \\ l_{2I}S_2^i \\ 0 \end{bmatrix} $$

i.e.

$$ {}^{i}\ddot{r}_{2I} = \begin{bmatrix} -l_{2I}\left(C_1^i\dot{\phi}_1^{i:2} + S_1^i\ddot{\phi}_1^i\right. \\ l_{2I}\left(C_1^i\ddot{\phi}_1^i - S_1^i\dot{\phi}_1^{i:2}\right. \\ 0 \end{bmatrix} + \begin{bmatrix} -l_{2I}\left(C_2^i\dot{\phi}_2^{i:2} + S_2^i\ddot{\phi}_2^i\right. \\ l_{2I}\left(C_2^i\ddot{\phi}_2^i - S_2^i\dot{\phi}_2^{i:2}\right. \\ 0 \end{bmatrix}. $$

[2] Partial Velocity Verification

From Eq. (4.99), then $$ \frac{\partial}{\partial \dot{\phi}_1^i}\left({}^{i}\dot{\phi}_1^T\right) = 1^{[3]}, \quad \frac{\partial}{\partial \dot{\phi}_2^1}\left({}^{i}\dot{\phi}_1^T\right) = 0_3^T. \tag{4.111} $$

-continued

So $${}^iJ_1 = \frac{\partial\,{}^i\dot\phi_1^T}{\partial\left[\dot\phi_1^i,\dot\phi_2^1\right]^T} = \begin{bmatrix}\partial\,{}^i\dot\phi_1/\partial\dot\phi_1^i\\ \partial\,{}^i\dot\phi_1/\partial\dot\phi_2^1\end{bmatrix} = \begin{bmatrix}0&0&1\\0&0&0\end{bmatrix}.$$

From Eq. (4.100), then $$\frac{\partial\,{}^i\dot\phi_2}{\partial\dot\phi_1^i} = \frac{\partial\dot\phi_1^i}{\partial\dot\phi_1^i} = 1^{[z]},\ \frac{\partial\,{}^i\dot\phi_2}{\partial\dot\phi_2^1} = {}^iQ_1\cdot\frac{\partial\,{}^1\dot\phi_2}{\partial\dot\phi_2^1} = {}^iQ_1\cdot 1^{[z]} = 1^{[z]}. \tag{4.112}$$

So $$\frac{\partial\,{}^i\dot\phi_2^T}{\partial\left[\dot\phi_1^i,\dot\phi_2^1\right]^T} = \begin{bmatrix}\frac{\partial}{\partial\dot\phi_1^i}\left({}^i\dot\phi_2^T\right)\\ \frac{\partial}{\partial\dot\phi_2^i}\left({}^i\dot\phi_2^T\right)\end{bmatrix} = \begin{bmatrix}0&0&1\\0&0&1\end{bmatrix}.$$

The correctness of Eq. (4.33) is verified by the special cases of Eqs. (4.111) and (4.112). From Eq. (4.96), then $$\frac{\partial\,{}^ir_{1I}}{\partial\phi_2^1} = 0_3,\ \frac{\partial\,{}^ir_{1I}}{\partial\phi_1^i} = \frac{\partial\,{}^iQ_1}{\partial\phi_1^i}\cdot{}^1r_{1I} = \begin{bmatrix}-S_1^i&-C_1^i&0\\C_1^i&-S_1^i&0\\0&0&1\end{bmatrix}\cdot\begin{bmatrix}l_{1I}\\0\\0\end{bmatrix} = \begin{bmatrix}-l_{1I}S_1^i\\l_{1I}C_1^i\\0\end{bmatrix}. \tag{4.113}$$

So $$\frac{\partial\,{}^ir_{1I}^T}{\partial\left[\phi_1^i,\phi_2^1\right]^T} = \begin{bmatrix}\partial\,{}^ir_{1I}^T/\partial\phi_1^i\\ \partial\,{}^ir_{1I}^T/\partial\phi_2^1\end{bmatrix} = \begin{bmatrix}-l_{1I}S_1^i&l_{1I}C_1^i&0\\0&0&0\end{bmatrix}.$$

From Eq. (4.98), then $$\frac{\partial\,{}^ir_{2I}}{\partial\phi_1^i} = \frac{\partial\,{}^iQ_1}{\partial\phi_1^i}\cdot\left({}^1r_2+{}^{1|2}r_{2I}\right) = \begin{bmatrix}-S_1^i&-C_1^i&0\\C_1^i&-S_1^i&0\\0&0&1\end{bmatrix}\cdot\left(\begin{bmatrix}l_1\\0\\0\end{bmatrix}+\begin{bmatrix}-l_{2I}C_2^1\\l_{2I}S_2^1\\0\end{bmatrix}\right) \tag{7.114}$$

$$= \begin{bmatrix}-S_1^i\cdot l_1-l_{2I}\cdot S_1^i\cdot C_2^1-l_{2I}\cdot C_1^i\cdot S_2^1\\C_1^i\cdot l_1+l_{2I}\cdot C_1^i\cdot C_2^1-l_{2I}\cdot S_1^i\cdot S_2^1\\0\end{bmatrix} = \begin{bmatrix}-S_1^il_1-l_{2I}S_2^i\\C_1^il_1+l_{2I}C_2^i\\0\end{bmatrix},$$

$$\frac{\partial\,{}^ir_{2I}}{\partial\phi_2^1} = {}^iQ_1\cdot\frac{\partial\,{}^iQ_2}{\partial\phi_2^1}\left({}^2r_{2I}\right) = \begin{bmatrix}C_1^i&-S_1^i&0\\S_1^i&C_1^i&0\\0&0&1\end{bmatrix}\cdot\begin{bmatrix}-S_2^1&-C_2^1&0\\C_2^1&-S_2^1&0\\0&0&1\end{bmatrix}\cdot\begin{bmatrix}l_{2I}\\0\\0\end{bmatrix}$$

$$= \begin{bmatrix}C_1^i&-S_1^i&0\\S_1^i&C_1^i&0\\0&0&1\end{bmatrix}\cdot\begin{bmatrix}-l_{2I}S_2^1\\l_{2I}C_2^1\\0\end{bmatrix} = \begin{bmatrix}-l_{2I}\cdot C_1^i\cdot S_2^1-l_{2I}\cdot S_1^i\cdot C_2^1\\-l_{2I}\cdot S_1^i\cdot S_2^1+l_{2I}\cdot C_1^i\cdot C_2^1\\0\end{bmatrix} = \begin{bmatrix}-l_{2I}S_2^i\\l_{2I}C_2^i\\0\end{bmatrix}.$$

So $$\frac{\partial\,{}^ir_{2I}^T}{\partial\left[\phi_1^i,\phi_2^1\right]^T} = \begin{bmatrix}\partial\left({}^ir_{2I}^T\right)/\partial\phi_1^i\\ \partial\left({}^ir_{2I}^T\right)/\partial\phi_2^1\end{bmatrix} = \begin{bmatrix}S_1^il_1-l_{2I}S_2^i&C_1^il_1+l_{2I}C_2^i&0\\-l_{2I}S_2^i&l_{2I}\cdot C_2^i&0\end{bmatrix}.$$

The correctness of Eq. (4.32) is verified by the special cases of Eqs. (4.113) and (4.114). From Eq. (4.102), then $$\frac{\partial\,{}^i\dot r_{1I}}{\partial\dot\phi_2^1} = \frac{\partial}{\partial\dot\phi_2^1}\left({}^i\dot\phi_1\cdot{}^ir_{1I}\right) = 0_3. \tag{4.115}$$

$$\frac{\partial\,{}^i\dot r_{1I}}{\partial\dot\phi_2^1} = \frac{\partial}{\partial\dot\phi_2^1}\left({}^i\dot\phi_1\right)\cdot{}^{i|1}r_{1I} = \tilde 1^{[z]}\cdot{}^{i|1}r_{1I} = \left[-l_{1I}S_1^i\ \ l_{1I}C_1^i\ \ 0\right]^T.$$

-continued

So $$\frac{\partial\,{}^i\dot r_{1I}^T}{\partial\left[\dot\phi_1^i,\dot\phi_2^1\right]^T} = \begin{bmatrix}-l_{1I}S_1^i&l_{1I}C_1^i&0\\0&0&0\end{bmatrix}.$$

From Eq. (4.105), then $$\frac{\partial\,{}^i\dot r_{1I}}{\partial\dot\phi_2^1} = \tag{4.116}$$

$$\tilde 1^{[z]}\cdot\begin{bmatrix}C_1^i&-S_1^i&0\\S_1^i&C_1^i&0\\0&0&1\end{bmatrix}\cdot{}^1r_{2I} = \tilde 1^{[z]}\cdot\begin{bmatrix}l_1C_1^i+l_{2I}C_2^i\\l_1S_1^i+l_{2I}S_2^i\\0\end{bmatrix} = \begin{bmatrix}-l_1S_1^i+l_{2I}S_2^i\\l_1C_1^i+l_{2I}C_2^i\\0\end{bmatrix},$$

$$\frac{\partial\,{}^i\dot r_{2I}}{\partial\dot\phi_2^1} = \begin{bmatrix}C_1^i&-S_1^i&0\\S_1^i&C_1^i&0\\0&0&1\end{bmatrix}\cdot$$

$$\tilde 1^{[z]}\cdot\begin{bmatrix}l_{2I}C_2^1\\l_{2I}S_2^1\\0\end{bmatrix} = \begin{bmatrix}C_1^i&-S_1^i&0\\S_1^i&C_1^i&0\\0&0&1\end{bmatrix}\cdot\begin{bmatrix}-l_{2I}S_2^1\\l_{2I}C_2^1\\0\end{bmatrix} = \begin{bmatrix}-l_{2I}S_2^i\\l_{2I}C_2^i\\0\end{bmatrix}.$$

So $$\frac{\partial\,{}^i\dot r_{1I}^T}{\partial\left[\dot\phi_1^i,\dot\phi_2^1\right]^T} = \begin{bmatrix}-l_1S_1^i-l_{2I}S_2^i&l_1C_1^i+l_{2I}C_2^i&0\\-l_{2I}S_2^i&l_{2I}\cdot C_2^i&0\end{bmatrix}.$$

The correctness of Eq. (4.32) is verified by the special cases of Eqs. (4.115) and (4.116).

For the Axis-Chain $Zl_k$, the complexity of the motion vector iterative calculation in Eqs. (4.12)-(4.20) is proportional to the number of axles. The above shows that the partial velocity is a very cumbersome process, but the complexity of the partial velocity iterative calculation in Eqs. (4.32)-(4.34) is the cardinal number of the Axis-Chain. When the partial velocity iterative in Eqs. (4.32)-(4.34) is applied to the Kane Eq. (4.83), the complexity of Kane dynamic modeling will be reduced to the linear complexity. In the following, the preparation theorem for Ju-Kane dynamics will be deducted, and based on this, and then other issues of MAS modeling and forward and inverse calculations will be solved.

Proof of the Preparation Theorem for Ju-Kane Dynamics

We deduce the preparation theorem for Ju-Kane dynamics based on the Lagrange equation (4.64). First, conduct the equivalence of the Lagrange equation and the Kane equation; then, calculate the partial velocities of the energy to the joint displacements and speeds, then derive the time, and finally give the preparation theorem for Ju-Kane dynamics.

[1] Equivalence Between the Lagrange Equation and Kane Equation $$\frac{d}{dt}\left(\frac{\partial}{\partial\dot q_u^{\bar u}}\left(\frac{1}{2}\cdot m_k\cdot{}^i\dot r_{kI}^T\cdot{}^i\dot r_{kI}\right)\right) = \frac{\partial_\upsilon\mathcal{E}_k^i}{\partial q_u^{\bar u}}+m_k\cdot\frac{\partial\,{}^i\dot r_{kI}^T}{\partial\dot q_u^{\bar u}}\cdot{}^i\ddot r_{kI} \tag{4.117}$$

$$\frac{d}{dt}\left(\frac{\partial}{\partial\dot q_u^{\bar u}}\left(\frac{1}{2}\cdot{}^i\dot\phi_1^T\cdot{}^{i|kI}J_{kI}\cdot{}^i\dot\phi_k\right)\right) = \frac{\partial_\omega\mathcal{E}_k^i}{\partial q_u^{\bar u}}+\frac{\partial\,{}^i\dot\phi_k^T}{\partial\dot q_u^{\bar u}}\cdot\frac{d}{dt}\left({}^{i|kI}J_{kI}\cdot{}^i\dot\phi_k\right).$$

PROOF: Considering the derivatives of the translational kinetic energy of the rigid-body k to the partial velocity of $\dot q_u^{\bar u}$ and the time, then $$\frac{d}{dt} = \left(\frac{\partial_\upsilon \mathcal{E}_k^i}{\partial \dot{q}_u^{\bar{u}}}\right) = \frac{d}{dt}\left(\frac{\partial}{\partial \dot{q}_u^{\bar{u}}}\left(\frac{1}{2}\cdot m_k \cdot {}^i\dot{r}_{kI}^T \cdot {}^i\dot{r}_{kI}\right)\right) =$$

$$\frac{d}{dt}\left(m_k\cdot\frac{\partial {}^i\dot r_{kI}^T}{\partial \dot q_u^{\bar u}}\cdot {}^i\dot r_{kI}\right) = m_k\cdot\frac{d}{dt}\left(\frac{\partial {}^i\dot r_{kI}^T}{\partial \dot q_u^{\bar u}}\right)\cdot {}^i\dot r_{kI} + m_k\cdot\frac{\partial {}^i\dot r_{kI}^T}{\partial \dot q_u^{\bar u}}\cdot{}^i\ddot r_{kI} =$$

$$m_k\cdot\frac{\partial {}^i\dot r_{kI}^T}{\partial q_u^{\bar u}}\cdot{}^i\dot r_{kI} + m_k\cdot\frac{\partial{}^i\dot r_{kI}^T}{\partial \dot q_u^{\bar u}}\cdot {}^i\ddot r_{kI} = \frac{\partial_\upsilon\mathcal E_k^i}{\partial q_u^{\bar u}} + m_k\cdot\frac{\partial {}^i\dot r_{kI}^T}{\partial\dot q_u^{\bar u}}\cdot{}^i\ddot r_{kI}.$$

Considering the derivatives of the rotational kinetic energy of the rigid-body k to the partial velocity of $\dot{q}_u^{\bar{u}}$ and the time, then $$\frac{d}{dt} = \left(\frac{\partial_\omega \mathcal{E}_k^i}{\partial \dot{q}_u^{\bar{u}}}\right) = \frac{d}{dt}\left(\frac{\partial}{\partial \dot{q}_u^{\bar{u}}}\left(\frac{1}{2}\cdot {}^i\dot\phi_k^T \cdot {}^{i|kI}J_{kI} \cdot {}^i\dot\phi_k\right)\right) = \frac{d}{dt}\left(\frac{\partial {}^i\dot\phi_k^T}{\partial \dot q_u^{\bar u}}\cdot {}^{i|kI}J_{kI}\cdot {}^i\dot\phi_k\right) =$$

$$\frac{d}{dt}\left(\frac{\partial {}^i\phi_k^T}{\partial q_u^{\bar u}}\right)\cdot {}^{i|kI}J_{kI}\cdot {}^i\dot\phi_k + \frac{\partial {}^i\dot\phi_k^T}{\partial \dot q_u^{\bar u}}\cdot\left({}^{i|kI}J_{kI}\cdot {}^i\ddot\phi_k + {}^i\dot{\tilde\phi}_k\cdot {}^{i|kI}J_{kI}\cdot {}^i\dot\phi_k\right) =$$

$$\frac{\partial_\omega \mathcal{E}_k^i}{\partial q_u^{\bar u}} + \frac{\partial {}^i\dot\phi_k^T}{\partial \dot q_u^{\bar u}}\cdot\left({}^{i|kI}J_{kI}\cdot {}^i\ddot\phi_k + {}^i\dot{\tilde\phi}_k\cdot {}^{i|kI}J_{kI}\cdot {}^i\dot\phi_k\right).$$

Q.E.D.

Since ${}_g\varepsilon_k^i$ and $\dot{q}_u^{\bar{u}}$ are irrelevant, From Eq. (4.117) and the Lagrange Eq. (4.64) of MAS, then $$\frac{d}{dt}\left(\frac{\partial}{\partial \dot q_u^{\bar u}}({}_\upsilon\mathcal{E}_k^i + {}_\omega\mathcal{E}_k^i + {}_g\mathcal{E}_k^i)\right) - \frac{\partial}{\partial q_u^{\bar u}}({}_\upsilon\mathcal{E}_k^i + {}_\omega\mathcal{E}_k^i + {}_g\mathcal{E}_k^i) =$$

$$\frac{d}{dt}\left(\frac{\partial}{\partial \dot q_u^{\bar u}}({}_\upsilon\mathcal{E}_k^i + {}_\omega\mathcal{E}_k^i)\right) - \frac{\partial}{\partial q_u^{\bar u}}({}_\upsilon\mathcal{E}_k^i + {}_\omega\mathcal{E}_k^i + {}_g\mathcal{E}_k^i) =$$

$$m_k\cdot\frac{\partial {}^i\dot r_{kI}^T}{\partial \dot q_u^{\bar u}}\cdot {}^i\ddot r_{kI} + \frac{\partial {}^i\dot\phi_k^T}{\partial \dot q_u^{\bar u}}\cdot\frac{d}{dt}({}^{i|kI}J_{kI}\cdot {}^i\dot\phi_k) - \frac{\partial_g \mathcal{E}_k^i}{\partial q_u^{\bar u}} =$$

$$m_k\cdot\frac{\partial {}^i\dot r_{kI}^T}{\partial \dot q_u^{\bar u}}\cdot {}^i\ddot r_{kI} + \frac{\partial {}^i\dot\phi_k^T}{\partial \dot q_u^{\bar u}}\cdot\left({}^i\dot{\tilde\phi}_k\cdot {}^{i|kI}J_{kI}\cdot {}^i\dot\phi_k + {}^{i|kI}J_{kI}\cdot {}^i\ddot\phi_k\right) - \frac{\partial_g \mathcal{E}_k^i}{\partial q_u^{\bar u}}.$$

The translational kinetic energy and the rotational kinetic energy of the dynamic system iL are expressed as:

$${}_\upsilon\mathcal{E}_{iL}^i = \sum_k^{iL}({}_\upsilon\mathcal{E}_k^i),\quad {}_\upsilon\mathcal{E}_{iL}^i = \sum_k^{iL}({}_\upsilon\mathcal{E}_k^i).$$

Considering Eqs. (4.62) and (4.63), i.e.

$$\frac{d}{dt}\left(\frac{\partial}{\partial \dot q_u^{\bar u}}(\mathcal{E}_{iL}^i)\right) - \frac{\partial}{\partial q_u^{\bar u}}(\mathcal{E}_{iL}^i) = \sum_k^{iL}\left(m_k\cdot\frac{\partial {}^i\dot r_{kI}^T}{\partial \dot q_u^{\bar u}}\cdot {}^i\ddot r_{kI}\right) + \tag{4.118}$$

$$\sum_k^{iL}\left(\frac{\partial {}^i\dot\phi_k^T}{\partial \dot q_u^{\bar u}}\cdot\left({}^{i|kI}J_{kI}\cdot {}^i\ddot\phi_k + {}^i\dot{\tilde\phi}_k\cdot {}^{i|kI}J_{kI}\cdot {}^i\dot\phi_k\right)\right) - \sum_k^{iL}\left(\frac{\partial_g\mathcal{E}_k^i}{\partial q_u^{\bar u}}\right).$$

Eq. (4.117) and (4.118) are the basis for proof of the preparation theorem for Ju-Kane dynamics, that is, the preparation theorem is essentially equivalent to the Lagrange method. Besides, the right side of Eq. (4.118) contains all the left terms of Eq. (4.83); this demonstrates that the Lagrange method is consistent with the calculation of the inertial force of the Kane method, that is, the Lagrange method is equivalent to the Kane method. Eq. (4.118) shows that there is $\partial({}_\upsilon\varepsilon_k^i + {}_w\varepsilon_k^i)/\partial q_u^{\bar u}$ repetitive calculation in the Lagrange Eq. (4.64).

[2] The Partial Velocity of the Energy to the Joint Speeds and Variables

[2-1] If ${}^{\bar u}k_u \in P$, and considering that $u \in uL \subset iL$ and $\dot r_u^{\bar u}$ are only relevant to the closed subtree uL, From Eqs. (4.62) and (4.63), then $$\frac{\partial_\upsilon \mathcal{E}_{iL}^i}{\partial \dot r_u^{\bar u}} = \frac{\partial}{\partial \dot r_u^{\bar u}}\left(\sum_k^{uL}\left(\frac{1}{2}\cdot m_k\cdot {}^i\dot r_{kI}^T\cdot {}^i\dot r_{kI}\right)\right) = \sum_k^{uL}\left(m_k\cdot\frac{\partial {}^i\dot r_{kI}^T}{\partial \dot r_u^{\bar u}}\cdot {}^i\dot r_{kI}\right), \tag{4.119}$$

$$\frac{\partial_\omega \mathcal{E}_{iL}^i}{\partial \dot r_u^{\bar u}} = \frac{\partial}{\partial \dot r_u^{\bar u}}\left(\sum_k^{uL}\left(\frac{1}{2}{}^i\dot\phi_k^T\cdot {}^{i|kI}J_{kI}\cdot {}^i\dot\phi_k\right)\right) = \sum_k^{uL}\left(\frac{\partial {}^i\dot\phi_k^T}{\partial \dot r_u^{\bar u}}{}^{i|kI}J_{kI}\cdot {}^i\dot\phi_k\right), \tag{4.120}$$

$$\frac{\partial_g \mathcal{E}_{iL}^i}{\partial r_u^{\bar u}} = \frac{\partial}{\partial r_u^{\bar u}}\left(\sum_k^{uL}(m_k\cdot {}^i r_{kI}^T\cdot {}^i g_{kI})\right) = \sum_k^{uL}\left(m_k\cdot\frac{\partial {}^i r_{kI}^T}{\partial r_u^{\bar u}}\cdot {}^i g_{kI}\right). \tag{4.121}$$

[2-2] If ${}^{\bar u}k_u \in R$, and considering that $u \in uL \subset iL$, $\phi_u^{\bar u}$ and $\dot\phi_u^{\bar u}$ are only relevant to the closed subtree uL, From Eqs. (4.62) and (4.63), then $$\frac{\partial_\upsilon \mathcal{E}_{iL}^i}{\partial \dot\phi_u^{\bar u}} = \frac{\partial}{\partial \dot\phi_u^{\bar u}}\left(\sum_k^{uL}\left(\frac{1}{2}\cdot m_k\cdot {}^i\dot r_{kI}^T\cdot {}^i\dot r_{kI}\right)\right) = \sum_k^{uL}\left(m_k\cdot\frac{\partial {}^i\dot r_{kI}^T}{\partial \dot\phi_u^{\bar u}}\cdot {}^i\dot r_{kI}\right), \tag{4.122}$$

$$\frac{\partial_\omega \mathcal{E}_{iL}^i}{\partial \dot\phi_u^{\bar u}} = \frac{\partial}{\partial \dot\phi_u^{\bar u}}\left(\sum_k^{uL}\left(\frac{1}{2}{}^i\dot\phi_k^T\cdot {}^{i|kI}J_{kI}\cdot {}^i\dot\phi_k\right)\right) = \sum_k^{uL}\left(\frac{\partial {}^i\dot\phi_k^T}{\partial \dot\phi_u^{\bar u}}{}^{i|kI}J_{kI}\cdot {}^i\dot\phi_k\right), \tag{4.123}$$

$$\frac{\partial_g \mathcal{E}_{iL}^i}{\partial \phi_u^{\bar u}} = \frac{\partial}{\partial \phi_u^{\bar u}}\left(\sum_k^{uL}(m_k\cdot {}^i r_{kI}^T\cdot {}^i g_{kI})\right) = \sum_k^{uL}\left(m_k\cdot\frac{\partial {}^i r_{kI}^T}{\partial \phi_u^{\bar u}}\cdot {}^i g_{kI}\right). \tag{4.124}$$

At this point, the calculation of the partial velocity of the energy to the joint speeds and the coordinates has completed.

[3] Find the Time Derivative

[3-1] If ${}^{\bar u}k_u \in P$, From Eq. (4.117), Eqs. (4.119) and (4.120), then $$\frac{{}^i d}{dt}\left(\frac{\partial_m \mathcal{E}_{iL}^i}{\partial \dot r_u^{\bar u}}\right) = \tag{4.125}$$

$$\frac{d}{dt}\left(\sum_k^{uL}\left(m_k\cdot\frac{\partial {}^i\dot r_{kI}^T}{\partial \dot r_u^{\bar u}}\cdot {}^i\dot r_{kI}\right) + \sum_k^{uL}\left(\frac{\partial {}^i\dot\phi_k^T}{\partial \dot r_u^{\bar u}}\cdot {}^{i|kI}J_{kI}\cdot {}^i\dot\phi_k\right)\right) =$$

$$\frac{\partial_m \mathcal{E}_{iL}^i}{\partial r_u^{\bar u}} + \sum_k^{uL}\left(m_k\cdot\frac{\partial {}^i\dot r_{kI}^T}{\partial \dot r_u^{\bar u}}\cdot {}^i\ddot r_{kI} + \right.$$

$$\left.\frac{\partial {}^i\dot\phi_k^T}{\partial \dot r_u^{\bar u}}\cdot\left({}^{i|kI}J_{kI}\cdot {}^i\ddot\phi_k + \backslash{}^i\dot{\tilde\phi}_k\cdot {}^{i|kI}J_{kI}\cdot {}^i\dot\phi_k\right)\right).$$

[3-2] If ${}^{\bar{u}}k_u \in R$, From Eqs. (4.117), (4.122) and (4.123), then $$\frac{d}{dt}\left(\frac{\partial_m \mathcal{E}_{iL}^i}{\partial \dot{r}_u^{\bar{u}}}\right) = \frac{d}{dt}\left(\sum_k^{uL}\left(m_k \cdot \frac{\partial\, {}^i\dot{r}_{kI}^T}{\partial \dot{\phi}_u^{\bar{u}}} \cdot {}^i\dot{r}_{kI}\right) + \sum_k^{uL}\left(\frac{\partial\, {}^i\dot{\phi}_k^T}{\partial \dot{\phi}_u^{\bar{u}}} \cdot {}^{i|kI}J_{kI} \cdot {}^i\dot{\phi}_k\right)\right) = \frac{\partial_m \mathcal{E}_{iL}^i}{\partial r_u^{\bar{u}}} + \sum_k^{uL}\left(m_k \cdot \frac{\partial\, {}^i\dot{r}_{kI}^T}{\partial \dot{\phi}_u^{\bar{u}}} \cdot {}^i\ddot{r}_{kI} + \frac{\partial\, {}^i\dot{\phi}_k^T}{\partial \dot{\phi}_u^{\bar{u}}} \cdot \left({}^{i|kI}J_{kI} \cdot {}^i\ddot{\phi}_k + {}^i\tilde{\dot{\phi}}_k \cdot {}^{i|kI}J_{kI} \cdot {}^i\dot{\phi}_k\right)\right). \tag{4.126}$$

At this point, the derivative of the time has been completed.

[4] Preparation Theorem for Ju-Kane Dynamics

Let Eqs. (4.121), (4.124), (4.125) and (4.126) be substituted into Eq. (4.118) to obtain theorem 4.1, as expressed below:

THEOREM 4.1. The rigid MAS iL={A,K,T,NT,F,B} is given, the root is used as the inertial space, ∀k, u∈A, NT=Ø; in addition to the gravity, the external resultant force acting on the axis u and the torque are denoted as ${}^{i|D}f_u$ and ${}^{i|D}\tau_u$; The mass and rotational inertia of Axis # k are denoted as $m_k$ and ${}^{kI}J_{kI}$ respectively; the gravity acceleration of Axis # k is ${}^{i}g_{kI}$; then the Ju-Kane dynamic equation of Axis # u is $$\begin{cases} \sum_k^{uL}\left(m_k \cdot \left(\frac{\partial\, {}^i\dot{r}_{kI}^T}{\partial \dot{r}_u^{\bar{u}}} \cdot {}^i\ddot{r}_{kI} - \frac{\partial\, {}^i r_{kI}^T}{\partial r_k^{\bar{k}}} \cdot {}^i g_{kI}\right)\right) = {}^{i|\bar{u}}n_u^T \cdot {}^{i|D}f_u, & \text{if } {}^{\bar{u}}k_u \in P \\ \sum_k^{uL}\left(m_k \cdot \left(\frac{\partial\, {}^i\dot{r}_{kI}^T}{\partial \dot{\phi}_u^{\bar{u}}} \cdot {}^i\ddot{r}_{kI} - \frac{\partial\, {}^i r_{kI}^T}{\partial \phi_k^{\bar{k}}} \cdot {}^i g_{kI}\right)\right) + \frac{\partial\, {}^i\dot{\phi}_k^T}{\partial \dot{\phi}_u^{\bar{u}}}, & \text{if } {}^{\bar{u}}k_u \in R \\ \quad \left({}^{i|kI}J_{kI} \cdot {}^i\ddot{\phi}_k + {}^i\tilde{\dot{\phi}} \cdot {}^{i|kI}J_{kI} \cdot {}^i\dot{\phi}_k\right)) = {}^{i|\bar{u}}n_u^T \cdot {}^{i|D}T_u, & \end{cases} \tag{4.127}$$

Although Eq. (4.127) is derived from the Lagrange Eq. (4.64) of MAS, Eq. (4.127) is similar to the Kane Eq. (4.83). Thus, theorem 4.1 is the preparation theorem for Ju-Kane dynamics. Although Eq. (4.127) is a different representation of the Kane equation for two basic joint pairs in the form, both are essentially different, because Eq. (4.127) has a Tree-Chain topology.

Application of Ju-Kane Preparation Theorem

EXAMPLE 4.4: Following the examples 4.1 and 4.3, ( ), establish the Mechanical dynamic model with the Ju-Kane preparation theorem.

SOLUTION: From Eq. (4.111), then $$\frac{\partial\, {}^i\dot{\phi}_1^T}{\partial \dot{\phi}_{(i,2]}} \cdot {}^{i|1}J_{1I} \cdot {}^i\ddot{\phi}_1 = \begin{bmatrix} 1^{[3]} \\ 0_3^T \end{bmatrix} \cdot \begin{bmatrix} * & * & * \\ * & * & * \\ * & * & J_{1I} \end{bmatrix} \cdot 1^{[z]} \cdot \ddot{\phi}_1^i = \begin{bmatrix} J_{1I} & 0 \\ 0 & 0 \end{bmatrix} \cdot \begin{bmatrix} \ddot{\phi}_1^i \\ \ddot{\phi}_2^1 \end{bmatrix}. \tag{4.128}$$

Eq. (4.128) represents the projections of the inertial force ${}^{i|1I}J_{1I} \cdot {}^i\ddot{\phi}_1$ of Axis #1 in the axial directions. From Eqs. (4.112) and (4.106), then $$\frac{\partial\, {}^i\dot{\phi}_2^T}{\partial \dot{\phi}_{(i,2]}} \cdot {}^{i|2}J_{2I} \cdot {}^i\ddot{\phi}_2 = \begin{bmatrix} 1^{[3]} \\ 1^{[3]} \end{bmatrix} \cdot \begin{bmatrix} * & * & * \\ * & * & * \\ * & * & J_{2I} \end{bmatrix} \cdot 1^{[z]} \cdot \ddot{\phi}_2^i = \begin{bmatrix} J_{2I} & J_{2I} \\ J_{2I} & J_{2I} \end{bmatrix} \cdot \begin{bmatrix} \ddot{\phi}_1^i \\ \ddot{\phi}_2^1 \end{bmatrix}. \tag{4.129}$$

From Eqs. (4.115) and (4.107), then $$\frac{\partial\, {}^i\dot{r}_{1I}^T}{\partial \dot{\phi}_{(i,2]}} \cdot {}^i\ddot{r}_{1I} = \begin{bmatrix} -l_{1I}S_1^i & l_{1I}C_1^i & 0 \\ 0 & 0 & 0 \end{bmatrix} \cdot \begin{bmatrix} -l_{1I}C_1^i\dot{\phi}_1^{i:2} - l_{1I}S_1^i\ddot{\phi}_1^i \\ l_{1I}C_1^i\ddot{\phi}_1^i - l_{1I}S_1^i\dot{\phi}_1^{i:2} \\ 0 \end{bmatrix} = \begin{bmatrix} l_{1I}^2S_1^iC_1^i\dot{\phi}_1^{i:2} + l_{1I}^2S_1^{i:2}\ddot{\phi}_1^i + l_{1I}^2C_1^{i:2}\ddot{\phi}_1^i - l_{1I}^2C_1^iS_1^i\dot{\phi}_1^{i:2} \\ 0 \end{bmatrix} = \begin{bmatrix} l_{1I}^2\ddot{\phi}_1^i \\ 0 \end{bmatrix} \tag{4.130}$$

So $$\frac{\partial\, {}^i\dot{r}_{1I}^T}{\partial \dot{\phi}_{(i,2]}} \cdot {}^i\ddot{r}_{1I} = \begin{bmatrix} l_{1I}^2\ddot{\phi}_1^i \\ 0 \end{bmatrix}.$$

From Eqs. (4.116) and (4.108), then $$\frac{\partial\, {}^i\dot{r}_{2I}^T}{\partial \dot{\phi}_{(i,2]}} \cdot {}^i\ddot{r}_2 = \begin{bmatrix} -l_1S_1^i - l_{2I}S_2^i & l_1C_1^i + l_{2I}C_2^i & 0 \\ -l_{2I}S_2^i & l_{2I}C_2^i & 0 \end{bmatrix}. \begin{bmatrix} -l_{1I}C_1^i\dot{\phi}_1^{i:2} - l_{1I}S_1^i\ddot{\phi}_1^i \\ l_{1I}C_1^i\ddot{\phi}_1^i - l_{1I}S_1^i\dot{\phi}_1^{i:2} \\ 0 \end{bmatrix} = \left[\begin{matrix} l_1l_{2I}(C_1^iS_2^i\dot{\phi}_1^{i:2} + S_1^iS_2^i\ddot{\phi}_1^i) + l_1^2(C_1^iS_1^i \cdot \dot{\phi}_1^{i:2} + S_1^{i:2}\ddot{\phi}_1^i) + l_1^2(C_1^{i:2}\ddot{\phi}_1^i - S_1^iC_1^i\dot{\phi}_1^{i:2}) + l_1l_{2I}(C_1^iC_2^i\ddot{\phi}_1^i - S_1^iC_2^i\dot{\phi}_1^{i:2}) \\ l_1l_{2I}C_1^iS_2^i\dot{\phi}_1^{i:2} + l_1l_{2I}S_1^iS_2^i\ddot{\phi}_1^i + l_1l_{2I}C_1^i \cdot C_2^i \cdot \ddot{\phi}_1^i - l_1l_{2I}S_1^iC_2^i\dot{\phi}_1^{i:2} \end{matrix}\right] = \begin{bmatrix} l_1^2\ddot{\phi}_1^i + l_1l_{2I}C_2^1\ddot{\phi}_1^i + l_1L_{2I}S_2^1\dot{\phi}_1^{i:2} \\ l_1l_{2I}C_2^1\ddot{\phi}_1^i + l_1L_{2I}S_2^1\dot{\phi}_1^{i:2} \end{bmatrix} \tag{4.131}$$

i.e.

$$\frac{\partial\, {}^i\dot{r}_{2I}^T}{\partial \dot{\phi}_{(i,2]}} \cdot {}^i\ddot{r}_2 = \begin{bmatrix} l_1^2\ddot{\phi}_1^i + l_1l_{2I}C_2^1\ddot{\phi}_1^i + l_1l_{2I}S_2^1\dot{\phi}_1^{i:2} \\ l_1l_{2I}C_2^1\ddot{\phi}_1^i + l_1l_{2I}S_2^1\dot{\phi}_1^{i:2} \end{bmatrix}.$$

From Eqs. (4.116) and (4.109), then $$\frac{\partial\, {}^i\dot{r}_{2I}^T}{\partial \dot{\phi}_{(i,2]}} \cdot {}^{i|2}\ddot{r}_{2I} = \tag{4.132}$$

-continued $$\begin{bmatrix} -l_1S_1^i - l_{2I}S_2^i & l_1C_1^i + l_{2I}C_2^i & 0 \\ -l_{2I}S_2^i & l_{2I}C_2^i & 0 \end{bmatrix} \cdot \begin{bmatrix} -l_{2I}C_2^i\dot{\phi}_2^{i:2} - l_{2I}S_2^i\ddot{\phi}_2^i \\ l_{2I}C_2^i\cdot\ddot{\phi}_2^i + l_{2I}S_2^i\dot{\phi}_2^{i:2} \\ 0 \end{bmatrix} =$$

$$\begin{bmatrix} l_1l_{2I}C_2^i\dot{\phi}_2^{i:2} + l_1l_{2I}S_1^iS_2^i\ddot{\phi}_2^i + l_{2I}^2S_2^iC_2^i\dot{\phi}_2^{i:2} + l_{2I}^2S_2^{i:2}\ddot{\phi}_2^i \\ + l_{2I}^2C_2^{i:2}\ddot{\phi}_2^i + l_{2I}^2C_2^iS_2^i\dot{\phi}_2^{i:2} + l_1l_{2I}C_1^iC_2^i + l_1l_{2I}C_1^iS_2^i\dot{\phi}_2^{i:2} \\ l_{2I}^2S_2^iC_2^i\dot{\phi}_2^{i:2} + l_{2I}^2S_2^{i:2}\ddot{\phi}_2^i + l_{2I}^2C_2^{i:2}\ddot{\phi}_2^i + l_{2I}^2C_2^iS_2^i\dot{\phi}_2^{i:2} \end{bmatrix}, =$$

$$\begin{bmatrix} l_{2I}^2\ddot{\phi}_2^i - l_1l_{2I}\left(S_2^1\dot{\phi}_2^{i:2} - C_2^1\ddot{\phi}_2\right) \\ l_{2I}^2\ddot{\phi}_2^i \end{bmatrix}$$

i.e.

$$\frac{\partial^i r_{2I}^T}{\partial\phi_{(i,2]}} \cdot {}^{i|2}\ddot{r}_{2I} = \begin{bmatrix} l_{2I}^2\ddot{\phi}_2^i - l_1l_{2I}\left(S_2^1\dot{\phi}_2^{i:2} - C_2^1\ddot{\phi}_2\right) \\ l_{2I}^2\ddot{\phi}_2^i \end{bmatrix}.$$

From Eqs. (4.131) and (4.132), then $$\frac{\partial^i r_{2I}^T}{\partial\dot{\phi}_{(i,2]}} \cdot {}^i\ddot{r}_{2I} = \begin{bmatrix} \left(l_1^2 + 2l_1l_{2I}C_2^1 + l_{2I}^2\right)\ddot{\phi}_1^i + \left(l_1l_{2I}C_2^1 + l_{2I}^2\right)\ddot{\phi}_2^1 \\ -2l_1l_{2I}S_2^1\dot{\phi}_1^i\dot{\phi}_2^1 - l_1l_{2I}S_2^1\dot{\phi}_2^{1:2} \\ \left(l_{2I}^2 + l_1l_{2I}C_2^1\right)\ddot{\phi}_1^i + l_{2I}^2\ddot{\phi}_2^1 + l_1l_{2I}S_2^1\dot{\phi}_1^{i:2} \end{bmatrix}, \quad (4.133)$$

Eq. (4.133) represents the projections of the body center acceleration ${}^i\ddot{r}_{2I}$ of Axis #2 in the $\phi_1^{\,i}$ and $\phi_2^{\,1}$ directions of the natural-coordinates. From Eq. (4.113), then $$\frac{\partial^i r_{1I}^T}{\partial\phi_{(i,2]}} \cdot {}^ig_{1I} = -m_1g\cdot\begin{bmatrix} -l_{1I}S_1^i & l_{1I}C_1^i & 0 \\ 0 & 0 & 0 \end{bmatrix}\cdot 1^{[y]} = \begin{bmatrix} -m_1gl_{1I}C_1^i \\ 0 \end{bmatrix}, \quad (4.134)$$

From Eq. (4.116), then $$\frac{\partial^i r_{2I}^T}{\partial\phi_{(i,2]}} \cdot {}^ig_{2I} = -m_2g\cdot\begin{bmatrix} -S_1^il_1 - l_{2I}S_2^i & C_1^il_1 + l_{2I}C_2^i & 0 \\ -l_{2I}S_2^i & l_{2I}C_2^i & 0 \end{bmatrix}\cdot 1^{[y]} = \begin{bmatrix} -l_1C_1^im_2g - l_{2I}C_2^im_2g \\ -l_{2I}C_2^im_2g \end{bmatrix}, \quad (4.135)$$

From Eqs. (4.134) and (4.135), then $$\frac{\partial^i r_{1I}^T}{\partial\phi_{(i,2]}} \cdot {}^ig_{1I} + \frac{\partial^i r_{2I}^T}{\partial\phi_{(i,2]}} \cdot {}^ig_{2I} = -\begin{bmatrix} l_{1I}C_1^im_1g + \left(l_1C_1^i + l_{2I}C_2^i\right)m_2g \\ l_{2I}C_2^im_2g \end{bmatrix}. \quad (4.136)$$

Eq. (4.136) represents the gravity ${}^ig_{2I}+{}^ig_{1I}$ projected on the direction of natural coordinates $\phi_1^{\,i}$ and $\phi_2^{\,1}$. Let Eq. (4.128), (4.129), (4.130), (4.132), (4.133) and (4.136) be substituted into Eq. (4.127), then $$\begin{bmatrix} m_1l_{1I}^2 + J_{1I} + J_{2I} + m_2\left(l_1^2 + 2l_1l_{2I}C_2^1 + l_{2I}^2\right) & m_2\left(l_{2I}^2 + l_1l_{2I}C_2^1\right) + J_{2I} \\ m_2\left(l_{2I}^2 + l_1l_{2I}C_2^1\right) + J_{2I} & m_2l_{2I}^2 + J_{2I} \end{bmatrix}\cdot\begin{bmatrix} \ddot{\phi}_1^i \\ \ddot{\phi}_2^1 \end{bmatrix} + \begin{bmatrix} -m_2l_1l_{2I}S_2^1\left(\dot{\phi}_2^{1:2} + 2\dot{\phi}_1^i\dot{\phi}_2^1\right) \\ m_2l_1l_{2I}S_2^1\dot{\phi}_1^{i:2} \end{bmatrix} + \begin{bmatrix} m_1gl_{1I}C_1^i + m_2g\left(l_1C_1^i + l_{2I}C_2^i\right) \\ m_2gl_{2I}C_2^i \end{bmatrix} = \begin{bmatrix} \tau_1^i \\ \tau_2^i \end{bmatrix}. \quad (4.137)$$

As we have compared Eq. (4.72) with Eq. (4.137), we know that they are exactly the same. This example proves the correctness of the Ju-Kane preparation theorem indirectly. Solution is finished.

EXAMPLE 4.5: Following example 4.2, establish the dynamic equation of the system with the Ju-Kane preparation theorem.

SOLUTION: Considering Axis #1:

$${}^i\dot{r}_{1I} = 1^{[x]}\cdot\dot{r}_1^i,\quad {}^i\ddot{r}_{1I} = 1^{[x]}\cdot\ddot{r}_1^i.$$

$$\frac{\partial^i\dot{r}_{1I}^T}{\partial\dot{r}_1^i} = 1^{[1]},\quad \frac{\partial^i r_{1I}^T}{\partial r_1^i} = 1^{[1]},$$

$$m_1\cdot\frac{\partial^i r_{1I}^T}{\partial r_1^i}\cdot{}^i\ddot{r}_{1I} = m_1\cdot 1^{[1]}\cdot 1^{[x]}\cdot\ddot{r}_1^i = m_1\ddot{r}_1^i,$$

$$m_1\cdot\frac{\partial^i r_{1I}^T}{\partial r_1^i}\cdot{}^ig_{1I} = -m_1g\cdot 1^{[1]}\cdot 1^{[y]} = 0.$$

Considering Axis #2:

$$\dot{\phi}_2^i = \dot{\phi}_1^i + \dot{\phi}_2^1 = \dot{\phi}_2^1,\ \ddot{\phi}_2^i = \ddot{\phi}_1^i + \ddot{\phi}_2^1 = \ddot{\phi}_2^1,$$

$${}^ir_{2I} = {}^ir_1 + {}^{i|1}r_2 + {}^{i|2}r_{2I} = \left[\,r_1^i + l_2S_2^1 \quad -l_2C_2^1 \quad 0\,\right]^T,$$

$${}^i\dot{r}_{2I} = \begin{matrix} {}^i\dot{r}_1 + {}^i\dot{\tilde{\phi}}_1\cdot{}^{i|1}r_2 \\ + {}^i\dot{\tilde{\phi}}_2\cdot{}^{i|2}r_{2I} \end{matrix} = 1^{[x]}\cdot\dot{r}_1^i + \begin{bmatrix} 0 & -\dot{\phi}_2^i & 0 \\ \dot{\phi}_2^i & 0 & 0 \\ 0 & 0 & 0 \end{bmatrix}\cdot\begin{bmatrix} l_2S_2^1 \\ -l_2C_2^1 \\ 0 \end{bmatrix} = \begin{bmatrix} \dot{r}_1^i + l_2C_2^1\dot{\phi}_2^1 \\ l_2S_2^1\dot{\phi}_2^1 \\ 0 \end{bmatrix},$$

$${}^i\ddot{r}_{2I} = {}^i\ddot{r}_1 + \left({}^i\ddot{\tilde{\phi}}_2 + {}^i\dot{\tilde{\phi}}_2^{:2}\right)\cdot{}^{i|2}r_{2I} =$$

$$1^{[x]}\cdot\ddot{r}_1^i + \begin{bmatrix} -\dot{\phi}_2^{i:2} & -\ddot{\phi}_2^i & 0 \\ \ddot{\phi}_2^i & -\dot{\phi}_2^{i:2} & 0 \\ 0 & 0 & 0 \end{bmatrix}\cdot\begin{bmatrix} l_2S_2^1 \\ -l_2C_2^1 \\ 0 \end{bmatrix} = \begin{bmatrix} \ddot{r}_1^i + l_2C_2^1\ddot{\phi}_2^1 - l_2S_2^1\dot{\phi}_2^{1:2} \\ l_2S_2^1\ddot{\phi}_2^1 + l_2C_2^1\dot{\phi}_2^{1:2} \\ 0 \end{bmatrix},$$

$$\frac{\partial^i\dot{r}_{2I}^T}{\partial\dot{r}_1^i} = 1^{[1]},\quad \frac{\partial^i\dot{r}_{2I}}{\partial\dot{\phi}_2^1} = \left[\,l_2C_2^1 \quad l_2S_2^1 \quad 0\,\right],$$

$$\frac{\partial^i r_{2I}^T}{\partial r_1^i} = 1^{[1]},\quad \frac{\partial^i r_{2I}^T}{\partial\phi_2^1} = \left[\,l_2C_2^1 \quad l_2S_2^1\ 0\,\right].$$

So $$m_2\cdot\frac{\partial^i r_{2I}^T}{\partial r_1^i}\cdot{}^i\ddot{r}_{2I} = m_2\cdot 1^{[1]}\cdot\begin{bmatrix} \ddot{r}_1^i + l_2C_2^1\ddot{\phi}_2^1 - l_2S_2^1\dot{\phi}_2^{1:2} \\ l_2S_2^1\ddot{\phi}_2^1 + l_2C_2^1\dot{\phi}_2^{1:2} \\ 0 \end{bmatrix} = \begin{matrix} m_2\ddot{r}_1^i \\ + m_2l_2C_2^1\ddot{\phi}_2^1, \\ - m_2l_2S_2^1\dot{\phi}_2^{1:2} \end{matrix}$$

$$m_2\cdot\frac{\partial^i r_{2I}^T}{\partial\phi_2^1}\cdot{}^i\ddot{r}_{2I} = m_2\cdot\begin{bmatrix} l_2C_2^1 \\ l_2S_2^1 \\ 0 \end{bmatrix}^T\cdot\begin{bmatrix} \ddot{r}_1^i + l_2C_2^1\ddot{\phi}_2^1 - l_2S_2^1\dot{\phi}_2^{1:2} \\ l_2S_2^1\ddot{\phi}_2^1 + l_2C_2^1\dot{\phi}_2^{1:2} \\ 0 \end{bmatrix} = \begin{matrix} m_2l_2C_2^1\ddot{r}_1^i \\ + m_2l_2^2\ddot{\phi}_2^1, \end{matrix}$$

$$m_2\cdot\frac{\partial^i r_{2I}^T}{\partial r_1^i}\cdot{}^ig_{2I} = -m_2g\cdot 1^{[1]}\cdot 1^{[y]} = 0,$$

$$m_2\cdot\frac{\partial^i r_{2I}^T}{\partial\phi_2^1}\cdot{}^ig_{2I} = -m_2g\cdot\left[\,l_2C_2^1 \quad l_2S_2^1 \quad 0\,\right]\cdot 1^{[y]} = -m_2gl_2S_2^1.$$

Let the above results be substituted into the Ju-Kane preparation Eq. (4.127) to obtain $$\begin{bmatrix} m_1+m_2 & m_2l_2C_2^1 \\ m_2l_2C_2^1 & m_2l_2^2 \end{bmatrix} \cdot \begin{bmatrix} \ddot{r}_1^i \\ \ddot{\phi}_2^1 \end{bmatrix} = \begin{bmatrix} m_2l_2S_2^1\dot{\phi}_1^{i:2} - kr_1^i \\ -m_2gl_2S_2^1 \end{bmatrix}$$

Obviously, the above equation is consistent with Eq. (4.85). Solution is finished.

Ju-Kane Dynamics Theorem of the Tree-Chain Dynamics

In the following, for the Ju-Kane preparation theorem, we solve the calculation problem of ${}^{iL}f_k$ and ${}^{iL}\tau_k$ on the right side of Eq. (4.127) and let the partial velocities of Eqs. (4.32)-(4.34) be substituted into Eq. (4.127) in order to establish the Ju-Kane dynamic equation of the Tree-Chain rigid-body system.

External Force Backward Iterative

If the bilateral external force ${}^{iS}f_{lS}$ from the force application point Tree-Chain rigid-body system in the environment to Axis # l and the external torque ${}^{i}\tau_l$ are given, their instantaneous power $p_{ex}$ is expressed as:

$$p_{ex} = \sum_l^{iL}\left({}^{iS}\dot{r}_{lS}^T \cdot {}^{iS}f_{lS} + {}^{i}\dot{\phi}_l^T \cdot {}^{i}\tau_l\right), \tag{4.138}$$

where ${}^{1S}f_{lS}$ and ${}^{i}\tau_l$ are not subject to the control of $\dot{\phi}_l^{\bar{l}}$ and $\dot{r}_l$ $\bar{l}$, i.e. ${}^{1S}f_{lS}$ and ${}^{i}\tau_l$ are independent of $\dot{\phi}_l^{\bar{l}}$ and $\dot{r}_l^{\bar{l}}$.

[1] If $k\in {}^{i}1_l$, then $\delta'^{L}_k=1$; From Eqs. (4.32) and (4.33), then $$\frac{\partial p_{ex}}{\partial \dot{\phi}_k^{\bar{k}}} = \frac{\partial}{\partial \dot{\phi}_k^{\bar{k}}}\left(\sum_l^{iL}\left(\begin{matrix} {}^{iS}\dot{r}_{lS}^T \cdot {}^{iS}f_{lS} + \\ \backslash {}^{i}\dot{\phi}_l^T \cdot {}^{i}\tau_l \end{matrix}\right)\right) = \tag{4.139}$$

$$\sum_l^{iL}\left(\begin{matrix} \frac{\partial}{\partial \dot{\phi}_k^{\bar{k}}}\left({}^{iS}\dot{r}_{lS}^T\right)\cdot {}^{iS}f_{lS} \\ \backslash + \frac{\partial}{\partial \dot{\phi}_k^{\bar{k}}}\left({}^{i}\dot{\phi}_l^T\right)\cdot {}^{i}\tau_l \end{matrix}\right) = \sum_l^{kL}\left({}^{i|\bar{k}}n_k^T \cdot {}^{i|\bar{k}}\tilde{r}_{lS} \cdot {}^{iS}f_{lS} + {}^{i|\bar{k}}n_k^T \cdot {}^{i}\tau_l\right);$$

i.e.

$$\frac{\partial}{\partial \dot{\phi}_k^{\bar{k}}}(p_{ex}) = {}^{i|\bar{k}}n_k^T \cdot \sum_l^{kL}\left({}^{i|\bar{k}}\tilde{r}_{lS} \cdot {}^{iS}f_{lS} + {}^{i}\tau_l\right).$$

${}^{i|k}\tilde{r}_{lS} \cdot {}^{iS}f_{lS}$ in Eq. (4.139) is different from ${}^{i}\tilde{\omega}_{\bar{l}} \cdot {}^{i|\bar{l}}r_l$ in Eq. (4.20) in the chain-ordering; the former is the action force, and the latter is the motion quantity, which are dual and have the backward CO.

[2] If $k\in {}^{i}1_l$, then $\delta'^{l_l}_k=1$; From Eqs. (4.38) and (4.138), then $$\frac{\partial}{\partial \dot{r}_k^{\bar{k}}}(p_{ex}) = \frac{\partial}{\partial \dot{r}_k^{\bar{k}}}\left(\sum_l^{iL}\left({}^{iS}\dot{r}_{lS}^T \cdot {}^{iS}f_{lS} + {}^{i}\dot{\phi}_l^T \cdot {}^{i}\tau_l\right)\right) = \tag{4.140}$$

$$\sum_l^{iL}\left(\frac{\partial}{\partial \dot{r}_k^{\bar{k}}}\left({}^{iS}\dot{r}_{lS}^T\right)\cdot {}^{iS}f_{lS} + \frac{\partial}{\partial \dot{r}_k^{\bar{k}}}\left({}^{i}\dot{\phi}_l^T\right)\cdot {}^{i}\tau_l\right) = \sum_l^{kL}\left(\delta_k^{i1_l} \cdot {}^{i|\bar{k}}n_k^T \cdot {}^{iS}f_{lS}\right);$$

i.e.

$$\frac{\partial}{\partial \dot{r}_k^{\bar{k}}}(p_{ex}) = {}^{i|\bar{k}}n_k^T \cdot \sum_l^{kL}\left({}^{iS}f_{lS}\right).$$

Eqs. (4.139) and (4.140) show that the external resultant forces acting on Axis # k by the environment is equivalent to the external resultant force of the closed subtree kL acting on the axis or the torque. Let Eqs. (4.139) and (4.140) be combined into:

$$\begin{cases} \frac{\partial}{\partial \dot{r}_k^{\bar{k}}}(p_{ex}) = {}^{i|\bar{k}}n_k^T \cdot \sum_l^{kL}\left({}^{iS}f_{lS}\right) & \text{if } {}^{\bar{k}}k_k \in P \\ \frac{\partial}{\partial \dot{\phi}_k^{\bar{k}}}(p_{ex}) = {}^{i|\bar{k}}n_k^T \cdot \sum_l^{kL}\left({}^{i|\bar{k}}\tilde{r}_{lS} \cdot {}^{iS}f_{lS} + {}^{i}\tau_l\right) & \text{if } {}^{\bar{k}}k_k \in R \end{cases}. \tag{4.141}$$

At this point, we solve the calculation problem of the external force backward iterative. In Eq. (4.141), the generalized force of the closed subtree to Axis # k is additive; the force action has double effects and is inversely iterative. The so-called backward iterative refers to that ${}^{k}r_{lS}$ needs to be iterated as left term; the chain-ordering of ${}^{i|k}\tilde{r}_{lS} \cdot {}^{iS}f_{lS}$ is opposite to that of ${}^{i}\tilde{\omega}_{\bar{l}} \cdot {}^{i|\bar{l}}r_l$.

Coaxial Driving Force Backward Iterative

If Axis # l is a Driving-Axis, the driving force of Axis # l and the driving torque are respectively ${}^{\bar{l}S}f_{lS}{}^{c}$ and ${}^{\bar{l}}\tau_l{}^{c}$; then the power $p_{ac}$ generated by the driving forces and torques are expressed as $$P_{ac} = \sum_l^{iL}\left(\begin{matrix} {}^{i|\bar{l}S}\dot{r}_{lS}^T \cdot & {}^{i|\bar{l}s}f_{lS}^c(\dot{r}_l^{\bar{l}}) + \\ \backslash {}^{i|\bar{l}}\dot{\phi}_l^T \cdot & {}^{i|\bar{l}}\tau_l^c(\dot{\phi}_l^{\bar{l}}) \end{matrix}\right) = \sum_l^{iL}\left(\begin{matrix} \left({}^{i}\dot{r}_{lS}^T - {}^{i}\dot{r}_{\bar{l}S}^T\right)\cdot {}^{i|\bar{l}S}f_{lS}^c(\dot{r}_l^{\bar{l}}) + \\ \backslash\left({}^{i}\dot{\phi}_l^T - {}^{i}\dot{\phi}_{\bar{l}}^T\right)\cdot {}^{i|\bar{l}}\tau_l^c(\dot{\phi}_l^{\bar{l}}) \end{matrix}\right). \tag{4.142}$$

[1] From Eq. (4.32), (4.33) and (4.142), then $$\frac{\partial p_{ac}}{\partial \dot{\phi}_k^{\bar{k}}} = \frac{\partial}{\partial \dot{\phi}_k^{\bar{k}}}\left(\sum_l^{iL}\left(\left({}^{i}\dot{r}_{lS}^T - {}^{i}\dot{r}_{\bar{l}S}^T\right)\cdot {}^{i|\bar{l}S}f_{lS}^c + \left({}^{i}\dot{\phi}_l^T - {}^{i}\dot{\phi}_{\bar{l}}^T\right)\cdot {}^{i|\bar{l}}\tau_l^c\right)\right) = \tag{4.143}$$

$$\sum_l^{kL}\left(\frac{\partial}{\partial \dot{\phi}_k^{\bar{k}}}\left({}^{i}\dot{r}_{lS}^T - {}^{i}\dot{r}_{\bar{l}S}^T\right)\cdot {}^{i|\bar{l}S}f_{lS}^c + \frac{\partial}{\partial \dot{\phi}_k^{\bar{k}}}\left({}^{i}\dot{\phi}_l^T - {}^{i}\dot{\phi}_{\bar{l}}^T\right)\cdot {}^{i|\bar{l}}\tau_l^c\right)\backslash +$$

$$\sum_l^{kL}\left(\left({}^{i}\dot{r}_{lS}^T - {}^{i}\dot{r}_{\bar{l}S}^T\right)\cdot \frac{\partial}{\partial \dot{\phi}_k^{\bar{k}}}\left({}^{i|\bar{l}S}f_{lS}^c\right) + \left({}^{i}\dot{\phi}_l^T - {}^{i}\dot{\phi}_{\bar{l}}^T\right)\cdot \frac{\partial}{\partial \dot{\phi}_k^{\bar{k}}}\left({}^{i|\bar{l}}\tau_l^c\right)\right) =$$

$$\sum_l^{kL}\left(\begin{matrix} {}^{i|\bar{k}}n_k^T \cdot \left(\delta_k^{i1_l} \cdot {}^{i|k}\tilde{r}_{lS} - \delta_k^{i1_{\bar{l}}} \cdot {}^{i|\bar{k}}\tilde{r}_{\bar{l}S}\right) \\ \backslash \cdot {}^{i|\bar{l}S}f_{lS}^c + {}^{i|\bar{k}}n_k^T \cdot \left(\delta_k^{i1_l} - \delta_k^{i1_{\bar{l}}}\right)\cdot {}^{i|\bar{l}}\tau_l^c \end{matrix}\right) + \sum_l^{kL}\left(\begin{matrix} {}^{i|\bar{l}S}\dot{r}_{lS}^T \cdot \frac{\partial^{i|\bar{l}S}f_{lS}^c}{\partial \dot{\phi}_k^{\bar{k}}} + \\ \backslash {}^{i|\bar{l}}\dot{\phi}_l^T \cdot \frac{\partial^{i|\bar{l}}\tau_l^c}{\partial \dot{\phi}_k^{\bar{k}}} \end{matrix}\right),$$

i.e.

$$\frac{\partial p_{ac}}{\partial \dot{\phi}_k^{\bar{k}}} =$$

$${}^{i|\bar{k}}n_k^T \cdot \sum_l^{kL}\left(\begin{matrix} \left(\delta_k^{i1_l} \cdot {}^{i|\bar{k}}\tilde{r}_{lS} - \delta_k^{i1_{\bar{l}}} \cdot {}^{i|\bar{k}}\tilde{r}_{\bar{l}S}\right)\cdot {}^{i|\bar{l}S}f_{lS}^c \\ \backslash + \left(\delta_k^{i1_l} - \delta_k^{i1_{\bar{l}}}\right)\cdot {}^{i|\bar{l}}\tau_l^c \end{matrix}\right)\backslash + \sum_l^{kL}\left({}^{i|\bar{l}S}\dot{r}_{lS}^T \cdot \frac{\partial}{\partial \dot{\phi}_k^{\bar{k}}}\left({}^{i|\bar{l}S}f_{lS}^c\right) + \right.$$

$$\left. {}^{i|\bar{l}}\dot{\phi}_l^T \cdot \frac{\partial}{\partial \dot{\phi}_k^{\bar{k}}}\left({}^{i|\bar{l}}\tau_l^c\right)\right)$$

If Axes # u and $\bar{u}$ are coaxial, then ${}^{k}\tilde{r}_{uS}={}^{k}\tilde{r}_{\bar{u}S}$; denote $\tau_u^{\,c}={}^{i|\bar{u}}n_u^{\,T}\cdot{}^{i|\bar{u}}\tau_u^{\,c}$, $\partial\tau_u^{\,c}/\partial\dot{\phi}_u^{\,\bar{u}}=\mathrm{Grad}(\tau_u^{\,c})\triangleq G(\tau_u^{\,c})$, $f_u^{\,c}={}^{i|\bar{u}}n_u^{\,T}\cdot{}^{i|\bar{u}S}f_{uS}^{\,c}$. Since ${}^{i|\bar{u}S}f_{uS}^{\,c}$ and $\dot{\phi}_u^{\,\bar{u}}$ are irrelevant, From Eq. (4.143) then $$\begin{cases} \dfrac{\partial}{\partial\dot{\phi}_u^{\bar{u}}}(p_{ac})=0, & \text{if } k\neq u \\ \dfrac{\partial}{\partial\dot{\phi}_u^{\bar{u}}}(p_{ac})={}^{i|\bar{u}}n_u^T\cdot{}^{i|\bar{u}}\tilde{r}_{uS}\cdot{}^{i|\bar{u}S}f_{uS}^c+\tau_u^c+\dot{\phi}_u^{\bar{u}}\cdot G(\tau_u^c), & \text{if } k=u \end{cases}.$$

Since ${}^{i|\bar{u}}r_{uS}$ and ${}^{i|\bar{u}S}f_{uS}^{\,c}$ are coaxial, then $$\begin{cases} \partial p_{ac}\Big/\partial\dot{\phi}_u^{\bar{u}}=0, & \text{if } k\neq u \\ \partial p_{ac}\Big/\partial\dot{\phi}_u^{\bar{u}}=\tau_u^c+\dot{\phi}_u^{\bar{u}}\cdot G(\tau_u^c), & \text{if } k=u \end{cases}. \tag{4.144}$$

[2] From Eqs. (4.33), (4.32) and (4.142), then $$\begin{aligned} \frac{\partial p_{ac}}{\partial \dot{r}_k^{\bar{k}}} &= \frac{\partial}{\partial \dot{r}_k^{\bar{k}}}\left(\sum_l^{iL}\left(\left({}^i\dot{r}_{lS}^T-{}^i\dot{r}_{\bar{l}S}^T\right)\cdot{}^{i|\bar{l}S}f_{lS}^c+\left({}^i\dot{\phi}_l^T-{}^i\dot{\phi}_{\bar{l}}^T\right)\cdot{}^{i|\bar{l}}\tau_l^c\right)\right)= \\ &\sum_l^{iL}\left(\frac{\partial}{\partial \dot{r}_k^{\bar{k}}}\left({}^i\dot{r}_{lS}^T-{}^i\dot{r}_{\bar{l}S}^T\right)\cdot{}^{i|\bar{l}S}f_{lS}^c+\frac{\partial}{\partial \dot{r}_k^{\bar{k}}}\left({}^i\dot{\phi}_l^T-{}^i\dot{\phi}_{\bar{l}}^T\right)\cdot{}^{i|\bar{l}}\tau_l^c\right)\backslash+ \\ &\sum_l^{iL}\left({}^{i|\bar{l}S}\dot{r}_{lS}^T\cdot\frac{\partial}{\partial \dot{r}_k^{\bar{k}}}\left({}^{i|\bar{l}S}f_{lS}^c\right)+{}^{i|\bar{l}}\dot{\phi}_l^T\cdot\frac{\partial}{\partial \dot{r}_k^{\bar{k}}}\left({}^{i|\bar{l}}\tau_l^c\right)\right)= \\ &\sum_l^{kL}\left({}^{i|\bar{k}}n_k^T\cdot\left(\delta_k^{{}^{i}1_l}-\delta_k^{{}^{i}1_{\bar{l}}}\right)\cdot{}^{i|\bar{l}S}f_{lS}^c\right)+\dot{r}_k^{\bar{k}}\cdot{}^{i|\bar{k}}n_k^T\cdot\frac{\partial}{\partial \dot{r}_k^{\bar{k}}}\left({}^{i|\bar{k}S}f_{kS}^c\right) \end{aligned} \tag{4.145}$$

i.e.

$$\frac{\partial p_{ac}}{\partial \dot{r}_k^{\bar{k}}}={}^{i|\bar{k}}n_k^T\cdot\sum_l^{kL}\left(\left(\delta_k^{{}^{i}1_l}-\delta_k^{{}^{i}1_{\bar{l}}}\right)\cdot{}^{i|\bar{l}S}f_{lS}^c\right)+\dot{r}_k^{\bar{k}}\cdot{}^{i|\bar{k}}n_k^T\cdot\frac{\partial\,{}^{i|\bar{k}S}f_{kS}^c}{\partial \dot{r}_k^{\bar{k}}}.$$

If Axes # u and $\bar{u}$ are coaxial, then ${}^{k}\tilde{r}_{uS}={}^{k}\tilde{r}_{\bar{u}S}$. Denote $$f_u^c(\dot{r}_u^{\bar{u}})={}^{i|\bar{u}}n_u^T\cdot{}^{i|\bar{u}S}f_{uS}^c(\dot{r}_u^{\bar{u}}),\ \partial f_u^c\Big/\partial\dot{r}_u^{\bar{u}}=G(f_u^c).$$

From Eq. (4.145), then $$\begin{cases} \dfrac{\partial p_{ac}}{\partial \dot{r}_u^{\bar{u}}}=0, & \text{if } k\neq u \\ \dfrac{\partial p_{ac}}{\partial \dot{r}_u^{\bar{u}}}=f_u^c+\dot{r}_u^{\bar{u}}\cdot G(f_u^c), & \text{if } k=u \end{cases}. \tag{4.146}$$

At this point, the coaxial driving force backward iterative is completed.

Ju-Kane Dynamics Theorem of the Tree-Chain Rigid Body System

In the following, we first elaborate the Ju-Kane dynamic theorem of the Tree-Chain rigid-body system, referred to as the Ju-Kane theorem, and then prove it.

THEOREM 4.2. The rigid MAS iL={A,K,T,NT,F,B} is given, the root is used as the inertial space, ∀k, u∈A, NT=Ø; in addition to the gravity, the external resultant force acting on the axis u and the torque are denoted as $f_u^{\,D}$ and $\tau_u^{\,D}$; The mass and rotational inertia of Axis # k are denoted as $m_k$ and ${}^{kI}J_{kI}$ respectively; the gravity acceleration of Axis # k is ${}^{i}g_{kI}$; the bilateral driving force on the Driving-Axis # u and the component on the driving torque on ${}^{\bar{u}}n_n$ are denoted as $f_u^{\,c}(\dot{r}_l^{\bar{l}})$ and $\tau_u^{\,c}(\dot{\phi}_l^{\bar{l}})$ respectively; the force of the environment i acting on Axis # l and the torque are denoted as ${}^{iS}f_{lS}$ and ${}^{i}\tau_l$ respectively; then the Ju-Kane dynamic equations of Axis # u are $$\begin{cases} {}^{i|\bar{u}}n_u^T\cdot\left(M_P^{[u][*]}\cdot\ddot{q}+h_P^{[u]}\right)=f_u^{iL}, & \text{if } {}^{\bar{u}}k_u\in P \\ {}^{i|\bar{u}}n_u^T\cdot\left(M_R^{[u][*]}\cdot\ddot{q}+h_R^{[u]}\right)=\tau_u^{iL}, & \text{if } {}^{\bar{u}}k_u\in R \end{cases}, \tag{4.147}$$

where $M_p^{\,[u][v]}$ and $M_R^{\,[u][v]}$ are 3×3 block matrixes, and $h_p^{\,[u]}$ and $h_R^{\,[u]}$ are 3D vectors. And $$\ddot{q}\triangleq\left\{{}^{i|\bar{l}}\ddot{q}_l={}^{i|\bar{l}}n_l\cdot\ddot{q}_l^{\bar{l}}\begin{bmatrix}\ddot{q}_l^{\bar{l}}=\ddot{r}_l^{\bar{l}}, & \text{if } {}^{\bar{l}}k_l\in P; \\ \ddot{q}_l^{\bar{l}}=\ddot{\phi}_l^{\bar{l}}, & \text{if } {}^{\bar{l}}k_l\in R;\end{bmatrix} l\in A\right\}, \tag{4.148}$$

$$M_P^{[u][*]}\cdot\ddot{q}\triangleq\sum_k^{uL}\left(m_k\sum_l^{{}^{i}1_{kI}}\left({}^{i}\ddot{\tilde{\phi}}_{\bar{l}}\cdot{}^{i|\bar{l}}r_l+{}^{i|\bar{l}}\ddot{r}_l\right)\right), \tag{4.149}$$

$$M_P^{[u][*]}\cdot\ddot{q}\triangleq\sum_k^{uL}\left({}^{i|kI}J_{kI}\cdot{}^{i}\ddot{\phi}_k+m_k\cdot{}^{i|u}\tilde{r}_{kI}\cdot\sum_l^{{}^{i}1_{kI}}\left({}^{i}\ddot{\tilde{\phi}}_{\bar{l}}\cdot{}^{i|\bar{l}}r_l+{}^{i|\bar{l}}\ddot{r}_l\right)\right), \tag{4.150}$$

$$h_P^{[u]}\triangleq\sum_k^{uL}\left(m_k\cdot\sum_l^{{}^{i}1_{kI}}\left({}^{i}\dot{\tilde{\phi}}_{\bar{l}}^{:2}\cdot{}^{i|\bar{l}}r_l+2\cdot{}^{i}\dot{\tilde{\phi}}_{\bar{l}}\cdot{}^{i|\bar{l}}\dot{r}_l\right)\right)-\sum_k^{uL}\left(m_k\cdot{}^{i}g_{kI}\right), \tag{4.151}$$

$$h_R^{[u]}\triangleq\sum_k^{uL}\left(m_k\cdot{}^{i|u}\tilde{r}_{kI}\cdot\sum_l^{{}^{i}1_{kI}}\begin{pmatrix}{}^{i}\dot{\tilde{\phi}}_{\bar{l}}^{:2}+{}^{i|\bar{l}}r_l+ \\ \backslash 2\cdot{}^{i}\dot{\tilde{\phi}}_{\bar{l}}\cdot{}^{i|\bar{l}}\dot{r}_l\end{pmatrix}+\begin{matrix}{}^{i}\dot{\tilde{\phi}}_k\cdot{}^{i|kI}J_{kI}\cdot{}^{i}\dot{\phi}_k \\ /-m_k\cdot{}^{i|u}\tilde{r}_{kI}\cdot{}^{i}g_{kI}\end{matrix}\right), \tag{4.152}$$

$$\begin{cases} f_u^{iL}=f_u^c+\dot{r}_u^{\bar{u}}\cdot G(f_u^c)+{}^{i|\bar{u}}n_u^T\cdot\sum_l^{uL}\left({}^{iS}f_{lS}\right), & \text{if } {}^{\bar{u}}k_u\in P \\ \tau_u^{iL}=\tau_u^c+\dot{\phi}_u^{\bar{u}}\cdot G(\tau_u^c)+{}^{i|\bar{u}}n_u^T\cdot\sum_l^{uL}\begin{pmatrix}{}^{i|u}\tilde{r}_{l_S}\cdot{}^{iS}f_{lS} \\ \backslash+{}^{i}\tau_l\end{pmatrix}, & \text{if } {}^{\bar{u}}k_u\in R \end{cases}. \tag{4.153}$$

PROOF: Let $\varepsilon_{cx}^{\,i}=\int_{t_0}^{t_f}(p_{cx}+p_{ac})dt$, so $$\begin{cases} \dfrac{d}{dt}\left(\dfrac{\partial\mathcal{E}_{ex}^i}{\partial\dot{r}_u^{\bar{u}}}\right)=\dfrac{\partial(p_{ex}+p_{ac})}{\partial\dot{r}_u^{\bar{u}}}\triangleq f_u^{iL}={}^{i|\bar{u}}n_u^T\cdot{}^{i|iL}f_u & \text{if } {}^{\bar{u}}k_u\in P \\ \dfrac{d}{dt}\left(\dfrac{\partial\mathcal{E}_{ex}^i}{\partial\dot{\phi}_u^{\bar{u}}}\right)=\dfrac{\partial(p_{cx}+p_{ac})}{\partial\dot{\phi}_u^{\bar{u}}}\triangleq\tau_u^{iL}={}^{i|\bar{u}}n_u^T\cdot{}^{i|iL}\tau_u & \text{if } {}^{\bar{u}}k_u\in R \end{cases} \tag{4.154}$$

From Eqs. (4.139), (4.140), (4.144), (4.146) and (4.158) to obtain Eq. (4.153). Let Eqs. (4.33), (4.32) and (4.34) be substituted into the Ju-Kane dynamic preparation Eqs. (4.127) to obtain $$\begin{cases} {}^{i|\bar{u}}n_u^T \cdot \sum_l^{uL}\left(m_k \cdot {}^i\ddot{r}_{kI} - m_k \cdot {}^i g_{kI}\right) = {}^{i|\bar{u}}n_u^T \cdot {}^{i|D}f_u, & \text{if } {}^{\bar{u}}k_u \in P \\ {}^{i|\bar{u}}n_u^T \cdot \sum_l^{uL}\left(\begin{pmatrix} {}^{i|kI}J_{kI} \cdot {}^i\ddot{\phi}_k + \\ \backslash m_k \cdot {}^{i|u}\tilde{r}_{kI} \cdot {}^i\ddot{r}_{kI} \end{pmatrix} + \sum_k^{uL}\left({}^i\dot{\tilde{\phi}}_k \cdot {}^{i|kI}J_{kI} \cdot {}^i\dot{\phi}_k\right)\right) & \\ \backslash - {}^{i|\bar{u}}n_u^T \cdot \sum_l^{uL}\left(m_k \cdot {}^{i|u}\tilde{r}_{kI} \cdot {}^i g_{kI}\right) = {}^{i|\bar{u}}n_u^T \cdot {}^{i|D}\tau_u, & \text{if } {}^{\bar{u}}k_u \in R \end{cases} \quad (4.155)$$

From Eq. (4.20), then $${}^i\ddot{r}_{kI} = \sum_l^{{}^i1_{kI}}\left({}^i\ddot{\tilde{\phi}}_{\bar{l}} \cdot {}^{i|\bar{l}}r_l + {}^{i|\bar{l}}\ddot{r}_l\right) + \sum_l^{{}^i1_{kI}}\left({}^i\dot{\tilde{\phi}}_{\bar{l}}^{:2} \cdot {}^{i|\bar{l}}r_l + 2 \cdot {}^i\dot{\tilde{\phi}}_{\bar{l}} \cdot {}^{i|\bar{l}}\dot{r}_l\right) \quad (4.156)$$

considering Eq. (4.156), then $$\sum_k^{uL}\left(m_k \cdot {}^i\ddot{r}_{kI}\right) - \sum_k^{uL}\left(m_k \cdot {}^i g_{kI}\right) = \sum_k^{uL}\left(m_k \cdot \sum_l^{{}^i1_{kI}}\left({}^i\ddot{\tilde{\phi}}_{\bar{l}} \cdot {}^{i|\bar{l}}r_l + {}^{i|\bar{l}}\ddot{r}_l\right)\right) \backslash + \sum_k^{uL}\left(m_k \cdot \sum_l^{{}^i1_{kI}}\left({}^i\dot{\tilde{\phi}}_{\bar{l}}^{:2} \cdot {}^{i|\bar{l}}r_l + 2 \cdot {}^i\dot{\tilde{\phi}}_{\bar{l}} \cdot {}^{i|\bar{l}}\dot{r}_l\right) - m_k \cdot {}^i g_{kI}\right); \quad (4.157)$$

Similarly, considering Eq. (4.156), then $$\sum_k^{uL}\begin{pmatrix} {}^{i|kI}J_{kI} \cdot {}^i\ddot{\phi}_k + m_k \\ \backslash \cdot {}^{i|u}\tilde{r}_{kI} \cdot {}^i\ddot{r}_{kI} \end{pmatrix} + \sum_k^{uL}\begin{pmatrix} {}^i\dot{\tilde{\phi}}_k \cdot {}^{i|kI}J_{kI} \cdot {}^i\dot{\phi}_k - \\ \backslash m_k \cdot {}^{i|u}\tilde{r}_{kI} \cdot {}^i g_{kI} \end{pmatrix} = \backslash\sum_k^{uL}\begin{pmatrix} {}^{i|kI}J_{kI} \cdot {}^i\ddot{\phi}_k + {}^i\dot{\tilde{\phi}}_k \cdot {}^{i|kI}J_{kI} \cdot {}^i\dot{\phi}_k + \\ \backslash m_k \cdot {}^{i|u}\tilde{r}_{kI} \cdot \sum_l^{{}^i1_{kI}}\left({}^i\ddot{\tilde{\phi}}_{\bar{l}} + {}^{i|\bar{l}}r_l + {}^{i|\bar{l}}\ddot{r}_l\right) \end{pmatrix} + \sum_k^{uL}\left(m_k \cdot {}^{i|u}\tilde{r}_{kI} \cdot \sum_l^{{}^i1_{kI}}\left({}^i\dot{\tilde{\phi}}_{\bar{l}}^{:2} \cdot {}^{i|\bar{l}}r_l + 2 \cdot {}^i\dot{\tilde{\phi}}_{\bar{l}} \cdot {}^{i|\bar{l}}\dot{r}_l\right) - m_k \cdot {}^{i|u}\tilde{r}_{kI} \cdot {}^i g_{kI}\right). \quad (4.158)$$

Let Eq. (4.155)-(4.158) be substituted into Eq. (4.154) to obtain Eq. (4.154)-(4.152). Q.E.D.

For the pure rotational axis system, From Eq. (4.152), then $$\sum_k^{uL}\left[{}^i\dot{\phi}_k^T \cdot \left({}^i\dot{\tilde{\phi}}_k \cdot {}^{i|kI}J_{kI} \cdot {}^i\dot{\phi}_k\right)\right] \equiv 0. \quad (4.159)$$

From Eq. (4.159) we know that, for a pure rotational axis system, the gyro torque relative to the inertial center doesn't consume any energy.

Application of Ju-Kane Dynamics Modeling of Tree Chain Rigid Body System

Figure 47:
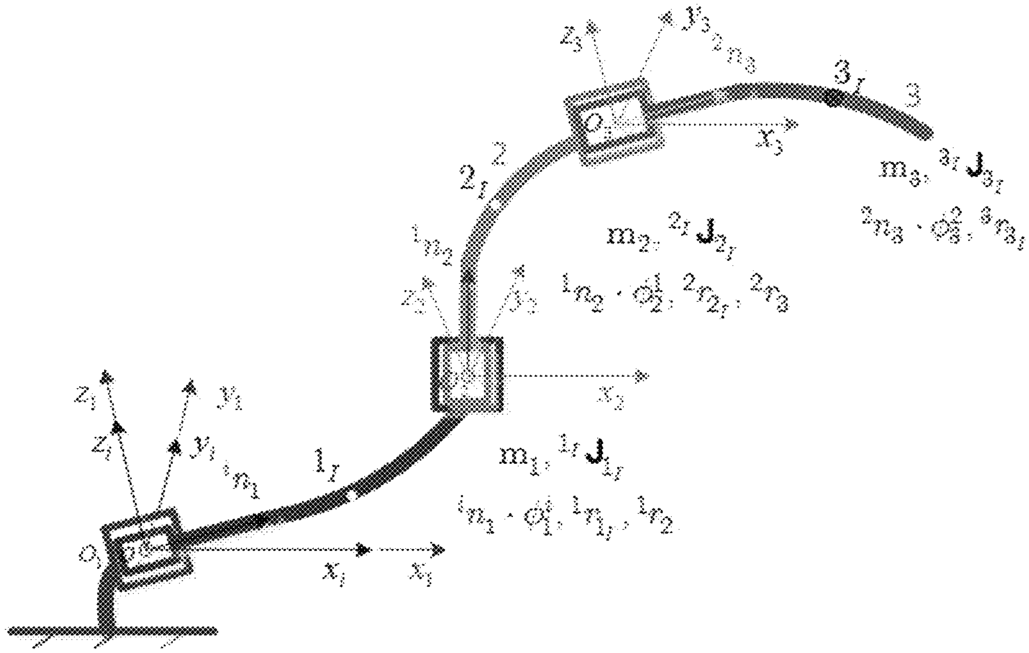
FIG. 47 is a schematic of a generic 3R robotic arm.

EXAMPLE 4.6 Given the 3R Robo-Arm as shown in FIG. 47, A=(i, 1:3]; Applying the tree chain Ju-Kane dynamic theorem to establish its dynamic equation and obtain the generalized inertia matrix.

SOLUTION: STEP 1. Establish the iterative kinematics equation based on Axis-Invariant.

From Eq. (4.8), then $${}^{\bar{l}}Q_l = 1 + S(\phi_l^{\bar{l}}) \cdot {}^{\bar{l}}\tilde{n}_l + (1 - C(\phi_l^{\bar{l}})) \cdot {}^{\bar{l}}\tilde{n}_l^{:2}, l \in [1:3]. \quad (4.160)$$

From Eqs. (4.12) and (4.160), then $${}^iQ_l = \prod_k^{{}^i1_l}\left({}^{\bar{k}}Q_k\right) \cdot {}^{\bar{l}}Q_l, \ l \in [2, 3]. \quad (4.161)$$

From Eqs. (4.16), (4.160) and (4.161), then $${}^ir_l = \sum_k^{{}^i1_l}\left({}^{i|\bar{k}}r_k\right), \ l \in [2, 3] \quad (4.162)$$

$${}^ir_{lI} = {}^ir_l + {}^{i|l}r_{lI}, \ l \in [2, 3].$$

From Eqs. (4.17) and (4.161), then $${}^i\dot{\phi}_l = \sum_k^{{}^i1_l}\left({}^{i|\bar{k}}\dot{\phi}_k\right), \ l \in [2, 3]. \quad (4.163)$$

From Eqs. (4.18), (4.161) and (4.163), then $${}^i\dot{r}_l = \sum_k^{{}^i1_l}\left({}^i\dot{\tilde{\phi}}_{\bar{k}} \cdot {}^{i|\bar{k}}r_k + {}^{i|\bar{k}}\dot{r}_k\right), \ l \in [2, 3] \quad (4.164)$$

$${}^i\dot{r}_{lI} = {}^i\dot{r}_l + {}^{i|l}\dot{r}_{lI} \quad l \in [1:3].$$

From Eqs. (4.19) and (4.161), then $${}^i\ddot{\phi}_l = \sum_k^{{}^i1_l}\left({}^{i|\bar{k}}\ddot{\phi}_k\right), \ l \in [2, 3]. \quad (4.165)$$

From Eqs. (4.25) and (4.161), then $${}^{i|lI}J_{lI} = {}^iQ_l \cdot {}^{lI}J_{lI} \cdot {}^lQ_i, l \in [1:3]. \quad (4.166)$$

STEP 2. Establish the dynamic equation. First establish the dynamic equation of Axis #1. From Eq. (4.150), then $$
\begin{aligned}
{}^{i}n_1^T \cdot M_R^{[1][*]} \cdot \ddot{q} = {}^{i}n_1^T \cdot & \begin{pmatrix} {}^{i|1I}J_{1I} - m_1 \cdot {}^{i|2I}J_{2I} - \\ m_2 \cdot {}^{i|1}\tilde{r}_{2I}^{:2} + {}^{i|3I}J_{3I} - m_3 \cdot {}^{i|1}\tilde{r}_{3I}^{:2} \end{pmatrix} \\
\cdot {}^{i}n_1 \cdot \ddot{\phi}_1^i + {}^{i}n_1^T \cdot & \begin{pmatrix} {}^{i|2I}J_{2I} - m_2 \cdot {}^{i|1}\tilde{r}_{2I} \cdot {}^{i|2}\tilde{r}_{2I} \\ + {}^{i|3I}J_{3I} - m_3 \cdot {}^{i|1}\tilde{r}_{3I} \cdot {}^{i|2}\tilde{r}_{3I} \end{pmatrix} \cdot {}^{i|1}n_2 \cdot \ddot{\phi}_2^1 \cdot \\
+ {}^{i}n_1^T \cdot & \left({}^{i|3I}J_{3I} - m_3 \cdot {}^{i|3}\tilde{r}_{3I}\right) \cdot {}^{i|2}n_3 \cdot \ddot{\phi}_3^{:2}
\end{aligned}
\tag{4.167}
$$

From Eq. (4.152), then $$
\begin{aligned}
{}^{i}n_1^T \cdot h_R^{[1]} = & {}^{i}n_1^T \cdot m_1 \cdot {}^{i|1}\tilde{r}_{1I} \cdot {}^{i}\dot{\tilde{\phi}}_1^{:2} \cdot {}^{i|1}\tilde{r}_{1I} \\
& + {}^{i}n_1^T \cdot m_2 \cdot {}^{i|1}\tilde{r}_{2I} \cdot \left({}^{i}\dot{\tilde{\phi}}_1^{:2} \cdot {}^{i|1}r_2 + {}^{i}\dot{\tilde{\phi}}_2^{:2} \cdot {}^{i|2}r_{2I}\right) \\
& + {}^{i}n_1^T \cdot m_3 \cdot {}^{i|1}\tilde{r}_{3I} \cdot \left({}^{i}\dot{\tilde{\phi}}_1^{:2} \cdot {}^{i|1}r_2 + {}^{i}\dot{\tilde{\phi}}_2^{:2} \cdot {}^{i|2}r_3 + {}^{i}\dot{\tilde{\phi}}_3^{:2} \cdot {}^{i|3}r_{3I}\right) \\
& + {}^{i}n_1^T \cdot \left({}^{i}\dot{\tilde{\phi}}_I \cdot {}^{i|1I}J_{1I} \cdot {}^{i}\dot{\phi}_1 + {}^{i}\dot{\tilde{\phi}}_2 \cdot {}^{i|2I}J_{2I} \cdot {}^{i}\dot{\phi}_2 + {}^{i}\dot{\tilde{\phi}}_3 \cdot {}^{i|3I}J_{3I} \cdot {}^{i}\dot{\phi}_3\right) \\
& + {}^{i}n_1^T \cdot \left(m_1 \cdot {}^{i|1}\tilde{r}_{1I} \cdot {}^{i}g_1 + m_2 \cdot {}^{i|1}\tilde{r}_{2I} \cdot {}^{i}g_2 + m_3 \cdot {}^{i|1}\tilde{r}_{3I} \cdot {}^{i}g_3\right)
\end{aligned}
\tag{4.168}
$$

From Eqs. (4.167) and (4.168) to obtain the dynamic equation of Axis #1, $$
{}^{i}n_1^T \cdot M_R^{[1][*]} \cdot \ddot{q} + {}^{i}n_1^T \cdot h_R^{[1]} = {}^{1|i}n_1^T \cdot {}^{i|iL}\tau_1. \tag{4.169}
$$

Establish the dynamic equation of Axis #2. From Eq. (4.150), then $$
\begin{aligned}
{}^{i|1}n_2^T \cdot M_R^{[2][*]} \cdot \ddot{q} = {}^{i|1}n_2^T \cdot & \begin{pmatrix} {}^{i|2I}J_{2I} - m_2 \cdot {}^{i|2}\tilde{r}_{2I} \cdot {}^{i|1}\tilde{r}_{2I} \\ + {}^{i|3I}J_{3I} - m_3 \cdot {}^{i|2}\tilde{r}_{3I} \cdot {}^{i|1}\tilde{r}_{3I} \end{pmatrix} \cdot {}^{i}n_1 \cdot \ddot{\phi}_1^i \\
+ {}^{i|1}n_2^T \cdot & \left({}^{i|2I}J_{2I} - m_2 \cdot {}^{i|2}\tilde{r}_{2I}^2 + {}^{i|3I}J_{3I} - m_3 \cdot {}^{i|2}\tilde{r}_{3I}^2\right) \cdot {}^{i|1}n_2 \cdot \ddot{\phi}_2^1 \\
+ {}^{i|1}n_2^T \cdot & \left({}^{i|3I}J_{3I} - m_3 \cdot {}^{i|2}\tilde{r}_{3I} \cdot {}^{i|3}\tilde{r}_{3I}\right) \cdot {}^{i|2}n_3 \cdot \ddot{\phi}_3^2
\end{aligned}
\tag{4.170}
$$

From Eq. (4.152), then $$
\begin{aligned}
{}^{i|1}n_2^T \cdot h_R^{[2]} = & {}^{i|1}n_2^T \cdot m_2 \cdot {}^{i|2}\tilde{r}_{2I} \cdot \left({}^{i}\dot{\tilde{\phi}}_1^{:2} \cdot {}^{i|1}r_2 + {}^{i}\dot{\tilde{\phi}}_2^{:2} \cdot {}^{i|2}r_{2I}\right) \\
& + {}^{i|1}n_2^T \cdot m_3 \cdot {}^{i|2}\tilde{r}_{3I} \cdot \left({}^{i}\dot{\tilde{\phi}}_1^{:2} \cdot {}^{i|1}r_2 + {}^{i}\dot{\tilde{\phi}}_2^{:2} \cdot {}^{i|2}r_3 + {}^{i}\dot{\tilde{\phi}}_3^{:2} \cdot {}^{i|3}r_{3I}\right). \\
& + {}^{i|1}n_2^T \cdot \left({}^{i}\dot{\tilde{\phi}}_2 \cdot {}^{i|2I}J_{2I} + {}^{i}\dot{\phi}_2 + {}^{i}\dot{\tilde{\phi}}_3 \cdot {}^{i|3I}J_{3I} \cdot {}^{i}\dot{\phi}_3\right) \\
& + {}^{i|1}n_2^T \cdot \left(m_2 \cdot {}^{i|2}\tilde{r}_{2I} \cdot {}^{i}g_2 + m_2 \cdot {}^{i|2}\tilde{r}_{3I} \cdot {}^{i}g_3\right)
\end{aligned}
\tag{4.171}
$$

From Eqs. (4.170) and (4.171) to obtain the dynamic equation of Axis #2, $$
{}^{2|1}n_2^T \cdot M_R^{[2][*]} \cdot \ddot{q} + {}^{2|1}n_2^T \cdot h_R^{[2]} = {}^{2|1}n_2^T \cdot {}^{i|iL}\tau_2. \tag{4.172}
$$

Finally, establish the dynamic equation of Axis #3. From Eq. (4.150), then $$
\begin{aligned}
{}^{i|2}n_3^T \cdot M_R^{[3][*]} \cdot \ddot{q} = & {}^{i|2}n_3^T \cdot \left({}^{i|3I}J_{3I} - m_3 \cdot {}^{i|3}\tilde{r}_{3I} \cdot {}^{i|1}\tilde{r}_{3I}\right) \cdot {}^{i}n_1 \cdot \ddot{\phi}_1^i \\
& + {}^{i|2}n_3^T \cdot \left({}^{i|3I}J_{3I} - m_3 \cdot {}^{i|3}\tilde{r}_{3I} \cdot {}^{i|2}\tilde{r}_{3I}\right) \cdot {}^{i|1}n_2 \cdot \ddot{\phi}_2^1 \\
& + {}^{i|2}n_3^T \cdot \left({}^{i|3I}J_{3I} - m_3 \cdot {}^{i|3}\tilde{r}_{3I}^{:2}\right) \cdot {}^{i|2}n_3 \cdot \ddot{\phi}_3^2
\end{aligned}
\tag{4.173}
$$

From Eq. (4.152), then $$
\begin{aligned}
{}^{i|2}n_3^T \cdot h_R^{[3]} = & {}^{i|2}n_3^T \cdot m_3 \cdot {}^{i|3}\tilde{r}_{3I} \cdot \begin{pmatrix} {}^{i}\dot{\tilde{\phi}}_1^{:2} \cdot {}^{i|1}r_2 + {}^{i}\dot{\tilde{\phi}}_2^{:2} \cdot {}^{i|2}r_3 \\ + {}^{i}\dot{\tilde{\phi}}_3^{:2} \cdot {}^{i|3}r_{3I} \end{pmatrix}. \\
& + {}^{i|2}n_3^T \cdot {}^{i}\dot{\tilde{\phi}}_3 \cdot {}^{i|3I}J_{3I} \cdot {}^{i}\dot{\phi}_3 + {}^{i|2}n_3^T \cdot m_3 \cdot {}^{i|3}\tilde{r}_{3I} \cdot {}^{i}g_3
\end{aligned}
\tag{4.174}
$$

From Eqs. (4.173) and (4.174) to obtain the dynamic equation of Axis #3, $$
{}^{3|2}n_3^T \cdot M_R^{[3][*]} \cdot \ddot{q} + {}^{3|2}n_3^T \cdot h_R^{[3]} = {}^{3|2}n_3^T \cdot {}^{i|iL}\tau_3. \tag{4.175}
$$

From Eqs. (4.167), (4.169) and (4.173) to obtain the generalized inertia:

$$
\begin{aligned}
M_{[1][1]} &= {}^{i}n_1^T \cdot \begin{pmatrix} {}^{i|1I}J_{1I} - m_1 \cdot {}^{i|1}\tilde{r}_{1I}^{:2} + {}^{i|2I}J_{2I} \\ - m_2 \cdot {}^{i|1}\tilde{r}_{2I}^{:2} + {}^{i|3I}J_{3I} - m_3 \cdot {}^{i|1}\tilde{r}_{3I}^{2} \end{pmatrix} \cdot {}^{i}n_1 \\
M_{[1][2]} &= {}^{i}n_1^T \cdot \begin{pmatrix} {}^{i|2I}J_{2I} - m_2 \cdot {}^{i|1}\tilde{r}_{2I} + {}^{i|2}\tilde{r}_{2I} \\ + {}^{i|3I}J_{3I} - m_3 \cdot {}^{i|1}\tilde{r}_{3I} \end{pmatrix} \cdot {}^{i|1}n_2 \\
M_{[1][3]} &= {}^{i}n_1^T \cdot \left({}^{i|3I}J_{3I} - m_3 \cdot {}^{i|1}\tilde{r}_{3I} \cdot {}^{i|3}\tilde{r}_{3I}\right) \cdot {}^{i|2}n_3 \\
M_{[2][1]} &= {}^{i|1}n_2^T \cdot \begin{pmatrix} {}^{i|2I}J_{2I} - m_2 \cdot {}^{i|2}\tilde{r}_{2I} \cdot {}^{i|1}\tilde{r}_{2I} \\ + {}^{i|3I}J_{3I} - m_3 \cdot {}^{i|2}\tilde{r}_{3I} \cdot {}^{i|1}\tilde{r}_{3I} \end{pmatrix} \cdot {}^{i}n_1 \\
M_{[2][2]} &= {}^{i|1}n_2^T \cdot \left({}^{i|2I}J_{2I} - m_2 \cdot {}^{i|2}\tilde{r}_{2I}^{:2} + {}^{i|3I}J_{3I} - m_3 \cdot {}^{i|2}\tilde{r}_{3I}^{:2}\right) \cdot {}^{i|1}n_2 \\
M_{[2][3]} &= {}^{i|1}n_2^T \cdot \left({}^{i|3I}J_{3I} - m_3 \cdot {}^{i|3}\tilde{r}_{3I} \cdot {}^{i|1}\tilde{r}_{3I}\right) \cdot {}^{i|2}n_3 \\
M_{[3][1]} &= {}^{i|2}n_3^T \cdot \left({}^{i|3I}J_{3I} - m_3 \cdot {}^{i|3}\tilde{r}_{3I} \cdot {}^{i|1}\tilde{r}_{3I}\right) \cdot {}^{i}n_1 \\
M_{[3][2]} &= {}^{i|2}n_3^T \cdot \left({}^{i|3I}J_{3I} - m_3 \cdot {}^{i|3}\tilde{r}_{3I} \cdot {}^{i|2}\tilde{r}_{3I}\right) \cdot {}^{i|1}n_2, \\
M_{[3][3]} &= {}^{i|2}n_3^T \cdot \left({}^{i|3I}J_{3I} - m_3 \cdot {}^{i|3}\tilde{r}_{3I}^{:2}\right) \cdot {}^{i|2}n_3
\end{aligned}
\tag{4.176}
$$

Solution is finished.

As shown in example 4.6, the dynamic modeling can be completed by letting the system topologies, axis-polarities, structural parameters, and inertial parameters be substituted into Eqs. (4.149)-(4.153) in a stylized manner. It is easy to achieve the Ju-Kane dynamic equation by programming. Since the Ju-Kane canonical equation of the Tree-Chain is derived from the Ju-Kane dynamic equation, the validity of the Ju-Kane dynamic equation of the Tree-Chain can be proved by the Ju-Kane canonical example.

Tree Chain Rigid Body System Ju-Kane Dynamics Canonical Form

After the establishment of the system dynamic equation, the equation solution is followed. Obviously, the inverse problem of the dynamic equation has been solved in the previous section. In the dynamic system simulation, the generalized forces of the environmental action and the generalized driving force of the Driving-Axis are usually given, and it is necessary to solve the acceleration of the dynamic system. This is a positive problem in solving the dynamic equation. Before solving, we first need to obtain the canonical equation as shown in example 4.2.

Obviously, the normalization process is the process of merging all joint acceleration terms. Thus, the coefficient of the joint acceleration is obtained. The problem is decomposed into two subproblems of the canonical equations of the Axis-Chain and the closed type of the closed subtree.

Canonical Equations of the Axis-Chain

Convert the forward iterative process of the joint acceleration terms in Eqs. (4.149) and (4.150) into the inverse summation process for the subsequent application; obviously, there are six different types of acceleration terms; they are processed respectively:

[1] The Axis-Chain ${}^i1_{nI}$=(i, . . . , n, nI] is given, then $$\sum_k^{{}^i1_{nI}}\left({}^i\ddot{\vec\phi}_{\bar k}\cdot{}^{i|\bar k}r_k\right)=\sum_k^{{}^i1_{nI}}\left(\sum_{k'}^{{}^i1_k}\left({}^{i|k'}\ddot{\bar{\bar\phi}}_{\overline{k'}}\right)\cdot{}^{i|\bar k}r_k\right)=\sum_k^{{}^i1_n}\left({}^{i|\bar k}\ddot\phi_k\cdot{}^{i|k}r_{nI}\right). \tag{4.177}$$

PROOF:

$$\sum_k^{{}^i1_{nI}}\left({}^i\ddot\phi_{\bar k}\cdot{}^{i|\bar k}r_k\right)=\sum_k^{{}^i1_{nI}}\left(\sum_{k'}^{{}^i1_{\bar k}}\left({}^{i|\overline{k'}}\ddot\phi_{k'}\right)\cdot{}^{i|\bar k}r_k\right)$$
$$={}^i\ddot\phi_{\bar i}\cdot{}^{i|\bar i}r_i\ \dots\ +\left({}^i\ddot\phi_{\bar i}+\dots+{}^{i|\bar k}\ddot{\bar{\bar\phi}}_{\bar k}\right)\cdot{}^{i|\bar k}r_k\ \dots+\left({}^i\ddot\phi_{\bar i}+\dots+{}^{i|\bar n}\ddot\phi_n\right)\cdot{}^{i|n}r_{nI}.$$
$$=\sum_k^{{}^i1_n}\left({}^{i|\bar k}\ddot\phi_k\cdot{}^{i|k}r_{nI}\right)$$

Q.E.D.

[2] The Axis-Chain ${}^iL_n$=(i, . . . , $\bar n$, n] is given, then $$\sum_k^{{}^{\bar l}1_n}\left({}^{i|kI}J_{kI}\cdot\sum_{k'}^{{}^i1_k}\left({}^{i|\overline{k'}}\ddot\phi_{k'}\right)\right)=\sum_k^{{}^{\bar l}1_n}\left({}^{i|kI}J_{kI}\right)\cdot\sum_k^{{}^i1_{\bar l}}\left({}^{i|\bar k}\ddot\phi_k\right)+\sum_k^{{}^{\bar l}1_n}\left(\sum_{k'}^{{}^{\bar k}1_n}\left({}^{i|k'I}J_{k'I}\right)\cdot{}^{i|\bar k}\ddot\phi_k\right). \tag{4.178}$$

PROOF: Since ${}^i1_n={}^i1_{\bar l}+{}^{\bar l}1_n$, then $$\sum_k^{{}^{\bar l}1_n}\left({}^{i|kI}J_{kI}\cdot\sum_{k'}^{{}^i1_k}\left({}^{i|\overline{k'}}\ddot\phi_{k'}\right)\right)=\sum_k^{{}^{\bar l}1_n}\left({}^{i|kI}J_{kI}\cdot{}^i\ddot\phi_k\right)$$
$$={}^{i|lI}J_{lI}\cdot\left({}^i\ddot\phi_{\bar i}+\dots+{}^{i|\bar l}\ddot\phi_l\right)+\dots$$
$$+{}^{i|kI}J_{kI}\cdot\left({}^i\ddot\phi_{\bar i}+\dots+{}^{i|\bar l}\ddot\phi_l\ +\dots+{}^{i|\bar k}\ddot\phi_k\right)+\dots$$
$$+{}^{i|nI}J_{nI}\cdot\left({}^i\ddot\phi_{\bar i}+\dots+{}^{i|\bar l}\ddot\phi_l\ +\dots+{}^{i|\bar k}\ddot\phi_k+\dots+{}^{i|\bar k}\ddot\phi_k+\dots+{}^{i|\bar n}\ddot\phi_n\right).$$
$$=\sum_k^{{}^{\bar l}1_n}\left({}^{i|kI}J_{kI}\right)\cdot\sum_k^{{}^i1_{\bar l}}\left({}^{i|\bar k}\ddot\phi_k\right)+\sum_k^{{}^{\bar l}1_n}\left(\sum_{k'}^{{}^{\bar k}1_n}\left({}^{i|k'I}J_{k'I}\right)\cdot{}^{i|\bar k}\ddot\phi_k\right)$$

Q.E.D.

[3] The Axis-Chain ${}^i1_n$=(i, . . . , $\bar n$, n] is given, then $$\sum_k^{{}^{\bar l}1_n}\left(m_k\cdot\sum_{k'}^{{}^i1_{kI}}\left({}^{i|\overline{k'}}\ddot r_{k'}\right)\right)=\sum_{k'}^{{}^{\bar l}1_n}(m_{k'})\cdot\sum_k^{{}^i1_{\bar l}}\left({}^{i|\bar k}\ddot r_k\right)+\sum_k^{{}^{\bar l}1_n}\left(\sum_{k'}^{{}^{\bar k}1_n}(m_{k'})\cdot{}^{i|\bar k}\ddot r_k\right)+\sum_k^{{}^{\bar l}1_n}\left(m_k\cdot{}^{i|k}\ddot r_{kI}\right). \tag{4.179}$$

PROOF: Since ${}^l1_n={}^l1_{\bar l}+{}^{\bar l}1_n$, then $$\sum_k^{{}^{\bar l}1_n}\left(m_k\cdot\sum_{k'}^{{}^i1_{kI}}\left({}^{i|\overline{k'}}\ddot r_{k'}\right)\right)=\sum_k^{{}^{\bar l}1_n}\left(m_k\cdot{}^i\ddot r_{k_I}\right)$$
$$=m_l\cdot\left({}^i\ddot r_{\bar i}+\dots+{}^{i|\bar l}\ddot r_l+{}^{i|l}\ddot r_{lI}\right)+\dots$$
$$+m_k\cdot\left({}^i\ddot r_{\bar i}+\dots{}^{i|\bar l}\ddot r_l\ +\dots+{}^{i|\bar k}\ddot r_k+{}^{i|k}\ddot r_{kI}\right)+\dots$$
$$+m_n\cdot\left({}^i\ddot r_{\bar i}+\dots{}^{i|\bar l}\ddot r_l\ +\dots+{}^{i|\bar k}\ddot r_k+\dots+{}^{i|\bar k}\ddot r_k+\dots+{}^{i|\bar n}\ddot r_n+{}^{i|\bar n}\ddot r_{nI}\right).$$
$$=\sum_{k'}^{{}^{\bar l}1_n}(m_{k'})\cdot\sum_k^{{}^i1_{\bar l}}\left({}^{i|\bar k}\ddot r_k\right)+\sum_k^{{}^{\bar l}1_n}\left(\sum_{k'}^{{}^{\bar k}1_n}(m_{k'})\cdot{}^{i|\bar k}\ddot r_k\right)+\sum_k^{{}^{\bar l}1_n}\left(m_k\cdot{}^{i|k}\ddot r_{kI}\right)$$

Q.E.D.

[4] The Axis-Chain ${}^i1_n$=(i, . . . , $\bar n$, n] is given, then $$\sum_k^{{}^{\bar l}1_n}\left(m_k\cdot\sum_j^{{}^i1_{kI}}\left(\sum_{k'}^{{}^i1_j}\left({}^{i|k'}\ddot{\bar{\bar\phi}}_{\bar k}\right)\cdot{}^{i|\bar j}r_j\right)\right)=-\sum_k^{{}^i1_{\bar l}}\left(\sum_{k'}^{{}^{\bar l}1_n}\left(m_{k'}\cdot{}^{i|\bar k}\tilde r_{k'I}\right)\cdot{}^{i|\bar k}\ddot\phi_k\right)-\sum_k^{{}^{\bar l}1_n}\left(\sum_{k'}^{{}^k1_n}\left(m_{k'}\cdot{}^{i|\bar k}\tilde r_{k'I}\right)\cdot{}^{i|\bar k}\ddot\phi_k\right). \tag{4.180}$$

PROOF: Considering ${}^i1_n={}^i1_{\bar l}+{}^{\bar l}1_n$, let Eq. (4.177) be substituted into the left side of Eq. (4.180) to obtain $$\sum_k^{{}^{\bar l}1_n}\left(m_k\cdot\sum_j^{{}^i1_{kI}}\left(\sum_{k'}^{{}^i1_j}\left({}^{i|k'}\ddot{\bar{\bar\phi}}_{\bar k}\right)\cdot{}^{i|\bar j}r_j\right)\right)=\sum_k^{{}^i1_n}\left(m_k\cdot\sum_j^{{}^i1_{kI}}\left({}^i\ddot\phi_{\bar j}\cdot{}^{i|\bar j}r_j\right)\right)$$
$$=\sum_k^{{}^{\bar l}1_n}\left(m_k\cdot\sum_j^{{}^i1_k}\left({}^{i|\bar j}\ddot\phi_j\cdot{}^{i|j}r_{kI}\right)\right)$$
$$=m_l\cdot\left({}^i\ddot\phi_1\cdot{}^ir_{lI}+\dots+{}^{i|\bar l}\ddot\phi_l\cdot{}^{i|l}r_{lI}\right)+\dots$$
$$+m_k\cdot\left({}^i\ddot\phi_1\cdot{}^ir_{kI}\dots+{}^{i|\bar l}\ddot\phi_l\cdot{}^{i|\bar l}r_{kI}\dots+{}^{i|\bar k}\ddot\phi_k\cdot{}^{i|k}r_{kI}\right)+\dots$$
$$+m_n\cdot\left({}^i\ddot\phi_1\cdot{}^{i|i}r_{nI}\dots+{}^{i|\bar l}\ddot\phi_l\cdot{}^{i|\bar l}r_{nI}\dots+{}^{i|\bar n}\ddot\phi_n\cdot{}^{i|n}r_{nI}\right).$$
$$=-\sum_k^{{}^i1_{\bar l}}\left(\sum_{k'}^{{}^{\bar l}1_n}\left(m_{k'}\cdot{}^{i|k}\tilde r_{k'I}\right)\cdot{}^{i|\bar k}\ddot\phi_k\right)-\sum_k^{{}^{\bar l}1_n}\left(\sum_{k'}^{{}^k1_n}\left(m_{k'}\cdot{}^{i|k}\tilde r_{k'I}\right)\cdot{}^{i|\bar k}\ddot\phi_k\right)$$

Q.E.D.

[5] The Axis-Chain ${}^i1_n$=(i, . . . , $\bar n$, n] is given, then $$\sum_k^{{}^{\bar l}1_n}\left(m_k\cdot{}^{i|l}\tilde r_{kI}\cdot\sum_k^{{}^i1_{kI}}\left(\sum_j^{{}^i1_k}\left({}^{i|\bar j}\ddot\phi_{\bar j}\right)\cdot{}^{i|\bar k}r_k\right)\right)=-\sum_k^{{}^i1_{\bar l}}\left(\sum_{k'}^{{}^{\bar l}1_n}\left(m_{k'}\cdot{}^{i|l}\tilde r_{k'I}\cdot{}^{i|k}\tilde r_{k'I}\right)\cdot{}^{i|\bar k}\ddot\phi_k\right)-\sum_k^{{}^{\bar l}1_n}\left(\sum_{k'}^{{}^k1_n}\left(m_{k'}\cdot{}^{i|l}\tilde r_{k'I}\cdot{}^{i|k}\tilde r_{k'I}\right)\cdot{}^{i|\bar k}\ddot\phi_k\right). \tag{4.181}$$

PROOF: Considering ${}^{i}1_n = {}^{i}1_{\bar{l}} + {}^{\bar{l}}1_n$, let Eq. (4.177) be substituted into the left side of Eq. (4.181) to obtain $$\begin{aligned}
&\sum_k^{{}^{\bar{l}}1_n}\left(m_k\cdot{}^{i|l}\tilde{r}_{kI}\cdot\sum_k^{{}^{i}1_{kI}}\left(\sum_j^{{}^{i}1_k}\left({}^{i|\bar{j}}\ddot{\tilde{\phi}}_{\bar{j}}\right)\cdot{}^{i|\bar{k}}r_k\right)\right)=\sum_k^{{}^{\bar{l}}1_n}\left(m_k\cdot{}^{i|l}\tilde{r}_{kI}\cdot\sum_k^{{}^{i}1_{kI}}\left({}^{i|\bar{j}}\ddot{\tilde{\phi}}_{\bar{k}}\cdot{}^{i|\bar{k}}r_k\right)\right)\\
&=m_l\cdot{}^{i|l}\tilde{r}_{lI}\cdot\left({}^{i}\ddot{\tilde{\phi}}_{\bar{i}}\cdot{}^{i|b}r_{lI}+\ldots+{}^{i|\bar{l}}\ddot{\tilde{\phi}}_l\cdot{}^{i|l}\tilde{r}_{lI}\right)+\ldots\\
&\backslash+m_k\cdot{}^{i|l}\tilde{r}_{kI}\cdot\left({}^{i}\ddot{\tilde{\phi}}_{\bar{i}}\cdot{}^{i|b}r_{kI}\ldots+{}^{i|\bar{l}}\ddot{\tilde{\phi}}_l\cdot{}^{i|l}r_{kI}\ldots+{}^{i|\bar{k}}\ddot{\tilde{\phi}}_k\cdot{}^{i|k}\ddot{r}_{kI}\right)+\ldots+m_n\\
&\backslash{}^{i|l}\tilde{r}_{nI}\cdot\left({}^{i}\ddot{\tilde{\phi}}_i\cdot{}^{i|b}r_{nI}\ldots+{}^{i|\bar{l}}\ddot{\tilde{\phi}}_l\cdot{}^{i|l}r_{nI}\ldots+{}^{i|\bar{k}}\ddot{\tilde{\phi}}_k\cdot{}^{i|k}\ddot{r}_{nI}\ldots+{}^{i|\bar{n}}\ddot{\tilde{\phi}}_n\cdot{}^{i|n}\ddot{r}_{nI}\right)\\
&=-\sum_k^{{}^{i}1_l}\left(\sum_{k'}^{{}^{\bar{l}}1_n}\left(m_{k'}\cdot{}^{i|l}\tilde{r}_{k'I}\cdot{}^{i|k}\tilde{r}_{k'I}\right)\cdot{}^{i|\bar{k}}\ddot{\phi}_k\right)-\sum_k^{{}^{\bar{l}}1_n}\left(\sum_{k'}^{{}^{k}1_n}\left(m_{k'}\cdot{}^{i|l}\tilde{r}_{k'I}\cdot{}^{i|k}\tilde{r}_{k'I}\right)\cdot{}^{i|k}\ddot{\phi}_k\right)
\end{aligned}.$$

Q.E.D.

[6] The Axis-Chain ${}^{i}1_n=(i, \ldots, \bar{n}, n]$ is given, then $$\begin{aligned}
&\sum_k^{{}^{\bar{l}}1_n}\left(m_k\cdot{}^{i|l}\tilde{r}_{kI}\cdot\sum_{k'}^{{}^{i}1_{kI}}\left({}^{i|\bar{k}'}\ddot{r}_{k'}\right)\right)=\sum_k^{{}^{\bar{l}}1_n}\left(m_k\cdot{}^{i|l}\tilde{r}_{kI}\right)\cdot\sum_{k'}^{{}^{i}1_{\bar{l}}}\left({}^{i|\bar{k}'}\ddot{r}_{k'}\right)+\\
&\sum_k^{{}^{\bar{l}}1_n}\left(\sum_{k'}^{{}^{k}1_n}\left(m_{k'}\cdot{}^{i|l}\tilde{r}_{k'I}\right)\cdot{}^{i|\bar{k}}\ddot{r}_k\right)+\sum_k^{{}^{\bar{l}}1_n}\left(m_k\cdot{}^{i|k}\tilde{r}_{kI}\cdot{}^{i|k}\ddot{r}_{kI}\right)
\end{aligned}. \tag{4.182}$$

PROOF: Since ${}^{i}1_n = {}^{i}1_{\bar{l}} + {}^{\bar{l}}1_n$, then $$\begin{aligned}
&\sum_k^{{}^{\bar{l}}1_n}\left(m_k\cdot{}^{i|l}\tilde{r}_{kI}\cdot\sum_k^{{}^{i}1_{kI}}\left({}^{i|\bar{k}}\ddot{r}_k\right)\right)=\sum_k^{{}^{\bar{l}}1_n}\left(m_k\cdot{}^{i|l}\tilde{r}_{kI}\cdot{}^{i}\ddot{r}_{kI}\right)\\
&=m_l\cdot{}^{i|l}\tilde{r}_{lI}\cdot\left({}^{i}\ddot{r}_{\bar{i}}+\ldots+{}^{i|\bar{l}}\ddot{r}_l+{}^{i|l}\ddot{r}_{lI}\right)+\ldots\\
&\backslash+m_k\cdot{}^{i|l}\tilde{r}_{kI}\cdot\left({}^{i}\ddot{r}_{\bar{i}}+\ldots+{}^{i|\bar{l}}\ddot{r}_l+\ldots+{}^{i|\bar{k}}\ddot{r}_k+{}^{i|k}\ddot{r}_{kI}\right)+\ldots\\
&\backslash+m_n\cdot{}^{i|l}\tilde{r}_{nI}\cdot\left({}^{i}\ddot{r}_{\bar{i}}+\ldots+{}^{i|\bar{l}}\ddot{r}_l+\ldots+{}^{i|\bar{k}}\ddot{r}_k+\ldots+{}^{i|\bar{n}}\ddot{r}_n+{}^{i|n}\ddot{r}_{nI}\right).\\
&=\sum_k^{{}^{\bar{l}}1_n}\left(m_k\cdot{}^{i|l}\tilde{r}_{kI}\right)\cdot\sum_{k'}^{{}^{i}1_{\bar{l}}}\left({}^{i|\bar{k}'}\ddot{r}_{k'}\right)+\sum_k^{{}^{\bar{l}}1_n}\left(\sum_{k'}^{{}^{k}1_n}\left(m_{k'}\cdot{}^{i|l}\tilde{r}_{k'I}\right)\cdot{}^{i|\bar{k}}\ddot{r}_k\right)\\
&\backslash+\sum_k^{{}^{\bar{l}}1_n}\left(m_k\cdot{}^{i|k}\tilde{r}_{kI}\cdot{}^{i|k}\ddot{r}_{kI}\right)
\end{aligned}$$

Q.E.D.

Canonical Equations of the Closed Child Tree

Since the generalized force in the closed child tree uL is additive, therefore, the node of the closed subtree has a unique Axis-Chain to the root, and the Axis-Chain ${}^{l}1_n$ of Eqs. (4.178)-(4.182) can be replaced with uL. From Eq. (4.178), then $$\sum_k^{uL}\left({}^{i|kI}J_{kI}\cdot\sum_l^{{}^{i}1_k}\left({}^{i|\bar{l}}\ddot{\phi}_l\right)\right)=\sum_k^{uL}\left({}^{i|kI}J_{kI}\right)\cdot\sum_l^{{}^{i}1_{\bar{u}}}\left({}^{i|\bar{l}}\ddot{\phi}_l\right)+\sum_k^{uL}\left(\begin{array}{c}\sum_j^{{}^{k}L}\left({}^{i|jI}J_{jI}\right)\\ \backslash\cdot{}^{i|\bar{k}}\ddot{\phi}_k\end{array}\right). \tag{4.183}$$

From Eq. (4.179), then $$\begin{aligned}
&\sum_k^{uL}\left(m_k\cdot\sum_l^{{}^{i}1_{kI}}\left({}^{i|\bar{l}}\ddot{r}_l\right)\right)=\sum_k^{uL}(m_k)\cdot\sum_l^{{}^{i}1_{\bar{u}}}\left({}^{i|\bar{l}}\ddot{r}_l\right)\\
&\backslash+\sum_k^{uL}\left(\sum_j^{{}^{k}L}(m_j)\cdot{}^{i|\bar{k}}\ddot{r}_k\right)+\sum_k^{uL}\left(m_k\cdot{}^{i|k}\ddot{r}_{kI}\right)
\end{aligned}. \tag{4.184}$$

From Eq. (4.180), then $$\begin{aligned}
&-\sum_k^{uL}\left(m_k\cdot\sum_l^{{}^{i}1_{kI}}\left(\sum_j^{{}^{i}1_l}\left({}^{i|\bar{j}}\ddot{\tilde{\phi}}_{\bar{j}}\right)\cdot{}^{i|\bar{l}}r_l\right)\right)=\sum_l^{{}^{i}1_{\bar{u}}}\left(\sum_k^{uL}\left(m_k\cdot{}^{i|l}\tilde{r}_{kI}\right)\cdot{}^{i|\bar{l}}\ddot{\phi}_l\right)\\
&\backslash+\sum_k^{uL}\left(\sum_j^{{}^{k}L}\left(m_j\cdot{}^{i|k}\tilde{r}_{jI}\right)\cdot{}^{i|\bar{k}}\ddot{\phi}_k\right)
\end{aligned}. \tag{4.185}$$

From Eq. (4.181), then $$\begin{aligned}
&\sum_k^{uL}\left(m_k\cdot{}^{i|u}\tilde{r}_{kI}\cdot\sum_l^{{}^{i}1_{kI}}\left(\sum_j^{{}^{i}1_l}\left({}^{i|\bar{\bar{j}}}\ddot{\tilde{\phi}}_{\bar{j}}\right)\cdot{}^{i|\bar{l}}r_l\right)\right)=\\
&\backslash-\sum_l^{{}^{i}1_{\bar{u}}}\left(\sum_k^{uL}\left(\begin{array}{c}m_k\cdot{}^{i|u}\tilde{r}_{kI}\\ \backslash\cdot{}^{i|l}\tilde{r}_{kI}\end{array}\right)\cdot{}^{i|\bar{l}}\ddot{\phi}_l\right)-\sum_k^{uL}\left(\sum_j^{{}^{k}L}\left(\begin{array}{c}m_j\cdot{}^{i|u}\tilde{r}_{jI}\\ \backslash\cdot{}^{i|k}\tilde{r}_{jI}\end{array}\right)\cdot{}^{i|\bar{k}}\ddot{\phi}_k\right)
\end{aligned}. \tag{4.186}$$

From Eq. (4.182), then $$\begin{aligned}
&\sum_k^{uL}\left(m_k\cdot{}^{i|u}\tilde{r}_{kI}\cdot\sum_l^{{}^{i}1_{kI}}\left({}^{i|\bar{l}}\ddot{r}_l\right)\right)=\sum_k^{uL}\left(m_k\cdot{}^{i|u}\tilde{r}_{kI}\right)\cdot\sum_l^{{}^{i}1_{\bar{u}}}\left({}^{i|\bar{l}}\ddot{r}_l\right)\\
&\backslash+\sum_k^{uL}\left(\sum_j^{{}^{k}L}\left(m_j\cdot{}^{i|u}\tilde{r}_{jI}\right)\cdot{}^{i|\bar{k}}\ddot{r}_k\right)+\sum_k^{uL}\left(m_k\cdot{}^{i|k}\tilde{r}_{kI}\cdot{}^{i|k}\ddot{r}_{kI}\right)
\end{aligned}. \tag{4.187}$$

At this point, the prerequisite for establishment of the canonical equations has been provided.

Tree Chain Rigid Body System Ju-Kane Dynamics Canonical Equations

In the following, establish the Ju-Kane canonical dynamic equation of the Tree-Chain rigid-body system with the conclusions in previous chapter. To facilitate the expression, first define $$ {}^{a}_{b}\Big\| \cdot {}^{\bar k}n_k \cdot \ddot q_k^{\bar k} \triangleq \begin{cases} a\cdot {}^{\bar k}n_k \cdot \ddot\phi_k^{\bar k} & \text{if } {}^{\bar k}k_k \in R \\ b\cdot {}^{\bar k}n_k\cdot \ddot r_k^{\bar k} & \text{if } {}^{\bar k}k_k\in P\end{cases}. $$

Then, express Eq. (4.149) and (4.150) as the canonical form with Eqs. (4.183)-(4.187).

[1] Canonical Form of Translational Axis

The canonical form of Eq. (4.149) is $$ M_P^{[u][*]}\cdot\ddot q = \sum_l^{{}^i\mathbf{1}_{\bar u}} \left( \left. \begin{array}{c} -\sum_k^{uL}\left(m_k\cdot {}^{i|l}\tilde r_{kI}\right) \\ \sum_k^{uL}(m_k)\cdot 1\end{array} \right\| \cdot \left({}^{i|\bar l}n_l\cdot \ddot q_l^{\bar l}\right) \right) + \sum_k^{uL} \left( \left. \begin{array}{c} -\sum_j^{kL}\left(m_j\cdot {}^{i|k}\tilde r_{jI}\right) \\ \sum_j^{kL}(m_j)\cdot 1\end{array} \right\| \cdot \left({}^{i|\bar k}n_k\cdot \ddot q_k^{\bar k}\right) \right) \quad (4.189) $$

PROOF: From Eqs. (4.22) and (4.149), then $$ M_P^{[u][*]}\cdot\ddot q = \sum_k^{uL}\left(m_k\cdot\sum_l^{{}^i\mathbf{1}_{kI}}\left({}^{i}\ddot{\tilde\phi}_{\bar l}\cdot{}^{i|\bar l}r_l + {}^{i|\bar l}\ddot r_l\right)\right). \quad (4.190) $$

From Eqs. (4.19) and (4.190), then $$ M_P^{[u][*]}\cdot\ddot q=\sum_k^{uL}\left(\sum_l^{{}^i\mathbf 1_{kI}}\left(m_k\cdot\sum_j^{{}^i\mathbf 1_l}\left({}^{i|\bar j}\ddot{\tilde\phi}_{\bar j}\right)\cdot{}^{i|\bar l}r_l\right)\right)+\sum_k^{uL}\left(m_k\cdot\sum_l^{{}^i\mathbf 1_{kI}}\left({}^{i|\bar l}\ddot r_l\right)\right). \quad (4.191) $$

Let Eq. (4.185) be substituted into the first term on the right side of Eq. (4.190) to obtain $$ \sum_k^{uL}\left(\sum_l^{{}^i\mathbf 1_{kI}}\left(m_k\cdot\sum_j^{{}^i\mathbf 1_l}\left({}^{i|\bar j}\ddot{\tilde\phi}_{\bar j}\right)\cdot{}^{i|\bar l}r_l\right)\right) = -\sum_l^{{}^i\mathbf 1_{\bar u}}\left(\sum_k^{uL}\left(m_k\cdot{}^{i|\bar l}\tilde r_{kI}\right)\cdot{}^{i|\bar l}\ddot\phi_l\right) - \sum_k^{uL}\left(\sum_j^{kL}\left(m_j\cdot{}^{i|k}\tilde r_{jI}\right)\cdot{}^{i|\bar k}\ddot\phi_k\right). \quad (4.192) $$

Let Eq. (4.184) be substituted into the last term on the right side of Eq. (4.191) to obtain $$ \sum_k^{uL}\left(m_k\cdot\sum_l^{{}^i\mathbf 1_{kI}}\left({}^{i|\bar l}\ddot r_l\right)\right) = \sum_k^{uL}(m_k)\cdot\sum_l^{{}^i\mathbf 1_{\bar u}}\left({}^{i|\bar l}\ddot r_l\right) + \sum_k^{uL}\left(\sum_j^{kL}(m_j)\cdot{}^{i|\bar k}\ddot r_k\right) + \sum_k^{uL}\left(m_k\cdot{}^{i|k}\ddot r_{kI}\right), \quad (4.193) $$

Let Eqs. (4.192) and (4.193) be substituted into Eq. (4.191), then $$ M_P^{[u][*]}\cdot\ddot q = \sum_l^{{}^i\mathbf 1_{\bar u}}\left[-\sum_k^{uL}\left(m_k\cdot{}^{i|l}\tilde r_{kI}\right)\cdot{}^{i|\bar l}\ddot\phi_l + \sum_k^{uL}(m_k)\cdot{}^{i|\bar l}\ddot r_l\right] + \sum_k^{uL}\left[-\sum_j^{kL}\left(m_j\cdot{}^{i|k}\tilde r_{jI}\right)\cdot{}^{i|\bar k}\ddot\phi_k + \sum_j^{kL}(m_j)\cdot{}^{i|\bar k}\ddot r_k\right] + \sum_k^{uL}\left(m_k\cdot{}^{i|k}\ddot r_{kI}\right). \quad (4.194) $$

For the rigid-body k, there is ${}^{k}\ddot r_{kI}=0_3$; obtain Eq. (4.189) with Eqs. (4.148), (4.188) and (4.194).

Q.E.D.

[2] Canonical Form of Rotational Axis

The canonical form of Eq. (4.150) is $$ M_R^{[u][*]}\cdot\ddot q = \sum_l^{{}^i\mathbf 1_{\bar u}}\left( \left. \begin{array}{c} \sum_k^{uL}\left({}^{i|kI}J_{kI} - m_k\cdot{}^{i|u}\tilde r_{kI}\cdot{}^{i|l}\tilde r_{kI}\right) \\ \sum_k^{uL}\left(m_k\cdot{}^{i|u}\tilde r_{kI}\right)\end{array}\right\| \cdot{}^{i|\bar l}n_l\cdot\ddot q_l^{\bar l}\right) + \sum_k^{uL}\left( \left. \begin{array}{c} \sum_j^{kL}\left({}^{i|jI}J_{jI} - m_j\cdot{}^{i|u}\tilde r_{jI}\cdot{}^{i|k}\tilde r_{jI}\right) \\ \sum_j^{kL}\left(m_j\cdot{}^{i|u}\tilde r_{jI}\right)\end{array}\right\| \cdot{}^{i|\bar k}n_k\cdot\ddot q_k^{\bar k}\right). \quad (4.195) $$

PROOF: From Eq. (4.150), then $$ M_R^{[u][*]}\cdot\ddot q = \sum_k^{uL}\left({}^{i|kI}J_{kI}\cdot\sum_l^{{}^i\mathbf 1_{kI}}\left({}^{i|\bar l}\ddot\phi_l\right)\right) + \sum_k^{uL}\left(m_k\cdot{}^{i|u}\tilde r_{kI}\cdot\sum_l^{{}^i\mathbf 1_{kI}}\left({}^{i|\bar l}\ddot r_l\right)\right) + \sum_k^{uL}\left(m_k\cdot{}^{i|u}\tilde r_{kI}\cdot\sum_l^{{}^i\mathbf 1_{kI}}\left(\sum_j^{{}^i\mathbf 1_{\bar l}}\left({}^{i|\bar j}\ddot{\tilde\phi}_{\bar j}\right)\cdot{}^{i|\bar l}r_l\right)\right). \quad (4.196) $$

Let Eq. (4.183) be substituted into the first term on the right side of Eq. (4.196) to obtain $$ \sum_k^{uL}\left({}^{i|kI}J_{kI}\cdot\sum_l^{{}^i\mathbf 1_{kI}}\left({}^{i|\bar l}\ddot\phi_l\right)\right) = \sum_k^{uL}\left({}^{i|kI}J_{kI}\right)\cdot\sum_l^{{}^i\mathbf 1_{\bar u}}\left({}^{i|\bar l}\ddot\phi_l\right) + \sum_k^{uL}\left(\sum_j^{kL}\left({}^{i|jI}J_{jI}\right)\cdot{}^{i|\bar k}\ddot\phi_k\right). \quad (4.197) $$

Let Eq. (4.186) be substituted into the last term on the right side of Eq. (4.196) to obtain $$ \sum_k^{uL}\left(m_k\cdot{}^{i|u}\tilde r_{kI}\cdot\sum_l^{{}^i\mathbf 1_{kI}}\left(\sum_j^{{}^i\mathbf 1_{\bar l}}\left({}^{i|\bar j}\ddot{\tilde\phi}_{\bar j}\right)\cdot{}^{i|\bar l}r_l\right)\right) = -\sum_l^{{}^i\mathbf 1_{\bar u}}\left(\sum_k^{uL}\left(m_k\cdot{}^{i|u}\tilde r_{kI}\cdot{}^{i|l}\tilde r_{kI}\right)\cdot{}^{i|\bar l}\ddot\phi_l\right) - \sum_k^{uL}\left(\sum_j^{kL}\left(m_j\cdot{}^{i|u}\tilde r_{jI}\cdot{}^{i|k}\tilde r_{jI}\right)\cdot{}^{i|\bar k}\ddot\phi_k\right). \quad (4.198) $$

Let Eq. (4.187) be substituted into the middle term on the right side of Eq. (4.196) to obtain $$\sum_{k}^{uL}\left(m_k\cdot{}^{i|u}\tilde{r}_{kI}\cdot\sum_{l}^{{}^i1_{kI}}\left({}^{i|\bar{l}}\ddot{r}_l\right)\right)=\sum_{k}^{uL}\left(m_k\cdot{}^{i|u}\tilde{r}_{kI}\right)\cdot\sum_{l}^{{}^i1_{\bar{u}}}\left({}^{i|\bar{l}}\ddot{r}_l\right) \\ +\sum_{k}^{uL}\left(\sum_{j}^{kL}\left(m_j\cdot{}^{i|u}\tilde{r}_{jI}\right)\cdot{}^{i|\bar{k}}\ddot{r}_k\right)+\sum_{k}^{uL}\left(m_k\cdot{}^{i|u}\tilde{r}_{kI}\cdot{}^{i|k}\ddot{r}_{kI}\right). \tag{4.199}$$

Let Eqs. (4.197), (4.198) and (4.199) be substituted into Eq. (4.197) to obtain $$M_R^{[u][*]}\cdot\ddot{q}=\sum_{l}^{{}^i1_{\bar{u}}}\begin{pmatrix}\sum_{k}^{uL}\left({}^{i|kI}J_{kI}-m_k\cdot{}^{i|u}\tilde{r}_{kI}\cdot{}^{i|l}\tilde{r}_{kI}\right)\cdot{}^{i|\bar{l}}\ddot{\phi}_l \\ +\sum_{k}^{uL}\left(m_k\cdot{}^{i|u}\tilde{r}_{kI}\right)\cdot{}^{i|\bar{l}}\ddot{r}_l\end{pmatrix}+ \tag{4.200}$$

$$\sum_{k}^{uL}\begin{pmatrix}\sum_{j}^{kL}\left({}^{i|jI}J_{jI}-m_j\cdot{}^{i|u}\tilde{r}_{jI}\cdot{}^{i|k}\tilde{r}_{jI}\right)\cdot{}^{i|\bar{k}}\ddot{\phi}_k+ \\ m_k\cdot{}^{i|k}\tilde{r}_{kI}\cdot{}^{i|k}\ddot{r}_{kI}+\sum_{j}^{kL}\left(m_j\cdot{}^{i|u}\tilde{r}_{jI}\right)\cdot{}^{i|\bar{k}}\ddot{r}_k\end{pmatrix}$$

For the rigid-body k, there is ${}^k\ddot{r}_{kI}0_3$; obtain Eq. (4.195) with Eqs. (4.148), (4.188) and (4.200). Q.E.D.

[3] Ju-Kane Canonical Form Theorem

With Eqs. (4.189) and (4.195), re-express the Ju-Kane as the following Tree-Chain Ju-Kane canonical form theorem.

THEOREM 4.3. The rigid MAS iL={A,K,T,NT,F,B} is given, the root is used as the inertial space, ∀k, l, u∈A, NT=∅; in addition to the gravity, the external resultant force acting on Axis # u and the component of the torque on ${}^{\bar{u}}n_u$ are denoted as $f_u^{iL}$ and $\tau_u^{iL}$; The mass and rotational inertia of Axis # k are denoted as $m_k$ and ${}^{kI}J_{kI}$ respectively; the gravity acceleration of Axis # k is ${}^ig_{kI}$; the bilateral driving force on the Driving-Axis # u and the component on the driving torque on ${}^{\bar{u}}n_u$ are denoted as $f_u^c(\dot{r}_l^{\bar{l}})$ and $\tau_u^c(\dot{\phi}_l^{\bar{l}})$ respectively; the force of the environment i acting on Axis # l and the torque are denoted as ${}^{iS}f_{lS}$ and ${}^i\tau_l$ respectively; then the Ju-Kane dynamic equation of the Tree-Chain of Axis # u is $$\begin{cases}{}^{i|\bar{u}}n_u^T\cdot\left(M_P^{[u][*]}\cdot\ddot{q}+h_P^{[u]}\right)=f_u^D, & \text{if } {}^{\bar{u}}k_u\in P \\ {}^{i|\bar{u}}n_u^T\cdot\left(M_R^{[u][*]}\cdot\ddot{q}+h_R^{[u]}\right)=\tau_u^D, & \text{if } {}^{\bar{u}}k_u\in R\end{cases}, \tag{4.201}$$

where $M_P^{[u][v]}$ and $M_R^{[u][v]}$ are 3×3 block matrixes, and $h_P^{[u]}$ and $h_R^{[v]}$ are 3D vectors. And $$\ddot{q}=\left\{{}^{i|\bar{l}}\ddot{q}_l={}^{i|\bar{l}}n_l\cdot\ddot{q}_l^{\bar{l}}\left|\begin{matrix}\ddot{q}_l^{\bar{l}}=\ddot{r}_l^{\bar{l}}, & \text{if } {}^{\bar{l}}k_l\in P; \\ \ddot{q}_l^{\bar{l}}=\ddot{\phi}_l^{\bar{l}}, & \text{if } {}^{\bar{l}}k_l\in R;\end{matrix}\right. l\in A\right\}, \tag{4.202}$$

-continued $$M_P^{[u][*]}\cdot\ddot{q}=\sum_{l}^{{}^i1_{\bar{u}}}\left(\left.\begin{matrix}-\sum_{j}^{uL}\left(m_j\cdot{}^{i|l}\tilde{r}_{jI}\right) \\ \sum_{j}^{uL}(m_j)\cdot 1\end{matrix}\right\|\cdot\left({}^{i|\bar{l}}n_l\cdot\ddot{q}_l^{\bar{l}}\right)\right) \\ +\sum_{k}^{uL}\left(\left.\begin{matrix}-\sum_{j}^{kL}\left(m_j\cdot{}^{i|k}\tilde{r}_{jI}\right) \\ \sum_{j}^{kL}(m_j)\cdot 1\end{matrix}\right\|\cdot\left({}^{i|\bar{k}}n_k\cdot\ddot{q}_k^{\bar{k}}\right)\right), \tag{4.203}$$

$$h_P^{[u]}=\sum_{k}^{uL}\left(m_k\cdot\sum_{l}^{{}^i1_{kI}}\left({}^i\dot{\tilde{\phi}}_{\bar{l}}^{:2}\cdot{}^{i|\bar{l}}r_l+2\cdot{}^i\dot{\tilde{\phi}}_{\bar{l}}\cdot{}^{i|\bar{l}}\dot{r}_l\right)\right)-\sum_{k}^{uL}\left(m_k\cdot{}^ig_{kI}\right), \tag{4.204}$$

$$h_R^{[u]}=\sum_{k}^{uL}\left(m_k\cdot{}^{i|u}\tilde{r}_{kI}\cdot\sum_{l}^{{}^i1_{kI}}\left({}^i\dot{\tilde{\phi}}_{\bar{l}}^{:2}\cdot{}^{i|\bar{l}}r_l+2\cdot{}^i\dot{\tilde{\phi}}_{\bar{l}}\cdot{}^{i|\bar{l}}\dot{r}_l\right)\right), \\ +\sum_{k}^{uL}\left({}^i\dot{\tilde{\phi}}_k\cdot{}^{i|kI}J_{kI}\cdot{}^i\dot{\phi}_k\right)-\sum_{k}^{uL}\left(m_k\cdot{}^{i|u}\tilde{r}_{kI}\cdot{}^ig_{kI}\right) \tag{4.205}$$

$$M_R^{[u][*]}\cdot\ddot{q}=\sum_{l}^{{}^i1_{\bar{u}}}\left(\left.\begin{matrix}\sum_{j}^{uL}\left({}^{i|jI}J_{jI}-m_j\cdot{}^{i|u}\tilde{r}_{jI}\cdot{}^{i|u}\tilde{r}_{jI}\right) \\ \sum_{j}^{uL}\left(m_j\cdot{}^{i|u}\tilde{r}_{jI}\right)\end{matrix}\right\|\cdot{}^{i|\bar{l}}n_l\cdot\ddot{q}_l^{\bar{l}}\right) \\ +\sum_{k}^{uL}\left(\left.\begin{matrix}\sum_{j}^{kL}\left({}^{i|jI}J_{jI}-m_j\cdot{}^{i|u}\tilde{r}_{jI}\cdot{}^{i|k}\tilde{r}_{jI}\right) \\ \sum_{j}^{{}^kL}\left(m_j\cdot{}^{i|u}\tilde{r}_{jI}\right)\end{matrix}\right\|\cdot{}^{i|\bar{k}}n_k\cdot\ddot{q}_k^{\bar{k}}\right), \tag{4.206}$$

$$\begin{cases}f_u^{iL}=f_u^c+\dot{r}_u^{\bar{u}}\cdot G(f_u^c)+{}^{i|\bar{u}}n_u^T\cdot\sum_{l}^{uL}\left({}^{iS}f_{lS}\right), & \text{if } {}^{\bar{u}}k_u\in P \\ \tau_u^{iL}=\tau_u^c+\dot{\phi}_u^{\bar{u}}\cdot G(\tau_u^c) & \\ +{}^{i|\bar{u}}n_u^T\cdot\sum_{l}^{uL}\left({}^{i|u}\tilde{r}_{lS}\cdot{}^{iS}f_{lS}+{}^I\tau_l\right), & \text{if } {}^{\bar{u}}k_u\in R\end{cases}. \tag{4.207}$$

Q.E.D.

If the rigid•MAS iL={A,K,T,NT,F,B} only contains rotational axes, NT=∅; then Eq. (4.206) can be simplified as, $$M_R^{[u][*]}\cdot\ddot{q}=\sum_{l}^{{}^i1_{\bar{u}}}\left(\sum_{k}^{uL}\left({}^{i|kI}J_{kI}-m_k\cdot{}^{i|u}\tilde{r}_{kI}\cdot{}^{i|l}\tilde{r}_{kI}\right)\cdot{}^{i|\bar{l}}n_l\cdot\ddot{\phi}_l^{\bar{l}}\right) \\ +\sum_{l}^{uL}\left(\sum_{j}^{kL}\left({}^{i|jI}J_{jI}-m_j\cdot{}^{i|u}\tilde{r}_{jI}\cdot{}^{i|k}\tilde{r}_{jI}\right)\cdot{}^{i|\bar{k}}n_k\cdot\ddot{\phi}_k^{\bar{k}}\right). \tag{4.208}$$

Application of Tree Chain Rigid Body System Ju-Kane Dynamics Canonical Equation

EXAMPLE 4.7. Establish the dynamic equation of the plane 2R Robo-Arm shown in example 7.1 with the Ju-Kane canonical form theorem; prove the equivalence of the two equations.

SOLUTION: STEP 1. Establish the iterative kinematics equation based on the Axis-Invariant. Establish the expressions of the Axis-invariant, DCM, position, translation velocity and rotation velocity respectively and refer to Eqs. (4.87)-(4.105);

STEP 2. From Eqs. (4.65), (4.87)-(4.105) and (4.208), we obtain $$ {}^{1|i}n_1^T \cdot M_R^{[1][*]} \cdot \ddot{q} = {}^{1|i}n_1^T \cdot \begin{pmatrix} {}^{1I}J_{1I} - m_1 \cdot {}^{1}\tilde{r}_{1I}^2 + \\ {}^{1|2I}J_{2I} - m_2 \cdot {}^{1}\tilde{r}_{2I}^2 \end{pmatrix} \cdot {}^{1|i}n_1 \cdot \ddot{\phi}_1^i + {}^{1|i}n_1^T \cdot \left({}^{1|2I}J_{2I} - m_2 \cdot {}^{1}\tilde{r}_{2I} \cdot {}^{2}\tilde{r}_{2I}\right) \cdot {}^{1}n_2 \cdot \ddot{\phi}_2^1 , = \left(m_1 l_{1I}^2 + J_{1I} + m_2\left(l_1^2 + 2 l_1 l_{2I} C_2^1 + l_{2I}^2\right) + J_{2I}\right) \cdot \ddot{\phi}_1^i + \left(m_2\left(l_{2I}^2 + l_1 l_{2I} C_2^1\right) + J_{2I}\right) \cdot \ddot{\phi}_2^1 \tag{4.209} $$

$$ {}^{2|i}n_2^T \cdot M_R^{[2][*]} \cdot \ddot{q} = {}^{2|i}n_2^T \cdot \begin{pmatrix} \left({}^{2I}J_{2I} - m_2 \cdot {}^{2}\tilde{r}_{2I} \cdot {}^{2|1}\tilde{r}_{2I}\right) \cdot {}^{2|1}n_2 \cdot \ddot{\phi}_1^i \\ + \left({}^{2I}J_{2I} - m_2 \cdot {}^{2}\tilde{r}_{2I}^{2}\right) \cdot {}^{2|1}n_2 \cdot \ddot{\phi}_2^1 \end{pmatrix} . = \left(m_2 l_{2I}^2 + m_2 l_1 l_{2I} C_2^1\right) \cdot \ddot{\phi}_1^i + \left(m_2 l_{2I}^2 + J_{2I}\right) \cdot \ddot{\phi}_2^1 \tag{4.210} $$

From Eqs. (4.209) and (4.210), then $$ \begin{bmatrix} {}^{1|i}n_1^T \\ {}^{2|1}n_2^T \end{bmatrix} \cdot M_R \cdot \ddot{q} = \begin{bmatrix} m_1 l_{1I}^2 + J_{1I} + J_{2I} + m_2\left(l_1^2 + 2 l_1 l_{2I} C_2^1 + l_{2I}^2\right), & m_2 l_{2I}\left(l_1 C_2^1 + l_{2I}\right) + J_{2I} \\ m_2\left(l_{2I}^2 + l_1 l_{2I} C_2^1\right) + J_{2I}, & m_2 l_{2I}^2 + J_{2I} \end{bmatrix} \cdot \begin{bmatrix} \ddot{\phi}_1^i \\ \ddot{\phi}_2^1 \end{bmatrix} . \tag{4.211} $$

From Eq. (4.205), then $$ h_R^{[1]} = m_1 \cdot {}^{i|1}\tilde{r}_{1I} \cdot {}^{i}\dot{\tilde{\phi}}_1^{:2} \cdot {}^{i|1}r_{1I} + m_2 \cdot {}^{i|1}\tilde{r}_{2I} \cdot \left({}^{i}\dot{\tilde{\phi}}_1^{:2} \cdot {}^{i|1}r_2 + {}^{i}\dot{\tilde{\phi}}_2^{:2} \cdot {}^{i|2}r_{2I}\right), + {}^{i}\dot{\tilde{\phi}}_l \cdot {}^{i|1I}J_{1I} \cdot {}^{i}\dot{\phi}_1 + {}^{i}\dot{\tilde{\phi}}_2 \cdot {}^{i|2I}J_{2I} \cdot {}^{i}\dot{\phi}_2 - m_1 \cdot {}^{i|1}\tilde{r}_{1I} \cdot {}^{i}g_{1I} - m_2 \cdot {}^{i|1}\tilde{r}_{2I} \cdot {}^{i}g_{2I} \tag{4.212} $$

$$ h_R^{[2]} = m_2 \cdot {}^{i|2}\tilde{r}_{2I} \cdot {}^{i}\dot{\tilde{\phi}}_2^{:2} \cdot {}^{i|2}r_{2I} + m_2 \cdot {}^{i|2}\tilde{r}_{2I} \cdot {}^{i}\dot{\tilde{\phi}}_1^{:2} \cdot {}^{i|1}r_2 \, . + {}^{2|i}\dot{\tilde{\phi}}_2 \cdot {}^{i|2I}J_{2I} \cdot {}^{i}\dot{\phi}_2 - m_2 \cdot {}^{i|2}\tilde{r}_{2I} \cdot {}^{i}g_{2I} \tag{4.213} $$

PROOF: From Eqs. (4.87), (4.96), and (4.99), then $$ {}^{i}n_1^T \cdot m_1 \cdot {}^{i|1}\tilde{r}_{1I} \cdot {}^{i}\dot{\tilde{\phi}}_1^{2} \cdot {}^{i|1}r_{1I} = m_1 \cdot 1^{[3]} \cdot \begin{bmatrix} 0 & 0 & l_{1I} S_1^i \\ 0 & 0 & -l_{1I} C_1^i \\ -l_{1I} S_1^i & l_{1I} C_1^i & 0 \end{bmatrix} \cdot \begin{bmatrix} 0 & -1 & 0 \\ 1 & 0 & 0 \\ 0 & 0 & 0 \end{bmatrix}^2 \cdot \begin{bmatrix} l_{1I} C_1^i \\ l_{1I} S_1^i \\ 0 \end{bmatrix} \cdot \dot{\phi}_1^{i:2} = 0 \tag{4.214} $$

From Eqs. (4.65), (4.87), (4.99) and (4.100), then $$ {}^{i}n_1^T \cdot {}^{i}\dot{\tilde{\phi}}_1 \cdot {}^{i|1I}J_{1I} \cdot {}^{i}\dot{\phi}_1 = 1^{[3]} \cdot \begin{bmatrix} 0 & -1 & 0 \\ 1 & 0 & 0 \\ 0 & 0 & 0 \end{bmatrix} \cdot \begin{bmatrix} * & * & * \\ * & * & * \\ * & * & J_{1I} \end{bmatrix} \cdot \begin{bmatrix} 0 \\ 0 \\ 1 \end{bmatrix} \cdot \dot{\phi}_1^{i:2} = 0 \tag{4.215} $$

$$ {}^{i|1}n_1^T \cdot {}^{i}\dot{\tilde{\phi}}_2 \cdot {}^{i|2I}J_{2I} \cdot {}^{i}\dot{\phi}_2 = 1^{[3]} \cdot \begin{bmatrix} 0 & -1 & 0 \\ 1 & 0 & 0 \\ 0 & 0 & 0 \end{bmatrix} \cdot {}^{i}Q_2 \cdot \begin{bmatrix} * & * & * \\ * & * & * \\ * & * & J_{2I} \end{bmatrix} \cdot {}^{2}Q_i \cdot 1^{[z]} \cdot \left(\dot{\phi}_1^i + \dot{\phi}_2^1\right)^2 = 0 \tag{4.216} $$

From Eqs. (4.87), (4.99), and (4.101)-(4.105), then $$ {}^{i}n_1^T \cdot m_2 \cdot {}^{i|1}\tilde{r}_{2I} \cdot {}^{i}\dot{\tilde{\phi}}_1^{:2} \cdot {}^{i|1}r_2 = m_2 \cdot 1^{[3]} \cdot \begin{bmatrix} 0 & 0 & l_1 S_1^i + l_{2I} S_2^i \\ 0 & 0 & -l_1 C_1^i - l_{2I} C_2^i \\ -l_1 S_1^i - l_{2I} S_2^i & l_1 C_1^i + l_{2I} C_2^i & 0 \end{bmatrix} \cdot \begin{bmatrix} 0 & -1 & 0 \\ 1 & 0 & 0 \\ 0 & 0 & 0 \end{bmatrix}^2 , \cdot \begin{bmatrix} l_1 C_1^i \\ l_1 S_1^i \\ 0 \end{bmatrix} \cdot \dot{\phi}_1^{i:2} = m_2\left(l_1 l_{2I} C_1^i S_2^i - l_1 l_{2I} S_1^i C_2^i\right) \cdot \dot{\phi}_1^{i:2} = m_2 l_1 l_{2I} S_2^1 \dot{\phi}_1^{i:2} \tag{4.217} $$

$$ {}^{i}n_1^T \cdot m_2 \cdot {}^{i|1}\tilde{r}_{2I} \cdot {}^{i}\dot{\tilde{\phi}}_2^{:2} \cdot {}^{i|2}r_{2I} = m_2 \cdot 1^{[3]} \cdot \begin{bmatrix} 0 & 0 & l_1 S_1^i + l_{2I} S_2^i \\ 0 & 0 & -l_1 C_1^i - l_{2I} C_2^i \\ -l_1 S_1^i - l_{2I} S_2^i & l_1 C_1^i + l_{2I} C_2^i & 0 \end{bmatrix} \cdot \begin{bmatrix} 0 & -1 & 0 \\ 1 & 0 & 0 \\ 0 & 0 & 0 \end{bmatrix}^2 . \cdot \begin{bmatrix} l_{2I} C_2^i \\ l_{2I} S_2^i \\ 0 \end{bmatrix} \cdot \dot{\phi}_2^{i:2} = m_2\begin{pmatrix} l_1 l_{2I} S_1^i C_2^i - \\ l_1 l_{2I} C_1^i S_2^i \end{pmatrix} \cdot \dot{\phi}_2^{i:2} - m_2 l_1 l_{2I} S_2^1 \dot{\phi}_2^{i:2} \tag{4.218} $$

From Eqs. (4.87), (4.98) and (4.89), then $$ {}^{i}n_1^T \cdot m_2 \cdot {}^{i}\tilde{r}_{2I} \cdot {}^{i}g_{2I} = -m_2 g \cdot 1^{[3]} \cdot \begin{bmatrix} 0 & 0 & l_1 S_1^i + l_{2I} S_2^i \\ 0 & 0 & -l_1 C_1^i - l_{2I} C_2^i \\ -l_1 S_1^i - l_{2I} S_2^i & l_1 C_1^i + l_{2I} C_2^i & 0 \end{bmatrix} \cdot 1^{[y]} . = -m_2 g l_1 C_1^i - m_2 g l_{2I} C_2^i \tag{4.219} $$

From Eqs. (4.87), (4.96) and (4.89), then $$ m_1 \cdot {}^{i}n_1^T \cdot {}^{i}\tilde{r}_{1I} \cdot {}^{i}g_{1I} = -m_1 g \cdot 1^{[3]} \cdot \begin{bmatrix} 0 & 0 & l_{1I} S_l^i \\ 0 & 0 & -l_{1I} C_l^i \\ -l_{1I} S_l^i & l_{1I} C_l^i & 0 \end{bmatrix} . \cdot 1^{[y]} = -m_1 g l_1 C_1^i \tag{4.220} $$

Let Eqs. (4.214)-(4.225) be substituted into Eq. (4.212), then $$ {}^{i}n_1^T \cdot h_R^{[1]} = m_2 l_1 l_{2I} S_2^1 \dot{\phi}_1^{i:2} - m_2 l_1 l_{2I} S_2^1 \dot{\phi}_1^{i:2} + m_1 g l_{1I} C_1^i + m_2 g l_1 C_1^i + m_g g l_{2I} C_2^i = -m_2 l_1 l_{2I} S_2^1\left(\dot{\phi}_2^{1:2} + 2 \dot{\phi}_1^i \dot{\phi}_2^1\right) + \left(m_1 g l_{1I} C_1^i + m_2 g\left(l_1 C_1^i + l_{2I} C_2^i\right)\right) . \tag{4.221} $$

From Eqs. (4.87), (4.95), and (4.101)-(4.105), then $$ {}^{i|1}n_2^T \cdot m_2 \cdot {}^{i|2}\tilde{r}_{2I} \cdot \left({}^{i}\dot{\tilde{\phi}}_2^{:2} \cdot {}^{i|2}r_{2I}\right) = m_2 \cdot \dot{\phi}_2^{i:2} \cdot 1^{[3]} \cdot \begin{bmatrix} 0 & 0 & l_{2I} S_2^i \\ 0 & 0 & -l_{2I} C_2^i \\ -l_{2I} S_2^i & l_{2I} C_2^i & 0 \end{bmatrix} \cdot \begin{bmatrix} 0 & -1 & 0 \\ 1 & 0 & 0 \\ 0 & 0 & 0 \end{bmatrix}^2 \cdot \begin{bmatrix} l_{2I} C_2^i \\ l_{2I} S_2^i \\ 0 \end{bmatrix} = 0 . \tag{4.222} $$

From Eqs. (4.87), (4.95). (4.97), and (4.101)-(4.105), then $$\begin{aligned}&{}^{i|1}n_2^T \cdot m_2 \cdot {}^{i|2}\tilde{r}_{2I} \cdot {}^{i}\dot{\tilde{\phi}}_1^{:2} \cdot {}^{i|1}r_2 = m_2 \cdot {}^i\dot{\tilde{\phi}}_1^{:2} \cdot 1^{[3]} \\ &\begin{bmatrix}0&0&l_{2I}S_2^i\\0&0&-l_{2I}C_2^i\\-l_{2I}S_2^i & l_{2I}C_2^i & 0\end{bmatrix} \cdot \begin{bmatrix}0&-1&0\\1&0&0\\0&0&0\end{bmatrix}^2 \cdot \begin{bmatrix}l_1C_1^i\\l_1S_1^i\\0\end{bmatrix} \cdot \\ &= m_2(l_1l_{2I}C_1^iS_2^i - l_1l_{2I}S_1^iC_2^i){}^i\dot\phi_1^{i:2} = m_2l_1l_{2I}S_2^1\dot\phi_1^{i:2}\end{aligned} \tag{4.223}$$

From Eqs. (4.87), (4.65), and (4.100), then $$\begin{aligned}&{}^{i|1}n_2^T \cdot {}^{2|i}\dot{\tilde\phi}_2 \cdot {}^{i|2I}J_{2I} \cdot {}^i\dot\phi_2 = \dot\phi_1^{i:2} \cdot 1^{[3]} \cdot \begin{bmatrix}0&-1&0\\1&0&0\\0&0&0\end{bmatrix} \cdot \\ &\begin{bmatrix}C_2^i&-S_2^i&0\\S_2^i&C_2^i&0\\0&0&1\end{bmatrix} \cdot \begin{bmatrix}*&*&**&*&**&*&J_{2I}\end{bmatrix} \cdot \begin{bmatrix}C_2^i&S_2^i&0\\-S_2^i&C_2^i&0\\0&0&1\end{bmatrix} \cdot 1^{[2]} = 0\end{aligned} \tag{4.224}$$

From Eqs. (4.87), (4.89), and (4.95), then $$\begin{aligned}&{}^{i|1}n_2^T \cdot m_2 \cdot {}^{i|2}\tilde r_{2I} \cdot {}^i g_{2I} = -m_2 g \cdot 1^{[3]} \cdot \begin{bmatrix}0&0&l_{2I}S_2^i\\0&0&-l_{2I}C_2^i\\-l_{2I}S_2^i&l_{2I}C_2^i&0\end{bmatrix} \cdot \\ &1^{[y]} = -m_2 g \cdot l_{2I}C_2^i\end{aligned} \tag{4.225}$$

Let Eqs. (4.222)-(4.225) be substituted into Eq. (4.213), then $$\begin{aligned}&{}^{i|1}n_2^T \cdot h_R^{[2]} = m_2(l_1l_{2I}C_1^iS_2^i - l_1l_{2I}S_1^iC_2^i)\dot\phi_1^{i:2} + m_2g \cdot l_{2I}C_2^i \\ &= m_2l_1l_{2I}S_2^i\dot\phi_1^{i:2} + m_2gl_{2I}C_2^i\end{aligned} \tag{4.226}$$

Eqs. (4.201), (4.211), (4.213) and (4.226), we obtain the dynamic equation of the system $$\begin{aligned}&\begin{bmatrix} m_1l_{1I}^2 + J_{1I} + J_{2I} + m_2(l_1^2 + 2l_1l_{2I}C_2^1 + l_{2I}^2) & m_2(l_{2I}^2 + l_1l_{2I}C_2^1) + J_{2I} \\ m_2 \cdot (l_{2I}^2 + l_1l_{2I}C_2^1) + J_{2I} & m_2l_{2I}^2 + J_{2I}\end{bmatrix} \cdot \begin{bmatrix}\ddot\phi_1^i\\ \ddot\phi_2^1\end{bmatrix} + \\ &\begin{bmatrix} -m_2l_1l_{2I}^2S_2^1\left(\dot\phi_2^{i:2} + 2\dot\phi_1^i\dot\phi_2^1\right) \\ m_2l_1l_{2I}S_2^1\dot\phi_1^{i:2}\end{bmatrix} + \begin{bmatrix} m_1gl_{1I}C_1^1 + m_2g\left(l_1C_1^i + l_{2I}C_2^i\right) \\ m_2gl_{2I}C_2^i\end{bmatrix} = \begin{bmatrix}\tau_1^i\\ \tau_2^i\end{bmatrix}\end{aligned} \tag{4.227}$$

By comparing equation (4.72) and (4.227), the two equations are the same. It is clear that the proof process is tedious because the 2R Robo-Arm has specific structural parameters; the Ju-Kane dynamics canonical equation is for the general configuration and structural parameters. Q.E.D.

EXAMPLE 4.8. Establish the dynamic equation of the system shown in example 4.2 with the Ju-Kane canonical form theorem, and prove the equivalence of the two equations.

SOLUTION: STEP 1. Establish the iterative kinematics equation based on the Axis-Invariant and the expressions of the Axis-Invariant, DCM, position, translation velocity and rotation velocity, and refer to example 4.2.

STEP 2. From Eqs. (4.202)-(4.206), we obtain $$\begin{aligned}&{}^in_1^T \cdot M_P^{[1][*]} \cdot \ddot q = {}^in_1^T \cdot (m_1 \cdot 1 + m_2 \cdot 1) \cdot {}^in_1 \cdot \ddot q_1^i + {}^in_1^T \cdot \\ &(-m_2 \cdot {}^{i|2}\tilde r_{2I}) \cdot {}^{i|1}n_2 \cdot \ddot q_2^1 = (m_1 + m_2) \cdot 1^{[1]} \cdot 1^{[x]} \cdot \ddot q_1^i - m_2 \cdot \\ &1^{[1]} \cdot \begin{bmatrix}0&0&-l_2C_2^1\\0&0&-l_2S_2^1\\l_2C_2^1&l_2S_2^1&0\end{bmatrix} \cdot 1^{[z]} \cdot \ddot q_2^1 = (m_1 + m_2)\ddot q_1^i + m_2l_2C_2^1\ddot q_2^1,\end{aligned}$$

$$\begin{aligned}&{}^{i|1}n_2^T \cdot M_R^{[2][*]} \cdot \ddot q = {}^{i|1}n_2^T \cdot (m_2 \cdot {}^{i|2}\tilde r_{2I}) \cdot {}^in_1 \cdot \ddot q_1^i \\ &+ {}^{i|1}n_2^T \cdot ({}^{i|2I}J_{2I} - m_2 \cdot {}^{i|2}\tilde r_{2I}^2) \cdot {}^{i|1}n_2 \cdot \ddot q_2^1 \\ &= 1^{[3]} \cdot \left(m_2 \cdot \begin{bmatrix}0&0&-l_2C_2^1\\0&0&-l_2S_2^1\\l_2C_2^1&l_2S_2^1&0\end{bmatrix}\right) \cdot 1^{[x]} \cdot \ddot q_1^i + 1^{[3]} \cdot \\ &\left(0 - m_2 \cdot \begin{bmatrix}0&0&-l_2C_2^1\\0&0&-l_2S_2^1\\l_2C_2^1&l_2S_2^1&0\end{bmatrix} \cdot \begin{bmatrix}0&0&-l_2C_2^1\\0&0&-l_2S_2^1\\l_2C_2^1&l_2S_2^1&0\end{bmatrix}\right) \cdot 1^{[z]} \cdot \ddot q_2^i, \\ &= m_2l_2C_2^1\ddot q_1^i + m_2l_2^2\ddot q_2^i\end{aligned}$$

$$\begin{aligned}&{}^in_1^T \cdot h_P^{[1]} = {}^in_1^T \cdot \begin{pmatrix} m_2 \cdot \left({}^i\dot{\tilde\phi}_2^{:2} \cdot {}^{i|2}r_{2I} + 2 \cdot {}^i\dot{\tilde\phi}_2 \cdot {}^{i|2}\dot r_{2I}\right) \\ -m_1 \cdot {}^ig_{1I} - m_2 \cdot {}^ig_{2I}\end{pmatrix} \\ &= 1^{[1]} \cdot \left(m_2 \cdot \begin{bmatrix}0&-\dot\phi_2^1&0\\ \dot\phi_2^1&0&0\\0&0&0\end{bmatrix} \cdot \begin{bmatrix}l_2S_2^1\\-l_2C_2^1\\0\end{bmatrix} + (m_1 + m_2) \cdot g \cdot 1^{[y]}\right), \\ &= -m_2l_2S_2^1\dot\phi_2^{1:2} = -m_2l_2S_2^1\dot q_2^{1:2}\end{aligned}$$

$$\begin{aligned}&{}^{i|1}n_2^T \cdot h_R^{[2]} = {}^{i|1}n_2^T \cdot \begin{pmatrix} m_2 \cdot {}^{i|2}\tilde r_{2I} \cdot \left({}^i\dot{\tilde\phi}_2^{:2} \cdot {}^{i|2}r_{2I} + 2 \cdot {}^i\dot{\tilde\phi}_2 \cdot {}^{i|2}\dot r_{2I}\right) \\ + {}^i\dot{\tilde\phi}_2 \cdot {}^{i|2I}J_{2I} \cdot {}^i\dot\phi_2 - m_2 \cdot {}^{i|2}\tilde r_{2I} \cdot {}^ig_{2I}\end{pmatrix} \\ &= m_2 \cdot 1^{[3]} \cdot \begin{bmatrix}0&0&-l_2C_2^1\\0&0&-l_2S_2^1\\l_2C_2^1&l_2S_2^1&0\end{bmatrix} \cdot \begin{bmatrix}0&-\dot\phi_2^1&0\\ \dot\phi_2^1&0&0\\0&0&0\end{bmatrix} \cdot \begin{bmatrix}l_2S_2^1\\-l_2C_2^1\\0\end{bmatrix} \cdot \\ &-m_2 \cdot 1^{[3]} \cdot \begin{bmatrix}0&0&-l_2C_2^1\\0&0&-l_2S_2^1\\l_2C_2^1&l_2S_2^1&0\end{bmatrix} \cdot \begin{bmatrix}0\\-g\\0\end{bmatrix} = m_2l_2S_2^1g\end{aligned}$$

STEP 3. From Eq. (4.207), find the external resultant force and the external resultant torque $$f_1^{iL} = f_u^c + \tilde r_u^{\bar u} \cdot G(f_u^c) + {}^{i|\bar u}n_u^T \cdot \sum_l^{uL}\left({}^{iS}f_{lS}\right) = -kr_1^i \cdot 1^{[1]} \cdot 1^{[x]} = -kr_1^i,$$

$$\tau_2^{iL} = 0.$$

$\tau_2^{iL}=0.$

STEP 4. Sort out Eq. (4.201) to obtain, $$\begin{bmatrix}m_1 + m_2 & m_2l_2C_2^1\\ m_2l_2C_2^1 & m_2l_2^2\end{bmatrix} \cdot \begin{bmatrix}\ddot r_1^i\\ \ddot\phi_2^1\end{bmatrix} = \begin{bmatrix}m_2l_2S_2^1\dot\phi_2^{1:2} - kr_1^i\\ -m_2gl_2S_2^1\end{bmatrix}.$$

Obviously, the equation is consistent with Eq. (4.85).

EXAMPLE 4.8. Following the example 4.6, obtain the generalized mass matrix of the system with the Ju-Kane canonical equation and distinguish whether it is the same as the generalized mass matrix obtained by applying the Ju-Kane theorem.

SOLUTION: From Eq. (4.208), then $$\begin{aligned} {}^{i}n_1^T \cdot M_R^{[1][*]} \cdot \ddot{q} = {}^{i}n_1^T \cdot \begin{pmatrix} {}^{i|1I}J_{1I} - m_1 \cdot {}^{i|1}\tilde{r}_{1I}^2 + {}^{i|2I}J_{2I} - m_2 \\ \cdot {}^{i|1}\tilde{r}_{2I}^2 + {}^{i|3I}J_{3I} - m_3 \cdot {}^{i|1}\tilde{r}_{3I}^2 \end{pmatrix} \\ \cdot {}^{i}n_1 \cdot \ddot{\phi}_1^i + {}^{i}n_1^T \cdot \begin{pmatrix} {}^{i|2I}J_{2I} - m_2 \cdot {}^{i|1}\tilde{r}_{2I} \cdot {}^{i|2}\tilde{r}_{2I} \\ + {}^{i|3I}J_{3I} - m_3 \cdot {}^{i|1}\tilde{r}_{3I} \cdot {}^{i|2}\tilde{r}_{3I} \end{pmatrix} \cdot {}^{i|1}n_2 \cdot \ddot{\phi}_2^1, \\ + {}^{i}n_1^T \cdot \left({}^{i|3I}J_{3I} - m_3 \cdot {}^{i|1}\tilde{r}_{3I} \cdot {}^{i|3}\tilde{r}_{3I}\right) \cdot {}^{i|2}n_3 \cdot \ddot{\phi}_3^2 \end{aligned} \quad (4.228)$$

$$\begin{aligned} {}^{i|1}n_2^T \cdot M_R^{[2][*]} \cdot \ddot{q} = {}^{i|1}n_2^T \cdot \begin{pmatrix} {}^{i|2I}J_{2I} - m_2 \cdot {}^{i|2}\tilde{r}_{2I}^2 \\ + {}^{i|3I}J_{3I} - m_3 \cdot {}^{i|2}\tilde{r}_{3I}^2 \end{pmatrix} \cdot {}^{i}n_1 \cdot \ddot{\phi}_1^i + \\ {}^{i|1}n_2^T \cdot \left({}^{i|2I}J_{2I} - m_2 \cdot {}^{i|2}\tilde{r}_{2I}^2 + {}^{i|3I}J_{3I} - m_3 \cdot {}^{i|2}\tilde{r}_{3I}^2\right) \cdot {}^{i|1}n_2 \cdot \ddot{\phi}_2^1, \\ + {}^{i}n_2^T \cdot \left({}^{i|3I}J_{3I} - m_3 \cdot {}^{i|2}\tilde{r}_{3I} \cdot {}^{i|3}\tilde{r}_{3I}\right) \cdot {}^{i|2}n_3 \cdot \ddot{\phi}_3^2 \end{aligned} \quad (4.229)$$

$$\begin{aligned} {}^{i|2}n_3^T \cdot M_R^{[3][*]} \cdot \ddot{q} = {}^{i|2}n_3^T \cdot \left({}^{i|3I}J_{3I} - m_3 \cdot {}^{i|3}\tilde{r}_{3I}^2\right) \cdot {}^{i}n_1 \cdot \ddot{\phi}_1^i \\ + {}^{i|2}n_3^T \cdot \left({}^{i|3I}J_{3I} - m_3 \cdot {}^{i|3}\tilde{r}_{3I}^2\right) \cdot {}^{i|1}n_2 \cdot \ddot{\phi}_2^1 . \\ + {}^{i|2}n_3^T \cdot \left({}^{i|3I}J_{3I} - m_3 \cdot {}^{i|3}\tilde{r}_{3I}^2\right) \cdot {}^{i|2}n_3 \cdot \ddot{\phi}_3^2 \end{aligned} \quad (4.230)$$

From Eqs. (4.228), (4.229) and (4.230), we obtain Eq. (4.176). This indirectly proves the correctness of the Ju-Kane canonical equations. Solution is finished.

EXAMPLE 4.9 The 6R Robo-Arm iL={A,K,T,NT,F,B}, A=(i,1:6], NT=∅, K=[${}^{\bar{l}}k_l$|l∈A, ${}^{\bar{l}}k_l$ ∈R] is given; the non-measurable action force is denoted as ${}^{iS}f_{6S}$, and the driving torque of each axis is [$\tau_u^{\ d}$|u∈A]; the external action torque [$\tau_u^{\ iL}$|u∈A] calculated with Eq. (4.207).

SOLUTION: Since ${}^{iS}f_{6S}$ is non-detectable, in the Force-Position Control, the force control of the Driving-Axis is required for offset; so, it is expected to solve and obtain the total control torque of the Driving-Axis through the dynamic equation. From Eq. (4.207), then $$\tau_u^c = \tau_u^d + {}^{i|\bar{u}}n_u^T \cdot {}^{i|u}\tilde{r}_{6S} \cdot {}^{is}f_{6S}, \quad (4.231)$$

where $\tau_u^{\ c}$ is the resultant torque of the axis u, and $\tau_u^{\ d}$ is the driving torque of the Driving-Axis. Solution is finished.

Inertia Matrix of Axis-Chain Rigid Body

The generalized inertia matrix of the Axis-Chain rigid-body expressed according to the Motion-Axis type and the 3D natural-coordinate frame is called the Axis-Chain rigid-body inertia matrix, which is referred to as the Axis-Chain inertia matrix. From Eqs. (4.244) and (4.247), then $$M_P^{[u][l]} = \left\| \begin{matrix} -\sum_j^{uL}\left(m_j \cdot {}^{i|l}\tilde{r}_{jI}\right) \\ \sum_j^{uL}(m_j) \end{matrix} \right\|, \quad M_P^{[u][k]} = \left\| \begin{matrix} -\sum_j^{kL}\left(m_j \cdot {}^{i|k}\tilde{r}_{jI}\right) \\ \sum_j^{kL}(m_j) \end{matrix} \right\|, \quad (4.232)$$

$$M_R^{[u][l]} = \left\| \begin{matrix} \sum_j^{uL}\begin{pmatrix} {}^{i|jI}J_{jI} - m_j \cdot \\ {}^{i|u}\tilde{r}_{jI} \cdot {}^{i|l}\tilde{r}_{jI} \end{pmatrix} \\ \sum_j^{uL}\left(m_j \cdot {}^{i|u}\tilde{r}_{jI}\right) \end{matrix} \right\|, \quad M_R^{[u][k]} = \left\| \begin{matrix} \sum_j^{kL}\begin{pmatrix} {}^{i|jI}J_{jI} - m_j \\ \cdot {}^{i|u}\tilde{r}_{jI} \cdot {}^{i|k}\tilde{r}_{jI} \end{pmatrix} \\ \sum_j^{kL}\left(m_j \cdot {}^{i|u}\tilde{r}_{jI}\right) \end{matrix} \right\|. \quad (4.233)$$

From Eqs. (4.232) and (4.233), we know that the above Axis-Chain inertia matrix is a 3×3 matrix, which is four times smaller than the traditional 6×6 generalized inertia matrix; accordingly, the computational complexity of the inverse is often four times smaller than that of the traditional inertia matrix.

The energy $\varepsilon_{uL}^{\ i}$ of the closed subtree ${}_{uL}$ is expressed as $$\varepsilon_{uL}^i = \frac{1}{2} \cdot \sum_j^{uL}\left({}^{i}\dot{\phi}_j^T \cdot {}^{i|jI}J_{jI} \cdot {}^{i}\dot{\phi}_j\right) + \frac{1}{2} \cdot \sum_j^{uL}\left(m_j \cdot {}^{i}\dot{r}_{jI}^T \cdot {}^{i}\dot{r}_{jI}\right). \quad (4.234)$$

If ${}^{\bar{u}}k_u$∈P, k∈${}^{i}1_{\bar{u}}$, l∈${}^{u}$L, then From Eqs. (4.32)-(4.34) and (4.234), then $${}^{i|\bar{u}}n_u^T \cdot M_P^{[u][l]} \cdot {}^{i|\bar{l}}n_l = \left\| \begin{matrix} \dfrac{\partial^2 \varepsilon_{uL}^i}{\partial \dot{r}_u^{\bar{u}} \partial \dot{\phi}_l^{\bar{l}}} \\ \dfrac{\partial^2 \varepsilon_{uL}^i}{\partial \dot{r}_u^{\bar{u}} \partial \dot{r}_l^{\bar{l}}} \end{matrix} \right\| = \left\| \begin{matrix} -{}^{i|\bar{u}}n_u^T \cdot \sum_j^{uL}\left(m_j \cdot {}^{i|l}\tilde{r}_{jI}\right) \cdot {}^{i|\bar{l}}n_l \\ {}^{i|\bar{u}}n_u^T \cdot \sum_j^{uL}(m_j) \cdot {}^{i|\bar{l}}n_l \end{matrix} \right\|, \quad (4.235)$$

$${}^{i|\bar{u}}n_u^T \cdot M_P^{[u][k]} \cdot {}^{i|\bar{k}}n_k = \left\| \begin{matrix} \dfrac{\partial^2 \varepsilon_{uL}^i}{\partial \dot{r}_u^{\bar{u}} \partial \dot{\phi}_k^{\bar{k}}} \\ \dfrac{\partial^2 \varepsilon_{uL}^i}{\partial \dot{r}_u^{\bar{u}} \partial \dot{r}_k^{\bar{k}}} \end{matrix} \right\| = \left\| \begin{matrix} -{}^{i|\bar{u}}n_u^T \cdot \sum_j^{uL}\left(m_j \cdot {}^{i|k}\tilde{r}_{jI}\right) \cdot {}^{i|\bar{k}}n_k \\ {}^{i|\bar{u}}n_u^T \cdot \sum_j^{uL}(m_j) \cdot {}^{i|\bar{k}}n_k \end{matrix} \right\|, \quad (4.236)$$

If ${}^{\bar{u}}k_u \in R$, $k \in {}^{i}1_{\bar{u}}$, $l \in {}^{u}L$, then From Eqs. (4.32) – (4.34) and (4.234), then $${}^{i|\bar{u}}n_u^T \cdot M_R^{[u][l]} \cdot {}^{i|\bar{l}}n_l = \left\| \begin{matrix} \dfrac{\partial^2 \varepsilon_{uL}^i}{\partial \dot{\phi}_u^{\bar{u}} \partial \dot{\phi}_l^{\bar{l}}} \\ \dfrac{\partial^2 \varepsilon_{uL}^i}{\partial \dot{\phi}_u^{\bar{u}} \partial \dot{r}_l^{\bar{l}}} \end{matrix} \right\| = \left\| \begin{matrix} {}^{i|\bar{u}}n_u^T \cdot \sum_j^{uL}\begin{pmatrix} {}^{i|jI}J_{jI} - m_j \cdot \\ {}^{i|u}\tilde{r}_{jI} \cdot {}^{i|l}\tilde{r}_{jI} \end{pmatrix} \cdot {}^{i|\bar{l}}n_l \\ -{}^{i|\bar{u}}n_u^T \cdot \sum_j^{uL}\left(m_j \cdot {}^{i|u}\tilde{r}_{jI}\right) \cdot {}^{i|\bar{l}}n_l \end{matrix} \right\|, \quad (4.237)$$

$${}^{i|\bar{u}}n_u^T \cdot M_R^{[u][k]} \cdot {}^{i|\bar{k}}n_k = \left\| \begin{matrix} \dfrac{\partial^2 \varepsilon_{uL}^i}{\partial \dot{\phi}_u^{\bar{u}} \partial \dot{\phi}_k^{\bar{k}}} \\ \dfrac{\partial^2 \varepsilon_{uL}^i}{\partial \dot{\phi}_u^{\bar{u}} \partial \dot{r}_k^{\bar{k}}} \end{matrix} \right\| = \left\| \begin{matrix} {}^{i|\bar{u}}n_u^T \cdot \sum_j^{uL}\begin{pmatrix} {}^{i|jI}J_{jI} - m_j \cdot \\ {}^{i|u}\tilde{r}_{jI} \cdot {}^{i|k}\tilde{r}_{jI} \end{pmatrix} \cdot {}^{i|\bar{k}}n_k \\ -{}^{i|\bar{u}}n_u^T \cdot \sum_j^{uL}\left(m_j \cdot {}^{i|u}\tilde{r}_{jI}\right) \cdot {}^{i|\bar{k}}n_k \end{matrix} \right\|. \quad (4.238)$$

Let $${}^{u}_{\uparrow}\tilde{r}_{II} = \begin{cases} {}^{u}\tilde{r}_{II} & \text{if } {}^{\bar{u}}k_u \in R \\ 1 & \text{if } {}^{\bar{u}}k_u \in P \end{cases}, \quad (4.239)$$

$$\delta_u = \begin{cases} -1 & \text{if } {}^{\bar{u}}k_u \in R \\ 1 & \text{if } {}^{\bar{u}}k_u \in P \end{cases}; \quad (4.240)$$

And $${}^{lI}_{\uparrow}J_{II} = -\sum_S^{\Omega_l}\left(m_l^{[S]} \cdot {}^{i|lI}_{\uparrow}\tilde{r}_{lS}\right) = \begin{cases} {}^{lI}J_{II} & \text{if } {}^{\bar{l}}k_l \in R \\ 0 & \text{if } {}^{\bar{l}}k_l \in P \end{cases}, \quad (4.241)$$

So, $M^{[u][k]}$ can be denoted as $$M^{[u][k]} = \sum_l^{uL}\left({}^{i|lI}_{\uparrow}J_{II} + \delta_k \cdot m_l \cdot {}^{i|u}_{\uparrow}\tilde{r}_{II} \cdot {}^{i|k}_{\uparrow}\tilde{r}_{II}\right). \quad (4.242)$$

In Eq. (4.242) $M^{[u][k]}$ is the 3×3 inertia matrix (AGIM), and $\delta_k$ is called as the Axis-Type function.

Characteristics of Axis-Chain Rigid Body Generalized Inertia Matrix

The rigid MAS iL={A,K,T,NT,F,B}, NT=ø; l,u∈iL, k∈uL is given; the Axis-Chain rigid-body inertia matrix of the system is symmetrical, i.e.

$$M^{[u][l]}=M^{[l][u]:T}, M^{[u][k]}=M^{[k][u]:T}. \quad (4.243)$$

PROOF: Obviously, then u≥l. If $^{\bar{u}}k_u \in P$, From Eq. (4.203), then $$M_P^{[u][l]} = \left\| \begin{matrix} -\sum_j^{uL}(m_j \cdot {}^{i|l}\tilde{r}_{jI}) \\ \sum_j^{uL}(m_j)\cdot 1 \end{matrix} \right\|,\quad M_P^{[u][k]} = \left\| \begin{matrix} -\sum_j^{kL}(m_j \cdot {}^{i|k}\tilde{r}_{jI}) \\ \sum_j^{kL}(m_j)\cdot 1 \end{matrix} \right\|, \tag{4.244}$$

$$M_P^{[l][u]} = \left\| \begin{matrix} -\sum_j^{uL}(m_j \cdot {}^{i|u}\tilde{r}_{jI}) \\ \sum_j^{uL}(m_j)\cdot 1 \end{matrix} \right\|,\quad M_P^{[k][u]} = \left\| \begin{matrix} -\sum_j^{kL}(m_j \cdot {}^{i|k}\tilde{r}_{jI}) \\ \sum_j^{kL}(m_j)\cdot 1 \end{matrix} \right\|. \tag{4.245}$$

From Eqs. (4.244) and (4.245), then $$M_R^{[u][l]} = M_R^{[l][u]:T},\ M_R^{[u][k]} = M_R^{[k][u]:T}. \tag{4.246}$$

If $^{\bar{u}}k_u \in R$, From Eq. (4.206), then $$M_R^{[u][l]} = \left\| \begin{matrix} \sum_j^{uL}\left( \begin{matrix} {}^{i|jI}J_{jI} - m_j \cdot \\ \backslash {}^{i|u}\tilde{r}_{jI} \cdot {}^{i|l}\tilde{r}_{jI} \end{matrix} \right) \\ O \end{matrix} \right\|,\quad M_R^{[u][k]} = \left\| \begin{matrix} \sum_j^{kL}\left( \begin{matrix} {}^{i|jI}J_{jI} - m_j \cdot \\ \backslash {}^{i|u}\tilde{r}_{jI} \cdot {}^{i|k}\tilde{r}_{jI} \end{matrix} \right) \\ O \end{matrix} \right\|, \tag{4.247}$$

$$M_R^{[l][u]} = \left\| \begin{matrix} \sum_j^{uL}\left( \begin{matrix} {}^{i|jI}J_{jI} - m_j \cdot \\ \backslash {}^{i|l}\tilde{r}_{jI} \cdot {}^{i|u}\tilde{r}_{jI} \end{matrix} \right) \\ O \end{matrix} \right\|,\quad M_R^{[k][u]} = \left\| \begin{matrix} \sum_j^{kL}\left( \begin{matrix} {}^{i|jI}J_{jI} - m_j \cdot \\ \backslash {}^{i|k}\tilde{r}_{jI} \cdot {}^{i|u}\tilde{r}_{jI} \end{matrix} \right) \\ O \end{matrix} \right\|. \tag{4.248}$$

From Eqs. (4.247), (4.248) and $$^{i|l}\tilde{r}_{jI} \cdot {}^{i|u}\tilde{r}_{jI} = {}^{i|u}\tilde{r}_{jI} \cdot {}^{i|l}\tilde{r}_{jI},$$

then $$M_R^{[u][l]} = M_R^{[l][u]:T},\ M_R^{[u][k]} = M_R^{[k][u]:T}. \tag{4.249}$$

Denote |A|=a, and denote the generalized inertia matrix of the system with a axes as $M_{3a\times 3a}$. From Eq. (4.243), then $$M_{3a\times 3a} = M_{3a\times 3a}^T. \tag{4.250}$$

The Axis-Chain rigid-body inertia matrix $M_{3a\times 3a}$ in Eq. (4.250) is symmetrical, and its element, i.e. Axis-Chain inertia matrix, is 3×3 matrix.

The rigid MAS iL={A,K,T,NT,F,B}, NT=ø is given; the element of the axis-rigid-body inertia matrix has the following characteristics:

[1] If $^{\bar{u}}k_u \in P$, $^{\bar{l}}k_l \in [R,P]$, $^{\bar{k}}k_k \in [R,P]$, From Eq. (4.203) we know $M_P^{[u][l]}$ and $M_P^{[u][k]}$ are symmetrical matrixes;

[2] If $^{\bar{u}}k_u \in R$, $^{\bar{l}}k_l \in R$, $^{\bar{k}}k_k \in R$, From Eq. (4.206) we know $M_R^{[u][l]}$ and $M_R^{[u][k]}$ are symmetrical matrixes;

[3] If $^{\bar{u}}k_u \in R$, $^{\bar{l}}k_l \in P$, $^{\bar{k}}k_k \in P$, From Eq. (4.206) we know $M_R^{[u][l]}$ is an anti-symmetrical matrix;

From the above, we know that the element of the Axis-Chain inertia matrix may be not symmetrical.

The Axis-Chain $^{\bar{u}}1_u = (\bar{u}, u1, u2, u3, u4, u5, u]$ is given; the Cartesian-Axis SEQS is denoted as $e_u = [e_u^{[1]}, e_u^{[2]}, e_u^{[3]}, e_u^{[4]}, e_u^{[5]}, e_u^{[6]}]$, where $[e_u^{[1]}, e_u^{[2]}, e_u^{[3]}]$ is the rotational axis SEQS, $[e_u^{[4]}, e_u^{[5]}, e_u^{[6]}]$ is the translational axis SEQS, and there are $^{u|}e_u^{[1]} = {}^{u|}e_u^{[4]} = 1^{[x]}$, $^{u|}e_u^{[2]} = {}^{u|}e_u^{[5]} = 1^{[y]}$, $^{u|}e_u^{[3]} = {}^{u|}e_u^{[6]} = 1^{[z]}$. The joint variable SEQS is $q_{(\bar{u},u]} = [\phi_1^{u}, \phi_2^{1}, \phi_3^{2}, r_4^{3}, r_5^{4}, r_u^{5}]^T$. From Eq. (4.203), then $$M^{[u][*]}\cdot\ddot{q} = \sum_l^{i_{1_u}} \left( \left[ \begin{matrix} \sum_k^{uL}\left({}^{i|kI}J_{kI} - m_k \cdot {}^{i|u}\tilde{r}_{kI} \cdot {}^{i|l}\tilde{r}_{kI}\right) & 0 \\ -\sum_k^{uL}\left(m_k \cdot {}^{i|l}\tilde{r}_{kI}\right) & \sum_k^{uL}(m_k)\cdot 1 \end{matrix} \right] \cdot \left[ \begin{matrix} {}^{i|\bar{l}}\ddot{\phi}_l \\ {}^{i|\bar{l}}\ddot{r}_l \end{matrix} \right] \right)$$

$$\backslash + \sum_k^{uL} \left( \left[ \begin{matrix} \sum_j^{kL}\left({}^{i|jI}J_{jI} - m_j \cdot {}^{i|u}\tilde{r}_{jI} \cdot {}^{i|k}\tilde{r}_{jI}\right) & 0 \\ -\sum_j^{kL}\left(m_j \cdot {}^{i|k}\tilde{r}_{jI}\right) & \sum_j^{kL}(m_j)\cdot 1 \end{matrix} \right] \cdot \left[ \begin{matrix} {}^{i|\bar{k}}\ddot{\phi}_k \\ {}^{i|\bar{k}}\ddot{r}_k \end{matrix} \right] \right).$$

Obviously, then u=uL, $m_t=0$, $^{lI}J_{lI}=0$; from the above Eqs., we obtain $$M^{[u][u]} = \left[ \begin{matrix} {}^{i|uI}J_{uI} & 0 \\ -m_u \cdot {}^{i|u}\tilde{r}_{uI} & m_u \cdot 1 \end{matrix} \right]. \tag{4.251}$$

Obviously, the 3D inertia matrix and the 6D inertia matrix with respect to Cartesian-Axes are different, but both are equivalent.

Axis-Chain Rigid Body Generalized Inertia Matrix

The generalized inertia matrix of the rigid MAS expressed according to the Natural-Axis type is called the generalized Natural-Axis inertia matrix of rigid MASs, and is referred to as the generalized inertia matrix of the Axis-Chain.

Define the orthogonal complement matrix $\mathcal{A}_{3a\times 3a}$ and the corresponding skew-symmetric matrix $\tilde{\mathcal{A}}_{3a\times 3a}$, $$\mathcal{A}_{3a\times 3a} \triangleq \mathrm{Diag}({}^{i}n_1, \ldots, {}^{i|\bar{k}}n_k, \ldots, {}^{i|\bar{a}}n_a), \tag{4.252}$$

$$\tilde{\mathcal{A}}_{3a\times 3a} \triangleq \mathrm{Diag}({}^{i}\tilde{n}_1, \ldots, {}^{i|\bar{k}}\tilde{n}_k, \ldots, {}^{i|\bar{a}}\tilde{n}_a), \tag{4.253}$$

From Eq. (4.252), then $$\mathcal{A}_{3a\times a}^T \cdot \mathcal{A}_{3a\times a} = 1_{a\times a}, \tag{4.254}$$

$$\mathcal{A}_{3a\times a} \cdot \mathcal{A}_{3a\times a}^T = \mathrm{Diag}\left( \begin{matrix} {}^{i}n_1, \ldots\ {}^{i|\bar{k}}n_k, \\ \backslash \ldots, {}^{i|\bar{a}}n_a \end{matrix} \right) \cdot \mathrm{Diag}\left( \begin{matrix} {}^{i}n_1^T, \ldots\ {}^{i|\bar{k}}n_k^T, \\ \backslash \ldots, {}^{i|\bar{a}}n_a^T \end{matrix} \right). \tag{4.255}$$

Considering $^{\bar{l}}\tilde{n}_l{}^{:2} = {}^{\bar{l}}n_l \cdot {}^{\bar{l}}n_l^T - 1$ obtained From Eqs. (4.35) and (4.255), then $$\mathcal{A}_{3a\times a} \cdot \mathcal{A}_{3a\times a}^T = \mathrm{Diag}\left( \begin{matrix} 1 + {}^{i}\tilde{n}_1^{:2}, \ldots, 1 + {}^{i|\bar{k}}\tilde{n}_k^{:2}, \\ \backslash \ldots, 1 + {}^{i|\bar{a}}\tilde{n}_a^{:2} \end{matrix} \right) = 1_{3a\times 3a} \cdot \tilde{\mathcal{A}}_{3a\times 3a}^{:2}; \tag{4.256}$$

Obviously, $\mathcal{A}_{3a\times 3a} \cdot \mathcal{A}_{3a\times 3a}^T$ is a symmetric matrix.

From Eq. (4.250), then $$\mathcal{M}_{a\times a}^T = (\mathcal{A}_{3a\times 3a}^T \cdot M_{3a\times 3a} \cdot \mathcal{A}_{3a\times 3a})^T = \mathcal{A}_{3a\times 3a}^T \cdot M_{3a\times 3a}^T \cdot \mathcal{A}_{3a\times a}$$

$$= \mathcal{A}_{3a\times a}^T \cdot M_{3a\times 3a} \cdot \mathcal{A}_{3a\times a} = \mathcal{M}_{a\times a}. \tag{4.257}$$

Eq. (4.257) shows that $\mathcal{M}_{a\times a}$ is symmetrical; it is called the generalized inertia matrix of the Axis-Chain.

From Eqs. (4.244), (4.245), (4.247) and (4.248), the computational complexity of $$\mathcal{M}_{a\times a}^{[u][k]}$$

is proportional to the number of axes of the closed subtree. So, $$O\left(\mathcal{M}_{a\times a}^{[u][k]}\right) \propto O(|kL|) < O(a). \tag{4.258}$$

For the generalized inertia matrix with respect to Axis-Chains, from Eqs. (4.258) and (4.250), we obtain the following general conclusions:

[1] If $\mathcal{M}_{a\times a}$ is calculated by a single CPU, then $O(\mathcal{M}_{a\times a})\leq O(a^2)$;

[2] If $\mathcal{M}_{a\times a}$ is calculated by a CPUs or GPUs in parallel, then $O(\mathcal{M}_{a\times a})\leq O(a)$.

Forward Solution of Tree Chain Rigid Body System Ju-Kane Dynamics Equation

Now we discuss how to obtain the forward solution of the tree chain rigid body system Ju-Kane dynamic equation. The forward solution of the dynamic equation is to find the joint acceleration or the inertial acceleration according to the dynamic equation when the driving force is given.

The rigid MAS iL={A,K,T,NT,F,B}, NT=ø is given; arrange the dynamic Eqs. (4.201) of each axis in the system in rows: denote the re-arranged axially driven generalized forces and the non-measurable constraint forces as $f^c$, and denote the measurable generalized forces as $f^i$; denote the joint acceleration SEQS as $\{\ddot{q}\}$; denote the re-arranged $h_P^{[u]}$ or $h_R^{[u]}$ as h; consider Eq. (4.252); then the dynamic equation of the system is:

$$\mathcal{A}_{3a\times a}^{T}\cdot[M_{3a\times 3a}\cdot\mathcal{A}_{3a\times a}\cdot\{\ddot{q}\}+h]-\mathcal{A}_{3a\times a}^{T}\cdot f^i=f^c. \tag{4.259}$$

From Eq. (4.259), then $$\mathcal{M}_{a\times a}\cdot\{\ddot{q}\}+\mathcal{A}_{3a\times a}^{T}\cdot h-\mathcal{A}_{3a\times a}^{T}\cdot f^i=f^c, \tag{4.260}$$

where $$\mathcal{M}_{a\times a}=\mathcal{A}_{3a\times a}^{T}\cdot M_{3a\times 3a}\cdot\mathcal{A}_{3a\times a}. \tag{4.261}$$

From Eq. (4.259), then $$\{\ddot{q}\}=\mathcal{M}_{a\times a}^{-1}\cdot(f^c+\mathcal{A}_{3a\times a}^{T}\cdot f^i-\mathcal{A}_{3a\times a}^{T}\cdot h). \tag{4.262}$$

The key is how to calculate the inverse of the generalized inertia matrix of the Axis-Chain in Eq. (4.262), i.e. $\mathcal{M}_{a\times a}^{-1}$. If $\mathcal{M}_{a\times a}^{-1}$, $O(\mathcal{M}_{a\times a}^{-1})\propto a^3$ are calculated with the pivot method; obviously, the calculation cost is very high even if MAS has a few axes. So, the method is inadvisable.

From Eq. (4.257) we know that the generalized inertia matrix of the Axis-Chain $M_{a\times a}$ is a symmetric matrix, and since the system energy $\{\ddot{q}\}^T\cdot\mathcal{M}_{a\times a}\cdot\{\ddot{q}\}$ is greater than zero, it is a positive definite matrix. The effective $\mathcal{M}_{a\times a}^{-1}$ calculation process is as follows:

[1] First, implement $LDL^T$ decomposition [3], $$\mathcal{M}_{a\times a}=(1_{a\times a}+\mathcal{L}_{a\times a})\cdot D_{a\times a}\cdot(1_{a\times a}+\mathcal{L}_{a\times a}^{T}). \tag{4.263}$$

where $\mathcal{L}_{a\times a}$ is the unique lower triangular matrix, and $D_{a\times a}$ is a diagonal matrix.

[1-1] If the $LDL^T$ decomposition is done by a single CPU, the decomposition complexity is $O(a^2)$;

[1-2] if the $LDL^T$ decomposition is done by a CPUs or GPUs in parallel, the decomposition complexity is O(a);

[2] Calculate $\mathcal{M}_{a\times a}^{-1}$ with Eq. (4.264).

$$\mathcal{M}_{a\times a}^{-1}=(1_{a\times a}+\mathcal{L}_{a\times a}^{T})^{-1}\cdot D_{a\times a}^{-1}\cdot(1_{a\times a}+\mathcal{L}_{a\times a})^{-1}. \tag{4.264}$$

Let Eq. (4.264) be substituted into Eq. (4.262), then $$\{\ddot{q}\}=\left(1_{a\times a}+\mathcal{L}_{a\times a}^{T}\right)^{-1}\cdot D_{a\times a}^{-1}\cdot(1_{a\times a}+\mathcal{L}_{a\times a})^{-1}\cdot\begin{pmatrix} f^c+\mathcal{A}_{3a\times a}^{T} \\ \backslash\cdot(f^i-h)\end{pmatrix}. \tag{4.265}$$

At this point, we obtain the forward solution of the Ju-Kane dynamic equation of the Tree-Chain rigid-body system. It has the following characteristics:

[2-1] The generalized inertia matrix $\mathcal{M}_{a\times a}$ of the Axis-Chain in Eq. (4.263) based on the Ju-Kane canonical equations is only ¼ of the generalized inertia matrix $\mathcal{M}_{6a\times 6a}$ of the 6D double vector space, and the $LDL^T$ decomposition rate of $\mathcal{M}_{a\times a}$ is greatly improved. At the same time, $f^c$, $f^i$ and h in Eq. (4.265) are iteratives of the Axis-Invariants, which can guarantee the real-time performance and the accuracy of the $\ddot{q}$ solution. The Ju-Kane canonical equations has the axiomatic theoretical basis, and its physical meaning is clear; the multi-body system dynamics based on the 6D spatial operator algebra is based on the integrated incidence matrix, and both the modeling process and the forward solution process are more abstract than the Ju-Kane dynamics and solution process. The dynamics iterative method established with the reference to the Kalman filter and smoother theories, especially, lacks rigorous axiomatic analysis proof.

[2-2] The generalized inertia matrix $\mathcal{M}_{a\times a}$ of the Axis-Chain in Eq. (4.263), the $f^c$, $f^i$ and h in Eq. (4.265) can be dynamically updated according to the system structure, which can ensure the flexibility of the engineering application.

[2-3] The generalized inertia matrix $\mathcal{M}_{a\times a}$ of the Axis-Chain in Eq. (4.263), the $f^c$, $f^i$ and h in Eq. (4.265) have concise and elegant chain index systems. At the same time, they have the pseudo-code functionality implemented by the software, which can ensure the quality of engineering realization.

[2-4] Because the polarities of Natural axes can be set according to the engineering needs, the output result of the dynamic calculation does not need to be converted intermediately, which improves the application convenience and the post-processing efficiency.

Inverse Solution of Tree Chain Rigid Body System Ju-Kane Dynamics Equation

The inverse solution of the dynamic equation refers to solving the driving force or the driving torque with the known motion state, structural parameters and inertial parameters. Considering Eqs. (4.201) and (4.207), then $$\begin{cases} f_u^{iL}-{}^{i|\overline{u}}n_u^T\cdot\sum\limits_{l}^{uL}\left({}^{iS}f_{lS}\right)-\dot{r}_u^{\overline{u}}\cdot G(f_u^c)=f_u^c, & \text{if } {}^{\overline{u}}k_u\in P \\ \tau_u^{iL}-{}^{i|\overline{u}}n_u^T\cdot\sum\limits_{l}^{uL}\begin{pmatrix}{}^{i|u}\tilde{r}_{lS}\cdot{}^{iS}f_{lS} \\ \backslash+{}^{i}\tau_l\end{pmatrix}-\dot{\phi}_u^{\overline{u}}\cdot G(\tau_u^c)=\tau_u^c, & \text{if } {}^{\overline{u}}k_u\in R\end{cases}. \tag{4.266}$$

When the joint shape, the velocity and the acceleration are known, From Eq. (4.147) we obtain ${}^{i|iL}f_u$ and ${}^{i|iL}\tau_u$. Further, if the external force and the external torque are known, then solve the driving force $f_u^c$ and the driving torque $\tau_u^c$, with Eq. (4.266). Obviously, the computational complexity of the inverse solution of the dynamic equation is proportional to the cardinal number of A.

Although the dynamic inverse solution is simple, it plays a very important role in the real-time force control of MAS. When MAS has a high DOE, the real-time dynamic calculation is often an important bottleneck because the dynamic response of the force control is usually required to be 5 to 10 times higher than the frequency of the dynamic response of the motion control. On the one hand, since the Axis-Chain inertia matrix $\mathcal{M}_{3a\times 3a}$ is not only symmetrical, but also its size is ¼ of the traditional body chain inertia matrix $\mathcal{M}_{6a\times 6a}$, and the calculation quantity is much less when the generalized inertia matrix $\mathcal{M}_{a\times a}$ of the Axis-Chain is calculated with Eq. (4.261). On the other hand, the calculation quantity of the axial inertia force $\mathcal{M}_{a\times a}\cdot\ddot{q}$ of the Motion-Axis calculated with Eq. (4.260) is only 1/36 of the Newton-Euler method.

Ju-Kane Dynamic Symbol Model of the Closed-Chain Rigid Body System

The previous chapter discusses the dynamic modeling of the rigid-body system, which are based on the ideal constraint pair and the Tree-Chain topology.

The Closed-Chain rigid MAS is also applied widely; for example, the Rocker mobile MAS of the CE3 Rover is a Closed-Chain with a differential, and the heavy-duty mechanical is usually a Closed-Chain system. Meanwhile, the actual Motion-Axis usually contains the internal friction and the viscous force. In this section, we first study the Ju-Kane dynamics of the Closed-Chain rigid MAS. Then, we solve the solution problem of the constraint force of the Motion-Axis, and then discuss the internal friction and the viscous force of the Motion-Axis arced. Finally, we establish the Ju-Kane dynamic equation of the Closed-Chain rigid MAS with non-ideal constraints.

Ju-Kane Dynamics Equation of the Closed-Chain Rigid Body System

In the following, we first elaborate the Ju-Kane dynamics theorem of the Closed-Chain rigid MAS, and then prove it.

THEOREM 4.4. The rigid MAS iL={A,K,T,NT,F,B} is given, the root is used as the inertial space, ∀u,u',k,l∈A, ${}^{uS}k_{u'S}$∈NT; in addition to the gravity, the external resultant force acting on the axis u and the component of the torque on ${}^{\bar{u}}n_u$ are denoted as $f_u^{iL}$ and $\tau_u^{iL}$; The mass and rotational inertia of Axis # k are denoted as in $m_k$ and ${}^{kI}J_{kI}$ respectively; the gravity acceleration of Axis # k is ${}^{i}g_{kI}$; the bilateral driving force on the Driving-Axis u and the component on the driving torque on ${}^{\bar{u}}n_u$ are denoted as $f_u^{c}(\dot{r}_l^{l})$ and $\tau_u^{c}(\dot{\phi}_l^{l})$ respectively; the force of the environment i acting on Axis # l and the torque are denoted as ${}^{iS}f_{lS}$ and ${}^{i}\tau_l$ respectively; then the generalized restraint force of the axis to Axis # u' is denoted as ${}^{i|uS}l_{u'S}$; then there is a Ju-Kane dynamics equation of the Tree-Chain rigid MAS:

[1] The Ju-Kane dynamic canonical equations of Axes # u and # u' are $$\begin{cases} {}^{i|\bar{u}}n_u^T\cdot M_P^{[u][*]}\cdot\ddot{q}+h_P^{[u]}+{}^{i|NT}l_u) = f_u^{iL}, & \text{if } {}^{\bar{u}}k_u\in P \\ {}^{i|\bar{u}}n_u^T\cdot M_R^{[u][*]}\cdot\ddot{q}+h_R^{[u]}+{}^{i|NT}l_u) = \tau_u^{iL}, & \text{if } {}^{\bar{u}}k_u\in R \end{cases}, \tag{4.267}$$

$$\begin{cases} {}^{i|\bar{u}'}n_u^T\cdot M_P^{[u'][*]}\cdot\ddot{q}+h_P^{[u']}+{}^{i|NT}l_{u'}) = f_{u'}^{iL}, & \text{if } {}^{\bar{u}}k_{u'}\in P \\ {}^{i|\bar{u}'}n_u^T\cdot M_R^{[u'][*]}\cdot\ddot{q}+h_R^{[u']}+{}^{i|NT}l_{u'}) = \tau_{u'}^{iL}, & \text{if } {}^{\bar{u}}k_{u'}\in R \end{cases}; \tag{4.268}$$

[2] The constraint algebraic equation of the non-tree constraint pair ${}^{u}k_{u'}$ is $${}^{i|u}J_{uS}\cdot{}^{i|\bar{u}}n_u\cdot\ddot{\phi}_u^{\bar{u}}+{}^{i|u'}J_{u'S}\cdot{}^{i|\bar{u}'}n_{u'}\cdot\ddot{\phi}_{u'}^{\bar{u}'}=0,\ \text{if}\ \begin{cases}{}^{\bar{u}}k_u\in R\\ {}^{\bar{u}'}k_{u'}\in R\end{cases}, \tag{4.269}$$

-continued $${}^{i|u}J_{uS}\cdot{}^{i|\bar{u}}n_u\cdot\ddot{r}_u^{\bar{u}}+{}^{i|u'}J_{u'S}\cdot{}^{i|\bar{u}'}n_{u'}\cdot\ddot{r}_{u'}^{\bar{u}'}=0,\ \text{if}\ \begin{cases}{}^{\bar{u}}k_u\in P\\ {}^{\bar{u}'}k_{u'}\in P\end{cases}, \tag{4.270}$$

$${}^{i|u}J_{uS}\cdot{}^{i|\bar{u}}n_u\cdot\ddot{\phi}_u^{\bar{u}}+{}^{i|u'}J_{u'S}\cdot{}^{i|\bar{u}'}n_{u'}\cdot\ddot{r}_{u'}^{\bar{u}'}=0,\ \text{if}\ \begin{cases}{}^{\bar{u}}k_u\in R\\ {}^{\bar{u}'}k_{u'}\in P\end{cases}, \tag{4.271}$$

$${}^{i|u}J_{uS}\cdot{}^{i|\bar{u}}n_u\cdot\ddot{r}_u^{\bar{u}}+{}^{i|u'}J_{u'S}\cdot{}^{i|\bar{u}'}n_{u'}\cdot\ddot{\phi}_{u'}^{\bar{u}'}=0,\ \text{if}\ \begin{cases}{}^{\bar{u}}k_u\in P\\ {}^{\bar{u}'}k_{u'}\in R\end{cases}, \tag{4.272}$$

where $${}^{i|NT}l_u=\sum_{u}^{NT}\left({}^{i|u}J_{uS}^T\cdot{}^{i|u}n_{u'}\cdot l_{uS}^{u'S}\right), \tag{4.273}$$

$${}^{i|NT}l_{u'}=\sum_{u'}^{NT}\left({}^{i|u'}J_{u'S}^T\cdot{}^{i|u'}n_{u}\cdot l_{u'S}^{uS}\right),$$

$${}^{i|u}J_{uS}={}^{i|\bar{u}}\tilde{n}_u\cdot{}^{i|u}\tilde{r}_{uS},\ {}^{i|u'}J_{u'S}=-{}^{i|\bar{u}'}\tilde{r}_{u'S}\ \text{if}\ \begin{cases}{}^{\bar{u}}k_u\in R\\ {}^{\bar{u}'}k_{u'}\in R\end{cases}, \tag{4.274}$$

$${}^{i|u}J_{uS}=1,\ {}^{i|u'}J_{u'S}=1,\ \text{if}\ {}^{\bar{u}}k_u\in P,{}^{\bar{u}'}k_{u'}\in P, \tag{4.275}$$

$${}^{i|u}J_{uS}={}^{i|u}\tilde{r}_{uS},\ {}^{i|u'}J_{u'S}=1,\ \text{if}\ {}^{\bar{u}}k_u\in R,{}^{\bar{u}'}k_{u'}\in P, \tag{4.276}$$

$${}^{i|u}J_{uS}=-1,\ {}^{i|u'}J_{u'S}=-{}^{i|\bar{u}'}\tilde{r}_{u'S},\ \text{if}\ {}^{\bar{u}}k_u\in P,{}^{\bar{u}'}k_{u'}\in R, \tag{4.277}$$

For others, see Eqs. (4.202)-(4.20'7).

PROOF: The non-tree constraint pair ${}^{uS}k_{u'S}$ maintains the restraint points $u_s$ and $u'_s$ consistent, $${}^{i|uS}r_{u'S}={}^{i}r_{u'S}-{}^{i}r_{uS}\equiv 0. \tag{4.278}$$

From Eq. (4.278), then $${}^{i|uS}\dot{r}_{u'S}={}^{i}\dot{r}_{u'S}-{}^{i}\dot{r}_{uS}=0 \tag{4.279}$$

The powers of the generalized constraint force $l_{u'S}^{uS}$ from Axis #n to Axis # u' in the direction of the constraint axis and the generalized constraint force $l_{uS}^{u'S}$ from Axes # u' to Axis # u in the direction of the constraint axis are respectively $$p_{con}^{u}=\dot{q}_{u'S}^{uS}\cdot l_{u'S}^{uS},\ p_{con}^{u'}=\dot{q}_{uS}^{u'S}\cdot l_{uS}^{u'S} \tag{4.280}$$

From Eqs. (4.279) and (4.280), then $$p_{con}^{u}=p_{con}^{u'},p_{con}^{u}+p_{con}^{u'}=0. \tag{4.281}$$

From Eq. (4.279), then $$\frac{\partial({}^{i}\dot{r}_{u'S}-{}^{i}\dot{r}_{uS})}{\partial\dot{\phi}_u^{\bar{u}}}\cdot\delta\dot{\phi}_u^{\bar{u}}+\frac{\partial({}^{i}\dot{r}_{u'S}-{}^{i}\dot{r}_{uS})}{\partial\dot{\phi}_{u'}^{\bar{u}'}}\cdot\delta\dot{\phi}_{u'}^{\bar{u}'}=0,\ \text{if}\ \begin{cases}{}^{\bar{u}}k_u\in R\\ {}^{\bar{u}'}k_{u'}\in R\end{cases}, \tag{4.282}$$

$$\frac{\partial({}^{i}\dot{r}_{u'S}-{}^{i}\dot{r}_{uS})}{\partial\dot{r}_u^{\bar{u}}}\cdot\delta\dot{r}_u^{\bar{u}}+\frac{\partial({}^{i}\dot{r}_{u'S}-{}^{i}\dot{r}_{uS})}{\partial\dot{r}_{u'}^{\bar{u}'}}\cdot\delta\dot{r}_{u'}^{\bar{u}'}=0,\ \text{if}\ \begin{cases}{}^{\bar{u}}k_u\in P\\ {}^{\bar{u}'}k_{u'}\in P\end{cases}, \tag{4.283}$$

$$\frac{\partial({}^{i}\dot{r}_{u'S}-{}^{i}\dot{r}_{uS})}{\partial\dot{\phi}_u^{\bar{u}}}\cdot\delta\dot{\phi}_u^{\bar{u}}+\frac{\partial({}^{i}\dot{r}_{u'S}-{}^{i}\dot{r}_{uS})}{\partial\dot{r}_{u'}^{\bar{u}'}}\cdot\delta\dot{r}_{u'}^{\bar{u}'}=0,\ \text{if}\ \begin{cases}{}^{\bar{u}}k_u\in R\\ {}^{\bar{u}'}k_{u'}\in P\end{cases}, \tag{4.284}$$

$$\frac{\partial({}^{i}\dot{r}_{u'S}-{}^{i}\dot{r}_{uS})}{\partial\dot{r}_u^{\bar{u}}}\cdot\delta\dot{r}_u^{\bar{u}}+\frac{\partial({}^{i}\dot{r}_{u'S}-{}^{i}\dot{r}_{uS})}{\partial\dot{\phi}_{u'}^{\bar{u}'}}\cdot\delta\dot{\phi}_{u'}^{\bar{u}'}=0,\ \text{if}\ \begin{cases}{}^{\bar{u}}k_u\in P\\ {}^{\bar{u}'}k_{u'}\in R\end{cases}, \tag{4.285}$$

From Eqs. (4.32) and (4.282), then $$-{}^{i|\overline{u}}\tilde{n}_u \cdot {}^{i|u}r_{uS} \cdot \ddot{\phi}_u^{\overline{u}} + {}^{i|\overline{u}'}\tilde{n}_{u'} \cdot {}^{i|u'}r_{u'S} \cdot \ddot{\phi}_{u'}^{\overline{u}'} = 0,$$

So $${}^{i|u}\tilde{r}_{uS} \cdot {}^{i|\overline{u}}n_u \cdot \ddot{\phi}_u^{\overline{u}} - {}^{i|u'}\tilde{r}_{u'S} \cdot {}^{i|\overline{u}'}n_{u'} \cdot \ddot{\phi}_{u'}^{\overline{u}'} = 0. \quad (4.286)$$

From Eqs. (4.274) and (4.286) to obtain Eq. (4.269). From Eqs. (4.33) and (4.283), then $${}^{i|\overline{u}}n_u \cdot \ddot{r}_u^{\overline{u}} + {}^{i|\overline{u}'}n_{u'} \cdot \ddot{r}_{u'}^{\overline{u}'} = 0, \quad (4.287)$$

From Eqs. (4.275) and (4.287) to obtain Eq. (4.270). From Eqs. (4.33) and (4.284), then $${}^{i|u}\tilde{r}_{u_S} \cdot {}^{i|\overline{u}}n_u \cdot \ddot{\phi}_u^{\overline{u}} + {}^{i|\overline{u}'}n_{u'} \cdot \ddot{r}_{u'}^{\overline{u}'} = 0, \quad (4.288)$$

From Eqs. (4.276) and (4.288) to obtain Eq. (4.271). From Eqs. (4.33) and (4.285), then $${}^{i|\overline{u}}n_u \cdot \ddot{r}_u^{\overline{u}} - {}^{i|u'}\tilde{r}_{u'_S} \cdot {}^{i|\overline{u}'}n_{u'} \cdot \ddot{\phi}_{u'}^{\overline{u}'} = 0, \quad (4.289)$$

From Eqs. (4.277) and (4.289) to obtain Eq. (4.272). From Eqs. (4.32), (4.280) and (4.274), then $$\begin{aligned}
-{}^{i|\overline{u}}n_u^T \cdot {}^{i|uS}\tau_{u'S} &= -\frac{\partial}{\partial \dot{\phi}_u^{\overline{u}}}(p_{con}^u) = -\frac{\partial}{\partial \dot{\phi}_u^{\overline{u}}}\left(\left({}^i\dot{r}_{uS}^T - {}^i\dot{r}_{u'S}^T\right) \cdot {}^{i|uS}l_{u'S}\right) \quad (4.290)\\
&= -\left({}^{i|\overline{u}}\tilde{n}_u \cdot {}^{i|u}r_{uS}\right)^T \cdot {}^{i|u_S}l_{u'S} = -\left(-{}^{i|u}\tilde{r}_{uS} \cdot {}^{i|\overline{u}}n_u\right)^T \cdot {}^{i|u_S}l_{u'S}, \\
&= -{}^{i|\overline{u}}n_u^T \cdot {}^{i|u}\tilde{r}_{uS} \cdot {}^{i|uS}l_{u'S} = {}^{i|\overline{u}}n_u^T \cdot {}^{i|u}J_{uS}^T \cdot {}^{i|uS}l_{u'S}
\end{aligned}$$

$$\begin{aligned}
-{}^{i|\overline{u}'}n_{u'}^T \cdot {}^{i|uS}\tau_{u'S} &= -\frac{\partial}{\partial \dot{\phi}_{u'}^{\overline{u}'}}(p_{con}^{u'}) = -\frac{\partial}{\partial \dot{\phi}_{u'}^{\overline{u}'}}\left(\left({}^i\dot{r}_{u'S}^T - {}^i\dot{r}_{uS}^T\right) \cdot {}^{i|u'S}f_{uS}\right) \quad (4.291)\\
&= -\left({}^{i|\overline{u}'}\tilde{n}_{u'} \cdot {}^{i|u'}r_{u'S}\right)^T \cdot {}^{i|uS}f_{u'S} = -\left(-{}^{i|u'}\tilde{r}_{u'S} \cdot {}^{i|\overline{u}'}n_{u'}\right)^T \cdot {}^{i|u_S}f_{u'S} \\
&= -{}^{i|\overline{u}'}n_{u'}^T \cdot {}^{i|u'}\tilde{r}_{u'S} \cdot {}^{i|uS}f_{u'S} = {}^{i|\overline{u}'}n_{u'}^T \cdot {}^{i|u'}J_{u'S}^T \cdot {}^{i|uS}f_{u'S}
\end{aligned}$$

The generalized constraint forces ${}^{i|uS}l_{u'S}$ and ${}^{i|u'S}l_{uS}$ are vectors, and we obtain Eq. (4.273) with Eqs. (4.290) and (4.291). At this point we know that the partial velocity is mainly applied to the backward iterative of the force. The generalized constraint forces ${}^{i|uS}l_{u'S}$ and ${}^{i|u'S}l_{uS}$ are considered as the external force, and we obtain Eqs. (4.267) and (4.268) according to theorem 4.3. Q.E.D.

The Ju-Kane Closed-Chain rigid-body dynamics based on the joint space Natural Axis-Chain overcomes the limitations of the Cartesian-Axis space:

[1] In the Newtonian Euler dynamics based on the Cartesian-Axis-Chain, the constraint of the non-tree joint pair ${}^{u}k_{u'}\in$ P cannot express the conditions of ${}^{\overline{u}}k_u\in$ P and ${}^{u}k_{\overline{u}}\in$ R or ${}^{\overline{u}}k_u\in$ R and ${}^{u}k_{u'}\in$ P, that is, it cannot express the constraint between the rack and the gear, between the worm and the worn gear, etc. Eqs. (4.269)-(4.272) can express any kind of constraint, and the physical meaning is clear;

[2] In the Newton-Euler dynamics based on the Cartesian-Axis, the algebraic constraint equation of the non-tree joint pair is 6D; Eqs. (4.269)-(4.272) represent the algebraic constraint equation of the 3D non-tree joint pair, which reduces the solution complexity of the system equation;

[3] In the Newton-Euler dynamics based on the Cartesian-Axis-Chain, the algebraic constraint equation of the non-tree joint pair is about the absolute acceleration of the 6D vector space, is an iterative in respect to the joint coordinates and the joint speeds, and has the cumulative error; while Eqs. (4.269)-(4.272) are about the joint acceleration, which ensures the accuracy of the constraint equation.

Solution of Constraint Forces Based on Axis-Invariant

For the Motion-Axis u without power loss, its constraint force and constraint torque vector are respectively ${}^{\overline{u}}f_C^{[u]}$ and ${}^{\overline{u}}\tau_C^{[u]}$. Obviously, then $${}^{\overline{u}}n_u^{T} \cdot {}^{\overline{u}}f_C^{[u]}=0, {}^{\overline{u}}n_u^{T} \cdot {}^{\overline{u}}\tau_C^{[u]}=0. \quad (4.292)$$

$\ddot{q}$ is obtained after the calculation with Eqs. (4.201) and (4.262). Eq. (4.292) shows that the motion-Axial-vector and the Motion-Axis constraint force have the relationship of natural orthogonal complement.

If $\underset{\cdot}{u}$ and $\underset{\cdot\cdot}{u}$ are two orthogonal restraint axes of the joint pair ${}^{\overline{u}}k_u$, and the restraint axis is orthogonal to the Motion-Axis, i.e.

$${}^{\overline{u}}n_u^T \cdot {}^{\overline{u}}n_{\underset{\cdot}{u}} = 0,\ {}^{\overline{u}}n_u^T \cdot {}^{\overline{u}}n_{\underset{\cdot\cdot}{u}} = 0,\ \Rightarrow {}^{\overline{u}}n_{\underset{\cdot\cdot}{u}} = {}^{\overline{u}}\tilde{n}_u^T \cdot {}^{\overline{u}}n_{\underset{\cdot}{u}}, \quad (4.293)$$

Denote ${}^{\overline{u}}n_{u'}$ as the Axial-vector of Constraint-Axis # u', substitute ${}^{\overline{u}}n_u$ in Eq. (4.201) with ${}^{\overline{u}}n_{u'}$, and recalculate to obtain $$\begin{cases} f_{u'}^C = f_u^{iL} - M_P^{[u][*]} \cdot \ddot{q} - h_P^{[u]}, & \text{if } {}^{\overline{u}}k_{u'} \in P \\ \tau_{u'}^C = \tau_u^{iL} - M_R^{[u][*]} \cdot \ddot{q} - h_R^{[u]}, & \text{if } {}^{\overline{u}}k_{u'} \in R \end{cases}, \quad (4.294)$$

where $$\begin{cases} {}^{\overline{u}}n_{u'}^T \cdot {}^{\overline{u}}f_C^{[u']} = f_{u'}^C, & \text{if } {}^{\overline{u}}k_{u'} \in P \\ {}^{\overline{u}}n_{u'}^T \cdot {}^{\overline{u}}\tau_C^{[u']} = \tau_{u'}^C, & \text{if } {}^{\overline{u}}k_{u'} \in R \end{cases}. \quad (4.295)$$

$$\begin{cases} {}^{\overline{u}}f_C^{[u']} = {}^{\overline{u}}n_{u'} \cdot f_{u'}^C, & \text{if } {}^{\overline{u}}k_{u'} \in P \\ {}^{\overline{u}}\tau_C^{[u']} = {}^{\overline{u}}n_{u'} \cdot \tau_{u'}^C, & \text{if } {}^{\overline{u}}k_{u'} \in R \end{cases}. \quad (4.296)$$

After completing the forward dynamics solution, we obtain the joint constraint force $f_{u'}^C$ and the constraint torque $\tau_{u'}^C$ From Eq. (4.294), according to the calculated joint acceleration. When ${}^{\overline{u}}n_u={}^{\overline{u}}n_u$, we obtain $f_u^C=0$ From Eqs. (4.294) and $\tau_u^C=0$ there is the same motion state and internal and external forces at the same time as in the Eq. (4.294). The balance of force and torque occurs only in Axis # u; in the constraint axis, the dynamic equation is not satisfied, that is, the force and the torque may be not balanced.

From Eq. (4.294), we can obtain the joint constraint forces $f_{\underset{\cdot}{u}}^C$ and $f_{\underset{\cdot\cdot}{u}}^C$ and the constraint torques $\tau_{\underset{\cdot}{u}}^C$ and $\tau_{\underset{\cdot\cdot}{u}}^C$. If the radial force vector ${}^{\overline{u}}f_u^{\perp}$ of Axis # u and the torque vector ${}^{\overline{u}}\tau_u^{\perp}$ are denoted, then $$\begin{cases} {}^{\overline{u}}f_u^{\perp} = {}^{\overline{u}}n_{\underset{\cdot}{u}} \cdot f_{\underset{\cdot}{u}}^C + {}^{\overline{u}}n_{\underset{\cdot\cdot}{u}} \cdot f_{\underset{\cdot\cdot}{u}}^C, \text{ if } {}^{\overline{u}}k_{u'} \in R \\ {}^{\overline{u}}\tau_u^{\perp} = {}^{\overline{u}}n_{\underset{\cdot}{u}} \cdot \tau_{\underset{\cdot}{u}}^C + {}^{\overline{u}}n_{\underset{\cdot\cdot}{u}} \cdot \tau_{\underset{\cdot\cdot}{u}}^C, \text{ if } {}^{\overline{u}}k_{u'} \in P \end{cases}. \quad (4.297)$$

If the radial force of Axis # u is $f_u^{\perp}$ and the torque is $\tau_u^{\perp}$, From Eq. (4.297), then $$\begin{cases} f_u^{\perp} = \sqrt{f_{\dot{u}}^{C:2} + f_{\ddot{u}}^{C:2}}, & \text{if } {}^{\overline{u}}k_{u'} \in R \\ \tau_u^{\perp} = \sqrt{\tau_{\dot{u}}^{C:2} + \tau_{\ddot{u}}^{C:2}}, & \text{if } {}^{\overline{u}}k_{u'} \in P \end{cases}. \tag{4.298}$$

At this point, the calculation of the radial constraint force is completed.

Calculation of Internal Friction and Viscous Forces

Figure 48:
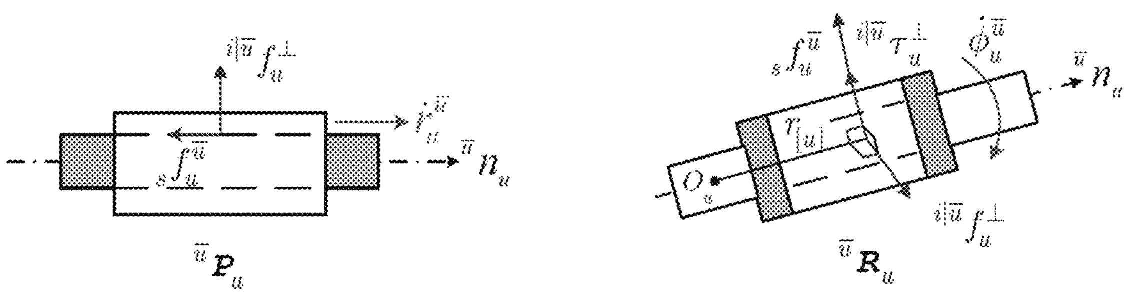
FIG. 48 is a schematic of internal friction and viscous force.

After the calculation of the radial generalized constraint force is completed, we obtain the radial constraint force $f_u^{\perp}$ of the Motion-Axis and the restraint torque $\tau_u^{\perp}$. As shown in FIG. 48, the internal friction force of the Motion-Axis and the internal friction torque are denoted as ${}_sf_u^{\overline{u}}$ and ${}_s\tau_u^{\overline{u}}$ respectively; the viscous force of Axis # u and the viscous torque are respectively ${}_cf_u^{\overline{u}}$ and ${}_c\tau_u^{\overline{u}}$. So $$\begin{cases} {}_sf_u^{\overline{u}} = -{}_sk^{[u]} \cdot f_u^{\perp} \cdot \mathrm{sign}(\dot{r}_u^{\overline{u}}) & \text{if } {}^{\overline{u}}k_u \in P \\ {}_s\tau_u^{\overline{u}} = -{}_sk^{[u]} \cdot \tau_u^{\perp} \cdot \mathrm{sign}(\dot{\phi}_u^{\overline{u}}) & \text{if } {}^{\overline{u}}k_u \in R \end{cases}, \tag{4.299}$$

$$\begin{cases} {}_cf_u^{\overline{u}} = -{}_ck^{[u]} \cdot \dot{r}_u^{\overline{u}} & \text{if } {}^{\overline{u}}k_u \in P \\ {}_c\tau_u^{\overline{u}} = -{}_ck^{[u]} \cdot \dot{\phi}_u^{\overline{u}} & \text{if } {}^{\overline{u}}k_u \in R \end{cases}, \tag{4.300}$$

where ${}_sk^{[u]}$—the internal friction coefficient of Axis # u; ${}_ck^{[u]}$—the viscous coefficient of Axis # u.

The resultant force of the internal friction force and the viscous force and the resultant torque are denoted as ${}_sf_u^{\overline{u}}$ and ${}_a\tau_u^{\overline{u}}$ in a generalized manner, From Eqs. (4.299) and (4.300), then $$\begin{cases} {}_af_u^{\overline{u}} = -{}_sk^{[u]} \cdot f_u^{|} \cdot \mathrm{sign}(\dot{r}_u^{\overline{u}}) - {}_ck^{[u]} \cdot \dot{r}_u^{\overline{u}} & \text{if } {}^{\overline{u}}k_u \in P \\ {}_a\tau_u^{\overline{u}} = -{}_sk^{[u]} \cdot \tau_u^{|} \cdot \mathrm{sign}(\dot{\phi}_u^{\overline{u}}) - {}_ck^{[u]} \cdot \dot{\phi}_u^{\overline{u}} & \text{if } {}^{\overline{u}}k_u \in R \end{cases}, \tag{4.301}$$

The generalized internal friction force and viscous force of Axes are the internal forces because they are only present in axial directions and are always orthogonal to their radial constraint forces. When the axial forces are balanced, the kinematic state of the dynamic system will not be affected regardless of the generalized frictional force and viscous force; the radial restraint force will not be affected. So, the radial constraint force $f_u^{\perp}$ of Axis # u and the constraint torque $\tau_u^{\perp}$ in Eqs. (4.294)-(4.298) are independent on the generalized internal friction force and the viscous force of the axis.

Ju-Kane Dynamics Model of the Closed-Chain Rigid Body Non-Ideal Constraint System THEOREM 4.5. The rigid MAS iL={A,K,T,NT,F,B} is given, 惯性系记为 ∀u,u',k,l∈A, ${}^{uS}k_{u'S}$∈NT; in addition to the gravity, the external resultant force acting on the axis u and the component of the torque on ${}^{\overline{u}}n_u$ are denoted as $f_u^{iL}$ and $\tau_u^{iL}$; The mass and rotational inertia of Axis # k are denoted as $m_k$ and ${}^{kI}J_{kI}$ respectively; the gravity acceleration of the axis k is ${}^ig_{kI}$; the bilateral driving force on the Driving-Axis # u and the component on the driving torque on ${}^{\overline{u}}n_u$ are denoted as $f_u^c(\dot{r}_l^{\overline{l}})$ and $\tau_u^c(\dot{\phi}_l^{\overline{l}})$ respectively; the force of the environment i acting on Axis # l and the torque are denoted as ${}^{iS}f_{lS}$ and ${}^i\tau_l$ respectively; then the generalized constraint force of the axis to Axis # u' is denoted as ${}^{i|uS}l_{u'S}$; the resultant force of the generalized internal friction and the cohesion of the Motion-Axis # u are ${}_af_u^{\overline{u}}$ and ${}_a\tau_u^{\overline{u}}$ respectively; then

[1] The Ju-Kane dynamic equation of the Closed-Chain rigid MAS refers to Eqs. (4.267)-(4.277), and (4.202)-(4.207);

[1-1] Calculate the joint acceleration $\ddot{q}$ with Eqs. (4.262)-(4.265);

[1-2] Calculate the radial constraint forces $f_u^{\perp}$ and $f_{u'}^{\perp}$ and the constraint torques $\tau_u^{\perp}$ and $\tau_{u'}^{\perp}$ with Eqs. (4.293)-(4.298);

[2] Establish the following Ju-Kane dynamic equation of the Closed-Chain rigid system with non-ideal constraints:

[2-1] The Ju-Kane dynamic canonical equations of the axis u and the axis u' are respectively $$\begin{cases} {}^{i|\overline{u}}n_u^T \cdot \left(M_P^{[u][*]} \cdot \ddot{q} + h_P^{[u]} + {}^{i|NT}l_u\right) = f_u^{iL} - {}_af_u^{\overline{u}}, & \text{if } {}^{\overline{u}}k_u \in P \\ {}^{i|\overline{u}}n_u^T \cdot \left(M_R^{[u][*]} \cdot \ddot{q} + h_R^{[u]} + {}^{i|NT}l_u\right) = \tau_u^{iL} - {}_a\tau_u^{\overline{u}}, & \text{if } {}^{\overline{u}}k_u \in R \end{cases}, \tag{4.302}$$

$$\begin{cases} {}^{i|\overline{u}'}n_{u'}^T \cdot \left(M_P^{[u'][*]} \cdot \ddot{q} + h_P^{[u']} + {}^{i|NT}l_{u'}\right) = f_{u'}^{iL} - {}_af_u^{\overline{u}}, & \text{if } {}^{\overline{u}'}k_{u'} \in P \\ {}^{i|\overline{u}'}n_{u'}^T \cdot \left(M_R^{[u'][*]} \cdot \ddot{q} + h_P^{[u']} + {}^{i|NT}l_{u'}\right) = \tau_{u'}^{iL} - {}_a\tau_{u'}^{\overline{u}'}, & \text{if } {}^{\overline{u}'}k_{u'} \in R \end{cases}; \tag{4.303}$$

[2-2] The constraint algebraic equation of non-tree constraint pair ${}^uk_{u'}$ is $${}^{i|u}J_{uS} \cdot {}^{i|\overline{u}}n_u \cdot \ddot{\phi}_u^{\overline{u}} + {}^{i|u'}J_{u'S} \cdot {}^{i|\overline{u}'}n_{u'} \cdot \ddot{\phi}_{u'}^{\overline{u}'} = 0, \quad \text{if } \begin{cases} {}^{\overline{u}}k_u \in R \\ {}^{\overline{u}'}k_{u'} \in R \end{cases}, \tag{4.304}$$

$${}^{i|u}J_{uS} \cdot {}^{i|\overline{u}}n_u \cdot \ddot{r}_u^{\overline{u}} + {}^{i|u'}J_{u'S} \cdot {}^{i|\overline{u}'}n_{u'} \cdot \ddot{r}_{u'}^{\overline{u}'} = 0, \quad \text{if } \begin{cases} {}^{\overline{u}}k_u \in P \\ {}^{\overline{u}'}k_{u'} \in P \end{cases}, \tag{4.305}$$

$${}^{i|u}J_{uS} \cdot {}^{i|\overline{u}}n_u \cdot \ddot{\phi}_u^{\overline{u}} + {}^{i|u'}J_{u'S} \cdot {}^{i|\overline{u}'}n_{u'} \cdot \ddot{r}_{u'}^{\overline{u}'} = 0, \quad \text{if } \begin{cases} {}^{\overline{u}}k_u \in R \\ {}^{\overline{u}'}k_{u'} \in P \end{cases}, \tag{4.306}$$

$${}^{i|u}J_{uS} \cdot {}^{i|\overline{u}}n_u \cdot \ddot{r}_u^{\overline{u}} + {}^{i|u'}J_{u'S} \cdot {}^{i|\overline{u}'}n_{u'} \cdot \ddot{\phi}_{u'}^{\overline{u}'} = 0, \quad \text{if } \begin{cases} {}^{\overline{u}}k_u \in P \\ {}^{\overline{u}'}k_{u'} \in R \end{cases}; \tag{4.307}$$

For the others, see Eqs. (4.267)-(4.277), and (4.202)-(4.207).

PROOF: The resultant force ${}_af_u^{\overline{u}}$ of the internal friction force and the viscous force of the Motion-Axis # u and the resultant torque ${}_a\tau_u^{\overline{u}}$ are the external forces of the Motion-Axis # u, so there is Eq. (4.302); resultant force ${}_af_u^{\overline{u}}$ of the internal friction force and the viscous force of the Motion-Axis u' and the resultant torque ${}_a\tau_u^{\overline{u}'}$ are the external forces of the Motion-Axes # u and # u, so there is Eq. (4.303). Other proof processes are similar to theorem 4.4. Q.E.D.

Ju-Kane Dynamic Canonical Equation of the Mobile MAS

The mobile MAS is applied widely, including the space robot, planet rover, biped robot, etc. Next, we will first elaborate the Ju-Kane dynamic theorem of the mobile MAS, and then prove it. Finally, we will give dynamics modeling examples of the mobile system with three wheel and CE3 patrol unit.

Ju-Kane Dynamic Equation of the Mobile MAS

THEOREM 4.6. The mobile rigid MAS iL={A,K,T,NT,F,B} is given, the root is used as the inertial space, ∀u,u',k,l∈A, ${}^{uS}k_{u'S}$∈NT: i=$\overline{c}$. Given the Axis-Chain ${}^il_c$=(i,c1,c2,c3,c4,c5, c] its axis type SEQS is noted as ${}^iK_c$=(X,R,R,R,P,P,P]. In addition to the gravity, the external resultant force acting on Axis # u and the component of the torque on ${}^{\overline{u}}n_u$ are denoted as $f_u^{iL}$ and $\tau_u^{iL}$; The mass and rotational inertia of Axis # k are denoted as $m_k$ and ${}^{kI}J_{kI}$ respectively; the gravity acceleration of Axis # k is ${}^ig_{kI}$; the bilateral driving force on the Axis # u and the component on the driving torque on ${}^{\overline{u}}n_u$ are denoted as $f_u^c(\dot{r}_l^{\overline{l}})$ and $\tau_u^c(\dot{\phi}_l^{\overline{l}})$ respectively; the force of the environment i acting on Axis # l and the torque are denoted as ${}^{iS}f_{lS}$ and ${}^{i}\tau_{l}$ respectively; the resultant force acting on Body # c is ${}^{i|L}f_{c}$ and the resultant torque is ${}^{i|L}\tau_{c}$, denoted as $$\phi_{(i,c]} = [\phi_{c1}^{1}, \phi_{c2}^{c1}, \phi_{c3}^{c2}],\ r_{(i,c]} = [r_{c4}^{c3}, r_{c5}^{c4}, r_{c}^{c5}];$$

and $$\begin{gathered} {}^{c|i}n_{c1} = 1^{[m]},\ {}^{c|c1}n_{c2} = 1^{[n]},\ {}^{c|c2}n_{c3} = 1^{[p]} \\ m, n, p \in \{x, y, z\},\ m \neq n,\ n \neq p \\ {}^{c|c5}n_{c} = 1^{[x]},\ {}^{c|c4}n_{c5} = 1^{[y]},\ {}^{c|c3}n_{c4} = 1^{[z]} \end{gathered}, \tag{4.308}$$

$${}_{0}^{c|c2}r_{c3} = {}_{0}^{c|c3}r_{c4} = {}_{0}^{c|c4}r_{c5} = {}_{0}^{c|c5}r_{c} = 0_3; \tag{4.309}$$

Then $$\begin{cases} M_P^{[c][*]} \cdot \ddot{q} + h_P^{[c]} = {}^{c}Q_i \cdot {}^{i|D}f_c \\ M_R^{[c][*]} \cdot \ddot{q} + h_R^{[c]} = {}^{c}\Theta_i \cdot {}^{i|D}\tau_c \end{cases}, \tag{4.310}$$

where $\underline{c}$L stands for the open subtree of c, cL−c=$\underline{c}$L and:

$${}^{i}\Theta_c = \partial^{i}\dot{\phi}_c / \partial\dot{\phi}_{(i,c]}, \tag{4.311}$$

$$\ddot{q} = \left\{ {}^{i|l}\ddot{q}_l = {}^{i|\bar{l}}n_l \cdot \ddot{q}_l^{\bar{l}} \,\middle|\, \begin{matrix} \ddot{q}_l^{\bar{l}} = \ddot{r}_l^{\bar{l}}, & \text{if } {}^{\bar{l}}k_l \in P; \\ \ddot{q}_l^{\bar{l}} = \ddot{\phi}_l^{\bar{l}}, & \text{if } {}^{\bar{l}}k_l \in R; \end{matrix}\ l \in A \right\}, \tag{4.312}$$

$$M_P^{[c][*]} \cdot \ddot{q} = {}^{c}Q_i \cdot \begin{pmatrix} \sum_k^{cL}(m_k) \cdot {}^{i}Q_c \cdot \ddot{r}_{(i,c]}^{T} - \sum_k^{cL}(m_k \cdot {}^{i|c}\tilde{r}_{kI}) \cdot {}^{i}\Theta_c \cdot \ddot{\phi}_{(i,c]}^{T} + \\ \sum_k^{\underline{c}L} \begin{pmatrix} \sum_j^{kL}(m_j) \\ -\sum_j^{kL}(m_j \cdot {}^{i|k}\tilde{r}_{jI}) \end{pmatrix} \cdot {}^{i|\bar{l}}n_l \cdot \ddot{q}_k^{\bar{k}} \end{pmatrix}, \tag{4.313}$$

$$\begin{aligned} M_R^{[c][*]} \cdot \ddot{q} = {}^{c}\Theta_i \cdot &\begin{pmatrix} \sum_k^{cL}({}^{i|kI}J_{kI} - m_k \cdot {}^{i|c}\tilde{r}_{kI}^{2}) \cdot {}^{i}\Theta_c \cdot \ddot{\phi}_{(i,c]}^{T} \\ \backslash + \sum_k^{cL}(m_k \cdot {}^{i|c}\tilde{r}_{kI}) \cdot {}^{i}Q_c \cdot \ddot{r}_{(i,c]}^{T} \end{pmatrix} + \\ {}^{c}\Theta_i \cdot \sum_k^{\underline{c}L} &\begin{pmatrix} \sum_j^{kL}(m_j \cdot {}^{i|c}\tilde{r}_{jI}) \\ \sum_j^{kL}({}^{i|jI}J_{jI} - m_j \cdot {}^{i|c}\tilde{r}_{jI} \cdot {}^{i|k}\tilde{r}_{jI}) \end{pmatrix} \cdot {}^{i|\bar{k}}n_k \cdot \ddot{q}_k^{\bar{k}} \end{aligned}; \tag{4.314}$$

For others, see Eqs. (4.204)-(4.207).

PROOF: Obviously, then $$m_k = 0,\ {}^{kI}J_{kI} = O,\ k \in [c1, c2, c3, c4, c5]. \tag{4.315}$$

From Eqs. (4.308) and (4.309), we know that they determine the cartesian rectangular coordinate frame of Axis # c, but there are 12 kinds in the three rotational axis sequences. From Eq. (4.33), then $${}^{i}\Theta_c = \frac{\partial^{i}\dot{\phi}_c}{\partial\dot{\phi}_{(i,c)}} = [{}^{i}n_{c1}, {}^{i|c1}n_{c2}, {}^{i|c2}n_{c3}]. \tag{4.316}$$

From Eq. (4.316), then $${}^{i}\dot{\phi}_c = {}^{i}\Theta_c \cdot \dot{\phi}_{(i,c]}. \tag{4.317}$$

From Eq. (4.317), then $$\dot{\phi}_{(i,c]}^{T} = {}^{c}\Theta_i \cdot {}^{i}\dot{\phi}_c = {}^{i}\Theta_c^{-1} \cdot {}^{i}\dot{\phi}_c. \tag{4.318}$$

So $$\begin{aligned} &\sum_k^{i_{1c3}}(m_k) \cdot {}^{i}Q_c \cdot \ddot{r}_{(i,c]}^{T} + \sum_k^{i_{1c3}}(-m_k \cdot {}^{i|c}\tilde{r}_{kI}) \cdot {}^{i}\Theta_c \cdot \ddot{\phi}_{(i,c]}^{T}, \\ &= m_c \cdot {}^{i}Q_c \cdot \ddot{r}_{(i,c]}^{T} - m_c \cdot {}^{i|c}\tilde{r}_{cI} \cdot {}^{i}\Theta_c \cdot \ddot{\phi}_{(i,c]}^{T} \end{aligned} \tag{4.319}$$

$$\begin{aligned} &\sum_k^{i_{1c3}}({}^{i|kI}J_{kI} - m_k \cdot {}^{i|c}\tilde{r}_{kI}^{2}) \cdot {}^{i}\Theta_c \cdot \ddot{\phi}_{(i,c]}^{T} + \sum_k^{i_{1c3}}(m_k \cdot {}^{i|c}\tilde{r}_{kI}) \cdot {}^{i}Q_c \cdot \ddot{r}_{(i,c]}^{T}. \\ &= ({}^{i|cI}J_{cI} m_c \cdot {}^{i|c}\tilde{r}_{cI}^{2}) \cdot {}^{i}\Theta_c \cdot \ddot{\phi}_{(i,c]}^{T} + m_c \cdot {}^{i|c}\tilde{r}_{cI} \cdot {}^{i}Q_c \cdot \ddot{r}_{(i,c]}^{T} \end{aligned} \tag{4.320}$$

From Eqs. (4.203) and (4.318), then $$M_P^{[c][*]} \cdot \ddot{q} = {}^{c}Q_i \cdot \begin{pmatrix} \sum_k^{cL}(m_k) \cdot {}^{i}Q_c \cdot \ddot{r}_{(i,c]}^{T} - \sum_k^{cL}(m_k \cdot {}^{i|c}\tilde{r}_{kI}) \cdot {}^{i}\Theta_c \cdot \ddot{\phi}_{(i,c]}^{T} + \\ \sum_k^{\underline{c}L} \begin{pmatrix} \sum_j^{kL}(m_j) \\ -\sum_j^{kL}(m_j \cdot {}^{i|k}\tilde{r}_{jI}) \end{pmatrix} \cdot {}^{i|\bar{l}}n_l \cdot \ddot{q}_k^{\bar{k}} \end{pmatrix}. \tag{4.321}$$

From Eqs. (4.319) and (4.321), we obtain Eq. (4.313). From Eqs. (4.206) and (4.318), then $$\begin{aligned} M_R^{[c][*]} \cdot \ddot{q} = {}^{c}\Theta_i \cdot &\begin{pmatrix} \sum_k^{cL}({}^{i|kI}J_{kI} - m_k \cdot {}^{i|c}\tilde{r}_{kI}^{2}) \cdot {}^{i}\Theta_c \cdot \ddot{\phi}_{(i,c]}^{T} \\ \backslash + \sum_k^{cL}(m_k \cdot {}^{i|c}\tilde{r}_{kI}) \cdot {}^{i}Q_c \cdot \ddot{r}_{(i,c]}^{T} \end{pmatrix} + \\ {}^{c}\Theta_i \cdot \sum_k^{\underline{c}L} &\begin{pmatrix} \sum_j^{kL}(m_j \cdot {}^{i|c}\tilde{r}_{jI}) \\ \sum_j^{kL}({}^{i|jI}J_{jI} - m_j \cdot {}^{i|c}\tilde{r}_{jI} \cdot {}^{i|k}\tilde{r}_{jI}) \end{pmatrix} \cdot {}^{i|\bar{k}}n_k \cdot \ddot{q}_k^{\bar{k}} \end{aligned}. \tag{4.322}$$

From Eqs. (4.320) and (4.322), we obtain Eq. (4.314). Q.E.D.

From theorem 4.6 we know that the three rotational axis sequences of the cartesian Frame # c of the body c can be determined with Eq. (4.308) as required; after the dynamic equation is established, the dynamic simulation is completed through the integral to directly obtain the desired attitude. Meanwhile, for the other axis in addition to the body, theorems 4.4 and 4.5 are also applied.

Dynamic Modeling and Inverse Solution of the Ju-Kane Based 10-Axis Tri-Wheeled System This section elaborates the dynamic modeling and inverse solution of the 10-Axis and 3-wheeled MAS based on Ju-Kane.

Figure 49:
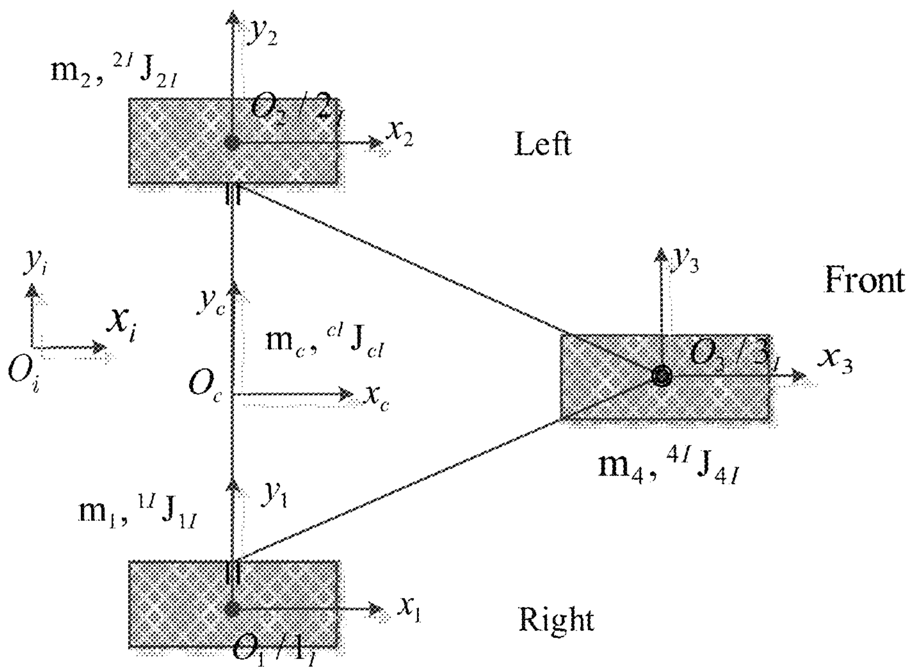
FIG. 49 is a diagram of three-wheeled mobile system.

EXAMPLE 4.10. The three-wheel car iL={A,K,T,NT,F,B} is given, as shown in FIG. 49, Axes #1, #2 and #4 drive the wheel, and Axis #3 drives the steering gear; the Axis SEQS is A=(i,c1,c2,c3,c4,c5,c,1:4], and the parent axis SEQS is $\overline{A}$=c2,c3,c4,c5,c,c,c,3]. The mass and rotational inertia of Axis # l are $m_l$ and ${}^{lI}J_{lI}$ respectively, l∈[c,1:4]. The dynamic equation of each axis is established according to theorem 4.6.

SOLUTION: STEP 1. Obviously, let |A|=4, |B|=5 and |NT|=|O|=3 be substituted into Eq. (4.43) to obtain DOF (iL)=10. From Eqs. (4.41), (4.42) and (4.44), we obtain $$DOL(iL)=10-2\cdot FD(W_{NS})-1\cdot FD(W_S)=3.$$

So, the system is still static determinacy on the natural road.
STEP 2. Forward kinematics calculation based on Axis-Invariant
From Eq., then $$^{\bar{l}}Q_l=1+S(\phi_l^{\bar{l}})\cdot{}^{\bar{l}}\tilde{n}_l+(1-C(\phi_l^{\bar{l}}))\cdot{}^{\bar{l}}\tilde{n}_l^2, l\in A. \tag{4.323}$$

Calculate with Eqs. (4.8) and (4.12)

$$^iQ_l=\prod_k^{^i1_{\bar{l}}}(^{\bar{k}}Q_k)\cdot{}^{\bar{l}}Q_l,\ l\in A. \tag{4.324}$$

Calculate with Eq. (4.16)

$$\begin{aligned} &^ir_l=\sum_k^{^i1_l}(^{i|\bar{k}}r_k),\ l\in A \\ &^ir_{lI}={}^ir_l+{}^{i|l}r_{lI},\ l\in A \end{aligned}. \tag{4.325}$$

Calculate with Eq. (4.17))

$$^i\dot{\phi}_l=\sum_k^{^i1_l}\left(^{i|\bar{k}}\dot{\phi}_k\right),\ l\in A. \tag{4.326}$$

Considering $^{\bar{l}}\dot{r}_l=0_3$ and $^l\dot{r}_{lI}=0_3$, where l=[c,1:4]; calculate with Eq. (4.161)

$$\begin{aligned} &^i\dot{r}_l={}^i\dot{r}_c+\sum_k^{^c1_l}\left(^i\dot{\tilde{\phi}}_{\bar{k}}\cdot{}^{i|\bar{k}}r_k\right),\ l=A \\ &^i\dot{r}_{lI}={}^i\dot{r}_l+{}^{i|l}\dot{r}_{lI},\ l=A \end{aligned}. \tag{4.327}$$

Calculate with Eq. (4.25)

$$^{i|lI}J_{lI}={}^iQ_{l'}{}^{lI}J_{lI'}{}^lQ_{lI'}{}^lQ_i, l\in A. \tag{4.328}$$

STEP 3. Establish the Ju-Kane dynamic canonical equation

From Eqs. (4.313) and (4.314) we obtain $M_P^{[c][*]}\cdot\ddot{q}$, $M_P^{[c][*]}\cdot\ddot{q}$; calculate $h_P^{[c]}$ and $h_R^{[c]}$ respectively with Eqs. (4.204) and (4.205); substitute into Eq. (4.310), then $$\begin{cases} M_P^{[c][*]}\cdot\ddot{q}+h_P^{[c]}={}^cQ_i\cdot{}^{i|iL}f_c \\ M_R^{[c][*]}\cdot\ddot{q}+h_R^{[c]}={}^c\Theta_i\cdot{}^{i|iL}\tau_c \end{cases}. \tag{4.329}$$

From Eqs. (4.208), (4.205) and (4.201), then $$M_R^{[u][*]}\cdot\ddot{q}+h_R^{[u]}=\tau_u^{iL},\ u\in[1:4]. \tag{4.330}$$

At this point, we obtain all 10 dynamic equations.
STEP 4. Carry out the backward iterative of the force From Eqs. (4.39), (4.40) and (4.207), then $$^{i|iL}f_c={}^iS_1^{NS}\cdot F_1^{NS}+{}^iS_2^{NS}\cdot F_2^{NS}+{}^iS_4^S\cdot F_4^S, \tag{4.331}$$

$$^{i|iL}\tau_c={}^{i|c}\tilde{r}_{1I}\cdot{}^iS_1^{NS}\cdot F_1^{NS}+{}^{i|c}\tilde{r}_{2I}\cdot{}^iS_2^{NS}\cdot F_2^{NS}+{}^{i|c}\tilde{r}_{4I}\cdot{}^iS_4^S\cdot F_4^S. \tag{4.332}$$

If we only consider the wheel-terrain force and driving forces of Driving-Axes, From Eq. (4.207), then $$^{i|iL}\tau_1={}^{i|1}\tilde{r}_{1I}\cdot{}^iS_1^{NS}\cdot F_1^{NS}+\tau_1^c$$

$$^{i|iL}\tau_2={}^{i|2}\tilde{r}_{2I}\cdot{}^iS_2^{NS}\cdot F_2^{NS}+\tau_2^c$$

$$^{i|iL}\tau_3={}^{i|3}\tilde{r}_{4I}\cdot{}^iS_4^S\cdot F_4^S$$

$$^{i|iL}\tau_4={}^{i|4}\tilde{r}_{4I}\cdot{}^iS_4^S\cdot F_4^S+\tau_4^c \tag{4.333}$$

STEP 5. Calculate the inverse solution of the dynamic equation
Write Eqs. (4.331)-(4.333) as a whole $$f_{10\times1}=B_{10\times10}\cdot u_{10\times1}, \tag{4.334}$$

where $$B=\begin{bmatrix} 0_3 & 0_3 & 0_3 & ^iS_1^{NS} & ^iS_2^{NS} & ^iS_4^S \\ 0_3 & 0_3 & 0_3 & ^{i|c}\tilde{r}_{11}\cdot{}^iS_1^{NS} & ^{i|c}\tilde{r}_{21}\cdot{}^iS_2^{NS} & ^{i|c}\tilde{r}_{41}\cdot{}^iS_4^S \\ 1 & 0 & 0 & \begin{matrix}^{i|c}n_1^T\cdot{}^{i|1}\tilde{r}_{i1}\\ \backslash\cdot{}^iS_1^{NS}\end{matrix} & 0_2^T & 0_3^T \\ 0 & 1 & 0 & 0_2^T & ^{i|c}n_2^T\cdot{}^{i|c}\tilde{r}_{21}\cdot{}^iS_2^{NS} & 0_3^T \\ 0 & 0 & 0 & 0_2^T & 0_2^T & \begin{matrix}^{i|c}n_3^T\cdot{}^{i|3}\tilde{r}_{4I}\\ \backslash\cdot{}^iS_4^S\end{matrix} \\ 0 & 0 & 1 & 0_2^T & 0_2^T & \begin{matrix}^{i|c}n_4^T\cdot{}^{i|4}\tilde{r}_{4I}\\ \backslash\cdot{}^iS_4^S\end{matrix} \end{bmatrix}. \tag{4.335}$$

$$\begin{aligned} &f=\left[\ ^{i|D}f_c\ \ ^{i|D}\tau_c\ \ \tau_1^D\ \ \tau_2^D\ \ \tau_3^D\ \ \tau_4^D\ \right]^T \\ &u=\left[\ \tau_1^c\ \ \tau_2^c\ \ \tau_4^c\ \ F_1^{NS}\ \ F_2^{NS}\ \ F_4^S\ \right]^T \end{aligned}.$$

If $[\ddot{q}_l^{\bar{l}},\dot{q}_l^{\bar{l}},q_l^{\bar{l}}|l\in A]$ is given, calculate ƒ with Eqs. (4.329) and (4.330). If $B^1$ exists, From Eq. (4.334), then $$u=B^{-1}\cdot f. \tag{4.336}$$

Solution is finished.

From Eqs. (4.335) and (4.336) we know:

[1] The control torques $\tau_1^c$, $\tau_2^c$ and $\tau_4^c$ and the wheel-terrain action forces $F_1$NS, $F_2^{NS}$ and $F_4^S$ are of coupling;

[2] After the dynamic inverse solution is completed, we not only obtain the control torques $\tau_1^c$, $\tau_2^c$ and $\tau_4^c$ of the Driving-Axis, but also obtain the wheel-terrain forces $F_1^{NS}$, $F_2^{NS}$ and $F_4^S$. So, the inverse solution has the following effects:

[2.1] Calculate the desired torque $\tau_1^c$, $\tau_2^c$ and $\tau_4^c$ of the Driving-Axis;

[2.2] Indirectly measure the wheel-terrain action forces $F_1^{NS}$, $F_2^{NS}$ and $F_4^S$ through the motion state (attitude, velocity and acceleration).

Dynamics Modeling and Inverse Solution of Ju-Kane Based 20-Axis Rover Mobile System This section elaborates the dynamic modeling and inverse solution of CE3 Rover mobile MAS based on Ju-Kane methods.

Figure 50:
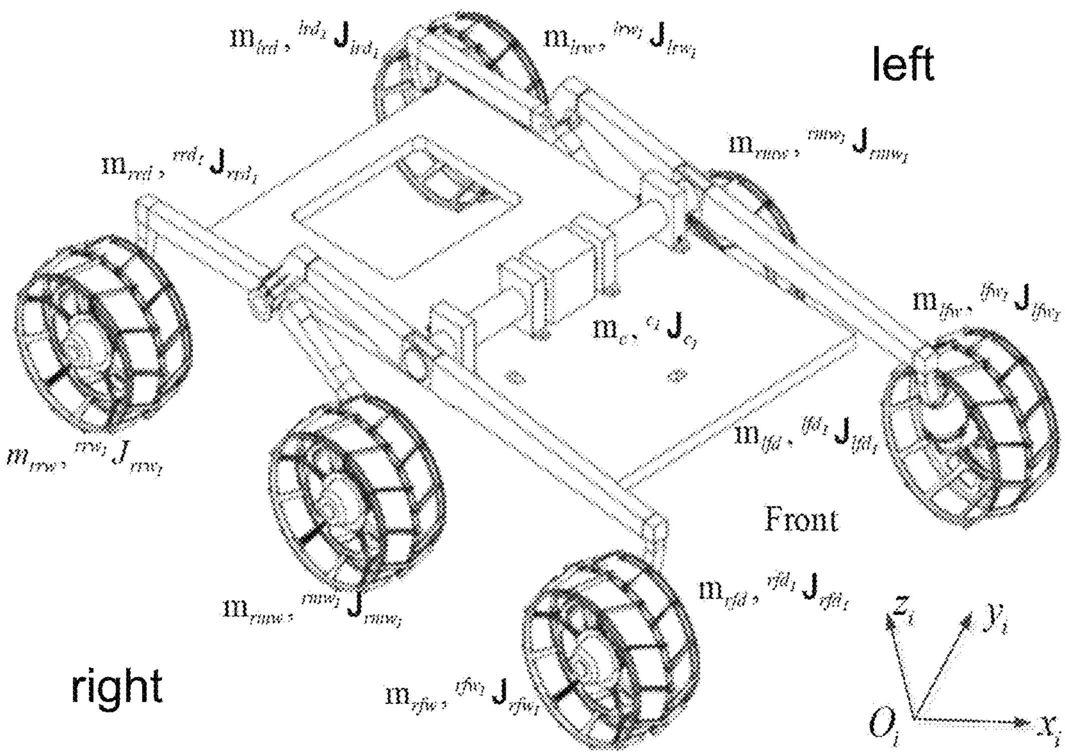
FIG. 50 is a diagram of the CE3 Lunar rover mobile system.

EXAMPLE 4.11. The CE3 Rover MAS iL={A,K,T,NT,F,B} as shown in FIG. 50 is given, and the axis span-tree of the system is shown in FIG. 17. The identifier and abbreviation symbols are shown in Example 1.1. The system structural parameters are shown in FIG. 17. Establish the dynamic equation of the system.

STEP 1. Obviously, |A|=14, |NT|=7, |O|=6; From Eqs. (4.41), (4.42) and (4.44), we obtain $$DOL(iL)=19-2\cdot FD(W_{NS})-4\cdot FD(W_S)=3.$$

Thus, the MAS D can adapt to the natural terrain. The Axis A, parent axis A and non-tree set NT are expressed respectively as follows.

$$A=(i,c1,c2,c3,c4,c5,c,rr,rb,rrd,rrw,rmw,rfd,rfw,lr,lb,lrd,lrw,lfd,lfw,lmw],$$

$$\overline{A}=(i,i,c1,c2,c3,c4,c5,c,rr,rb,rrd,rb,rr,rfb,c,lr,lb,lrd,lr,lfd,lb],$$

$$NT=\{{}^{lr}R_{rr},{}^{i}o_{i_{lfm}},{}^{i}o_{i_{lmw}},{}^{i}o_{i_{lrw}},{}^{i}o_{i_{rfw}},{}^{i}o_{i_{rmw}},{}^{i}o_{i_{rrw}}\}.$$

STEP 2. Forward kinematic calculation of MAS based on Axis-Invariant. From Eq. (4.8), then $${}^{\bar{l}}Q_l=1+S(\phi_l^{\bar{l}})\cdot{}^{\bar{l}}\tilde{n}_l+(1-C(\phi_l^{\bar{l}}))\cdot{}^{\bar{l}}n_l^{2},l\in A. \tag{4.337}$$

Calculate with Eqs. (4.12) and (4.337)

$${}^{i}Q_l=\prod_{k}^{{}^{i}1_{\bar{l}}}\left({}^{\bar{k}}Q_k\right)\cdot{}^{\bar{l}}Q_l,\ l\in A. \tag{4.338}$$

Calculate with Eqs. (4.16) and (4.338)

$${}^{i}r_l=\sum_{k}^{{}^{i}1_l}\left({}^{i|\bar{k}}r_k\right),\ l\in A$$

$${}^{i}r_{l_I}={}^{i}r_l+{}^{i|l}r_{l_I},\ l\in A \tag{4.339}$$

Calculate with Eq. (4.17)

$${}^{i}\dot{\phi}_l=\sum_{k}^{{}^{i}1_l}\left({}^{i|\bar{k}}\dot{\phi}_k\right),\ l\in A \tag{4.340}$$

Denote l∈(c,rb,rr,rfd,rfw,rmw,rrd,rrw,lb,lr,lfd,lfw,lmw,lrd, lrw], since it is a rigid-body system, if ${}^{\bar{l}}\dot{r}_l=0_3$ and ${}^{l}\dot{r}_{l_i}=0_3$. Calculate with Eqs. (4.18), (4.338) and (4.340)

$${}^{i}\dot{r}_l={}^{i}\dot{r}_c+\sum_{k}^{{}^{c}1_l}\left({}^{i}\dot{\tilde{\phi}}_{\bar{k}}\cdot{}^{i|\bar{k}}r_k\right),\ l\in A$$

$${}^{i}\dot{r}_{l_I}={}^{i}\dot{r}_l+{}^{i|l}\dot{r}_{l_I},\ l\in A \tag{4.341}$$

Calculate with Eq. (4.25)

$${}^{i|l_I}J_{l_I}={}^{i}Q_l\cdot{}^{l_I}J_{l_I}\cdot{}^{l}Q_i,l\in A \tag{4.342}$$

STEP 3. Establish the dynamic equation

From Eqs. (4.313) and (4.314), we obtain $M_P^{[c][*]}\cdot\ddot{q}$, $M_P^{[c][*]}\cdot\ddot{q}$; calculate $h_P^{[c]}$ and $h_R^{[c]}$ respectively with Eqs. (4.204) and (4.205); substitute into Eq. (4.310) to obtain $$\begin{cases} M_P^{[c][*]}\cdot\ddot{q}+h_P^{[c]}={}^{c}Q_i\cdot{}^{i|iL}f_c \\ M_R^{[c][*]}\cdot\ddot{q}+h_R^{[c]}={}^{c}\Theta_i\cdot{}^{i|iL}\tau_c \end{cases}. \tag{4.343}$$

From Eqs. (4.208), (4.205) and (4.210), then $$M_P^{[c][*]}\cdot\ddot{q}+h_R^{[u]}=\tau_u^{iL}, \tag{4.344}$$

where u∈[rfd,rfw,rmw,rrd,rrw,lfd,lfw,lmw,lrd,lrw].

From Eqs. (4.269), (4.205), (4.267) and (4.273), then $$M_R^{[lr][*]}\cdot\ddot{q}+h_R^{[lr]}-{}^{i|c}n_{lr}^{T}\cdot{}^{i|lr}\tilde{r}_{lr_S}^{T}\cdot{}^{i|lr_S}l_{rr_S}=\tau_{lr}^{iL}, \tag{4.345}$$

$$M_R^{[rr][*]}\cdot\ddot{q}+h_R^{[rr]}-{}^{i|c}n_{rr}^{T}\cdot{}^{i|rr}\tilde{r}_{rr_S}^{T}\cdot{}^{i|lr_S}l_{rr_S}=\tau_{rr}^{iL}. \tag{4.346}$$

From Eqs. (4.274) and (4.269), then $$-{}^{i|lr}\tilde{r}_{lr_S}\cdot{}^{i|c}n_{lr}\cdot\ddot{\phi}_{lr}^{c}-{}^{i|rr}\tilde{r}_{rr_S}\cdot{}^{i|c}n_{rr}\cdot\ddot{\phi}_{rr}^{c}=0_3, \tag{4.347}$$

where the initial angle of the differential axis is $${}_0\dot{q}_{lr}{}^{c}=-{}_0\dot{q}_{rr}{}^{c}$$

$${}_0q_{lr}{}^{c}=-{}_0q_{rr}{}^{c}. \tag{4.348}$$

From Eqs. (4.208), (4.205) and (4.201), then $$\begin{aligned} M_R^{[lb][*]}\cdot\ddot{q}+h_R^{[lb]}&=\tau_{lb}^{iL} \\ M_R^{[rb][*]}\cdot\ddot{q}+h_R^{[rb]}&=\tau_{rb}^{iL} \end{aligned}. \tag{4.349}$$

At this point, we obtain the 19-Axis dynamic equation and the 3D algebraic equation of a non-tree constraint pair including 19-Axis external torque scalar and 1-Axis constraint torque vector.

STEP 4. Carry out the backward iterative of the force. From Eq. (4.153), then $${}^{i|iL}f_c={}^{i}S_{lmw}^{NS}\cdot F_{lmw}^{NS}+{}^{i}S_{rmw}^{NS}\cdot F_{rmw}^{NS}+{}^{i}S_{lfw}^{NS}\cdot F_{lfw}^{S}\backslash+{}^{i}S_{rfw}^{S}\cdot F_{rfw}^{S}+{}^{i}S_{lrw}^{S}\cdot F_{lrw}^{S}+{}^{i}S_{rrw}^{S}\cdot F_{rrw}^{S}, \tag{4.350}$$

$${}^{i|iL}\tau_c={}^{i|c}\tilde{r}_{i_{lmw}}\cdot{}^{i}S_{lmw}^{NS}\cdot F_{lmw}^{NS}+{}^{i|c}\tilde{r}_{i_{rmw}}\cdot{}^{i}S_{rmw}^{NS}\cdot F_{rmw}^{NS}\backslash+{}^{i|c}\tilde{r}_{i_{lfw}}\cdot{}^{i}S_{lfw}^{S}\cdot F_{lfw}^{S}+{}^{i|c}\tilde{r}_{i_{rfw}}\cdot{}^{i}S_{rfw}^{S}\cdot F_{rfw}^{S}\backslash+{}^{i|c}\tilde{r}_{i_{lrw}}\cdot{}^{i}S_{lrw}^{S}\cdot F_{lrw}^{S}+{}^{i|c}\tilde{r}_{i_{rrw}}\cdot{}^{i}S_{rrw}^{S}\cdot F_{rrw}^{S}, \tag{4.351}$$

$${}^{i|iL}\tau_{lb}={}^{i|lb}\tilde{r}_{i_{lmw}}\cdot{}^{i}S_{lmw}^{NS}\cdot F_{lmw}^{NS}+{}^{i|lb}\tilde{r}_{i_{lfw}}\cdot{}^{i}S_{lfw}^{S}\cdot F_{lfw}^{S}\backslash+{}^{i|lb}\tilde{r}_{i_{lrw}}\cdot{}^{i}S_{lrw}^{S}\cdot F_{lrw}^{S}+l_{rb}^{lb}, \tag{4.352}$$

$${}^{i|iL}\tau_{rb}={}^{i|rb}\tilde{r}_{i_{rmw}}\cdot{}^{i}S_{lmw}^{NS}\cdot F_{rmw}^{NS}+{}^{i|lb}\tilde{r}_{i_{rfw}}\cdot{}^{i}S_{rfw}^{S}\cdot F_{rfw}^{S}\backslash+{}^{i|rb}\tilde{r}_{i_{rrw}}\cdot{}^{i}S_{rrw}^{S}\cdot F_{rrw}^{S}+l_{rb}^{lb}, \tag{4.353}$$

$$\begin{aligned} {}^{i|iL}\tau_{lr}&={}^{i|lr}\tilde{r}_{i_{lmw}}\cdot{}^{i}S_{lmw}^{NS}\cdot F_{lmw}^{NS}+{}^{i|lr}\tilde{r}_{i_{lrw}}\cdot{}^{i}S_{lrw}^{S}\cdot F_{lrw}^{S} \\ {}^{i|iL}\tau_{rr}&={}^{i|rr}\tilde{r}_{i_{rmw}}\cdot{}^{i}S_{rmw}^{NS}\cdot F_{rmw}^{NS}+{}^{i|rr}\tilde{r}_{i_{rrw}}\cdot{}^{i}S_{rrw}^{S}\cdot F_{rrw}^{S} \end{aligned}, \tag{4.354}$$

$$\begin{aligned} {}^{i|iL}\tau_{lfd}&={}^{i|lfd}\tilde{r}_{i_{lfw}}\cdot{}^{i}S_{lfw}^{S}\cdot F_{lfw}^{S}+\tau_{lfd}^{lb} \\ {}^{i|iL}\tau_{rfd}&={}^{i|rfd}\tilde{r}_{i_{rfw}}\cdot{}^{i}S_{rfw}^{S}\cdot F_{rfw}^{S}+\tau_{rfd}^{rb} \\ {}^{i|iL}\tau_{lrd}&={}^{i|lrd}\tilde{r}_{i_{lrw}}\cdot{}^{i}S_{lrw}^{S}\cdot F_{lrw}^{S}+\tau_{lrd}^{lr} \\ {}^{i|iL}\tau_{rrd}&={}^{i|rrd}\tilde{r}_{i_{rrw}}\cdot{}^{i}S_{rrw}^{S}\cdot F_{rrw}^{S}+\tau_{rrd}^{rr} \end{aligned}, \tag{4.355}$$

$$\begin{aligned} {}^{i|iL}\tau_{lfw}&={}^{i|lfw}\tilde{r}_{i_{lfw}}\cdot{}^{i}S_{lfw}^{S}\cdot F_{lfw}^{S}+\tau_{lfw}^{lfd} \\ {}^{i|iL}\tau_{rfw}&={}^{i|rfw}\tilde{r}_{i_{rfw}}\cdot{}^{i}S_{rfw}^{S}\cdot F_{rfw}^{S}+\tau_{rfw}^{rfd} \end{aligned}$$

$$\begin{aligned} {}^{i|iL}\tau_{lrw}&={}^{i|lrw}\tilde{r}_{i_{lrw}}\cdot{}^{i}S_{lrw}^{S}\cdot F_{lrw}^{S}+\tau_{lrw}^{lrd} \\ {}^{i|iL}\tau_{rrw}&={}^{i|rrw}\tilde{r}_{i_{rrw}}\cdot{}^{i}S_{rrw}^{S}\cdot F_{rrw}^{S}+\tau_{rrw}^{rrd} \end{aligned}. \tag{4.356}$$

$$\begin{aligned} {}^{i|iL}\tau_{lmw}&={}^{i|lmw}\tilde{r}_{i_{lmw}}\cdot{}^{i}S_{lmw}^{NS}\cdot F_{lmw}^{NS}+\tau_{lmw}^{lr} \\ {}^{i|iL}\tau_{rmw}&={}^{i|rmw}\tilde{r}_{i_{rmw}}\cdot{}^{i}S_{rmw}^{NS}\cdot F_{rmw}^{NS}+\tau_{rmw}^{rr} \end{aligned}, \tag{4.357}$$

$$^{i|iL}\tau_{lfd} = {}^{i|lfd}\tilde{r}_{i_{lfw}} \cdot {}^{i}S_{lfw}{}^{S} \cdot F_{lfw}{}^{S} + \tau_{lfd}{}^{lb}$$

$$^{i|iL}\tau_{rfd} = {}^{i|rfd}\tilde{r}_{i_{rfw}} \cdot {}^{i}S_{rfw}{}^{S} \cdot F_{rfw}{}^{S} + \tau_{rfd}{}^{rb}$$

$$^{i|iL}\tau_{lrd} = {}^{i|lrd}\tilde{r}_{i_{lrw}} \cdot {}^{i}S_{lrw}{}^{S} \cdot F_{lrw}{}^{S} + \tau_{lrd}{}^{lr}$$

$$^{i|iL}\tau_{rrd} = {}^{i|rrd}\tilde{r}_{i_{rrw}} \cdot {}^{i}S_{rrw}{}^{S} \cdot F_{rrw}{}^{S} + \tau_{rrd}{}^{rr}, \quad (4.355)$$

$$^{i|iL}\tau_{lfw} = {}^{i|lfw}\tilde{r}_{i_{rfw}} \cdot {}^{i}S_{lfw}{}^{S} \cdot F_{lfw}{}^{S} + \tau_{lfw}{}^{lfd}$$

$$^{i|iL}\tau_{rfw} = {}^{i|rfw}\tilde{r}_{i_{rfw}} \cdot {}^{i}S_{rfw}{}^{S} \cdot F_{rfw}{}^{S} + \tau_{rfw}{}^{rfd}$$

$$^{i|iL}\tau_{lrw} = {}^{i|lrw}\tilde{r}_{i_{lrw}} \cdot {}^{i}S_{lrw}{}^{S} \cdot F_{lrw}{}^{S} + \tau_{lrw}{}^{lrd}$$

$$^{i|iL}\tau_{rrw} = {}^{i|rrw}\tilde{r}_{i_{rrw}} \cdot {}^{i}S_{rrw}{}^{S} \cdot F_{rrw}{}^{S} + \tau_{rrw}{}^{rrd}. \quad (4.356)$$

$$^{i|iL}\tau_{lmw} = {}^{i|lmw}\tilde{r}_{i_{lmw}} \cdot {}^{i}S_{lmw}{}^{S} \cdot F_{lmw}{}^{S} + \tau_{lmw}{}^{lr}$$

$$^{i|iL}\tau_{rmw} = {}^{i|rmw}\tilde{r}_{i_{rmw}} \cdot {}^{i}S_{rmw}{}^{S} \cdot F_{rmw}{}^{S} + \tau_{rmw}{}^{rr}, \quad (4.357)$$

STEP 5. Calculate the inverse solution of the dynamic equation. Increase driving torque constraints of steering gears, $$\tau_{lfd}{}^{lb} = \tau_{rfd}{}^{rb} = \tau_{d}$$

$$\tau_{lrd}{}^{lr} = \tau_{rrd}{}^{rr} = -\tau_{d}. \quad (4.358)$$

Increase the driving torque constraints of wheels, $$\tau_{lfw}{}^{lfd} = \tau_{lrw}{}^{lrd} = \tau_{lmw}{}^{lr} = \tau_{l}$$

$$\tau_{rfw}{}^{rfd} = \tau_{rrw}{}^{rrd} = \tau_{rmw}{}^{rr} = \tau_{r} \quad (4.359)$$

Denote $$u_{20\times1} = \left[l_{rb}^{lb}, \tau_d, \tau_l, \tau_r, F_{lfw}^{S}, F_{lrw}^{S}, F_{rfw}^{S}, F_{rrw}^{S}, F_{lmw}^{NS}, F_{rmw}^{NS}\right]^T, \quad (4.360)$$

Write Eqs. (4.350)-(4.357) as a whole $$f_{20\times1} = B_{20\times20} \cdot u_{20\times1}, \quad (4.361)$$

where $$f_{20\times1} = \begin{bmatrix} {}^{i|iL}f_c, {}^{i|iL}\tau_c, \tau_{rb}^{iL}, \tau_{lb}^{iL}, \tau_{rr}^{iL}, \tau_{lr}^{iL}, \tau_{rfd}^{iL}, \tau_{rrd}^{iL}, \\ \backslash\tau_{lfd}^{iL}, \tau_{lrd}^{iL}, \tau_{rfw}^{iL}, \tau_{lfw}^{iL}, \tau_{rrw}^{iL}, \tau_{lrw}^{iL}, \tau_{lmw}^{iL}, \tau_{lmw}^{iL} \end{bmatrix}^T, \quad (4.362)$$

$$B_{[1:6][1:4]} = 0_{6\times4}, \quad (4.363)$$

$$B_{[1:6][5:20]} = \begin{bmatrix} {}^{i}S_{lfw}^{S} & {}^{i}S_{lrw}^{S} & {}^{i}S_{rfw}^{S} & {}^{i}S_{rrw}^{S} & {}^{i}S_{lmw}^{NS} & {}^{i}S_{rmw}^{NS} \\ {}^{i|c}\tilde{r}_{i_{lfw}} \cdot & {}^{i|c}\tilde{r}_{i_{lrw}} \cdot & {}^{i|c}\tilde{r}_{i_{rfw}} \cdot & {}^{i|c}\tilde{r}_{i_{rrw}} \cdot & {}^{i|c}\tilde{r}_{i_{lmw}} \cdot & {}^{i|c}\tilde{r}_{i_{rmw}} \cdot \\ \backslash{}^{i}S_{lfw}^{S} & \backslash{}^{i}S_{lrw}^{S} & \backslash{}^{i}S_{rfw}^{S} & \backslash{}^{i}S_{rrw}^{S} & \backslash{}^{i}S_{lmw}^{NS} & \backslash{}^{i}S_{rmw}^{NS} \end{bmatrix}, \quad (4.364)$$

$$B_{[7:8][1:4]} = \begin{bmatrix} 1 & 0 & 0 & 0 \\ -1 & 0 & 0 & 0 \end{bmatrix}, \quad (4.365)$$

$$B_{[7][5:20]} = {}^{i|c}n_{rb}^T \cdot \begin{bmatrix} 0_3^T & 0_3^T & {}^{i|rb}\tilde{r}_{i_{rfw}} \cdot & {}^{i|rb}\tilde{r}_{i_{rrw}} \cdot & 0_{1\times2} & {}^{i|rb}\tilde{r}_{i_{rmw}} \cdot \\ & & \backslash{}^{i}S_{rfw}^{S} & \backslash{}^{i}S_{rrw}^{S} & & \backslash{}^{i}S_{rmw}^{NS} \end{bmatrix}, \quad (4.366)$$

$$B_{[8][5:20]} = {}^{i|c}n_{lb}^T \cdot \begin{bmatrix} {}^{i|lb}\tilde{r}_{i_{lfw}} \cdot & {}^{i|lb}\tilde{r}_{i_{lrw}} \cdot & 0_3^T & 0_3^T \cdot & {}^{i|lb}\tilde{r}_{i_{lmw}} \cdot & 0_{1\times2} \\ \backslash{}^{i}S_{lfw}^{S} & \backslash{}^{i}S_{lrw}^{S} & & & \backslash{}^{i}S_{lmw}^{NS} & \end{bmatrix}$$

$$B_{[9:20][1:4]} = \begin{bmatrix} 0 & 0 & 0 & 0 \\ 0 & 0 & 0 & 0 \end{bmatrix}, \quad (4.367)$$

$$B_{[9][5:20]} = {}^{i|rb}n_{rr}^T \cdot \begin{bmatrix} 0_3^T & 0_3^T & 0_3^T & {}^{i|rr}\tilde{r}_{i_{rrw}} \cdot & 0_{1\times2} & {}^{i|rr}\tilde{r}_{i_{rmw}} \cdot \\ & & & \backslash{}^{i}S_{rrw}^{S} & & \backslash{}^{i}S_{rmw}^{NS} \end{bmatrix}$$

$$B_{[10][5:20]} = {}^{i|lb}n_{lr}^T \cdot \begin{bmatrix} 0_3^T & {}^{i|lr}\tilde{r}_{i_{lrw}} & 0_3^T & 0_3^T & {}^{i|lr}\tilde{r}_{i_{lmw}} & 0_{1\times2} \\ & \backslash\cdot{}^{i}S_{lrw}^{S} & & & \backslash\cdot{}^{i}S_{lmw}^{NS} & \end{bmatrix}, \quad (4.368)$$

-continued $$B_{[11][5:20]} = {}^{i|rb}n_{rfd}^T \cdot \left[\, 0_3^T \;\; 0_3^T \;\; {}^{i|rfd}\tilde{r}_{i_{rfw}} \cdot {}^{i}S_{rfw}^{S} \;\; 0_3^T \;\; 0_{1\times2} \;\; 0_{1\times2} \,\right]$$

$$B_{[12][5:20]} = {}^{i|rr}n_{rrd}^T \cdot \left[\, 0_3^T \;\; 0_3^T \;\; 0_3^T \;\; {}^{i|rrd}\tilde{r}_{i_{rrw}} \cdot {}^{i}S_{rrw}^{S} \;\; 0_{1\times2} \;\; 0_{1\times2} \,\right]$$

$$B_{[13][5:20]} = {}^{i|lb}n_{lfd}^T \cdot \left[\, {}^{i|lfd}\tilde{r}_{i_{lfw}} \cdot {}^{i}S_{lfw}^{S} \;\; 0_3^T \;\; 0_3^T \;\; 0_3^T \;\; 0_{1\times2} \;\; 0_{1\times2} \,\right] \quad (4.369)$$

$$B_{[14][5:20]} = {}^{i|lr}n_{lrd}^T \cdot \left[\, 0_3^T \;\; {}^{i|lrd}\tilde{r}_{i_{lrw}} \cdot {}^{i}S_{lrw}^{S} \;\; 0_3^T \;\; 0_3^T \;\; 0_{1\times2} \;\; 0_{1\times2} \,\right],$$

$$B_{[15][5:20]} = {}^{i|rfd}n_{rfw}^T \cdot \left[\, 0_3^T \;\; 0_3^T \;\; {}^{i|rfw}\tilde{r}_{i_{rfw}} \cdot {}^{i}S_{rfw}^{S} \;\; 0_3^T \;\; 0_{1\times2} \;\; 0_{1\times2} \,\right] \quad (4.370)$$

$$B_{[16][5:20]} = {}^{i|rfd}n_{lfw}^T \cdot \left[\, {}^{i|lfw}\tilde{r}_{i_{lfw}} \cdot {}^{i}S_{lfw}^{S} \;\; 0_3^T \;\; 0_3^T \;\; 0_3^T \;\; 0_{1\times2} \;\; 0_{1\times2} \,\right],$$

$$B_{[17][5:20]} = {}^{i|rrd}n_{rrw}^T \cdot \left[\, 0_3^T \;\; 0_3^T \;\; 0_3^T \;\; {}^{i|rrw}\tilde{r}_{i_{rrw}} \cdot {}^{i}S_{rrw}^{S} \;\; 0_{1\times2} \;\; 0_{1\times2} \,\right]$$

$$B_{[18][5:20]} = {}^{i|lrd}n_{rrw}^T \cdot \left[\, 0_3^T \;\; {}^{i|lrw}\tilde{r}_{i_{lrw}} \cdot {}^{i}S_{lrw}^{S} \;\; 0_3^T \;\; 0_3^T \;\; 0_{1\times2} \;\; 0_{1\times2} \,\right] \quad (4.371)$$

$$B_{[19][5:20]} = {}^{i|lr}n_{lmw}^T \cdot \left[\, 0_3^T \;\; 0_3^T \;\; 0_3^T \;\; 0_3^T \;\; {}^{i|lmw}\tilde{r}_{i_{lmw}} \cdot {}^{i}S_{lmw}^{NS} \;\; 0_{1\times2} \,\right].$$

$$B_{[20][5:20]} = {}^{i|rr}n_{rmd}^T \cdot \left[\, 0_3^T \;\; 0_3^T \;\; 0_3^T \;\; 0_3^T \;\; 0_3^T \;\; {}^{i|rmw}\tilde{r}_{i_{rmw}} \cdot {}^{i}S_{rmw}^{NS} \,\right]$$

Denote k∈[rb,rr,rfd,rfw,rmw,rrd,rrw,lb,lr,lfd,lfw,lmw,lrd,lrw], and find the inverse solution with Eqs. (4.343)-(4.348) to obtain ${}^{i|iL}f_c$, ${}^{i|iL}\tau_c$, $\tau_k^{iL}$, and ${}^{i|lbs}l_{rb_S}$, a total of 21 scalars; thus, From Eq. (4.361) we obtain u. Solution is finished.

From the solution process we know:

[1] There are 6 driving axes and 4 steering axes in the system, and the movement freedom of the mobile MAS is 3, so there are 7 redundant drive axes. 7 constraints are manually added through Eqs. (4.358) and (4.359), which ensures the uniqueness of the inverse solution;

[2] With the dynamic calculation, we can not only calculate the control torque of the system, but also find the only solution of the six wheel-terrain action forces: with the detection of the motion state of the mobile MAS, we indirectly measure the wheel-terrain force with dynamic inverse solution.

Force-Position Control of MAS

This section discusses the Force-Position Control servo problem of MAS. Firstly, we discuss the requirements and the necessary conditions of the Force-Position Control, and then discuss the Force-Position Control principle.

[1] Force-Position Control requirements

The Force-Position Control has a very important effect in MAS, especially in the robot system and the precision machining center.

[1-1] It improves the operation beat. In the production line, especially in the assembly, machining and other operation processes, it is required to improve the operation beat of the robot and the processing center, thereby enhancing the production efficiency and reducing the production costs; while improving the operation beat of MAS, we need to consider the impact of MAS dynamics process.

[1-2] It prevents damage to the structure of MAS to achieve the compliant control. In the machining process, the end effectors of the picking linkage, the cutting linkage and the drilling linkage may come into hard impact with the operation object, which is easy to cause damage to the end effectors and MAS, so we need to achieve the compliant control, that is, when it is subject to the overload force, the system can have a certain degree of flexibility, and will not produce a hard impact. Therefore, the control force of the Driving-Axis is required to be adjusted flexibly and in real-time based on the environment action force. Eq. (4.231) in example 4.9 considers the non-measurable action force, of which the purpose is to lay the foundation for the force position compliant control of the dynamic system.

[1-3] It improves the safety of man-machine collaboration; the robot and people divide works rationally to complete their own works, and we need to protect the safety of man-machine collaboration. In the high-beat robot production line, there are many cases of robot wounding every year. On the one hand, we need to reduce the man-machine interaction scene; on the other hand, we need to enhance the flexible force position tracking control of the robot according to the environment. For example, the Mechanical is automatically controlled technically and does not need to the man to machine teaching process, so as to reduce the necessity of man-machine interaction. The man-machine contact position is identified through the visual inspection, and the man-machine interaction force is detected with the force sensor, so that the control force of each axis of the robot is adjusted flexibly. However, the current force sensor is too large in mass and the volume, the cost is very high, and the system application is complex. It is necessary to realize the force position compliant control of the robot through dynamic modeling and control.

[2] Prerequisites for the Force-Position Control based on the dynamics model of MAS

[2-1] Indirect measurement of the environment action force. The dynamic modeling and the inverse solution of CE3 Rover mobile MAS based on Ju-Kane are elaborated with EXAMPLE 4.10 and in this section.

From EXAMPLE 4.11, we know that the dynamics inverse solution of MAS can calculate the desired control torque or the control force of the driver, and also indirectly measure the force between MAS and the environment. Therefore, it provides the principle support for the Force-Position Control of MAS.

[2-2] All-in-one joint. Since the dynamic response of the force control process is usually 5 to 10 times higher than the response velocity of the position servo control, the joint driver is required to have a higher communication rate and reliability, and the EtherCAT communication can satisfy the communication requirements of the force control. The motor and the reducer are required to have good force characteristics; the joint driving torque is calculated by the current detection by the motor, which requires that the motor load and the current model are accurate, and the force characteristics of the reducer achieve a certain accuracy. The torque motor and the RV reducer are more suitable for the requirements of force control.

[2-3] The robot controller needs to achieve kinematics and dynamics real-time solutions of MAS, and usually needs to reach 300-500 Hz or more, that is, when the motion velocity of the robot and the environmental action is 300-500 mm/s, the position control accuracy can reach mm, which lays the technical foundation for ensuring personal safety.

Structure of the MAS Rigid Body System Dynamics Equation

The system $iL=\{A,K,T,NT,F,B\}$, $|NT|=c$, $|A|=a$ is given, the independent dimension of the non-measurable action force is denoted as e, and the dimension of the Driving-Axis is denoted as d; then, dimension of the unknown action force is $w=d+e$; the number of system equations is $n=a+3c$.

Write the algebraic equation of the non-tree constraint pair in Eqs. (4.274)-(4.277) as a whole $$C_{3c\times a}(q_a,\dot{q}_a)\cdot\ddot{q}_a=0_{3c}. \tag{4.372}$$

The Driving-Axis control generalized force and the non-measurable action force are denoted as $u_n$; write $\ddot{q}$ and the non-tree constraint force as $\ddot{q}_n$ collectively; Write the dynamic equation and the algebraic Eq. (4.372) of the non-tree constraint pair in Eq. (4.260) as a whole $$M_{n\times n}\cdot\ddot{q}_n+h_n=u_n, \tag{4.373}$$

where $u_n$ is the component of the axial driving force and the unknown environment action force; $B_{n\times n}$ is the inverse transfer matrix of the generalized control force of the Driving-Axis and the unknown environment action force. $B_{n\times n}$ is usually inverse, and Eq. (4.373) is expressed as $$M'(q)\cdot\ddot{q}+h'(q,\dot{q})=u, \tag{4.374}$$

where $$M'(q)=B_{n\times n}^{-1}\cdot M_{n\times n}, h'(q,\dot{q})=B_{n\times n}^{-1}\cdot h'_n, u_n=u, \tag{4.375}$$

Because there are inaccurate structural parameters and MAS inertia parameters in the dynamic modeling of MAS, Eq. (4.374) is called the nominal model or theoretical model of the MAS. The corresponding system engineering model or the actual model is denoted as $$M(q)\cdot\ddot{q}+h(q,\dot{q})=u. \tag{4.376}$$

Since $M(q,\dot{q};t)\cdot\ddot{q}$ is an axial inertial force, and is a major term in the system equation, so it is often necessary to consider the upper and lower limits of $M'(q,\dot{q};t)$; it is denoted as $$\underline{m}\cdot I\le M'(q)\le\overline{m}\cdot I, \tag{4.377}$$

where $\underline{m}$ is a lower-limit constant, $\overline{m}$ is an upper-limit constant, and I is a unit matrix.

Eqs. (4.375) and (4.376) are called the dynamic control equations of the rigid MAS, and belong to the affine equations; they have the following characteristics in the structure:

[1] The control input u contains both the axis drive generalized force and the environment action force, which is different from the traditional system control model;

[2] They are linear equations about the control input u;

[3] They are nonlinear equations about the system state q and q;

[4] The joint acceleration $\ddot{q}$ and the control input u have the same dimensions.

On the basis of understanding the structure characteristics of the control equation of MAS, we should carry out the controller design to achieve the goal of the Force-Position Control of MA S.

Force-Position Control Based on Global Linearization

The affinity system is given $$M(q)\cdot\ddot{q}+h(q,\dot{q})=u; \tag{4.378}$$

Figure 51:
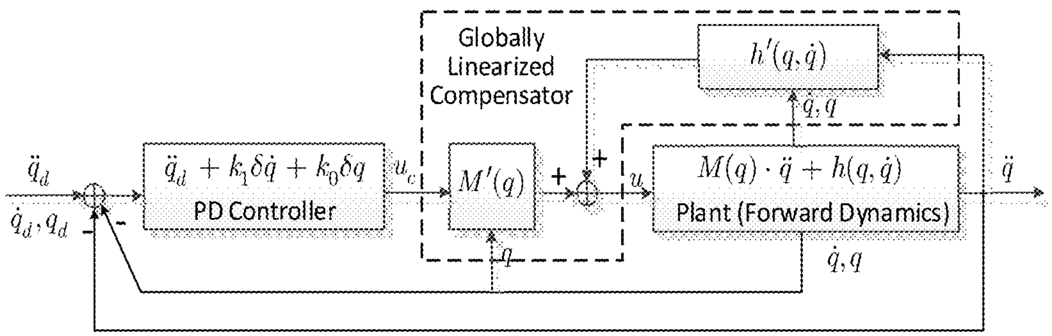
FIG. 51 is a multi-axis system tracking control diagram based on linearizer.

As shown in FIG. 51, build the global linearized compensator $$u=M'(q)\cdot u_c+h'(q,\dot{q}), \tag{4.379}$$

and a stable servo feedback controller[3]

$$k_1\delta\dot{q}+k_0\delta q=u_c-\ddot{q}_d; \tag{4.380}$$

If the servo feedback controller (4.380) is stable, the system (4.378) can achieve the tracking control of the state $[\ddot{q},\dot{q},q]$ to the desired state $[\ddot{q}_d,\dot{q}_d,q_d]$, where $q, u\in\mathcal{R}^n$, $M'(q)$ and $h'(q,\dot{q})$ are respectively nominal models of $M(q)$ and $h(q,\dot{q})$, $\delta\dot{q}=\dot{q}_d-\dot{q}$, $\delta q=q_d-q$.

PROOF: As shown in FIG. 51, the control object itself completes the forward dynamic calculation, and the linearized compensator completes the inverse dynamic calculation.

[1] Implement linearization with the globally linearized compensator

Let Eq. (4.378) be substituted into Eq. (4.379), then $$M(q)\cdot\ddot{q}+h(q,\dot{q})=M'(q)\cdot u_c+h'(q,\dot{q}), \tag{4.381}$$

Sine M'(q) and h'(q,q̇) are respectively nominal models of M(q) and h(q,q̇), so M'(q)→M(q,q̇), h'(q,q̇)→h(q,q̇); let them be substituted into Eq. (4.381) to obtain $$u_c \to \ddot{q} \tag{4.382}$$

Eq. (4.382) shows that the control object is linearized globally.

[2] Eliminate the disturbance caused by model uncertainty by the PD servo feedback control But, in fact, the nominal model does not infinitely approach the system model, so $u_c \approx I_{n\times n}\cdot\ddot{q}$. From Eqs. (4.380) and (4.382), we know that $$u_c = \ddot{q}_d + k_1\delta\dot{q} + k_0\delta q \to \ddot{q}. \tag{4.383}$$

Eq. (4.383) is a second-order n-dimensional linear system. The system gradually becomes stable by adjusting parameters $k_0$ and $k_1$ of the PD controller, i.e. $\ddot{q}\to\ddot{q}_d$. Q.E.D.

From Eq. (4.380), we know that the method cannot directly control $\delta\ddot{q}=\ddot{q}_d-\ddot{q}$; thus, the force position tracking control cannot be achieved.

Force-Position Control of MAS Based on Inverse Model

Impedance control refers to the control for eliminating the influence of the environment resistance on the system, and the environment impedance can be divided into two categories: detectable impedance and undetectable impedance The position vector ${}^{i}r_{IS}$ acted by the impedance ${}^{i}f_{IS}$ is denoted as ${}^{i}r_{IS}$, From Eq. (4.32), then=

$$\dot{r} = J\cdot\dot{q}, \tag{4.384}$$

where $$J(q) = \partial^{i}\dot{r}_{IS}/\partial\dot{q}^{T}$$

From the principles of virtual work "at any time, the power acted by the external force ${}^{i}f_{IS}$ is equal to the power generated by the generalized force $u_i$ acting on the displacement" we know that $${}^{i}\dot{r}_{IS}^{T}\cdot{}^{i}f_{IS} = \dot{q}^{T}\cdot u_i \tag{4.385}$$

Let Eq. (4.384) be substituted into Eq. (4.385), then $$\dot{q}^{T}\cdot J^{T}(q)\cdot{}^{i}f_{IS} = \dot{q}^{T}\cdot u_i \tag{4.386}$$

Since $\dot{q}^T$ is any value, From Eq. (4.386), then $$u_i = J^{T}(q)\cdot{}^{i}f_{IS} \tag{4.387}$$

$u_i$ is the equivalent generalized force of the external impedance ${}^{i}f_{IS}$ of the system (4.378) acting in the direction of the Motion-Axis.

Figure 52:
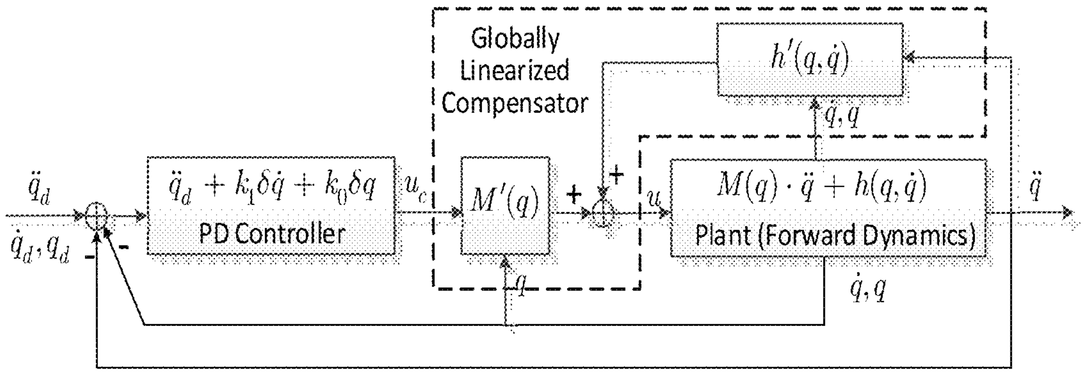
FIG. 52 is a multi-axis system force position control diagram based on the inverse model compensation.

As shown in FIG. 52. the affine system is given $$M(q)\cdot\ddot{q} + h(q,\dot{q}) = u + u_i. \tag{4.388}$$

Build the inverse model compensator $$u' + u'_i + M'(q)\cdot\ddot{q} + h'(q,\dot{q}), \tag{4.389}$$

and a stable servo feedback controller $$k_2\delta\ddot{q} + k_1\delta\dot{q} + k_0\delta q = u_c; \tag{4.390}$$

If the servo feedback controller (4.390) is stable, the system (4.388) can achieve the tracking control of the state $[\ddot{q},\dot{q},q]$ to the desired state $[\ddot{q}_d,\dot{q}_d,q_d]$, where q, $u\in\mathcal{R}^n$, M'(q) and h'(q,q̇) are respectively nominal models of M(q) and h(q,q̇), $\delta\ddot{q}=\ddot{q}_d-\ddot{q}$, $\delta\dot{q}=\dot{q}_d-\dot{q}$, $\delta q=q_d-q$.

PROOF: Let Eq. (4.388) be substituted into Eq. (4.389) to obtain $$M(q)+\cdot\ddot{q} + h(q,\dot{q}) + u_i = M'(q)\cdot\ddot{q} + h'(q,\dot{q}) + u_c + u'_i. \tag{4.391}$$

Since M'(q') and h'(q,q̇) are respectively nominal models of M(q) and h(q,q̇), $u'_i$ is the nominal model of $u_i$; so there are M'(q)→M(q), h'(q,q̇)→h(q,q̇) and $u'_i\to u_i$, From Eq. (4.391), then $$M_0\ddot{q} + h_0 q + h_1\dot{q} + u_c = 0_n, \tag{4.392}$$

where $\delta M(q)=M'(q)-M(q)=M_0$ and $$\delta h(q,\dot{q}) = h'(q,\dot{q}) - h(q,\dot{q}) = h_0 q + h_1\dot{q}.$$

Let Eq. (4.390) be substituted into Eq. (4.392), then $$M_0\ddot{q} + h_0 q + h_1\dot{q} + (k_2\delta\ddot{q} + k_1\delta\dot{q} + k_0\delta q) \equiv 0_n. \tag{4.393}$$

From Eq. (4.393), then $$(k_2 I_{n\times n} - M_0)\ddot{q} + (k_1 I_n - h_1)\dot{q} + (k_0 I_n - h_0)q = k_2\ddot{q}_d + k_1\dot{q}_d + k_0 q_d. \tag{4.394}$$

If the second-order n-dimensional linear system (4.394) is stable, and $k_2 I_{n\times n} >> M_0$, $k_1 I_n >> h_1$, $k_0 I_n >> h_0$; then From Eq. (4.394) we obtain $[\ddot{q},\dot{q},q]\to[\ddot{q}_d,\dot{q}_d,q_d]$; therefore, we achieve the tracking control. At the same time, since $[\ddot{q},\dot{q},q]\to[\ddot{q}_d,\dot{q}_d,q_d]$, MAS based on the inverse model compensator is a global linearized system, where >> stands for much greater than.

Since the system (4.394) is stable, $\delta\ddot{q}$ is controlled by the structural parameters of the system (4.390); From Eq. (4.388) we obtain δu, which is also controlled by the structural parameters of the system (4.390). Therefore, the servo control of external force increment δu is achieved.

When the nominal model $u'_i$ of $u_i$ is known, the disturbance $u_f$ is eliminated directly by the inverse model compensator. When $u'_i$ is unknown, but ${}^{i}r_{IS}$ is known, the external force $u'_i$ can be calculated by the kinematics inverse solution. When $u'_i$ is unknown and ${}^{i}r_{IS}$ is also unknown, as shown in FIG. 52, the disturbance force $u_i$ causes the change in the system joint acceleration $\ddot{q}$, and the influence of the disturbance force on the system is reduced by the automatic adjustment of the PID controller. Q.E.D.

Force-Position Control of MAS Based on Sliding Mode

The PD impedance control based on the global linearized compensator is suitable for the more accurate model of the controlled object and the measurable impedance. When the model of the controlled object is not accurate or the environment impedance is not detectable, it is necessary to design a robust controller in order to ensure the control performance of the system. In the following, we give the preliminary knowledge and then elaborate the variable structure control theorem based on the fuzzy sliding mode and prove it.

DEFINITION 4.1. The real symmetric matrix $B\in\mathcal{R}^{n\times n}$ of n×n is called the positive definite; if $x^T Bx>0$, $x\neq 0$[4,5].

If the above strict inequality is weakened as $x^T\cdot B\cdot x\geq 0$, then B is called the positive semi-definite matrix.

DEFINITION 4.2. For all x∈R, conditions enabling the scalar function ƒ(x): R→R positive definite are as follows [4,5]:

(a) ƒ(0)=0; (b) ƒ(x)>0; (c) ƒ(x) is continuous; (d) ∂ƒ/∂x is continuous;

If the above condition (b) is weakened as ƒ(x)≥0, then ƒ(x) is positive semi-definite.

DEFINITION 4.3. Assuming that A, $B\in\mathcal{R}^{n\times n}$ is a real symmetric matrix, then when, and only when, the matrix is A−B positive definite, A>B; similarly, when A−B is positive semi-definite, A≥B[4,5].

DEFINITION 4.4. When there is only a positive number α>0, if ∀l≥0, B(t)≥α≠I, then the time-varying matrix $B(t)\in\mathcal{R}^{n\times n}$ is consistent positive definite.

COROLLARY 4.1. When, and only when, the eigenvalue is positive (or non-negative), the real symmetric matrix $B\in\mathcal{R}^{n\times n}$ is positive definite (or positive semi-definite).

COROLLARY 4.2. When, and only when, the inverse matrix $B^{-1}$ is positive definite, the nonsingular matrix $B\in\mathcal{R}^{n\times n}$ is positive definite[4,5].

COROLLARY 4.3. If both A, $B\in\mathcal{R}^{n\times n}$ are real symmetric matrixes and A≥B, there is for any vector $x\in\mathcal{R}^{n}$ $$x^T\cdot A\cdot x\geq x^T\cdot B\cdot x \tag{4.395}$$

THEOREM 4.7. If the matrix $A\in\mathcal{R}^{n\times n}$ is nonsingular and has an independent eigenvalue, then there is a similar transformation $A=V^1\neq\delta(A)\cdot V$; δ(A) is a diagonal matrix composed of the eigenvalues of A, and V is a nonsingular matrix composed of eigenvectors[4,5].

THEOREM 4.8. If A, $B\in\mathcal{R}^{n\times n}$ is a nonsingular matrix of n×n with independent eigenvalues, and A and B are interchangeable, i.e. AB=BA, then they have the same eigenvector satisfying $A=V^{-1}\cdot\delta(A)\cdot V$ and $B=V^{-1}\cdot\delta(B)\cdot V$, where δ(A) and δ(B) are respectively diagonal matrixes of A and B in respect to the eigenvector[4,5].

THEOREM 4.9. If there are the positive definite matrices $B\in\mathcal{R}^{n\times n}$ of n×n and two arbitrary vectors x, $y\in\mathcal{R}^{n}$, the following inequality is called the "universal Cauchy-Schwarz inequality":

$$x^T\cdot B\cdot y\leq\sqrt{x^T\cdot B\cdot x}\cdot\sqrt{y^T\cdot B\cdot y} \tag{4.396}$$

According to the above theorem, we obtain the following conclusions:

COROLLARY 4.4. If A, $B\in\mathcal{R}^{n\times n}$ is positive definite or positive semi-definite, and A and B are interchangeable, i.e. A·B=B·A, then the matrix A·B is also positive definite or positive semi-definite[4,5].

PROOF: If A and B are interchangeable, according to theorem 4.8, there is $$A\cdot B=V^{-1}\cdot\delta(A)\cdot V\cdot V^{-1}\cdot\delta(B)\cdot V=V^{-1}\cdot\delta(A\cdot B)\cdot V,$$

Where δ(A·B)=δ(A)·δ(B), the eigenvalues of A and B are the product of the eigenvalues of A and B. According to Inference 7.1, if A and B are positive definite or positive semi-definite, then their eigenvalues are positive (non-negative), so their product is also positive Non-negative). Thus, we prove that A·B is positive definite or positive semi-definite. Q.E.D.

THEOREM 4.10. Assuming that there is a positive definite matrix $B\in\mathcal{R}^{n\times n}$ of n×n and there is a positive real number b>0 that makes b·I>B, I is a unit matrix of n×n. Assuming that any vector $y\in\mathcal{R}^{n}$ and ||y||≤ρ, there is the following inequality for any vector[4,5]:

$$x^T\cdot B\cdot y\leq b\cdot\rho\cdot\|x\| \tag{4.397}$$

PROOF: Since b·I−B is positive semi-definite, then there is the following for any vector x, $y\in\mathcal{R}^{n}$:

$$x^T\cdot(b\cdot I-B)\cdot x\geq 0$$

$$y^T\cdot(b\cdot I-B)\cdot y\geq 0$$

So $$x^T\cdot B\cdot x\leq b\cdot\|x\|^2$$

$$y^T\cdot B\cdot y\leq b\cdot\|y\|^2.$$

From ||y||≤ρ and (4.395), then $$y^T\cdot B\cdot y\leq b\cdot\rho^2 \tag{4.398}$$

According to theorem 4.9, there is the following for the bounded vector y and any vector x:

$$x^T\cdot B\cdot y\leq\sqrt{x^T\cdot B\cdot x}\cdot\sqrt{y^T\cdot B\cdot y} \tag{4.399}$$

From Eqs. (4.399) and (4.398), then $$x^T\cdot B\cdot y\leq\sqrt{b\cdot\|x\|^2}\cdot\sqrt{b\cdot\rho^2}$$

So $\bar{x}\cdot B\cdot y\leq b\cdot\rho\cdot\|x\|$. Q.E.D.

THEOREM 4.11. Considering $M\in\mathcal{R}^{n\times n}$ is the positive definite matrix of n×n and $K\in\mathcal{R}^{n\times n}$ is the diagonal positive definite matrix of n×n, if there is a positive real number m>0 and m·I≥M, there is the following for any vector $X\in\mathcal{R}^{n}$ [1,5]:

$$m\cdot x^T\cdot M^{-1}\cdot K\cdot x\geq x^T\cdot K\cdot x \tag{4.400}$$

PROOF: m·I≥M means that m·I−M is positive semi-definite. According to Inference 4.2, if M is positive definite, then $M^{-1}$ is also positive definite. Since K is diagonal, then $M^{-1}\cdot K$ can be interchangeable, according to inference 4.4, $M^{-1}\cdot K$ positive semi-definite. So, there is $$(m\cdot I-M)\cdot M^{-1}\cdot K=M^{-1}\cdot K\cdot(m\cdot I-M)$$

According to inference 4.4, the condition to make $(mI-M)\cdot M^{-1}\cdot K$ to be positive semi-definite is as follows:

$$(mI-M)\cdot M^{-1}\cdot K=M^{-1}\cdot K\cdot(m\cdot I-M)$$

Or $$M^{-1}\cdot K\geq\frac{1}{m}\cdot K\cdot I$$

According to Inference 4.3, there is the following for any vector $x\in\mathcal{R}^{n\times n}$:

$$x^T\cdot M^{-1}\cdot K\cdot x\geq\frac{1}{m}\cdot x^T\cdot K\cdot x$$

or $$m\cdot x^T\cdot M^{-1}\cdot K\cdot x\geq x^T\cdot K\cdot x$$

i.e.

$$x^T\cdot M^{-1}\cdot x\geq\frac{1}{m}\cdot x^T\cdot x=\frac{1}{m}\cdot\|x\|^2$$

Q.E.D.

Fuzzy Variable Structure Control

THEOREM 4.12 As shown in FIG. 53, considering the affine system with the input SEQS of $u=[u_{[1]}:u_{[n]}]^T$ and the state SEQS of $q=[q_{[1]}:q_{[n]}]^T$, i∈[1:n].

[1] System structure and parameters include:

[1.1] The affine system model is denoted as $$u=M(q,\dot{q};t)\cdot\ddot{q}+h(q,\dot{q};t)=f(q,\dot{q},\ddot{q};t) \tag{4.401}$$

[1.2] The nominal affine system model is denoted as $$u'=M'(q,\dot{q};t)\cdot\ddot{q}+h'(q,\dot{q};t)=f'(q,\dot{q},\ddot{q};t) \tag{4.402}$$

and $$\underline{m}(q,\dot{q};t)\cdot I_n\le M'(q,\dot{q};t)\le\overline{m}(q,\dot{q};t)\cdot I_n, \tag{4.403}$$

where $q\in\mathcal{R}^n$, $\overline{m}$ and $\underline{m}$ respectively stand for the least upper bound and the greatest lower bound, and are positive definite functions, $M'\in\mathcal{R}^{n\times n}$, $h'\in\mathcal{R}^{n\times n}$, $u'\in\mathcal{R}^n$.

[1.3] Let the errors of two system models meet $$\|\Delta f(q,\dot{q},\ddot{q}_r;t)\|=\|f'(q,\dot{q},\ddot{q};t)-f(q,\dot{q},\ddot{q}_r;t)\|\le\rho(q,\dot{q},\ddot{q}_r;t)<\infty \tag{4.404}$$

[1.4] The system deviation is denoted as $$e=q-q_d. \tag{4.405}$$

where $q_d$ is the system control objective.

[1.5] The generalized error is denoted as $$s=\dot{e}+P\cdot e+Q\cdot\int_0^t e\,dt, \tag{4.406}$$

The sliding mode superplane is $$\dot{s}=\ddot{e}+P\cdot\dot{e}+Q\cdot e=0, \tag{4.407}$$

where $$P=2\Lambda, Q=\Lambda^2, \tag{4.408}$$

$\Lambda$ is the positive definite diagonal matrix of n×n, and $\lambda_{[i]}$ is the diagonal element of $\Lambda$, and $\lambda_{[i]}>0$.

[1.6] The reference acceleration is denoted as $$\ddot{q}_r=\ddot{q}_d-2\cdot\Lambda\cdot\dot{e}-\Lambda^2\cdot e. \tag{4.409}$$

[1.7] The boundary thickness of the sliding mode is expressed as $\phi_{[i]}$, where $\phi_{[i]}$ stands for the generalized error control boundary, and $\phi_{[i]}>0$; the set of states $q_{[i]}$ within the generalized error control boundary is, $$N_{[i]}(s_{[i]},\phi_{[i]})=\{q_{[i]}\in R:|s_{[i]}|\le\phi_{[i]}\}; \tag{4.410}$$

$N_{[i]}(s_{[i]},\phi_{[i]})$ is called the neighborhood of the sliding mode surface.

[2] Control objective and control law

If the closed-loop control system is expected to satisfy Lyapunov-like stability in the control process from the initial stale q(0) to the sliding mode surface, i.e.

$$\frac{1}{2}\cdot\frac{d}{dt}(s^T\cdot s)\le-\sum_{i=1}^{n}(\eta_{[i]}\cdot(|s_{[i]}|-\phi_{[i]})), \tag{4.411}$$

where $\eta_{[i]}>0$, $\phi_{[i]}>0$; then the fuzzy sliding mode control law of the system is[4,5]:

$$\begin{cases} u=u'_d+u_c \\ u'_d=M'(q,\dot{q};t)\cdot\ddot{q}_r+h'(q,\dot{q};t) \end{cases}; \tag{4.412}$$

Figure 54:
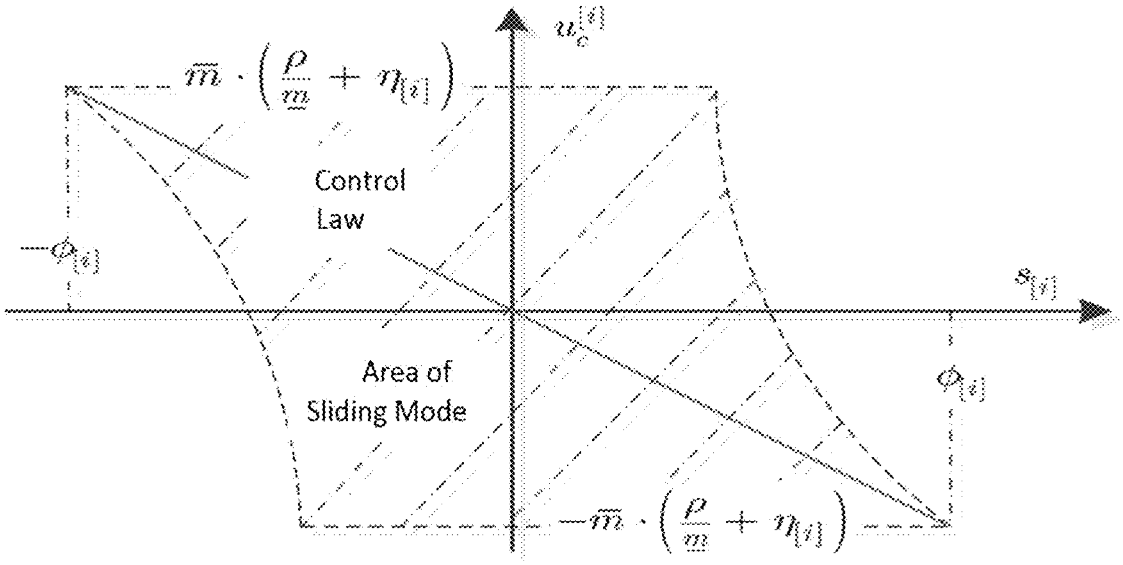
FIG. 54 is a diagram of fuzzy variable structure control law.

FIG. 54 is the fuzzy sliding model control law of the system. As shown in FIG. 54, and the ith control input $u_c^{[i]}$ meets:

[2.1] When $s_{[i]}>0$, $$u_c^{[i]}<-\left(\overline{m}\cdot\left(\frac{\rho}{\underline{m}}+\eta_{[i]}\right)-\overline{m}\cdot\frac{\eta_{[i]}\cdot\phi_{[i]}}{|s_{[i]}|}\right); \tag{4.413}$$

[2.2] When $s_{[i]}<0$, $$u_c^{[i]}>\overline{m}\cdot\left(\frac{\rho}{\underline{m}}+\eta_{[i]}\right)-\overline{m}\cdot\frac{\eta_{[i]}\cdot\phi_{[i]}}{|s_{[i]}|}; \tag{4.414}$$

[2.3] $u_c^{[i]}$ is continuously monotonous, when $s_{[i]}=0$ $$u_c^{[i]}(0)=0. \tag{4.415}$$

PROOF: From Eqs. (4.407) and (4.408) we know that: the characteristic root of the sliding mode surface $\dot{s}=\ddot{e}+P\cdot\dot{e}+Q\cdot e=0$ is $\lambda_{[i]}$, and $\lambda_{[i]}>0$, so $\dot{s}$ trends to be stable exponentially. Therefore, any nonzero initial state q(0) can reach the sliding mode surface.

From Eq. (4.411), we know that the generalized error for the state outside the neighborhood $N_{[i]}(s_{[i]},\phi_{[i]})$ of the sliding mode surface represented by Eq. (4.410) satisfies the asymptotic stability, thus avoiding the chattering effect in the sliding mode control.

From Eqs. (4.405) and (4.407), then $$\dot{s}=\ddot{e}+2\cdot\Lambda\cdot\dot{e}+\Lambda^2\cdot e=\ddot{q}-(\ddot{q}_d-2\cdot\Lambda\cdot\dot{e}-\Lambda^2\cdot e). \tag{4.416}$$

From Eq. (4.374), then $$\ddot{q}=M^{-1}(q,\dot{q};t)\cdot(u-h(q,\dot{q};t)). \tag{4.417}$$

Let Eq. (4.417) be substituted into Eq. (4.416), then $$\dot{s}=M^{-1}(q,\dot{q};t)\cdot\backslash(u-M(q,\dot{q};t)\cdot(\ddot{q}_d-2\cdot\Lambda\cdot\dot{e}-\Lambda^2\cdot e)-h(q,\dot{q};t)). \tag{4.418}$$

Let Eq. (4.409) be substituted into Eq. (4.418), then $$\dot{s}=M^{-1}(q,\dot{q};t)\cdot(u-(M(q,\dot{q};t)\cdot\ddot{q}_r+h(q,\dot{q};t))) \tag{4.419}$$

Let Eq. (4.412) be substituted into Eq. (4.419), then $$\dot{s}=M^{-1}(q,\dot{q};t)\cdot\begin{pmatrix} M'(q,\dot{q};t)\cdot\ddot{q}_r+h'(q,\dot{q};t)+u_c\backslash- \\ (M(q,\dot{q};t)\cdot\ddot{q}_r+h(q,\dot{q};t)) \end{pmatrix}. \tag{4.420}$$

From Eqs. (4.404) and (4.420), then $$\begin{aligned}\dot{s}&=M^{-1}(q,\dot{q};t)\cdot(u_c+(f'(q,\dot{q},\ddot{q}_r;t)-f(q,\dot{q},\ddot{q}_r;t)))\\&=M^{-1}(q,\dot{q};t)\cdot u_c+M^{-1}(q,\dot{q};t)\cdot\Delta f(q,\dot{q},\ddot{q}_r;t)\end{aligned}, \tag{4.421}$$

where $\Delta f(q,\dot{q},\ddot{q}_r;t)$ is the system uncertain vector, and the controlled quantity $u_c$ is the compensation input for the system instability.

From Eq. (4.421), we know that $$\begin{aligned}s^T\cdot\dot{s}&=s^T\cdot M^{-1}(q,\dot{q};t)\cdot u_c\\&+s^T\cdot M^{-1}(q,\dot{q};t)\cdot\Delta f(q,\dot{q},\ddot{q}_r;t)\end{aligned}. \tag{4.422}$$

From Eqs. (4.404), (4.422), (4.377) and theorem 4.10, we know $$s^T\cdot M^{-1}(q,\dot{q};t)\cdot\Delta f(q,\dot{q},\ddot{q}_r;t)\le 1/\underline{m}\rho(q,\dot{q},\ddot{q}_r;t)\cdot\|s\|. \tag{4.423}$$

Since $$\|s\|\le\sum_{i=1}^{n}|s_i| \tag{4.424}$$

And (4.422), then $$s^T\cdot\dot{s}\le\frac{1}{\underline{m}}\cdot\rho(q,\dot{q},\ddot{q}_r;t)\cdot\sum_{i=1}^{n}|s_i|+s^T\cdot M^{-1}(q,\dot{q};t)\cdot u_c. \tag{4.425}$$

From Eq. (4.425), select $u_c$ to meet the following conditions $$\frac{1}{\underline{m}}\cdot\rho(q,\dot{q},\ddot{q}_r;t)\cdot\sum_{i=1}^{n}|s_i|+s^T\cdot M^{-1}(q,\dot{q};t)\cdot u_c\le-\sum_{i=1}^{n}(\eta_i\cdot|s_i|-\eta_i\cdot\phi_i)<0. \tag{4.426}$$

in order to ensure $s^T\cdot\dot{s}<0$, i.e. ensure the generalized error $s_{[i]}\to 0$ of the system. Eq. (4.426) is $$s^T\cdot M^{-1}(q,\dot{q};t)\cdot u_c\le-\sum_{i=1}^{n}\left[\left(\frac{\rho(q,\dot{q},\ddot{q}_r;t)}{\underline{m}}+\eta_i\right)\cdot|s_i|-\eta_i\cdot\phi_i\right]. \tag{4.427}$$

Select $u_c^{[i]}$ as the function of $s_i$, $u_c^{[i]}(s_i)$, to meet the following conditions:

a) $u_c^{[i]}(s_i)$ is a continuous function; b) when $0<|s_i|<\phi_i$, $u_c^{[i]}(s_i)$ is monotonically decreasing; c) $u_c^{[i]}(0)=0$ Since when $u_c^{[i]}(0)=0$, Eq. (4.427) is established; when $0<|s_i|<\phi_i$, $u_c^{[i]}(s_i)$ is monotonically decreasing, and (4.427) must be established, take $u_c^{[i]}(s_i)$ as $$u_c=-G(s_i)\cdot\Omega(s_i)\cdot s, \tag{4.428}$$

where G is the positive definite diagonal matrix of n×n; $g_i(s_i)$ is the diagonal element of G and is a positive definite function; Ω is also the positive definite diagonal matrix of n×n, and $1/|s_i|$ is a diagonal element;

When $s_i=0$, the diagonal element of $G(s_i)\cdot\Omega(s_i)$ is 0. Obviously, Eq. (4.428) can guarantee that Eq. (4.427) is established.

Definition $$dsgn(s_i)=\begin{cases}-1 & \text{if } s_i<0\\ 0 & \text{if } s_i=0\\ +1 & \text{if } s_i>0\end{cases}. \tag{4.429}$$

Let Eq. (4.428) be substituted into Eq. (4.427), then $$\overline{m}\cdot s^T\cdot M^{-1}(q,\dot{q};t)\cdot G(s_i)\cdot\Omega(s_i)\cdot s\ge\overline{m}\cdot\sum_{i=1}^{n}\left[\left(\frac{\rho(q,\dot{q},\ddot{q}_r;t)}{\underline{m}}+\eta_i\right)\cdot|s_i|-\eta_i\cdot\phi_i\right]. \tag{4.430}$$

Since $G(s_i)\cdot\Omega(s_i)$ is at least positive semi-definite, according to theorem 4.11 we obtain $$\overline{m}\cdot s^T\cdot M^{-1}(q,\dot{q};t)\cdot G(s_i)\cdot\Omega(s_i)\cdot s\ge s^T\cdot G(s_i)\cdot\Omega(s_i)\cdot s=\sum_{i=1}^{n}(g_i(s_i)\cdot s_i\cdot dsgn(s_i))\ge 0. \tag{4.431}$$

From Eq. (4.431), considering Eqs. (4.431) and (4.430), if let $$\sum_{i=1}^{n}(g_i(s_i)\cdot s_i\cdot dsgn(s_i))\ge\overline{m}\cdot\sum_{i=1}^{n}\left[\left(\frac{\rho(q,\dot{q},\ddot{q}_r;t)}{\underline{m}}+\eta_i\right)\cdot|s_i|-\eta_i\cdot\phi_i\right] \tag{4.432}$$

established, and since $s_i dsgn(s_i)=|s_i|$, then we need that $$g_i(s_i)>\overline{m}\cdot\left(\frac{\rho(q,\dot{q},\ddot{q}_r;l)}{\underline{m}}+\eta_i\right)-\frac{\overline{m}\cdot\eta_i\cdot\phi_i}{|s_i|} \tag{4.433}$$

is established; Eq. (4.433) is a constraint condition for controlling the input $u_c$ in Eq. (4.428).

Eq. (4.428) is equivalent to $$u_c^{[i]}=-g_i(s_i)\cdot\frac{1}{|s_i|}\cdot s_i=-g_i(s_i)\cdot dsgn(s_i); \tag{4.434}$$

i.e. if $s_i>0$, $$u_c^{[i]}=-g_i(s_i); \tag{4.435}$$

When $s_i<0$ $$u_c^{[i]}=g_i(s_i); \tag{4.436}$$

From Eqs. (4.435) and (4.436), to respectively obtain Eq. (4.413), Eq. (4.414) is established. Q.E.D.

The robust control based on the sliding mode has the following advantages compared with the traditional sliding mode control:

[1] It has the robust control for the imprecise dynamic models;

[2] Since the sliding mode control law uses the soft switching, as compared with the hard switching of the traditional sliding mode control, it can greatly reduce the "chattering" to reduce the hard impact on the system;

The robust control based on the sliding mode is only applicable to systems where the system inputs are consistent with the number of independent states of the system, but not applicable to undercontrol systems where the system inputs are not consistent with the number of independent states of the system or the redundant control systems; the undercontrol systems or redundant control system cannot be done by the simple control, which are essentially control problems with online planning functions.

Example of the Force-Position Control of MASs

The CE3 Rover dynamic equation in example 4.11 is applied as the nominal model of the rover, MAS Force-Position Control based on the fuzzy variable structure is applied, and the rover dynamic simulation system is applied for simulation verification. The joint variable SEQS of the rover is $$q=\begin{bmatrix}{}^{c|i}r_c,\ {}^{c|i}\phi_c,\ \phi_{rh}^{c},\ \phi_{lh}^{c},\ \phi_{rr}^{rb},\ \phi_{lr}^{lb},\ \phi_{rfd}^{rb},\ \phi_{rrd}^{rr},\\ \backslash\phi_{lfd}^{lb},\ \phi_{lrd}^{lr},\ \phi_{rfw}^{rfd},\ \phi_{lfw}^{lfd},\ \phi_{rrw}^{rrd},\ \phi_{lrw}^{lrd},\ \phi_{rmw}^{rr},\ \phi_{lmw}^{lr},\end{bmatrix}^T.$$

The desided control is $q_d=[{}^{c|i}r_c^{[1]},{}^{c|i}\phi_c^{[3]}]^T$, $\dot{q}_d=[{}^{c|i}\dot{r}_c^{[1]},{}^{c|i}\dot{\phi}_c^{[3]}]^T$, ${}^{c|i}\dot{r}_c^{[2]}\equiv 0$. $\ddot{q}_d=[{}^{c|i}\ddot{r}_c^{[1]},{}^{c|i}\ddot{\phi}_c^{[3]}]^T$.

Simulation shows that:

[1] The rover dynamic calculation based on the Ju-Kane method only takes 1/16 to 1/20 the time of the dynamics of the Newton-Euler method;

[2] The Multi-Axis control principle based on the fuzzy variable structure is correct to meet the engineering needs of the rover control;

[3] The rover dynamics based on the Ju-Kane method can be applied to the real-time control, and can also calculate the force between the rover and the environment in real-time.

Section Four: Additional Remarks

From the introduction above, we know that this patent provides the method about how to modelling a multi-axis robot devices and how to calculate the movement and the dynamics of the device. To know more about the method, we illustrate some examples and prove the feasibility of the method.

In addition to the examples and method illustrated here, other deformation or replacement should also be considered to infringe the claims of this innovation.

The invention claimed is:

1. An axis-invariant based multi-axis robot inverse kinematics modeling and solving method for controlling a multi-axis robot device wherein a multi-axis robot system for the multi-axis robot device comprises link sequence and joint sequence; the modeling and solving method includes:

- converting the joint sequence in an axis-chain axiom into an axis sequence and a parent axis sequence where the axis in the axis sequence are translational axis or rotational axis; expressing the restraint axis in the closed-chain as non tree are sequence; achieving isomorphic structures of the multi-axis robot system and a variable topology structure;
- using the axis sequence to describe the multi-axis robot system; using an axis invariant corresponding to the axis in a set of axes of the robot device to calculate the control parameters of the multi-axis robot system wherein for two links on an axis, the axis invariant of this axis does not change with motion of the corresponding joint for the two links; constructing an isomorphic system that maps with the axis one by one through a topological axis element and a metric involute axis invariable element, and using the calculated control parameters to control the multi-axis robot system.

2. The modeling and solving method according to claim 1, wherein the axis invariants have the following characteristics:

- for two links on an axis, the axis invariants of this axis not changing with the corresponding joint motion;
- the axis invariants having a zero-position reference direction;
- the absolute derivative of the axis invariant relative to time as a reference axis corresponding to the axis invariant being constant to zero;
- the axis invariant and any independent vector determining a unique radial zero vector;
- the axis invariants having a nilpotent characteristic in 3D space and 4D space;
- constituting a fixed axis invariant, the axis invariants and a position vector measured in origins of the axis invariant and its adjacent axis invariant constituting a fixed axis invariant, which represent both the 3D structure spiral and the 3D motion spiral; these excellent operating performance making the multi-axis robot system positive kinematics have inherently compaction, function multiplexing performance and concise hierarchical process, meet kinematic chain axiom and metric axioms, have the function of pseudo code and accurate physical meaning; and have a basis of 3D spatial operation algebra, which intuitively describes the spatial motion relationship of the robot with motions including projection, position alignment, direction alignment, attitude alignment, spiral moment.

3. The modeling and solving method according to claim 1, which applies the Dixon elimination and solution principle of n "using N-order" polynomials to solve kinematic equations.

4. The modeling and solving method according to claim 3, wherein the Dixon elimination and solution principle of n "nano-order N-order" polynomials are used to perform inverse solution calculation which is shown as processes of inversing a position of a 3R robotic arm based on the axis invariants, and the main steps include:

- [1] obtaining n "n-dimensional two-order" polynomial equations according to the position and pose n-dimensional 3D vector equation of the 3R robotic arm;
- [2] applying Dixon determinant formula based on the axis invariant, determinant formula of block matrix, or stepwise calculation of determinant to simplify determinant calculation;
- [3] applying the n "n-dimensional N-order" polynomials of Dixon elimination and solution principle to complete the inverse kinematics solution, where: a one-dimension high-order polynomial equation is obtained when a value of Dixon determinant obtained from the Dixon determinant formula is 0, and a one-dimension high-order polynomial equation based on companion matrix is applied to obtain the solution of a one-dimension high-order polynomial equation.

5. The modeling and solving method according to claim 1, wherein firstly, a precise measurement principle of fixed axis invariants is applied to complete accurate measurement of system structural parameters; then, D-H and D-H parameter determination principle based on fixed axis invariant is applied to accurately calculate D-H and D-H parameters including the effects of machining and assembly errors.

6. The modeling and solving method according to claim 1, wherein 2R and 3R inverse attitude solution principles based on axis invariant and D-H parameters is applied to calculate 1R/2R/3R inverse attitude solutions accurately and in real time.

7. The modeling and solving method according to claim 1, wherein "Ju-Gibbs" quaternion and "class direction cosin matrix" is applied to establish vector kinematic equation; wherein the "Ju-Gibbs" quaternion is expressed as $$^{\bar{l}}\boldsymbol{\tau}_{l} \triangleq [\tau_l \cdot {}^{\bar{l}}n_l, {}^{\bar{l}}\boldsymbol{\tau}_{l}^{[4]}]^T = [{}^{\bar{l}}\tau_l, {}^{\bar{l}}\boldsymbol{\tau}_{l}^{[4]}]^T \cong {}^{\bar{l}}\dot{\lambda}_l, \phi_l^{\bar{l}} \in (-\pi, \pi),$$

and the class direction cosine matrix is expressed as $$^{i}Q_n = \prod_{l}^{^{i}1_n}\left(1 + 2 \cdot \tau_l \cdot {}^{\bar{l}}\tilde{n}_l + \tau_l^{:2} \cdot {}^{\bar{l}}N_l\right), {}^{\bar{l}}N_l = 1 + 2 \cdot {}^{\bar{l}}\tilde{n}_l^2.$$

8. The modeling and solving method according to claim 1, wherein general purpose 6R robot arm 4th and 5th-axis solution method is based on a "Ju-Gibbs" quaternion 2R robot finger inverse solution, or a class DCM 2R robot finger inverse solution.

9. The modeling and solving method according to claim 8: a step for the inverse solution based on the "Ju-Gibbs" quaternion 2R robot finger: considering axis alignment $^{i}1_l$ based on the judgment alignment principle of the "Ju-Gibbs" quaternion, $|R_l^i|>2$; if the unit axis vector $^{\bar{l}}n_l$ is aligned with the desired unit axis vector $_d^{i|\bar{l}}n_l$, there being at least one multi-axis rotating "Ju-Gibbs" quaternion $_d^{i}\boldsymbol{\tau}_{\bar{l}}^{T}=[_d^{i}n_{\bar{l}} \cdot {}_d\tau_{\bar{l}}^{i},1]$; wherein $$\begin{cases} {}_{d}^{i}n_{\bar{l}} = \left({}_{d}^{i|\bar{l}}\tilde{n}_l + {}^{\bar{l}}\tilde{n}_l\right)\cdot\left({}_{d}^{i|\bar{l}}n_l - {}^{\bar{l}}n_l\right) \\ {}_{d}\tau\frac{i}{l} = \dfrac{\left\|{}_{d}^{i|\bar{l}}n_l - {}^{\bar{l}}n_l\right\|}{\left\|{}_{d}^{i|\bar{l}}n_l + {}^{\bar{l}}n_l\right\|} \end{cases}; \text{ if } {}_{d}^{i|\bar{l}}n_l \neq \pm{}^{\bar{l}}n_l,$$

$${}_{d}^{i}n_{\bar{l}} = {}^{\bar{\bar{l}}}\tilde{n}_{\bar{l}}\cdot{}^{\bar{l}}n_l,\ {}_{d}\tau\frac{i}{l} = 0; \text{ if } {}_{d}^{i|\bar{l}}n_l = {}^{\bar{l}}n_l,$$

$${}_{d}^{i}n_{\bar{l}} = {}^{\bar{\bar{l}}}\tilde{n}_{\bar{l}}\cdot{}^{\bar{l}}n_l,\ {}_{d}\tau\frac{i}{l} = \pm\propto; \text{ if } {}_{d}^{i|\bar{l}}n_l = -{}^{\bar{l}}n_l,$$

and then expounding the 2R robotic arm pointing inverse solution theorem based on "Ju-Gibbs" quaternion alignment;

if 6R rotation chain ${}^{i}l_6$=(i,1:6] is given, denoting the "Ju-Gibbs" quaternion of the 5th axis joint expects as ${}_{d}^{i}\boldsymbol{\tau}_5$, and denoting the 3rd axis joint "Ju-Gibbs" specification quaternion as ${}_{d}^{i}\boldsymbol{\tau}_3$, then there being an inverse solution to the alignment $$\begin{cases} \tau_4 = \dfrac{{}^{3}E_5^{[1][*]}\cdot{}_{d}^{3}\tau_5}{1+{}^{3}n_4^T\cdot{}^{4}n_5\cdot{}^{3}E_5^{[3][*]}\cdot{}_{d}^{3}\tau_5} \\ \tau_5 = \dfrac{{}^{3}E_5^{[2][*]}\cdot{}_{d}^{3}\tau_5}{1+{}^{3}n_4^T\cdot{}^{4}n_5\cdot{}^{3}E_5^{[3][*]}\cdot{}_{d}^{3}\tau_5} \end{cases},$$

$$\text{if } 1+{}^{3}n_4^T\cdot{}^{4}n_5\cdot{}^{3}E_5^{[3][*]}\cdot{}_{d}^{3}\tau_5 \neq 0,$$

$$\tau_4 = \frac{{}^{3}E_5^{[3][*]}\cdot{}_{d}^{3}\tau_5}{{}^{3}E_5^{[2][*]}\cdot{}_{d}^{3}\tau_5},\ \tau_5 = \frac{{}^{3}E_5^{[3][*]}\cdot{}_{d}^{3}\tau_5}{{}^{3}E_5^{[1][*]}\cdot{}_{d}^{3}\tau_5};$$

$$\text{if } 1+{}^{3}n_4^T\cdot{}^{4}n_5\cdot{}^{3}E_5^{[3][*]}\cdot{}_{d}^{3}\tau_5 = 0;$$

wherein $$\tau_3^i\cdot{}_{d}^{3}\tau_5 = {}_{d}^{3}\tilde{\tau}_i\cdot{}_{d}^{i}\tau_5,\ {}_{d}^{i}\tau_5 = {}_{d}^{i}n_5\cdot{}_{d}\tau_5^3,$$

$${}^{3}E_5^{:-1} = \left[{}^{3}n_4 \quad {}^{4}n_5 \quad {}^{3}\tilde{n}_4\cdot{}^{4}n_5\right],$$

in the formula, ${}^{3}E_5^{[3][\bullet]}$ denoting the third row, all columns of ${}^{3}E_5$; ${}^{3}n_4$ denoting a coordinate vector from link 3 to link 4, which is an axis invariant; ${}^{3}\tilde{n}_4$ denoting the cross-product matrix of axis invariant ${}^{3}n_4$, and the rest of the links being the same;

compared with the Euler quaternions and dual quaternions, there being no redundancy equation in the position and pose alignment of "Ju-Gibbs" quaternion representations; calculating 4th and 5th axes of robot joint by using alignment which lay a foundation of 6R and 7R robot arm inverse solution.

10. The modeling and solving method according to claim 8, its DCM 2R robot finger inverse solution: given 6R rotation chain ${}^{i}l_6$=(i,1:6], known ${}^{3}n_4$ and ${}^{4}n_5$, system mechanism parameters ${}^{5}l_6$ and desired pointing ${}_{d}^{3|5}l_6$, noting a 5th axis joint direction cosine matrix expectation as ${}_{d}^{i}Q_5$ and 3rd axis joint direction expectation direction cosine matrix as ${}_{d}^{i}Q_3$, there being an inverse solution whose system mechanism parameter ${}^{5}l_6$ is aligned with a desired direction ${}_{d}^{3|5}l_6$ to satisfy the following equation $$\begin{bmatrix} {}^{5}l_6 - {}_{d}^{3|5}l_6,\ 2\cdot{}^{3}\tilde{n}_4\cdot{}^{5}l_6,\ 2\cdot{}^{5}l_6^{\perp},\ 4\cdot{}^{3}\tilde{n}_4\cdot{}^{5}l_6^{\perp}, \\ {}^{3}N_4\cdot{}^{5}l_6 - {}_{d}^{3|5}l_6,\ \backslash{}^{5}l_6^{\circ} - {}_{d}^{3|5}l_6, \\ 2\cdot{}^{3}N_4\cdot{}^{5}l_6^{\perp},\ 2\cdot{}^{3}\tilde{n}_4\cdot{}^{5}l_6^{\circ},\ {}^{3}N_4\cdot{}^{5}l_6^{\circ} - {}_{d}^{3|5}l_6 \end{bmatrix}\backslash.$$

-continued $$\begin{bmatrix} \\ 1,\ \tau_4,\ \tau_5,\ \tau_4\cdot\tau_5,\ \tau_4^{:2},\ \tau_5^{:2},\ \backslash \\ \tau_4^{:2}\cdot\tau_5,\ \tau_4\cdot\tau_5^{:2},\ \tau_4^{:2}\cdot\tau_5^{:2} \end{bmatrix} = 0_3,$$

in the formula, \ denoting the line continuation character; ${}^{5}l_6^{\circ}$ and ${}^{5}l_6^{\perp}$ respectively representing the zero vector and the radial vector of axis 5 to axis 6; ${}^{\bar{l}}\tilde{n}_l$ denoting a cross-product matrix of axis invariant ${}^{\bar{l}}n_l$; $0_3=[0\ 0\ 0]^T$; ${}^{l}l_{\bar{l}}^{\bullet} \triangleq -{}^{\bar{l}}\tilde{n}_l^{2}\cdot{}^{l}l_{\bar{l}}$, ${}^{l}l_{\bar{l}}^{\circ} \triangleq {}^{\bar{l}}N_l\cdot{}^{l}l_{\bar{l}}$, ${}^{\bar{l}}\tilde{n}_l\cdot{}^{l}l_{\bar{l}} = {}^{\bar{l}}\tilde{n}_l\cdot({}^{l}l_{\bar{l}}^{I}+{}^{l}l_{\bar{l}}^{\bullet}) = {}^{\bar{l}}\tilde{n}_l\cdot{}^{l}l_{\bar{l}}^{\bullet} = {}^{l}l_{\bar{l}}^{\perp}$, $-{}^{\bar{l}}\tilde{n}_l^{:2} = 1-{}^{\bar{l}}n_l\cdot{}^{\bar{l}}n_l^{T} \triangleq {}^{\bar{l}}N_l$; ${}^{3}n_4$ representing the coordinate vector from link 3 to link 4, which is the axis invariant; ${}^{3}\tilde{n}_4$ representing the cross-product of the axis invariant ${}^{3}n_4$, and the rest of the links being the same.

11. The modeling and solving method according to claim 1, which applies a 3R robot arm position inverse solution principle based on the axis invariant and calculates the position inverse solution of the 3R robotic arm accurately and in real time; expressing the 3R kinematic polynomial equation of the position inverse solution principle as $$f^{[1:3]} = \tau_1^i\begin{pmatrix} \tau_3^1\cdot{}^{1}l_2 + \tau_3^2\cdot{}^{1}Q_2 \\ \backslash\cdot{}^{2}l_3 + {}^{1}Q_3\cdot{}^{3}l_{3S} \end{pmatrix} - \tau_3^1\cdot{}^{1}Q_i\cdot{}_{d}^{i}r_{3S} = 0_3,$$

for polynomial system $F_3(Y_2|T_2)$, $\mathrm{Det}(F_3(Y_2|T_2))/\tau_1^{t:2} \underset{con}{\coloneqq} Y_2^{\beta:T}\cdot{}_{S}\overline{\Theta}_S(\tau_1)\cdot T_2^{\beta}$ wherein $${}_{S}\overline{\Theta}_S^{[i][j]}(\tau_1) = \sum_{l}^{[0:2]}\left({}_{S}\overline{\Theta}_S^{[i][j][l]}\cdot\tau_1^{:l}\right),$$

$$con = \{\beta2,\ \alpha2 \in [0:3],\ \alpha3,\ \beta3 \in [0:1]\}, \qquad S = 8$$

$$Y_2^{\beta} = \left[1 \quad \tau_2 \quad \tau_3 \quad \tau_2\tau_3 \quad \tau_2^{:2} \quad \tau_2^{:2}\tau_3 \quad \tau_2^{:3} \quad \tau_2^{:3}\tau_3\right],\ T_2^{\beta\wedge T} = Y_2^{\beta}(\tau_{[2:3]}\,|\,y_{[2:3]}).$$

12. The modeling and solving method according to claim 1, which applies an inverse solution principle of the general 6R robot arm based on the axis invariant principle to accurately and real-timely calculate the general 6R robot arm inverse solution of position and pose; expressing the principle of reversed solution of the pose as: if given 6R axis chain ${}^{i}l_6$=(i,1:6], ${}^{i}l_1=0_3$, the expected position vector and "Ju-Gibbs" quaternions are ${}_{d}^{i}r_6$ and ${}_{d}^{i}\boldsymbol{\tau}_5$ respectively; the 6R robot kinematics polynomial equation represented by the axis invariant being $$f^{[1:3]} := {}_{d}\tau_5^i\cdot\left({}^{3}Q_1\cdot{}^{1}Q_i\cdot{}_{d}^{i}r_6 - \tau_1^i\cdot\left({}^{3}Q_1\cdot{}^{1}l_2 + \tau_2^1\cdot{}^{3}Q_2\cdot{}^{2}l_3\right)\right)\backslash-$$

$$\begin{pmatrix} {}^{i}\tau_3^T\cdot C_{11}\cdot{}^{i}\tau_3\cdot\left({}^{3}l_4+{}^{4}l_5+{}^{5}l_6\right)\backslash+ \\ 2\cdot{}^{i}\tau_3^T\cdot C_{12}\cdot{}^{i}\tau_3\cdot\left({}^{4}l_5^{\perp}+{}^{3}\tilde{n}_4\cdot{}^{5}l_6\right)\backslash+ \\ 2\cdot{}^{i}\tau_3^T\cdot C_{13}\cdot{}^{i}\tau_3\cdot{}^{5}l_6^{\perp}\backslash+ \\ 4\cdot{}^{i}\tau_3^T\cdot C_{14}\cdot{}^{i}\tau_3\cdot{}^{i}\tilde{n}_4\cdot{}^{5}l_6^{\perp}\backslash+ \\ 2\cdot{}^{i}\tau_3^T\cdot C_{24}\cdot{}^{i}\tau_3\cdot{}^{3}N_4\cdot{}^{5}l_6^{\perp}\backslash+ \\ 2\cdot{}^{i}\tau_3^T\cdot C_{34}\cdot{}^{i}\tau_3\cdot\left({}^{4}l_5^{\perp}+{}^{3}\tilde{n}_4\cdot{}^{5}l_6^{\circ}\right)\backslash+ \\ {}^{i}\tau_3^T\cdot C_{22}\cdot{}^{i}\tau_3\cdot\left({}^{3}l_4+{}^{4}l_5^{\circ}+{}^{3}N_4\cdot{}^{5}l_6\right)\backslash+ \\ {}^{i}\tau_3^T\cdot C_{33}\cdot{}^{i}\tau_3\cdot\left({}^{3}l_4+{}^{4}l_5+{}^{5}l_6^{\circ}\right)\backslash+ \\ {}^{i}\tau_3^T\cdot C_{44}\cdot{}^{i}\tau_3\cdot\left({}^{3}l_4+{}^{4}l_5^{\circ}+{}^{3}N_4\cdot{}^{5}l_6^{\circ}\right) \end{pmatrix} = 0_3,$$

wherein $\tau_1^{i}+1+\tau_1^{:2}$, $\tau_2^{1}+1+\tau_2^{:2}$, $\tau_3^{2}+1+\tau_3^{:2}$, ${}_{d}\tau_5^{i}=\|{}_{d}^{i}\boldsymbol{\tau}_5\|^2$, expressing the matrix of system structure parameters and expected "Ju-Gibbs' attitude quaternions as:

$$^{3}E_5 = \left[{}^{3}n_4,\ \ {}^{4}n_5,\ \ {}^{3}\tilde{n}_4\cdot{}^{4}n_5\right]^{-1}$$

$$\underset{\cdot}{C} = \begin{bmatrix} {}^{3}n_4^T\cdot{}^{4}n_5\cdot{}^{3}E_5^{[3][\bullet]}\cdot\left({}_d^i\tilde{\tau}_5-1\right)+{}_d^i\tau_5^T, & {}^{3}n_4^T\cdot{}^{4}n_5\cdot{}^{3}E_5^{[3][\bullet]}\cdot{}_d^i\tau_5+1 \\ {}^{3}E_5\cdot\left({}_d^i\tilde{\tau}_5-1\right) & {}^{3}E_5\cdot{}_d^i\tau_5 \end{bmatrix},$$

$$\underset{\cdot}{C}_{[1]} = \left[{}^{3}n_4^T\cdot{}^{4}n_5\cdot{}^{3}E_5^{[3][\bullet]}\backslash\cdot\left({}_d^i\tilde{\tau}_5-1\right)+{}_d^i\tau_5^T,\right.$$

$$\left.1+{}^{3}n_4^T\cdot{}^{4}n_5\cdot\backslash{}^{3}E_5^{[3][\bullet]}\cdot{}_d^i\tau_5\right]$$

$$\underset{\cdot}{C}_{[k+1]} = \left[{}^{3}E_5^{[k][\bullet]}\cdot\left({}_d^i\tilde{\tau}_5-1\right),\ {}^{3}E_5^{[k][\bullet]}\cdot{}_d^i\tau_5\right],\ k\in[1:3],$$

$$\underset{\cdot}{C}_{11} \triangleq \underset{\cdot}{C}_{[1]}^T\cdot\underset{\cdot}{C}_{[1]},\ \underset{\cdot}{C}_{22} \triangleq \underset{\cdot}{C}_{[2]}^T\cdot\underset{\cdot}{C}_{[2]}$$

$$\underset{\cdot}{C}_{33} \triangleq \underset{\cdot}{C}_{[3]}^T\cdot\underset{\cdot}{C}_{[3]},\ \underset{\cdot}{C}_{44} \triangleq \underset{\cdot}{C}_{[4]}^T\cdot\underset{\cdot}{C}_{[4]}$$

$$\underset{\cdot}{C}_{12} \triangleq \underset{\cdot}{C}_{[1]}^T\cdot\underset{\cdot}{C}_{[2]},\ \underset{\cdot}{C}_{13} \triangleq \underset{\cdot}{C}_{[1]}^T\cdot\underset{\cdot}{C}_{[3]},\ \underset{\cdot}{C}_{14} \triangleq \underset{\cdot}{C}_{[1]}^T\cdot\underset{\cdot}{C}_{[4]}$$

$$\underset{\cdot}{C}_{23} \triangleq \underset{\cdot}{C}_{[2]}^T\cdot\underset{\cdot}{C}_{[3]},\ \underset{\cdot}{C}_{24} \triangleq \underset{\cdot}{C}_{[2]}^T\cdot\underset{\cdot}{C}_{[4]},\ \underset{\cdot}{C}_{34} \triangleq \underset{\cdot}{C}_{[3]}^T\cdot\underset{\cdot}{C}_{[4]},$$

and the Dixon matrix of axis invariant characterized 6R robot kinematics polynomial system $F_3(Y_2|T_2)$ with the following structure $$\mathrm{Det}(F_3(Y_2|T_2))/\tau_1{}^{i}\vdots^{2} \underset{con}{=} Y_2{}^{\alpha\wedge T}\cdot{}_S\overline{\Theta}_S(\tau_1)\cdot T_2{}^{\alpha},$$

wherein $${}_S\overline{\Theta}_S{}^{[i][j]}(\tau_1)={}_S\overline{\Theta}_S{}^{[i][j][0]}+{}_S\overline{\Theta}_S{}^{[i][j][1]}\cdot\tau_1+{}_S\overline{\Theta}_S{}^{[i][j][l]}\cdot\tau_1\vdots^{2},$$

$$con=\{\beta 2,\alpha_2\in[0:3],\beta 3,\alpha_3\in[0:1]\},S=\mathrm{Min}(|T_2{}^{\alpha}|,|Y_2{}^{\beta}|)=8$$

$$Y_2{}^{\beta\wedge T}=[1\ y_2\ y_2\vdots^{2}\ y_2\vdots^{3}\ y_3\ y_2y_3\ y_2\vdots^{2}y_3\ y_2\vdots^{3}y_3],\quad T_2{}^{\beta\wedge T}=Y_2{}^{\beta}(\tau_{[2:3]}|y_{[2:3]}).$$

13. The modeling and solving method according to claim 1, which applies an inverse solution principle of general 7R robotic arm based on axial invariance for modeling and solving; the inverse solution principle is expressed as:

if given 7R axis chain ${}^{i}l_7=(i,1:7]$, ${}^{i}l_1=0_3$, denoting the expected position vector and "Ju-Gibbs" quaternions as ${}_d^i r_7$ and ${}_d^i\boldsymbol{\tau}_6$ respectively, the 7R robot kinematics polynomial equation represented by the axis invariant being $$f^{[1:3]} :=$$

$$\begin{cases} {}_d\tau_6^i\cdot\left({}^{3}Q_1\cdot{}^{1}Q_i\cdot{}_d^i r_7-\tau_1^i\cdot\left({}^{4}Q_1\cdot{}^{1}l_2+\tau_2^1\cdot{}^{4}Q_2\cdot{}^{2}l_3\backslash+\tau_2^1\tau_3^2\cdot{}^{4}Q_3\cdot{}^{3}l_4\right)\right)\backslash- \\ \begin{pmatrix} {}^{i}\underset{\cdot}{\tau}_4^T\cdot\underset{\cdot}{C}_{11}\cdot{}^{i}\underset{\cdot}{\tau}_4\cdot\left({}^{4}l_5+{}^{5}l_6+{}^{6}l_7\right)\backslash+ \\ 2\cdot{}^{i}\underset{\cdot}{\tau}_4^T\cdot\underset{\cdot}{C}_{12}\cdot{}^{i}\underset{\cdot}{\tau}_4\cdot\left({}^{5}l_6^{\perp}+{}^{4}\tilde{n}_5\cdot{}^{6}l_7\right)\backslash+ \\ 2\cdot{}^{i}\underset{\cdot}{\tau}_4^T\cdot\underset{\cdot}{C}_{13}\cdot{}^{i}\underset{\cdot}{\tau}_4\cdot{}^{6}l_7^{\perp}\backslash+ \\ 4\cdot{}^{i}\underset{\cdot}{\tau}_4^T\cdot\underset{\cdot}{C}_{14}\cdot{}^{i}\underset{\cdot}{\tau}_4\cdot{}^{4}\tilde{n}_5\cdot{}^{6}l_7^{\perp}\backslash+ \\ 2\cdot{}^{i}\underset{\cdot}{\tau}_4^T\cdot\underset{\cdot}{C}_{24}\cdot{}^{i}\underset{\cdot}{\tau}_4\cdot\left({}^{5}l_6^{\perp}+{}^{4}\tilde{n}_5\cdot{}^{6}l_7^{\circ}\right)\backslash+ \\ 2\cdot{}^{i}\underset{\cdot}{\tau}_4^T\cdot\underset{\cdot}{C}_{34}\cdot{}^{i}\underset{\cdot}{\tau}_4\cdot{}^{4}N_5\cdot{}^{6}l_7^{\perp}\backslash+ \\ {}^{i}\underset{\cdot}{\tau}_4^T\cdot\underset{\cdot}{C}_{22}\cdot{}^{i}\underset{\cdot}{\tau}_4\cdot\left({}^{4}l_5+{}^{5}l_6^{\circ}+{}^{4}N_5\cdot{}^{6}l_7\right)\backslash+ \\ {}^{i}\underset{\cdot}{\tau}_4^T\cdot\underset{\cdot}{C}_{33}\cdot{}^{i}\underset{\cdot}{\tau}_4\cdot\left({}^{4}l_5+{}^{5}l_6+{}^{6}l_7^{\circ}\right)\backslash+ \\ {}^{i}\underset{\cdot}{\tau}_4^T\cdot\underset{\cdot}{C}_{44}\cdot{}^{i}\underset{\cdot}{\tau}_4\cdot\left({}^{4}l_5+{}^{5}l_6^{\circ}+{}^{4}N_5\cdot{}^{6}l_7^{\circ}\right) \end{pmatrix} = 0_3 \\ {}^{i}\underset{\cdot}{\tau}_4^T\cdot\left[\underset{\cdot}{C}_{11}+\underset{\cdot}{C}_{22}+\underset{\cdot}{C}_{33}+\underset{\cdot}{C}_{44}\right]\cdot{}^{i}\underset{\cdot}{\tau}_4-{}^{i}\underset{\cdot}{\varepsilon}_6^{[4]}\cdot{}_d\tau_6^i\cdot\underset{\cdot}{C}_{[1]}\cdot{}^{i}\underset{\cdot}{\tau}_4=0, \end{cases}$$

wherein $\tau_1{}^{i}+1+\tau_1\vdots^{2}$, $\tau_2{}^{1}+1+\tau_2\vdots^{2}$, $\tau_3{}^{2}+1+\tau_3\vdots^{2}$, ${}_d\tau_6{}^{i}=\|{}_d^i\boldsymbol{\tau}_6\|^2$ expressing the matrix of system structure parameters and expectation "Ju-Gibbs" attitude quaternions as:

$$^{4}E_6 = \left[{}^{4}n_5\ \ {}^{5}n_6\ \ {}^{4}\tilde{n}_5\cdot{}^{5}n_6\right]^{-1},$$

$$\underset{\cdot}{C} = \begin{bmatrix} {}^{4}n_5^T\cdot{}^{5}n_6\cdot{}^{4}E_6^{[3][\bullet]}\cdot\left({}_d^i\tilde{\tau}_6-1\right)+{}_d^i\tau_6^T, & {}^{4}n_5^T\cdot{}^{5}n_6\cdot{}^{4}E_6^{[3][\bullet]}\cdot{}_d^i\tau_6+1 \\ {}^{4}E_6\cdot\left({}_d^i\tilde{\tau}_6-1\right) & {}^{4}E_6\cdot{}_d^i\tau_6 \end{bmatrix},$$

$$\underset{\cdot}{C}_{[1]} = \left[{}^{4}n_5^T\cdot{}^{5}n_6\cdot{}^{4}E_6^{[3][\bullet]}\cdot\left({}_d^i\tilde{\tau}_6-1\right)+{}_d^i\tau_6^T,\ {}^{4}n_5^T\cdot{}^{5}n_6\cdot{}^{4}E_6^{[3][\bullet]}\cdot{}_d^i\tau_6+1\right],$$

$$\underset{\cdot}{C}_{[k+1]} = \left[{}^{4}E_6^{[k][\bullet]}\cdot\left({}_d^i\tilde{\tau}_6-1\right),\ {}^{4}E_6^{[k][\bullet]}\cdot{}_d^i\tau_6\right],\ k\in[1:3],$$

$$\underset{\cdot}{C}_{11} \triangleq \underset{\cdot}{C}_{[1]}^T\cdot\underset{\cdot}{C}_{[1]},\ \underset{\cdot}{C}_{22} \triangleq \underset{\cdot}{C}_{[2]}^T\cdot\underset{\cdot}{C}_{[2]}$$

$$\underset{\cdot}{C}_{33} \triangleq \underset{\cdot}{C}_{[3]}^T\cdot\underset{\cdot}{C}_{[3]},\ \underset{\cdot}{C}_{44} \triangleq \underset{\cdot}{C}_{[4]}^T\cdot\underset{\cdot}{C}_{[4]}$$

$$\underset{\cdot}{C}_{12} \triangleq \underset{\cdot}{C}_{[1]}^T\cdot\underset{\cdot}{C}_{[2]},\ \underset{\cdot}{C}_{13} \triangleq \underset{\cdot}{C}_{[1]}^T\cdot\underset{\cdot}{C}_{[3]},\ \underset{\cdot}{C}_{14} \triangleq \underset{\cdot}{C}_{[1]}^T\cdot\underset{\cdot}{C}_{[4]}$$

$$\underset{\cdot}{C}_{23} \triangleq \underset{\cdot}{C}_{[2]}^T\cdot\underset{\cdot}{C}_{[3]},\ \underset{\cdot}{C}_{24} \triangleq \underset{\cdot}{C}_{[2]}^T\cdot\underset{\cdot}{C}_{[4]},\ \underset{\cdot}{C}_{34} \triangleq \underset{\cdot}{C}_{[3]}^T\cdot\underset{\cdot}{C}_{[4]}.$$

* * * * *